US008923806B2

(12) United States Patent
Johnson

(10) Patent No.: US 8,923,806 B2
(45) Date of Patent: Dec. 30, 2014

(54) SYSTEM AND METHOD FOR PRESENTING APPLICATION DATA BY DATA PROCESSING SYSTEM(S) IN A VICINITY

(71) Applicant: William J. Johnson, Flower Mound, TX (US)

(72) Inventor: William J. Johnson, Flower Mound, TX (US)

( * ) Notice: Subject to any disclaimer, the term of this patent is extended or adjusted under 35 U.S.C. 154(b) by 0 days.

(21) Appl. No.: 13/972,001

(22) Filed: Aug. 21, 2013

(65) Prior Publication Data

US 2013/0337836 A1 Dec. 19, 2013

Related U.S. Application Data

(63) Continuation of application No. 12/590,831, filed on Nov. 13, 2009, now Pat. No. 8,634,796.

(51) Int. Cl.

| | |
|---|---|
| ***H04M 11/04*** | (2006.01) |
| ***H04L 12/24*** | (2006.01) |
| ***H04W 4/02*** | (2009.01) |
| *G06Q 10/08* | (2012.01) |
| *G06Q 30/06* | (2012.01) |

(52) U.S. Cl.

CPC ............ *H04W 4/02* (2013.01); *H04L 41/0816* (2013.01); *G06Q 10/0833* (2013.01); *G06Q 30/0633* (2013.01); *G06Q 10/087* (2013.01)

USPC ...................... 455/404.2; 455/456.3; 370/331

(58) Field of Classification Search

CPC ....... H04W 4/02; H04W 4/025; H04W 4/023; H04W 4/021; H04W 4/028; H04W 4/04; H04W 64/003; H04W 64/00; H04W 8/10; H04W 4/003; H04W 36/32; H04W 40/20; H04W 8/06; H04L 67/18

USPC ................................ 455/404.2, 414.1, 456.3

See application file for complete search history.

(56) References Cited

U.S. PATENT DOCUMENTS

| | | | |
|---|---|---|---|
| 3,636,421 | A | 1/1972 | Barker et al. |
| 4,021,780 | A | 5/1977 | Narey et al. |

(Continued)

FOREIGN PATENT DOCUMENTS

| | | |
|---|---|---|
| EP | 0712227 | 5/1996 |
| EP | 915590 | 5/1999 |

(Continued)

OTHER PUBLICATIONS

Bill N. Schilit and Marvin M. Theimer, Disseminating Active Map Information Mobile Hosts, IEEE Network, Sep./Oct. 1994.

(Continued)

*Primary Examiner* — Liton Miah
(74) *Attorney, Agent, or Firm* — Yudell Isidore PLLC

(57) ABSTRACT

Provided is a distributed system and method for enabling new and useful location dependent features and functionality to mobile data processing systems. Mobile data processing Systems (MSs) interact with each other as peers in communications and interoperability. Data is shared between mobile data processing systems to carry out novel Location Based eXchanges (LBX) of data for new mobile applications. Information transmitted inbound to, transmitted outbound from, is in process at, or is application modified at a mobile data processing system triggers processing of actions in accordance with user configured permissions, charters, and other configurations. In a preferred embodiment, a user configurable platform is provided for quickly building well behaving LBX applications at MSs and across a plurality of interoperating MSs. Tools, triggered interfaces and integrated applications are disclosed for a breadth of MS LBX configurations and functionality.

38 Claims, 322 Drawing Sheets

(56) References Cited

U.S. PATENT DOCUMENTS

| | | | |
|---|---|---|---|
| 4,255,619 | A | 3/1981 | Saito |
| 4,445,118 | A | 4/1984 | Taylor et al. |
| 4,536,647 | A | 8/1985 | Atalla et al. |
| 4,644,351 | A | 2/1987 | Zabarsky et al. |
| 4,757,267 | A | 7/1988 | Riskin |
| 4,841,560 | A | 6/1989 | Chan et al. |
| 4,845,504 | A | 7/1989 | Roberts et al. |
| 4,922,516 | A | 5/1990 | Butler et al. |
| 4,973,952 | A | 11/1990 | Malec et al. |
| 4,974,170 | A | 11/1990 | Bouve et al. |
| 4,977,399 | A | 12/1990 | Price et al. |
| 5,089,814 | A | 2/1992 | DeLuca et al. |
| 5,095,532 | A | 3/1992 | Mardus |
| 5,121,126 | A | 6/1992 | Clagett |
| 5,122,795 | A | 6/1992 | Cubley et al. |
| 5,131,020 | A | 7/1992 | Liebesny et al. |
| 5,185,857 | A | 2/1993 | Rozmanith et al. |
| 5,196,031 | A | 3/1993 | Hook |
| 5,214,793 | A | 5/1993 | Conway et al. |
| 5,223,844 | A | 6/1993 | Mansell et al. |
| 5,243,652 | A | 9/1993 | Teare et al. |
| 5,245,608 | A | 9/1993 | Deaton et al. |
| 5,264,822 | A | 11/1993 | Vogelman et al. |
| 5,265,070 | A | 11/1993 | Minowa |
| 5,303,393 | A | 4/1994 | Noreen et al. |
| 5,321,242 | A | 6/1994 | Heath, Jr. |
| 5,337,044 | A | 8/1994 | Folger et al. |
| 5,347,632 | A | 9/1994 | Filepp et al. |
| 5,363,377 | A | 11/1994 | Sharpe |
| 5,365,516 | A | 11/1994 | Jandrell |
| 5,371,794 | A | 12/1994 | Diffie et al. |
| 5,390,237 | A | 2/1995 | Hoffman et al. |
| 5,404,505 | A | 4/1995 | Levinson |
| 5,432,841 | A | 7/1995 | Rimer |
| 5,444,444 | A | 8/1995 | Ross |
| 5,451,757 | A | 9/1995 | Heath, Jr. |
| 5,455,807 | A | 10/1995 | Nepple |
| 5,461,627 | A | 10/1995 | Rypinski |
| 5,469,362 | A | 11/1995 | Hunt et al. |
| 5,475,735 | A | 12/1995 | Williams et al. |
| 5,485,163 | A | 1/1996 | Singer et al. |
| 5,487,103 | A | 1/1996 | Richardson |
| 5,493,309 | A | 2/1996 | Bjornholt et al. |
| 5,497,414 | A | 3/1996 | Bartholomew |
| 5,504,482 | A | 4/1996 | Schreder |
| 5,511,111 | A | 4/1996 | Serbetcioglu et al. |
| 5,511,233 | A | 4/1996 | Otten |
| 5,512,908 | A | 4/1996 | Herrick |
| 5,513,263 | A | 4/1996 | White et al. |
| 5,528,248 | A | 6/1996 | Steiner et al. |
| 5,539,395 | A | 7/1996 | Buss et al. |
| 5,544,354 | A | 8/1996 | May et al. |
| 5,559,520 | A | 9/1996 | Barzegar et al. |
| 5,561,704 | A | 10/1996 | Salimando |
| 5,566,235 | A | 10/1996 | Hetz |
| 5,581,479 | A | 12/1996 | McLaughlin |
| 5,583,864 | A | 12/1996 | Lightfoot et al. |
| 5,586,254 | A | 12/1996 | Kondo et al. |
| 5,588,042 | A | 12/1996 | Comer |
| 5,590,196 | A | 12/1996 | Moreau |
| 5,590,398 | A | 12/1996 | Matthews |
| 5,592,470 | A | 1/1997 | Rudrapatna et al. |
| 5,594,779 | A | 1/1997 | Goodman |
| 5,596,625 | A | 1/1997 | LeBlanc |
| 5,602,843 | A | 2/1997 | Gray |
| 5,608,854 | A | 3/1997 | Labedz et al. |
| 5,610,973 | A | 3/1997 | Comer |
| 5,625,364 | A | 4/1997 | Herrick et al. |
| 5,625,668 | A | 4/1997 | Loomis |
| 5,627,549 | A | 5/1997 | Park |
| 5,636,245 | A | 6/1997 | Ernst et al. |
| 5,646,632 | A | 7/1997 | Khan et al. |
| 5,654,959 | A | 8/1997 | Baker et al. |
| 5,657,375 | A | 8/1997 | Connolly et al. |
| 5,661,492 | A | 8/1997 | Shoap et al. |
| 5,663,734 | A | 9/1997 | Krasner |
| 5,664,948 | A | 9/1997 | Dimitriadis et al. |
| 5,666,481 | A | 9/1997 | Lewis |
| 5,677,905 | A | 10/1997 | Bigham |
| 5,687,212 | A | 11/1997 | Kinser, Jr. et al. |
| 5,689,431 | A | 11/1997 | Rudow et al. |
| 5,694,453 | A | 12/1997 | Fuller et al. |
| 5,701,301 | A | 12/1997 | Weisser, Jr. |
| 5,704,049 | A | 12/1997 | Briechle |
| 5,712,899 | A | 1/1998 | Pace, II |
| 5,713,075 | A | 1/1998 | Threadgill et al. |
| 5,714,948 | A | 2/1998 | Farmakis et al. |
| 5,717,688 | A | 2/1998 | Belanger et al. |
| 5,720,033 | A | 2/1998 | Deo |
| 5,724,521 | A | 3/1998 | Dedrick |
| 5,727,057 | A | 3/1998 | Emery et al. |
| 5,729,680 | A | 3/1998 | Belanger et al. |
| 5,758,049 | A | 5/1998 | Johnson et al. |
| 5,771,283 | A | 6/1998 | Chang et al. |
| 5,774,534 | A | 6/1998 | Mayer |
| 5,778,304 | A | 7/1998 | Grube et al. |
| 5,790,974 | A | 8/1998 | Tognazzini |
| 5,794,210 | A | 8/1998 | Goldhaber et al. |
| 5,796,727 | A | 8/1998 | Harrison et al. |
| 5,798,733 | A | 8/1998 | Ethridge |
| 5,806,018 | A | 9/1998 | Smith et al. |
| 5,812,763 | A | 9/1998 | Teng |
| 5,819,155 | A | 10/1998 | Worthey et al. |
| 5,826,195 | A | 10/1998 | Westerlage et al. |
| 5,835,061 | A | 11/1998 | Stewart |
| 5,838,774 | A | 11/1998 | Weisser, Jr. |
| 5,842,010 | A | 11/1998 | Jain et al. |
| 5,845,211 | A | 12/1998 | Roach |
| 5,852,775 | A | 12/1998 | Hidary |
| 5,855,007 | A | 12/1998 | Jovicic et al. |
| 5,870,555 | A | 2/1999 | Pruett et al. |
| 5,870,724 | A | 2/1999 | Lawlor et al. |
| 5,875,186 | A | 2/1999 | Belanger et al. |
| 5,875,401 | A | 2/1999 | Rochkind |
| 5,878,126 | A | 3/1999 | Velamuri et al. |
| 5,880,958 | A | 3/1999 | Helms et al. |
| 5,881,131 | A | 3/1999 | Farris et al. |
| 5,884,284 | A | 3/1999 | Peters et al. |
| 5,887,259 | A | 3/1999 | Zicker et al. |
| 5,889,953 | A | 3/1999 | Thebaut et al. |
| 5,892,454 | A | 4/1999 | Schipper et al. |
| 5,896,440 | A | 4/1999 | Reed et al. |
| 5,897,640 | A | 4/1999 | Veghte et al. |
| 5,903,636 | A | 5/1999 | Malik |
| 5,907,544 | A | 5/1999 | Rypinski |
| 5,920,846 | A | 7/1999 | Storch et al. |
| 5,922,040 | A | 7/1999 | Prabhakaran |
| 5,923,702 | A | 7/1999 | Brenner et al. |
| 5,933,420 | A | 8/1999 | Jaszewski et al. |
| 5,938,721 | A | 8/1999 | Dussell et al. |
| 5,949,867 | A | 9/1999 | Sonnenberg |
| 5,950,130 | A | 9/1999 | Coursey |
| 5,961,593 | A | 10/1999 | Gabber et al. |
| 5,963,866 | A | 10/1999 | Palamara et al. |
| 5,963,913 | A | 10/1999 | Henneuse et al. |
| 5,968,176 | A | 10/1999 | Nessett et al. |
| 5,969,678 | A | 10/1999 | Stewart |
| 5,982,867 | A | 11/1999 | Urban et al. |
| 5,983,091 | A | 11/1999 | Rodriguez |
| 5,987,381 | A | 11/1999 | Oshizawa |
| 5,991,287 | A | 11/1999 | Diepstraten et al. |
| 5,995,015 | A | 11/1999 | DeTemple et al. |
| 6,006,090 | A | 12/1999 | Coleman et al. |
| 6,009,398 | A | 12/1999 | Mueller et al. |
| 6,011,975 | A | 1/2000 | Emery et al. |
| 6,018,293 | A | 1/2000 | Smith |
| 6,026,151 | A | 2/2000 | Bauer et al. |
| 6,028,921 | A | 2/2000 | Malik et al. |
| 6,047,327 | A | 4/2000 | Tso et al. |
| 6,055,637 | A | 4/2000 | Hudson et al. |
| 6,058,106 | A | 5/2000 | Cudak et al. |
| 6,067,082 | A | 5/2000 | Enmei |
| 6,067,297 | A | 5/2000 | Beach |
| 6,073,062 | A | 6/2000 | Hoshino et al. |

(56) References Cited

U.S. PATENT DOCUMENTS 6,076,080 A 6/2000 Morscheck et al.
6,085,086 A 7/2000 La Porta et al.
6,091,956 A * 7/2000 Hollenberg ................ 455/456.5
6,101,381 A 8/2000 Tajima et al.
6,101,443 A 8/2000 Kato et al.
6,112,186 A 8/2000 Bergh et al.
6,115,669 A 9/2000 Watanabe et al.
6,122,520 A 9/2000 Want et al.
6,133,853 A 10/2000 Obradovich et al.
6,138,003 A 10/2000 Kingdon et al.
6,138,119 A 10/2000 Hall et al.
6,141,609 A 10/2000 Herdeg et al.
6,144,645 A 11/2000 Struhsaker et al.
6,154,152 A 11/2000 Ito
6,154,637 A 11/2000 Wright et al.
6,157,829 A 12/2000 Grube et al.
6,157,946 A 12/2000 Itakura et al.
6,163,274 A 12/2000 Lindgren
6,167,255 A 12/2000 Kennedy, III et al.
6,182,226 B1 1/2001 Reid et al.
6,184,829 B1 2/2001 Stilp
6,185,426 B1 2/2001 Alperovich et al.
6,185,484 B1 2/2001 Rhinehart
6,192,314 B1 2/2001 Khavakh et al.
6,202,054 B1 3/2001 Lawlor et al.
6,205,478 B1 3/2001 Sugano et al.
6,208,854 B1 3/2001 Roberts et al.
6,208,866 B1 3/2001 Rouhollahzadeh et al.
6,226,277 B1 5/2001 Chuah
6,229,477 B1 5/2001 Chang et al.
6,229,810 B1 5/2001 Gerszberg et al.
6,233,329 B1 5/2001 Urban et al.
6,233,452 B1 5/2001 Nishino
6,236,360 B1 5/2001 Rudow et al.
6,236,365 B1 5/2001 LeBlanc et al.
6,236,940 B1 5/2001 Rudow et al.
6,246,361 B1 6/2001 Weill et al.
6,246,948 B1 6/2001 Thakker
6,252,544 B1 6/2001 Hoffberg
6,259,405 B1 7/2001 Stewart et al.
6,263,209 B1 7/2001 Reed et al.
6,266,615 B1 7/2001 Jin
6,278,938 B1 8/2001 Alumbaugh
6,285,665 B1 9/2001 Chuah et al.
6,285,931 B1 9/2001 Hattori et al.
6,298,234 B1 10/2001 Brunner
6,308,273 B1 10/2001 Goertzel et al.
6,311,069 B1 10/2001 Havinis et al.
6,317,718 B1 11/2001 Fano
6,321,092 B1 11/2001 Fitch et al.
6,324,396 B1 11/2001 Vasa et al.
6,326,918 B1 12/2001 Stewart
6,327,254 B1 12/2001 Chuah
6,327,357 B1 12/2001 Meek et al.
6,332,127 B1 12/2001 Bandera et al.
6,332,163 B1 12/2001 Bowman-Amuah
6,340,958 B1 1/2002 Cantu et al.
6,343,290 B1 1/2002 Cossins et al.
6,345,288 B1 2/2002 Reed et al.
6,353,664 B1 3/2002 Cannon et al.
6,359,880 B1 3/2002 Curry et al.
6,360,101 B1 3/2002 Irvin
6,366,561 B1 4/2002 Bender
6,370,389 B1 4/2002 Isomursu et al.
6,377,548 B1 4/2002 Chuah et al.
6,377,810 B1 4/2002 Geiger et al.
6,377,982 B1 4/2002 Rai et al.
6,381,311 B2 4/2002 Joyce et al.
6,385,531 B2 5/2002 Bates et al.
6,385,591 B1 5/2002 Mankoff
6,389,055 B1 5/2002 August et al.
6,389,426 B1 5/2002 Turnbull et al.
6,393,482 B1 5/2002 Rai et al.
6,400,722 B1 6/2002 Chuah et al.
6,405,123 B1 6/2002 Rennard et al.
6,407,673 B1 6/2002 Lane
6,408,307 B1 6/2002 Semple et al.
6,414,635 B1 7/2002 Stewart et al.
6,414,950 B1 7/2002 Rai et al.
6,415,019 B1 7/2002 Savaglio et al.
6,418,308 B1 7/2002 Heinonen et al.
6,421,441 B1 7/2002 Dzuban
6,421,714 B1 7/2002 Rai et al.
6,427,073 B1 7/2002 Kortesalmi et al.
6,427,115 B1 7/2002 Sekiyama
6,427,119 B1 7/2002 Stefan et al.
6,430,276 B1 8/2002 Bouvier et al.
6,430,562 B1 8/2002 Kardos et al.
6,442,391 B1 8/2002 Johansson et al.
6,442,479 B1 8/2002 Barton
6,442,687 B1 8/2002 Savage
6,449,272 B1 9/2002 Chuah et al.
6,449,497 B1 9/2002 Kirbas et al.
6,452,498 B2 9/2002 Stewart
6,456,234 B1 9/2002 Johnson
6,463,533 B1 10/2002 Calamera et al.
6,470,378 B1 10/2002 Tracton et al.
6,470,447 B1 10/2002 Lambert et al.
6,473,626 B1 10/2002 Nevoux et al.
6,477,382 B1 11/2002 Mansfield et al.
6,477,526 B2 11/2002 Hayashi et al.
6,484,029 B2 11/2002 Hughes et al.
6,484,092 B2 11/2002 Seibel
6,484,148 B1 11/2002 Boyd
6,490,291 B1 12/2002 Lee et al.
6,496,491 B2 12/2002 Chuah et al.
6,496,931 B1 12/2002 Rajchel et al.
6,505,046 B1 1/2003 Baker
6,505,048 B1 1/2003 Moles et al.
6,505,049 B1 1/2003 Dorenbosch
6,505,120 B2 1/2003 Yamashita et al.
6,505,163 B1 1/2003 Zhang et al.
6,512,754 B2 1/2003 Feder et al.
6,516,055 B1 2/2003 Bedeski et al.
6,516,416 B2 2/2003 Gregg et al.
6,519,252 B2 2/2003 Sallberg
6,519,458 B2 2/2003 Oh et al.
6,522,876 B1 2/2003 Weiland et al.
6,526,275 B1 2/2003 Calvert
6,526,349 B2 2/2003 Bullock et al.
6,532,418 B2 3/2003 Chun et al.
6,545,596 B1 4/2003 Moon
6,546,257 B1 4/2003 Stewart
6,560,442 B1 5/2003 Yost et al.
6,560,461 B1 5/2003 Fomukong et al.
6,571,279 B1 5/2003 Herz et al.
6,577,643 B1 6/2003 Rai et al.
6,577,644 B1 6/2003 Chuah et al.
6,594,482 B1 7/2003 Findikli et al.
6,615,131 B1 9/2003 Rennard et al.
6,618,474 B1 9/2003 Reese
6,618,593 B1 9/2003 Drutman et al.
6,622,016 B1 9/2003 Sladek et al.
6,628,627 B1 9/2003 Zendle et al.
6,628,928 B1 9/2003 Crosby et al.
6,628,938 B1 9/2003 Rachabathuni et al.
6,633,633 B1 10/2003 Bedingfield
6,640,184 B1 10/2003 Rabe
6,647,257 B2 11/2003 Owensby
6,647,269 B2 11/2003 Hendrey et al.
6,650,901 B1 11/2003 Schuster et al.
6,654,610 B1 11/2003 Chen et al.
6,662,014 B1 12/2003 Walsh
6,665,536 B1 12/2003 Mahany
6,665,718 B1 12/2003 Chuah et al.
6,671,272 B2 12/2003 Vaziri et al.
6,675,017 B1 1/2004 Zellner et al.
6,675,208 B1 1/2004 Rai et al.
6,677,894 B2 1/2004 Sheynblat et al.
6,697,018 B2 2/2004 Stewart et al.
6,697,783 B1 2/2004 Brinkman et al.
6,701,160 B1 3/2004 Pinder et al.
6,701,251 B2 3/2004 Stefan et al.
6,704,311 B1 3/2004 Chuah et al.

(56) References Cited

U.S. PATENT DOCUMENTS 6,716,101 B1 4/2004 Meadows et al.
6,721,406 B1 4/2004 Contractor
6,725,048 B2 4/2004 Mao et al.
6,731,238 B2 5/2004 Johnson
6,732,080 B1 5/2004 Blants
6,732,101 B1 5/2004 Cook
6,732,176 B1 5/2004 Stewart et al.
6,738,808 B1 5/2004 Zellner et al.
6,754,504 B1 6/2004 Reed
6,754,582 B1 6/2004 Smith et al.
6,759,960 B2 7/2004 Stewart et al.
6,772,064 B1 8/2004 Smith et al.
6,799,049 B1 9/2004 Zellner et al.
6,801,509 B1 10/2004 Chuah et al.
6,816,720 B2 11/2004 Hussain et al.
6,819,929 B2 11/2004 Antonucci et al.
6,820,062 B1 11/2004 Gupta et al.
6,829,475 B1 12/2004 Lee et al.
6,850,758 B1 2/2005 Paul et al.
6,867,733 B2 3/2005 Sandhu et al.
6,868,074 B1 3/2005 Hanson
6,874,011 B1 3/2005 Spielman
6,876,858 B1 4/2005 Duvall et al.
6,898,569 B1 5/2005 Bansal et al.
6,937,869 B1 8/2005 Rayburn
6,937,998 B1 8/2005 Swartz et al.
6,954,147 B1 10/2005 Cromer et al.
6,985,747 B2 1/2006 Chithambaram
6,999,572 B1 2/2006 Shaffer et al.
7,005,985 B1 2/2006 Steeves
7,009,556 B2 3/2006 Stewart et al.
7,023,995 B2 4/2006 Olsson
7,043,231 B2 5/2006 Bhatia et al.
7,058,594 B2 6/2006 Stewart et al.
7,069,319 B2 * 6/2006 Zellner et al. ................ 709/224
7,085,555 B2 8/2006 Zellner et al.
7,103,368 B2 9/2006 Teshima
7,103,476 B2 9/2006 Smith et al.
7,106,843 B1 9/2006 Gainsboro et al.
7,110,749 B2 9/2006 Zellner et al.
7,116,977 B1 10/2006 Moton et al.
7,124,101 B1 10/2006 Mikurak
7,130,631 B2 10/2006 Okazaki et al.
7,139,722 B2 11/2006 Perrella et al.
7,155,199 B2 12/2006 Zalewski et al.
7,177,651 B1 2/2007 Almassy
7,181,225 B1 2/2007 Moton et al.
7,181,529 B2 2/2007 Bhatia et al.
7,188,027 B2 3/2007 Smith et al.
7,190,960 B2 3/2007 Wilson et al.
7,203,502 B2 4/2007 Wilson et al.
7,212,829 B1 5/2007 Lau et al.
7,224,978 B2 5/2007 Zellner et al.
7,236,799 B2 6/2007 Wilson et al.
RE39,717 E 7/2007 Yates et al.
7,245,925 B2 7/2007 Zellner
7,260,378 B2 8/2007 Holland et al.
7,272,493 B1 9/2007 Hamrick et al.
7,292,939 B2 11/2007 Smith et al.
7,295,924 B2 11/2007 Smith et al.
7,308,703 B2 * 12/2007 Wright et al. .................... 726/1
7,362,851 B2 4/2008 Contractor
7,383,052 B2 6/2008 Moton et al.
7,386,396 B2 6/2008 Johnson
7,418,503 B2 * 8/2008 Zellner et al. ................ 709/225
7,693,953 B2 * 4/2010 Middleton et al. ........... 709/207
7,787,887 B2 8/2010 Gupta et al.
8,065,411 B2 * 11/2011 Spiess et al. ................. 709/224
8,688,148 B2 * 4/2014 Steenstra et al. .......... 455/456.5
2001/0001239 A1 5/2001 Stewart
2001/0005864 A1 * 6/2001 Mousseau et al. ........... 709/318
2001/0007450 A1 7/2001 Begum
2001/0021646 A1 9/2001 Antonucci et al.
2001/0028301 A1 10/2001 Geiger et al.
2001/0034709 A1 10/2001 Stoifo et al.
2001/0049275 A1 12/2001 Pierry et al.
2001/0051911 A1 12/2001 Marks et al.
2002/0035474 A1 3/2002 Alpdemir
2002/0035493 A1 3/2002 Mozayeny et al.
2002/0037709 A1 3/2002 Bhatia et al.
2002/0037722 A1 3/2002 Hussain et al.
2002/0037731 A1 3/2002 Mao et al.
2002/0037744 A1 3/2002 Bhatia et al.
2002/0037750 A1 3/2002 Hussain et al.
2002/0038362 A1 3/2002 Bhatia et al.
2002/0038384 A1 3/2002 Khan et al.
2002/0038386 A1 3/2002 Bhatia et al.
2002/0046069 A1 4/2002 Mozayeny et al.
2002/0046077 A1 4/2002 Mozayeny et al.
2002/0046090 A1 4/2002 Stewart
2002/0052781 A1 5/2002 Aufricht et al.
2002/0077083 A1 6/2002 Zellner et al.
2002/0077084 A1 6/2002 Zellner et al.
2002/0077118 A1 6/2002 Zellner et al.
2002/0077130 A1 6/2002 Owensby
2002/0077897 A1 6/2002 Zellner et al.
2002/0087335 A1 7/2002 Meyers et al.
2002/0090932 A1 7/2002 Bhatia et al.
2002/0091991 A1 7/2002 Castro
2002/0095312 A1 7/2002 Wheat
2002/0095454 A1 7/2002 Reed et al.
2002/0102993 A1 8/2002 Hendrey et al.
2002/0107027 A1 8/2002 O'Neil
2002/0120713 A1 8/2002 Gupta et al.
2002/0161637 A1 10/2002 Sugaya
2002/0174147 A1 11/2002 Wang et al.
2003/0003990 A1 1/2003 Von Kohorn
2003/0016233 A1 1/2003 Charpentier
2003/0018527 A1 1/2003 Filepp et al.
2003/0030731 A1 2/2003 Colby
2003/0140088 A1 7/2003 Robinson et al.
2003/0169151 A1 9/2003 Ebling et al.
2004/0002329 A1 1/2004 Bhatia et al.
2004/0097243 A1 5/2004 Zellner et al.
2004/0111269 A1 6/2004 Koch
2004/0116131 A1 6/2004 Hochrainer et al.
2004/0151151 A1 8/2004 Kubler et al.
2004/0164898 A1 8/2004 Stewart
2004/0186902 A1 9/2004 Stewart et al.
2004/0201459 A1 10/2004 Rich et al.
2004/0203903 A1 10/2004 Wilson et al.
2004/0205198 A1 10/2004 Zellner et al.
2004/0228330 A1 11/2004 Kubler et al.
2004/0246940 A1 12/2004 Kubler et al.
2004/0252051 A1 * 12/2004 Johnson .................. 342/357.09
2004/0264442 A1 12/2004 Kubler et al.
2004/0266453 A1 12/2004 Maanoja et al.
2005/0002419 A1 1/2005 Doviak et al.
2005/0004838 A1 1/2005 Perkowski et al.
2005/0017068 A1 1/2005 Zalewski et al.
2005/0043036 A1 2/2005 Ioppe et al.
2005/0050227 A1 3/2005 Michelman
2005/0060365 A1 3/2005 Robinson et al.
2005/0096067 A1 5/2005 Martin
2005/0114777 A1 5/2005 Szeto
2005/0151655 A1 7/2005 Hamrick et al.
2005/0246097 A1 11/2005 Hamrick et al.
2005/0272445 A1 12/2005 Zellner
2005/0283833 A1 12/2005 Lalonde et al.
2006/0009190 A1 1/2006 Laliberte
2006/0010202 A1 1/2006 Blackstock et al.
2006/0022048 A1 2/2006 Johnson
2006/0030335 A1 2/2006 Zellner et al.
2006/0030339 A1 2/2006 Zhovnirovsky et al.
2006/0059043 A1 3/2006 Chan et al.
2006/0089134 A1 4/2006 Moton et al.
2006/0094447 A1 5/2006 Zellner
2006/0099966 A1 5/2006 Moton et al.
2006/0105784 A1 5/2006 Zellner et al.
2006/0106537 A1 5/2006 Hamrick et al.
2006/0136544 A1 6/2006 Atsmon et al.
2006/0164302 A1 7/2006 Stewart et al.
2006/0167986 A1 7/2006 Trzyna et al.
2006/0183467 A1 8/2006 Stewart et al.

(56) References Cited

U.S. PATENT DOCUMENTS

| | | | |
|---|---|---|---|
| 2006/0189327 A1 | 8/2006 | Zellner et al. | |
| 2006/0189332 A1 | 8/2006 | Benco et al. | |
| 2006/0194589 A1 | 8/2006 | Sankisa | |
| 2006/0195570 A1 | 8/2006 | Zellner et al. | |
| 2006/0198359 A1 | 9/2006 | Fok et al. | |
| 2006/0240828 A1 | 10/2006 | Jain et al. | |
| 2006/0252465 A1 | 11/2006 | Karstens et al. | |
| 2006/0253252 A1 | 11/2006 | Hamrick et al. | |
| 2007/0005188 A1 | 1/2007 | Johnson | |
| 2007/0010260 A1 | 1/2007 | Zellner | |
| 2007/0042789 A1 | 2/2007 | Moton et al. | |
| 2007/0105565 A1 | 5/2007 | Enzmann et al. | |
| 2007/0124721 A1 | 5/2007 | Cowing et al. | |
| 2007/0136603 A1 | 6/2007 | Kuecuekyan | |
| 2007/0232326 A1 | 10/2007 | Johnson | |
| 2007/0233387 A1* | 10/2007 | Johnson | 701/300 |
| 2007/0244633 A1 | 10/2007 | Phillips et al. | |
| 2007/0250920 A1 | 10/2007 | Lindsay | |
| 2007/0275730 A1 | 11/2007 | Bienas et al. | |
| 2007/0276587 A1 | 11/2007 | Johnson | |
| 2007/0281716 A1 | 12/2007 | Altman et al. | |
| 2007/0287473 A1 | 12/2007 | Dupray | |
| 2008/0030308 A1 | 2/2008 | Johnson | |
| 2008/0071761 A1 | 3/2008 | Singh et al. | |
| 2008/0096529 A1 | 4/2008 | Zellner | |
| 2008/0170679 A1 | 7/2008 | Sheha et al. | |
| 2008/0301561 A1 | 12/2008 | Bain | |
| 2009/0054077 A1 | 2/2009 | Gauthier et al. | |
| 2009/0067593 A1 | 3/2009 | Ahlin | |
| 2009/0167524 A1 | 7/2009 | Chesnutt et al. | |
| 2009/0190734 A1 | 7/2009 | White et al. | |
| 2009/0233622 A1 | 9/2009 | Johnson | |
| 2009/0233623 A1 | 9/2009 | Johnson | |
| 2010/0069035 A1 | 3/2010 | Johnson | |
| 2010/0146160 A1 | 6/2010 | Piekarski | |
| 2010/0159946 A1 | 6/2010 | Cheung et al. | |
| 2010/0227595 A1 | 9/2010 | Johnson et al. | |
| 2010/0235748 A1 | 9/2010 | Johnson et al. | |
| 2011/0021145 A1 | 1/2011 | Johnson et al. | |

FOREIGN PATENT DOCUMENTS

| | | |
|---|---|---|
| EP | 917320 | 5/1999 |
| EP | 935364 | 8/1999 |
| EP | 924914 | 4/2003 |
| EP | 779752 | 6/2004 |
| EP | 1435749 | 7/2004 |
| EP | 1445923 | 8/2004 |
| EP | 838933 | 4/2008 |
| GB | 2396779 | 6/2004 |
| JP | 01-194628 | 8/1989 |
| JP | 03-128540 | 5/1991 |
| JP | 07-234789 | 9/1995 |
| JP | 07-288514 | 10/1995 |
| JP | 07-319706 | 12/1995 |
| JP | 08-44568 | 2/1996 |
| JP | 08-87296 | 4/1996 |
| JP | 11-168478 | 6/1999 |
| WO | WO 98/19484 | 5/1998 |
| WO | WO 99/16263 | 4/1999 |
| WO | WO 99/27716 | 6/1999 |
| WO | WO 99/51005 | 10/1999 |
| WO | WO 99/55012 | 10/1999 |
| WO | WO 00/02365 | 1/2000 |
| WO | WO 00/76249 | 12/2000 |
| WO | WO 02/11407 | 2/2002 |
| WO | WO 2004/080092 | 9/2004 |

OTHER PUBLICATIONS

Andy Harter and Andy Hooper, A Distributed Location system for the Active Office, IEEE Network, Jan./Feb. 1994.

Max J. Egenhofer, Spatial SQL: A Query and Presentation Languange, IEEE Network, Feb. 1994.

Mike Spreitzer and Marvin Theimer, Providing Location Information in a Ubiquitous Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

Ronald Azuma, Tracking Requirements for Augmented Reality, Communications of the ACM, vol. 36, No. 1, Jan. 1992.

Roy Want, et al., The Active Badge Location System, ACM Transactions on Information Systems, vol. 10, No. 1, Jan. 1992.

Marvin White, Emerging Requirements for Digital Maps for In-Vehicle Pathfinding and Other Traveller Assistance, Vehicular Navigation and Information Systems Conference Proceedings, Part 1, Oct. 1991.

Fred Phail, The Power of a Personal Computer for Car Information and Communications Systems, Vehicular Navigation and Information Systems Conference Proceedings, Part 1, Oct. 1991.

Thomas A. Dingus, et al., Human Factors Engineering the TravTek Driver Interface, Vehicular Navigation and Information Systems Conference Proceedings, Part II, Oct. 1991.

Michael Muffat et al., European Cooperation on Dual Mode Route Guidance Perspectives for Advanced Research Partners, Vehicular Navigation and Information Systems Conference Proceedings, Part II, Oct. 1991.

High Performance Wireless Access Point for the Enterprise, ORiNOCO™ AP-100 Access Point for the Enterprise, Lucent Technologies, 2000.

MobileStar Network, MobileStar Network First to Provide Business Travelers with High-Speed Data Access via the Internet—Wirelessly, New York, NY, Jun. 24, 1998.

ORiNCO AP-1000—Getting Started, Lucent Technologies.

Harry Chen, et al., "Dynamic Service Discovery for Mobile Computing: Intelligent Agents Meet Jini in the Aether," Cluster Computing, Special Issue on Internet Scalability, vol. 4, No. 4, Feb. 2001.

3rd Generation Partnership Project: Technical Specification Group Services and System Aspects; Functional Stage 2 Description of Location Services in UMTS (1999).

http://www.openwave.com/us/news_room/press_releases/2001/20020320, "Open Wave Announces Availability to End-to-End set of Location Services for Wireless Internet".

Trembly, A., "Wireless products arm road warriors," National Underwriter, vol. 105, No. 3, pp. 23-25, Dialog 02113577 67213220 (Jan. 2001).

Antonio, Interfaces and Algorithms for a Wide-Area Event Notification Service, Oct. 1999.

* cited by examiner

| | | MS (id 0A12:43EF:985B:012F) |
|---|---|---|
| GPS | C | x |
| | S | |
| A-GPS | C | |
| | S | |
| D-GPS | C | |
| | S | |
| Graphic-Pattern(s) | C | |
| | S | |
| Graphic-Distances | C | |
| | S | |
| Graphic-Triangulate | C | |
| | S | |
| Artificial Intelligence | C | |
| | S | |
| Cell Range | C | |
| | S | x |
| Cell AOA | C | |
| | S | |
| Cell TDOA | C | |
| | S | x |
| Cell MPT | C | |
| | S | x |
| Antenna Range | C | |
| | S | x |
| Antenna AOA | C | |
| | S | x |
| Antenna TDOA | C | |
| | S | x |
| Antenna MPT | C | |
| | S | x |
| LIDAR/optics | C | |
| | S | |
| Manual | C | |
| | S | |
| Contact | C | |
| | S | x |
| MPT | C | |
| | S | x |
| Client Logical Connect | C | |
| | S | |
| Server Logical Connect | C | |
| | S | |
| Client Physical Connect | C | |
| | S | |
| Server Physical Connect | C | |
| | S | |
| Sound/Acoustics | C | |
| | S | |
| Microdot/ RFI | C | |
| | S | |
| Transponder | C | |
| | S | |
| Others | C | |
| | S | |
| . . . | C | |
| | S | |

```
// Figs. 30A through 30E syntaxes (e.g. delimiters, etc) used should enforce
// appropriate unambiguous grammar parsability for Lex&Yacc, top down
// recursive parsing, XML encoding, other syntactic embodiments, applicable semantic
// representations, and any other syntactic/semantic embodiments. Figs. 30A through 30E BNF
// grammar elaborates for a corresponding interpreter, recommended syntaxes, programming
// language structures and/or objects, DB schemas, ANSI datastream encoding (e.g. X.409),
// flowchart processing blocks and locations in parent application flowcharts, and any other
// analogous implementation embodiments or subsets thereof.

// ***** Common BNF grammar (e.g. in Data 8): *****

Variables           = "null" | Variables Variable
        // Variables are placed anywhere; Can be used for referencing (a="..." b=a  c=b)

Variable            = VarType(VarName) = "null" | VarType(VarName) = ...value(s)... |
                          VarType(VarName) = [ Variables ] [ VarInstantiations ] |
                          VarType(VarName) = [ VarInstantiations ]  [ Variables ]
        // Variables scope to following & descending nesting; "value" has appropriate syntax
        // per VarType; VarName can be set to other variables (e.g. indirect tree structure)

VarInstantiations   = "null" | VarInstantiations VarInstantiate

VarInstantiate      = *VarName(Param1="x1", Param2="x2", ... ParamN="xN")  for N >= 0
        // Parameters allow optionally substituting occurrences in VarName with new values
        // prior to instantiation.

VarName             = "text string"

Description         = "null" | "text string" | VarInstantiate

History             = [ CreatorInfo ] [ ModifierInfo ] | VarInstantiations

CreatorInfo         = "null" | [ CreateDateTime ] [ CreatorID] [ CreatorIDType ]
                          [ CreatorAddr ] [ CreatorSysID ] [ CreatorSysType ]
                          [ CreatorSysAddr ] | VarInstantiations

ModifierInfo        = "null" | [ LastModifyDateTime ] [ LastModifyID ]
              [ LastModifyIDType ] [ LastModifyAddr ] [ LastModifySysID ]
              [ LastModifySysType ] [ LastModifySysAddr ] | VarInstantiations

CreateDateTime      = "date/time stamp" | VarInstantiate

CreatorID           = ID

CreatorIDType       = IDType
```

```
CreatorAddr          = Address

CreatorSysID         = "text string" | VarInstantiate

CreatorSysType       = "system type" | VarInstantiate   // e.g. type of MS

CreatorSysAddr       = Address

LastModifyDateTime=  "date/time stamp" | VarInstantiate

LastModifyID         = ID

LastModifyIDType     = IDType

LastModifyAddr       = Address

LastModifySysID      = "text string" | VarInstantiate

LastModifySysType =  "system type" | VarInstantiate

LastModifySysAddr =  Address

ID                   = "MS ID" [ Description ] [ History ] |
        "MS Group ID" [ Description ] [ History ] | "User ID" [ Description ] [ History ] |
        "User Group ID" [ Description ] [ History ] | "logical handle" [ Description ] [ History ] |
        "physical handle" [ Description ] [ History ] | VarInstantiations

IDType               = "MS_ID" | "MS_Group_ID" | "User_ID" | "User_Group_ID"  |
                            "logical_handle" | "physical_handle" | VarInstantiate

Address              = "ip address" | "SNA address" | "Postal address" |
                       "point" | "logical address" | "physical address" | "situational location" |
                       "2 dimensional area" | "3 dimensional area" | VarInstantiate

TimeSpec             = "Xdate/time stamp" | "Xdate/time period" | VarInstantiate

VarType              = Description | History | ID | IDType | CreatorInfo | ModifierInfo |
        CreateDateTime | CreatorID | CreatorIDType | CreatorAddr | CreatorSysID |
        CreatorSysType | CreatorSysAddr | LastModifyDateTime | LastModifyID |
        LastModifyIDType | LastModifyAddr | LastModifySysID | LastModifySysType |
        LastModifySysAddr | Address | "Xdate/time stamp" |  "Xdate/time period" | "text string" |
        "system type" | TimeSpec | "MS ID" | "MS Group ID" | "User ID" | "User Group ID" |
        "logical handle" | physical handle" | "...Address elaborations..." |
        "...IDType elaborations..." |  Variable  // | VarInstantiate here as well (but elaborates)
```

```
// ***** BNF grammar for Permissions 10: *****

PermissionBody    = "null" | [ Variables ] [ Permissions ]
     // [ Variables ] placed anywhere (not shown in constructs below to enhance readability)

Permissions       = "null" | Permissions Permission | VarInstantiations

Permission        = Grantor Grantee [ Grants ] [ TimeSpec ] [ Description ] [ History ] |
                        VarInstantiations
     // No Grants implies granting all permissions; This embodiment ensures non-null
     // Grantor and Grantee, but "null" could be used (e.g. for placeholder entries).

Grantor           = ID [ IDType ] | VarInstantiations
     // ID defaults (e.g. MS ID) when IDType not present

Grantee           = ID [ IDType ] | VarInstantiations

Grants            = "null" | Grants Grant | Privileges | VarInstantiations

Grant             = "grant name" AND (Privileges [ TimeSpec ] [ Description ] [ History ] |
                        Grants  [ TimeSpec ] [ Description ] [ History ] |
                        VarInstantiations)

Privileges        = "null" | Privileges Privilege | VarInstantiations

Privilege         = "atomic privilege for assignment" [ MSRelevance ]
                        [ TimeSpec ] [ Description ] [ History ] | VarInstantiations

MSRelevance       = "MS relevance descriptor"

Groups            = "null" | Groups Group | VarInstantiations

Group             = "group name" AND (IDs [ Description ] [ History ] |
                        Groups  [ Description ] [ History ] |
                        VarInstantiations)

IDs               = "null" | IDs ID [ IDType ] |  VarInstantiations

VarType           = *VarType | Permissions | Permission | Grantor | Grantee | Grants |
                        Grant | Privileges | Privilege | MSRelevance | Groups | Group |
                        IDs
```

```
// ***** BNF grammar for Charters 12: *****

CharterBody      = "null" | [ Variables ] [ Charters ]
      // [ Variables ] placed anywhere (not shown in constructs below to enhance readability)

Charters         = "null" | Charters Charter | VarInstantiations

Charter          = Grantee Grantor Expression Actions [ TimeSpec ] [ Description ]
                       [ History ] | VarInstantiations

Expression       = Conditions [ TimeSpec ] | VarInstantiations
      // This embodiment ensures at least one condition to a Charter, but "null" could be
      // used (e.g. for placeholder entries).

Conditions       = Condition | Conditions CondOp Condition] | VarInstantiations

CondOp           = "and" | "or" | VarInstantiations

Condition        = Term Op Term [ TimeSpec ] [ Description ] [ History ] |
      Value [ TimeSpec ] [ Description ] [ History ] |
      Invocation [ TimeSpec ] [ Description ] [ History ] | VarInstantiations
      // Another embodiment allows unary operators (e.g. "not"), for example for boolean
      // WDR fields (e.g. Applications field(s)). Current boolean tests for "True" or "False",
      // or non-zero = "True" and zero = "False". Value & Invocation result in a boolean.

Term             = WDRTerm [ TimeSpec ] [ Description ] [ History ] |
                 AppTerm [ TimeSpec ] [ Description ] [ History ] |
                 Value [ TimeSpec ] [ Description ] [ History ] |
                 Invocation [ TimeSpec ] [ Description ] [ History ] |
                 PointSet [ TimeSpec ] [ Description ] [ History ] |
                 VarInstantiate

WDRTerm          = "Any WDR 1100 field, or any subset thereof" [ Description ]
                       [ History ] | VarInstantiate

AppTerm          = "Any Application data field, or any subset thereof" [ Description ]
                       [ History ] | VarInstantiate

Value            = Data | "number" | "text string" | "value" | "True" | "False" |
                       "atomic term" | "map term" | ID [ IDType ] | "null" | VarInstantiate

PointSet         = [2D | 3D] [Geo | Cartesian | Polar]
                       "text string" [ Description ] [ History ] |
                       "numeric(s)" [ Description ] [ History ] |
                       Data [ Description ] [ History ] | VarInstantiate
```

```
Data            = "typed memory pointer" | "typed memory value" | "typed file path" |
                        "typed file path and offset" | "typed DB qualifier" | VarInstantiate
      // i.e. pointer or value from stack, globals, shared memory, file data location, DB
      // pointer, DB value, or any other data.

Invocation      = "DLL interface(optional params...)" |
                        "Linked interface(optional params...)" |
                        "executable path(optional params...)" | VarInstantiate
      // Invocation can return any value of any type, except will be converted to a boolean
      // when used as a Term (0 = False, else = True). Best to return boolean when Term use.

Op              = [ "atomic not operator" ] "atomic operator" | ProfileMatch |
                        VarInstantiate

ProfileMatch    = "atomic profile match operator" | VarInstantiate

Actions         = "null" | Actions Action

Action          = [ Host ] Command Operand [Parameters]
                        [ TimeSpec ] [ Description ] [ History ] | VarInstantiations

Host            = "null" | ID [IDType] | VarInstantiations

Command         = "atomic command" | VarInstantiations
      // Command may map to translation member entry of natural language map

Operand         = "atomic operand" | VarInstantiations
      // Some embodiments have no need for an operand in this grammar (e.g. command file
      // reference, DLL call, self contained command, invocation callout, etc).

Parameters      = "null" | Parameters Parameter | VarInstantiations

Parameter       = WDRTerm [ Description ] [ History ] |
                        AppTerm [ Description ] [ History ] |
                        Value [ Description ] [ History ] |
                        Invocation [ Description ] [ History ] |
                        ID [ IDType ] [ Description ] [ History ] |
                        VarInstantiate [ Description ] [ History ]

VarType         = *VarType | Charters | Charter | Expression | Conditions | Condition |
                  CondOp | WDRTerm | Term | Value | PointSet | Data | Invocation | Op |
                  Actions | ProfileMatch | Action | Command | Operand | Parameters |
                  Parameter | Host
```

*Fig. 30E*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 201 | #, sender, msg/subj, attribs, recip(s) | #, sender, msg/subj, attribs, recip(s) | # | # | #, system(s) | #, system(s) | #, ack, source, system(s) | #, ack, system(s) | #, ack, source, system(s) | #, system(s) | |
| 203 | link, sender, msg/subj, attribs, recip(s) | link, sender, msg/subj, attribs, recip(s) | link, params | link, params | link, params, system(s) | link, params, system(s) | link, ack, source, system(s) | link, ack, system(s) | link, ack, source, system(s) | link, params, system(s) | |
| 205 | body, sender, msg/subj, attribs, recip(s) | body, sender, msg/subj, attribs, recip(s) | body, sender, msg/subj, attribs, recip(s) | body, sender, msg/subj, attribs, recip(s) | email, system(s) | body, sender, msg/subj, attribs, recip(s) | email, ack, source, system(s) | email, ack, system(s) | email, ack, source, system(s) | email, system(s) | |
| 207 | msg, sender, msg/subj, attribs, recip(s) | msg, sender, msg/subj, attribs, recip(s) | msg, sender, msg/subj, attribs, recip(s) | body, sender, msg/subj, attribs, recip(s) | msg, system(s) | body, sender, msg/subj, attribs, recip(s) | msg, ack, source, system(s) | msg, ack, system(s) | msg, ack, source, system(s) | msg, system(s) | |
| 209 | body, sender, msg/subj, attribs, recip(s) | body, sender, msg/subj, attribs, recip(s) | body, sender, msg/subj, attribs, recip(s) | body, sender, msg/subj, attribs, recip(s) | email, system(s) | body, sender, msg/subj, attribs, recip(s) | email, ack, source, system(s) | email, ack, system(s) | email, ack, source, system(s) | email, system(s) | |
| 211 | msg, sender, msg/subj, attribs, recip(s) | msg, sender, msg/subj, attribs, recip(s) | msg, sender, msg/subj, attribs, recip(s) | msg, sender, msg/subj, attribs, recip(s) | msg, system(s) | body, sender, msg/subj, attribs, recip(s) | msg, ack, source, system(s) | msg, ack, system(s) | msg, ack, source, system(s) | msg, system(s) | |
| 213 | indicator, sender, msg/subj, attribs, recip(s) | indicator, sender, msg/subj, attribs, recip(s) | indicator, sender, msg/subj, attribs, recip(s) | indicator, sender, msg/subj, attribs, recip(s) | indicator, system(s) | indicator, system(s) | indicator, ack, source, system(s) | indicator, ack, system(s) | indicator, ack, source, system(s) | indicator, system(s) | |

*Fig. 31A*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 215 | app, sender, msg/subj, attribs, recip(s) | app, sender, msg/subj, attribs, recip(s) | app, params | app, params | app, params, system(s) | app, params, system(s) | app, params, ack, source, system(s) | app, params, ack, system(s) | app, params, ack, source, system(s) | app, params, system(s) | |
| 217 | doc, sender, msg/subj, attribs, recip(s) | doc, sender, msg/subj, attribs, recip(s) | doc | doc | doc, system(s) | doc, system(s) | doc, ack, source, system(s) | doc, ack, system(s) | doc, ack, source, system(s) | doc, system(s) | |
| 219 | path, sender, msg/subj, attribs, recip(s) | path, sender, msg/subj, attribs, recip(s) | path | path | path, system(s) | path, system(s) | path, ack, source, system(s) | path, ack, system(s) | path, ack, source, system(s) | path, system(s) | |
| 221 | content, sender, msg/subj, attribs, recip(s) | content, sender, msg/subj, attribs, recip(s) | content | content | content, system(s) | content, system(s) | content, ack, source, system(s) | content, ack, system(s) | content, ack, source, system(s) | content, system(s) | |
| 223 | DB-obj, sender, msg/subj, attribs, recip(s) | DB-obj, query, sender, msg/subj, attribs, recip(s) | DB-obj | DB-obj, query | DB-obj, system(s) | DB-obj, query, system(s) | DB-obj, ack, source, system(s) | DB-obj, ack, system(s) | DB-obj, ack, source, system(s) | DB-obj, query, system(s) | |
| 225 | data, sender, msg/subj, attribs, recip(s) | data, value, sender, msg/subj, attribs, recip(s) | data, value | data, value | data, system(s) | data, value, system(s) | data, ack, source, system(s) | data, ack, system(s) | data, ack, source, system(s) | data, value, system(s) | |

*Fig. 31B*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 227 | sem, sender, msg/subj, attribs, recip(s) | sem, cmd, sender, msg/subj, attribs, recip(s) | sem, cmd | sem, cmd | sem, system(s) | sem, cmd, system(s) | sem, ack, source, system(s) | sem, ack, system(s) | sem, ack, source, system(s) | sem, cmd, system(s) | |
| 229 | path, sender, msg/subj, attribs, recip(s) | path, sender, msg/subj, attribs, recip(s) | path | path | path, system(s) | path, system(s) | path, ack, source, system(s) | path, ack, system(s) | path, ack, source, system(s) | path, system(s) | |
| 231 | app, macro, sender, msg/subj, attribs, recip(s) | app, macro, sender, msg/subj, attribs, recip(s) | app, macro | app, macro | app, macro, system(s) | app, macro, system(s) | app, params, ack, source, system(s) | app, params, ack, system(s) | app, params, ack, source, system(s) | app, macro, system(s) | |
| 233 | "<alt> <prtscr>", sender, msg/subj, attribs, recip(s) | "<alt> <prtscr>", sender, msg/subj, attribs, recip(s) | "<alt> <prtscr>" | "<alt> <prtscr>" | objtxt, system(s) | cmds, system(s) | "<alt> <prtscr>", ack, source, system(s) | objtxt, ack, system(s) | "<alt> <prtscr>", ack, source, system(s) | "<alt> <prtscr>", system(s) | |
| 235 | macro, sender, msg/subj, attribs, recip(s) | macro, sender, msg/subj, attribs, recip(s) | macro | macro | macro, system(s) | macro, system(s) | macro, ack, system(s) | app, params, ack, system(s) | macro, ack, system(s) | macro, system(s) | |
| 237 | iodev, input, sender, msg/subj, attribs, recip(s) | iodev, input, sender, msg/subj, attribs, recip(s) | iodev, input | iodev, input | iodev, input, system(s) | iodev, input, system(s) | iodev, input, ack, system(s) | iodev, ack, system(s) | iodev, input, ack, system(s) | iodev, input, system(s) | |

*Fig. 31C*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | . . . |
| 239 | iodev, output, sender, subj, attribs, recip(s) | iodev, output, sender, subj, attribs, recip(s) | iodev, output | iodev, output | iodev, output, system(s) | iodev, output, system(s) | iodev, output, ack, system(s) | iodev, ack, system(s) | iodev, output, ack, system(s) | iodev, output, system(s) | |
| 241 | alert, sender, msg/subj, attribs, recip(s) | alert, sender, msg/subj, attribs, recip(s) | alert | alert | alert, system(s) | alert, system(s) | alert, ack, source, system(s) | alert, ack, system(s) | alert, ack, source, system(s) | alert, system(s) | |
| 243 | pid, signal, sender, msg/subj, attribs, recip(s) | pid, signal, sender, msg/subj, attribs, recip(s) | pid, signal | pid, signal | prname, system(s) | pid, signal, system(s) | prname, ack, source, system(s) | prname, ack, system(s) | prname, ack, source, system(s) | prname, signal system(s) | |
| 245 | container, sender, msg/subj, attribs, recip(s) | container, sender, msg/subj, attribs, recip(s) | container | container | container, system(s) | container, system(s) | container, ack, source, system(s) | container, ack, system(s) | container, ack, source, system(s) | container, system(s) | |
| 247 | progobj, data, sender, msg/subj, attribs, recip(s) | progobj, data, sender, msg/subj, attribs, recip(s) | progobj, data | progobj, data, sender, msg/subj, attribs, recip(s) | progobj, data, system(s) | progobj, data, system(s) | progobj, ack, source, system(s) | progobj, ack, system(s) | progobj, ack, source, system(s) | progobj, data, system(s) | |
| 249 | cursor, sender, msg/subj, attribs, recip(s) | cursor, sender, msg/subj, attribs, recip(s) | cursor | cursor, sender, msg/subj, attribs, recip(s) | cursor, system(s) | cursor, attribs, system(s) | ack, source, system(s) | ack, system(s) | ack, source, system(s) | cursor, attribs, system(s) | |

*Fig. 31D*

| Operand ↓ | Command | | | | | | | | | | |
|---|---|---|---|---|---|---|---|---|---|---|---|
| | 101 | 103 | 105 | 119 | 107 | 109 | 111 | 113 | 115 | 117 | ... |
| 251 | calobj, sender, msg/subj, attribs, recip(s) | calobj, sender, msg/subj, attribs, recip(s) | calobj, sender, msg/subj, attribs, recip(s) | calobj, sender, msg/subj, attribs, recip(s) | calobj, system(s) | calobj, attribs, system(s) | calobj, ack, source, system(s) | calobj, ack, system(s) | calobj, ack, source, system(s) | calobj, attribs, system(s) | |
| 253 | ABobj, sender, msg/subj, attribs, recip(s) | ABobj, sender, msg/subj, attribs, recip(s) | ABobj, sender, msg/subj, attribs, recip(s) | ABobj, sender, msg/subj, attribs, recip(s) | ABobj, system(s) | ABobj, attribs, system(s) | ABobj, ack, source, system(s) | ABobj, ack, system(s) | ABobj, ack, source, system(s) | ABobj, attribs, system(s) | |
| ... | | | | | | | | | | | |

*Fig. 31E*

| Token | Length | Value |
|---|---|---|
| Variables[1] | L | complex ( [Variable] ... [Variable] ). |
| Variable | L | complex (First 2 bytes = VarType; VarName; value(s)); this can be present in any complex datastream for scope within current complex datastream thereafter and all descending constructs to it. |
| VarInstantiations[1] | L | complex ( [VarInstatiate] ... [VarInstantiate] ). |
| VarInstantiate | L | instantiation variable name and optional parameters; this can be subordinate to any other construct (e.g. {Description,8,{VarInstantiate,2,x}} where x is variable of string type (e.g. x = "Very long description text here"). Note the savings in TLV datastream size by using variables defined in 1 place for multiple subsequent instantiations thereafter). |
| VarName | L | text string for variable name. |
| Description | L | text string for description. |
| History | L | complex ( [CreatorInfo] [ModifierInfo] ) |
| CreatorInfo | L | complex ( [CreateDateTime] [CreatorID] [CreatorIDType] [CreatorAddr] [CreatorSysID ] [ CreatorSysType ] [ CreatorSysAddr ] ). |
| ModifierInfo | L | complex ( [LastModifyDateTime] [LastModifyID] [ LastModifyIDType ] [LastModifyAddr] [LastModifySysID] [LastModifySysType] [LastModifySysAddr] ). |
| CreateDateTime | L | date/time stamp (i.e. YYYYMMDDHHMMSS.12..J). |
| CreatorID | L | complex (ID). |
| CreatorIDType | 1 | Atomic element of IDType. |
| CreatorAddr | L | complex (Address). |
| CreatorSysID | L | Text string for system ID. |
| CreatorSysType | L | Text string for system type. |
| CreatorSysAddr | L | complex (Address). |
| LastModifyDateTime | L | date/time stamp. |
| LastModifyID | L | complex (ID). |
| LastModifyIDType | L | Atomic element of IDType. |
| LastModifyAddr | L | complex (Address). |
| LastModifySysID | L | Text string for system ID. |
| LastModifySysType | L | Text string for system type. |
| LastModifySysAddr | L | complex (Address). |
| ID | L | complex (first 2 bytes = length of the identifier; followed by identifier;[Description] [History] ). |
| IDType | 1 | Atomic element of IDType. |
| Address | L | First 2 bytes = address type; next L-2 bytes = address info. |
| TimeSpec | L | First byte = spec type (stamp, period); Next bytes = the time spec(s) (e.g. preferably in syntax described). |

*Fig. 33A*

| Token | Length | Value |
|---|---|---|
| PermissionBody | L | complex ( [Variables] [Permissions] ). |
| Permissions[1] | L | complex ( [Permission] ... [Permission] ). |
| Permission | L | complex ( Grantor Grantee [Grants] [TimeSpec] [Description] [History] ). |
| Grantor | L | complex ( ID [ IDType] ). |
| Grantee | L | complex ( ID [ IDType] ). |
| Grants[1] | L | complex ( [Grant] … [Grant] \| [Privileges] ). |
| Grant | L | First 2 bytes = length of Grant name; following bytes = grant name string; then complex: ( Privileges [TimeSpec] [Description] [History] \| Grants [TimeSpec] [Description] [History] ). |
| Privileges[1] | L | complex ( [Privilege] ... [Privilege] ). |
| Privilege | L | first 4 bytes = unsigned integer for atomic privilege assigned; following bytes (L-4) are complex: ( [MSRelevance] [TimeSpec] [Description] [History] ). |
| MSRelevance | 8 | 64 bits for up to 64 different MS types of different capabilities. |
| Groups[1] | L | complex ( [Group] … [Group]). |
| Group | L | First 2 bytes = length of Group name; following bytes = group name string; then complex: ( IDs [Description] [History] \| Groups [Description] [History] ). |
| IDs[1] | L | complex ( ID [IDType] ... ID [IDType] ). |

*Fig. 33B*

| Token | Length | Value |
|---|---|---|
| CharterBody | L | complex ( [Variables] [Charters] ). |
| Charters[1] | L | complex ( [Charter] ... [Charter] ). |
| Charter | L | complex ( Grantee Grantor Expression Actions [TimeSpec] [Description] [History] ). |
| Expression | L | complex ( Conditions [TimeSpec] ). |
| Conditions | L | complex (Condition \| Conditions CondOp Condition] ). |
| CondOp | 1 | "&" or "\|". |
| Condition | L | complex ( Term Op Term [TimeSpec] [Description] [History] \| Value [TimeSpec] [Description] [History] \| Invocation [TimeSpec] [Description] [History] ). |
| Term | L | complex ( WDRTerm [TimeSpec] [Description] [ History ] \| AppTerm [TimeSpec] [Description] [History] \| Value [TimeSpec] [Description] [History] \| Invocation [TimeSpec] [Description] [History] ). |
| WDRTerm | L | first 2 bytes for WDR 1100 field/subfield length; following bytes are __name syntactical reference; then, if any, is complex = [Description] [History] ). |
| AppTerm | L | first 2 bytes for Application field length; following bytes are Prefix_name syntactical reference; then, if any, is complex = [Description] [History] ). |
| Value | L | first byte indicates Value type; following bytes (L-1), if any, is the "number", "text string", "value", "Boolean", "null", "atomic term", "map term" or complex = ( Data \| ID [IDType] ). |
| PointSet | L | first byte indicates dimension; second byte indicates type; third byte indicates format; next 2 bytes is the point set information length (LEN); following bytes is the PointSet information (may be complex for Data), following bytes (L-5-LEN), if any, is complex = [Description] [History] ). |
| Data | L | first byte = atomic element data type; L-1 following bytes are the data syntactical reference. |
| Invocation | L | first byte = atomic element data type; L-1 following bytes = atomic element invocation with optional parameters. |
| Op | 2 | the operator reference (not clarifier simply provides unique operator (e.g. = and != are two operators; ProfileMatch here too). Numeric values used instead of characters here. |

*Fig. 33C-1*

| Token | Length | Value |
|---|---|---|
| Actions[1] | L | complex ( [Action] ... [Action] ). |
| Action | L | complex ( [Host] Command Operand [Parameters] [TimeSpec] [Description] [History] ). |
| Host | L | complex ( ID [IDType] ). |
| Command | 2 | the command reference. |
| Operand | 2 | the operand reference. |
| Parameters[1] | L | complex ( [Parameter] ... [Parameter] ). |
| Parameter | L | complex ( WDRTerm [ Description ] [ History ] \| AppTerm [ Description ] [ History ] \| Value [ Description ] [ History ] \| Invocation [ Description ] [ History ] ID [ IDType ] [ Description ] [ History ] ). |

*Fig. 33C-2*

```
//********* Grammar Common Definitions: *********
//
#define      TOKEN_LENGTH                 2
#define      LENGTH_LENGTH                4


// #define   VARTYPE_x        Use Token Definitions for VarType

#define      IDTYPE_MSID                  11
#define      IDTYPE_MSGRPID               12
#define      IDTYPE_USERID                13
#define      IDTYPE_USERGRPID             14
#define      IDTYPE_LOGICAL               15
             // e.g. ip address and socket; e.g. inetd.cfg invocation (e.g. 23.56.232.2:34002)
#define      IDTYPE_PHYSICAL              16 // MS serial #

#define      ADDRTYPE_LOGICAL             21 // e.g. ip address
#define      ADDRTYPE_PHYSICAL            22 // e.g. MS serial #
#define      ADDRTYPE_POSTAL              23
#define      ADDRTYPE_POINT               24
#define      ADDRTYPE_SL                  25
#define      ADDRTYPE_2D                  26
#define      ADDRTYPE_3D                  27

#define      TIMESPECTYPE_STAMP           31
#define      TIMESPECTYPE_PERIOD          32
```

*Fig. 34A*

```
//********* Grammar Common Construct Token Definitions: *********
//
// #define   VARIABLES            10001
#define      VARIABLE             10002
// #define   VARINSTANTIATIONS    10003
#define      VARINSTANTIATE       10004
#define      VARNAME              10005
#define      DESCRIPTION          10006
#define      HISTORY              10007
#define      CREATORINFO          10008
#define      MODIFIERINFO         10009
#define      CREATEDATETIME       10010
#define      CREATORID            10011
#define      CREATORIDTYPE        10012
#define      CREATORADDR          10013
#define      CREATORSYSID         10014
#define      CREATORSYSTYPE       10015
#define      CREATORSYSADDR       10016
#define      LASTMODIFYDATETIME   10017
#define      LASTMODIFYID         10018
#define      LASTMODIFYIDTYPE     10019
#define      LASTMODIFYADDR       10020
#define      LASTMODIFYSYSID      10021
#define      LASTMODIFYSYSTYPE    10022
#define      LASTMODIFYSYSADDR    10023
#define      ID                   10024
#define      IDTYPE               10025
#define      ADDRESS              10026
#define      TIMESPEC             10027


//********* Grammar Permission Construct Token Definitions: *********
//
#define      PERMISSIONBODY       12001
// #define   PERMISSIONS          12002
#define      PERMISSION           12003
#define      GRANTOR              12004
#define      GRANTEE              12005
#define      GRANTS               12006
#define      GRANT                12007
// #define   PRIVILEGES           12008
#define      PRIVILEGE            12009
#define      MSRELEVANCE          12010
```

*Fig. 34B*

```
#define     GROUPS                                  12011
#define     GROUP                                   12012
#define     IDS                                     12013

//********* Grammar Charter Construct Token Definitions: *********
//
#define     CHARTERBODY                             14001
// #define  CHARTERS                                14002
#define     CHARTER                                 14003
#define     EXPRESSION                              14004
#define     CONDITIONS                              14005
#define     CONDOP                                  14006
#define     CONDITION                               14007
#define     TERM                                    14008
#define     WDRTERM                                 14009
#define     APPTERM                                 14010
#define     VALUE                                   14011
#define     DATA                                    14012
#define     INVOCATION                              14013
#define     OP                                      14014
// #define  ACTIONS                                 14015
#define     ACTION                                  14016
#define     HOST                                    14017
#define     COMMAND                                 14018
#define     OPERAND                                 14019
// #define  PARAMETERS                              14020
#define     PARAMETER                               14021
#define     POINTSET                                14022

//********* Grammar Charter Definitions: *********
//
// atomic terms (e.g. \loc_my), WDR field terms (e.g. __location),
// Application terms (e.g. M_source), Invocation (e.g. fcn(p1,p2)), CondOp (e.g. "&") and
// Data atomic elements (e.g. c:\dir1\fname:58/LONGINT) are recognized syntaxes.
#define     VALUE_NUMBER                            41
#define     VALUE_TEXT                              42
#define     VALUE_ENUM                              43 // "value"
#define     VALUE_BOOLEAN                           44 // 1 = True, 0 = False
#define     VALUE_ID                                45

#define     DIMENSION2                              71
#define     DIMENSION3                              72
#define     FORMAT_GEO                              73
#define     FORMAT_CARTESIAN                        74
#define     FORMAT_POLAR                            75
```

*Fig. 34C*

```
//********* Atomic Commands : *********
//
#define     CMD_SEND                 101
#define     CMD_NOTIFY               103
#define     CMD_COMPOSE              105
#define     CMD_FIND                 107
#define     CMD_INVOKE               109
#define     CMD_COPY                 111
#define     CMD_DISCARD              113
#define     CMD_MOVE                 115
#define     CMD_STORE                117
#define     CMD_CONNECT              119
#define     CMD_ADMINISTRATE         121
#define     CMD_CHANGE               123

//********* Atomic Operands : *********
//
#define     OPERAND_AUTODIALNUMBER   201
#define     OPERAND_WEBLINK          203
#define     OPERAND_EMAIL            205
#define     OPERAND_SMSMSG           207
#define     OPERAND_BRDEMAIL         209
#define     OPERAND_BRDSMSMSG        211
#define     OPERAND_INDICATOR        213
#define     OPERAND_APP              215
#define     OPERAND_DOCUMENT         217
#define     OPERAND_FILE             219
#define     OPERAND_CONTENT          221
#define     OPERAND_DBOBJ            223
#define     OPERAND_DATA             225
#define     OPERAND_SEMAPHORE        227
#define     OPERAND_DIRECTORY        229
#define     OPERAND_APPCONTEXT       231
#define     OPERAND_UIFOBJ           233
#define     OPERAND_UIFCTL           235
#define     OPERAND_INPUT            237
#define     OPERAND_OUTPUT           239
#define     OPERAND_ALERT            241
#define     OPERAND_PROC             243
#define     OPERAND_CONTAINER        245
#define     OPERAND_PROGOBJ          247
#define     OPERAND_CURSOR           249
#define     OPERAND_CALENDAR         251
#define     OPERAND_ADDRESSBOOK      253
```

*Fig. 34D*

```
// TIMESPEC date/time stamps for open ended periods are set with no start/end spec:
//  >=YYYMMDDHHMMSS.1..J ==> set x.endDT to DT_NOENDSPEC;
//  <=YYYMMDDHHMMSS.1..J ==> set x.startDT to DT_NOSTARTSPEC;
// <YYYMMDDHHMMSS.1..J and >YYYMMDDHHMMSS.1..J subtracts/adds min precision
// from specified date/time stamp (i.e. TIMESPEC periods are preferably inclusive).
#define DT_NOENDSPEC          -1.0
#define DT_NOSTARTSPEC        -2.0

typedef struct timespec { // specifications converted to a Julian period form
        double            startDT;     // converted to Julian format (1ms precision)
        double            endDT;       //  converted to Julian format (1ms precision)
        struct timespec   *nextTS;     // linked list of sibling timespecs
        } TIMESPEC;

typedef struct {
        double            *dt;         // Julian date/time
        unsigned char     id[MAX_IDLENGTH];
        unsigned short    idtype;      // for IDTYPE_x values
        // unsigned short cadr_type;   // Assume 1 format here
        unsigned char     *c_address;
        char              *sysid;
        char              *systype;
        // unsigned short sysadr_type; // Assume 1 format here
        unsigned char     *sys_address;
        } BOOKKEEP;

typedef struct {
        BOOKKEEP *creation;
        BOOKKEEP *modify;
        } HISTRY;

typedef struct {
        unsigned short    vartype;
        char              name[MAX_VARNAME];
        unsigned char     *value;      // may be complex or series of complex
        } VAR;
```

*Fig. 34E*

```
typedef struct privilege {
        unsigned long       priv;           // constant value of known privilege
        unsigned char       relevance[MAX_RELEVANCEMASK];
        TIMESPEC            *tspec;
        char                *desc;
        HISTRY              *hist;
        struct privilege    *nextPriv;      // linked list of sibling privileges
        } PRIVILEGE;

typedef struct grant {
        char                name[MAX_GRNAMLENGTH];
        char                permtype;       // 'P' = Privilege(s), 'G' = Grant(s)
        union {
            struct grant    *grants;        // linked list subordinate/descending grant(s)
            PRIVILEGE       *privileges;    // linked list of privilege(s)
            } assigned;
        TIMESPEC            *tspec;
        char                *desc;
        HISTRY              *hist;
        struct grant        *nextGrant;     // linked list of sibling grants
        } GRANT;

typedef struct permission {
        unsigned char       grantor[MAX_IDLENGTH];
        unsigned short      gortype;              // for IDTYPE_x values
        unsigned char       grantee[MAX_IDLENGTH];
        unsigned short      geetype;              // for IDTYPE_x values
        char                permtype;             // 'P' = Privilege(s), 'G' = Grant(s)
        union {
            GRANT           *grants;              // linked list of grant(s)
            PRIVILEGE       *privileges;          // linked list of privilege(s)
            } assigned;
        TIMESPEC            *tspec;
        char                *desc;
        HISTRY              *hist;
        struct permission   *nextPerm;            // linked list of permissions
        } PERMISSION;
```

*Fig. 34F*

```
typedef struct identity {
        unsigned char       id[MAX_IDLENGTH];
        unsigned short      idtype;      // for IDTYPE_x values
        struct identity     *nextID;     // linked list of sibling IDs
        } IDENTITY;

typedef struct group {
        char                name[MAX_GRPNAMELENGTH];
        char                grptype;     // 'B' = Branch, 'L' = Leaf
        union {
            struct group    *groups;     // linked list subordinate/descending group(s)
            IDENTITY        *ids;        // linked list of IDs in this group
            } assigned;
        char                *desc;
        HISTRY              *hist;
        struct grant        *nextGroup;  // linked list of sibling groups
        } GROUP;

typedef struct action {
        IDENTITY            host;  // .idtype = 0 = no host spec)
        unsigned short      cmd;
        unsigned short      operand;
        unsigned char       *params;          // maintained in syntax for flexibility
                                              // and for stack processing
        TIMESPEC            *tspec;
        char                *desc;
        HISTRY              *hist;
        struct action       *nextActn;        // linked list of sibling actions
        } ACTION;

typedef struct charter {
        unsigned char       grantee[MAX_IDLENGTH];
        unsigned short      geetype;          // for IDTYPE_x values
        unsigned char       grantor[MAX_IDLENGTH];
        unsigned short      gortype;          // for IDTYPE_x values
        TIMESPEC            *exprTS;
        unsigned char       *cond;            // at least 1 condition maintained in
                                              // syntax for proper stack processing
        ACTION              *actn;
        char                *desc;
        HISTRY              *hist;
        struct charter      *nextCharter;     // linked list of charters
        } CHARTER;
```

*Fig. 34G*

4920 — Privilege Data at $ID_1$ MS 4922, 4924, 4926, 4928

Grantor

| Grantee | $ID_1$ | $ID_2$ |
|---|---|---|
| $ID_1$ | Not Applicable (Grantor has all privileges assigned to self by default, therefore no explicit privilege assignments needed) | * Enforce & inform purpose<br>* Used on incoming $ID_2$ WDRs @ $ID_1$ MS for feature to $ID_1$<br>* Used on incoming $ID_1$ WDRs @ $ID_2$ MS for feature to $ID_1$<br>* Used on $ID_2$ WDRs @ $ID_2$ MS for feature to $ID_1$ |
| $ID_2$ | * Maintain & inform purpose<br>* Used on incoming $ID_1$ WDRs @ $ID_2$ MS for feature to $ID_2$<br>* Used on incoming $ID_2$ WDRs @ $ID_1$ MS for feature to $ID_2$<br>* Used on $ID_1$ WDRs @ $ID_1$ MS for feature to $ID_2$ | Not Applicable (Other IDs are understood to have all privileges assigned to self by default, therefore no explicit privilege assignments needed) |

4940 — Privilege Data at $ID_2$ MS 4942, 4944, 4946, 4948

Grantor

| Grantee | $ID_1$ | $ID_2$ |
|---|---|---|
| $ID_1$ | Not Applicable (Other IDs are understood to have all privileges assigned to self by default, therefore no explicit privilege assignments needed) | * Maintain & inform purpose<br>* Used on incoming $ID_2$ WDRs @ $ID_1$ MS for feature to $ID_1$<br>* Used on incoming $ID_1$ WDRs @ $ID_2$ MS for feature to $ID_1$<br>* Used on $ID_2$ WDRs @ $ID_2$ MS for feature to $ID_1$ |
| $ID_2$ | * Enforce & inform purpose<br>* Used on incoming $ID_1$ WDRs @ $ID_2$ MS for feature to $ID_2$<br>* Used on incoming $ID_2$ WDRs @ $ID_1$ MS for feature to $ID_2$<br>* Used on $ID_1$ WDRs @ $ID_1$ MS for feature to $ID_2$ | Not Applicable (Grantor has all privileges assigned to self by default, therefore no explicit privilege assignments needed) |

Charter Data at $ID_1$ MS

Grantee

| Grantor | $ID_1$ | $ID_2$ |
| --- | --- | --- |
| $ID_1$ | (4962) * Maintain local to $ID_1$ MS<br>* Enforce at $ID_1$ MS for $ID_1$ WDRs and/or incoming $ID_2$ WDRs for feature(s) with privileges granted by $ID_2$ to $ID_1$ | * Enforce & inform purpose<br>* Used on incoming $ID_2$ WDRs @ $ID_1$ MS for privileged feature(s) to $ID_1$ and/or $ID_2$<br>* Used on $ID_1$ WDRs @ $ID_1$ MS for privileged feature(s) to $ID_1$ and/or $ID_2$ (4966) |
| $ID_2$ | * Maintain & inform purpose<br>* Used on $ID_2$ WDRs @ $ID_2$ MS for privileged feature(s) to $ID_1$ and/or $ID_2$<br>(4964) * Used on incoming $ID_1$ WDRs @ $ID_2$ MS for privileged feature(s) to $ID_1$ and/or $ID_2$ | * Inform $ID_1$ of $ID_2$ charters if $ID_1$ privileged to know/browse<br>* Clone $ID_2$ data to $ID_1$ for sharing administration if $ID_1$ privileged to clone (4968) |

4980

Charter Data at $ID_2$ MS

Grantee

| Grantor | $ID_1$ | $ID_2$ |
| --- | --- | --- |
| $ID_1$ | (4982) * Inform $ID_2$ of $ID_1$ charters if $ID_2$ privileged to know/browse<br>* Clone $ID_1$ data to $ID_2$ for sharing administration if $ID_2$ privileged to clone | * Maintain & inform purpose<br>* Used on incoming $ID_2$ WDRs @ $ID_1$ MS for privileged feature(s) to $ID_1$ and/or $ID_2$<br>* Used on $ID_1$ WDRs @ $ID_1$ MS for privileged feature(s) to $ID_1$ and/or $ID_2$ (4986) |
| $ID_2$ | * Enforce & inform purpose<br>* Used on $ID_2$ WDRs @ $ID_2$ MS for privileged feature(s) to $ID_1$ and/or $ID_2$<br>(4984) * Used on incoming $ID_1$ WDRs @ $ID_2$ MS for privileged feature(s) to $ID_1$ and/or $ID_2$ | * Maintain local to $ID_2$ MS<br>* Enforce at $ID_2$ MS for $ID_2$ WDRs and/or incoming $ID_1$ WDRs for feature(s) with privileges granted by $ID_1$ to $ID_2$ (4988) |

*Fig. 49B*

```
Permissions {

        Text(str) = "Test Case #106729 (context)";
        Generic(assignPrivs) = "G=Family,Work,\vuloc [T=>20080402000130.24,<20080428;
                    D=*str; H;]";
        Groups {
                LBXPHONE_USERS = Austin, Davood, Jane, Kris, Mark, Ravi, Sam, Tim;
                "SW Components" = "SM 1.0", "PIP 1.0", "PIPGUI 1.0", "SMGUI 1.0",
                                "COMM 1.0", "KERNEL 1.1";
        }

        Grants /* Can define Grant structure(s) prior to assignment */ {
                Family= \lbxall[R=0xFFFFFFFF;] [D=*str(context="Family")];
                Work = [T=YYYYMMDD08:YYYYMMDD17;D=*str(context="Work");H;] {
                        "Department 232"=\geoar,\geode,\nearar,\nearde;
                        "Department 458" = [D="Davood Iyadi's mgt scope";] {
                                "Server Development Team" = ;
                                "lbxPhone Development Team" = {
                                        "Comm Layer Guys" = \mssys;\msbios;
                                        "GUI girls" = \msguiload;
                                        "Mark and Tim" = \msapps;
                                };
                        };
                        "Accounting Department" [H;] = \track;
                };
                Parents = { Mom=\lbxall; Dad=\lbxall; };
                Michael-Friends=\geoarr;\geode;
                Jason-Friends=\nearar;\nearde;
        }

        // Permissions are granted here:
        Bill: LBXPHONE_USERS [G=\caller;\callee;\trkall;];
        LBXPHONE_USERS: Bill [G=\callee;\caller;];
        Bill:Sophia;
        Bill:Brian [*assignPrivs];
        Bill:George [G=\geoall,\nearall;];
        Michael : Bill [G=Parents,Michael-Friends;];
        Jason: Bill [G=Parents,Jason-Friends;];

}
```

```
Charters {

        Condition(cond1) = "(__location @@ \loc_my) [D="Test Case #104223 (v)";]";
        "ms group"  =  { "Jane", "George", "Sally" };

        (  ((__msid = "Michael") & *cond1(v="Michael")) |
                ((__msid = "Jason") & *cond1(v="Jason"))  ):
               Invoke App myscript.cmd ("S"), Notify Autodial 214-405-6733;

        ((_I_msid = "Brian") & (_I_location @ \loc_my) [D="multi-cond text";H;]):
                       Invoke App (myscript.cmd ("B")) [T=20080302;],
                       Notify Autodial (214-405-5422);

        (M_sender  = ~emailAddrVar [T=<YYYYMMDD18]):
                Notify Indicator (M_sender, \thisMS) [D="Test Case #104223"; H;];

        (B_srchSubj ^ M_subject) & !(_fcnTest(B_srchSubj)) :
               "ms group"[G].Store DBobject(JOESDB.LBXTABS.TEST,
                       "INSERT INTO TABLESAV (" && \thisMS && ", " && \timestamp &&
                              ", 9);", \thisMS);

        ( _I_msid = "Sophia" & \loc_my (30M)$$(25M) _I_location ) :
               "ms group".Invoke App (alert.cmd);

        (%c:\myprofs\interests.chk > 90):
               Send Email ("Howdy " && _I_msid && " !!\n\nOur profiles matched > 90%.\n\n"
                      && "Call me at " && \appfld.phone.id && ". We are " &&
                      (_I_location - \loc_my)F && " feet apart\n", \appfld.source.id, "Call Me!",
                      , _I_appfld.email.source);

}
```

```
typedef struct privilege {
        unsigned long       priv;
        unsigned char       relevance[MAX_RELEVANCEMASK];
        TIMESPEC            *tspec;      // merged with permission level (if permission
                                         // level was present)
        struct privilege    *nextPriv;
        } PRIVILEGE;

typedef struct permission {
        unsigned char       grantor[MAX_IDLENGTH];
        unsigned short      grantor_idtype;
        unsigned char       grantee[MAX_IDLENGTH];
        unsigned short      grantee_idtype;
        PRIVILEGE           *privileges;
        struct permission   *nextPerm;
        } PERMISSION;

typedef struct action {
        IDENTITY            host;
        unsigned short      cmd;
        unsigned short      operand;
        unsigned char       *params;
        TIMESPEC            *tspec;          // merged with charter level (if charter
                                             // level was present)
        struct action       *nextActn;
        } ACTION;

typedef struct charter {
        unsigned char       grantee[MAX_IDLENGTH];
        unsigned short      grantee_idtype;
        unsigned char       grantor[MAX_IDLENGTH];
        unsigned short      grantor_idtype;
        unsigned char       *expression;
        ACTION              *actn;
        struct charter      *nextCharter;
        } CHARTER;
```

*Fig. 52*

```
...
x = "this is a textual description"
...
z="timespec=""200802030000:200812312359"" description=""test98341;Permission"""
...
<permission grantor="Jimbob" grantee="Henry" <%=z%> >
        <grant name="grant1" >
                <privilege id="\lbxcpy" relevance="FFFFFFFF"
                        timespec="YYYMMDD09:YYMMDD17" description="<%=x%>" />
                <privilege id="\lbxflt" />
                ...
        </grant>
        ...
</permission>
...
<group name="group123" >
        <member="Jim" />
        <member="Sue" />
        ...
</group>
...
<charter grantee="Henry" grantor="Jimbob" timespec="200802030000:200812312359"
        description="test98341;Charter" >
        <expression>
                <condition trigger="true"
                        specification="(__msid = ""Michael"") & __location $(300M) \loc_my" />
                <condition trigger="true"
                        specification="(__msid = ""Jason"") & __location $(300M) \loc_my" />
        </expression>
        <action host="George" cmd="Invoke" operand="App" param="alert.cmd" />
        <action host="George" cmd="Notify" operand="Indicator" param="test98341 Fired!" />
</charter>
...
```

*Fig. 54*

| Operand ↓ | PM | Preferred embodiment Send processing |
|---|---|---|
| 201 | O | Sending an auto-dial # updates appropriate recipient MS storage so that a recipient user can subsequently auto-dial the auto-dial # with a minimal user interface action. Preferably, the recipient MS user is appropriately and immediately notified of the receipt. Preferably, the send command data is maintained to LBX History, a historical call log (e.g. incoming), or other useful storage for subsequent user browse of the accompanying message and a date/time stamp of when sent, and for automated speed dialing of the # in response to a user action to auto-dial. Various embodiments will save to LBX History how many times, and when, the auto-dial # was used to perform automated speed dialing. |
| 203 | O | Sending a web link updates appropriate recipient MS storage so a recipient user can subsequently invoke (transpose to) the link, for example in a browser, with a minimal user interface action. Preferably, the recipient MS user is appropriately and immediately notified of the receipt. Preferably, the send command data is maintained to LBX History, a historical call log (e.g. incoming), browser history data, browser favorites, or other useful storage for subsequent user browse of the accompanying message and a date/time stamp of when sent, and for invocation of the link within a MS browser in response to a user action to use the link. Various embodiments will save to LBX History how many times, and when, the weblink was invoked. |
| 205 | E | Sending an email causes interface to the email delivery system (e.g. SMTP API) for sending the email body parameter. In one embodiment, the body is assumed to be the body of the email. In another embodiment, the body is attached with or without attachment(s). Attachments are preferably referenced with an appropriate syntax in the body specified. In another embodiment, the body is parsed for determining and using the best delivery options. The email will arrive to a recipient like other emails. Attributes can be set as is customary for email attributes (e.g. confirmation of delivery status, special handling, NLS considerations, etc). |
| 207 | E | Sending an SMS message causes interface to the sms message delivery system (e.g. SMTP API) for sending the sms message. The email interface can be used provided the sms message length maximum is observed. In one embodiment, the message parameter is identical to the msg/subj parameter. In another embodiment, the two parameters are concatenated, or formed in a complimentary manner, to highlight the subj/msg parameter from the sms message. In another embodiment, only a null subj/msg is supported. The message will arrive to a recipient like other sms messages. Various attributes can be set (e.g. confirmation of delivery status, special handling, NLS considerations, etc). |

*Fig. 63B-1*

| Operand ↓ | PM | Preferred embodiment Send processing |
|---|---|---|
| 209 | E | Sending a broadcast email causes interface to the email delivery system (e.g. SMTP API) for sending the email body parameter. In one embodiment, the body is assumed to be the body of the email. In another embodiment, the body is attached with or without attachment(s). Attachments are preferably referenced with an appropriate syntax in the body specified. In another embodiment, the body is parsed for determining and using the best delivery options. The email will arrive to a recipient like other emails. Various attributes can be set (e.g. special handling, NLS considerations, etc), but preferably, no confirmation of delivery is set since this is a broadcast. |
| 211 | E | Sending an SMS broadcast message causes interface to the sms message delivery system (e.g. SMTP API) for sending the sms message parameter. The email interface can be used provided the sms message length maximum is observed. In one embodiment, the message parameter is identical to the msg/subj parameter. In another embodiment, the two parameters are concatenated, or formed in a complimentary manner, to highlight the subj/msg parameter from the sms message. In another embodiment, only a null subj/msg is supported. The message will arrive to a recipient like other messages. Various attributes can be set (e.g. special handling, NLS considerations, etc), but preferably, no confirmation of delivery status is set since this is a broadcast. |
| 213 | O | Sending an indicator updates appropriate recipient MS storage so that the currently focused user interface object (e.g. window titlebar) of the MS user interface is modified with the indicator. If there are no active user interface objects in the current MS user interface, then an appropriate alert area of the currently focused interface is to display the indicator. The user can clear (remove) the indicator when desired. Preferably, the indicator is used for modifying other focused objects (e.g. titlebars) or other focused areas in the user interface so as to not get overlooked. For example, as the user navigates and surfaces/focuses new user interface objects, the indicator remains visible on the newly focused object. Preferably, the indicator is selectable by the user of the MS for showing all other send command parameters associated, as well as a date/time stamp of when sent. In other embodiments, the most recently displayed indicator is displayed in the appropriate focused area, but the user can conveniently select any indicators which were sent in history at some point in time for sought indicator information by selecting the currently displayed indicator and then requesting to browse/scroll history of previously delivered indicators (with options to see details). Preferably, the send command data is maintained to LBX History, a historical log (web page load history), or other useful storage for subsequent use. Some title bar management methods include various IBM Technical Disclosure Bulletins from 1991 through 1995 (e.g. DA8-92-0910 "Originator Identified Direct Access Mail Basket Title Bar Mechanism", DA8-93-0061 "Roving Title Bar", DA8-93-0223 "Roving Title Bar Status", etc). |

*Fig. 63B-2*

| Operand ↓ | PM | Preferred embodiment Send processing |
|---|---|---|
| 215 | O | Sending an application causes invocation of the application at the recipient MS. The app parameter is preferably a fully qualified path name to the executable to start. In another embodiment, the app parameter is indirect: a path name to a "shortcut" (like a MS Windows shortcut). In another embodiment, the app parameter is an identifier string for the underlying operating system to know which application to start. The attributes parameter can be used for how to start the application, for example to flag whether to start an additional instance if the application is already running at the MS (provided multiple instances are supported). The msg/subject parameter may be useful for maintaining to LBX history useful information, along with a date/time stamp when sent, with record of the application invocation reference. An error is logged if the app parameter is not found for launch. Preferably, the invoke command data is maintained to LBX History, a historical log (web page load history), or other useful storage for subsequent use. |
| 217 | E | Sending a document causes interface to the email delivery system (e.g. SMTP API) for appropriately sending the document. The doc parameter is preferably a fully qualified path name, or suitable reference, to the document which may have a document type (e.g. by file extension, document parse, or document location). The document type is used for setting proper email attachment settings and perhaps the attributes parameter. Depending on the document type, the document may form the email body or be an attachment. The email will arrive to a recipient like other emails. Various attributes can be set (e.g. confirmation of delivery status, special handling, NLS considerations, etc). |
| 219 | E | Sending a file causes interface to the email delivery system (e.g. SMTP API) for appropriately sending the file. The path parameter is preferably a fully qualified path name, or suitable reference, to the file which should have a file type (e.g. by file extension, file parse, or file location). The file type is used for setting proper email attachment settings and perhaps the attributes parameter. Depending on the file type, the file may form the email body or be an attachment. The email will arrive to a recipient like other emails. Various attributes can be set (e.g. confirmation of delivery status, special handling, NLS considerations, etc). |
| 221 | O | Sending content causes the content to be sent to the recipient MS in a manner which is appropriate for where the content is stored and how it is to be subsequently presented. The content parameter is one that cannot be classified in the other operands, but is content for presentation nevertheless. Examples include special data records (e.g. extern variable name), content data memory locations (e.g. programmatic variable), or files containing a customizably processed format. Methods of displaying the content include audio and/or visual using applicable MS capabilities. Preferably, the send command data is maintained to LBX History, a historical content log, or other useful storage for subsequent user browse of the accompanying content and a date/time stamp of when sent, and for presentation of the content in response to an applicable user action. Attributes may be set for special content handling. |

*Fig. 63B-3*

| Operand ↓ | PM | Preferred embodiment Send processing |
|---|---|---|
| 223 | O | Sending a Database (DB) object causes the DB object to be sent to the recipient MS in a manner which is appropriate for subsequent import DB or table(s). The DB-obj parameter takes on many syntaxes for sending any subset of a database object, such as an entire database, table(s), certain rows, certain columns, etc. In one embodiment, a qualified database form is used such as: Owner:DatabaseName:TableName for sending the entire table (can use table name wildcard for multiple tables). In another embodiment, Owner:DatabaseName:"...SQL query... shall return the data that is to be sent, preferably in a comma delimited or tab delimited form (as specified in the attributes parameter). Preferably, the send command data is maintained to LBX History, a database log, or other useful storage (subj/msg to document the transaction) for subsequent user browse of the accompanying data and a date/time stamp of when sent, and for DB query manager browse of the data in response to a user action for browse. One preferred embodiment enables the data for easy import to a variety of database destinations, preferably via the same DB query mgr interface(s) used for browsing. |
| 225 | O | Sending data causes reading the current value of the data at the MS where the send command action is being executed and then sending the current value to the recipient MS for informative purposes. In the preferred embodiment, the data is a global system variable visible to all processes of a MS operating system. In other embodiments, the data may have limited scope which is made accessible to present disclosure processing (e.g. with extern). An AppTerm uses record 5300 for access. Depending on the embodiment, data may be that which is contained in a program data segment, stack segment, and/or extra segment. There can be unique syntaxes for specifying which type of data is being sought (e.g. "S:dataname"). In the preferred embodiment, all occurrences found on the MS and information including its value about the occurrence is presented to the user. In one embodiment, a well known location of link symbol information files are consulted, and in another embodiment a new parameter specifies where to look, or which symbol file of information to use. Preferably, the data value is maintained to LBX History, a historical log, or other useful storage for subsequent user browse, or programmatic access, of the data variable name, its value and date/time stamp of when sent, and for presentation of the data value in response to a user action to show it. |
| 227 | O | Sending a semaphore causes reading the current value of the semaphore at the MS where the send command action is being executed and then sending the current value to the recipient MS for informative purposes. In the preferred embodiment, the semaphore is a global system semaphore visible to all processes of a MS operating system. In other embodiments, the semaphore may have limited scope which is made accessible to present disclosure processing (e.g. RAM semaphore). Preferably, the semaphore value (cleared or set) is maintained to LBX History, a historical log, or other useful storage for subsequent user browse, or programmatic access, of the semaphore name, its value and date/time stamp of when sent, and for presentation of the semaphore value in response to a user action to show it. |

*Fig. 63B-4*

| Operand ↓ | PM | Preferred embodiment Send processing |
|---|---|---|
| 229 | E | Sending a directory causes interface to the email delivery system (e.g. SMTP API) for sending the directory. In one embodiment, the directory is assumed to be the body of the email (e.g. when attributes parameter indicates it is to be a description only of the directory) for sending information about the directory such as # files, nesting of folders, sizes, and any useful file system characteristic(s) or statistics of the directory. In another embodiment, or as specified with an additional parameter (or in attributes), the directory is compressed and encoded as an attachment. In another embodiment, the directory is sent as individually attached files (as indicated to send that way by new or attributes parameter). The email will arrive to a recipient like other emails. The attribute parameter can be used for conventional email attributes as well as new attributes which affect directory data processing. |
| 231 | O | Sending an application context causes invocation of the application at the recipient MS and then executing a macro within the application context. The app parameter is preferably a fully qualified path name to the executable to start. In another embodiment, the app parameter is indirect: a path name to a "shortcut" (like a MS Windows shortcut). In another embodiment, the app parameter is an identifier string for the underlying operating system to know which application to start. The macro parameter is preferably a file, path, or accessible variable name containing a set of keystrokes that can be directed to standard/user-interface input. In another embodiment, the macro parameter is a prerecorded user input scenario (for play after application launched -- pulldown selections, mouse droppings, clicks, etc) captured to a file or stored in an accessible variable name. The attributes parameter can be used for how to start the application, for example to flag whether to start an additional instance if the application is already running at the MS (provided multiple instances are supported), and to specify the type of macro parameter being specified, or to specify a speed for processing individuals of the macro. The msg/subject parameter may be useful for maintaining to LBX history useful information with record of the application context invocation reference. An error is logged if the app parameter is not found for launch. |
| 233 | E | Sending the focused user interface object causes interface to the email delivery system (e.g. SMTP API) for sending an image (preferably .JPG) of the currently focused user interface object as an attachment. The "<alt><prtscrn>" constant string parameter is a syntactical string representation for the keystroke sequence for performing the MS focused user interface capture action. A similar syntax can be used to specify a different keystroke sequence (1$^{st}$ parameter) for the same functionality. The email will arrive to a recipient like other emails. The attributes parameter can be set for which format to send, in which case a conversion may take place prior to sending (depends on embodiment). Various attributes can be set (e.g. confirmation of delivery status, special handling, NLS considerations, etc). |

*Fig. 63B-5*

| Operand ↓ | PM | Preferred embodiment Send processing |
|---|---|---|
| 235 | O | Sending user interface control causes redirecting the keystroke macro to input of the recipient MS as if it were entered by the MS user. The macro parameter is preferably a file, path, or accessible variable name containing a set of keystrokes that can be directed to standard user-interface/input. In another embodiment, the macro is a prerecorded user input scenario (for play after application launched -- pulldown selections, mouse droppings, clicks, etc) captured to a file or stored in an accessible variable name. The attributes parameter can be used for whether or not to first display the subj/msg to the recipient MS user for user acknowledgement, or cancellation, prior to executing the macro at the MS. This allows the user time to get the MS user interface in a desirable state if necessary for running the macro, and to see information of the origination (i.e. Parameters). The msg/subject parameter may be useful for maintaining to LBX history information with a record of user interface control sent. |
| 237 | O | Sending input causes redirecting the input to the iodev parameter input device stream of the recipient MS as if it were entered by the MS user, or programmatically specified to the iodev I/O device parameter by a data processing system process. The input parameter is preferably a file, path, or accessible variable name containing a datastream (e.g. macro) recognizable by the iodev connected device. The attributes parameter can be used for whether or not to first display the subj/msg to the recipient MS user for user acknowledgement, or cancellation, prior to redirecting the input parameter datastream at the MS, or to specify a speed for processing individuals of the input. This allows the user time to get the MS user interface, and any iodev devices, in a desirable state if necessary for running the input, and to see information of the origination (i.e. Parameters). The msg/subject parameter may be useful for maintaining to LBX history information with a record of the user interface control having been sent. |
| 239 | O | Sending output causes redirecting the output to the iodev parameter output device stream of the recipient MS as if it were entered by the MS user, or programmatically specified to the iodev I/O device parameter by a data processing system process. The output parameter is preferably a file, path, or accessible variable name containing a datastream (e.g. macro) recognizable by the iodev connected device. The attributes parameter can be used for whether or not to first display the subj/msg to the recipient MS user for user acknowledgement prior to redirecting the output parameter datastream at the MS, or to specify a speed for processing individuals of the output. This allows the user time to get the MS user interface, and any iodev devices, in a desirable state if necessary for running the output, and to see information of the origination (i.e. Parameters). The msg/subject parameter may be useful for maintaining to LBX history information with a record of the user interface control having been sent. |

*Fig. 63B-6*

| Operand ↓ | PM | Preferred embodiment Send processing |
|---|---|---|
| 241 | O | Sending an alert updates appropriate recipient MS storage so that a recipient MS alerter process can pick up the alert and then alert the user. There are a variety of alert processes, the most basic of which monitors incoming messages and posts them to the user in an alerting manner. In one embodiment, the alert parameter is identical to the msg/subj parameter. In another embodiment, the two parameters are concatenated, or formed in a complimentary manner, to highlight the subj/msg parameter from the alert message. In another embodiment, only a null subj/msg is supported. The attributes parameter can be for special treatment of the alert by an alerter process. |
| 243 | O | See Notify Command for identical processing. |
| 245 | O | See Notify Command for identical processing. |
| 247 | O | See Notify Command for identical processing. |
| 249 | O | See Notify Command for identical processing. |
| 251 | O | Sending a calendar object causes interface to the recipient MS calendar/scheduling system for sending/scheduling the calendar object parameter. The calobj parameter contains the date/time stamp of when to schedule the object, or a special syntax constant for "now", "first available per recipient and sender availability", "by end of the week pending availability", or other reasonable constants for when to schedule the calendar object. In one embodiment, the calendar object is assumed to be a newly scheduled calendar item for placement to the calendar of recipients. In another embodiment, the calendar object (e.g. data or file containing parsable syntax) contains directives for what actions exactly to perform to the calendar application interface. In another embodiment, the email system is the transport to deliver the calendar object or calendar actions to recipients. Attributes can be set as is customary for calendar entries (attendance required, emergency meeting, recurring/weekly/monthly meeting, etc). The attributes parameter may be used for performing other actions/functions in the calendaring interface. |
| 253 | O | Sending an address book (AB) object causes interface to the AB system for sending/entering the AB object parameter at the recipient MS. In one embodiment, the AB object is assumed to be a newly entered AB entry (e.g. contact reference name) for creation in the AB of recipients. In another embodiment, the AB object parameter contains directives (e.g. data or file containing parsable syntax) for what actions exactly to perform to the AB application interface. Attributes can be set as may be customary for AB entries (customer, peer, manager, friend, family, etc). The attributes parameter may be used for performing other actions/functions in the AB interface. |
| . . . | | |

*Fig. 63B-7*

| Operand ↓ | PM | Preferred embodiment Notify processing |
|---|---|---|
| 201 | O | Notifying with an auto-dial # automatically performs call processing to auto-dial the auto-dial #. Preferably, the recipient MS user is called by the MS as a normal phone call would be made. In one embodiment, multiple recipients are called "back to back" after the previous recipient call terminates. In another embodiment, a multiple line party call is made with an automated manner with all recipients. The attributes parameter can indicate which embodiment to use, and can be used for specialized call processing (collect, prepaid account check, hide caller id, etc). Preferably, the notify command data and call data is maintained to LBX History, a historical call log (e.g. incoming), with the accompanying subj/msg and a date/time stamp of when sent, and for future repeated automated speed dialing of the # in response to a user action to auto-dial. Various embodiments will save to LBX History how many times, and when, the auto-dial # was used to perform automated speed dialing, along with call details such as direction of call, parties to the call, features of the call, or other call characteristics. In one embodiment, the recipient ID is one to one with the called #. In another embodiment, the recipient ID is used to find the associated called number. Preferably, an existing API is used to accomplish processing. Automatic dialing through a variety of interfaces is well known in the art, and depends on the software development environment. Conventional processing side affects of automated calling should occur like the action was manual (e.g. log update). |
| 203 | O | Notifying with a web link automatically invokes (transposes to) at the recipient MS the link, for example in a browser, with a minimal (if any) user interface action. In one embodiment, the link includes URL parameter(s) (e.g. ?p1=xyz). In another embodiment, all recipients are passed to the link with appended URL parameter(s) (e.g. ?ids=Recip1;Recip2;...RecipN). An alternate embodiment fires form variables to the loaded page with the same URL variables. The attributes parameter can indicate which embodiment to use, and how to invoke the link (e.g. use currently focused window, use an active browser window, spawn new browser window, etc). Preferably, the notify command data is maintained to LBX History, a historical call log (e.g. incoming), browser history data, browser favorites, or other useful storage for subsequent user browse of the accompanying subj/msg and a date/time stamp of when sent, and for invocation of the link within a MS browser in response to a user action to use the link again in the future. Various embodiments will save to LBX History how many times, and when, the weblink was invoked. |
| 205 | E | See Send Command for identical processing. |
| 207 | E | See Send Command for identical processing. |
| 209 | E | See Send Command for identical processing. |
| 211 | E | See Send Command for identical processing. |
| 213 | O | See Send Command for identical processing. |
| 215 | O | See Send Command for identical processing. |

*Fig. 64B-1*

| Operand ↓ | PM | Preferred embodiment Notify processing |
|---|---|---|
| 217 | E | See Send Command for identical processing. |
| 219 | E | See Send Command for identical processing. |
| 221 | O | Notifying with content causes the content to be presented at the recipient MS upon delivery in a manner which is appropriate for the content type. The content parameter is one that cannot be classified in the other operands, but is content for presentation nevertheless. Examples include special data records (e.g. extern variable name), content data memory locations (e.g. programmatic variable), or files containing a customizably processed format. Methods of displaying the content include audio and/or visual using applicable MS capabilities. Preferably, the notify command data is maintained to LBX History, a historical content log (e.g. incoming), browser history data, or other useful storage for subsequent user browse of the accompanying content and a date/time stamp of when sent, and for presentation of the content. Various embodiments will save to LBX History how many times, and when, the content was presented. |
| 223 | O | Notifying with a Database (DB) object causes the DB object (i.e. qualified database with access query string) to be modified with the query parameter. The query parameter is used to perform any query against the specified DB-database (DB-obj), preferably a query that only returns a return code (e.g. causes alteration). Preferably, the notify command data is maintained to LBX History, a database log (e.g. incoming), or other useful storage for subsequent query use and a date/time stamp of when sent, and for DB query manager browse/use of the query in response to an applicable user action. Other params are for documentary purposes when information is saved. In some embodiments, an appropriate SQL client interface (e.g. SQLNET API) is used to carry out processing, or a suitable DB API is used. |
| 225 | O | Notifying data causes modifying the value of the data at the recipient MS (set data to value). An error can result if the data is not resolvable for the attempt. In the preferred embodiment, the data is a global system variable visible to all processes of a MS operating system. In other embodiments, the data may have limited scope which is made accessible to present disclosure processing (e.g. with extern). An AppTerm uses record 5300 for access. Preferably, the data affected is maintained to LBX History, a historical log (e.g. incoming), or other useful storage for subsequent user browse, or programmatic access, of the data variable name, its before and after values and date/time stamp of when sent, and for presentation of the data value in response to a user action to show it. |
| 227 | O | Notifying a semaphore causes modifying the value of the semaphore at the recipient MS. In the preferred embodiment, the semaphore is a global system semaphore visible to all processes of a MS operating system. In other embodiments, the semaphore may have limited scope which is made accessible to present disclosure processing (e.g. RAM semaphore). Preferably, the semaphore value before and after setting is maintained to LBX History, a historical log (e.g. incoming), or other useful storage for subsequent user browse, or programmatic access, and for presentation of the semaphore information in response to a user action to show it. |

*Fig. 64B-2*

| Operand ↓ | PM | Preferred embodiment Notify processing |
|---|---|---|
| 229 | E | See Send Command for identical processing. |
| 231 | O | See Send Command for identical processing. |
| 233 | E | See Send Command for identical processing. |
| 235 | O | See Send Command for identical processing. |
| 237 | O | See Send Command for identical processing. |
| 239 | O | See Send Command for identical processing. |
| 241 | O | Notifying with an alert presents the alert to each recipient MS. Depending on attributes parameter settings, the alert may be asynchronously presented to an alert area, synchronously alerted and requiring a user action to acknowledge, logged to special file, or other reasonable alert method(s). Fig. 75B processing will cause the alert to be presented to the MS user. In one embodiment, the alert parameter is identical to the msg/subj parameter. In another embodiment, the two parameters are concatenated, or formed in a complimentary manner, to highlight the subj/msg parameter from the alert message. In another embodiment, only a null subj/msg is supported. Various embodiments will support different alert content types and applicable processing as indicated by the attributes parameter. Preferably, an appropriate API is made available for processing. |
| 243 | O | Notifying a process causes sending an operating system signal (see UNIX signaling) to the process with Process ID (PID) of the pid parameter. A numeric value parameter (e.g. 0 or 1) may be communicated with the signal. Depending on attributes parameter settings, another embodiment accesses the pid parameter as a process identifier parameter which is used to lookup the operating system PID prior to signaling. The msg/subject parameter may be useful for maintaining to LBX history useful information, along with a date/time stamp when sent, with record of the application invocation reference. An error can be logged if the process is not found for signaling. |
| 245 | O | Notifying a container causes launch of a MS file manager to examine the contents of a MS system container having the path in the container parameter (e.g. c:\dir1\subdir3). The attributes parameter can be used for how to start the file manager, for example to flag whether to start an additional instance if the file manager is already running at the MS (provided multiple instances are supported), otherwise an existing instance is updated for the container, or a new instance is started for the container. The msg/subject parameter may be useful for maintaining to LBX history useful information, along with a sent date/time stamp, with record of the application invocation reference. An error can be logged if the file manager is not found for launch, or if the container is invalid. |

*Fig. 64B-3*

| Operand | PM | Preferred embodiment Notify processing |
|---|---|---|
| 247 | O | Notifying a program object causes acting on a specified program object (per attribute parameter) with the specified data at the recipient MS. The progobj parameter is the linked run time symbolic name accessible to charter processing of the present disclosure for third party plug-in processing. The progobj parameter can be a variable name, function name, object name, queue name, procedure name, or semaphore name accessed at run time by the symbolic name evaluation during charter processing. The binary data parameter is used to modify the program object (variable name set Least Significant Bit (LSB) to Most significant Bit (MSB) right to left intuitive Motorola processing byte/bit order until bits set or unmatched, function name invoked with respective data bytes pushed to the stack prior to invocation, object name data public data area initialized with the data parameter on a byte to byte basis, queue name entry inserted using the data parameter as a typecast data record of bits, procedure name invoked with respective data bytes pushed to the stack prior to invocation, or semaphore name set with clear for a null data parameter, else a set action). Alternately, an Intel reverse byte order can be used to apply the data Parameter. The attributes parameter indicates which variety of progobj is specified, and can be used to indicate a byte order data mapping method to use. The msg/subject parameter may be useful for maintaining to LBX history useful information, along with a date/time stamp when sent, with record of the program object invocation. An error can be logged if the progobj parameter is not resolvable. Appropriate MS O/S interfaces are used. |
| 249 | O | Notifying a cursor causes modifying a recipient MS user interface cursor in accordance with direction by the attributes parameter. The cursor parameter can be a suitable cursor bitmap file reference, suitable animated cursor file, predefined appearance type, or predefined behaving cursor. The attributes parameter further distinguishes which cursor modification is being requested. The msg/subject parameter may be useful for maintaining to LBX history useful information, along with a date/time stamp when sent. An error is logged if there is no active cursor in the user interface. An appropriate MS API is used, depending on the development environment. |
| 251 | O | See Send Command for identical processing. |
| 253 | O | See Send Command for identical processing. |
| . . . | | |

*Fig. 64B-4*

| Operand ↓ | PM | Preferred embodiment Compose processing |
|---|---|---|
| 201 | C | Composing an auto-dial # launches the MS phone number calling interface with the auto-dial # parameter defaulted for making the call. Once launched, the user can make a very simple confirmation action for placing the call to the auto-dial #. Call processing takes place as though the user manually launched the dialing application, entered the auto-dial # and then is ready to decide if the call should be placed. Appropriate MS storage is updated and subsequently processed as though the user had entered the # for calling manually. Preferably, the compose command data is maintained to LBX History, a historical call log (e.g. outgoing when call placed), or other useful storage for subsequent use. |
| 203 | S | Composing a web link launches a MS browser and defaults the link as though the user had entered it manually. The user can subsequently invoke (transpose to) the link if desired with a minimal action (e.g. click ok). The link may include appended URL parameters (e.g. "?v=yes&T=go" for customized web page processing). An alternate embodiment can fire form variables for active web page processing using URL parameters specified or using the params parameter. Processing takes place as though the user manually launched the browser application, entered the weblink and then is ready to decide if the link should be invoked. Appropriate MS storage is updated and subsequently processed as though the user had entered the weblink in the browser manually. Preferably, the compose command data is maintained to LBX History, a historical log (web page load history when invoked), or other useful storage for subsequent use. |
| 205 | C | Composing an email causes interface to the email delivery system for invoking the create email interface and defaulting the appropriate email fields with the passed parameters. The user can subsequently send the email with little effort, or after optional modification, with a minimal action (e.g. click ok). Processing takes place as though the user manually launched the create email application, entered the fields of the email form with passed parameters, and then is ready to decide if the email should be sent, or further edited, or possibly cancelled. Appropriate MS storage is updated and subsequently processed as though the user manually started the create email interface and entered the email information manually. Preferably, the compose command data is maintained to LBX History, a historical call log (e.g. incoming), or other useful storage for subsequent use. A standard email POP or mailbox interface is preferably used. The email will arrive to a recipient like other emails. Various attributes can be set (e.g. confirmation of delivery status, special handling, NLS considerations, etc). |

*Fig. 65B-1*

| Operand ↓ | PM | Preferred embodiment Compose processing |
|---|---|---|
| 207 | C | Composing an sms message causes interface to an appropriate messaging delivery system for invoking the create message interface and defaulting the appropriate message fields with the passed parameters. The user can subsequently send the message with little effort, or after optional modification, with a minimal action (e.g. click ok). Processing takes place as though the user manually launched the create message application, entered the fields of the messaging form with passed parameters, and then is ready to decide if the message should be sent, or further edited, or possibly cancelled. Appropriate MS storage is updated and subsequently processed as though the user manually started the create message interface and entered message information manually. Preferably, the compose command data is maintained to LBX History, a historical call log (e.g. incoming), or other useful storage for subsequent use. A standard email POP or mailbox interface, or a similar messaging interface, can be used. The message will arrive to a recipient like other sms messages. Various sms message attributes may be set (e.g. confirmation of delivery status, special handling, NLS considerations, etc). |
| 209 | C | Composing a broadcast email causes interface to the email delivery system for invoking the create email interface and defaulting the appropriate email fields with the passed parameters. The user can subsequently send the email with little effort, or after optional modification, with a minimal action (e.g. click ok). Processing takes place as though the user manually launched the create email application, entered the fields of the email form with passed parameters, and then is ready to decide if the email should be sent, or further edited, or possibly cancelled. Appropriate MS storage is updated and subsequently processed as though the user manually started the create email interface and entered the email information manually. Preferably, the compose command data is maintained to LBX History, a historical call log (e.g. incoming), or other useful storage for subsequent use. A standard email POP or mailbox interface is preferably used. The email will arrive to a recipient like other emails. Various attributes can be set (e.g. special handling, NLS considerations, etc), but preferably, no confirmation of delivery status is requested in attributes since this is a broadcast. |

*Fig. 65B-2*

| Operand ↓ | PM | Preferred embodiment Compose processing |
|---|---|---|
| 211 | C | Composing a broadcast sms message causes interface to an appropriate messaging delivery system for invoking the create message interface and defaulting the appropriate message fields with the passed parameters. The user can subsequently send the message with little effort, or after optional modification, with a minimal action (e.g. click ok). Processing takes place as though the user manually launched the create message application, entered the fields of the messaging form with passed parameters, and then is ready to decide if the message should be sent, or further edited, or possibly cancelled. Appropriate MS storage is updated and subsequently processed as though the user manually started the create message interface and entered message information manually. Preferably, the compose command data is maintained to LBX History, a historical call log (e.g. incoming), or other useful storage for subsequent use. A standard email POP or mailbox interface, or a similar messaging interface, can be used. The message will arrive to a recipient like other messages. Various attributes can be set (e.g. special handling, NLS considerations, etc), but preferably, no confirmation of delivery status is requested in attributes since this is a broadcast. |
| 213 | O | See Send Command for identical processing. |
| 215 | C | Composing an application causes invocation of the application at the MS. The app parameter is preferably a fully qualified path name to the executable to start. In another embodiment, the app parameter is indirect: a path name to a "shortcut" (like a MS Windows shortcut). In another embodiment, the app parameter is an identifier string for the underlying operating system to know which application to start. The params parameter can be used for command line, or string to append, or pass, to the app/path parameter, for how to start the application (e.g. with parameters). Processing takes place as though the user manually launched the application (and with any optional params). Preferably, the compose command data is maintained to LBX History, a log, or other useful storage for subsequent use. |
| 217 | S | Composing a document causes invocation of the appropriate application at the MS in accordance with the object type as though the user selected the document for automatically being associated to the correct application when opening the document for composing (e.g. edit/manage) it. The doc parameter may be preferably a fully qualified path name to the document. Preferably, the compose command data is maintained to LBX History, a log, or other useful storage for subsequent use. |
| 219 | S | Composing a file causes invocation of the appropriate application at the MS in accordance with the file type of the fully qualified path name of the file as though the user selected the file for automatically being associated to the correct application when opening the document. Processing takes place as though the user manually launched the application for the specified file to compose it. The path parameter is preferably a fully qualified path name to the file. Preferably, the compose command data is maintained to LBX History, a log, or other useful storage for subsequent use. |

*Fig. 65B-3*

| Operand | PM | Preferred embodiment Compose processing |
|---|---|---|
| 221 | O | Composing content causes invocation of the appropriate application at the MS in accordance with the content as though the user selected the content for automatically being associated to the correct application when opening the content. Processing takes place as though the user manually launched the applicable application for the content for composing (e.g. manage/edit of) it. The path parameter is preferably a fully qualified specification to the content. Preferably, the compose command data is maintained to LBX History, a log, or other useful storage for subsequent use. |
| 223 | C | Composing a DB object causes invocation of the appropriate database query manager DB object creation interface to a context complementary to the type of DB object as though the user started the query manager and manually entered the DB object for creation. Processing takes place as though the user manually launched the query manager, entered the fields of the database object form, and then is ready to further work with the starting template of DB object information. In one embodiment, the DB-obj parameter contains directives for automatically populating specified data to a particular Query Manager create object interface. In another embodiment, the DB-obj parameter is specified for an existing DB object for then being opened by the query manager for further review or work. Appropriate MS storage is updated and subsequently processed as though the user had entered information manually. Preferably, the compose command data is maintained to LBX History, a historical call log (e.g. incoming), or other useful storage for subsequent use. |
| 225 | O | Composing data causes modifying the value of the data at the MS (analogous to a Notify data action -- set data to value). An error can result if the data is not resolvable for the attempt. In the preferred embodiment, the data is a global system variable visible to all processes of a MS operating system. In other embodiments, the data may have limited scope which is made accessible to present disclosure processing (e.g. with extern). A recognized AppTerm causes access to record 5300 for proper semaphore synchronized access. Preferably, the data affected is maintained to LBX History, a historical log (e.g. incoming), or other useful storage for subsequent user browse, or programmatic access, of the data variable name, its before and after values and date/time stamp of when sent, and for presentation of the data value in response to a user action to show it. |
| 227 | O | Composing a semaphore causes modifying the value of the semaphore at the MS (analogous to a Notify sem action -- set sem to value). An error can result if the semaphore is not resolvable for the attempt. In the preferred embodiment, the semaphore is a global system semaphore visible to all processes of a MS operating system. In other embodiments, the semaphore may have limited scope which is made accessible to present disclosure processing (i.e. RAM semaphore). Preferably, the semaphore value before and after setting is maintained to LBX History, a historical log (e.g. incoming), or other useful storage for subsequent user browse, or programmatic access, and for presentation of the semaphore information in response to a user action to show it. |

*Fig. 65B-4*

| Operand ↓ | PM | Preferred embodiment Compose processing |
|---|---|---|
| 229 | S | Composing a directory causes invocation of the appropriate application (e.g. file system manager) at the MS as though the user selected the directory for automatically being associated to the correct file management application when opening the directory. Processing takes place as though the user manually launched the application for working with the directory. The path parameter is preferably a fully qualified path name to the directory. Preferably, the compose command data is maintained to LBX History, a log, or other useful storage for subsequent use. |
| 231 | C | Composing an application context causes invocation of the application at the MS and then executing a macro within the application context (analogous to a Send app context action). The app parameter is preferably a fully qualified path name to the executable to start. In another embodiment, the app parameter is indirect: a path name to a "shortcut" (like a MS Windows shortcut). In another embodiment, the app parameter is an identifier string for the underlying operating system to know which application to start. The macro parameter is preferably a file, path, or accessible variable name containing a set of keystrokes that can be directed to standard/user-interface input. In another embodiment, the macro parameter is a prerecorded user input scenario (for play after application launched -- pulldown selections, mouse droppings, clicks, etc) captured to a file or stored in an accessible variable name. Preferably, the compose command data is maintained to LBX History, a log, or other useful storage for subsequent use. |
| 233 | S | Composing a focused user interface object causes invocation of the appropriate application (e.g. graphic application by file type embodiment .jpg, .gif, etc) at the MS as though the user manually captured the focused user interface object (e.g. Alt-Prtscrn) using the first command string syntax parameter, invoked the correct graphical application to open for the captured image, and is ready for save of the file, or for further editing. Processing takes place as though the user manually launched the application for the specified file. The embodiment's file type preference may influence which application is to be launched. The first parameter can be used to change the keystroke sequence for capture. Preferably, the compose command data is maintained to LBX History, a log, or other useful storage for subsequent use. |
| 235 | O | Composing user interface control causes redirecting the keystroke macro to user interface input of the MS as if it were entered by the MS user (analogous to a Send user interface control action). The macro parameter is preferably a file, path, or accessible variable name containing a set of keystrokes that can be directed to standard input. In another embodiment, the macro is a prerecorded user input scenario (for play after application launched -- pulldown selections, mouse droppings, clicks, etc) captured to a file or stored in an accessible variable name. Preferably, the compose command data is maintained to LBX History, a log, or other useful storage for subsequent use. |

*Fig. 65B-5*

| Operand ↓ | PM | Preferred embodiment Compose processing |
|---|---|---|
| 237 | O | Composing input causes redirecting the input to the iodev parameter input device stream of the MS as if it were entered by the MS user, or programmatically specified to the iodev I/O device parameter by a data processing system process (analogous to a Send input action). The input parameter is preferably a file or accessible variable name containing a datastream recognizable by the iodev connected device. Preferably, the compose command data is maintained to LBX History, a log, or other useful storage for subsequent use. |
| 239 | O | Composing output causes redirecting the output to the iodev parameter output device stream of the MS as if it were entered by the MS user, or programmatically specified to the iodev I/O device parameter by a data processing system process (analogous to a Send output action). The output parameter is preferably a file or accessible variable name containing a datastream recognizable by the iodev connected device. Preferably, the compose command data is maintained to LBX History, a log, or other useful storage for subsequent use. |
| 241 | S | Composing an alert causes invocation of the appropriate alerter application at the MS as though the user selected the alert application, manually entered the alert parameter, and is ready to decide what to do with the alert, for example send it with a minimal action (e.g. ok), edit it, or cancel it. Processing takes place as though the user manually launched the application for creating the specified alert. Preferably, the compose command data is maintained to LBX History, a log, or other useful storage for subsequent use. |
| 243 | O | Composing a process causes sending an operating system signal (see UNIX signaling) to the process with Process ID (PID) of the pid parameter (analogous to a Notify process action). A numeric value parameter (e.g. 0 or 1) may be communicated with the signal. An error can be logged if the process is not found for signaling. Preferably, the compose command data is maintained to LBX History, a log, or other useful storage for subsequent use. |
| 245 | S | Composing a container causes launch of a MS container manager (e.g. file manager) to examine the contents of the container having the path in the container parameter (e.g. c:\dir1\subdir3) (analogous to a Notify container action). An error is logged if the file manager is not found for launch, or if the container is invalid. Preferably, the compose command data is maintained to LBX History, a log, or other useful storage for subsequent use. |
| 247 | O | Composing a program object causes launch of a MS development environment application (e.g. Microsoft Visual Studio or IBM C-Set development consoles, etc), performing a search for the progobj parameter symbol, and producing search results of all occurrences for the current development working directory, mount point, or last used development repository. Preferably, the compose command data is maintained to LBX History, a log, or other useful storage for subsequent use. |

*Fig. 65B-6*

| Operand ↓ | PM | Preferred embodiment Compose processing |
|---|---|---|
| 249 | O | Composing a cursor causes invocation of the appropriate application (e.g. graphic application by file type embodiment .bmp, .ico, etc) at the MS as though the user manually launched the application for the cursor parameter, and is ready for save of the file, or for further editing, or for cancellation. Depending on the cursor parameter referenced, an appropriate application will be launched for graphics, animation, etc. The cursor parameter is preferably a fully qualified path to determine the cursor (e.g. file). Processing takes place as though the user manually launched the application for the specified file. The embodiment's file type preference will influence which application is to be launched. Preferably, the compose command data is maintained to LBX History, a log, or other useful storage for subsequent use. |
| 251 | S | Composing a calendar object causes interface to the calendar system for invoking the create calendar object interface and defaulting the appropriate calendar interface fields with the passed parameters. The calendar object parameter may be as described for Send calendar object, except for defaulting calendar interface create object interface(s). The user can subsequently create the scheduled event with little effort, or after optional modification, with a minimal action (e.g. click ok). Processing takes place as though the user manually launched the calendar application, entered the fields of the calendar form with passed parameters, and then is ready to decide what to do with it. Appropriate MS storage is updated and subsequently processed as though the user had manually started the calendar application and entered the calendar information manually. Preferably, the compose command data is maintained to LBX History, a historical call log (e.g. incoming), or other useful storage for subsequent use. A standard calendaring interface is preferably used. Attributes can be set as is customary for a calendar object. |
| 253 | S | Composing an address book (AB) object causes interface to the AB system for invoking the create AB object interface and defaulting the appropriate AB interface fields with the passed parameters. The AB object parameter may be as described for Send AB object, except for defaulting AB interface create object interface(s). The user can subsequently create the AB entry with little effort, or after optional modification, with a minimal action (e.g. click ok). Processing takes place as though the user manually launched the AB application, entered the fields of the AB form with passed parameters, and then is ready to decide what to do with it. Appropriate MS storage is updated and subsequently processed as though the user manually started the AB application and entered the AB information manually. Preferably, the compose command data is maintained to LBX History, a historical call log (e.g. incoming), or other useful storage for subsequent use. A standard AB interface is preferably used. Attributes can be set as may be customary for an AB entry. |
| . . . | | |

*Fig. 65B-7*

| Operand ↓ | PM | Preferred embodiment Connect processing |
|---|---|---|
| 201 | C | Connecting with an auto-dial # launches the MS phone number calling interface with the auto-dial # parameter defaulted for placing a call (like Notify autodial #). The call is actually made as though the user manually launched the dialing application, entered the auto-dial # and then chose to make the call with it. Appropriate MS storage is updated and subsequently processed as though the user had entered the # for calling manually and then made the call. Conventional call processing takes place thereafter. Preferably, the connect command data is maintained to LBX History, a historical call log (e.g. outgoing), or other useful storage for subsequent use. |
| 203 | S | Connecting with a web link launches a MS browser and invokes (transposes to) the link as though the user had entered it manually and went to the weblink page (like Notify weblink). In one embodiment, the weblink parameter includes URL parameter(s). In another embodiment, the params parameter supports a URL command string for appending to the weblink (e.g. "?v=yes&T=go") for customized web page processing. An alternate embodiment can fire form variables for active web page processing using the params parameter. Processing takes place as though the user manually launched the browser application, entered the weblink and then loaded the weblink webpage. Appropriate MS storage is updated and subsequently processed as though the user had entered the weblink in the browser manually. Preferably, the connect command data is maintained to LBX History, a historical log (web page load history), or other useful storage for subsequent use. |
| 205 | C | See Send Command for identical processing. |
| 207 | C | See Send Command for identical processing. |
| 209 | C | See Send Command for identical processing. |
| 211 | C | See Send Command for identical processing. |
| 213 | O | See Send Command for identical processing. |
| 215 | C | See Compose command for identical processing. |
| 217 | S | See Compose command for identical processing. |
| 219 | S | See Compose command for identical processing. |
| 221 | O | See Compose command for identical processing. |
| 223 | C | See Notify command for identical processing, except some applicable parameters not used. |
| 225 | O | See Compose command for identical processing. |
| 227 | O | See Compose command for identical processing. |
| 229 | O | See Compose command for identical processing. |
| 231 | C | See Compose command for identical processing. |
| 233 | S | See Compose command for identical processing. |
| 235 | O | See Compose command for identical processing. |

Fig. 66B-1

| Operand ↓ | PM | Preferred embodiment Connect processing |
|---|---|---|
| 237 | O | See Compose command for identical processing. |
| 239 | O | See Compose command for identical processing. |
| 241 | C | Connecting with an alert causes interfacing to the alert subsystem for instantly producing the alert at the MS. Preferably, the connect command data is maintained to LBX History, a log, or other useful storage for subsequent use. The alert parameter of Notify processing is identical. |
| 243 | O | See Compose command for identical processing. |
| 245 | S | See Compose command for identical processing. |
| 247 | O | See Notify command for identical processing. |
| 249 | O | See Notify command for identical processing. |
| 251 | C | See Send Command for identical processing. |
| 253 | C | See Send Command for identical processing. |
| . . . | | |

*Fig. 66B-2*

| Operand ↓ | PM | Preferred embodiment Find processing |
|---|---|---|
| 201 | C | Finding an auto-dial # launches a system (e.g. MS) phone number log interface with the auto-dial # parameter for searching. Preferably, both the outgoing and incoming logs are searched. The auto-dial # parameter can be a wildcard (pattern) for matching. In one embodiment, all matching occurrences found in history are presented with their date/time stamps, and perhaps other information, of the call and when it took place. In another embodiment, the most recent occurrence from a particular log is presented, and perhaps in an interface which enables calling the # with a minimal user action. The search takes place as though the user manually launched the search, entered the auto-dial # for the search, and then was presented with the result(s). Appropriate MS storage is updated and subsequently processed as though the user manually performed the search. Preferably, the find cmd data is maintained to LBX History, a historical log, or other useful storage for subsequent use. A new parameter can be specified for which log to search. |
| 203 | S | Finding a weblink launches a search to system (e.g. MS) browser history with the weblink parameter (and with the params parameter if specified) for searching. The weblink parameter can be a wildcard (pattern), and may include URL parameters, for matching. In one embodiment, all matching occurrences found in history are presented with their date/time stamps, and perhaps other information, of the link and when it was invoked. In another embodiment, the most recent occurrence from a particular invocation is presented, and perhaps in an interface which enables invoking (transposing to) the weblink with a minimal user action. In a preferred embodiment, the params parameter tells find processing how and where to search. The search takes place as though the user manually launched the search, entered the weblink for the search, and then was presented with the result(s). Appropriate MS storage is updated and subsequently processed as though the user had manually performed the search. Preferably, the find command data is maintained to LBX History, a historical log, or other useful storage for subsequent use. A new parameter can be specified for which folder to search. |

*Fig. 67B-1*

| Operand ↓ | PM | Preferred embodiment Find processing |
|---|---|---|
| 205 | C | Finding an email causes searching a system (e.g. MS) email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by seaching for substrings. All occurrences found in history are presented with at least their date/time stamps, subject line, sender and recipient, and perhaps other information, of the email and when it took place. In another embodiment, the most recent occurrence from searched folders is presented, and perhaps in an interface which enables appropriate MS email system processing from that point forward (e.g. when processed at local MS). Alternatively, an additional parameter indicates how to search. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-2*

| Operand ↓ | PM | Preferred embodiment Find processing |
|---|---|---|
| 207 | C | Finding an sms message causes searching a system (e.g. MS) sms messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In the preferred embodiment, all occurrences found in history are presented with at least their date/time stamps, message, sender and recipient, and perhaps other information, of the message and when it took place. In another embodiment, the most recent occurrence from searched folders is presented, and perhaps in an interface which enables appropriate MS messaging system processing from that point forward (e.g. when processed at local MS). Alternatively, an additional parameter indicates how to search. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-3*

| Operand ↓ | PM | Preferred embodiment Find processing |
|---|---|---|
| 209 | C | Finding a broadcast email causes searching a system (e.g. MS) email system with search criteria of the email param string. The email param string can specify searching any email fields for any values including wildcarding. Each field is referenced with a predefined name and associated with a search criteria. For example, the param of "subj:'personnel';recip:'george@alltell.com';body:'reduction in force'" searches emails with a subject containing "personnel" and sent to "george@alltell.com" and has an email body containing "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize useful syntaxes for searching any characteristics of email. Wildcarding (pattern matching) is preferably inherent by searching for substrings. In the preferred embodiment, all occurrences found in history are presented with at least their date/time stamps, subject line, sender and recipient, and perhaps other info, of the email and when it took place. In another embodiment, the most recent occurrence from searched folders is presented, and perhaps in an interface which enables appropriate MS email system processing from that point forward (e.g. when processed at local MS). Alternatively, an additional parameter indicates how to search. The search takes place as though the user manually launched the search, entered criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-4*

| Operand ↓ | PM | Preferred embodiment Find processing |
|---|---|---|
| 211 | C | Finding a broadcast sms message causes searching a system (e.g. MS) sms messaging system with search criteria of the sms message param string. The message param string can specify searching any message fields for any values including wildcarding. Each field is referenced with a predefined name and associated with a search criteria. For example, the sms message string of "recip:'2144034071@nextel.com,9725397137@lbxsrv.com';" causes searching messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize useful syntaxes for searching any characteristics of messages. Wildcarding (pattern matching) is preferably inherent by searching for substrings. In the preferred embodiment, all occurrences found in history are presented with at least their date/time stamps, message, sender and recipient, and perhaps other information, of the message and when it took place. In another embodiment, the most recent occurrence from searched folders is presented, and perhaps in an interface which enables appropriate MS messaging system processing from that point forward (e.g. when processed at local MS). Alternatively, an additional parameter indicates how to search. The search takes place as though the user manually launched the search, entered search criteria, and then was presented with result(s). Appropriate MS storage is updated and processed as though the user manually performed the search. Preferably, find cmd data is maintained to LBX History, a historical log, or other useful storage for later use. |
| 213 | O | Finding an indicator searches appropriate system (e.g. MS) storage for the indicator (e.g. storage/memory used for indicators by other commands). The indicator parameter string specifies the indicator (e.g. string) being sought and wildcarding is supported. Any active user interface object containing the indicator is surfaced. If more than one user interface object contains the indicator, then all objects are appropriately tiled with the most recent in the priority position(s). In another embodiment, appropriate MS storage/memory which contains the history of indicators sent is searched and all occurrences found in history are presented with at least their date/time stamps, the indicator, and perhaps other information. In yet another embodiment, a new parameter tells processing whether to surface/prioritize active objects, or to search history for when indicators were sent. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-5*

| Operand ↓ | PM | Preferred embodiment Find processing |
|---|---|---|
| 215 | C | Finding an application causes searching the system (e.g. MS) for the application (and with the params parameter if specified). The app parameter is preferably an executable name, optionally with parameters that were passed. Providing a partial or full path to the application parameter will validate that it is found there. The app parameter string preferably supports wildcarding. Embodiments (or as specified with params and/or new parameters) include file system searching, invocation history (e.g. Microsoft Windows up/down arrow command line recall) searching for what had been invoked (perhaps within a trailing time period), what is currently running, what has been terminated (perhaps within a trailing time period), or any of these for a particular invoked identity, credentials, or owner, In the preferred embodiment, all occurrences found on the MS and their paths are presented to the user with at least their date/time stamps, size, and perhaps attributes information. In another embodiment, all parts which are linked to the executable are identified with their paths, date/time stamps, size, and perhaps attributes when a symbol file is specified with a new parameter. The symbol file is output from a link process and can be used to identify all executable parts such as dynamic link libraries, linked binaries, and any other executable binary file involved with the application. The search takes place as though the user manually launched the search, entered the criteria for the search, and then was presented with the result(s). Appropriate MS storage is updated and processed as though the user had manually performed the search. Preferably, find command data is maintained to LBX History, a historical log, or other useful storage for subsequent use. |
| 217 | S | Finding a document causes searching the system (e.g. MS) for the document. The doc parameter is a document name. The document parameter can be a wildcard (pattern) for matching. Providing a partial or full path to the document name will validate that it is found there. In the preferred embodiment, all occurrences found on the MS and their paths are presented to the user with at least their date/time stamps, size, and perhaps attributes information. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 219 | S | Finding a file causes searching the system (e.g. MS) for the file. The path parameter is a file name. Providing a partial or full path to the file will validate that it is found there. The path parameter can be a wildcard (pattern) for matching. In the preferred embodiment, all occurrences found on the MS and their paths are presented to the user with at least their date/time stamps, size, and perhaps attributes information. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for |

Fig. 67B-6

| Operand ↓ | PM | Preferred embodiment Find processing |
|---|---|---|
| | | subsequent use. |
| 221 | O | Finding content causes searching the system (e.g. MS) for the content. The content parameter can be a wildcard (pattern) for matching. The content parameter can be a handle to the content, or a search criteria for the content. In the preferred embodiment, all occurrences found on the MS and where the content is located is presented to the user, perhaps with other content description information. The search takes place as though the user manually launched the search, entered the criteria for the search, and then was presented with the result(s). There are various embodiments for how and where content is maintained. Appropriate MS storage is updated and subsequently processed as though the user had manually performed the search. Preferably, the find command data is maintained to LBX History, a historical log, or other useful storage for subsequent use. |
| 223 | C | Finding a DB object causes searching the system (e.g. MS) database(s) for the database object. The database object parameter is provided with a variety of syntaxes depending on the type of database object sought. For example, the DB-obj parameters is "T:tablename" to seek a table, "S:schemaname" to seek a particular schema, "C:columnname" to seek a particular column name, "D:DBname" to seek a particular DB name, "R:rolename" to seek a particular role set, "P:procname" to search for particular stored procedure, etc. There are unique syntaxes for every type of DB object being sought. Those skilled in the art know how to query system tables for particular DB object(s) sought. An appropriate SQL client API should be used. If necessary, an additional parameter is specified for authentication credentials (may be specified with DB-obj string syntax). The search criteria can be a wildcard (pattern) for matching. In the preferred embodiment, all occurrences found on the MS and information about the occurrence is presented to the user. The search takes place as though the user manually launched the search, entered the criteria or query for the search, and then was presented with the result(s). Appropriate MS storage is updated and subsequently processed as though the user had manually performed the search. Preferably, the find command data is maintained to LBX History, a historical log, or other useful storage for subsequent use. |

Fig. 67B-7

| Operand ↓ | PM | Preferred embodiment Find processing |
|---|---|---|
| 225 | O | Finding data causes searching the system (e.g. MS) for the data. In the preferred embodiment, the data is a global system variable visible to processes of a MS O/S. In other embodiments, the data may have limited scope which is made accessible to present disclosure processing (e.g. with extern). Depending on the embodiment, data may be that which is contained in a program data segment, stack segment, and/or extra segment. There can be unique syntaxes for specifying which type of data is being sought (e.g. "S:dataname"). The search criteria can be a wildcard (pattern) for matching. In the preferred embodiment, all occurrences found on the MS and information about the occurrence including its current value is presented to the user. In one embodiment, a well known location of link symbol information files are consulted, and in another embodiment a new parameter specifies where to look, or which symbol file of information to use. An AppTerm uses record 5300 for access. The search takes place as though the user manually launched the search, entered the criteria for the search, and then was presented with the result(s). Appropriate MS storage is updated and subsequently processed as though the user had manually performed the search. Preferably, find command data is maintained to LBX History, a historical log, or other useful storage for later use. |
| 227 | O | Finding a semaphore causes reading the current value of the semaphore at the system (e.g. MS) where the find command action is being executed and then presenting the current value along with any other useful information for the semaphore. The semaphore param can be a wildcard (pattern) for matching. In the preferred embodiment, the semaphore is a global system semaphore visible to all processes of a MS operating system. In other embodiments, the semaphore may have limited scope which is made accessible to present disclosure processing. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 229 | S | Finding a directory causes searching the system (e.g. MS) for the directory (path). The path parameter is a directory name. Providing a more defined partial or full path to the path parameter will narrow down the results if the directory exists in more than one place. The path parameter can be a wildcard (pattern) for matching. In the preferred embodiment, all occurrences found on the MS and their paths are presented to the user with at least their date/time stamps, size, and perhaps attributes information. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-8*

| Operand ↓ | PM | Preferred embodiment Find processing |
|---|---|---|
| 231 | C | Finding an application context causes invocation of the application at the system (e.g. MS) and then executing a macro within the application context (similar to Compose app object processing). The app parameter is preferably a fully qualified path name to the executable to start. In another embodiment, the app parameter is indirect: a path name to a "shortcut" (like a MS Windows shortcut). In another embodiment, the app parameter is an identifier string for the underlying operating system to know which application to start. The search criteria can be a wildcard (pattern) for matching. The macro parameter is preferably a file, or path, or accessible variable name containing a set of keystrokes that can be directed to standard/user-interface input. In another embodiment, the macro parameter is a prerecorded user input scenario (for play after application launched -- pulldown selections, mouse droppings, clicks, etc) captured to a file or stored in an accessible variable name. Preferably, the compose command data is maintained to LBX History, a log, or other useful storage for subsequent use. |
| 233 | S | Finding a user interface object causes finding and focusing the user interface object at the system (e.g. MS) which contains the object text (objtxt) parameter. In a preferred embodiment, there is a unique syntax for which places of user interface objects that are currently active are to be search (e.g. title bar, entry fields, radio button options, window text, combinations thereof, etc). The search criteria can be a wildcard (pattern) for matching. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 235 | O | Finding user interface control causes searching the system (e.g. MS) storage and/or memory which was used for processing another command (e.g. Compose) to redirect the keystroke macro to standard input of the MS as if it were entered by the MS user. The search criteria can be a wildcard (pattern) for matching. The macro parameter is the same as was used by the command and is to be matched. In the preferred embodiment, presented in the search results are all occurrences of previous command actions, which used the macro at the MS, including the command, date/time stamp, and other information recorded (e.g. to LBX History, a historical log, or other useful storage for subsequent use). The search takes place as though the user manually launched a search, entered the criteria for the search, and then was presented with the result(s). Appropriate MS storage is updated and subsequently processed as though the user had manually performed the search. Preferably, the find command data is maintained to LBX History, historical log, or other useful storage for subsequent use. |

*Fig. 67B-9*

| Operand ↓ | PM | Preferred embodiment Find processing |
|---|---|---|
| 237 | O | Finding input causes searching the system (e.g. MS) storage and/or memory which was used for processing another command (e.g. Compose) to redirect the input to the iodev device of the MS. The iodev and input parameters are the same as was used by a previous command and is to be matched. The search criteria can be a wildcard (pattern) for matching. In the preferred embodiment, presented in the search results are all occurrences of previous command actions, which used the iodev and input at the MS, including the command, date/time stamp, and other information recorded (e.g. to LBX History, a historical log, or other useful storage for subsequent use). The search takes place as though the user manually launched a search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 239 | O | Finding output causes searching the system (e.g. MS) storage and/or memory which was used for processing another command (e.g. Compose) to redirect the output to the iodev device of the MS. The search criteria can be a wildcard (pattern) for matching. The iodev and output parameters are the same as was used by a previous command and is to be matched. In the preferred embodiment, presented in the search results are all occurrences of previous command actions, which used the iodev and output at the MS, including the command, date/time stamp, and other information recorded (e.g. to LBX History, a historical log, or other useful storage for subsequent use). The search takes place as though the user manually launched a search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 241 | S | Finding an alert causes searching the system (e.g. MS) for the alert. The alert parameter is the same parameter used to generate an alert (e.g. using another command). In the preferred embodiment, all occurrences found on the MS which is associated to the alerter application in use at the MS, and which is used for other commands disclosed, are presented to the user with at least their date/time stamps, and perhaps other information. The search takes place as though the user manually launched the search, entered the criteria for the search, and then was presented with the result(s). The search criteria can be a wildcard (pattern) for matching. Appropriate MS storage is updated and subsequently processed as though the user had manually performed the search. Preferably, the find command data is maintained to LBX History, a historical log, or other useful storage for subsequent use. |

*Fig. 67B-10*

<table>
<tr><th>Operand ↓</th><th>PM</th><th>Preferred embodiment Find processing</th></tr>
<tr><td>243</td><td>O</td><td>Finding a process causes finding all process names running at the system (e.g. MS) which contain the prname string parameter (e.g. in UNIX: "ps -ef | grep prname"). In the preferred embodiment, all occurrences found running at the MS are presented with interesting programmatic information such as when started, its size, etc (see UNIX ps command for other information that can be presented here in various embodiments; an additional parameter (like ps parameters) can specify what info to provide to the user). The search takes place as though the user manually launched the search, entered the criteria for the search, and then was presented with the result(s). Appropriate MS storage is updated and subsequently processed as though the user had manually performed the search. Preferably, the find command data is maintained to LBX History, historical log, or other useful storage for subsequent use.</td></tr>
<tr><td>245</td><td>S</td><td>Finding a container causes searching the system (e.g. MS) for the container. The container parameter is a container name (e.g. file system directory) depending on the MS or environment. Unique syntaxes can be used for which type of container is being searched. In the preferred embodiment, all occurrences found on the MS and their paths are presented to the user with information of interest. The search criteria can be a wildcard (pattern) for matching. The search takes place as though the user manually launched the search, entered the criteria for the search, and then was presented with the result(s). Appropriate MS storage is updated and subsequently processed as though the user had manually performed the search. Preferably, the find command data is maintained to LBX History, historical log, or other useful storage for subsequent use.</td></tr>
<tr><td>247</td><td>O</td><td>Finding a program object causes searching the system (e.g. MS) for the program object. In the preferred embodiment, a unique syntax is used for which type of program object is being sought (e.g. Q:queuename has a queue qualifier prefix). There can be unique syntaxes for specifying which type of program object is being sought (e.g. "S:dataname"). In the preferred embodiment, all occurrences found on the MS and information about the occurrence including its current value is presented to the user. A null data parameter returns all occurrences found. A non-null data parameter returns these objects having the data value. Objects must be programmatically accessible. In one embodiment, a well known location of link symbol information files are consulted, and in another embodiment a new parameter specifies where to look, or which symbol file of information to use. In another embodiment, MS storage and/or memory is searched which recorded a previous atomic command action, and the search takes place for a previous command(s) (e.g. Notify) for when performed and what was performed. The search criteria can be a wildcard (pattern) for matching. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use.</td></tr>
</table>

*Fig. 67B-11*

| Operand ↓ | PM | Preferred embodiment Find processing |
|---|---|---|
| 249 | O | Finding a cursor causes searching the system (e.g. MS) storage and/or memory which was used for processing another command (e.g. Compose) to view or alter a cursor. In the preferred embodiment, presented in the search results are all occurrences of previous command actions, which viewed or altered the cursor at the MS, including the command, date/time stamp, and other information recorded (e.g. to LBX History, a historical log, or other useful storage for subsequent use). The search criteria can be a wildcard (pattern) for matching. The search takes place as though the user manually launched a search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| 251 | C | Finding a calendar object causes searching a system (e.g. MS) calendar system with search criteria of the calendar object parameter string. The calendar object parameter string can specify searching any calendar entry fields for any values including wildcarding. Each field is referenced with a predefined name and then associated with a search criteria (similar to email above). Those skilled in the art recognize useful syntaxes for searching any characteristics of calendar objects with an appropriate syntax. The calendar object parameter is at least a string with a syntax for querying any combination of calendar object fields. In the preferred embodiment, all occurrences found in history are presented with at least their date/time stamps, attendees, and perhaps other information, of the calendar object and when it was scheduled. In another embodiment, the most recent occurrence from the calendaring system is presented, and perhaps in an interface which enables appropriate MS calendar system processing from that point forward (e.g. when processed at local MS), or alternatively an additional parameter can specify how to search. Wildcarding (pattern matching) is preferably inherent by searching for substrings. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |

*Fig. 67B-12*

| Operand ↓ | PM | Preferred embodiment Find processing |
|---|---|---|
| 253 | C | Finding an address book (AB) object causes searching a system (e.g. MS) AB system with search criteria of the AB object parameter string. The AB object parameter string can specify searching any AB entry fields for any values including wildcarding. Each field is referenced with a predefined name and then associated with a search criteria (similar to email above). Those skilled in the art recognize many useful syntaxes for searching any characteristics of AB objects/entries with an appropriate syntax. The AB object parameter is at least a string with a syntax for querying any combination of AB object fields. In the preferred embodiment, all occurrences found are presented with appropriate AB information. In another embodiment, the most recent occurrence from the AB system is presented, and perhaps in an interface which enables appropriate MS AB system processing from that point forward (e.g. when processed at local MS), or alternatively an additional parameter can specify how to search. Wildcarding (pattern matching) is preferably inherent by searching for substrings. The search takes place as though the user manually launched the search, entered the criteria for the search, and then was presented with the result(s). Appropriate MS storage is updated and subsequently processed as though the user had manually performed the search. Preferably, the find command data is maintained to LBX History, a historical log, or other useful storage for subsequent use. |
| . . . | | |

*Fig. 67B-13*

| Operand ↓ | PM | Preferred embodiment Invoke processing |
|---|---|---|
| 201 | C | Invoking with an auto-dial # launches the MS phone number calling interface at the MS (local or remote) with the auto-dial # parameter for placing a call (like/see Notify / Connect autodial # processing). The call is actually made as though a user manually launched the dialing application at the particular MS, entered the auto-dial # and then chose to make the call with it. Appropriate MS storage is updated and subsequently processed as though the user had entered the # for calling manually, and then make the call. Conventional call processing takes place thereafter. Preferably, the invoke command data is maintained to LBX History, a historical call log (e.g. outgoing), or other useful storage for subsequent use. A system parameter provides means for placing the call from another system (e.g. another MS) – like a Host specification. |
| 203 | S | Invoking with a web link launches the MS browser at the particular MS and invokes (transposes to) the link as though the user had entered it manually and went to the weblink page (like/see Notify / Connect weblink processing). In one embodiment, the weblink parameter includes URL parameter(s). In another embodiment, the params parameter supports a URL command string for appending to the weblink (e.g. "?v=yes&T=go") for customized web page processing. An alternate embodiment can fire form variables for active web page processing using the params parameter, or URL parameter(s). Processing takes place as though the user manually launched the browser application at the particular MS, entered the weblink and then loaded the weblink webpage. Appropriate MS storage is updated and subsequently processed as though the user had entered and invoked the weblink in the browser manually. Preferably, the compose command data is maintained to LBX History, a historical log (web page load history), or other useful storage for subsequent use. |
| 205 | E | See Send Command for identical processing. |
| 207 | E | See Send Command for identical processing. |
| 209 | E | See Send Command for identical processing. |
| 211 | E | See Send Command for identical processing. |

*Fig. 68B-1*

| Operand ↓ | PM | Preferred embodiment Invoke processing |
|---|---|---|
| 213 | O | Invoking an indicator updates the appropriate MS storage so that the currently focused user interface object (e.g. window titlebar) of the particular MS user interface is modified with the indicator (like/see Send indicator processing). If there are no active user interface objects in the MS user interface, then an appropriate alert area of the currently focused interface is to display the indicator. The user can clear (remove) the indicator when desired. Preferably, the indicator is used for modifying other focused objects (e.g. titlebars) or other focused areas in the user interface so as to not get overlooked. For example, as the user navigates and surfaces/focuses new user interface objects, the indicator remains visible on the newly focused object. Preferably, the indicator is selectable by the user of the MS for showing all other send command parameters associated, as well as a date/time stamp of when sent. In other embodiments, the most recently displayed indicator is displayed in the appropriate focused area, but the user can conveniently select any indicators which were sent in history at some point in time for sought indicator information by selecting the currently displayed indicator and then requesting to browse/scroll history of previously delivered indicators (with options to see details). Preferably, the invoke command data is maintained to LBX History, a historical log (web page load history), or other useful storage for subsequent use. |
| 215 | C | Invoking an application causes invocation of the application at the particular MS (like/see Send app processing). The app parameter is preferably a fully qualified path name to the executable to start, and may already include parameters. In another embodiment, the app parameter is indirect: a path name to a "shortcut" (like a MS Windows shortcut). In another embodiment, the app parameter is an identifier string for the underlying operating system to know which application to start. The params parameter may specify the executable parameters, or may be used for how to start the application (like attributes of Send app processing). An error is logged if the app parameter is not found for launch. Preferably, the invoke command data is maintained to LBX History, a historical log (web page load history), or other useful storage for subsequent use. |
| 217 | S | Invoking a document causes invocation of an appropriate application at the particular MS in accordance with the object type as though the user selected the document for automatically being associated to the correct application when opening the document. The user can then decide what to do with the document once it is opened in the appropriate application. In an alternate embodiment, an additional parameter is provided for exactly what to do with the document, in which case an appropriate API is invoked with the document (i.e. PM = C). The doc parameter is preferably a fully qualified path name to the document. Preferably, the invoke command data is maintained to LBX History, a log, or other useful storage for subsequent use. |

*Fig. 68B-2*

| Operand ↓ | PM | Preferred embodiment Invoke processing |
|---|---|---|
| 219 | S | Invoking a file causes invocation of an appropriate application at the particular MS in accordance with the file type as though the user selected the file for automatically being associated to the correct application when opening the document. Processing takes place as though the user manually launched the application for the specified file. The user can then decide what to do with the file once it is opened in the appropriate application. In an alternate embodiment, an additional parameter is provided for exactly what to do with the file, in which case an appropriate API is invoked with the file (i.e. PM = C). The path parameter is preferably a fully qualified path name to the file. Preferably, the invoke command data is maintained to LBX History, a log, or other useful storage for subsequent use. |
| 221 | O | Invoking content causes the content to be presented at the particular MS in a manner which is appropriate for the content type (like/see Notify content processing). The content parameter is one that cannot be classified in the other operands, but is content for presentation nevertheless. Examples include special data records (e.g. extern variable name), content data memory locations (e.g. programmatic variable), or files containing a customizably processed format. Methods of displaying the content include audio and/or visual using applicable MS capabilities. Preferably, the invoke command data is maintained to LBX History, a historical content log (e.g. incoming), browser history data, or other useful storage for subsequent user browse of the accompanying content and a date/time stamp of when sent, and for presentation of the content. Various embodiments will save to LBX History how many times, and when, the content was presented. |
| 223 | O | Invoking a Database (DB) object causes the DB object (i.e. qualified database with access query string) to be modified with the query parameter at the particular MS (like/see Notify DB-obj processing without certain parameters). The query parameter is used to perform any query against the specified DB-database (DB-obj), preferably a query that only returns a return code. Fig. 75B processing may return SELECT results in some embodiments (like find results returned). Preferably, the invoke command data is maintained to LBX History, a database log (e.g. incoming), or other useful storage for subsequent query use and a date/time stamp of when sent, and for DB query manager browse/use of the query in response to an applicable user action. |
| 225 | O | Invoking data causes modifying the value of the data at the particular MS (i.e. set data to value – like/see Notify data processing without certain parameters). An error can result if the data is not resolvable for the attempt. In the preferred embodiment, the data is a global system variable visible to all processes of a MS operating system. In other embodiments, the data may have limited scope which is made accessible to present disclosure processing (e.g. with extern). A recognized AppTerm causes access to record 5300 for proper semaphore synchronized access. Preferably, the data affected is maintained to LBX History, a historical log (e.g. incoming), or other useful storage for subsequent user browse, or programmatic access, of the data variable name, its before and after values & date/time stamp of sent, and for presentation of the data value for a user action to show it. |

*Fig. 68B-3*

| Operand ↓ | PM | Preferred embodiment Invoke processing |
|---|---|---|
| 227 | O | Invoking a semaphore causes modifying the value of the semaphore at the particular MS where the action is being executed (like/see Notify semaphore processing). In the preferred embodiment, the semaphore is a global system semaphore visible to all processes of a MS operating system. In other embodiments, the semaphore may have limited scope which is made accessible to present disclosure processing (e.g. RAM semaphore). Preferably, the semaphore value before and after setting is maintained to LBX History, a historical log (e.g. incoming), or other useful storage for subsequent user browse, or programmatic access, and for presentation of the semaphore information in response to a user action to show it. |
| 229 | S | See Compose Command for identical processing, except processing may take place locally and/or at privilege-providing remote MS(s) (system(s) parameter). |
| 231 | C | See Compose Command for identical processing, except processing may take place locally and/or at privilege-providing remote MS(s) (system(s) parameter). |
| 233 | S | See Compose Command for identical processing, except processing may take place locally and/or at privilege-providing remote MS(s) (system(s) parameter). Also, the cmds parameter replaces the "capture focused object" command string with one or more semicolon delimited "capture focused object" command strings for each target system in the system(s) parameters. This enables a plurality of different types of MSs to participate even though they have different commands (e.g. keystroke capture actions) to accomplish capturing the focused user interface object. Based on the file type at the particular MS, the appropriate application opens the file. |
| 235 | O | See Compose Command for identical processing, except processing may take place locally and/or at privilege-providing remote MS(s) (system(s) parameter). |
| 237 | O | See Compose Command for identical processing, except processing may take place locally and/or at privilege-providing remote MS(s) (system(s) parameter). |
| 239 | O | See Compose Command for identical processing, except processing may take place locally and/or at privilege-providing remote MS(s) (system(s) parameter). |
| 241 | C | See Connect Command for identical processing, except processing may take place locally and/or at privilege-providing remote MS(s) (system(s) parameter). |
| 243 | O | See Compose Command for identical processing, except processing may take place locally and/or at privilege-providing remote MS(s) (system(s) parameter). |
| 245 | S | See Compose Command for identical processing, except processing may take place locally and/or at privilege-providing remote MS(s) (system(s) parameter). |
| 247 | O | See Notify Command for identical processing, except sender is forced to requesting MS, no documentary subj/msg parameter, and system(s) used instead of recipient(s). Processing may take place locally and/or at privilege-providing remote MS(s) (system(s) parameter). |

*Fig. 68B-4*

| Operand ↓ | PM | Preferred embodiment Invoke processing |
|---|---|---|
| 249 | O | See Notify Command for identical processing, except sender is forced to requesting MS, no documentary subj/msg parameter, and system(s) used instead of recipient(s). Processing may take place locally and/or at privilege-providing remote MS(s) (system(s) parameter). |
| 251 | O | See Send Command for identical processing, except sender is forced to requesting MS, and system(s) used instead of recipient(s) for calendar alteration without regard for the owner (API embodiment). Processing may take place locally and/or at privilege-providing remote MS(s) (system(s) parameter). |
| 253 | O | See Send Command for identical processing, except sender is forced to requesting MS, and system(s) used instead of recipient(s) for AB alteration without regard for the owner (API embodiment). Processing may take place locally and/or at privilege-providing remote MS(s) (system(s) parameter). |
| . . . | | |

*Fig. 68B-5*

| Operand ↓ | PM | Preferred embodiment Copy processing |
|---|---|---|
| 201 | C | Copying an auto-dial # launches a phone number log interface with the auto-dial # parameter (can be wildcarded) for searching the source system. Preferably, both the outgoing and incoming logs are searched. In an alternate embodiment, the log is specified with a parameter. In the preferred embodiment, the most recent occurrence from a particular log is provided. In another embodiment, all occurrences found in history are presented with their date/time stamps, and perhaps other information, of the call and when it took place (e.g. when the ack parameter is set) and the user browses the results prior to accepting the copy of multiple items. The search takes place as though the user manually launched the search, entered the auto-dial # for the search, and then was provided with result(s) for the copy. Preferably, the copy shall take place if there are no ambiguities (e.g. more than one phone number returned per search criteria). An additional parameter may be specified for the target (different log) of the copy, otherwise the object is copied to an assumed location (e.g. same folder to more recent position). Appropriate MS storage is updated and subsequently processed as though the user manually performed the search and copy of the result. Preferably, the copy cmd data is maintained to LBX History, a historical log, or other useful storage for subsequent use. The copy is made to system(s) logs, preferably with identifying information of the source and who did the copy. |
| 203 | C | Copying a weblink launches a search to MS browser history with the weblink parameter (can be wildcarded) for searching the source system. In one embodiment, all occurrences found in history are presented with their date/time stamps, and perhaps other information, of the link and when it was invoked (e.g. when the ack parameter is specified to true) for presentation to the user prior to doing the copy. In the preferred embodiment, the most recent occurrence from a particular invocation is provided for the copy. An additional parameter may be specified for the target (specified favorites folder), otherwise the object is copied to an assumed location (e.g. highest level favorites folder or special named folder).The search takes place as though the user manually launched the search, entered the weblink for the search, and then was provided with the result for copying it. Appropriate MS storage is updated and subsequently processed as though the user had manually performed the search and copy of the result. Preferably, the copy command data is maintained to LBX History, a historical log, or other useful storage for subsequent use. The copy is made to a special browser favorites folder, or another designated folder configured ahead of time, preferably with identifying information of the source and who did the copy. |

*Fig. 69B-1*

| Operand ↓ | PM | Preferred embodiment Copy processing |
|---|---|---|
| 205 | C | Copying an email causes searching the source email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In a preferred embodiment, the most recent occurrence from searched folders is provided for the copy. An additional parameter may be specified for the target (specified folder), otherwise the object is copied to an assumed location (e.g. drafts, inbox, or special named folder). The search takes place as though the user manually launched the search, entered the criteria for the search, and then was provided with the result for doing the copy. Appropriate MS storage is updated and subsequently processed as though the user had manually performed the search and copy. Preferably, the copy command data is maintained to LBX History, a historical log, or other useful storage for subsequent use. The copy is made to a special email folder of the target system, or another designated folder configured ahead of time, or as specified with a new parameter for copy processing, preferably with identifying information of the source and who did the copy (if supported in email application). |

*Fig. 69B-2*

| Operand ↓ | PM | Preferred embodiment Copy processing |
|---|---|---|
| 207 | C | Copying an sms message causes searching the source messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In a preferred embodiment, the most recent occurrence from searched folders is provided for copying. An additional parameter may be specified for the target (specified folder), otherwise the object is copied to an assumed location (e.g. inbox, drafts, special named folder). The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The copy is made to a special messaging folder of the target system, or another designated folder configured ahead of time, or as specified with a new parameter to copy processing, preferably with identifying information of the source and who did the copy. |

*Fig. 69B-3*

| Operand ↓ | PM | Preferred embodiment Copy processing |
|---|---|---|
| 209 | C | Copying a broadcast email causes searching the source email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In a preferred embodiment, the most recent occurrence from searched folders is provided for the copy. An additional parameter may be specified for the target (specified folder), otherwise the object is copied to an assumed location (e.g. inbox, drafts, special named folder). The search takes place as though the user manually launched the search, entered the criteria for the search, and then was provided with the result for doing the copy. Appropriate MS storage is updated and subsequently processed as though the user had manually performed the search and copy. Preferably, the copy command data is maintained to LBX History, a historical log, or other useful storage for subsequent use. The copy is made to a special email folder of the target system, or another designated folder configured ahead of time, or as specified with a new parameter to copy processing, preferably with identifying information of the source and who did the copy. |

*Fig. 69B-4*

| Operand ↓ | PM | Preferred embodiment Copy processing |
|---|---|---|
| 211 | C | Copying a broadcast sms msg causes searching the source messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In a preferred embodiment, the most recent occurrence from searched folders is provided for copying. An additional parameter may be specified for the target (specified folder), otherwise the object is copied to an assumed location (e.g. inbox, drafts, special named folder). The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The copy is made to a special messaging folder of the target system, or another designated folder configured ahead of time, or as specified with a new parameter to copy processing, preferably with identifying information of the source and who did the copy. |
| 213 | C | Copying an indicator searches appropriate source storage for the indicator (e.g. storage/memory used for indicators by other commands). The indicator parameter string specifies the indicator string being sought and wildcarding is supported. In one embodiment, appropriate MS storage/memory which contains the history of indicators sent to the source system is searched and all occurrences found in history are presented with at least their date/time stamps, the indicator, and perhaps other information, for user reconciliation at block 6942. In a preferred embodiment, the most recently delivered indicator is identified and used for the copy. The search takes place as though the user manually launched the search, entered the criteria for the search, and then was provided with the result for the copy. Appropriate MS storage is updated and subsequently processed as though the user had manually performed the search and copy. Preferably, the copy command data is maintained to LBX History, a historical log, or other useful storage for subsequent use. The copy is made so that the target system(s) are delivered the indicator(s) like delivering a new indicator for presentation. |

*Fig. 69B-5*

| Operand ↓ | PM | Preferred embodiment Copy processing |
|---|---|---|
| 215 | C | Copying an application causes searching the source system for the application (and with the params parameter(s) if specified to get the params specified invocation of the application). The app parameter is preferably an executable name and may contain parameters that were passed. Providing a more defined partial or full path to the application parameter will limit the search result. The app parameter string preferably supports wildcarding. In one embodiment, all occurrences found at the source and their paths are presented to the user with at least their date/time stamps, size, and perhaps attributes information, for user reconciliation at block 6942. In a preferred embodiment, the most recently executed instance of the matching application is determined for the copy. In one embodiment, the application itself is copied to the target systems, perhaps as directed by an additional parameter (e.g. directory location). In another embodiment, the executable path to run the application is placed into execution history at the system(s) so that a user can run it, albeit from a remote system (assumption that application available for running there already). The search takes place as though the user manually launched the search, entered the criteria for the search, and then was provided with the result for copy. Appropriate MS storage is updated and subsequently processed as though the user had manually performed the search and copy. Preferably, the copy command data is maintained to LBX History, a historical log, or other useful storage for subsequent use. |
| 217 | C | Copying a document causes searching the source for the document. The doc parameter is a document name. The document parameter can be a wildcard (pattern) for matching. Providing a more defined partial or full path to the document name will narrow the search. In one embodiment, all occurrences found on the MS and their paths are presented to the user with at least their date/time stamps, size, and perhaps attributes information, for reconciliation at block 6942. In a preferred embodiment, the most recently accessed search result is provided for the copy. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. Copying the document places a copy to each target system at a special shared folder, or configured folder for sharing, or as specified with a new destination parameter to copy processing. |

*Fig. 69B-6*

| Operand ↓ | PM | Preferred embodiment Copy processing |
|---|---|---|
| 219 | C | Copying a file causes searching the source path for the file. The path parameter is a file name. Providing a more defined partial or full path to the file will narrow the search result. The path parameter can be a wildcard (pattern) for matching. In one embodiment, all occurrences found on the MS and their paths are provided with at least their date/time stamps, size, and perhaps attributes information, for reconciliation at block 6942. In a preferred embodiment, the most recently accessed file meeting the search criteria is copied to the target systems. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. In one embodiment, the copy results in overwriting an existing file with the same handle (e.g. name). In another embodiment, the copy results in writing a newly altered name of the file when there is an existing file with the same handle (e.g. name). An additional parameter may be specified for the target (specified folder), otherwise the object is copied to an assumed location. |
| 221 | O | Copying content causes searching the source for the content. The content parameter is a reference to the content. The content parameter can be a wildcard (pattern) for matching. In a preferred embodiment, the most recently accessed search result is provided for the copy. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. Copying the content places a copy to each target system at a special shared destination, or configured destination for sharing, or as specified with a new parameter to copy processing. |

Fig. 69B-7

| Operand ↓ | PM | Preferred embodiment Copy processing |
|---|---|---|
| 223 | O | Copying a DB object causes searching the source for the database object value. The database object parameter is provided with a variety of syntaxes depending on the type of database object sought. For example, the DB-obj parameters is "T:tablename" to seek a table, "S:schemaname" to seek a particular schema, "C:columnname" to seek a particular column name, "D:DBname" to seek a particular DB name, "R:rolename" to seek a particular role set, "P:procname" to search for particular stored procedure, etc. There are unique syntaxes for every type of DB object being sought which maps to an appropriate SQL system tables query. The search criteria can be a wildcard (pattern) for matching. In one embodiment, all occurrences found on the source system and information about the occurrence is presented to the user for reconciliation at block 6942. In other embodiments, the best (e.g. most recently accessed) fit database object is identified for use in the copy, or a new parameter indicating how to search. The search takes place as though the user manually launched the search, entered the criteria or query for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The value of the DB object is copied to the value of the DB object with the same name and type at the destination system(s). If not found at a target system, then no action is performed at that system. Copying a database object copies the value to the same database object(s) at other system(s), or creates new copies of the DB objects there when names do not match. Copying a DB object is intended to keep DBs in synch in some uses. Value(s) are overwritten. An additional parameter may be specified for the target of the copy (e.g. schema path which may include credentials for authentication). |

*Fig. 69B-8*

| Operand ↓ | PM | Preferred embodiment Copy processing |
|---|---|---|
| 225 | O | Copying data causes searching the source system for the data. In the preferred embodiment, the data is a global system variable visible to all processes of a MS operating system. In other embodiments, the data may have limited scope which is made accessible to present disclosure processing (e.g. with extern). Depending on the embodiment, data may be that which is contained in a program data segment, stack segment, and/or extra segment. There can be unique syntaxes for specifying which type of data is being sought (e.g. "S:dataname" for data parameter). The search criteria can be a wildcard (pattern) for matching. In the preferred embodiment, a well known location of link symbol information files are consulted, and in another embodiment a new parameter specifies where to look, or which symbol file of information to use. A recognized AppTerm causes access to record 5300 for proper semaphore synchronized access. In one embodiment, all occurrences found at the source system and information about the occurrence including its current value is presented to the user for reconciliation at block 6942. In a preferred embodiment, the best data value (e.g. most recently accessed if more than one matches) is provided for the copy. The search takes place as though the user manually launched the search, entered the criteria for the search, and then was provided with result for copying it. Appropriate MS storage is updated and subsequently processed as though the user had manually performed the search and copy. Preferably, the copy command data is maintained to LBX History, a historical log, or other useful storage for subsequent use. The value of the copied data is copied to the data with the same name and type at the destination system(s). If not found at a target system, then no action is performed at that system, or an error is provided. Copying a data object copies the value to the same data object(s) at other system(s). Copying is intended to keep data in synch between systems in some uses. Value(s) are overwritten. An additional parameter may be specified for the target data name of the copy. |
| 227 | O | Copying a semaphore causes reading the current value of the semaphore at the source where the copy command action is being executed and then copying the current value to the same semaphore names at the target system(s). The semaphore param can be a wildcard (pattern) for matching. In the preferred embodiment, the semaphore is a global system semaphore visible to all processes of a MS operating system. In other embodiments, the semaphore may have limited scope which is made accessible to present disclosure processing. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The value (set or cleared) of the copied semaphore is copied to the semaphore with the same name and type at the destination system(s). If not found at a target system, then no action is performed at that system, or an error is provided. Copying a semaphore copies the value to the same semaphore at other system(s). Copying a semaphore is intended to keep systems in synch in some uses. Value(s) are overwritten. An additional parameter may be specified for the target sem name of the copy. |

*Fig. 69B-9*

| Operand ↓ | PM | Preferred embodiment Copy processing |
|---|---|---|
| 229 | C | Copying a directory causes searching the source system for the directory. The path parameter is a directory name. Providing a more defined partial or full path to the directory parameter will narrow the search result. The path parameter can be a wildcard (pattern) for matching. In one embodiment, all occurrences found on the MS and their paths are provided with at least their date/time stamps, size, and perhaps attributes information, for reconciliation at block 6942. In a preferred embodiment, the most recently accessed directory meeting the search criteria is copied to the target systems. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. In one embodiment, the copy results in overwriting an existing directory and files therein. In another embodiment, the copy results in writing a newly altered name of directory contents when there is a conflict (e.g. existing entity with same name). In another embodiment, an additional target path parameter is provided for where to place the directory. |
| 231 | C | Operand 215 (application object) is treated identically to this Operand 231 (application context) this LBX release (same params currently). |
| 233 | C | Copying a focused user interface object causes capturing the currently focused user interface object using the first parameter (e.g. Alt-Prtscrn; can be changed with the param) string syntax for keystroke(s) to capture the image, and then copying the graphics file (file type in various embodiments) to a shared destination, or a configured destination at the target system(s) or as specified with a new parameter. The capture takes place as though the user manually performed the capture action, and then was provided with the result for copying it. Appropriate MS storage is updated and subsequently processed as though the user had manually performed the capture and copy. Preferably, the copy command data is maintained to LBX History, a historical log, or other useful storage for subsequent use. In one embodiment, the copy results in overwriting an existing file with the same handle (e.g. name), which will be seldom since the graphics file name preferably contains a date/time stamp portion. In another embodiment, the copy results in writing a newly altered name of the file when there is an existing file with the same handle (e.g. name). An additional parameter may be specified for the target of the copy. An additional parameter may be specified for the target format of the copy whereby a conversion is caused (e.g. JPG to TIFF). |
| 235 | C | See Compose Command for identical processing, except processing may take place locally and/or at privilege-providing remote MS(s) (system(s) parameter). Also, the ack parameter provides a reconciliation option. |
| 237 | C | See Compose Command for identical processing, except processing may take place locally and/or at privilege-providing remote MS(s) (system(s) parameter). Also, the ack parameter provides a reconciliation option. |

*Fig. 69B-10*

| Operand ↓ | PM | Preferred embodiment Copy processing |
|---|---|---|
| 239 | C | See Compose Command for identical processing, except processing may take place locally and/or at privilege-providing remote MS(s) (system(s) parameter). Also, the ack parameter provides a reconciliation option. |
| 241 | C | Copying an alert causes searching the source for the alert. The alert parameter is the same parameter used to generate an alert (e.g. using another command), and can be wildcarded. In one embodiment, all occurrences found on the MS which is associated to the alerter application in use at the MS, and which is used for other commands disclosed, are provided to the user for reconciliation at block 6942 with at least their date/time stamps, and perhaps other information. In other embodiments, the most recently generated alert matching the alert search criteria is used for copying, or the search occurs as specified with an additional parameter. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The copy is made so that the target system(s) are delivered the alert(s) like delivering a new alert to the systems. |
| 243 | C | Copying a process causes first finding all process names running at the source (e.g. MS) which contain the prname string parameter (e.g. in UNIX: "ps -ef \| grep prname"). In one embodiment, all occurrences found running at the MS are presented with interesting programmatic information such as when started, its size, etc for reconciliation at block 6942. In the preferred embodiment, one process running in the source system is to be found (i.e. >1 = ambiguous). The search takes place as though the user manually launched the search, entered the criteria for the search, and then was provided with the result for copying. Results are useful statistics about the process which is running at the source. Appropriate MS storage is updated and subsequently processed as though the user had manually performed the search and copy. Preferably, the copy command data is maintained to LBX History, historical log, or other useful storage for subsequent use. Useful statistic(s) about the process (perhaps which statistics specified with an additional parameter) are copied to an appropriate destination of the target system(s) for informative purposes (e.g. a special log file). In another embodiment, the alerter process and/or indicator methodology can be used as the destination for the copy for alerting a user at the target system. In another embodiment, there is a new parameter for which end result the copy will have (informative destination, handled like alert, handled like indicator). |

*Fig. 69B-11*

| Operand ↓ | PM | Preferred embodiment Copy processing |
|---|---|---|
| 245 | C | Copying a container causes searching the source system for the container. The container parameter can be well defined to narrow the search result, and may be wildcarded (pattern) for matching. In one embodiment, all occurrences found on the MS and their references/handles are provided with at least their date/time stamps, size, and perhaps attributes information, for reconciliation at block 6942. In a preferred embodiment, the most recently accessed container meeting the search criteria is copied to the target systems. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. In one embodiment, the copy results in overwriting an existing container. In another embodiment, the copy results in writing a newly altered reference/handle of the container when there is a conflict (e.g. existing entity with same name). An additional parameter may be specified for the target, otherwise the object is copied to an assumed location. |
| 247 | C | Copying a program object first causes searching the source for the program object. In the preferred embodiment, a unique syntax is used for which type of program object is being sought (similar to above). There can be unique syntaxes for specifying which type of program object is being sought (e.g. "S:dataname"). In one embodiment, all occurrences found on the MS and information about the occurrence including its current value is presented to the user for reconciliation at block 6942. In a preferred embodiment, one program object is to be found (e.g. >1 = ambiguous). In one embodiment, a well known location of link symbol information files are consulted, and in another embodiment a new parameter specifies where to look, or which symbol file of information to use. The search criteria can be a wildcard (pattern) for matching. The search takes place as though the user manually launched the search, entered the criteria for the search, and then was provided with the result for copying. Appropriate MS storage is updated and subsequently processed as though the user had manually performed the search and copy. Preferably, the copy command data is maintained to LBX History, a historical log, or other useful storage for subsequent use. Useful statistic(s) about the program object (perhaps which statistics specified with an additional parameter) are copied to an appropriate destination of the target system(s) for informative purposes (e.g. a special log file). In another embodiment, the alerter process and/or indicator methodology can be used as the destination for the copy for alerting a user at the target system. In another embodiment, there is new parameter for which end result the copy will have (informative destination, handled like alert, handled like indicator). An alternate embodiment works like Operand 223 wherein copying is intended to keep program object(s) between systems in synch. Such embodiments require source and target system processing to have access to the object(s) (this may limit participating object(s)). |

*Fig. 69B-12*

| Operand ↓ | PM | Preferred embodiment Copy processing |
|---|---|---|
| 249 | C | Copying a cursor causes searching the source system for the current cursor setting(s). In the preferred embodiment, provided in the search results is the current cursor information (e.g. image, animation , etc). The current cursor information of the source is then used to alter the cursor at the target system(s). Appropriate MS storage is updated and subsequently processed as though the user had manually performed the copy operation. Preferably, the copy command data is maintained to LBX History, a historical log, or other useful storage for subsequent use. |
| 251 | C | Copying a calendar (CAL) object causes searching the source CAL system with search criteria of the calendar object parameter string. The calendar object parameter string can specify searching any calendar entry fields for any values including wildcarding. Each field is referenced with a predefined name and then associated with a search criteria (similar to email above). Those skilled in the art recognize many useful syntaxes for searching any characteristics of CAL objects. In one embodiment, all occurrences found in history are presented to the user for reconciliation at block 6942 with at least their date/time stamps, attendees, and perhaps other information, of the CAL object and when it was scheduled. In a preferred embodiment, the most recent occurrence from the calendaring system is provided for the copy. Wildcarding (pattern matching) is preferably inherent by searching for substrings. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The calendar entry is copied in its entirety to the target system calendaring system. In another embodiment, a new parameter is specified to copy the calendar item to a new schedule or time. A duplicate calendar entry may be created if one already exists. |

Fig. 69B-13

| Operand ↓ | PM | Preferred embodiment Copy processing |
|---|---|---|
| 253 | C | Copying an address book (AB) object causes searching the source AB system with search criteria of the AB object parameter string. The AB object parameter string can specify searching any AB entry fields for any values including wildcarding. Each field is referenced with a predefined name and then associated with a search criteria (similar to email above). Those skilled in the art recognize many useful syntaxes for searching any characteristics of AB objects/entries. In one embodiment, all occurrences found are presented to the user for reconciliation at block 6942 with appropriate AB information. In a preferred embodiment, the most recent occurrence from the AB system is provided for the copy. Wildcarding (pattern matching) is preferably inherent by searching for substrings. The search takes place as though the user manually launched the search, entered the criteria for the search, and then was provided with the result for copying it. Appropriate MS storage is updated and subsequently processed as though the user had manually performed the search and copy. Preferably, the copy command data is maintained to LBX History, a historical log, or other useful storage for subsequent use. The AB entry is copied in its entirety to the target system AB system. In another embodiment, a new parameter is specified to copy the AB item to special destination. A duplicate AB entry may be created if one already exists. |
| . . . | | |

*Fig. 69B-14*

| Operand ↓ | PM | Preferred embodiment Discard processing |
|---|---|---|
| 201 | C | Discarding an auto-dial # launches a phone number log interface with the auto-dial # parameter (can be wildcarded) for searching the specified system (e.g. MS). Preferably, both the outgoing and incoming logs are searched. In an alternate embodiment, the log is specified with a parameter. In the preferred embodiment, the most recent occurrence from a particular log is to be discarded. In another embodiment, all occurrences found in history are presented with their date/time stamps, and perhaps other information, of the call and when it took place when the ack parameter is set and the user browses the results prior to accepting the discard of multiple items. The search takes place as though the user manually launched the search, entered the auto-dial # for the search, and then was provided with result(s) for the discard. Preferably, the discard shall take place if there are no ambiguities (e.g. more than one phone number returned per search criteria). Appropriate MS storage is updated and subsequently processed as though the user manually performed the search and discard of the result. Preferably, the discard cmd data is maintained to LBX History, a historical log, or other useful storage for subsequent use. The discard is made to system(s) logs. |
| 203 | S | Discarding a weblink launches a search to browser history with the weblink parameter (can be wildcarded) for searching the specified system. In one embodiment, all occurrences found in history are presented with their date/time stamps, and perhaps other information, of the link and when it was invoked, when the ack parameter is specified to true for presentation to the user prior to doing the discard. In the preferred embodiment, the most recent occurrence from a particular invocation is provided for the discard. The search takes place as though the user manually launched the search, entered the weblink for the search, and then was provided with the result for discarding it. Appropriate MS storage is updated and subsequently processed as though the user had manually performed the search and discard of the result. Preferably, the discard command data is maintained to LBX History, a historical log, or other useful storage for subsequent use. The discard is made to a special browser favorites folder, another designated folder configured ahead of time, or as specified with an additional parameter. |

*Fig. 70B-1*

| Operand ↓ | PM | Preferred embodiment Discard processing |
|---|---|---|
| 205 | C | Discarding an email causes searching the specified email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In another embodiment, the most recent occurrence from searched folders is provided for the discard. The search takes place as though the user manually launched the search, entered the criteria for the search, and then was provided with the result for doing the discard. Appropriate MS storage is updated and subsequently processed as though the user had manually performed the search and discard. Preferably, the discard command data is maintained to LBX History, a historical log, or other useful storage for subsequent use. The email is discarded from an email folder as specified with a syntax in the email parameter string. |

*Fig. 70B-2*

| Operand ↓ | PM | Preferred embodiment Discard processing |
|---|---|---|
| 207 | C | Discarding an sms message causes searching the specified messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In another embodiment, the most recent occurrence from searched folders is provided for discarding. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The message is discarded from a folder as specified with a syntax in the sms message parameter string. |

*Fig. 70B-3*

| Operand ↓ | PM | Preferred embodiment Discard processing |
|---|---|---|
| 209 | C | Discarding a broadcast email causes searching the specified email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In a preferred embodiment, the most recent occurrence from searched folders is provided for the discard. The search takes place as though the user manually launched the search, entered the criteria for the search, and then was provided with the result for doing the discard. Appropriate MS storage is updated and subsequently processed as though the user had manually performed the search and discard. Preferably, the discard command data is maintained to LBX History, a historical log, or other useful storage for subsequent use. The email is discarded from a folder as specified with a syntax in the email parameter string. |

*Fig. 70B-4*

| Operand ↓ | PM | Preferred embodiment Discard processing |
|---|---|---|
| 211 | C | Discarding a broadcast sms msg causes searching the specified messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In a preferred embodiment, the most recent occurrence from searched folders is provided for discarding. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The message is discarded from a folder as specified with a syntax in the sms message parameter string. |
| 213 | O | Discarding an indicator searches appropriate specified system storage for the indicator (e.g. storage/memory used for indicators by other commands). The indicator parameter string specifies the indicator string being sought and wildcarding is supported. In one embodiment, appropriate MS storage/memory which contains the history of indicators sent to the source system is searched and all occurrences found in history are presented with at least their date/time stamps, the indicator, and perhaps other information, for user reconciliation. In one embodiment, the most recently delivered indicator is identified and used for the discard. The search takes place as though the user manually launched the search, entered the criteria for the search, and then was provided with the result for the discard. Appropriate MS storage is updated and subsequently processed as though the user had manually performed the search and discard. Preferably, the discard command data is maintained to LBX History, a historical log, or other useful storage for subsequent use. The discard is performed so that the target system(s) have the indicator(s) removed from the interface if currently presented and removed from history maintained for the user interface object presentation (preferably not from LBX history). An additional parameter may specify how to delete the indicator. |

*Fig. 70B-5*

| Operand ↓ | PM | Preferred embodiment Discard processing |
|---|---|---|
| 215 | C | Discarding an application causes searching the specified system for the application (and with the params parameter(s) if specified to get the right invocation of the application). The app parameter is preferably an executable name. Providing a partial or full path to the application parameter will limit the search result. The app parameter string preferably supports wildcarding. In one embodiment, all occurrences found at the source and their paths are presented to the user with at least their date/time stamps, size, and perhaps attributes information, for user reconciliation. In a preferred embodiment, the most recently executed instance of the matching application is determined for the discard. The search takes place as though the user manually launched the search, entered the criteria for the search, and then was provide with the result for discard. Appropriate MS storage is updated and subsequently processed as though the user had manually performed the search and discard. Preferably, the discard command data is maintained to LBX History, a historical log, or other useful storage for subsequent use. The discard does not remove the application from the target system. It terminates the application by terminating/killing it at the operating system level. A Discard File operand command can be used to remove it from the system. |
| 217 | S | Discarding a document causes searching the specified system for the document. The doc parameter is a document name. The document parameter can be a wildcard (pattern) for matching. Providing a more defined partial or full path to the document name will narrow the search. In one embodiment, all occurrences found and their paths are presented to the user with at least their date/time stamps, size, and perhaps attributes information, for user reconciliation. In a preferred embodiment, the most recently accessed search result is provided for the discard. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. Discard of the document removes it from each target system at a special shared folder, or configured folder for sharing, or as specified with a new parameter to discard processing. |
| 219 | S | Discarding a file causes searching the source path for the file. The path parameter is a file name. Providing a more defined partial or full path to the file will narrow the search result. The path parameter can be a wildcard (pattern) for matching. In one embodiment, all occurrences found on the MS and their paths are provided with at least their date/time stamps, size, and perhaps attributes information, for user reconciliation. In another embodiment, the most recently accessed file meeting the search criteria is discarded. The search takes place as though the user manually launched the search, entered the criteria for the search, and then was provide with the result for discarding it. Appropriate MS storage is updated and subsequently processed as though the user had manually performed the search and discard. Preferably, the discard cmd data is maintained to LBX History, a historical log, or other useful storage for subsequent use. File(s) are discarded at each target system. |

*Fig. 70B-6*

| Operand ↓ | PM | Preferred embodiment Discard processing |
|---|---|---|
| 221 | O | Discarding content causes searching the specified system for the content. The content parameter is a reference to the content. The content parameter can be a wildcard (pattern) for matching. In a preferred embodiment, the most recently accessed search result is provided for the discard. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. Discarding the content removes it from each target system at a special shared destination, or configured destination for sharing, or as specified with a new parameter to discard processing. |
| 223 | C | Discarding a DB object causes searching the specified system for the database object value. The database object parameter is provided with a variety of syntaxes depending on the type of database object sought. For example, the DB-obj parameters is "T:tablename" to seek a table, "S:schemaname" to seek a particular schema, "C:columnname" to seek a particular column name, "D:DBname" to seek a particular DB name, "R:rolename" to seek a particular role set, "P:procname" to search for particular stored procedure, etc. There are unique syntaxes for every type of DB object being sought. The search criteria can be a wildcard (pattern) for matching. In one embodiment, all occurrences found on the source system and information about the occurrence is presented to the user for reconciliation. In a preferred embodiment, the best (e.g. most recently accessed) fit database object is identified for discard. The search takes place as though the user manually launched the search, entered the criteria or query for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The DB object is discarded (removed, deleted, dropped). |
| 225 | O | Same as Compose processing except modifies the value to an initial value (e.g. 0) at each system. |
| 227 | O | Same as Compose processing except modifies the value to an initial value (e.g. clear) at each system. |

*Fig. 70B-7*

| Operand ↓ | PM | Preferred embodiment Discard processing |
|---|---|---|
| 229 | S | Discarding a directory causes searching the specified system for the directory. The path parameter is a directory name. Providing a more defined partial or full path to the directory parameter will narrow the search result. The path parameter can be a wildcard (pattern) for matching. In one embodiment, all occurrences found on the MS and their paths are provided with at least their date/time stamps, size, and perhaps attributes information, for user reconciliation. In one embodiment, the most recently accessed directory meeting the search criteria is discarded. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The directory is discarded at each target system. |
| 231 | C | Operand 215 and 235 (application object) is treated identically to Operand 231 (application context) this LBX release (same params currently). The specified application is terminated, not removed. |
| 233 | S | Discarding a user interface object causes closing/terminating the focused object(s) at each specified system that contains the objtxt parameter criteria in the titlebar. In a preferred embodiment, there is a unique syntax for which places of user interface objects that are currently active are to be search (e.g. title bar, entry fields, radio button options, window text, combinations thereof, etc). The search criteria can be a wildcard (pattern) for matching. The search takes place as though the user manually launched the search, entered the criteria for the search, and the object(s) are closed/terminated. Appropriate MS storage is updated and subsequently processed as though the user had manually performed the search and discard. Preferably, the discard command data is maintained to LBX History, a historical log, or other useful storage for subsequent use. |
| 235 | C | Operand 215 and 231 (application object) is treated identically to Operand 235 (application context) this LBX release (same params currently). The specified application is terminated, not removed. |
| 237 | O | Discarding input causes reinitializing the iodev parameter input device stream of the specified system, so that any pending state is discarded. In one embodiment, a special input datastream is issued to reinitialize the I/O path. In another embodiment, the I/O path is terminated and restarted to reinitialize for the attached device(s). In another embodiment, the I/O path is flushed and then reinitialized. In another embodiment, an additional parameter indicates how to discard the iodev device stream (e.g. method and/or initialization data to initialize with). The iodev parameter specifies which Input/Output device to reinitialize. Preferably, the discard command data is maintained to LBX History, a log, or other useful storage for subsequent use. |

*Fig. 70B-8*

| Operand ↓ | PM | Preferred embodiment Discard processing |
|---|---|---|
| 239 | O | Discarding output causes reinitializing the iodev parameter output device stream of the specified system, so that any pending state is discarded. In one embodiment, a special output datastream is issued to reinitialize the I/O path. In another embodiment, the I/O path is terminated and restarted to reinitialize for the attached device(s). In another embodiment, the I/O path is flushed and then reinitialized. In another embodiment, an additional parameter indicates how to discard the iodev device stream (e.g. method and/or initialization data to initialize with). The iodev parameter specifies which Input/Output device to reinitialize. Preferably, the discard command data is maintained to LBX History, a log, or other useful storage for subsequent use. |
| 241 | C | Discarding an alert causes searching the specified system for the alert and discarding it. The alert parameter is the same parameter used to generate an alert (e.g. using another command), and can be wildcarded. In one embodiment, all occurrences found which is associated to the alerter application in use at the MS, and which is used for other commands disclosed, are provided to the user for reconciliation with at least their date/time stamps, and perhaps other information. In one embodiment, the most recently generated alert matching the alert search criteria is used for discarding. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. |
| 243 | O | Discarding a process causes searching for and terminating/killing all process names running at the specified system (e.g. MS) which contain the prname string parameter (e.g. in UNIX: "ps -ef \| grep prname"). In one embodiment, all occurrences found running at the MS are presented with interesting programmatic information such as when started, its size, etc for user reconciliation. In the preferred embodiment, one process running in the specified system is to be found (i.e. >1 = ambiguous). The search takes place as though the user manually launched the search, entered the criteria for the search, and then was provided with the result for discarding. Appropriate MS storage is updated and subsequently processed as though the user had manually performed the search and discard. Preferably, the discard command data is maintained to LBX History, historical log, or other useful storage for subsequent use. The process is terminated/killed. It is not removed from the system. |

*Fig. 70B-9*

| Operand ↓ | PM | Preferred embodiment Discard processing |
|---|---|---|
| 245 | S | Discarding a container causes searching the specified system for the container. The container parameter can be well defined to narrow the search result, and may be wildcarded (pattern) for matching. In one embodiment, all occurrences found on the MS and their references/handles are provided with at least their date/time stamps, size, and perhaps attributes information, for user reconciliation. In one embodiment, the most recently accessed container meeting the search criteria is discarded at the target systems. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The container is discarded from each specified system. |
| 247 | O | Discarding a program object causes searching the specified system for the program object and initializing to a initial value (i.e. discarding any current value). In the preferred embodiment, a unique syntax is used for which type of program object is being sought (similar to above). There can be unique syntaxes for specifying which type of program object is being sought (e.g. "S:dataname"). In one embodiment, all occurrences found on the MS and information about the occurrence including its current value is presented to the user for reconciliation. In a preferred embodiment, one program object is to be found (e.g. >1 = ambiguous). In one embodiment, a well known location of link symbol information files are consulted, and in another embodiment a new parameter specifies where to look, or which symbol file of information to use. The search criteria can be a wildcard (pattern) for matching. The search takes place as though the user manually launched the search, entered the criteria for the search, and then was provided with the result for discarding. Appropriate MS storage is updated and subsequently processed as though the user had manually performed the search and discard. Preferably, the discard command data is maintained to LBX History, a historical log, or other useful storage for subsequent use. A reasonable reset value (e.g. 0 for data, clear for semaphore) is set to the program object. Program objects which cannot hold a value (procedure) are preferably not affected by the discard command. Local and remote processing must have programmatic visibility to affected program object(s). |
| 249 | O | Discarding a cursor causes resetting the cursor at the specified system. In the preferred embodiment, provided in the search results is the current cursor information (e.g. image, animation , etc) when user reconciliation is involved. Appropriate MS storage is updated and subsequently processed as though the user had manually performed the discard operation. Preferably, the discard command data is maintained to LBX History, a historical log, or other useful storage for subsequent use. In one embodiment, a system defaulted cursor is set. In another embodiment, the previous cursor setting is returned to, and multiple discard cursor actions can change the cursor continuously to historical settings. An additional parameter may provide how to discard the cursor. |

*Fig. 70B-10*

| Operand ↓ | PM | Preferred embodiment Discard processing |
|---|---|---|
| 251 | C | Discarding a calendar object causes searching the specified calendar system with search criteria of the calendar object parameter string. The calendar object parameter string can specify searching any calendar entry fields for any values including wildcarding. Each field is referenced with a predefined name and then associated with a search criteria (similar to email above). Those skilled in the art recognize many useful syntaxes for searching any characteristics of calendar objects. In one embodiment, all occurrences found in history are presented to the user for reconciliation with at least their date/time stamps, sender and recipient, and perhaps other information, of the calendar object and when it was scheduled. In a preferred embodiment, the most recent occurrence from the calendaring system is discarded. Wildcarding (pattern matching) is preferably inherent by searching for substrings. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The calendar entry(s) are discarded from the target system calendaring system. |
| 253 | C | Discarding an address book (AB) object causes searching the specified AB system with search criteria of the AB object parameter string. The AB object parameter string can specify searching any AB entry fields for any values including wildcarding. Each field is referenced with a predefined name and then associated with a search criteria (similar to email above). Those skilled in the art recognize many useful syntaxes for searching any characteristics of AB objects/entries. In one embodiment, all occurrences found are presented to the user for reconciliation with appropriate AB information. In a preferred embodiment, the most recent occurrence from the AB system is discarded. Wildcarding (pattern matching) is preferably inherent by searching for substrings. The search takes place as though the user manually launched the search, entered the criteria for the search, and then was provided with the result for discarding it. Appropriate MS storage is updated and subsequently processed as though the user had manually performed the search and discard. Preferably, the discard command data is maintained to LBX History, a historical log, or other useful storage for subsequent use. The AB entry(s) are discarded from the target system AB system. |
| ... | | |

*Fig. 70B-11*

| Operand ↓ | PM | Preferred embodiment Move processing |
|---|---|---|
| 201 | C | Moving an auto-dial # launches a phone number log interface with the auto-dial # parameter (can be wildcarded) for searching the source system. Preferably, both the outgoing and incoming logs are searched. In an alternate embodiment, the log is specified with a parameter. In the preferred embodiment, the most recent occurrence from a particular log is provided. In another embodiment, all occurrences found in history are presented with their date/time stamps, and perhaps other information, of the call and when it took place (e.g. when the ack parameter is set) and the user browses the results prior to accepting the move. The search takes place as though the user manually launched the search, entered the auto-dial # for the search, and then was provided with result(s) for the move. Preferably, the move shall take place if there are no ambiguities (e.g. more than one phone number returned per search criteria). An additional parameter may be specified for the target (different log) of the move, otherwise the object is moved to an assumed location (e.g. same folder to more recent position). Appropriate MS storage is updated and subsequently processed as though the user manually performed the search and move of the result. Preferably, the move cmd data is maintained to LBX History, a historical log, or other useful storage for subsequent use. The move is made to system(s) logs, preferably with identifying information of the source and who did the move. |
| 203 | C | Moving a weblink launches a search to MS browser history with the weblink parameter (can be wildcarded) for searching the source system. In one embodiment, all occurrences found in history are presented with their date/time stamps, and perhaps other information, of the link and when it was invoked (e.g. when the ack parameter is specified to true) for presentation to the user prior to doing the move. In the preferred embodiment, the most recent occurrence from a particular invocation is provided for the move. An additional parameter may be specified for the target (specified favorites folder), otherwise the object is moved to an assumed location (e.g. highest level favorites folder). The search takes place as though the user manually launched the search, entered the weblink for the search, and then was provided with the result for moving it. Appropriate MS storage is updated and subsequently processed as though the user had manually performed the search and move of the result. Preferably, the move command data is maintained to LBX History, a historical log, or other useful storage for subsequent use. The move is made to a special browser favorites folder, or another designated folder configured ahead of time, or as specified with an additional parameter, preferably with identifying information of the source and who did the move. |

*Fig. 71B-1*

| Operand ↓ | PM | Preferred embodiment Move processing |
|---|---|---|
| 205 | C | Moving an email causes searching the source email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In a preferred embodiment, the most recent occurrence from searched folders is provided for the move. An additional parameter may be specified for the target (specified folder), otherwise the object is moved to an assumed location (e.g. inbox, drafts, special named folder).The search takes place as though the user manually launched the search, entered the criteria for the search, and then was provided with the result for doing the move. Appropriate MS storage is updated and subsequently processed as though the user had manually performed the search and move. Preferably, the move command data is maintained to LBX History, a historical log, or other useful storage for subsequent use. The move is made to a special email folder of the target system, or another designated folder configured ahead of time, or as specified with a new parameter for move processing, preferably with identifying information of the source and who did the move (if supported in email application). |

*Fig. 71B-2*

| Operand ↓ | PM | Preferred embodiment Move processing |
|---|---|---|
| 207 | C | Moving an sms message causes searching the source messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In a preferred embodiment, the most recent occurrence from searched folders is provided for moving. An additional parameter may be specified for the target (specified folder), otherwise the object is moved to an assumed location (e.g. inbox, drafts, special named folder). The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The move is made to a special messaging folder of the target system, or another designated folder configured ahead of time, or as specified with a new parameter to move processing, preferably with identifying information of the source and who did the move. |

*Fig. 71B-3*

| Operand ↓ | PM | Preferred embodiment Move processing |
|---|---|---|
| 209 | C | Moving a broadcast email causes searching the source email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In one embodiment, all occurrences found in history are presented with at least their date/time stamps, subject line, sender and recipient, and perhaps other information, of the email and when it took place, when the ack parameter is set to true for user reconciliation. In a preferred embodiment, the most recent occurrence from searched folders is provided for the move. An additional parameter may be specified for the target (specified folder), otherwise the object is moved to an assumed location (e.g. inbox, drafts, special named folder). The search takes place as though the user manually launched the search, entered the criteria for the search, and then was provided with the result for doing the move. Appropriate MS storage is updated and subsequently processed as though the user had manually performed the search and move. Preferably, the move command data is maintained to LBX History, a historical log, or other useful storage for subsequent use. The move is made to a special email folder of the target system, or another designated folder configured ahead of time, or as specified with a new parameter to move processing, preferably with identifying information of the source and who did the move. |

*Fig. 71B-4*

| Operand ↓ | PM | Preferred embodiment Move processing |
|---|---|---|
| 211 | C | Moving a broadcast sms msg causes searching the source messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In one embodiment, all occurrences found in history are presented with at least their date/time stamps, message, sender and recipient, and perhaps other information, of the message and when it took place, when the ack parameter is set to true for user reconciliation. In a preferred embodiment, the most recent occurrence from searched folders is provided for moving. An additional parameter may be specified for the target (specified folder), otherwise the object is moved to an assumed location (e.g. inbox, drafts, special named folder). The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The move is made to a special messaging folder of the target system, or another designated folder configured ahead of time, or as specified with a new parameter to move processing, preferably with identifying information of the source and who did the move. |
| 213 | C | Moving an indicator searches appropriate source storage for the indicator (e.g. storage/memory used for indicators by other commands). The indicator parameter string specifies the indicator string being sought and wildcarding is supported. In one embodiment, appropriate MS storage/memory which contains the history of indicators sent to the source system is searched and all occurrences found in history are presented with at least their date/time stamps, the indicator, and perhaps other information, for user reconciliation. In a preferred embodiment, the most recently delivered indicator is identified and used for the move. The search takes place as though the user manually launched the search, entered the criteria for the search, and then was provided with the result for the move. Appropriate MS storage is updated and subsequently processed as though the user had manually performed the search and move. Preferably, the move command data is maintained to LBX History, a historical log, or other useful storage for subsequent use. The move is made so that the target system(s) are delivered the indicators like delivering new indicator(s) for presentation. |

*Fig. 71B-5*

| Operand ↓ | PM | Preferred embodiment Move processing |
|---|---|---|
| 215 | C | Moving an application causes searching the source system for the application (and with the params parameter(s) if specified to get the param specified invocation of the application). The app parameter is preferably an executable name, and may contain parameters that were passed. Providing a more defined partial or full path to the application parameter will limit the search result. The app parameter string preferably supports wildcarding. In one embodiment, all occurrences found at the source and their paths are presented to the user with at least their date/time stamps, size, and perhaps attributes information, for user reconciliation. In a preferred embodiment, the most recently executed instance of the matching application is determined for the move. In one embodiment, the application itself is moved to the target systems, perhaps as directed by an additional parameter (e.g. directory location). In another embodiment, the executable path to run the application is moved to execution history at the system(s) so that a user can run it, albeit from a remote system (assumption that application available for running there already). In another embodiment, the executable(s) are roved to the target system using methodologies of U.S. Patent 5,938,722 ("Method of executing programs in a network", Johnson). The search takes place as though the user manually launched the search, entered the criteria for the search, and then was provided with the result for move. Appropriate MS storage is updated and subsequently processed as though the user had manually performed the search and move. Preferably, the move command data is maintained to LBX History, a historical log, or other useful storage for subsequent use. |
| 217 | C | Moving a document causes searching the source system for the document. The doc parameter is a document name. The document parameter can be a wildcard (pattern) for matching. Providing a more defined partial or full path to the document name will narrow the search. In one embodiment, all occurrences found on the MS and their paths are presented to the user with at least their date/time stamps, size, and perhaps attributes information, for user reconciliation. In a preferred embodiment, the most recently accessed search result is provided for the move. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. Moving the document places the document to each target system at a special shared folder, or configured folder for sharing, or as specified with a new destination parameter to move processing. |

*Fig. 71B-6*

| Operand ↓ | PM | Preferred embodiment Move processing |
|---|---|---|
| 219 | C | Moving a file causes searching the source path for the file. The path parameter is a file name. Providing a more defined partial or full path to the file will narrow the search result. The path parameter can be a wildcard (pattern) for matching. In one embodiment, all occurrences found on the MS and their paths are provided with at least their date/time stamps, size, and perhaps attributes information, for user reconciliation. In a preferred embodiment, the most recently accessed file meeting the search criteria is moved to the target systems. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. In one embodiment, the move results in overwriting an existing file with the same handle (e.g. name). In another embodiment, the move may result in writing a newly altered name of the file when there is an existing file with the same handle (e.g. name). An additional parameter may be specified for the target (specified folder), otherwise the object is moved to an assumed location. |
| 221 | O | Moving content causes searching the source for the content. The content parameter is a reference to the content. The content parameter can be a wildcard (pattern) for matching. In a preferred embodiment, the most recently accessed search result is provided for the move. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. Moving the content places the content to each target system at a special shared destination, or configured destination for sharing, or as specified with a new parameter to move processing. |

Fig. 71B-7

| Operand ↓ | PM | Preferred embodiment Move processing |
|---|---|---|
| 223 | O | Moving a DB object causes searching the source for the database object value. The database object parameter is provided with a variety of syntaxes depending on the type of database object sought. For example, the DB-obj parameters is "T:tablename" to seek a table, "S:schemaname" to seek a particular schema, "C:columnname" to seek a particular column name, "D:DBname" to seek a particular DB name, "R:rolename" to seek a particular role set, "P:procname" to search for particular stored procedure, etc. There are unique syntaxes for every type of DB object being sought which maps to an appropriate SQL system tables query. The search criteria can be a wildcard (pattern) for matching. In one embodiment, all occurrences found on the source system and information about the occurrence is presented to the user for reconciliation. In other embodiments, the best (e.g. most recently accessed) fit database object is identified for use in the move, or a new parameter indicates how to search. The search takes place as though the user manually launched the search, entered the criteria or query for the search, and then was provided with the result for moving it. Appropriate MS storage is updated and subsequently processed as though the user had manually performed the search and move. Preferably, the move command data is maintained to LBX History, a historical log, or other useful storage for subsequent use. The value of the DB object is moved to the value of the DB object with the same name and type at the destination system(s). If not found at a target system, then no action is performed at that system. Moving a database object moves the value to the same database object(s) at other system(s), or creates new ones when there is not match. Value(s) are overwritten. An additional parameter may be specified for the target of the move. |

*Fig. 71B-8*

| Operand ↓ | PM | Preferred embodiment Move processing |
|---|---|---|
| 225 | O | Moving data causes searching the source system for the data. In the preferred embodiment, the data is a global system variable visible to all processes of a MS operating system. In other embodiments, the data may have limited scope which is made accessible to present disclosure processing (e.g. with extern). Depending on the embodiment, data may be that which is contained in a program data segment, stack segment, and/or extra segment. There can be unique syntaxes for specifying which type of data is being sought (e.g. "S:dataname" for data parameter). The search criteria can be a wildcard (pattern) for matching. In the preferred embodiment, a well known location of link symbol information files are consulted, and in another embodiment a new parameter specifies where to look, or which symbol file of information to use. A recognized AppTerm causes access to record 5300 for proper semaphore synchronized access. In one embodiment, all occurrences found at the source system and information about the occurrence including its current value is presented to the user for reconciliation. In a preferred embodiment, the best data value (e.g. most recently accessed if more than one matches) is provided for the move. The search takes place as though the user manually launched the search, entered the criteria for the search, and then was provided with result for moving it. Appropriate MS storage is updated and subsequently processed as though the user had manually performed the search and move. Preferably, the move command data is maintained to LBX History, a historical log, or other useful storage for subsequent use. The value of the data to be moved is copied to the data with the same name and type at the destination system(s). In another embodiment, the source data is reinitialized (e.g. 0), or reinitialized according to a new parameter, as part of the move operation. If not found at a target system, then no action is performed at that system, or an error is provided. Moving a data object at least copies the value to the same data object(s) at other system(s). Value(s) are overwritten. An additional parameter may be specified for the target of the move. |

*Fig. 71B-9*

| Operand | PM | Preferred embodiment Move processing |
|---|---|---|
| 227 | O | Moving a semaphore causes reading the current value of the semaphore at the source where the move command action is being executed and then moving the current value to the same semaphore names at the target system(s). The semaphore param can be a wildcard (pattern) for matching. In the preferred embodiment, the semaphore is a global system semaphore visible to all processes of a MS operating system. In other embodiments, the semaphore may have limited scope which is made accessible to present disclosure processing. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The value (set or cleared) of the moved semaphore is copied to the semaphore with the same name and type at the destination system(s). In another embodiment, the source semaphore is reinitialized (e.g. clear), or reinitialized according to a new parameter, as part of the move operation. If not found at a target system, then no action is performed at that system, or an error is provided. Moving a semaphore at least copies the value to the same semaphore at other system(s). Value(s) are changed (clear or set). An additional parameter may be specified for the target of the move. |
| 229 | C | Moving a directory causes searching the source system for the directory. The path parameter is a directory name. Providing a more defined partial or full path to the directory parameter will narrow the search result. The path parameter can be a wildcard (pattern) for matching. In one embodiment, all occurrences found on the MS and their paths are provided with at least their date/time stamps, size, and perhaps attributes information, for user reconciliation. In a preferred embodiment, the most recently accessed directory meeting the search criteria is copied to the target systems. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. In one embodiment, the move results in overwriting an existing directory and files therein. In another embodiment, the move results in writing a newly altered name of directory contents when there is a conflict (e.g. existing entity with same name). In another embodiment, an additional target path parameter is provided for where to place the directory. |
| 231 | C | Operand 215 (application object) is treated identically to this Operand 231 (application context) this LBX release (same params currently). |

*Fig. 71B-10*

| Operand ↓ | PM | Preferred embodiment Move processing |
|---|---|---|
| 233 | C | Moving a focused user interface object causes capturing the currently focused user interface object using the first parameter (e.g. Alt-Prtscrn; can be changed with the param) string syntax for keystroke(s) to capture the image, and then moving the graphics file (file type in various embodiments) to a shared destination, or a configured destination at the target system(s), or as specified with a new parameter. The capture takes place as though the user manually performed the capture action, and then was provided with the result for moving it. Appropriate MS storage is updated and subsequently processed as though the user had manually performed the capture and move. Preferably, the move command data is maintained to LBX History, a historical log, or other useful storage for subsequent use. In one embodiment, the move results in overwriting an existing file with the same handle (e.g. name), which will be seldom since the graphics file name preferably contains a date/time stamp portion. In another embodiment, the move results in writing a newly altered name of the file when there is an existing file with the same handle (e.g. name). An additional parameter may be specified for the target of the move. An additional parameter may be specified for the target format of the move whereby a conversion is caused (e.g. JPG to TIFF). |
| 235 | C | See Compose Command for identical processing, except processing may take place locally and/or at privilege-providing remote MS(s) (system(s) parameter). Also, the ack parameter provides a reconciliation option. |
| 237 | C | See Compose Command for identical processing, except processing may take place locally and/or at privilege-providing remote MS(s) (system(s) parameter). Also, the ack parameter provides a reconciliation option. |
| 239 | C | See Compose Command for identical processing, except processing may take place locally and/or at privilege-providing remote MS(s) (system(s) parameter). Also, the ack parameter provides a reconciliation option. |
| 241 | C | Moving an alert causes searching the source system for the alert. The alert parameter is the same parameter used to generate an alert (e.g. using another command), and can be wildcarded. In one embodiment, all occurrences found on the MS which is associated to the alerter application in use at the MS, and which is used for other commands disclosed, are provided to the user for reconciliation with at least their date/time stamps, and perhaps other information. In other embodiments, the most recently generated alert matching the alert search criteria is used for moving, or the search occurs as specified with an additional parameter. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The move is made so that the target system(s) are delivered the alert(s) like delivering a new alert to the systems. |

*Fig. 71B-11*

<table>
<tr><th>Operand ↓</th><th>PM</th><th>Preferred embodiment Move processing</th></tr>
<tr><td>243</td><td>C</td><td>Moving a process causes first finding all process names running at the source (e.g. MS) which contain the prname string parameter (e.g. in UNIX: "ps -ef | grep prname"). In one embodiment, all occurrences found running at the MS are presented with interesting programmatic information such as when started, its size, etc for user reconciliation. In the preferred embodiment, one process running in the source system is to be found (i.e. >1 = ambiguous). The search takes place as though the user manually launched the search, entered the criteria for the search, and then was provided with the result for moving. Results are useful statistics about the process which is running at the source. Appropriate MS storage is updated and subsequently processed as though the user had manually performed the search and move. Preferably, the move command data is maintained to LBX History, historical log, or other useful storage for subsequent use. Useful statistic(s) about the process (perhaps which statistics specified with an additional parameter) are moved/copied to an appropriate destination of the target system(s) for informative purposes (e.g. a special log file). In another embodiment, the alerter process and/or indicator methodology can be used as the destination for the move for alerting a user at the target system. In another embodiment, there is a new parameter for which end result the move will have (informative destination, handled like alert, handled like indicator). In some embodiments, the process is roved to the target system using methodologies of U.S. Patent 5,938,722 ("Method of executing programs in a network", Johnson), as requested in a new parameter.</td></tr>
<tr><td>245</td><td>C</td><td>Moving a container causes searching the source system for the container. The container parameter can be well defined to narrow the search result, and may be wildcarded (pattern) for matching. In one embodiment, all occurrences found on the MS and their references/handles are provided with at least their date/time stamps, size, and perhaps attributes information, for user reconciliation. In a preferred embodiment, the most recently accessed container meeting the search criteria is copied to the target systems. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. In one embodiment, the move results in overwriting an existing container. In another embodiment, the move results in writing a newly altered reference/handle of the container when there is a conflict (e.g. existing entity with same name). An additional parameter may be specified for the target, otherwise the object is moved to an assumed location.</td></tr>
</table>

*Fig. 71B-12*

| Operand ↓ | PM | Preferred embodiment Move processing |
|---|---|---|
| 247 | C | Moving a program object causes first searching the source for the program object. In the preferred embodiment, a unique syntax is used for which type of program object is being sought (similar to above). There can be unique syntaxes for specifying which type of program object is being sought (e.g. "S:dataname"). In one embodiment, all occurrences found on the MS and information about the occurrence including its current value is presented to the user for reconciliation. In a preferred embodiment, one program object is to be found (e.g. >1 = ambiguous). In one embodiment, a well known location of link symbol information files are consulted, and in another embodiment a new parameter specifies where to look, or which symbol file of information to use. The search criteria can be a wildcard (pattern) for matching. The search takes place as though the user manually launched the search, entered the criteria for the search, and then was provided with the result for moving. Appropriate MS storage is updated and subsequently processed as though the user had manually performed the search and move. Preferably, the move command data is maintained to LBX History, a historical log, or other useful storage for subsequent use. Useful statistic(s) about the program object (perhaps which statistics specified with an additional parameter) are moved/copied to an appropriate destination of the target system(s) for informative purposes (e.g. a special log file). In another embodiment, the alerter process and/or indicator methodology can be used as the destination for the move for alerting a user at the target system. In another embodiment, there is new parameter for which end result the move will have (informative destination, handled like alert, handled like indicator). An alternate embodiment works like Operand 223 wherein moving is intended to keep program object(s) between systems in synch, albeit with a discard from the source system. Such embodiments require source and target system processing to have access to the object(s) (this may limit participating object(s)). |
| 249 | C | Moving a cursor causes searching the source system for the current cursor setting(s). In the preferred embodiment, provided in the search results is the current cursor information (e.g. image, animation , etc). The current cursor information of the source is then used to alter the cursor at the target system(s). Appropriate MS storage is updated and subsequently processed as though the user had manually performed the move operation. Preferably, the move command data is maintained to LBX History, a historical log, or other useful storage for subsequent use. In some embodiments, the source cursor is reset to a different (e.g. initialized) setting as resulting from the move. |

*Fig. 71B-13*

| Operand ↓ | PM | Preferred embodiment Move processing |
|---|---|---|
| 251 | C | Moving a calendar object causes searching the source calendar system with search criteria of the calendar object parameter string. The calendar object parameter string can specify searching any calendar entry fields for any values including wildcarding. Each field is referenced with a predefined name and then associated with a search criteria (similar to email above). Those skilled in the art recognize many useful syntaxes for searching any characteristics of calendar objects. In one embodiment, all occurrences found in history are presented to the user for reconciliation with at least their date/time stamps, attendees, and perhaps other information, of the calendar object and when it was scheduled. In a preferred embodiment, the most recent occurrence from the calendaring system is provided for the move. Wildcarding (pattern matching) is preferably inherent by searching for substrings. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The calendar entry is moved in its entirety to the target system calendaring system. In another embodiment, a new parameter is specified to move the calendar item(s) to a new schedule or time. A duplicate calendar entry may be created if one already exists. |
| 253 | C | Moving an address book (AB) object causes searching the source AB system with search criteria of the AB object parameter string. The AB object parameter string can specify searching any AB entry fields for any values including wildcarding. Each field is referenced with a predefined name and then associated with a search criteria (similar to email above). Those skilled in the art recognize many useful syntaxes for searching any characteristics of AB objects/entries. In one embodiment, all occurrences found are presented to the user for reconciliation with appropriate AB information. In a preferred embodiment, the most recent occurrence from the AB system is provided for the move. Wildcarding (pattern matching) is preferably inherent by searching for substrings. The search takes place as though the user manually launched the search, entered the criteria for the search, and then was provided with the result for moving it. Appropriate MS storage is updated and subsequently processed as though the user had manually performed the search and move. Preferably, the move command data is maintained to LBX History, a historical log, or other useful storage for subsequent use. The AB entry is moved in its entirety to the target system AB system. In another embodiment, a new parameter is specified to move the AB item(s) to a special destination. A duplicate AB entry may be created if one already exists. |
| . . . | | |

Fig. 71B-14

| Operand ↓ | PM | Preferred embodiment Store processing |
|---|---|---|
| 201 | C | Storing an auto-dial # stores the auto-dial # parameter to the system(s). Preferably, a certain log is used to store the auto-dial #, or an additional parameter can be provided for where to store the auto-dial # to. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored auto-dial #. An additional parameter may be specified for how/where exactly to store it (e.g. which log). |
| 203 | S | Storing a weblink stores the weblink parameter to the system(s). Preferably, a certain link folder is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored weblink. An additional parameter may be specified for how/where exactly to store it (e.g. which folder). |
| 205 | C | Storing an email causes storing the email object to the system(s)' email system. In one embodiment, the email parameter string is a string containing a syntax for defining an email item and used to create the email to a certain folder, configured folder, or as specified with an additional parameter. Each email field can be defined with values, and the store command may result in defaulting fields which are not specified in the email parameter. In another embodiment, the email parameter points to a file containing a syntax for creating the email object. Those skilled in the art recognize many useful syntaxes for setting data in a new email object. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored email. |

*Fig. 72B-1*

| Operand ↓ | PM | Preferred embodiment Store processing |
|---|---|---|
| 207 | C | Storing an sms message causes storing the sms message object to the system(s)' messaging system. In one embodiment, the sms message parameter string is a string containing a syntax for defining an sms message item and used to create the sms message to a certain folder, configured folder, or as specified with an additional parameter. Each sms message field can be defined with values, and the store command may result in defaulting fields which are not specified in the sms message parameter. In another embodiment, the sms message parameter points (e.g. path) to a file containing a syntax for creating the sms message object. Those skilled in the art recognize many useful syntaxes for setting data in a new sms message object. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored sms message. |
| 209 | C | Storing a broadcast email causes storing the email object to the system(s)' email system. In one embodiment, the email parameter string is a string containing a syntax for defining an email item and used to create the email to a certain folder, configured folder, or as specified with an additional parameter. Each email field can be defined with values, and the store command may result in defaulting fields which are not specified in the email parameter. In another embodiment, the email parameter points (e.g. path) to a file containing a syntax for creating the email object. Those skilled in the art recognize many useful syntaxes for setting data in a new email object. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored email. |

*Fig. 72B-2*

| Operand ↓ | PM | Preferred embodiment Store processing |
|---|---|---|
| 211 | C | Storing a broadcast sms message causes storing the sms message object to the system(s)' messaging system. In one embodiment, the sms message parameter string is a string containing a syntax for defining an sms message item and used to create the sms message to a certain folder, configured folder, or as specified with an additional parameter. Each sms message field can be defined with values, and the store command may result in defaulting fields which are not specified in the sms message parameter. In another embodiment, the sms message parameter points to a file (e.g. path) containing a syntax for creating the sms message object. Those skilled in the art recognize many useful syntaxes for setting data in a new sms message object. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored sms message. |
| 213 | O | See Invoke Command for identical processing. |
| 215 | C | See Invoke Command for identical processing. |
| 217 | S | Storing a document stores the document parameter to the system(s). The document may be a self contained object parameter, or pointer (e.g. path) to a file defining the document. Preferably, a certain folder is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored document. |
| 219 | S | Storing a file stores the file from the path parameter to the system(s). Preferably, a certain folder is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored file. |

*Fig. 72B-3*

| Operand ↓ | PM | Preferred embodiment Store processing |
|---|---|---|
| 221 | O | Storing content stores the content parameter to the system(s). The content may be a self contained object parameter, or pointer (e.g. path) to a file defining the content. Preferably, a certain destination is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored content. |
| 223 | C | See Invoke Command for identical processing. |
| 225 | O | See Invoke Command for identical processing. |
| 227 | O | See Invoke Command for identical processing. |
| 229 | S | Storing a directory stores the directory from the path parameter to the system(s). Preferably, a certain folder is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored directory. |
| 231 | C | See Invoke Command for identical processing. |
| 233 | S | Storing a focused user interface object causes a snapshot to be taken of the currently focused user interface object (to .jpg, .gif, alternate embodiments, etc) at the MS and then the snapshot file is stored as though the user manually captured the focused user interface object (e.g. Alt-Prtscrn) and saved it. Preferably, a certain folder is used to store it, or an additional parameter can be provided for where to store it. The first parameter command syntax can be defaulted or changed. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored snapshot. An additional parameter may be specified for the target format of the store whereby a conversion is caused (e.g. JPG to TIFF). |
| 235 | O | See Invoke Command for identical processing. |
| 237 | O | See Invoke Command for identical processing. |
| 239 | O | See Invoke Command for identical processing. |

*Fig. 72B-4*

| Operand ↓ | PM | Preferred embodiment Store processing |
|---|---|---|
| 241 | S | Storing an alert causes storing the alert to the specified system(s). The alert parameter is the same parameter used to generate an alert (e.g. using another command). Storing takes place as though the user manually launched it. Appropriate MS storage is updated and subsequently processed as though the user had manually performed the store. Preferably, the store command data is maintained to LBX History, a historical log, or other useful storage for subsequent use. The store is performed so that the target system(s) are delivered the alert(s) like delivering a new alert to the systems. |
| 243 | O | Storing a process causes sending an operating system signal (see UNIX signaling) to the process name (after determining the Process ID (PID) of the prname parameter). A numeric value parameter (e.g. 0 or 1) may be communicated with the signal. An error is logged if the process is not found for signaling. Preferably, the store command data is maintained to LBX History, a log, or other useful storage for subsequent use. |
| 245 | S | Storing a container stores the container parameter to the system(s). The container may be a self contained object parameter, or pointer (e.g. path) to a file defining the container. Preferably, a certain destination is used to store it, or an additional parameter can be provided for where to store it. Store processing takes place as though the user manually launched it. Appropriate MS storage is updated and subsequently processed as though the user manually performed the store command. Preferably, the store cmd data is maintained to LBX History, a historical log, or other useful storage for subsequent use. In a preferred embodiment, information about who, when, why is additionally maintained with the stored container. |
| 247 | O | See Invoke Command for identical processing. |
| 249 | O | See Invoke Command for identical processing. |
| 251 | C | See Invoke Command for identical processing. |
| 253 | C | See Invoke Command for identical processing. |
| . . . | | |

*Fig. 72B-5*

| Operand ↓ | PM | Preferred embodiment Administrate processing |
|---|---|---|
| 201 | C | Administrating an auto-dial # launches a MS phone number log interface with the auto-dial # parameter for searching. Preferably, both the outgoing and incoming logs are searched. The auto-dial # parameter can be a wildcard (pattern) for matching. In one embodiment, all occurrences found in history are presented with their date/time stamps, log found in, and perhaps other information, of the call and when it took place. In another embodiment, the most recent occurrence from a particular log is presented, and perhaps in an interface which enables calling the # with a minimal user action. The search takes place as though the user manually launched the search, entered the auto-dial # for the search, and then was presented with the result(s) in an appropriate administration interface. Appropriate MS storage is updated and subsequently processed as though the user manually performed the search. Preferably, the administration cmd data is maintained to LBX History, a historical log, or other useful storage for subsequent use. Subsequent administration includes modifying the log entry(s) as desired (e.g. add a 1 prefix since caller id may not have maintained one when it is needed for auto-dial). A new parameter can be specified for which log(s) to search. |
| 203 | S | Administrating a weblink launches a search to MS browser history with the weblink parameter (and with the params parameter if specified) for searching. The weblink parameter can be a wildcard (pattern) for matching. In one embodiment, all occurrences found in history are presented with their date/time stamps, folder found in, and perhaps other information, of the link and when it was invoked. In another embodiment, the most recent occurrence from a particular invocation is presented, and perhaps in an interface which enables invoking (transposing to) the weblink with a minimal user action. The search takes place as though the user manually launched the search, entered the weblink for the search, and then was presented with the result(s) in an appropriate administration interface. Appropriate MS storage is updated and subsequently processed as though the user had manually performed the search. Preferably, the administration command data is maintained to LBX History, a historical log, or other useful storage for subsequent use. Subsequent administration includes modifying the weblink(s) as desired (e.g. change description). |

*Fig. 73B-1*

| Operand ↓ | PM | Preferred embodiment Administrate processing |
|---|---|---|
| 205 | C | Administrating an email causes searching a MS email system with search criteria of the email parameter string. The email parameter string can specify searching any email fields for any values including wildcarding (patterns for matching). Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. All occurrences found in history are presented with at least their date/time stamps, subject line, sender and recipient, and perhaps other information, of the email and when it took place. In another embodiment, the most recent occurrence from searched folders is presented, and perhaps in an interface which enables appropriate MS email system processing from that point forward (e.g. when processed at local MS). The search takes place as though the user manually launched the search, entered the criteria for the search, and then was presented with the result(s) in an appropriate administration interface. Appropriate MS storage is updated and subsequently processed as though the user had manually performed the search. Preferably, the administration command data is maintained to LBX History, a historical log, or other useful storage for subsequent use. Subsequent administration includes modifying the email(s) as desired, and perhaps having an option to send/resend. |

*Fig. 73B-2*

| Operand ↓ | PM | Preferred embodiment Administrate processing |
|---|---|---|
| 207 | C | Administrating an sms message causes searching a MS sms messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In the preferred embodiment, all occurrences found in history are presented with at least their date/time stamps, message, sender and recipient, and perhaps other information, of the message and when it took place. In another embodiment, the most recent occurrence from searched folders is presented, and perhaps in an interface which enables appropriate MS messaging system processing from that point forward (e.g. when processed at local MS). The search takes place as though the user manually launched the search, entered the criteria for the search, and then was presented with the result(s) in an appropriate administration interface. Appropriate MS storage is updated and subsequently processed as though the user had manually performed the search. Preferably, the administration command data is maintained to LBX History, a historical log, or other useful storage for subsequent use. Subsequent administration includes modifying the sms message(s) as desired, and perhaps having an option to send/resend. |

*Fig. 73B-3*

| Operand ↓ | PM | Preferred embodiment Administrate processing |
|---|---|---|
| 209 | C | Administrating a broadcast email causes searching a MS email system with search criteria of the email parameter string. The email parameter string can specify searching any email fields for any values including wildcarding. Each field is referenced with a predefined name and then associated with a search criteria. For example, the email string of "subj:'personnel';recip:'george@alltell.com';body:'reduction in force'" causes searching all emails with a subject containing "personnel" and was sent to "george@alltell.com" and has a message body containing the string "reduction in force". To search for certain email containers/folders, a sub-search criteria of "folders" is used (e.g. "folders:sent,inbox,company;" indicates to only search the email folders of sent, inbox, and company (no specification preferably indicates to search all folders)). Those skilled in the art recognize many useful syntaxes for searching any characteristics of email. Wildcarding (pattern matching) is preferably inherent by searching for substrings. In the preferred embodiment, all occurrences found in history are presented with at least their date/time stamps, subject line, sender and recipient, and perhaps other information, of the email and when it took place. In another embodiment, the most recent occurrence from searched folders is presented, and perhaps in an interface which enables appropriate MS email system processing from that point forward (e.g. when processed at local MS). The search takes place as though the user manually launched the search, entered the criteria for the search, and then was presented with the result(s) in an appropriate administration interface. Appropriate MS storage is updated and subsequently processed as though the user had manually performed the search. Preferably, the administration command data is maintained to LBX History, a historical log, or other useful storage for subsequent use. Subsequent administration includes modifying the email(s) as desired, and perhaps having an option to send/resend. |

*Fig. 73B-4*

| Operand ↓ | PM | Preferred embodiment Administrate processing |
|---|---|---|
| 211 | C | Administrating a broadcast sms message causes searching a MS sms messaging system with search criteria of the sms message parameter string. The message parameter string can specify searching any message fields for any values including wildcarding. Each field is referenced with a predefined name and then associated with a search criteria. For example, the sms message string of "recip:'2144034071@nextel.com,9725397137@lbxsrv.com';" causes searching all messages to the sought recipients. To search for certain messaging containers/folders, a sub-search criteria of "folders" is used (e.g. "folders:outgoing" indicates to only search the outgoing folder (no specification preferably indicates to search all folders)). Those skilled in the art recognize many useful syntaxes for searching any characteristics of messages. Wildcarding (pattern matching) is preferably inherent by searching for substrings. In the preferred embodiment, all occurrences found in history are presented with at least their date/time stamps, message, sender and recipient, and perhaps other information, of the message and when it took place. In another embodiment, the most recent occurrence from searched folders is presented, and perhaps in an interface which enables appropriate MS messaging system processing from that point forward (e.g. when processed at local MS). The search takes place as though the user manually launched the search, entered the criteria for the search, and then was presented with the result(s) in an appropriate administration interface. Appropriate MS storage is updated and subsequently processed as though the user had manually performed the search. Preferably, the administration command data is maintained to LBX History, a historical log, or other useful storage for subsequent use. Subsequent administration includes modifying the message(s) as desired, and perhaps having an option to send/resend. |
| 213 | O | See Find Command for identical processing this LBX release. |

*Fig. 73B-5*

| Operand ↓ | PM | Preferred embodiment Administrate processing |
|---|---|---|
| 215 | C | Administrating an application causes searching the MS for application (and with the params parameter if specified). The app parameter is preferably an executable name. Providing a more defined partial or full path to the application parameter will validate that it is found there. The app parameter string preferably supports wildcarding. In the preferred embodiment, all occurrences found on the MS and their paths are presented to the user with at least their date/time stamps, size, and perhaps attributes information. In another embodiment, all parts which are linked to the executable are identified with their paths, date/time stamps, size, and perhaps attributes when a symbol file is specified with a new parameter. The symbol file is output from a link process and can be used to identify all executable parts such as dynamic link libraries, linked binaries, and any other executable binary file involved with the application. The search takes place as though the user manually launched the search, entered the criteria for the search, and then was presented with the result(s) in an appropriate administration interface (e.g. a properties edit user interface). Appropriate MS storage is updated and subsequently processed as though the user had manually performed the search. Preferably, the administration command data is maintained to LBX History, a historical log, or other useful storage for subsequent use. Subsequent administration includes modifying the configuration, startup parameters, or any other environmental variables of the application. |
| 217 | S | See Compose Command for identical processing, except processing may take place locally and/or at privilege-providing remote MS(s) (system(s) parameter). |
| 219 | S | See Compose Command for identical processing, except processing may take place locally and/or at privilege-providing remote MS(s) (system(s) parameter). |
| 221 | O | See Compose Command for identical processing, except processing may take place locally and/or at privilege-providing remote MS(s) (system(s) parameter). |
| 223 | C | See Compose Command for identical processing, except processing may take place locally and/or at privilege-providing remote MS(s) (system(s) parameter). |
| 225 | O | See Invoke Command for identical processing this LBX release. |
| 227 | O | See Invoke Command for identical processing this LBX release. |
| 229 | S | See Invoke Command for identical processing this LBX release. |
| 231 | C | See Invoke Command for identical processing this LBX release. |
| 233 | S | See Invoke Command for identical processing this LBX release. |
| 235 | O | See Invoke Command for identical processing this LBX release. |
| 237 | O | See Invoke Command for identical processing this LBX release. |
| 239 | O | See Invoke Command for identical processing this LBX release. |

*Fig. 73B-6*

| Operand ↓ | PM | Preferred embodiment Administrate processing |
|---|---|---|
| 241 | S | See Compose Command for identical processing, except processing may take place locally and/or at privilege-providing remote MS(s) (system(s) parameter). |
| 243 | O | See Invoke Command for identical processing this LBX release. |
| 245 | S | See Compose Command for identical processing, except processing may take place locally and/or at privilege-providing remote MS(s) (system(s) parameter). |
| 247 | O | See Compose Command for identical processing, except processing may take place locally and/or at privilege-providing remote MS(s) (system(s) parameter). |
| 249 | O | See Compose Command for identical processing, except processing may take place locally and/or at privilege-providing remote MS(s) (system(s) parameter). |
| 251 | C | See Compose Command for identical processing, except processing may take place locally and/or at privilege-providing remote MS(s) (system(s) parameter). |
| 253 | C | See Compose Command for identical processing, except processing may take place locally and/or at privilege-providing remote MS(s) (system(s) parameter). |
| ... | | |

*Fig. 73B-7*

```
...
<home>
        ...
        <city>Moorestown</city>
        <state>New Jersey</state>
        ...
</home>
...
<interests >
basketball;programming;  running;  football
</interests>
...
<hangouts>
        ...
        <morning>Starbucks</morning>
        <lunch>Jammin's;Mongolian Barbeque</lunch>
        <evening>Confettis;Jimbos</evening>
        ...
</hangouts>
...
```

*Fig. 78*

```
.
.
.
typedef struct xml_node {
            struct xml_node     *descend1st; // Points to first descendant tag in XML doc
            struct xml_node     *peer_down;  // Points to same level tag down XML doc
            struct xml_node     *ascendant;  // Points to ascending tag in XML doc
            struct xml_node     *peer_up;    // Points to same level tag up XML doc
            char                 data_type;  // Type of data @ data pointer
            unsigned char       *data;       // Typecast-able pointer to data
            } XML_NODE;
.
.
.
XML_NODE  *Lprofile;     // Root node to XML doc tag tree for Local profile
.
.
.
XML_NODE  *Rprofile;     // Root node to XML doc tag tree for Remote/Received profile
.
.
.
```

| | appname | Application Description | Status |
|---|---|---|---|
| 8002a | source | Configurable MS ID | Registered |
| 8002b | profile | % and # operator object | Registered |
| 8002c | email | Electronic mail | Registered |
| 8002d | calendar | Electronic calendar | Registered |
| 8002e | ab | Electronic address book | Registered |
| 8002f | phone | Electronic phone | Registered |
| 8002g | emergency | Emergency use | Registered |
| 8002h | loc | LBX locational data sharing | Registered |
| 8002i | rfid | Radio Frequency Identification | Registered |
| 8002j | hotspot | Wifi/Wimax/Xan | Registered |
| 8002k | services | Published services for service propagation | Registered |
| 8002l | statistics | MS statistics (may be shared between MSs) | Registered |
| 8004a | traffic | Traffic Reports | RFP |
| 8004b | appliance | Appliance Control | RFP |
| 8004c | acctmgt | Account Management (ATM, Banking) | RFP |
| 8004d | transport | Public Transportation (Bus, Taxi, Air, Train) | RFP |
| 8004e | carpool | Automotive "car-pooling" | RFP |
| 8004f | advertise | Advertising | RFP |
| 8004g | news | News | RFP |
| 8004h | media | Video, Pictures | RFP |
| 8004i | parking | Parking lot awareness | RFP |
| 8006a | employ | Employment, Job Awareness | Presented |
| 8006b | real | Real Estate | Presented |
| 8008a | personal | Personal Use | Tabled |

| Field 1100k reference | Description |
|---|---|
| appfld.source.id.X | MS ID context sensitive default value (X in [email, phone, calendar, ab, rfid, ip (uses first), one for each candidate id for contextual elaboration of an Expression...]) |
| appfld.source.type | MS type |
| appfld.source.mfr | MS manufacturer |
| appfld.source.serno | MS serial number |
| appfld.source.ip | Current delimited (e.g. semicolon) IP address(es) of MS (may have > 1) |
| ... | ... |

8002b

| Field 1100k reference | Description |
|---|---|
| appfld.profile.contents | MS profile info (e.g.for % or # operator) |
| ... | ... |

8002c

| Field 1100k reference | Description |
|---|---|
| appfld.email.source | Primary MS email app sender ID |
| appfld.email.default.X | Email compose defaults wherein X in [attribute.Y such that Y in [cod, urgent, charcode, one for each settable attribute for email...], salutation, doctype, recips, encrypt, compress, one for each email default variable...] |
| appfld.email.type | Email app type/name |
| appfld.email.pending.X | Pending email in progress of being composed: X in [see .default.X fields above, cdt, content, one for each email variable...] |
| appfld.email.last.X.Y.Z | Last email sent (i.e. X = sent) or last email received (i.e. X = rcvd) to/from Y (Y in [ANY, {id} such that id specific source/destination (e.g. joe@yahoo.com)]; Z in [see .pending.X fields above] |
| ... | ... |

| Field 1100k reference | Description |
|---|---|
| appfld.ab.id | Override for AB identifer. |
| appfld.ab.default.X | AB entry compose defaults wherein X in [attribute.Y such that Y in [marker, color, font, size, one for each settable attribute for AB entry…], background, one for each AB entry default variable...] |
| appfld.ab.type | AB app type/name |
| appfld.ab.pending.X | Pending AB entry in progress of being composed: X in [see .default.X fields above, cdt, content, group, one for each AB entry variable...] |
| appfld.ab.last.X.Y.Z | Last AB entry created locally (i.e. X = local) or last AB entry received (i.e. X = other) to/from Y (Y in [ANY, {id} such that id specific source/destination (e.g. MSID4F3EB2398)]; Z in [see .pending.X fields above] |
| … | … |

8002d

| Field 1100k reference | Description |
|---|---|
| appfld.calendar.id | Calendar id override. |
| appfld.calendar.next.X | MS calendar next entry data X |
| appfld.calendar.nextavail.X | MS calendar app next available free slots |
| appfld.calendar.default.X | Calendar entry compose defaults wherein X in [attribute.Y such that Y in [cod, urgent, color, one for each settable attribute for calendar entry…], recips, camp, one for each calendar entry default variable...] |
| appfld.calendar.sched.X | MS calendar schedule for period X (X in [curweek, curmonth, curyear, etc]) |
| appfld.calendar.type | MS calendar app type/name |
| appfld.calendar.pending.X | Pending calendar entry in progress of being composed: X in [see .default.X fields above, cdt, content, date/time(s), recurring, one for each calendar entry variable...] |
| appfld.calendar.last.X.Y.Z | Last calendar entry created locally (i.e. X = local) or last calendar entry received (i.e. X = other) to/from Y (Y in [ANY, {id} such that id specific source/destination (e.g. joe@yahoo.com)]; Z in [see .pending.X fields above] |
| … | |

| Field 1100k reference | Description |
|---|---|
| appfld.phone.id | MS phone app primary caller id |
| appfld.phone.default.X | Phone call defaults wherein X in [volume, encrypt, compress, camp, one for each phone application default variable...] |
| appfld.phone.caller | MS phone app caller id override |
| appfld.phone.log.X | MS phone app log file X (X in [out, in, missed, one for each log…]) |
| appfld.phone.record.X | MS phone app record boolean for calls made, calls received, or specific numbers (e.g. MS IDs) |
| appfld.phone.ogm | MS phone app OGM |
| appfld.phone.dt.X | Date/time stamp for X (X in [tx (last call made), rx (last call received), missed (last call missed)]) |
| appfld.phone.type | MS phone app type/name |
| appfld.phone.fwd | MS phone app forwarding setting for prioritized list. A prioritized list automatically tries the next entry if there is no answer or a failed outbound connection. |
| appfld.phone.ring | Ring setting = ring tone selection reference OR audio file reference. |
| appfld.phone.vibe | Vibration setting = None OR reference for vibration type. |
| appfld.phone.droplocs | MS phone dropped locations |
| appfld.phone.macro.X | Automated macros for ARU interfaces |
| appfld.phone.pwd.X | MS phone passwords for allowing calls to complete and for variable processing by caller. |
| appfld.phone.msg.X | Phone messages (new, saved, etc) |
| appfld.phone.blackout | MS phone blackout conditions (expressions including application in use, date/time(s), current location(s), any MS detectable condition) |
| appfld.phone.pending.X | Pending phone call: X in [see .default.X fields above, cdt, data, one for each phone call app variable...]; data is only present for peer to peer MS phone calls (it carries the voice call). |
| appfld.phone.last.X.Y.Z | Last phone call made (i.e. X = out) or last call received (i.e. X = in) to/from Y (Y in [ANY, {id} such that id specific source/destination (e.g. MSID4F3EB2398)]; Z in [see .pending.X fields above, edt] |
| … | |

| Field 1100k reference | Description |
|---|---|
| appfld.emergency.type | Emergency type (Police, Fire, Amber, Help, Caution, etc) |
| appfld.emergency.cdt | Emergency create date/time stamp |
| appfld.emergency.duration | Emergency anticipated duration |
| appfld.emergency.content.X | Emergency content.X (X in [type, alert, prefmeth, one field for each alert content section…]) |
| appfld.emergency.method.X | MS emergency notify method X (X in [attribute.Y, how, where]) |
| appfld.emergency.last.X | Last emergency WDR data: X in [self, other]. |
| … | … |

8002h

| Field 1100k reference | Description |
|---|---|
| appfld.loc.blackout | Blackout criteria |
| appfld.loc.mode | Current MS mode |
| appfld.loc.geofence.X | MS configured geofence data |
| appfld.loc.halo.X | MS configured interest perimeter |
| appfld.loc.mark.X | X = # of saved location marks Y |
| appfld.loc.dcdb.X | Location activated delivery content for MS ID X |
| appfld.loc.beacon.X | Beacon a peer MS at the peer MS; Sending MS controls what is seen by receiving MS |
| … | … |

8002i

| Field 1100k reference | Description |
|---|---|
| appfld.rfid.id | Deaults appfld.source.id.rfid. |
| appfld.rfid.passive.X | MS Passive RFI capability |
| appfld.rfid.active.X | MS Active RFI capability |
| appfld.rfid.listen.X | Active RFID listening channel directions |
| appfld.rfid.seek.X | Passive RFID polling channel directions |
| … | … |

8002j

| Field 1100k reference | Description |
|---|---|
| appfld.hotspot.listen | Listening boolean |
| appfld.hotspot.X | X number of Hotspot(s) (the information) automatically detected over time |
| … | … |

8002k

| Field 1100k reference | Description |
|---|---|
| appfld.services.X | LN-expanse dynamic services information |
| … | … |

| | |
|---|---|
| S1 | R1 |
| S2 | R2 |
| S3 | R3 |
| S4 | R4 |
| S5 | R5 |
| S6 | R6 |

9654

| | | |
|---|---|---|
| sent date/time$_1$ | sender$_1$ | subject$_1$ |
| sent date/time$_2$ | sender$_2$ | subject$_2$ |
| sent date/time$_3$ | sender$_3$ | subject$_3$ |
| sent date/time$_4$ | sender$_4$ | subject$_4$ |
| sent date/time$_5$ | sender$_5$ | subject$_5$ |
| sent date/time$_6$ | sender$_6$ | subject$_6$ |

9656

| | |
|---|---|
| S5 | R5 |
| S3 | R3 |
| S2 | R2 |
| S1 | R1 |
| S6 | R6 |
| S4 | R4 |

9658

| | | |
|---|---|---|
| sent date/time$_5$ | sender$_5$ | subject$_5$ |
| sent date/time$_3$ | sender$_3$ | subject$_3$ |
| sent date/time$_2$ | sender$_2$ | subject$_2$ |
| sent date/time$_1$ | sender$_1$ | subject$_1$ |
| sent date/time$_6$ | sender$_6$ | subject$_6$ |
| sent date/time$_4$ | sender$_4$ | subject$_4$ |

*Fig. 96B*

SYSTEM AND METHOD FOR PRESENTING APPLICATION DATA BY DATA PROCESSING SYSTEM(S) IN A VICINITY

CROSS-REFERENCES TO RELATED APPLICATIONS

This application is a continuation of application Ser. No. 12/590,831 filed Nov. 13, 2009 and entitled "System and Method for Location Based Exchanges of Data Facilitating Distributed Locational Applications" which is a continuation in part of application Ser. No. 12/287,064 filed Oct. 3, 2008 and entitled "System and Method for Location Based Exchanges of Data Facilitating Distributed Locational Applications" which is a continuation in part of application Ser. No. 12/077,041 filed Mar. 14, 2008 and entitled "System and Method for Location Based Exchanges of Data Facilitating Distributed Locational Applications". This application contains an identical specification to Ser. No. 12/590,831 except for the title, abstract, and claims.

FIELD OF THE INVENTION

The present disclosure relates generally to location based services for mobile data processing systems, and more particularly to location based exchanges of data between distributed mobile data processing systems for locational applications. A common connected service is not required for location based functionality and features. Location based exchanges of data between distributed mobile data processing systems enable location based features and functionality in a peer to peer manner.

BACKGROUND OF THE INVENTION

The internet has exploded with new service offerings. Websites yahoo.com, google.com, ebay.com, amazon.com, and iTunes.com have demonstrated well the ability to provide valuable services to a large dispersed geographic audience through the internet (ebay, yahoo, google, amazon and iTunes (Apple) are trademarks of the respective companies). Thousands of different types of web services are available for many kinds of functionality. Advantages of having a service as the intermediary point between clients, users, and systems, and their associated services, includes centralized processing, centralized maintaining of data, for example to have an all knowing database for scope of services provided, having a supervisory point of control, providing an administrator with access to data maintained by users of the web service, and other advantages associated with centralized control. The advantages are analogous to those provided by the traditional mainframe computer to its clients wherein the mainframe owns all resources, data, processing, and centralized control for all users and systems (clients) that access its services. However, as computers declined in price and adequate processing power was brought to more distributed systems, such as Open Systems (i.e. Windows, UNIX, Linux, and Mac environments), the mainframe was no longer necessary for many of the daily computing tasks. In fact, adequate processing power is incorporated in highly mobile devices, various handheld mobile data processing systems, and other mobile data processing systems. Technology continues to drive improved processing power and data storage capabilities in less physical space of a device. Just as Open Systems took much of the load of computing off of mainframe computers, so to can mobile data processing systems offload tasks usually performed by connected web services. As mobile data processing systems are more capable, there is no need for a service to middleman interactions possible between them.

While a centralized service has its advantages, there are also disadvantages. A service becomes a clearinghouse for all web service transactions. Regardless of the number of threads of processing spread out over hardware and processor platforms, the web service itself can become a bottleneck causing poor performance for timely response, and can cause a large amount of data that must be kept for all connected users and/or systems. Even large web services mentioned above suffer from performance and maintenance overhead. A web service response will likely never be fast enough. Additionally, archives must be kept to ensure recovery in the event of a disaster because the service houses all data for its operations. Archives also require storage, processing power, planning, and maintenance. A significantly large and costly data center is necessary to accommodate millions of users and/or systems to connect to the service. There is a tremendous amount of overhead in providing such a service. Data center processing power, data capacity, data transmission bandwidth and speed, infrastructure entities, and various performance considerations are quite costly. Costs include real estate required, utility bills for electricity and cooling, system maintenance, personnel to operate a successful business with service(s), etc. A method is needed to prevent large data center costs while eliminating performance issues for features sought. It is inevitable that as users are hungry for more features and functionality on their mobile data processing systems, processing will be moved closer to the device for optimal performance and infrastructure cost savings.

Service delivered location dependent content was disclosed in U.S. Pat. Nos. 6,456,234; 6,731,238; 7,187,997 (Johnson). Anonymous location based services was disclosed in U.S. PTO Publication 2006/0022048 (Johnson). The Johnson patents and published application operate as most web services do in that the clients connecting to the service benefit from the service by having some connectivity to the service. U.S. Publication 2006/0022048 (Johnson) could cause large numbers of users to inundate the service with device heartbeats and data to maintain, depending on the configurations made. While this may be of little concern to a company that has successfully deployed substantially large web service resources, it may be of great concern to other more frugal companies. A method is needed for enabling location dependent features and functionality without the burden of requiring a service.

Users are skeptical about their privacy as internet services proliferate. A service by its very nature typically holds information for a user maintained in a centralized service database. The user's preferences, credential information, permissions, customizations, billing information, surfing habits, and other conceivable user configurations and activity monitoring, can be housed by the service at the service. Company insiders, as well as outside attackers, may get access. Most people are concerned with preventing personal information of any type being kept in a centralized database which may potentially become compromised from a security standpoint. Location based services are of even more concern, in particular when the locations of the user are to be known to a centralized service. A method and system is needed for making users comfortable with knowing that their personal information is at less risk of being compromised.

A reasonable requirement is to push intelligence out to the mobile data processing systems themselves, for example, in knowing their own locations and perhaps the locations of other nearby mobile data processing systems. Mobile data processing systems can intelligently handle many of their own application requirements without depending on some remote service. Just as two people in a business organization should not need a manager to speak to each other, no two mobile data processing systems should require a service middleman for useful location dependent features and functionality. The knowing of its own location should not be the end of social interaction implementation local to the mobile data processing systems, but rather the starting place for a large number of useful distributed local applications that do not require a service.

Different users use different types of Mobile data processing Systems (MSs) which are also called mobile devices: laptops, tablet computers, Personal Computers (PCs), Personal Digital Assistants (PDAs), cell phones, automobile dashboard mounted data processing systems, shopping cart mounted data processing systems, mobile vehicle or apparatus mounted data processing systems, Personal Navigational Devices (PNDs), iPhones (iPhone is a trademark of Apple, Inc.), various handheld mobile data processing systems, etc. MSs move freely in the environment, and are unpredictably moveable (i.e. can be moved anywhere, anytime). Many of these Mobile data processing Systems (MSs) do not have capability of being automatically located, or are not using a service for being automatically located. Conventional methods use directly relative stationary references such as satellites, antennas, etc. to locate MSs. Stationary references are expensive to deploy, and risk obsolescence as new technologies are introduced to the marketplace. Stationary references have finite scope of support for locating MSs.

While the United States E911 mandate for cellular devices documents requirements for automatic location of a Mobile data processing System (MS) such as a cell phone, the mandate does not necessarily promote real time location and tracking of the MSs, nor does it define architecture for exploiting Location Based Services (LBS). We are in an era where Location Based Services (LBS), and location dependent features and functionality, are among the most promising technologies in the world. Automatic locating of every Mobile data processing System (MS) is an evolutionary trend. A method is needed to shorten the length of time for automatically locating every MS. Such a goal can be costly using prior art technologies such as GPS (Global Positioning System), radio wave triangulation, coming within range to a known located sensor, or the like. Complex system infrastructure, or added hardware costs to the MSs themselves, make such ventures costly and time constrained by schedules and costs involved in engineering, construction, and deployment.

A method is needed for enabling users to get location dependent features and functionality through having their mobile locations known, regardless of whether or not their MS is equipped for being located. Also, new and modern location dependent features and functionality can be provided to a MS unencumbered by a connected service.

BRIEF SUMMARY OF THE INVENTION

LBS (Location Based Services) is a term which has gained in popularity over the years as MSs incorporate various location capability. The word "Services" in that terminology plays a major role in location based features and functionality involving interaction between two or more users. This disclosure introduces a new terminology, system, and method referred to as Location Based eXchanges (LBX). LBX is an acronym used interchangeably/contextually throughout this disclosure for the singular term "Location Based Exchange" and for the plural term "Location Based Exchanges", much the same way LBS is used interchangeably/contextually for the single term "Location Based Service" and for the plural term "Location Based Services". LBX describes leveraging the distributed nature of connectivity between MSs in lieu of leveraging a common centralized service nature of connectivity between MSs. The line can become blurred between LBS and LBX since the same or similar features and functionality are provided, and in some cases strengths from both may be used. The underlying architectural shift differentiates LBX from LBS for depending less on centralized services, and more on distributed interactions between MSs. LBX provide server-free and server-less location dependent features and functionality.

Disclosed are many different aspects to LBX, starting with the foundation requirement for each participating MS to know, at some point in time, their own whereabouts. LBX is enabled when an MS knows its own whereabouts. It is therefore a goal to first make as many MSs know their own whereabouts as possible. When two or more MSs know their own whereabouts, LBX enables distributed locational applications whereby a server is not required to middleman social interactions between the MSs. The MSs interact as peers. LBX disclosed include purely peer to peer interactions, peer to peer interactions for routing services, peer to peer interactions for delivering distributed services, and peer to peer interactions for location dependent features and functionality (e.g. a first mobile data processing system sends directly (e.g. wirelessly) to a second mobile data processing system without using an intervening data processing system). One embodiment of an LBX enabled MS is referred to as an lbxPhone™.

It is an advantage herein to have no centralized service governing location based features and functionality among MSs. Avoiding a centralized service prevents performance issues, infrastructure costs, and solves many of the issues described above. No centralized service also prevents a user's information from being kept in one accessible place. LBS contain centralized data that is personal in nature to its users. This is a security concern. Having information for all users in one place increases the likelihood that a disaster to the data will affect more than a single user. LBX spreads data out across participating systems so that a disaster affecting one user does not affect any other user.

It is an advantage herein for enabling useful distributed applications without the necessity of having a service, and without the necessity of users and/or systems registering with a service. MSs interact as peers in preferred embodiments, rather than as clients to a common service (e.g. internet connected web service).

It is an advantage herein for locating as many MSs as possible in a wireless network, and without additional deployment costs on the MSs or the network. Conventional locating capability includes GPS (Global Positioning System) using stationary orbiting satellites, improved forms of GPS, for example AGPS (Adjusted GPS) and DGPS (Differential GPS) using stationary located ground stations, wireless communications to stationary located cell tower base stations, TDOA (Time Difference of Arrival) or AOA (Angle of Arrival) triangulation using stationary located antennas, presence detection in vicinity of a stationary located antenna, presence detection at a wired connectivity stationary network location, or other conventional locating systems and methods. Mobile data processing systems, referred to as Indirectly Located Mobile data processing systems (ILMs), are automatically located using automatically detected locations of Directly Located Mobile data processing systems (DLMs) and/or automatically detected locations of other ILMs. ILMs are provided with the ability to participate in the same LBS, or LBX, as a DLM (Directly Located Mobile data processing system). DLMs are located using conventional locating capability mentioned above. DLMs provide reference locations for automatically locating ILMs, regardless of where any one is currently located. DLMs and ILMs can be highly mobile, for example when in use by a user. There are a variety of novel methods for automatically locating ILMs, for example triangulating an ILM (Indirectly Located Mobile data processing system) location using a plurality of DLMs, detecting the ILM being within the vicinity of at least one DLM, triangulating an ILM location using a plurality of other ILMs, detecting the ILM being within the vicinity of at least one other ILM, triangulating an ILM location using a mixed set of DLM(s) and ILM(s), determining the ILM location from heterogeneously located DLMs and/or ILMs, and other novel methods.

MSs are automatically located without using direct conventional means for being automatically located. The conventional locating capability (i.e. conventional locating methods) described above is also referred to as direct methods. Conventional methods are direct methods, but not all direct methods are conventional. There are new direct techniques disclosed below. Provided herein is an architecture, as well as systems and methods, for immediately bringing automatic location detection to every MS in the world, regardless of whether that MS is equipped for being directly located. MSs without capability of being directly located are located by leveraging the automatically detected locations of MSs that are directly located. This is referred to as being indirectly located. An MS which is directly located is hereinafter referred to as a Directly Located Mobile data processing system (DLM). For a plural acronym, MSs which are directly located are hereinafter referred to as Directly Located Mobile data processing systems (DLMs). MSs without capability of being directly located are located using the automatically detected locations of MSs that have already been located. An MS which is indirectly located is hereinafter referred to as an Indirectly Located Mobile data processing system (ILM). For a plural acronym, MSs which are indirectly located are hereinafter referred to as Indirectly Located Mobile data processing systems (ILMs). A DLM can be located in the following ways:

A) New triangulated wave forms;

B) Missing Part Triangulation (MPT) as disclosed below;

C) Heterogeneous direct locating methods;

D) Assisted Direct Location Technology (ADLT) using a combination of direct and indirect methods;

E) Manually specified; and/or

F) Any combinations of A) through E);

DLMs provide reference locations for automatically locating ILMs, regardless of where the DLMs are currently located. It is preferable to assure an accurate location of every DLM, or at least provide a confidence value of the accuracy. A confidence value of the accuracy is used by relative ILMs to determine which are the best set (e.g. which are of highest priority for use to determine ILM whereabouts) of relative DLMs (and/or ILMs) to use for automatically determining the location of the ILM.

In one example, the mobile locations of several MSs are automatically detected using their local GPS chips. Each is referred to as a DLM. The mobile location of a non-locatable MS is triangulated using radio waves between it and three (3) of the GPS equipped DLMs. The MS becomes an ILM upon having its location determined relative the DLMs. ILMs are automatically located using DLMs, or other already located ILMs. An ILM can be located in the following ways:

G) Triangulating an ILM location using a plurality of DLMs with wave forms of any variety (e.g. AOA, TDOA, MPT (a heterogeneous location method));

H) Detecting the ILM being within the reasonably close vicinity of at least one DLM;

I) Triangulating an ILM location using a plurality of other ILMs with wave forms of any variety;

J) Detecting the ILM being within the reasonable close vicinity of at least one other ILM;

K) Triangulating an ILM location using a mixed set of DLM(s) and ILM(s) with wave forms of any variety (referred to as ADLT);

L) Determining the ILM location from heterogeneously located DLMs and/or ILMs (i.e. heterogeneously located, as used here, implies having been located relative different location methodologies);

M) A) through F) Above; and/or

N) Any combinations of A) through M).

Locating functionality may leverage GPS functionality, including but not limited to GPS, AGPS (Adjusted GPS), DGPS, (Differential GPS), or any improved GPS embodiment to achieve higher accuracy using known locations, for example ground based reference locations. The NexTel GPS enabled iSeries cell phones provide excellent examples for use as DLMs (Nextel is a trademark of Sprint/Nextel). Locating functionality may incorporate triangulated locating of the MS, for example using a class of Radio Frequency (RF) wave spectrum (cellular, WiFi (some WiFi embodiments referred to as WiMax), bluetooth, etc), and may use measurements from different wave spectrums for a single location determination (depends on communications interface(s) 70 available). A MS may have its whereabouts determined using a plurality of wave spectrum classes available to it (cellular, WiFi, bluetooth, etc). The term "WiFi" used throughout this disclosure also refers to the industry term "WiMax". Locating functionality may include in-range proximity detection for detecting the presence of the MS. Wave forms for triangulated locating also include microwaves, infrared wave spectrum relative infrared sensors, visible light wave spectrum relative light visible light wave sensors, ultraviolet wave spectrum relative ultraviolet wave sensors, X-ray wave spectrum relative X-ray wave sensors, gamma ray wave spectrum relative gamma ray wave sensors, and longwave spectrum (below AM) relative longwave sensors. While there are certainly more common methods for automatically locating a MS (e.g. radio wave triangulation, GPS, in range is proximity detection), those skilled in the art recognize there are methods for different wave spectrums being detected, measured, and used for carrying information between data processing systems.

Kubler et al (U.S. PTO publications 2004/0264442, 2004/0246940, 2004/0228330, 2004/0151151) disclosed methods for detecting presence of mobile entities as they come within range of a sensor. In Kubler et al, accuracy of the location of the detected MS is not well known, so an estimated area of the whereabouts of the MS is enough to accomplish intended functionality, for example in warehouse installations. A confidence value of this disclosure associated with Kubler et al tends to be low (i.e. not confident), with lower values for long range sensors and higher values for short range sensors.

GPS and the abundance of methods for improving GPS accuracy has led to many successful systems for located MSs with high accuracy. Triangulation provides high accuracies for locating MSs. A confidence value of this disclosure associated with GPS and triangulating location methods tends to be high (i.e. confident). It is preferred that DLMs use the highest possible accuracy method available so that relative ILMs are well located. Not all DLMs need to use the same location methods. An ILM can be located relative DLMs, or other ILMs, that each has different locating methodologies utilized.

Another advantage herein is to generically locate MSs using varieties and combinations of different technologies. MSs can be automatically located using direct conventional methods for accuracy to base on the locating of other MSs. MSs can be automatically located using indirect methods. Further, it is an advantage to indirectly locate a MS relative heterogeneously located MSs. For example, one DLM may be automatically located using GPS. Another DLM may be automatically located using cell tower triangulation. A third DLM may be automatically located using within range proximity. An ILM can be automatically located at a single location, or different locations over time, relative these three differently located DLMs. The automatically detected location of the ILM may be determined using a form of triangulation relative the three DLMs just discussed, even though each DLM had a different direct location method used. In a preferred embodiment, industry standard IEEE 802.11 WiFi is used to locate (triangulate) an ILM relative a plurality of DLMs (e.g. TDOA in one embodiment). This standard is prolific among more compute trended MSs. Any of the family of 802.11 wave forms such is as 802.11a, 802.11b, 802.11g, or any other similar class of wave spectrum can be used, and the same spectrum need not be used between a single ILM and multiple DLMs. 802.x used herein generally refers to the many 802.whatever variations.

Another advantage herein is to make use of existing marketplace communications hardware, communications software interfaces, and communications methods and location methods where possible to accomplish locating an MS relative one or more other MSs. While 802.x is widespread for WiFi communications, other RF wave forms can be used (e.g. cell phone to cell tower communications). In fact, any wave spectrum for carrying data applies herein. Of course, any protocol(s) may be involved in embodiments of the disclosures (e.g. TDMA, CDMA, H.323, SIP, 2G, 3G, ip phone, digital, analog, spectrum frequency, etc).

Still another advantage is for support of heterogeneous locatable devices. Different people like different types of devices as described above. Complete automation of locating functionality can be provided to a device through local automatic location detection means, or by automatic location detection means remote to the device. Also, an ILM can be located relative a laptop, a cell phone, and a PDA (i.e. different device types).

Yet another advantage is to prevent the unnecessary storing of large amounts of positioning data for a network of MSs. Keeping positioning data for knowing the whereabouts of all devices can be expensive in terms of storage, infrastructure, performance, backup, and disaster recovery. A preferred embodiment simply uses a distributed approach to determining locations of MSs without the overhead of an all-knowing database maintained somewhere. Positions of MSs can be determined “on the fly” without storing information in a master database. However, there are embodiments for storing a master database, or a subset thereof, to configurable storage destinations, when it makes sense. A subset can be stored at a MS.

Another advantage includes making use of existing location equipped MSs to expand the network of locatable devices by locating non-equipped MSs relative the location of equipped MSs. MSs themselves help increase dimensions of the locatable network of MSs. The locatable network of MSs is referred to as an LN-Expanse (i.e. Location-Network Expanse). An LN-Expanse dynamically grows and shrinks based on where MSs are located at a particular time. For example, as users travel with their personal MSs, the personal MSs themselves define the LN-Expanse since the personal MSs are used to locate other MSs. An ILM simply needs location awareness relative located MSs (DLMs and/or ILMs).

Yet another advantage is a MS interchangeably taking on the role of a DLM or ILM as it travels. MSs are chameleons in this regard, in response to location technologies that happen to be available. A MS may be equipped for DLM capability, but may be in a location at some time where the capability is inoperable. In these situations the DLM takes on the role of an ILM. When the MS again enters a location where it can be a DLM, it automatically takes on the role of the DLM. This is very important, in particular for emergency situations. A hiker has a serious accident in the mountains which prevents GPS equipped DLM capability from working. Fortunately, the MS automatically takes on the role of an ILM and is located within the vicinity of neighboring (nearby) MSs. This allows the hiker to communicate his location, operate useful locational application functions and features at his MS, and enable emergency help that can find him.

It is a further advantage that MS locations be triangulated using any wave forms (e.g. RF, microwaves, infrared, visible light, ultraviolet, X-ray, gamma ray). X-ray and gamma ray applications are special in that such waves are harmful to humans in short periods of times, and such applications should be well warranted to use such wave forms. In some medical embodiments, micro-machines may be deployed within a human body. Such micro-machines can be equipped as MSs. Wave spectrums available at the time of deployment can be used by the MSs for determining exact positions when traveling through a body.

It is another advantage to use TDOA (Time Difference Of Arrival), AOA (Angle Of Arrival), and Missing Part Triangulation (MPT) when locating a MS. TDOA uses time information to determine locations, for example for distances of sides of a triangle. AOA uses angles of arrival to antennas to geometrically assess where a MS is located by intersecting lines drawn from the antennas with detected angles. MPT is disclosed herein as using combinations of AOA and TDOA to determine a location. Exclusively using all AOA or exclusively using all TDOA is not necessary. MPT can be a direct method for locating MSs.

Yet another advantage is to locate MSs using Assisted Direct Location Technology (ADLT). ADLT is disclosed herein as using direct (conventional) location capability together with indirect location capability to confidently determine the location of a MS.

Still another advantage is to permit manual specification for identifying the location of a MS (a DLM). The manual location can then in turn be used to facilitate locating other MSs. A user interface may be used for specification of a DLM location. The user interface can be local, or remote, to the DLM. Various manual specification methods are disclosed. Manual specification is preferably used with less mobile MSs, or existing MSs such as those that use dodgeball.com (trademark of Google). The confidence value depends on how the location is specified, whether or not it was validated, and how it changes when the MS moves after being manually set. Manual specification should have limited scope in an LN-expanse unless inaccuracies can be avoided.

Another advantage herein is locating a MS using any of the methodologies above, any combinations of the methodologies above, and any combinations of direct and/or indirect location methods described.

Another advantage is providing synergy between different locating technologies for smooth operations as an MS travels. There are large numbers of methods and combinations of those methods for keeping an MS informed of its whereabouts. Keeping an MS informed of its whereabouts in a timely manner is critical in ensuring LBX operate optimally, and for ensuring nearby MSs without certain locating technologies can in turn be located.

It is another advantage for locating an MS with multiple location technologies during its travels, and in using the best of breed data from multiple location technologies to infer a MS location confidently. Confidence values are associated with reference location information to ensure an MS using the location information can assess accuracy. A DLM is usually an "affirmifier". An affirmifier is an MS with its whereabouts information having high confidence of accuracy and can serve as a reference for other MSs. An ILM can also be an affirmifier provided there is high confidence that the ILM location is known. An MS (e.g. ILM) may be a "pacifier". A pacifier is an MS having location information for its whereabouts with a low confidence for accuracy. While it can serve as a reference to other ILMs, it can only do so by contributing a low confidence of accuracy.

It is another advantage for providing user customization of confidence values based on the user's experience. A MS user may completely rely on the MS system settings for setting confidence values, or may "tweak" location technology confidence values to accommodate experiences with particular location technologies that have been encountered during travels.

It is an advantage to synergistically make use of the large number of locating technologies available to prevent one particular type of technology to dominate others while using the best features of each to assess accurate mobile locations of MSs.

A further advantage is to leverage a data processing system with capability of being located for co-locating another data processing system without any capability of being located. For example, a driver owns an older model automobile, has a useful second data processing system in the automobile without means for being automatically located. The driver also own a cell phone, called a first data processing system, which does have means for being automatically located. The location of the first data processing system can be shared with the second data processing system for locating the second data processing system. Further still, the second data processing system without means for being automatically located is located relative a first set (plurality) of data processing systems which are not at the same location as the second data processing system. So, data processing systems are automatically located relative at least one other data processing which can be automatically located.

Another advantage is a LBX enabled MS includes a service informant component for keeping a supervisory service informed. This prevents an MS from operating in total isolation, and prevents an MS from operating in isolation with those MSs that are within its vicinity (e.g. within maximum range 1306) at some point in time, but to also participate when the same MSs are great distances from each other. There are LBX which would fit well into an LBS model, but a preferred embodiment chooses to use the LBX model. For example, multiple MS users are seeking to carpool to and from a common destination. The service informant component can perform timely updates to a supervisory service for route comparisons between MSs, even though periods of information are maintained only at the MSs. For example, users find out that they go to the same church with similar schedules, or coworkers find out they live nearby and have identical work schedules. The service informant component can keep a service informed of MS whereabouts to facilitate novel LBX applications. The service informant can also be configured for: communicating directly to another MS, communicating to a data processing system through a propagateable service, invoking a "plug-in" home grown interface, alerting the MS user with a specified alert, or invoking an atomic command used by charter processing.

It is a further advantage in leveraging the vast amount of MS WiFi/WiMax deployment underway in the United States. More widespread WiFi/WiMax availability enhances the ability for well performing peer to peer types of features and functionality disclosed.

It is a further advantage to prevent unnecessary established connections from interfering with successfully triangulating a MS position. As the MS roams and encounters various wave spectrum signals, that is all that is required for determining the MS location. Broadcast signaling contains the necessary location information for automatically locating the MS.

Yet another advantage is to leverage Network Time Protocol (NTP) for eliminating bidirectional communications in determining Time of Arrival (TOA) and TDOA (Time Difference Of Arrival) measurements (TDOA as used in the disclosure generally refers to both TOA and TDOA). NTP enables a single unidirectional transmission of data to carry all that is necessary in determining TDOA, provided the sending data processing system and the receiving data processing system are NTP synchronized to an adequate granulation of time.

A further advantage is for making available to remote peer MSs certain MS operating system resources such as memory, storage, semaphores, application data, or the like, according to permissions. A single MS can access and use operating system resources of another MS, for example in charter processing. Also, semaphore controlled synchronization of processing can be achieved over a network, or plurality, of peer MSs without a common server to synchronize the processing.

It is an advantage of this disclosure to provide a competing superior alternative to server based mobile technologies such as that of U.S. Pat. Nos. 6,456,234; 6,731,238; 7,187,997; and U.S. PTO Publication 2006/0022048 (Johnson). It is also an advantage to leverage both LBX technology and LBS technology in the same MS in order to improve the user experience. The different technologies can be used to complement each other in certain embodiments.

A further advantage herein is to leverage existing "usual communications" data transmissions for carrying new data that is ignored by existing MS processing, but observed by new MS processing, for carrying out processing maximizing location functions and features across a large geography. Alternatively, new data can be transmitted between systems for the same functionality.

It is an advantage herein in providing peer to peer service propagation. ILMs are provided with the ability to participate in the same Location Based Services (LBS) or other services as DLM(s) in the vicinity. An MS may have access to services which are unavailable to other MSs. Any MS can share its accessible services for being accessible to any other MS, preferably in accordance with permissions. For example, an MS without internet access can get internet access via an MS in the vicinity with internet access. In a preferred embodiment, permissions are maintained in a peer to peer manner prior to lookup for proper service sharing. In another embodiment, permissions are specified and used at the time of granting access to the shared services. Once granted for sharing, services can be used in a mode as if the sharing user is using the services, or in a mode as if the user accepting the share is a new user to the service. Routing paths are dynamically reconfigured and transparently used as MSs travel. Hop counts dynamically change to strive for a minimal number of hops for an MS getting access to a desirable service. Route communications depend on where the MS needing the service is located relative a minimal number of hops through other MSs to get to the service. Services can be propagated from DLMs to DLMs, DLMs to ILMs, ILMs to DLMs, or ILMs to ILMs.

Services otherwise unavailable to a first MS (or MS user) in the LN-Expanse become available through another MS which does have access to the service. A plurality of MSs may facilitate the connection (e.g. hops) from the first MS to the last MS which publishes the service and has access to the service. MSs can access needed services through MSs in the vicinity when necessary. A service directory is shared and propagated between MSs so that the superset of services in a LN-Expanse are made available to any one MS in the LN-Expanse regardless of current MS conditions, whereabouts, capability, or an inability to connect to a desired service. A service route is minimized for best performance even with highly mobile MSs by minimizing a number of hops between MSs to reach a service.

It is another advantage herein for providing peer to peer permissions, authentication, and access control. A service is not necessary for maintaining credentials and permissions between MSs. Permissions are maintained locally to a MS. In a centralized services model, a database can become massive in size when searching for needed permissions. Permission searching and validation of U.S. PTO Publication 2006/0022048 (Johnson) was costly in terms of database size and performance. There was overhead in maintaining who owned the permission configuration for every permission granted. Maintaining permissions locally, as described below, reduces the amount of data to represent the permission because the owner is understood to be the personal user of the MS. Additionally, permission searching is very fast because the MS only has to search its local data for permissions that apply to only its MS.

Yet another advantage is to provide a nearby, or nearness, status using a peer to peer system and method, rather than intelligence maintained in a centralized database for all participating MSs. There is lots of overhead in maintaining a large database containing locations of all known MSs. This disclosure removes such overhead through using nearby detection means of one MS when in the vicinity of another MS. There are varieties of controls for governing how to generate the nearby status. In one aspect, a MS automatically calls the nearby MS thereby automatically connecting the parties to a conversation without user interaction to initiate the call. In another aspect, locally maintained configurations govern functionality when MSs are newly nearby, or are newly departing being nearby. Nearby status, alerts, and queries are achieved in a LBX manner.

It is yet another advantage for automatic call forwarding, call handling, and call processing based on the whereabouts of a MS, or whereabouts of a MS relative other MSs. The nearness condition of one MS to another MS can also affect the automatic call forwarding functionality.

Yet another advantage herein is for peer to peer content delivery and local MS configuration of that content. Users need no connectivity to a service. Users make local configurations to enjoy location based content delivery to other MSs. Content is delivered under a variety of circumstances for a variety of configurable reasons. Content maintained local to an MS is delivered asynchronously to other MSs for nearby alerts, arrival or departure to and from geofenced areas, and other predicated conditions of nearby MSs. While it may appear there are LBS made available to users of MSs, there are in fact LBX being made available to those users.

Another advantage herein is a LBX enabled MS can operate in a peer to peer manner to data processing systems which control environmental conditions. For example, automobile equipped (or driver kept) MSs encounter an intersection having a traffic light. Interactions between the MSs at the intersection and a data processing system in the vicinity for controlling the traffic light can automatically override light color changing for optimal traffic flow. In another embodiment, a parking lot search by a user with an MS is facilitated as he enters the parking lot, and in accordance with parking spaces currently occupied. In general, other nearby data processing systems can have their control logic processed for a user's preferences (as defined in the MS), a group of nearby user's preferences, and/or situational locations (see U.S. Pat. Nos. 6,456,234; 6,731,238; 7,187,997 (Johnson) for "situational location" terminology) of nearby MSs.

Another advantage herein is an MS maintains history of hotspot locations detected for providing graphical indication of hotspot whereabouts. This information can be used by the MS user in guiding where a user should travel in the future for access to services at the hotspot. Hotspot growth prevents a database in being timely configured with new locations. The MS can learn where hotspots are located, as relevant to the particular MS. The hotspot information is instantly available to the MS.

A further advantage is for peer to peer proximity detection for identifying a peer service target within the MS vicinity. A peer service target can be acted upon by an MS within range, using an application at the MS. The complementary whereabouts of the peer service target and MS automatically notify the user of service availability. The user can then use the MS application for making a payment, or for performing an account transfer, account deposit, account deduction, or any other transaction associated with the peer service target.

Yet another advantage is for a MS to provide new self management capability such as automatically marking photographs taken with location information, a date/time stamp, and who was with the person taking the picture.

Yet another advantage is being alerted to nearby people needing assistance and nearby fire engines or police cars that need access to roads.

A further advantage is providing a MS platform for which new LBX features and functionality can be brought quickly to the marketplace. The platform caters to a full spectrum of users including highly technical software developers, novice users, and users between those ranges. A rich programming environment is provided wherein whereabouts (WDR) information interchanged with other MSs in the vicinity causes triggering of privileged actions configured by users. The programming environment can be embedded in, or "plugged into", an existing software development environment, or provided on its own. A syntax may be specified with source code statements, XML, SQL database definitions, a datastream, or any other derivative of a well defined BNF grammar. A user friendly configuration environment is provided wherein whereabouts information interchanged with other MSs in the vicinity causes triggering of privileged actions configured by users. The platform is an event based environment wherein WDRs containing certain configured sought information are recognized at strategic processing paths for causing novel processing of actions. Events can be defined with complex expressions, and actions can be defined using homegrown executables, APIs, scripts, applications, a set of commands provided with the LBX platform, or any other executable processing. The LBX platform includes a variety of embodiments for charter and permission definitions including an internalized programmatic form, a SQL database form, a data record form, a datastream form, and a well defined BNF grammar for deriving other useful implementations (e.g. lex and yacc).

It is an advantage for permissions and/or charters to be configured in anticipation of every possible future travel, situation, environment, application, or condition of a MS (or MS user), or a plurality of related (by permissions and charters) MSs (or MS users). It is powerful in how permissions and charters configured in advance of anticipated events reveal novel unpredictably timed automated actions and application behavior for novel uses.

It is another advantage to support a countless number of privileges that can be configured, managed, and processed in a peer to peer manner between MSs. Any peer to peer feature or set of functionality can have a privilege associated to it for being granted from one user to another. It is also an advantage for providing a variety of embodiments for how to manage and maintain privileges in a network of MSs.

It is another advantage to support a complete set of options for charters that can be configured, managed, and processed in a peer to peer manner between MSs. Charters can become effective under a comprehensive set of conditions, expressions, terms, and operators. It is also an advantage for providing a variety of embodiments for how to manage and maintain charters in a network of MSs. Charters themselves can be self modifying for changing permissions or charters "on the fly" (i.e. during charter processing).

It is a further advantage for providing multithreaded communications of permission and charter information and transactions between MSs for well performing peer to peer interactions. Any signal spectrum for carrying out transmission and reception is candidate, depending on the variety of MS. In fact, different signaling wave spectrums, types, and protocols may be used in interoperating communications, or even for a single transaction, between MSs.

It is yet another advantage for increasing the range of the LN-expanse from a wireless vicinity to potentially infinite vicinity through other data processing (e.g. routing) equipment. While wireless proximity is used for governing automatic location determination, whereabouts information may be communicated between MSs great distances from each other provided there are privileges and/or charters in place making such whereabouts information relevant for the MS. Whereabouts information of others will not be maintained unless there are privileges in place to maintain it. Whereabouts information may not be shared with others if there have been no privileges granted to a potential receiving MS. Privileges can provide relevance to what whereabouts (WDR) information is of use, or should be processed, maintained, or acted upon.

Another advantage is to provide a MS which can be user configured for any desired behavior based on location, whereabouts, and "in the vicinity" conditions for the MS and/or its peer MSs during travels. A user has infinite control over providing a processing "character" for the MS. Also, various MS applications are generically supported with integrated locational based features and functionality. Charters may be used to automatically perform: MS configuration and system variable setting, clip-board and paste operations, MS input and output control, automatic communications with other MSs or data processing systems, enabling/disabling a feature or service, and many other features.

Another advantage is for using a convenient user interface such as map navigation for generating a map term such as a point, point and radius, or set of points defining area(s) on a map which is conveniently referenced in a charter configuration and later processed for replacement. For example, a user makes selection(s) on a map, and location information is automatically generated for the selection(s). The user can assign a convenient name to the location information without knowing details of the location information itself. The user can then reference the name for completely specifying the associated location information details. Also, the user may use WDR search criteria for determining a map term, the WDR found being one originated from the MS of map term creation or that of a peer MS. Recent whereabouts of a WDR found (e.g. from queue 22), or past whereabouts of a WDR found (e.g. history 30) may be used. Queue 22 may be viewed as maintaining a short term history, while history 30 may be viewed as maintaining a longer term history. Specifying locations in charter configurations can be tedious. Map terms provide the user with a simple user interface method to specify locations, and for hiding complexities of how the location was determined and generated for charter use. In some embodiments, map terms are used in broader scope by permitting any substitution where referenced. In some embodiments, map terms are used in broader scope by permitting "special terms" to be automatically created by a user by simply selecting a MS on a map.

It is an advantage for a convenient "charters starters" user interface for browsing, enabling, disabling, and maintaining charters depending on application, categories, or useable/clone-able snippets of the charters. For example, a MS may come prepackaged with many charters which have been organized and marked for particular applications and categories. The user can search, find, manage and enable/disable a set of charters based on their application or category, and can clone charter subsets for creating new charters. A MS user may manage his own charters, or charters of privilege granting others, using the charters starters interfaces. The user is also able to search, find, manage and enable/disable a set of charters based on any criteria found in the charter definitions themselves. A knowledgeable or authorized user may organize charters as he sees fit, for example to assign charters to categories and applications. The charter starters user interface organizes charters in easily identifiable groups (e.g. folders, categories, applications, etc) and provides simplicity for enabling, disabling and organizing any desired sets of complex charter configurations.

It is an advantage in providing application term triggered processing to the LBX platform described, and for all users and skill sets thereof. A rich programming environment and user friendly configuration environment is provided wherein application data which becomes modified causes triggering of privileged actions configured by users. The programming environment can be embedded in, or "plugged into", an existing software development environment, or provided on its own. A syntax may be specified with source code statements, XML, SQL database definitions, a datastream, or any other derivative of the disclosed BNF grammar. The platform is an event based environment wherein events of modifying application data containing configured sought values/information are recognized for triggering processing of actions. Events can be defined with complex expressions, and actions can be defined using homegrown executables, APIs, scripts, applications, a set of commands provided with the LBX platform, or any other executable processing. The LBX platform includes a variety of embodiments as described.

Another advantage is providing a comprehensive palette of paste commands for pasting LBX data into data entry fields, snapshot images, or one or more video stream frames. Data can be accessed and used for pasting from: queue 22; history 30; statistics 14; service directory 16; atomic terms; map terms; WDRTerm data; AppTerm data; any term or construct of the LBX BNF grammar; data describing current, past or future LBX data; averages of MS or LBX data; data derived from MSs in the vicinity (e.g. nearby); and data sensed, received, sent, processed, analyzed, or predicted at the MS. Data being pasted may be converted prior to the paste as a user requests. The user may adjust the paste data appearance (font, size, color, or any other appearance characteristic) prior to finalizing the paste action.

Yet another advantage is providing "plug-in" application support so that an application can be integrated conveniently into the LBX architecture and framework through Prefix Registry Records 5300. Application data and executable interfaces are "plugged in". Application data is made accessible to charter processing for conditional and configurable event based charter processing. Various "plug-in" systems and methods are described. The LBX platform is designed to integrate well with MS applications of all varieties for a cohesive architecture.

Another advantage is for tightly coupling/integrating LBX processing configuration and processing into a programming environment for a WPL in context of a rich PPL. LBX processing can be a "plug-in" to PPLs, or may be integrated into the PPL syntax for a rich WPL. There are a variety of systems and methods described for a comprehensive LBX platform.

It is an advantage for facilitating the creation of charters that make sense in context of a particular MS application by automating suggestions. Special terms and atomic operands are determined for an application context, and candidate charters and/or portions thereof are presented for use to the user based on being derived from the special terms and atomic operands determined for the application context. A user's effort in creating charters for a particular application context is minimized with ready-made charters or charter portions that are automatically determined to be relevant for the particular application context. Upon being presented with suggestions, the user can select, or select and "tweak" to a desired charter configuration. The user can also configure privileges that are in context of the application or the charters selected.

It is an advantage for automatically comparing MS data profile information for matches for triggering conditional actions of charters. Users can configure data which is beaconed to other MSs and then compared for matches for automated charter processing. MSs are automated with social interaction to other MSs so that MS users are alerted of MS users of interest in the vicinity for a variety of applications.

It is an advantage for transmitting application data fields to peer MSs in the vicinity, receiving application data fields from peer MSs in the vicinity, transmitting application data fields to data processing systems in the vicinity in a peer to peer manner, and receiving application data fields from data processing systems in the vicinity in a peer to peer manner for interoperability of a diverse set of applications and automated triggered processing thereof, while not using an application server to middle-man the data (e.g. MSs communicate with each other directly and wirelessly as peers). Application data fields shared between peer data processing systems (e.g. MSs) are preferably additionally available at a MS as AppTerm data (see below). A user has control for disabling or enabling which application data fields are shared. Privileges configured between MSs enforce desired effects for processing the data on MSs which send or receive the data.

A further advantage is to provide MSs with a wealth of location based enhanced applications without requiring a service. It is also an advantage to not require a service for geo-fence alerts, proactive content delivery, and nearby alerts, for example as described by server based U.S. patent pending Ser. No. 11/207,080 ("System and Method for Anonymous Location Based Services", Johnson). Herein, alert processing, geo-fences and content is maintained at a MS for a) being processed at the MS when interacting directly with peer MSs; and b) being shared with peer MSs for being processed at peer MSs. Better performance of processing content delivery and providing alerts is achieved because it occurs at the MSs without any interoperability to some "middleman" service.

Another advantage is in leveraging the multi-threaded and wireless multi-wave, multi-frequency and multi-channel capability of the disclosed MS for RFID and RDS integration. RFID and RDS interfaces fit nicely in the LBX framework as described below.

A further advantage is for the MS to automatically, or upon user request, analyze a picture, or video stream frame, for the purpose of more confidently determining a MS location. User configurations are used to drive desired processing.

Another advantage is for thoroughly maintaining and managing statistics and history information at a MS. Many options are supported for how, where, and when to save such information.

A further advantage is to provide Sudden Proximal User Interfaces (SPUIs) at a MS when detecting other data processing systems in the vicinity (e.g. another MS, a RFID device, a data processing system emulating a MS, or any other data processing system). A SPUI is a GUI for notifying a MS user that a remote data processing system of interest is in the vicinity, based on configured "in the vicinity" conditions. Presenting the SPUI at the MS can be triggered by charter configurations, application term (AppTerm) trigger configurations, or RFID trigger configurations. There are many applications for SPUI processing for saving MS users time from MS user interface interactions for common tasks, for example appliance and device interfaces. Authentication can be automated. Also, SPUIs save data from previous executions for defaulting data in a subsequent execution thereby preventing the burdening of a MS user from re-entering data to the MS that was already entered once previously. There are many applications that fit within the SPUI framework, some of which are described below.

Another advantage is for providing a user with the ability to manually request to send/transmit outbound data with options for customizing, such as: a WDR, a derivative of a WDR, a subset of a WDR, a user configured set of data, or any customized set of data. If a WDR or derivative/subset thereof is to be sent, the WDR may first be searched for at the MS with user specified search criteria and/or transmitted outbound according to user specified transmission criteria.

It is an advantage to provide a task monitor/trace interface for examining MS task status for current and past system states. The task monitor interface permits convenient contextual charter creation as desired by the user based on task status findings.

It is an advantage for providing generic application record sorting based on: MS whereabouts, whereabouts of a particular MS, whereabouts of others in the vicinity, or other WDR search criteria for sorting WDRs maintained at the MS where the sort is requested.

Another advantage is for providing one or more vicinity monitors for indicating MSs of interest that are nearby. The multi-threaded MS supports a plurality of vicinity monitors. A MS user configures criteria/conditions (i.e. expression) for a vicinity monitor for being compared to WDR information as it is received at the MS. The expression result (True/False)

determines whether or not the MS that originated the WDR is to be monitored within the particular vicinity monitor. A polling or asynchronous event (e.g. as WDRs received) design may be used.

Another advantage is for automatic inventory management processing for inventory items that are in the vicinity of a MS at some point in time. A MS user can move to the whereabouts of particular items he desires to keep an inventory of for automatically managing the inventory by counting the current stock, performing orders for stocking, and tracking an order. The MS user can configure payment information for automatic order processing. Inventory items are enabled for inventory management in having an associated data processing system (e.g. (RFID tag, affixed/integrated MS, etc). A MS user can manually perform an order using the automatically determined inventory count information, or the order can be scheduled for automatic ordering (e.g. using a calendar entry). Inventory items can be ordered individually or as a group, perhaps as part of a group hierarchy. Typical uses are for managing the life of a typical MS user: products stocked in kitchen pantry, refrigerator, freezer, closet, office, bathrooms, laundry room, office supply closet, or other areas of a MS user's home, office or place of work.

Another advantage is for providing a MS user with a convenient resource mapping of privileges and charters between identities. For example, it could be tedious figuring out all the privileges, grants and charters which are granted to one MS user, and then granting those same rights to another MS user. Such a task is error prone and time consuming. Resource mapper functionality is provided wherein all rights (e.g. privileges) of one identifier can be assigned to another identifier in a single operation. The same rights can subsequently be removed as a single operation. A MS user has the ability to model granting privileges and charters to an identity (e.g. group), and then assign all of those, or remove all of those, in a single operation to other identifiers.

A further advantage is for different applications to be correlated through cross application addressing so that features or contexts of one application can be used to automatically affect features or contexts of another application. Identifiers used in context of one application are correlated to another application form. For example, an email application recipient address is correlated to the phone application caller id for the same MS in order to instantly (upon user request) show all emails associated to a person on an active phone call. The correlation occurs transparently without needing to know addressing details. There can be many identifier forms for correlation for a single MS depending on an application in use.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number, except that reference numbers 1 through 99 may be found on the first 4 drawings of FIGS. 1A through 1D, and FIG. 1F. Dashed outlines (e.g. process blocks, data record fields) may be used in the drawings to highlight, or indicate optional embodiments, for example depending on MS performance considerations. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

BRIEF DESCRIPTION OF THE DRAWINGS

There is no guarantee that there are descriptions in this specification for explaining every novel feature found in the drawings. The present disclosure will be described with reference to the accompanying drawings, wherein:

FIG. 9A depicts a table for illustrating heterogeneously locating a MS;

FIGS. 30A through 30B depict a preferred embodiment BNF grammar for variables, variable instantiations and common grammar for BNF grammars of permissions, groups and charters;

FIG. 30C depicts a preferred embodiment BNF grammar for permissions and groups;

FIGS. 30D through 30E depict a preferred embodiment BNF grammar for charters;

FIGS. 31A through 31E depict a preferred embodiment set of command and operand candidates for Action Data Records (ADRs) facilitating discussing associated parameters of the ADRs of the present disclosure;

FIG. 33A depicts a preferred embodiment American National Standards Institute (ANSI) X.409 encoding of the BNF grammar of FIGS. 30A through 30B for variables, variable instantiations and common grammar for BNF grammars of permissions and charters;

FIG. 33B depicts a preferred embodiment ANSI X.409 encoding of the BNF grammar of FIG. 30C for permissions and groups;

FIGS. 33C-1 and 33C-2 (both hereinafter referred to as FIG. 33C) depict a preferred embodiment ANSI X.409 encoding of the BNF grammar of FIGS. 30D through 30E for charters;

FIGS. 34A through 34G depict preferred embodiment C programming source code header file contents, derived from the grammar of FIGS. 30A through 30E;

FIG. 49A depicts an illustration for preferred permission data characteristics in the present disclosure LBX architecture;

FIG. 49B depicts an illustration for preferred charter data characteristics in the present disclosure LBX architecture;

FIG. 51A depicts an example of a source code syntactical encoding embodiment of permissions, derived from the grammar of FIGS. 30A through 30E;

FIG. 51B depicts an example of a source code syntactical encoding embodiment of charters, derived from the grammar of FIGS. 30A through 30E;

FIG. 52 depicts another preferred embodiment C programming source code header file contents, derived from the grammar of FIGS. 30A through 30E;

FIG. 54 depicts an example of an XML syntactical encoding embodiment of permissions and charters, derived from the BNF grammar of FIGS. 30A through 30E;

FIGS. 63B-1 through 63B-7 depicts a matrix describing how to process some varieties of the Send command;

FIG. 64A depicts a flowchart for describing a preferred embodiment of a procedure for Notify command action processing;

FIGS. 64B-1 through 64B-4 depicts a matrix describing how to process some varieties of the Notify command;

FIG. 64C depicts a flowchart for describing one embodiment of a procedure for Notify command action processing, as derived from the processing of FIG. 64A;

FIG. 65A depicts a flowchart for describing a preferred embodiment of a procedure for Compose command action processing;

FIGS. 65B-1 through 65B-7 depicts a matrix describing how to process some varieties of the Compose command;

FIG. 65C depicts a flowchart for describing one embodiment of a procedure for Compose command action processing, as derived from the processing of FIG. 65A;

FIG. 66A depicts a flowchart for describing a preferred embodiment of a procedure for Connect command action processing;

FIGS. 66B-1 through 66B-2 depicts a matrix describing how to process some varieties of the Connect command;

FIG. 66C depicts a flowchart for describing one embodiment of a procedure for Connect command action processing, as derived from the processing of FIG. 66A;

FIG. 67A depicts a flowchart for describing a preferred embodiment of a procedure for Find command action processing;

FIGS. 67B-1 through 67B-13 depicts a matrix describing how to process some varieties of the Find command;

FIG. 67C depicts a flowchart for describing one embodiment of a procedure for Find command action processing, as derived from the processing of FIG. 67A;

Figure 68A:
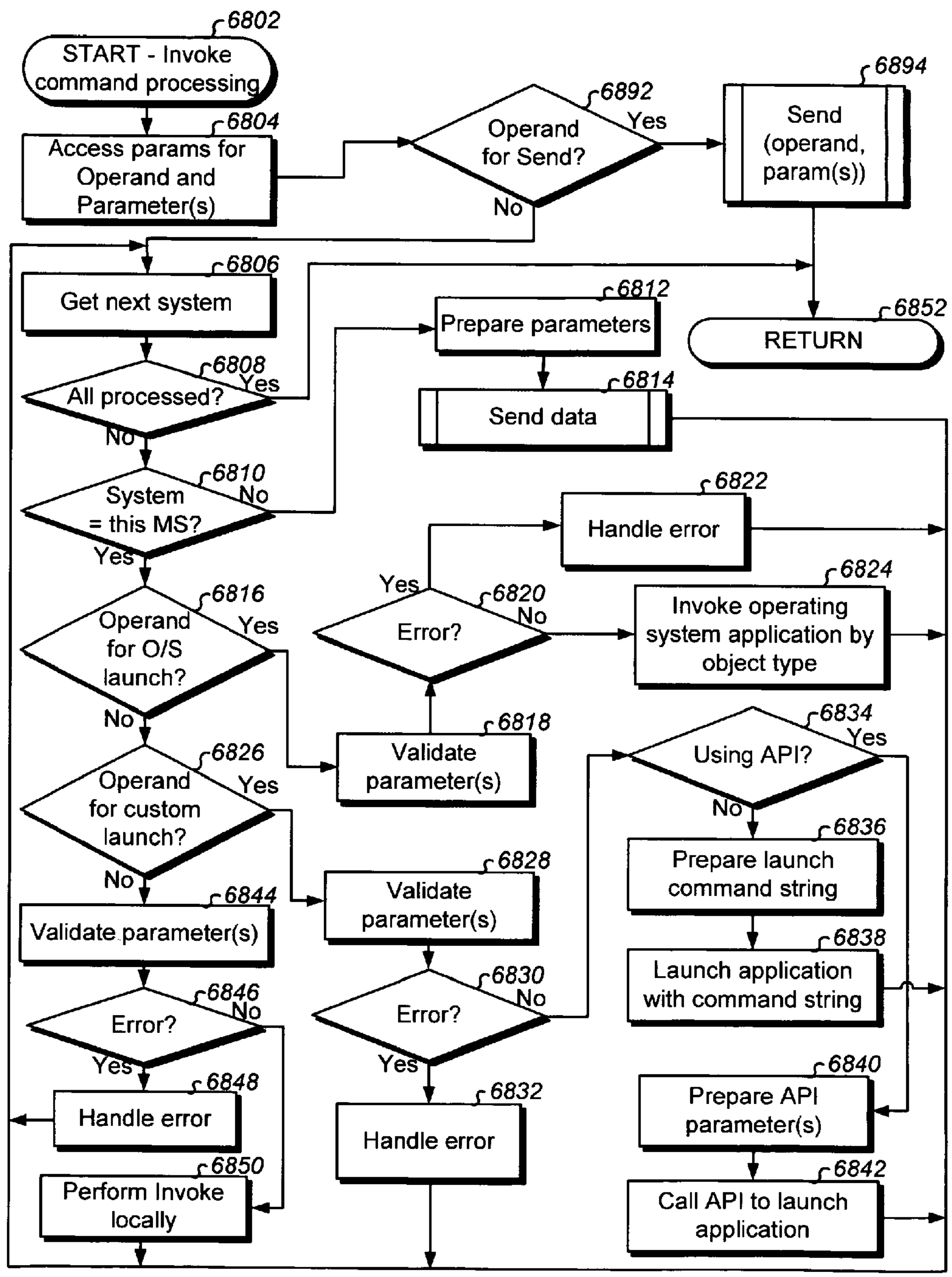
Figure 68C:
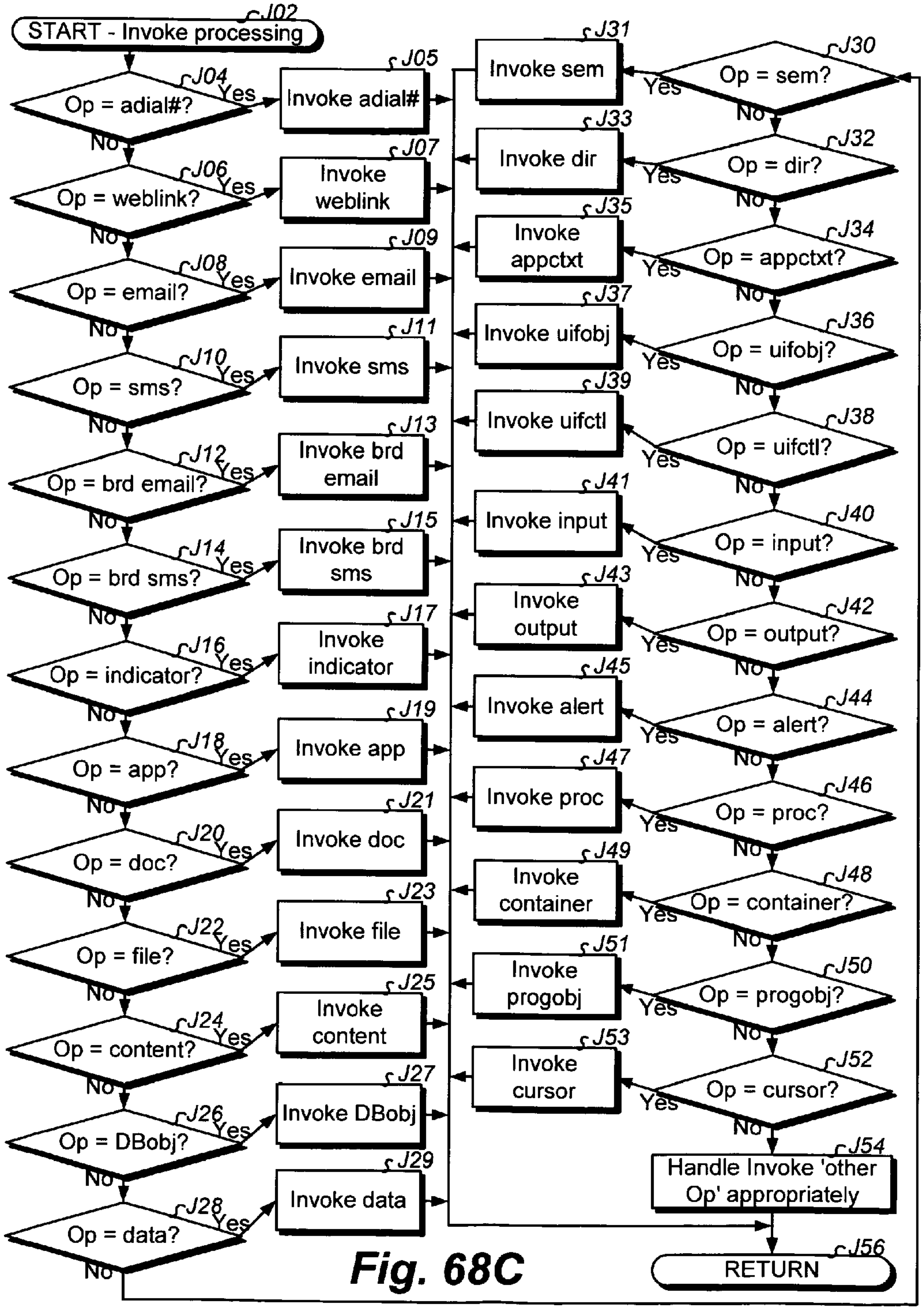
Figure 69A:
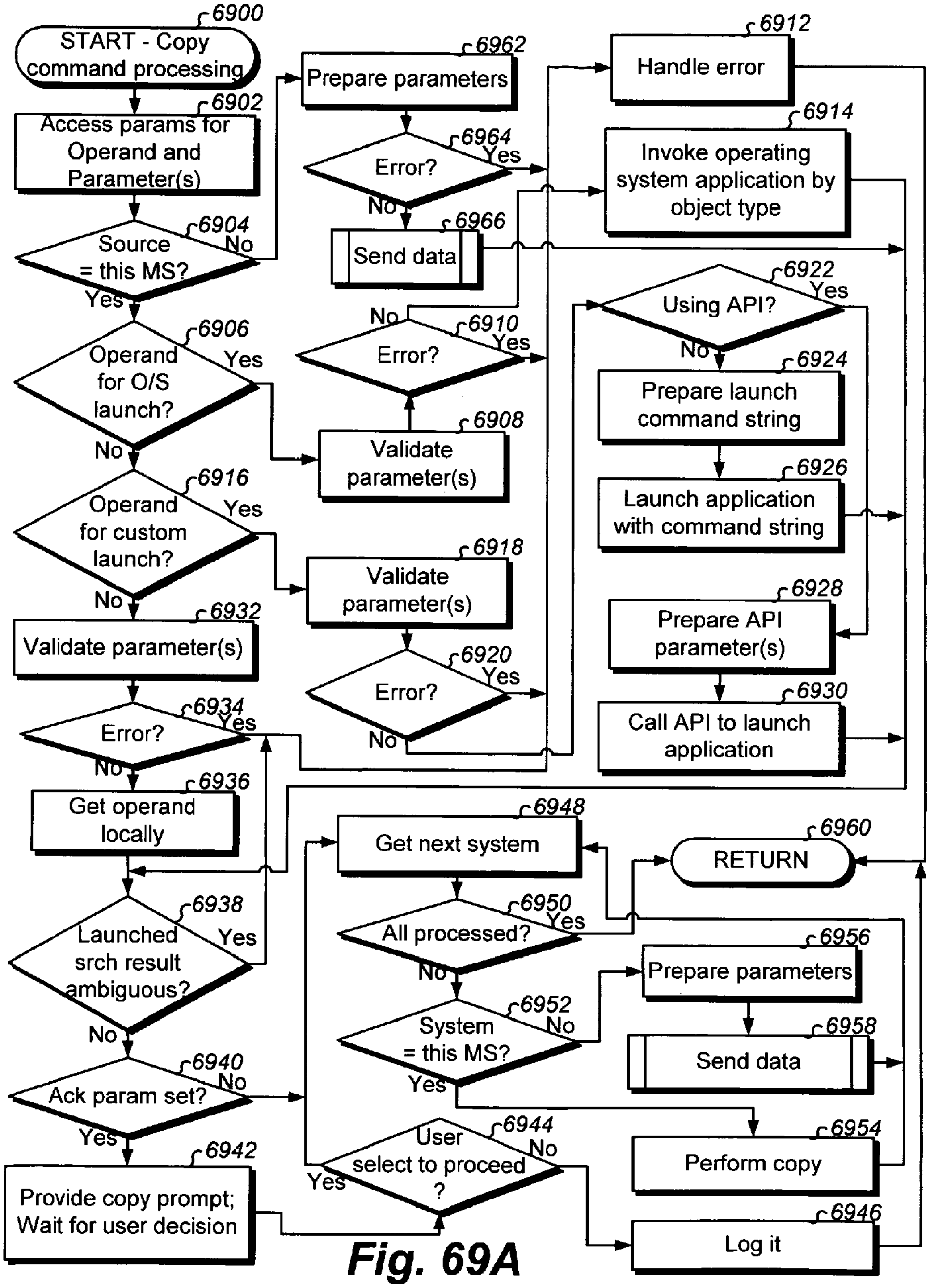
Figure 69C:
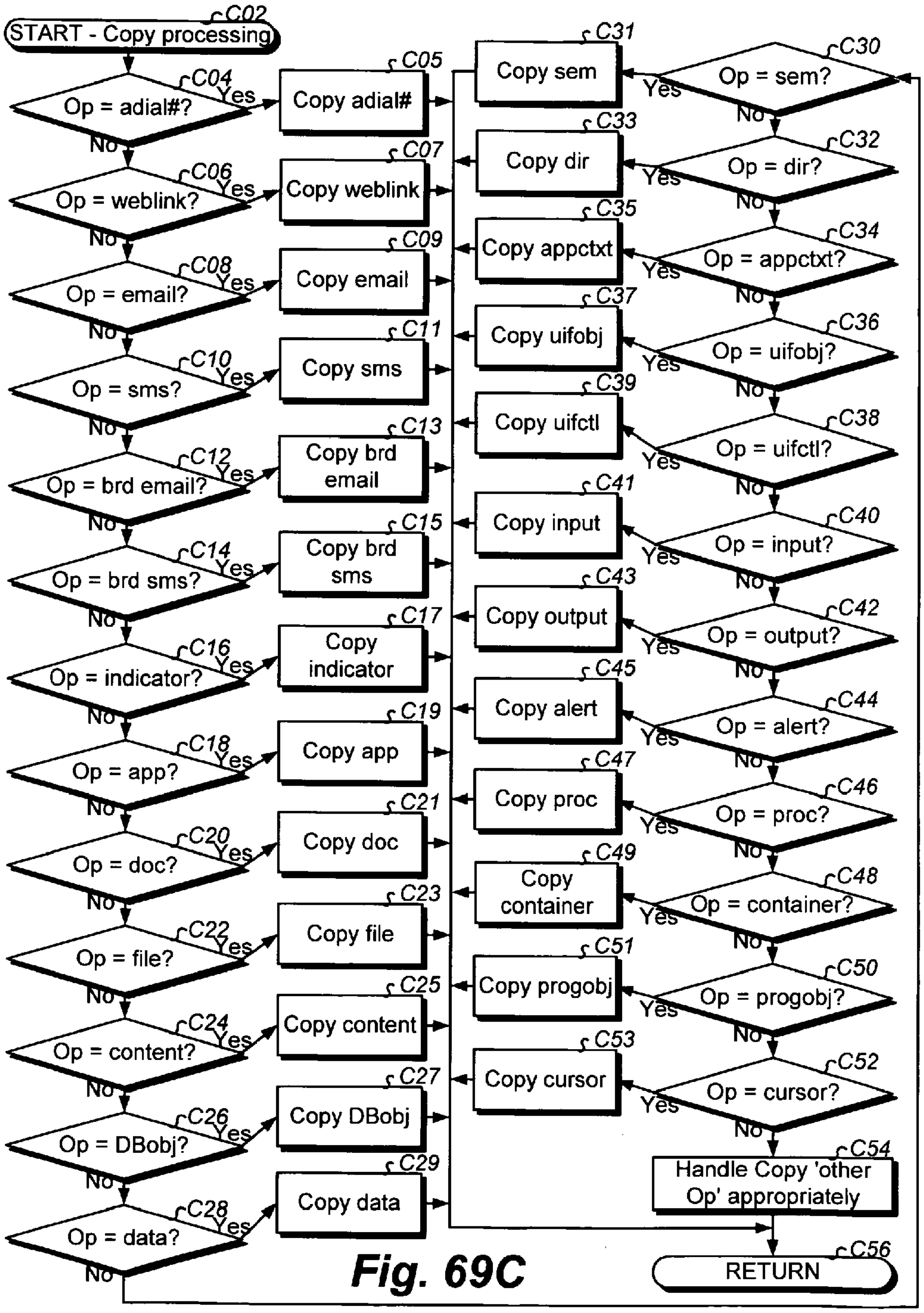
Figure 70A:
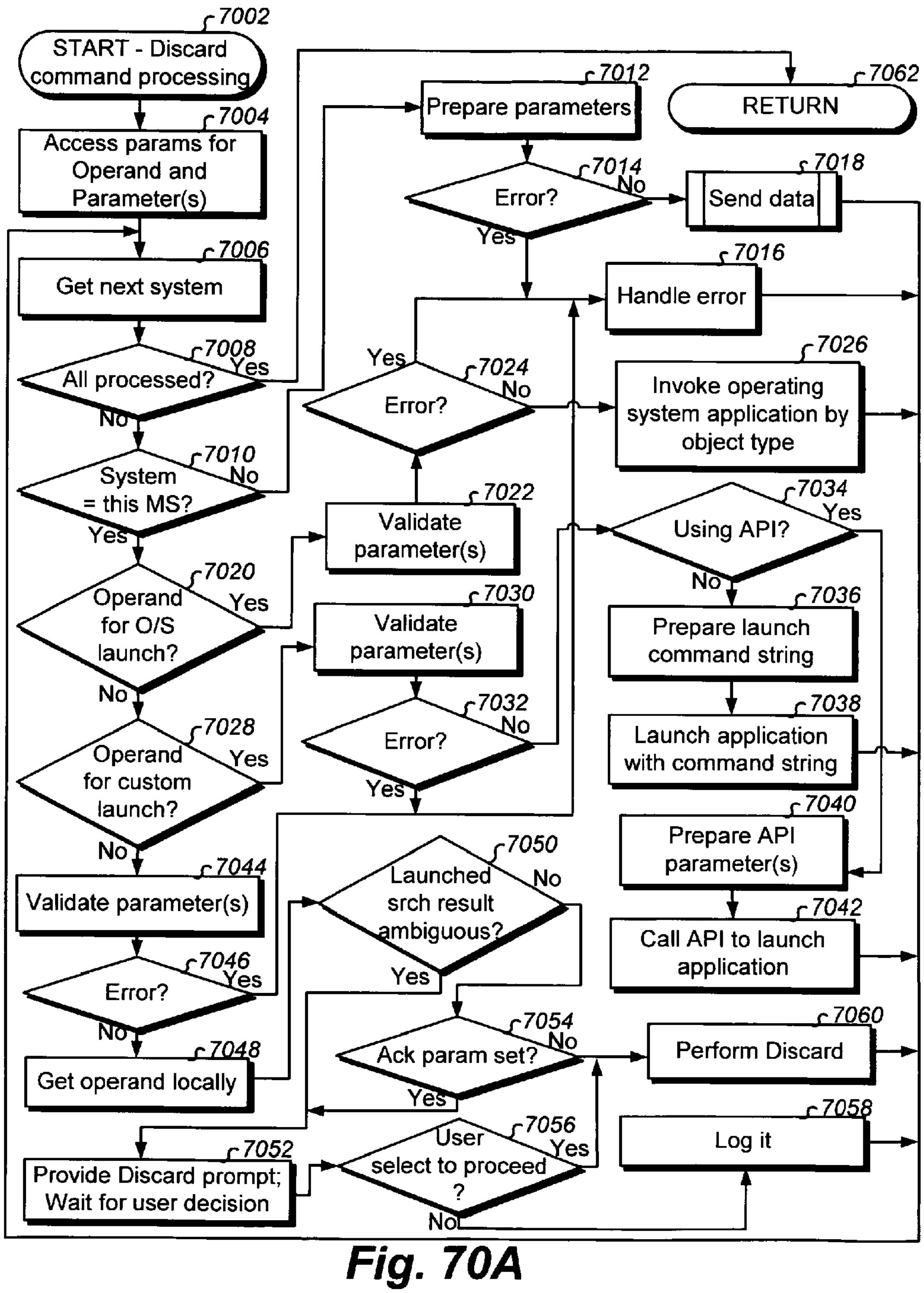
Figure 70C:
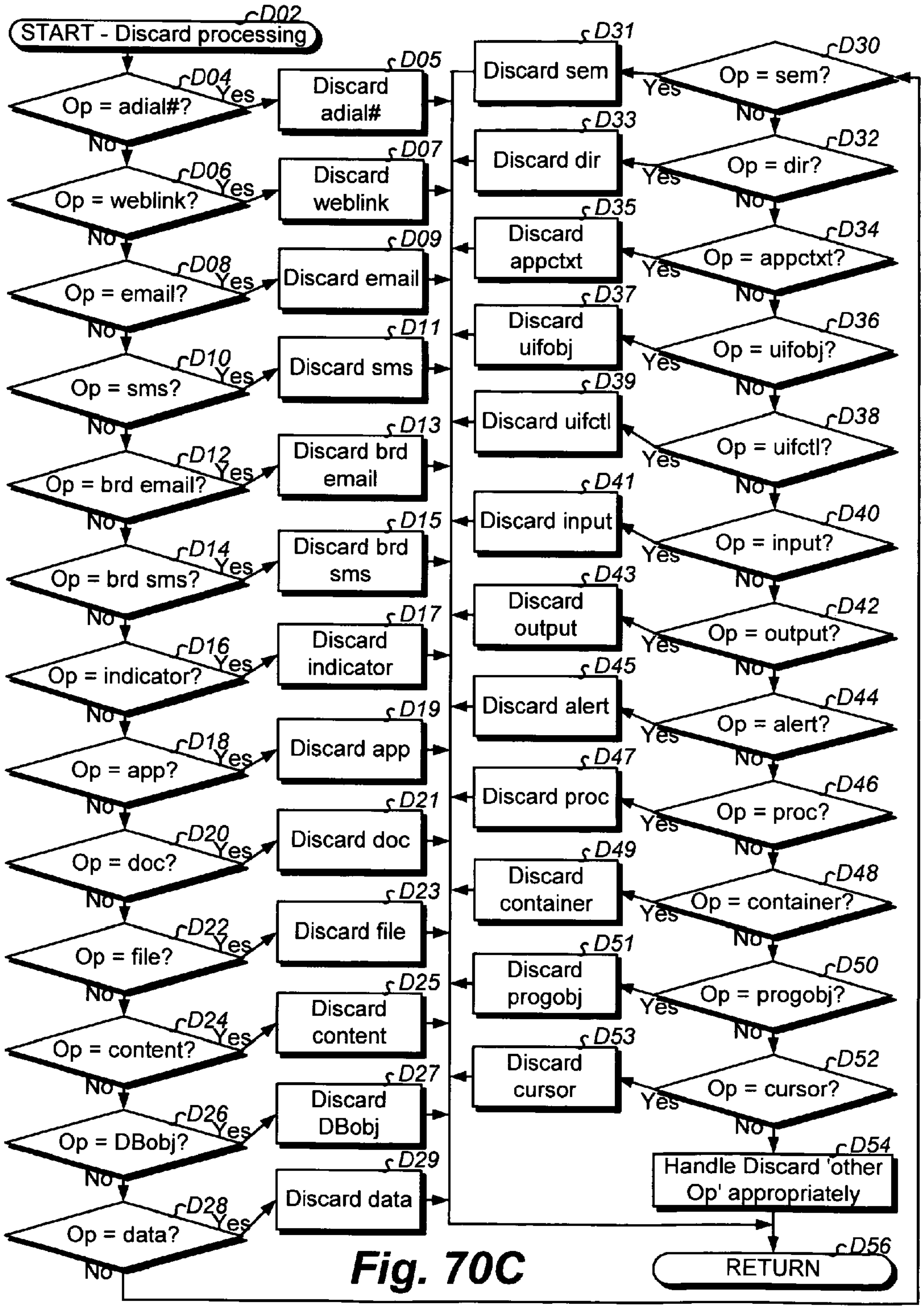
Figure 71A:
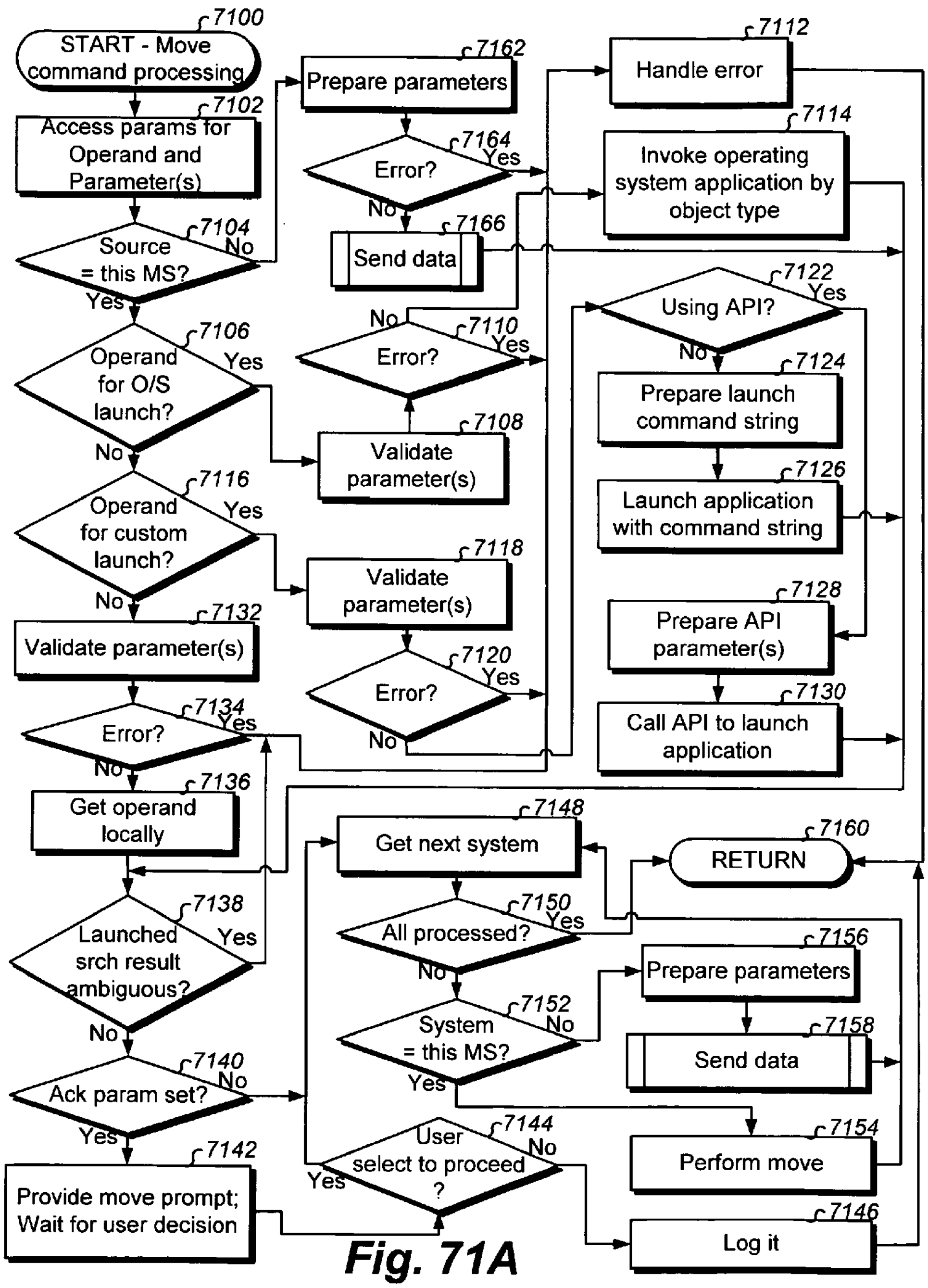
Figure 71C:
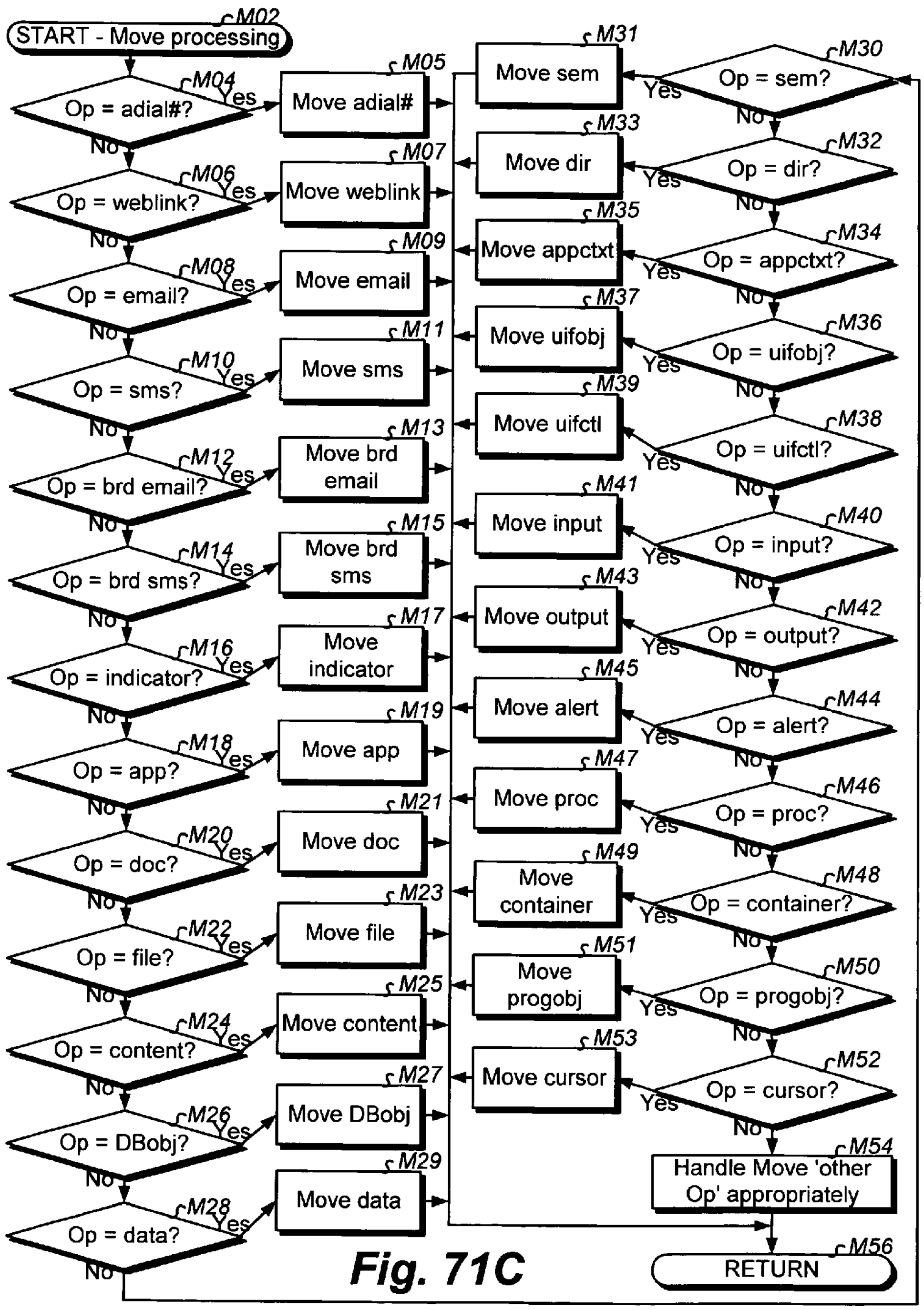
Figure 72A:
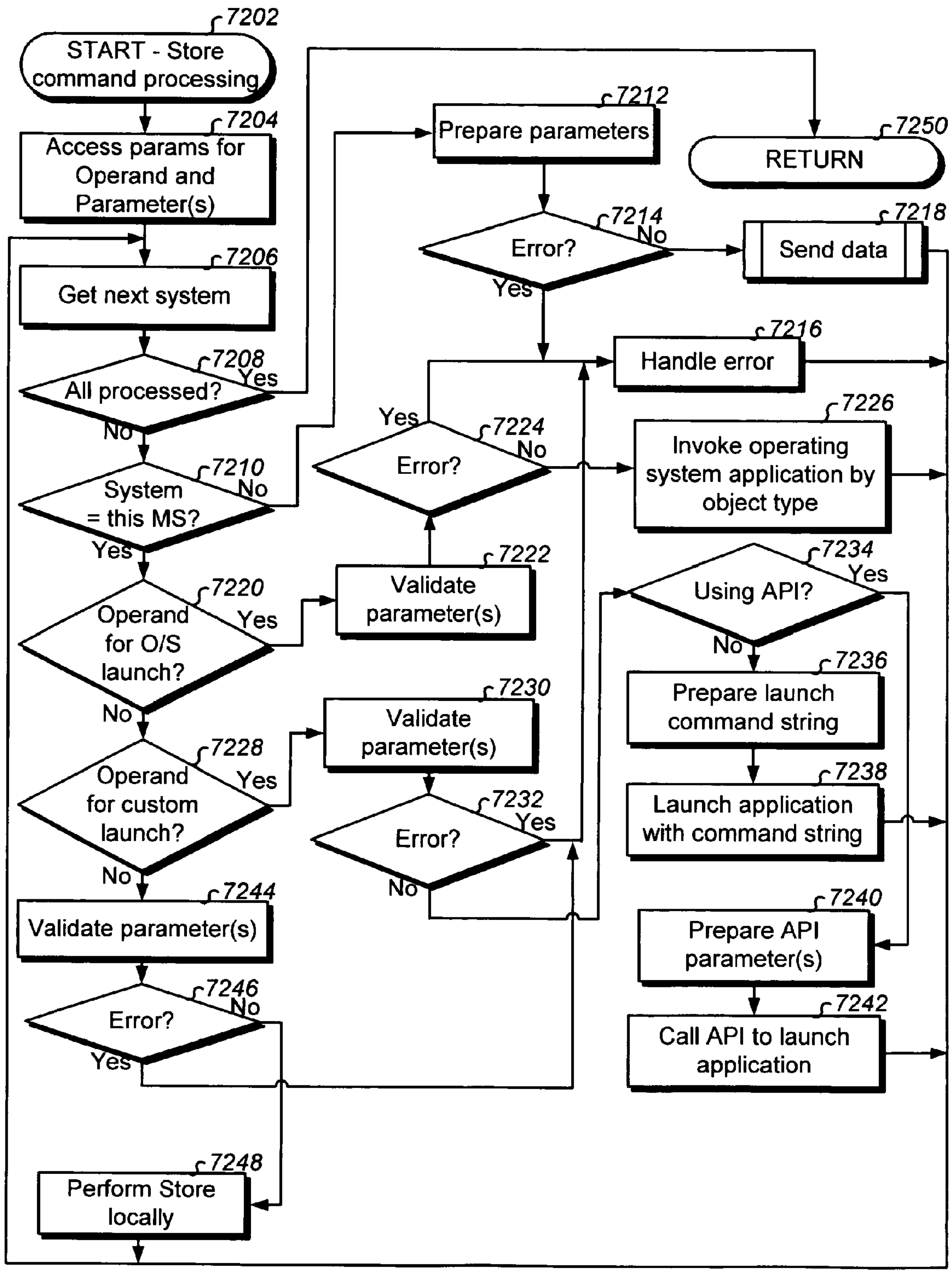
Figure 72C:
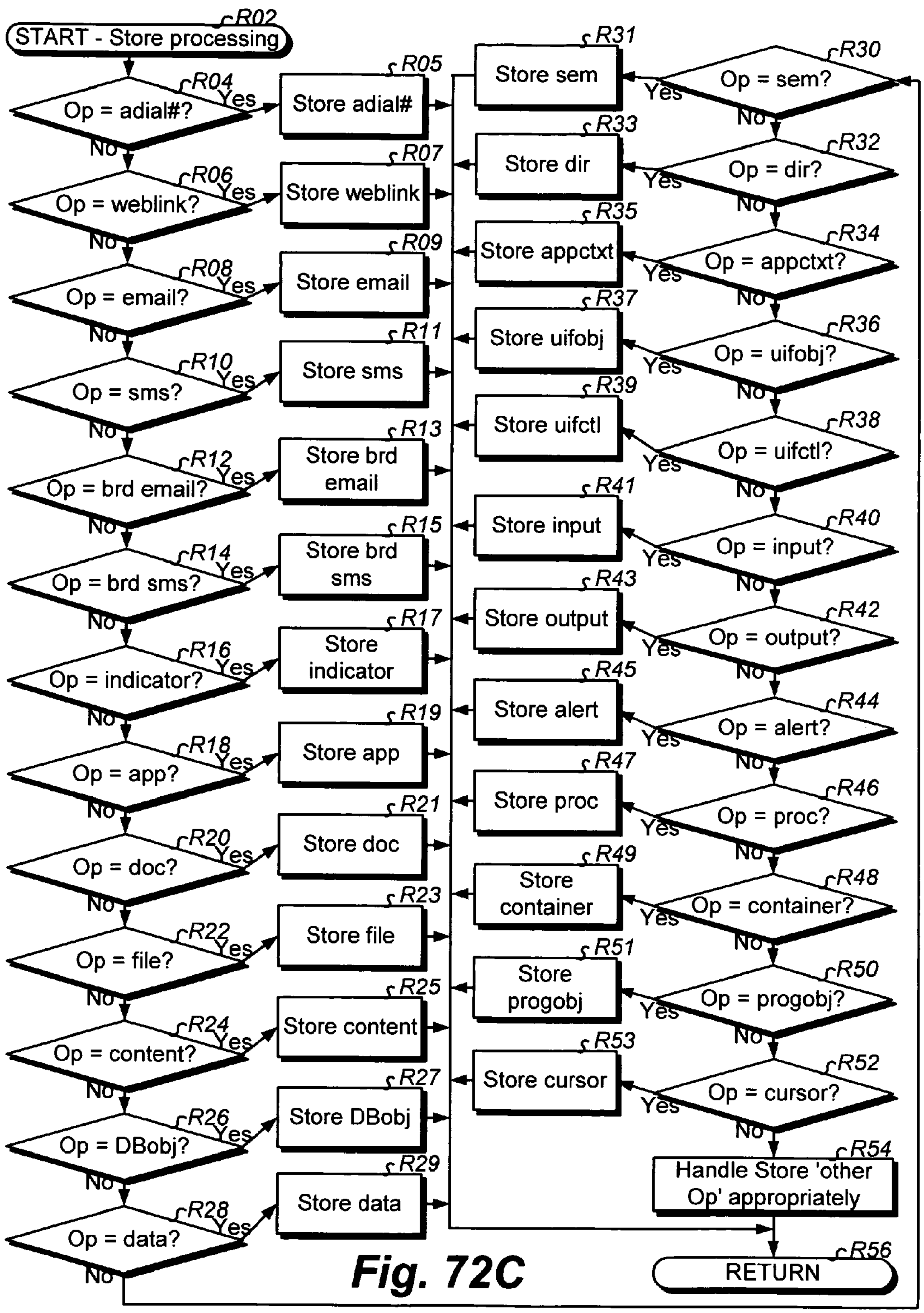
Figure 73A:
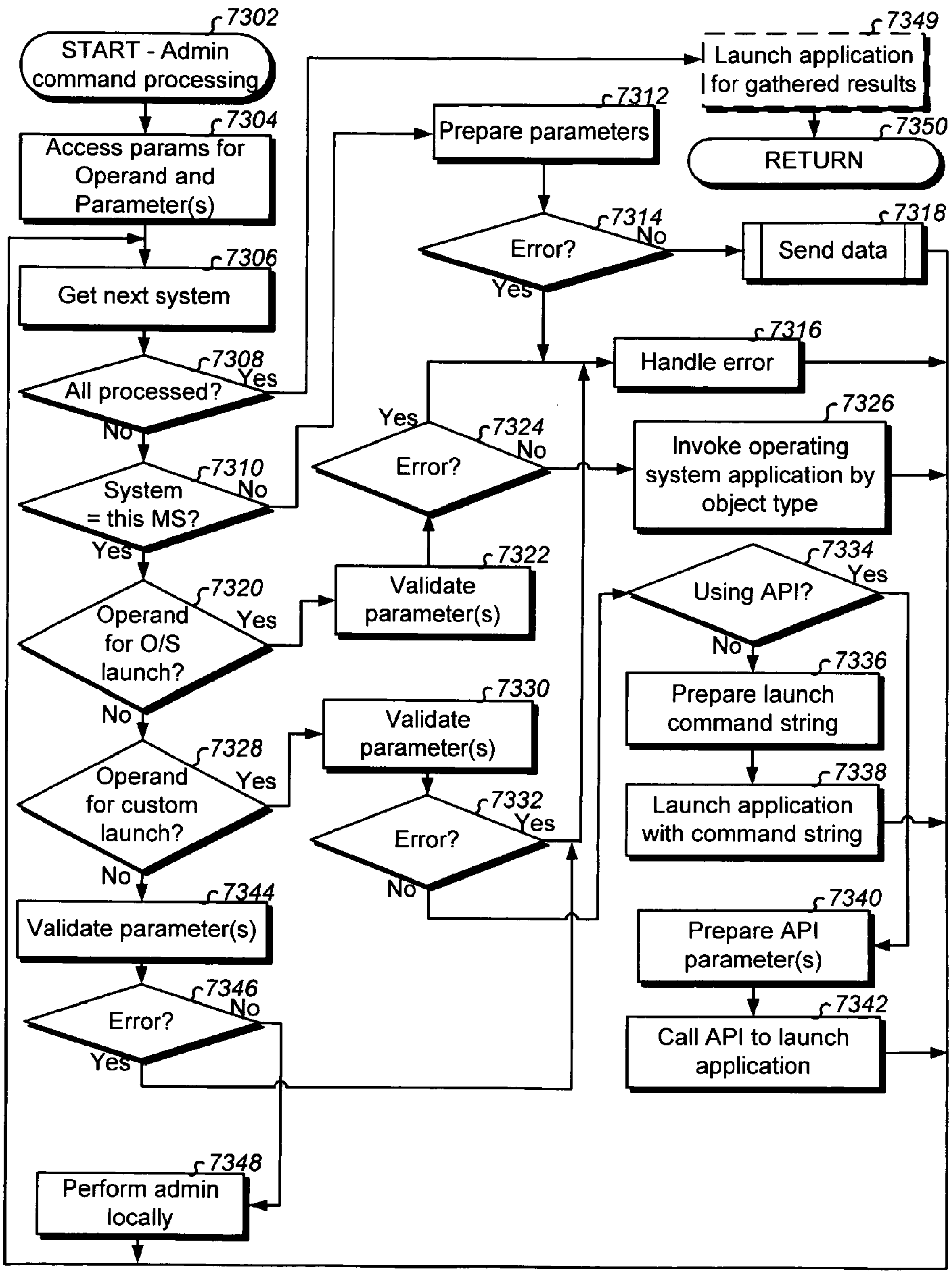
Figure 73C:
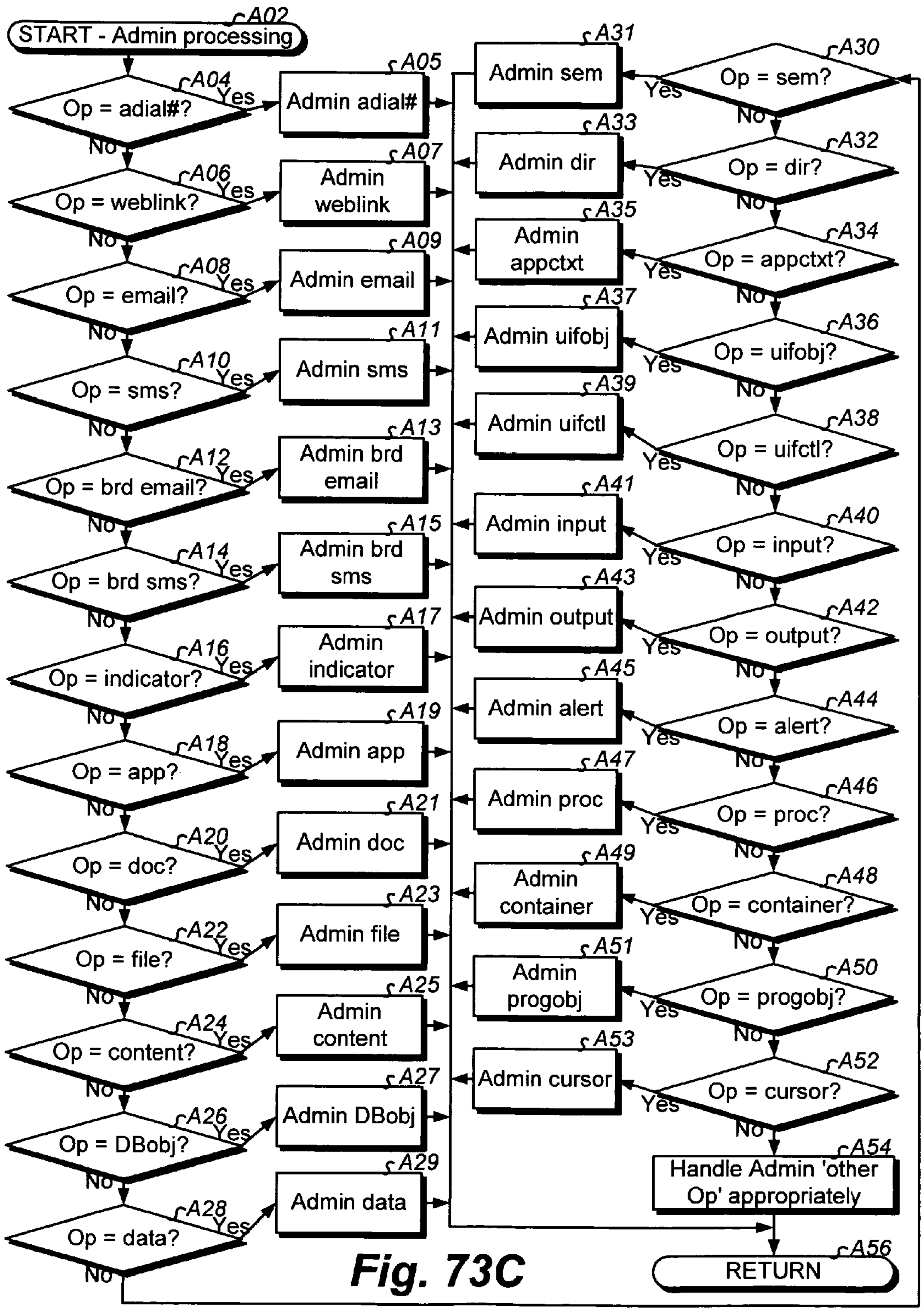
Figure 74A:
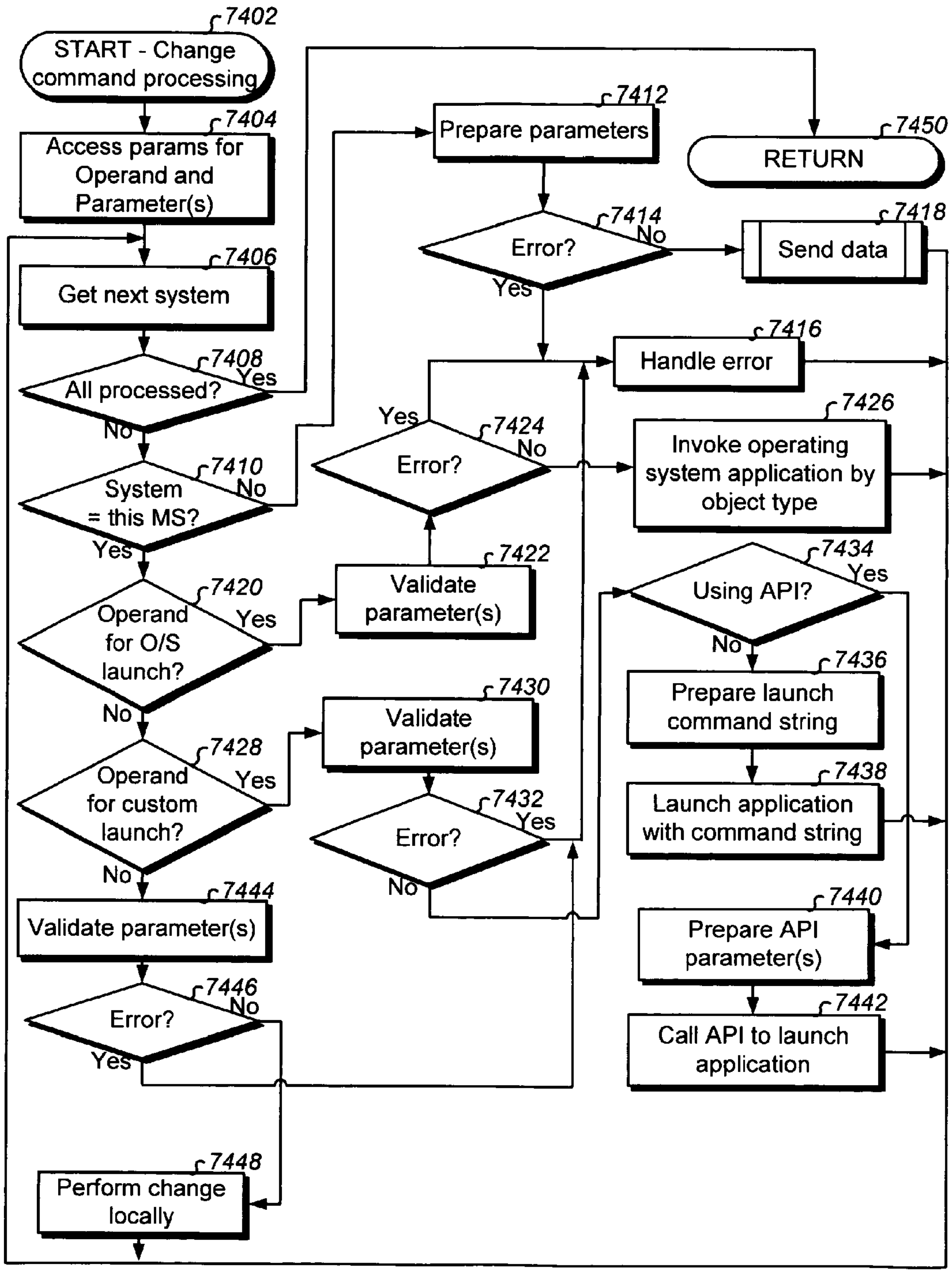
Figure 74C:
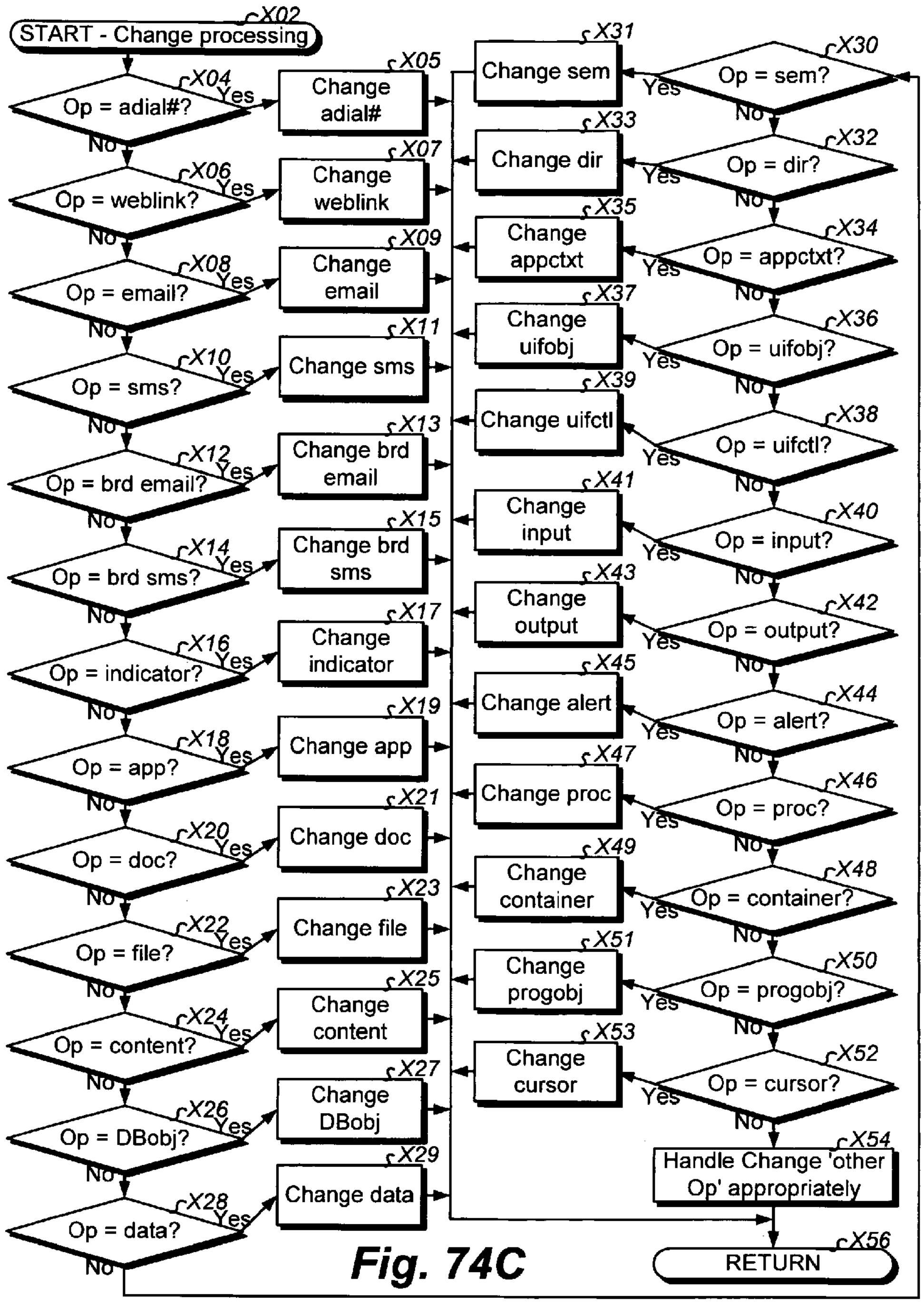
Figure 75A:
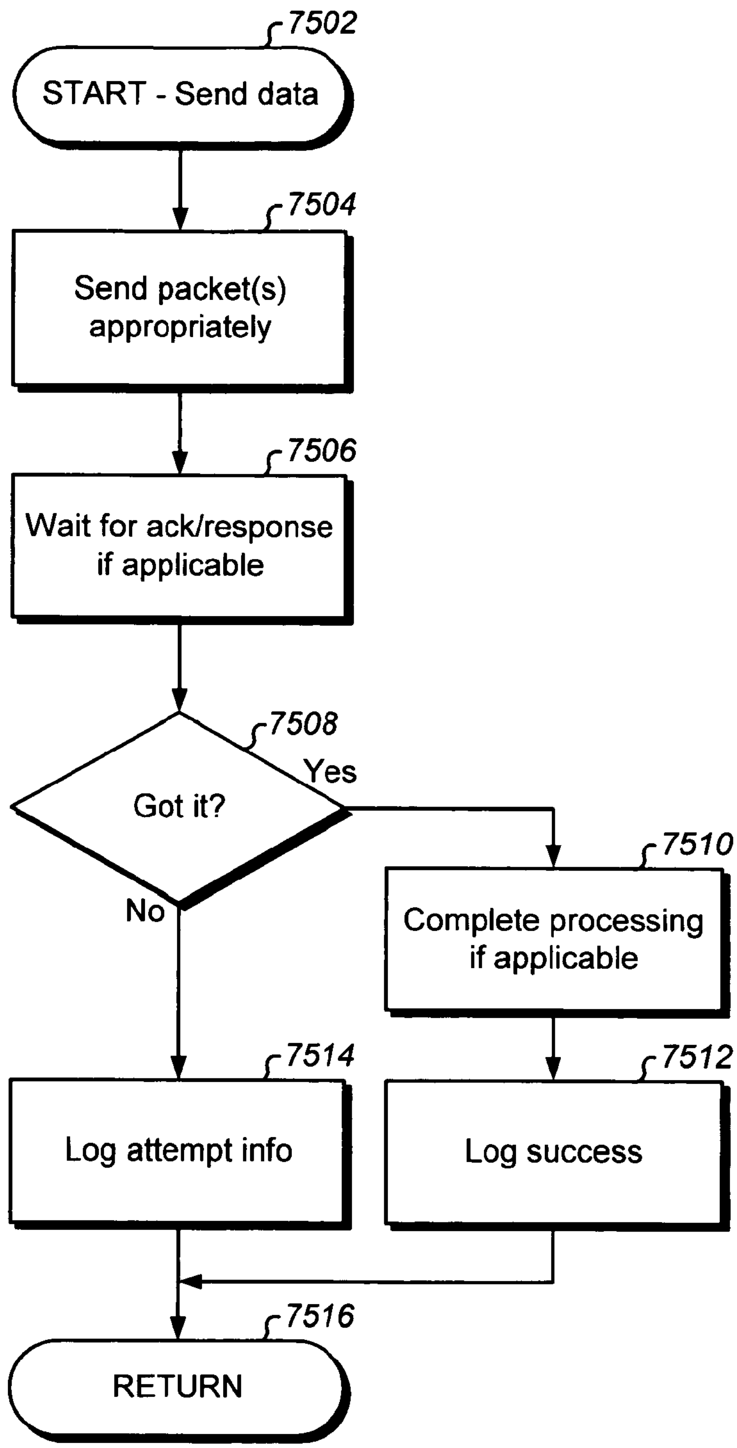
Figure 75B:
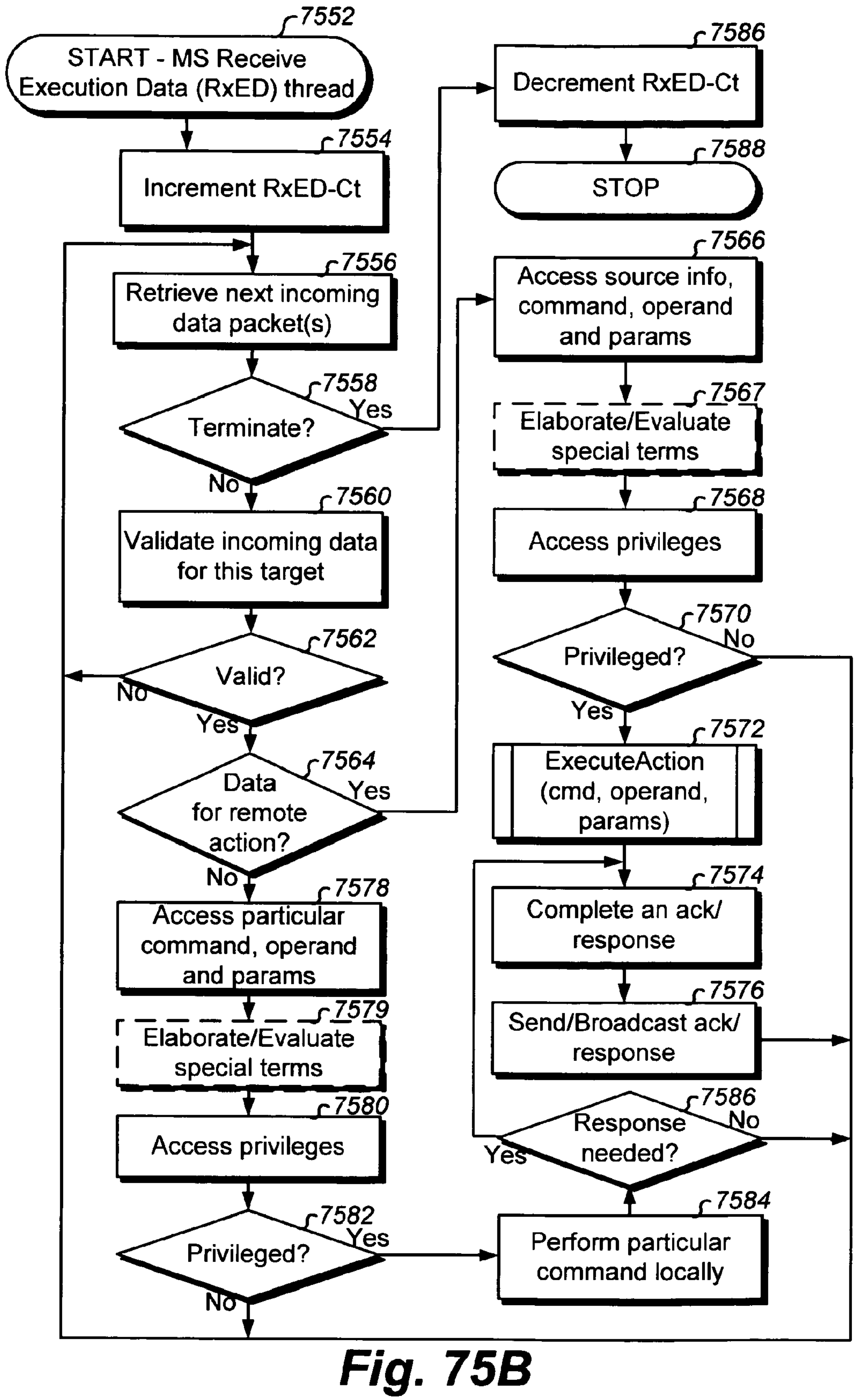
Figure 76A:
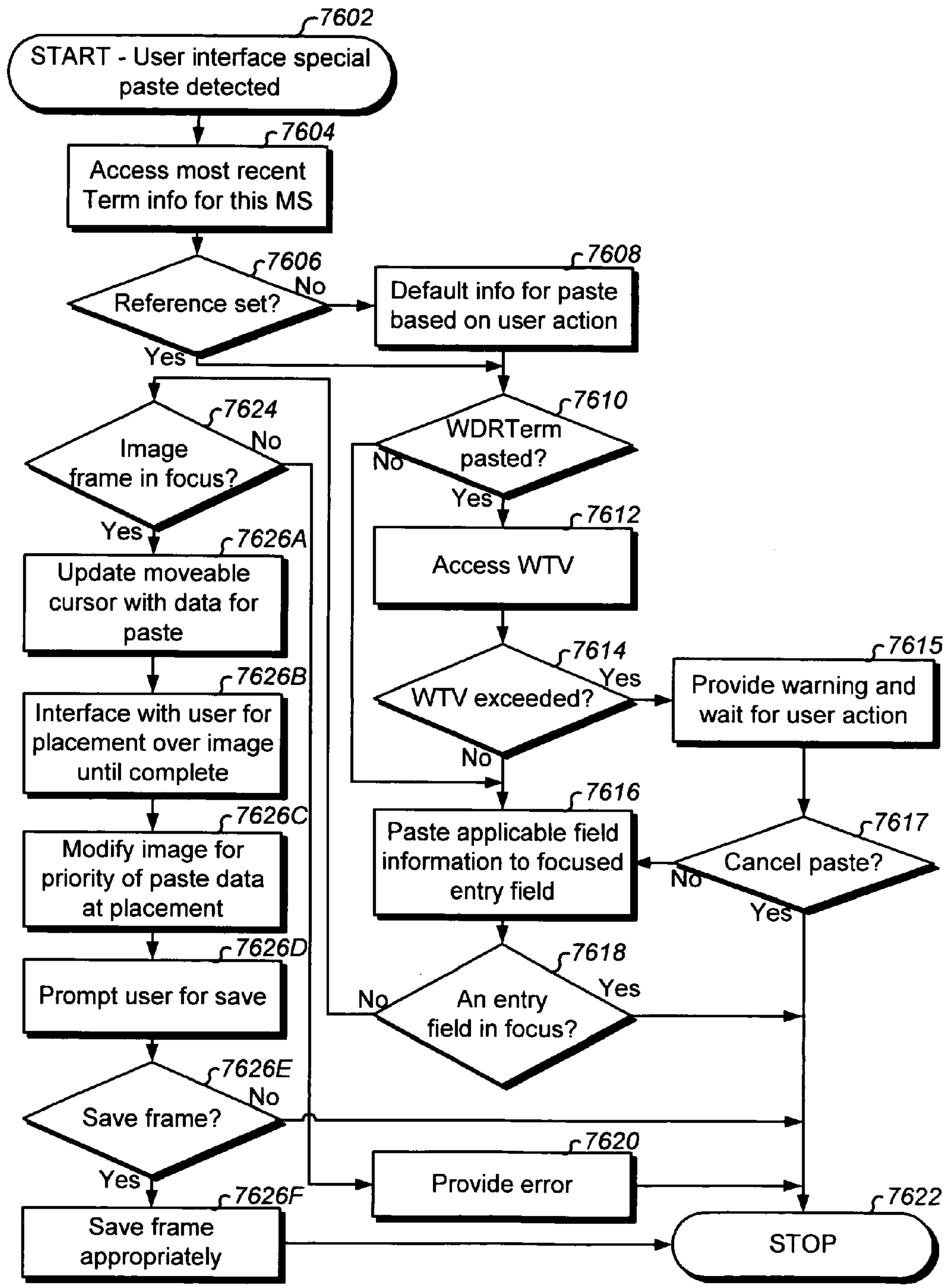
Figures 1, 76B:
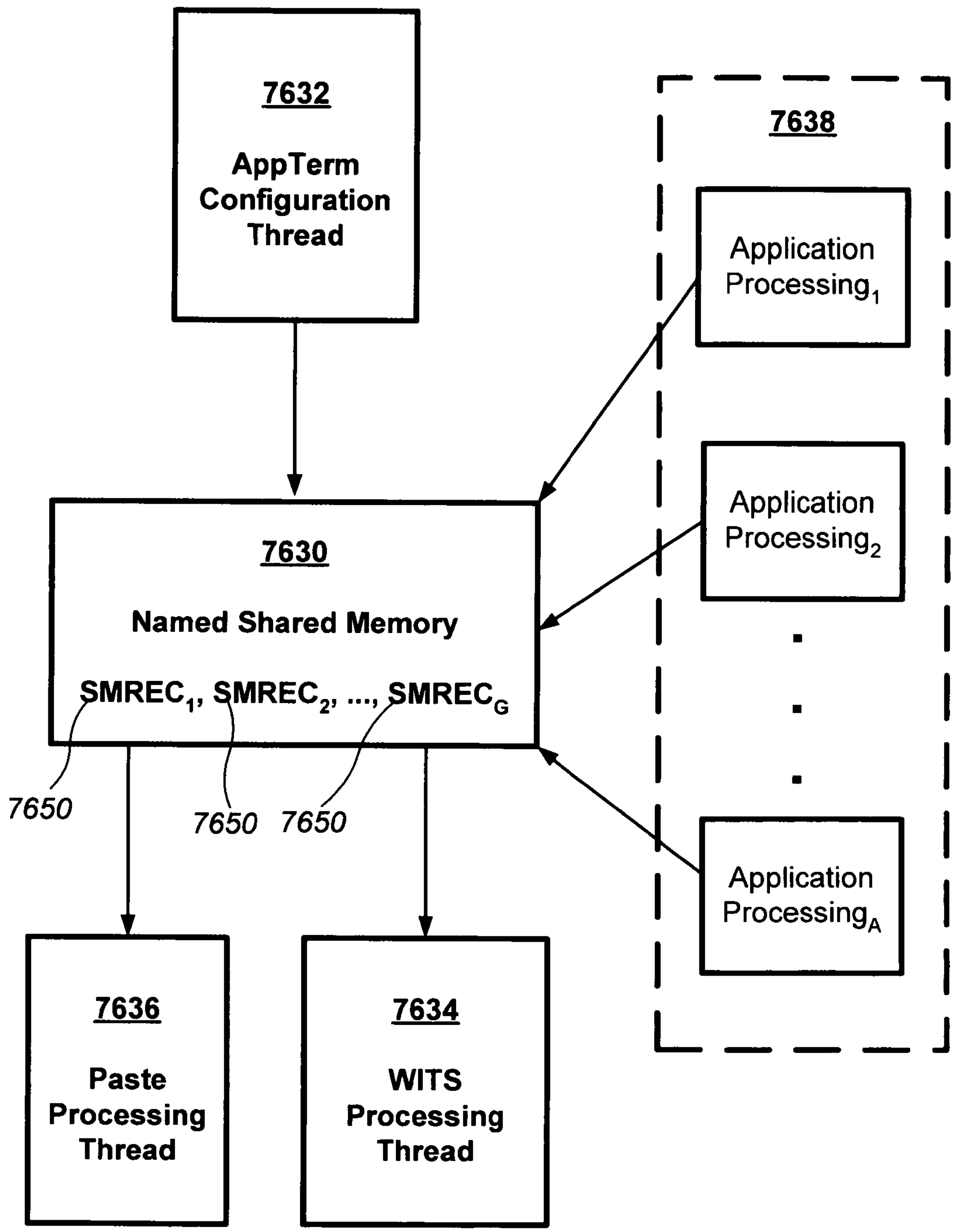
Figures 2, 76B:
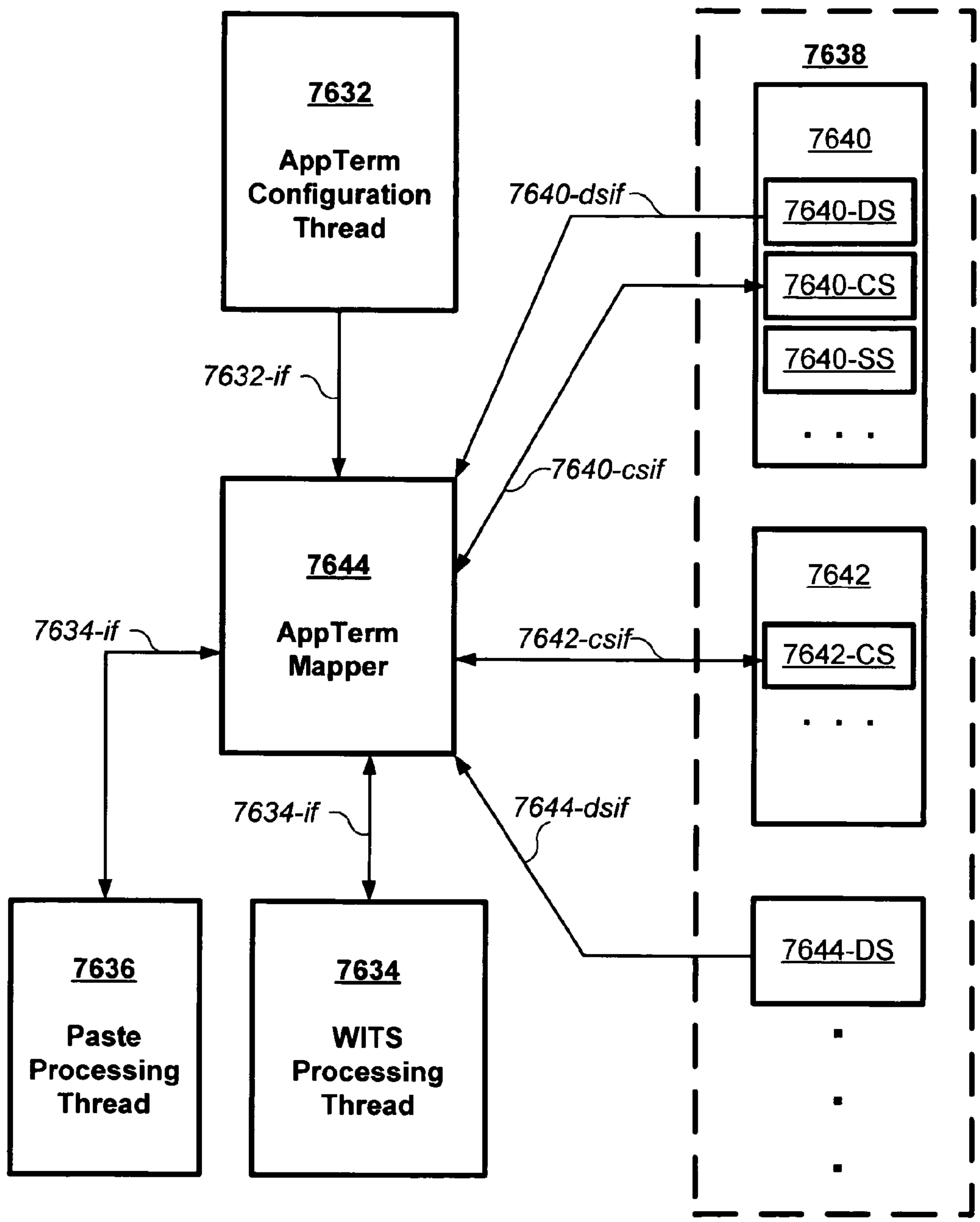
Figures 3, 76B:
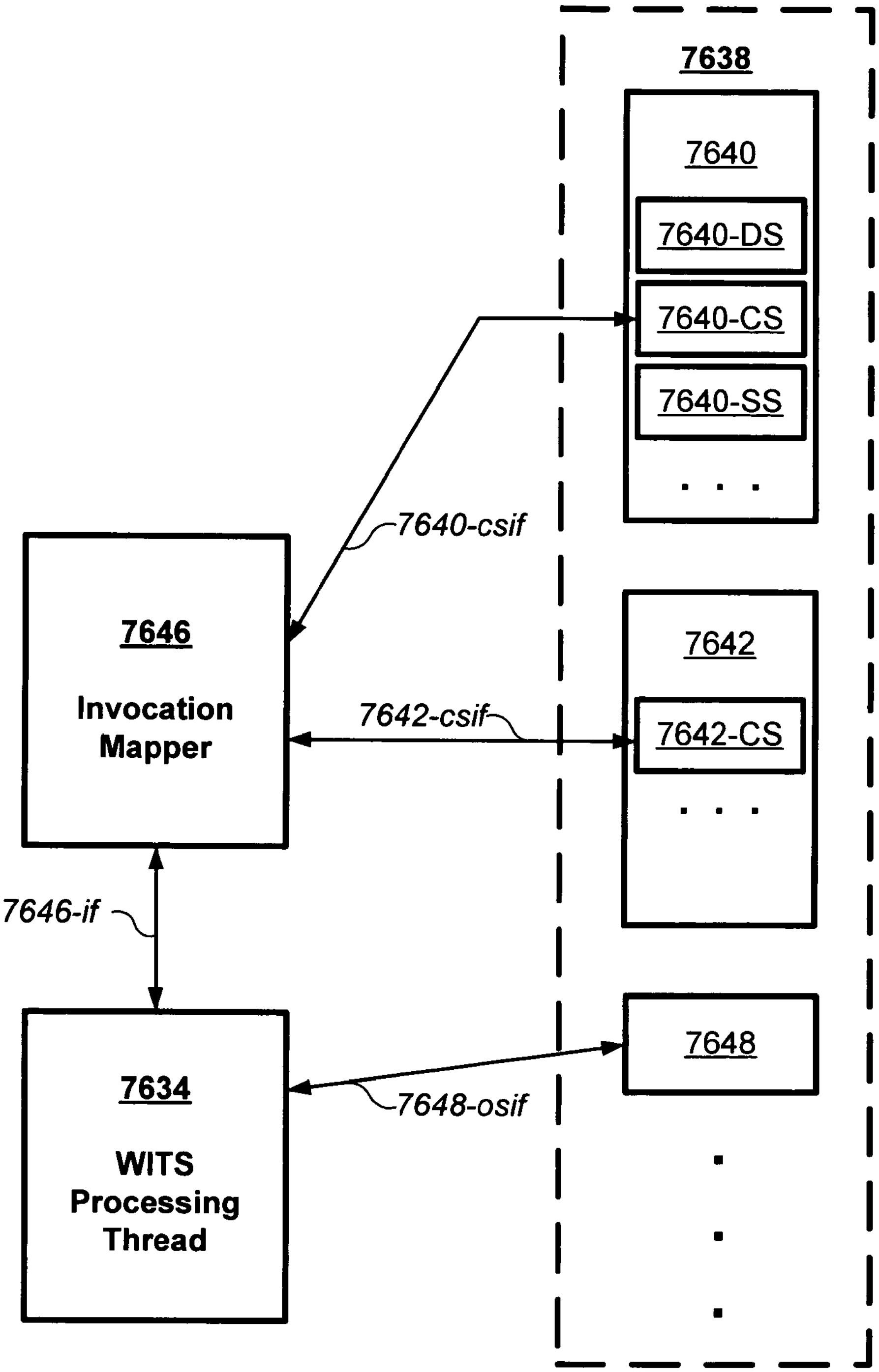
Figure 76C:
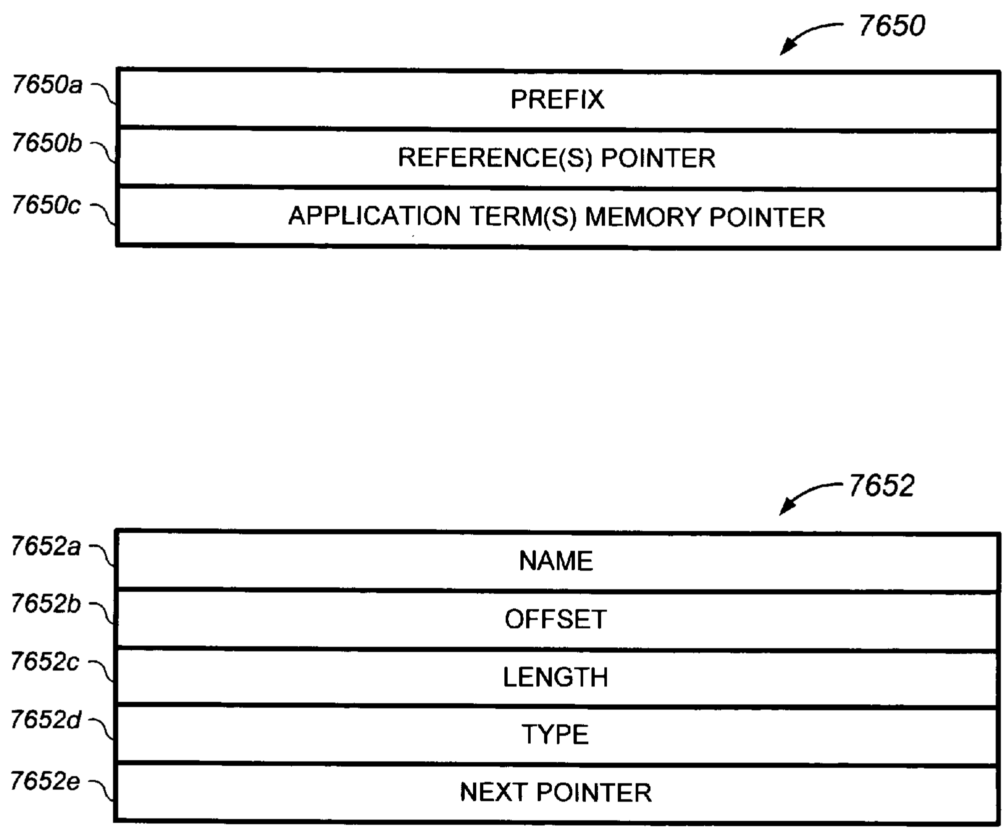
Figure 76D:
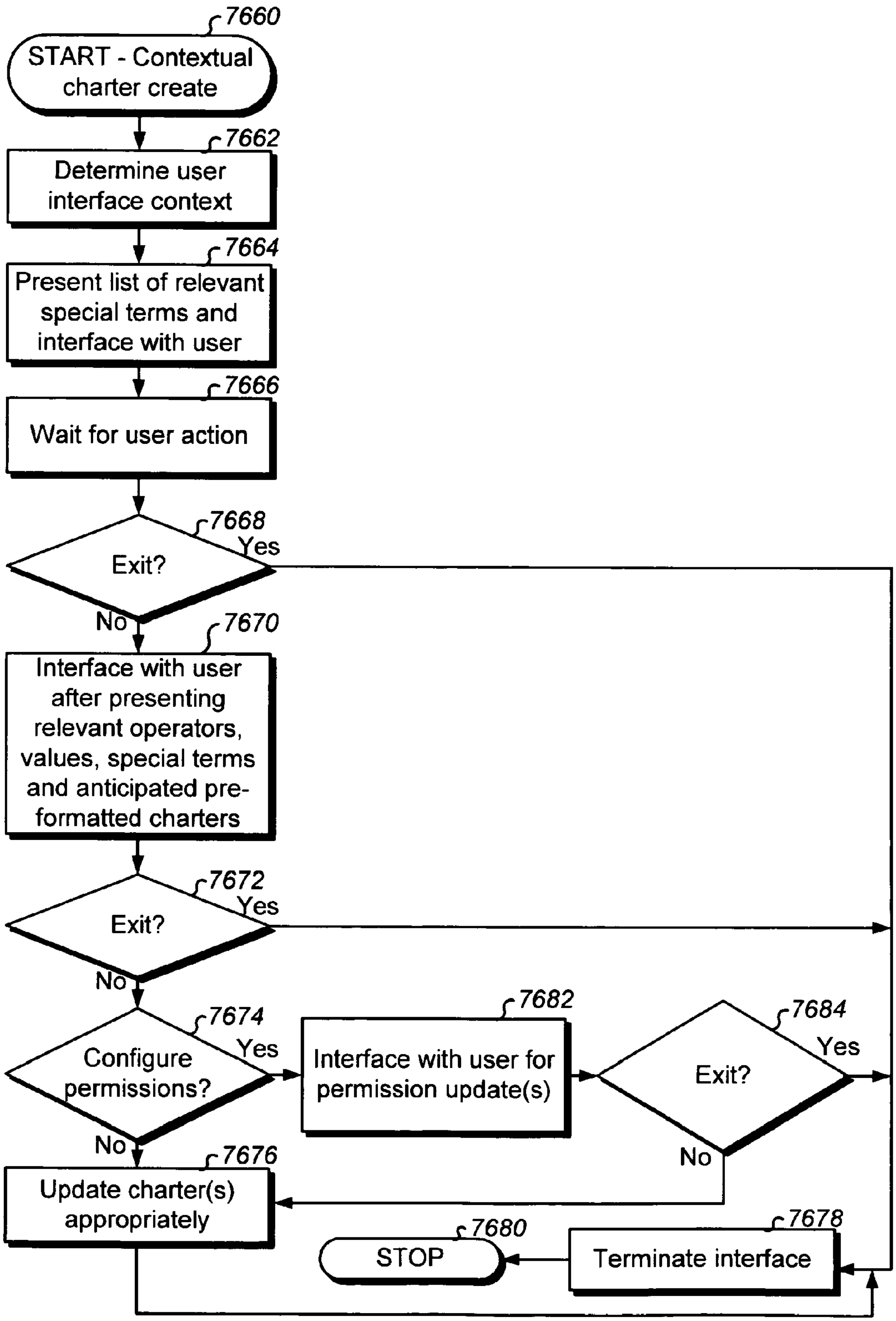
Figure 77:
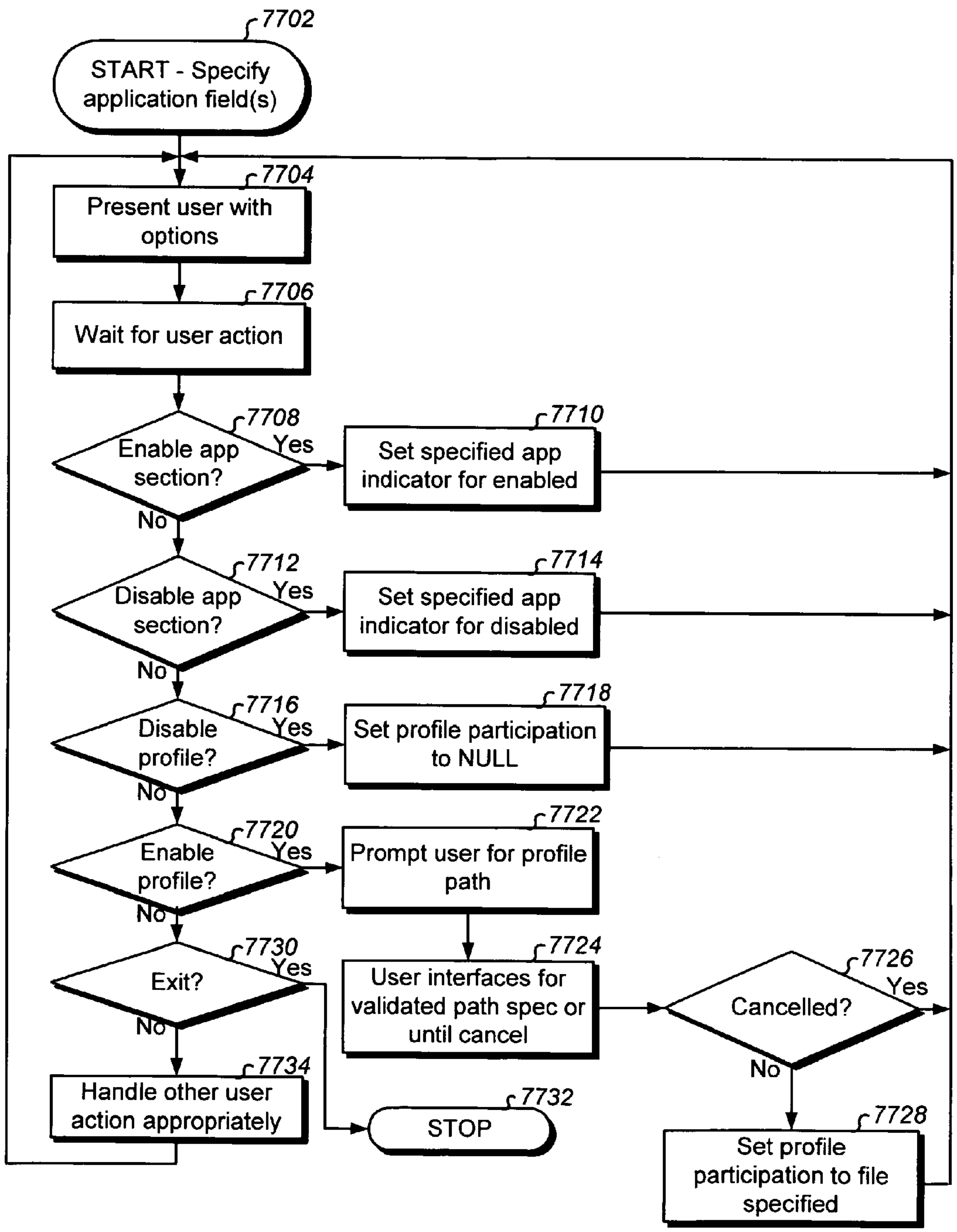
Figure 79A:
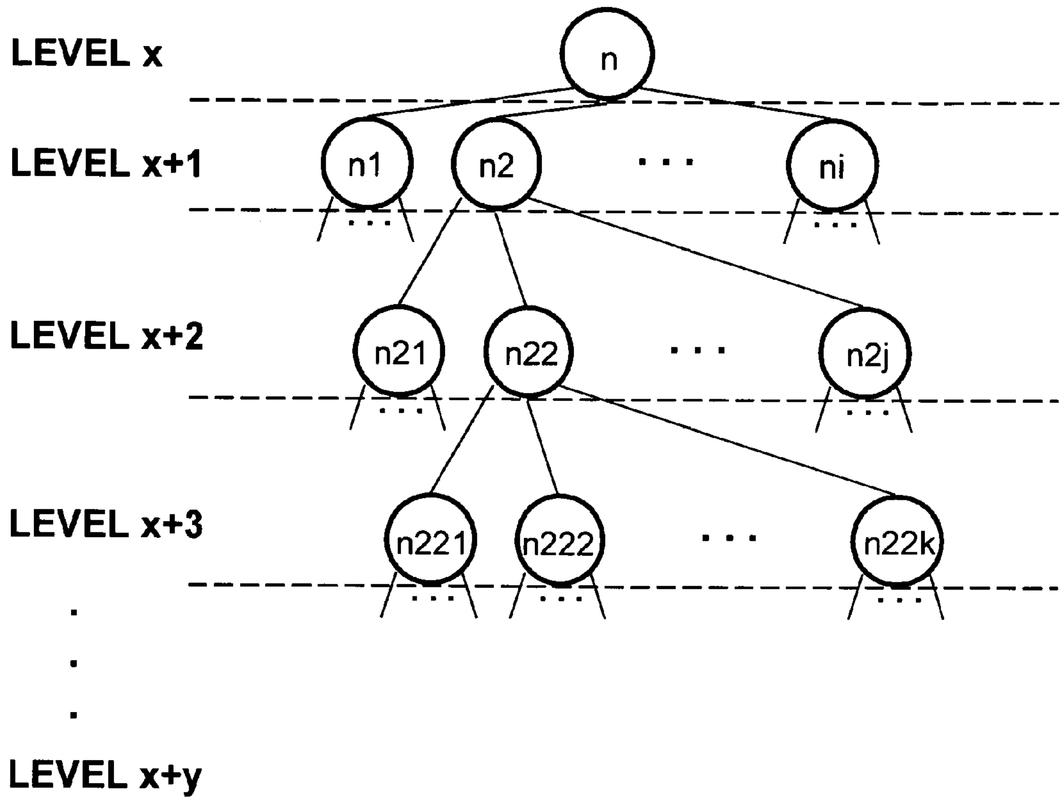
Figure 79B:
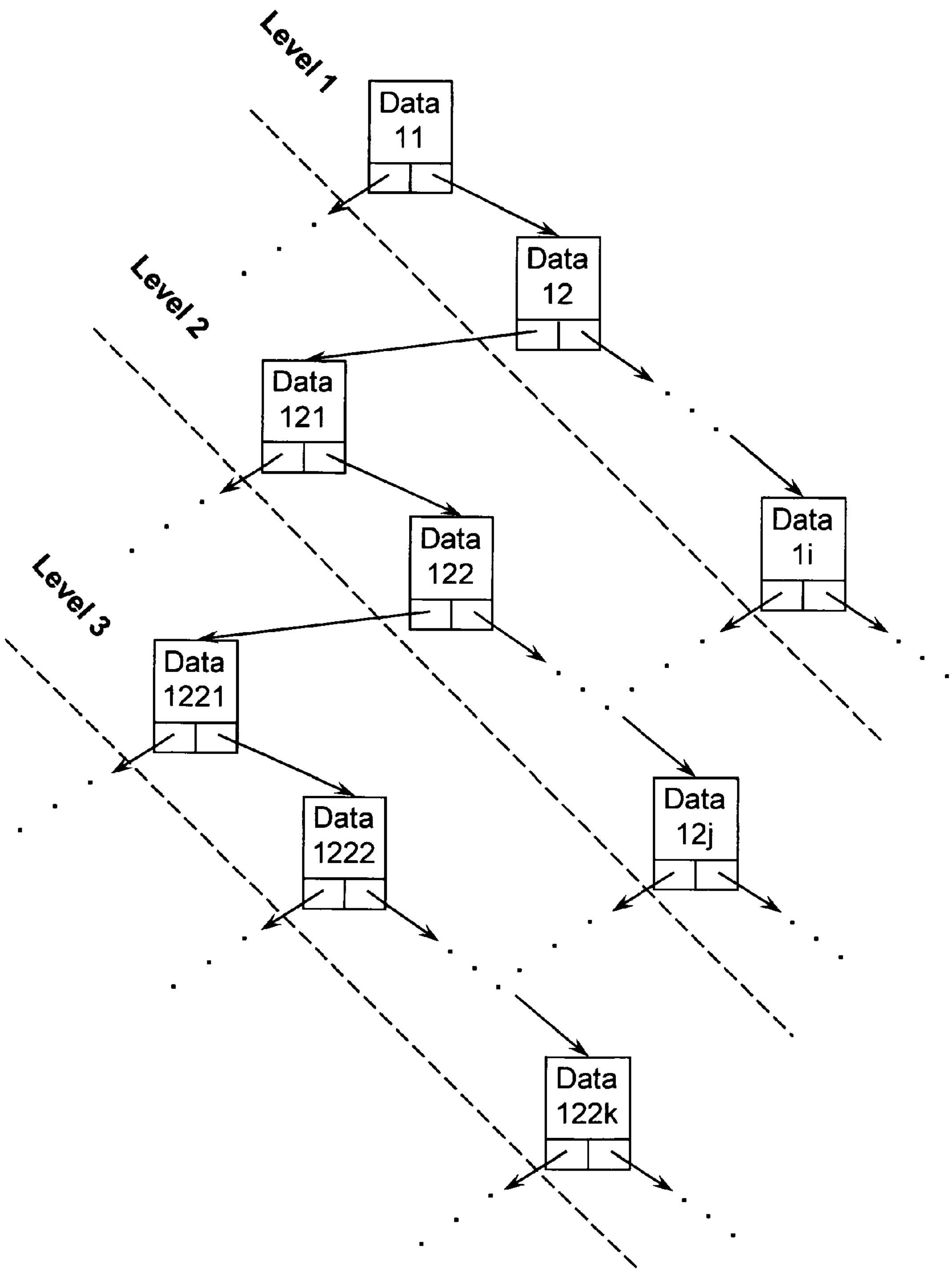
Figure 79D:
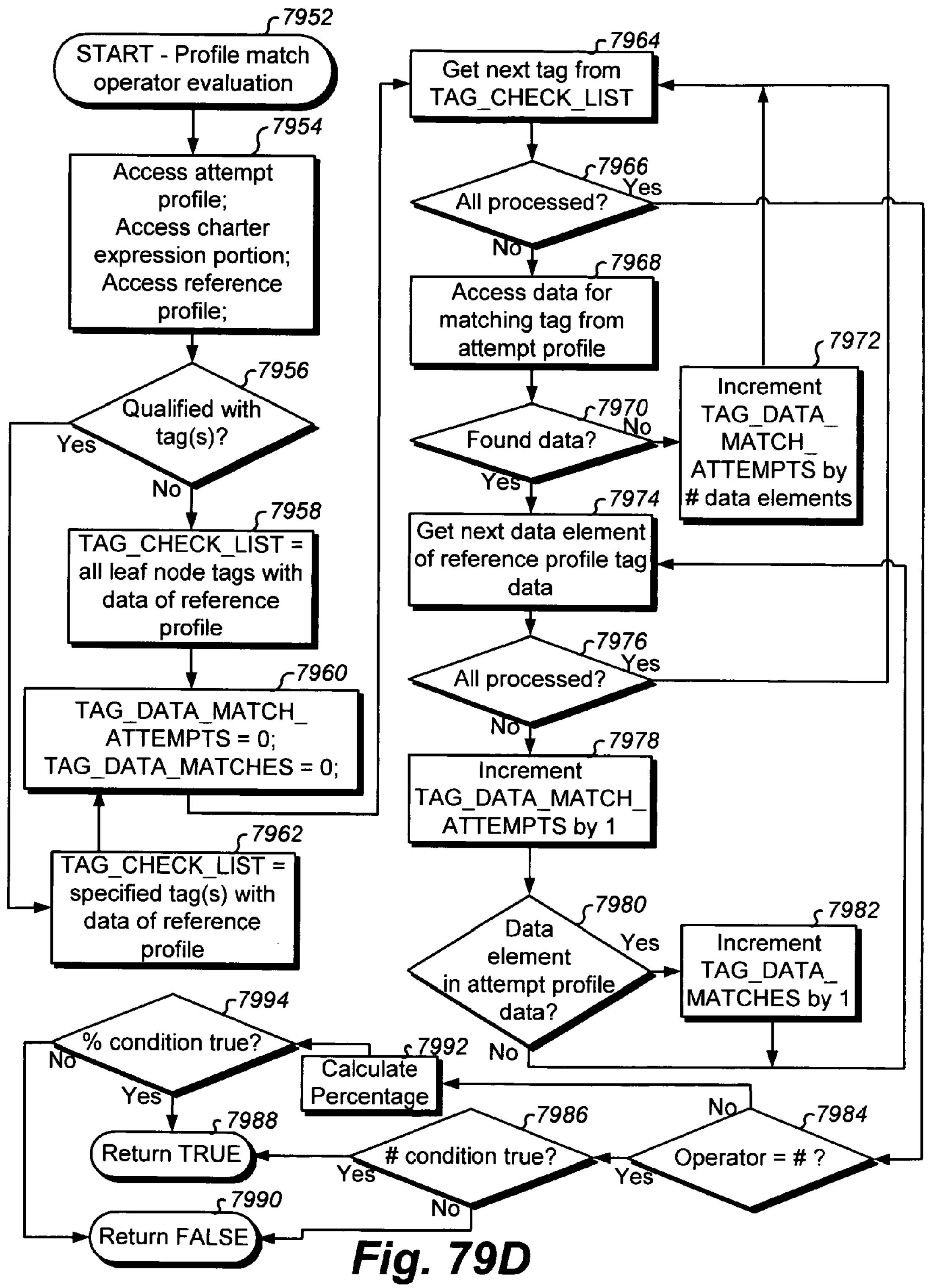
Figure 80C:
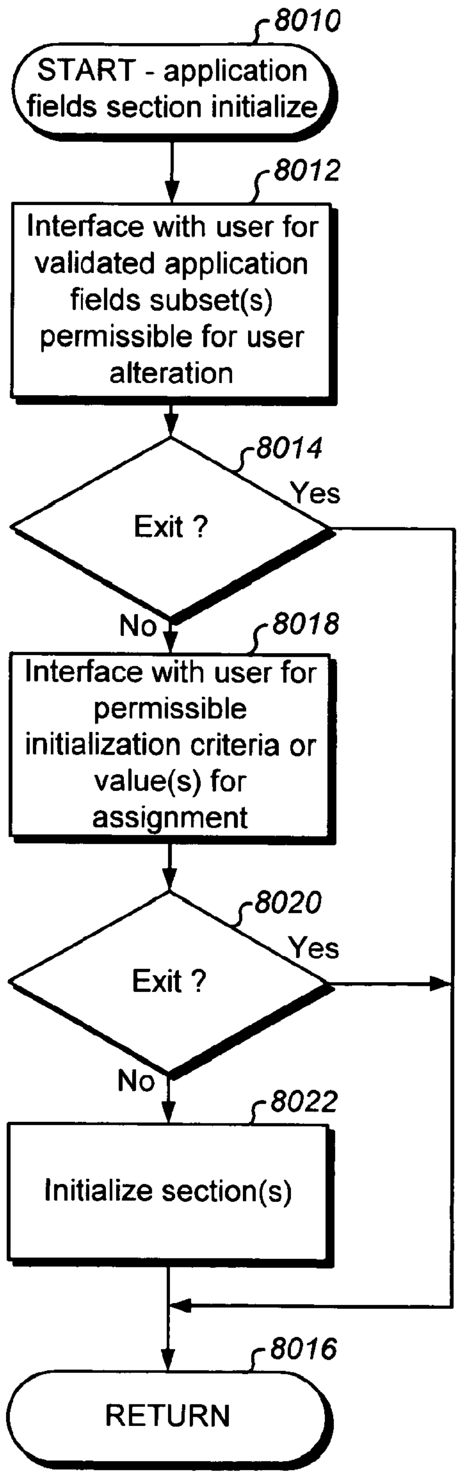
Figure 80D:
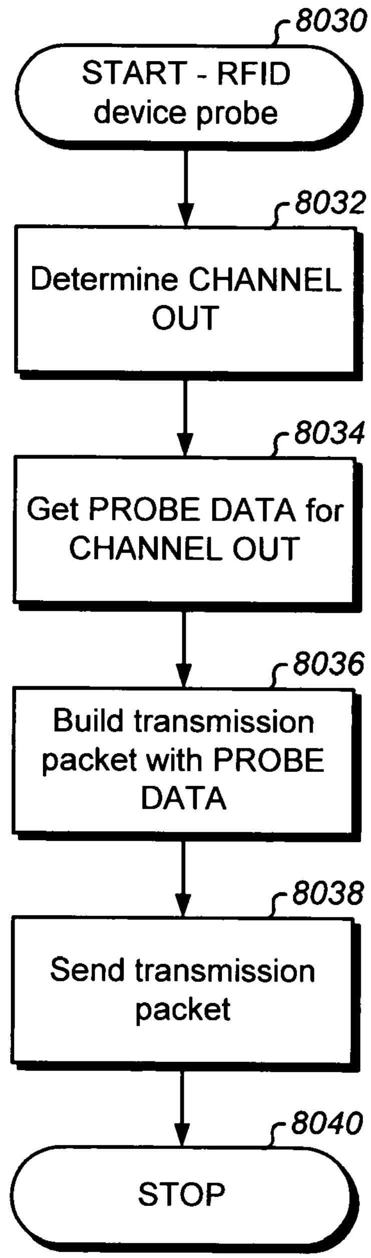
Figure 80E:
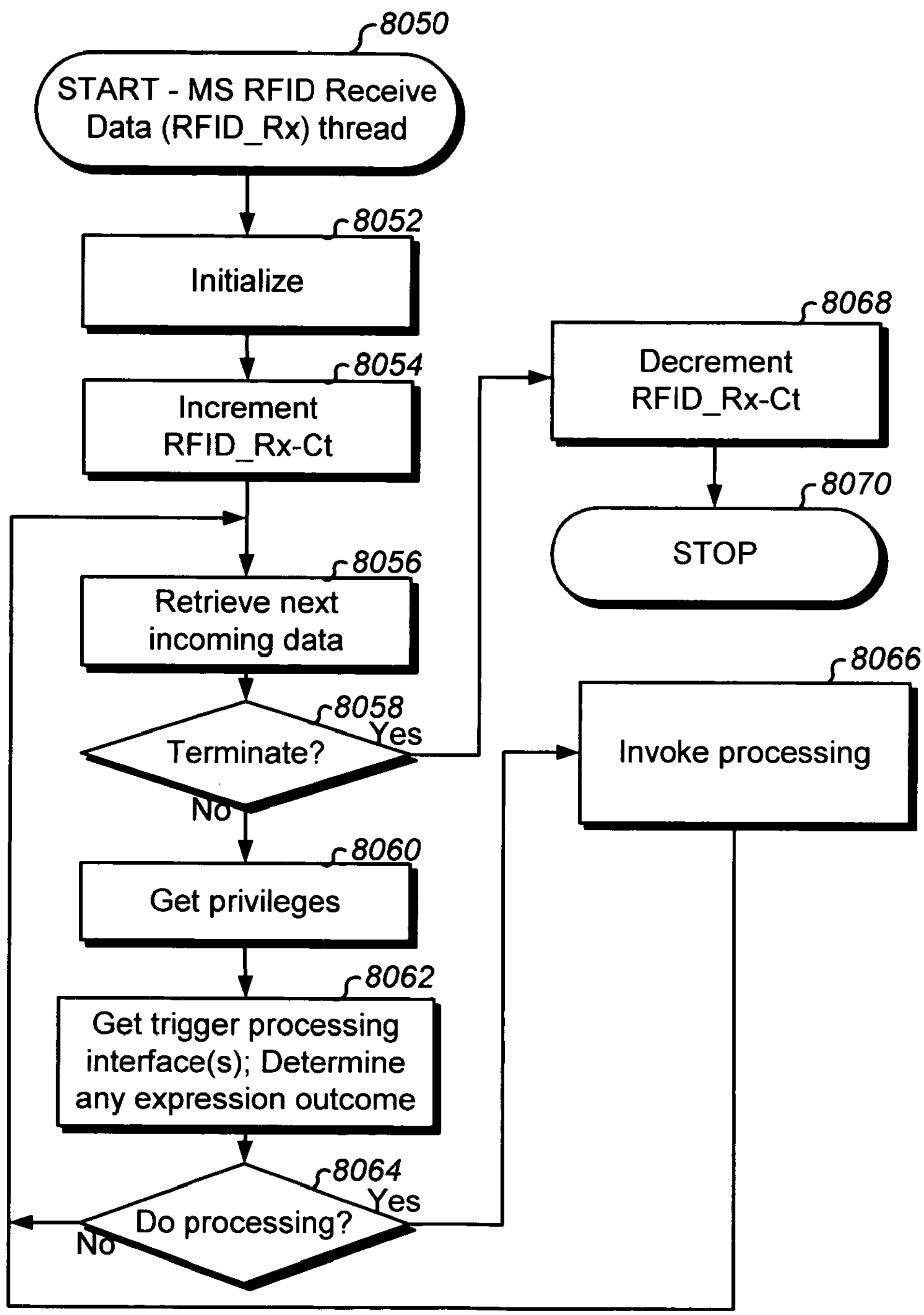
Figure 81A:
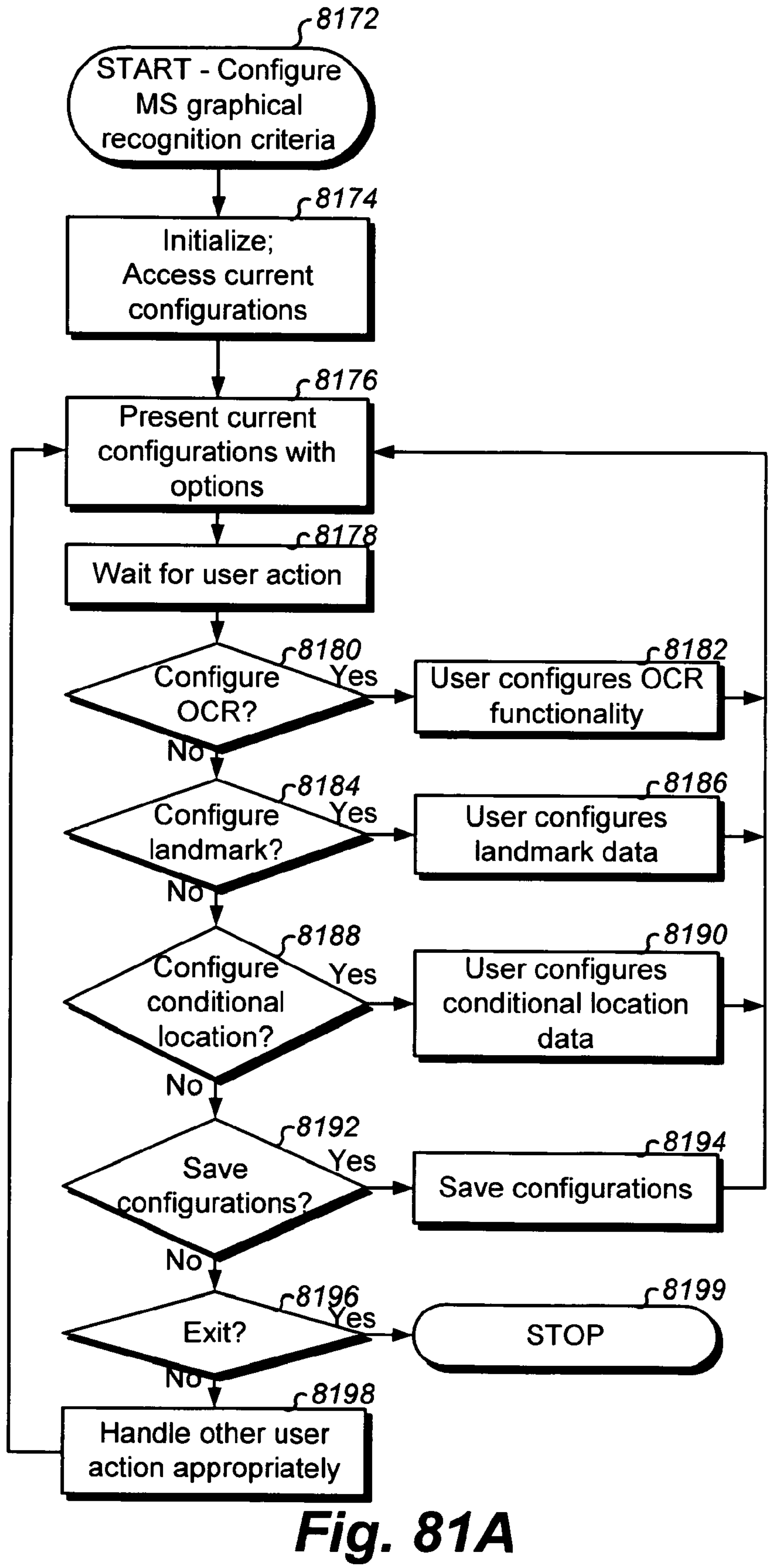
Figure 81B:
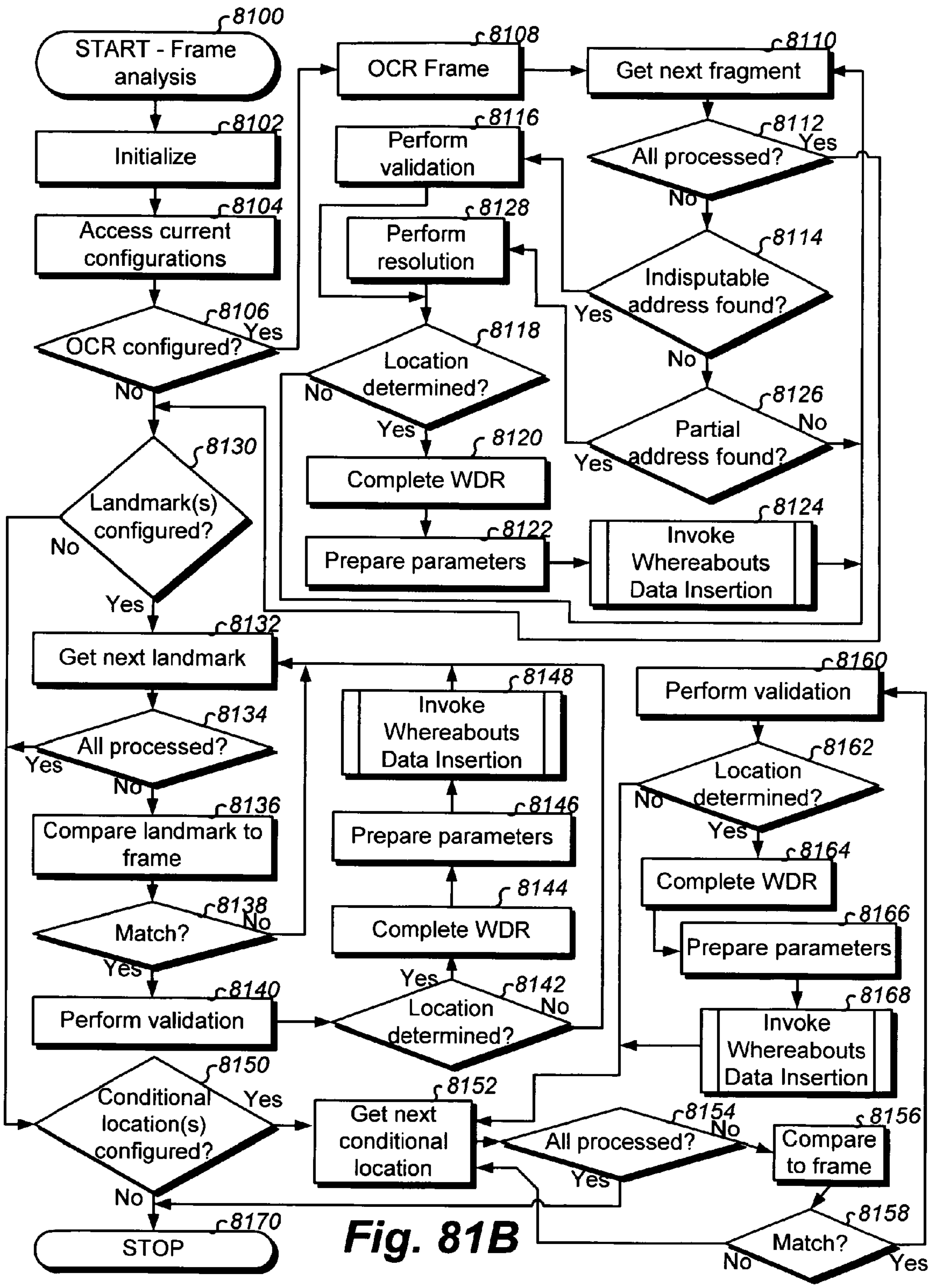
Figure 82A:
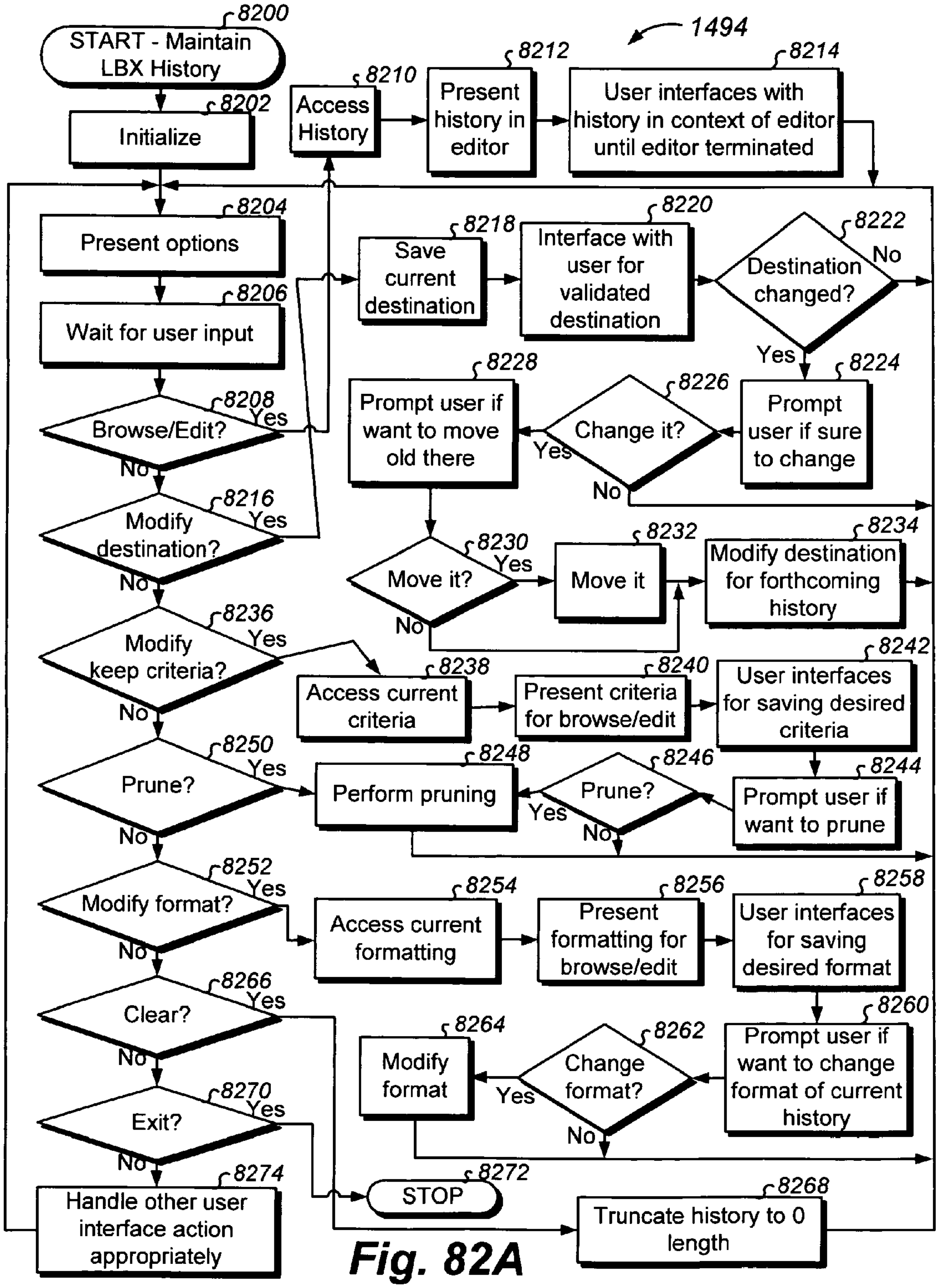
Figure 82B:
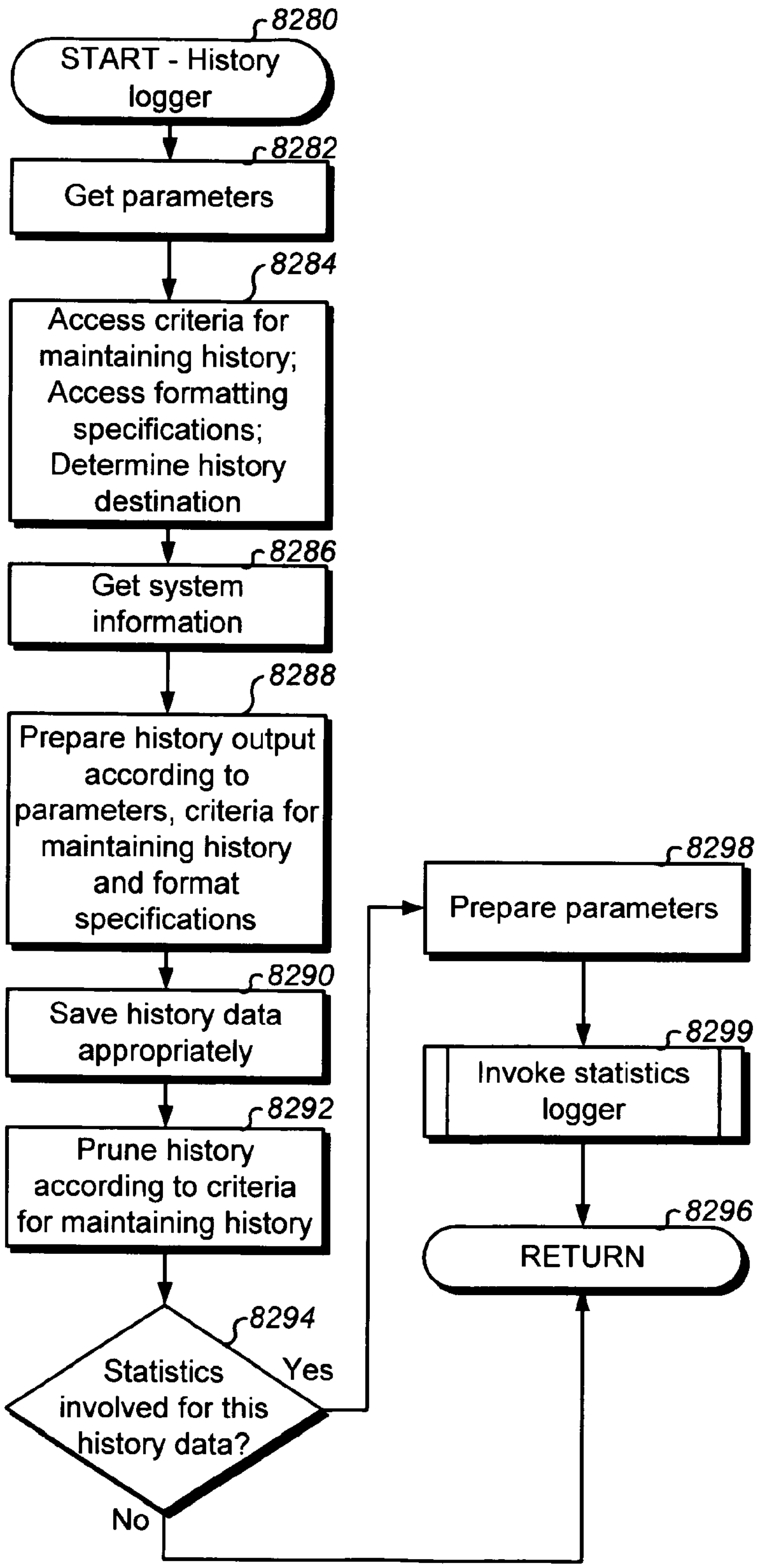
Figure 83A:
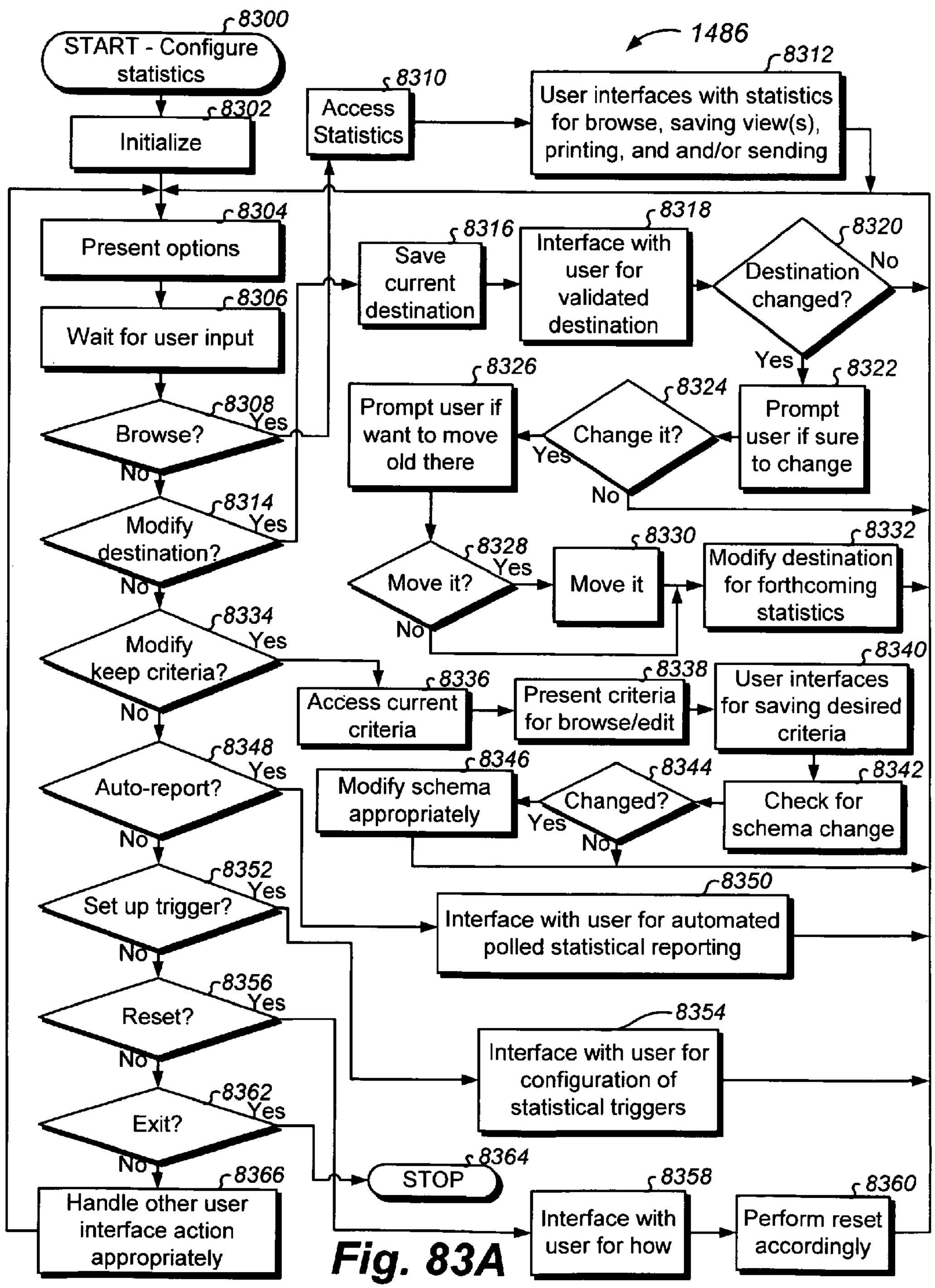
Figure 83B:
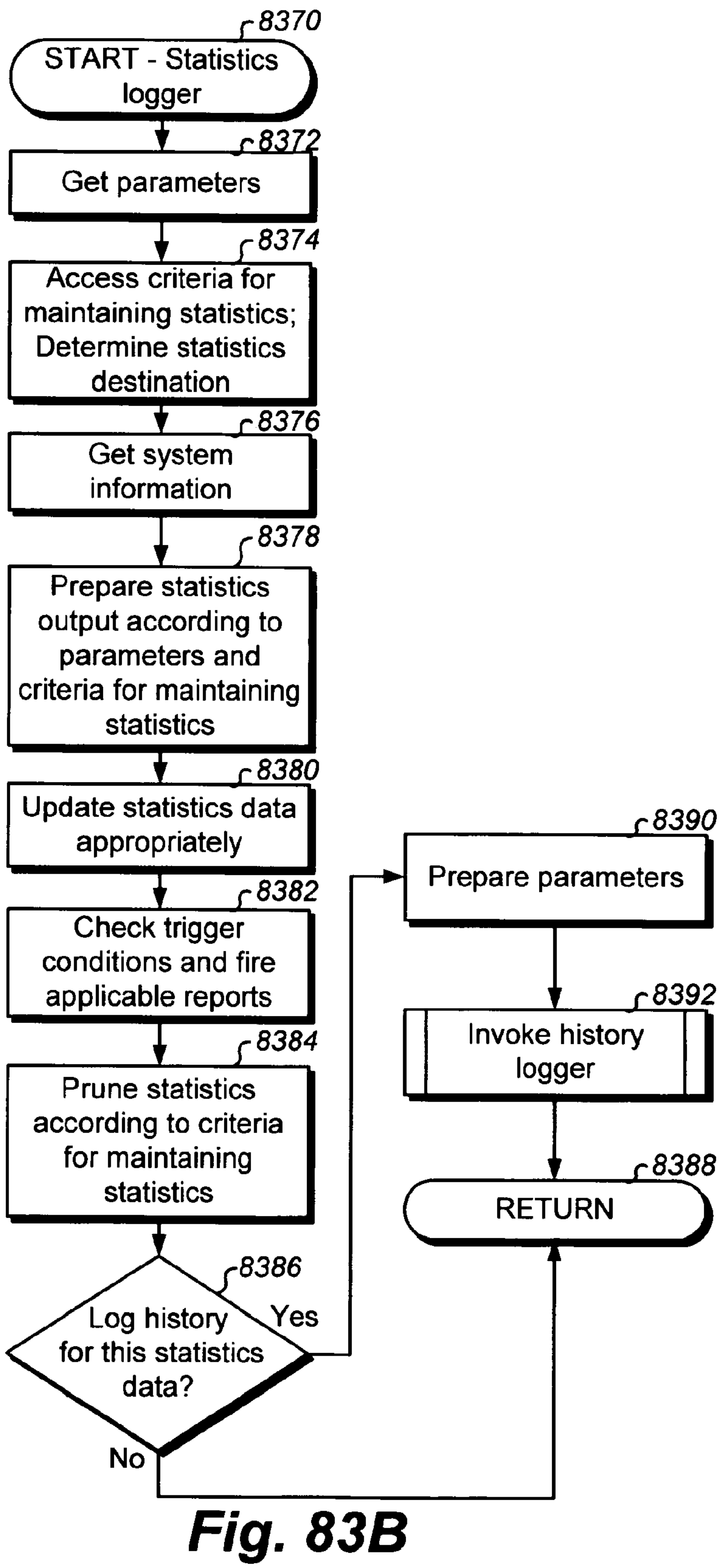
Figure 84A:
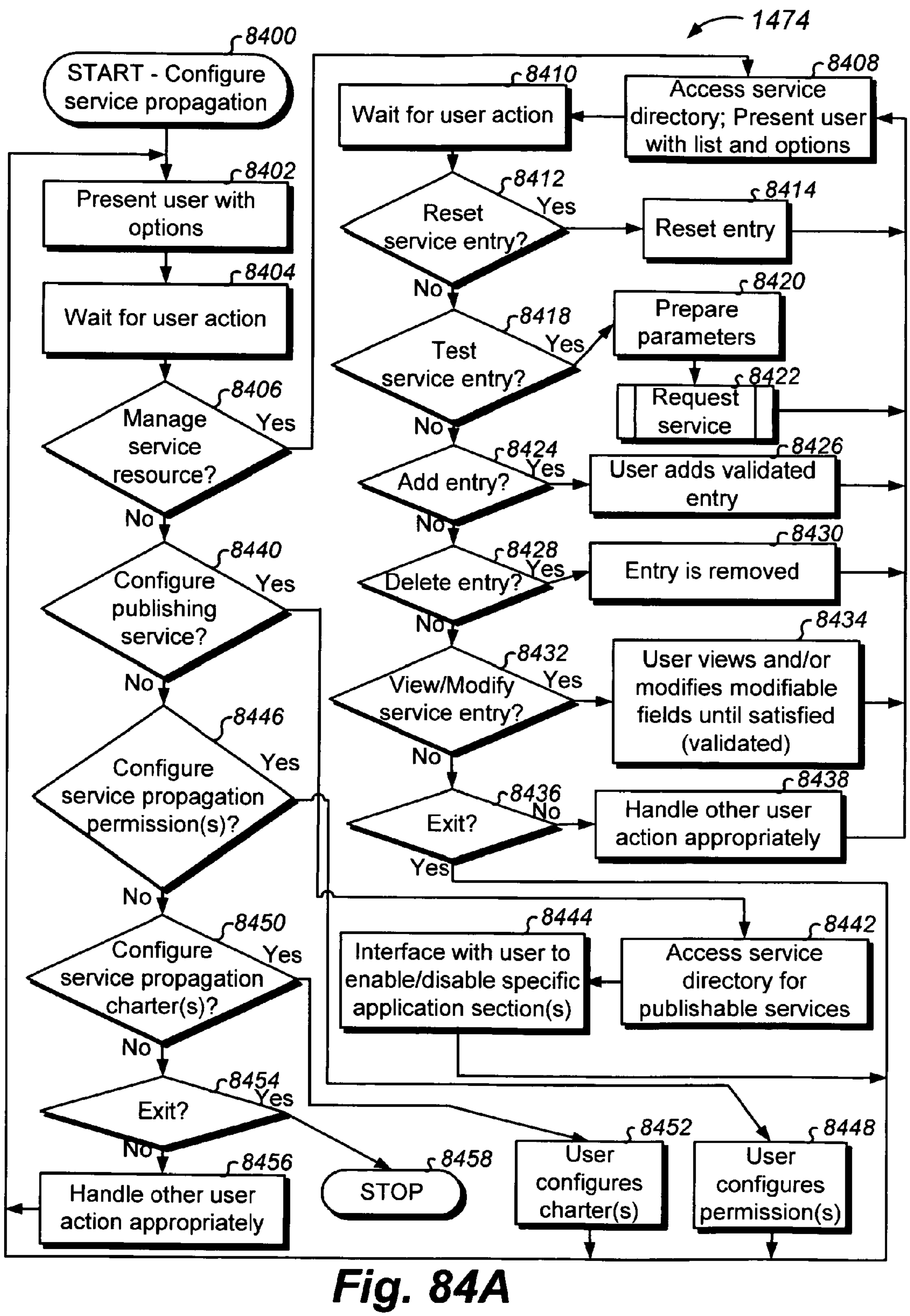
Figure 84B:
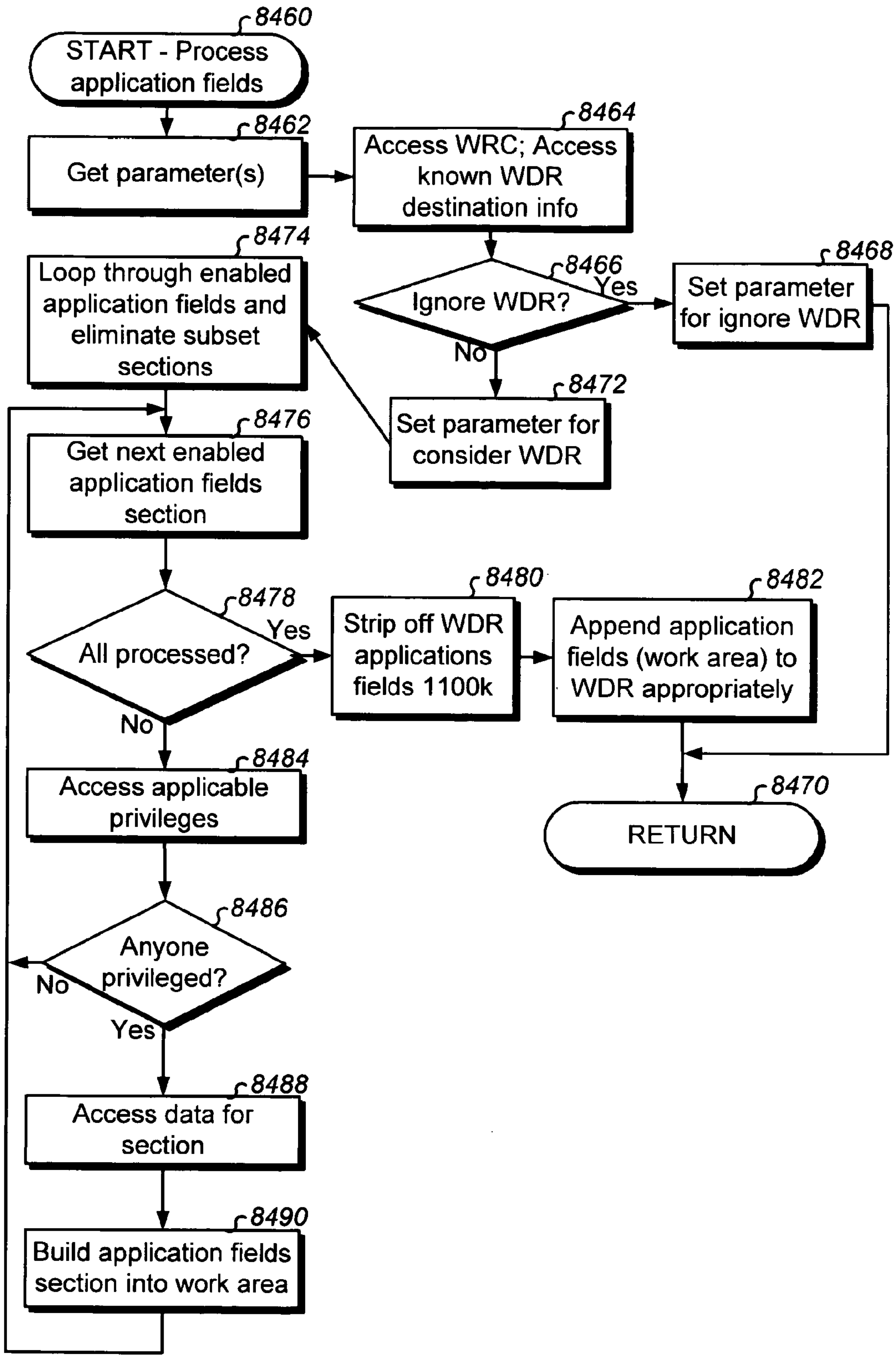
Figure 85A:
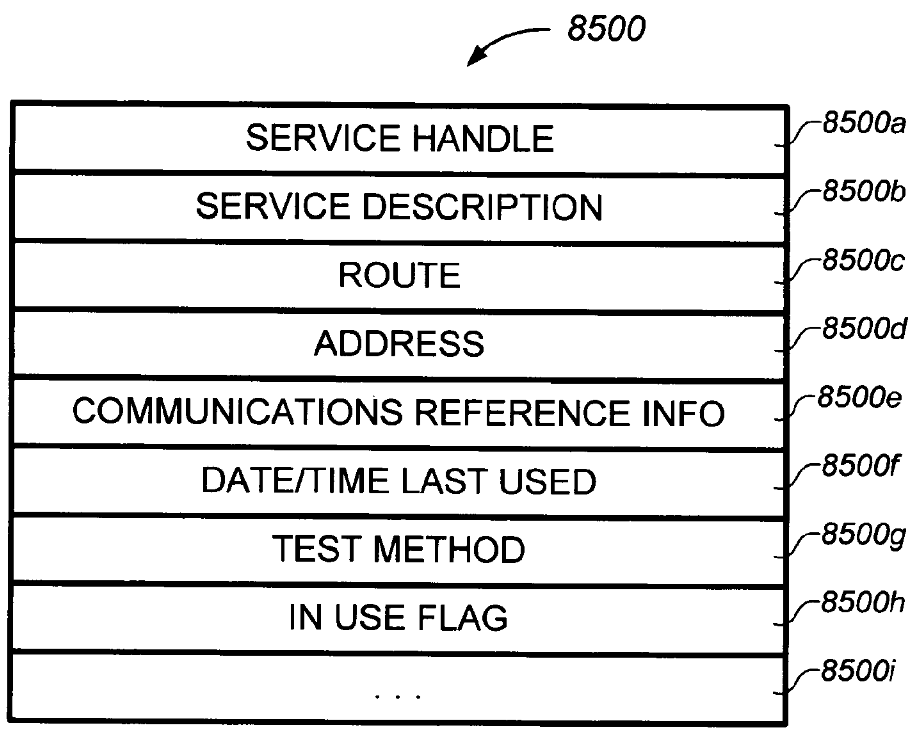
Figure 85B:
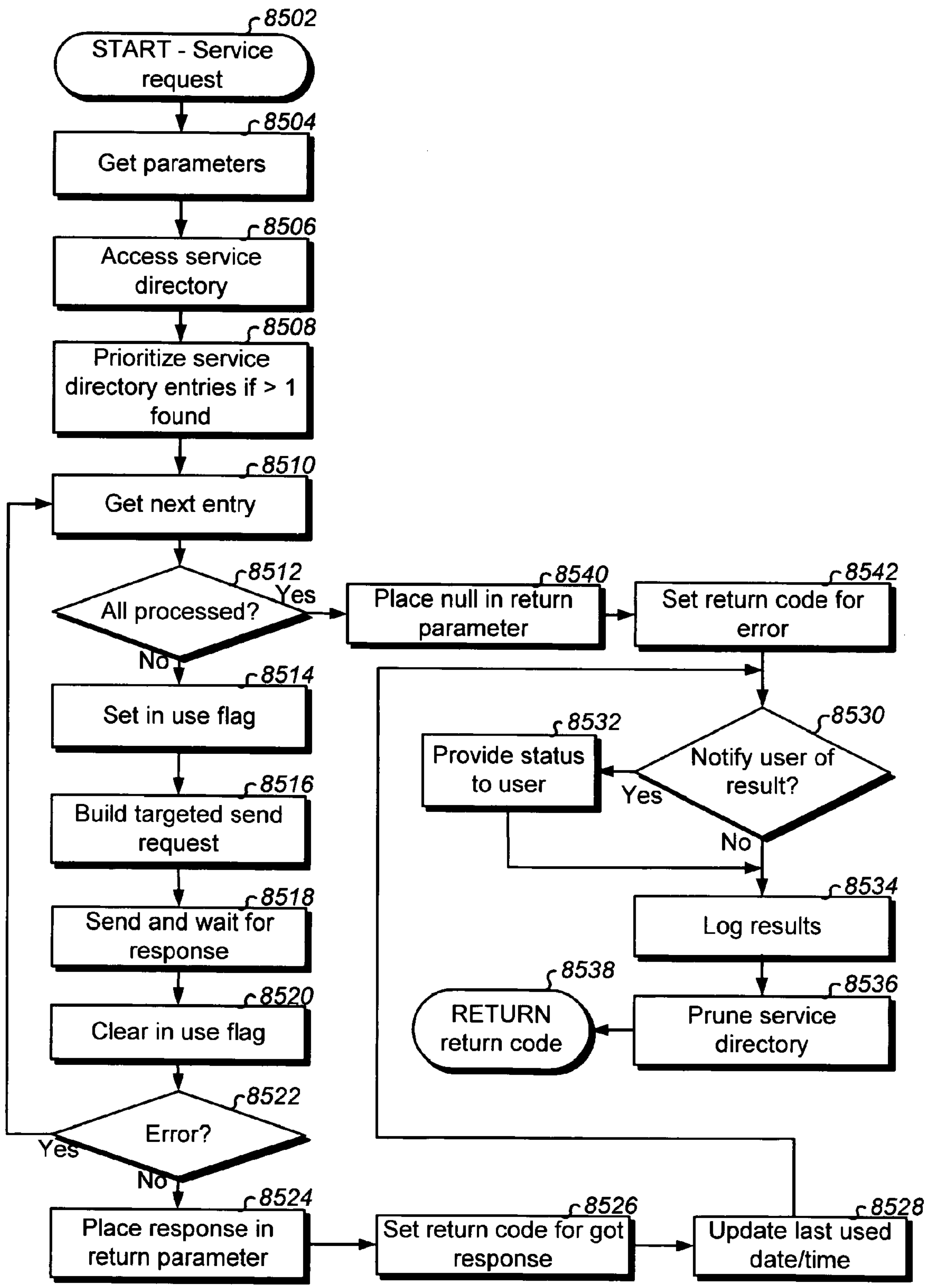
Figure 85C:
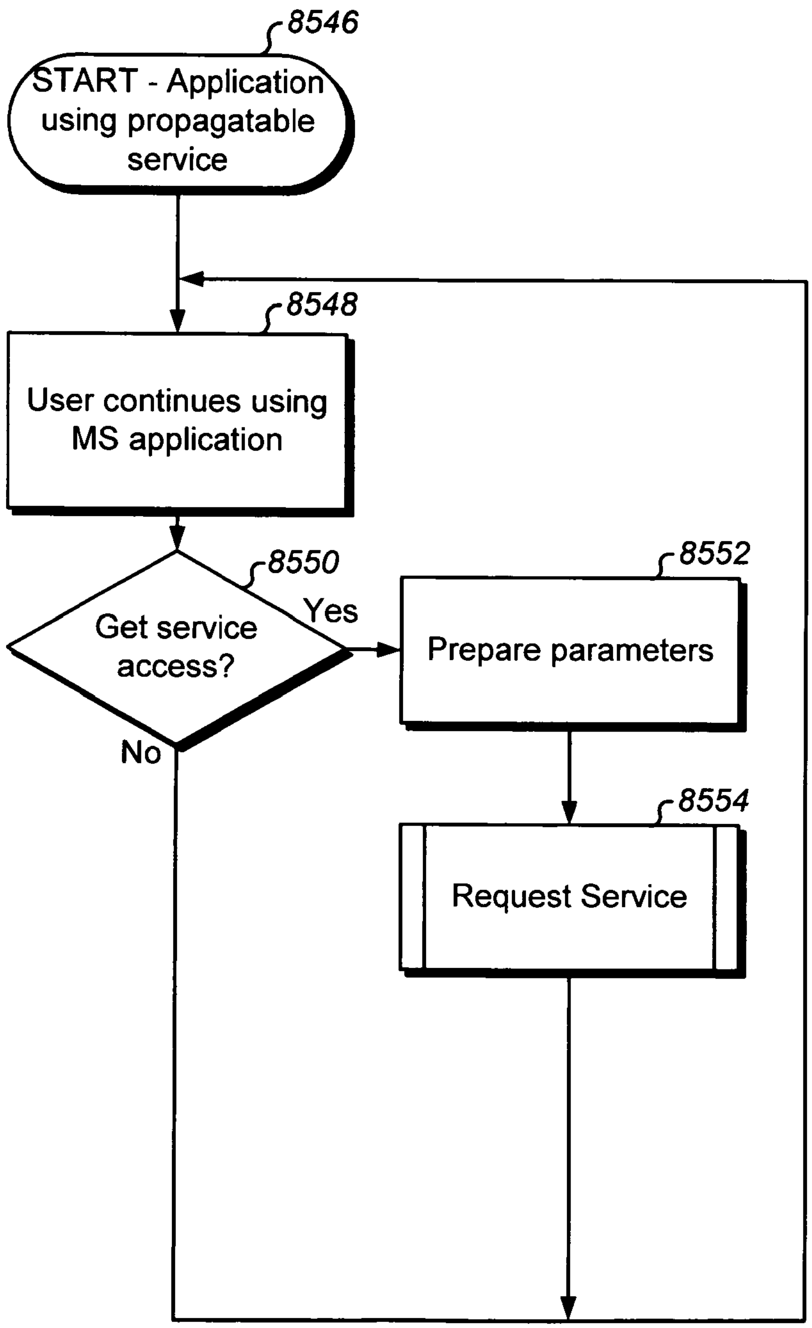
Figure 85D:
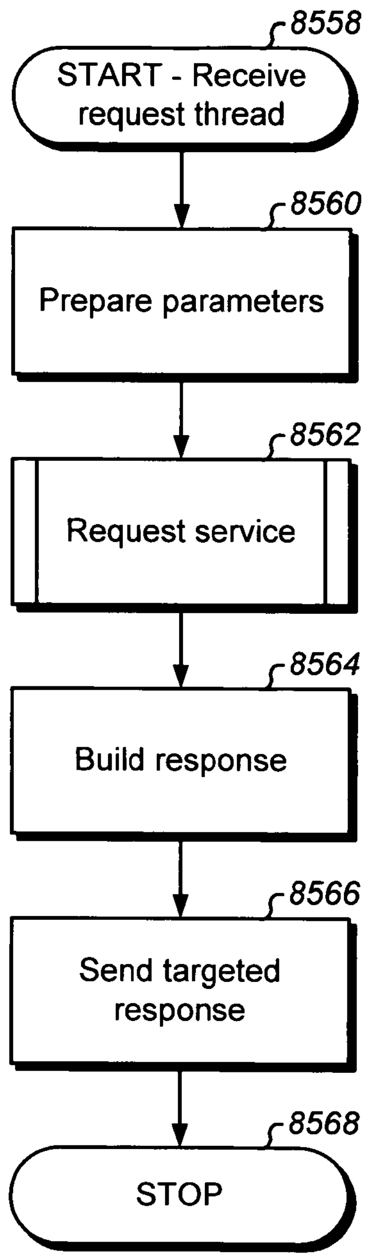
Figure 85E:
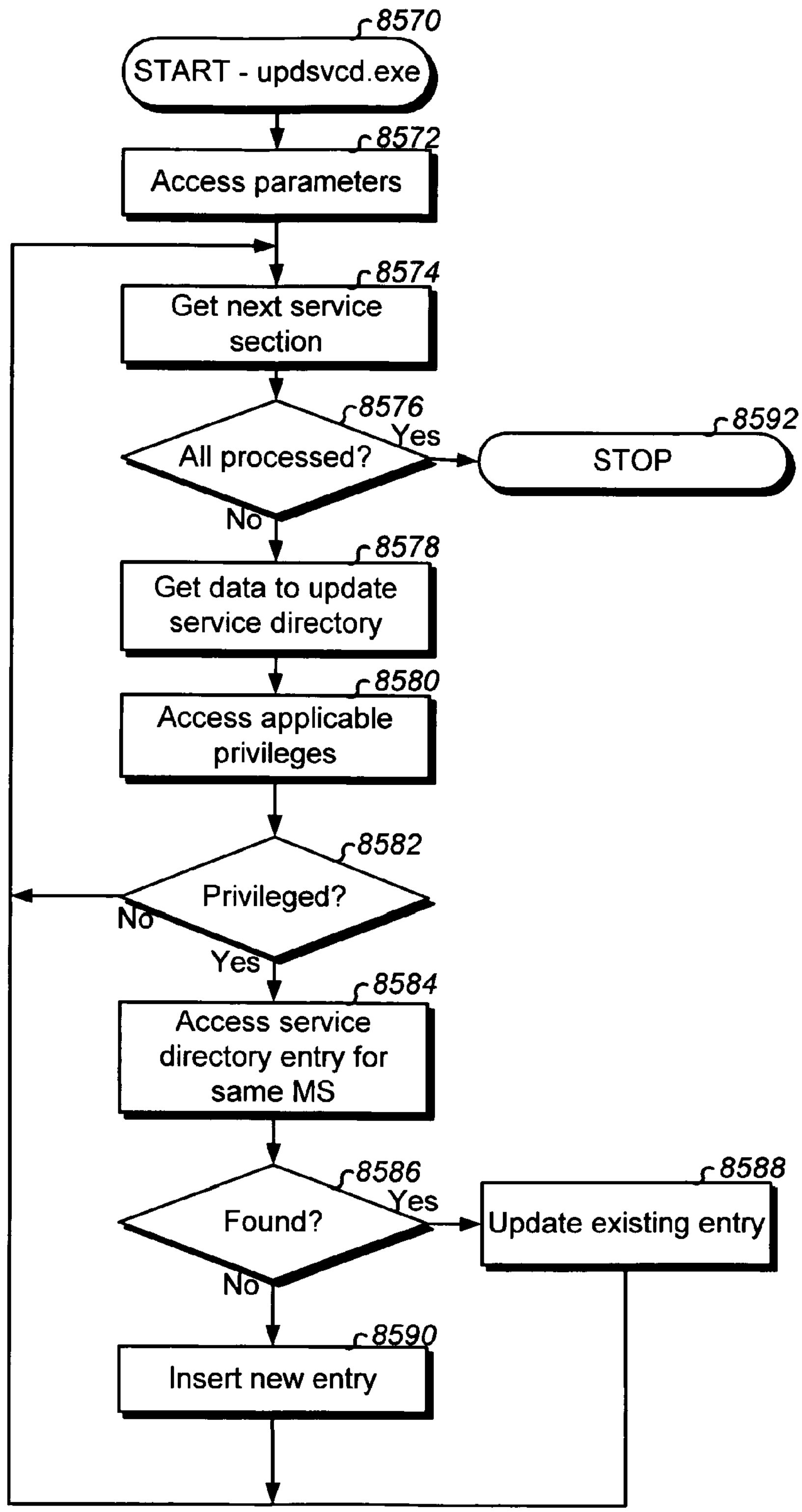
Figure 86A:
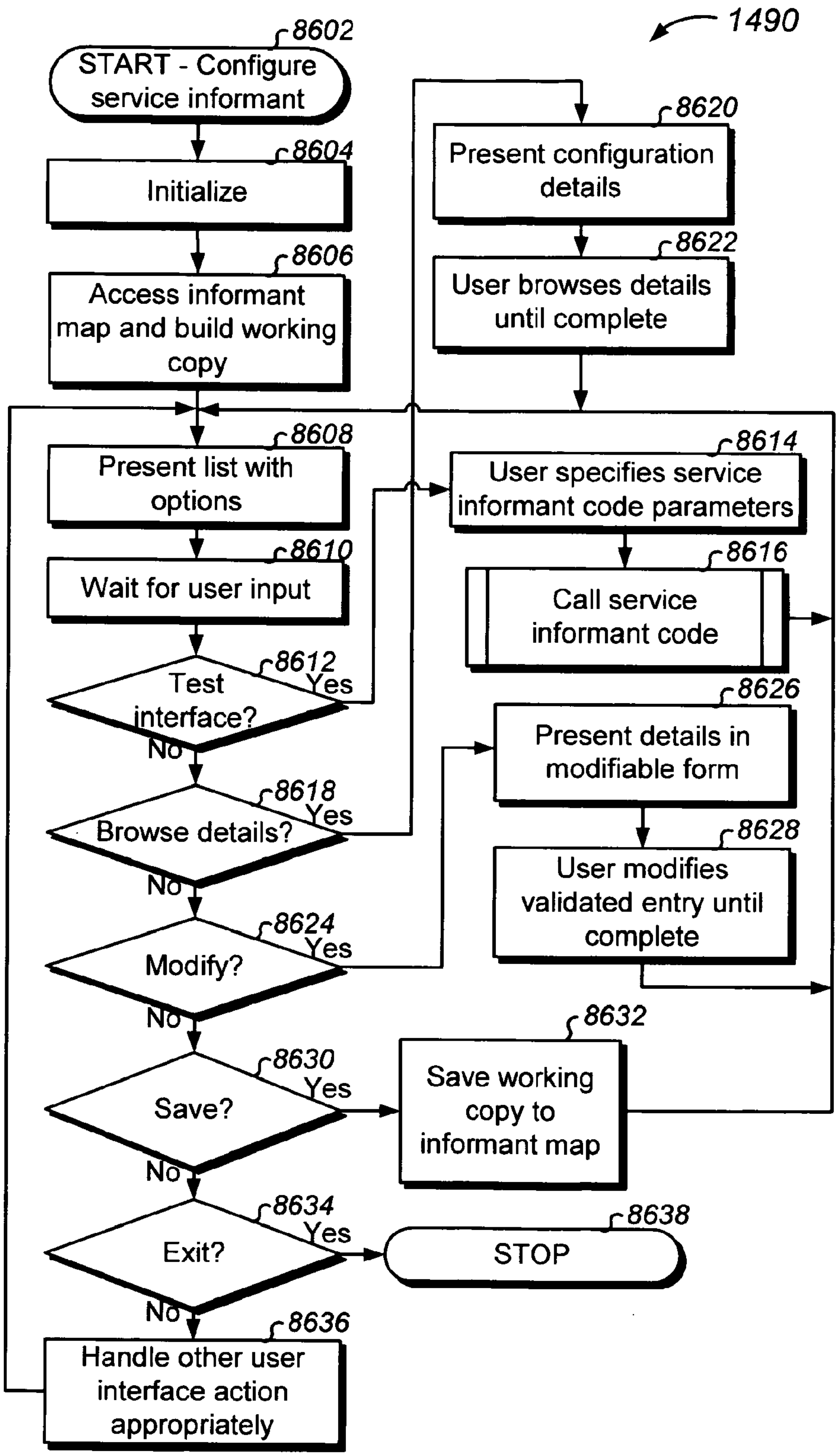
Figure 86B:
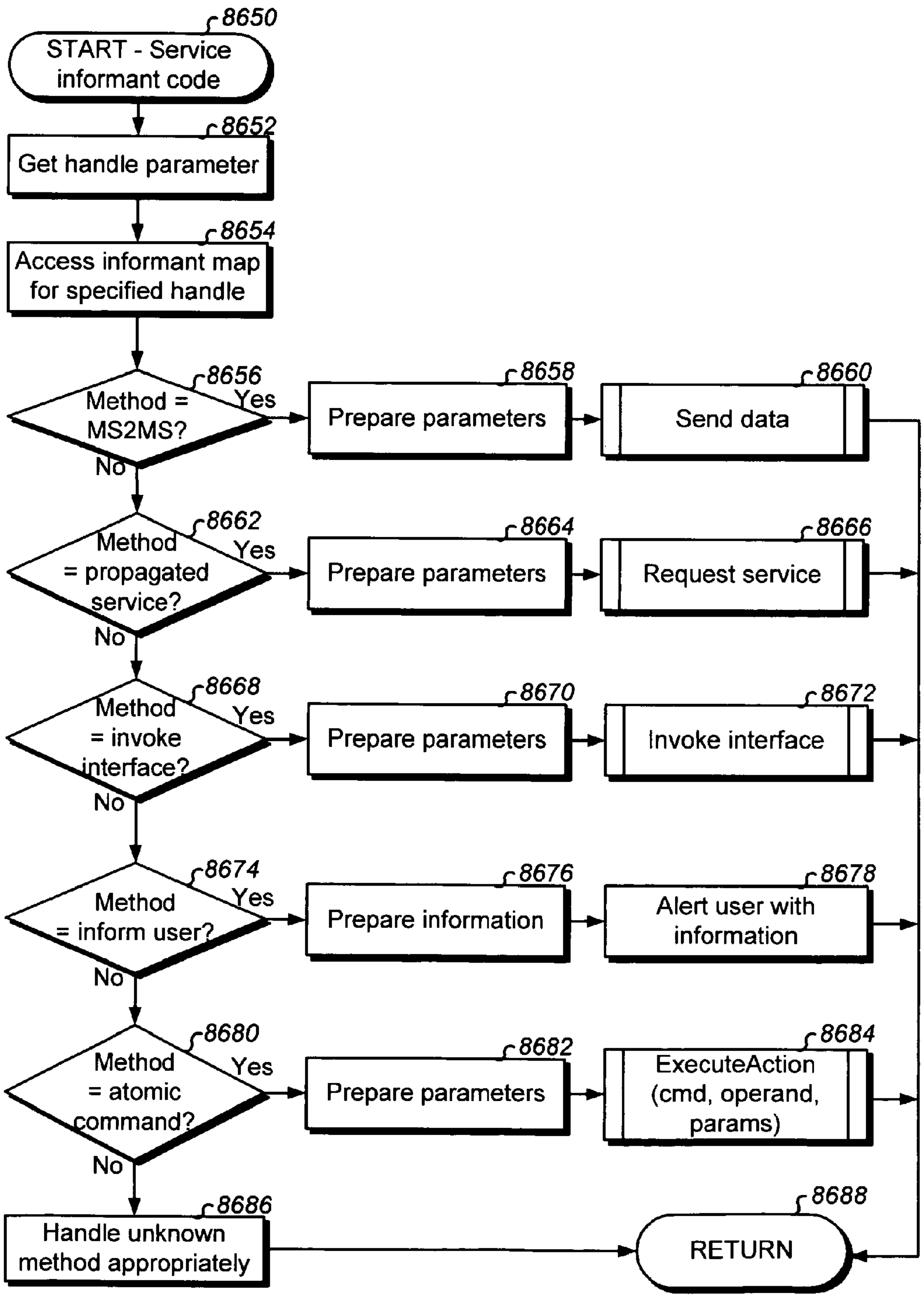
Figure 86C:
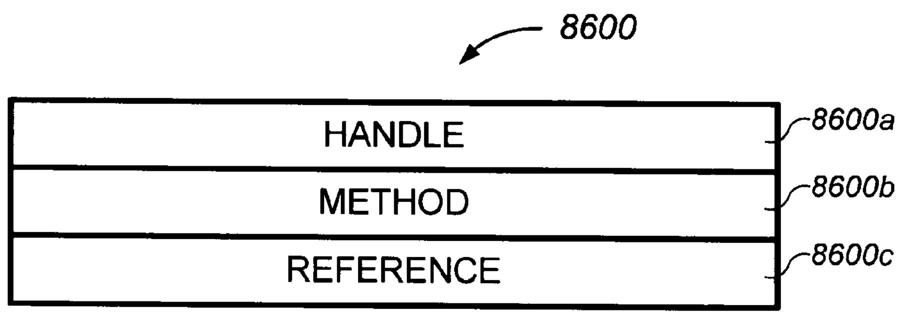
Figure 87A:
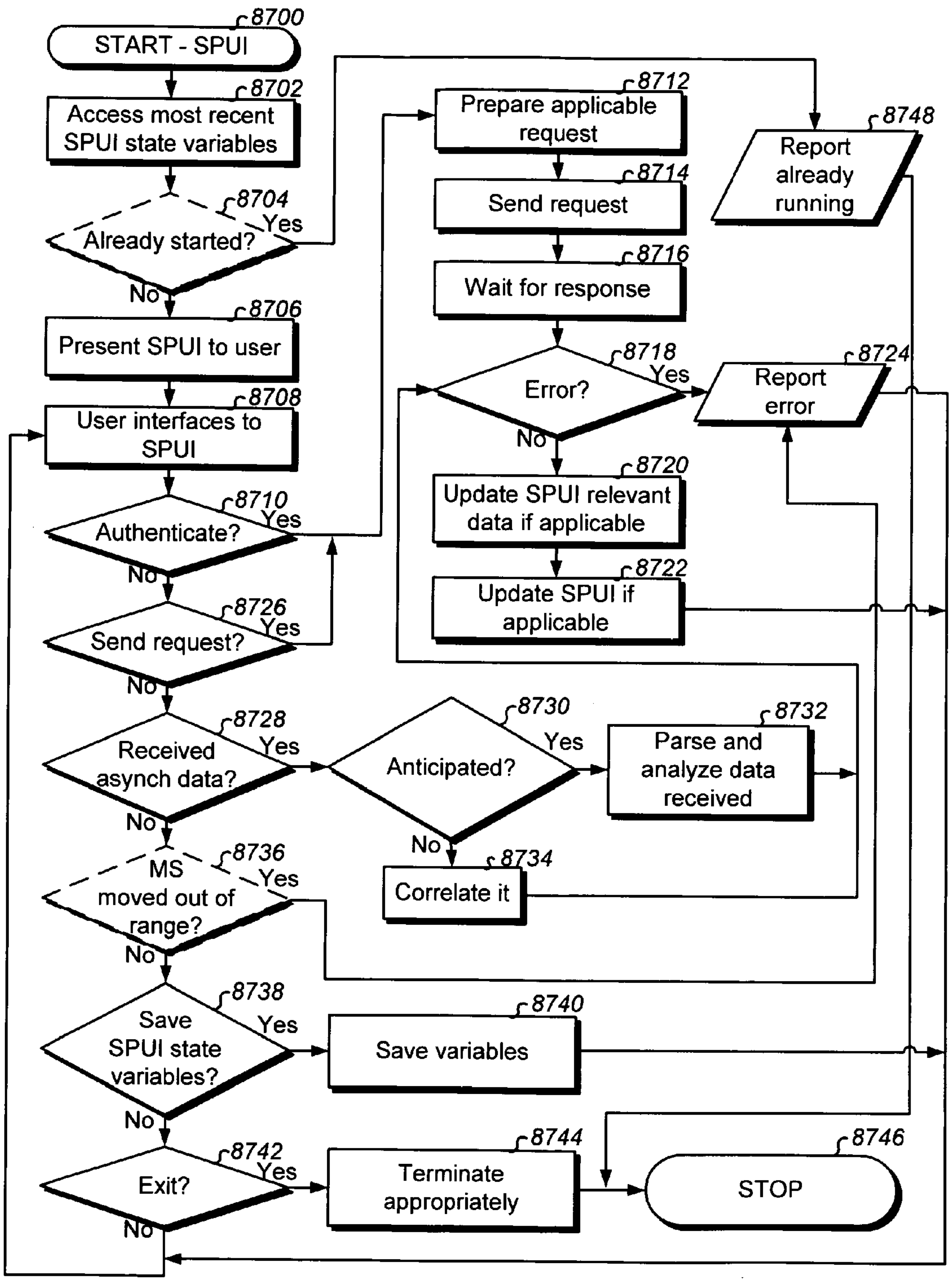
Figure 87B:
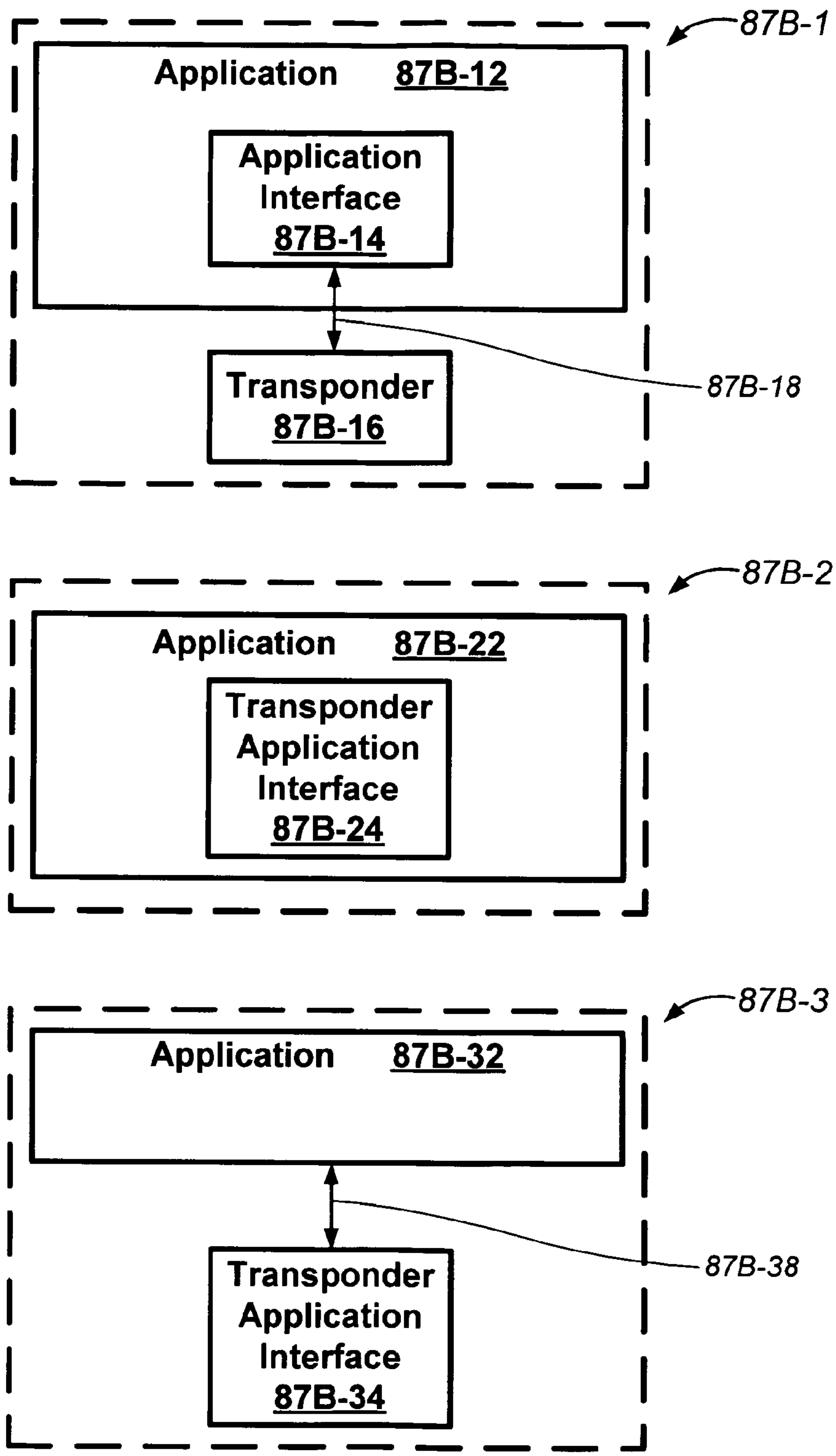
Figure 87C:
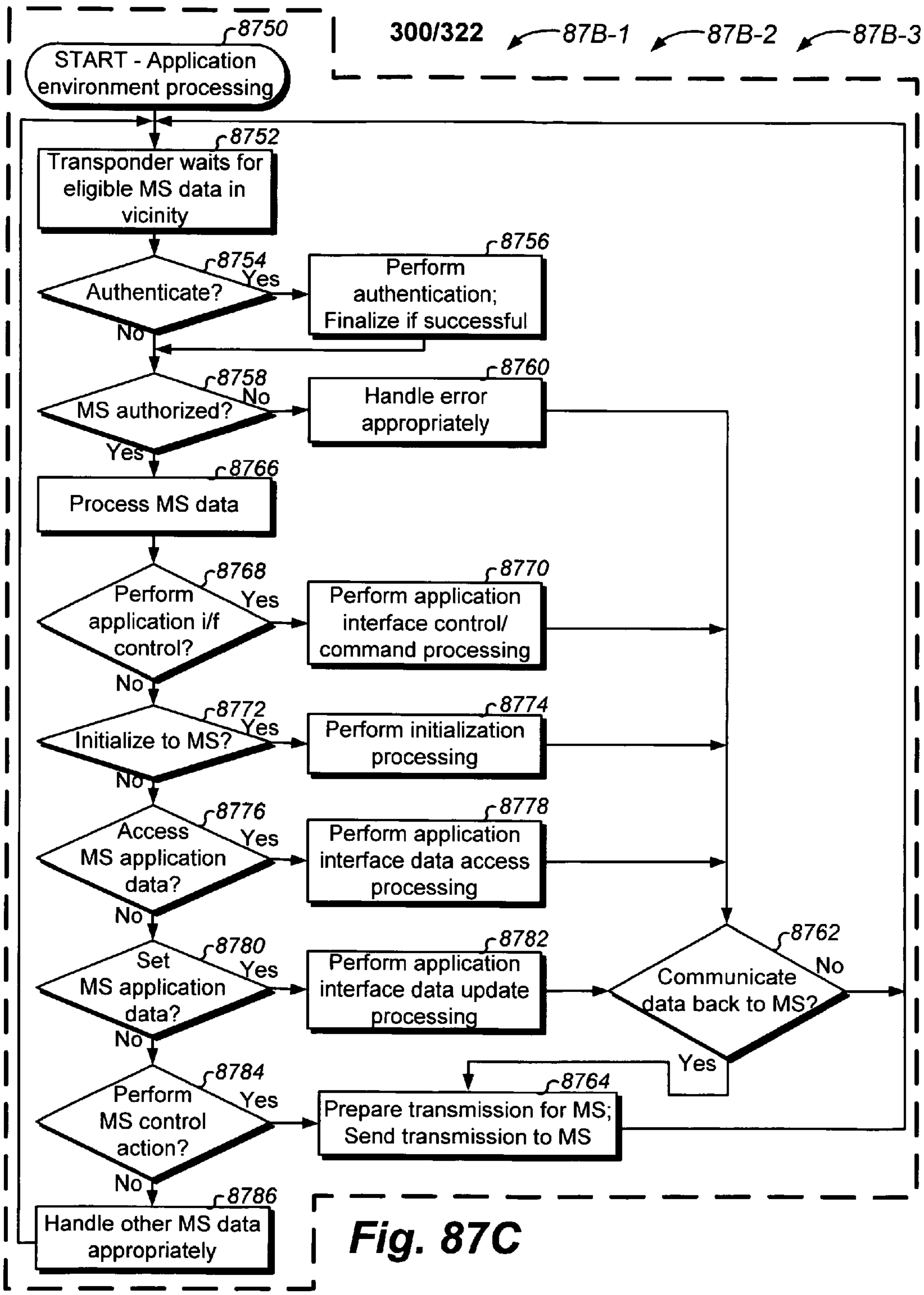
Figure 88A:
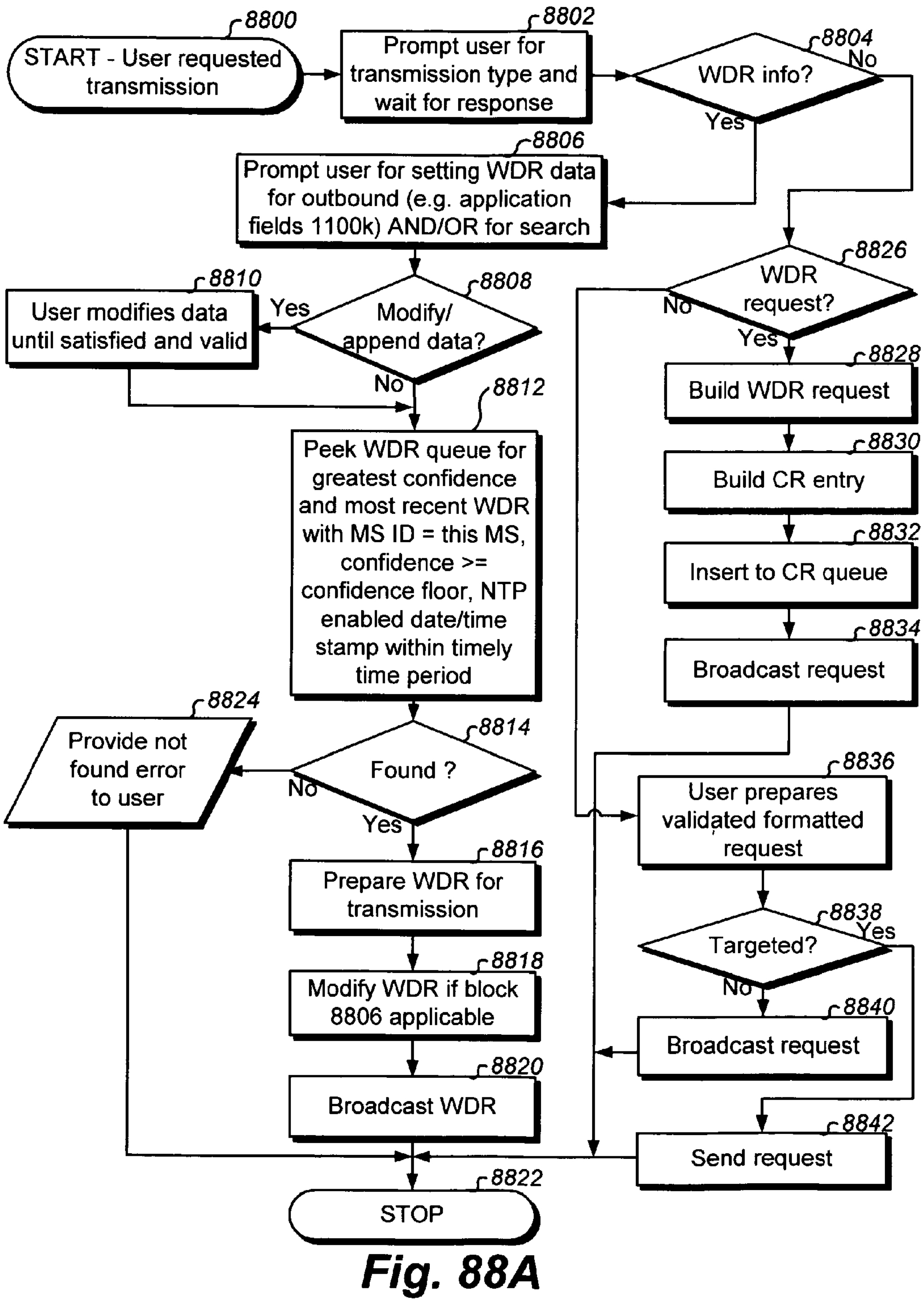
Figure 88B:
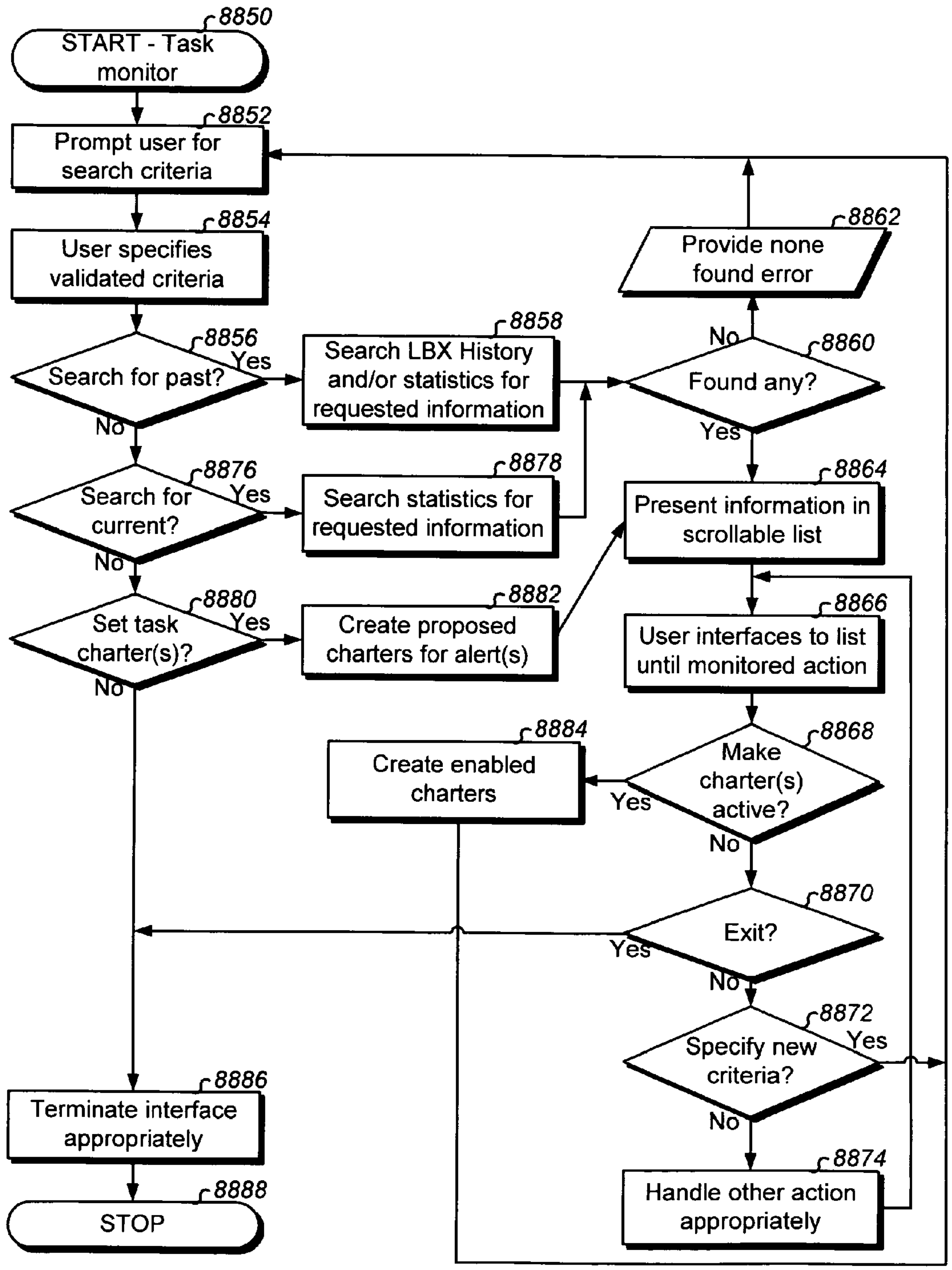
Figure 89A:
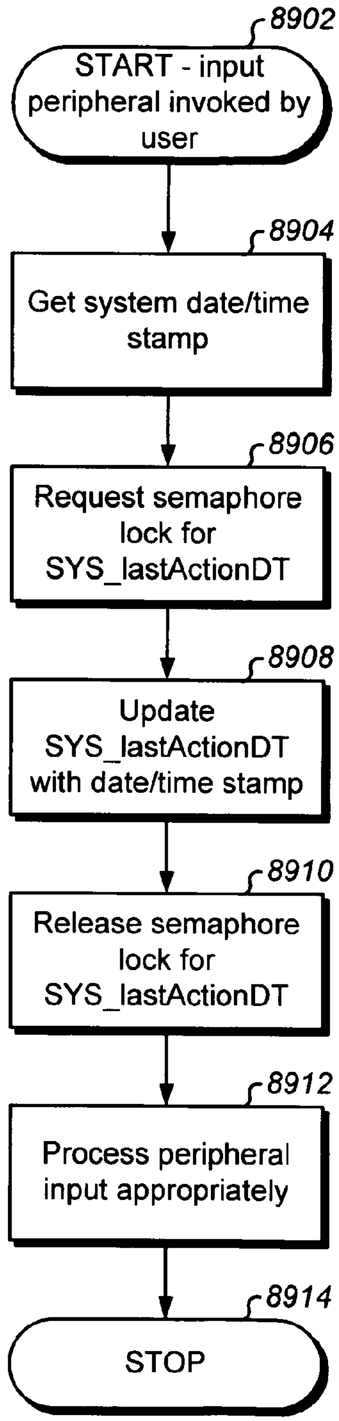
Figure 90A:
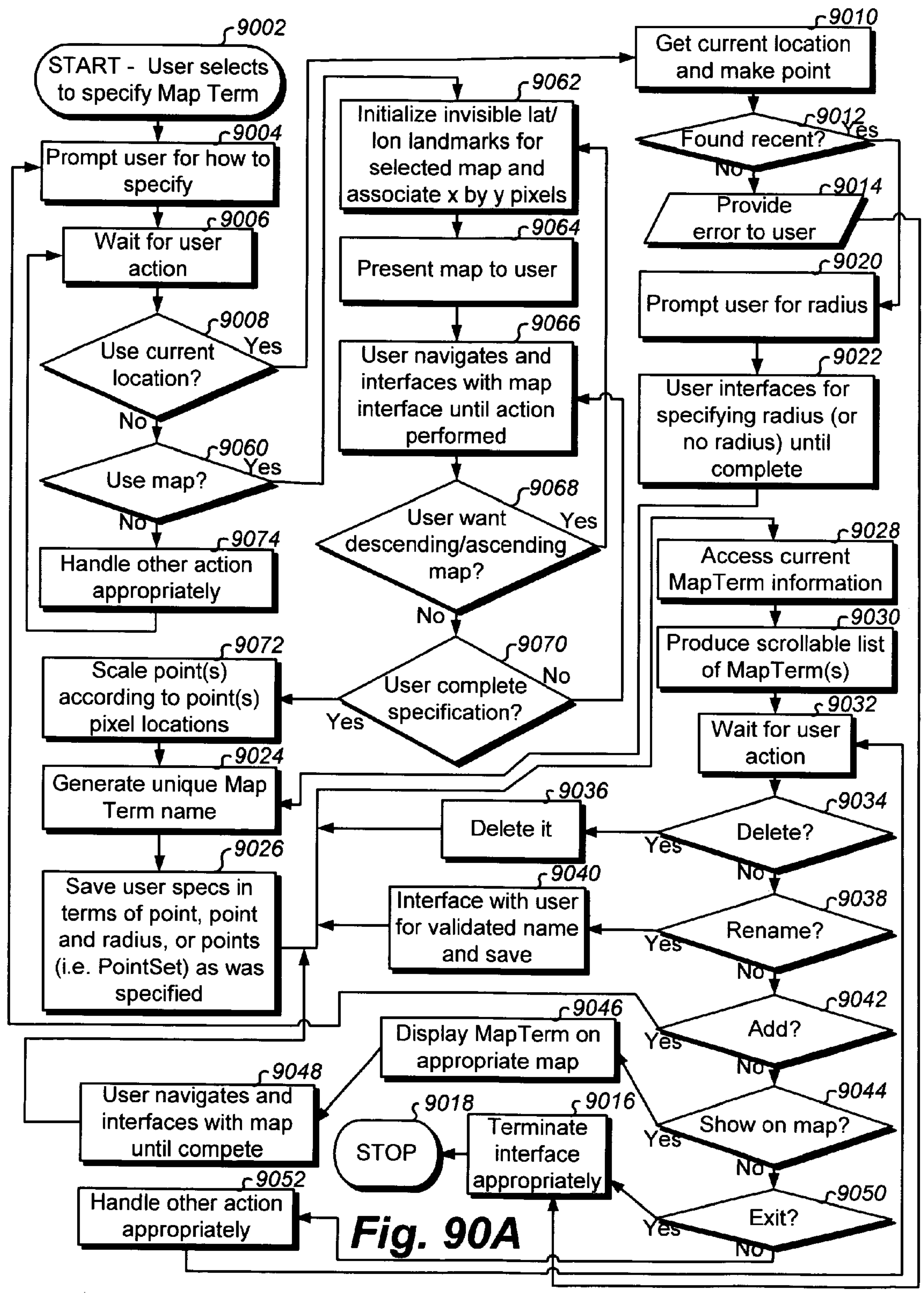
Figure 90B:
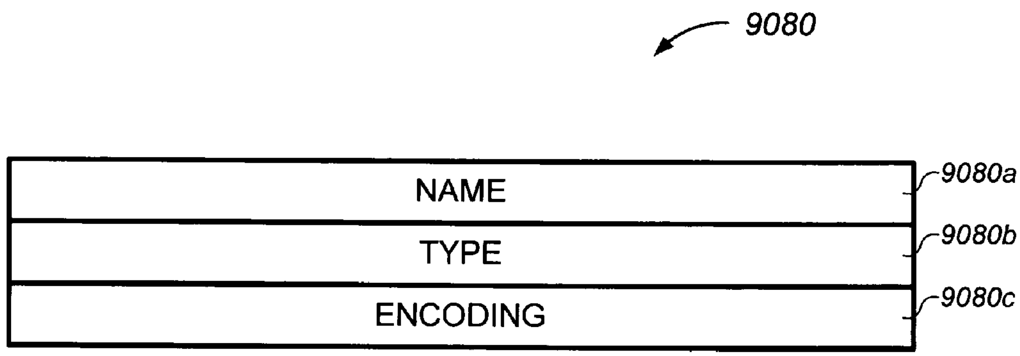
Figure 91A:
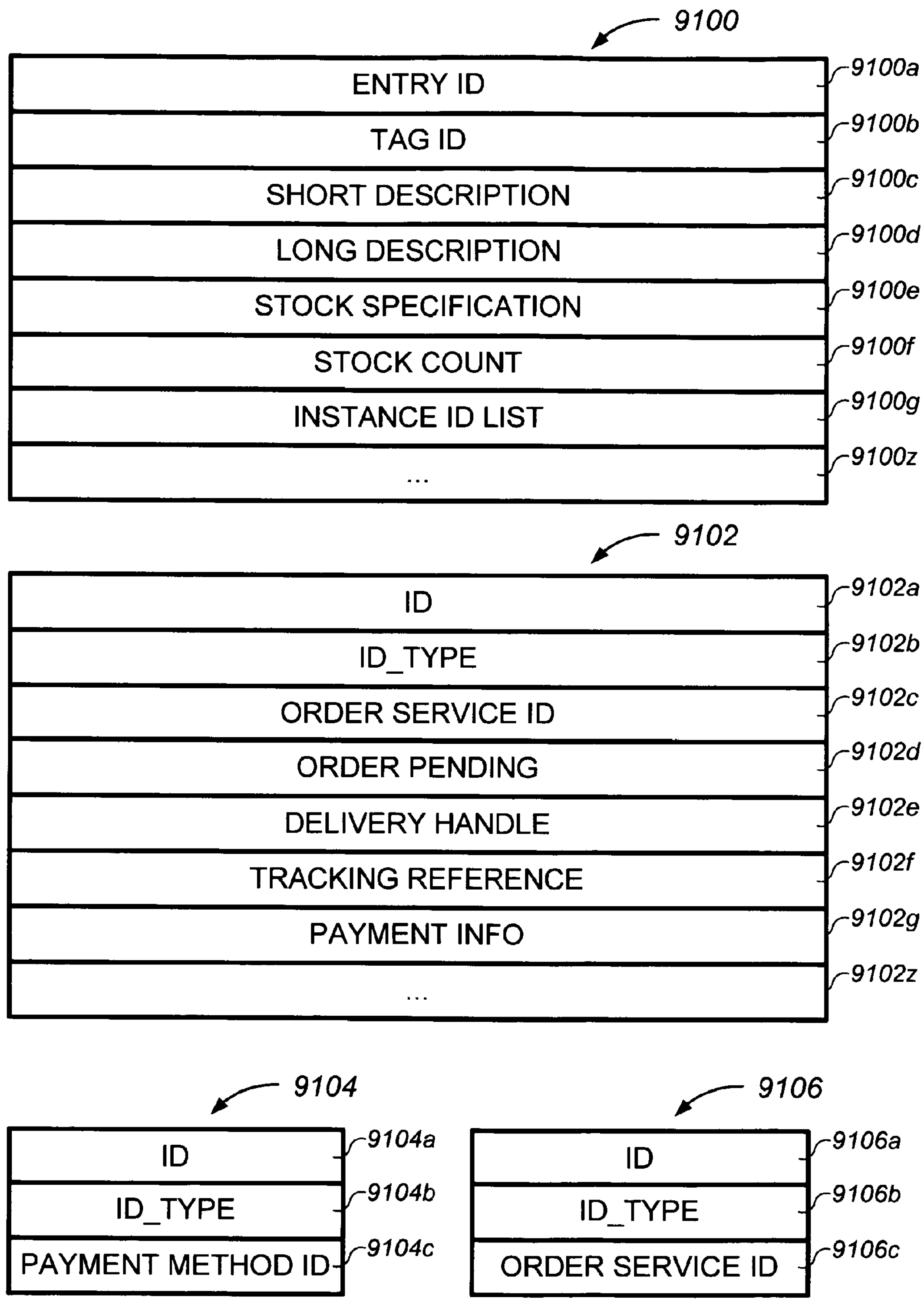
Figure 91B:
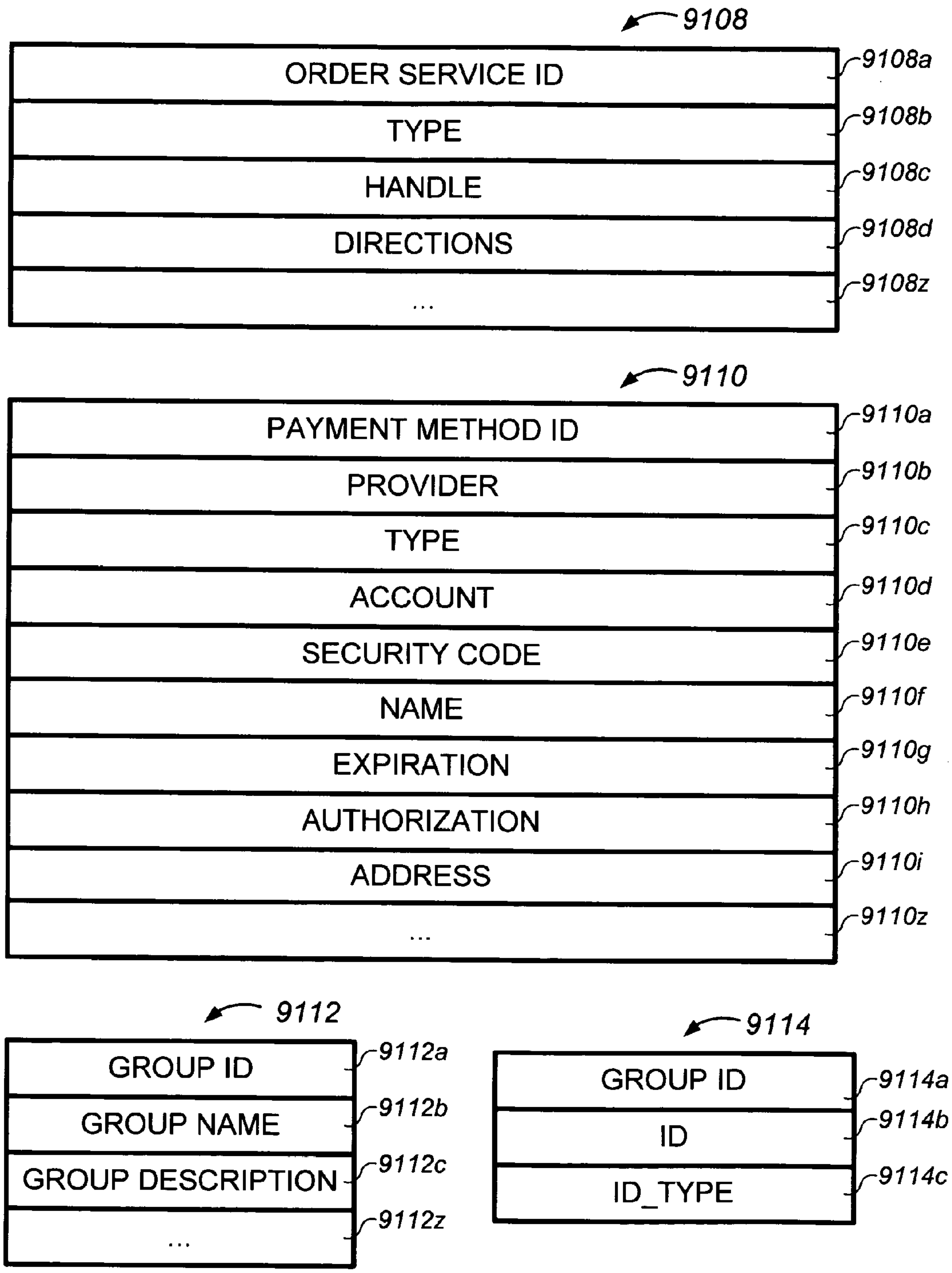
Figure 91C:
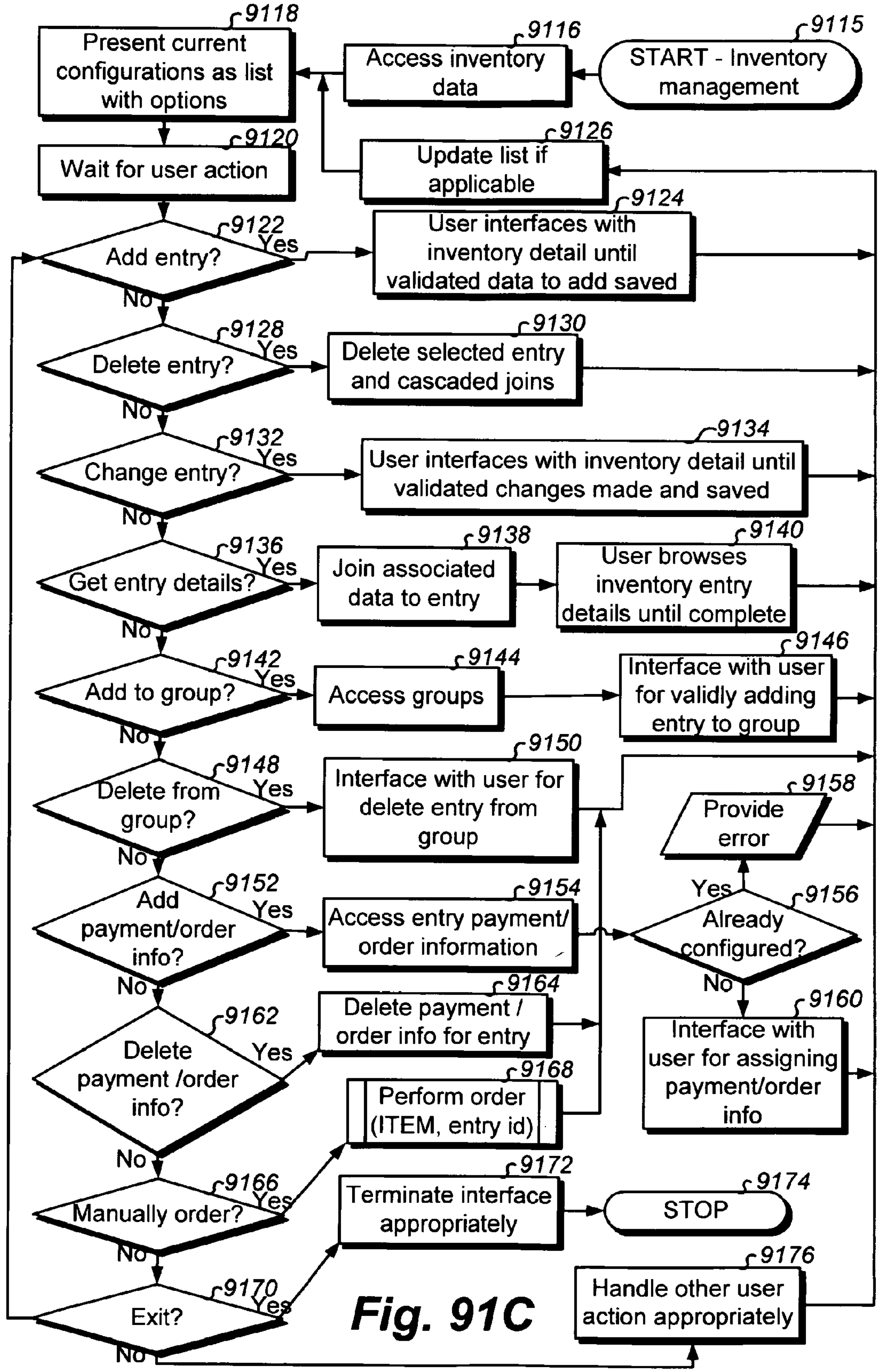
Figure 91D:
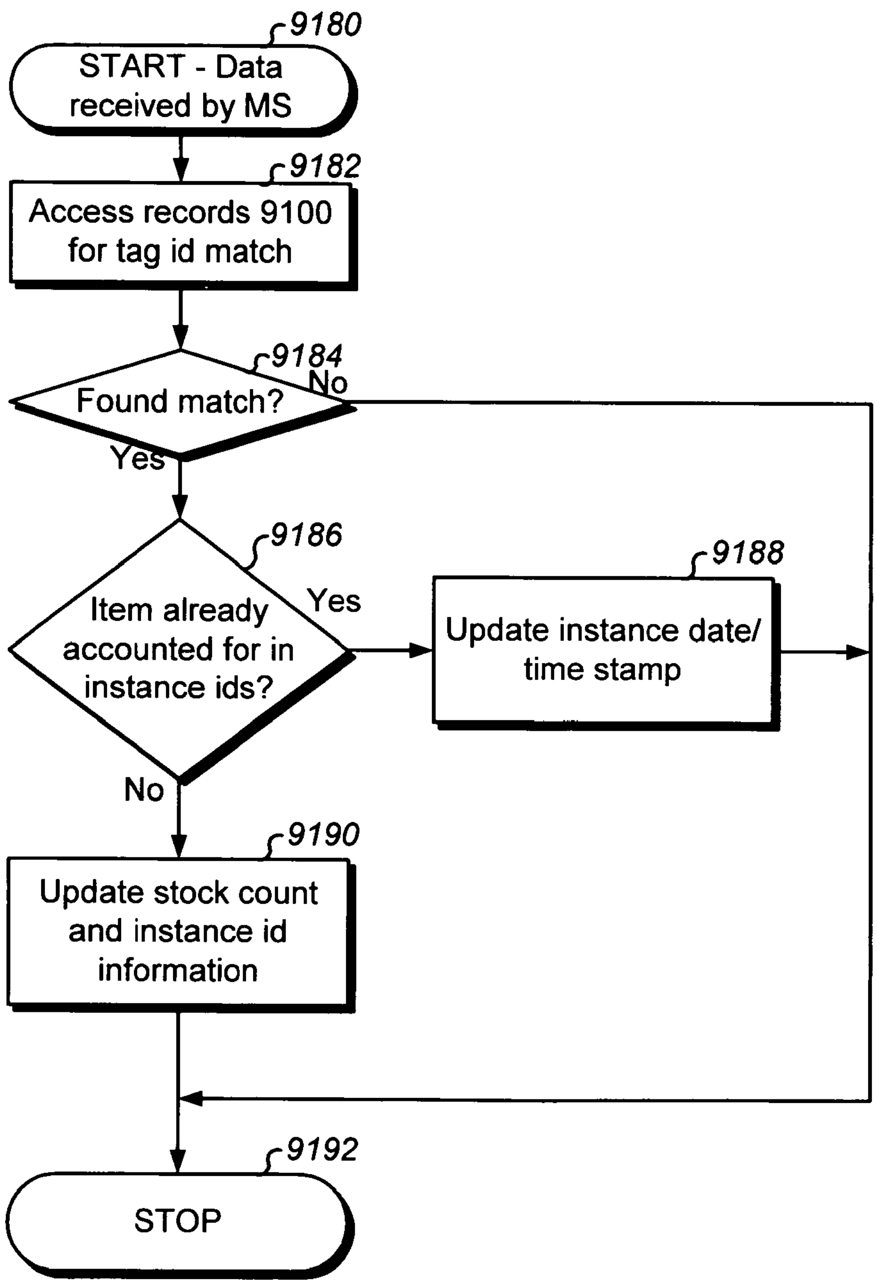
Figure 92A:
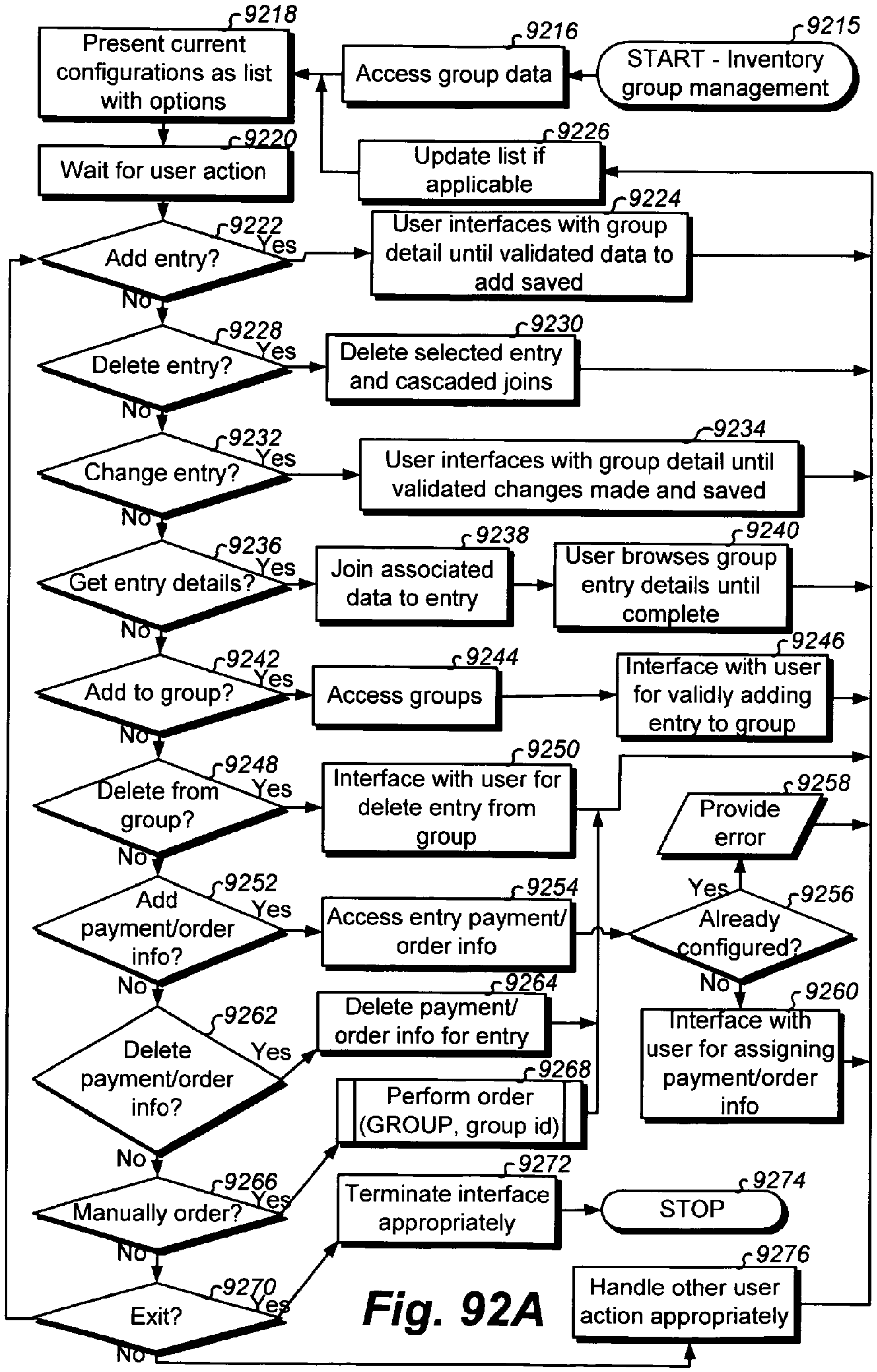
Figure 92B:
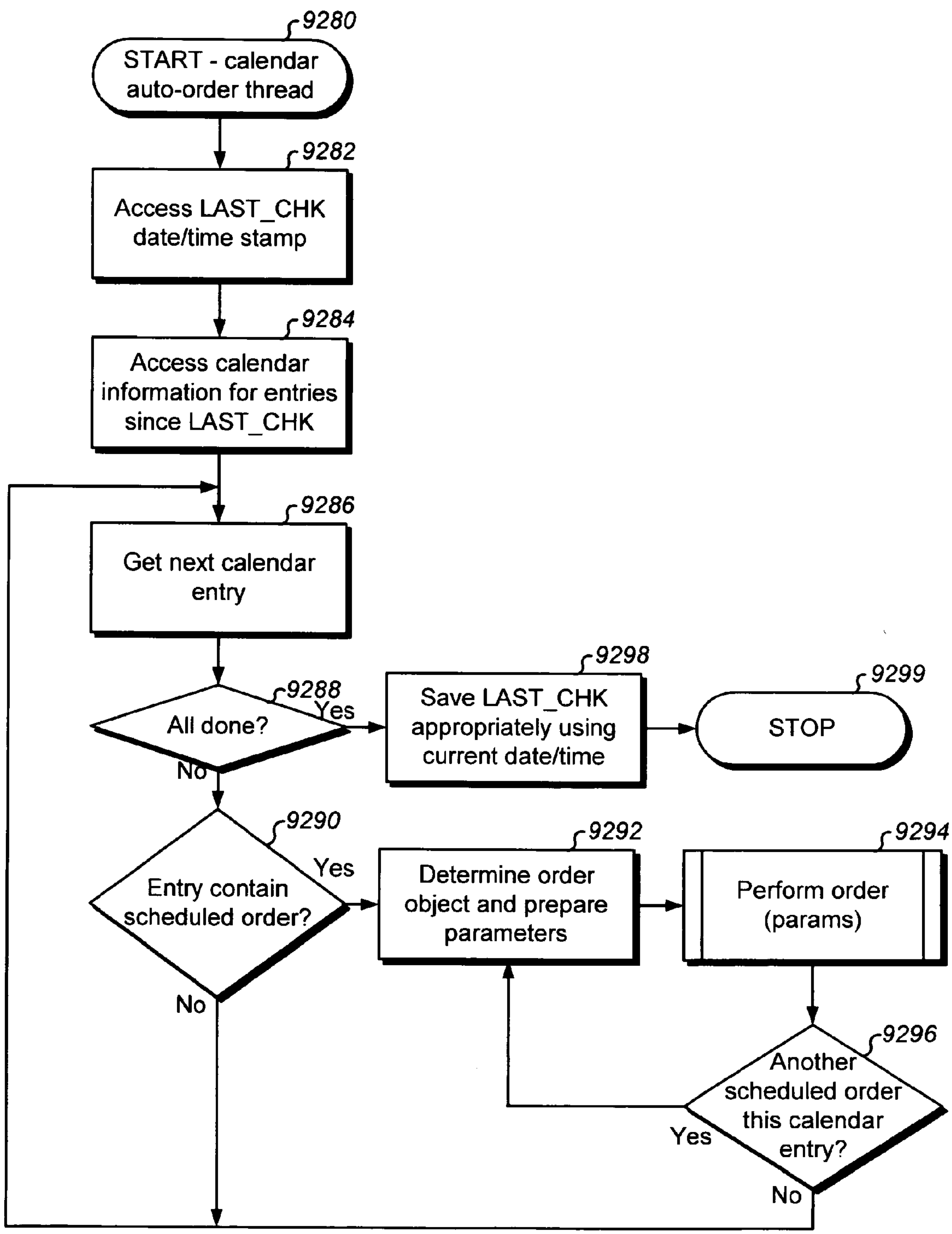
Figure 93A:
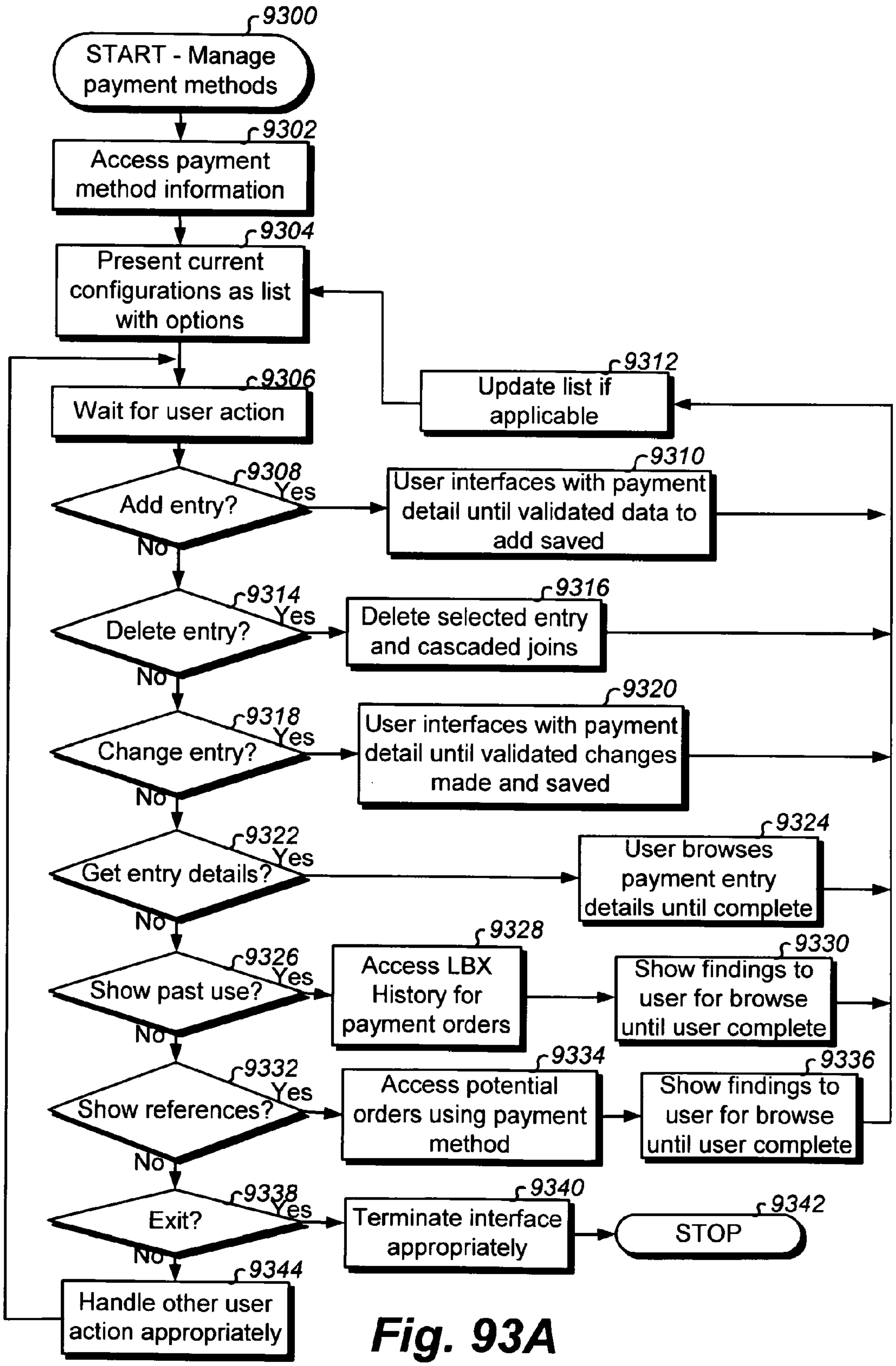
Figure 93B:
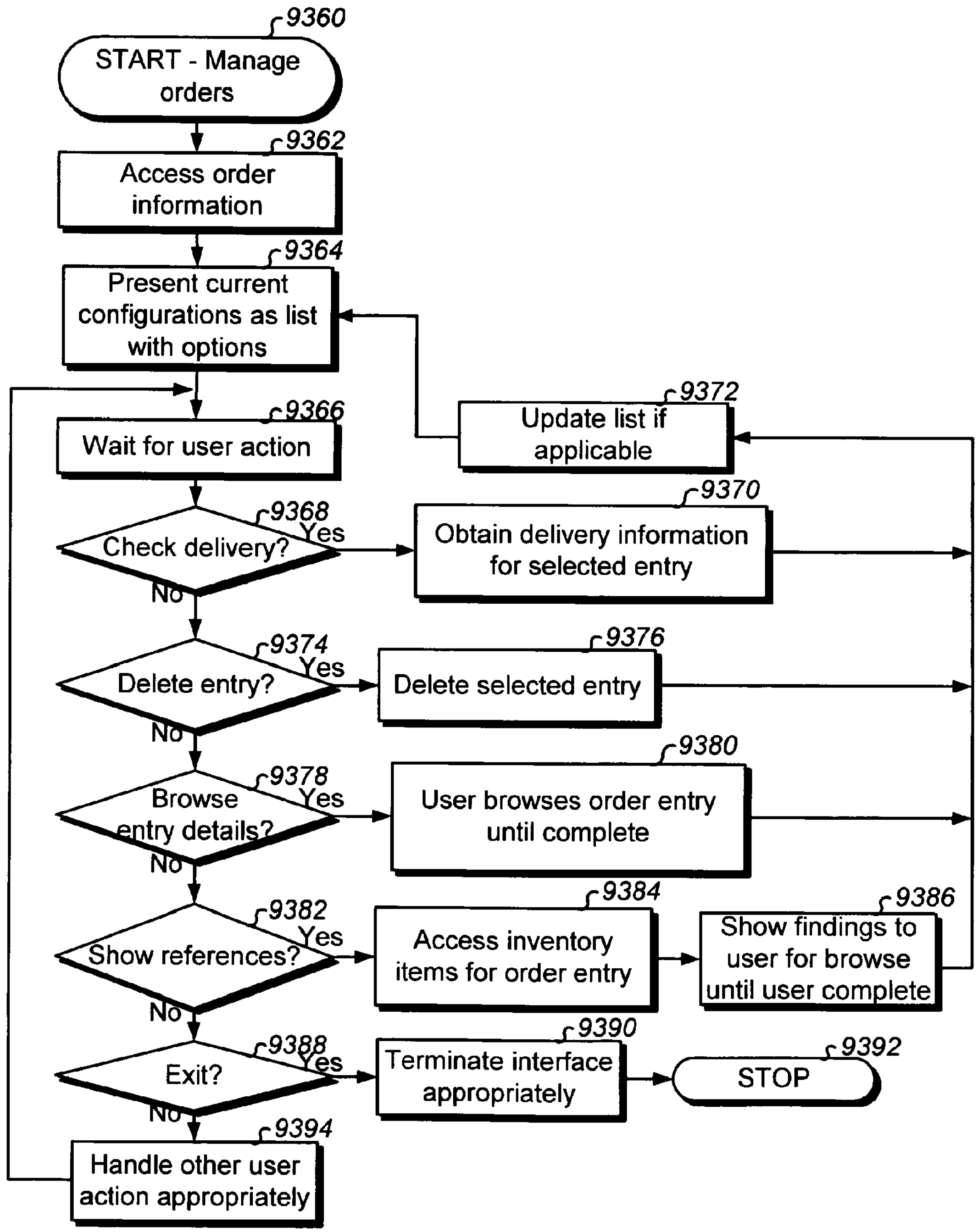
Figure 94A:
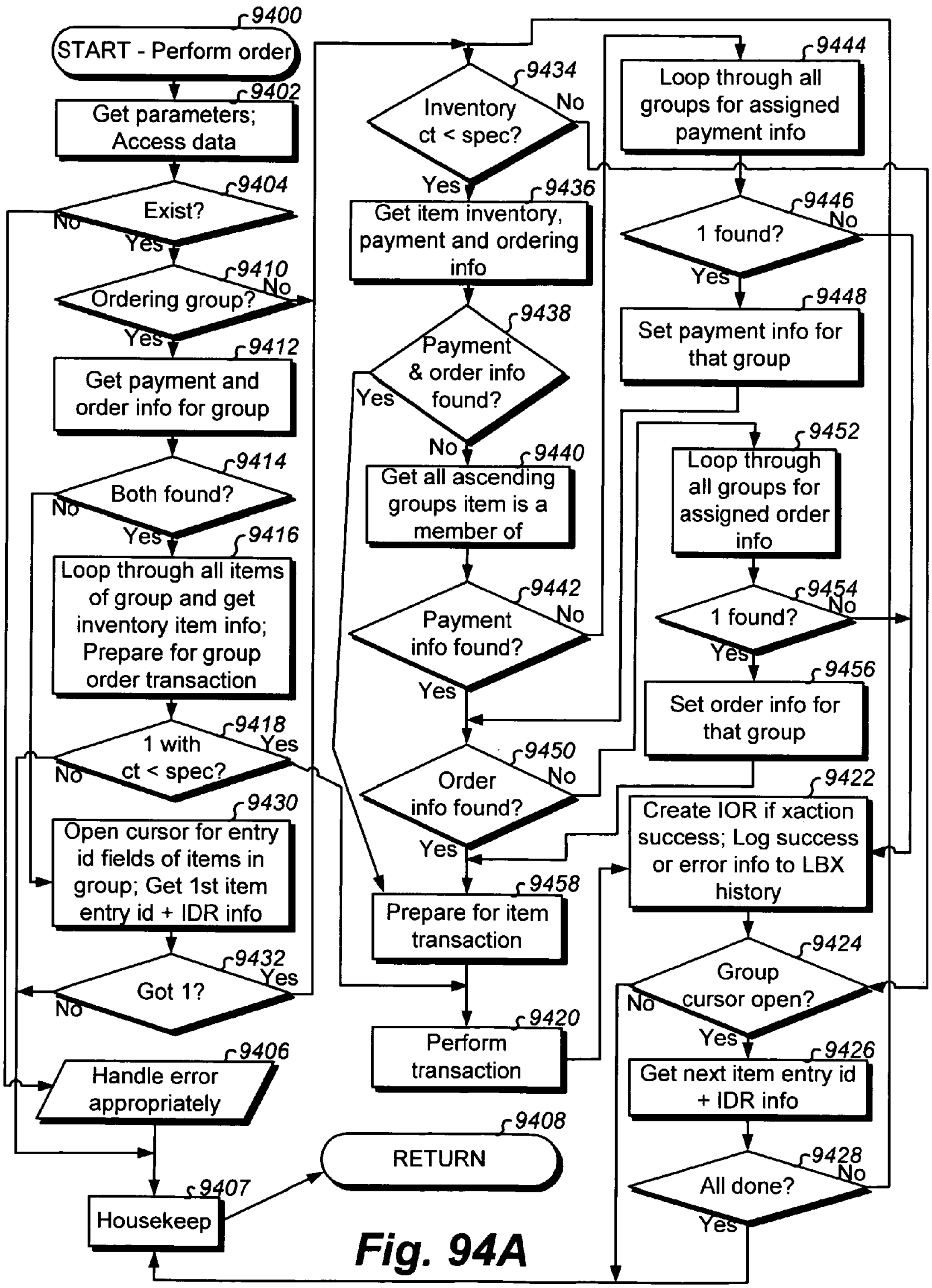
Figure 94B:
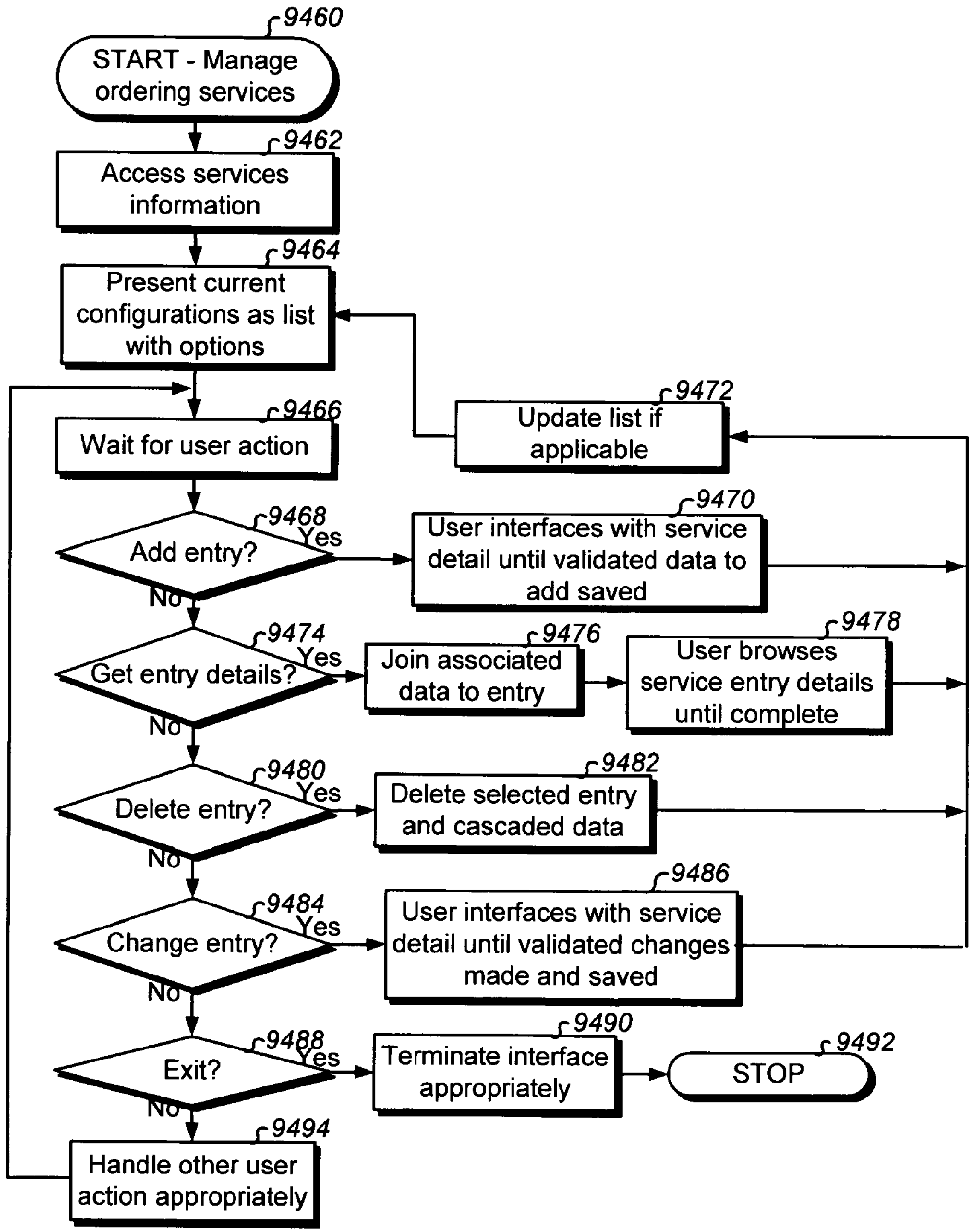
Figure 95A:
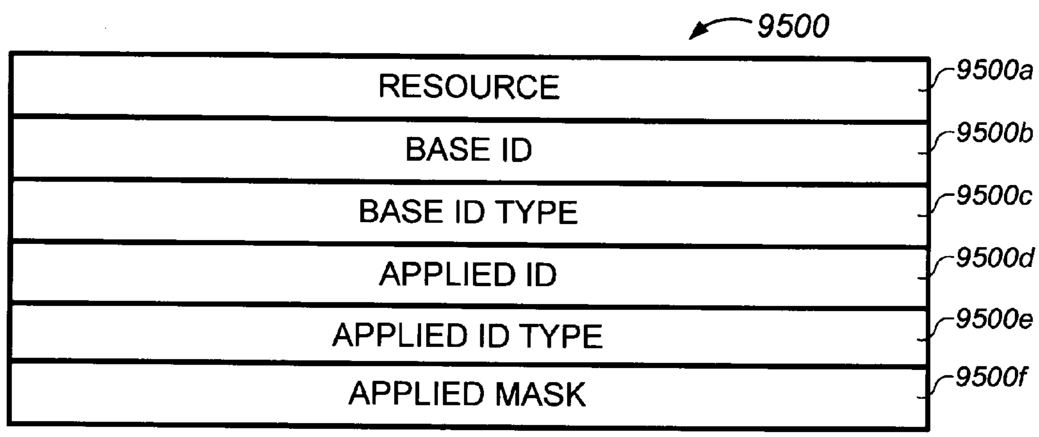
Figure 95B:
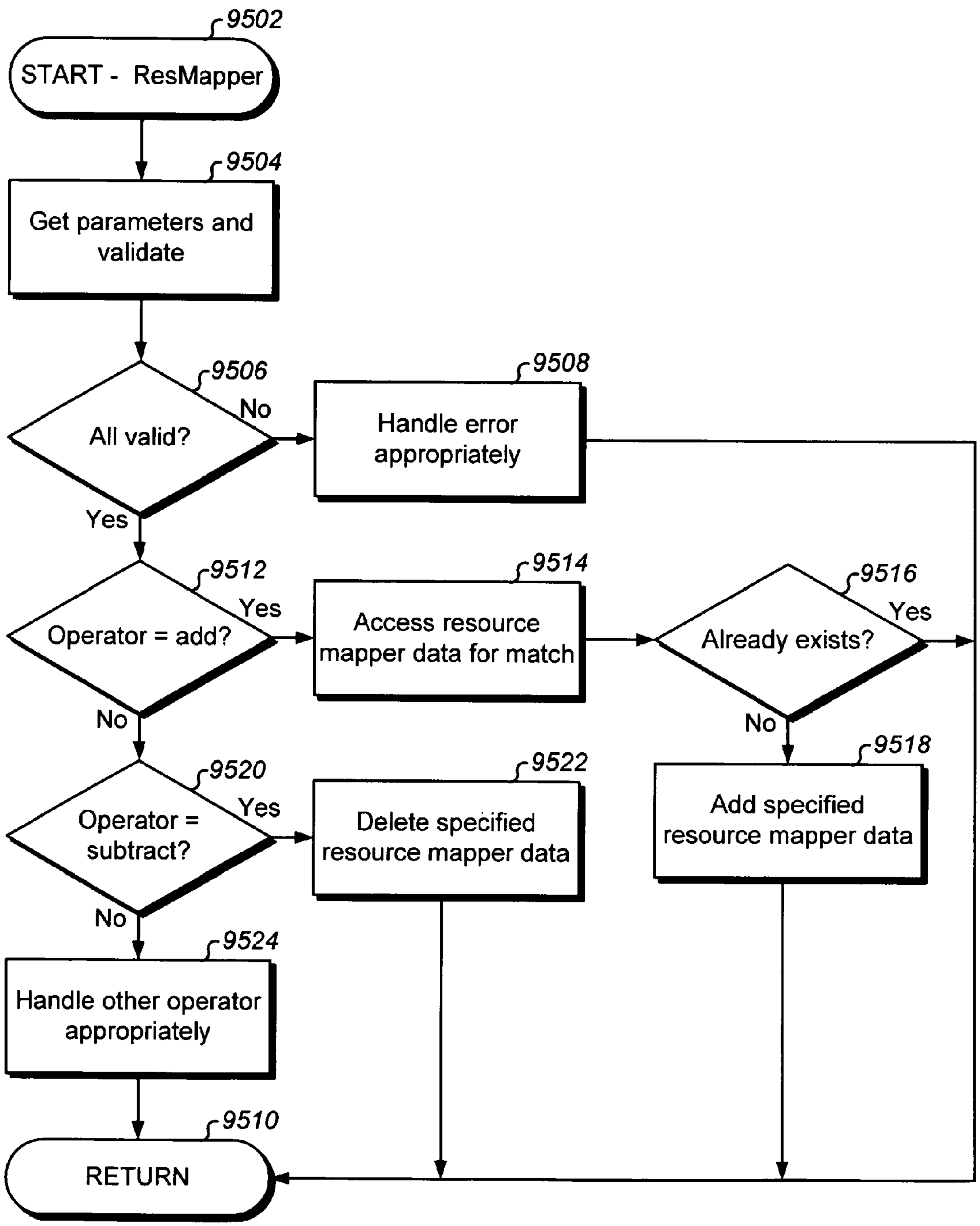
Figure 96A:
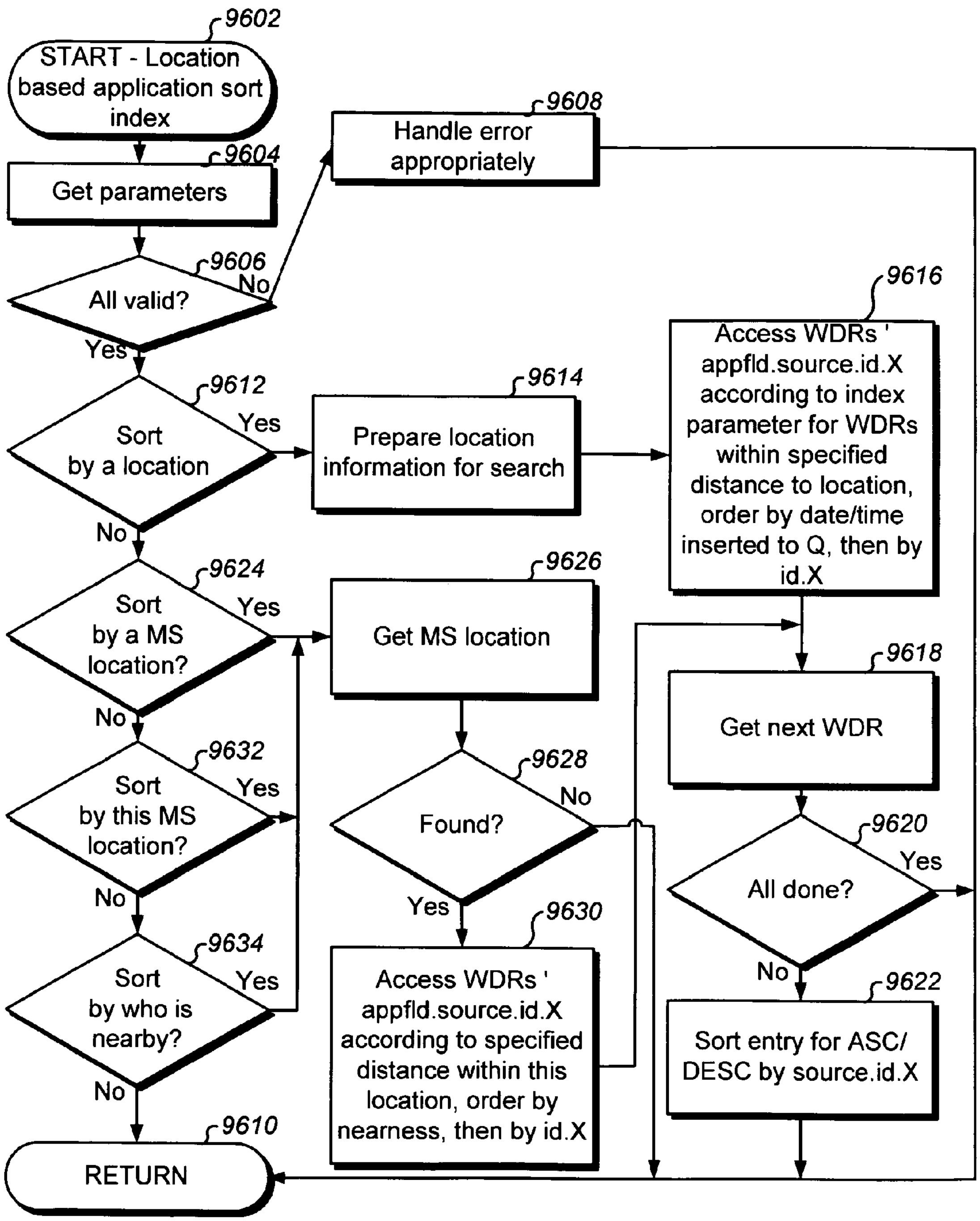
Figure 97A:
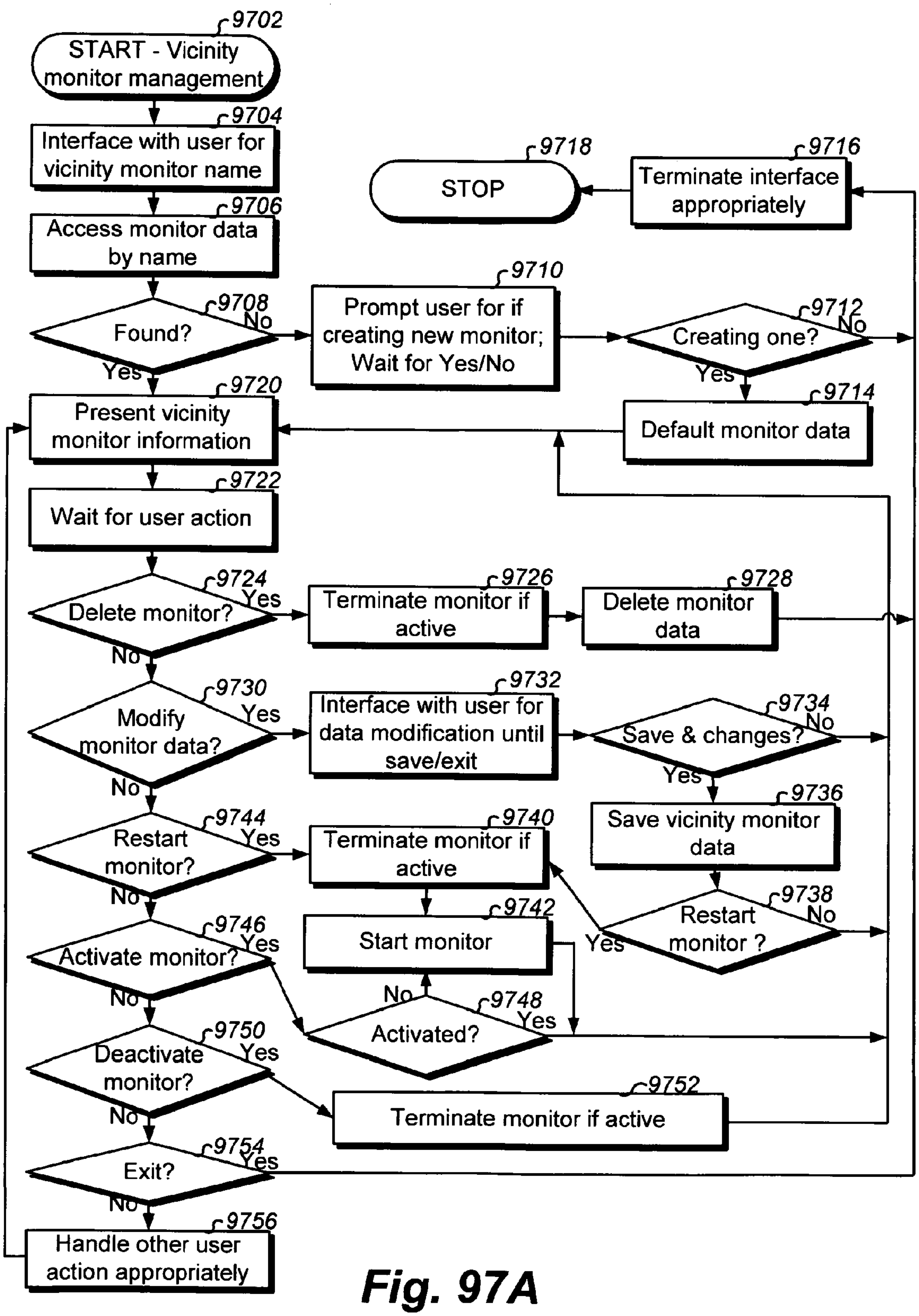
Figure 97B:
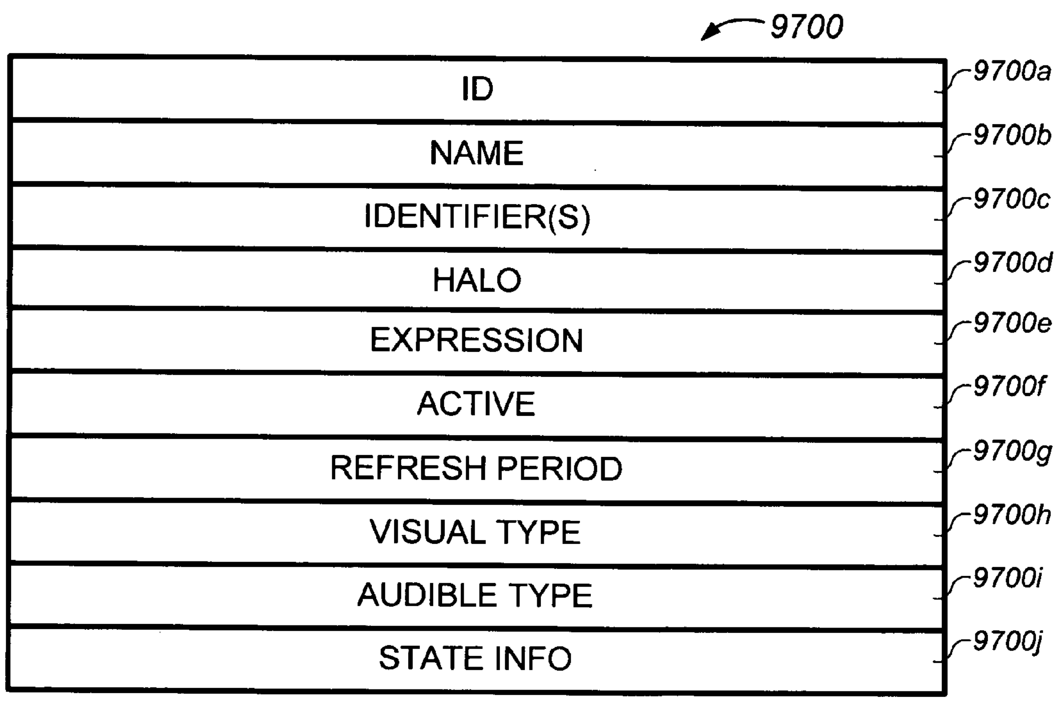
Figure 97C:
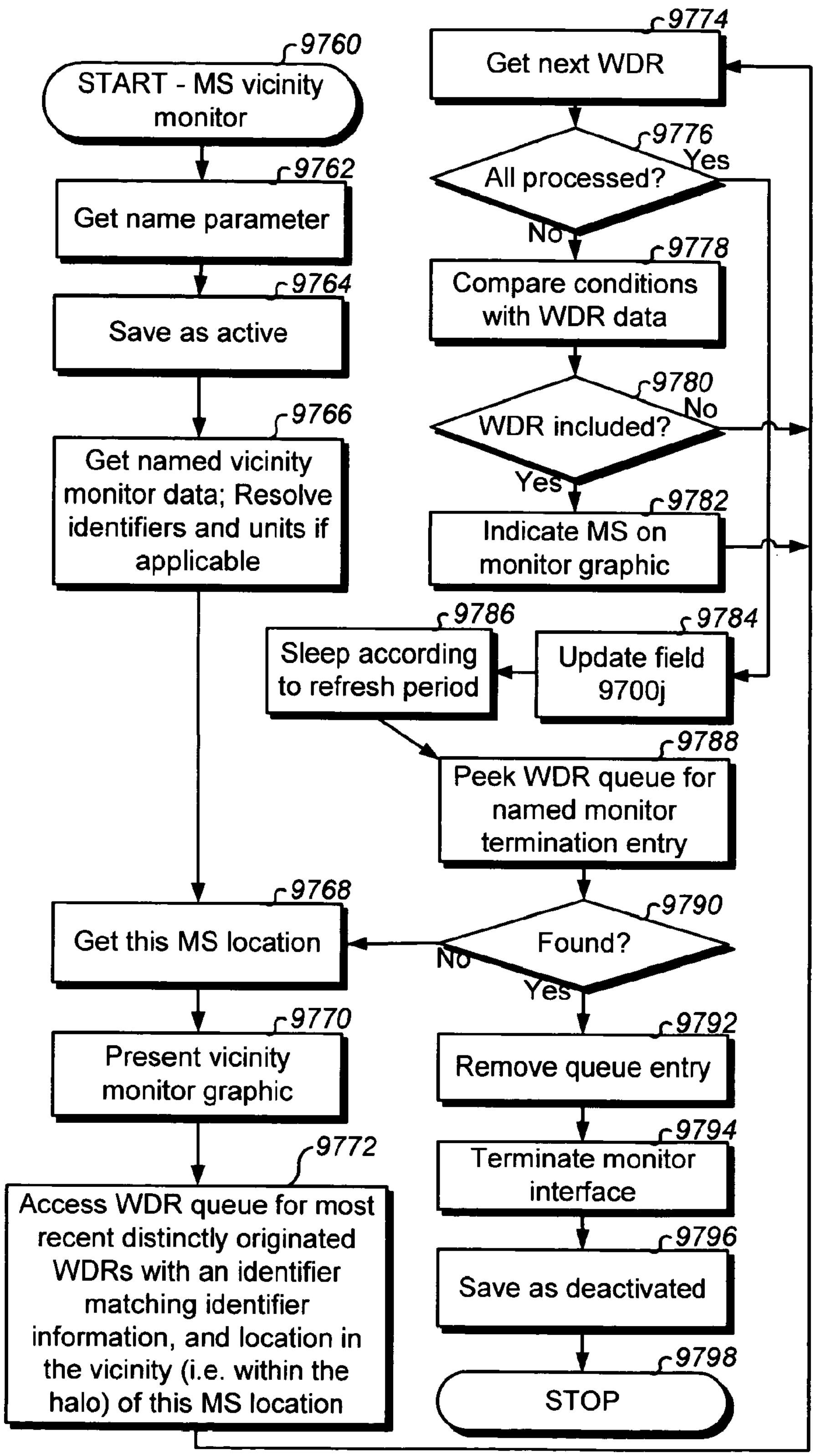

FIG. 68A depicts a flowchart for describing a preferred embodiment of a procedure for Invoke command action processing;

FIGS. 68B-1 through 68B-5 depicts a matrix describing how to process some varieties of the Invoke command;

FIG. 68C depicts a flowchart for describing one embodiment of a procedure for Invoke command action processing, as derived from the processing of FIG. 68A;

FIG. 69A depicts a flowchart for describing a preferred embodiment of a procedure for Copy command action processing;

FIGS. 69B-1 through 69B-14 depicts a matrix describing how to process some varieties of the Copy command;

FIG. 69C depicts a flowchart for describing one embodiment of a procedure for Copy command action processing, as derived from the processing of FIG. 69A;

FIG. 70A depicts a flowchart for describing a preferred embodiment of a procedure for Discard command action processing;

FIGS. 70B-1 through 70B-11 depicts a matrix describing how to process some varieties of the Discard command;

FIG. 70C depicts a flowchart for describing one embodiment of a procedure for Discard command action processing, as derived from the processing of FIG. 70A;

FIG. 71A depicts a flowchart for describing a preferred embodiment of a procedure for Move command action processing;

FIGS. 71B-1 through 71B-14 depicts a matrix describing how to process some varieties of the Move command;

FIG. 71C depicts a flowchart for describing one embodiment of a procedure for Move command action processing, as derived from the processing of FIG. 71A;

FIG. 72A depicts a flowchart for describing a preferred embodiment of a procedure for Store command action processing;

FIGS. 72B-1 through 72B-5 depicts a matrix describing how to process some varieties of the Store command;

FIG. 72C depicts a flowchart for describing one embodiment of a procedure for Store command action processing, as derived from the processing of FIG. 72A;

FIG. 73A depicts a flowchart for describing a preferred embodiment of a procedure for Administration command action processing;

FIGS. 73B-1 through 73B-7 depicts a matrix describing how to process some varieties of the Administration command;

FIG. 73C depicts a flowchart for describing one embodiment of a procedure for Administration command action processing, as derived from the processing of FIG. 73A;

FIG. 74A depicts a flowchart for describing a preferred embodiment of a procedure for Change command action processing;

FIG. 74C depicts a flowchart for describing one embodiment of a procedure for Change command action processing, as derived from the processing of FIG. 74A;

FIG. 75A depicts a flowchart for describing a preferred embodiment of a procedure for sending data to a remote MS;

FIG. 75B depicts a flowchart for describing a preferred embodiment of processing for receiving execution data from another MS;

FIG. 76A depicts a flowchart for describing a preferred embodiment of processing a special term information paste action at a MS;

FIG. 76B-1 illustrates a preferred embodiment of Application term interface processing;

FIG. 76B-2 illustrates an embodiment of Application term interface processing for applications not using a standardized LBX coding practice;

FIG. 76B-3 illustrates a preferred embodiment of charter invocation interface processing;

FIG. 76C illustrates a preferred embodiment of Application term shared memory records;

FIG. 76D depicts a flowchart for describing a preferred embodiment of processing for contextual charter creation;

FIG. 77 depicts a flowchart for describing a preferred embodiment of configuring data to be maintained to WDR Application Fields;

FIG. 78 depicts a simplified example of an XML syntactical encoding embodiment of a profile for the profile section of WDR Application Fields;

FIG. 79A illustrates a branch subset of a tree structure;

FIG. 79B illustrates a binary tree equivalent to the tree structure of FIG. 79A which is used to support XML tag tree traversal processing;

FIG. 79C depicts a preferred embodiment C programming source code structure for encoding a node in an internalized XML tree;

FIG. 79D depicts a flowchart for describing a preferred embodiment of a procedure for profile match operator evaluation;

FIG. 80A depicts a LBX application fields implementation status table;

FIGS. 80B-1 through 80B-4 (referred generally as FIG. 80B) depict some section descriptions of registered LBX application fields;

FIG. 80C depicts a flowchart for describing a preferred embodiment of a procedure for application fields section initialization processing;

FIG. 80D depicts a flowchart for describing a preferred embodiment of MS Radio Frequency Identification (RFID) probe processing;

FIG. 80E depicts a flowchart for describing a preferred embodiment of processing for receiving data from an RFID device;

FIG. 81A depicts a flowchart for describing a preferred embodiment of processing for configuring criteria used by a MS to graphically locate itself;

FIG. 81B depicts a flowchart for describing a preferred embodiment of processing for a MS to graphically locate itself;

FIG. 82A depicts a flowchart for describing a preferred embodiment of processing for maintaining LBX history;

FIG. 82B depicts a flowchart for describing a procedure to maintain information to LBX history;

FIG. 83A depicts a flowchart for describing a preferred embodiment of processing for configuring LBX statistics;

FIG. 83B depicts a flowchart for describing a procedure to maintain information to LBX statistics;

FIG. 84A depicts a flowchart for describing a preferred embodiment of processing for configuring service propagation;

FIG. 84B depicts a flowchart for describing a procedure to process application fields according to how they are enabled or disabled;

FIG. 85A depicts a preferred embodiment of a Service Directory Record (SDR) for discussing operations of the present disclosure;

FIG. 85B depicts a flowchart for describing a preferred embodiment of a procedure for processing a request for a propagated service;

FIG. 85C depicts a flowchart for describing an example embodiment of MS application processing relevant for interfacing to a propagated service;

FIG. 85D depicts a flowchart for describing a preferred embodiment of processing at a MS when receiving a request for a propagated service from a remote MS;

FIG. 85E depicts a flowchart for describing a preferred embodiment of processing for an executable that updates service directory information;

FIG. 86A depicts a flowchart for describing a preferred embodiment of processing for configuring the service informant;

FIG. 86B depicts a flowchart for describing a preferred embodiment procedure to provide service informant processing;

FIG. 86C depicts a preferred embodiment of a Service Informant Record (SIR) for discussing operations of the present disclosure;

FIG. 87A depicts a flowchart for describing a preferred embodiment of Sudden Proximal User Interface (SPUI) processing;

FIG. 87B illustrates different embodiments for discussing various application data processing systems which can be automatically controlled by a MS according to the present disclosure;

FIG. 87C depicts a flowchart for describing a remote data processing system application environment covering an infinite number of MS controllable applications;

FIG. 88A depicts a flowchart for describing a preferred embodiment of manually transmitting WDR information;

FIG. 88B depicts a flowchart for describing a preferred embodiment of MS task monitor processing;

FIG. 89A depicts a flowchart for describing a preferred embodiment of updating a MS global variable for the last time a MS input peripheral was acted upon by a MS user;

FIG. 90A depicts a flowchart for a preferred embodiment for processing the request to specify a map term;

FIG. 90B depicts a preferred embodiment of a Map Term Data Record (MTDR) for discussing operations of the present disclosure, derived from the grammar of FIGS. 30A through 30E;

FIGS. 91A through 91B depict preferred data schema embodiments of automated inventory management for discussing operations of the present disclosure;

FIG. 91C depicts a flowchart for a preferred embodiment for inventory management processing;

FIG. 91D depicts a flowchart for a preferred embodiment of automatically processing whereabouts of inventory items in the vicinity of a MS;

FIG. 92A depicts a flowchart for a preferred embodiment for inventory group management processing;

FIG. 92B depicts a flowchart for a preferred embodiment for automatic order processing of inventory items according to a schedule;

FIG. 93A depicts a flowchart for a preferred embodiment for payment method management processing;

FIG. 93B depicts a flowchart for a preferred embodiment for pending inventory order management processing;

FIG. 94A depicts a flowchart for a preferred embodiment of a procedure for automatically ordering inventory;

FIG. 94B depicts a flowchart for a preferred embodiment for order services management processing;

FIG. 95A depicts a preferred embodiment of a resource mapper record for resource mapper processing of the present disclosure;

FIG. 95B depicts a flowchart for a preferred embodiment for automatic resource mapper processing;

FIG. 96A depicts a flowchart for a preferred embodiment for automatic application sort index processing;

FIG. 96B illustrates an example application use of sort index processing;

FIG. 97A depicts a flowchart for a preferred embodiment for vicinity monitor configuration processing;

FIG. 97B depicts a preferred embodiment of a Vicinity Monitor Data Record (VMDR) for discussing operations of vicinity monitor processing; and FIG. 97C depicts a flowchart for a preferred embodiment for vicinity monitor processing.

DETAILED DESCRIPTION OF THE INVENTION

With reference now to detail of the drawings, the present disclosure is described. Obvious error handling is omitted from the flowcharts in order to focus on the key aspects of the present disclosure. Obvious error handling includes database I/O errors, field validation errors, errors as the result of database table/data constraints or unique keys, data access errors, communications interface errors or packet collision, hardware failures, checksum validations, bit error detections/corrections, and any other error handling as well known to those skilled in the relevant art in context of this disclosure. A semicolon may be used in flowchart blocks to represent, and separate, multiple blocks of processing within a single physical block. This allows simpler flowcharts with less blocks in the drawings by placing multiple blocks of processing description in a single physical block of the flowchart. Flowchart processing is intended to be interpreted in the broadest sense by example, and not for limiting methods of accomplishing the same functionality. Preferably, field validation in the flowcharts checks for SQL injection attacks, communications protocol sniff and hack attacks, preventing of spoofing MS addresses, syntactical appropriateness, and semantics errors where appropriate. Disclosed user interface processing and/or screenshots are also preferred embodiment examples that can be implemented in other ways without departing from the spirit and scope of this disclosure. Alternative user interfaces (since this disclosure is not to be limiting) will use similar mechanisms, but may use different mechanisms without departing from the spirit and scope of this disclosure.

Locational terms such as whereabouts, location, position, area, destination, perimeter, radius, geofence, situational location, or any other related two or three dimensional locational term used herein to described position(s) and/or locations and/or whereabouts is to be interpreted in the broadest sense. Location field 1100c may include an area (e.g. on earth), a point (e.g. on earth), or a three dimensional bounds in space. In another example, a radius may define a sphere in space, rather than a circle in a plane. In some embodiments, a planet field forms part of the location (e.g. Earth, Mars, etc as part of field 1100c) for which other location information (e.g. latitude and longitude on Mars also part of field 1100c) is relative. In some embodiments, elevations (or altitudes) from known locatable point(s), distances from origin(s) in the universe, etc. can denote where exactly is a point of three dimensional space, or three dimensional sphere, area, or solid, is located. That same point can provide a mathematical reference to other points of the solid area/region in space. Descriptions for angles, pitches, rotations, etc from some reference point(s) may be further provided. Three dimensional areas/regions include a conical shape, cubical shape, spherical shape, pyramidal shape, irregular shapes, or any other shape either manipulated with a three dimensional graphic interface, or with mathematical model descriptions. Areas/regions in space can be occupied by a MS, passed through (e.g. by a traveler) by a MS, or referenced through configuration by a MS. In a three dimensional embodiment, nearby/nearness is determined in terms of three dimensional information, for example, a spherical radius around one MS intersecting a spherical radius around another MS. In a two dimensional embodiment, nearby/nearness is determined in terms of two dimensional information, for example, a circular radius around one MS intersecting a circular radius around another MS. Points can be specified as a point in a x-y-z plane, a point in polar coordinates, or the like, perhaps the center of a planet (e.g. Earth) or the Sun, some origin in the Universe, or any other origin for distinctly locating three dimensional location(s), positions, or whereabouts in space. Elevation (e.g. for earth, or some other planet, etc) may be useful to the three dimensional point of origin, and/or for the three dimensional region in space. A region in space may also be specified with connecting x-y-z coordinates together to bound the three dimensional region in space. There are many methods for representing a location (field 1100c) without departing from the spirit and scope of this disclosure. MSs, for example as carried by users, can travel by airplane through three dimensional areas/regions in space, or travel under the sea through three dimensional regions in space.

Various embodiments of communications between MSs, or an MS and service(s), will share channels (e.g. frequencies) to communicate, depending on when in effect. Sharing a channel will involve carrying recognizable and processable signature to distinguish transmissions for carrying data. Other embodiments of communications between MSs, or an MS and service(s), will use distinct channels to communicate, depending on when in effect. The number of channels that can be concurrently listened on and/or concurrently transmitted on by a data processing system will affect which embodiments are preferred. The number of usable channels will also affect which embodiments are preferred. This disclosure avoids unnecessary detail in different communication channel embodiments so as to not obfuscate novel material. Independent of various channel embodiments within the scope and spirit of the present disclosure, MSs communicate with other MSs in a peer to peer manner, in some aspects like automated walkie-talkies.

Novel features disclosed herein need not be provided as all or none. Certain features may be isolated in some MS embodiments, or may appear as any subset of features and functionality in other embodiments.

Location Based eXchanges (LBX) Architecture

Figure 1A:
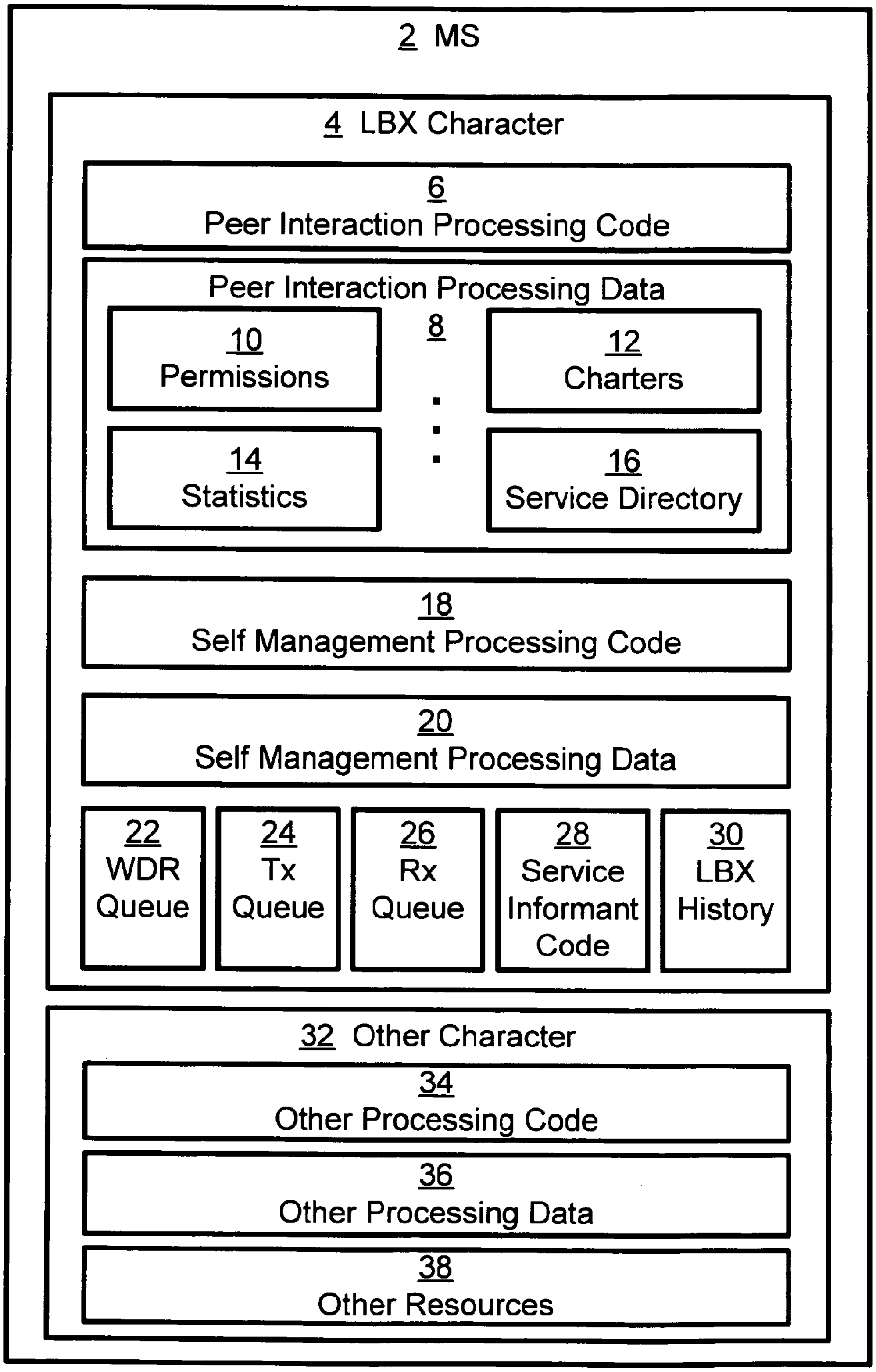
FIG. 1A depicts a preferred embodiment high level example componentization of a MS in accordance with the present disclosure.

FIG. 1A depicts a preferred embodiment high level example componentization of a MS in accordance with the present disclosure. A MS 2 includes processing behavior referred to as LBX Character 4 and Other Character 32. LBX character 4 provides processing behavior causing MS 2 to take on the character of a Location Based Exchange (LBX) MS according to the present disclosure. Other Character 32 provides processing behavior causing MS to take on character of prior art MSs in context of the type of MS. Other character 32 includes at least other processing code 34, other processing data 36, and other resources 38, all of which are well known to those skilled in the art for prior art MSs. Other character 32 provides a MS user with a limited set of configurability and functionality. In some embodiments, LBX character 4 components may, or may not, make use of other character 32 components 34, 36, and 38. Other character 32 components may, or may not, make use of LBX character 4 components 6 through 30.

LBX character 4 preferably includes at least Peer Interaction Processing (PIP) code 6, Peer Interaction Processing (PIP) data 8, self management processing code 18, self management processing data 20, WDR queue 22, send queue 24, receive queue 26, service informant code 28, and LBX history 30. Peer interaction processing (PIP) code 6 comprises executable code in software, firmware, or hardware form for carrying out LBX processing logic of the present disclosure when interacting with another MS. Peer interaction processing (PIP) data 8 comprises data maintained in any sort of memory of MS 2, for example hardware memory, flash memory, hard disk memory, a removable memory device, or any other memory means accessible to MS 2. PIP data 8 contains intelligence data for driving LBX processing logic of the present disclosure when interacting with other MSs. Self management processing code 18 comprises executable code in software, firmware, or hardware form for carrying out the local user interface LBX processing logic of the present disclosure. Self management processing data 20 contains intelligence data for driving processing logic of the present disclosure as disclosed for locally maintained LBX features. WDR queue 22 contains Whereabouts Data Records (WDRs) 1100, and is a First-In-First-Out (FIFO) queue when considering housekeeping for pruning the queue to a reasonable trailing history of inserted entries (i.e. remove stale entries). WDR queue 22 is preferably designed with the ability of queue entry retrieval processing similar to Standard Query Language (SQL) querying, wherein one or more entries can be retrieved by querying with a conditional match on any data field(s) of WDR 1100 and returning lists of entries in order by an ascending or descending key on one or any ascending/descending ordered list of key fields.

All disclosed queues (e.g. 22, 24, 26, 1980, 1990 (See FIG. 19), or any other queue) are implemented with an appropriate thread-safe means of queue entry peeking (makes copy of sought queue entry without removing), discarding, retrieval, insertion, and queue entry field sorted search processing. Queues are understood to have an associated implicit semaphore to ensure appropriate synchronous access to queue data in a multi-threaded environment to prevent data corruption and misuse. Such queue interfaces are well known in popular operating systems. In MS operating system environments which do not have an implicit semaphore protected queue scheme, queue accesses in the present disclosure flowcharts are to be understood to have a previous request to a queue-assigned semaphore lock prior to queue access, and a following release of the semaphore lock after queue access. Operating systems without semaphore control may use methods to achieve similar thread-safe synchronization functionality. Queue functionality may be accomplished with lists, arrays, databases (e.g. SQL) and other methodologies without departing from the spirit and scope of queue descriptions herein.

Queue 22 alternate embodiments may maintain a plurality of WDR queues which segregate WDRs 1100 by field(s) values to facilitate timely processing. WDR queue 22 may be at least two (2) separate queues: one for maintaining the MS 2 whereabouts, and one for maintaining whereabouts of other MSs. WDR queue 22 may be a single instance WDR 1100 in some embodiments which always contains the most current MS 2 whereabouts for use by MS 2 applications (may use a sister queue 22 for maintaining WDRs from remote MSs). At least one entry is to be maintained to WDR queue 22 at all times for MS 2 whereabouts.

Send queue 24 (Transmit (Tx) queue) is used to send communications data, for example as intended for a peer MS within the vicinity (e.g. nearby as indicated by maximum range 1306) of the MS 2. Receive queue 26 (Receive (Rx) queue) is used to receive communications data, for example from peer MSs within the vicinity (e.g. nearby as indicated by maximum range 1306) of the MS 2. Queues 24 and 26 may also each comprise a plurality of queues for segregating data thereon to facilitate performance in interfacing to the queues, in particular when different queue entry types and/or sizes are placed on the queue. A queue interface for sending/receiving data to/from the MS is optimal in a multi-threaded implementation to isolate communications transport layers to processing behind the send/receive queue interfaces, but alternate embodiments may send/receive data directly from a processing thread disclosed herein. Queues 22, 24, and/or 26 may be embodied as a purely data form, or SQL database, maintained at MS 2 in persistent storage, memory, or any other storage means. In some embodiments, queues 24 and 26 are not necessary since other character 32 will already have accessible resources for carrying out some LBX character 4 processing.

Queue embodiments may contain fixed length records, varying length records, pointers to fixed length records, or pointers to varying length records. If pointers are used, it is assumed that pointers may be dynamically allocated for record storage on insertions and freed upon record use after discards or retrievals.

As well known to those skilled in the art, when a thread sends on a queue 24 in anticipation of a corresponding response, there is correlation data in the data sent which is sought in a response received by a thread at queue 26 so the sent data is correlated with the received data. In a preferred embodiment, correlation is built using a round-robin generated sequence number placed in data for sending along with a unique MS identifier (MS ID). If data is not already encrypted in communications, the correlation can be encrypted. While the unique MS identifier (MS ID) may help the MS identify which (e.g. wireless) data is destined for it, correlation helps identify which data at the MS caused the response. Upon receipt of data from a responder at queue 26, correlation processing uses the returned correlation (e.g. field 1100*m*) to correlate the sent and received data. In preferred embodiments, the sequence number is incremented each time prior to use to ensure a unique number, otherwise it may be difficult to know which data received is a response to which data was sent, in particular when many data packets are sent within seconds. When the sequence number reaches a maximum value (e.g. 232−1), then it is round-robinned to 0 and is incremented from there all over again. This assures proper correlation of data between the MS and responders over time. There are other correlation schemes (e.g. signatures, random number generation, checksum counting, bit patterns, date/time stamp derivatives) to accomplish correlation functionality. If send and receive queues of Other Character 32** are used, then correlation can be used in a similar manner to correlate a response with a request (i.e. a send with a receipt).

There may be good reason to conceal the MS ID when transmitting it wirelessly. In this embodiment, the MS ID is a dependable and recognizable derivative (e.g. a pseudo MS ID) that can be detected in communications traffic by the MS having the pseudo MS ID, while concealing the true MS ID. This would conceal the true MS ID from would-be hackers sniffing wireless protocol. The derivative can always be reliably the same for simplicity of being recognized by the MS while being difficult to associate to a particular MS. Further still, a more protected MS ID (from would-be hackers that take time to deduce how an MS ID is scrambled) can itself be a dynamically changing correlation anticipated in forthcoming communications traffic, thereby concealing the real MS ID (e.g. phone number or serial number), in particular when anticipating traffic in a response, yet still useful for directing responses back to the originating MS (with the pseudo MS ID (e.g. correlation)). A MS would know which correlation is anticipated in a response by saving it to local storage for use until it becomes used (i.e. correlated in a matching response), or becomes stale. In another embodiment, a correlation response queue (like CR queue 1990) can be deployed to correlate responses with requests that contain different correlations for pseudo MS IDs. In all embodiments, the MS ID (or pseudo MS ID) of the present disclosure should enable targeting communications traffic to the MS.

Service informant code 28 comprises executable code in software, firmware, or hardware form for carrying out of informing a supervisory service. The present disclosure does not require a connected web service, but there are features for keeping a service informed with activities of MS LBX. Service informant code 28 can communicate as requested any data 8, 20, 22, 24, 26, 30, 36, 38, or any other data processed at MS 2.

LBX history 30 contains historical data useful in maintaining at MS 2, and possibly useful for informing a supervisory service through service informant code 28. LBX History 30 preferably has an associated thread of processing for keeping it pruned to the satisfaction of a user of MS 2 (e.g. prefers to keep last 15 days of specified history data, and 30 days of another specified history data, etc). With a suitable user interface to MS 2, a user may browse, manage, alter, delete, or add to LBX History 30 as is relevant to processing described herein. Service informant code 28 may be used to cause sending of an outbound email, SMS message, outbound data packet, or any other outbound communication in accordance with LBX of the MS.

PIP data 8 preferably includes at least permissions 10, charters 12, statistics 14, and a service directory 16. Permissions 10 are configured to grant permissions to other MS users for interacting the way the user of MS 2 desires for them to interact. Therefore, permissions 10 contain permissions granted from the MS 2 user to other MS users. In another embodiment, permissions 10 additionally, or alternatively, contain permissions granted from other MS users to the MS 2 user. Permissions are maintained completely local to the MS 2. Charters 12 provide LBX behavior conditional expressions for how MSs should interact with MS 2. Charters 12 are configured by the MS 2 user for other MS users. In another embodiment, charters 12 additionally, or alternatively, are configured by other MS users for the MS 2 user. Some charters expressions depend on permissions 10. Statistics 14 are maintained at MS 2 for reflecting peer (MS) to peer (MS) interactions of interest that occurred at MS 2. In another embodiment, statistics 14 additionally, or alternatively, reflect peer (MS) to peer (MS) interactions that occurred at other MSs, preferably depending on permissions 10. Service informant code 28 may, or may not, inform a service of statistics 14 maintained. Service directory 16 includes routing entries for how MS 2 will find a sought service, or how another MS can find a sought service through MS 2.

In some embodiments, any code (e.g. 6, 18, 28, 34, 38) can access, manage, use, alter, or discard any data (e.g. 8, 20, 22, 24, 26, 30, 36, 38) of any other component in MS 2. Other embodiments may choose to keep processing of LBX character 4 and other character 32 disjoint from each other. Rectangular component boundaries are logical component representations and do not have to delineate who has access to what. MS (also MSs) references discussed herein in context for the new and useful features and functionality disclosed is understood to be an MS 2 (MSs 2).

Figure 1B:
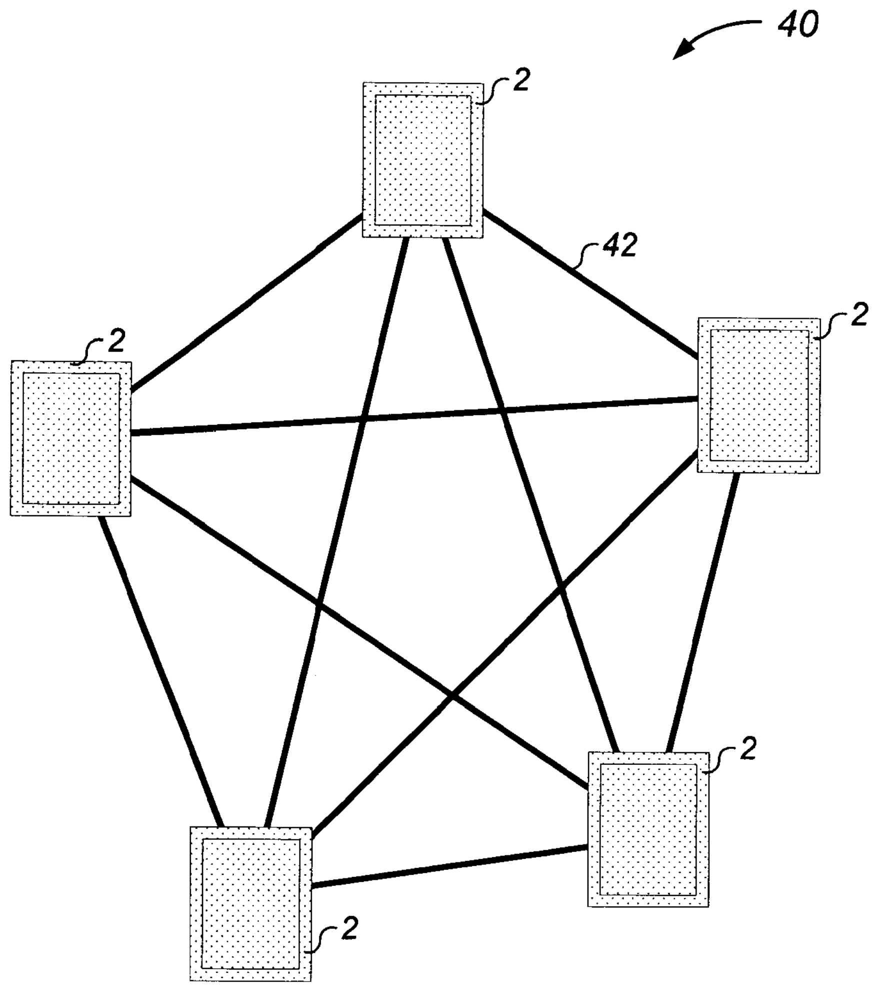
FIG. 1B depicts a Location Based eXchanges (LBX) architectural illustration for discussing the present disclosure.

FIG. 1B depicts a Location Based eXchanges (LBX) architectural illustration for discussing the present disclosure. LBX MSs are peers to each other for locational features and functionality. An MS 2 communicates with other MSs without requiring a service for interaction. For example, FIG. 1B depicts a wireless network 40 of five (5) MSs. Each is able to directly communicate with others that are in the vicinity (e.g. nearby as indicated by maximum range 1306). In a preferred embodiment, communications are limited reliability wireless broadcast datagrams having recognizable data packet identifiers. In another embodiment, wireless communications are reliable transport protocols carried out by the MSs, such as TCP/IP. In other embodiments, usual communications data associated with other character 32 include new data (e.g. Communications Key 1304) in transmissions for being recognized by MSs within the vicinity. For example, as an MS conventionally communicates, LBX data is added to the protocol so that other MSs in the vicinity can detect, access, and use the data. The advantage to this is that as MSs use wireless communications to carry out conventional behavior, new LBX behavior is provided by simply incorporating additional information (e.g. Communications Key 1304) to existing communications.

Regardless of the embodiment, an MS 2 can communicate with any of its peers in the vicinity using methods described below. Regardless of the embodiment, a communication path 42 between any two MSs is understood to be potentially bidirectional, but certainly at least unidirectional. The bidirectional path 42 may use one communications method for one direction and a completely different communications method for the other, but ultimately each can communicate to each other. When considering that a path 42 comprises two unidirectional communications paths, there are N*(N−1) unidirectional paths for N MSs in a network 40. For example, 10 MSs results in 90 (i.e. 10*9) one way paths of communications between all 10 MSs for enabling them to talk to each other. Sharing of the same signaling channels is preferred to minimize the number of MS threads listening on distinct channels. Flowcharts are understood to process at incredibly high processing speeds, in particular for timely communications processing. While the MSs are communicating wirelessly to each other, path 42 embodiments may involve any number of intermediary systems or communications methods, for example as discussed below with FIG. 1E.

Figure 1C:
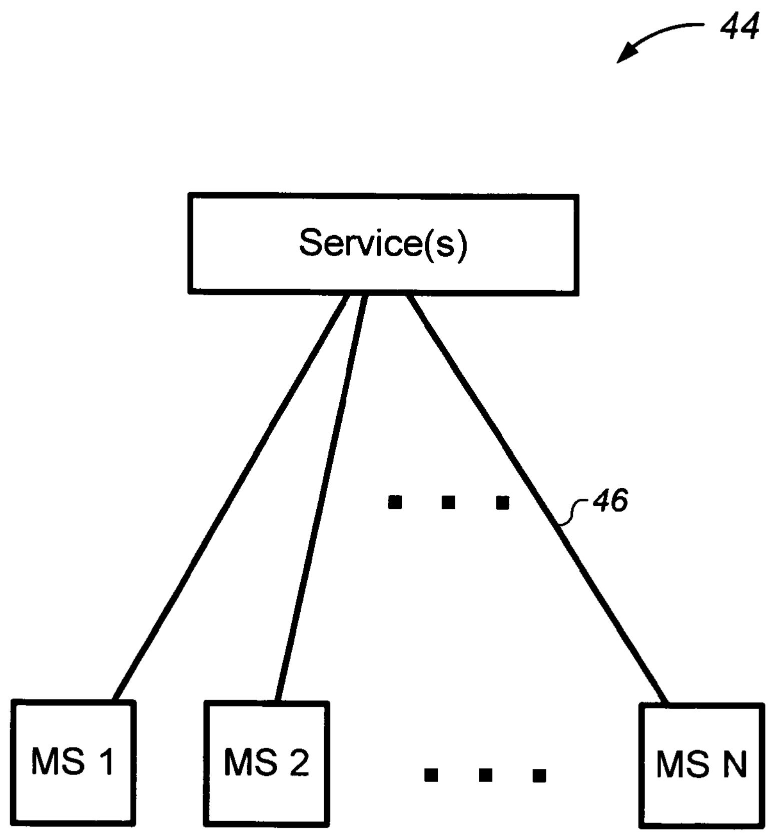
FIG. 1C depicts a Location Based Services (LBS) architectural illustration for discussing prior art of the present disclosure.

FIG. 1C depicts a Location Based Services (LBS) architectural illustration for discussing prior art of the present disclosure. In order for a MS to interact for LBS with another MS, there is service architecture 44 for accomplishing the interaction. For example, to detect that MS 1 is nearby MS N, the service is indispensably involved in maintaining data and carrying out processing. For example, to detect that MS 1 is arriving to, or departing from, a geofenced perimeter area configured by MS N, the service was indispensably involved in maintaining data and carrying out processing. For example, for MS N to locate MS 1 on a live map, the service was indispensably involved in maintaining data and carrying out processing. In another example, to grant and revoke permissions from MS 1 to MS N, the service was indispensably involved in maintaining data and carrying out processing. While it is advantageous to require a single bidirectional path 46 for each MS (i.e. two unidirectional communications paths; (2*N) unidirectional paths for N MSs), there are severe requirements for service(s) when there are lots of MSs (i.e. when N is large). Wireless MSs have advanced beyond cell phones, and are capable of housing significant parallel processing, processing speed, increased wireless transmission speeds and distances, increased memory, and richer features.

Figure 1D:
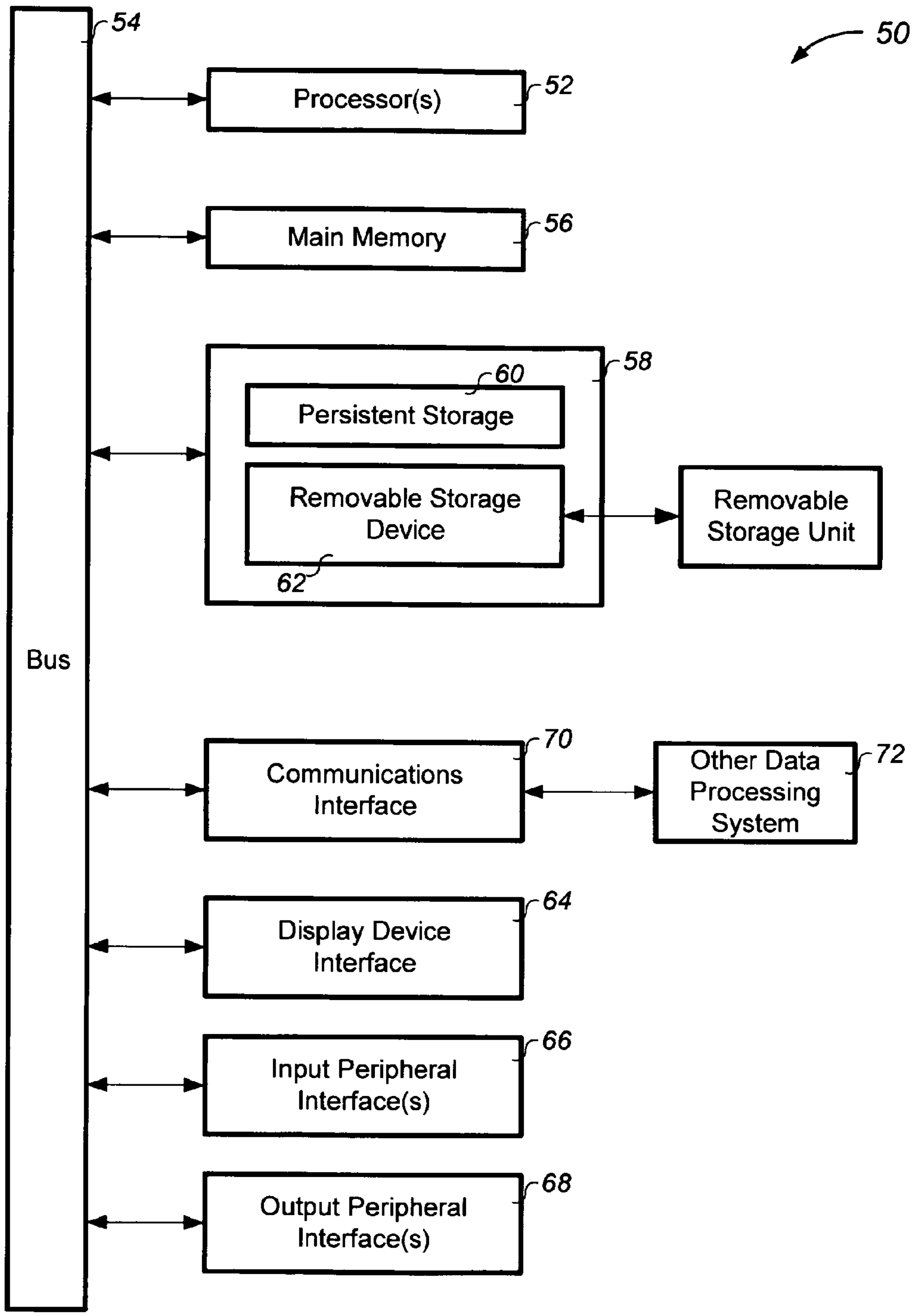
FIG. 1D depicts a block diagram of a data processing system useful for implementing a MS, ILM, DLM, centralized server, or any other data processing system disclosed herein.

FIG. 1D depicts a block diagram of a data processing system useful for implementing a MS, ILM, DLM, centralized server, or any other data processing system described herein. An MS 2 is a data processing system 50. Data processing system 50 includes at least one processor 52 (e.g. Central Processing Unit (CPU)) coupled to a bus 54. Bus 54 may include a switch, or may in fact be a switch 54 to provide dedicated connectivity between components of data processing system 50. Bus (and/or switch) 54 is a preferred embodiment coupling interface between data processing system 50 components. The data processing system 50 also includes main memory 56, for example, random access memory (RAM). Memory 56 may include multiple memory cards, types, interfaces, and/or technologies. The data processing system 50 may include secondary storage devices 58 such as persistent storage 60, and/or removable storage device 62, for example as a compact disk, floppy diskette, USB flash, or the like, also connected to bus (or switch) 54. In some embodiments, persistent storage devices could be remote to the data processing system 50 and coupled through an appropriate communications interface. Persistent storage 60 may include flash memory, disk drive memory, magnetic, charged, or bubble storage, and/or multiple interfaces and/or technologies, perhaps in software interface form of variables, a database, shared memory, etc.

The data processing system 50 may also include a display device interface 64 for driving a connected display device (not shown). The data processing system 50 may further include one or more input peripheral interface(s) 66 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 66. The data processing system 50 may still further include one or more output peripheral interface(s) 68 to output devices such as a printer, facsimile device, or the like. Output peripherals may also be available via an appropriate interface.

Data processing system 50 will include communications interface(s) 70 for communicating to another data processing system 72 via analog signal waves, digital signal waves, infrared proximity, copper wire, optical fiber, or other wave spectrums described herein. A MS may have multiple communications interfaces 70 (e.g. cellular connectivity, 802.x, etc). Other data processing system 72 may be an MS. Other data processing system 72 may be a service. Other data processing system 72 is a service data processing system when MS 50 communicates to other data processing system 72 by way of service informant code 28. In any case, the MS and other data processing system are said to be interoperating when communicating.

Data processing system programs (also called control logic) may be completely inherent in the processor(s) 52 being a customized semiconductor, or may be stored in main memory 56 for execution by processor(s) 52 as the result of a read-only memory (ROM) load (not shown), or may be loaded from a secondary storage device into main memory 56 for execution by processor(s) 52. Such programs, when executed, enable the data processing system 50 to perform features of the present disclosure as discussed herein. Accordingly, such data processing system programs represent controllers of the data processing system.

In some embodiments, the disclosure is directed to a control logic program product comprising at least one processor 52 having control logic (software, firmware, hardware microcode) stored therein. The control logic, when executed by processor(s) 52, causes the processor(s) 52 to provide functions of the disclosure as described herein. In another embodiment, this disclosure is implemented primarily in hardware, for example, using a prefabricated component state machine (or multiple state machines) in a semiconductor element such as a processor 52.

Those skilled in the art will appreciate various modifications to the data processing system 50 without departing from the spirit and scope of this disclosure. A data processing system, and more particularly a MS, preferably has capability for many threads of simultaneous processing which provide control logic and/or processing. These threads can be embodied as time sliced threads of processing on a single hardware processor, multiple processors, multi-core processors, Digital Signal Processors (DSPs), or the like, or combinations thereof. Such multi-threaded processing can concurrently serve large numbers of concurrent MS tasks. Concurrent processing may be provided with distinct hardware processing and/or as appropriate software driven time-sliced thread processing. Those skilled in the art recognize that having multiple threads of execution on an MS is accomplished in many different ways without departing from the spirit and scope of this disclosure. This disclosure strives to deploy software to existing MS hardware configurations, but the disclosed software can be deployed as burned-in microcode to new hardware of MSs.

Data processing aspects of drawings/flowcharts are preferably multi-threaded so that many MSs and applicable data processing systems are interfaced with in a timely and optimal manner. Data processing system 50 may also include its own clock mechanism (not shown), if not an interface to an atomic clock or other clock mechanism, to ensure an appropriately accurate measurement of time in order to appropriately carry out processing described below. In some embodiments, Network Time Protocol (NTP) is used to keep a consistent universal time for MSs and other data processing systems in communications with MSs. This is most advantageous to prevent unnecessary round-tripping of data between data processing systems to determine timing (e.g. Time Difference of Arrival (TDOA)) measurements. A NTP synchronized date/time stamp maintained in communications is compared by a receiving data processing system for comparing with its own NTP date/time stamp to measure TOA (time of arrival (i.e. time taken to arrive)). Of course, in the absence of NTP used by the sender and receiver, TOA is also calculated in a bidirectional transmission using correlation. In this disclosure, TOA measurements from one location technology are used for triangulating with TOA measurements from another location technology, not just for determining "how close". Therefore, TDOA terminology is generally used herein to refer to the most basic TOA measurement of a wave spectrum signal being the difference between when it was sent and when it was received. TDOA is also used to describe using the difference of such measurements to locate (triangulate). NTP use among participating systems has the advantage of a single unidirectional broadcast data packet containing all a receiving system requires to measure TDOA, by knowing when the data was sent (date/time stamp in packet) and when the data was received (signal detected and processed by receiving system). A NTP clock source (e.g. atomic clock) used in a network is to be reasonably granular to carry out measurements, and ensures participating MSs are updated timely according to anticipated time drifts of their own clocks. MS clocks should maintain time as accurately as possible to minimize drift and minimize how often resynchronization with a NTP clock source is required. There are many well known methods for accomplishing NTP, some which require dedicated thread(s) for NTP processing, and some which use certain data transmitted to and from a source to keep time in synch.

Those skilled in the art recognize that NTP accuracy depends on participating MS clocks and processing timing, as well as time server source(s). Radio wave connected NTP time server(s) is typically accurate to as granular as 1 millisecond. Global Positioning System (GPS) time servers provide accuracy as granular as 50 microseconds. GPS timing receivers provide accuracy to around 100 nanoseconds, but this may be reduced by timing latencies in time server operating systems. With advancements in hardware, microcode, and software, obvious improvements are being made to NTP. In NTP use embodiments of this disclosure, an appropriate synchronization of time is used for functional interoperability between MSs and other data processing systems using NTP. NTP is not required in this disclosure, but it is an advantage when in use.

LBX Directly Located Mobile Data Processing Systems (DLMs)

Figure 1E:
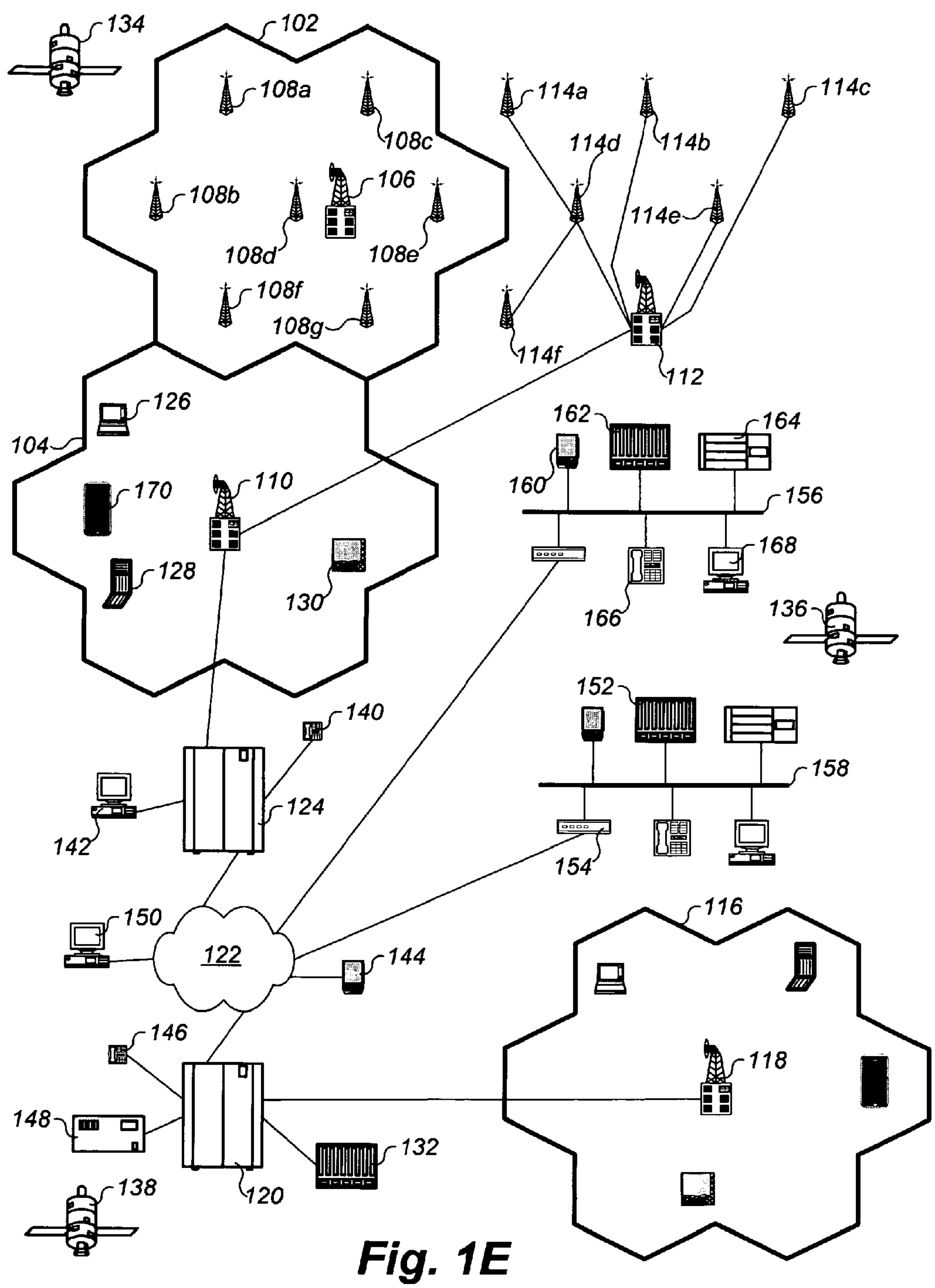
FIG. 1E depicts a network illustration for discussing various deployments of whereabouts processing aspects of the present disclosure.

FIG. 1E depicts a network illustration for discussing various deployments of whereabouts processing aspects of the present disclosure. In some embodiments, a cellular network cluster 102 and cellular network cluster 104 are parts of a larger cellular network. Cellular network cluster 102 contains a controller 106 and a plurality of base stations, shown generally as base stations 108. Each base station covers a single cell of the cellular network cluster, and each base station 108 communicates through a wireless connection with the controller 106 for call processing, as is well known in the art. Wireless devices communicate via the nearest base station (i.e. the cell the device currently resides in), for example base station 108*b*. Roaming functionality is provided when a wireless device roams from one cell to another so that a session is properly maintained with proper signal strength. Controller 106 acts like a telephony switch when a wireless device roams across cells, and it communicates with controller 110 via a wireless connection so that a wireless device can also roam to other clusters over a larger geographical area. Controller 110 may be connected to a controller 112 in a cellular cluster through a physical connection, for example, copper wire, optical fiber, or the like. This enables cellular clusters to be great distances from each other. Controller 112 may in fact be connected with a physical connection to its base stations, shown generally as base stations 114. Base stations may communicate directly with the controller 112, for example, base station 114*e*. Base stations may communicate indirectly to the controller 112, for example base station 114*a* by way of base station 114*d*. It is well known in the art that many options exist for enabling interoperating communications between controllers and base stations for the purpose of managing a cellular network. A cellular network cluster 116 may be located in a different country. Base controller 118 may communicate with controller 110 through a Public Service Telephone Network (PSTN) by way of a telephony switch 120, PSTN 122, and telephony switch 124, respectively. Telephony switch 120 and telephony switch 124 may be private or public. In one cellular network embodiment of the present disclosure, the services execute at controllers, for example controller 110. In some embodiments, the MS includes processing that executes at a wireless device, for example mobile laptop computer 126, wireless telephone 128, a personal digital assistant (PDA) 130, an iPhone 170, or the like. As the MS moves about, positional attributes are monitored for determining location. The MS may be handheld, or installed in a moving vehicle. Locating a wireless device using wireless techniques such as Time Difference of Arrival (TDOA) and Angle Of Arrival (AOA) are well known in the art. The service may also execute on a server computer accessible to controllers, for example server computer 132, provided an appropriate timely connection exists between cellular network controller(s) and the server computer 132. Wireless devices (i.e. MSs) are preferably known by a unique identifier, for example a phone number, caller id, device identifier, or like appropriate unique handle.

In another embodiment of the present disclosure, GPS satellites such as satellite 134, satellite 136, and satellite 138 provide information, as is well known in the art, to GPS devices on earth for triangulation locating of the GPS device. In this embodiment, a MS has integrated GPS functionality so that the MS monitors its positions. The MS is preferably known by a unique identifier, for example a phone number, caller id, device identifier, or like appropriate unique handle (e.g. network address).

In yet another embodiment of the present disclosure, a physically connected device, for example, telephone 140, computer 142, PDA 144, telephone 146, and fax machine 148, may be newly physically connected to a network. Each is a MS, although the mobility is limited. Physical connections include copper wire, optical fiber, USB, or any other physical connection, by any communications protocol thereon. Devices are preferably known by a unique identifier, for example a phone number, caller id, device identifier, physical or logical network address, or like appropriate unique handle. The MS is detected for being newly located when physically connected. A service can be communicated to upon detecting connectivity. The service may execute at an Automatic Response Unit (ARU) 150, a telephony switch, for example telephony switch 120, a web server 152 (for example, connected through a gateway 154), or a like data processing system that communicates with the MS in any of a variety of ways as well known to those skilled the art. MS detection may be a result of the MS initiating a communication with the service directly or indirectly. Thus, a user may connect his laptop to a hotel network, initiate a communication with the service, and the service determines that the user is in a different location than the previous communication. A local area network (LAN) 156 may contain a variety of connected devices, each an MS that later becomes connected to a local area network 158 at a different location, such as a PDA 160, a server computer 162, a printer 164, an internet protocol telephone 166, a computer 168, or the like. Hard copy presentation could be made to printer 164 and fax 148.

Current technology enables devices to communicate with each other, and other systems, through a variety of heterogeneous system and communication methods. Current technology allows executable processing to run on diverse devices and systems. Current technology allows communications between the devices and/or systems over a plethora of methodologies at close or long distance. Many technologies also exist for automatic locating of devices. It is well known how to have an interoperating communications system that comprises a plurality of individual systems communicating with each other with one or more protocols. As is further known in the art of developing software, executable processing of the present disclosure may be developed to run on a particular target data processing system in a particular manner, or customized at install time to execute on a particular data processing system in a particular manner.

Figure 1F:
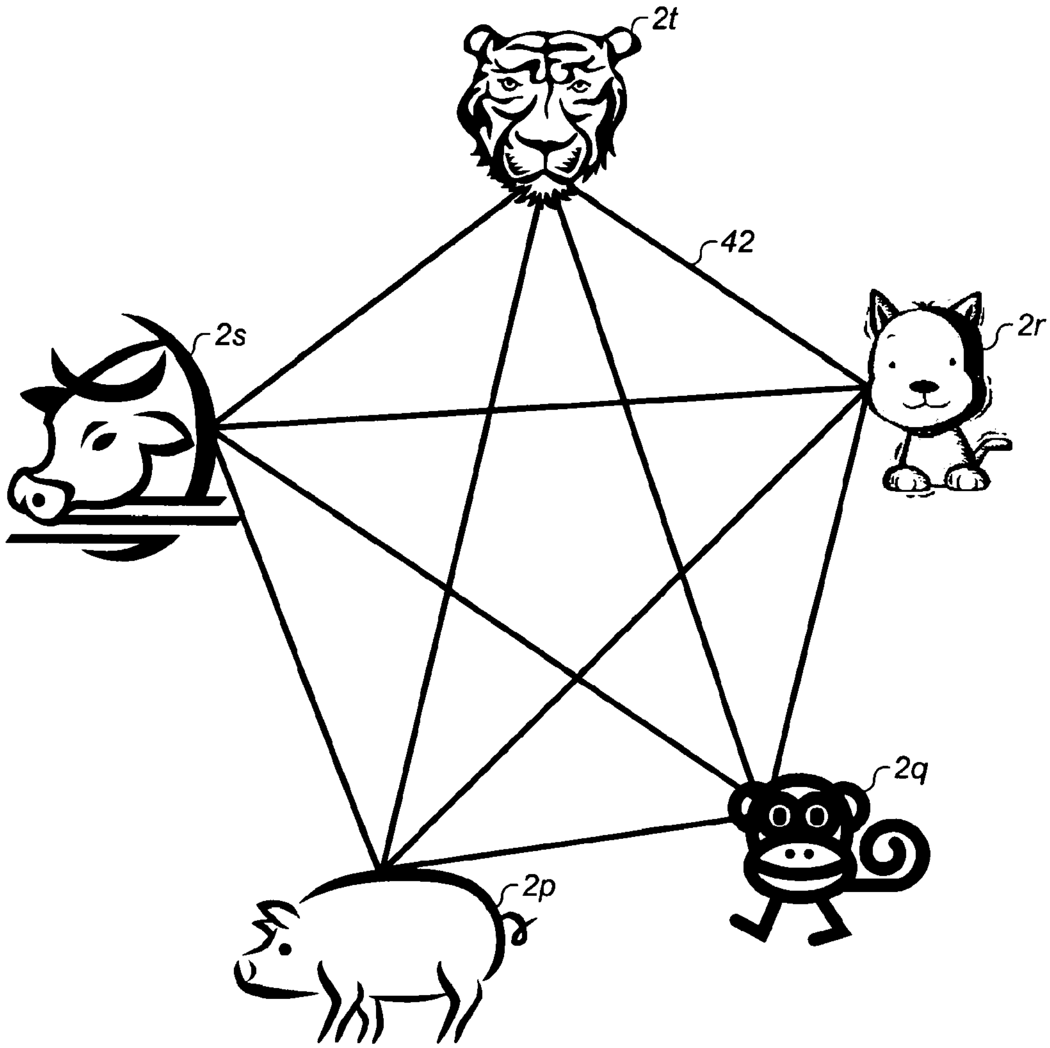
FIG. 1F depicts a network illustration for discussing LBX character provided to a MS through user LBX configurations made.

FIG. 1F depicts a network illustration for discussing LBX character 4 provided to a MS through LBX configurations made, for example with permissions 10 and/or charters 12. FIG. 1F exemplifies FIG. 1B in how user configurations provide wits and a unique personality to a MS. LBX character 4 wits (see WITS below) enable a vast and diverse set of processing behavior for location based processing, even for identically manufactured MSs having identically available applications for use. Every MS 2 can be very different and distinguished from other MSs 2 depending on permissions 10 and charters 12 which are configured for driving WITS processing. For example, a MS 2*p* with "Hog" LBX character contains user configurations for selfishly leveraging the LN-expanse for being located while never providing information for others to be located. Hog MS 2*p* contains configurations that are rich and deep in functionality for the user of MS 2*p*, but provide little functionality for other MS users. A MS 2*q* with "Monkey" LBX character contains configurations for "fun and games" which are suitable for interacting with other MSs for primarily entertainment and playful purposes. Monkey MS 2*q* contains configurations that provide enjoyment to the MS user and his peers. A MS 2*r* with "Dog" LBX character contains configurations for "being everyone's best friend" whereby MS 2*r* maintains configurations for helping others in accordance with any requests made on behalf of peer MSs. For example, the user of MS 2*r* is willing to unquestionably create configurations to keep LBX peers happy and to facilitate locational applications at other MSs. A MS 2*s* with "Cow" LBX character contains configurations for "existing to contribute" to the LN-Expanse by maintaining configurations for facilitating the locating of other MSs, and to interact with other MSs for the purpose of supporting locational applications at other MSs without being solicited for support. A MS 2*t* with "Tiger" LBX character contains user configurations which are "strictly business" and suitable for interacting with other MSs for primarily locational business purposes. Tiger MS 2 contains configurations for allowing business associates to interact, for example for letting a boss and team member know whereabouts, or alerting business associates of being nearby, or for automatically performing charter actions for the purpose of improving business activities. The richness of locational features and functionality provided by the LBX architecture enables a MS user to configure an infinite set of LBX character 4 for characterizing a MS and how it interacts with other MSs. Users exploit their own creativity for how their MSs should behave and what personalities their MS should have. The user's MS becomes a broader reaching, and more impacting, personification of a user's moving presence.

In some embodiments, an administrator or authorized user (e.g. parent) configures the MS for intended LBX character and use by the main MS user (e.g. child). Credentials such as a password, access code, user identifier and password, etc, or other authorization scheme may be used when accessing a disclosed configuration interface to limit configurability to certain users, types of users, or users with certain privileges.

Figure 2A:
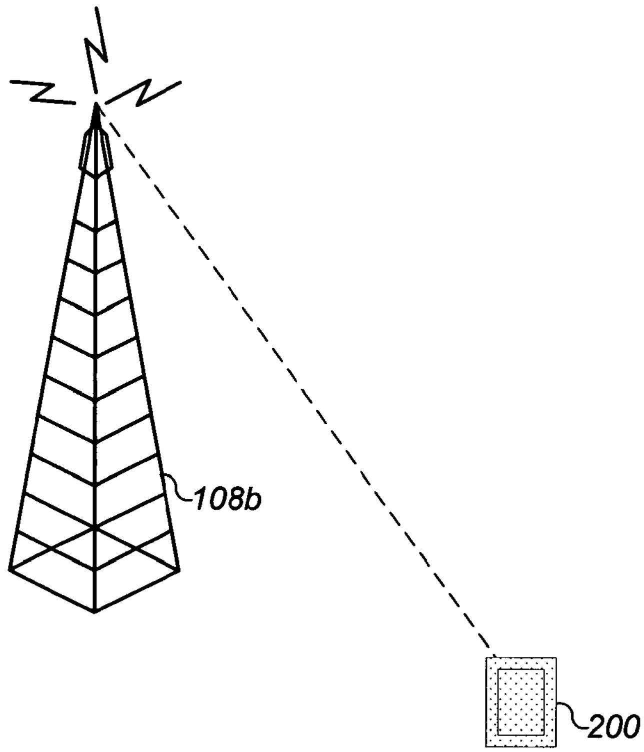
FIG. 2A depicts an illustration for describing automatic location of a MS through the MS coming into range of a stationary cellular tower.

FIG. 2A depicts an illustration for describing automatic location of a MS, for example a DLM 200, through the MS coming into range of a stationary cellular tower. A DLM 200, or any of a variety of MSs, travels within range of a cell tower, for example cell tower 108*b*. The known cell tower location is used to automatically detect the location of the DLM 200. In fact, any DLM that travels within the cell served by cell tower 108*b* is identified as the location of cell tower 108*b*. The confidence of a location of a DLM 200 is low when the cell coverage of cell tower 108*b* is large. In contrast, the confidence of a location of a DLM 200 is higher when the cell coverage of cell tower 108*b* is smaller. However, depending on the applications locating DLMs using this method, the locating can be quite acceptable. Location confidence is improved with a TDOA measurement for the elapsed time of communication between DLM 200 and cell tower to determine how close the MS is to the cell tower. Cell tower 108*b* can process all locating by itself, or with interoperability to other services as connected to cell tower 108*b* in FIG. 1E. Cell tower 108*b* can communicate the location of DLM 200 to a service, to the DLM 200, to other MSs within its coverage area, any combination thereof, or to any connected data processing system, or MS, of FIG. 1E.

Figure 2B:
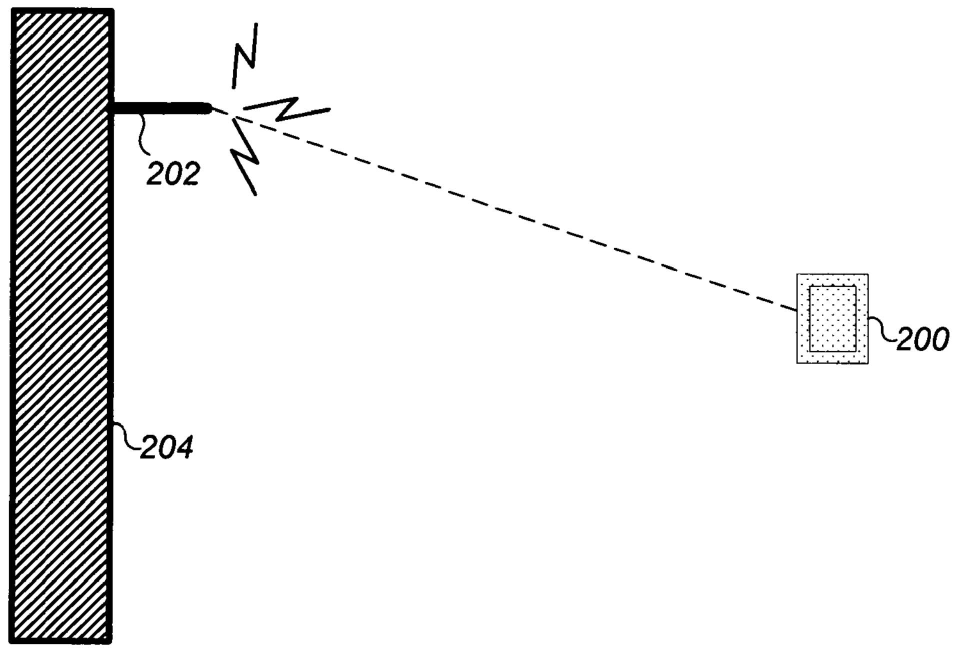
FIG. 2B depicts an illustration for describing automatic location of a MS through the MS coming into range of some stationary antenna.

FIG. 2B depicts an illustration for describing automatic location of a MS, for example a DLM 200, through the MS coming into range of some stationary antenna. DLM 200, or any of a variety of MSs, travels within range of a stationary antenna 202 that may be mounted to a stationary object 204. The known antenna location is used to automatically detect the location of the DLM 200. In fact, any DLM that travels within the coverage area served by antenna 202 is identified as the location of antenna 202. The confidence of a location of a DLM 200 is low when the antenna coverage area of antenna 202 is large. In contrast, the confidence of a location of a DLM 200 is higher when the antenna coverage area of antenna 202 is smaller. However, depending on the applications locating DLMs using this method, the locating can be quite acceptable. Location confidence is improved with a TDOA measurement for the elapsed time of communication between DLM 200 and a particular antenna to determine how close the MS is to the antenna. Antenna 202 can process all locating by itself (with connected data processing system (not shown) as well known to those skilled in the art), or with interoperability to other services as connected to antenna 202, for example with connectivity described in FIG. 1E. Antenna 202 can be used to communicate the location of DLM 200 to a service, to the DLM 200, to other MSs within its coverage area, any combination thereof, or to any connected data processing system, or MS, of FIG. 1E.

Figure 2C:
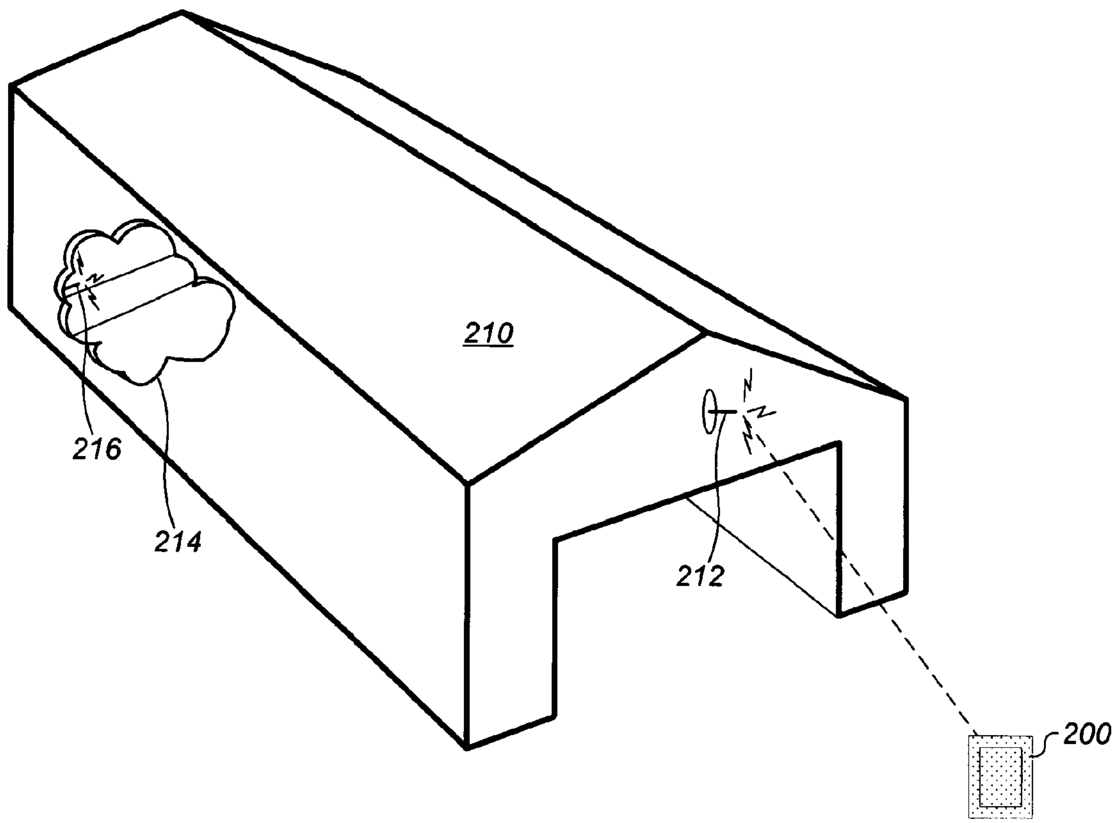
FIG. 2C depicts an illustration for discussing an example of automatically locating a MS through the MS coming into range of some stationary antenna.

FIG. 2C depicts an illustration for discussing an example of automatically locating a MS, for example a DLM 200, through the MS coming into range of some stationary antenna. DLM 200, or any of a variety of MSs, travels within range of a stationary antenna 212 that may be mounted to a stationary object, such as building 210. The known antenna location is used to automatically detect the location of the DLM 200. In fact, any DLM that travels within the coverage area served by antenna 212 is identified as the location of antenna 212. The confidence of a location of a DLM 200 is low when the antenna coverage area of antenna 212 is large. In contrast, the confidence of a location of a DLM 200 is higher when the antenna coverage area of antenna 212 is smaller. However, depending on the applications locating DLMs using this method, the locating can be quite acceptable. Location confidence is improved with a TDOA measurement as described above. Antenna 212 can process all locating by itself (with connected data processing system (not shown) as well known to those skilled in the art), or with interoperability to other services as connected to antenna 212, for example with connectivity described in FIG. 1E. Antenna 212 can be used to communicate the location of DLM 200 to a service, to the DLM 200, to other MSs within its coverage area, any combination thereof, or to any connected data processing system, or MS, of FIG. 1E.

Once DLM 200 is within the building 210, a strategically placed antenna 216 with a desired detection range within the building is used to detect the DLM 200 coming into its proximity. Wall breakout 214 is used to see the antenna 216 through the building 210. The known antenna 216 location is used to automatically detect the location of the DLM 200. In fact, any DLM that travels within the coverage area served by antenna 216 is identified as the location of antenna 216. The confidence of a location of a DLM 200 is low when the antenna coverage area of antenna 216 is large. In contrast, the confidence of a location of a DLM 200 is higher when the antenna coverage area of antenna 216 is smaller. Travels of DLM 200 can be limited by objects, pathways, or other limiting circumstances of traffic, to provide a higher confidence of location of DLM 200 when located by antenna 216, or when located by any locating antenna described herein which detects MSs coming within range of its location. Location confidence is improved with a TDOA measurement as described above. Antenna 216 can process all locating by itself (with connected data processing system (not shown) as well known to those skilled in the art), or with interoperability to other services as connected to antenna 216, for example with connectivity described in FIG. 1E. Antenna 216 can be used to communicate the location of DLM 200 to a service, to the DLM 200, to other MSs within its coverage area, any combination thereof, or to any connected data processing system, or MS, of FIG. 1E. Other in-range detection antennas of a FIG. 2C embodiment may be strategically placed to facilitate warehouse operations such as in Kubler et al.

Figure 2D:
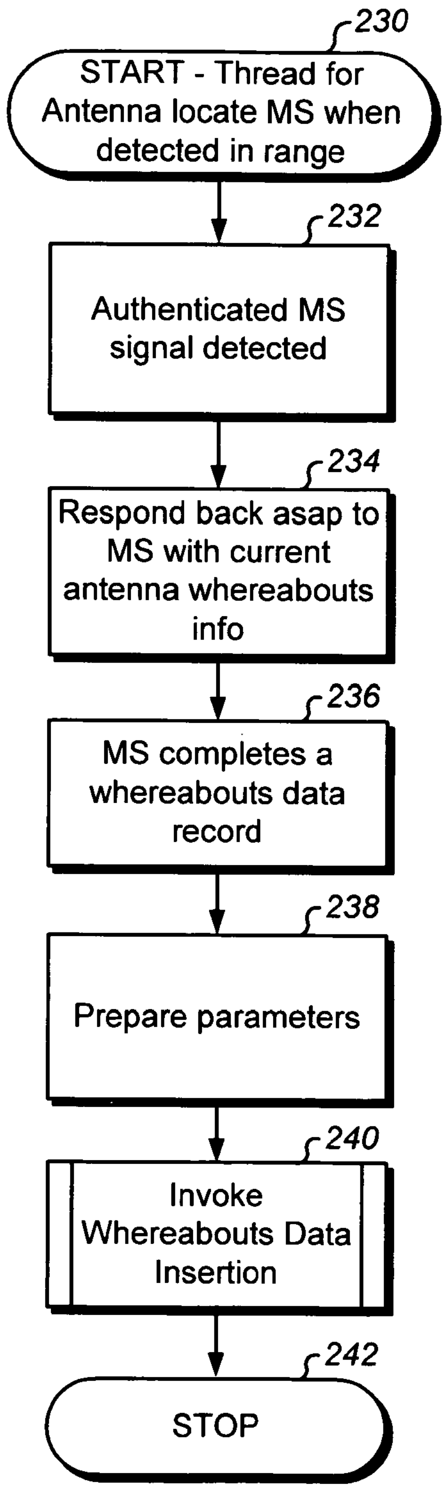
FIG. 2D depicts a flowchart for describing a preferred embodiment of a service whereabouts update event of an antenna in-range detected MS when MS location awareness is monitored by a stationary antenna or cell tower.
Figure 13A:
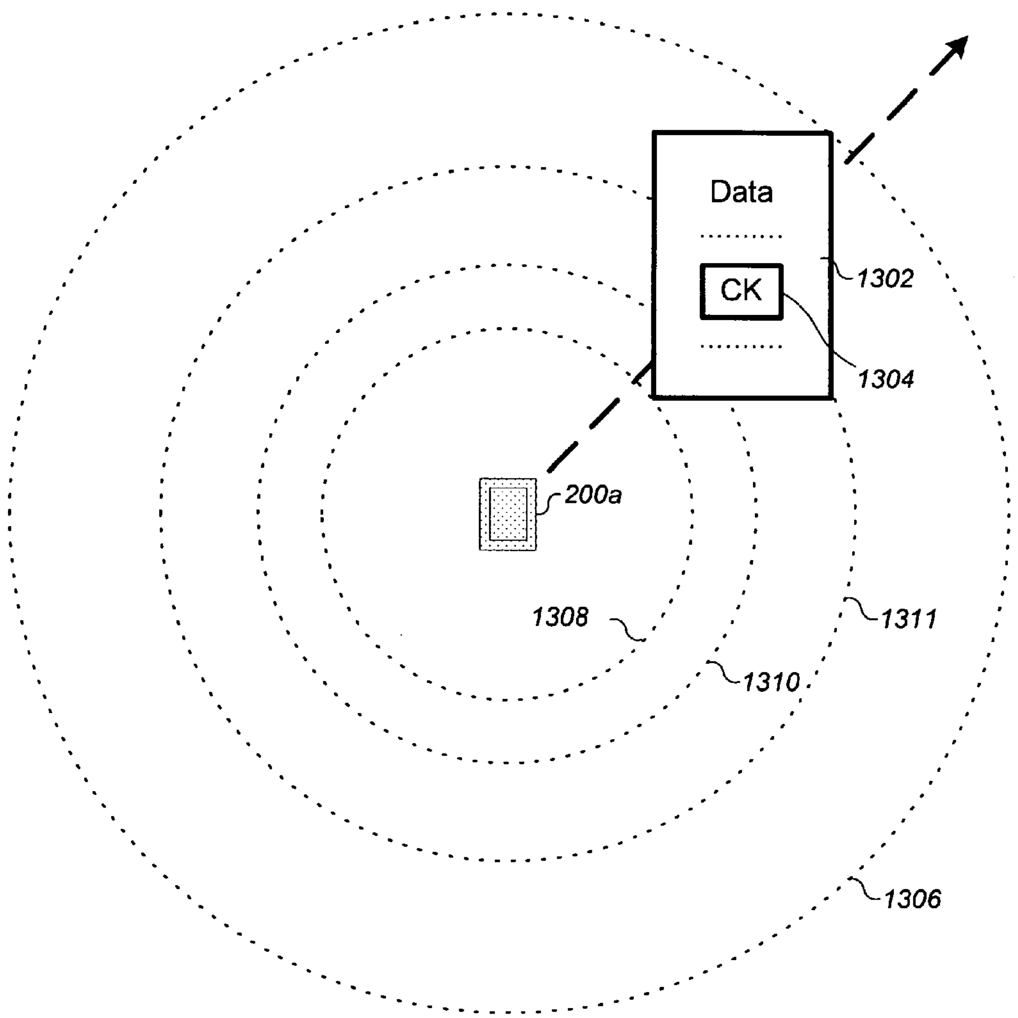
FIGS. 13A through 13C depict an illustration of data processing system wireless data transmissions over some wave spectrum.

FIG. 2D depicts a flowchart for describing a preferred embodiment of a service whereabouts update event of an antenna in-range detected MS, for example a DLM 200, when MS location awareness is monitored by a stationary antenna, or cell tower (i.e. the service thereof). FIGS. 2A through 2C location detection processing are well known in the art. FIG. 2D describes relevant processing for informing MSs of their own whereabouts. Processing begins at block 230 when a MS signal deserving a response has been received and continues to block 232 where the antenna or cell tower service has authenticated the MS signal. A MS signal can be received for processing by blocks 230 through 242 as the result of a continuous, or pulsed, broadcast or beaconing by the MS (FIG. 13A), perhaps as part of usual communication protocol in progress for the MS (FIG. 13A usual data 1302 with embedded Communications Key (CK) 1304), or an MS response to continuous, or pulsed, broadcast or beaconing via the service connected antenna (FIG. 13C). MS and/or service transmission can be appropriately correlated for a response (as described above) which additionally facilitates embodiments using TDOA measurements (time of communications between the MS and antenna, or cell tower) to determine at least how close is the MS in range (or use in conjunction with other data to triangulate the MS location). The MS is preferably authenticated by a unique MS identifier such as a phone number, address, name, serial number, or any other unique handle to the MS. In this, and any other embodiments disclosed, an MS may be authenticated using a group identifier handle indicating membership to a supported/known group deserving further processing. Authentication will preferably consult a database for authenticating that the MS is known. Block 232 continues to block 234 where the signal received is immediately responded back to the MS, via the antenna, containing at least correlation along with whereabouts information for a Whereabouts Data Record (WDR) 1100 associated with the antenna (or cell tower). Thereafter, the MS receives the correlated response containing new data at block 236 and completes a local whereabouts data record 1100 (i.e. WDR 1100) using data received along with other data determined by the MS.

In another embodiment, blocks 232 through 234 are not required. A service connected antenna (or cell tower) periodically broadcasts its whereabouts (WDR info (e.g. FIG. 13C)) and MSs in the vicinity use that directly at block 236. The MS can choose to use only the confidence and location provided, or may determine a TDOA measurement for determining how close it is. If the date/time stamp field 1100*b* indicates NTP is in use by the service, and the MS is also using NTP, then a TDOA measurement can be determined using the one unidirectional broadcast via the antenna by using the date/time stamp field 1100*b* received with when the WDR information was received by the MS (subtract time difference and use known wave spectrum for distance). If either the service or MS is not NTP enabled, then a bidirectional correlated data flow between the service and MS is used to assess a TDOA measurement in terms of time of the MS. One embodiment provides the TDOA measurement from the service to the MS. Another embodiment calculates the TDOA measurement at the MS.

Network Time protocol (NTP) can ensure MSs have the same atomic clock time as the data processing systems driving antennas (or cell towers) they will encounter. Then, date/time stamps can be used in a single direction (unidirectional) broadcast packet to determine how long it took to arrive to/from the MS. In an NTP embodiment, the MS (FIG. 13A) and/or the antenna (FIG. 13C) sends a date/time stamp in the pulse, beacon, or protocol. Upon receipt, the antenna (or cell tower) service data processing system communicates how long the packet took from an MS to the antenna (or cell tower) by comparing the date/time stamp in the packet and a date/time stamp of when it was received. The service may also set the confidence value, before sending WDR information to the MS. Similarly, an MS can compare a date/time stamp in the unidirectional broadcast packet sent from a locating service (FIG. 13C) with when received by the MS. So, NTP facilitates TDOA measurements in a single broadcast communication between systems through incorporation to usual communications data 1302 with a date/time stamp in Communications Key (CK) 1304, or alternatively in new data 1302. Similarly, NTP facilitates TDOA measurement in a single broadcast communication between systems through incorporation to usual communications data 1312 with a date/time stamp in Communications Key (CK) 1314, or alternatively in new data 1312.

The following template is used in this disclosure to highlight field settings. See FIG. 11A descriptions. Fields are set to the following upon exit from block 236:

MS ID field 1100*a* is preferably set with: Unique MS identifier of the MS invoking block 240. This field is used to uniquely distinguish this MS WDRs on queue 22 from other originated WDRs.

DATE/TIME STAMP field 1100*b* is preferably set with: Date/time stamp for WDR completion at block 236 to the finest granulation of time achievable by the MS. The NTP use indicator is set appropriately.

LOCATION field 1100*c* is preferably set with: Location of stationary antenna (or cell tower) as communicated by the service to the MS.

CONFIDENCE field 1100*d* is preferably set with: The same value (e.g. 76) for any range within the antenna (or cell tower), or may be adjusted using the TDOA measurement (e.g. amount of time detected by the MS for the response at block 234). The longer time it takes between the MS sending a signal detected at block 232 and the response with data back received by the MS (block 234), the less confidence there is for being located because the MS must be a larger distance from the antenna or cell tower. The less time it takes between the MS sending a signal detected at block 232 and the response with data back, the more confidence there is for being located because the MS must be a closer distance to the antenna or cell tower. Confidence values are standardized for all location technologies. In some embodiments of FIG. 2D processing, a confidence value can be set for 1 through 100 (1 being lowest confidence and 100 being highest confidence) wherein a unit of measurement between the MS and antenna (or cell tower) is used directly for the confidence value. For example, 20 meters is used as the unit of measurement. For each unit of 20 meters distance determined by the TDOA measurement, assign a value of 1, up to a worst case of 100 (i.e. 2000 meters). Round the 20 meter unit of distance such that 0 meters to <25 meters is 20 meters (i.e. 1 unit of measurement), 26 meters to <45 meters is 40 meters (i.e. 2 units of measurement), and so on. Once the number of units is determined, subtract that number from 101 for the confidence value (i.e. 1 unit=confidence value 100, 20 units=confidence value 81; 100 units or greater=confidence value of 1). Yet another embodiment will use a standard confidence value for this "coming in range" technology such as 76 and then further increase or decrease the confidence using the TDOA measurement. Many embodiments exist for quantifying a higher versus lower confidence. In any case, a confidence value (e.g. 76) is determined by the MS, service, or both (e.g. MS uses TDOA measurement to modify confidence sent by service).

LOCATION TECHNOLOGY field 1100*e* is preferably set with: "Server Antenna Range" for an antenna detecting the MS, and is set to "Server Cell Range" for a cell tower detecting the MS. The originator indicator is set to DLM.

LOCATION REFERENCE INFO field 1100*f* is preferably set with: The period of time for communications between the antenna and the MS (a TDOA measurement), if known; a communications signal strength, if available; wave spectrum used (e.g. from MS receive processing), if available; particular communications interface 70, if available. The TDOA measurement may be converted to a distance using wave spectrum information. The values populated here should have already been factored into the confidence value at block 236.

COMMUNICATIONS REFERENCE INFO field 1100*g* is preferably set with: Parameters uniquely identifying a/the service (e.g. antenna (or cell tower)) and how to best communicate with it again, if available. May not be set, regardless if received from the service.

SPEED field 1100*h* is preferably set with: Data received by MS at block 234, if available.

HEADING field 1100*i* is preferably set with: Data received by MS at block 234, if available.

ELEVATION field 1100*j* is preferably set with: data received by MS at block 234, if available. Elevation field 1100*j* is preferably associated with the antenna (or cell tower) by the elevation/altitude of the antenna (or cell tower).

APPLICATION FIELDS field 1100*k* is preferably set with: Data received at block 234 by the MS, or set by data available to the MS, or set by both the locating service for the antenna (or cell tower) and the MS itself. Application fields include, and are not limited to, MS navigation APIs in use, social web site identifying information, application information for applications used, accessed, or in use by the MS, or any other information complementing whereabouts of the MS.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

A service connected to the antenna (or cell tower) preferably uses historical information and artificial intelligence interrogation of MS travels to determine fields 1100*h* and 1100*i*. Block 236 continues to block 238 where parameters are prepared for passing to FIG. 2F processing invoked at block 240. Parameters are set for: WDRREF=a reference or pointer to the WDR; DELETEQ=FIG. 2D location queue discard processing; and SUPER=FIG. 2D supervisory notification processing. Thereafter, block 240 invokes FIG. 2F processing and FIG. 2D processing terminates at block 242. FIG. 2F processing will insert to queue 22 so this MS knows at least its own whereabouts whenever possible. A single data instance embodiment of WDR queue 22 will cause FIG. 2F to update the single record of WDR information for being current upon exit from block 240 (this is true for all flowchart blocks invoking FIG. 2F processing).

With reference now to FIG. 2F, depicted is a flowchart for describing a preferred embodiment of a procedure for inserting a Whereabouts Data Record (WDR) 1100 to MS WDR queue 22. Appropriate semaphores are used for variables which can be accessed simultaneously by another thread other than the caller. With reference now to FIG. 2F, procedure processing starts at block 270 and continues to block 272 where parameters passed from the invoking block of processing, for example block 240, are determined. The variable WDRREF is set by the caller to a reference or pointer to the WDR so subsequent blocks of FIG. 2F can access the WDR. The variable DELETEQ is set by the caller so that block 292 knows how to discard obsolete location queue entries. The DELETEQ variable can be a multi-field record (or reference thereof) for how to prune. The variable SUPER is set by the caller so that block 294 knows under what condition(s), and which data, to contact a supervisory service. The SUPER variable can be a multi-field record (or reference thereof) for instruction.

Block 272 continues to block 274 where the DLMV (see FIG. 12 and later discussions for DLMV (DLM role(s) List Variable)), or ILMV (see FIG. 12 and later discussions for ILMV (ILM role(s) List Variable)), is checked for an enabled role matching the WDR for insertion (e.g. DLM: location technology field 1100*e* (technology and originator indicator) when MS ID=this MS; ILM: DLM or ILM indicator when MS ID not this MS). If no corresponding DLMV/ILMV role is enabled for the WDR to insert, then processing continues to block 294 (the WDR is not inserted to queue 22). If the ILMV/DLMV role for the WDR is enabled, then processing continues to block 276 where the confidence of the WDR 1100 is validated prior to insertion. An alternate embodiment to FIG. 2F will not have block 274 (i.e. block 272 continues directly to block 276) since appropriate DLM and/or ILM processing may be terminated anyway when DLM/ILM role(s) are disabled (see FIG. 14A/B).

If block 276 determines the data to be inserted is not of acceptable confidence (e.g. field 1100*d*<confidence floor value (see FIG. 14A/B)), then processing continues to block 294 described below. If block 276 determines the data to be inserted is of acceptable confidence (e.g. field 1100*d*>70), then processing continues to block 278 for checking the intent of the WDR insertion.

Figure 26A:
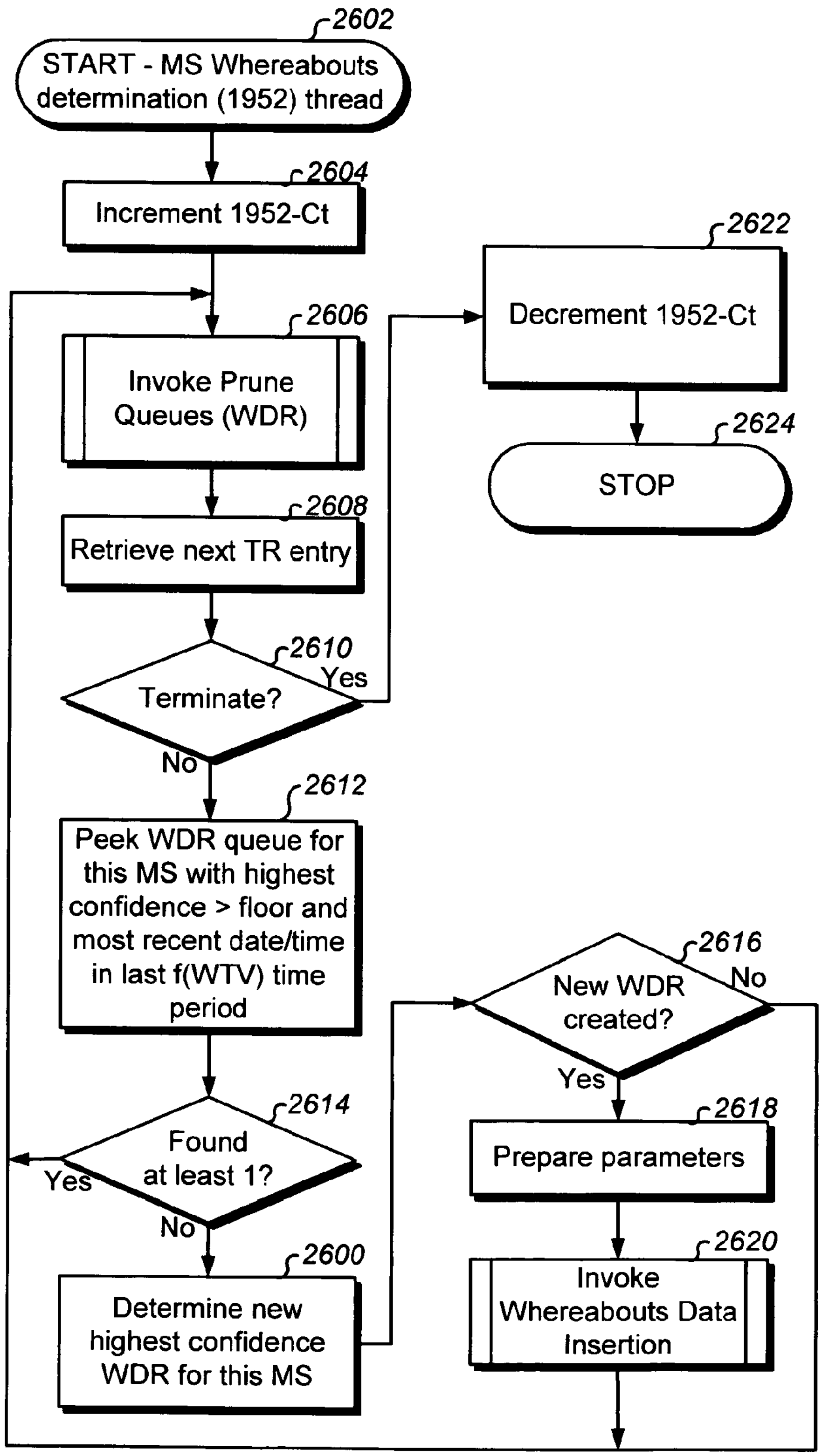
FIG. 26A depicts a flowchart for describing a preferred embodiment of MS whereabouts determination processing.

If block 278 determines the WDR for insert is a WDR describing whereabouts for this MS (i.e. MS ID matching MS of FIG. 2F processing (DLM: FIGS. 2A through 9B, or ILM: FIG. 26A/B)), then processing continues to block 280. If block 278 determines the WDR for insert is from a remote ILM or DLM (i.e. MS ID does not match MS of FIG. 2F processing), then processing continues to block 290. Block 280 peeks the WDR queue 22 for the most recent highest confidence entry for this MS whereabouts by searching queue 22 for: the MS ID field 1100*a* matching the MS ID of FIG. 2F processing, and a confidence field 1100*d* greater than or equal to the confidence floor value, and a most recent date/time stamp field 1100*b*. Thereafter, if block 282 determines one was found, then processing continues to block 284, otherwise processing continues to block 286 where a Last Whereabouts date/Time stamp (LWT) variable is set to field 1100*b* of the WDR for insert (e.g. first MS whereabouts WDR), and processing continues to block 288.

If block 284 determines the WDR for insertion has significantly moved (i.e. using a movement tolerance configuration (e.g. 3 meters) with fields 1100*c* of the WDR for insert and the WDR peeked at block 280), then block 286 sets the LWT (Last Whereabouts date/Time stamp) variable (with appropriate semaphore) to field 1100*b* of the WDR for insert, and processing continues to block 288, otherwise processing continues directly to block 288 (thereby keeping the LWT as its last setting). The LWT is to hold the most recent date/time stamp of when the MS significantly moved as defined by a movement tolerance. The movement tolerance can be system defined or configured, or user configured in FIG. 14 by an option for configuration detected at block 1408, and then using the Configure Value procedure of FIG. 18 (like confidence floor value configuration).

Figure 14A:
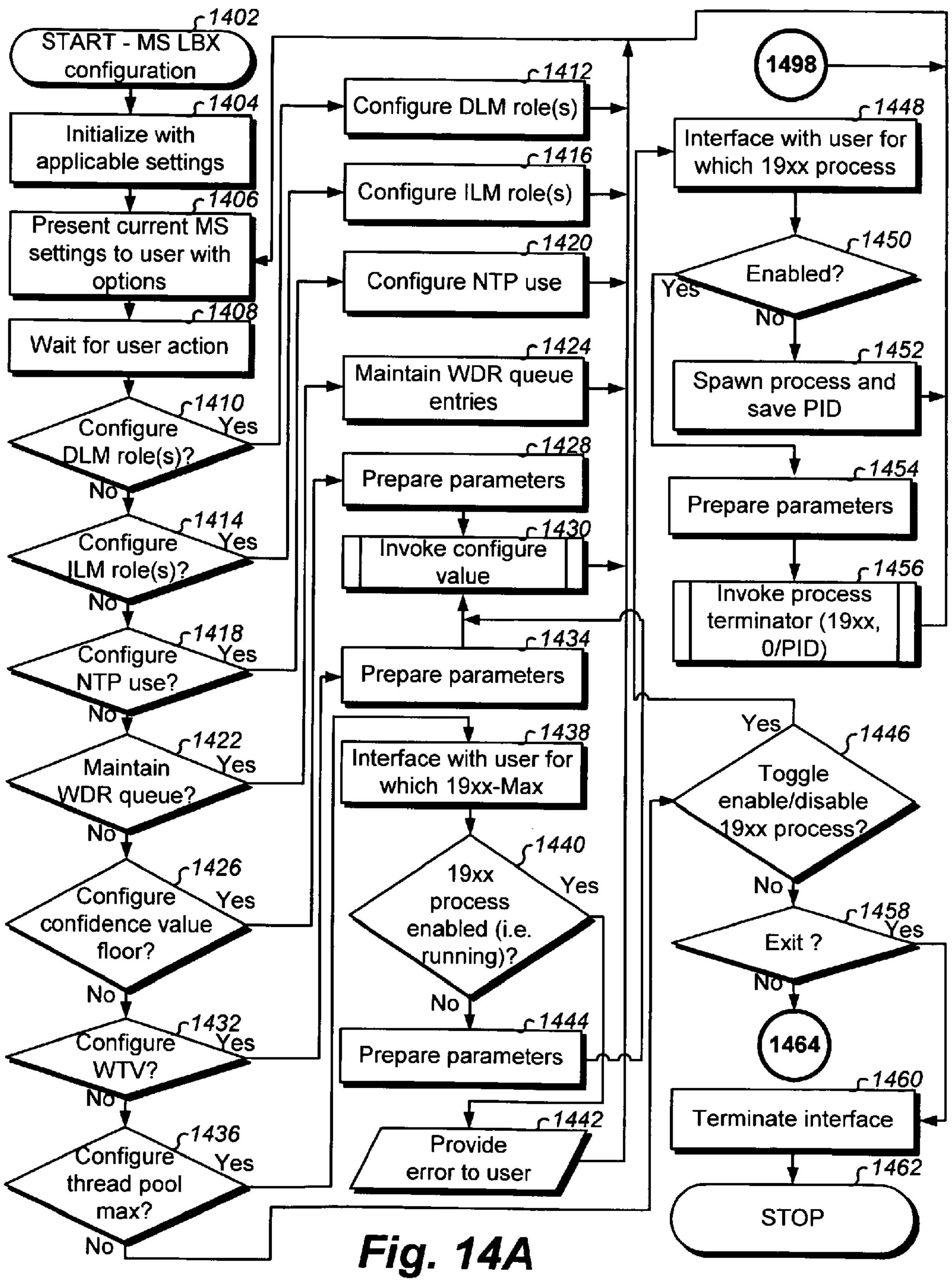
FIG. 14A depicts a flowchart for describing a preferred embodiment of MS LBX configuration processing.

Block 288 accesses the DLMV and updates it with a new DLM role if there is not one present for it. This ensures a correct list of DLMV roles are available for configuration by FIG. 14. Preferably, by default an unanticipated DLMV role is enabled (helps inform the user of its availability). Likewise in another embodiment, ILMV roles can be similarly updated, in particular if a more granulated list embodiment is maintained to the ILMV, or if unanticipated results help to identify another configurable role. By default, block 274 should allow unanticipated roles to continue with WDR insertion processing, and then block 288 can add the role, enable it, and a user can decide what to do with it in configuration (FIG. 14A/B).

Thereafter, the WDR 1100 is inserted to the WDR queue 22 at block 290, block 292 discards any obsolete records from the queue as directed by the caller (invoker), and processing continues to block 294. The WDR queue 22 preferably contains a list of historically MS maintained Whereabouts Data Records (WDRs) as the MS travels. When the MS needs its own location, for example from an application access, or to help locate an ILM, the queue is accessed for returning the WDR with the highest confidence value (field 1100*d*) in the most recent time (field 1100*b*) for the MS (field 1100*a*). Block 292 preferably discards by using fields 1100*b* and 1100*d* relative to other WDRs. The queue should not be allowed to get too large. This will affect memory (or storage) utilization at the MS as well as timeliness in accessing a sought queue entry. Block 292 also preferably discards WDRs from queue 22 by moving selected WDRs to LBX History 30.

As described above, queue interfaces assume an implicit semaphore for properly accessing queue 22. There may be ILMs requesting to be located, or local applications of the MS may request to access the MS whereabouts. Executable thread(s) at the MS can accesses the queue in a thread-safe manner for responding to those requests. The MS may also have multiple threads of processing for managing whereabouts information from DLMs, ILMs, or stationary location services. The more concurrently executable threads available to the MS, the better the MS is able to locate itself and respond to others (e.g. MSs). There can be many location systems and methods used to keeping a MS informed of its own whereabouts during travel. While the preferred embodiment is to maximize thread availability, the obvious minimum requirement is to have at least 1 executable thread available to the MS. As described above, in operating system environments without proper queue interfaces, queue access blocks are first preceded by an explicit request for a semaphore lock to access queue 22 (waits until obtained), and then followed by a block for releasing the semaphore lock to another thread for use. Also, in the present disclosure it is assumed in blocks which access data accessible to more than 1 concurrent thread (e.g. shared memory access to DLMV or ILMV at block 274) that an appropriate semaphore (created at block 1220) protect synchronous access.

If block 294 determines information (e.g. whereabouts) should be communicated by service informant code 28 to a supervisory service, for example a service 1050, then block 296 communicates specified data to the service and processing terminates at block 298 by returning to the invoker (caller). If block 294 determines a supervisory service is not to be informed, then processing terminates with an appropriate return to the caller at block 298. Service informant code 28, at block 296, can send information as data that is reliably acknowledged on receipt, or as a datagram which most likely (but unreliably) is received.

Depending on the SUPER variable, block 294 may opt to communicate every time a WDR is placed to the queue, or when a reasonable amount of time has passed since last communicating to the supervisory service, or when a WDR confidence reaches a certain sought value, or when any WDR field or fields contain certain sought information, or when a reasonably large number of entries exist in WDR queue 22, or for any processing condition encountered by blocks 270 through 298, or for any processing condition encountered by caller processing up to the invocation of FIG. 2F processing. Different embodiments will send a single WDR 1100 at block 296, a plurality of WDRs 1100, or any other data. Various SUPER parameter(s) embodiments for FIG. 2F caller parameters can indicate what, when, where and how to send certain data. Block 296 may send an email, an SMS message, or use other means for conveying data. Service informant code 28 may send LBX history 30, statistics 14 and/or any other data 8, data 20, queue data, data 36 or resources 38. Service informant code 28 may update data in history 30, statistics 14 or any other data 8, data 20, queue data, data 36 and/or resources 38, possibly using conditions of this data to determine what is updated. Blocks 294 and 296 may be omitted in some embodiments.

If a single WDR is sent at block 296 as passed to FIG. 2F processing, then the WDR parameter determined at block 272 is accessed. If a plurality of WDRs is sent at block 296, then block 296 appropriately interfaces in a thread-safe manner to queue 22, and sends the WDRs.

Some preferred embodiments do not incorporate blocks 278 through 286. (i.e. block 276 continues to block 288 if confidence ok). Blocks 278 through 286 are for the purpose of implementing maintaining a date/time stamp of last MS significant movement (using a movement tolerance). Architecture 1900 uses FIG. 2F, as does DLM processing. FIG. 2F must perform well for the preferred multithreaded architecture 1900. Block 280 performs a peek, and block 284 can be quite timely depending on embodiments used for location field 1100*c*. A movement tolerance incorporated at the MS is not necessary, but may be nice to have. Therefore, blocks 278 through 286 are optional blocks of processing.

FIG. 2F may also maintain (with appropriate semaphore) the most recent WDR describing whereabouts of the MS of FIG. 2F processing to a single data record every time a new one is to be inserted. This allows applications needing current whereabouts to simply access a current WDR, rather than interface to a plurality of WDRs at queue 22. For example, there could be a new block 289 for updating the single WDR 1100 (just prior to block 290 such that incoming blocks to block 290 go to new block 289, and new block 289 continues to block 290).

Figure 2E:
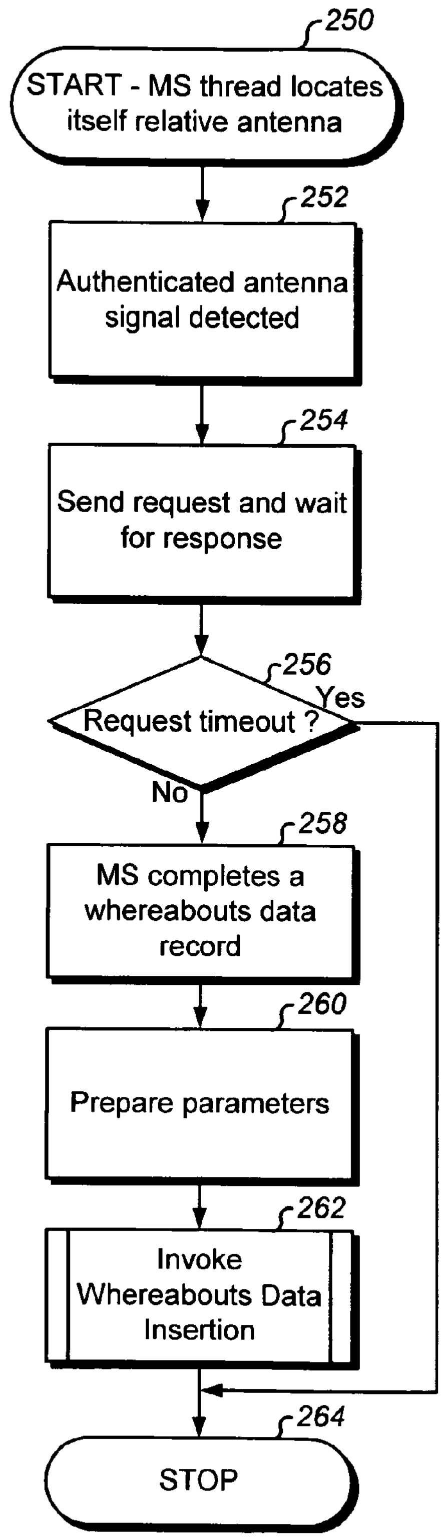
FIG. 2E depicts a flowchart for describing a preferred embodiment of an MS whereabouts update event of an antenna in-range detected MS when MS location awareness is monitored by the MS.
Figure 2F:
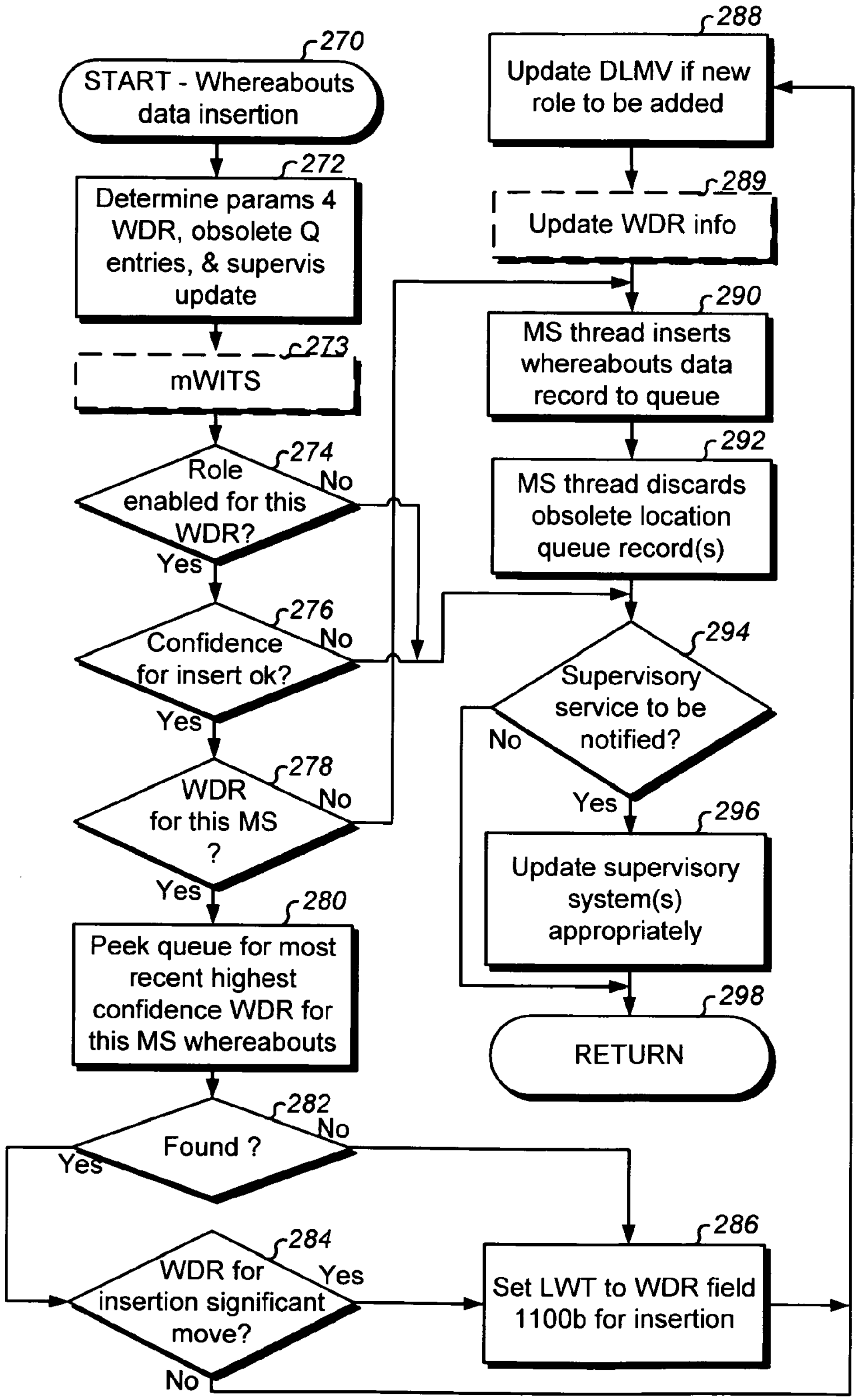
FIG. 2F depicts a flowchart for describing a preferred embodiment of a procedure for inserting a Whereabouts Data Record (WDR) to an MS whereabouts data queue.

With reference now to FIG. 2E, depicted is a flowchart for describing a preferred embodiment of an MS whereabouts update event of an antenna in-range detected MS, for example a DLM 200, when MS location awareness is monitored by the MS. FIG. 2E describes relevant processing for MSs to maintain their own whereabouts. Processing begins at block 250 when the MS receives a signal from an antenna (or cell tower) deserving a response and continues to block 252 where the antenna or cell tower signal is authenticated by the MS as being a legitimate signal for processing. The signal can be received for processing by blocks 250 through 264 as the result of a continuous, or pulsed, broadcast or beaconing by the antenna, or cell tower (FIG. 13C), or as part of usual communication protocol in progress with at least one MS (FIG. 13C usual data 1312 with embedded Communications Key 1314), or as a response via antenna to a previous MS signal (FIG. 13A). The signal is preferably authenticated by a data parsed signature deserving further processing. Block 252 continues to block 254 where the MS sends an outbound request for soliciting an immediate response from the antenna (or cell tower) service. The request by the MS is appropriately correlated (e.g. as described above) for a response, which additionally facilitates embodiments using TDOA measurements (time of communications between the MS and antenna, or cell tower) to determine how close is the MS in range. Block 254 waits for a response, or waits until a reasonable timeout, whichever occurs first. There are also multithreaded embodiments to breaking up FIG. 2E where block 254 does not wait, but rather terminates FIG. 2E processing and depends on another thread to correlate the response and then continue processing blocks 256 through 260 (like architecture 1900).

Thereafter, if block 256 determines the request timed out, then processing terminates at block 264. If block 256 determines the response was received, then processing continues to block 258. Block 258 completes a WDR 1100 with appropriate response data received along with data set by the MS. See FIG. 11A descriptions. Fields are set to the following upon exit from block 258:

MS ID field 1100*a* is preferably set with: Same as was described for FIG. 2D (block 236) above.

DATE/TIME STAMP field 1100*b* is preferably set with: Same as was described for FIG. 2D (block 236) above.

LOCATION field 1100*c* is preferably set with: Same as was described for FIG. 2D (block 236) above.

CONFIDENCE field 1100*d* is preferably set with: Same as was described for FIG. 2D (block 236) above.

LOCATION TECHNOLOGY field 1100*e* is preferably set with: "Client Antenna Range" for an antenna detecting the MS, and is set to "Client Cell Range" for a cell tower detecting the MS. The originator indicator is set to DLM.

LOCATION REFERENCE INFO field 1100*f* is preferably set with: Same as was described for FIG. 2D (block 236) above.

COMMUNICATIONS REFERENCE INFO field 1100*g* is preferably set with: Same as was described for FIG. 2D (block 236) above.

SPEED field 1100*h* is preferably set with: Same as was described for FIG. 2D (block 236) above.

HEADING field 1100*i* is preferably set with: Same as was described for FIG. 2D (block 236) above.

ELEVATION field 1100*j* is preferably set with: Same as was described for FIG. 2D (block 236) above.

APPLICATION FIELDS field 1100*k* is preferably set with: Same as was described for FIG. 2D (block 236) above.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

The longer time it takes between sending a request and getting a response at block 254, the less confidence there is for being located because the MS must be a larger distance from the antenna or cell tower. The less time it takes, the more confidence there for being located because the MS must be a closer distance to the antenna or cell tower. Confidence values are analogously determined as described for FIG. 2D. FIG. 2D NTP embodiments also apply here. NTP can be used so no bidirectional communications is required for TDOA measurement. In this embodiment, the antenna (or cell tower) sets a NTP date/time stamp in the pulse, beacon, or protocol. Upon receipt, the MS instantly knows how long the packet took to be received by comparing the NTP date/time stamp in the packet and a MS NTP date/time stamp of when it was received (i.e. no request/response pair required). If location information is also present with the NTP date/time stamp in data received at block 252, then block 252 can continue directly to block 258.

An alternate MS embodiment determines its own (direction) heading and/or speed for WDR completion based on historical records maintained to the WDR queue 22 and/or LBX history 30.

Block 258 continues to block 260 for preparing parameters for: WDRREF=a reference or pointer to the WDR; DELETEQ=FIG. 2E location queue discard processing; and SUPER=FIG. 2E supervisory notification processing. Thereafter, block 262 invokes the procedure (FIG. 2F processing) to insert the WDR to queue 22. After FIG. 2F processing of block 262, FIG. 2E processing terminates at block 264.

In alternative "coming within range" (same as "in range", "in-range", "within range") embodiments, a unique MS identifier, or MS group identifier, for authenticating an MS for locating the MS is not necessary. An antenna emitting signals (FIG. 13C) will broadcast (in CK 1314 of data 1312) not only its own location information (e.g. location field 1100*c*), but also an NTP indicated date/time stamp field 1100*b*, which the receiving MS (also having NTP for time synchronization) uses to perform a TDOA measurement upon receipt. This will enable a MS to determine at least how close (e.g. radius 1318 range, radius 1320 range, radius 1322 range, or radius 1316 range) it is located to the location of the antenna by listening for and receiving the broadcast (e.g. of FIG. 13C). Similarly, in another embodiment, an NTP synchronized MS emits signals (FIG. 13A) and an NTP synchronized data processing system associated with a receiving antenna can make a TDOA measurement upon signal receipt. In other embodiments, more than a single unidirectional signal may be used while still preventing the requirement to recognize the MS to locate it. For example, an antenna emitting signals (e.g. FIG. 13C hotspot WiFi 802.*x*) will contain enough information for a MS to respond with correlation for being located, and visa-versa. In any case, there can be multi-directional exchanged signals for determining a TDOA measurement.

Figure 3A:
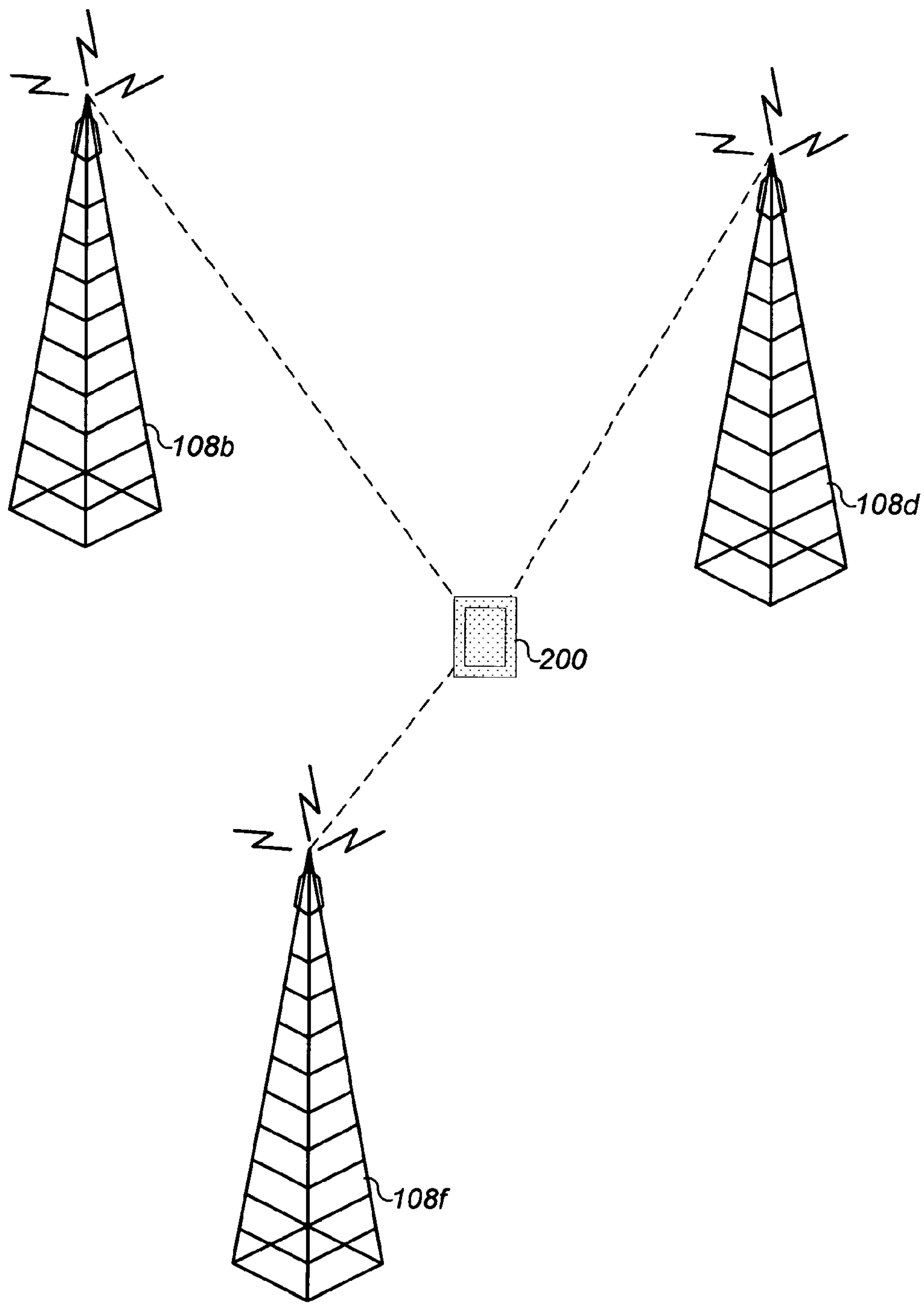
FIG. 3A depicts a locating by triangulation illustration for discussing automatic location of a MS.

FIG. 3A depicts a locating by triangulation illustration for discussing automatic location of a MS, for example DLM 200. DLM 200 is located through triangulation, as is well known in the art. At least three base towers, for example, base tower 108*b*, base tower 108*d*, and base tower 108*f*, are used for locating the MS. A fourth base tower may be used if elevation (or altitude) was configured for use in locating DLM 200. There are cases where only two base towers are necessary given routes of travel are limited and known, for example, in spread out roadways or limited configured locations. Base towers may also be antennas 108*b*, 108*d*, and 108*f* in similar triangulation embodiments.

Figure 3B:
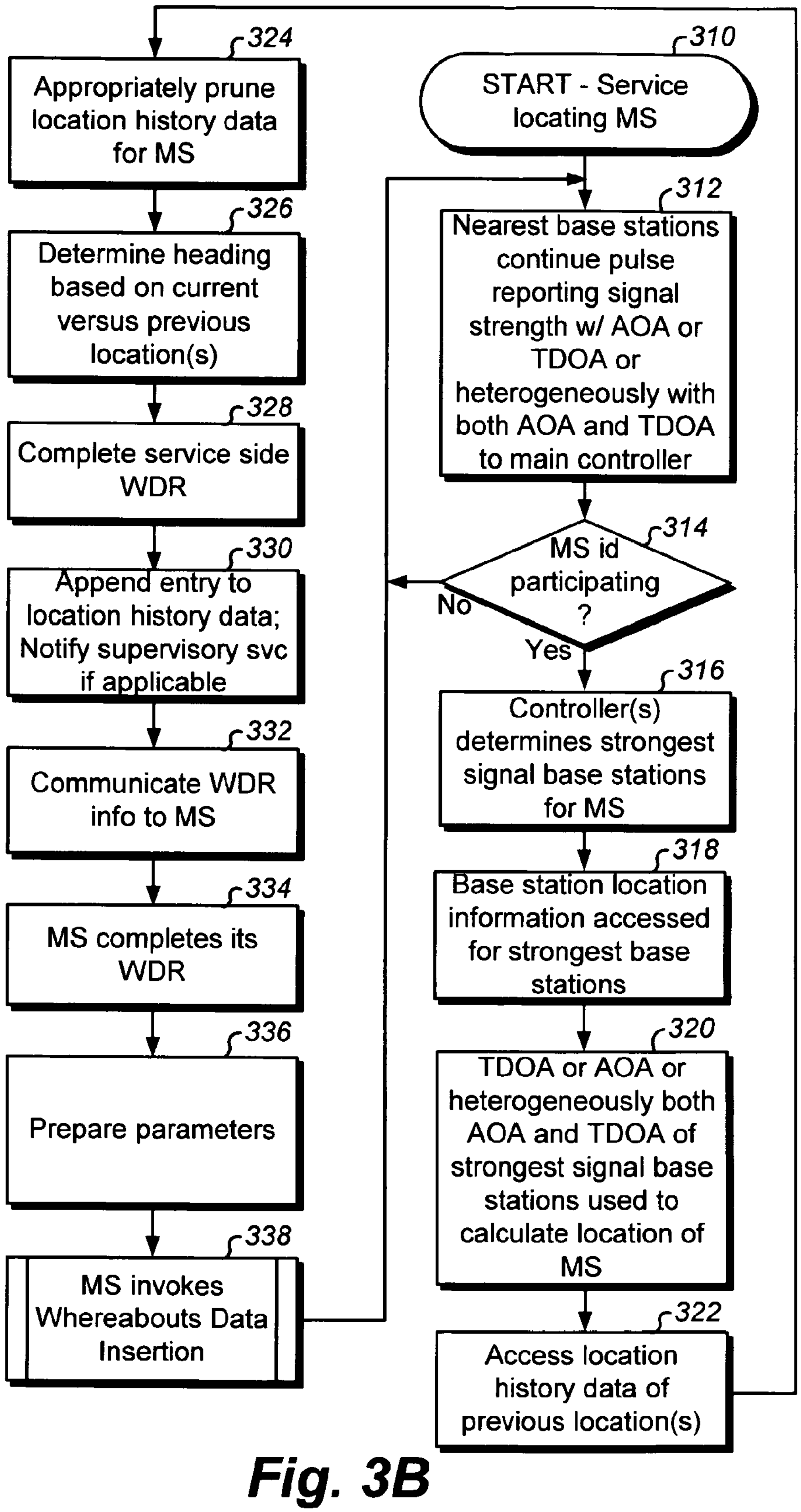
FIG. 3B depicts a flowchart for describing a preferred embodiment of the whereabouts update event of a triangulated MS when MS location awareness is monitored by some remote service.

FIG. 3B depicts a flowchart for describing a preferred embodiment of the whereabouts update event of a triangulated MS, for example DLM 200, when MS location awareness is monitored by some remote service. While FIG. 3A location determination with TDOA and AOA is well known in the art, FIGS. 3B and 3C include relevant processing for MSs to maintain their own whereabouts. Processing begins at block 310 and continues to block 312 where base stations able to communicate to any degree with a MS continue reporting to their controller the MS signal strength with an MS identifier (i.e. a unique handle) and Time Difference of Arrival (TDOA) information, Angle of Arrival (AOA) information, or heterogeneously both TDOA and AOA (i.e. MPT), depending on the embodiment. The MS can pick signals from base stations. In some embodiments, the MS monitors a paging channel, called a forward channel. There can be multiple forward channels. A forward channel is the transmission frequency from the base tower to the MS. Either the MS provides broadcast heartbeats (FIG. 13A) for base stations, or the base stations provide heartbeats (FIG. 13C) for a response from the MS, or usual MS use protocol signals are detected and used (incorporating CK 1304 in usual data 1302 by MS, or CK 1314 in "usual data" 1312 by service). Usual data is the usual communications traffic data in carrying out other character 32 processing. Communication from the MS to the base tower is on what is called the reverse channel. Forward channels and reverse channel are used to perform call setup for a created session channel.

TDOA is calculated from the time it takes for a communication to occur from the MS back to the MS via the base tower, or alternatively, from a base tower back to that base tower via the MS. NTP may also be used for time calculations in a unidirectional broadcast from a base tower (FIG. 13C) to the MS, or from the MS (FIG. 13A) to a base tower (as described above). AOA is performed through calculations of the angle by which a signal from the MS encounters the antenna. Triangle geometry is then used to calculate a location. The AOA antenna is typically of a phased array type.

See "Missing Part Triangulation (MPT)" section below with discussions for FIGS. 11A through 11E for details on heterogeneously locating the MS using both TDOA and AOA (i.e. Missing Part Triangulation (MPT)). Just as high school taught geometry for solving missing parts of a triangle, so to does MPT triangulate an MS location. Think of the length of a side of a triangle as a TDOA measurement—i.e. length of time, translatable to a distance. Think of the AOA of a signal to an antenna as one of the angles of a triangle vertice. Solving with MPT analogously uses geometric and trigonometric formulas to solve the triangulation, albeit at fast processing speeds.

Thereafter, if the MS is determined to be legitimate and deserving of processing (similar to above), then block 314 continues to block 316. If block 314 determines the MS is not participating with the service, in which case block 312 did little to process it, then processing continues back to block 312 to continue working on behalf of legitimate participating MSs. The controller at block 316 may communicate with other controllers when base stations in other cellular clusters are picking up a signal, for example, when the MS roams. In any case, at block 316, the controller(s) determines the strongest signal base stations needed for locating the MS, at block 316. The strongest signals that can accomplish whereabouts information of the MS are used. Thereafter, block 318 accesses base station location information for base stations determined at block 316. The base station provides stationary references used to (relatively) determine the location of the MS. Then, block 320 uses the TDOA, or AOA, or MPT (i.e. heterogeneously both AOA and TDOA) information together with known base station locations to calculate the MS location.

Thereafter, block 322 accesses historical MS location information, and block 324 performs housekeeping by pruning location history data for the MS by time, number of entries, or other criteria. Block 326 then determines a heading (direction) of the MS based on previous location information. Block 326 may perform Artificial Intelligence (AI) to determine where the MS may be going by consulting many or all of the location history data. Thereafter, block 328 completes a service side WDR 1100, block 330 appends the WDR information to location history data and notifies a supervisory service if there is one outside of the service processing of FIG. 3B. Processing continues to block 332 where the service communicates the WDR to the located MS.

Thereafter, the MS completes its own WDR at block 334 for adding to WDR queue 22 to know its own whereabouts whenever possible, and block 336 prepares parameters for invoking WDR insertion processing at block 338. Parameters are set for: WDRREF=a reference or pointer to the MS WDR; DELETEQ=FIG. 3B location queue discard processing; and SUPER=FIG. 3B supervisory notification processing (e.g. no supervisory notification processing because it was already handled at block 330, or by being in context of the FIG. 3B service processing). At block 338, the MS invokes FIG. 2F processing already described. After block 338, processing continues back to block 312. Of course, block 332 continues directly to block 312 at the service(s) since there is no need to wait for MS(s) processing in blocks 334 through 338. FIG. 3B processing is continuous for every MS in the wireless network 7 days a week, 24 hours a day.

Figure 11A:
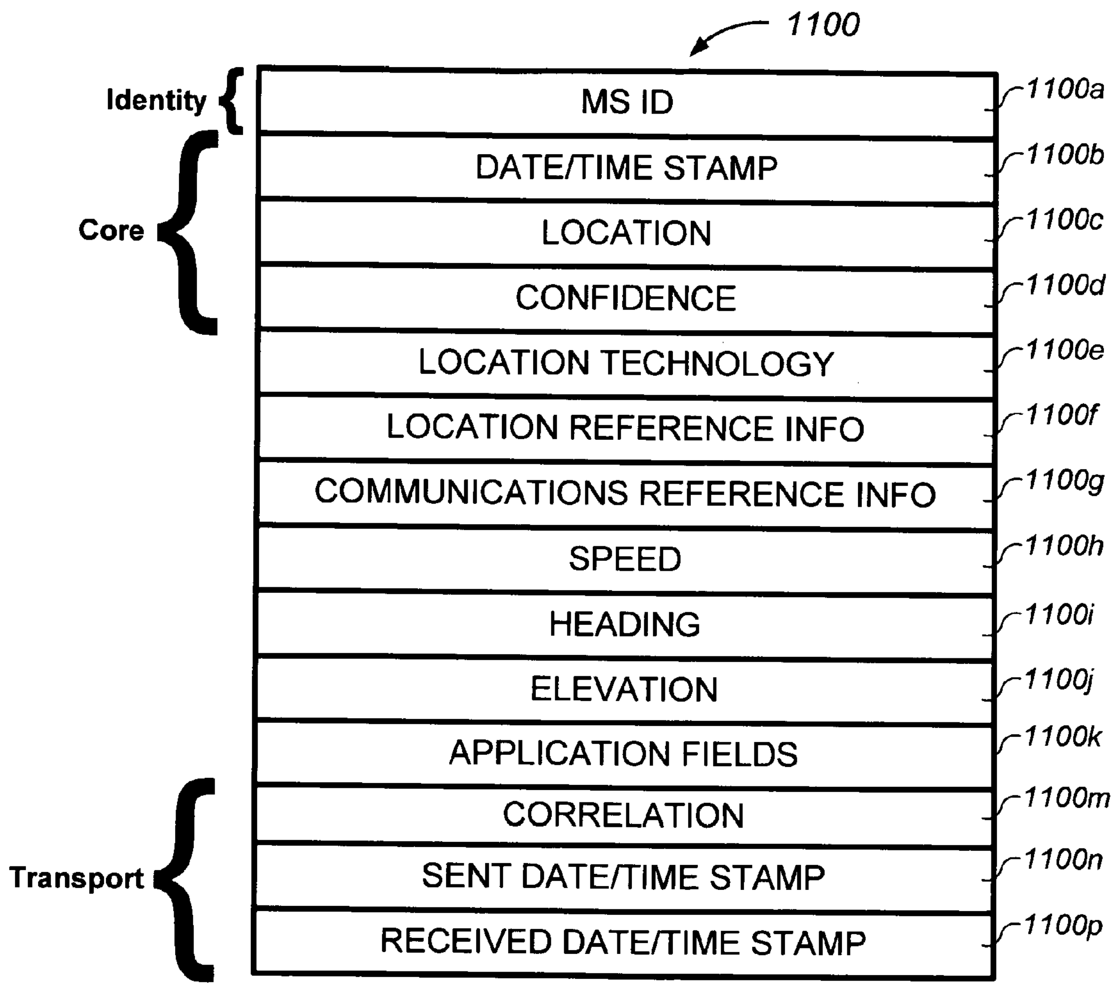
FIG. 11A depicts a preferred embodiment of a Whereabouts Data Record (WDR) 1100 for discussing operations of the present disclosure.

See FIG. 11A descriptions. Fields are set to the following upon exit from block 334:

MS ID field **1100*a* is preferably set with: Same as was described for FIG. 2D (block 236**) above.

DATE/TIME STAMP field **1100*b* is preferably set with: Same as was described for FIG. 2D (block 236**) above.

LOCATION field **1100*c*** is preferably set with: The triangulated location of the MS as communicated by the service.

CONFIDENCE field **1100*d* is preferably set with: Confidence of triangulation determined by the service which is passed to the MS at block 332. The confidence value may be set with the same value (e.g. 85) regardless of how the MS was triangulated. In other embodiments, field 1100*d* will be determined (completely, or adjusting the value of 85) by the service for TDOA measurements used, AOA measurements, signal strengths, wave spectrum involved, and/or the abundance of particular MS signals available for processing by blocks 312 through 320**. Higher confidences are assigned for smaller TDOA measurements (shorter distances), strong signal strengths, and numerous additional data points beyond what is necessary to locate the MS. Lower confidences are assigned for larger TDOA measurements, weak signal strengths, and minimal data points necessary to locate the MS. A reasonable confidence can be assigned using this information as guidelines where 1 is the lowest confidence and 100 is the highest confidence.

LOCATION TECHNOLOGY field **1100*e*** is preferably set with: "Server Cell TDOA", "Server Cell AOA", "Server Cell MPT", "Server Antenna TDOA", "Server Antenna AOA", or "Server Antenna MPT", depending on how the MS was located and what flavor of service was used. The originator indicator is set to DLM.

LOCATION REFERENCE INFO field **1100*f*** is preferably set with: null (not set) for indicating that all triangulation data was factored into determining confidence, and none is relevant for a single TDOA or AOA measurement in subsequent processing (i.e. service did all the work).

COMMUNICATIONS REFERENCE INFO field **1100*g* is preferably set with: Same as was described for FIG. 2D (block 236**) above.

SPEED field **1100*h* is preferably set with: Service WDR information at block 332**, wherein the service used historical information and artificial intelligence interrogation of MS travels to determine, if available.

HEADING field **1100*i* is preferably set with: Service WDR information at block 332**, wherein the service used historical information and artificial intelligence interrogation of MS travels to determine, if available.

ELEVATION field **1100*j*** is preferably set with: Elevation/altitude, if available.

APPLICATION FIELDS field **1100*k* is preferably set with: Same as was described for FIG. 2D (block 236**) above.

CORRELATION FIELD **1100*m* is preferably set with: Not Applicable (i.e. not maintained to queue 22**).

SENT DATE/TIME STAMP field **1100*n* is preferably set with: Not Applicable (i.e. not maintained to queue 22**).

RECEIVED DATE/TIME STAMP field **1100*p* is preferably set with: Not Applicable (i.e. not maintained to queue 22**).

Figure 3C:
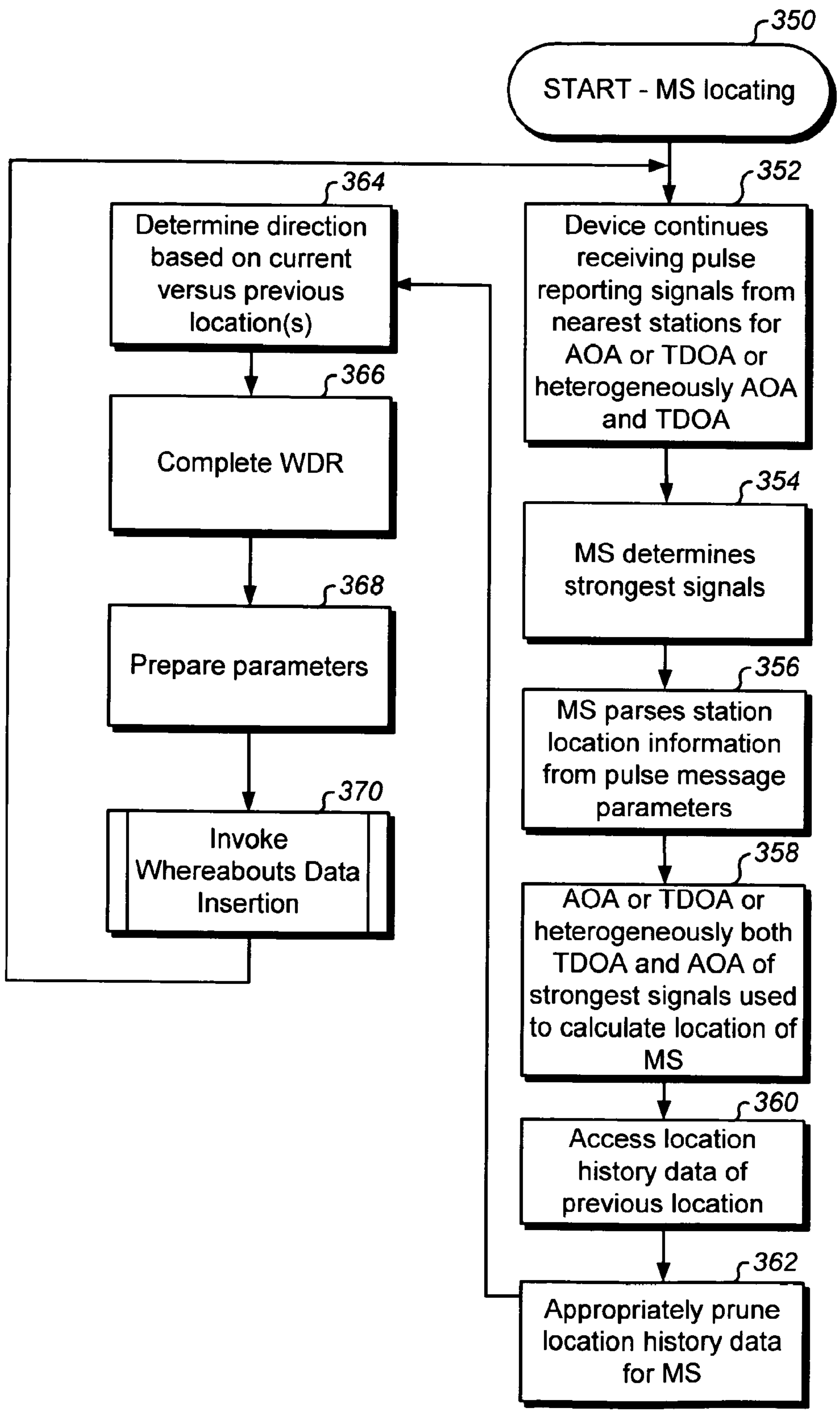
FIG. 3C depicts a flowchart for describing a preferred embodiment of the whereabouts update event of a triangulated MS when MS location awareness is monitored by the MS.

FIG. 3C depicts a flowchart for describing a preferred embodiment of the whereabouts update event of a triangulated MS, for example a DLM 200, when MS location awareness is monitored by the MS. Communications between the base stations and MS is similar to FIG. 3B processing except the MS receives information (FIG. 13C) for performing calculations and related processing. Processing begins at block 350 and continues to block 352 where the MS continues receiving (FIG. 13C) pulse reporting from base stations (or antennas). AOA, TDOA, and MPT (See "Missing Part Triangulation (MPT)" section below with discussions for FIGS. 11A through 11E for details on heterogeneously locating the MS using both TDOA and AOA) can be used to locate the MS, so there are many possible signal types received at block 352. Then, block 354 determines the strongest signals which can accomplish a completed WDR, or at least a location, of the MS. Thereafter, block 356 parses base station location information from the pulse messages that are received by the MS. Block 358 communicates with base stations to perform TDOA and/or AOA measurements and calculations. The time it takes for a communication to occur from the MS back to the MS for TDOA, or alternatively, from a base tower back to that base tower can be used. NTP may also be used, as described above, so that base towers (or antennas) broadcast signals (FIG. 13C) picked up by the MS which already contain the base tower locations and NTP date/time stamps for TDOA calculations. Block 358 uses the TDOA and/or AOA information with the known base station information to determine the MS location. While AOA information from the base stations (or antennas) is used by the MS, various MS embodiments can use AOA information detected at an MS antenna provided the heading, yaw, pitch, and roll is known at the MS during the same time as signal reception by the MS. A 3-axis accelerometer (e.g. in iPhone) may also provide yaw, pitch and roll means for proper AOA calculation.

Thereafter, block 360 accesses historical MS location information (e.g. WDR queue 22 and/or LBX history 30) to prevent redundant information kept at the MS, and block 362 performs housekeeping by pruning the LBX history 30 for the MS by time, number of entries, or other criteria. Block 364 then determines a heading (direction) of the MS based on previous location information (unless already known from block 358 for AOA determination). Block 364 may perform Artificial Intelligence (AI) to determine where the MS may be going by consulting queue 22 and/or history 30. Thereafter, block 366 completes a WDR 1100, and block 368 prepares parameters for FIG. 2F processing: WDRREF=a reference or pointer to the MS WDR; DELETEQ=FIG. 3C location queue discard processing; and SUPER=FIG. 3B supervisory notification processing. Block 368 continues to block 370 for invoking FIG. 2F processing already described above. After block 370, processing continues back to block 352. FIG. 3C processing is continuous for the MS as long as the MS is enabled. In various multithreaded embodiments, many threads at the MS work together for high speed processing at blocks 352 through 358 for concurrently communicating to many stationary references.

See FIG. 11A descriptions. Fields are set to the following upon exit from block 366:

MS ID field **1100*a* is preferably set with: Same as was described for FIG. 2D (block 236**) above.

DATE/TIME STAMP field **1100*b* is preferably set with: Same as was described for FIG. 2D (block 236**) above.

LOCATION field **1100*c*** is preferably set with: The triangulated location of the MS as determined by the MS.

CONFIDENCE field **1100*d* is preferably set with: The confidence of triangulation as determined by the MS. Confidence may be set with the same value (e.g. 80 since MS may be moving during triangulation) regardless of how the MS was triangulated. In other embodiments, field 1100*d*** will be determined (completely, or adjusting the value of 80) by the MS for TDOA measurements used, AOA measurements, signal strengths, wave spectrum involved, and/or the abundance of particular service signals available for processing. Higher confidences are assigned for smaller TDOA measurements (shorter distances), strong signal strengths, and numerous additional data points beyond what is necessary to locate the MS. Lower confidences are assigned for larger TDOA measurements, weak signal strengths, and minimal data points necessary to locate the MS. A reasonable confidence can be assigned using this information as guidelines where 1 is the lowest confidence and 100 is the highest confidence.

LOCATION TECHNOLOGY field **1100*e*** is preferably set with: "Client Cell TDOA", "Client Cell AOA", "Client Cell MPT", "Client Antenna TDOA", "Client Antenna AOA", or "Client Antenna MPT", depending on how the MS located itself. The originator indicator is set to DLM.

LOCATION REFERENCE INFO field **1100*f* is preferably set with: Data associated with selected best stationary reference(s) used by the MS: the selection location/whereabouts, TDOA measurement to it, and wave spectrum (and/or particular communications interface 70) used, if reasonable. The TDOA measurement may be converted to a distance using wave spectrum information. Also, preferably set herein is data associated with a selected best stationary reference used by the MS (may be same or different than for TDOA measurement): the selection location, AOA measurement to it, and heading, yaw, pitch, and roll values (or accelerometer readings), if reasonable. Values that may be populated here should have already been factored into the confidence value. There may be one or more stationary reference whereabouts with useful measurements maintained here for FIG. 26B processing of block 2652**.

COMMUNICATIONS REFERENCE INFO field **1100*g*** is preferably set with: Parameters referencing MS internals, if desired.

SPEED field **1100*h* is preferably set with: Speed determined by the MS using historical information (queue 22 and/or history 30**) and artificial intelligence interrogation of MS travels to determine, if reasonable.

HEADING field **1100*i* is preferably set with: Heading determined by the MS using historical information (queue 22 and/or history 30**) and artificial intelligence interrogation of MS travels to determine, if reasonable.

ELEVATION field **1100*j*** is preferably set with: Elevation/altitude, if available.

APPLICATION FIELDS field **1100*k* is preferably set with: Same as was described for FIG. 2D (block 236**) above.

CORRELATION FIELD **1100*m* is preferably set with: Not Applicable (i.e. not maintained to queue 22**).

SENT DATE/TIME STAMP field **1100*n* is preferably set with: Not Applicable (i.e. not maintained to queue 22**).

RECEIVED DATE/TIME STAMP field **1100*p* is preferably set with: Not Applicable (i.e. not maintained to queue 22**).

In alternative triangulation embodiments, a unique MS identifier, or MS group identifier, for authenticating an MS for locating the MS is not necessary. An antenna emitting signals (FIG. 13C) will broadcast (CK 1314 of data 1312) not only its own location information, but also an NTP date/time stamp, which the receiving MS (also having NTP for time synchronization) uses to perform TDOA measurements upon receipt. This will enable a MS to determine how close (e.g. radius 1318 range, radius 1320 range, radius 1322 range, or radius 1316 range) it is located to the location of the antenna by listening for and receiving the broadcast (e.g. of FIG. 13C). Similarly, in another embodiment, an NTP synchronized MS emits signals (FIG. 13A) and an NTP synchronized data processing system associated with a receiving antenna can determine a TDOA measurement upon signal receipt. In other embodiments, more than a single unidirectional signal may be used while still preventing the requirement to recognize the MS to locate it. For example, an antenna emitting signals will contain enough information for a MS to respond with correlation for being located. Alternatively, an MS emitting signals will contain enough information for a service to respond with correlation for being located. In any case, there can be multi-directional exchanged signals for determining TDOA. Similarly, a service side data processing system can interact with a MS for AOA information without requiring a known identifier of the MS (use request/response correlation).

Figure 4A:
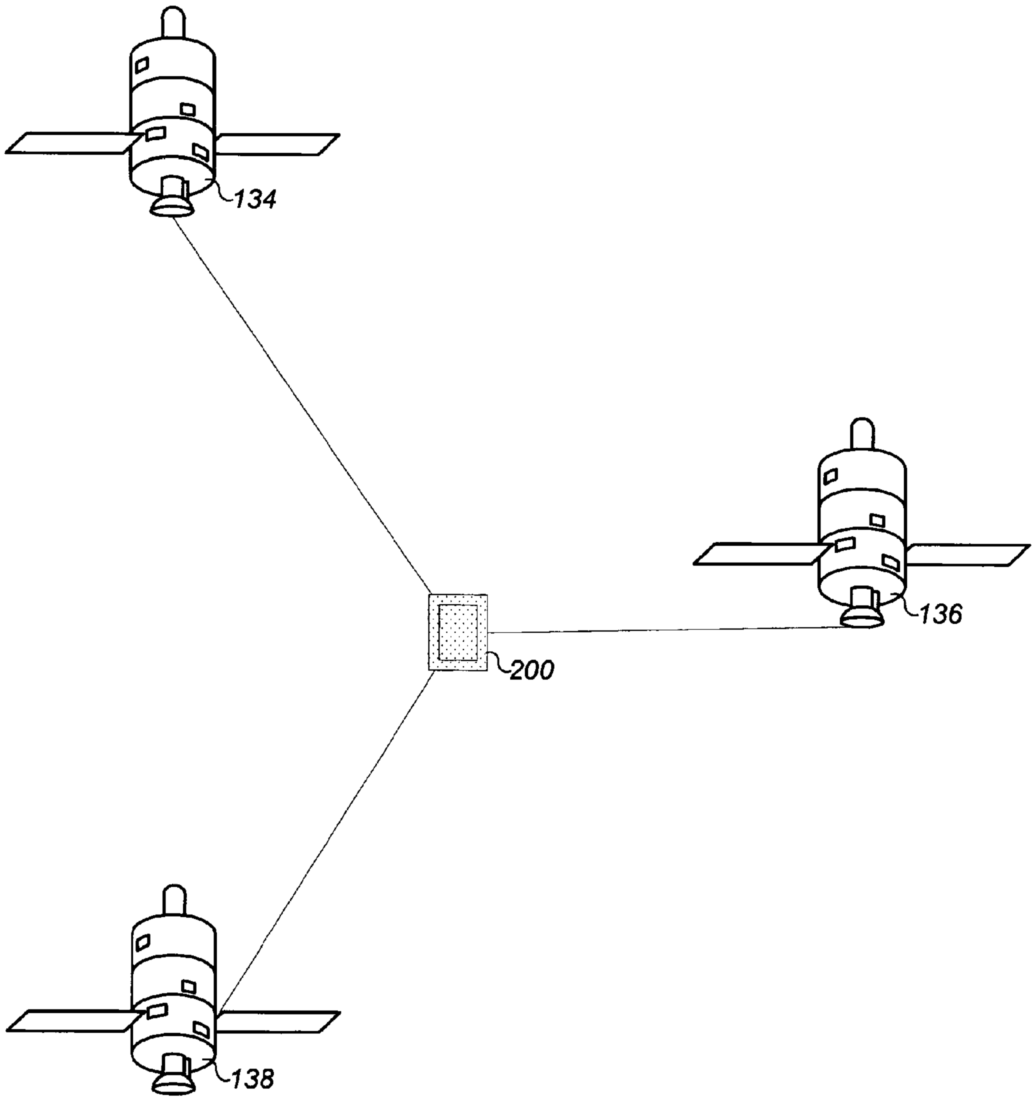
FIG. 4A depicts a locating by GPS triangulation illustration for discussing automatic location of a MS.

FIG. 4A depicts a locating by GPS triangulation illustration for discussing automatic location of a MS, for example a DLM 200. A MS, for example DLM 200, is located through GPS triangulation as is well known in the art. At least three satellites, for example, satellite 134, satellite 136, and satellite 138, are necessary for locating the MS. A fourth satellite would be used if elevation, or altitude, was configured for use by the present disclosure. Ground based stationary references can further enhance whereabouts determination.

Figure 4B:
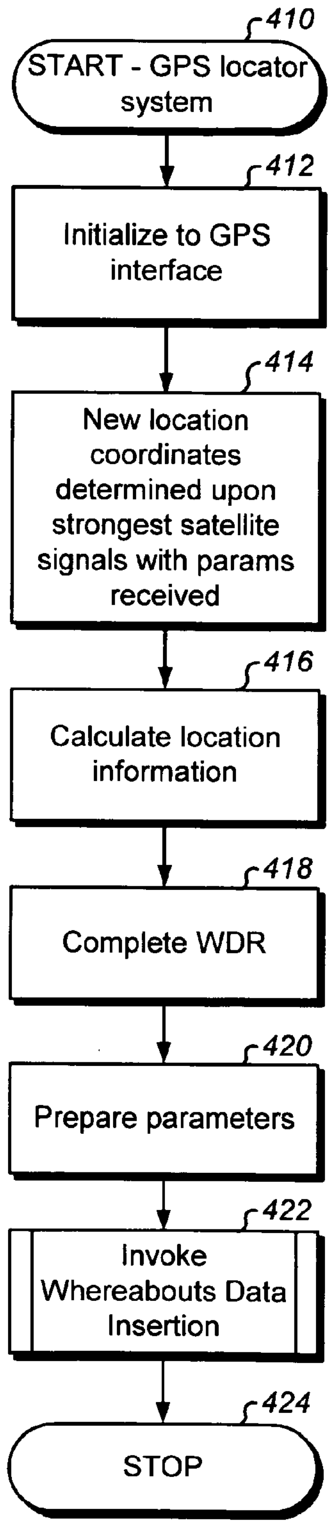
FIG. 4B depicts a flowchart for describing a preferred embodiment of the whereabouts update event of a GPS triangulated MS.

FIG. 4B depicts a flowchart for describing a preferred embodiment of the whereabouts update event of a GPS triangulated MS, for example a DLM 200. Repeated continuous GPS location processing begins at block 410 and continues to block 412 where the MS initializes to the GPS interface, then to block 414 for performing the conventional locating of the GPS enabled MS, and then to block 416 for calculating location information. In some embodiments, block 412 may only be necessary a first time prior to repeated invocations of FIG. 4B processing. Block 414 may be an implicit wait for pulses from satellites, or an event driven mechanism when GPS satellite pulses are received for synchronized collection, or a multithreaded implementation concurrently listening for, and processing collaboratively, the signals. Block 414 and block 416 processing is well known in the art. Thereafter, the MS completes a WDR 1100 at block 418, block 420 prepares parameters for FIG. 2F invocation, and block 422 invokes, with the WDR, the FIG. 2F processing (described above). Processing then terminates at block 424. Parameters prepared at block 420 are: WDRREF=a reference or pointer to the WDR; DELETEQ=FIG. 4B location queue discard processing; and SUPER=FIG. 4B supervisory notification processing. GPS location processing is preferably continuous for the MS as long as the MS is enabled.

See FIG. 11A descriptions. Fields are set to the following upon exit from block 418:

MS ID field **1100*a* is preferably set with: Same as was described for FIG. 2D (block 236**) above.

DATE/TIME STAMP field **1100*b* is preferably set with: Same as was described for FIG. 2D (block 236**) above.

LOCATION field **1100*c*** is preferably set with: The GPS location of the MS.

CONFIDENCE field **1100*d* is preferably set with: Confidence of GPS variety (usually high) which may be set with the same value (e.g. 95 for DGPS, 93 for AGPS, and 90 for GPS). In other embodiments, field 1100*d*** will be determined (completely, or amending the defaulted value) by the MS for timing measurements, signal strengths, and/or the abundance of particular signals available for processing, similarly to as described above. An MS may not be aware of the variety of GPS, in which case straight GPS is assumed.

LOCATION TECHNOLOGY field **1100*e*** is preferably set with: "GPS", "A-GPS", or "D-GPS", depending on (if known) flavor of GPS. The originator indicator is set to DLM.

LOCATION REFERENCE INFO field **1100*f*** is preferably set with: null (not set) for indicating that data was factored into determining confidence, and none is relevant for a single TDOA or AOA measurement in subsequent processing.

COMMUNICATIONS REFERENCE INFO field **1100*g*** is preferably set with: Parameters referencing MS internals, if desired.

SPEED field **1100*h* is preferably set with: Speed determined by the MS using a suitable GPS interface, or historical information (queue 22 and/or history 30**) and artificial intelligence interrogation of MS travels to determine, if reasonable.

HEADING field **1100*i* is preferably set with: Heading determined by the MS using a suitable GPS interface, or historical information (queue 22 and/or history 30**) and artificial intelligence interrogation of MS travels to determine, if reasonable.

ELEVATION field **1100*j*** is preferably set with: Elevation/altitude, if available.

APPLICATION FIELDS field **1100*k* is preferably set with: Same as was described for FIG. 2D (block 236**) above.

CORRELATION FIELD **1100*m* is preferably set with: Not Applicable (i.e. not maintained to queue 22**).

SENT DATE/TIME STAMP field **1100*n* is preferably set with: Not Applicable (i.e. not maintained to queue 22**).

RECEIVED DATE/TIME STAMP field **1100*p* is preferably set with: Not Applicable (i.e. not maintained to queue 22**).

Figure 5A:
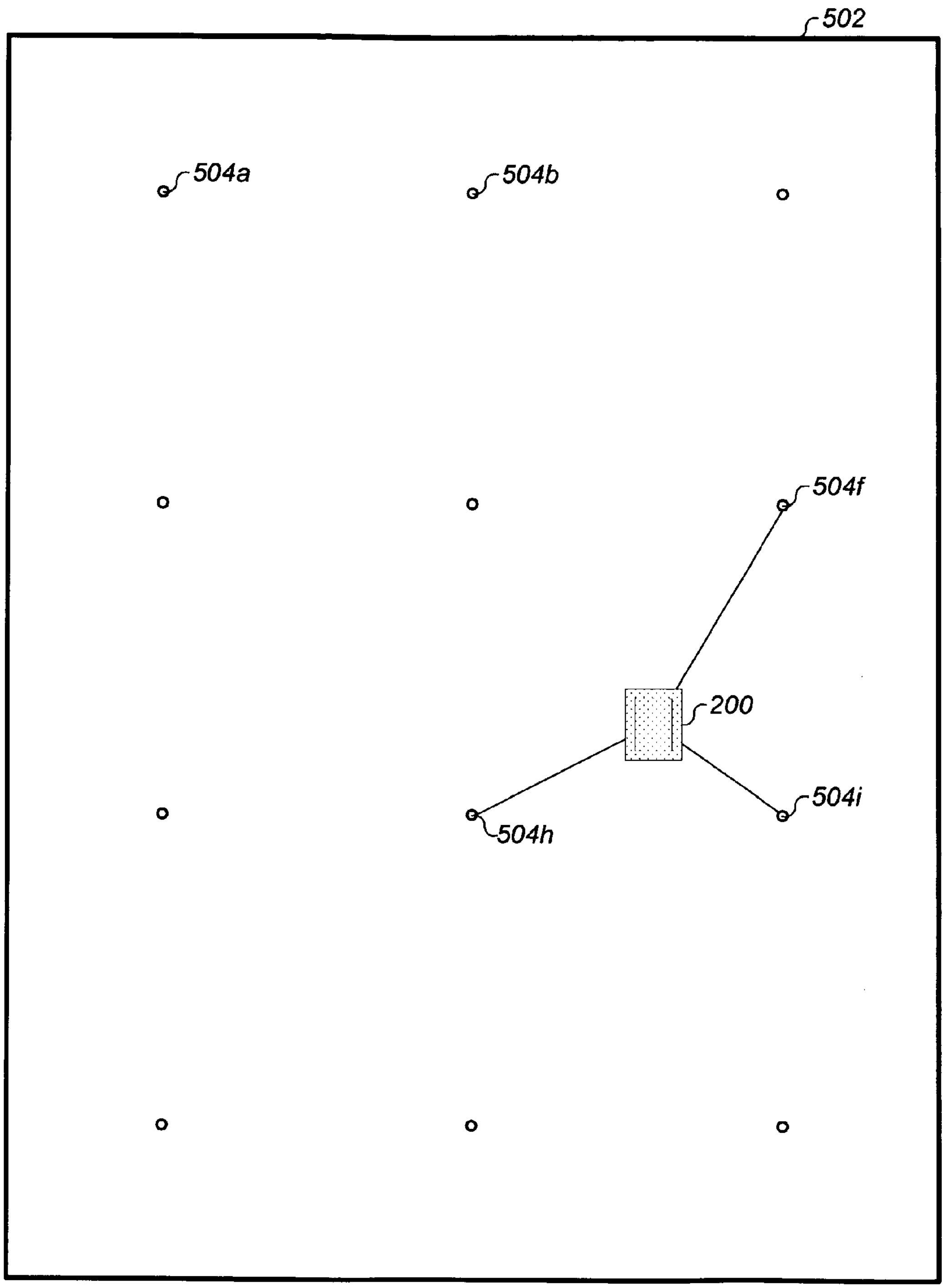
FIG. 5A depicts a locating by stationary antenna triangulation illustration for discussing automatic location of a MS.

FIG. 5A depicts a locating by stationary antenna triangulation illustration for discussing automatic location of a MS, for example DLM 200. There may be communication/transmission issues when an MS is taken indoors. Shown is a top view of an indoor floor plan 502. Antenna stations 504 (shown generally as 504) are strategically placed over the area so that an MS can be located. Triangulation techniques again apply. At least three antenna stations, for example, station **504*f*, station 504*h*, and station 504*i* are used to locate the MS, for example DLM 200. In floor plan embodiments where aisles delimit travel, only two antenna stations may be necessary, for example at either end of the particular aisle. While most stations 504 may receive signals from the MS, only the strongest stations are used. FIG. 5A and associated discussions can also be used for an outside triangulation embodiment using a similar strategic antenna placement scheme. Processing described for FIGS. 3A to 3C can also be used for an indoor embodiment as described by FIG. 5**A.

Figure 5B:
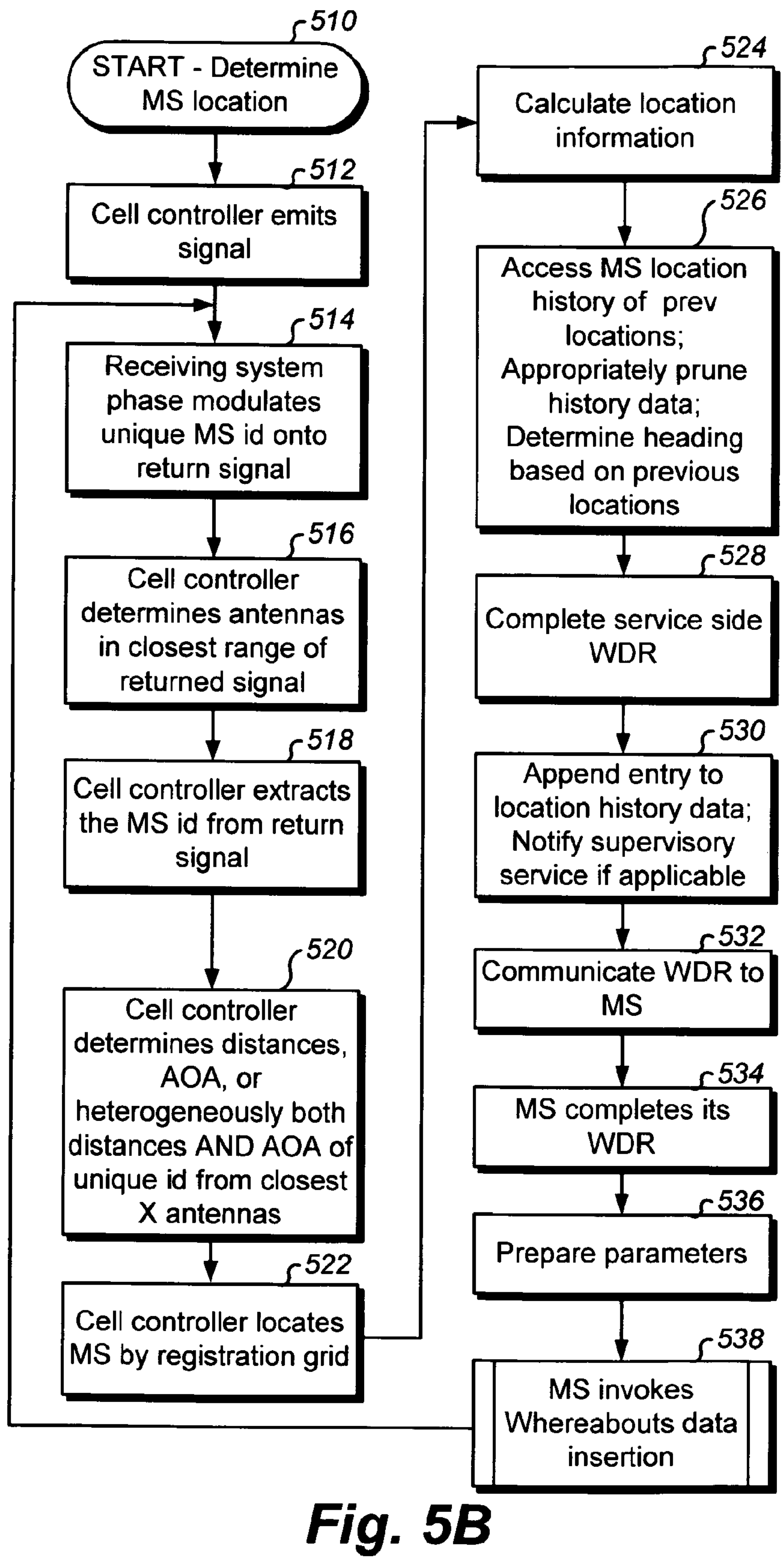
FIG. 5B depicts a flowchart for describing a preferred embodiment of the whereabouts update event of a stationary antenna triangulated MS.

FIG. 5B depicts a flowchart for describing a preferred embodiment of the whereabouts update event of a stationary antenna triangulated MS, for example a DLM 200. In one embodiment, indoor location technology of Pinpoint corporation (Pinpoint is a trademark of Pinpoint Corporation) is utilized to locate any MS that moves about the indoor location. The Pinpoint corporation methodology begins at block 510 and continues to block 512. A cell controller drives antenna stations to emit a broadcast signal from every station. Any MS within range (i.e. indoors) will phase modulate its unique identifier onto a return signal it transmits, at block 514. Stations at block 516 receive the transmission and strength of signal. The cell controller that drives stations sorts out and selects the strongest (e.g. 3) signals. The cell controller, at block 518, also extracts the unique MS identifier from the return signal, and TDOA is used to calculate distances from the stations receiving the strongest signals from the MS at block 520. Alternative embodiments can use AOA or MPT to determine locations. The locations of the controller selected stations are registered in an overlay map in an appropriate coordinate system, landmark system, or grid of cells. Block 522 locates the MS using the overlay map, locations of the (e.g. 3) selected stations, and the calculated distances triangulated from the selected stations, using TDOA, AOA, or MPT in various embodiments. Thereafter, block 524 calculates location information of the MS. Processing continues with repeated broadcast at block 512 and subsequent processing for every MS within range.

Thereafter, block 526 accesses historical MS location information, performs housekeeping by pruning location history data for the MS by time, number of entries, or other criteria, and determines a heading (direction) of the MS based on previous location information. Block 526 may perform Artificial Intelligence (AI) to determine where the MS may be going by consulting many or all of the location history data. Thereafter, block 528 completes a service side WDR 1100, block 530 appends the WDR information to location history data and notifies a supervisory service if there is one outside of the service processing of FIG. 5B. Processing continues to block 532 where the service communicates the WDR to the located MS.

Thereafter, the MS completes the WDR at block 534 for adding to WDR queue 22. Thereafter, block 536 prepares parameters passed to FIG. 2F processing for: WDRREF=a reference or pointer to the MS WDR; DELETEQ=FIG. 5B location queue discard processing; and SUPER=FIG. 5B supervisory notification processing (e.g. no supervisory notification processing because it was already handled at block 530, or by being in context of the FIG. 5B service processing). Block 536 continues to block 538 where the MS invokes FIG. 2F processing already described above. After block 538, processing continues back to block 514. Of course, block 532 continues directly to block 514 at the service(s) since there is no need to wait for MS(s) processing in blocks 534 through 538. FIG. 5B processing is continuous for every MS in the wireless network 7 days a week, 24 hours a day.

See FIG. 11A descriptions. Fields are set to the following upon exit from block 534:

MS ID field 1100*a* is preferably set with: Same as was described for FIG. 2D (block 236) above.

DATE/TIME STAMP field 1100*b* is preferably set with: Same as was described for FIG. 2D (block 236) above.

LOCATION field 1100*c* is preferably set with: The triangulated location of the MS as communicated by the service.

CONFIDENCE field 1100*d* is preferably set with: Confidence of triangulation determined by the service which is passed to the MS at block 532. The confidence value may be set with the same value (e.g. 95 (normally high for triangulation using densely positioned antennas)) regardless of how the MS was triangulated. In other embodiments, field 1100*d* will be determined (completely, or adjusting the value of 95) by the service for TDOA measurements used, AOA measurements, signal strengths, wave spectrum involved, and/or the abundance of particular MS signals available for processing. Higher confidences are assigned for smaller TDOA measurements (shorter distances), strong signal strengths, and numerous additional data points beyond what is necessary to locate the MS. Lower confidences are assigned for larger TDOA measurements, weak signal strengths, and minimal data points necessary to locate the MS. A reasonable confidence can be assigned using this information as guidelines where 1 is the lowest confidence and 100 is the highest confidence.

LOCATION TECHNOLOGY field 1100*e* is preferably set with: "Server Antenna TDOA", "Server Antenna AOA", or "Server Antenna MPT", depending on how the MS was located and what flavor of service was used. The originator indicator is set to DLM.

LOCATION REFERENCE INFO field 1100*f* is preferably set with: null (not set) for indicating that all triangulation data was factored into determining confidence, and none is relevant for a single TDOA or AOA measurement in subsequent processing (i.e. service did all the work).

COMMUNICATIONS REFERENCE INFO field 1100*g* is preferably set with: Same as was described for FIG. 2D (block 236) above.

SPEED field 1100*h* is preferably set with: Service WDR information at block 532, wherein the service used historical information and artificial intelligence interrogation of MS travels to determine, if available.

HEADING field 1100*i* is preferably set with: Service WDR information at block 532, wherein the service used historical information and artificial intelligence interrogation of MS travels to determine, if available.

ELEVATION field 1100*j* is preferably set with: Elevation/altitude, if available.

APPLICATION FIELDS field 1100*k* is preferably set with: Same as was described for FIG. 2D (block 236) above.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

Figure 6A:
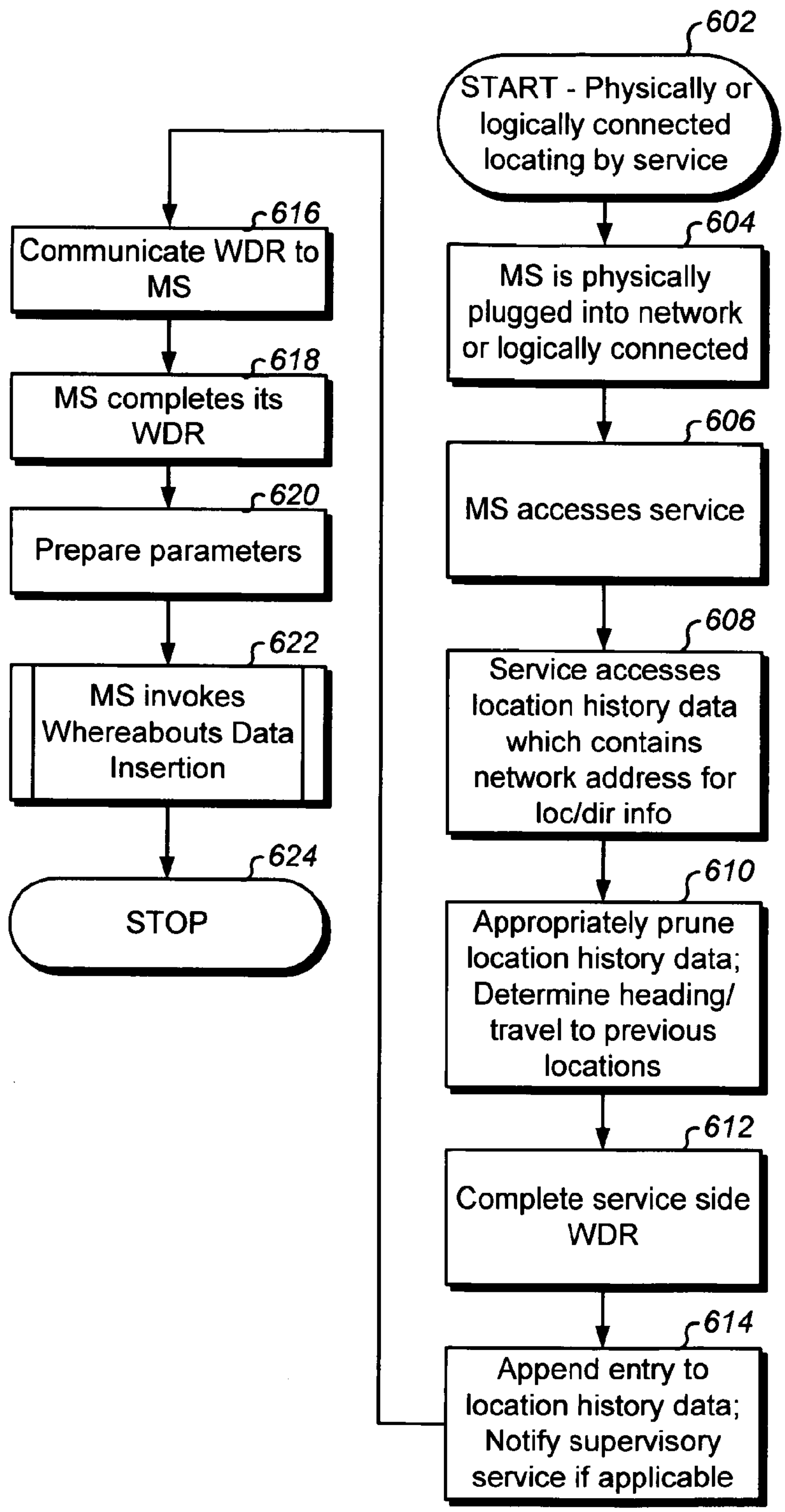
FIG. 6A depicts a flowchart for describing a preferred embodiment of a service whereabouts update event of a physically or logically connected MS.

FIG. 6A depicts a flowchart for describing a preferred embodiment of a service whereabouts update event of a physically, or logically, connected MS, for example a DLM 200. A MS may be newly located and physically, or logically, connected, whereby communications between the MS and service is over a physical/logical connection. Physical connections may occur by connecting a conduit for communications to the MS, or from the MS to a connection point. Conduits include ethernet cables, optical fiber, firewire, USB, or any other means for conduit for communications through a physical medium. Conduits also include wireless mediums (air) for transporting communications, such as when an MS comes into physical wireless range eligible for sending and receiving communications. Logical connections may occur, after a physical connection already exists, for example through a successful communication, or authenticated, bind between a MS and other MS, or MS and service. Logical connections also include the result of: successfully logging into an application, successfully authenticated for access to some resource, successfully identified by an application, or any other logical status upon a MS being certified, registered, signed in, authenticated, bound, recognized, affirmed, or the like.

Relevant processing begins at block 602 and continues to block 604 where an MS device is physically/logically connected to a network. Thereafter, the MS accesses a service at block 606. Then, at block 608, the service accesses historical MS location history, and block 610 performs housekeeping by pruning the location history data maintained for the MS by time, number of entries, or other criteria. Block 610 may perform Artificial Intelligence (AI) to determine where the MS may be going (e.g. using heading based on previous locations) by consulting much or all of the location history data. Thereafter, service processing at block 612 completes a service side WDR 1100, then the service appends WDR information to location history data at block 614, and may notify a supervisory service if there is one outside of the service processing of FIG. 6A. Processing continues to block 616 where the service communicates WDR information to the newly physically/logically connected MS. There are many embodiments for determining a newly connected MS location using a physical or logical address, for example consulting a database which maps locations to network addresses (e.g. location to logical ip address; location to physical wall jack/port; etc). Then, at block 618 the MS completes its own WDR using some information from block 616, FIG. 2F parameters are prepared at block 620, block 622 invokes FIG. 2F processing already described above, and processing terminates at block 624. Parameters are set at block 620 for: WDRREF=a reference or pointer to the MS WDR; DELETEQ=FIG. 6A location queue discard processing; and SUPER=FIG. 6A supervisory notification processing (e.g. no supervisory notification processing because it was already handled at block 614, or by being in context of the FIG. 6A service processing). Of course, block 616 continues directly to block 624 at the service(s) since there is no need to wait for MS processing in blocks 618 through 622. FIG. 6A processing is available at any appropriate time in accordance with the underlying service.

See FIG. 11A descriptions. Fields are set to the following upon exit from block 618:

MS ID field 1100*a* is preferably set with: Same as was described for FIG. 2D (block 236) above.

DATE/TIME STAMP field 1100*b* is preferably set with: Same as was described for FIG. 2D (block 236) above.

LOCATION field 1100*c* is preferably set with: The location of the MS as communicated by the service.

CONFIDENCE field 1100*d* is preferably set with: Confidence (determined by the service) according to how the MS was connected, or may be set with the same value (e.g. 100 for physical connect, 77 for logical connect (e.g. short range wireless)) regardless of how the MS was located. In other embodiments, field 1100*d* will be determined by the service for anticipated physical conduit range, wireless logical connect range, etc. The resulting confidence value can be adjusted based on other parameters analogously to as described above.

LOCATION TECHNOLOGY field 1100*e* is preferably set with "Service Physical Connect" or "Service Logical Connect", depending on how the MS connected. The originator indicator is set to DLM.

LOCATION REFERENCE INFO field 1100*f* is preferably set with: null (not set), but if a TDOA measurement can be made (e.g. short range logical connect, and using methodologies described above), then a TDOA measurement, a communications signal strength, if available; and wave spectrum (and/or particular communications interface 70) used, if available. The TDOA measurement may be converted to a distance using wave spectrum information. Possible values populated here should have already been factored into the confidence value.

COMMUNICATIONS REFERENCE INFO field 1100*g* is preferably set with: Same as was described for FIG. 2D (block 236) above.

SPEED field 1100*h* is preferably set with: null (not set), but can be set with speed required to arrive to the current location from a previously known location, assuming same time scale is used.

HEADING field 1100*i* is preferably set with: null (not set), but can be set to heading determined when arriving to the current location from a previously known location.

ELEVATION field 1100*j* is preferably set with: Elevation/altitude (e.g. of physical connection, or place of logical connection detection), if available.

APPLICATION FIELDS field 1100*k* is preferably set with: Same as was described for FIG. 2D (block 236) above.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

Figure 6B:
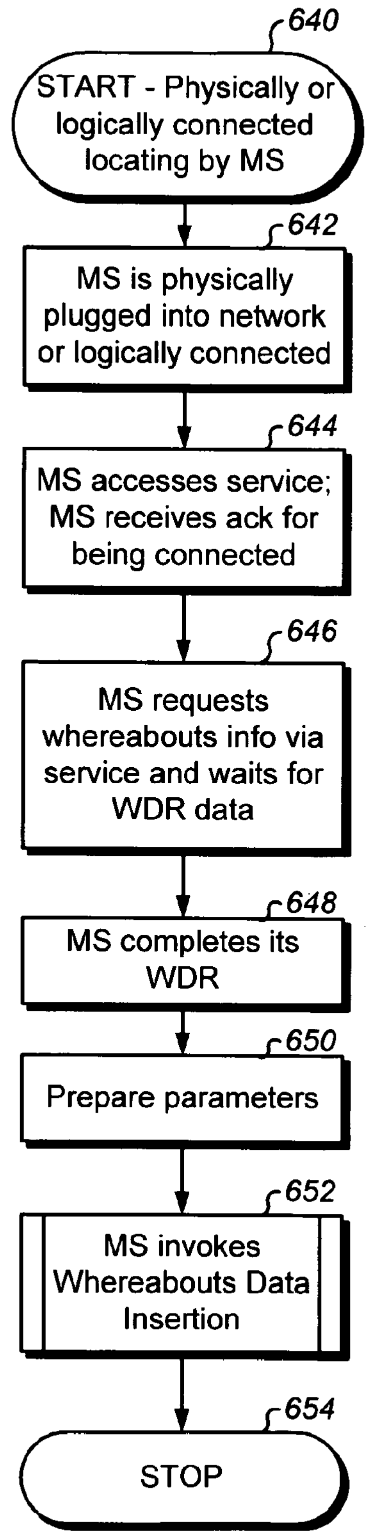
FIG. 6B depicts a flowchart for describing a preferred embodiment of a MS whereabouts update event of a physically or logically connected MS.

FIG. 6B depicts a flowchart for describing a preferred embodiment of a MS whereabouts update event of a physically, or logically, connected MS, for example a DLM 200. A MS may be newly located and physically/logically connected, whereby communications between the MS and service is over a physical/logical connection as described in FIG. 6A above. Relevant processing begins at block 640 and continues to block 642 where an MS device is physically/logically connected. Thereafter, at block 644 the MS accesses the connectivity service and waits for an acknowledgement indicating a successful connection. Upon acknowledgement receipt, processing continues to block 646 where the MS requests WDR information via the connectivity service and waits for the data (i.e. connectivity service may be different than the location service, or may be one in the same). As part of connectivity, location service pointer(s) (e.g. ip address for http://112.34.323.18 referencing or a Domain Name Service (DNS) name like http://www.servicename.com) are provided with the connectivity acknowledgement from the connectivity service at block 644, so the MS knows how to proceed at block 646 for retrieving location information. There are various embodiments for the location service determining a MS location as described above for FIG. 6A. In an alternative embodiment, the MS already knows how to locate itself wherein block 644 continues directly to block 648 (no block 646) because the MS maintains information for determining its own whereabouts using the physical or logical address received in the acknowledgement at block 644. Similar mapping of a network address to the MS location can be in MS data, for example data 36, data 8, or data 20. At block 648, the MS completes its WDR 1100. Thereafter, block 650 prepares FIG. 2F parameters, block 652 invokes FIG. 2F processing already described above, and processing terminates at block 654. Parameters set at block 650 are: WDRREF=a reference or pointer to the MS WDR; DELETEQ=FIG. 6B location queue discard processing; and SUPER=FIG. 6B supervisory notification processing. FIG. 6B processing is available at any appropriate time to the MS.

See FIG. 11A descriptions. Fields are set to the following upon exit from block 648:

MS ID field 1100*a* is preferably set with: Same as was described for FIG. 2D (block 236) above.

DATE/TIME STAMP field 1100*b* is preferably set with: Same as was described for FIG. 2D (block 236) above.

LOCATION field 1100*c* is preferably set with: The location determined for the MS.

CONFIDENCE field 1100*d* is preferably set with: Confidence (determined by the service) according to how the MS was connected, or may be set with the same value (e.g. 100 for physical connect, 77 for logical connect (e.g. short range wireless)) regardless of how the MS was located. In other embodiments, field 1100*d* will be determined by the service for anticipated physical conduit range, wireless logical connect range, etc. The resulting confidence value can be adjusted based on other parameters analogously to as described above.

LOCATION TECHNOLOGY field 1100*e* is preferably set with “Client Physical Connect” or “Client Logical Connect”, depending on how the MS connected. The originator indicator is set to DLM.

LOCATION REFERENCE INFO field 1100*f* is preferably set with: null (not set), but if a TDOA measurement can be made (e.g. short range logical connect, and using methodologies described above), then a TDOA measurement, a communications signal strength, if available; and wave spectrum (and/or particular communications interface 70) used, if available. The TDOA measurement may be converted to a distance using wave spectrum information. Possible values populated here should have already been factored into the confidence value.

COMMUNICATIONS REFERENCE INFO field 1100*g* is preferably set with: Same as was described for FIG. 2D (block 236) above.

SPEED field 1100*h* is preferably set with: null (not set), but can be set with speed required to arrive to the current location from a previously known location using, assuming same time scale is used.

HEADING field 1100*i* is preferably set with: null (not set), but can be set to heading determined when arriving to the current location from a previously known location.

ELEVATION field 1100*j* is preferably set with: Elevation/altitude (e.g. of physical connection, or place of logical connection detection), if available.

APPLICATION FIELDS field 1100*k* is preferably set with: Same as was described for FIG. 2D (block 236) above.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

Figure 7A:
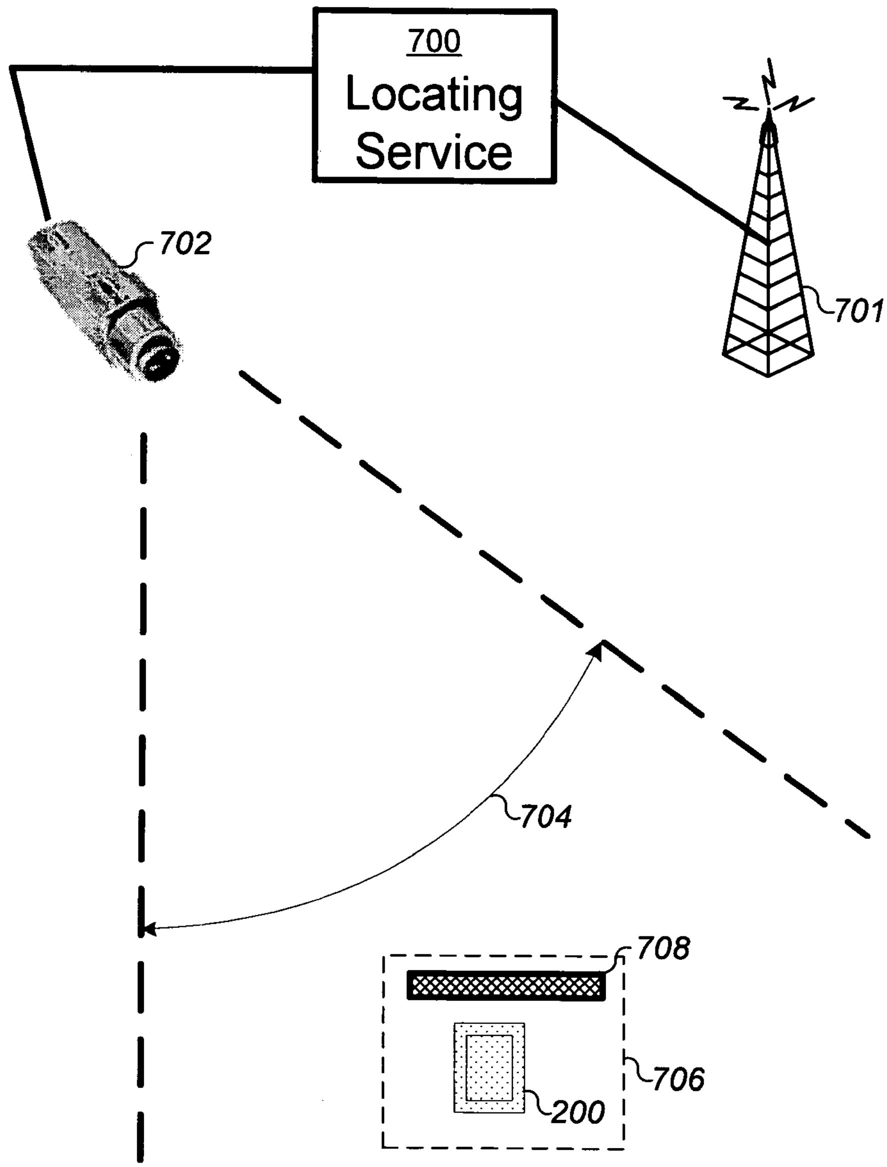
FIGS. 7A, 7B and 7C depict a locating by image sensory illustration for discussing automatic location of a MS.
Figure 7B:
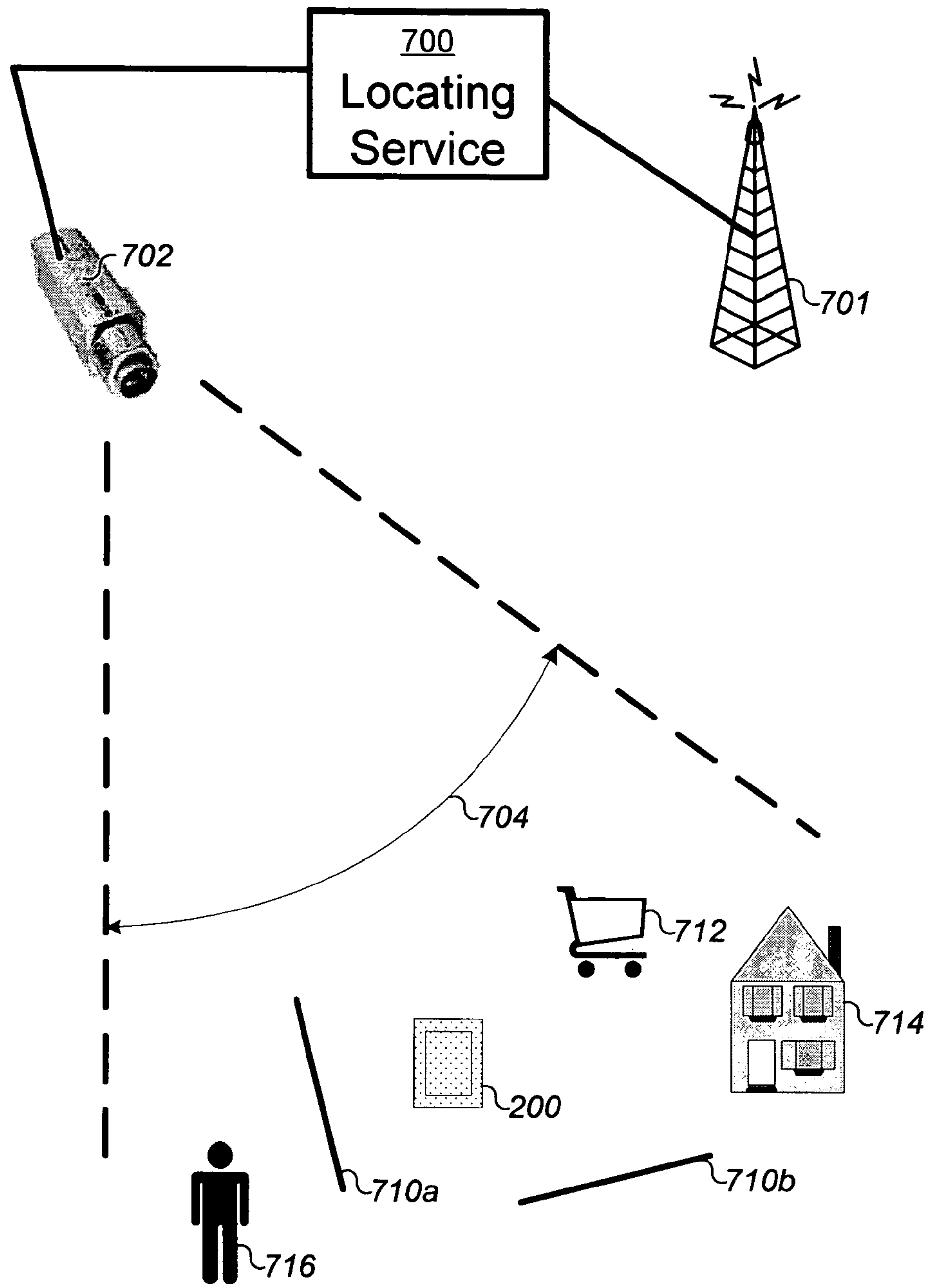
Figure 7C:
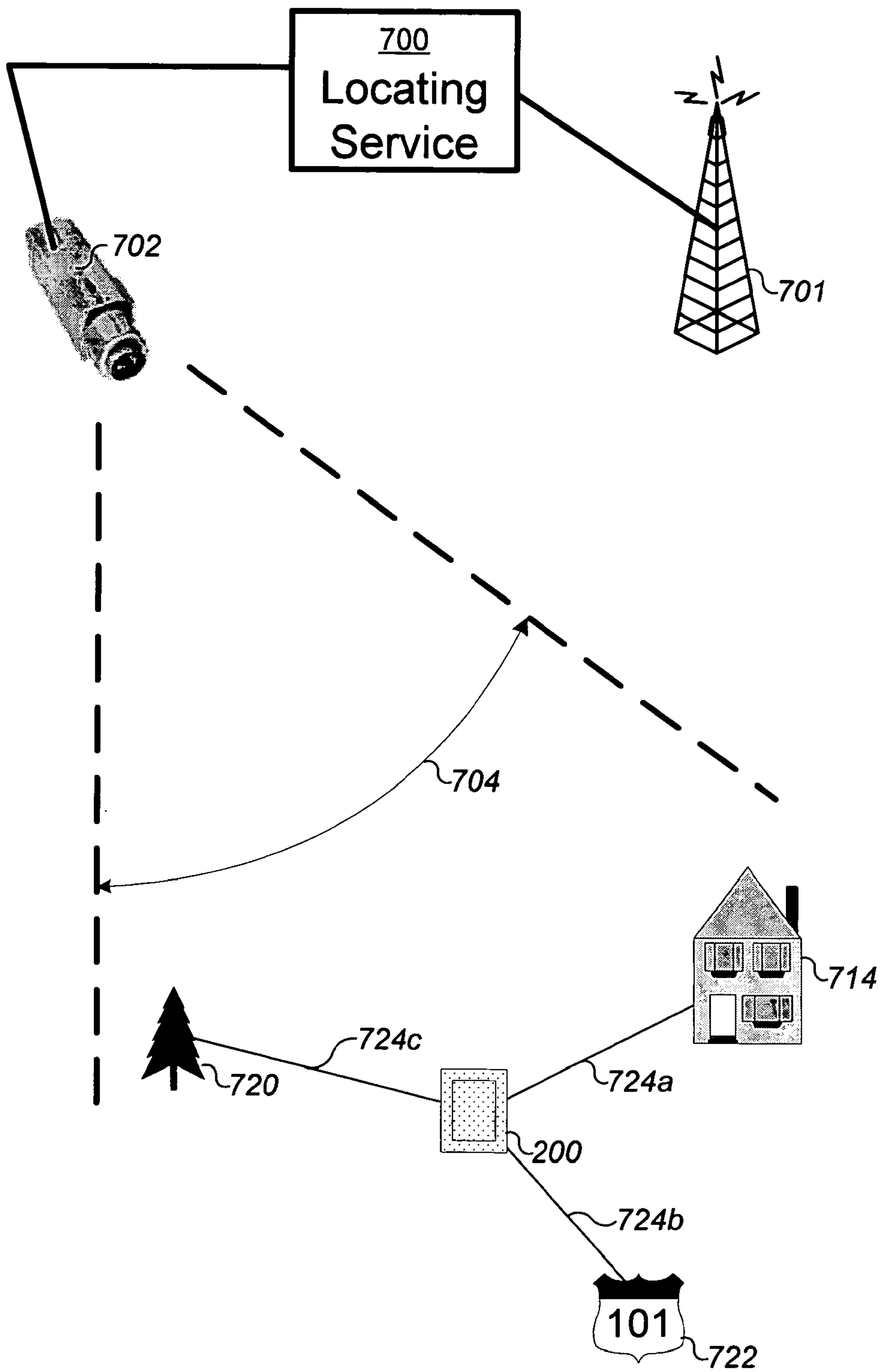

FIGS. 7A, 7B and 7C depict a locating by image sensory illustration for discussing automatic location of a MS, for example a DLM 200. With reference now to FIG. 7A, an image capture device 702 is positioned for monitoring MSs that come into the field of view 704 of device 702. Device 702 may be a camcorder, video camera, image camera that takes at least one snapshot, timely snapshots, or motion/presence detection snapshots, or any other device capable of producing at least a snapshot image at some point in time containing objects in the field of view 704. In one preferred embodiment, DLM 200 is sensed within the vicinity of device 702, perhaps by antenna (or cell tower) 701, prior to being photographed by device 702. In another embodiment, DLM 200 is sensed by movement within the vicinity of device 702 with well know motion detection means. In yet another embodiment, device 702 periodically or continually records. Device 702 is connected to a locating service 700 for processing as described by FIG. 7D. Locating service 700 has means for communicating wirelessly to DLM 200, for example through a connected antenna (or cell tower) 701. FIG. 7A illustrates that device 702 participates in pattern recognition for identifying the location of a MS. The MS can have on its exterior a string of characters, serial number, barcode, license plate, graphic symbol(s), textual symbols, combinations thereof, or any other visually perceptible, or graphical, identification 708 that can be recognized optically, or in a photograph. Device 702 is to have graphical/pixel resolution capability matching the requirements for identifying a MS with the sought graphical identification. Graphical identification 708 can be formed on the perceptible exterior of DLM 200, or can be formed as part of a housing/apparatus 706 which hosts DLM 200. Graphical identification 708 can be automatically read from an image using well known barcode reader technology, an Optical Character Recognition (OCR) process, a license tag scanner, general pattern recognition software, or the like. Housing 706 is generally shown for representing an automobile (license plate recognition, for example used in prior art toll tag lanes), a shopping cart, a package, or any other hosting article of manufacture which has a DLM 200 as part of it. Upon recognition, DLM 200 is associated with the location of device 702. Error in locating an MS will depend on the distance within the field of view 704 from device 702. A distance may be estimated based on the anticipated size of identification 708, relative its size determined within the field of view 704.

With reference now to FIG. 7B, image capture device 702 is positioned for monitoring MSs that come into the field of view 704 of device 702. MSs are preferably distinguishable by appearance (e.g. color, shape, markings, labels, tags, etc), or as attached (e.g. recognized mount to host) or carried (e.g. recognized by its recognized user). Such techniques are well known to those skilled in the art. Device 702 is as described above with connectivity to locating service 700 and antenna (or cell tower) 701. FIG. 7B illustrates that device 702 uses known measurements within its field of view for determining how large, and where located, are objects that come into the field of view 704. For example, a well placed and recognizable vertical line 710*a* and horizontal line 710*b*, which are preferably perpendicular to each other, have known lengths and positions. The objects which come into the field of view are measured based on the known lengths and positions of the lines 710*a* and 710*b* which may be landscape markings (e.g. parking lot lines) for additional purpose. Field of view 704 may contain many lines and/or objects of known dimensions strategically placed or recognized within the field of view 704 to facilitate image processing by service 700. Building 714 may serve as a reference point having known dimension and position in measuring objects such as a person 716 or DLM 200. A moving object such as a shopping cart 712 can have known dimensions, but not a specific position, to facilitate service 700 in locating an MS coming into the field of view 704. Those skilled in the art recognize that known dimensions and/or locations of anticipated objects in field of view 704 have measurements facilitating discovering positions and measurements of new objects that may travel into the field of view 704. Using FIG. 7B techniques with FIG. 7A techniques provides additional locating accuracy. A distance may be estimated based on the anticipated sizes of references in the field of view, relative size of the recognized MS.

With reference now to FIG. 7C, image capture device 702 is positioned for monitoring MSs that come into the field of view 704 of device 702. Device 702 is as described above with connectivity to locating service 700 and antenna (or cell tower) 701. MSs are preferably distinguishable by appearance (e.g. color, shape, markings, labels, tags, etc), or as attached (e.g. recognized mount to host) or carried (e.g. recognized by its user), or as identified by FIG. 7A and/or FIG. 7B methodologies. FIG. 7C illustrates that device 702 uses known locations within its field of view for determining how large, and where located, are objects that come into the field of view 704. For example, building 714, tree 720, and traffic sign 722 have its locations known in field of view 704 by service 700. Solving locations of objects that move into the field of view is accomplished with graphical triangulation measurements between known object reference locations (e.g. building 714, tree 720, and sign 722) and the object to be located. Timely snapshots by device 702 provide an ongoing locating of an MS, for example DLM 200. Line segment distances 724 (a, b, c) can be measured using references such as those of FIG. 7B. Whereabouts are determined by providing known coordinates to anticipated objects such as building 714, tree 720, and sign 722. Similarly, graphical AOA measurements (i.e. graphical angle measurements) and graphical MPT measurements can be used in relation to anticipated locations of objects within the field of view 704. There may be many anticipated (known) object locations within field of view 704 to further facilitate locating an MS. Being nearby an object may also be enough to locate the MS by using the object's location for the location of the MS. Using FIG. 7C techniques with FIG. 7A and/or FIG. 7B techniques provides additional locating accuracy.

The system and methodologies illustrated by FIGS. 7A through 7C are preferably used in optimal combination by locating service 700 to provide a best location of an MS. In some embodiments, MS whereabouts is determined as the location of a device 702 by simply being recognized by the device 702. In other embodiments, multiple devices 702 can be strategically placed within a geographic area for being used in combination to a common locating service 700 for providing a most accurate whereabouts of an MS. Multiple field of views 704 from difference angles of different devices 702 enable more precise locating within three dimensional space, including precise elevations.

Figure 7D:
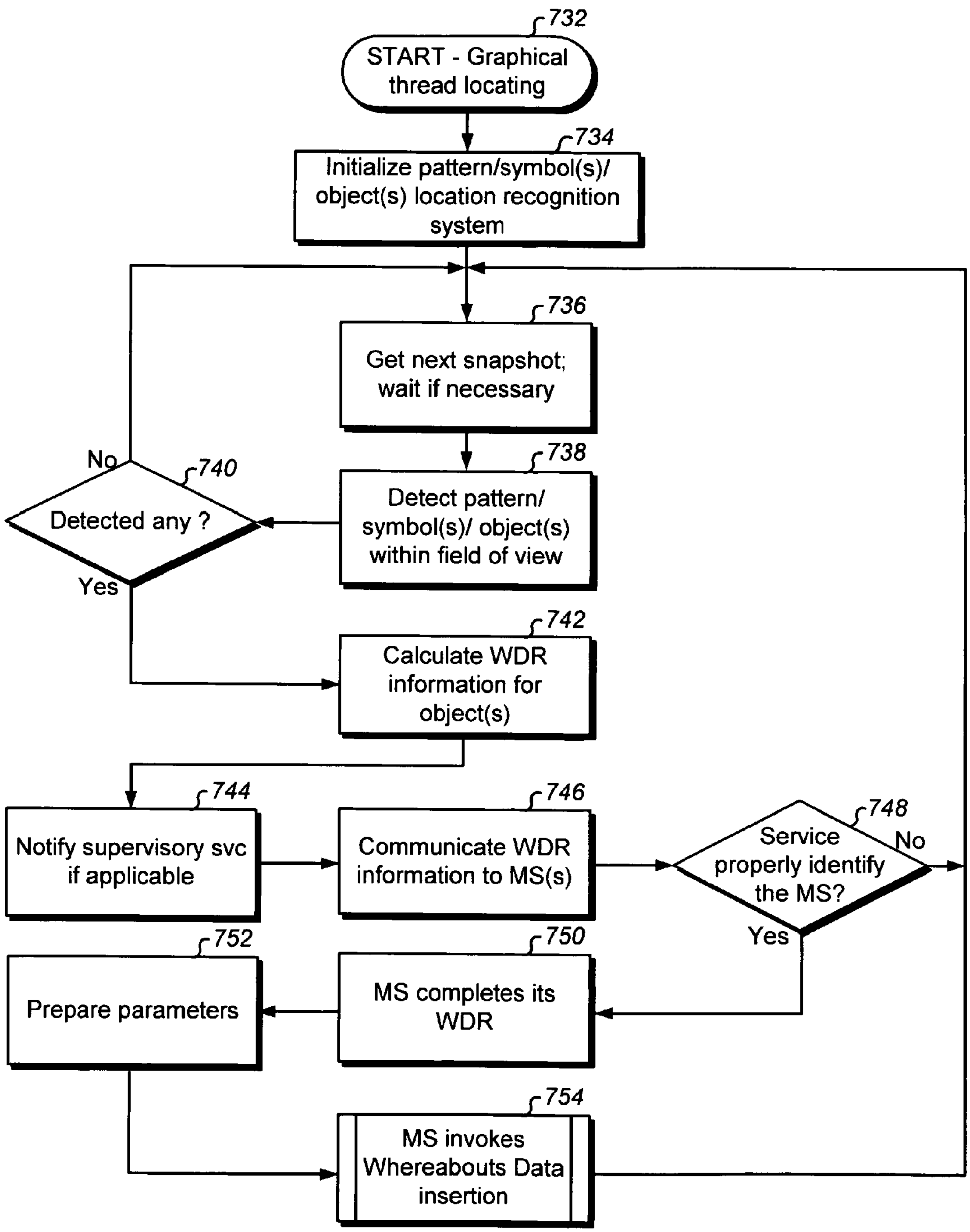
FIG. 7D depicts a flowchart for describing a preferred embodiment of graphically locating a MS, for example as illustrated by FIGS. 7A through 7C.

FIG. 7D depicts a flowchart for describing a preferred embodiment of graphically locating a MS in accordance with locating service 700 described above, for example as illustrated by FIGS. 7A through 7C. Locating service 700 may be a single capable data processing system, or many connected data processing systems for enhanced parallel processing. Locating service 700 may be connected to services involved with any other locating technology described in this application for synergistic services as an MS is mobile. Locating service 700 begins at block 732 and continues to block 734 where the service 700 is initialized in preparation of MS whereabouts analysis. Block 734 initializes its table(s) of sought identifying criteria which can be pattern recognized. In one preferred embodiment, color/shade, shape, appearance and applicable sought information is initialized for each sought identifying criteria. Pattern recognition is well known in the art and initialization is specific for each technology discussed above for FIGS. 7A through 7C. For FIGS. 7B and 7C discussions, positions, measurements, and reference points of known landmarks are additionally accounted. Thereafter, block 736 gets the next snapshot from device(s) 702. If there is none waiting to get, block 736 waits for one. If there is one queued up for processing, then block 736 continues to block 738. FIG. 7D is processing of a service, and is preferably multi-threaded. For example, blocks 736 through 754 can occur concurrently in many threads for processing a common queue of snapshots received from a device 702, or many devices 702. Each thread may process all sought criteria, or may specialize in a subset of sought criteria wherein if nothing is found, the thread can place the snapshot back on a queue for thread processing for another sought criteria after marking the queue entry as having been processed for one particular subset. So, threads may be specialized and work together in seeking all criteria, or may each work in parallel seeking the same criteria. In preferred embodiments, there is at least one queue of snapshots received by block(s) 736. Block 736 continues to block 738 which attempts to detect an MS having sought criteria using pattern recognition techniques of FIGS. 7A through 7C, in particular, or in combination. In one example embodiment, as device 702 provides service 700 with at least one timely snapshot to block 736, the snapshot graphic is scanned at block 738 for identifying characters/symbols/appearance of sought criteria. Block 738 continues with its search result to block 740. If block 740 determines no MS was detected, then processing continues back to block 736. If block 738 detected at least one MS (as determined at block 740), then block 742 calculates WDR information for the MS(s) detected, block 744 notifies a supervisory service of MS whereabouts if applicable, block 746 communicates the WDR information to MS(s) detected (for example via antenna 701), and processing continues to block 748.

There may be a plurality of MSs in the field of view, so communications at block 746 targets each MS recognized. A MS should not rely on the service to have done its job correctly. At a MS, block 748 checks the MS ID communicated for validation. If block 748 determines the MS ID is incorrect, then processing continues back to block 736 (for the particular MS). If block 748 determines the MS ID is correct, then processing continues to block 750 where the particular MS completes its WDR 1100 received from service 700. Thereafter, MS(s) prepare parameters at block 752, invoke local FIG. 2F processing already described above (at block 754), and processing continues for service 700 back to block 736. Of course, block 746 continues directly to block 736 at the service(s) since there is no need to wait for MS(s) processing in blocks 748 through 754. Parameters set at block 752 are: WDRREF=a reference or pointer to the MS WDR; DELETEQ=FIG. 7D location queue discard processing; and SUPER=FIG. 7D supervisory notification (e.g. no supervisory notification processing because it was already handled at block 744, or by being in context of the FIG. 7D service processing). No snapshots from device 702 are to be missed at block 736.

See FIG. 11A descriptions. Fields are set to the following upon exit from block 750:

MS ID field 1100*a* is preferably set with: Unique MS identifier of the MS, after validating at the MS that the service 700 has correctly identified it. This field is used to uniquely distinguish this MS WDRs on queue 22 from other originated WDRs. The service 700 may determine a MS ID from a database lookup using above appearance criteria. Field 1100*a* may also be determined using the transmission methods as described for FIGS. 2A through 2E, for example by way of antenna 701. For example, when the MS comes within range of antenna 701, FIG. 7D processing commences. Another embodiment prevents recognizing more than one MS within the field of view 704 at any time (e.g. a single file entryway), in which case the service can solicit a "who are you" transmission to identify the MS and then send back its whereabouts (in which case the MS sets its own MS ID here).

DATE/TIME STAMP field 1100*b* is preferably set with: Same as was described for FIG. 2D (block 236) above.

LOCATION field 1100*c* is preferably set with: The location determined for the MS by the service.

CONFIDENCE field 1100*d* is preferably set with: same value (e.g. 76) regardless of how the MS location was determined. In other embodiments, field 1100*d* will be determined by the number of distance measurements and/or the abundance of particular objects used in the field of view 704. The resulting confidence value can be adjusted based on other graphical parameters involved, analogously to as described above.

LOCATION TECHNOLOGY field 1100*e* is preferably set with: "Server Graphic-Patterns" "Server Graphic-Distances", "Server Graphic Triangulate", or a combination field value depending on how the MS was located and what flavor of service was used. The originator indicator is set to DLM.

LOCATION REFERENCE INFO field 1100*f* is preferably set with: null (not set) for indicating that all whereabouts determination data was factored into the confidence, and none is relevant for a single TDOA or AOA measurement in subsequent processing (i.e. service did all the work).

COMMUNICATIONS REFERENCE INFO field 1100*g* is preferably set with: Same as was described for FIG. 2D (block 236) above.

SPEED field 1100*h* is preferably set with: null (not set), but can be set with speed required to arrive to the current location from a previously known time at a location (e.g. using previous snapshots processed), assuming the same time scale is used.

HEADING field 1100*i* is preferably set with: null (not set), but can be set to heading determined when arriving to the current location from a previously known location (e.g. using previous snapshots processed).

ELEVATION field 1100*j* is preferably set with: Elevation/altitude, if available, if available.

APPLICATION FIELDS field 1100*k* is preferably set with: Same as was described for FIG. 2D (block 236) above.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

In an alternative embodiment, MS 2 may be equipped (e.g. as part of resources 38) with its own device 702 and field of view 704 for graphically identifying recognizable environmental objects or places to determine its own whereabouts. In this embodiment, the MS would have access to anticipated objects, locations and dimensions much the same way described for FIGS. 7A through 7D, either locally maintained or verifiable with a connected service. Upon a successful recognition of an object, place, or other graphically perceptible image which can be mapped to a location, the MS would complete a WDR similarly to above. The MS may recognize addresses, buildings, landmarks, of other pictorial data. Thus, the MS may graphically determine its own location. The MS would then complete a WDR 1100 for FIG. 2F processing exactly as described for FIG. 7D with the exceptions of fields that follow:

MS ID field 1100*a* is preferably set with: Same as was described for FIG. 2D (block 236) above.

LOCATION field 1100*c* is preferably set with: The location determined for the MS by the MS.

LOCATION TECHNOLOGY field 1100*e* is preferably set with: "Client Graphic-Patterns" "Client Graphic-Distances", "Client Graphic Triangulate", or a combination field value depending on how the MS located itself. The originator indicator is set to DLM.

COMMUNICATIONS REFERENCE INFO field 1100*g* is preferably set with: null (not set).

With reference now to FIG. 81B, depicted is a flowchart for describing a preferred embodiment of processing for a MS to graphically locate itself. FIG. 81B processing is used on each image (generally referred to as a frame) which is captured (or stored) at a MS. There are many embodiments for how, when, where and why an image (frame) is captured at the MS which subsequently gets analyzed by FIG. 81B processing, including:

- MS local video, or camcorder, capability is used for capturing an image stream (i.e. a plurality of frames);
- MS local camera capability is used for capturing a single snapshot image (i.e. a single frame);
- MS receives location tagged image(s) (i.e. a snapshot or stream (i.e. a single frame or plurality of frames)) for a MS location;
- MS receives image(s), or image stream, from source which claims the image(s) are representative of the current MS location;
- MS contains image(s), or image stream, which is understood to be representative of the current location, and MS user selects the image(s) or image stream for analysis (i.e. each frame to be analyzed); or
- MS maintains images(s) or image stream(s) to a MS memory and/or storage for subsequent analysis for MS recognizing its own location.

In some embodiments, a MS user enables or disables the MS automatically performing frame analysis for recognizing its own location. Enablement may include an additional configuration for which events, or moments, to perform analysis, including:

- Each frame as it is captured at the MS;
- Each frame as a configurable plurality of frames are captured at the MS;
- The frame upon completion of capturing a snapshot image;
- Each frame upon completion of capturing an image stream;
- Each frame upon storing the image or image stream, perhaps to a particular location for frame analysis processing;
- Each frame as it is received from a remote data processing system; or
- Each frame as it is stored (e.g. locally, or upon being received from a remote data processing system).

Preferably, a user can manually perform frame analysis at any time on a stored image or stream. In preferred embodiments, MS performance considerations will affect under what circumstances frame analysis can be configured and/or performed. In some embodiments, a MS is prepackaged with graphical recognition criteria for FIG. 81B artificial processing intelligence. In some embodiments, a MS performs location determination processing of FIG. 81B upon normal MS usage (e.g. camcorder, camera, etc) and determining a location is a side affect of having used the MS for image capture purpose. In some embodiments, the MS performs image captures automatically for processing, perhaps unknown to the user of the MS, although preferably according to a user is configuration.

Independent of how a frame is selected for processing, frame analysis processing begins at block 8100, continues to block 8102 for applicable initialization in preparation for subsequent processing, and then to block 8104 for accessing graphical recognition criteria. In a preferred embodiment, graphical recognition criteria is preconfigured for a MS and governs how and what to examine in images for determining a location. Thereafter, if block 8106 determines Optical Character Recognition (OCR) criteria is configured, then block 8108 performs optical character recognition on the frame and produces an output text stream if one or more characters is identified. Block 8108 preferably employs all reasonable methods and systems for improving optical character recognizing functionality (e.g. employ relevant techniques of U.S. Pat. No.: 5,875,261 (Method of and apparatus for optical character recognition based on geometric and color attribute hypothesis testing, Fitzpatrick et al); U.S. Pat. No. 5,645,309 (Method of and apparatus for character recognition through related spelling heuristics, Johnson); U.S. Pat. No. 5,406,640 (Method of and apparatus for producing predominate and non-predominate color coded characters for optical character recognition, Fitzpatrick et al); U.S. Pat. No. 5,396,564 (Method of and apparatus for recognizing predominate and non-predominate color code characters for optical character recognition, Fitzpatrick et al); U.S. Pat. No. 5,262,860 (Method and system communication establishment utilizing captured and processed visually perceptible data within a broadcast video signal, Fitzpatrick et al)).

Processing continues to block 8110 where the next (or first) text fragment from block 8108 is accessed, and block 8112 checks if a new text fragment is available for processing. If block 8112 determines that a new text fragment is available for processing, then block 8114 checks if the fragment, along with any other data so far processed, contains high confidence address information. If block 8114 determines high confidence address information was detected in the frame, then block 8116 performs further validation using whereabouts information available to the MS at the time of block 8116 processing, and block 8118 checks if a location can be determined for the address information containing the text fragment being processed. If block 8118 determines a location was determined, then block 8120 completes a WDR 1100, block 8122 prepares parameters for FIG. 2D processing, block 8124 invokes local FIG. 2F processing already described above, and processing continues back to block 8110 for a next text fragment to process. Parameters set at block 8122 are: WDRREF=a reference or pointer to the MS WDR; DELETEQ=FIG. 81B location queue discard processing; and SUPER=FIG. 81B supervisory notification. The location determined at block 8118 should be of a reasonable confidence when completing the WDR at block 8120. See FIG. 11A descriptions, and WDR completion descriptions above.

A fragment at block 8110 may be any subset text string of the text stream from block 8108 so that text fragments, for example, may include re-processing previously processed or subsequently processed text portions of a loop iteration of block 8110 through 8124. Intelligence is maintained at block 8110 for selecting an optimal next best text fragment. For example, if the user of the MS snaps a picture of an address on the outside of an office building, block 8110 should have enough intelligence to select the entire address text string rather than just a portion (e.g. zip code) for processing, and then prevent reprocessing redundant information for another loop iteration. Block 8110 may incorporate intelligence based on anticipated address lookup capability accessible to block 8116. Block 8114 determines an indisputable address as a zip code, number and street address, state, street sign block, combinations thereof, or any other textual address information which corresponds to some location. Block 8116 preferably has access to address mapping or geo-coding conversion information which is accessed local and/or remote to the MS of FIG. 81B processing for partial address search (e.g. find all states with street address), as well as queue 22, LBX history 30, statistics 14 and any other data which can complement or confirm determining whereabouts of the MS (e.g. narrow down state for street address based on what is found on queue 22). A most recent WDR at queue 22 with a confident location can confirm whether or not the OCR findings are reasonable or possible.

With reference back to block 8118, if it is determined that a confident location cannot be determined, processing continues back to block 8110. With reference back to block 8114, if it is determined that an indisputable address was not found, processing continues to block 8126. If block 8126 determines a partial address was determined in the text fragment, block 8128 performs resolution accessing other text information from the text stream as well as using validation resources used by block 8116, and processing continues to block 8118 already described above. With reference back to block 8126, if it is determined that a partial address was not found, processing continues back to block 8110. With reference back to block 8112, if it is determined that that all reasonable text fragments have been processed from the text stream output of block 8108, processing continues to block 8130. With reference back to block 8106, if it is determined that no OCR criteria is configured for processing, then processing continues to block 8130.

If it is determined at block 8130 that one or more landmarks have been configured for graphical recognition criteria, block 8132 gets the next (or first) configured landmark, and block 8134 checks if all have been processed. If there is a landmark to process, then block 8136 compares the landmark criteria to the frame and block 8138 checks if a match was determined. Landmark criteria is preferably scaled, two dimensionally translated, and color matched as a raster over the frame image for matching to a landmark in the frame. If block 8138 determines a match was found, then block 8140 performs validation similarly to block 8116. Landmarks are configured with known location information (e.g. latitude and longitude, address, etc) for facilitating comparisons to useful MS resources for validation (i.e. queue 22, LBX history 30, statistics 14, and any other data which can complement or confirm determining whereabouts of the MS).

Thereafter, if block 8142 determines a confident location was validated at block 8140, then block 8144 completes a WDR 1100, block 8146 prepares parameters for FIG. 2D processing, block 8148 invokes local FIG. 2F processing already described above, and processing continues back to block 8132 for the next landmark criteria to process. Parameters set at block 8146 are: WDRREF=a reference or pointer to the MS WDR; DELETEQ=FIG. 81B location queue discard processing; and SUPER=FIG. 81B supervisory notification.

If block 8142 determines that a confident location could not be determined, then processing continues directly back to block 8132. If block 8138 determines a match was not found, processing continues back to block 8132. Referring back to block 8134, if all landmarks have been processed, then processing continues to block 8150. Referring back to block 8130, if no landmark information is configured, processing continues to block 8150.

If it is determined at block 8150 that one or more conditional locations have been configured for graphical recognition criteria, block 8152 gets the next (or first) configured conditional location, and block 8154 checks if all have been processed. If there is a conditional location to process, then block 8156 compares the conditional location criteria to the frame and block 8158 checks if a match was determined. Conditional location is somewhat of a catch all for analyzing graphical objects in a frame, for example bar codes, special predefined location symbols, skiing direction signs, and other perceptible visuals other than OCR text and graphical landmarks. Conditional locations further support MS conditions which must be satisfied in order for frame analysis to take place. For example, if the frame is from a snapshot image (not an image stream) and a certain application is active, only then will frame analysis be performed for the criteria configured. In some embodiments, block 8156 can support all expressions of charter BNF Grammar 3068*a* and 3068*b*. A True result of that expression then causes a compare using the location criteria of the conditional location criteria. If block 8158 determines a match was found (and/or expression to process=True), then block 8160 performs validation similarly to block 8116 (e.g. consulting queue 22, LBX history 30, statistics 14, and any other data which can complement or confirm determining whereabouts of the MS).

Thereafter, if block 8162 determines a confident location was validated at block 8160, then block 8164 completes a WDR 1100, block 8166 prepares parameters for FIG. 2D processing, block 8168 invokes local FIG. 2F processing already described above, and processing continues back to block 8152 for the next conditional location criteria to process. Parameters set at block 8166 are: WDRREF=a reference or pointer to the MS WDR; DELETEQ=FIG. 81B location queue discard processing; and SUPER=FIG. 81B supervisory notification.

If block 8162 determines that a confident location could not be determined, then processing continues directly back to block 8152. If block 8158 determines a match was not found (and/or expression to process=False), processing continues back to block 8152. Referring back to block 8154, if all conditional locations have been processed, then FIG. 81B processing terminates at block 8170.

With reference to FIG. 81A, depicted is a flowchart for describing a preferred embodiment of processing for configuring criteria used by a MS to graphically locate itself. The user of FIG. 81A may be a MS user, an authenticated administrator of the MS of FIG. 81A processing, or an appropriate administrator for manufactured MSs which have not yet been sold retail.

User interface processing begins at block 8172 and continues to block 8174 for is initialization and for accessing any graphical recognition criteria already configured. Thereafter, block 8176 present any current configurations with alteration options, and block 8178 waits for a user action. When a user action is detected to the user interface, processing continues to block 8180.

If block 8180 determines the user selected to configure OCR capability, then block 8182 interfaces with the user for enabling, or disabling, appropriate OCR functionality to be used by FIG. 81B, otherwise processing continues to block 8184. When block 8182 is complete, processing continues back to block 8176.

If block 8184 determines the user selected to configure landmark criteria for graphical recognition, then block 8186 interfaces with the user for enabling, or disabling, landmark recognition functionality to be used by FIG. 81B, otherwise processing continues to block 8188. When block 8186 is complete interfacing with the user to specify graphical landmark criteria as well as associated location data, processing continues back to block 8176. Graphical landmark criteria may include scalable geometric or raster description including edge dimensions, angles, and recognizable appearance features; color and shading information for verifiable time(s) of the day; unique color combinations or contrasts from known vantage points; actual graphical representation; or combinations thereof.

If block 8188 determines the user selected to configure conditional location criteria for graphical recognition, then block 8190 interfaces with the user for enabling, or disabling, conditional location recognition functionality to be used by FIG. 81B, otherwise processing continues to block 8192. When block 8190 is complete interfacing with the user to specify criteria as well as associated location data, processing continues back to block 8176. Conditional location criteria may include any valid BNF grammar charter expression, as well as any other criteria which can be compared for a match to a graphical image. Block 8190 should support a user syntax for expression specification.

If block 8192 determines the user selected to save configuration made thus far, then block 8194 saves the configurations for FIG. 81B and processing continues back to block 8176, otherwise processing continues to block 8196. Block 8194 may internalize conditional expressions of block 8190 for optimal FIG. 81B processing.

If block 8196 determines the user selected to exit FIG. 81A processing, then block 8199 appropriately terminates the FIG. 81A interface and processing, otherwise block 8198 handles other user interface actions detected at block 8178 before continuing back to block 8176.

Figure 8A:
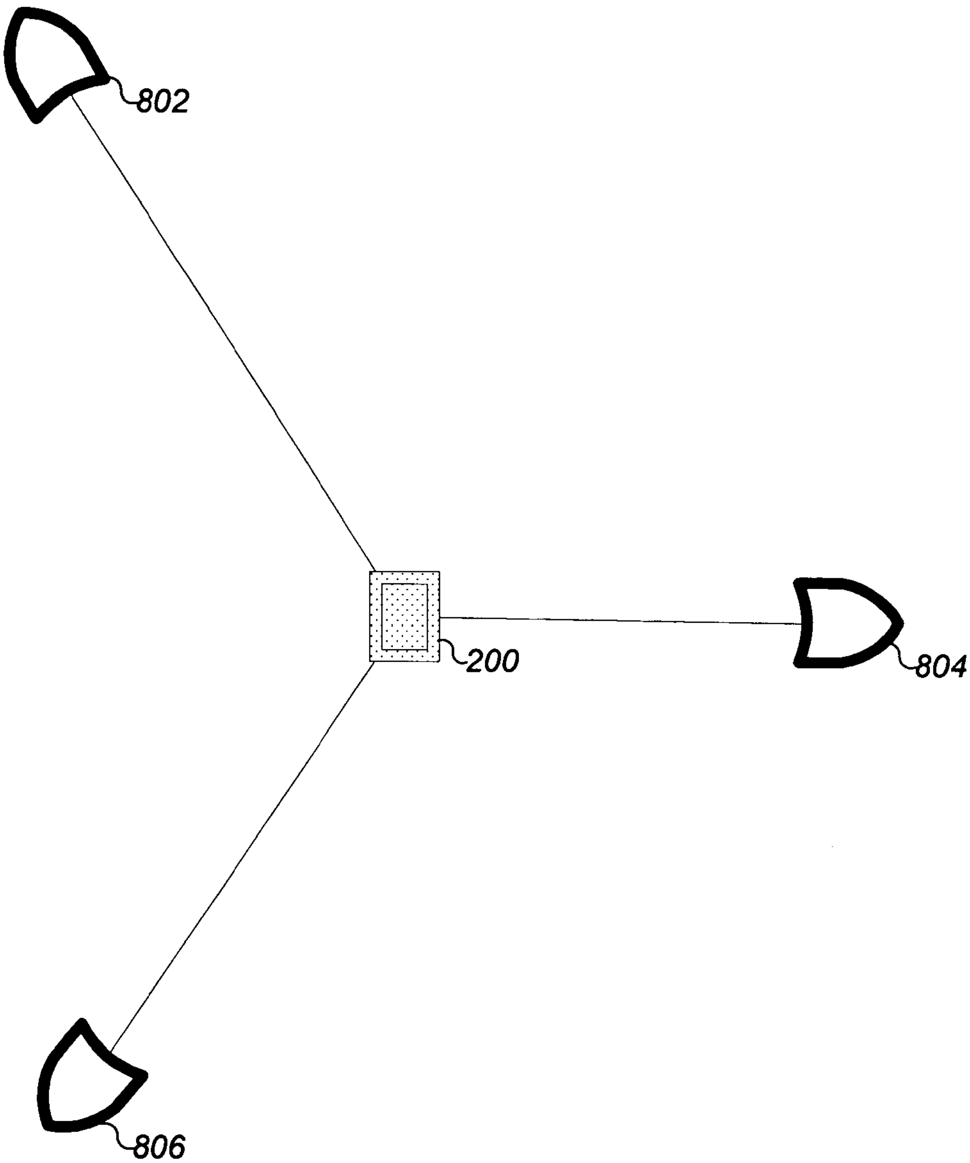
FIG. 8A heterogeneously depicts a locating by arbitrary wave spectrum illustration for discussing automatic location of a MS.

FIG. 8A heterogeneously depicts a locating by arbitrary wave spectrum illustration for discussing automatic location of a MS. In the case of acoustics or sound, prior art has shown that a noise emitting animal or object can be located by triangulating the sound received using TDOA by strategically placed microphones. It is known that by figuring out time delay between a few strategically spaced microphones, one can infer the location of the sound. In a preferred embodiment, an MS, for example DLM 200, emits a pulsed or constant sound (preferably beyond the human hearing range) which can be sensed by microphones 802 though 806. Data is superimposed on the sound wave spectrum with variations in pitch or tone, or data occurs in patterned breaks in sound transmission. Data may contain a unique identifier of the MS so service(s) attached to microphones 802 through 806 can communicate uniquely to an MS. In some embodiments, sound used by the MS is known to repel certain pests such as unwanted animals, rodents, or bugs in order to prevent the person carrying the MS from encountering such pests during travel, for example during outdoor hiking or mountain climbing. In submarine acoustics, AOA is a method to locate certain objects. The FIGS. 3B and 3C flowcharts occur analogously for sound signals received by microphones 802 through 806 which are connected to service processing of FIGS. 3B and 3C. The only difference is wave spectrum used.

It has been shown that light can be used to triangulate position or location information (e.g. U.S. Pat. Nos. 6,549,288 (Migdal et al) and 6,549,289 (Ellis)). Optical sensors 802 through 806 detect a light source of, or illumination of, an MS, for example DLM 200. Data is superimposed on the light wave spectrum with specified frequency/wavelength and/or periodicity, or data occurs in patterned breaks in light transmission. Data may contain a unique identifier of the MS so service(s) attached to sensors 802 through 806 can communicate uniquely to an MS. Mirrors positioned at optical sensors 802 through 806 may be used to determine an AOA of light at the sensor, or alternatively TDOA of recognizable light spectrum is used to position an MS. The FIGS. 3B and 3C flowcharts occur analogously for light signals received by sensors 802 through 806 which are connected to service processing of FIGS. 3B and 3C. The only difference is wave spectrum used.

Heterogeneously speaking, FIG. 8A illustrates having strategically placed sensors 802 through 806 for detecting a wave spectrum and using TDOA, AOA, or MPT. Those skilled in the art appreciate that a wave is analogously dealt with by FIGS. 3B and 3C regardless of the wave type, albeit with different sensor types 802 through 806 and different sensor interface to service(s) of FIGS. 3B and 3C. Wave signal spectrums for triangulation by analogous processing to FIGS. 3B and 3C include microwaves, infrared, visible light, ultraviolet light, X-rays, gamma rays, longwaves, magnetic spectrum, or any other invisible, visible, audible, or inaudible wave spectrum. Sensors 802 through 806 are appropriately matched according to the requirements. Alternatively, a MS may be sensing wave spectrums emitted by transmitters 802 through 806.

Those skilled in the relevant arts appreciate that the point in all this discussion is all the wave forms provide methods for triangulating whereabouts information of an MS. Different types of wave forms that are available for an MS can be used solely, or in conjunction with each other, to determine MS whereabouts. MSs may be informed of their location using the identical wave spectrum used for whereabouts determination, or may use any other spectrum available for communicating WDR information back to the MS. Alternatively, the MS itself can determine WDR information relative applicable sensors/transmitters. In any case, a WDR 1100 is completed analogously to FIGS. 3B and 3C.

Figure 8B:
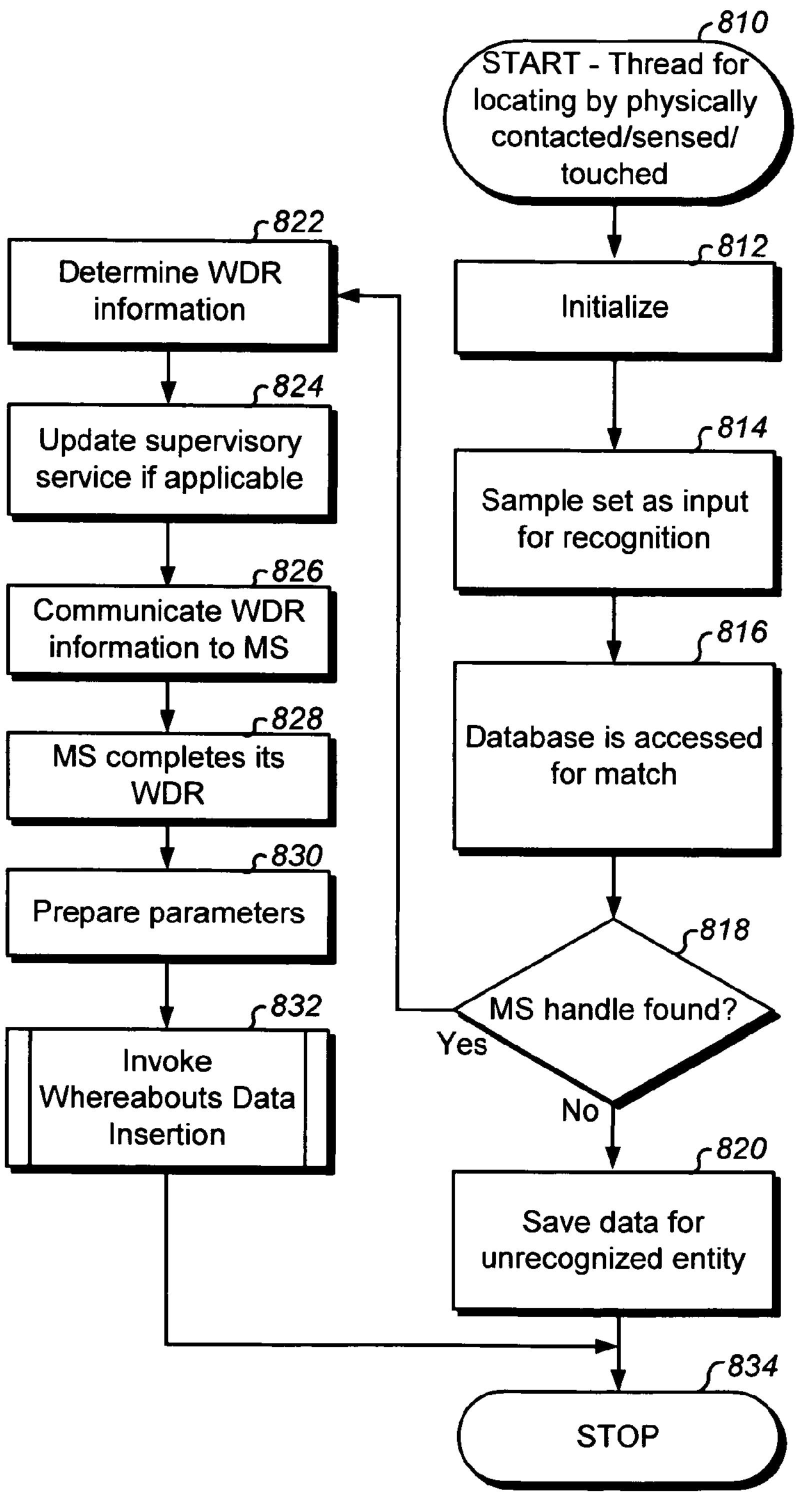
FIG. 8B depicts a flowchart for describing a preferred embodiment of locating a MS through physically contacting the MS.

FIG. 8B depicts a flowchart for describing a preferred embodiment of locating a MS through physically sensing a MS, for example a DLM 200. Processing begins at block 810 upon contact with a candidate MS and continues to block 812 where initialization takes place. Initialization includes determining when, where, and how the contact was made. Then, block 814 takes the contact sample and sets it as input containing a unique identifier or handle of the MS which was sensed. There are various known embodiments of how the MS is sensed:

a) Touching sensors contact the MS (or host/housing having MS) to interpret physical characteristics of the MS in order to uniquely identify it (e.g. Braille, embossed/raised/depressed symbols or markings, shape, temperature, depressions, size, combinations thereof, etc);
b) Purchase is made with MS while in vicinity of device accepting purchase, and as part of that transaction, the MS is sensed as being at the same location as the device accepting purchase, for example using a cell phone to purchase a soft drink from a soft drink dispensing machine;
c) Barcode reader is used by person to scan the MS (or host/housing having MS), for example as part of shipping, receiving, or transporting;
d) The MS, or housing with MS, is sensed by its odor (or host/housing having MS), perhaps an odor indicating where it had been, where it should not be, or where it should be. Various odor detection techniques may be used;
e) Optical sensing wherein the MS is scanned with optical sensory means, for example to read a serial number; and/or
f) Any sensing means which can identify the MS through physical contact, or by nearby/close physical contact with some wave spectrum.

Block 814 continues to block 816 where a database is accessed for recognizing the MS identifier (handle) by mapping sensed information with an associated MS handle. If a match is found at block 818, then block 822 determines WDR 1100 information using the location of where sensing took place. If block 818 determines no match was found, then data is saved at block 820 for an unrecognized entity such as is useful when an MS should have been recognized, but was not. In another embodiment, the MS handle is directly sensed so block 814 continues directly to block 818 (no block 816). Block 820 continues to block 834 where processing terminates. Block 816 may not use the entire MS identifier for search, but some portion of it to make sure it is a supported MS for being located by sensing. The MS identifier is useful when communicating wirelessly the WDR information to the MS (at block 826).

Referring now back to block 822, processing continues to block 824 where a supervisory service may be updated with the MS whereabouts (if applicable), and block 826 communicates the WDR information to the MS. Any available communication method can be used for communicating the WDR information to the MS, as described above. Thereafter, the MS completes the WDR at block 828, block 830 prepares FIG. 2F parameters, and block 832 invokes FIG. 2F processing already described above. Processing terminates thereafter at block 834. Parameters set at block 830 are: WDRREF = a reference or pointer to the MS WDR; DELETEQ=FIG. 8B location queue discard processing; and SUPER=FIG. 8B supervisory notification (e.g. no supervisory notification processing because it was already handled at block 824, or by being in context of the FIG. 8B service processing). FIG. 8B processing is available at any appropriate time for the MS. In an alternate embodiment, the MS senses its environment to determine whereabouts.

See FIG. 11A descriptions. Fields are set to the following upon exit from block 828:

MS ID field 1100*a* is preferably set with: Same as was described for FIG. 2D (block 236) above.
DATE/TIME STAMP field 1100*b* is preferably set with: Same as was described for FIG. 2D (block 236) above.
LOCATION field 1100*c* is preferably set with: Location of the sensor sensing the MS.
CONFIDENCE field 1100*d* is preferably set with: Should be high confidence (e.g. 98) for indisputable contact sensing and is typically set with the same value.
LOCATION TECHNOLOGY field 1100*e* is preferably set with: "Contact", or a specific type of Contact. The originator indicator is set to DLM.
LOCATION REFERENCE INFO field 1100*f* is preferably set with: null (not set).
COMMUNICATIONS REFERENCE INFO field 1100*g* is preferably set with: Same as was described for FIG. 2D (block 236) above.
SPEED field 1100*h* is preferably set with: null (not set), but can be set with speed required to arrive to the current location from a previously known time at a location, assuming the same time scale is used.
HEADING field 1100*i* is preferably set with: null (not set), but can be set to heading determined when arriving to the current location from a previously known location.
ELEVATION field 1100*j* is preferably set with: Elevation/altitude, if available.
APPLICATION FIELDS field 1100*k* is preferably set with: Same as was described for FIG. 2D (block 236) above.
CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

Figure 8C:
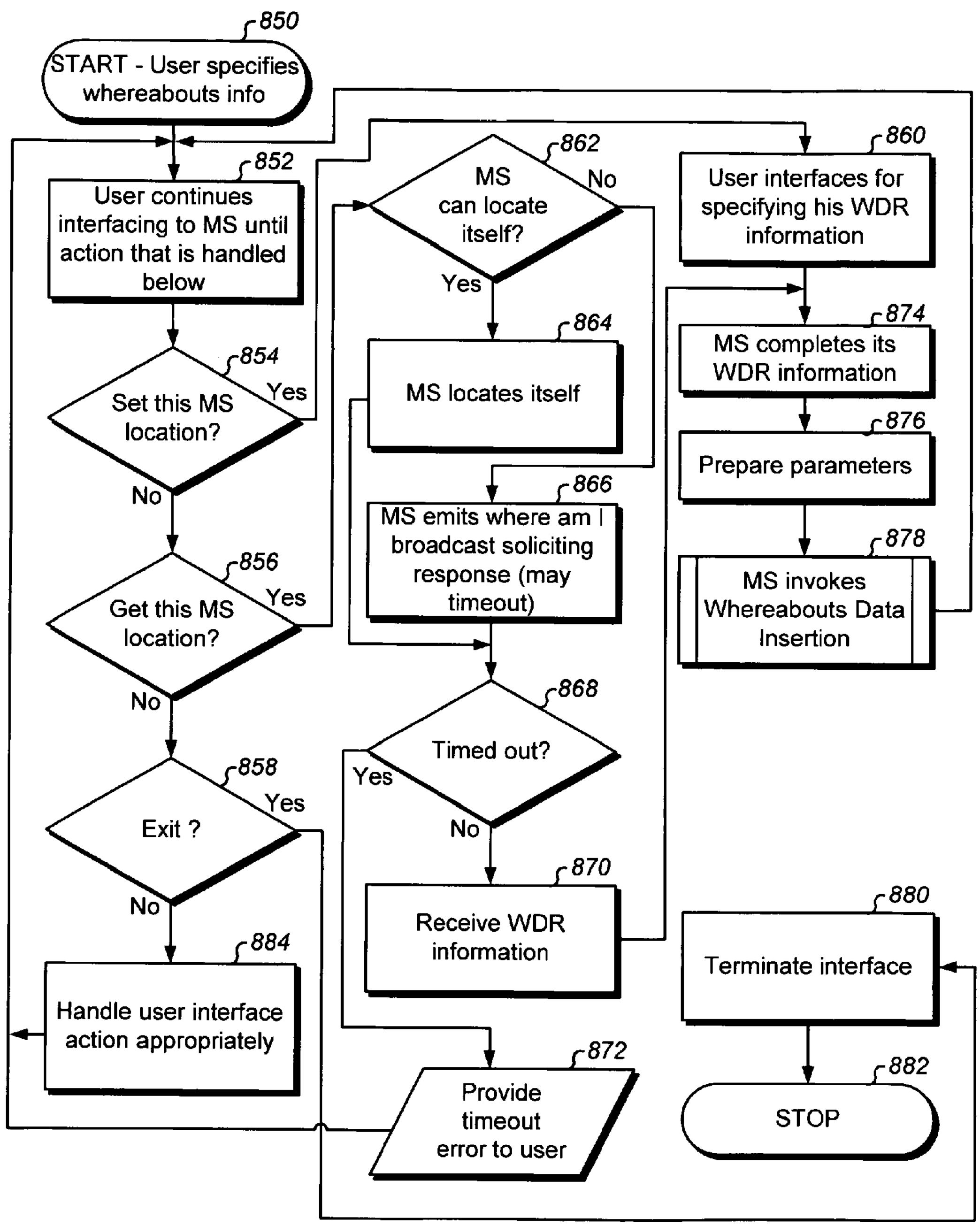
FIG. 8C depicts a flowchart for describing a preferred embodiment of locating a MS through a manually entered whereabouts of the MS.

FIG. 8C depicts a flowchart for describing a preferred embodiment of locating a MS, for example a DLM 200, through a manually entered location of the MS. MS user interface processing begins at block 850 when a user starts the user interface from code 18 and continues to block 852. Any of a variety of user interfaces, dependent on the type of MS, is used for manually entering the location of the MS. A user interfaces with the MS at block 852 until one of the monitored actions relevant to this disclosure are detected. Thereafter, if block 854 determines the user has selected to set his location manually, then processing continues to block 860. If block 854 determines the user did not select to manually set his location, then block 856 determines if the user selected to force the MS to determine its location. If the user did select to force the MS to get its own location, then block 856 continues to block 862. If the user did not select to force the MS to get its own location as determined by block 856, then processing continues to block 858. If block 858 determines the user wanted to exit the user interface, then block 880 terminates the interface and processing terminates at block 882. If block 858 determines the user did not want to exit the user interface, then block 884 handles any user interface actions which caused exit from block 852 yet were not handled by any action processing relevant to this disclosure.

With reference back to block 860, the user interfaces with the MS user interface to manually specify WDR information. The user can specify:

1) An address or any address subset such as a zip code;
2) Latitude, longitude, and elevation;
3) MAPSCO identifier;
4) FEMA map identifier;
5) USDA map identifier;
6) Direct data entry to a WDR 1100; or
7) Any other method for user specified whereabouts of the MS.

The user can specify a relevant confidence value for the manually entered location, however, processing at block 860 preferably automatically defaults a confidence value for the data entered. For example, a complete address, validated at block 860, will have a high confidence. A partial address such as city and state, or a zip code will have a low confidence value. The confidence value will reflect how large an area is candidate for where the MS is actually located. To prevent completely relying on the user at block 860 for accurate WDR information, validation embodiments may be deployed. Some examples:

Upon specification (e.g. FEMA), the MS will access connected service(s) to determine accuracy (FEMA conversion tables);

Upon specification (e.g. MAPSCO), the MS will access local resources to help validate the specification (e.g. MAPSCO conversion tables); and/or Upon specification (e.g. address), the MS can access queue 22 and/or history 30 for evidence proving likelihood of accuracy. The MS may also access services, or local resources, for converting location information for proper comparisons.

In any case, a confidence field 1100*d* value can be automatically set based on the validation results, and the confidence may, or may not, be enabled for override by the user.

After WDR information is specified at block 860, the MS completes the WDR at block 874, block 876 prepares parameters for FIG. 2F processing, and (at block 878) the MS invokes FIG. 2F processing already described above before returning back to block 852. Parameters set at block 876 are: WDRREF=a reference or pointer to the MS WDR; DELETEQ=FIG. 8C location queue discard processing; and SUPER=FIG. 8C supervisory notification processing. Various embodiments permit override of the confidence floor value by the user, or by FIG. 8C processing. Block 874 may convert the user specified information into a standardized more usable form in an LN-expanse (e.g. convert to latitude and longitude if possible, truncated precision for more area coverage). WDR 1100 fields (see FIG. 11A) are set analogously in light of the many variations already described above.

With reference back to block 862, if it is determined that the MS is equipped with capability (e.g. in range, or in readiness) to locate itself, then processing continues to block 864 where the MS locates itself using MS driven capability described by FIGS. 2E, 3C, 4B, 6B, and 8A or MS driven alternative embodiments to FIGS. 2D, 3B, 5B, 6A, 7D, 8A, and 8B, or any other MS capability for determining its own whereabouts with or without help from other data processing systems or services. Interfacing to locating capability preferably involves a timeout in case there is no, or slow, response, therefore block 864 continues to block 868 where it determined whether or not block 864 timed out prior to determining a location. If block 868 determines a timeout was encountered, then block 872 provides the user with an error to the user interface, and processing continues back to block 852. Block 872 preferably requires use acknowledgement prior to continuing to block 852.

If block 868 determines there was no timeout (i.e. whereabouts successfully determined), then block 870 interfaces to the locating interface to get WDR information, block 874 completes a WDR, and blocks 876 and 878 do as described above. If block 862 determines the MS cannot locate itself and needs help, then block 866 emits at least one broadcast request to any listening service which can provide the MS its location. Appropriate correlation is used for an anticipated response. Example services listening are service driven capability described by FIGS. 2D, 3B, 5B, 6A, 7D, 8A, and 8B, or service side alternative embodiments of FIGS. 2E, 3C, 4B, 6B, and 8A, or any other service capability for determining MS whereabouts with or without help from the MS or other data processing systems or services. Block 866 then continues to block 868.

If block 868 determines a timeout was encountered from the service broadcast request, then block 872 provides the user with an error to the user interface, and processing continues back to block 852. If block 868 determines there was no timeout (i.e. whereabouts successfully determined), then block 870 receives WDR information from the locating interface of the responding service, block 874 completes a WDR, and blocks 876 and 878 do as already described above.

See FIG. 11A descriptions. Depending how the MS was located via processing started at block 856 to block 862, a WDR is completed analogous to as described in Figs. above. If the user manually specified whereabouts at block 860, fields are set to the following upon exit from block 874:

MS ID field 1100*a* is preferably set with: Same as was described for FIG. 2D (block 236) above.

DATE/TIME STAMP field 1100*b* is preferably set with: Same as was described for FIG. 2D (block 236) above.

LOCATION field 1100*c* is preferably set with: Location entered by the user, or converted from entry by the user; preferably validated.

CONFIDENCE field 1100*d* is preferably set with: User specified confidence value, or a system assigned value per a validated manual specification. Confidence should reflect confidence of location precision (e.g. validated full address high; city and zip code low, etc). Manually specified confidences are preferably lower than other location technologies since users may abuse or set incorrectly, unless validated. Specifying lower confidence values than technologies above, for completely manual WDR specifications (i.e. no validation), ensures that manual specifications are only used by the MS in absence of other technologies. There are many validation embodiments that can be deployed (as described above) for a manually entered address wherein the resulting confidence may be based on validation(s) performed (e.g. compare recent history for plausible current address, use current latitude and longitude for database lookup to compare with address information entered, etc). The system and/or user may or may not be able to override the confidence value determined.

LOCATION TECHNOLOGY field 1100*e* is preferably set with: "Manual", or "Manual Validated". Types of validations may further be elaborated. The originator indicator is set to DLM.

LOCATION REFERENCE INFO field 1100*f* is preferably set with: null (not set).

COMMUNICATIONS REFERENCE INFO field 1100*g* is preferably set with: null (not set).

SPEED field 1100*h* is preferably set with: null (not set).

HEADING field 1100*i* is preferably set with: null (not set).

ELEVATION field 1100*j* is preferably set with: null (not set).

APPLICATION FIELDS field 1100*k* is preferably set with: Same as was described for FIG. 2D (block 236) above; or as decided by the user.

CORRELATION FIELD 1100*m* is preferably set with: Not Applicable (i.e. not maintained to queue 22).

SENT DATE/TIME STAMP field 1100*n* is preferably set with: Not Applicable (i.e. not maintained to queue 22).

RECEIVED DATE/TIME STAMP field 1100*p* is preferably set with: Not Applicable (i.e. not maintained to queue 22).

FIG. 9A depicts a table for illustrating heterogeneously locating a MS, for example a DLM 200. While many location methods and systems have been exhausted above, there may be other system and methods for locating an MS which apply to the present disclosure. The requirement for LBX is that the MS be located, regardless of how that occurs. MSs disclosed herein can be located by one or many location technologies discussed. As MS prices move lower, and capabilities increase, an affordable MS will contain multiple abilities for being located. GPS, triangulation, in-range detection, and contact sensory may all be used in locating a particular MS as it travels. Equipping the MS with all techniques is straightforward and is compelling when there are competing, or complementary, technologies that the MS should participate in.

The FIG. 9A table has DLM location methods for rows and a single column for the MS (e.g. DLM 200). Each location technology can be driven by the client (i.e. the MS), or a service (i.e. the location server(s)) as denoted by a row qualifier "C" for client or "S" for service. An MS may be located by many technologies. The table illustrated shows that the MS with unique identifier 0A12:43 EF:985B:012F is able to be heterogeneously located, specifically with local MS GPS capability, service side cell tower in-range detection, service side cell tower TDOA, service side cell tower MPT (combination of TDOA and AOA), service side antenna in-range detection, service side antenna AOA, service side antenna TDOA, service side antenna MPT, service side contact/sensory, and general service side MPT. The unique identifier in this example is a universal product identifier (like Host Bus Adapter (HBA) World Wide Name (WWN) identifiers are generated), but could be in other form as described above (e.g. phone #214-403-4071). An MS can have any subset of technologies used to locate it, or all of the technologies used to locate it at some time during its travels. An MS is heterogeneously located when two or more location technologies are used to locate the MS during MS travels and/or when two or more location technologies with incomplete results are used in conjunction with each other to locate the MS during MS travels, such as MPT. MPT is a heterogeneous location technology because it uses at least two different methods to accomplish a single location determination. Using combinations of different location technologies can be used, for example a TDOA measurement from an in-range antenna with a TDOA measurement relative a cell tower (e.g. as accomplished in MS processing of FIG. 26B), using completely different services that have no knowledge of each other. Another combination is to use a synergy of whereabouts data from one technology with whereabouts data from another technology. For example, in-range detection is used in combination with graphical identification to provide better whereabouts of a MS. In another example, a GPS equipped MS travels to an area where GPS does not work well (e.g. downtown amidst large and tall buildings). The DLM becomes an ILM, and is triangulated relative other MSs. So, an MS is heterogeneously located using two or more technologies to determine a single whereabouts, or different whereabouts of the MS during travel.

Figure 9B:
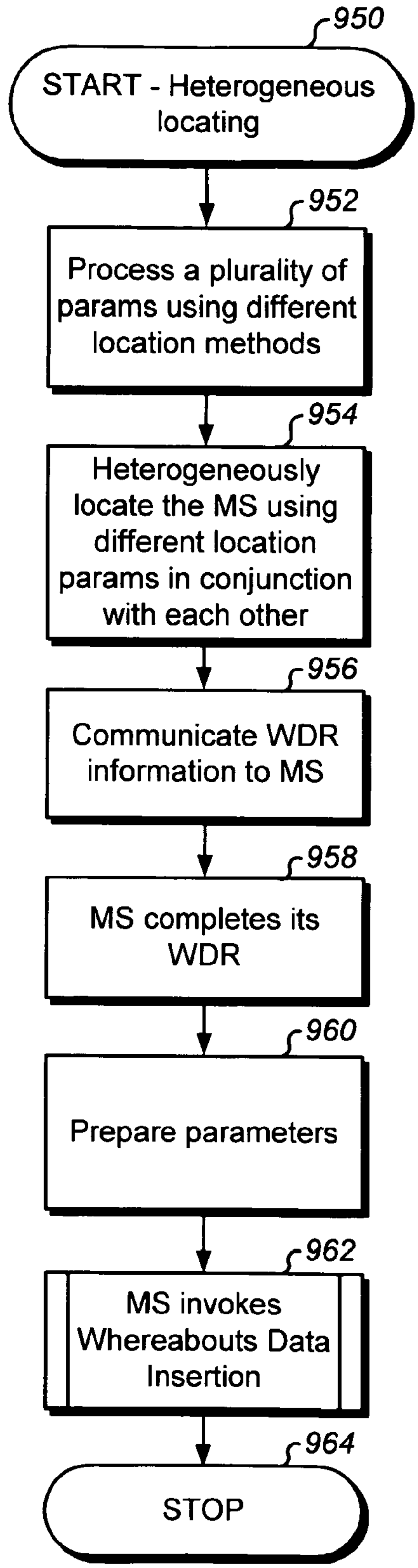
FIG. 9B depicts a flowchart for describing a preferred embodiment of heterogeneously locating a MS.

FIG. 9B depicts a flowchart for describing a preferred embodiment of heterogeneously locating a MS, for example DLM 200. While heterogeneously locating an MS can occur by locating the MS at different times using different location technologies, flowchart 9B is shown to discuss a generalization of using different location technologies with each other at the same time to locate an MS. Processing begins at block 950 and continues to block 952 where a plurality of parameters from more than one location technology are examined for locating an MS. Processing begins at block 950 by a service (or the MS) when a location technology by itself cannot be used to confidently locate the MS. Data deemed useful at block 952, when used in conjunction with data from a different location technology to confidently locate the MS, is passed for processing to block 954. Block 954 heterogeneously locates the MS using data from at least two location technologies to complement each other and to be used in conjunction with each other in order to confidently locate the MS. Once the MS whereabouts are determined at block 954, WDR information is communicated to the MS for further processing at block 956. In some embodiments where a service is heterogeneously locating the MS, block 956 communicates WDR information wirelessly to the MS before processing begins at block 958. In another embodiment where the MS is heterogeneously locating itself, block 956 communicates WDR information internally to WDR completion processing at block 958. In preferred embodiments, the MS completes its WDR information at block 958, FIG. 2F parameters are prepared at block 960, and the MS invokes FIG. 2F processing already described above (at block 962), before processing terminates at block 964. Parameters set at block 960 are: WDRREF=a reference or pointer to the MS WDR; DELETEQ=FIG. 9B location queue discard processing; and SUPER=FIG. 9B supervisory notification processing. WDR 1100 fields (see FIG. 11A) are set analogously in light of many variations already described above.

In some embodiments of FIG. 9B processing, Missing Part Triangulation (MPT) is used to heterogeneously locate an MS. For a service side embodiment example, block 950 begins service processing when TDOA information itself cannot be used to confidently locate the MS, or AOA information itself cannot be used to confidently locate the MS, however using angles and distances from each in conjunction with each other enables solving whereabouts confidently. See "Missing Part Triangulation (MPT)" section below with discussions for FIGS. 11A through 11E for MPT processing of blocks 952 and 954. Data discovered at block 952 and processed by block 954 depends on the embodiment, what stationary reference point locations are known at the time of blocks 952 and 954 processing, and which parts are missing for triangulating the MS. Having three (3) sides (all TDOA) with known stationary vertices location(s) solves the triangle for locating the MS. Three (3) angles (all AOA) with known stationary vertices location(s) solves the triangle for locating the MS. Those skilled in the art appreciate that solving triangulation can make complementary use of different distances (time used to determine length in TDOA) and angles (from AOA) for deducing a MS location confidently (e.g. MPT). Those skilled in the art recognize that having stationary reference locations facilitates requiring less triangular information for deducing a MS location confidently.

While MPT has been discussed by example, flowchart 9B is not to be interpreted in a limiting sense. Any location technologies, for example as shown in FIG. 9A, can be used in conjunction with each other when not all information required is available in a single location technology to confidently deduce an MS location. Data available from the different location technologies available will be examined on its own merits, and optionally used in conjunction to deduce a confident location. For example, a TDOA (difference between when signal sent and when received) measurement from "coming within range" technology can be used to distinguish how close, or how far, is an MS in the vicinity. That measurement may be used to more confidently locate the MS using other TDOA measurements from other unrelated "coming within range" whereabouts information. In another example, graphical locating information described with FIGS. 7A through 7D can be used in conjunction with AOA and/or TDOA, or other useful locating information of other locating technologies. In another example, light triangulation information is used in conjunction with sound triangulation, or light and/or sound information is used with any other wave form location information to perform accurate locating of a MS. Thus, there are many examples where heterogeneously locating involves using the best available data from a plurality of different locating technologies.

With the many DLM examples above, it should be clear now to the reader how to set the WDR 1100 for DLM invoked FIG. 2F processing. There can be other location technologies that will set WDR 1100 fields analogously. Locating methodologies of FIGS. 2A through 9B can be used in any combination, for example for more timely or accurate locating. Furthermore, a MS automatically takes on a role of a DLM or ILM depending on what capability is available at the time, regardless of whether or not the MS is equipped for being directly located. As a DLM roams to unsupported areas, it can remain a DLM using different DLM technologies, and it can become an ILM to depend on other MSs (ILMs or DLMs) in the vicinity to locate it.

LBX Indirectly Located Mobile Data Processing Systems (ILMs)

Figure 10A:
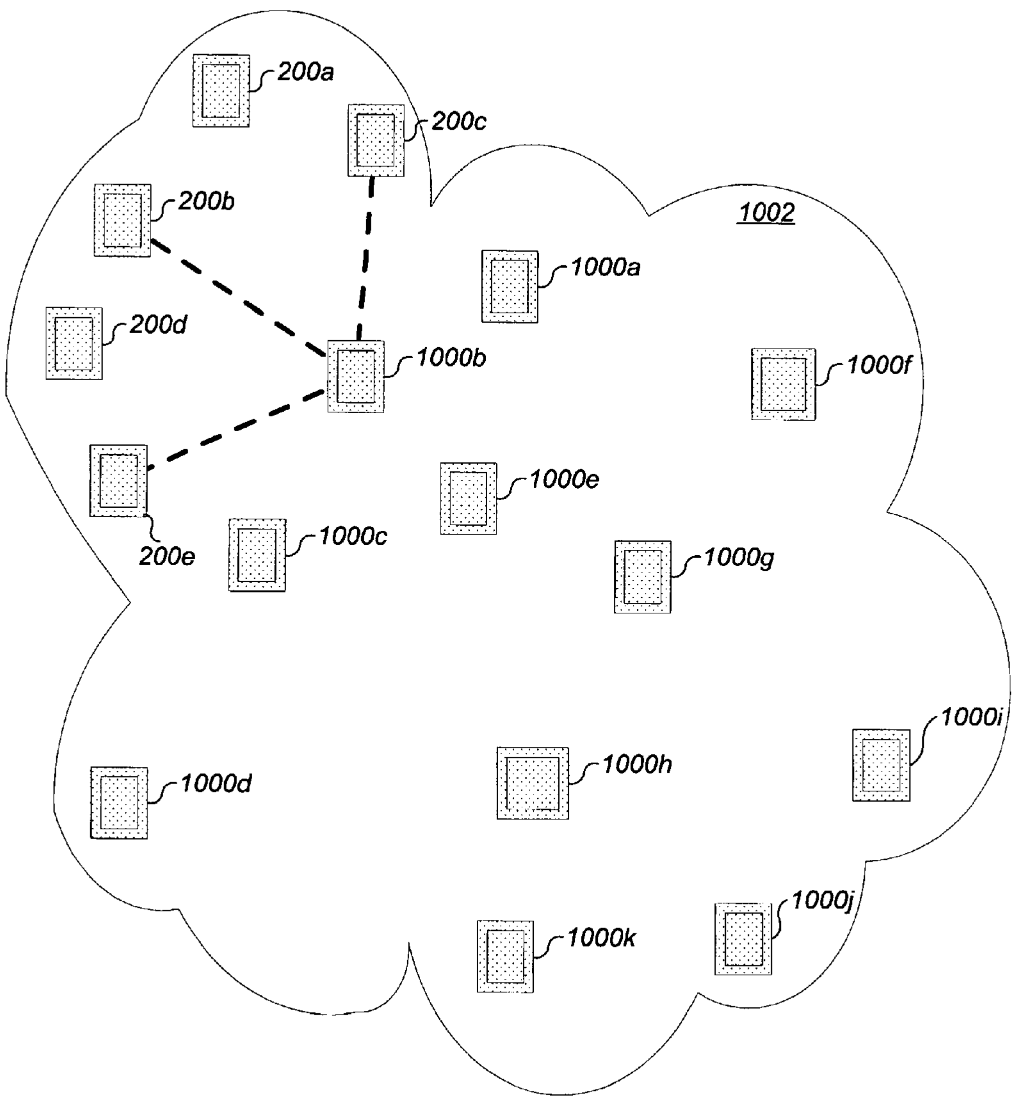
FIGS. 10A and 10B depict an illustration of a Locatable Network expanse (LN-Expanse) for describing locating of an ILM with all DLMs.
Figure 10B:
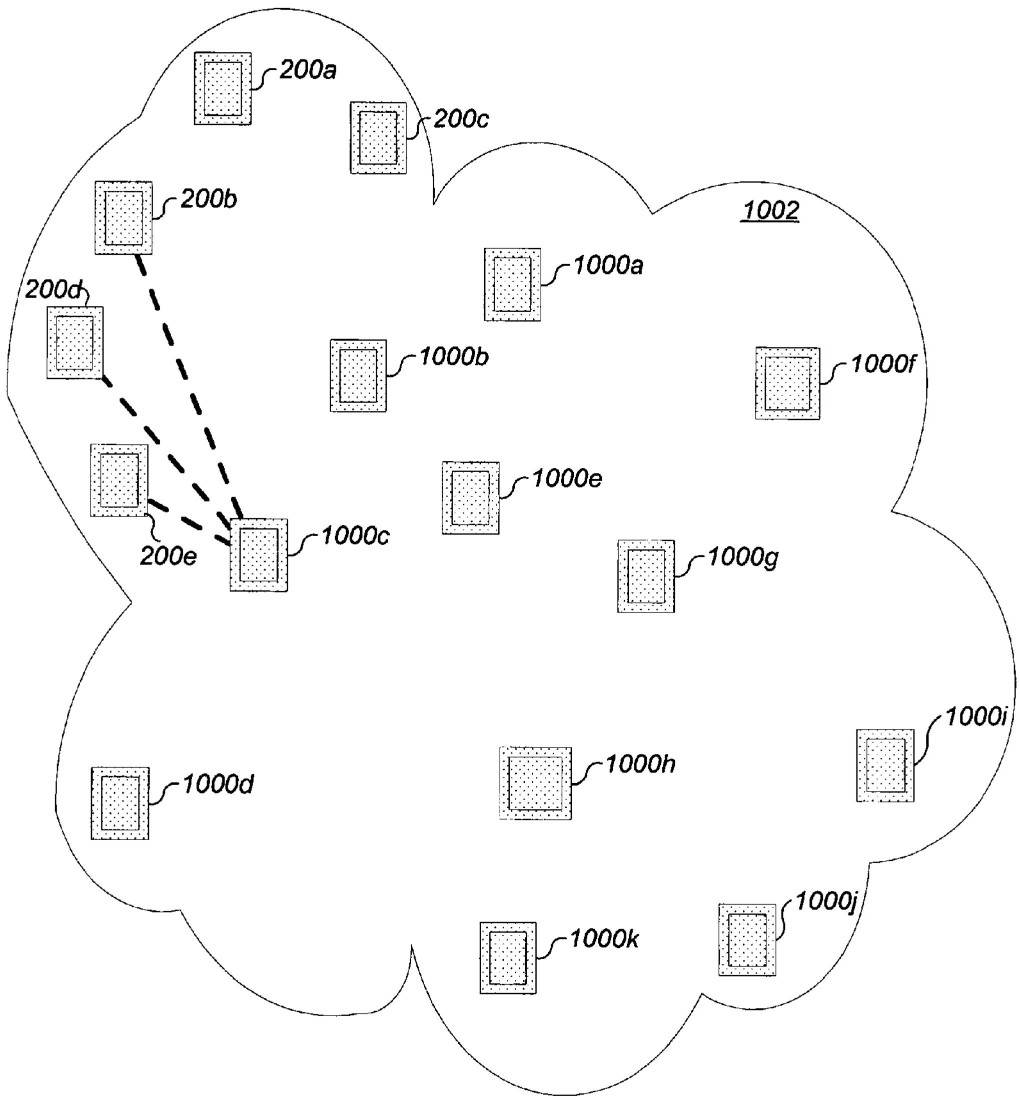

FIGS. 10A and 10B depict an illustration of a Locatable Network expanse (LN-Expanse) 1002 for describing locating of an ILM with all DLMs. With reference now to FIG. 10A, DLM 200*a*, DLM 200*b*, DLM 200*c*, DLM 200*d*, and DLM 200*e* (referred to generally in FIGS. 10A and 10B discussions as DLMs 200) are each automatically and directly located, for example using any of the automatic location technologies heretofore described. ILM 1000*b* is automatically located using the reference locations of DLM 200*b*, DLM 200*c*, and DLM 200*e*. DLMs 200 can be mobile while providing reference locations for automatically determining the location of ILM 1000*b*. Timely communications between MSs is all that is required for indirectly locating MSs. In some embodiments, DLMs 200 are used to triangulate the position of ILM 1000*b* using aforementioned wave spectrum(s) reasonable for the MSs. Different triangulation embodiments can triangulate the location of ILM 1000*b* using TDOA, AOA, or MPT, preferably by the ILM 1000*b* seeking to be located. In other embodiments, TDOA information is used to determine how close ILM 1000*b* is to a DLM for associating the ILM at the same location of a DLM, but with how close nearby. In other embodiments, an ILM is located by simply being in communications range to another MS. DLMs 200 can be referenced for determining elevation of an ILM. The same automatic location technologies used to locate a DLM can be used to automatically locate an ILM, except the DLMs are mobile and serve as the reference points. It is therefore important that DLM locations be timely known when references are needed for locating ILMs. Timely ILM interactions with other MSs, and protocol considerations are discussed in architecture 1900 below. DLMs 200*b*, 200*c*, and 200*e* are preferably selected for locating ILM 1000*b* by their WDR high confidence values, however any other WDR data may be used whereby wave spectrum, channel signal strength, time information, nearness, surrounded-ness, etc is considered for generating a confidence field 1100*d* of the WDR 1100 for the located ILM. Preferably, those considerations are factored into a confidence value, so that confidence values can be completely relied upon.

With reference now to FIG. 10B, ILM 1000*c* has been located relative a plurality of DLMs, namely DLM 200*b*, DLM 200*d*, and DLM 200*e*. ILM 1000*c* is located analogously to ILM 1000*b* as described for FIG. 10A, except there are different DLMs involved with doing the locating of ILM 1000*c* because of a different location of ILM 1000*c*. FIGS. 10A and 10B illustrate that MSs can be located using other MSs, rather than fixed stationary references described for FIGS. 2A through 9B. ILM 1000*b* and ILM 1000*c* are indirectly located using DLMs 200.

Figure 10C:
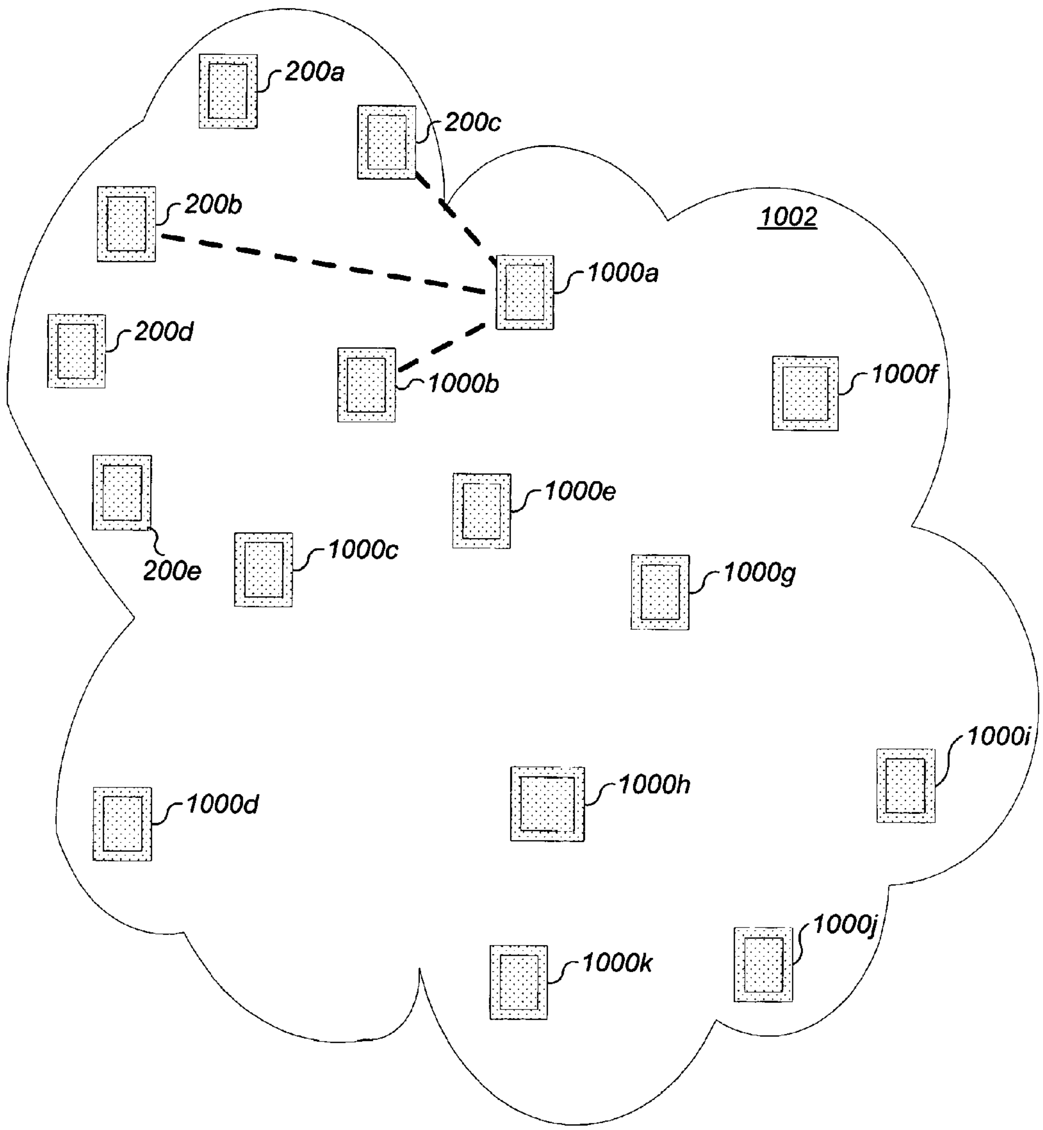
FIG. 10C depicts an illustration of a Locatable Network expanse (LN-Expanse) for describing locating of an ILM with an ILM and DLM.

FIG. 10C depicts an illustration of a Locatable Network expanse (LN-Expanse) 1002 for describing locating of an ILM with an ILM and DLM. ILM 1000*a* is automatically located using the reference locations of DLM 200*c*, DLM 200*b*, and ILM 1000*b*. DLM 200*b*, DLM 200*c* and ILM 1000*b* can be mobile while providing reference locations for automatically determining the location of ILM 1000*a*. In some embodiments, MSs are used to triangulate the position of ILM 1000*a* using any of the aforementioned wave spectrum(s) (e.g. WiFi, cellular radio, etc) reasonable for the MSs. Different triangulation embodiments can triangulate the location of ILM 1000*a* using TDOA, AOA, or MPT, preferably by the ILM 1000*a* seeking to be located. In other embodiments, TDOA information is used to determine how close ILM 1000*a* is to a MS (DLM or ILM) for associating the ILM at the same location of a MS, but with how close nearby. In other embodiments, an ILM is located by simply being in communications range to another MS. DLMs or ILMs can be referenced for determining elevation of ILM 1000*a*. The same automatic location technologies used to locate a MS (DLM or ILM) are used to automatically locate an ILM, except the MSs are mobile and serve as the reference points. It is therefore important that MS (ILM and/or DLM) locations be timely known when references are needed for locating ILMs. Timely ILM interactions with other MSs, and protocol considerations are discussed in architecture 1900 below. DLM 200*b*, DLM 200*c*, and ILM 1000*b* are preferably selected for locating ILM 1000*a* by their WDR high confidence values, however any other WDR data may be used whereby wave spectrum, channel signal strength, time information, nearness, surrounded-ness, etc is considered for generating a confidence field 1100*d* of the WDR 1100 for the located ILM. Preferably, those considerations were already factored into a confidence value so that confidence values can be completely relied upon. ILM 1000*a* is indirectly located using DLM(s) and ILM(s).

Figure 10D:
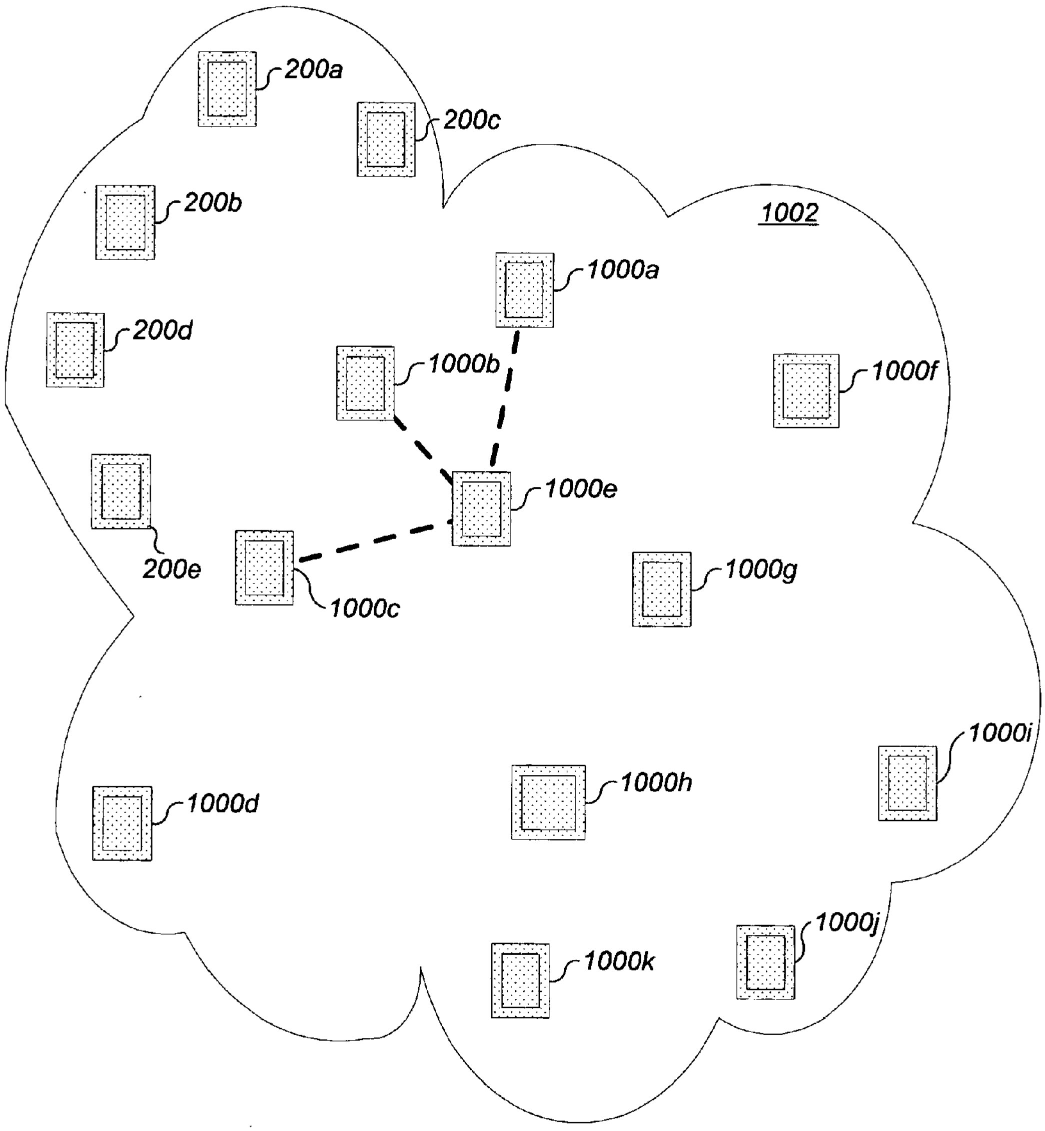
FIGS. 10D, 10E, and 10F depict an illustration of a Locatable Network expanse (LN-Expanse) for describing locating of an ILM with all ILMs.
Figure 10E:
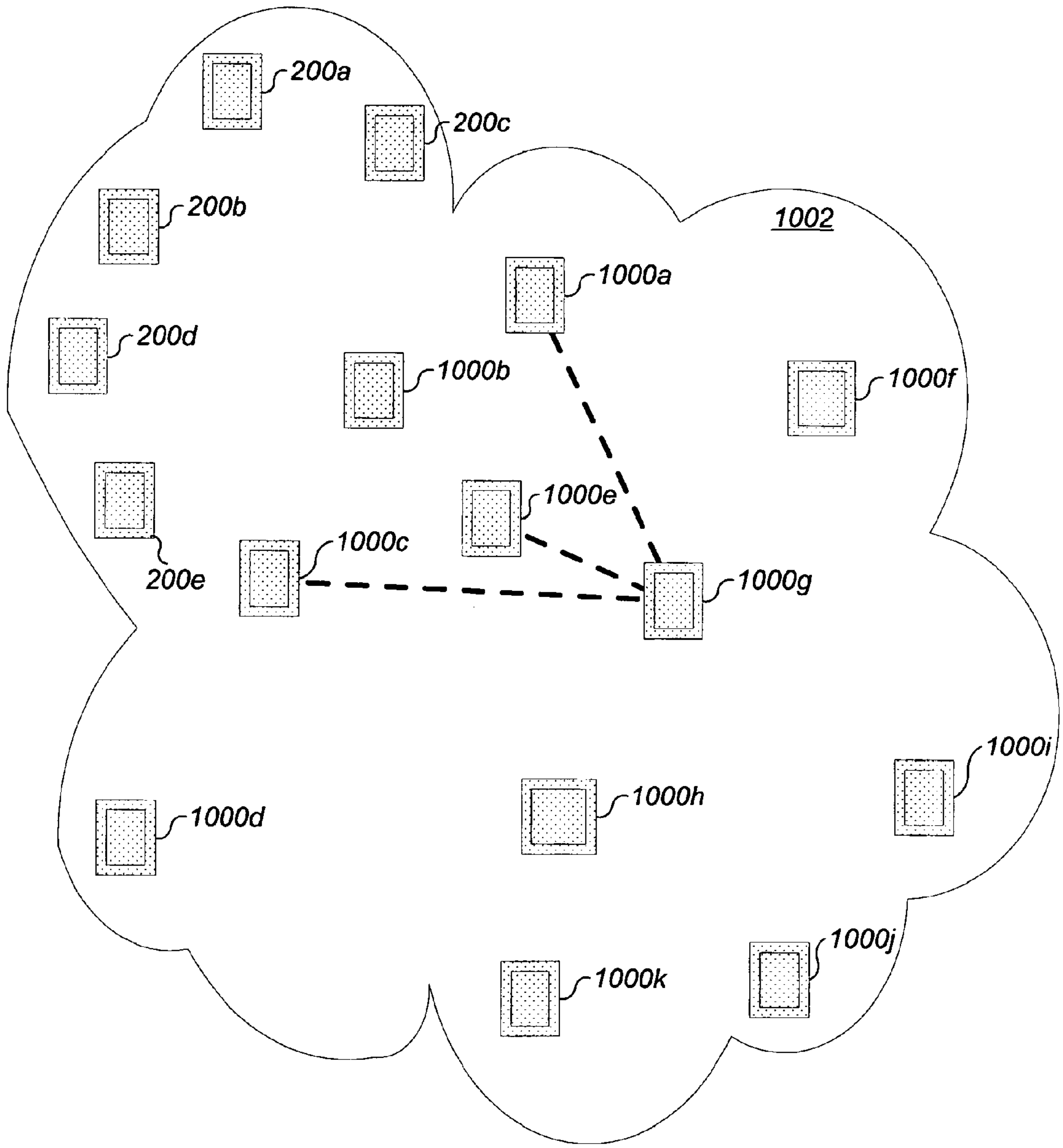
Figure 10F:
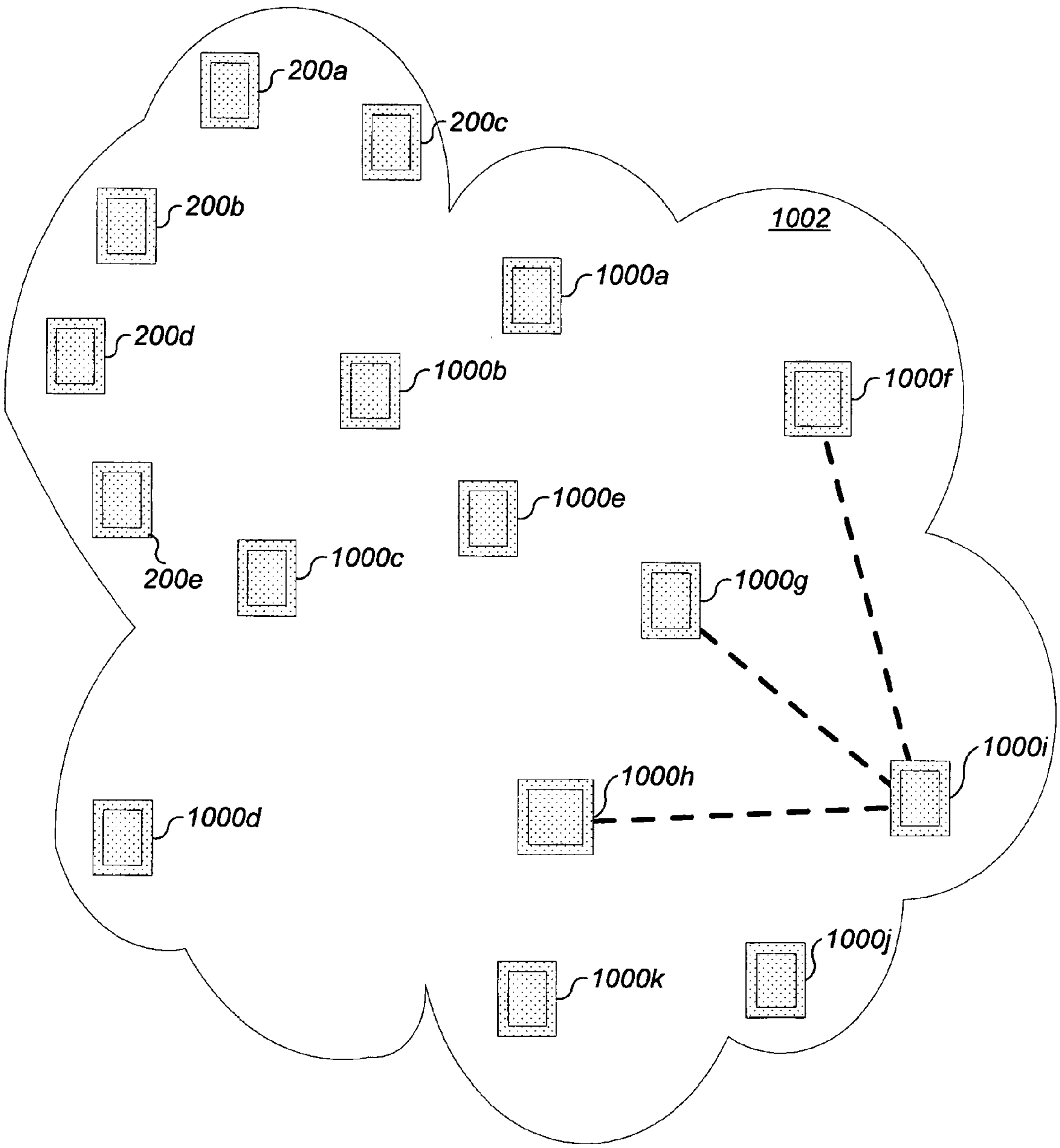

FIGS. 10D, 10E, and 10F depict an illustration of a Locatable Network expanse (LN-Expanse) 1002 describing locating of an ILM with all ILMs. With reference now to FIG. 10D, ILM 1000*e* is automatically located using the reference locations of ILM 1000*a*, ILM 1000*b*, and ILM 1000*c*. ILM 1000*a*, ILM 1000*b* and ILM 1000*c* can be mobile while providing reference locations for automatically determining the location of ILM 1000*e*. Timely communications between MSs is all that is required. In some embodiments, MSs are used to triangulate the position of ILM 1000*e* using any of the aforementioned wave spectrum(s) reasonable for the MSs. Different triangulation embodiments can triangulate the location of ILM 1000*e* using TDOA, AOA, or MPT processing (relative ILMs 1000*a* through 1000*c*), preferably by the ILM 1000*e* seeking to be located. ILMs can be referenced for determining elevation of ILM 1000*e*. The same automatic location technologies used to locate a MS (DLM or ILM) are used to automatically locate an ILM, except the MSs are mobile and serve as the reference points. It is therefore important that ILM locations be timely known when references are needed for locating ILMs. Timely ILM interactions with other MSs, and protocol considerations are discussed in architecture 1900 below. ILM 1000*a*, ILM 1000*b*, and ILM 1000*c* are preferably selected for locating ILM 1000*e* by their WDR high confidence values, however any other WDR data may be used whereby wave spectrum, channel signal strength, time information, nearness, surrounded-ness, etc is considered for generating a confidence field 1100*d* of the WDR 1100 for the located ILM. Preferably, those considerations were already factored into a confidence value so that confidence values can be completely relied upon. ILM 1000*e* is indirectly located using ILM 1000*a*, ILM 1000*b*, and ILM 1000*c*.

With reference now to FIG. 10E, ILM 1000*g* is automatically located using the reference locations of ILM 1000*a*, ILM 1000*c*, and ILM 1000*e*. ILM 1000*a*, ILM 1000*c* and ILM 1000*e* can be mobile while providing reference locations for automatically determining the location of ILM 1000*g*. ILM 1000*g* is located analogously to ILM 1000*e* as described for FIG. 10D, except there are different ILMs involved with doing the locating of ILM 1000*g* because of a different location of ILM 1000*g*. Note that as ILMs are located in the LN-expanse 1002, the LN-expanse expands with additionally located MSs.

With reference now to FIG. 10F, ILM 1000*i* is automatically located using the reference locations of ILM 1000*f*, ILM 1000*g*, and ILM 1000*h*. ILM 1000*f*, ILM 1000*g* and ILM 1000*h* can be mobile while providing reference locations for automatically determining the location of ILM 1000*i*. ILM 1000*i* is located analogously to ILM 1000*e* as described for FIG. 10D, except there are different ILMs involved with doing the locating of ILM 1000*i* because of a different location of ILM 1000*i*. FIGS. 10D through 10F illustrate that an MS can be located using all ILMs, rather than all DLMs (FIGS. 10A and 10B), a mixed set of DLMs and ILMs (FIG. 10C), or fixed stationary references (FIGS. 2A through 9B). ILMs 1000*e*, 1000*g*, and 1000*i* are indirectly located using ILMs. Note that in the FIG. 10 illustrations the LN-expanse 1002 has expanded down and to the right from DLMs directly located up and to the left. It should also be noted that locating any MS can be done with at least one other MS. Three are not required as illustrated. It is preferable that triangulation references used surround an MS.

Figure 10G:
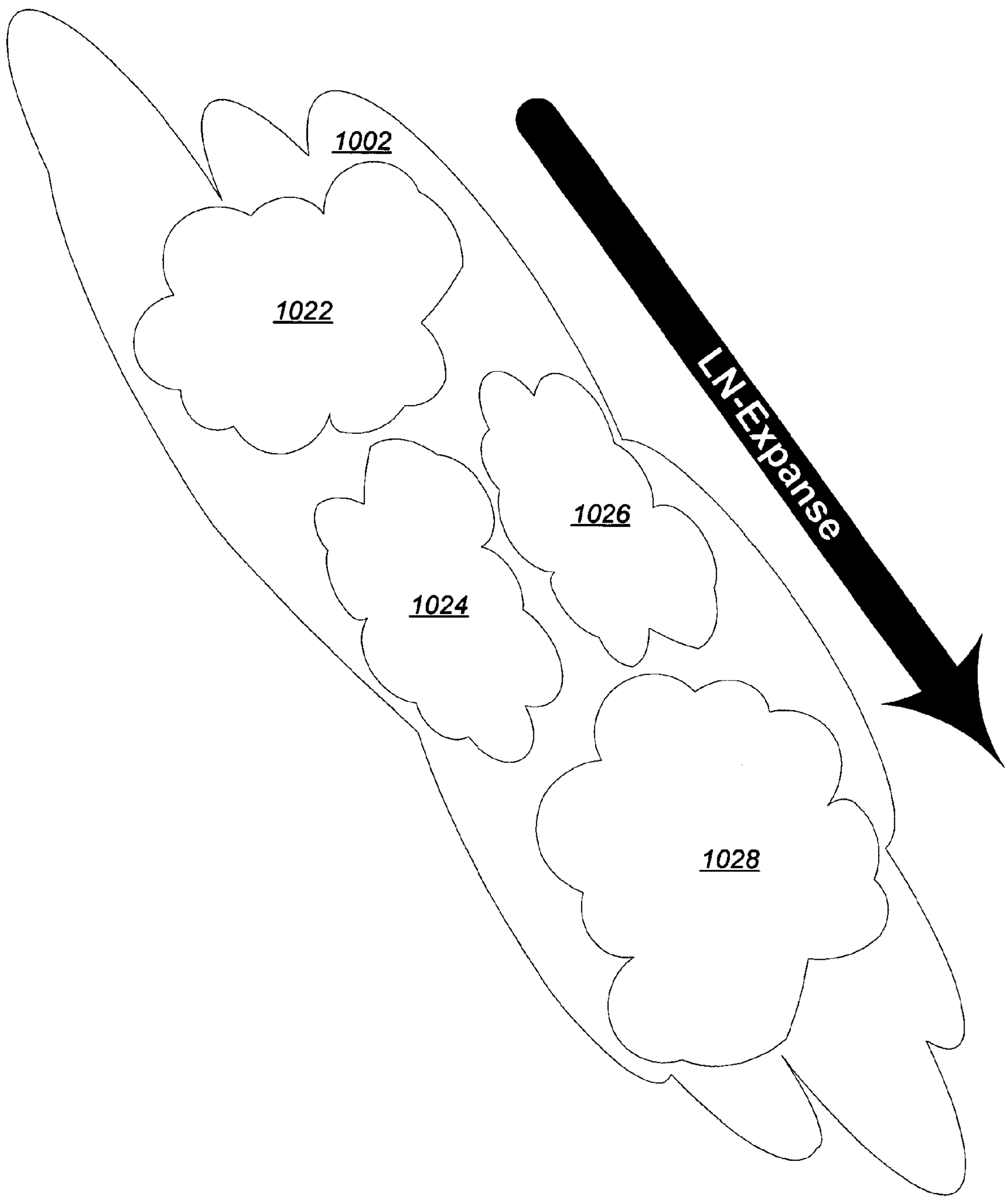
FIGS. 10G and 10H depict an illustration for describing the infinite reach of a Locatable Network expanse (LN-Expanse) according to MSs.
Figure 10H:
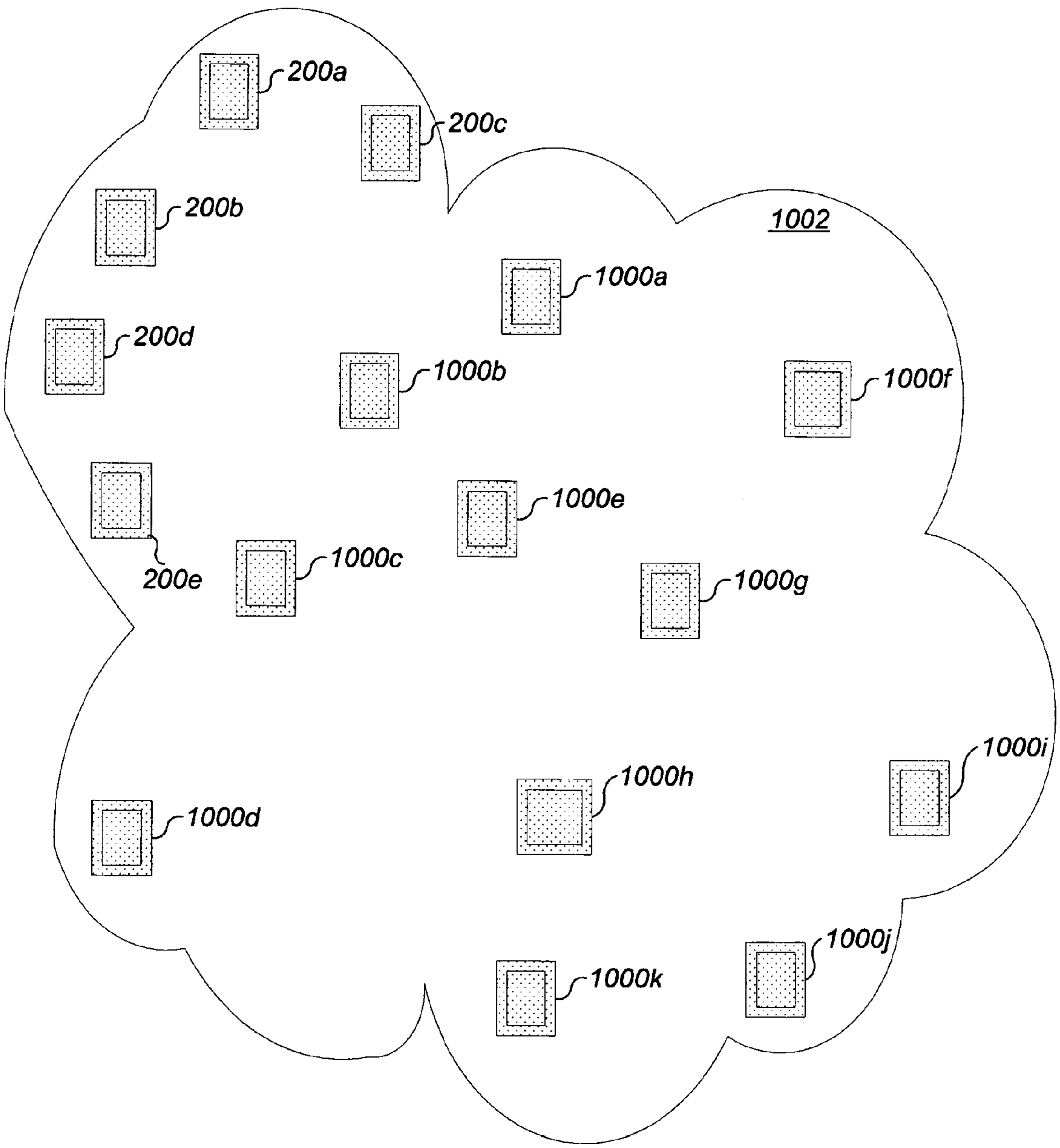

FIGS. 10G and 10H depict an illustration for describing the reach of a Locatable Network expanse (LN-Expanse) according to MSs. Location confidence will be dependent on the closest DLMs, how stale an MS location becomes for serving as a reference point, and how timely an MS refreshes itself with a determined location. An MS preferably has highest available processing speed with multithreaded capability in a plurality of hardware processors and/or processor cores. A substantially large number of high speed concurrent threads of processing that can occur within an MS provides for an optimal capability for being located quickly among its peer MSs, and for serving as a reference to its peer MSs. MS processing described in flowcharts herein assumes multiple threads of processing with adequate speed to accomplish an optimal range in expanding the LN-Expanse 1002.

With reference now to FIG. 10G, an analysis of an LN-Expanse 1002 will contain at least one DLM region 1022 containing a plurality of DLMs, and at least one DLM indirectly located region 1024 containing at least one ILM that has been located with all DLMs. Depending on the range, or scope, of an LN-Expanse 1002, there may be a mixed region 1026 containing at least one ILM that has been indirectly located by both an ILM and DLM, and there may be an exclusive ILM region 1028 containing at least one ILM that has been indirectly located by all ILMs. The further in distance the LN-Expanse has expanded from DLM region 1022 with a substantial number of MSs, the more likely there will an exclusive ILM region 1028. NTP may be available for use in some regions, or some subset of a region, yet not available for use in others. NTP is preferably used where available to minimize communications between MSs, and an MS and service(s). An MS has the ability to make use of NTP when available.

With reference now to FIG. 10H, all MSs depicted know their own locations. The upper left-hand portion of the illustration consists of region 1022. As the reader glances more toward the rightmost bottom portion of the illustration, there can be regions 1024 and regions 1026 in the middle of the illustration. At the very rightmost bottom portion of the illustration, remaining ILMs fall in region 1028. An ILM is indirectly located relative all DLMs, DLMs and ILMs, or all ILMs. An "Affirmifier" in a LN-expanse confidently knows its own location and can serve as a reference MS for other MSs. An affirmifier is said to "affirmify" when in the act of serving as a reference point to other MSs. A "Pacifier" can contribute to locating other systems, but with a low confidence of its own whereabouts. The LN-Expanse is a network of located/locatable MSs, and is preferably expanded by a substantial number of affirmifiers.

Figure 10I:
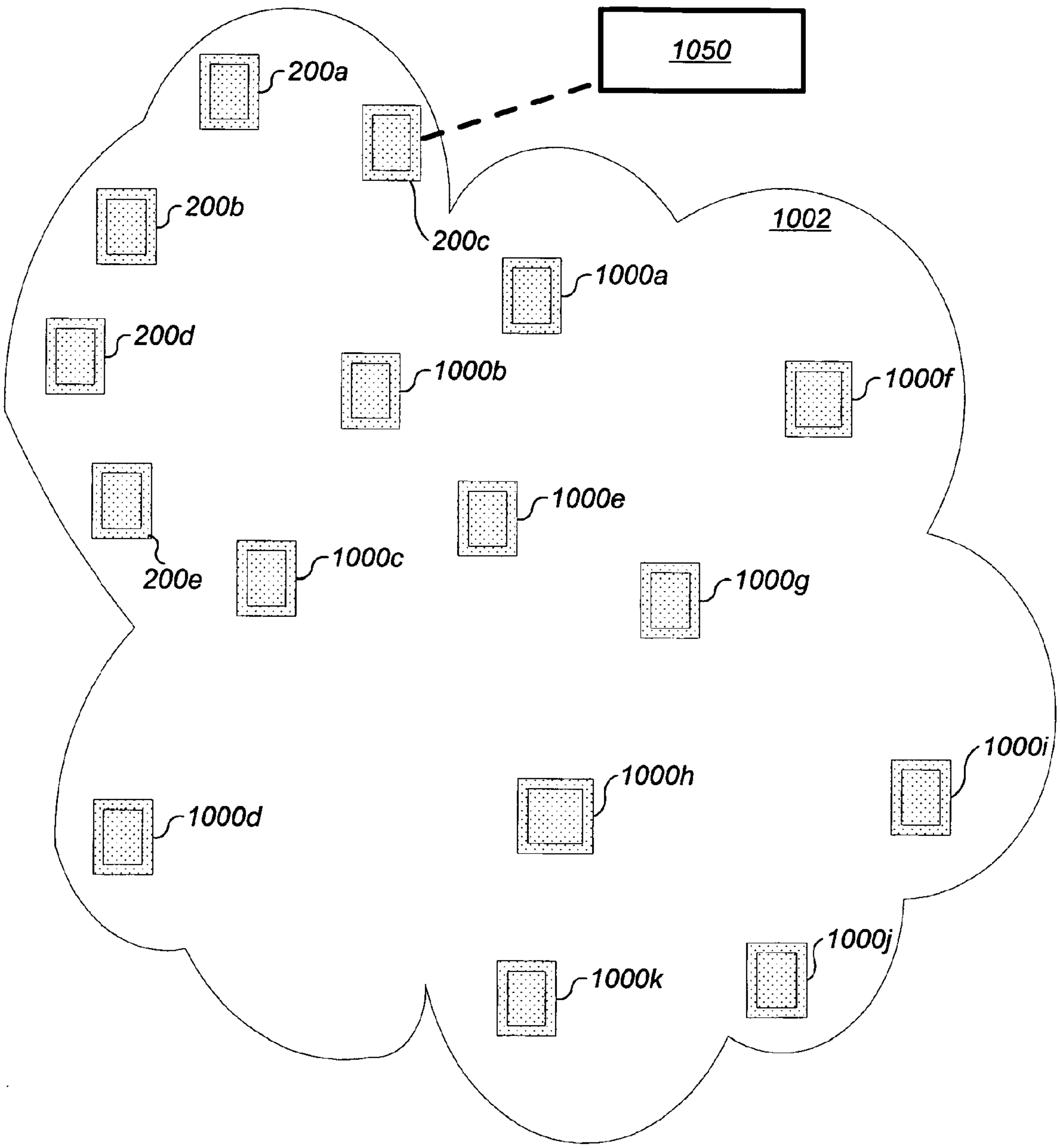
FIG. 10I depicts an illustration of a Locatable Network expanse (LN-Expanse) for describing a supervisory service.

FIG. 10I depicts an illustration of a Locatable Network expanse (LN-Expanse) for describing a supervisory service, for example supervisory service 1050. References in flowcharts for communicating information to a supervisory service can refer to communicating information to supervisory service 1050 (e.g. blocks 294 and 296 from parameters passed to block 272 for many processing flows). The only requirement is that supervisory service 1050 be contactable from an MS (DLM or ILM) that reports to it. An MS reporting to service 1050 can communicate directly to it, through another MS (i.e. a single hop), or through a plurality of MSs (i.e. a plurality of hops). Networks of MSs can be preconfigured, or dynamically reconfigured as MSs travel to minimize the number of hops between a reporting MS and service 1050. A purely peer to peer preferred embodiment includes a peer to peer network of located/locatable MSs that interact with each other as described herein. The purely peer to peer preferred embodiment may have no need to include a service 1050. Nevertheless, a supervisory service may be warranted to provide certain processing centralization, or for keeping information associated with MSs. In some embodiments, supervisory service 1050 includes at least one database to house data (e.g. data 8; data 20; data 36; data 38, queue data 22, 24, 26; and/or history 30) for any subset of MSs which communicate with it, for example to house MS whereabouts information.

FIG. 11A depicts a preferred embodiment of a Whereabouts Data Record (WDR) 1100 for discussing operations of the present disclosure. A Whereabouts Data Record (WDR) 1100 may also be referred to as a Wireless Data Record (WDR) 1100. A WDR takes on a variety of formats depending on the context of use. There are several parts to a WDR depending on use. There is an identity section which contains a MS ID field 1100*a* for identifying the WDR. Field 1100*a* can contain a null value if the WDR is for whereabouts information received from a remote source which has not identified itself. MSs do not require identities of remote data processing systems in order to be located. There is a core section which is required in WDR uses. The core section includes date/time stamp field 1100*b*, location field 1100*c*, and confidence field 1100*d*. There is a transport section of fields wherein any one of the fields may be used when communicating WDR information between data processing systems. Transport fields include correlation field 1100*m*, sent date/time stamp field 1100*n*, and received date/time stamp field 1100*p*. Transport fields may also be communicated to send processing (e.g. queue 24), or received from receive processing (e.g. queue 26). Other fields are of use depending on the MS or applications thereof, however location technology field 1100*e* and location reference info field 1100*f* are of particular interest in carrying out additional novel functionality of the present disclosure. Communications reference information field 1100*g* may be valuable, depending on communications embodiments in the LN-expanse.

Some fields are multi-part fields (i.e. have sub-fields). Whereabouts Data Records (WDRs) 1100 may be fixed length records, varying length records, or a combination with field(s) in one form or the other. Some WDR embodiments will use anticipated fixed length record positions for subfields that can contain useful data, or a null value (e.g. −1). Other WDR embodiments may use varying length fields depending on the number of sub-fields to be populated. Other WDR embodiments will use varying length fields and/or sub-fields which have tags indicating their presence. Other WDR embodiments will define additional fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments).

When a WDR is referenced in this disclosure, it is referenced in a general sense so that the contextually reasonable subset of the WDR of FIG. 11A is used. For example, when communicating WDRs (sending/receiving data 1302 or 1312) between data processing systems, a reasonable subset of WDR 1100 is communicated in preferred embodiments as described with flowcharts. When a WDR is maintained to queue 22, preferably most (if not all) fields are set for a complete record, regardless if useful data is found in a particular field (e.g. some fields may be null (e.g. −1)). Most importantly, Whereabouts Data Records (WDRs) are maintained to queue 22 for maintaining whereabouts of the MS which owns queue 22. LBX is most effective the more timely (and continuous) a MS has valid whereabouts locally maintained. WDRs are designed for maintaining whereabouts information independent of any location technology applied. Over time, a MS may encounter a plurality of location technologies used to locate it. WDRs maintained to a first MS queue 22 have the following purpose:

1) Maintain timely DLM whereabouts information of the first MS independent of any location technology applied;
2) Maintain whereabouts information of nearby MSs independent of any location technology applied;
3) Provide DLM whereabouts information to nearby MSs for determining their own locations (e.g. provide whereabouts information to at least a second MS for determining its own location);
4) Maintain timely ILM whereabouts information of the first MS independent of any location technology applied; and
5) Provide ILM whereabouts information to nearby MSs so they can determine their own locations (e.g. first MS providing whereabouts information to at least a second MS for the second MS determining its own whereabouts).

A MS may go in and out of DLM or ILM roles as it is mobile. Direct location methods are not always available to the MS as it roams, therefore the MS preferably does all of 1 through 5 above. When the WDR 1100 contains a MS ID field 1100*a* matching the MS which owns queue 22, that WDR contains the location (location field 1100*c*) with a specified confidence (field 1100*d*) at a particular time (date/time stamp field 1100*b*) for that MS. Preferably the MS ID field 1100*a*, date/time stamp field 1100*b* and confidence field 1100*d* is all that is required for searching from the queue 22 the best possible, and most timely, MS whereabouts at the time of searching queue 22. Other embodiments may consult any other fields to facilitate the best possible MS location at the time of searching and/or processing queue 22. The WDR queue 22 also maintains affirmifier WDRs, and acceptable confidence pacifier WDRs (block 276), which are used to calculate a WDR having matching MS field 1100*a* so the MS knows its whereabouts via indirect location methods. Affirmifier and pacifier WDRs have MS ID field 1100*a* values which do not match the MS owning queue 22. This distinguishes WDRs of queue 22 for A) accessing the current MS location; from B) the WDRs from other MSs. All WDR fields of affirmifier and pacifier originated WDRs are of importance for determining a best location of the MS which owns queue 22, and in providing LBX functionality.

MS ID field 1100*a* is a unique handle to an MS as previously described. Depending on the installation, MS ID field 1100*a* may be a phone #, physical or logical address, name, machine identifier, serial number, encrypted identifier, concealable derivative of a MS identifier, correlation, pseudo MS ID, or some other unique handle to the MS. An MS must be able to distinguish its own unique handle from other MS handles in field 1100*a*. For indirect location functionality disclosed herein, affirmifier and pacifier WDRs do not need to have a correct originating MS ID field 1100*a*. The MS ID may be null, or anything to distinguish WDRs for MS locations.

However, to accomplish other LBX features and functionality, MS Identifiers (MS IDs) of nearby MSs (or unique correlations thereof) maintained in queue 22 are to be known for processing by an MS. MS ID field 1100*a* may contain a group identifier of MSs in some embodiments for distinguishing between types of MSs (e.g. to be treated the same, or targeted with communications, as a group), as long as the MS containing queue 22 can distinguish its own originated WDRs 1100. A defaulted value may also be set for a "do not care" setting (e.g. null).

Date/Time stamp field 1100*b* contains a date/time stamp of when the WDR record 1100 was completed by an MS for its own whereabouts prior to WDR queue insertion. It is in terms of the date/time scale of the MS inserting the local WDR (NTP derived or not). Date/Time stamp field 1100*b* may also contain a date/time stamp of when the WDR record 1100 was determined for the whereabouts of an affirmifier or pacifier originating record 1100 to help an MS determine its own whereabouts, but it should still be in terms of the date/time scale of the MS inserting the local WDR (NTP derived or not) to prevent time conversions when needed, and to promote consistent queue 22 searches/sorts/etc. The date/time stamp field 1100*b* should use the best possible granulation of time, and may be in synch with other MSs and data processing systems according to NTP. A time zone, day/light savings time, and NTP indicator is preferably maintained as part of field 1100*b*. The NTP indicator (e.g. bit) is for whether or not the date/time stamp is NTP derived (e.g. the NTP use setting is checked for setting this bit when completing the WDR for queue 22 insertion). In some embodiments, date/time stamp field 1100*b* is measured in the same granulation of time units to an atomic clock available to MSs of an LN-Expanse 1002. When NTP is used in a LN-Expanse, identical time server sources are not a requirement provided NTP derived date/time stamps have similar accuracy and dependability.

Location field 1100*c* depends on the installation of the present disclosure, but can include a latitude and longitude, cellular network cell identifier, geocentric coordinates, geodetic coordinates, three dimensional space coordinates, area described by GPS coordinates, overlay grid region identifier or coordinates, GPS descriptors, altitude/elevation (e.g. in lieu of using field 1100*j*), MAPSCO reference, physical or logical network address (including a wildcard (e.g. ip addresses 145.32.*.*)), particular address, polar coordinates, or any other two/three dimensional location methods/means used in identifying the MS location. Data of field 1100*c* is preferably a consistent measure (e.g. all latitude and longitude) for all location technologies that populate WDR queue 22. Some embodiments will permit using different measures to location field 1100*c* (e.g. latitude and longitude for one, address for another; polar coordinates for another, etc) which will be translated to a consistent measure at appropriate processing times.

Confidence field 1100*d* contains a value for the confidence that location field 1100*c* accurately describes the location of the MS when the WDR is originated by the MS for its own whereabouts. Confidence field 1100*d* contains a value for the confidence that location field 1100*c* accurately describes the location of an affirmifier or pacifier that originated the WDR. A confidence value can be set according to known timeliness of processing, communications and known mobile variables (e.g. MS speed, heading, yaw, pitch, roll, etc) at the time of transmission. Confidence values should be standardized for all location technologies used to determine which location information is of a higher/lower confidence when using multiple location technologies (as determined by fields 1100*e* and 1100*f*) for enabling determination of which data is of a higher priority to use in determining whereabouts. Confidence value ranges depend on the implementation. In a preferred embodiment, confidence values range from 1 to 100 (as discussed previously) for denoting a percentage of confidence. 100% confidence indicates the location field 1100*c* is guaranteed to describe the MS location. 0% confidence indicates the location field 1100*c* is guaranteed to not describe the MS location. Therefore, the lowest conceivable value of a queue 22 for field 1100*d* should be 1. Preferably, there is a lowest acceptable confidence floor value configured (by system, administrator, or user) as used at points of queue entry insertion—see block 276 to prevent frivolous data to queue 22. In most cases, WDRs 1100 contain a confidence field 1100*d* up to 100. In confidence value preferred embodiments, pacifiers know their location with a confidence of less than 75, and affirmifiers know their location with a confidence value 75 or greater. The confidence field is skewed to lower values as the LN-expanse 1002 is expanded further from region 1022. Confidence values are typically lower when ILMs are used to locate a first set of ILMs (i.e. first tier), and are then lower when the first set of ILMs are used to locate a second set of ILMs (second tier), and then lower again when the second set of ILMs are used to locate a third set of ILMs (third tier), and so on. Often, examination of a confidence value in a WDR 1100 can indicate whether the MS is a DLM, or an ILM far away from DLMs, or an MS which has been located using accurate (high confidence) or inaccurate (low confidence) locating techniques.

Location Technology field 1100*e* contains the location technology used to determine the location of location field 1100*c*. An MS can be located by many technologies. Location Technology field 1100*e* can contain a value from a row of FIG. 9A or any other location technology used to locate a MS. WDRs inserted to queue 22 for MS whereabouts set field 1100*e* to the technology used to locate the MS. WDRs inserted to queue 22 for facilitating a MS in determining whereabouts set field 1100*e* to the technology used to locate the affirmifier or pacifier. Field 1100*e* also contains an originator indicator (e.g. bit) for whether the originator of the WDR 1100 was a DLM or ILM. When received from a service that has not provided confidence, this field may be used by a DLM to determine confidence field 1100*d*.

Location Reference Info field 1100*f* preferably contains one or more fields useful to locate a MS in processing subsequent of having been inserted to queue 22. In other embodiments, it contains data that contributed to confidence determination. Location Reference Info field 1100*f* may contain information (TDOA measurement and/or AOA measurement—see inserted field 1100*f* for FIGS. 2D, 2E and 3C) useful to locate a MS in the future when the WDR originated from the MS for its own whereabouts. Field 1100*f* will contain selected triangulation measurements, wave spectrum used and/or particular communications interfaces 70, signal strength(s), TDOA information, AOA information, or any other data useful for location determination. Field 1100*f* can also contain reference whereabouts information (FIG. 3C) to use relative a TDOA or AOA (otherwise WDR location field assumed as reference). In one embodiment, field 1100*f* contains the number of DLMs and ILMs which contributed to calculating the MS location to break a tie between using WDRs with the same confidence values. In another embodiment, a tier of ILMs used to locate the MS is maintained so there is an accounting for the number of ILMs in the LN-expanse between the currently located MS and a DLM. In other embodiments, MS heading, yaw, pitch and roll, or accelerometer values are maintained therein, for example for antenna AOA positioning. When wave spectrum frequencies or other wave characteristics have changed in a transmission used for calculating a TDOA measurement, appropriate information may be carried along, for example to properly convert a time into a distance. Field 1100*f* should be used to facilitate correct measurements and uses, if needed conversions have not already taken place.

Communications reference information field 1100*g* is a multipart record describing the communications session, channel, and bind criteria between the MS and MSs, or service(s), that helped determine its location. In some embodiments, field 1100*g* contains unique MS identifiers, protocol used, logon/access parameters, and useful statistics of the MSs which contributed to data of the location field 1100*c*. An MS may use field 1100*g* for WDRs originated from affirmifiers and pacifiers for subsequent LBX processing.

Speed field 1100*h* contains a value for the MS speed when the WDR is originated by the MS for its own whereabouts. Speed field 1100*d* may contain a value for speed of an affirmifier or pacifier when the WDR was originated elsewhere. Speed is maintained in any suitable units.

Heading field 1100*i* contains a value for the MS heading when the WDR is originated by the MS for its own whereabouts. Heading field 1100*i* may contain a value for heading of an affirmifier or pacifier when the WDR was originated elsewhere. Heading values are preferably maintained in degrees up to 360 from due North, but is maintained in any suitable directional form.

Elevation field 1100*j* contains a value for the MS elevation (or altitude) when the WDR is originated by the MS for its own whereabouts. Elevation field 1100*j* may contain a value for elevation (altitude) of an affirmifier or pacifier when the WDR was originated elsewhere. Elevation (or altitude) is maintained in any suitable units.

Application fields 1100*k* contains one or more fields for describing application(s) at the time of completing, or originating, the WDR 1100. Application fields 1100*k* may include field(s) for:

a) MS Application(s) in use at time;
b) MS Application(s) context(s) in use at time;
c) MS Application(s) data for state information of MS Application(s) in use at time;
d) MS Application which caused WDR 1100;
e) MS Application context which caused WDR 1100;
f) MS Application data for state information of MS Application which caused WDR 1100;
g) Application(s) in use at time of remote MS(s) involved with WDR;
h) Application(s) context(s) in use at time of remote MS(s) involved with WDR;
i) MS Application(s) data for state information of remote MS(s) involved with WDR;
j) Remote MS(s) criteria which caused WDR 1100;
k) Remote MS(s) context criteria which caused WDR 1100;
l) Remote MS(s) data criteria which caused WDR 1100;
m) Application(s) in use at time of service(s) involved with WDR;
n) Application(s) context(s) in use at time of service(s) involved with WDR;
o) MS Application(s) data for state information of service(s) involved with WDR;
p) Service(s) criteria which caused WDR 1100;
q) Service(s) context criteria which caused WDR 1100;
r) Service(s) data criteria which caused WDR 1100;
s) MS navigation APIs in use;
t) Web site identifying information;
u) Physical or logical address identifying information;
v) Situational location information as described in U.S. Pat. Nos. 6,456,234; 6,731,238; 7,187,997 (Johnson);
w) Transactions completed at a MS;
x) User configurations made at a MS;
y) Environmental conditions of a MS;
z) Application(s) conditions of a MS;
aa) Service(s) conditions of a MS;
bb) Date/time stamps (like field 1100*b*) with, or for, any item of a) through aa); and/or
cc) Any combinations of a) through bb).

Correlation field 1100*m* is optionally present in a WDR when the WDR is in a transmission between systems (e.g. wireless communications) such as in data 1302 or 1312. Field 1100*m* provides means for correlating a response to an earlier request, or to correlate a response to an earlier broadcast. Correlation field 1100*m* contains a unique handle. In a LN-expanse which globally uses NTP, there is no need for correlation in data 1302 or 1312. Correlation field 1100*m* may be present in WDRs of queues 24 or 26. Alternatively, a MS ID is used for correlation.

Sent date/time stamp field 1100*n* is optionally present in a WDR when the WDR is in transmission between systems (e.g. wireless communications) such as in data 1302 or 1312. Field 1100*n* contains when the WDR was transmitted. A time zone, day/light savings time, and NTP indicator is preferably maintained as part of field 1100*n*. Field 1100*n* is preferably not present in WDRs of queue 22 (but can be if TDOA measurement calculation is delayed to a later time). In some embodiments, there is no need for field 1100*n*. Whereabouts determined for MSs of an LN-Expanse may be reasonably timely, facilitating simplicity of setting outbound field 1100*b* to the transmission date/time stamp at the sending data processing system, rather than when the WDR was originally completed for whereabouts (e.g. when substantially the same time anyway). Sent date/time field 1100*n* may be present in WDRs of queues 24 or 26.

Received date/time stamp field 1100*p* is preferably present in a WDR when inserted to queue 26 by receiving thread(s) upon received data 1302 or 1312. Field 1100*p* contains when the WDR was received by the MS. A time zone, day/light savings time, and NTP indicator is preferably maintained as part of field 1100*p*. Field 1100*p* is preferably not present in WDRs of queue 22 (but can be if TDOA measurement calculation is delayed to a later time). In some embodiments, there is no need for field 1100*p*. For example, thread(s) 1912 may be listening directly on applicable channel(s) and can determine when the data is received. In another embodiment, thread(s) 1912 process fast enough to determine the date/time stamp of when data 1302 or 1312 is received since minimal time has elapsed between receiving the signal and determining when received. In fact, known processing duration between when received and when determined to be received can be used to correctly alter a received date/time stamp. Received date/time stamp field 1100*p* is preferably added to records placed to queue 26 by receiving thread(s) feeding queue 26.

Any fields of WDR 1100 which contain an unpredictable number of subordinate fields of data preferably use a tagged data scheme, for example an X.409 encoding for a Token, Length, and Value (called a TLV encoding). Therefore, a WDR 1100, or field therein, can be a variable sized record. For example, Location Reference info field 1100*f* may contain TTA, 8, 0.1456 where the Token="TTA" for Time Till Arrival (TDOA measurement between when sent and when received), Length=8 for 8 bytes to follow, and Value=0.1456 in time units contained within the 8 bytes; also SS, 4, 50 where Token="Signal Strength", 4=4 for 4 bytes to follow, and Value=50 dBu for the signal strength measurement. This allows on-the-fly parsing of unpredictable, but interpretable, multipart fields. The TLV encoding also enables-on-the-fly configuration for parsing new subordinate fields to any WDR 1100 field in a generic implementation, for example in providing parse rules to a Lex and Yacc implementation, or providing parse rules to a generic top down recursive TLV encoding parser and processor.

Any field of WDR 1100 may be converted: a) prior to insertion to queue 22; or b) after access to queue 22; or c) by queue 22 interface processing; for standardized processing. Any field of WDR 1100 may be converted when sending/receiving/broadcasting, or related processing, to ensure a standard format. Other embodiments will store and access values of WDR 1100 field(s) which are already in a standardized format. WDR 1100 fields can be in any order, and a different order when comparing what is in data transmitted versus data maintained to queue 22.

An alternate embodiment to WDRs maintained to queue 22 preserves transport fields 1100*m*, 1100*n* and/or 1100*p*, for example for use on queue 22. This would enable 1952 thread(s) to perform TDOA measurements that are otherwise calculated in advance and kept in field 1100*f*. However, queue 22 size should be minimized and the preferred embodiment uses transport fields when appropriate to avoid carrying them along to other processing.

Figure 11B:
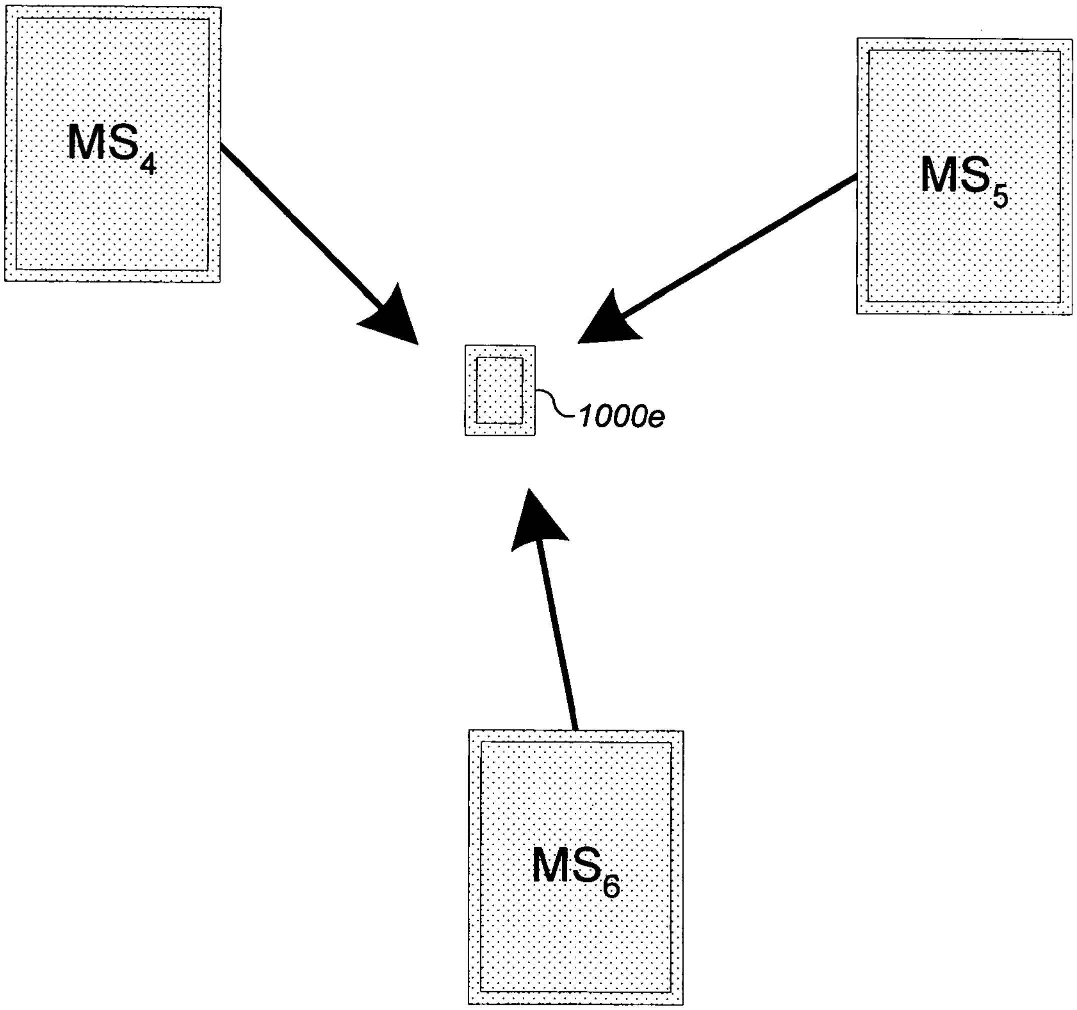
FIGS. 11B, 11C and 11D depict an illustration for describing various embodiments for determining the whereabouts of an MS.
Figure 11C:
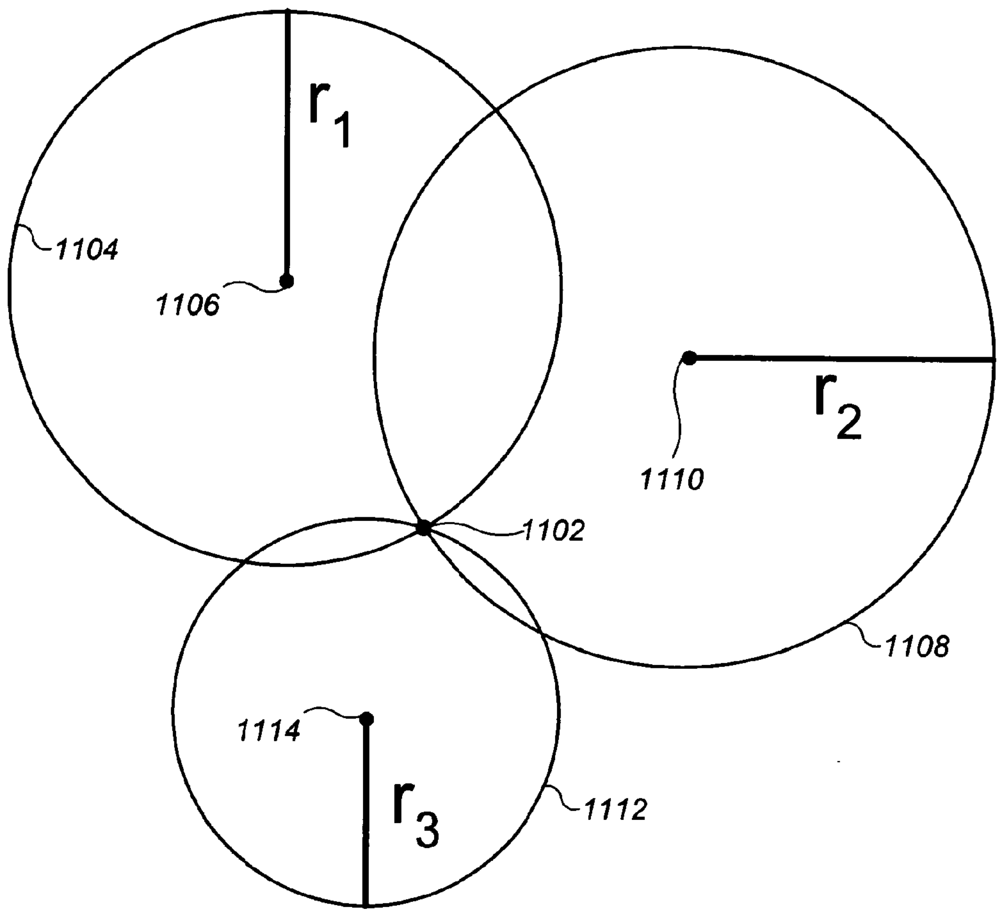
Figure 11D:
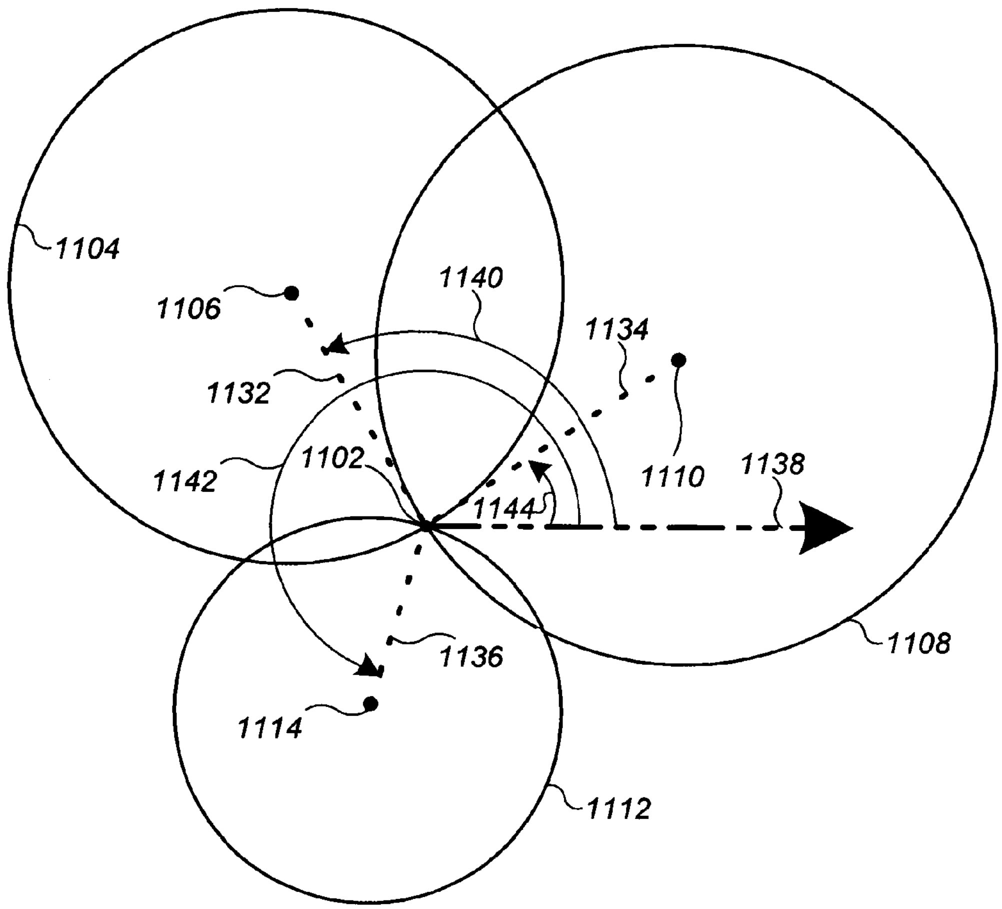

FIGS. 11B, 11C and 11D depict an illustration for describing various embodiments for determining the whereabouts of an MS, for example an ILM 1000*e*. With reference now to FIG. 11B, a MS 1000*e* location is located by using locations of three (3) other MSs: $MS_4$, $MS_5$, and $MS_6$ (referred to generally as $MS_j$). $MS_j$ are preferably located with a reasonably high level of confidence. In some embodiments, $MS_j$ are all DLMs. In some embodiments, $MS_j$ are all ILMs. In some embodiments, $MS_j$ are mixed DLMs and ILMs. Any of the MSs may be mobile during locating of MS 1000*e*. Wave spectrums in use, rates of data communications and MS processing speed, along with timeliness of processing described below, provide timely calculations for providing whereabouts of ILM 1000*e* with a high level of confidence. The most confident MSs ($MS_j$) were used to determine the MS 1000*e* whereabouts. For example, $MS_j$ were all located using a form of GPS, which in turn was used to triangulate the whereabouts of MS 1000*e*. In another example, $MS_4$ was located by a form of triangulation technology, $MS_5$ was located by a form of "coming into range" technology, and $MS_6$ was located by either of the previous two, or some other location technology. It is not important how an MS is located. It is important that each MS know its own whereabouts and maintain a reasonable confidence to it, so that other MSs seeking to be located can be located relative highest confidence locations available. The WDR queue 22 should always contain at least one entry indicating the location of the MS 2 which owns WDR queue 22. If there are no entries contained on WDR queue 22, the MS 2 does not know its own location.

With reference now to FIG. 11C, a triangulation of MS 1000*e* at location 1102 is explained using location (whereabouts) 1106 of $MS_4$, location (whereabouts) 1110 of $MS_5$, and location (whereabouts) 1114 of $MS_6$. Signal transmission distance from $MS_j$ locations are represented by the radiuses, with $r_1$ the TDOA measurement (time difference between when sent and when received) between $MS_4$ and MS 1000*e*, with $r_2$ the TDOA measurement (time difference between when sent and when received) between $MS_5$ and MS 1000*e*, with $r_3$ the TDOA measurement (time difference between when sent and when received) between $MS_6$ and MS 1000*e*. In this example, the known locations of $MS_j$ which are used to determine the location of MS 1000*e* allow triangulating the MS 1000*e* whereabouts using the TDOA measurements. In fact, less triangular data in the illustration can be necessary for determining a highly confident whereabouts of MS 1000*e*.

With reference now to FIG. 11D, a triangulation of MS 1000*e* at location 1102 is explained using location (whereabouts) 1106 of $MS_4$, location (whereabouts) 1110 of $MS_5$, and location (whereabouts) 1114 of $MS_6$. In some embodiments, AOA measurements taken at a positioned antenna of MS 1000*e* at location 1102 are used relative the whereabouts 1106, whereabouts 1110, whereabouts 1114 (AOA 1140, AOA 1144 and AOA 1142), wherein AOA measurements are detected for incoming signals during known values for MS heading 1138 with MS yaw, pitch, and roll (or accelerometer readings). AOA triangulation is well known in the art. Line segment 1132 represents the direction of signal arrival to the antenna at whereabouts 1102 from $MS_4$ at whereabouts 1106. Line segment 1134 represents the direction of signal arrival to the antenna at whereabouts 1102 from $MS_5$ at whereabouts 1110. Line segment 1136 represents the direction of signal arrival to the antenna at whereabouts 1102 from $MS_6$ at whereabouts 1114. In this example, the known locations of $MS_j$ which are used to determine the location of MS 1000*e* allow triangulating the MS 1000*e* whereabouts using the AOA measurements. In fact, less triangular data in the illustration can be necessary for determining a highly confident whereabouts of MS 1000*e*. Alternative embodiments will use AOA measurements of outbound signals from the MS at whereabouts 1102 detected at antennas of whereabouts 1106 and/or 1110 and/or 1114.

Missing Part Triangulation (MPT)

FIGS. 11C and 11D illustrations can be used in a complementary manner when only one or two TDOA measurements are available and/or not all stationary locations, or MS reference locations, are known at the time of calculation. Another example is when only one or two AOA angles is available and/or not all stationary locations, or MS reference locations, are known at the time of calculation. However, using what is available from each technology in conjunction with each other allows solving the MS whereabouts (e.g. blocks 952/954 processing above). MPT is one example of solving for missing parts using more than one location technology. Condition of data known for locating a MS (e.g. whereabouts 1106, 1110 and 1114) may be the following:

1) AAS=two angles and a side;
2) ASA=two angles and a common side;
3) SAS=two sides and the included angle; or
4) SSA=two sides and a non-included angle.

TDOA measurements are distances (e.g. time difference between when sent and when received), and AOA measurements are angles. Each of the four conditions are recognized (e.g. block 952 above), and data is passed for each of the four conditions for processing (e.g. block 954 above). For AAS (#1) and ASA (#2), processing (e.g. block 954) finds the third angle by subtracting the sum of the two known angles from 180 degrees (i.e. using mathematical law that triangles' interior angles add up to 180 degrees), and uses the mathematical law of Sines (i.e. a/sin A=b/sin B=c/sin C) twice to find the second and third sides after plugging in the knowns and solving for the unknowns. For SAS (#3), processing (e.g. block 954) uses the mathematical law of Cosines (i.e. $a^2=b^2+c^2-2bc\cos A$) to find the third side, and uses the mathematical law of Sines (sin A/a=sin B/b=sin C/c (derived from law of Sines above)) to find the second angle. For SSA (#4), processing (e.g. block 954) uses the mathematical law of Sines (i.e. (sin A/a=sin B/b=sin C/c) twice to get the second angle, and mathematical law of Sines (a/sin A=b/sin B=c/sin C) to get the third side. Those skilled in the art recognize other useful trigonometric functions and formulas, and similar uses of the same trigonometric functions, for MPT depending on what data is known. The data discovered and processed depends on an embodiment, what reference locations are available, and which parts are missing for MPT. MPT uses different distances (time used to determine length in TDOA) and/or angles (from AOA or TDOA technologies) for deducing a MS location confidently (e.g. MPT). Even a single AOA measurement from a known reference location (stationary or MS) with a single TDOA measurement relative that reference location can be used to confidently locate a MS, and triangulation measurements used to deduce a MS location need not be from the same location technologies or wave spectrums. Those skilled in the art recognize that having known reference locations facilitates requiring less triangular information for deducing a MS location confidently. MPT examples include using information from any aforementioned wave spectrums, or any heterogeneous combinations thereof, for example to leverage useful, or available, data from different wave spectrums and/or location technologies (see heterogeneous locating discussions).

Figure 11E:
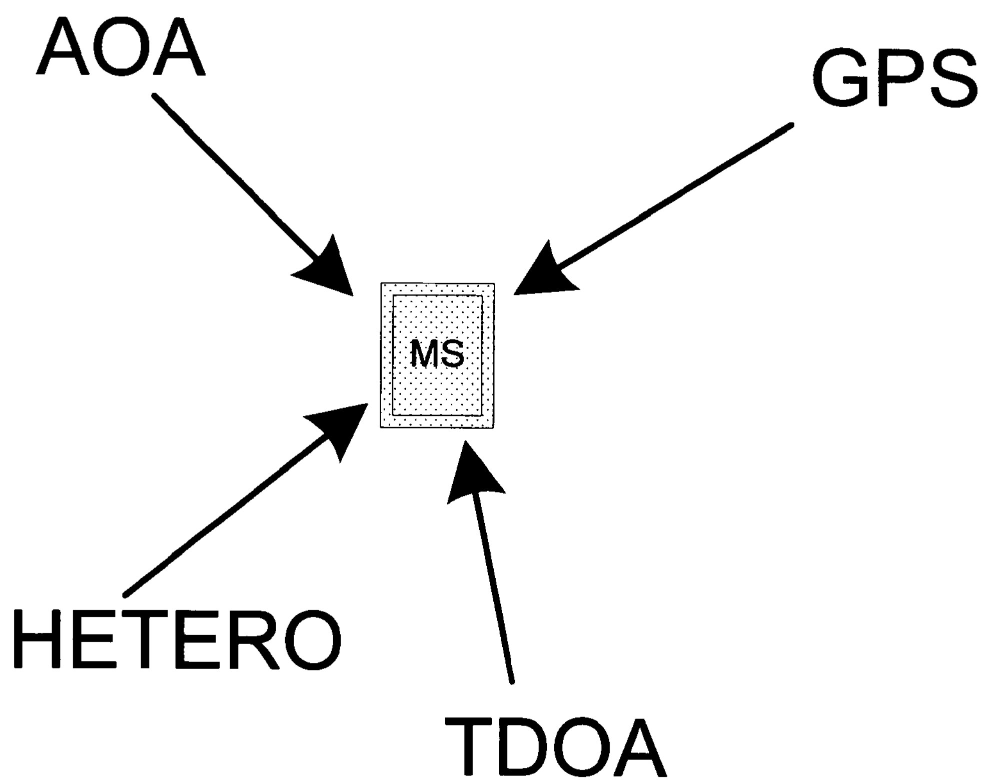
FIG. 11E depicts an illustration for describing various embodiments for automatically determining the whereabouts of an MS.

FIG. 11E depicts an illustration for describing various embodiments for automatically determining the location of an MS. An MS can be located relative other MSs which were located using any of a variety of location technologies, for example any of those of FIG. 9A. An MS is heterogeneously located when one of the following conditions are met:

- More than one location technology is used during travel of the MS;
- More than one location technology is used to determine a single whereabouts of the MS;
- MPT is used to locate the MS; and/or
- ADLT is used to locate the MS.

The WDR queue 22 and interactions between MSs as described below cause the MS to be heterogeneously located without special consideration to any particular location technology. While WDR 1100 contains field 1100*e*, field 1100*d* provides a standard and generic measurement for evaluating WDRs from different location technologies, without concern for the location technology used. The highest confidence entries to a WDR queue 22 are used regardless of which location technology contributed to the WDR queue 22.

LBX Configuration

Figure 12:
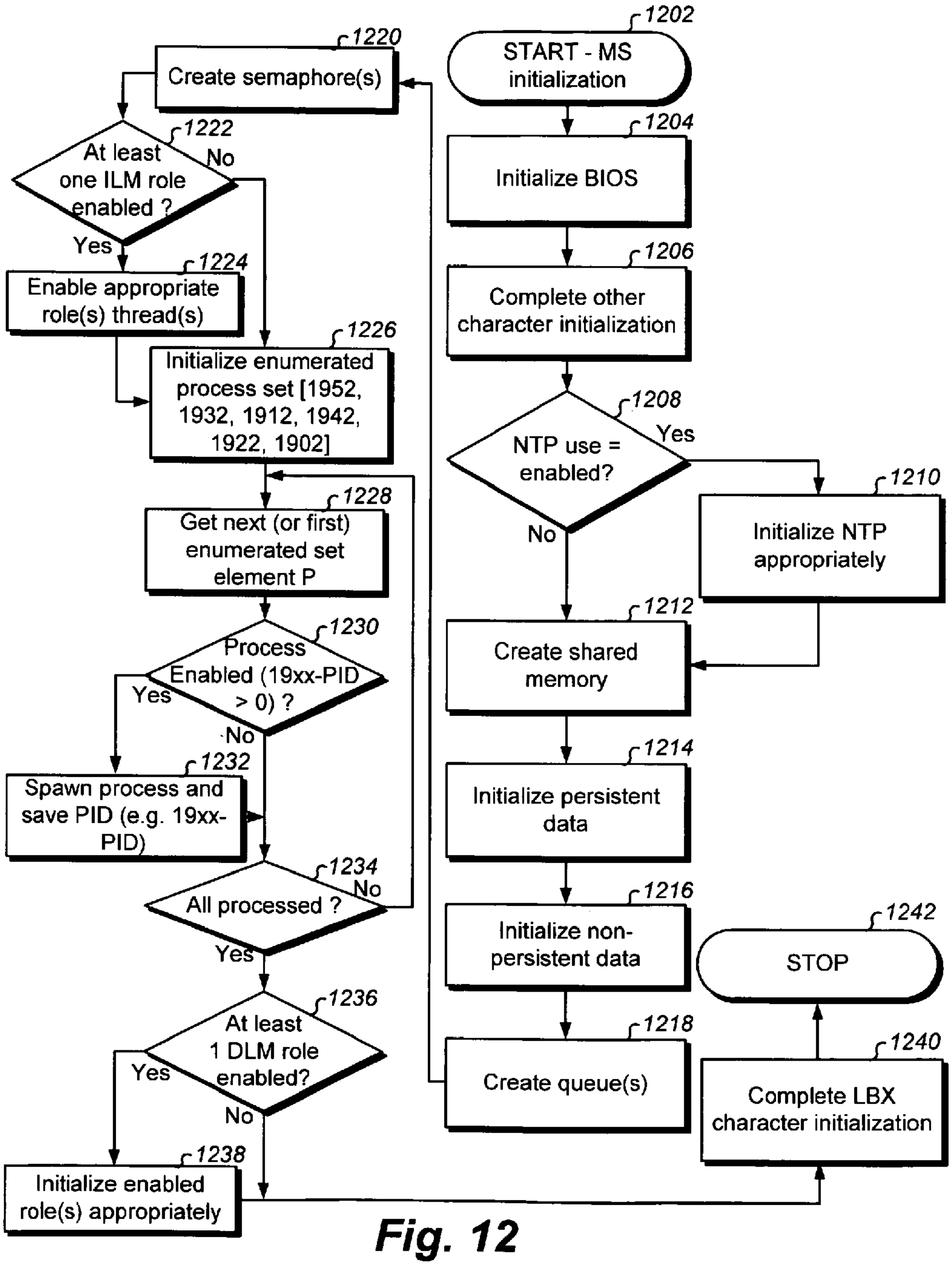
FIG. 12 depicts a flowchart for describing an embodiment of MS initialization processing.

FIG. 12 depicts a flowchart for describing an embodiment of MS initialization processing. Depending on the MS, there are many embodiments of processing when the MS is powered on, started, restarted, rebooted, activated, enabled, or the like. FIG. 12 describes the blocks of processing relevant to the present disclosure as part of that initialization processing. It is recommended to first understand discussions of FIG. 19 for knowing threads involved, and variables thereof. Initialization processing starts at block 1202 and continues to block 1204 where the MS Basic Input Output System (BIOS) is initialized appropriately, then to block 1206 where other character 32 processing is initialized, and then to block 1208 to check if NTP is enabled for this MS. Block 1206 may start the preferred number of listen/receive threads for feeding queue 26 and the preferred number of send threads for sending data inserted to queue 24, in particular when transmitting CK 1304 embedded in usual data 1302 and receiving CK 1304 or 1314 embedded in usual data 1302 or 1312, respectively. The number of threads started should be optimal for parallel processing across applicable channel(s). In this case, other character 32 threads are appropriately altered for embedded CK processing (sending at first opportune outbound transmission; receiving in usual inbound transmission).

If block 1208 determines NTP is enabled (as defaulted or last set by a user (i.e. persistent variable)), then block 1210 initializes NTP appropriately and processing continues to block 1212. If block 1208 determines NTP was not enabled, then processing continues to block 1212. Block 1210 embodiments are well known in the art of NTP implementations (also see block 1626). Block 1210 may cause the starting of thread(s) associated with NTP. In some embodiments, NTP use is assumed in the MS. In other embodiments, appropriate NTP use is not available to the MS. Depending on the NTP embodiment, thread(s) may pull time synchronization information, or may listen for and receive pushed time information. Resources 38 (or other MS local resource) provides interface to an MS clock for referencing, maintaining, and generating date/time stamps at the MS. After block 1210 processing, the MS clock is synchronized to NTP. Because of initialization of the MS in FIG. 12, block 1210 may rely on a connected service to initially get the startup synchronized NTP date/time. MS NTP processing will ensure the NTP enabled/disabled variable is dynamically set as is appropriate (using semaphore access) because an MS may not have continuous clock source access during travel when needed for resynchronization. If the MS does not have access to a clock source when needed, the NTP use variable is disabled. When the MS has (or again gets) access to a needed clock source, then the NTP use variable is enabled.

Thereafter, block 1212 creates shared memory to maintain data shared between processes/threads, block 1214 initializes persistent data to shared memory, block 1216 initializes any non-persistent data to shared memory (e.g. some statistics 14), block 1218 creates system queues, and block 1220 creates semaphore(s) used to ensure synchronous access by concurrent threads to data in shared memory, before continuing to block 1222. Shared memory data accesses appropriately utilize semaphore lock windows (semaphore(s) created at block 1220) for proper access. In one embodiment, block 1220 creates a single semaphore for all shared memory accesses, but this can deteriorate performance of threads accessing unrelated data. In the preferred embodiment, there is a semaphore for each reasonable set of data of shared memory so all threads are fully executing whenever possible. Persistent data is that data which maintains values during no power, for example as stored to persistent storage 60. This may include data 8 (including permissions 10, charters 12, statistics 14, service directory 16), data 20, LBX history 30, data 36, resources 38, and/or other data. Persistent data preferably includes at least the DLMV (see DLM role(s) list Variable below), ILMV (see ILM role(s) list Variable below), process variables 19xx-Max values (19xx=1902, 1912, 1922, 1932, 1942 and 1952 (see FIG. 19 discussions below)) for the last configured maximum number of threads to run in the respective process, process variables 19xx-PID values (19xx=1902, 1912, 1922, 1932, 1942 and 1952 (see FIG. 19 discussions below)) for multi-purpose of: a) holding an Operating System Process Identifier (i.e. O/S PID) for a process started; and b) whether or not the respective process was last enabled (i.e. PID>0) or disabled (i.e. PID<=0), the confidence floor value (see FIG. 14A), the WTV (see Whereabouts Timeliness Variable (see FIG. 14A)), the NTP use variable (see FIG. 14A) for whether or not NTP was last set to disabled or enabled (used at block 1208), and the Source Periodicity Time Period (SPTP) value (see FIG. 14B). There are reasonable defaults for each of the persistent data prior to the first use of MS 2 (e.g. NTP use is disabled, and only becomes enabled upon a successful enabling of NTP at least one time). Non-persistent data may include data involved in some regard to data 8 (and subsets of permissions 10, charters 12, statistics 14, service directory 16), data 20, LBX history 30, data 36, resources 38, queues, semaphores, etc. Block 1218 creates queues 22, 24, and 26. Queues 1980 and 1990 are also created there if required. Queues 1980 and 1990 are not required when NTP is in use globally by participating data processing systems. Alternate embodiments may use less queues by threads sharing a queue and having a queue entry type field for directing the queue entry to the correct thread. Alternate embodiments may have additional queues for segregating entries of a queue disclosed for best possible performance. Other embodiments incorporate queues figuratively to facilitate explanation of interfaces between processing.

All queues disclosed herein are understood to have their own internally maintained semaphore for queue accesses so that queue insertion, peeking, accessing, etc uses the internally maintained semaphore to ensure two or more concurrently executing threads do not corrupt or misuse data to any queue. This is consistent with most operating system queue interfaces wherein a thread stays blocked (preempted) after requesting a queue entry until a queue entry appears in the queue. Also, no threads will collide with another thread when inserting, peeking, or otherwise accessing the same queue. Therefore, queues are implicitly semaphore protected. Other embodiments may use an explicit semaphore protected window around queue data accessing, in which case those semaphore(s) are created at block 1220.

Thereafter, block 1222 checks for any ILM roles currently enabled for the MS (for example as determined from persistent storage of an ILM role(s) list Variable (ILMV) preferably preconfigured for the MS at first use, or configured as last configured by a user of the MS). ILM roles are maintained to the ILM role(s) list Variable (ILMV). The ILMV contains one or more entries for an ILM capability (role), each entry with a flag indicating whether it is enabled or disabled (marked=enabled, unmarked=disabled). If block 1222 determines there is at least one ILM role enabled (i.e. as marked by associated flag), then block 1224 artificially sets the corresponding 19xx-PID variables to a value greater than 0 for indicating the process(es) are enabled, and are to be started by subsequent FIG. 12 initialization processing. The 19xx-PID will be replaced with the correct Process Identifier (PID) upon exit from block 1232 after the process is started. Preferably, every MS can have ILM capability. However, a user may want to (configure) ensure a DLM has no ILM capability enabled (e.g. or having no list present). In some embodiments, by default, every MS has an unmarked list of ILM capability maintained to the ILMV for 1) USE DLM REFERENCES and 2) USE ILM REFERENCES. USE DLM REFERENCES, when enabled (marked) in the ILMV, indicates to allow the MS of FIG. 12 processing to determine its whereabouts relative remote DLMs. USE ILM REFERENCES, when enabled (marked) in the ILMV, indicates to allow the MS of FIG. 12 processing to determine its whereabouts relative remote ILMs. Having both list items marked indicates to allow determining MS whereabouts relative mixed DLMs and ILMs. An alternative embodiment may include a USE MIXED REFERENCES option for controlling the MS of FIG. 12 processing to determine its whereabouts relative mixed DLMs and/or ILMs. Alternative embodiments will enforce any subset of these options without exposing user configurations, for example on a MS without any means for being directly located.

For any of the ILMV roles of USE DLM REFERENCES, USE ILM REFERENCES, or both, all processes 1902, 1912, 1922, 1932, 1942 and 1952 are preferably started (i.e. 1902-PID, 1912-PID, 1922-PID, 1932-PID, 1942-PID and 1952-PID are artificially set at block 1224 to cause subsequent process startup at block 1232). Characteristics of an anticipated LN-expanse (e.g. anticipated location technologies of participating MSs, MS capabilities, etc) will start a reasonable subset of those processes with at least process 1912 started. Block 1224 continues to block 1226. If block 1222 determines there are no ILMV role(s) enabled, then block processing continues to block 1226.

Figure 19:
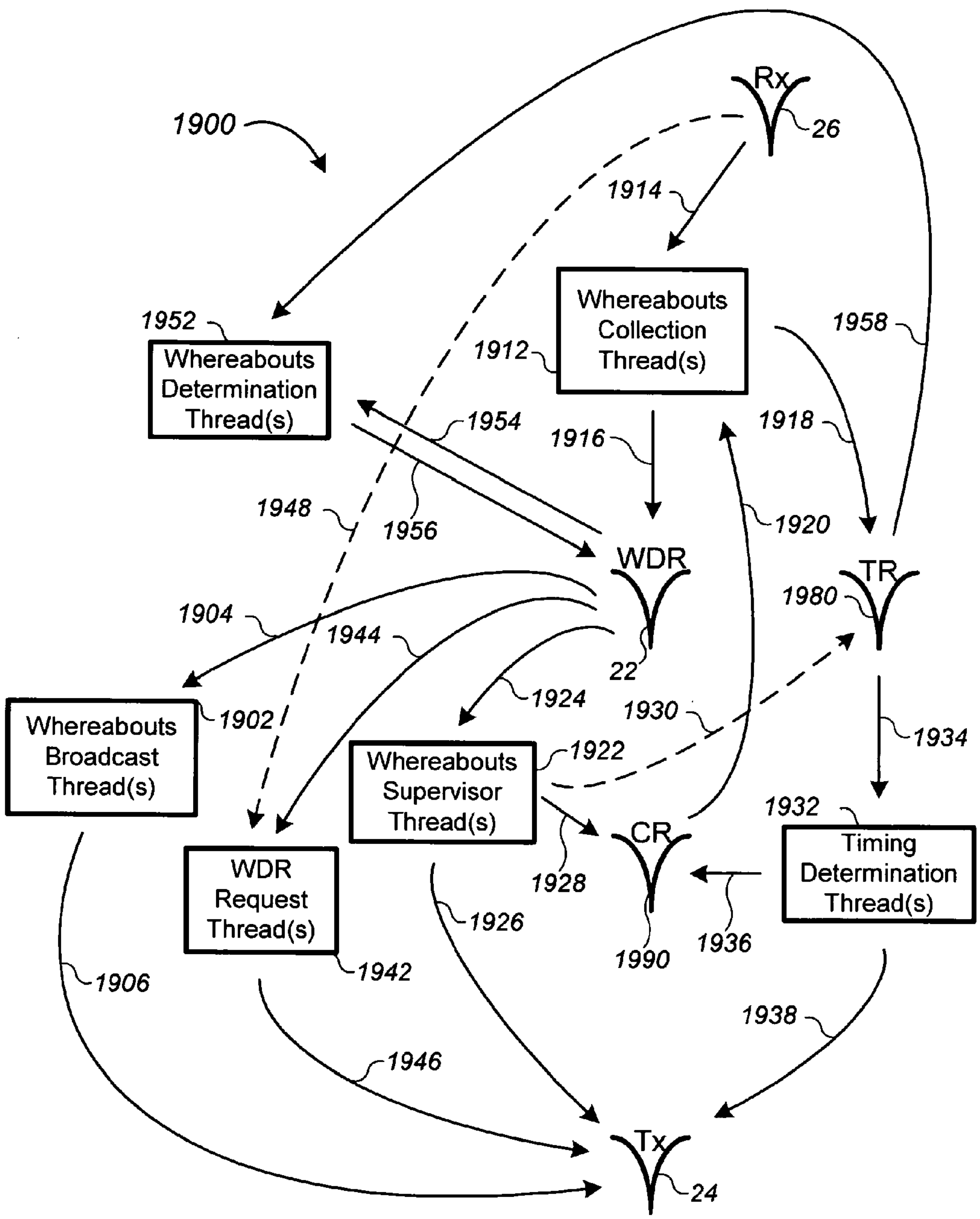
FIG. 19 depicts an illustration for describing a preferred embodiment multithreaded architecture of peer interaction processing of a MS in accordance with the present disclosure.

Block 1226 initializes an enumerated process name array for convenient processing reference of associated process specific variables described in FIG. 19, and continues to block 1228 where the first member of the set is accessed for subsequent processing. The enumerated set of process names has a prescribed start order for MS architecture 1900. Thereafter, if block 1230 determines the process identifier (i.e. 19xx-PID such that 19xx is 1902, 1912, 1922, 1932, 1942, 1952 in a loop iteration of blocks 1228 through 1234) is greater than 0 (e.g. this first iteration of 1952-PID>0 implies it is to be started here; also implies process 1952 is enabled as used in FIGS. 14A, 28, 29A and 29B), then block 1232 spawns (starts) the process (e.g. 1952) of FIG. 29A to start execution of subordinate worker thread(s) (e.g. process 1952 thread(s)) and saves the real PID (Process Identifier) to the PID variable (e.g. 1952-PID) returned by the operating system process spawn interface. Block 1232 passes as a parameter to the process of FIG. 29A which process name to start (e.g. 1952), and continues to block 1234. If block 1230 determines the current process PID variable (e.g. 1952-PID) is not greater than 0 (i.e. not to be started; also implies is disabled as used in FIGS. 14A, 28, 29A and 29B), then processing continues to block 1234. Block 1234 checks if all process names of the enumerated set (pattern of 19xx) have been processed (iterated) by blocks 1228 through 1234. If block 1234 determines that not all process names in the set have been processed (iterated), then processing continues back to block 1228 for handling the next process name in the set. If block 1234 determines that all process names of the enumerated set were processed, then block 1236 checks the DLMV (DLM role(s) list Variable). Blocks 1228 through 1234 iterate every process name of FIG. 19 to make sure that each is started in accordance with non-zero 19xx-PID variable values at FIG. 12 initialization.

Block 1236 checks for any DLM roles currently enabled for the MS (for example as determined from persistent storage of a DLM role(s) list Variable (DLMV) preferably preconfigured for the MS at first use if the MS contains DLM capability). DLM capability (roles), whether on-board at the MS, or determined during MS travels (see block 288), is maintained to the DLM role(s) list Variable (DLMV). The DLMV contains one or more entries for a DLM capability (role), each (role) entry with a flag indicating whether it is enabled or disabled (marked=enabled, unmarked=disabled). If block 1236 determines there is at least one DLM role enabled (i.e. as marked by associated flag), then block 1238 initializes enabled role(s) appropriately and processing continues to block 1240. Block 1238 may cause the starting of thread(s) associated with enabled DLM role(s), for DLM processing above (e.g. FIGS. 2A through 9B). Block 1238 may invoke API(s), enable flag(s), or initialize as is appropriate for DLM processing described above. Such initializations are well known in the art of prior art DLM capabilities described above. If block 1236 determines there are no DLM roles to initialize at the MS, then processing continues to block 1240. Any of the FIG. 9A technologies are eligible in the DLMV as determined to be present at the MS and/or as determined by historical contents of the WDR queue 22 (e.g. location technology field 1100*e* with MS ID field 1100*a* for this MS) and/or determined by LBX history 30. Application Programming Interfaces (APIs) may also be used to determine MS DLM capability (role(s)) for entry(s) to the DLMV.

Block 1240 completes LBX character initialization, and FIG. 12 initialization processing terminates thereafter at block 1242. Depending on what threads were started as part of block 1206, Block 1240 may startup the preferred number of listen/receive threads for feeding queue 26 and the preferred number of send threads for sending data inserted to queue 24, in particular when transmitting new data 1302 and receiving new data 1302 or 1312. The number of threads started should be optimal for parallel processing across applicable channel(s). Upon encounter of block 1242, the MS is appropriately operational, and a user at the MS of FIG. 12 processing will have the ability to use the MS and applicable user interfaces thereof.

Figure 29A:
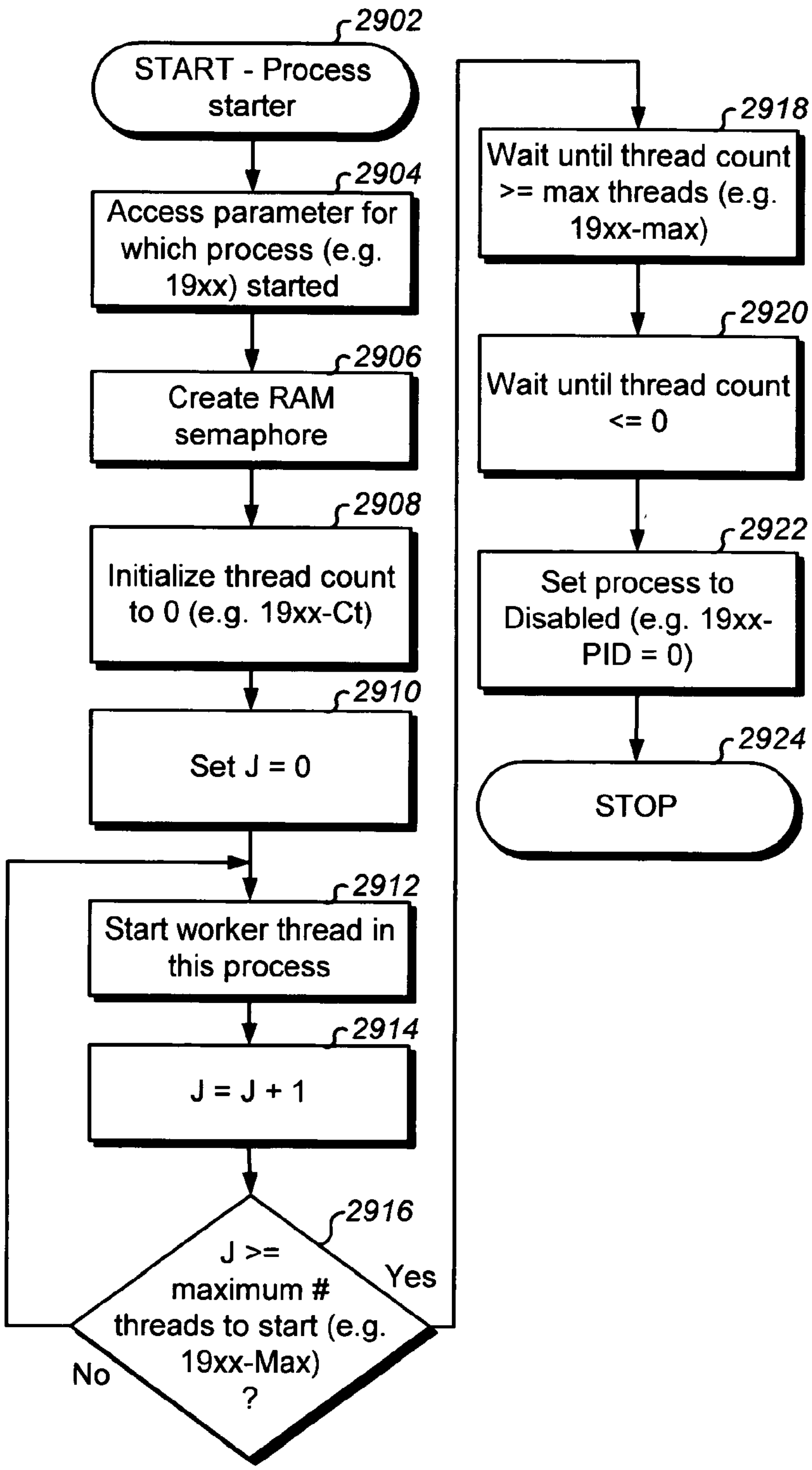
FIG. 29A depicts a flowchart for describing a preferred embodiment of a process for starting a specified number of threads in a specified thread pool.

With reference now to FIG. 29A, depicted is a flowchart for describing a preferred embodiment of a process for starting a specified number of threads in a specified thread pool. FIG. 29A is in itself an O/S process, has a process identifier (PID) after being started, will contain at least two threads of processing after being started, and is generic in being able to take on the identity of any process name passed to it (e.g. 19xx) with a parameter (e.g. from block 1232). FIG. 29A represents the parent thread of a 19xx process. The FIG. 29A process is generic for executing any of processes 19xx (i.e. 1902, 1912, 1922, 1932, 1942 and 1952) with the prescribed number of worker threads using the 19xx-Max configuration (i.e. 1902-Max, 1912-Max, 1922-Max, 1932-Max, 1942-Max and 1952-Max). FIG. 29A will stay running until it (first all of its worker thread(s)) is terminated. FIG. 29A consists of an O/S Process 19xx with at least a parent thread (main thread) and one worker thread (or number of worker threads for FIG. 19 processing as determined by 19xx-Max). The parent thread has purpose to stay running while all worker threads are running, and to own intelligence for starting worker threads and terminating the process when all worker threads are terminated. The worker threads are started subordinate to the FIG. 29A process at block 2912 using an O/S start thread interface.

A 19xx (i.e. 1902, 1912, 1922, 1932, 1942 and 1952) process starts at block 2902 and continues to block 2904 where the parameter passed for which process name to start (i.e. take on identity of) is determined (e.g. 1952). Thereafter, block 2906 creates a RAM semaphore (i.e. operating system term for a well performing Random Access Memory (RAM) semaphore with scope only within the process (i.e. to all threads of the process)). The local semaphore name preferably uses the process name prefix (e.g. 1952-Sem), and is used to synchronize threads within the process. RAM semaphores perform significantly better than global system semaphores. Alternate embodiments will have process semaphore(s) created at block 1220 in advance. Thereafter, block 2908 initializes a thread counter (e.g. 1952-Ct) to 0 for counting the number of worker threads actually started within the 19xx process (e.g. 1952), block 2910 initializes a loop variable J to 0, and block 2912 starts a worker thread (the first one upon first encounter of block 2912 for a process) in this process (e.g. process 1902 starts worker thread FIG. 20, . . . , process 1952 starts worker thread FIG. 26A—see architecture 1900 description below).

Thereafter, block 2914 increments the loop variable by 1 and block 2916 checks if all prescribed worker threads have been started. Block 2916 accesses the 19xx-Max (e.g. 1952-Max) variable from shared memory using a semaphore for determining the maximum number of threads to start in the process worker thread pool. If block 2916 determines all worker threads have been started, then processing continues to block 2918. If block 2916 determines that not all worker threads have been started for the process of FIG. 29A, then processing continues back to block 2912 for starting the next worker thread. Blocks 2912 through 2916 ensure the 19xx-Max (e.g. 1952-Max) number of worker threads are started within the process of FIG. 29A.

Block 2918 waits until all worker threads of blocks 2912 through 2916 have been started, as indicated by the worker threads themselves. Block 2918 waits until the process 19xx-Ct variable has been updated to the prescribed 19xx-Max value by the started worker threads, thereby indicating they are all up and running. When all worker threads are started (e.g. 1952-Ct=1952-Max), thereafter block 2920 waits (perhaps a very long time) until the worker thread count (e.g. 1952-Ct) has been reduced back down to 0 for indicating that all worker threads have been terminated, for example when the user gracefully powers off the MS. Block 2920 continues to block 2922 when all worker threads have been terminated. Block 2922 sets the shared memory variable for the 19xx process (e.g. 1952-PID) to 0 using a semaphore for indicating that the 19xx (e.g. 1952) process is disabled and no longer running. Thereafter, the 19xx process terminates at block 2924. Waiting at blocks 2918 and 2920 are accomplished in a variety of well known methods:

- Detect signal sent to process by last started (or terminated) worker thread that thread count is now MAX (or 0); or
- Loop on checking the thread count with sleep time between checks, wherein within the loop there is a check of the current count (use RAM semaphore to access), and processing exits the loop (and block) when the count has reached the sought value; or
- Use of a semaphore for a count variable which causes the parent thread of FIG. 29A to stay blocked prior to the count reaching its value, and causes the parent thread to become cleared (will leave wait block) when the count reaches its sought value.

Starting threads of processing in FIG. 29A has been presented from a software perspective, but there are hardware/firmware thread embodiments which may be started appropriately to accomplish the same functionality. If the MS operating system does not have an interface for returning the PID at block 1232, then FIG. 29A can have a block (e.g. 2905) used to determine its own PID for setting the 19xx-PID variable.

Figure 13B:
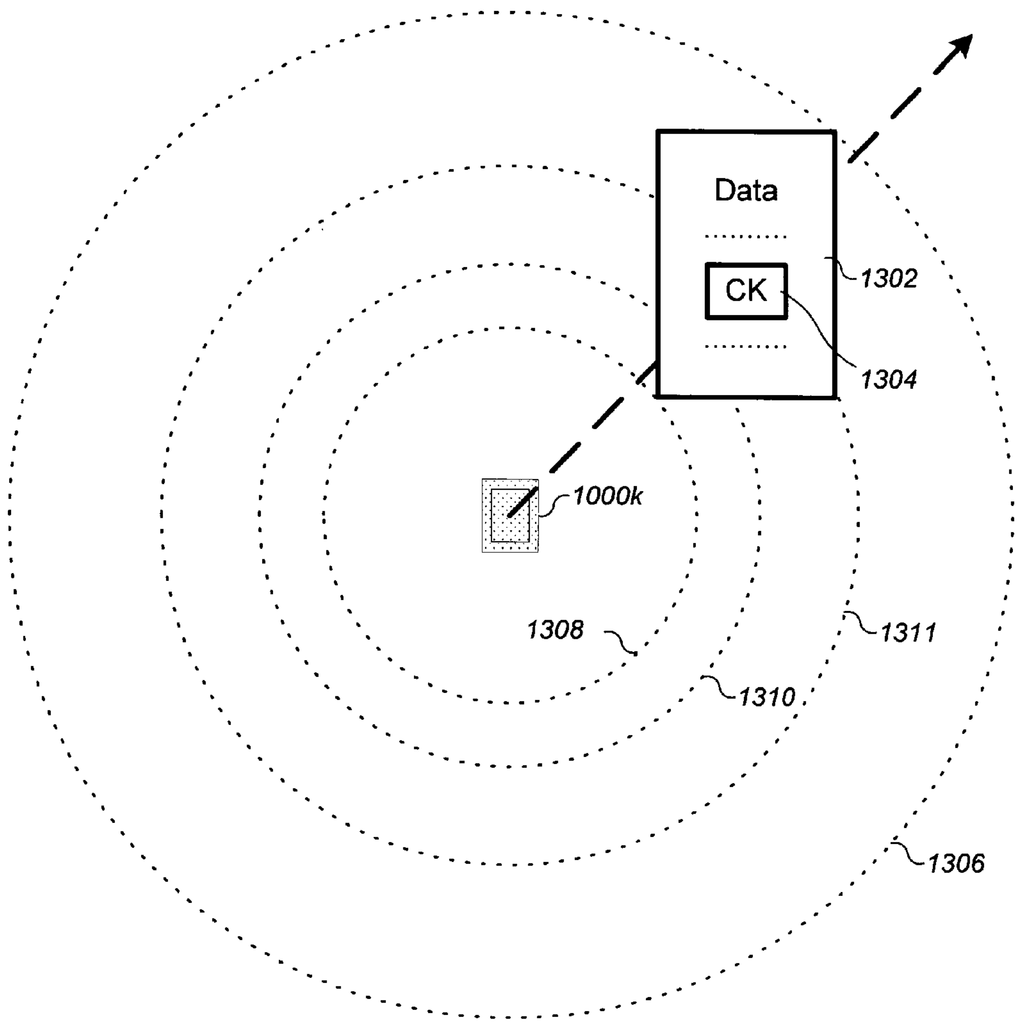
Figure 13C:
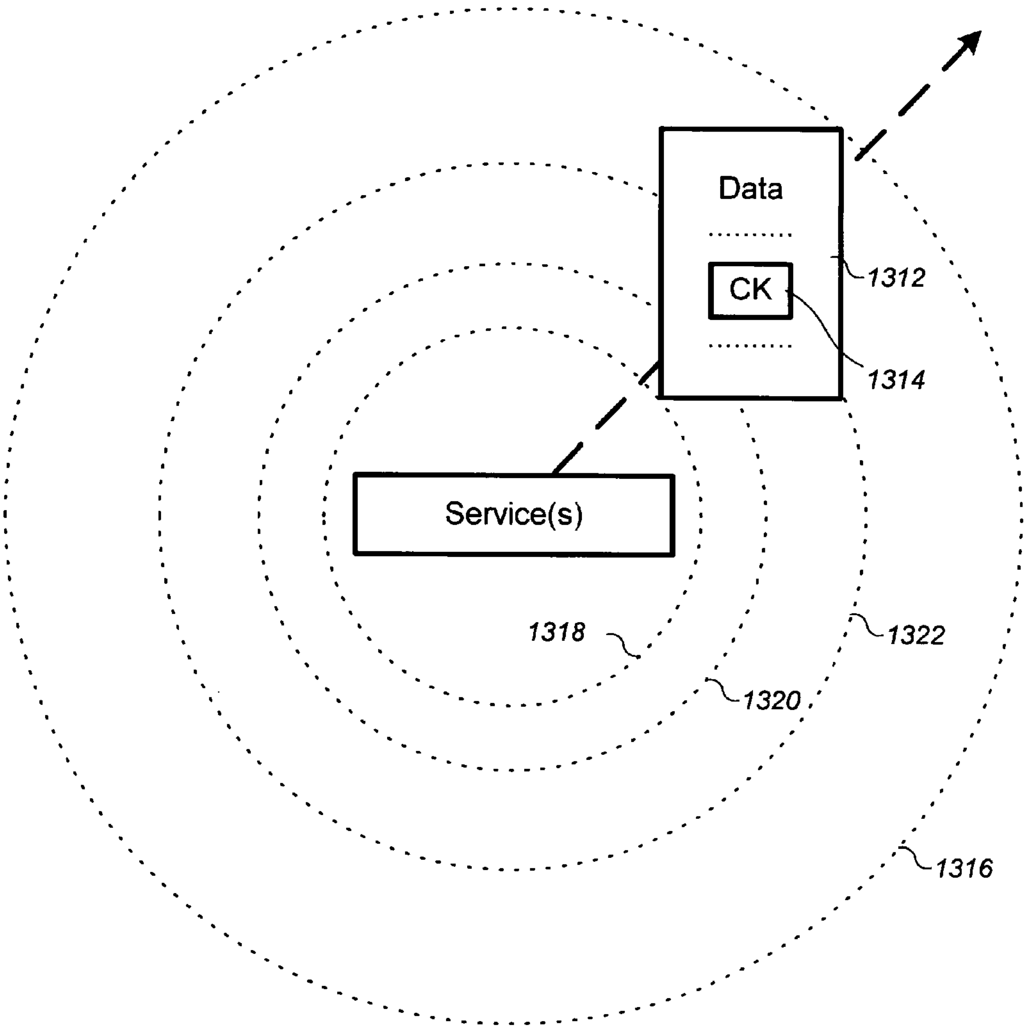

FIGS. 13A through 13C depict an illustration of data processing system wireless data transmissions over some wave spectrum. Embodiments may exist for any of the aforementioned wave spectrums, and data carried thereon may or may not be encrypted (e.g. encrypted WDR information). With reference now to FIG. 13A, a MS, for example a DLM 200*a*, sends/broadcasts data such as a data 1302 in a manner well known to those skilled in the art, for example other character 32 processing data. When a Communications Key (CK) 1304 is embedded within data 1302, data 1302 is considered usual communications data (e.g. protocol, voice, or any other data over conventional forward channel, reverse channel, voice data channel, data transmission channel, or any other prior art use channel) which has been altered to contain CK 1304. Data 1302 contains a CK 1304 which can be detected, parsed, and processed when received by another MS or other data processing system in the vicinity of the MS (e.g. DLM 200*a*) as determined by the maximum range of transmission 1306. CK 1304 permits "piggy-backing" on current transmissions to accomplish new functionality as disclosed herein. Transmission from the MS radiate out from it in all directions in a manner consistent with the wave spectrum used. The radius 1308 represents a first range of signal reception from the MS 200*a*, perhaps by another MS (not shown). The radius 1310 represents a second range of signal reception from the MS 200*a*, perhaps by another MS (not shown). The radius 1311 represents a third range of signal reception from the MS 200*a*, perhaps by another MS (not shown). The radius 1306 represents a last and maximum range of signal reception from the MS 200*a*, perhaps by another MS (not shown). MS design for maximum radius 1306 may take into account the desired maximum range versus acceptable wave spectrum exposure health risks for the user of the MS. The time of transmission from MS 200*a* to radius 1308 is less than times of transmission from MS 200*a* to radiuses 1310, 1311, or 1306. The time of transmission from MS 200*a* to radius 1310 is less than times of transmission from MS 200*a* to radiuses 1311 or 1306. The time of transmission from MS 200*a* to radius 1311 is less than time of transmission from MS 200*a* to radius 1306.

In another embodiment, data 1302 contains a Communications Key (CK) 1304 because data 1302 is new transmitted data in accordance with the present disclosure. Data 1302 purpose is for carrying CK 1304 information for being detected, parsed, and processed when received by another MS or other data processing system in the vicinity of the MS (e.g. DLM 200*a*) as determined by the maximum range of transmission 1306.

With reference now to FIG. 13B, a MS, for example an ILM 1000*k*, sends/broadcasts data such as a data 1302 in a manner well known to those skilled in the art. Data 1302 and CK 1304 are as described above for FIG. 13A. Data 1302 or CK 1304 can be detected, parsed, and processed when received by another MS or other data processing system in the vicinity of the MS (e.g. ILM 1000*k*) as determined by the maximum range of transmission 1306. Transmission from the MS radiate out from it in all directions in a manner consistent with the wave spectrum used, and as described above for FIG. 13A.

With reference now to FIG. 13C, a service or set of services sends/broadcasts data such as a data packet 1312 in a manner well known to those skilled in the art, for example to service other character 32 processing. When a Communications Key (CK) 1314 is embedded within data 1312, data 1312 is considered usual communications data (e.g. protocol, voice, or any other data over conventional forward channel, reverse channel, voice data channel, data transmission channel, or any other prior art use channel) which has been altered to contain CK 1314. Data 1312 contains a CK 1314 which can be detected, parsed, and processed when received by an MS or other data processing system in the vicinity of the service(s) as determined by the maximum range of transmission 1316. CK 1314 permits "piggy-backing" on current transmissions to accomplish new functionality as disclosed herein. Transmissions radiate out in all directions in a manner consistent with the wave spectrum used, and data carried thereon may or may not be encrypted (e.g. encrypted WDR information). The radius 1318 represents a first range of signal reception from the service (e.g. antenna thereof), perhaps by a MS (not shown). The radius 1320 represents a second range of signal reception from the service (e.g. antenna thereof), perhaps by a MS (not shown). The radius 1322 represents a third range of signal reception from the service (e.g. antenna thereof), perhaps by a MS (not shown). The radius 1316 represents a last and maximum range of signal reception from the service (e.g. antenna thereof), perhaps by a MS (not shown). The time of transmission from service to radius 1318 is less than times of transmission from service to radiuses 1320, 1322, or 1316. The time of transmission from service to radius 1320 is less than times of transmission from service to radiuses 1322 or 1316. The time of transmission from service to radius 1322 is less than time of transmission from service to radius 1316. In another embodiment, data 1312 contains a Communications Key (CK) 1314 because data 1312 is new transmitted data in accordance with the present disclosure. Data 1312 purpose is for carrying CK 1314 information for being detected, parsed, and processed when received by another MS or data processing system in the vicinity of the service(s) as determined by the maximum range of transmission.

In some embodiments, data 1302 and 1312 are prior art wireless data transmission packets with the exception of embedding a detectable CK 1304 and/or CK 1314, respectively. Usual data communications of MSs are altered to additionally contain the CK so data processing systems in the vicinity can detect, parse, and process the CK. Appropriate send and/or broadcast channel processing is used. In other embodiments, data 1302 and 1312 are new broadcast wireless data transmission packets for containing CK 1304 and CK 1314, respectively. A MS may use send queue 24 for sending/broadcasting packets to data processing systems in the vicinity, and may use the receive queue 26 for receiving packets from other data processing systems in the vicinity. Contents of CKs (Communications Keys) depend on which LBX features are in use and the functionality intended.

In the case of "piggybacking" on usual communications, receive queue 26 insertion processing simply listens for the usual data and when detecting CK presence, inserts CK information appropriately to queue 26 for subsequent processing. Also in the case of "piggybacking" on usual communications, send queue 24 retrieval processing simply retrieves CK information from the queue and embeds it in an outgoing data 1302 at first opportunity. In the case of new data communications, receive queue 26 insertion processing simply listens for the new data containing CK information, and inserts CK information appropriately to queue 26 for subsequent processing. Also in the case of new data communications, send queue 24 retrieval processing simply retrieves CK information from the queue and transmits CK information as new data.

LBX: LN-EXPANSE Configuration

FIG. 14A depicts a flowchart for describing a preferred embodiment of MS LBX configuration processing. FIG. 14 is of Self Management Processing code 18. MS LBX configuration begins at block 1402 upon user action to start the user interface and continues to block 1404 where user interface objects are initialized for configurations described below with current settings that are reasonable for display to available user interface real estate. Thereafter, applicable settings are presented to the user at block 1406 with options. Block 1406 preferably presents to the user at least whether or not DLM capability is enabled (i.e. MS to behave as a DLM=at least one role of DLMV enabled), whether or not ILM capability is enabled (i.e. MS to behave as an ILM=at least one role of ILMV enabled), and/or whether or not this MS should participate in the LN-expanse as a source location for other MSs (e.g. process 1902 and/or 1942 enabled). Alternative embodiments will further present more or less information for each of the settings, or present information associated with other FIG. 14 blocks of processing. Other embodiments will not configure DLM settings for an MS lacking DLM capability (or when all DLMV roles disabled). Other embodiments will not configure ILM settings when DLM capability is present. Block 1406 continues to block 1408 where processing waits for user action in response to options. Block 1408 continues to block 1410 when a user action is detected. If block 1410 determines the user selected to configure DLM capability (i.e. DLMV role(s)), then the user configures DLM role(s) at block 1412 and processing continues back to block 1406. Block 1412 processing is described by FIG. 15A. If block 1410 determines the user did not select to configure DLM capability (i.e. DLMV role(s)), then processing continues to block 1414. If block 1414 determines the user selected to configure ILM capability (i.e. ILMV role(s)), then the user configures ILM role(s) at block 1416 and processing continues back to block 1406. Block 1416 processing is described by FIG. 15B. If block 1414 determines the user did not select to configure ILM capability (i.e. ILMV role(s)), then processing continues to block 1418. If block 1418 determines the user selected to configure NTP use, then the user configures NTP use at block 1420 and processing continues back to block 1406. Block 1420 processing is described by FIG. 16. If block 1418 determines the user did not select to configure NTP use, then processing continues to block 1422.

If block 1422 determines the user selected to maintain the WDR queue, then the user maintains WDRs at block 1424 and processing continues back to block 1406. Block 1424 processing is described by FIG. 17. Blocks 1412, 1416, 1420 and 1424 are understood to be delimited by appropriate semaphore control to avoid multi-threaded access problems. If block 1422 determines the user did not select to maintain the WDR queue, then processing continues to block 1426. If block 1426 determines the user selected to configure the confidence floor value, then block 1428 prepares parameters for invoking a Configure Value procedure (parameters for reference (address) of value to configure; and validity criteria of value to configure), and the Configure Value procedure of FIG. 18 is invoked at block 1430 with the two (2) parameters. Thereafter, processing continues back to block 1406. Blocks 1428 and 1430 are understood to be delimited by appropriate semaphore control when modifying the confidence floor value since other threads can access the floor value.

The confidence floor value is the minimum acceptable confidence value of any field 1100*d* (for example as checked by block 276). No WDR with a field 1100*d* less than the confidence floor value should be used to describe MS whereabouts. In an alternative embodiment, the confidence floor value is enforced as the same value across an LN-expanse with no user control to modify it. One embodiment of FIG. 14 does not permit user control over a minimum acceptable confidence floor value. Various embodiments will default the floor value. Block 1812 enforces an appropriate value in accordance with the confidence value range implemented (e.g. value from 1 to 100). Since the confidence of whereabouts is likely dependent on applications in use at the MS, the preferred embodiment is to permit user configuration of the acceptable whereabouts confidence for the MS. A new confidence floor value can be put to use at next thread(s) startup, or can be used instantly with the modification made, depending on the embodiment. The confidence floor value can be used to filter out WDRs prior to inserting to queue 22, filter out WDRs when retrieving from queue 22, filter out WDR information when listening on channel(s) prior to inserting to queue 26, and/or used in accessing queue 22 for any reason (depending on embodiments). While confidence is validated on both inserts and queries (retrievals/peeks), one or the other validation is fine (preferably on inserts). It is preferred that executable code incorporate checks where applicable since the confidence floor value can be changed after queue 22 is in use. Also, various present disclosure embodiments may maintain all confidences to queue 22, or a particular set of acceptable confidences.

If block 1426 determines the user did not select to configure the confidence floor value, then processing continues to block 1432. If block 1432 determines the user selected to configure the Whereabouts Timeliness Variable (WTV), then block 1434 prepares parameters for invoking the Configure Value procedure (parameters for reference (address) of value to configure; and validity criteria of value to configure), and the Configure Value procedure of FIG. 18 is invoked at block 1430 with the two (2) parameters. Thereafter, processing continues back to block 1406. Blocks 1434 and 1430 are understood to be delimited by appropriate semaphore control when modifying the WTV since other threads can access the WTV.

A critical configuration for MS whereabouts processing is whereabouts timeliness. Whereabouts timeliness is how often (how timely) an MS should have accurate whereabouts. Whereabouts timeliness is dependent on how often the MS is updated with whereabouts information, what technologies are available or are in the vicinity, how capable the MS is of maintaining whereabouts, processing speed(s), transmission speed(s), known MS or LN-expanse design constraints, and perhaps other factors. In some embodiments, whereabouts timeliness is as soon as possible. That is, MS whereabouts is updated whenever possible as often as possible. In fact, the present disclosure provides an excellent system and methodology to accomplish that by leveraging location technologies whenever and wherever possible. However, there should be balance when considering less capable processing of a MS to prevent hogging CPU cycles from other applications at the MS. In other embodiments, a hard-coded or preconfigured time interval is used for keeping an MS informed of its whereabouts in a timely manner. For example, the MS should know its own whereabouts at least every second, or at least every 5 seconds, or at least every minute, etc. Whereabouts timeliness is critical depending on the applications in use at the MS. For example, if MS whereabouts is updated once at the MS every 5 minutes during high speeds of travel when using navigation, the user has a high risk of missing a turn during travel in downtown cities where timely decisions for turns are required. On the other hand, if MS whereabouts is updated every 5 seconds, and an application only requires an update accuracy to once per minute, then the MS may be excessively processing.

In some embodiments, there is a Whereabouts Timeliness Variable (WTV) configured at the MS (blocks 1432, 1434, 1430). Whether it is user configured, system configured, or preset in a system, the WTV is used to:

- Define the maximum period of time for MS whereabouts to become stale at any particular time;
- Cause the MS to seek its whereabouts if whereabouts information is not up to date in accordance with the WTV; and
- Prevent keeping the MS too busy with keeping abreast of its own whereabouts.

In another embodiment, the WTV is automatically adjusted based on successes or failures of automatically locating the MS. As the MS successfully maintains timely whereabouts, the WTV is maintained consistent with the user configured, system configured, or preset value, or in accordance with active applications in use at the time. However, as the MS fails in maintaining timely whereabouts, the WTV is automatically adjusted (e.g. to longer periods of time to prevent unnecessary wasting of power and/or CPU resources). Later, as whereabouts become readily available, the WTV can be automatically adjusted back to the optimal value. In an emergency situation, the user always has the ability to force the MS to determine its own whereabouts anyway (Blocks 856 and 862 through 878, in light of a WDR request and WDR response described for architecture 1900). In embodiments where the WTV is adjusted in accordance with applications in use at the time, the most demanding requirement of any application started is maintained to the WTV. Preferably, each application of the MS initializes to an API of the MS with a parameter of its WTV requirements. If the requirement is more timely than the current value, then the more timely value is used. The WTV can be put to use at next thread(s) startup, or can be used instantly with the modification made, depending on the embodiment.

If block 1432 determines the user did not select to configure the WTV, then processing continues to block 1436. If block 1436 determines the user selected to configure the maximum number of threads in a 19xx process (see 19xx-Max variable in FIG. 19 discussions), then block 1438 interfaces with the user until a valid 19xx-max variable is selected, and processing continues to block 1440. If block 1440 determines the 19xx process is already running (i.e. 19xx-PID>0 implies it is enabled), then an error is provided to the user at block 1442, and processing continues back to block 1406. Preferably, block 1442 does not continue back to block 1406 until the user acknowledges the error (e.g. with a user action). If block 1440 determines the user selected 19xx process (process 1902, process 1912, process 1922, process 1932, process 1942, or process 1952) is not already running (i.e. 19xx-PID=0 implies it is disabled), then block 1444 prepares parameters for invoking the Configure Value procedure (parameters for reference (address) of 19xx-Max value to configure; and validity criteria of value to configure), and the Configure Value procedure of FIG. 18 is invoked at block 1430 with the two (2) parameters. Thereafter, processing continues back to block 1406. Blocks 1438, 1440, 1444 and 1430 are understood to be delimited by appropriate semaphore control when modifying the 19xx-Max value since other threads can access it. The 19xx-Max value should not be modified while the 19xx process is running because the number of threads to terminate may be changed prior to terminating. An alternate embodiment of modifying a process number of threads will dynamically modify the number of threads in anticipation of required processing.

If block 1436 determines the user did not select to configure a process thread maximum (19xx-Max), then block 1446 checks if the user selected to (toggle) disable or enable a particular process (i.e. a 19xx process of FIG. 19). If block 1446 determines the user did select to toggle enabling/disabling a particular FIG. 19 process, then block 1448 interfaces with the user until a valid 19xx process name is selected, and processing continues to block 1450. If block 1450 determines the 19xx process is already running (i.e. 19xx-PID>0 implies it is enabled), then block 1454 prepares parameters (just as does block 2812). Thereafter, block 1456 invokes FIG. 29B processing (just as does block 2814). Processing then continues back to block 1406. If block 1450 determines the 19*xx* process is not running (i.e. 19xx-PID=0 implies it is disabled), then block 1452 invokes FIG. 29A processing (just as does block 1232). Processing then continues back to block 1406. Block 1456 does not continue back to block 1406 until the process is completely terminated. Blocks 1448, 1450, 1452, 1454 and 1456 are understood to be delimited by appropriate semaphore control.

Preferred embodiments of blocks 1446 and 1448 use convenient names of processes being started or terminated, rather than convenient brief process names such as 1902, 1912, 1922, 1932, 1942, or 1952 used in flowcharts. In some embodiments, the long readable name is used, such as whereabouts broadcast process (1902), whereabouts collection process (1912), whereabouts supervisor process (1922), timing determination process (1932), WDR request process (1942), and whereabouts determination process (1952). For example, the user may know that the whereabouts supervisor process enabled/disabled indicates whether or not to have whereabouts timeliness monitored in real time. Enabling the whereabouts supervisor process enables monitoring for the WTV in real time, and disabling the whereabouts supervisor process disables monitoring the WTV in real time.

In another embodiment of blocks 1446 and 1448, a completely new name or description may be provided to any of the processes to facilitate user interface usability. For example, a new name Peer Location Source Variable (PLSV) can be associated to the whereabouts broadcast process 1902 and/or 1942. PLSV may be easier to remember. If the PLSV was toggled to disabled, the whereabouts broadcast process 1902 and/or 1942 terminates. If the PLSV was toggled to enabled, the whereabouts broadcast process 1902 and/or 1942 is started. It may be easier to remember that the PLSV enables/disables whether or not to allow this MS to be a location source for other MSs in an LN-expanse.

In other embodiments, a useful name (e.g. PLSV) represents starting and terminating any subset of 19xx processes (a plurality (e.g. 1902 and 1942)) for simplicity. In yet other embodiments, FIG. 14A/14B can be used to start or terminate worker thread(s) in any process, for example to throttle up more worker threads in a process, or to throttle down for less worker threads in a process, perhaps modifying thread instances to accommodate the number of channels for communications, or for the desired performance. There are many embodiments for fine tuning the architecture 1900 for optimal peer to peer interaction. In yet other embodiments, toggling may not be used. There may be individual options available at block 1408 for setting any data of this disclosure. Similarly, the 19xx-Max variables may be modified via individual user friendly names and/or as a group of 19xx-Max variables.

Referring back to block 1446, if it is determined the user did not select to toggle for enabling/disabling process(es), then processing continues to block 1458. If block 1458 determines the user selected to exit FIG. 14A/14B configuration processing, then block 1460 terminates the user interface appropriately and processing terminates at block 1462. If block 1458 determines the user did not select to exit the user interface, then processing continues to block 1466 of FIG. 14B by way of off page connector 1464.

Figure 14B:
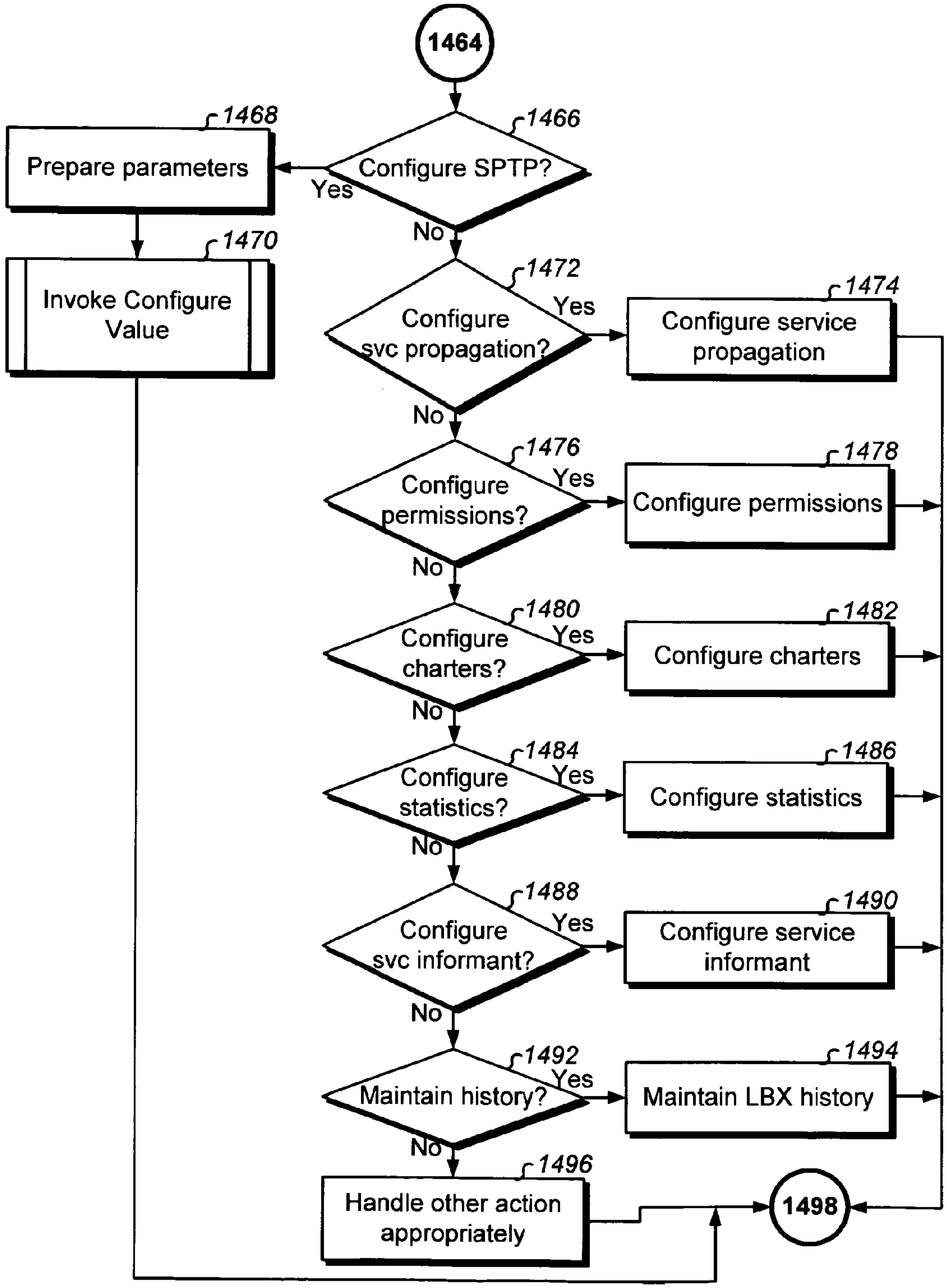
FIG. 14B depicts a continued portion flowchart of FIG. 14A for describing a preferred embodiment of MS LBX configuration processing.

With reference now to FIG. 14B, depicted is a continued portion flowchart of FIG. 14A for describing a preferred embodiment of MS LBX configuration processing. If block 1466 determines the user selected to configure the Source Periodicity Time Period (SPTP) value, then block 1468 prepares parameters for invoking the Configure Value procedure (parameters for reference (address) of value to configure; and validity criteria of value to configure), and the Configure Value procedure of FIG. 18 is invoked at block 1470 with the two (2) parameters. Thereafter, processing continues back to block 1406 by way of off page connector 1498. Blocks 1468 and 1470 are understood to be delimited by appropriate semaphore control when modifying the SPTP value since other threads can access it. The SPTP configures the time period between broadcasts by thread(s) 1902, for example 5 seconds. Some embodiments do not permit configuration of the SPTP.

If block 1466 determines the user did not select to configure the SPTP value, then processing continues to block 1472.

If block 1472 determines the user selected to configure service propagation, then the user configures service propagation at block 1474 and processing continues back to block 1406 by way of off page connector 1498. If block 1472 determines the user did not select to configure service propagation, then processing continues to block 1476.

If block 1476 determines the user selected to configure permissions 10, then the user configures permissions at block 1478 and processing continues back to block 1406 by way of off page connector 1498. If block 1476 determines the user did not select to configure permissions 10, then processing continues to block 1480. If block 1480 determines the user selected to configure charters 12, then the user configures charters 12 at block 1482 and processing continues back to block 1406 by way of off page connector 1498. If block 1480 determines the user did not select to configure charters 12, then processing continues to block 1484. If block 1484 determines the user selected to configure statistics 14, then the user configures statistics 14 at block 1486 and processing continues back to block 1406 by way of off page connector 1498. If block 1484 determines the user did not select to configure statistics 14, then processing continues to block 1488. If block 1488 determines the user selected to configure service informant code 28, then the user configures code 28 at block 1490 and processing continues back to block 1406 by way of off page connector 1498. If block 1488 determines the user did not select to configure code 28, then processing continues to block 1492. If block 1492 determines the user selected to maintain LBX history 30, then the user maintains LBX history at block 1494 and processing continues back to block 1406 by way of off page connector 1498. If block 1492 determines the user did not select to maintain LBX history 30, then processing continues to block 1496.

Block 1496 handles other user interface actions leaving block 1408, and processing continues back to block 1406 by way of off page connector 1498.

Details of blocks 1474, 1478, 1482, 1486, 1490, 1494, and perhaps more detail to block 1496, are described with other flowcharts. Appropriate semaphores are requested at the beginning of block processing, and released at the end of block processing, for thread safe access to applicable data at risk of being accessed by another thread of processing at the same time of configuration. In some embodiments, a user/administrator with secure privileges to the MS has ability to perform any subset of configurations of FIGS. 14A and 14B processing, while a general user may not. Any subset of FIG. 14 configuration may appear in alternative embodiments, with or without authenticated administrator access to perform configuration.

Figure 15A:
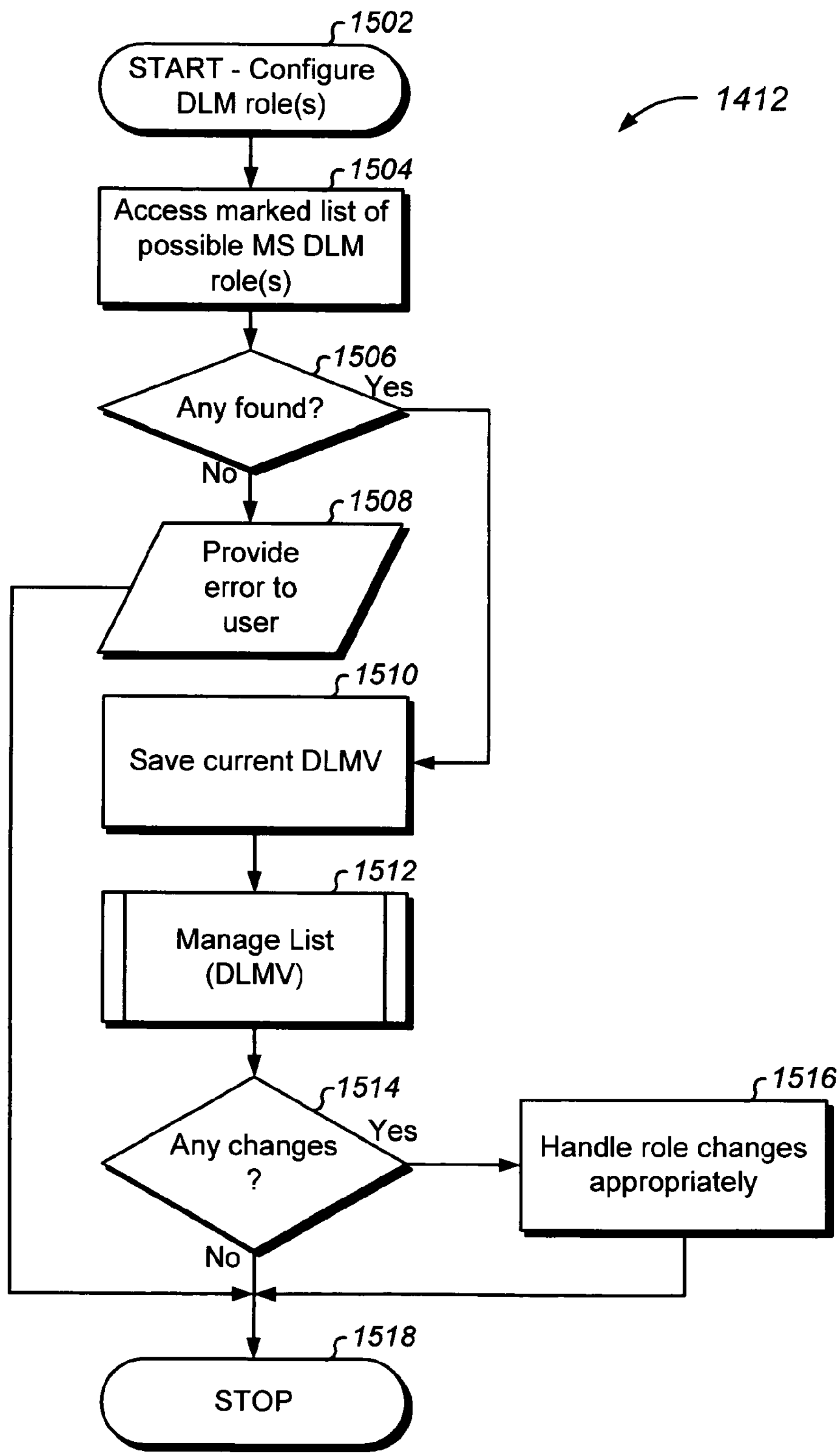
FIG. 15A depicts a flowchart for describing a preferred embodiment of DLM role configuration processing.

FIG. 15A depicts a flowchart for describing a preferred embodiment of DLM role configuration processing of block 1412. Processing begins at block 1502 and continues to block 1504 which accesses current DLMV settings before continuing to block 1506. If there were no DLMV entries (list empty) as determined by block 1506, then block 1508 provides an error to the user and processing terminates at block 1518. The DLMV may be empty when the MS has no local DLM capability and there hasn't yet been any detected DLM capability, for example as evidenced by WDRs inserted to queue 22. Preferably, the error presented at block 1508 requires the user to acknowledge the error (e.g. with a user action) before block 1508 continues to block 1518. If block 1506 determines at least one entry (role) is present in the DLMV, then the current DLMV setting(s) are saved at block 1510, the manage list processing procedure of FIG. 15C is invoked at block 1512 with the DLMV as a reference (address) parameter, and processing continues to block 1514.

Figure 15B:
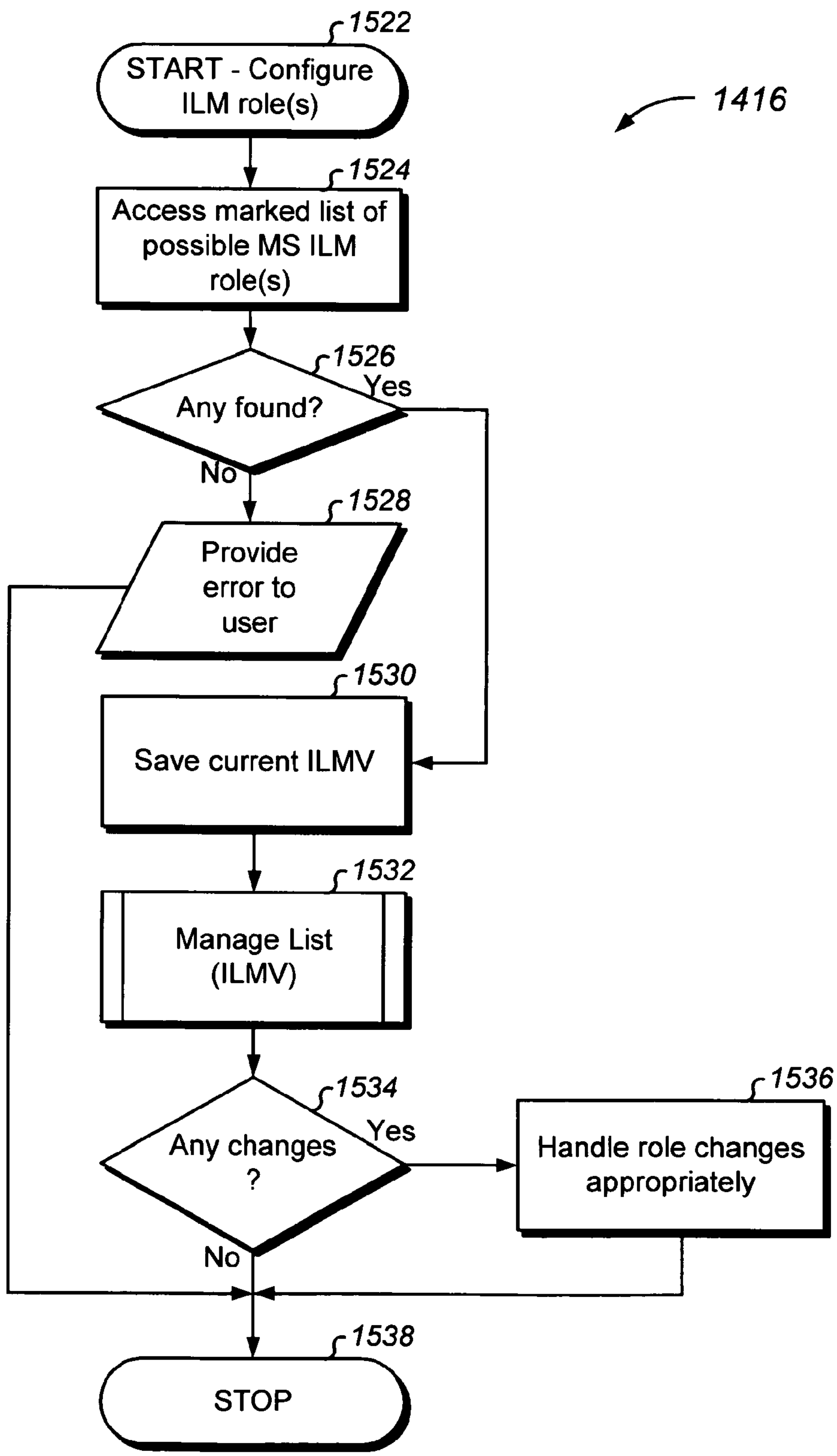
FIG. 15B depicts a flowchart for describing a preferred embodiment of ILM role configuration processing.
Figure 15C:
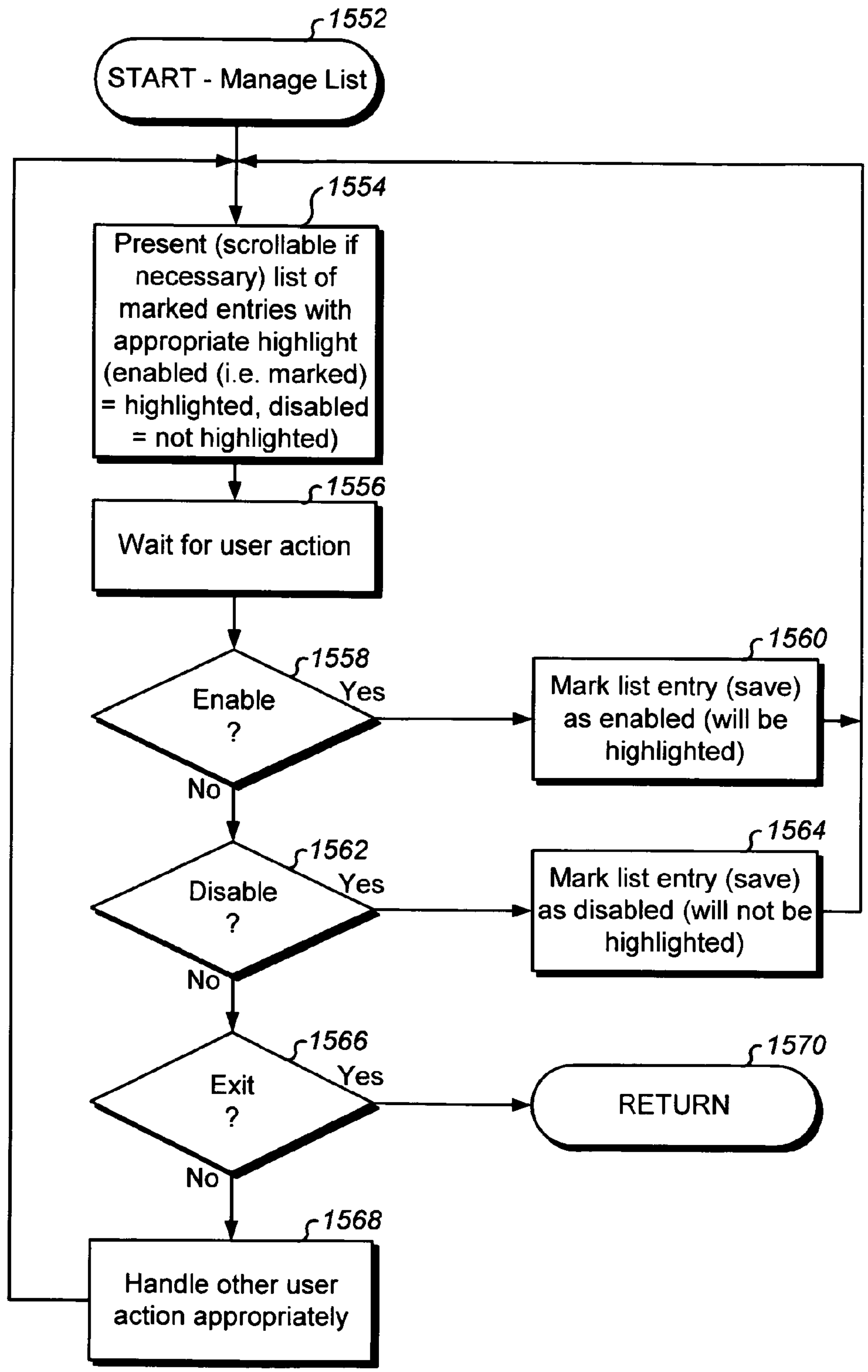
FIG. 15C depicts a flowchart for describing a preferred embodiment of a procedure for Manage List processing.

Block 1514 determines if there were any changes to the DLMV from FIG. 15C processing by comparing the DLMV after block 1512 with the DLMV saved at block 1510. If there were changes via FIG. 15C processing, such as a role which was enabled prior to block 1512 which is now disabled, or such as a role which was disabled prior to block 1512 which is now enabled, then block 1514 continues to block 1516 which handles the DLMV changes appropriately. Block 1516 continues to block 1518 which terminates FIG. 15A processing. If block 1514 determines there were no changes via block 1512, then processing terminates at block 1518.

Block 1516 enables newly enabled role(s) as does block 1238 described for FIG. 12. Block 1516 disables newly disabled role(s) as does block 2804 described for FIG. 28.

FIG. 15B depicts a flowchart for describing a preferred embodiment of ILM role configuration processing of block 1416. Processing begins at block 1522 and continues to block 1524 which accesses current ILMV settings before continuing to block 1526. If there were no ILMV entries (list empty) as determined by block 1526, then block 1528 provides an error to the user and processing terminates at block 1538. The ILMV may be empty when the MS is not meant to have ILM capability. Preferably, the error presented at block 1528 requires the user to acknowledge the error before block 1528 continues to block 1538. If block 1526 determines at least one entry (role) is present in the ILMV, then the current ILMV setting(s) are saved at block 1530, the manage list processing procedure of FIG. 15C is invoked with a reference (address) parameter of the ILMV at block 1532, and processing continues to block 1534.

Block 1534 determines if there were any changes to the ILMV from FIG. 15C processing by comparing the ILMV after block 1532 with the ILMV saved at block 1530. If there were changes via FIG. 15C processing, such as a role which was enabled prior to block 1532 which is now disabled, or such as a role which was disabled prior to block 1532 which is now enabled, then block 1534 continues to block 1536 which handles the ILMV changes appropriately. Block 1536 continues to block 1538 which terminates FIG. 15B processing. If block 1534 determines there were no changes via block 1532, then processing terminates at block 1538.

Block 1536 enables newly enabled role(s) as does blocks 1224 through 1234 described for FIG. 12. Block 1536 disables newly disabled role(s) as does blocks 2806 through 2816 described for FIG. 28.

FIG. 15C depicts a flowchart for describing a preferred embodiment of a procedure for Manage List processing. Processing starts at block 1552 and continues to block 1554. Block 1554 presents the list (DLM capability if arrived to by way of FIG. 15A; ILM capability if arrived to by way of FIG. 15B) to the user, as passed to FIG. 15C processing with the reference parameter by the invoker, with which list items are marked (enabled) and which are unmarked (disabled) along with options, before continuing to block 1556 for awaiting user action. Block 1554 highlights currently enabled roles, and ensures disabled roles are not highlighted in the presented list. When a user action is detected at block 1556, thereafter, block 1558 checks if a list entry was enabled (marked) by the user, in which case block 1560 marks the list item as enabled, saves it to the list (e.g. DLMV or ILMV), and processing continues back to block 1554 to refresh the list interface. If block 1558 determines the user did not respond with an enable action, then block 1562 checks for a disable action. If block 1562 determines the user wanted to disable a list entry, then block 1564 marks (actually unmarks it) the list item as disabled, saves it to the list (e.g. DLMV or ILMV), and processing continues back to block 1554. If block 1562 determines the user did not want to disable a list item, then block 1566 checks if the user wanted to exit FIG. 15C processing. If block 1566 determines the user did not select to exit list processing, then processing continues to block 1568 where other user interface actions are appropriately handled and then processing continues back to block 1554. If block 1566 determines the user did select to exit manage list processing, then FIG. 15C processing appropriately returns to the caller at block 1570.

FIG. 15C interfaces with the user for desired DLMV (via FIG. 15A) or ILMV (via FIG. 15B) configurations. In some embodiments, it makes sense to have user control over enabling or disabling DLM and/or ILM capability (roles) to the MS, for example for software or hardware testing.

Figure 16:
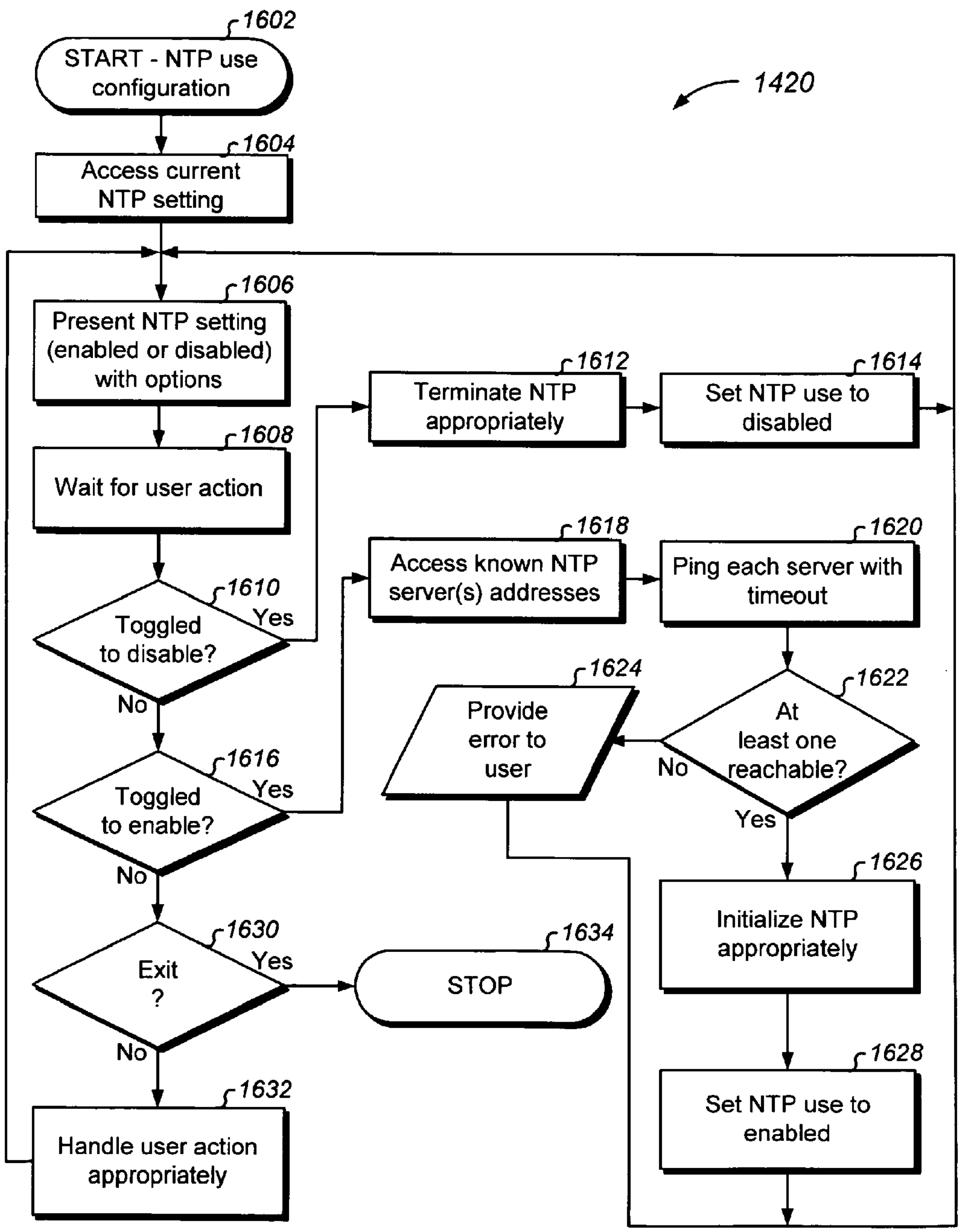
FIG. 16 depicts a flowchart for describing a preferred embodiment of NTP use configuration processing.

FIG. 16 depicts a flowchart for describing a preferred embodiment of NTP use configuration processing of block 1420. Processing starts at block 1602 and continues to block 1604 where the current NTP use setting is accessed. Thereafter, block 1606 presents the current NTP use setting to its value of enabled or disabled along with options, before continuing to block 1608 for awaiting user action. When a user action is detected at block 1608, block 1610 checks if the NTP use setting was disabled at block 1608, in which case block 1612 terminates NTP use appropriately, block 1614 sets (and saves) the NTP use setting to disabled, and processing continues back to block 1606 to refresh the interface. Block 1612 disables NTP as does block 2828.

If block 1610 determines the user did not respond for disabling NTP, then block 1616 checks for a toggle to being enabled. If block 1616 determines the user wanted to enable NTP use, then block 1618 accesses known NTP server address(es) (e.g. ip addresses preconfigured to the MS, or set with another user interface at the MS), and pings each one, if necessary, at block 1620 with a timeout. As soon as one NTP server is determined to be reachable, block 1620 continues to block 1622. If no NTP server was reachable, then the timeout will have expired for each one tried at block 1620 for continuing to block 1622. Block 1622 determines if at least one NTP server was reachable at block 1620. If block 1622 determines no NTP server was reachable, then an error is presented to the user at block 1624 and processing continues back to block 1606. Preferably, the error presented at block 1624 requires the user to acknowledge the error before block 1624 continues to block 1606. If block 1622 determines that at least one NTP server was reachable, then block 1626 initializes NTP use appropriately, block 1628 sets the NTP use setting to enabled (and saves), and processing continues back to block 1606. Block 1626 enables NTP as does block 1210.

Referring back to block 1616, if it is determined the user did not want to enable NTP use, then processing continues to block 1630 where it is checked if the user wanted to exit FIG. 16 processing. If block 1630 determines the user did not select to exit FIG. 16 processing, then processing continues to block 1632 where other user interface actions leaving block 1608 are appropriately handled, and then processing continues back to block 1606. If block 1630 determines the user did select to exit processing, then FIG. 16 processing terminates at block 1634.

Figure 17:
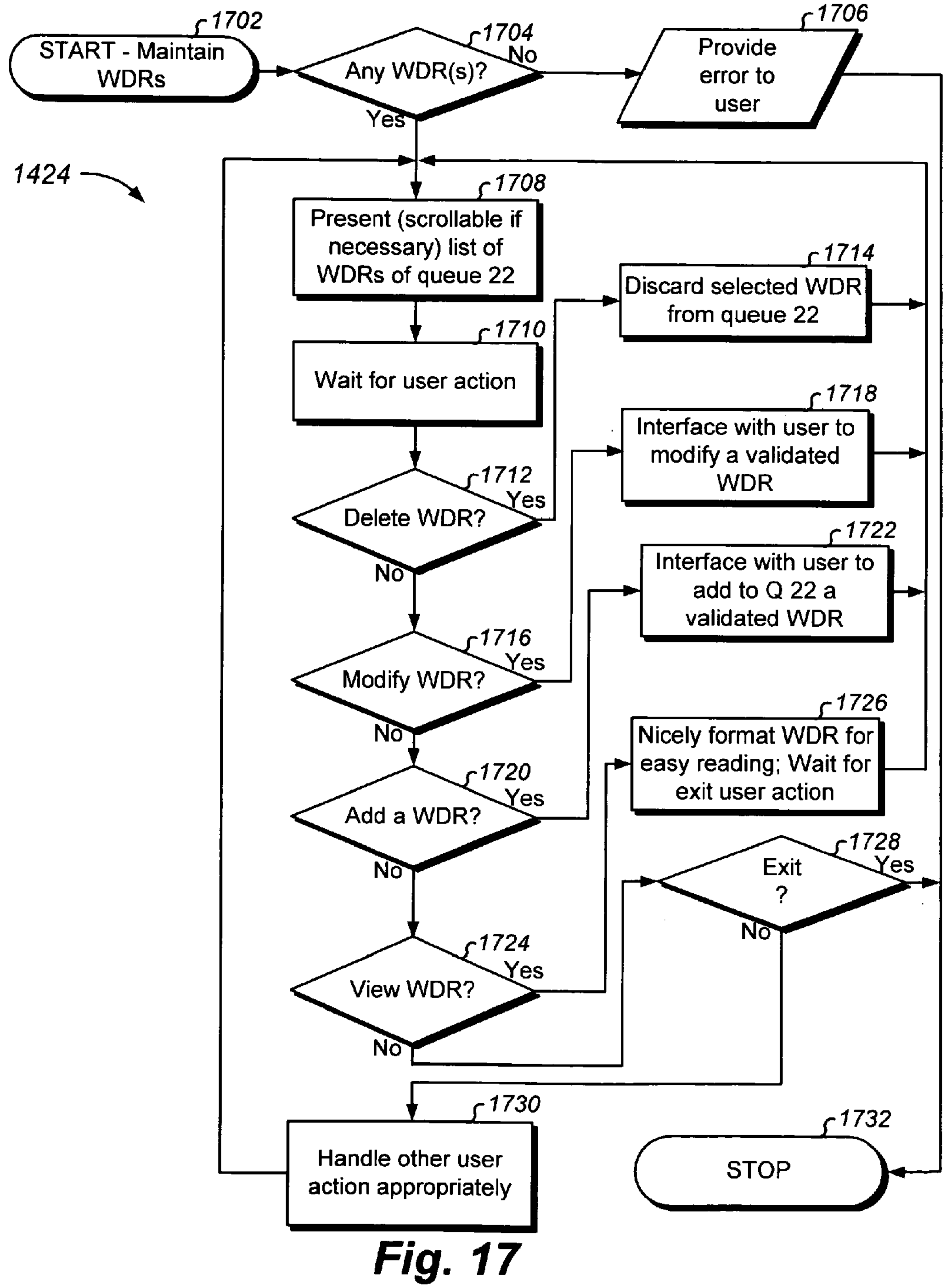
FIG. 17 depicts a flowchart for describing a preferred embodiment of WDR maintenance processing.
Figure 18:
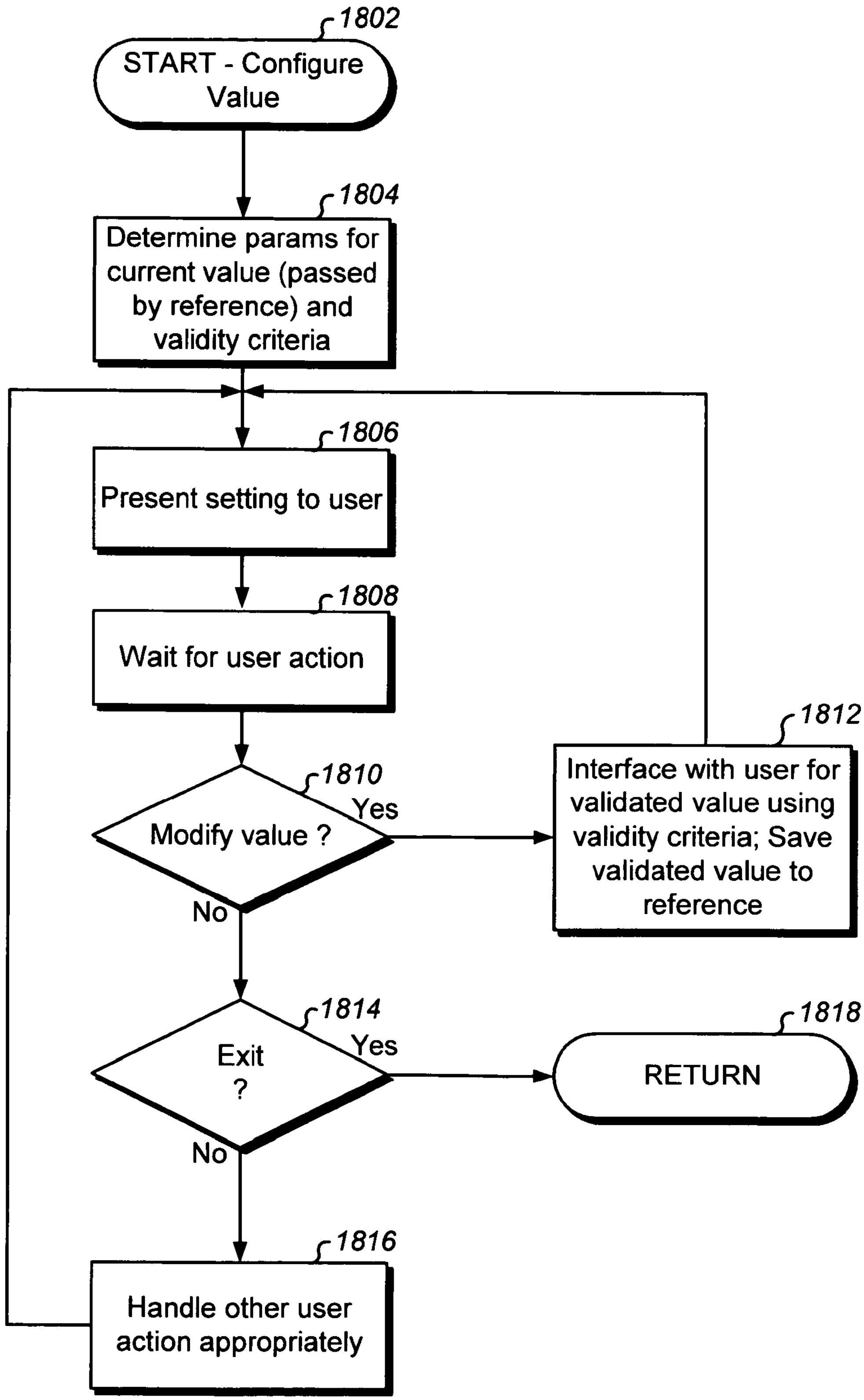
FIG. 18 depicts a flowchart for describing a preferred embodiment of a procedure for variable configuration processing.

FIG. 17 depicts a flowchart for describing a preferred embodiment of WDR is maintenance processing of block 1424. Processing starts at block 1702 and continues to block 1704 where it is determined if there are any WDRs of queue 22. If block 1704 determines there are no WDRs for processing, then block 1706 presents an error to the user and processing continues to block 1732 where FIG. 17 processing is terminated appropriately. Preferably, the error presented at block 1706 requires the user to acknowledge the error before block 1706 continues to block 1732. If block 1704 determines there is at least one WDR, then processing continues to block 1708 where the current contents of WDR queue 22 is appropriately presented to the user (in a scrollable list if necessary). The user can interface to the list at block 1708. In one example, block 1708 allows the user to see who is nearby. Block 1708 may provide a convenient search criteria specification interface for the user to find sought data. Of course, a separate user interface can be used to access WDR data for desired information. Thereafter, block 1710 awaits user action. When a user action is detected at block 1710, block 1712 checks if the user selected to delete a WDR from queue 22, in which case block 1714 discards the selected WDR, and processing continues back to block 1708 for a refreshed presentation of queue 22. If block 1712 determines the user did not select to delete a WDR, then block 1716 checks if the user selected to modify a WDR. If block 1716 determines the user wanted to modify a WDR of queue 22, then block 1718 interfaces with the user for validated WDR changes before continuing back to block 1708. If block 1716 determines the user did not select to modify a WDR, then block 1720 checks if the user selected to add a WDR to queue 22. If block 1720 determines the user selected to add a WDR (for example, to manually configure MS whereabouts), then block 1722 interfaces with the user for a validated WDR to add to queue 22 before continuing back to block 1708. If block 1720 determines the user did not select to add a WDR, then block 1724 checks if the user selected to view detailed contents of a WDR, perhaps because WDRs are presented in an abbreviated form at block 1708. If it is determined at block 1724 the user did select to view details of a WDR, then block 1726 formats the WDR in detail form, presents it to the user, and waits for the user to exit the view of the WDR before continuing back to block 1708. If block 1724 determines the user did not select to view a WDR in detail, then block 1728 checks if the user wanted to exit FIG. 17 processing. If block 1728 determines the user did not select to exit FIG. 17 processing, then processing continues to block 1730 where other user interface actions leaving block 1710 are appropriately handled, and then processing continues back to block 1708. If block 1728 determines the user did select to exit processing, then FIG. 17 processing terminates at block 1732.

There are many embodiments for maintaining WDRs of queue 22. In some embodiments, FIG. 17 (i.e. block 1424) processing is only provided for debug of an MS. In a single instance WDR embodiment, block 1708 presents the one and only WDR which is used to keep current MS whereabouts whenever possible. Other embodiments incorporate any subset of FIG. 17 processing.

FIG. 18 depicts a flowchart for describing a preferred embodiment of a procedure for variable configuration processing, namely the Configure Value procedure, for example for processing of block 1430. Processing starts at block 1802 and continues to block 1804 where parameters passed by the invoker of FIG. 18 are determined, namely the reference (address) of the value for configuration to be modified, and the validity criteria for what makes the value valid. Passing the value by reference simply means that FIG. 18 has the ability to directly change the value, regardless of where it is located. In some embodiments, the parameter is an address to a memory location for the value. In another embodiment, the value is maintained in a database or some persistent storage, and FIG. 18 is passed enough information to know how to permanently affect/change the value.

Block 1804 continues to block 1806 where the current value passed is presented to the user (e.g. confidence floor value), and then to block 1808 for awaiting user action. When a user action is detected at block 1808, block 1810 checks if the user selected to modify the value, in which case block 1812 interfaces with the user for a validated value using the validity criteria parameter before continuing back to block 1806. Validity criteria may take the form of a value range, value type, set of allowable values, or any other criteria for what makes the value a valid one.

If block 1810 determines the user did not select to modify the value, then block 1814 checks if the user wanted to exit FIG. 18 processing. If block 1814 determines the user did not select to exit FIG. 18 processing, then processing continues to block 1816 where other user interface actions leaving block 1808 are appropriately handled, and then processing continues back to block 1806. If block 1814 determines the user did select to exit processing, then FIG. 18 processing appropriately returns to the caller at block 1818.

LBX: LN-EXPANSE Interoperability

FIG. 19 depicts an illustration for describing a preferred embodiment multithreaded architecture of peer interaction processing of a MS in accordance with the present disclosure. MS architecture 1900 preferably includes a set of Operating System (O/S) processes (i.e. O/S terminology "process" with O/S terminology "thread" or "threads (i.e. thread(s))), including a whereabouts broadcast process 1902, a whereabouts collection process 1912, a whereabouts supervisor process 1922, a timing determination process 1932, a WDR request process 1942, and a whereabouts determination process 1952. Further included are queues for interaction of processing, and process associated variables to facilitate processing. All of the FIG. 19 processes are of PIP code 6. There is preferably a plurality (pool) of worker threads within each of said 19xx processes (i.e. 1902, 1912, 1922, 1932, 1942 and 1952) for high performance asynchronous processing. Each 19xx process (i.e. 1902, 1912, 1922, 1932, 1942 and 1952) preferably has at least two (2) threads:

1) "parent thread"; and
2) "worker thread".

A parent thread (FIG. 29A) is the main process thread for:

- starting the particular process;
- starting the correct number of worker thread(s) of that particular process;
- staying alive while all worker threads are busy processing; and
- properly terminating the process when worker threads are terminated.

Figure 20:
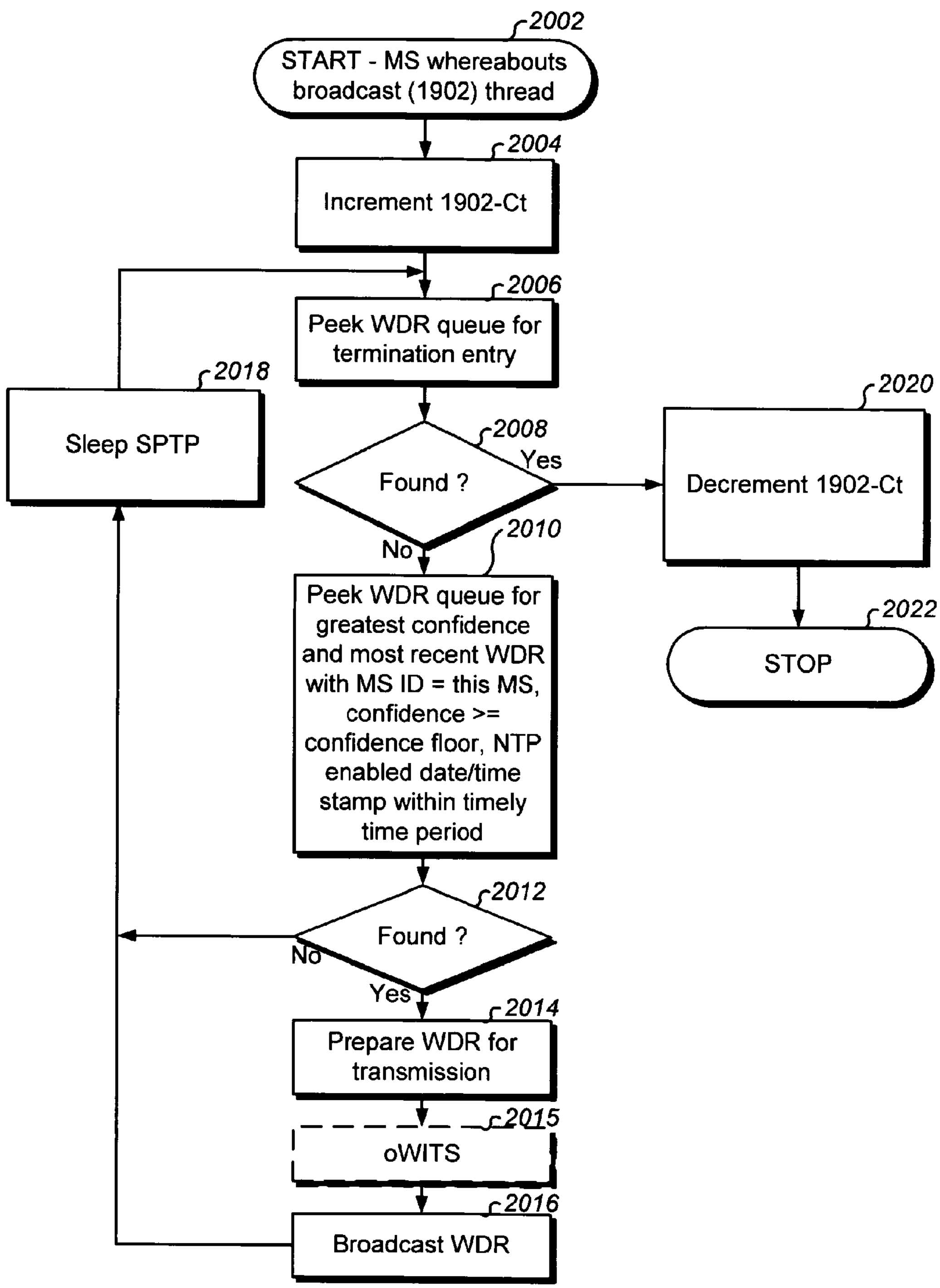
FIG. 20 depicts a flowchart for describing a preferred embodiment of MS whereabouts broadcast processing.
Figure 21:
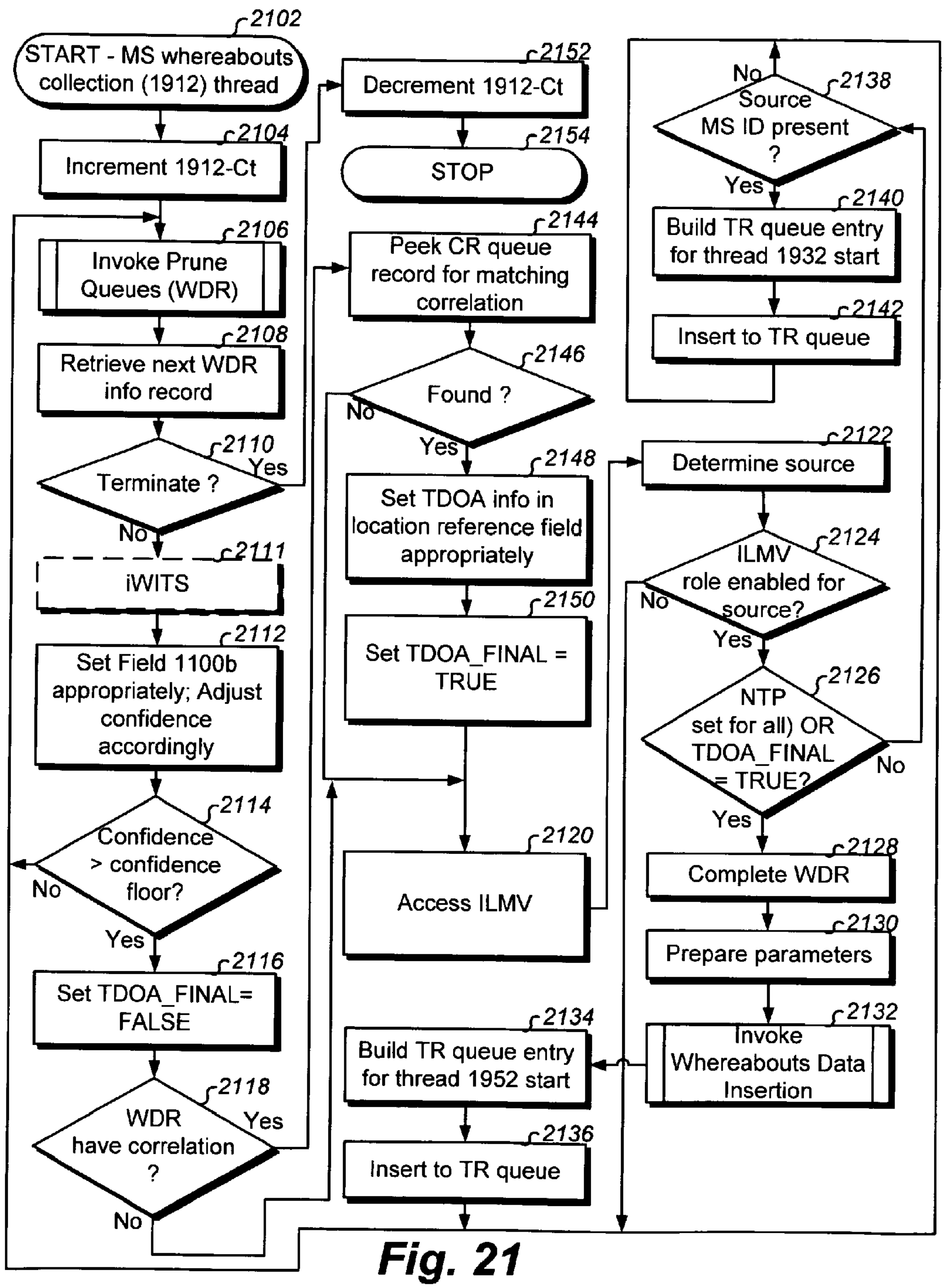
FIG. 21 depicts a flowchart for describing a preferred embodiment of MS whereabouts collection processing.
Figure 22:
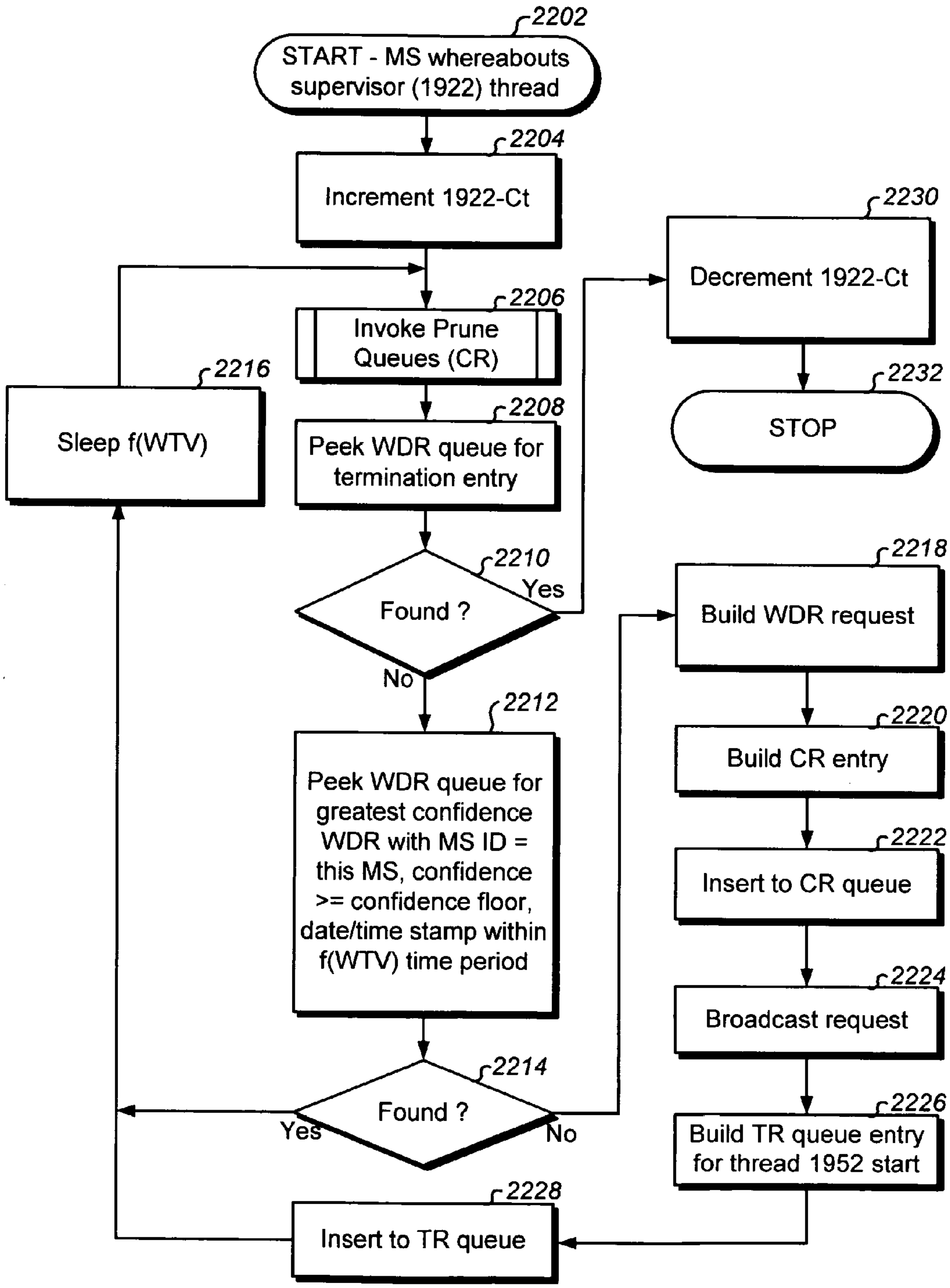
FIG. 22 depicts a flowchart for describing a preferred embodiment of MS whereabouts supervisor processing.
Figure 23:
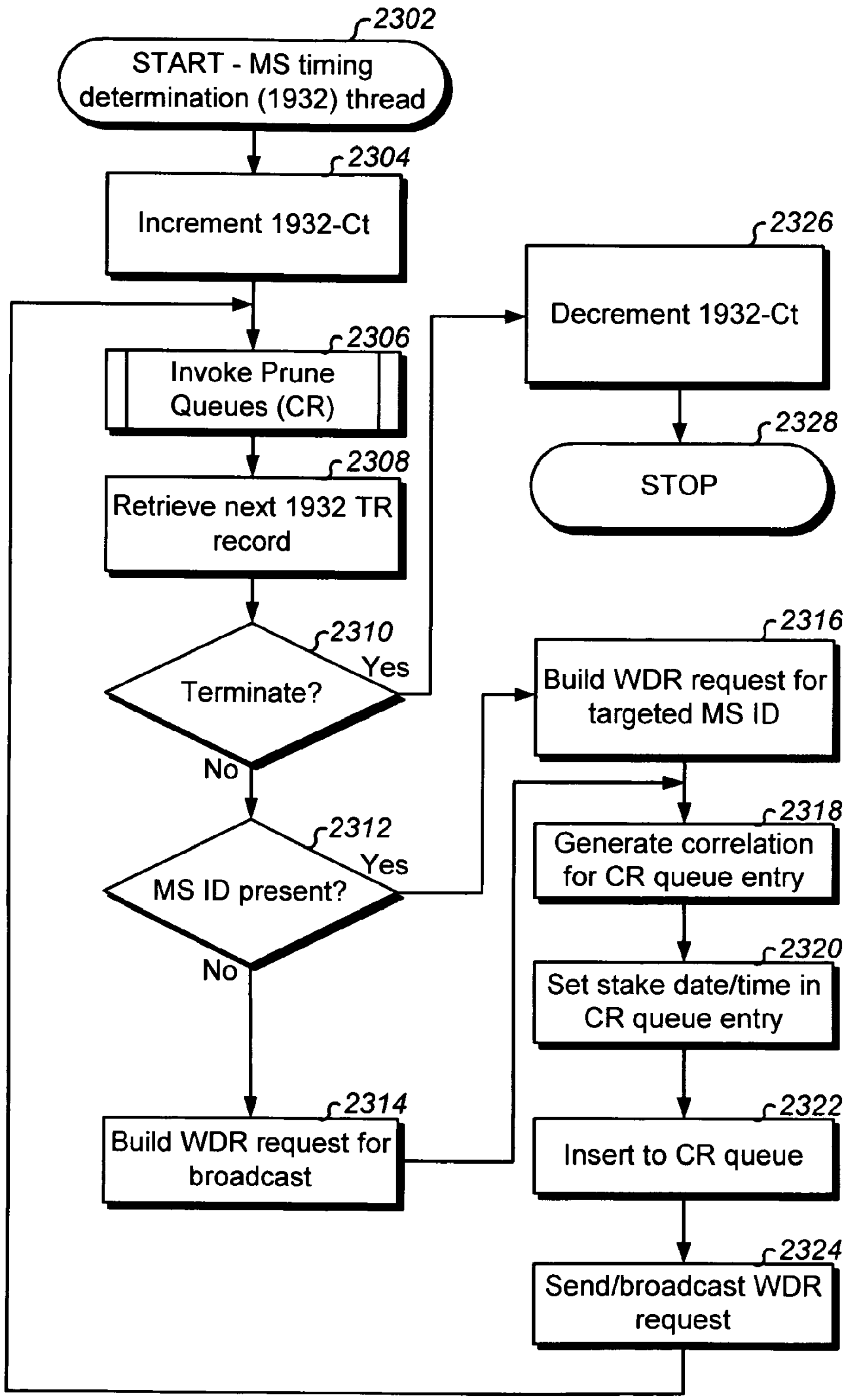
FIG. 23 depicts a flowchart for describing a preferred embodiment of MS timing determination processing.
Figure 25:
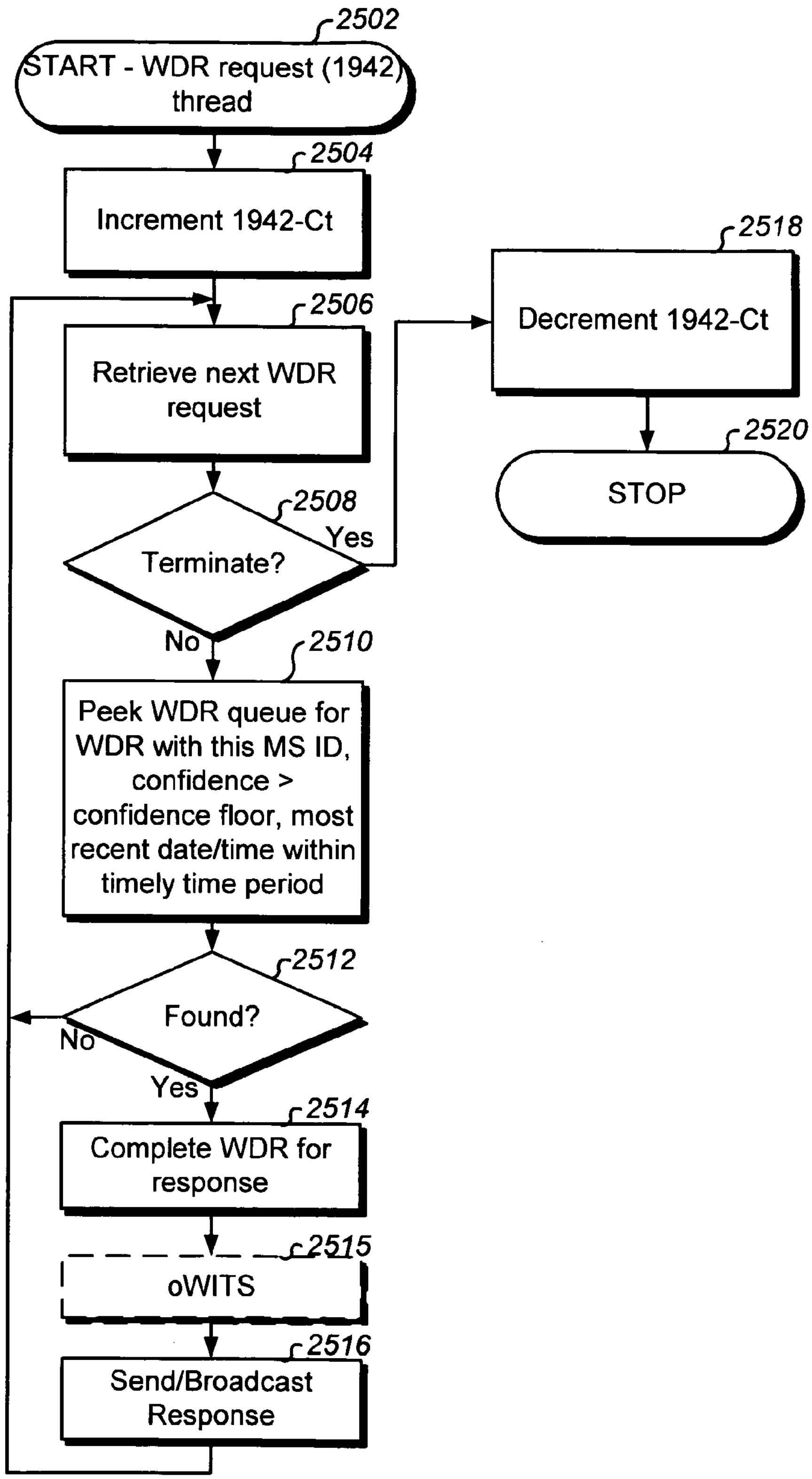
FIG. 25 depicts a flowchart for describing a preferred embodiment of MS WDR request processing.

The parent thread is indeed the parent for governing behavior of threads at the process whole level. Every process has a name for convenient reference, such as the names 1902, 1912, 1922, 1932, 1942 and 1952. Of course, these names may take on the associated human readable forms of whereabouts broadcast process, whereabouts collection process, whereabouts supervisor process, timing determination process, WDR request process, and whereabouts determination process, respectively. For brevity, the names used herein are by the process label of FIG. 19 in a form 19xx. There must be at is least one worker thread in a process. Worker thread(s) are described with a flowchart as follows:

1902—FIG. 20;
1912—FIG. 21;
1922—FIG. 22;
1932—FIG. 23;
1942—FIG. 25; and
1952—FIG. 26A.

Threads of architecture MS are presented from a software perspective, but there are applicable hardware/firmware process thread embodiments accomplished for the same functionality. In fact, hardware/firmware embodiments are preferred when it is known that processing is mature (i.e. stable) to provide the fastest possible performance. Architecture 1900 processing is best achieved at the highest possible performance speeds for optimal wireless communications processing. There are two (2) types of processes for describing the types of worker threads:

1) "Slave to Queue"; and
2) "Slave to Timer".

A 19xx process is a slave to queue process when its worker thread(s) are driven by feeding from a queue of architecture 1900. A slave to queue process stays "blocked" (O/S terminology "blocked"=preempted) on a queue entry retrieval interface until the sought queue item is inserted to the queue. The queue entry retrieval interface becomes "cleared" (O/S terminology "cleared"=clear to run) when the sought queue entry is retrieved from the queue by a thread. These terms (blocked and cleared) are analogous to a semaphore causing a thread to be blocked, and a thread to be cleared, as is well known in the art. Queues have semaphore control to ensure no more than one thread becomes clear at a time for a single queue entry retrieved (as done in an O/S). One thread sees a particular queue entry, but many threads can feed off the same queue to do the same work concurrently. Slave to queue type of processes are 1912, 1932, 1942 and 1952. A slave to queue process is properly terminated by inserting a special termination queue entry for each worker thread to terminate itself after queue entry retrieval.

A 19xx process is a slave to timer process when its worker thread(s) are driven by a timer for peeking a queue of architecture 1900. A timer provides the period of time for a worker thread to sleep during a looped iteration of checking a queue for a sought entry (without removing the entry from the queue). Slave to timer threads periodically peek a queue, and based on what is found, will process appropriately. A queue peek does not alter the peeked queue. The queue peek interface is semaphore protected for preventing peeking at an un-opportune time (e.g. while thread inserting or retrieving from queue). Queue interfaces ensure one thread is acting on a queue with a queue interface at any particular time. Slave to timer type of processes are 1902 and 1922. A slave to timer process is properly terminated by inserting a special termination queue entry for each worker thread to terminate itself by queue entry peek.

Figure 24A:
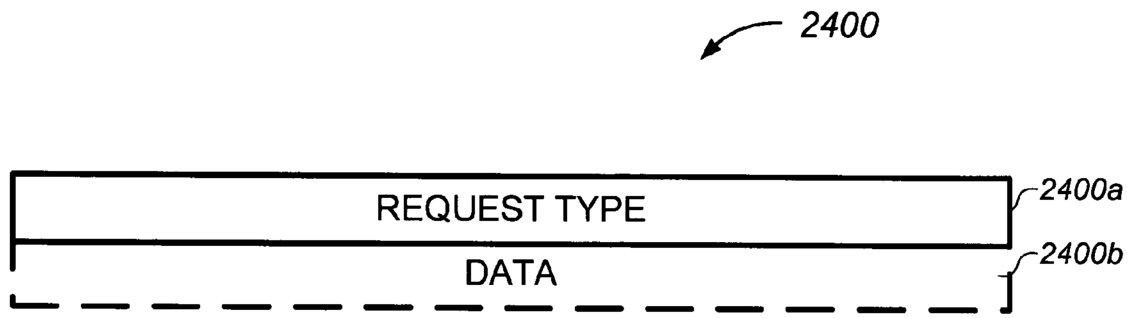
FIG. 24A depicts an illustration for describing a preferred embodiment of a thread request queue record.
Figure 29B:
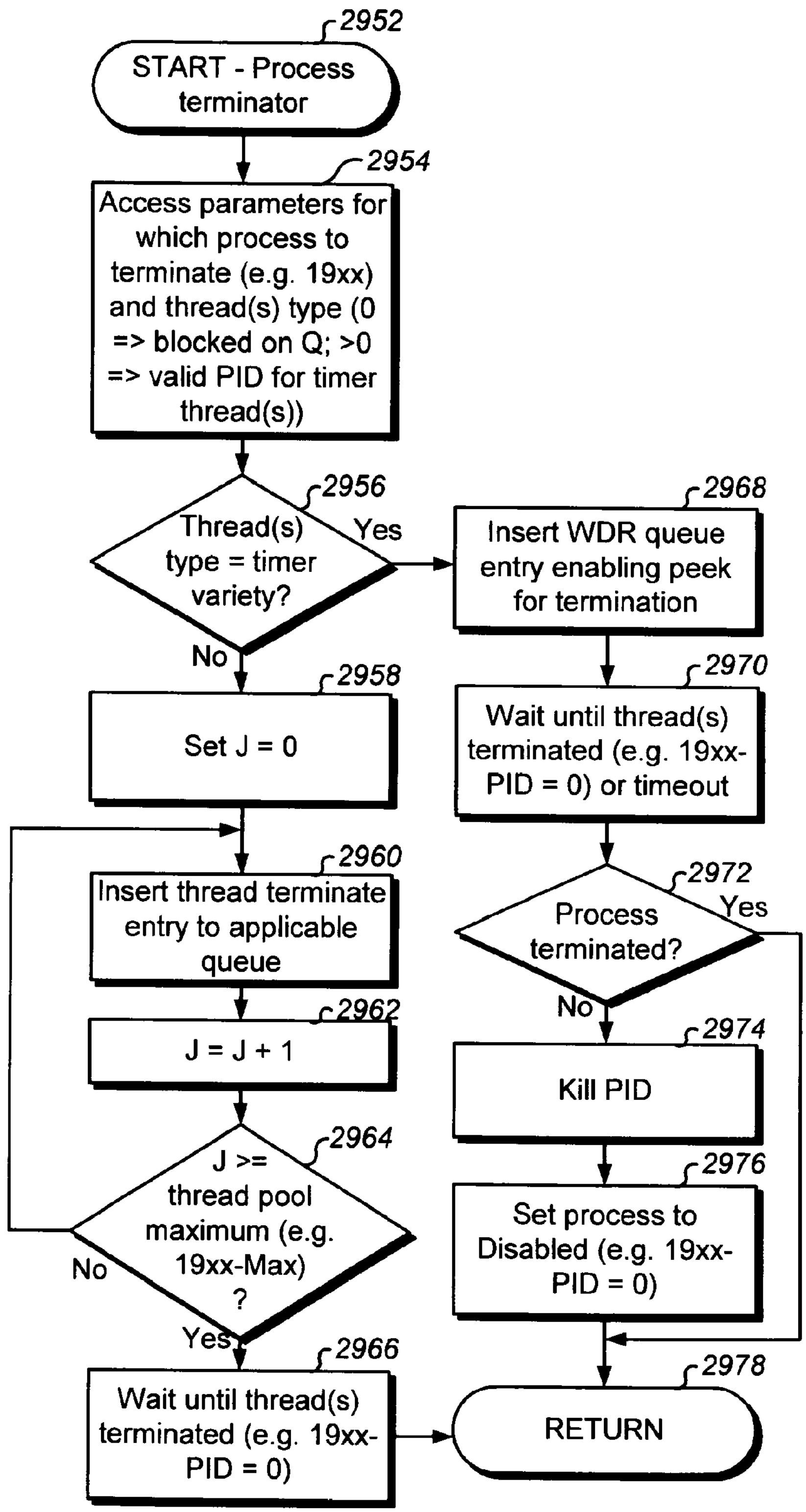
FIG. 29B depicts a flowchart for describing a preferred embodiment of a procedure for terminating the process started by FIG. 29A.

Block 2812 knows the type of 19xx process for preparing the process type parameter for invocation of FIG. 29B at block 2814. The type of process has slightly different termination requirements because of the worker thread(s) processing type. Alternate embodiments of slave to timer processes will make them slave to queue processes by simply feeding off Thread Request (TR) queue 1980 for driving a worker thread when to execute (and when to terminate). New timer(s) would insert timely queue entries to queue 1980, and processes 1902 and 1922 would retrieve from the queue (FIG. 24A record 2400). The queue entries would become available to queue 1980 when it is time for a particular worker thread to execute. Worker threads of processes 1902 and 1922 could retrieve, and stay blocked on, queue 1980 until an entry was inserted by a timer for enabling a worker thread (field 2400*a* set to 1902 or 1912). TR queue 1980 is useful for starting any threads of architecture 1900 in a slave to queue manner. This may be a cleaner architecture for all thread pools to operate the same way (slave to queue). Nevertheless, the two thread pool methods are implemented.

Each 19xx process has at least four (4) variables for describing present disclosure processing:

19xx-PID=The O/S terminology "Process Identifier (PID)" for the O/S PID of the 19xx process. This variable is also used to determine if the process is enabled (PID>0), or is disabled (PID=0 (i.e. <=0));

19xx-Max=The configured number of worker thread(s) for the 19xx process;

19xx-Sem=A process local semaphore for synchronizing 19xx worker threads, for example in properly starting up worker threads in process 19xx, and for properly terminating worker threads in process 19xx; and

19xx-Ct=A process local count of the number of worker thread(s) currently running in the 19xx process.

19xx-PID and 19xx-Max are variables of PIP data 8. 19xx-Sem and 19xx-Ct are preferably process 19xx stack variables within the context of PIP code 6. 19xx-PID is a semaphore protected global variable in architecture 1900 so that it can be used to determine whether or not a particular 19xx process is enabled (i.e. running) or disabled (not running). 19xx-Max is a semaphore protected global variable in architecture 1900 so that user configuration processing outside of architecture 1900 can be used to administrate a desired number of worker threads for a 19xx process. Alternate embodiments will not provide user configuration of 19xx-Max variables (e.g. hard coded maximum number of threads), in which case no 19xx-Max global variable is necessary. "Thread(s) 19xx" is a brief form of stating "worker thread(s) of the 19xx process".

Receive (Rx) queue 26 is for receiving CK 1304 or CK 1314 data (e.g. WDR or WDR requests), for example from wireless transmissions. Queue 26 will receive at least WDR information (destined for threads 1912) and WDR requests (FIG. 24C records 2490 destined for threads 1942). At least one thread (not shown) is responsible for listening on appropriate channel(s) and immediately depositing appropriate records to queue 26 so that they can be processed by architecture 1900. Preferably, there is a plurality (pool) of threads for feeding queue 26 based on channel(s) being listened on, and data 1302 or 1312 anticipated for being received. Alternative embodiments of thread(s) 1912 may themselves directly be listening on appropriate channels and immediately processing packets identified, in lieu of a queue 26. Alternative embodiments of thread(s) 1942 may themselves directly be listening on appropriate channels and immediately processing packets identified, in lieu of a queue 26. Queue 26 is preferred to isolate channel(s) (e.g. frequency(s)) and transmission reception processing in well known modular (e.g. Radio Frequency (RF)) componentry, while providing a high performance queue interface to other asynchronous threads of architecture 1900 (e.g. thread(s) of process 1912). Wave spectrums (via particular communications interface 70) are appropriately processed for feeding queue 26. As soon as a record is received by an MS, it is assumed ready for processing at queue 26. All queue 26 accesses are assumed to have appropriate semaphore control to ensure synchronous access by any thread at any particular time to prevent data corruption and misuse. Queue entries inserted to queue 26 may have arrived on different channel(s), and in such embodiments a channel qualifier may further direct queue entries from queue 26 to a particular thread 1912 or 1942 (e.g. thread(s) dedicated to channel(s)). In other embodiments, receive processing feeds queue 26 independent of any particular channel(s) monitored, or received on (the preferred embodiment described). Regardless of how data is received and then immediately placed on queue 26, a received date/time stamp (e.g. fields 1100*p* or 2490*c*) is added to the applicable record for communicating the received date/time stamp to a thread (e.g. thread(s) 1912 or 1942) of when the data was received. Therefore, the queue 26 insert interface tells the waiting thread(s) when the data was actually received. This ensures a most accurate received date/time stamp as close to receive processing as possible (e.g. enabling most accurate TDOA measurements). An alternate embodiment could determine applicable received date/time stamps in thread(s) 1912 or thread(s) 1942. Other data placed into received WDRs are: wave spectrum and/or particular communications interface 70 of the channel received on, and heading/yaw/pitch/roll (or accelerometer readings) with AOA measurements, signal strength, and other field 1100*f* eligible data of the receiving MS. Depending on alternative embodiments, queue 26 may be viewed metaphorically for providing convenient grounds of explanation.

Send (Tx) queue 24 is for sending/communicating CK 1304 data, for example for wireless transmissions. At least one thread (not shown) is responsible for immediately transmitting (e.g. wirelessly) anything deposited to queue 24. Preferably, there is a plurality (pool) of threads for feeding off of queue 24 based on channel(s) being transmitted on, and data 1302 anticipated for being sent. Alternative embodiments of thread(s) of processes 1902, 1922, 1932 and 1942 may themselves directly transmit (send/broadcast) on appropriate channels anything deposited to queue 24, in lieu of a queue 24. Queue 24 is preferred to isolate channel(s) (e.g. frequency(s)) and transmission processing in well known modular (e.g. RF) componentry, while providing a high performance queue interface to other asynchronous threads of architecture 1900 (e.g. thread(s) 1942). Wave spectrums and/or particular communications interface 70 are appropriately processed for sending from queue 24. All queue 24 accesses are assumed to have appropriate semaphore control to ensure synchronous access by any thread at any particular time to prevent data corruption and misuse. As soon as a record is inserted to queue 24, it is assumed sent immediately. Preferably, fields sent depend on fields set. Queue entries inserted to queue 24 may contain specification for which channel(s) to send on in some embodiments. In other embodiments, send processing feeding from queue 24 has intelligence for which channel(s) to send on (the preferred embodiment described). Depending on alternative embodiments, queue 24 may be viewed metaphorically for providing convenient grounds of explanation.

When interfacing to queue 24, the term "broadcast" refers to sending outgoing data in a manner for reaching as many MSs as possible (e.g. use all participating communications interfaces 70), whereas the term "send" refers to targeting a particular MS or group of MSs.

WDR queue 22 preferably contains at least one WDR 1100 at any point in time, for at least describing whereabouts of the MS of architecture 1900. Queue 22 accesses are assumed to have appropriate semaphore control to ensure synchronous access by any thread at any particular time to prevent data corruption and misuse. A single instance of data embodiment of queue 22 may require an explicit semaphore control for access. In a WDR plurality maintained to queue 22, appropriate queue interfaces are again provided to ensure synchronous thread access (e.g. implicit semaphore control). Regardless, there is still a need for a queue 22 to maintain a plurality of WDRs from remote MSs. The preferred embodiment of all queue interfaces uses queue interface maintained semaphore(s) invisible to code making use of queue (e.g. API) interfaces. Depending on alternative embodiments, queue 22 may be viewed metaphorically for providing convenient grounds of explanation.

Thread Request (TR) queue 1980 is for requesting processing by either a timing determination (worker) thread of process 1932 (i.e. thread 1932) or whereabouts determination (worker) thread of process 1952 (i.e. thread 1952). When requesting processing by a thread 1932, TR queue 1980 has requests (retrieved via processing 1934 after insertion processing 1918) from a thread 1912 to initiate TDOA measurement. When requesting processing by a thread 1952, TR queue 1980 has requests (retrieved via processing 1958 after insertion processing 1918 or 1930) from a thread 1912 or 1922 so that thread 1952 performs whereabouts determination of the MS of architecture 1900. Requests of queue 1980 comprise records 2400. Preferably, there is a plurality (pool) of threads 1912 for feeding queue 1980 (i.e. feeding from queue 26), and for feeding a plurality each of threads 1932 and 1952 from queue 1980. All queue 1980 accesses are assumed to have appropriate semaphore control to ensure synchronous access by any thread at any particular time to prevent data corruption and misuse. Depending on alternative embodiments, queue 1980 may be viewed metaphorically for providing convenient grounds of explanation.

With reference now to FIG. 24A, depicted is an illustration for describing a preferred embodiment of a thread request queue record, as maintained to Thread Request (TR) queue 1980. TR queue 1980 is not required when a LN-expanse globally uses NTP, as found in thread 19xx processing described for architecture 1900, however it may be required at a MS which does not have NTP, or a MS which interacts with another data processing system (e.g. MS) that does not have NTP. Therefore, TR queue record 2400 (i.e. queue entry 2400) may, or may not, be required. This is the reason FIG. 1A does not depict queue 1980. When NTP is in use globally (in LN-expanse), TDOA measurements can be made using a single unidirectional data (1302 or 1312) packet containing a sent date/time stamp (of when the data was sent). Upon receipt, that sent date/time stamp received is compared with the date/time of receipt to determine the difference. The difference is a TDOA measurement. Knowing transmission speeds with a TDOA measurement allows calculating a distance. In this NTP scenario, no thread(s) 1932 are required.

Threads 1912 and/or DLM processing may always insert the MS whereabouts without requirement for thread(s) 1952 by incorporating thread 1952 logic into thread 1912, or by directly starting (without queue 1980) a thread 1952 from a thread 1912. Therefore, threads 1952 may not be required. If threads 1952 are not required, queue 1980 may not be required by incorporating thread 1932 logic into thread 1912, or by directly starting (without queue 1980) a thread 1932 from a thread 1912. Therefore, queue 1980 may not be required, and threads 1932 may not be required.

Records 2400 (i.e. queue entries 2400) contain a request type field 2400*a* and data field 2400*b*. Request type field 2400*a* simply routes the queue entry to destined thread(s) (e.g. thread(s) 1932 or thread(s) 1952). A thread 1932 remains blocked on queue 1980 until a record 2400 is inserted which has a field 2400*a* containing the value 1932. A thread 1952 remains blocked on queue 1980 until a record 2400 is inserted which has a field 2400*a* containing the value 1952. Data field 2400*b* is set to zero (0) when type field 2400*a* contains 1952 (i.e. not relevant). Data field 2400*b* contains an MS ID (field 1100*a*) value, and possibly a targeted communications interface 70 (or wave spectrum if one to one), when type field contains 1932. Field 2400*b* will contain information for appropriately targeting the MS ID with data (e.g. communications interface to use if MS has multiple of them). An MS with only one communications interface can store only a MS ID in field 2400*b*.

Records 2400 are used to cause appropriate processing by 19xx threads (e.g. 1932 or 1952) as invoked when needed (e.g. by thread(s) 1912). Process 1932 is a slave to queue type of process, and there are no queue 1980 entries 2400 which will not get timely processed by a thread 1932. No interim pruning is necessary to queue 1980.

With reference now back to FIG. 19, Correlation Response (CR) queue 1990 is for receiving correlation data for correlating requests transmitted in data 1302 with responses received in data 1302 or 1312. Records 2450 are inserted to queue 1990 (via processing 1928) from thread(s) 1922 so that thread(s) 1912 (after processing 1920) correlate data 1302 or 1312 with requests sent by thread(s) 1922 (e.g. over interface 1926), for the purpose of calculating a TDOA measurement. Additionally, records 2450 are inserted to queue 1990 (via processing 1936) from thread(s) 1932 so that thread(s) 1912 (after processing 1920) correlate data 1302 or 1312 with requests sent by thread(s) 1932 (e.g. over interface 1938), for the purpose of calculating a TDOA measurement. Preferably, there is a plurality (pool) of threads for feeding queue 1990 and for feeding from queue 1990 (feeding from queue 1990 with thread(s) 1912). All queue 1990 accesses are assumed to have appropriate semaphore control to ensure synchronous access by any thread at any particular time to prevent data corruption and misuse. Depending on alternative embodiments, queue 1990 may be viewed metaphorically for providing convenient grounds of explanation.

Figure 24B:
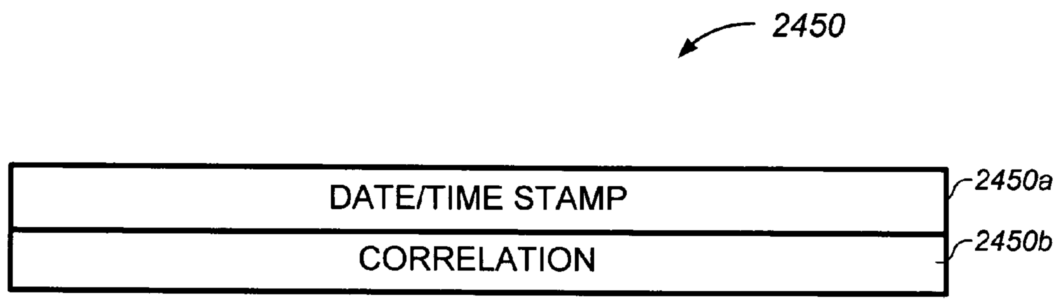
FIG. 24B depicts an illustration for describing a preferred embodiment of a correlation response queue record.

With reference now to FIG. 24B, depicted is an illustration for describing a preferred embodiment of a correlation response queue record, as maintained to Correlation Response (CR) queue 1990. CR queue 1990 is not required when a LN-expanse globally uses NTP, as found in thread 19xx processing described for architecture 1900, however it may be required at a MS which does not have NTP, or a MS which interacts with another data processing system (e.g. MS) that does not have NTP. Therefore, CR record 2450 (i.e. queue entry 2450) may, or may not, be required. This is the reason FIG. 1A does not depict queue 1990. The purpose of CR queue 1990 is to enable calculation of TDOA measurements using correlation data to match a request with a response. When NTP is used globally in the LN-expanse, no such correlations between a request and response is required, as described above. In the NTP scenario, thread(s) 1912 can deduce TDOA measurements directly from responses (see FIG. 21), and there is no requirement for threads 1932.

TDOA measurements are best taken using date/time stamps as close to the processing points of sending and receiving as possible, otherwise critical regions of code may be required for enabling process time adjustments to the measurements when processing is "further out" from said points. This is the reason MS receive processing provides received date/time stamps with data inserted to queue 26 (field 1100*p* or 2490*c*). In a preferred embodiment, send queue 24 processing inserts to queue 1990 so the date/time stamp field 2450*a* for when sent is as close to just prior to having been sent as possible. However, there is still the requirement for processing time spent inserting to queue 1990 prior to sending anyway. Anticipated processing speeds of architecture 1900 allow reasonably moving sent date/time stamp setting just a little "further out" from actually sending to keep modular send processing isolated. A preferred embodiment (as presented) assumes the send queue 24 interface minimizes processing instructions from when data is placed onto queue 24 and when it is actually sent, so that the sending thread(s) 19xx (1902, 1922, 1932 and 1942) insert to queue 1990 with a reasonably accurate sent/date stamp field 2450*a*. This ensures a most accurate sent date/time stamp (e.g. enabling most accurate TDOA measurements). An alternate embodiment makes appropriate adjustments for more accurate time to consider processing instructions up to the point of sending after queue 1990 insertion.

Records 2450 (i.e. queue entries 2450) contain a date/time stamp field 2450*a* and a correlation data field 2450*b*. Date/time stamp field 2450*a* contains a date/time stamp of when a request (data 1302) was sent as set by the thread inserting the queue entry 2450. Correlation data field 2450*b* contains unique correlation data (e.g. MS id with suffix of unique number) used to provide correlation for matching sent requests (data 1302) with received responses (data 1302 or 1312), regardless of the particular communications interface(s) used (e.g. different wave spectrums supported by MS). Upon a correlation match, a TDOA measurement is calculated using the time difference between field 2450*a* and a date/time stamp of when the response was received (e.g. field 1100*p*). A thread 1912 accesses queue 1990 for a record 2450 using correlation field 2450*b* to match, when data 1302 or 1312 contains correlation data for matching. A thread 1912 then uses the field 2450*a* to calculate a TDOA measurement. Process 1912 is not a slave to queue 1990 (but is to queue 26). A thread 1912 peeks queue 1990 for a matching entry when appropriate. Queue 1990 may contain obsolete queue entries 2450 until pruning is performed. Some WDR requests may be broadcasts, therefore records 2450 may be used for correlating a plurality of responses. In another record 2450 embodiment, an additional field 2450*c* is provided for specification of which communication interface(s) and/or channel(s) to listen on for a response.

With reference now back to FIG. 19, any reasonable subset of architecture 1900 processing may be incorporated in a MS. For example in one minimal subset embodiment, a DLM which has excellent direct locating means only needs a single instance WDR (queue 22) and a single thread 1902 for broadcasting whereabouts data to facilitate whereabouts determination by other MSs. In a near superset embodiment, process 1942 processing may be incorporated completely into process 1912, thereby eliminating processing 1942 by having threads 1912 feed from queue 26 for WDR requests as well as WDR information. In another subset embodiment, process 1922 may only send requests to queue 24 for responses, or may only start a thread 1952 for determining whereabouts of the MS. There are many viable subset embodiments depending on the MS being a DLM or ILM, capabilities of the MS, LN-expanse deployment design choices, etc. A reference to FIG. 19 accompanies thread 19*xx* flowcharts (FIGS. 20, 21, 22, 23, 25 and 26A). The user, preferably an administrator type (e.g. for lbxPhone™ debug) selectively configures whether or not to start or terminate a process (thread pool), and perhaps the number of threads to start in the pool (see FIG. 14A). Starting a process (and threads) and terminating processes (and threads) is shown in flowcharts 29A and 29B. There are other embodiments for properly starting and terminating threads without departing from the spirit and scope of this disclosure.

LBX of data may also be viewed as LBX of objects, for example a WDR, WDR request, TDOA request, AOA request, charters, permissions, data record(s), or any other data may be viewed as an object. A subset of an object or data may also be viewed as an object.

While a consumer ready lbxPhone™ preferably incorporates a multithreaded architecture 1900 using an optimized O/S kernel and communications interfaces in hardware ("burned in" well tested semiconductor(s) microcode) for maximum performance, some LBX enabled MSs may integrate the functionality as close to a MS O/S kernel as is reasonable for a particular MS (e.g. with modifiable software, pluggable microcode chip, etc). Still other MSs may provide plug-in adaptability for LBX processing, perhaps even at an application layer. For example, Apple may provide LBX processing, or a subset thereof, as an "App" (application) in their "App Store" for customer download to an iPhone when the MS (iPhone) contains sufficient performance and/or interfaces to provide optimal performance. There are many examples for carrying out the LBX architecture.

FIG. 20 depicts a flowchart for describing a preferred embodiment of MS whereabouts broadcast processing, for example to facilitate other MSs in locating themselves in an LN-expanse. FIG. 20 processing describes a process 1902 worker thread, and is of PIP code 6. Thread(s) 1902 purpose is for the MS of FIG. 20 processing (e.g. a first, or sending, MS) to periodically transmit whereabouts information to other MSs (e.g. at least a second, or receiving, MS) to use in locating themselves. It is recommended that validity criteria set at block 1444 for 1902-Max be fixed at one (1) in the preferred embodiment. Multiple channels for broadcast at block 2016 should be isolated to modular send processing (feeding from a queue 24).

In an alternative embodiment having multiple transmission channels visible to process 1902, there can be a worker thread 1902 per channel to handle broadcasting on multiple channels. If thread(s) 1902 (block 2016) do not transmit directly over the channel themselves, this embodiment would provide means for communicating the channel for broadcast to send processing when interfacing to queue 24 (e.g. incorporate a channel qualifier field with WDR inserted to queue 24). This embodiment could allow specification of at least one (1) worker thread per channel, however multiple worker threads configurable for process 1902 as appropriated for the number of channels configurable for broadcast.

Processing begins at block 2002, continues to block 2004 where the process worker thread count 1902-Ct is accessed and incremented by 1 (using appropriate semaphore access (e.g. 1902-Sem)), and continues to block 2006 for peeking WDR queue 22 for a special termination request entry. Block 2004 may also check the 1902-Ct value, and signal the process 1902 parent thread that all worker threads are running when 1902-Ct reaches 1902-Max. Thereafter, if block 2008 determines that a worker thread termination request was not found in queue 22, processing continues to block 2010. Block 2010 peeks the WDR queue 22 (using interface 1904) for the most recent highest confidence entry for this MS whereabouts by searching queue 22 for: the MS ID field 1100*a* matching the MS ID of FIG. 20 processing, and a confidence field 1100*d* greater than or equal to the confidence floor value, and a most recent NTP enabled date/time stamp field 1100*b* within a prescribed trailing period of time (e.g. preferably less than or equal to 2 seconds). For example, block 2010 peeks the queue (i.e. makes a copy for use if an entry found for subsequent processing, but does not remove the entry from queue) for a WDR of this MS (i.e. MS of FIG. 20 processing) which has the greatest confidence over 75 and has been most recently inserted to queue 22 with an NTP date/time stamp in the last 2 seconds. Date/time stamps for MS whereabouts which are not NTP derived have little use in the overall palette of process 19xx choices of architecture 1900 because receiving data processing systems (e.g. MSs) will have no means of determining an accurate TDOA measurement in the unidirectional transmission from an NTP disabled MS. A receiving data processing system will still require a bidirectional correlated exchange with the MS of FIG. 20 processing to determine an accurate TDOA measurement in its own time scale (which is accomplished with thread(s) 1922 pulling WDR information anyway). An alternate embodiment to block 2010 will not use the NTP indicator as a search criteria so that receiving data processing systems can receive to a thread

1912, and then continue for appropriate correlation processing, or can at least maintain whereabouts to queue 22 to know who is nearby.

Thread 1902 is of less value to the LN-expanse when it broadcasts outdated/invalid whereabouts of the MS to facilitate locating other MSs. In an alternate embodiment, a movement tolerance (e.g. user configured or system set (e.g. 3 meters)) is incorporated at the MS, or at service(s) used to locate the MS, for knowing when the MS has significantly moved (e.g. more than 3 meters) and how long it has been (e.g. 45 seconds) since last significantly moving. In this embodiment, the MS is aware of the period of time since last significantly moving and the search time criteria is set using the amount of time since the MS significantly moved (whichever is greater). This way a large number of (perhaps more confident candidates) WDRs are searched in the time period when the MS has not significantly moved. Optional blocks 278 through 284 may have been incorporated to FIG. 2F for movement tolerance processing just described, in which case the LWT is compared to the current date/time of block 2010 processing to adjust block 2010 search time criteria for the correct trailing period. In any case, a WDR is sought at block 2010 which will help other MSs in the LN-expanse locate themselves, and to let other MSs know who is nearby.

Thereafter, if block 2012 determines a useful WDR was found, then block 2014 prepares the WDR for send processing, block 2016 broadcasts the WDR information (using send interface 1906) by inserting to queue 24 so that send processing broadcasts data 1302 (e.g. on all available communications interface(s) 70), for example as far as radius 1306, and processing continues to block 2018. The broadcast is for reception by data processing systems (e.g. MSs) in the vicinity. At least fields 1100*b*, 1100*c*, 1100*d*, and 1100*n* are broadcast. See FIG. 11A descriptions. Fields are set to the following upon exit from block 2014:

MS ID field 1100*a* is preferably set with: Field 1100*a* from queue 22, or transformed (if not already) into a pseudo MS ID (possibly for future correlation) if desired. This field may also be set to null (not set) because it is not required when the NTP indicator of field 1100*b* is enabled and the broadcast is sent with an NTP enabled field 1100*n*.

DATE/TIME STAMP field 1100*b* is preferably set with: Field 1100*b* from queue 22.

LOCATION field 1100*c* is preferably set with: Field 1100*c* from queue 22.

CONFIDENCE field 1100*d* is preferably set with: Field 1100*d* from queue 22.

LOCATION TECHNOLOGY field 1100*e* is preferably set with: Field 1100*e* from queue 22.

LOCATION REFERENCE INFO field 1100*f* is preferably set with: null (not set). Null indicates to send processing feeding from queue 24 to use all available comm. interfaces 70 (i.e. Broadcast). Specifying a comm. interface targets the specified interface (i.e. send).

COMMUNICATIONS REFERENCE INFO field 1100*g* is preferably set with: null (not set). If MS ID (or pseudo MS ID) is sent, this is all that is required to target this MS.

SPEED field 1100*h* is preferably set with: Field 1100*h* from queue 22.

HEADING field 1100*i* is preferably set with: Field 1100*i* from queue 22.

ELEVATION field 1100*j* is preferably set with: Field 1100*j* from queue 22.

APPLICATION FIELDS field 1100*k* is preferably set with: Field 1100*k* from queue 22. An alternate embodiment will add, alter, or discard data (with or without date/time stamps) here at the time of block 2014 processing.

CORRELATION FIELD 1100*m* is preferably set with: null (not set).

SENT DATE/TIME STAMP field 1100*n* is preferably set with: Sent date/time stamp as close in processing the broadcast of block 2016 as possible.

RECEIVED DATE/TIME STAMP field 1100*p* is preferably set with: Not Applicable (i.e. N/A for sending).

Block 2018 causes thread 1902 to sleep according to the SPTP setting (e.g. a few seconds). When the sleep time has elapsed, processing continues back to block 2006 for another loop iteration of blocks 2006 through 2016. Referring back to block 2012, if a useful WDR was not found (e.g. candidates too old), then processing continues to block 2018. Referring back to block 2008, if a worker thread termination request entry was found at queue 22, then block 2020 decrements the worker thread count by 1 (using appropriate semaphore access (e.g. 1902-Sem)), and thread 1902 processing terminates at block 2022. Block 2020 may also check the 1902-Ct value, and signal the process 1902 parent thread that all worker threads are terminated when 1902-Ct equals zero (0).

Block 2016 causes broadcasting data 1302 containing CK 1304 wherein CK 1304 contains WDR information prepared as described above for block 2014. Alternative embodiments of block 2010 may not search a specified confidence value, and broadcast the best entry available anyway so that listeners in the vicinity will decide what to do with it. A semaphore protected data access (instead of a queue peek) may be used in embodiments where there is always one WDR current entry maintained for the MS.

In the embodiment wherein usual MS communications data 1302 of the MS is altered to contain CK 1304 for listening MSs in the vicinity, send processing feeding from queue 24, caused by block 2016 processing, will place WDR information as CK 1304 embedded in usual data 1302 at the next opportune time of sending usual data 1302. If an opportune time is not timely, send processing should discard the send request of block 2016 to avoid broadcasting outdated whereabouts information (unless using a movement tolerance and time since last significant movement). As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 20 sends repeated timely pulsed broadcasts of new data 1302 (per SPTP) for MSs in the vicinity of the first MS to receive. In any case, appropriate implementation should ensure field 1100*n* is as accurate as possible for when data 1302 is actually sent.

An alternate embodiment to architecture 1900 for elimination of process 1902 incorporates a trigger implementation for broadcasting MS whereabouts at the best possible time—i.e. when the MS whereabouts is inserted to queue 22. As soon as a new (preferably NTP enabled) WDR candidate becomes available, it can be broadcast at a new block 279 of FIG. 2F. (e.g. new block 279 continued to from block 278 and then continuing to block 280). Fields are set as described above for FIG. 20. Preferably, the new block 279 starts an asynchronous thread consisting of blocks 2014 and 2016 so that FIG. 2F processing performance is not impacted. In a further embodiment, block 279 can be further enhanced using the SPTP value to make sure that too many broadcasts are not made. The SPTP (Source Periodicity Time Period) could be observed for getting as close as possible to broadcasting whereabouts in accordance with SPTP (e.g. worst case there are not enough broadcasts).

FIG. 21 depicts a flowchart for describing a preferred embodiment of MS whereabouts collection processing. FIG. 21 processing describes a process 1912 worker thread, and is of PIP code 6. Thread(s) 1912 purpose is for the MS of FIG. 21 processing (e.g. a second, or receiving, MS) to collect potentially useful WDR information from other MSs (e.g. at least a first, or sending, MS) in the vicinity for determining whereabouts of the receiving (second) MS. It is recommended that validity criteria set at block 1444 for 1912-Max be set as high as possible (e.g. 10) relative performance considerations of architecture 1900, with at least one thread per channel that WDR information may be received on by the receiving MS. Multiple channels for receiving data fed to queue 26 should be isolated to modular receive processing (feeding a queue 26).

In an alternative embodiment having multiple receiving transmission channels visible to process 1912 (e.g. thread(s) 1912 receiving directly), there can be a worker thread 1912 per channel to handle receiving on multiple channels simultaneously. If thread(s) 1912 do not receive directly from the channel, the preferred embodiment of FIG. 21 would not need to convey channel information to thread(s) 1912 waiting on queue 26 anyway. Embodiments could allow specification/configuration of many thread(s) 1912 per channel.

Figure 27A:
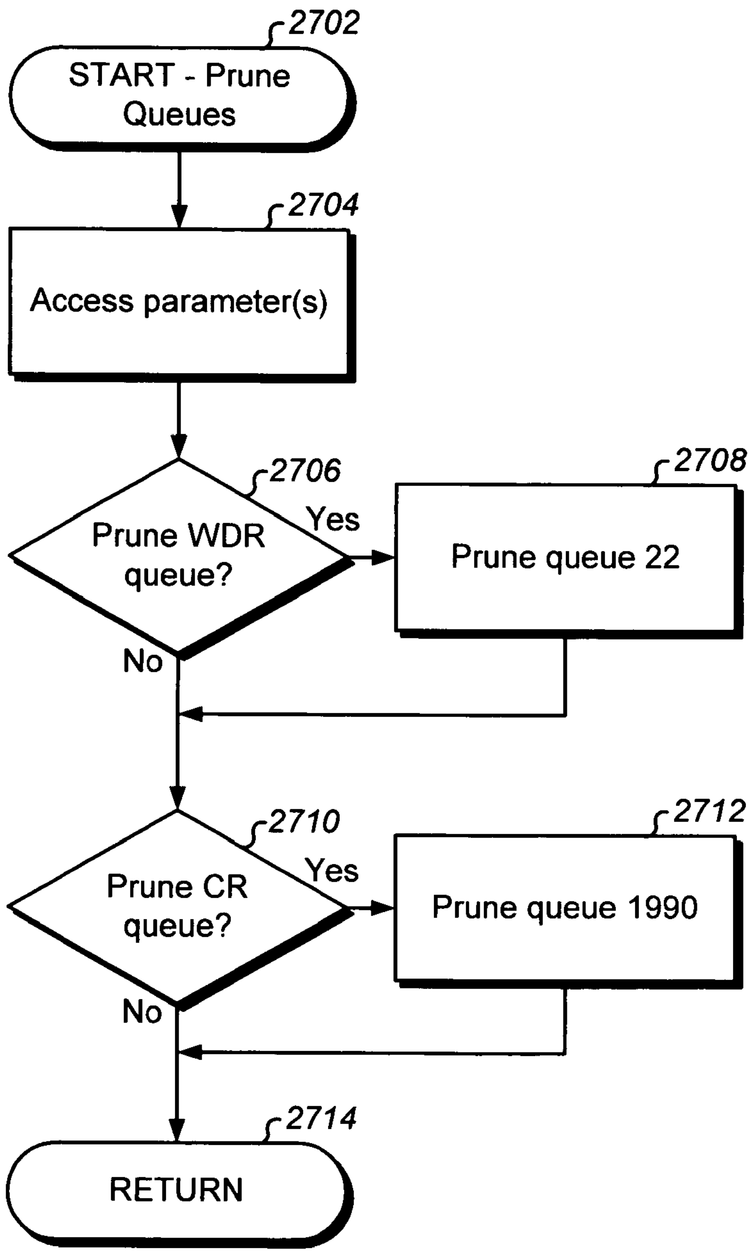
FIG. 27A depicts a flowchart for describing a preferred embodiment of queue prune processing.

Processing begins at block 2102, continues to block 2104 where the process worker thread count 1912-Ct is accessed and incremented by 1 (using appropriate semaphore access (e.g. 1912-Sem)), and continues to block 2106 for interim housekeeping of pruning the WDR queue by invoking a Prune Queues procedure of FIG. 27A. Block 2104 may also check the 1912-Ct value, and signal the process 1912 parent thread that all worker threads are running when 1912-Ct reaches 1912-Max. Block 2106 may not be required since block 2130 can cause queue 22 pruning (block 292).

Thereafter, block 2108 retrieves from queue 26 a WDR (using interface 1914), perhaps a special termination request entry, or a WDR received in data 1302 (CK 1304) or data 1312 (CK 1314), and only continues to block 2110 when a WDR has been retrieved. Block 2108 stays blocked on retrieving from queue 26 until any WDR is retrieved. If block 2110 determines that a special WDR indicating to terminate was not found in queue 26, processing continues to block 2112. Block 2112 adjusts date/time stamp field 1100*b* if necessary depending on NTP use in the LN-expanse and adjusts the confidence field 1100*d* accordingly. In a preferred embodiment, fields 1100*b* and 1100*d* for the WDR in process is set as follows for certain conditions:

- Fields 1100*b*, 1100*n* and 1100*p* all NTP indicated: keep fields 1100*b* and 1100*d* as is; or
- Fields 1100*b* and 1100*n* are NTP indicated, 1100*p* is not: Is correlation (field 1100*m*) present?: No, then set confidence (field 1100*d*) to 0 (for filtering out at block 2114)/Yes, then set field 1100*b* to 1100*p* (in time terms of this MS) and adjust confidence lower based on differences between fields 1100*b*, 1100*n* and 1100*p*; or
- Fields 1100*b* and 1100*p* are NTP indicated, 1100*n* is not: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*; or
- Fields 1100*b* NTP indicated, 1100*n* and 1100*p* not: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*; or
- Field 1100*b* not NTP indicated, 1100*n* and 1100*p* are: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*; or
- Fields 1100*b* and 1100*p* are not NTP indicated, 1100*n* is: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*; or
- Fields 1100*b* and 1100*n* are not NTP indicated, 1100*p* is: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*; or
- Fields 1100*b*, 1100*n* and 1100*p* not NTP indicated: Is correlation present?: No, then set confidence to 0 (for filtering out at block 2114)/Yes, then set field 1100*b* to 1100*p* (in time terms of this MS) and adjust confidence lower based on differences between fields 1100*b*, 1100*n* and 1100*p*.

NTP ensures maintaining a high confidence in the LN-expanse, but absence of NTP is still useful. Confidence values should be adjusted with the knowledge of the trailing time periods used for searches when sharing whereabouts (e.g. thread(s) 1942 searches). Block 2112 continues to block 2114.

If at block 2114, the WDR confidence field 1100*d* is not greater than the confidence floor value, then processing continues back to block 2106. If block 2114 determines that the WDR field 1100*d* is satisfactory, then block 2116 initializes a TDOA_FINAL variable to False, and block 2118 checks if the WDR from block 2108 contains correlation (field 1100*m*).

If block 2118 determines the WDR does not contain correlation, then block 2120 accesses the ILMV, block 2122 determines the source (ILM or DLM) of the WDR using the originator indicator of field 1100*e*, and block 2124 checks suitability for collection of the WDR. While processes 19xx running are generally reflective of the ILMV roles configured, it is possible that the more descriptive nature of ILMV role(s) not be one to one in relationship to 19xx processes, in particular depending on the subset of architecture 1900 in use. Block 2124 is redundant anyway because of block 274. If block 2124 determines the ILMV role is disabled for collecting this WDR, then processing continues back to block 2106. If block 2124 determines the ILMV role is enabled for collecting this WDR, then processing continues to block 2126.

If block 2126 determines both the first (sending) and second (receiving) MS are NTP enabled (i.e. Fields 1100*b*, 1100*n* and 1100*p* are NTP indicated) OR if TDOA_FINAL is set to True (as arrived to via block 2150), then block 2128 completes the WDR for queue 22 insertion, block 2130 prepares parameters for FIG. 2F processing and block 2132 invokes FIG. 2F processing (interface 1916). Parameters set at block 2130 are: WDRREF=a reference or pointer to the WDR completed at block 2128; DELETEQ=FIG. 21 location queue discard processing; and SUPER=FIG. 21 supervisory notification processing. Block 2128 calculates a TDOA measurement whenever possible and inserts to field 1100*f*. See FIG. 11A descriptions. Fields are set to the following upon exit from block 2128:

MS ID field 1100*a* is preferably set with: Field 1100*a* from queue 26.

DATE/TIME STAMP field 1100*b* is preferably set with: Preferred embodiment discussed for block 2112.

LOCATION field 1100*c* is preferably set with: Field 1100*c* from queue 26.

CONFIDENCE field 1100*d* is preferably set with: Confidence at equal to or less than field 1100*d* received from queue 26 (see preferred embodiment for block 2112).

LOCATION TECHNOLOGY field 1100*e* is preferably set with: Field 1100*e* from queue 26.

LOCATION REFERENCE INFO field 1100*f* is preferably set with: All available measurements from receive processing (e.g. AOA, heading, yaw, pitch, roll, signal strength, wave spectrum, particular communications interface 70, etc), and TDOA measurement(s) as determined in FIG. 21 (blocks 2128 and 2148).

COMMUNICATIONS REFERENCE INFO field 1100*g* is preferably set with: Field 1100*g* from queue 26.

SPEED field 1100*h* is preferably set with: Field 1100*h* from queue 26.

HEADING field 1100*i* is preferably set with: Field 1100*i* from queue 26.

ELEVATION field 1100*j* is preferably set with: Field 1100*j* from queue 26.

APPLICATION FIELDS field 1100*k* is preferably set with: Field 1100*k* from queue 26. An alternate embodiment will add, alter, or discard data (with or without date/time stamps) here at the time of block 2128 processing.

CORRELATION FIELD 1100*m* is preferably set with: Not Applicable (i.e. not maintained to queue 22). Was used by FIG. 21 processing.

SENT DATE/TIME STAMP field 1100*n* is preferably set with: Not Applicable (i.e. not maintained to queue 22). Was used by FIG. 21 processing.

RECEIVED DATE/TIME STAMP field 1100*p* is preferably set with: Not Applicable (i.e. not maintained to queue 22). Was used by FIG. 21 processing.

Block 2132 continues to block 2134 where a record 2400 is built (i.e. field 2400*a*=1952 and field 2400*b* is set to null (e.g. −1)) and then block 2136 inserts the record 2400 to TR queue 1980 (using interface 1918) so that a thread 1952 will perform processing. Blocks 2134 and 2136 may be replaced with an alternative embodiment for starting a thread 1952. Block 2136 continues back to block 2106.

Referring now back to block 2126, if it is determined that a TDOA measurement cannot be made (i.e. (field 1100*n* or 1100*p* not NTP indicated) OR if TDOA_FINAL is set to False), then block 2138 checks if the WDR contains a MS ID (or pseudo MS ID). If block 2138 determines there is none, then processing continues back to block 2106 because there is no way to distinguish one MS from another with respect to the WDR retrieved at block 2108 for directing bidirectional correlation. An alternate embodiment will use a provided correlation field 1100*m* received at block 2108, instead of a field 1100*a*, for knowing how to target the originating MS for TDOA measurement processing initiated by a thread 1932. If block 2138 determines there is a usable MS ID (or correlation field), then block 2140 builds a record 2400 (field 2400*a*=1932, field 2400*b*=the MS ID (or pseudo MS ID, or correlation) and particular communications interface from field 1100*f* (if available) of the WDR of block 2108, and block 2142 inserts the record 2400 to queue 1980 (interface 1918) for starting a thread 1932. Block 2142 continues back to block 2106. An alternate embodiment causes block 2126 to continue directly to block 2140 (no block 2138) for a No condition from block 2126. Regardless of whether the originating MS ID can be targeted, a correlation (in lieu of an MS ID) may be used when the MS responds with a broadcast. The WDR request made by thread 1932 can be a broadcast rather than a targeted request. Thread(s) 1932 can handle sending targeted WDR requests (to a known MS ID) and broadcast WDR requests.

Referring back to block 2118, if it is determined the WDR does contain correlation (field 1100*m*), block 2144 peeks the CR queue 1990 (using interface 1920) for a record 2450 containing a match (i.e. field 1100*m* matched to field 2450*b*). Thereafter, if block 2146 determines no correlation was found on queue 1990 (e.g. response took too long and entry was pruned), then processing continues to block 2120 already described. If block 2146 determines the correlation entry was found (i.e. thread 1912 received a response from an earlier request (e.g. from a thread 1922 or 1932), then block 2148 uses date/time stamp field 2450*a* (from block 2144) with field 1100*p* (e.g. from block 2108) to calculate a TDOA measurement in time scale of the MS of FIG. 21 processing, and sets field 1100*f* appropriately in the WDR. Note that correlation field 2450*b* is valid across all available MS communications interfaces (e.g. all supported active wave spectrums). The TDOA measurement considers duration of time between the earlier sent date/time of record 2450 and the later time of received date/time field 1100*p*. The TDOA measurement may further be altered at block 2148 processing time to a distance knowing the velocity of the wave spectrum used as received to queue 26. Block 2148 continues to block 2150 where the TDOA_FINAL variable is set to True, then to block 2120 for processing already described.

Referring back to block 2110, if a WDR for a worker thread termination request was found at queue 26, then block 2152 decrements the worker thread count by 1 (using appropriate semaphore access (e.g. 1912-Sem)), and thread 1912 processing terminates at block 2154. Block 2152 may also check the 1912-Ct value, and signal the process 1912 parent thread that all worker threads are terminated when 1912-Ct equals zero (0).

In the embodiment wherein usual MS communications data 1302 of the MS is altered to contain CK 1304 or 1314 for listening MSs in the vicinity, receive processing feeding queue 26 will place WDR information to queue 26 as CK 1304 or 1314 is detected for being present in usual communication data 1302 or 1304. As normal communications are conducted, transmitted data 1302 or 1312 contains new data CK 1304 or 1314 to be ignored by receiving MS other character 32 processing, but to be found by listening MSs within the vicinity which anticipate presence of CK 1304 or 1314. Otherwise, when LN-Expanse deployments have not introduced CK 1304 (or 1314) to usual data 1302 (or 1312) communicated on a receivable signal by MSs in the vicinity, FIG. 21 receives new data 1302 (or 1312) sent. In any case, field 1100*p* should be as accurate as possible for when data 1302 (or 1312) was actually received. Critical regions of code and/or anticipated execution timing may be used to affect a best setting of field 1100*p*.

So, FIG. 21 is responsible for maintaining whereabouts of others to queue 22 with data useful for triangulating itself.

FIG. 22 depicts a flowchart for describing a preferred embodiment of MS whereabouts supervisor processing, for example to ensure the MS of FIG. 22 processing (e.g. first MS) is maintaining timely whereabouts information for itself. FIG. 22 processing describes a process 1922 worker thread, and is of PIP code 6. Thread(s) 1922 purpose is for the MS of FIG. 22 processing (e.g. a first, or sending, MS), after determining its whereabouts are stale, to periodically transmit requests for whereabouts information from MSs in the vicinity (e.g. from at least a second, or receiving, MS), and/or to start a thread 1952 for immediately determining whereabouts. Alternative embodiments to FIG. 22 will implement processing of blocks 2218 through 2224, or processing of blocks 2226 through 2228, or both as depicted in FIG. 22. It is recommended that validity criteria set at block 1444 for 1922-Max be fixed at one (1) in the preferred embodiment. Multiple channels for broadcast at block 2224 should be isolated to modular send processing feeding from a queue 24.

In an alternative embodiment having multiple transmission channels visible to process 1922, there can be a worker thread 1922 per channel to handle broadcasting on multiple channels. If thread(s) 1922 (block 2224) do not transmit directly over the channel, this embodiment would provide means for communicating the channel for broadcast to send processing when interfacing to queue 24 (e.g. incorporate a channel qualifier field with WDR request inserted to queue 24). This embodiment could allow specification of one (1) thread per channel, however multiple worker threads configurable for process 1922 as determined by the number of channels configurable for broadcast.

Processing begins at block 2202, continues to block 2204 where the process worker thread count 1922-Ct is accessed and incremented by 1 (using appropriate semaphore access (e.g. 1922-Sem)), and continues to block 2206 for interim housekeeping of pruning the CR queue by invoking a Prune Queues procedure of FIG. 27A. Block 2204 may also check the 1922-Ct value, and signal the process 1922 parent thread that all worker threads are running when 1922-Ct reaches 1922-Max. Block 2206 continues to block 2208 for peeking WDR queue 22 (using interface 1924) for a special termination request entry. Thereafter, if block 2210 determines that a worker thread termination request was not found in queue 22, processing continues to block 2212. Block 2212 peeks the WDR queue 22 (using interface 1924) for the most recent highest confidence entry for this MS whereabouts by searching queue 22 for: the MS ID field 1100*a* matching the MS ID of FIG. 22 processing, and a confidence field 1100*d* greater than or equal to the confidence floor value, and a most recent date/time stamp field 1100*b* within a prescribed trailing period of time of block 2212 search processing using a function of the WTV (i.e. f(WTV)=short-hand for "function of WTV") for the period. For example, block 2212 peeks the queue (i.e. makes a copy for use if an entry found for subsequent processing, but does not remove the entry from queue) for a WDR of the first MS which has the greatest confidence over 75 and has been most recently inserted to queue 22 in the last 3 seconds. Since the MS whereabouts accuracy may be dependent on timeliness of the WTV, it is recommended that the f(WTV) be some value less than or equal to WTV, but preferably not greater than the WTV. Thread 1922 is of less value to the MS when not making sure in a timely manner the MS is maintaining timely whereabouts for itself. In an alternate embodiment, a movement tolerance (e.g. user configured or system set (e.g. 3 meters)) is incorporated at the MS, or at service(s) used to locate the MS, for knowing when the MS has significantly moved (e.g. more than 3 meters) and how long it has been (e.g. 45 seconds) since last significantly moving. In this embodiment, the MS is aware of the period of time since last significantly moving and the f(WTV) is set using the amount of time since the MS significantly moved (i.e. f(WTV)=as described above, or the amount of time since significantly moving, whichever is greater). This way a large number of (perhaps more confident candidates) WDRs are searched in the time period when the MS has not significantly moved. Optional blocks 278 through 284 may have been incorporated to FIG. 2F for movement tolerance processing just described, in which case the LWT is compared to the current date/time to adjust the WTV for the correct trailing period. In any case, a WDR is sought at block 2212 which will verify whether or not MS whereabouts are current.

Thereafter, if block 2214 determines a satisfactory WDR was found, then processing continues to block 2216. Block 2216 causes thread 1922 to sleep according to a f(WTV) (preferably a value less than or equal to the WTV (e.g. 95% of WTV)). When the sleep time has elapsed, processing continues back to block 2206 for another loop iteration of blocks 2206 through 2214.

If block 2214 determines a current WDR was not found, then block 2218 builds a WDR request (e.g. containing record 2490 with field 2490*a* for the MS of FIG. 22 processing (MS ID or pseudo MS ID) so receiving MSs in the LN-expanse know who to respond to, and field 2490*b* with appropriate correlation for response), block 2220 builds a record 2450 (using correlation generated for the request at block 2218), block 2222 inserts the record 2450 to queue 1990 (using interface 1928), and block 2224 broadcasts the WDR request (record 2490) for responses. Absence of field 2490*d* indicates to send processing feeding from queue 24 to broadcast on all available comm. interfaces 70.

Figure 24C:
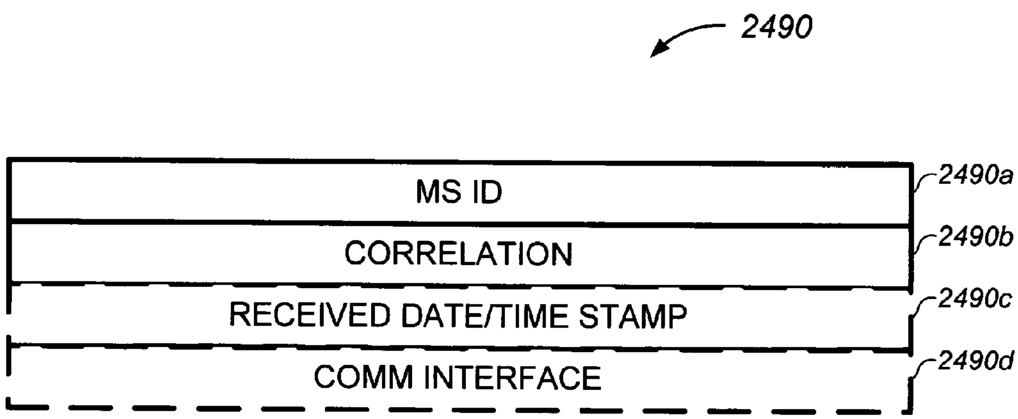
FIG. 24C depicts an illustration for describing a preferred embodiment of a WDR request record.

With reference now to FIG. 24C, depicted is an illustration for describing a preferred embodiment of a WDR request record, as communicated to queue 24 or 26. When a LN-expanse globally uses NTP, as found in thread 19xx processing described for architecture 1900, a WDR request record 2490 may, or may not, be required. TDOA calculations can be made using a single unidirectional data (1302 or 1312) packet containing a sent date/time stamp (of when the data was sent) as described above.

Records 2490 contain a MS ID field 2490*a* and correlation field 2490*b*. MS ID field 2490*a* contains an MS ID (e.g. a value of field 1100*a*). An alternate embodiment will contain a pseudo MS ID (for correlation), perhaps made by a derivative of the MS ID with a unique (suffix) portion, so that receiving MSs can directly address the MS sending the request without actually knowing the MS ID (i.e. they know the pseudo MS ID which enables the MS to recognize originated transmissions). Correlation data field 2490*b* contains unique correlation data (e.g. MS id with suffix of unique number) used to provide correlation for matching sent requests (data 1302) with received WDR responses (data 1302 or 1312). Upon a correlation match, a TDOA measurement is calculated using the time difference between field 2450*a* and a date/time stamp of when the response was received (e.g. field 1100*p*). Received date/time stamp field 2490*c* is added by receive processing feeding queue 26 when an MS received the request from another MS. Comm interface field 2490*d* is added by receive processing inserting to queue 26 for how to respond and target the originator. Many MSs do not have choices of communications interfaces, so field 2490*d* may not be required. If available it is used, otherwise a response can be a broadcast. Field 2490*d* may contain a wave spectrum identifier for uniquely identifying how to respond (e.g. one to one with communications interface), or any other value for indicating how to send given how the request was received.

With reference back to FIG. 22, block 2218 builds a request that receiving MSs will know is for soliciting a response with WDR information. Block 2218 generates correlation for field 2450*b* to be returned in responses to the WDR request broadcast at block 2224. Block 2220 also sets field 2450*a* to when the request was sent. Preferably, field 2450*a* is set as close to the broadcast as possible. In an alternative embodiment, broadcast processing feeding from queue 24 makes the record 2450 and inserts it to queue 1990 with a most accurate time of when the request was actually sent. Fields 2450*a* are to be as accurate as possible. Block 2224 broadcasts the WDR request data 1302 (using send interface 1926) by inserting to queue 24 so that send processing broadcasts data 1302, for example as far as radius 1306. Broadcasting preferably uses all available communications interface(s) 70 (e.g. all available wave spectrums). Therefore, the comm interface field 2490*d* is not set (which implies to send processing to do a broadcast).

Block 2224 continues to block 2226 where a record 2400 is built (i.e. field 2400*a*=1952 and field 2400*b* is set to null (e.g. −1)) and then block 2228 inserts the record 2400 to TR queue 1980 (using interface 1930) so that a thread 1952 will perform processing. Blocks 2226 and 2228 may be replaced with an alternative embodiment for starting a thread 1952. Block 2228 continues back to block 2216.

Referring back to block 2210, if a worker thread termination request entry was found at queue 22, then block 2230 decrements the worker thread count by 1 (using appropriate semaphore access (e.g. 1922-Sem)), and thread 1922 processing terminates at block 2232. Block 2230 may also check the 1922-Ct value, and signal the process 1922 parent thread that all worker threads are terminated when 1922-Ct equals zero (0).

In the embodiment wherein usual MS communications data 1302 of the MS is altered to contain CK 1304 for listening MSs in the vicinity, send processing feeding from queue 24, caused by block 2224 processing, will place the request as CK 1304 embedded in usual data 1302 at the next opportune time of sending usual data 1302. This may require the alternative embodiment of adding the entry to queue 1990 being part of send processing. As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 22 sends new WDR request data 1302.

FIG. 23 depicts a flowchart for describing a preferred embodiment of MS timing determination processing. FIG. 23 processing describes a process 1932 worker thread, and is of PIP code 6. Thread(s) 1932 purpose is for the MS of FIG. 23 processing to determine TDOA measurements when needed for WDR information received. It is recommended that validity criteria set at block 1444 for 1932-Max be set as high as possible (e.g. 12) relative performance considerations of architecture 1900, to service multiple threads 1912.

Processing begins at block 2302, continues to block 2304 where the process worker thread count 1932-Ct is accessed and incremented by 1 (using appropriate semaphore access (e.g. 1932-Sem)), and continues to block 2306 for interim housekeeping of pruning the CR queue by invoking a Prune Queues procedure of FIG. 27A. Block 2304 may also check the 1932-Ct value, and signal the process 1932 parent thread that all worker threads are running when 1932-Ct reaches 1932-Max.

Thereafter, block 2308 retrieves from queue 1980 a record 2400 (using interface 1934), perhaps a special termination request entry, or a record 2400 received from thread(s) 1912, and only continues to block 2310 when a record 2400 containing field 2400*a* set to 1932 has been retrieved. Block 2308 stays blocked on retrieving from queue 1980 until a record 2400 with field 2400*a*=1932 is retrieved. If block 2310 determines a special entry indicating to terminate was not found in queue 1980, processing continues to block 2312.

If at block 2312, the record 2400 does not contain a MS ID (or pseudo MS ID) in field 2400*b*, processing continues to block 2314 for building a WDR request (record 2490) to be broadcast, and then to block 2318. Broadcasting preferably uses all available communications interface(s) 70 (e.g. all available wave spectrums). If block 2312 determines the field 2400*b* is a valid MS ID (not null), block 2316 builds a WDR request targeted for the MS ID, and processing continues to block 2318. A targeted request is built for targeting the MS ID (and communications interface, if available) from field 2400*b*. Send processing is told which communications interface to use, if available (e.g. MS has multiple), otherwise send processing will target each available interface. In the unlikely case a MS ID is present in field 2400*b* without the communications interface applicable, then all communications interfaces 70 are used with the targeted MS ID. In MS embodiments with multiple communications interfaces 70, then 2400*b* is to contain the applicable communication interface for sending. Block 2318 generates appropriate correlation for a field 2450*b* (e.g. to be compared with a response WDR at block 2144), block 2320 sets field 2450*a* to the current MS date/time stamp, block 2322 inserts the record 2450 to queue 1990 (using interface 1936), and block 2324 sends/broadcasts (using interface 1938) a WDR request (record 2490). Thereafter, processing continues back to block 2306 for another loop iteration. An alternative embodiment will only target a WDR request to a known MS ID. For example, block 2312 would continue back to block 2306 if no MS ID is found (=null), otherwise it will continue to block 2316 (i.e. no use for block 2314).

Block 2318 sets field 2450*b* to correlation to be returned in responses to the WDR request sent/broadcast at block 2324. Block 2320 sets field 2450*a* to when the request is sent. Preferably, field 2450*a* is set as close as possible to when a send occurred. In an alternative embodiment, send processing feeding from queue 24 makes the record 2450 and inserts it to queue 1990 with a most accurate time of when the request was actually sent. Fields 2450*a* are to be as accurate as possible. Block 2324 sends/broadcasts the WDR request data 1302 (using send interface 1938) by inserting to queue 24 a record 2490 (2490*a*=the targeted MS ID (or pseudo MS ID) OR null if arrived to from block 2314, field 2490*b*=correlation generated at block 2318) so that send processing sends data 1302, for example as far as radius 1306. A null MS ID may be responded to by all MSs in the vicinity. A non-null MS ID is to be responded to by a particular MS. Presence of field 2490*d* indicates to send processing feeding from queue 24 to target the MS ID over the specified comm. interface (e.g. when MS has a plurality of comm. interfaces 70 (e.g. cellular, WiFi, Bluetooth, etc; i.e. MS supports multiple classes of wave spectrum)).

Referring back to block 2310, if a worker thread termination request was found at queue 1980, then block 2326 decrements the worker thread count by 1 (using appropriate semaphore access (e.g. 1932-Sem)), and thread 1932 processing terminates at block 2328. Block 2326 may also check the 1932-Ct value, and signal the process 1932 parent thread that all worker threads are terminated when 1932-Ct equals zero (0).

In the embodiment wherein usual MS communications data 1302 of the MS is altered to contain CK 1304 for listening MSs in the vicinity, send processing feeding from queue 24, caused by block 2324 processing, will place the WDR request as CK 1304 embedded in usual data 1302 at the next opportune time of sending usual data 1302. As the MS conducts its normal communications, transmitted data 1302 contains new data CK 1304 to be ignored by receiving MS other character 32 processing, but to be found by listening MSs within the vicinity which anticipate presence of CK 1304.

This may require the alternative embodiment of adding the entry to queue 1990 being part of send processing. Otherwise, when LN-Expanse deployments have not introduced CK 1304 to usual data 1302 communicated on a receivable signal by MSs in the vicinity, FIG. 22 sends/broadcasts new WDR request data 1302.

An alternate embodiment to block 2324 can wait for a response with a reasonable timeout, thereby eliminating the need for blocks 2318 through 2322 which is used to correlate the subsequent response (to thread 1912) with the request sent at block 2324. However, this will cause a potentially unpredictable number of simultaneously executing thread(s) 1932 when many MSs are in the vicinity.

Thread(s) 1932 are useful when one or both parties to WDR transmission (sending and receiving MS) do not have NTP enabled. TDOA measurements are taken to triangulate the MS relative other MSs in real time.

FIG. 25 depicts a flowchart for describing a preferred embodiment of MS WDR request processing, for example when a remote MS requests (e.g. from FIG. 22 or 23) a WDR. Receive processing identifies targeted requests destined (e.g. FIG. 23) for the MS of FIG. 25 processing, and identifies general broadcasts (e.g. FIG. 22) for processing as well. FIG. 25 processing describes a process 1942 worker thread, and is of PIP code 6. Thread(s) 1942 purpose is for the MS of FIG. 25 processing to respond to incoming WDR requests. It is recommended that validity criteria set at block 1444 for 1942-Max be set as high as possible (e.g. 10) relative performance considerations of architecture 1900, to service multiple WDR requests simultaneously. Multiple channels for receiving data fed to queue 26 should be isolated to modular receive processing.

In an alternative embodiment having multiple receiving transmission channels visible to process 1942, there can be a worker thread 1942 per channel to handle receiving on multiple channels simultaneously. If thread(s) 1942 do not receive directly from the channel, the preferred embodiment of FIG. 25 would not need to convey channel information to thread(s) 1942 waiting on queue 24 anyway. Embodiments could allow specification/configuration of many thread(s) 1942 per channel.

Processing begins at block 2502, continues to block 2504 where the process worker thread count 1942-Ct is accessed and incremented by 1 (using appropriate semaphore access (e.g. 1942-Sem)), and continues to block 2506 for retrieving from queue 26 a record 2490 (using interface 1948), perhaps a special termination request entry, and only continues to block 2508 when a record 2490 is retrieved. Block 2506 stays blocked on retrieving from queue 26 until any record 2490 is retrieved. If block 2508 determines a special entry indicating to terminate was not found in queue 26, processing continues to block 2510. There are various embodiments for thread(s) 1912 and thread(s) 1942 to feed off a queue 26 for different record types, for example, separate queues 26A and 26B, or a thread target field with either record found at queue 26 (e.g. like field 2400*a*). In another embodiment, thread(s) 1912 are modified with logic of thread(s) 1942 to handle all records described for a queue 26, since thread(s) 1912 are listening for queue 26 data anyway.

Block 2510 peeks the WDR queue 22 (using interface 1944) for the most recent highest confidence entry for this MS whereabouts by searching queue 22 for: the MS ID field 1100*a* matching the MS ID of FIG. 25 processing, and a confidence field 1100*d* greater than or equal to the confidence floor value, and a most recent date/time stamp field 1100*b* within a prescribed trailing period of time of block 2510 search processing (e.g. 2 seconds). For example, block 2510 peeks the queue (i.e. makes a copy for use if an entry found for subsequent processing, but does not remove the entry from queue) for a WDR of the MS (of FIG. 25 processing) which has the greatest confidence over 75 and has been most recently inserted to queue 22 in the last 2 seconds. It is recommended that the trailing period of time used by block 2510 be never greater than a few seconds. Thread 1942 is of less value to the LN-expanse when it responds with outdated/invalid whereabouts of the MS to facilitate locating other MSs. In an alternate embodiment, a movement tolerance (e.g. user configured or system set (e.g. 3 meters)) is incorporated at the MS, or at service(s) used to locate the MS, for knowing when the MS has significantly moved (e.g. more than 3 meters) and how long it has been (e.g. 45 seconds) since last significantly moving. In this embodiment, the MS is aware of the period of time since last significantly moving and the trailing period of time used by block 2510 is set using the amount of time since the MS significantly moved, or the amount of time since significantly moving, whichever is greater. This way a large number of (perhaps more confident candidate) WDRs are searched in the time period when the MS has not significantly moved. Optional blocks 278 through 284 may have been incorporated to FIG. 2F for movement tolerance processing just described, in which case the LWT is compared to the current date/time to adjust the trailing period of time used by block 2510 for the correct trailing period. In any case, a WDR is sought at block 2510 to satisfy a request helping another MS in the LN-expanse locate itself.

Thereafter, if block 2512 determines a useful WDR was not found, then processing continues back to block 2506 for another loop iteration of processing an inbound WDR request. If block 2512 determines a useful WDR was found, then block 2514 prepares the WDR for send processing with correlation field 1100*m* set from correlation field 2490*b* retrieved at block 2506, and block 2516 sends/broadcasts (per field 2490*a*) the WDR information (using send interface 1946) by inserting to queue 24 so that send processing transmits data 1302, for example as far as radius 1306, and processing continues back to block 2506. At least fields 1100*b*, 1100*c*, 1100*d*, 1100*m* and 1100*n* are sent/broadcast. See FIG. 11A descriptions. Fields are set to the following upon exit from block 2514:

MS ID field 1100*a* is preferably set with: Field 2490*a* from queue 26.

DATE/TIME STAMP field 1100*b* is preferably set with: Field 1100*b* from queue 22.

LOCATION field 1100*c* is preferably set with: Field 1100*c* from queue 22.

CONFIDENCE field 1100*d* is preferably set with: Field 1100*d* from queue 22.

LOCATION TECHNOLOGY field 1100*e* is preferably set with: Field 1100*e* from queue 22.

LOCATION REFERENCE INFO field 1100*f* is preferably set with: null (not set) for Broadcast by send processing, otherwise set to field 2490*d* for Send by send processing.

COMMUNICATIONS REFERENCE INFO field 1100*g* is preferably set with: null (not set).

SPEED field 1100*h* is preferably set with: Field 1100*h* from queue 22.

HEADING field 1100*i* is preferably set with: Field 1100*i* from queue 22.

ELEVATION field 1100*j* is preferably set with: Field 1100*j* from queue 22.

APPLICATION FIELDS field 1100*k* is preferably set with: Field 1100*k* from queue 22. An alternate embodiment will add, alter, or discard data (with or without date/time stamps) here at the time of block 2514 processing.

CORRELATION FIELD 1100*m* is preferably set with: Field 2490*b* from queue 26.

SENT DATE/TIME STAMP field 1100*n* is preferably set with: Sent date/time stamp as close in processing the send/broadcast of block 2516 as possible.

RECEIVED DATE/TIME STAMP field 1100*p* is preferably set with: Not Applicable (i.e. N/A for sending).

Embodiments may rely completely on the correlation field 2490*b* with no need for field 2490*a*. Referring back to block 2508, if a worker thread termination request was found at queue 26, then block 2518 decrements the worker thread count by 1 (using appropriate semaphore access (e.g. 1942-Sem)), and thread 1942 processing terminates at block 2520. Block 2518 may also check the 1942-Ct value, and signal the process 1942 parent thread that all worker threads are terminated when 1942-Ct equals zero (0).

Block 2516 causes sending/broadcasting data 1302 containing CK 1304, depending on the type of MS, wherein CK 1304 contains WDR information prepared as described above for block 2514. Alternative embodiments of block 2510 may not search a specified confidence value, and broadcast the best entry available anyway so that listeners in the vicinity will decide what to do with it. A semaphore protected data access (instead of a queue peek) may be used in embodiments where there is always one WDR current entry maintained for the MS.

In the embodiment wherein usual MS communications data 1302 of the MS is altered to contain CK 1304 for listening MSs in the vicinity, send processing feeding from queue 24, caused by block 2516 processing, will place WDR information as CK 1304 embedded in usual data 1302 at the next opportune time of sending usual data 1302. If an opportune time is not timely, send processing should discard the send request of block 2516 to avoid broadcasting outdated whereabouts information (unless using a movement tolerance and time since last significant movement). As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 25 sends/broadcasts new WDR response data 1302. In any case, field 1100*n* should be as accurate as possible for when data 1302 is actually sent. Critical regions of code (i.e. prevent thread preemption) and/or anticipated execution timing may be used to affect a best setting of field 1100*n*.

In an alternate embodiment, records 2490 contain a sent date/time stamp field 2490*e* of when the request was sent by a remote MS, and the received date/time stamp field 2490*c* is processed at the MS in FIG. 25 processing. This would enable block 2514 to calculate a TDOA measurement for returning in field 1100*f* of the WDR sent/broadcast at block 2516.

FIG. 26A depicts a flowchart for describing a preferred embodiment of MS whereabouts determination processing. FIG. 26A processing describes a process 1952 worker thread, and is of PIP code 6. Thread(s) 1952 purpose is for the MS of FIG. 26A processing to determine its own whereabouts with useful WDRs from other MSs. It is recommended that validity criteria set at block 1444 for 1952-Max be set as high as possible (e.g. 10) relative performance considerations of architecture 1900, to service multiple threads 1912. 1952-Max may also be set depending on what DLM capability exists for the MS of FIG. 26A processing. In an alternate embodiment, thread(s) 19xx are automatically throttled up or down (e.g. 1952-Max) per unique requirements of the MS as it travels.

Processing begins at block 2602, continues to block 2604 where the process worker thread count 1952-Ct is accessed and incremented by 1 (using appropriate semaphore access (e.g. 1952-Sem)), and continues to block 2606 for interim housekeeping of pruning the WDR queue by invoking a Prune Queues procedure of FIG. 27A. Block 2604 may also check the 1952-Ct value, and signal the process 1952 parent thread that all worker threads are running when 1952-Ct reaches 1952-Max. Block 2606 may not be necessary since pruning may be accomplished at block 2620 when invoking FIG. 2F (block 292).

Thereafter, block 2608 retrieves from queue 1980 a record 2400 (using interface 1958), perhaps a special termination request entry, or a record 2400 received from thread(s) 1912, and only continues to block 2610 when a record 2400 containing field 2400*a* set to 1952 has been retrieved. Block 2608 stays blocked on retrieving from queue 1980 until a record 2400 with field 2400*a*=1952 is retrieved. If block 2610 determines a special entry indicating to terminate was not found in queue 1980, processing continues to block 2612.

Block 2612 peeks the WDR queue 22 (using interface 1954) for the most recent highest confidence entry for this MS whereabouts by searching queue 22 for: the MS ID field 1100*a* matching the MS ID of FIG. 26A processing, and a confidence field 1100*d* greater than or equal to the confidence floor value, and a most recent date/time stamp field 1100*b* within a prescribed trailing period of time of block 2612 search processing using a f(WTV) for the period. For example, block 2612 peeks the queue (i.e. makes a copy for use if an entry found for subsequent processing, but does not remove the entry from queue) for a WDR of the MS (of FIG. 26A processing) which has the greatest confidence over 75 and has been most recently inserted to queue 22 in the last 2 seconds. Since MS whereabouts accuracy may be dependent on timeliness of the WTV, it is recommended that the f(WTV) be some value less than or equal to WTV. In an alternate embodiment, a movement tolerance (e.g. user configured or system set (e.g. 3 meters)) is incorporated at the MS, or at service(s) used to locate the MS, for knowing when the MS has significantly moved (e.g. more than 3 meters) and how long it has been (e.g. 45 seconds) since last significantly moving. In this embodiment, the MS is aware of the period of time since last significantly moving and the f(WTV) is set using the amount of time since the MS significantly moved (i.e. f(WTV)=as described above, or the amount of time since significantly moving, whichever is greater). This way a large number of (perhaps more confident candidate) WDRs are searched in the time period when the MS has not significantly moved. Optional blocks 278 through 284 may have been incorporated to FIG. 2F for movement tolerance processing just described, in which case the LWT is compared to the current date/time to adjust the WTV for the correct trailing period.

Thereafter, if block 2614 determines a timely whereabouts for this MS already exists to queue 22 (current WDR found), then processing continues back to block 2606 for another loop iteration of processing. If 2614 determines a satisfactory WDR does not already exist in queue 22, then block 2600 determines a new highest confidence WDR for this MS (FIG. 26B processing) using queue 22.

Thereafter, if block 2616 determines a WDR was not created (BESTWDR variable=null) for the MS of FIG. 26A processing (by block 2600), then processing continues back to block 2606. If block 2616 determines a WDR was created (BESTWDR=WDR created by FIG. 26B) for the MS of FIG. 26A processing by block 2600, then processing continues to block 2618 for preparing FIG. 2F parameters and FIG. 2F processing is invoked with the new WDR at block 2620 (for interface 1956) before continuing back to block 2606. Parameters set at block 2618 are: WDRREF=a reference or pointer to the WDR completed at block 2600; DELETEQ=FIG. 26A location queue discard processing; and SUPER=FIG. 26A supervisory notification processing.

Referring back to block 2610, if a worker thread termination request was found at queue 1980, then block 2622 decrements the worker thread count by 1 (using appropriate semaphore access (e.g. 1952-Sem)), and thread 1952 processing terminates at block 2624. Block 2622 may also check the 1952-Ct value, and signal the process 1952 parent thread that all worker threads are terminated when 1952-Ct equals zero (0).

Alternate embodiments to FIG. 26A will have a pool of thread(s) 1952 per location technology (WDR field 1100*e*) for specific WDR field(s) selective processing. FIG. 26A processing is shown to be generic with handling all WDRs at block 2600.

Figure 26B:
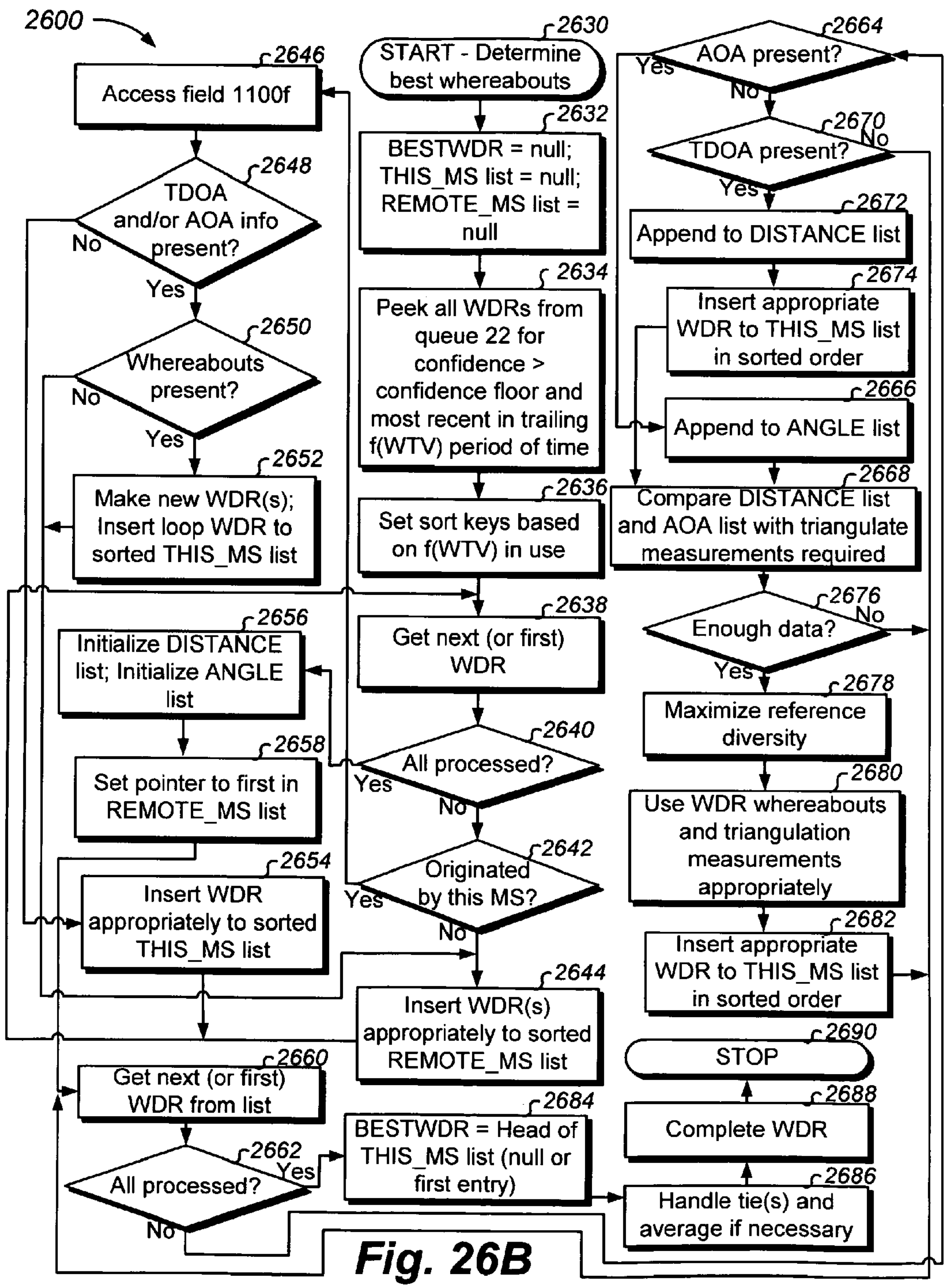
FIG. 26B depicts a flowchart for describing a preferred embodiment of processing for determining a highest possible confidence whereabouts.

FIG. 26B depicts a flowchart for describing a preferred embodiment of processing for determining a highest possible confidence whereabouts, for example in ILM processing, such as processing of FIG. 26A block 2600. Processing starts at block 2630, and continues to block 2632 where variables are initialized (BESTWDR=null, THIS_MS=null, REMOTE_MS=null). BESTWDR will reference the highest confidence WDR for whereabouts of the MS of FIG. 26B processing (i.e. this MS) upon return to FIG. 26A when whereabouts determination is successful, otherwise BESTWDR is set to null (none found). THIS_MS points to an appropriately sorted list of WDRs which were originated by this MS and are DLM originated (i.e. inserted by the DLM of FIG. 26B processing). REMOTE_MS points to an appropriately sorted list of WDRs which were originated by other MSs (i.e. from DLMs and/or ILMs and collected by the ILM of FIG. 26B processing).

Thereafter, block 2634 peeks the WDR queue 22 (using interface 1954) for most recent WDRs by searching queue 22 for: confidence field 1100*d* greater than or equal to the confidence floor value, and a most recent date/time stamp field 1100*b* within a prescribed trailing period of time of block 2634 search processing using a f(WTV) for the period. For example, block 2634 peeks the queue (i.e. makes a copy of all WDRs to a result list for use if any found for subsequent processing, but does not remove the entry(s) from queue) for all WDRs which have confidence over 75 and has been most recently inserted to queue 22 in the last 2 seconds. It is recommended that the f(WTV) used here be some value less than or equal to the WTV (want to be ahead of curve, so may use a percentage (e.g. 90%)), but preferably not greater than a couple/few seconds (depends on MS, MS applications, MS environment, whereabouts determination related variables, etc).

In an alternative embodiment, thread(s) 1952 coordinate with each other to know successes, failures or progress of their sister threads for automatically adjusting the trailing f(WTV) period of time appropriately. See "Alternative IPC Embodiments" below.

Thread 1952 is of less value to the MS when whereabouts are calculated using stale WDRs, or when not enough useful WDRs are considered. In an alternate embodiment, a movement tolerance (e.g. user configured or system set (e.g. 3 meters)) is incorporated at the MS, or at service(s) used to locate the MS, for knowing when the MS has significantly moved (e.g. more than 3 meters) and how long it has been (e.g. 45 seconds) since last significantly moving. In this embodiment, the MS is aware of the period of time since last significantly moving and the f(WTV) is set using the amount of time since the MS significantly moved (i.e. f(WTV)=as described above, or the amount of time since significantly moving, whichever is greater). This way a large number of (perhaps more confident candidates) WDRs are searched in the time period when the MS has not significantly moved. Optional blocks 278 through 284 may have been incorporated to FIG. 2F for movement tolerance processing just described, in which case the LWT is compared to the current date/time to adjust the WTV for the correct trailing period. In any case, all useful WDRs are sought at block 2634 and placed into a list upon exit from block 2634.

Thereafter, block 2636 sets THIS_MS list and REMOTE_MS list sort keys to be used at blocks 2644 and 2654. Blocks 2638 through 2654 will prioritize WDRs found at block 2634 depending on the sort keys made at block 2636. A number of variables may be used to determine the best sort keys, such as the time period used to peek at block 2634 and/or the number of entries in the WDR list returned by block 2634, and/or other variables. When the time period of search is small (e.g. less than a couple seconds), lists (THIS_MS and REMOTE_MS) should be prioritized primarily by confidence (fields 1100*d*) since any WDRs are valuable for determining whereabouts. This is the preferred embodiment.

When the time period is great, careful measure must be taken to ensure stale WDRs are not used (e.g. >few seconds, and not considering movement tolerance). Depending on decision embodiments, there will be preferred priority order sort keys created at exit from block 2636, for example "key1/key2/key3" implies that "key1" is a primary key, "key2" is a second order key, and "key3" is a third order key. A key such as "field-1100*b*/field-1100*d*/field-1100*f*:signal-strength" would sort WDRs first by using date/time stamp fields 1100*b*, then by confidence value fields 1100*d* (sorted within matching date/time stamp WDRs), then by signal-strength field 1100*f* sub-field values (sorted within matching WDR confidences; no signal strength present=lowest priority). Another sort key may be "field-1100*d*/field-1100*b*" for sorting WDRs first by using confidence values, then by date/time stamps (sorted within matching WDR confidences). The same or different sort keys can be used for lists THIS_MS and REMOTE_MS. Any WDR data (fields or subfields) can be sorted with a key, and sort keys can be of N order dimension such that "key1/key2/ . . . /keyN". Whatever sort keys are used, block 2686 will have to consider confidence versus being stale, relative to the WTV. In the preferred embodiment, the REMOTE_MS and THIS_MS lists are set with the same sort keys of "field-1100*d*/field-1100*b*" (i.e. peek time period used at block 2634 is less than 2 seconds) so that confidence is primary.

Thereafter, block 2638 gets the first (if any) WDR in the list returned at block 2634 (also processes next WDR in list when encountered again in loop of blocks 2638 through 2654), and block 2640 checks if all WDRs have already been processed. If block 2640 finds that all WDRs have not been processed, then block 2642 checks the WDR origination. If block 2642 determines the WDR is one that originated from a remote MS (i.e. MS ID does not match the MS of FIG. 26B processing), then block 2644 inserts the WDR into the REMOTE_MS list using the desired sort key (confidence primary, time secondary) from block 2636, and processing continues to block 2638 for another loop iteration. If block 2642 determines the WDR is one that originated from this MS (MS ID field 1100*a* matches the MS of FIG. 26B processing (e.g. this MS being a DLM at the time of WDR creation (this MS ID=field 1100*a*) or this MS being an ILM at the time of WDR creation (previous processing of FIG. 26A)), then processing continues to block 2646 to determine how to process the WDR which was inserted by "this MS" for its own whereabouts.

Block 2646 accesses field 1100*f* for data found there (e.g. FIGS. 2D and 2E may have inserted useful TDOA measurements, even though DLM processing occurred; or FIG. 3C may have inserted useful TDOA and/or AOA measurements with reference station(s) whereabouts; or receive processing may have inserted AOA and related measurements). Thereafter, if block 2648 determines presence of TDOA and/or AOA data, block 2650 checks if reference whereabouts (e.g. FIG. 3C selected stationary reference location(s)) is also stored in field 1100*f*. If block 2650 determines whereabouts information is also stored to field 1100*f*, then block 2652 makes new WDR(s) from the whereabouts information containing at least the WDR Core and field 1100*f* containing the AOA and/or TDOA information as though it were from a remote DLM or ILM. Block 2652 also performs the expected result of inserting the WDR of loop processing into the THIS_MS list using the desired sort key from block 2636. Processing then continues to block 2644 where the newly made WDR(s) is inserted into the REMOTE_MS list using the desired sort key (confidence primary, time secondary) from block 2636. Block 2644 continues back to block 2638.

Block 2646 through 2652 show that DLM stationary references may contribute to determining whereabouts of the MS of FIG. 26B processing by making such references appear to processing like remote MSs with known whereabouts. Any DLM location technology processing discussed above can facilitate FIG. 26B whereabouts processing when reference whereabouts can be maintained to field 1100*f* along with relative AOA, TDOA, MPT, confidence, and/or other useful information for locating the MS. Various embodiments will populate field 1100*f* wherever possible with any useful locating fields (see data discussed for field 1100*f* with FIG. 11A discussions above) for carrying plenty of information to facilitate FIG. 26B processing.

Referring back to block 2650, if it is determined that whereabouts information was not present with the AOA and/or TDOA information of field 1100*f*, then processing continues to block 2644 for inserting into the REMOTE_MS list (appropriately with sort key from block 2636) the currently looped WDR from block 2634. In-range location technology associates the MS with the antenna (or cell tower) location, so that field 1100*c* already contains the antenna (or cell tower) whereabouts, and the TDOA information was stored to determine how close the MS was to the antenna (or cell tower) at the time. The WDR will be more useful in the REMOTE_MS list, then if added to the THIS_MS list (see loop of blocks 2660 through 2680). Referring back to block 2648, if it is determined that no AOA and/or TDOA information was in field 1100*f*, then processing continues to block 2654 for inserting the WDR into the THIS_MS list (appropriately with sort key (confidence primary, time secondary) from block 2636).

Block 2654 handles WDRs that originated from the MS of FIG. 26B (this MS), such as described in FIGS. 2A through 9B, or results from previous FIG. 26A processing. Block 2644 maintains remote DLMs and/or ILMs (their whereabouts) to the REMOTE_MS list in hope WDRs contain useful field 1100*f* information for determining the whereabouts of the MS of FIG. 26B processing. Block 2652 handles WDRs that originated from the MS of FIG. 26B processing (this MS), but also processes fields from stationary references used (e.g. FIG. 3C) by this MS which can be helpful as though the WDR was originated by a remote ILM or DLM. Thus, block 2652 causes inserting to both lists (THIS_MS and REMOTE_MS) when the WDR contains useful information for both. Blocks 2652, 2654 and 2644 cause the iterative loop of blocks 2660 through 2680 to perform ADLT using DLMs and/or ILMs. Alternate embodiments of blocks 2638 through 2654 may use peek methodologies to sort from queue 22 for the REMOTE_MS and THIS_MS lists.

Referring back to block 2640, if it is determined that all WDRs in the list from block 2634 have been processed, then block 2656 initializes a DISTANCE list and ANGLE list each to null, block 2658 sets a loop iteration pointer to the first entry of the prioritized REMOTE_MS list (e.g. first entry higher priority than last entry in accordance with sort key used), and block 2660 starts the loop for working with ordered WDRs of the REMOTE_MS list. Exit from block 2640 to block 2656 occurs when the REMOTE_MS and THIS_MS lists are in the desired priority order for subsequent processing. Block 2660 gets the next (or first) REMOTE_MS list entry for processing before continuing to block 2662. If block 2662 determines all WDRs have not yet been processed from the REMOTE_MS list, then processing continues to block 2664.

Blocks 2664 and 2670 direct collection of all useful ILM triangulation measurements for TDOA, AOA, and/or MPT triangulation of this MS relative known whereabouts (e.g. other MSs). It is interesting to note that TDOA and AOA measurements (field 1100*f*) may have been made from different communications interfaces 70 (e.g. different wave spectrums), depending on interfaces the MS has available (i.e. all can participate). For example, a MS with blue-tooth, WiFi and cellular phone connectivity (different class wave spectrums supported) can be triangulated using the best available information (i.e. heterogeneous location technique). Examination of fields 1100*f* in FIG. 17 can show wave spectrums (and/or particular communications interfaces 70) inserted by receive processing for what the MS supports. If block 2664 determines an AOA measurement is present (field 1100*f* sub-field), then block 2666 appends the WDR to the ANGLE list, and processing continues to block 2668. If block 2664 determines an AOA measurement is not present, then processing continues to block 2670. If block 2670 determines a TDOA measurement is present (field 1100*f* sub-field), then block 2672 appends the WDR to the DISTANCE list, and processing continues to block 2674. Block 2674 uses WDRs for providing at least an in-range whereabouts of this MS by inserting to the THIS_MS list in sorted confidence priority order (e.g. highest confidence first in list, lowest confidence at end of list). Block 2674 continues to block 2668. Block 2674 may cause duplicate WDR(s) inserted to the THIS_MS list, but this will have no negative effect on selected outcome.

Block 2668 compares the ANGLE and DISTANCE lists constructed thus far from loop processing (blocks 2660 through 2682) with minimum triangulation requirements (e.g. see "Missing Part Triangulation (MPT)" above). Three (3) sides, three (3) angles and a side, and other known triangular solution guides will also be compared. Thereafter, if block 2676 determines there is still not enough data to triangulate whereabouts of this MS, then processing continues back to block 2660 for the next REMOTE_MS list entry, otherwise block 2678 maximizes diversity of WDRs to use for triangulating. Thereafter, block 2680 uses the diversified DISTANCE and ANGLE lists to perform triangulation of this MS, block 2682 inserts the newly determined WDR into the THIS_MS list in sort key order, and continues back to block

2660. Block 2680 will use heterogeneous (MPT), TDOA and/or AOA triangulation on ANGLE and DISTANCE lists for determining whereabouts.

Block 2682 preferably keeps track of (or checks THIS_MS for) what it has thus far determined whereabouts for in this FIG. 26B thread processing to prevent inserting the same WDR to THIS_MS using the same REMOTE_MS data. Repeated iterations of blocks 2676 through 2682 will see the same data from previous iterations and will use the best of breed data in conjunction with each other at each iteration (in current thread context). While inserting duplicates to THIS_MS at block 2682 does not cause failure, it may be avoided for performance reasons. Duplicate insertions are preferably avoided at block 2674 for performance reasons as well, but they are again not harmful. Block 2678 preferably keeps track of previous diversity order in this FIG. 26B thread processing to promote using new ANGLE and DISTANCE data in whereabouts determination at block 2680 (since each iteration is a superset of a previous iteration (in current thread context)). Block 2678 promotes using WDRs from different MSs (different MS IDs), and from MSs located at significantly different whereabouts (e.g. to maximize surrounded-ness), preferably around the MS of FIG. 26B processing. Block 2678 preferably uses sorted diversity pointer lists so as to not affect actual ANGLE and DISTANCE list order. The sorted pointer lists provide pointers to entries in the ANGLE and DISTANCE lists for a unique sorted order governing optimal processing at block 2680 to maximize unique MSs and surrounded-ness, without affecting the lists themselves (like a SQL database index). Different embodiments of blocks 2678 through 2682 should minimize inserting duplicate WDRs (for performance reasons) to THIS_MS which were determined using identical REMOTE_MS list data. Block 2682 causes using ADLT at blocks 2684 through 2688 which uses the best of breed whereabouts, either as originated by this MS maintained in THIS_MS list up to the thread processing point of block 2686, or as originated by remote MSs (DLMs and/or ILMs) processed by blocks 2656 through the start of block 2684.

Referring back to block 2662, if it is determined that all WDRs in the REMOTE_MS list have been processed, then block 2684 sets the BESTWDR reference to the head of THIS_MS (i.e. BESTWDR references first WDR in THIS_MS list which is so far the best candidate WDR (highest confidence) for this MS whereabouts, or null if the list is empty). It is possible that there are other WDRs with matching confidence adjacent to the highest confidence entry in the THIS_MS list. Block 2684 continues to block 2686 for comparing matching confidence WDRs, and if there are matches, then breaking a tie between WDRs with matching confidence by consulting any other WDR field(s) (e.g. field 1100*f* signal strength, or location technology field 1100*e*, etc). If there is still a tie between a plurality of WDRs, then block 2686 may average whereabouts to the BESTWDR WDR using the matching WDRs. Thereafter processing continues to block 2688 where the BESTWDR is completed, and processing terminates at block 2690. Block 2688 also frees resources (if any) allocated by FIG. 26B processing (e.g. lists). Blocks 2686 through 2688 result in setting BESTWDR to the highest priority WDR (i.e. the best possible whereabouts determined). It is possible that FIG. 26B processing causes a duplicate WDR inserted to queue 22 (at block 2620) for this MS whereabouts determination, but that is no issue except for impacting performance to queue 22. An alternate embodiment to queue 22 may define a unique index for erring out when inserting a duplicate to prevent frivolous duplicate entries, or block 2688 will incorporate processing to eliminate the chance of inserting a WDR of less use than what is already contained at queue 22. Therefore, block 2688 may include processing for ensuring a duplicate will not be inserted (e.g. null the BESTWDR reference) prior to returning to FIG. 26A at block 2690.

Averaging whereabouts at block 2686 occurs only when there are WDRs at the head of the list with a matching highest confidence value and still tie in other WDR fields consulted, yet whereabouts information is different. In this case, all matching highest confidence whereabouts are averaged to the BESTWDR to come up with whereabouts in light of all matching WDRs. Block 2686 performs ADLT when finalizing a single whereabouts (WDR) using any of the whereabouts found in THIS_MS (which may contain at this point DLM whereabouts originated by this MS and/or whereabouts originated by remote DLMs and/or ILMs). Block 2686 must be cognizant of sort keys used at blocks 2652 and 2654 in case confidence is not the primary key (time may be primary).

If no WDRs were found at block 2634, or no THIS_MS list WDRs were found at blocks 2652 and 2654, and no REMOTE_MS list entries were found at block 2644; or no THIS_MS list WDRs were found at blocks 2652 and 2654, and no REMOTE_MS list entries were found useful at blocks 2664 and/or 2670; then block 2684 may be setting BESTWDR to a null reference (i.e. none in list) in which case block 2686 does nothing. Hopefully, at least one good WDR is determined for MS whereabouts and a new WDR is inserted for this MS to queue 22, otherwise a null BESTWDR reference will be returned (checked at block 2616). See FIG. 11A descriptions. If BESTWDR is not null, then fields are set to the following upon exit from block 2688:

MS ID field 1100*a* is preferably set with: MS ID of MS of FIG. 26B processing.

DATE/TIME STAMP field 1100*b* is preferably set with: Date/time stamp of block 2688 processing.

LOCATION field 1100*c* is preferably set with: Resulting whereabouts after block 2688 completion.

CONFIDENCE field 1100*d* is preferably set with: WDR Confidence at THIS_MS list head.

LOCATION TECHNOLOGY field 1100*e* is preferably set with: "ILM TDOA Triangulation", "ILM AOA Triangulation", "ILM MPT Triangulation" or "ILM in-range", as determined by the WDRs inserted to MS_LIST at blocks 2674 and 2682. The originator indicator is set to ILM.

LOCATION REFERENCE INFO field 1100*f* is preferably set with: null (not set), but may be set with contributing data for analysis of queue 22 provided it is marked for being overlooked by future processing of blocks 2646 and 2648 (e.g. for debug purpose).

COMMUNICATIONS REFERENCE INFO field 1100*g* is preferably set with: null (not set).

SPEED field 1100*h* is preferably set with: Block 2688 may compare prioritized entries and their order of time (field 1100*b*) in THIS_MS list for properly setting this field, if possible.

HEADING field 1100*i* is preferably set with: null (not set). Block 2688 may compare prioritized entries and their order of time (field 1100*b*) in THIS_MS list for properly setting this field, if possible.

ELEVATION field 1100*j* is preferably set with: Field 1100*j* of BESTWDR (may be averaged if WDR tie(s)), if available.

APPLICATION FIELDS field 1100*k* is preferably set with: Field(s) 1100*k* from BESTWDR or tie(s) thereof from THIS_MS. An alternate embodiment will add, alter, or discard data (with or without date/time stamps) here at the time of block 2688 processing.

CORRELATION FIELD **1100*m* is preferably set with: Not Applicable (i.e. not maintained to queue 22**).

SENT DATE/TIME STAMP field **1100*n* is preferably set with: Not Applicable (i.e. not maintained to queue 22**).

RECEIVED DATE/TIME STAMP field **1100*p* is preferably set with: Not Applicable (i.e. not maintained to queue 22**).

Block 2680 determines whereabouts using preferred guidelines, such as whereabouts determined never results in a confidence value exceeding any confidence value used to determine whereabouts. Some embodiments will use the mean (average) of confidence values used, some will use the highest, and some the lowest of the WDRs used. Preferred embodiments tend to properly skew confidence values to lower values as the LN-Expanse grows away from region 1022. Blocks 2668 through 2680 may consult any of the WDR fields (e.g. field **1100*f*** sub-fields yaw, pitch, roll; speed, heading, etc) to deduce the most useful WDR inputs for determining an optimal WDR for this MS whereabouts.

Alternative IPC Embodiments

Thread(s) 1952 are started for every WDR collected from remote MSs. Therefore, it is possible that identical new WDRs are inserted to queue 22 using the same WDR information at blocks 2634 of simultaneously executing threads 1952, but this will not cause a problem since at least one will be found when needed, and duplicates will be pruned together when appropriate. Alternative embodiments provide IPC (Interprocess Communications Processing) coordination between 1952 threads for higher performance processing, for example:

- As mentioned above, thread(s) 1952 can coordinate with each other to know successes, failures or progress of their sister 1952 thread(s) for automatically adjusting the trailing f(WTV) period of time appropriately. The f(WTV) period of time used at block 2634 would be semaphore accessed and modified (e.g. increased) for another 1952 thread when a previous 1952 thread was unsuccessful in determining whereabouts (via semaphore accessed thread outcome indicator). After a successful determination, the f(WTV) period of time could be reset back to the smaller window. One embodiment of increasing may start with 10% of the WTV, then 20% at the next thread, 30% at the next thread, up to 90%, until a successful whereabouts is determined. After successful whereabouts determination, a reset to its original starting value is made.
- A semaphore accessed thread 1952 busy flag is used for indicating a certain thread is busy to prevent another 1952 thread from doing the same or similar work. Furthermore, other semaphore protected data for what work is actually being performed by a thread can be informative to ensure that no thread 1952 starts for doing duplicated effort.
- Useful data of statistics 14 may be appropriately accessed by thread(s) 1952 for dynamically controlling key variables of FIG. 26B processing, such as the search f(WTV) time period, sort keys used, when to quit loop processing (e.g. on first successful whereabouts determination at block 2680), surrounded-ness preferences, etc. This can dynamically change the FIG. 26B logic from one thread to another for desired results.

FIG. 26B continues processing through every WDR retrieved at block 2634. An alternative embodiment will terminate processing after finding the first (which is highest priority data supported) successful triangulation at block 2682.

FIG. 27A depicts a flowchart for describing a preferred embodiment of queue prune processing. Queue pruning is best done on an interim basis by threads which may insert to the queue being pruned. In an alternate embodiment, a background asynchronous thread will invoke FIG. 27A for periodic queue pruning to ensure no queue which can grow becomes too large. The Prune Queues procedure starts at block 2702 and continues to block 2704 where parameters passed by a caller for which queue(s) (WDR and/or CR) to prune are determined. Thereafter, if block 2706 determines that the caller wanted to prune the WDR queue 22, block 2708 appropriately prunes the queue, for example discarding old entries using field **1100*b*, and processing continues to block 2710. If block 2706 determines that the caller did not want to prune the WDR queue 22, then processing continues to block 2710. If block 2710 determines that the caller wanted to prune the CR queue 1990, block 2712 appropriately prunes the queue, for example discarding old entries using field 2450*a*, and processing continues to block 2714. If block 2710 determines that the caller did not want to prune the CR queue 1990, then processing continues to block 2714. Block 2714** appropriately returns to the caller.

The current design for queue 1980 does not require FIG. 27A to prune it. Alternative embodiments may add additional queues for similar processing. Alternate embodiments may use FIG. 27A like processing to prune queues 24, 26, or any other queue under certain system circumstances. Parameters received at block 2704 may also include how to prune the queue, for example when using different constraints for what indicates entry(s) for discard.

Figure 27B:
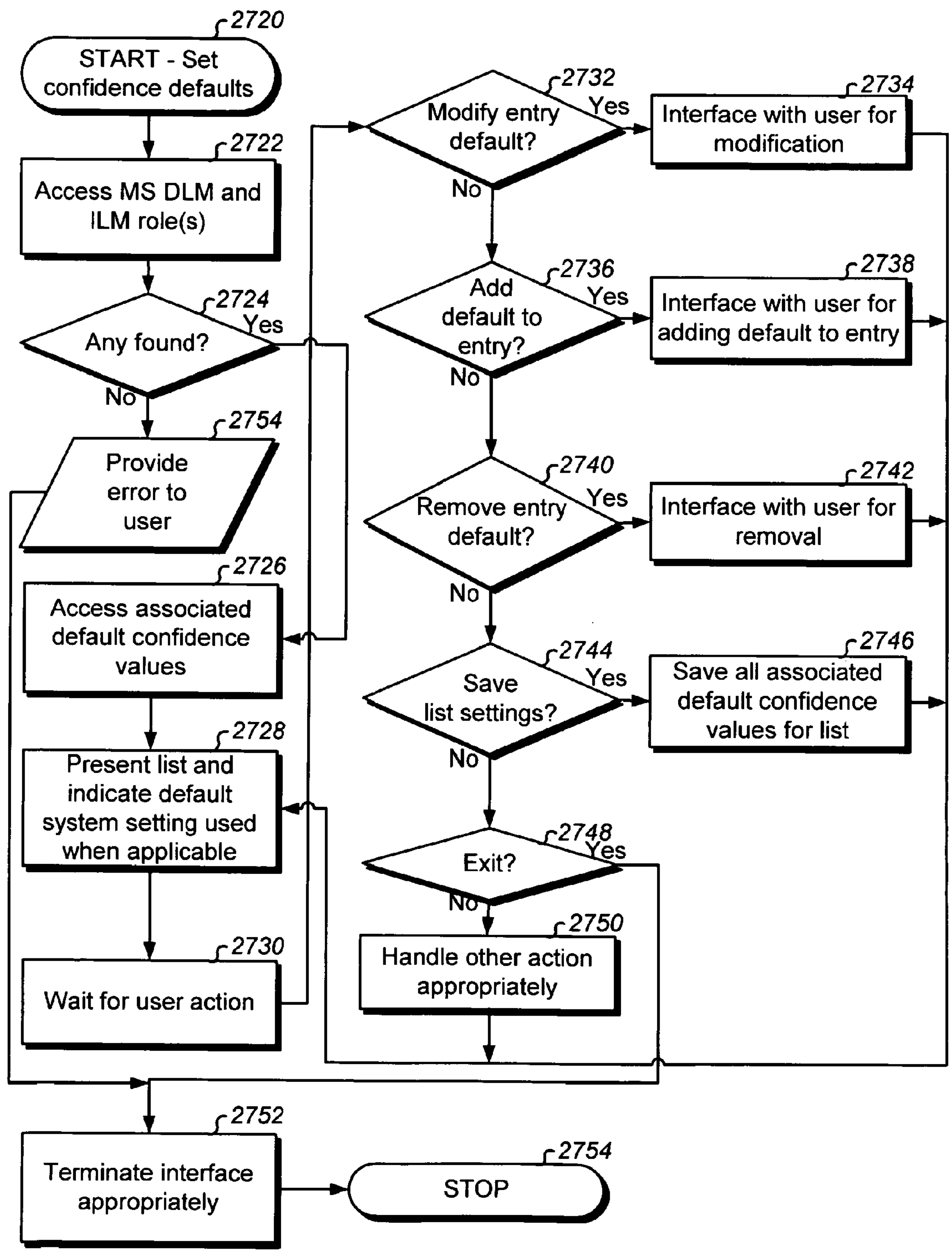
FIG. 27B depicts a flowchart for describing a preferred embodiment of setting confidence default values based on user experience.

FIG. 27B depicts a flowchart for describing a preferred embodiment of setting confidence default values based on user experience. Default confidence values used by the MS for initially determining a suitable confidence may be "tweaked" by a user, or an administrator, for cases where an intervention may be desirable. In one embodiment, block 1496 may be modified to include new blocks **1496*f*, 1496*g*, and 1496*c*** such that:

- Block **1496*f* checks to see if the user selected to configure (set) a default for confidence value(s) used for WDRs—an option for configuration at block 1406 wherein the user action to configure it is detected at block 1408**;
- Block **1496*g* is processed if block 1496*f* determines the user did select to configure (set) a default for confidence value(s). Block 1496*g* invokes FIG. 27B for interfacing with the user accordingly, and processing then continues to block 1496*c***.
- Block **1496*c* is processed if block 1496*f* determines the user did not select to configure (set) a default for confidence value(s), or as the result of processing leaving block 1496*g*. Block 1496*c* handles other user interface actions leaving block 1408 (e.g. becomes the "catch all" as currently shown in block 1496 of FIG. 14**B).

Confidence value configuration begins at block 2720 upon a user action to present the interface. In one embodiment, the user is an authenticated administrator prior to being permitted to get access to processing of FIG. 27B. Block 2720 continues to block 2722 where all conceivable MS roles (DLM and ILM) are accessed, then to block 2724 to ensure the MS is enabled for at least one role which can have a setting configured. Depending on an embodiment, block 2722 may access roles which are supported, currently enabled, possible for future use, or those having other accessible characteristics. If block 2724 determines at least one role is available to the MS, then block 2726 accesses any default confidence values for each role determined and block 2728 presents a list (scrollable if applicable) to the user with any settings found. Block

2726 determines if there are any user configured defaults already configured through a prior use of FIG. 27B. The list presented at block 2728 will indicate when no user configuration was determined and what the current system default value is. The user can select an entry from the list, for example with a cursor, and perform a particular action on the selected entry as described below. Block 2728 continues to block 2730 where processing waits for certain user actions in response to the list presented. When block 2730 detects a user action, processing continues to block 2732.

If block 2732 determines the user selected to modify a role default entry (e.g. which was configured at a prior use of FIG. 27B), then block 2734 interfaces with the user for an updated confidence value default setting and processing continues back to block 2728. If block 2732 determines the action was not for modifying an existing role default entry, processing continues to block 2736. If block 2736 determines the user selected to add a new default to a selected role, then block 2738 interfaces with the user for a confidence value default setting and processing continues back to block 2728. If block 2736 determines the action was not for adding a confidence value default to a role, processing continues to block 2740. If block 2740 determines the user selected to remove a user configured confidence default value for a role, then block 2742 interfaces with the user for removal (e.g. reset back to system default setting) and processing continues back to block 2728. If block 2740 determines the action was not for a role confidence default value removal, processing continues to block 2744. If block 2744 determines the user selected to save user configured role settings resulting from FIG. 27B processing up to this point, then block 2746 saves all user configured confidence default values for MS processing use, and processing continues back to block 2728. If block 2744 determines the action was not for saving user configurations, processing continues to block 2748. If block 2748 determines the user selected to exit FIG. 27B processing, then processing continues to block 2752 where the user interface is appropriately terminated and to block 2754 where FIG. 27B processing is terminated, otherwise processing continues to block 2750 where other user actions leaving block 2730 are appropriately handled, and processing then continues back to block 2728.

Referring back to block 2724, if no DLM or ILM roles are determined for the MS, then block 2756 presents an error to the user and processing continues to block 2752 and block 2754 thereafter, already described above.

Default confidence values are the initial defaults used for setting a WDR confidence value (e.g. at blocks 236, 258, 334, 366, 418, 534, 618, 648, 750, 828, 874, 958, 2128, 2688, 8120, 8144, 8164, etc, or any other processing block where a confidence value is defaulted based on a location technology used, logic used, or any particular location processing used), however processing may further refine or adjust the confidence as is deemed appropriate when considering circumstances relevant for a particular processing block (e.g. surrounded-ness, timeliness of WDR information used for locating, heterogeneous sources considered, or any other variable for consideration of adjustment to a confidence default). In some embodiments, the user configured default value is a hard coded numeric value. In some embodiments, the user configured default value is an offset to be incremented (added (+)) or decremented (subtracted (−)) from an existing system default value. In other embodiments, the user configured default value includes an expression which elaborates to a default value or an offset to be applied to a system default. There may be a plurality of conditions specified for how to evaluate the expression.

Figure 28:
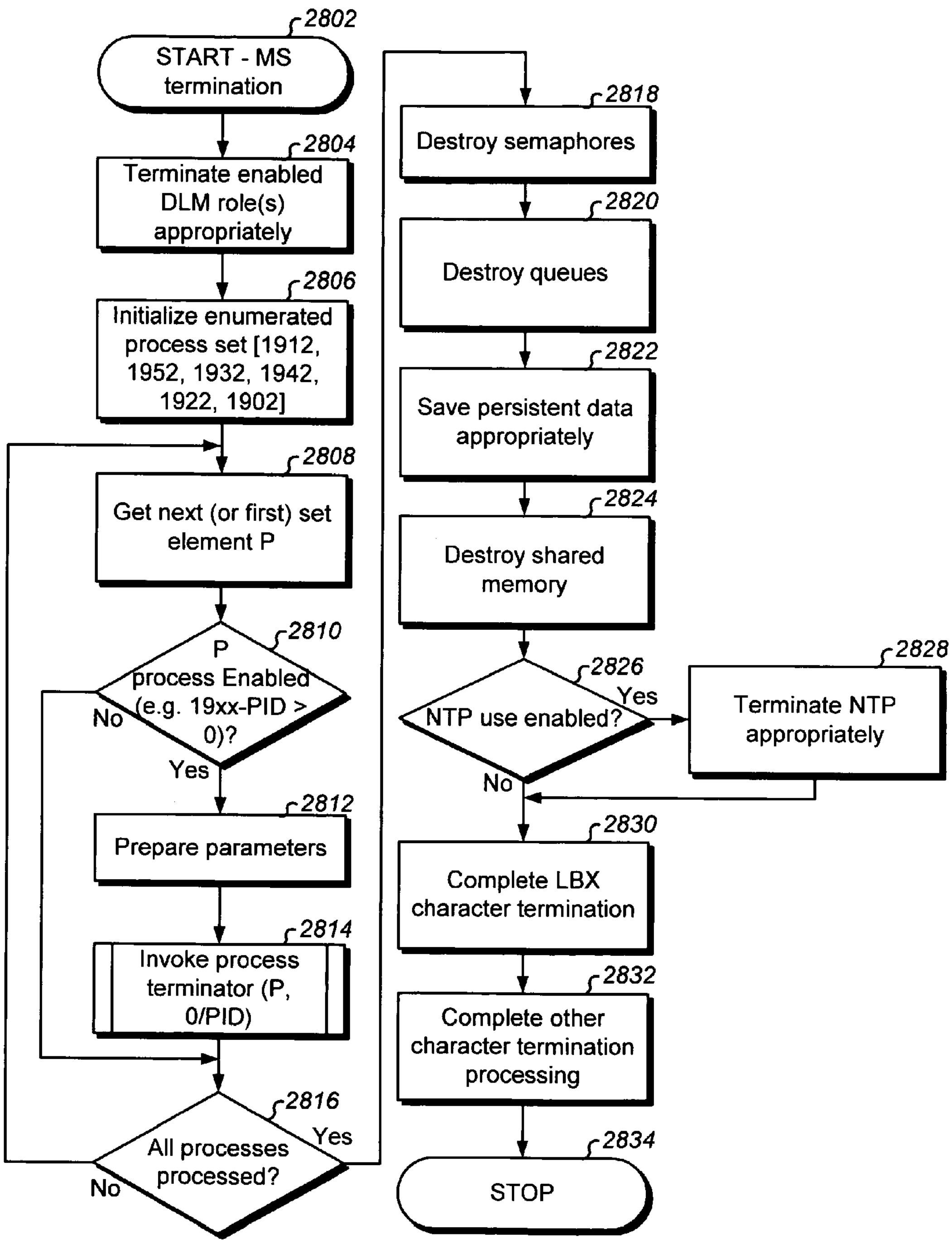
FIG. 28 depicts a flowchart for describing a preferred embodiment of MS termination processing.

FIG. 28 depicts a flowchart for describing a preferred embodiment of MS termination processing. Depending on the MS, there are many embodiments of processing when the MS is powered off, restarted, rebooted, reactivated, disabled, or the like. FIG. 28 describes the blocks of processing relevant to the present disclosure as part of that termination processing. Termination processing starts at block 2802 and continues to block 2804 for checking any DLM roles enabled and appropriately terminating if any are found (for example as determined from persistent storage variable DLMV). Block 2804 may cause the termination of thread(s) associated with enabled DLM role(s) for DLM processing above (e.g. FIGS. 2A through 9B). Block 2804 may invoke API(s), disable flag(s), or terminate as is appropriate for DLM processing described above. Such terminations are well known in the art of prior art DLM capabilities described above. Block 2804 continues to block 2806.

Blocks 2806 through 2816 handle termination of all processes/threads associated with the ILMV roles so there is no explicit ILMV check required. Block 2806 initializes an enumerated process name array for convenient processing reference of associated process specific variables described in FIG. 19, and continues to block 2808 where the first member of the set is accessed for subsequent processing. The enumerated set of process names has a prescribed termination order for MS architecture 1900. Thereafter, if block 2810 determines the process identifier (i.e. 19xx-PID such that 19xx is 1902, 1912, 1922, 1932, 1942, 1952 in a loop iteration of blocks 2808 through 2816) is greater than 0 (e.g. this first iteration of 1912-PID>0 implies it is to be terminated here; also implies process 1912 is enabled as used in FIGS. 14A, 28, 29A and 29B), then block 2812 prepares parameters for FIG. 29B invocation, and block 2814 invokes (calls) the procedure of FIG. 29B to terminate the process (of this current loop iteration (19xx)). Block 2812 prepares the second parameter in accordance with the type of 19xx process. If the process (19xx) is one that is slave to a queue for dictating its processing (i.e. blocked on queue until queue entry present), then the second parameter (process type) is set to 0 (directing FIG. 29A processing to insert a special termination queue entry to be seen by worker thread(s) for terminating). If the process (19xx) is one that is slave to a timer for dictating its processing (i.e. sleeps until it is time to process), then the second parameter (process type) is set to the associated 19xx-PID value (directing FIG. 29B to use in killing/terminating the PID in case the worker thread(s) are currently sleeping). Block 2814 passes the process name and process type as parameters to FIG. 29B processing. Upon return from FIG. 29B, block 2814 continues to block 2816. If block 2810 determines that the 19xx process is not enabled, then processing continues to block 2816. Upon return from FIG. 29B processing, the process is terminated and the associated 19xx-PID variable is already set to 0 (see blocks 2966, 2970, 2976 and 2922).

Block 2816 checks if all process names of the enumerated set (19xx) have been processed (iterated) by blocks 2808 through 2816. If block 2816 determines that not all process names in the set have been processed (iterated), then processing continues back to block 2808 for handling the next process name in the set. If block 2816 determines that all process names of the enumerated set were processed, then block 2816 continues to block 2818.

Block 2818 destroys semaphore(s) created at block 1220. Thereafter, block 2820 destroys queue(s) created at block 1218 (may have to remove all entries first in some embodiments), block 2822 saves persistent variables to persistent storage (for example to persistent storage 60), block 2824 destroys shared memory created at block 1212, and block 2826 checks the NTP use variable (saved prior to destroying shared memory at block 2824).

If block 2826 determines NTP is enabled, then block 2828 terminates NTP appropriately (also see block 1612) and processing continues to block 2830. If block 2826 determines NTP was not enabled, then processing continues to block 2830. Block 2828 embodiments are well known in the art of NTP implementations. Block 2828 may cause terminating of thread(s) associated with NTP use.

Block 2830 completes LBX character termination, then block 2832 completes other character 32 termination processing, and FIG. 28 processing terminates thereafter at block 2834. Depending on what threads were started at block 1240, block 2830 may terminate the listen/receive threads for feeding queue 26 and the send threads for sending data inserted to queue 24. Depending on what threads were started at block 1206, block 2832 may terminate the listen/receive threads for feeding queue 26 and the send threads for sending data inserted to queue 24 (i.e. other character 32 threads altered to cause embedded CK processing). Upon encounter of block 2834, the MS is appropriately terminated for reasons as set forth above for invoking FIG. 28.

With reference now to FIG. 29B, depicted is a flowchart for describing a preferred embodiment of a procedure for terminating a process started by FIG. 29A. When invoked by a caller, the procedure starts at block 2952 and continues to block 2954 where parameters passed are determined. There are two parameters: the process name to terminate, and the type of process to terminate. The type of process is set to 0 for a process which has worker threads which are a slave to a queue. The type of process is set to a valid O/S PID when the process worker threads are slave to a timer.

Thereafter, if block 2956 determines the process type is 0, then block 2958 initializes a loop variable J to 0, and block 2960 inserts a special termination request queue entry to the appropriate queue for the process worker thread to terminate. See FIG. 19 discussions for the queue inserted for which 19xx process name.

Thereafter, block 2962 increments the loop variable by 1 and block 2964 checks if all process prescribed worker threads have been terminated. Block 2964 accesses the 19xx-Max (e.g. 1952-Max) variable from shared memory using a semaphore for determining the maximum number of threads to terminate in the process worker thread pool. If block 2964 determines all worker threads have been terminated, processing continues to block 2966 for waiting until the 19xx-PID variable is set to disabled (e.g. set to 0 by block 2922), and then to block 2978 which causes return to the caller. Block 2966 uses a preferred choice of waiting described for blocks 2918 and 2920. The 19xx process (e.g. 1952) will have its 19xx-PID (e.g. 1952-PID) variable set at 0 (block 2922) when the process terminates. In some embodiments, the waiting methodology used at block 2966 may use the 19xx-PID variable, or may be signaled by the last terminating worker thread, or by block 2922.

If block 2964 determines that not all worker threads have been terminated yet, then processing continues back to block 2960 to insert another special termination request queue entry to the appropriate queue for the next process worker thread to terminate. Blocks 2960 through 2964 insert the proper number of termination queue entries to the same queue so that all of the 19xx process worker threads terminate.

Referring back to block 2956, if it is determined the process type is not 0 (i.e. is a valid O/S PID), then block 2968 inserts a special WDR queue 22 entry enabling a queue peek for worker thread termination. The reader will notice that the process termination order of block 2806 ensures processes which were slaves to the WDR queue 22 have already been terminated. This allows processes which are slaves to a timer to see the special termination queue entry inserted at block 2968 since no threads (which are slaves to queue) will remove it from queue 22. Thereafter, block 2970 waits until the 19*xx* process name (parameter) worker threads have been terminated using a preferred choice of waiting described for blocks 2918 and 2920. The 19xx process (e.g. 1902) will have its 19xx-PID (e.g. 1902-PID) variable set at 0 (block 2922) when the process terminates. In some embodiments, the waiting methodology used at block 2970 may use the 19xx-PID variable, or may be signaled by the last terminating worker thread, or by block 2922. Block 2970 also preferably waits for a reasonable timeout period in anticipation of known sleep time of the 19xx process being terminated, for cases where anticipated sleep times are excessive and the user should not have to wait for lengthy FIG. 28 termination processing. If the timeout occurs before the process is indicated to be terminated, then block 2970 will continue to block 2972. Block 2970 also continues to block 2972 when the process has successfully terminated.

If block 2972 determines the 19xx process did terminate, the caller is returned to at block 2978 (i.e. 19xx-PID already set to disabled (0)). If block 2972 determines the 19*xx* process termination timed out, then block 2974 forces an appropriate O/S kill to the PID thereby forcing process termination, and block 2976 sets the 19xx-PID variable for disabled (i.e. process 19xx was terminated). Thereafter, block 2978 causes return to the caller.

There are many embodiments for setting certain queue entry field(s) identifying a special queue termination entry inserted at blocks 2960 and 2968. Some suggestions: In the case of terminating thread(s) 1912, queue 26 insertion of a WDR preferably sets the MS ID field with a value that will never appear in any other case except a termination request (e.g. −100). In the case of terminating thread(s) 1902, 1922 and 1952, queue 22 insertion of a WDR preferably sets the MS ID field with a value that will never appear in any other case except a termination request (e.g. −100). In the case of terminating thread(s) 1942, queue 26 insertion of a WDR request preferably sets the MS ID field with a value that will never appear in any other case except a termination request (e.g. −100). In the case of terminating thread(s) 1932, queue 1980 insertion of a thread request queue record 2400 preferably sets field 2400*a* with a value that will never appear in any other case except a termination request (e.g. −100). Of course, any available field(s) can be used to indicate termination to particular thread(s).

Terminating threads of processing in FIG. 29B has been presented from a software perspective, but there are hardware/firmware thread embodiments which may be terminated appropriately to accomplish the same functionality. If the MS operating system does not have an interface for killing the PID at block 2974, then blocks 2972 through 2976 can be eliminated for relying on a FIG. 28 invocation timeout (incorporated for block 2814) to appropriately rob power from remaining thread(s) of processing.

An ILM has many methods and systems for knowing its own location. LBX depends on MSs maintaining their own whereabouts. No service is required to maintain the whereabouts of MSs in order to accomplish novel functionality.

LBX: Permissions and Charters—Configuration

Armed with its own whereabouts, as well as whereabouts of others and others nearby, a MS uses charters for governing many of the peer to peer interactions. A user is preferably unaware of specificities of the layer(s) providing WDR interoperability and communications. Permissions 10 and charters 12 surface desired functionality to the MS user(s) without fully revealing the depth of features that could be made available. Permissions provide authentication for novel features and functionality, and to which context to apply the charters. However, some permissions can provide action(s), features, and functionality by themselves without a charter. It is preferred that LBX features and functionality be provided in the most elegant manner across heterogeneous MSs.

User configured permissions are maintained at a MS and their relevance (applicability) to WDRs that are being processed is determined. WDR processing events are recognized through being placed in strategic LBX processing paths of WDRs. For example, permissions govern processing of newly processed WDRs at a MS, regardless of where the WDR originated. A permission can provide at least one privilege, and may provide a plurality of privileges. A permission is granted from a grantor identity to a grantee identity. Depending on what permissions are determined relevant to (i.e. applicable to) a WDR being processed (e.g. by accessing at least one field in the WDR), an action or plurality of actions which are associated with the permission can automatically occur. Actions may be as simple as modifying a setting which is monitored/used by an LBX application, or as complex as causing many executable application actions for processing. User configured charters are maintained at a MS and their relevance (applicability) to WDRs that are being processed is determined, preferably in context of the same recognized events (i.e. strategic processing paths) which are used for determining relevance of permissions to WDRs. A charter consists of a conditional expression and can have an action or plurality of actions which are associated with the expression. Upon evaluating the expression to an actionable condition (e.g. evaluates to a Boolean true result), the associated action(s) are invoked. Charters can be created for a MS by a user of that MS, or by a user of another MS. Charters are granted similarly to permissions in using a grantor and grantee identity, therefore granting a charter is equivalent to granting a permission to execute the charter.

While some embodiments will provide disclosed features as one at a time implementations, a comprehensive architecture is disclosed for providing a platform that will survive LBX maturity. FIGS. 30A through 30E depict a preferred embodiment BNF (Backus Naur Form) grammar for permissions 10 and charters 12. A BNF grammar is an elegant method for describing the many applicable derived subset embodiments of syntax and semantics in carrying out processing behavior. The BNF grammar of FIGS. 30A through 30E specifically describes:

- Prescribed command languages, such as a programming language, for encoding/representing permissions 10 and charters 12 (e.g. a Whereabouts Programming Language (WPL));
- Prescribed configuration in a Lex & Yacc processing of a suitable encoding;
- Prescribed XML encodings/representations of permissions 10 and charters 12;
- Prescribed communications datastream encodings/representations of permissions 10 and charters 12, such as in an ANSI encoding standard (e.g. X.409);
- Prescribed internalized encodings/representations of permissions 10 and charters 12, for example in a data processing memory;
- Prescribed internalized encodings/representations of permissions 10 and charters 12, for example in a data processing storage means;
- Prescribed database schemas for encoding/representing permissions 10 and charters 12;
- Prescribed semantics of constructs to carry out permissions 10 and charters 12;
- A delimited set of constructs for defining different representative syntaxes for carrying out permissions 10 and charters 12; and
- Prescribed data processing of interpreters and/or compilers for internalizing a syntax for useful semantics as disclosed herein.

There are many embodiments (e.g. BNF grammar subsets) of carrying out permissions 10 and charters 12 without departing from the spirit and scope of the present disclosure. A particular implementation will choose which derivative method and system to implement, and/or which subset of the BNF grammars shall apply. Atomic elements of the BNF grammar (leaf nodes of the grammar tree) are identified within double quotes (e.g. "text string" implies the value is an atomic element in text string form). Atomic elements are not constructs which elaborate to other things and/or types of data.

FIGS. 30A through 30B depict a preferred embodiment BNF grammar 3002*a* through 3002*b* for variables, variable instantiations and common grammar for BNF grammars of permissions 10, groups (e.g. data 8) and charters 12. Variables are convenient for holding values that become instantiated where appropriate. This provides a rich programming language and/or macro nature to the BNF grammar. Variables can be set with: a) a typed value (i.e. value of a particular data type (may be a list)); b) another variable for indirect referencing; c) a plurality of typed values; d) a plurality of variable references; or e) any combinations of a) through d). Variables can appear anywhere in the permissions or charters encodings. When variables are referenced by name, they preferably resolve to the name of the variable (not the value). When variables are referenced by their name with an instantiation operator (e.g. *), the variable is instantiated (i.e. elaborated/resolved) to assigned value(s). Instantiation also provides a macro (or function) ability to optionally replace subset(s) (preferably string replacements) of the variable's instantiated value with parameter substitutions. This enables customizably instantiating values (i.e. optionally, string occurrences in the value are replaced with specified matching parameters). An alternate embodiment to string substitution is for supporting numbers to be incremented, decremented, or kept as is, depending on the substitution syntax. For example:

```
*myVar(555++, 23−=4,888−−,200+=100)
```

This instantiation specifies that all occurrences of the string "555" should be incremented by 1 such that the first occurrence of "555" becomes "556", next occurrence of "555" becomes "557", and so on. Changing all occurrences of "555" to "556" is accomplished with the string substitution. This instantiation also specifies that all occurrences of the string "23" should be decremented by 4 such that the first occurrence of "23" becomes "19", next occurrence of "23" becomes "15", and so on. Changing all occurrences of "23" to "19" is accomplished with the string substitution. This instantiation also specifies that all occurrences of the string "888" should be decremented by 1 such that the first occurrence of "888" becomes "887", next occurrence of "888" becomes "886", and so on. Changing all occurrences of "888" to "887" is accomplished with the string substitution. This instantiation also specifies that all occurrences of the string "200"

should be incremented by 100 such that the first occurrence of "200" becomes "300", next occurrence of "200" becomes "400", and so on. Changing all occurrences of "200" to "300" is accomplished with the string substitution.

Preferably, when a variable is set to another variable (e.g. a=b), an instantiation of the variable (i.e. *a) equals the variable b, not b's value (i.e. *(*a)=b's value). If the variable b is set to a variable c (e.g. b=c) in the example, and the variable a is set to the variable b as already described (past or future, prior to instantiation), and c was set (i.e. c=2) to the value 2 (past or future, prior to instantiation), then the preferred embodiment requires three (3) instantiations of variable a to get to the value assigned to variable c (e.g. *(*(*a)))=2). Instantiation of variable a (e.g. *a) preferably corresponds to a level of "peeling back" through the hierarchy of variable assignments if one exists. Alternative embodiments will allow a single instantiation of a variable to get through any number of indirect variable assignments for the first encountered value in the indirect chain value (e.g. *a=2) at the time of instantiation. Either semantic may have useful features from a is programming standpoint. Over-instantiating (e.g. *(*c)=error) should cause an error. An assigned value is the leaf node in peeling back with instantiations.

The BNF Grammar "null" is an atomic element for no value. In a syntactic embodiment, a null value may be a special null character (e.g. 0). The History construct is preferably used to track when certain constructs were created and last modified. An alternative embodiment will track all construct changes to LBX history 30 for later human, or automated, processing audit.

Grammar 3002*b* "system type" is an atomic element (atomic elements are not constructs which elaborate to other things; atomic elements are shown delimited in double quotes) generalized for the type of MS (e.g. PDA, cell phone, laptop, etc). Other embodiments will provide more detail to the type of MS (e.g. iPhone, Blackberry Pearl, Nextel i845, Nokia 741, etc). ID is an identity construct of the present disclosure for identifying a MS, a user, a group, or any other entity for which to associate data and/or processing. IDType provides the type of ID to support a heterogeneous identifying grammar. An identity (i.e. ID [IDType]) can be directly associated to a MS (e.g. MS ID), or may be indirectly associated to a MS (e.g. user ID or group ID of the MS). Indirect identity embodiments may assume an appropriate lookup for mapping between identities is performed to get one identity by looking up another identity. There may be multiple identities for a MS. Identities, by definition, provide a collective handle to data. For example, an email sender or recipient is an example of an identity ("logical handle") which can be associated to a user identity and/or MS identity and/or group identity. A sender, source, recipient, and system parameter in some atomic commands presented below is any of the variety of types of identities.

Address elements of "ip address" and "SNA address" are examples of logical addresses, but are mentioned specifically anyway. ID, IDType and Address construct atomic elements (as elaborated on Right Hand Side (RHS)) are self explanatory. The TimeSpec construct is one of various kinds of "date/time stamp" or "date/time period" atomic elements. In a syntactic embodiment, date/time stamps are specified with prefixed character(s) and a time format such as xYYYYMMDDHHMMSS.12 . . . J (J=# places to right of decimal point, such that 1=is the one tenth (1/10) second place, two=the one hundredth (1/100) second place, etc). The first character(s) (i.e. x) clarify the date/time stamp information.

>20080314 indicates "in effect if current date/time after Mar. 14, 2008;

>=20080314 indicates "in effect if current date/time on or after Mar. 14, 2008;

<200803142315 indicates "in effect if current date/time prior to Mar. 14, 2008 at 11:15 PM;

<=200803142315 indicates "in effect if current date/time on or prior to Mar. 14, 2008 at 11:15 PM; and =20080314231503 indicates "in effect if current date/time matches Mar. 14, 2008 at 11:15:03 PM.

Date/time periods may have special leading characters, just as described above (which are also periods). When using the date/time format, the granulation of the date/time stamp is a period of time.

20080314 indicates "in effect if current date/time during Mar. 14, 2008;

200803142315 indicates "in effect if current date/time during Mar. 14, 2008 at 11:15 PM (any time during that minute); and 20080314231503 indicates "in effect if current date/time during Mar. 14, 2008 at 11:15:03 PM (any time during that second).

Date/time periods can also be specified with a range using a colon such as 20080314:20080315 (Mar. 14, 2008 through Mar. 15, 2008). A date/time period can be plural such as 20080314:20080315, 2008031712:2008031823 (i.e. multiple periods) by using a comma.

FIG. 30C depicts a preferred embodiment BNF grammar 3034 for permissions 10 and groups (of data 8). The terminology "permissions" and "privileges" are used interchangeably in this disclosure. However, the BNF grammar shows a permission can provide one privilege, or a plurality of privileges. There are a massive number (e.g. thousands) of values for "atomic privilege for assignment" (i.e. privileges that can be assigned from a grantor to a grantee) in grammar 3034. Few examples are discussed below. This disclosure would be extremely lengthy to describe every privilege. The reader can determine a minimum set of LBX privileges (permissions) disclosed as: Any configurable privilege granted by one identity to another identity that can limit, enable, disable, delegate, or govern actions, feature(s), functionality, behavior(s), or any subset(s) thereof which are disclosed herein. Every feature disclosed herein, or feature subset thereof, can be managed (granted and enforced) with an associated privilege. Privileges may be used to "turn on" a feature or "turn off" a feature, depending on various embodiments.

There are two (2) main types of permissions (privileges): semantic privileges which on their own enable LBX features and functionality; and grammar specification privileges which enable BNF grammar specifications. Semantic privileges are named, anticipated by applications, and have a semantic meaning to an application. Semantic privileges are variables to applications whereby values at the time of an application checking the variable(s) determine how the application will behave. Semantic privileges can also have implicit associated action(s). Grammar specification privileges are named, anticipated by charter parser implementation, and indicate what is, and what is not, permitted when specifying a charter. Grammar specification privileges are variables to charter parsing whereby values at the time of charter parse logic checking the variable(s) determine whether or not the charter is valid (i.e. privileged) for execution. Impersonation is not directly defined in the BNF grammar of charters, and is therefore considered a semantic privilege.

The "MS relevance descriptor" atomic element is preferably a binary bit-mask accommodating all anticipated MS types (see "system type"). Each system type is represented by a bit-mask bit position wherein a bit set to 1 indicates the MS type does participate with the privilege assigned, and a bit set to 0 indicates the MS type does not participate with the privilege assigned. This is useful when MSs do not have equivalent capabilities thereby limiting interoperability for a particular feature governed by a privilege. When the optional MSRelevance construct is not specified with a privilege, the preferred default is assumed relevance for all MSs (i.e. =all bits set to 1). An alternate embodiment will make the default relevant for no MSs (i.e. =all bits set to 0). Privilege codes (i.e. syntactical constants equated to an "atomic privilege for assignment" description) are preferably long lived and never changing so that as new LBX privileges are introduced (i.e. new privileges supported), the old ones retain their values and assigned function, and operate properly with new software releases (i.e. backwards compatible). Thus, new constants (e.g. \lbxall=privilege for allowing all LBX interoperable features) for "atomic privilege for assignment" should be chosen carefully.

Grants are used to organize privileges in desired categories and/or sub-categories (e.g. organization name, team name, person name, etc and then privileges for that particular grant name). A grant can be used like a folder. Grants provide an hierarchy of tree branch nodes while privileges are leaf nodes of the grant privilege tree. There are many types of privileges. Many are categorized for configuring charter conditions and charter actions, and some can be subsets of others, for example to have an overall category of privileges as well as many subordinate privileges within that category. This facilitates enabling/disabling an entire set with a single configuration, or enabling/disabling certain privileges within the set. This also prevents forcing a user to define Grants to define privilege categories. BNF grammar 3034 does not clarify the Privilege construct with a parameter for further interpretation, however some embodiments will incorporate an optional Parameters specification:

Privilege="atomic privilege for assignment" [Parameters] [MSRelevance] [TimeSpec] [Description] [History] |VarInstantiations In such embodiments, Parameters preferably resolves to the Parameters construct of FIG. 30E for clarifying how to apply a particular privilege. Parameters, if used for privileges, have meaning within the context of a particular privilege. Similarly, Parameters may also be used at a Grant level for applying qualifying information to a group of privileges:

Grant="grant name" [Parameters] AND (Privileges [TimeSpec] [Description] [History] I Grants [TimeSpec] [Description] [History] I VarInstantiations)

Some examples of semantic privileges (i.e. "atomic privilege for assignment") that can be granted from a grantor identity (ID/IDType) to a grantee identity (ID/IDType) include:

- Impersonate: allows the grantee to perform MS administration of grantor (alternate embodiments will further granulate to a plurality of impersonate privileges for each possible type, or target, of administration);
- LBX interoperable: allows overall LBX interoperability (all or none);
- View nearby status: enables determining if nearby each other;
- Identify (beacon) the MS with an alert—see FIG. 88A discussion;
- View whereabouts status of MS users which have privileges configured at MS (e.g. friends of the MS user)—see FIG. 88A discussion;
- View whereabouts status: enables determining whereabouts (e.g. on a map);
- View Reports: enables viewing statistics and/or reports; This privilege is preferably set with a parameter for which statistics and/or which reports; An alternate embodiment will have individual privileges for each type of statistic and/or report;
- View Historical Report: enables viewing history information (e.g. routes); This privilege is preferably set with a parameter for which history information; An alternate embodiment will have individual privileges for each type of history information;
- Set Geofence arrival alert: allows an action for alerting based on arrival to a geofenced area; This privilege may be set with parameter(s) for which eligible area(s) to define geofences; An alternate embodiment will have individual privileges for each area(s);
- Set Geofence departure alert: allows an action for alerting based on departure from a geofenced area; This privilege may be set with parameter(s) for which eligible area(s) to define geofences; An alternate embodiment will have individual privileges for each area(s);
- Set nearby arrival alert: allows an action for alerting based on arrival to being nearby; This privilege may be set with a parameter for quantifying amount nearby;
- Set nearby departure alert: allows an action for alerting based on departure from being nearby; This privilege may be set with a parameter for quantifying amount nearby;
- Set Geofence group arrival alert: allows an action for alerting based on a group's arrival to a geofenced area; This privilege may be set with parameter(s) for which groups or MSs apply;
- Set Geofence group departure alert: allows an action for alerting based on a group's departure from a geofenced area; This privilege may be set with parameter(s) for which groups or MSs apply;
- Set nearby group arrival alert: allows an action for alerting based on a group's arrival to being nearby; This privilege may be set with parameter(s) for quantifying amount nearby, and/or which groups or MSs apply;
- Set nearby group departure alert: allows an action for alerting based on a group's is departure from being nearby; This privilege may be set with parameter(s) for quantifying amount nearby, and/or which groups or MSs apply;
- Set Situational Location (as defined in U.S. Pat. Nos. 6,456,234; 6,731,238; 7,187,997; U.S. PTO Publication 2006/0022048 (Johnson)) arrival alert: allows an action for alerting based on arrival to a situational location; This privilege may be set with parameter(s) for one or more situational location(s) defined;
- Set Situational Location (as defined in U.S. Pat. Nos. 6,456,234; 6,731,238; 7,187,997; U.S. PTO Publication 2006/0022048 (Johnson)) departure alert: allows an action for alerting based on departure from a situational location; This privilege may be set with a parameter(s) for one or more situational location(s) defined;
- Set Situational Location (as defined in U.S. Pat. Nos. 6,456,234; 6,731,238; 7,187,997; U.S. PTO Publication 2006/0022048 (Johnson)) group arrival alert: allows an action for alerting based on a group's arrival to a situational location; This privilege may be set with parameter(s) for one or more situational location(s) defined, and/or which groups or MSs apply;
- Set Situational Location (as defined in U.S. Pat. Nos. 6,456,234; 6,731,238; 7,187,997; U.S. PTO Publication 2006/0022048 (Johnson)) group departure alert: allows an action for alerting based on a group's departure from a situational location; This privilege may be set with parameter(s) for one or more situational location(s) defined, and/or which groups or MSs apply;

- Allow action monitoring: allows condition for the monitoring of certain action(s); This privilege may be set with parameter(s) for which action(s) to be monitored;
- Accept service routing: enables being a service routing system; This privilege may be set with parameter(s) for which service(s) to route;
- Allow whereabouts monitoring (i.e. any WDR 1100 fields): allows condition for the monitoring of certain whereabouts; This privilege may be set with parameter(s) for which area(s) where whereabouts can be monitored; Another embodiment will define a specific privilege for each field and/or subfield of a WDR 1100 (e.g. speed monitoring (e.g. field 1100*h*));
- Service informant utilization (includes derived subsets for how to be used; e.g. log for me all successful detections (or particular types) by the remote MS of interest);
- Strip out WDR information inbound, outbound, and/or prior to be inserting to queue 22: these types of privileges may also affect what charters can and cannot do;
- Append WDR information inbound, outbound, and/or prior to be inserting to queue 22: these types of privileges may also affect what charters can and cannot do;
- Support certain types of service informant code processing, for example for carpool collaboration;
- Participate in parking lot search functionality; this privilege may be set with parameter(s) for which parking lots apply;
- Be a candidate peer service target for any particular application, types of applications, or all applications, or for certain MSs, certain groups, or combinations of any of these (parameter(s) may be specified);
- Participate in LN-expanse as a master MS, for example to maintain a database of historical MSs in the vicinity, or a database of identity mappings (e.g. users to MSs; parameter(s) may be specified);
- Keep track of hotspot history;
- Provide service propagation for any particular application, types of applications, or all applications, or for certain MSs, certain groups, or combinations of any of these (parameter(s) may be specified);
- Enable automatic call forwarding functionality when within proximity to a certain phone, for example to route a wireless call to a nearby wired line phone; this privilege may be set with parameter(s) for which phones or phone numbers participate;
- Enable configuration of deliverable content that can be delivered in a peer to peer manner to a MS in the vicinity, using any data type, size, location, or other characteristic to be a unique privilege; parameter(s) may be specified to qualify this;
- Permit whereabouts to be queried in certain ways at a MS for any of a variety of purposes (e.g. map term generation);
- Allow access to charters starters data, and permit a certain subset of actions thereof (e.g. use of snippets, what can be searched, etc);
- Enable LBX interaction (e.g. via fields 1100*k*) for a specific application or specific data for a specific application;
- Enable particular paste command(s) involving particular data;
- Enable contextually creating charters involving applications common to more than one MS user;
- Enable MS profile (e.g. appfld.profile.contents) comparisons;
- Enforce known functionality (e.g. permitted values) for data of application fields 1100*k*, in particular for data of registered application sections commonly processed by MSs;
- Enable/disable service propagation, or a subset of functionality thereof;
- Enable/disable a particular SPUI (e.g. parameter for SPUI executable name);
- Enable/disable a MS user's ability to send a targeted transmission to another MS user;
- Enable/disable what data can or cannot be clipped and pasted;
- Enable/disable, and under what conditions, charters can modify privileges or other charters;
- Enable/disable various WDR based application record sorting;
- Allow being monitored on a vicinity monitor, perhaps according to certain conditions;
- Allow grantings to be assigned to other identifier, or certain identifier(s), as a single unit (e.g. see resource mapper);
- Allow cross application addressing, perhaps for certain applications and contexts;
- A privilege for any functionality or feature disclosed herein;
- Any subordinate privilege of above, or of any functionality or feature disclosed herein;
- Any parent privilege of above, or of any functionality or feature disclosed herein; and/or
- Any privilege combination of above, or of any functionality or feature disclosed herein.

Grammar specification privileges can enable/disable permitted specifications of certain charter terms, conditions, actions, or any other charter aspect. Some examples of grammar specification privileges (i.e. "atomic privilege for assignment") that can be granted from a grantor identity (ID/IDType) to a grantee identity (ID/IDType) include:

- Accept autodial #: allows an action for sending a speed dial number;
- Accept web link: allows an action for sending a hyper link;
- Accept email: allows an action for sending an email;
- Accept SMS msg: allows an action for sending an SMS message;
- Accept content: allows an action for sending a content of any type;
- Accept broadcast email: allows an action for sending a broadcast email;
- Accept broadcast SMS msg: allows an action for sending a broadcast SMS message;
- Accept indicator: allows an action for sending an indicator;
- Accept invocation: allows an action for invoking (optionally with parameters for which executable and parameters to it) an executable (application, script, command file, or any other executable); Alternate embodiments will have specific privileges for each type of executable that may be invoked);
- Accept file: allows an action for sending a file or directory;
- Accept semaphore control: allows an action for setting or clearing a semaphore; This privilege is preferably set with a parameter for which semaphore and what to do (set or clear);
- Accept data control: allows an action for access, storing, alerting, or discarding data (alternate embodiments will further granulate to a plurality of data control privileges for each data control type (access, store, alter, discard, etc); This privilege may be set with parameter(s) for which data and what to do;

Accept database control: allows an action for access, storing, alerting, or discarding database data (alternate embodiments will further granulate to a plurality of data control privileges for each data control type (access, store, alter, discard, etc); This privilege may be set with parameter(s) for which database data and what to do;

Accept file control: allows an action for access, storing, alerting, or discarding file/directory path data (alternate embodiments will further granulate to a plurality of data control privileges for each data control type (access, store, alter, discard, etc)); This privilege may be set with parameter(s) for which directory or file path(s) and what to do;

Allow profile match comparison: allows condition for the monitoring of certain profile(s); This privilege may be set with a parameter(s) for which profile(s) can be monitored/compared; An alternate embodiment will define a specific privilege for each ProfileMatch type;

Allow interest match comparison: allows condition for the monitoring of interests; This privilege may be set with parameter(s) for which interests can be monitored/compared; An alternate embodiment will define a specific privilege for each interest candidate;

Allow filters match comparison: allows condition for the monitoring of filters; This privilege may be set with parameter(s) for which filters can be monitored/compared; An alternate embodiment will define a specific privilege for each filter candidate;

Allow movement monitoring: allows condition for the monitoring of movement; This privilege may be set with parameter(s) for quantifying how much movement, and/or how long for lack of movement (an alternate embodiment will define distinct privileges for each movement monitoring type);

Allow application use monitoring: allows condition for the monitoring of application usage; This privilege may be set with parameter(s) for specifying which application(s) to monitor, and/or how long for usage of the application(s); Another embodiment specifies which aspect of the application is to be monitored (e.g. data, DB data, semaphore, thread/process invoke or terminate, file/directory data, etc);

Allow invocation monitoring: allows an action for monitoring application(s) used (optionally with parameter(s) for which application/executable); Alternate embodiments will have specific privileges for each application or executable of interest;

Allow application termination monitoring: allows condition for monitoring application(s) terminated (optionally with parameter(s) for which application/executable); Alternate embodiments will have specific privileges for each application or executable of interest;

Allow file system monitoring: allows condition for monitoring a file or directory; This privilege may be set with parameter(s) for specifying which path(s) to monitor, and/or what to monitor for, and how long for absence or removal of the path(s);

Allow semaphore monitoring: allows condition for monitoring a semaphore; This privilege may be set with parameter(s) for specifying which semaphore(s) to monitor, and/or what to monitor for (clear or set);

Allow data monitoring (file or directory): allows condition for monitoring data; This privilege may be set with parameter(s) for specifying which data to monitor, and/or what value to monitor for (charter condition like a debugger watch);

Allow data attribute monitoring (file or directory): allows condition for monitoring data attribute(s); This privilege may be set with parameter(s) for specifying which data attributes (e.g. chmod or attrib or extended attributes) to monitor, and/or what value to monitor for (charter condition like a debugger watch);

Allow database monitoring: allows condition for monitoring database data; This privilege may be set with parameter(s) for specifying which database data to monitor, and/or what value to monitor for (like a database trigger);

Allow sender monitor: allows condition for monitoring sender information; This privilege may be set with parameter(s) for specifying which sender address(es) to monitor email or SMS messages from (may have separate privileges for each type of distribution);

Allow recipient monitor: allows condition for monitoring recipient information; This privilege may be set with parameter(s) for specifying which recipient address(es) to monitor email or SMS messages to (may have separate privileges for each type of distribution);

Allow "modification" instead of "monitor"/"monitoring" for each monitor/monitoring privilege described above;

Allow focused title bar use: allows using the focused title bar for alerting;

Allow specifying map terms or certain types or forms of map terms;

Allow specifying PointSet or any other Term construct;

Allow specifying AppTerm triggers or any aspect of configuration thereof (charter types, which standardized MS applications can be configured, which customized application can be configured, permitted AppTerm condition terms, etc);

Permit local or remote charter or command execution;

Permit access to a pluggable interface, one provided by another MS user at a MS, for example a dynamically linked interface, or script;

Allow specifying profile operators, tags for compare, or other profile permitted interrogation;

Enforce specific application fields and/or settings thereof in fields 1100*k* of WDRs;

A privilege for any BNF grammar atomic command, atomic operand, parameter(s), parameter type, atomic operator, or underlying action performed in a charter herein;

Any subordinate privilege of above, or of any functionality or feature disclosed herein;

Any parent privilege of above, or of any functionality or feature disclosed herein; and/or Any privilege combination of above, or of any functionality or feature disclosed herein.

While the Grantor construct translates to the owner of the permission configuration according to grammar 3034, impersonation permits a user to take on the identity of a Grantor for making a configuration. For example, a group by its very nature is a form of impersonation when a single user of the group grants permissions from the group to another identity. A user may also impersonate another user (if has the privilege to do so) for making configurations. In an alternative embodiment, grammar 3034 may include means for identifying the owner of the permission(s) granted. Group constructs provide means for collections of ID constructs, for example for teams, departments, family, whatever is selected for grouping by a name (atomic element "group name"). The impersonation privilege should be delegated very carefully in the preferred embodiment since the BNF grammar does not carry owner information except through a History construct use.

The Grantor of a privilege is the identity wanting to convey a privilege to another identity (the Grantee). The Grantee is the identity becoming privileged by administration of another identity (the Grantor). There are various embodiments for maintaining privileges, some embodiments having the side affect of increasing, or decreasing, the palette of available privileges for assignment. Privilege/Permission embodiments include:

1) Administrated privileges are maintained and enforced at the Grantor's MS. As privileged Grantee WDR information is detected at the Grantor's MS, or as Grantor WDR information is detected at the Grantor's MS: the appropriately privileged Grantee is provided with LBX application features at their (Grantee) MS in accordance with the privileges granted;
2) Administrated privileges are maintained and enforced at the Grantor's MS, but are also communicated to the Grantee's MS for being used by the Grantee for informative purposes. As privileged Grantee WDR information is detected at the Grantor's MS, or as Grantor WDR information is detected at the Grantor's MS: the appropriately privileged Grantee is provided with LBX application features at their (Grantee) MS in accordance with the privileges granted;
3) Administrated privileges are maintained at the Grantor's MS for administration purpose, but are used for governing features/processing at a Grantee MS. Privileges are appropriately communicated to a Grantee MS for WDR information processing, such that as Grantor WDR information is detected at the Grantee MS, the Grantee is provided with LBX application features at their (Grantee) MS in accordance with the privileges granted; and/or
4) Privileges are stored at both the Grantor's MS and the Grantee's MS for WDR information processing including any combination of #1 through #3 above (i.e. WDR information processing at each MS provides LBX features benefiting the Grantor and/or Grantee).
5) See FIG. 49A discussions for some of the permission/privilege assignment considerations between a Grantor identity and a Grantee identity.

In an alternative embodiment, groups can be used to handle groups of privileges as well as groups of IDs, so that Groups/Group BNF constructs generically handle a collection of things, regardless of the type of things, for example using a qualifier like IDType. Grants and Groups have a similar hierarchy. There may be no need to have separate Grants/Grant BNF grammar definitions. The Groups/Group constructs can be extended to handle Privileges in a similar manner. Groups/Group construct related changes may be made to the BNF grammar, database tables and flowcharts described below for consolidating collections of IDs, groups and privileges for properly carrying out and supporting groups and grants as disclosed.

FIGS. 30D through 30E depict a preferred embodiment BNF grammar 3068*a* through 3068*b* for charters. Charters embody conditional events to be monitored and the actions to cause when those events occur. Notice there is still a Grantee and Grantor construct in charters, even in the face of having privileges for governing the charters. Grantor and Grantee constructs used in charters have to do with granting the permission/privilege to enable charters at a particular MS. Once they are enabled at a MS, permissions/privileges of grammar 3034 may be used to govern how the charters process.

It is important to note the context of terminology use "Grantor" and "Grantee" appears in, since they are similarly used in context of charters versus permissions. In both cases there is an acceptance/authentication/configuration granted by a Grantor to a Grantee. A permission Grantor grants a privilege to a Grantee. A charter Grantor grants a privilege to enable a Grantee's charters (may be at the mercy of privileges in the preferred embodiment). The Grantee construct in charters translates to the owner/creator/maintainer identity of the charter configuration according to grammar 3068*a* and 3068*b*, and the Grantor construct translates to an identity the Grantee has created the charter for, but does not necessarily have the privilege to do so, or does not necessarily have the privilege for any subset of processing of the charter. Privileges preferably govern whether charters are in effect, and how they are in effect. An alternative embodiment will activate (make in effect) a charter by granting it from one identity to another as shown in grammar 3068*a*. A charter consists of a conditional expression and can have an action or plurality of actions which are associated with the conditional expression. Upon evaluating the expression to an actionable condition (e.g. evaluates to a Boolean true result), the associated action(s) are invoked.

Impersonation permits a user to take on the identity of a Grantee for making a configuration. For example, a group by its very nature is a form of impersonation when a single user of the group administrates charters for the group. A user may also impersonate another user (if has the privilege to do so) for making configurations. In an alternative embodiment, grammar 3068*a* and 3068*b* may include means for identifying the owner of the charters administrated. The impersonation privilege should be delegated very carefully in the preferred embodiment since the BNF grammar does not carry owner information except through a History construct use.

The Grantee of a charter is the identity (e.g. creates and owns the charter) wanting to have its charters processed for another identity (the Grantor). The Grantor is the identity targeted for processing the administrated charter(s) created by the Grantee. The terminology "Grantor" and "Grantee" will become reversed (to match privilege assignments) in an embodiment which grants charters like privileges. There are various embodiments for maintaining charters, some embodiments having the side affect of increasing, or decreasing, the palette of available charter processing deployed. Charter embodiments include:

6) Administrated charters are stored at the Grantee's (the administrator's) MS. As privilege providing Grantor WDR information is detected at the Grantee's MS, the Grantee is provided with LBX application charter processing at his (Grantee) MS, preferably in accordance with privileges defined as described in #1 through #5 above;
7) Administrated charters are maintained at the Grantee's (the administrator's) MS, but are communicated to the Grantor's MS for being used for informative purposes. As privilege providing Grantor WDR information is detected at the Grantee's MS, the Grantee is provided with LBX application charter processing at his (Grantee) MS, preferably in accordance with privileges defined as described in #1 through #5 above;
8) Administrated charters are maintained at the Grantee's MS for administration purpose, but are used for processing at the Grantor MS. Charters are appropriately communicated to the Grantor MS for WDR information processing, such that as Grantor WDR information is detected at the Grantor MS, the Grantee is provided with LBX application features for processing at the Grantor's MS, preferably in accordance with privileges defined as described in #1 through #5 above. Also, as Grantee WDR information is detected at the Grantor's MS, the Grantee is provided with LBX application charter processing at his (Grantee) MS, preferably in accordance with privileges defined as described in #1 through #5 above; and/or 9) Charters are maintained at both the Grantor's MS and the Grantee's MS for WDR information processing, including any combination of #6 through #8 above (i.e. WDR information processing at each MS provides LBX features benefiting the Grantor and/or the Grantee).

10) See FIG. 49B discussions for some of the charter assignment considerations between a Grantee identity and a Grantor identity.

Grammar 3068*a* "and" and "or" are atomic elements for CondOp operators. In a syntactic embodiment, "and" and "or" may be special characters (e.g. &, I, respectively). Grammar 3068*a* Value elaboration "atomic term" (RHS) is an atomic element for a special type of term that can be used in a condition specification, such as:

My MS location (e.g. \loc_my): preferred embodiment resolves to field 1100*c* from the most recent WDR which describes this MS (i.e. the MS of atomic term evaluation processing); WTV may be used to determine if this is of use (if not, may return a null, cause a failure in a conditional match, or generate an error);

A specified MS, or group, mobile location (e.g. \locByL_-30.21,−97.2=location at the specified latitude and longitude (ensure no intervening blanks)): preferred embodiment resolves to a specified location comparable to a WDR field 1100*c*, not necessarily in the same format or units used as field 1100*c* (i.e. converted appropriately for a valid comparison when used). There are many different formats and units that can be specified here with a unique syntax. An elevation (or altitude) may also be specified for a three dimensional specification (e.g. \locByL_-30.21,−97.2,10L=location 10 miles in elevation (or altitude); may also be referred to as a situational location);

A specified MS, or group, situational location (e.g. \sl_-30.21,−97.2;1050F=situational location at the specified latitude, longitude and elevation in feet (ensure no intervening blanks)): preferred embodiment resolves to specified situational location comparable to applicable WDR fields, not necessarily in the same format or units used (i.e. converted appropriately for valid comparison(s) when used). See U.S. Pat. No. 6,456,234 (Johnson) for the definition of a situational location that can be specified. A reasonable syntax following the leading escape character and "sl" prefix should be used; this example assumes an anticipated order (lat, long, elevation); One embodiment also assumes an order for other situational location criteria wherein a semicolon (;) delimits data (i.e. use ";" to show lack of data at anticipated position (e.g. \sl_-30.21,−97.2;;;; 56); Another embodiment uses descriptors to indicate which data is being described so any order can be specified (e.g. \sl_lat=−30.21,lon=−97.2;elev=1050F). There are many different formats, fields and units that can be specified here with a unique syntax;

My current MS mobile location (e.g. \loc_my): same as described above;

A current MS, or group, mobile location (e.g. \locByID_Larry=location of MS with id Larry, \locG_dept78=location of members of the group dept78): preferred embodiment resolves to a location associated with an identifier. Preferably, queue 22 is accessed first for the most recent occurrence of a WDR matching the identifier(s). An alternate embodiment additionally searches LBX history 30 if not found elsewhere. In one embodiment, an averaged location is made for a group identifier using locations of the identifiers belonging to the group, otherwise a group containing MSs with different locations (i.e. each individual of the group compared for match) causes a false condition when used in an expression, or alternatively cause an error. This is preferably used to compare locations of WDRs from a plurality of different MSs without requiring a value to be surfaced back to the is expression reference;

A current MS, or group, situational location (e.g. \slByID_Larry=situational location of MS with id Larry, \slByG_dept78=situational location of members of the group dept78): preferred embodiment resolves to a situational location associated with an identifier. Preferably, queue 22 is accessed first for the most recent occurrence of a WDR matching the identifier(s). An alternate embodiment additionally searches LBX history 30 if not found elsewhere. In one embodiment, an averaged situational location is made for a group identifier using locations of the identifiers belonging to the group, otherwise a group containing MSs with different locations causes a false condition when used in an expression, or alternatively cause an error. This is preferably used to compare situational locations of WDRs from a plurality of different MSs without requiring a value to be surfaced back to the expression reference;

A WDR with field(s) to search for directly from queue 22 in form: \q_ref$_1$=<criteria$_1$>;_ref$_2$=<criteria$_2$>; . . . ; ref$_i$=<criteria$_i$> such that each ref$_i$ is identical to the reference used in a WDRTerm (e.g. ref) for i>=1, and <criteria$_i$> is a contextually relevant expression for how to search for matching to the particular referenced field(s);

A WDR with field(s) to search for directly from history 30 in form: \h_ref$_1$=<criteria$_1$>; ref$_2$=<criteria$_2$>; . . . ; ref$_i$=<criteria$_i$> such that each ref$_i$ is identical to the reference used in a WDRTerm (e.g. ref) for i>=1, and <criteria$_i$> is a contextually relevant expression for how to search for matching to the particular referenced field(s);

Last application used (e.g. \appLast): preferably resolves to an application reference (e.g. name) which can be successfully compared to a MS operating system maintained reference for the application (e.g. as maintained to LBX history) that was last used by the MS user (e.g. embodiments for last focused, or last used that had user input directed to it). One embodiment implements only known PRR applications using field 5300*a* and/or 5300*b* for the reference (See FIGS. 53 and 55A);

Last application context used (e.g. \appLastCtxt): preferably resolves to an application context reference which can be successfully compared to a MS operating system context maintained for comparison to LBX history. One embodiment implements only known PRR applications using field 5300*a* and/or 5300*b* for the application reference (See FIGS. 53 and 55A), and saved user input for the context of when the application was focused. Another embodiment incorporates the system and methods of U.S. Pat. No. 5,692,143 ("Method and system for recalling desktop states in a data processing system", Johnson et al) to maintain application contexts to history;

Application in use (e.g. \appLive): preferably resolves to an application reference (e.g. name) which can be successfully compared to a MS operating system maintained reference for the application (e.g. as maintained to LBX history) that may or may not be running (active) on the MS. One embodiment implements only known PRR applications using field 5300_a_ and/or 5300_b_ for the reference (See FIGS. 53 and 55A);

Application context in use (e.g. \appLiveCtxt): preferably resolves to an application context reference which can be successfully compared to a MS operating system context maintained for comparison. One embodiment implements only known PRR applications using field 5300_a_ and/or 5300_b_ for the application reference (See FIGS. 53 and 55A), and saved user input for the current context of the application (e.g. maintained to LBX history). Another embodiment incorporates the system and methods of U.S. Pat. No. 5,692,143 ("Method and system for recalling desktop states in a data processing system", Johnson et al) to maintain application contexts;

Application active (e.g. \appLive): same as application in use above;

Application context active (e.g. \appLiveCtxt): same as application context in use above;

Current MS system date/time (e.g. \timestamp); preferably resolves to the MS date/time from the MS system clock interface for a current date/time stamp;

Particular LBX maintained statistical value (e.g. \st_statisticName wherein statisticName is the name of the statistic): preferably resolves to the referenced statistic name of statistics 14. There are potentially hundreds of statistics maintained for the MS;

MS ID of MS hosting atomic term (e.g. \thisMS; alternate embodiments support ID and IDType grammar rules): preferably resolves to the identifier of the MS where the atomic term is being resolved, and the context of use may cause a conversion, broader consideration, or use of an associated ID (i.e. for different IDType) for proper MS ID IDType comparison;

Appropriate MS ID type/format of MS hosting atomic term (e.g. \thisMS_type): preferably resolves to the identifier of the MS in the specified explicit type (i.e. "type") where the atomic term is being resolved (e.g. \thisMS_email, \thisMS_userid, \thisMS_serno, etc (e.g. using a field appfld.source.id.X));

Most current WDR field of \thisMS (e.g. \fldname); fldname is identical to WDR in-process field names which can reference any field, subfield, set, subset, or derived data/information of a WDR in process (i.e. _fldname, _I_fldname, _O_fldname). The difference here is that the most recent WDR (e.g. of queue 22) for \thisMS is accessed, rather than an in-process WDR. The leading backslash indicates to reference the most recent WDR for \thisMS. In some embodiments, the WTV is accessed and an error is produced for \fldname references that reference stale WDR information; and/or A partial or full address (e.g. \zip__75022=zip code, \state_TX=two character state code, \country_US=character(s) country code, \mapsco__458A=MAPSCO grid identifier, \address__"1201 Jamison St., Valley View, Minn." wherein double quotes can be used to handle significant blank characters, \city_Dallas=city, etc). There are many embodiments for syntactically representing a partial or full address, and ambiguous, un-resolvable, or incomparable addresses should cause an error (e.g. force False condition to prevent charter action from running, and log to history) for notifying of an issue; Atomic terms are automatically converted in context of condition/expression use when performing a compare (e.g. it is legal to compare an address with a latitude and longitude and range thereof to see if the same location). Appropriate geocoding and location conversion data or tables is used. Preferably, the conversion data is locally maintained, but may be accessed remotely when needed, for example through a propagated service.

Preferably, a convenient syntax using a leading escape character refers to an atomic term (e.g. \loc_my=My MS location). An atomic term may be clarified with a time specification (period(s), specific time(s), etc) by qualifying an appropriate atomic term, for example with a "(spec)" syntax after the backslash (e.g. \(20090220100239.8)st_OSThreads for total number of threads executing in MS at particular time). When the time specification portion of an atomic term is determined to not be appropriate, preferably an error is presented to prevent the invalid qualified atomic term from being used. Alternatively, an error can be provided when processed, or the time specification may be ignored. When used in conjunction with other conditions, an "atomic term" provides extraordinary location based expressions. Other Grammar 3068_a_, and 3068_b_ Data construct, atomic elements are described here: "Any WDR 1100 field, or any subset thereof" is self explanatory; "Any Application data field, or any subset thereof" is an atomic element for any semaphore, data, database data, file/directory data, or any other referenceable data of a specified application; "number" is any number; "text string" is any text string; "True" is a Boolean representing true; "False" is a Boolean representing false; "numeric(s)" is a set (may be ordered (e.g. left to right)) of formatted binary data; "typed memory pointer" is a pointer to memory location (of any memory or storage described for FIG. 1D) containing a known type of data and length; "typed memory value" is a memory location (of any memory or storage described for FIG. 1D) containing a known type of data and length; "typed file path" is a file path location (of any memory or storage described for FIG. 1D) containing a known type of data and length; "typed file path and offset" is a file path location (of any memory or storage described for FIG. 1D) and an offset therein (e.g. byte offset) for pointing to a known type of data and length; "typed DB qualifier" is a database data path (of any memory or storage described for FIG. 1D) for qualifying data in a database (e.g. with a query, with a identity/table/row/column qualifier, or other reasonable database qualifying method).

WDRTerm provides means for setting up conditions on any WDR 1100 field or subfield that is detected for WDR(s):

Inserted by FIG. 2F processing (e.g. received from other MSs, or created by the hosting MS); and/or Sent/communicated outbound from a MS; and/or Received/communicated inbound to a MS.

An alternate BNF grammar embodiment qualifies the "Any WDR 1100 field, or any subset thereof" atomic element with an operator for which of the three MS code paths to check WDR field conditions (e.g. Operators of "OUTBOUND" and "INBOUND", denoted by perhaps a syntactical O and I, respectively). Absence of an operator can be assumed for checking WDRs on FIG. 2F insert processing. Such embodiments result in a BNF grammar WDRTerm definition of:

WDRTerm=[WDRTermOp] "Any WDR 1100 field, or any subset thereof" [Description] [History]|VarInstantiate WDRTermOp="inbound"|"outbound"

Yet another embodiment will allow combination operators for qualifying a combination of any three MS code paths to check.

AppTerm provides means for setting up conditions on data of any application of an MS, for example to trigger an action based on a particular active call during whereabouts processing. A few AppTerm examples are any of the following:

- Any phone application data record data (e.g. incoming call(s), outgoing call(s), active call(s), caller id, call attributes, etc)
- Any email/SMS message application data record data (e.g. mailbox attributes, message last sent, message last received, message being composed, last type of message sent, last type of message received, attribute(s) of any message(s), etc)
- Any address book application data record data (e.g. group(s) defined, friend(s) defined, entry(s) defined and any data associated with those, etc)
- Any calendar application data record data (e.g. last scheduled entry, most recently removed entry, number of entries per time period(s), last scheduled event attendee(s), number of scheduled events for specified qualifier, next forthcoming appointment, etc)
- Any map application data record data; and/or
- Any other application data record data of a MS.

PointSet provides means for defining a set of points for a variety of applications. Points of a PointSet may describe a single point (i.e. one point record), a line segment, a polygon, a point with radius, a two dimensional area, a three dimensional area in space, or any other multi-dimensional region. An optional dimension qualifier (i.e. 2D or 3D; default=2D) specifies whether or not the set of points are for two dimensional space or three dimensional space. Alternate embodiments support higher dimensions for certain applications, for example to describe another universe dimension as straightforward as time, or a situational location (e.g. extending a point record definition), or as complex as a string theory dimension. If point records can be specified for the dimension qualifier(s), any dimension(s) may be used. An optional point type qualifier (i.e. Geo, Cartesian or Polar; default=Geo) specifies the type of points in the set wherein each point is a record of appropriate data. Alternate embodiments support other type qualifiers for certain applications, for example to describe lines, arcs, or regions containing an infinite set of points (e.g. extending a point record definition for describing a collection of points), or to specify different models (e.g. Geodetic, Polar Cylindrical, Polar Spherical, etc). When a "text string" format is used for the PointSet, it is preferably null terminated (e.g. null included in ANSI encoded length) and an appropriate syntax is used to identify point record components (e.g. comma), and to delimit point records (e.g. semicolon) in the set of points (e.g. "+33.27,−97.4;+34.1,−97.3;+34.13,−97.12;" specifies a two dimensional Geo polygon PointSet (i.e. point records of latitude,longitude decimal degree pairs) and "3D/Geo; +33.27,−97.4,4500F;+34.1,−97.3,1L;+34.13,−97.21,2000Y;+34.3,−97.1,2000Y;+34.89,−97.08,2000Y" specifies a three dimensional Geo polygon solid region in space PointSet (i.e. point records of latitude, longitude,altitude decimal degree tuples)).

A single point may have an additional specification for a radius around the point (e.g. "+33.27,−97.4,R1000F") as indicated with the "R" prefix. The R prefix solves ambiguity between a 3D specification for a point at an elevation/altitude and a point with a spherical radius. Syntactical unit qualifiers may, or may not, be supported for any of the point record components (e.g. 4500F=4500 feet, 1L=1 Mile, 2000Y=2000 Yards, latitude/longitude specified in desirable way (e.g. 33.27N,97.4W;), etc). A numeric(s) (binary) format will cause each PointSet record component to occupy an anticipated number of bits/bytes along with an overall length describing all bytes of the PointSet. Numeric indication (e.g. bit(s)) is used to indicate whether a radius is specified for a single point versus an altitude/elevation in a 3D specification. In some embodiments, the user interfaces to convenient units which are converted to a standard form of units in the PointSet and converted when necessary.

The Data construct is used for either string or binary specification. In a preferred embodiment string syntax, a Point Set is encoded like an atomic term with a leading backslash and anticipated characters (e.g. \PS_. . . ) for proper conditional evaluation (e.g. at blocks 6122 and 6154). In another embodiment, a Point Set is treated as a "special term" (e.g. atomic term) and gets replaced (e.g. at blocks 6118 and 6152) with an internalized form for proper condition evaluation. In some embodiments, a Point Set is encoded with a unique syntax (e.g. PS: . . . ). A PointSet is useful for specifying two dimensional polygons, or point delimited regions in three dimensional space. Well known polygon implementation techniques may affect how to internalize a PointSet specification, for example to determine whether or not a MS is relevant (i.e. in, not in, at, not at, was in, was not in, was at, was not at, in vicinity of, not in vicinity of, newly in vicinity of, not newly in vicinity of, recently in vicinity of, not recently in vicinity of, departed from, not departed from, recently departed from, not recently departed from, etc) using processing of "Determining If A Point Lies On The Interior Of A Polygon" published November 1987 by Paul Bourke.

With reference now to FIG. 90A, depicted is a flowchart for a preferred embodiment for processing the request to specify a map term. A map term is a name which resolves to a point, point and radius or set of points (see PointSet described above). There are a variety of MS applications which can be used to create a point, point and radius, or PointSet thereby preventing a tedious user encoding. The user sets up a map term with a convenient user interface (e.g. FIG. 90A), gives it a name, and can then reference it in expressions by the map term name (using a ? prefix to the name to indicate its is a map term). Otherwise, the user may be faced with specifying a challenging encoding (e.g. complex text string) for an expression.

Map term specification processing begins at block 9002 upon a user action to create a map term, continues to block 9004 where the user is prompted for how to specify the map term, and waits at block 9006 for the user's response. Block 9006 continues to block 9008 when the user responds.

If block 9008 determines the user selected to use the user's current location (i.e. current location of the MS), then block 9010 accesses queue 22 for a current and most recent MS location and makes a point (may make point and default radius, or set of points in alternate embodiments) using the location information if a reasonably current location was found. Thereafter, if block 9012 determines there was no current (i.e. reasonably recent) location found, then block 9014 provides the user with an error, block 9016 appropriately terminates the FIG. 90A user interface, and FIG. 90A processing terminates at block 9018. Block 9014 preferably requires the user to acknowledge the error. If block 9012 determines a current location was found, then block 9020 prompts the user for a radius, and block 9022 interfaces with the user for specification of a valid radius. A three dimensional embodiment additionally prompts the user for 2D or 3D for the point set to be created, and the user additionally specifies 2D or 3D at block 9022. When the user specifies the requested information, block 9024 automatically generates a unique map term name (e.g. mt_035), preferably using a round-robin sequence number and ensuring no current map terms currently have the name in use, and then continues to block 9026 where the map term information is saved to a new record 9080. Block 9026 saves the user specifications as a PointSet which can be referenced by the name. The user may have specified only a single point for a location, or a single point and radius around it for a location when arriving to block 9024 from block 9022. Block 9026 continues to block 9028.

With reference now to FIG. 90B, depicted is a preferred embodiment of a Map Term Data Record (MTDR) 9080 for discussing operations of the present disclosure, derived from the grammar of FIGS. 30A through 30E. A MTDR 9080 contains a name field 9080*a* which can be referenced in an expression or condition with a "?" prefix (e.g. ?mt_035), a type field 9080*b* which indicates the type of PointSet for interpretation of field 9080*c*, and the PointSet encoding field 9080*c*. Encoding field 9080*c* may be a binary or textual encoding depending on the embodiment. A description field 9080*d* may be included for user documentation of the map term. A MS may enforce a maximum number of records 9080. Records 9080 may be used to save waypoints as well known to those skilled in the art.

With reference back to FIG. 90A, block 9028 accesses all records 9080, continues to block 9030 for producing a scrollable list of map term names, and continues to block 9032 where processing waits for a user action in response to the map term list. Block 9032 continues to block 9034 upon a user action. Block 9030 preferably highlights a newly created map term from FIG. 90A processing up to the point of processing at block 9030. The user can highlight which map term to perform an action on as handled by block 9052.

If block 9034 determines the user selected to delete a particular map term from the list, then block 9036 deletes it from records 9080 and processing continues back to block 9028 for a list refresh. If block 9034 determines the user did not select to delete a particular map term, processing continues to block 9038. If block 9038 determines the user selected to rename a particular map term from the list (e.g. the newly created map term with a default name), then block 9040 interfaces with the user for a valid name and saves it to the particular record 9080 field 9080*a*. A valid name is unique in all records 9080. The name should be descriptive so that the user knows why the map term was created. Thereafter, processing continues back to block 9028 for a list refresh. If block 9038 determines the user did not select to rename a particular map term, processing continues to block 9042. If block 9042 determines the user selected to add a new map term, then processing continues back to block 9004, otherwise processing continues to block 9044. If block 9044 determines the user selected to display a particular map term on a map, then block 9046 displays the map term on a suitable map, block 9048 interfaces with the user for navigating and interfacing to the map, and processing continues back to block 9028 for a list refresh when the user is done at block 9048. The map term location information of the particular record 9080 is preferably used at block 9046 to provide a best map at a best zoom. Block 9048 preferably supports any kind of map navigation (like blocks 9062 through 9068). If block 9044 determines the user did not select to display a map term on a map, processing continues to block 9050. If block 9050 determines the user selected to exit list processing, then block 9016 terminates user interface processing, and FIG. 90A processing terminates at block 9018, otherwise block 9052 handles any other user actions detected at block 9032 and continues back to block 9032.

Referring back to block 9008, if it is determined that the user did not select to specify a map term with the current MS location, processing continues to block 9060. If block 9060 determines the user selected to use a map to specify a map term, then processing continues to block 9062, otherwise any other actions leaving block 9006 are handled appropriately at block 9074 and processing continues back to block 9006.

In some embodiments, an action for processing blocks 9028 through 9050 is available to the user at block 9004 and detected at block 9006 for being processed (e.g. at block 9074). This allows a user to browse map terms without creating one first. While a map term should be named for being easy to remember, there may be many defined. Maintaining existing map terms may be provided through a separate user interface, or a user may use a database query manager in a SQL database embodiment to manage MTDRs 9080 directly. In another embodiment, a user may specify at block 9004 to use the last known location or current location of another MS for map term creation, in which case processing at block 9074 includes continuing to a block 9010A (like block 9010) for access to queue 22 (and/or possibly LBX history 30 in some embodiments) for another MS location. Processing already described for block 9010 would involve another MS location in the block 9010A with processing of blocks 9012 and thereafter for that location. Other embodiments allow a user to specify any search criteria at block 9004 for finding any WDR at queue 22 and/or from history 30, regardless of the originator, to then have the associated location used for specifying a map term.

Block 9062 establishes latitude and longitude landmarks upon the selected map (map is defaulted on first encounter of block 9062 from block 9060) and associates corresponding x and y pixels, preferably with the leftmost bottom corner at the Cartesian coordinate system origin, for example the leftmost top corner (e.g. (x,y)=(0,Y)), rightmost top corner (e.g. (x,y)=(X,Y)), rightmost bottom corner (e.g. (x,y)=(X,0)), and leftmost bottom corner (e.g. (x,y)=(0,0)) of a rectangular map graphic. Other embodiments may use a different system. Each map graphic is preferably stored with the 4 corners being a well known latitude and longitude, along with a vertical and horizontal curvature factor. In cases where humans have traveled to other planets (also moons or any other body in space) with MS use, associated planetary maps (parent map selectable) will contain applicable latitude and longitude coordinates with relative curvature factors depending on the particular body in space.

The map graphics are preferably small enough in area, yet large enough in display, to avoid too much skewing of latitude and longitude calculations based on points a user selects in the map relative to the four well known corners. Latitude and longitude considers earth curvature wherein one embodiment of map selection may not. However, other embodiments will use curvature factors relative to where map points are selected.

Thereafter, block 9064 presents the selected (or defaulted) map to the user, and the user navigates the map and interfaces to the map at block 9066 until a certain action is invoked. Thereafter, if block 9068 determines the user selected to display a descending geographical map (map that drills down into a territory on the current map), or ascending map (map that covers more territory including the current map), then processing continues back to block 9062 for the desired map initialization. Convenient map hierarchy traversal is provided for zooming in or out. Panning may also be provided at block 9066 which will access other maps for display before returning to block 9062 for subsequent processing, as determined by action subsequent to block 9066. The user can traverse the map hierarchy in any direction for location specification.

If block 9068 determines the user did want a descending or ascending map, then processing continues to block 9070. If block 9070 determines the user completed location specifications (e.g. a point, circle (point with radius), rectangle, or polygon), then processing continues to block 9072, otherwise processing continues back to block 9066. Block 9066 is intended for the user to specify a point, circle (point with radius), rectangle, or polygon on a map for convenient automated location information specification. The user makes selections with a cursor for a point, circle, rectangle, or polygon. Block 9072 scales the specified points (point, center of circle (with radius), 4 rectangle corners, polygon sequence of points) according to pixel locations for deriving the corresponding latitude(s) and longitude(s) as determined relative to the map well known 4 corners and any curvature skewing information. Processing then continues to block 9024 already described above. When block 9024/9026 is arrived to after block 9072, block 9026 saves the user specifications to a new record 9080 for a point, point with radius, or set of points (i.e. PointSet).

Alternate embodiments to FIGS. 90A and 90B will enable specification of certain atomic terms for convenient reference by name, for example situational locations. In such embodiments, the user specifies additional information (e.g. conditions) to clarify the location to a situational location. In other embodiments, any Expression, Condition, Term, or other charter portion may be specified with a map term so that the reference (e.g. ?refname) is a way to substitute an encoding that was conveniently configured as a map term in advance of use. For example, a user may select on a map another MS user and have any of a variety of associated terms (e.g. atomic term \locByID_Larry) conveniently specified for the map term which corresponds to the MS user. Various mathematical models can be used to achieve high accuracy on deriving user selected pixels on maps to precise location coordinates. Some map embodiments of blocks 9062 through 9068 will support selecting, panning, and navigating MAPSCO maps, zip codes, and other map means for specifying a location. In such embodiments, an appropriate PointSet is generated for the user's specification.

With reference now to FIG. 30E, grammar 3068*b* completes definition of grammar rules for charters. The Invocation construct elaborates to any of a variety of executables, with or without parameters, including Dynamic Link Library (DLL) interfaces (e.g. function), post-compile linked interfaces (e.g. function), scripts, batch files, command files, or any other executable. The invoked interface should return a value, preferably a Boolean (true or false), otherwise one will preferably be determined or defaulted for it. The "optional params" may include any variety of the Parameter construct, and may also include any special term or expression that evaluates to: a) any variety of the Parameter construct; or b) any variety of data acceptable to the invoked interface. The "optional params" may also include other invocations which provide at least one return data providing a data parameter to the hosting Invocation. This allows nesting of invocations for bubbling back parameter values to the next outermost invocation. Expressions in "optional parameters" may include arithmetic operations, string operations, formatting operations, or any other operation involving evaluation to at least one value, preferably with a stack based elaboration.

The Op construct contains atomic elements (called atomic operators) for certain operators used for terms to specify conditions. In syntactical embodiments, each atomic operator may be clarified with a not modifier (i.e. !). For example, "equal to" is "=" and "not equal to" is "!=". Those skilled in the art recognize which atomic operator is contextually appropriate for which applicable terms (see BNF grammar 3068*a*). There are many reasonable syntactical embodiments for atomic operators, with at least:

| | |
|---|---|
| =: | equal to; |
| !=: | not equal to; |
| >: | greater than; |
| !>: | not greater than; |
| >=: | greater than or equal to; |
| !>=: | not greater than or equal to; |
| <: | less than; |
| !<: | not less than; |
| <=: | less than or equal to; |
| !<=: | not less than or equal to; |
| ^: | in (e.g. LHS point in a RHS polygon); |
| !^: | not in (e.g. LHS line outside of a RHS circle); |
| ^^: | was in (e.g. searches queue 22 and LBX history 30); |
| !^^: | was not in; |
| >>: | Term LHS (Left Hand Side) "contains" Term RHS (Right Hand Side); |
| <<: | Term RHS "contains" Term LHS; |
| @: | at (e.g. location at a specified address (e.g. city, state, zip code, country, MAPSCO grid reference, etc, combinations thereof)); |
| !@: | not at; |
| @@: | was at; |
| !@@: | was not at; |
| #: | cached index; |
| <E>: | East of (LHS east of RHS (e.g. PointSet specified for point, line, area, polygon, circle, etc)); |
| <W>: | West of; |
| <N>: | North of; |
| <S>: | South of; |
| $(range): | in vicinity of (range = distance (e.g. 10 F = 10 Feet)); |
| !$(range): | not in vicinity of (range = distance (e.g. 1L = 1 Mile)); |
| >$(range): | newly in vicinity of (causes access to only queue 22 so pruning of queue 22 enforces a system default time window; Alternatively, if queue 22 maintains a long trailing history, then a system default trailing time can be assumed when searching queue 22 to check if MS detected prior to be within range); |
| !>$(range): | not newly in vicinity of; |
| (spec)>$(range): | newly in vicinity of according to a time specification (i.e. time spec can be period (e.g. 15 M = in last 15 Minutes), or specific time); |
| (spec)!>$(range): | not newly in vicinity of according to a time specification; |

-continued

| | |
|---|---|
| $>(range): | departed from vicinity of (causes access to only queue 22 so pruning of queue 22 enforces a system default time window; Alternatively, if queue 22 maintains a long trailing history, then a system default trailing time can be assumed when searching queue 22 to check if MS detected prior to be within range); |
| !$>(range): | not departed from vicinity of; |
| (spec)$(range): | recently in vicinity of (spec = time period (e.g. 8 H = in last 8 hours), or specific time); |
| (spec)!$(range): | not recently in vicinity of (spec = time period (e.g. 8 H = in last 8 hours), or specific time); |
| (spec)$$(range): | recently departed from vicinity of (spec = time period (e.g. 5 M = in last 5 minutes), or specific time); and |
| (spec)!$$(range): | not recently departed from vicinity of (spec = time period (e.g. 5 M = in last 5 minutes), or specific time). |

Values for "range" above can be any reasonable units such as 3K implies 3 Kilometers, 3M implies 3 Meters, 3L implies 3 Miles, 3F implies 3 Feet, etc. Values for "spec" above can be any reasonable time specification as described for TimeSpec (FIG. 30B) and/or using qualifiers like "range" such as 3W implies 3 Weeks, 3D implies 3 Days, 3H implies 3 Hours, 3M implies 3 Minutes, etc.

Resolving of conditions using atomic operators involves evaluating conditions (BNF grammar constructs) and additionally accessing similar data of LBX history 30 in some preferred embodiments. Atomic operator validation errors should result when inappropriately used.

Example syntactical embodiments of the "atomic profile match operator" atomic element include:

| | |
|---|---|
| #: | number of profile matches; |
| %: | percentage of profile matches; |
| #(tag(s)): | number of profile tag section matches (e.g. #(interests) compares one profile tag "interests"); and |
| %(tag(s)): | percentage of profile tag section matches (e.g. % (interest, activities) compares a plurality of profile tags ("interests" and "activities"). |

In one embodiment of profiles maintained at MSs, a LBX singles/dating application maintains a MS profile for user's interests, tastes, likes, dislikes, etc. The ProfileMatch operators enable comparing user profiles under a variety of conditions, for example to cause an action of alerting a user that a person of interest is nearby. See FIGS. 77 and 78 for other profile information. In some embodiments, the qualifiers of the atomic profile match operators can be results of an evaluated expression. For example, an expression which results in a string can be used to specify a tag list (e.g. ("interests," && *var2) wherein the var2 variable elaborates to a text string). In another example, the file for comparison may be the result of an expression (e.g. *path && *fname). Terms of Expressions/Conditions can themselves be expressions which elaborate to a particular term for contextual use. A preferred embodiment performs automatic typecasting when necessary to promote comparisons of condition Terms. Appropriate operator precedence, and use of parenthesis to override implemented precedence, is incorporated to ensure no ambiguity across expressions and operators.

Atomic operators are context sensitive and take on their meaning in context to terms (i.e. BNF Grammar Term) they are used with (e.g. atomic operator evaluation may include access to local or remote geo-coding conversion tables to resolve locations in appropriate terms or format for comparisons and other processing). An alternate embodiment incorporates new appropriate atomic operators for use as CondOp operators, provided the result of the condition is a Boolean (e.g. term>=term results in a true or false). Also, while a syntactical form of parenthesis is not explicitly shown in the BNF grammar, the Conditions constructs explicitly defines how to make complex expressions with multiple conditions. Using parenthesis is one preferred syntactical embodiment for carrying out the Conditions construct. The intention of the BNF grammar is to end up with any reasonable conditional expression for evaluating to a Boolean True or False. Complex expression embodiments involving any conceivable operators, terms, order of evaluation (e.g. as syntactically represented with parentheses), and other arithmetic similarities, are certainly within the spirit and scope of this disclosure.

BNF grammar terms are to cover expressions containing conditions involving WDR fields (WDRTerm), situational locations, geofences (i.e. a geographic boundary identifying an area or space), two dimensional and three dimensional areas, two dimensional and three dimensional space, point in an area, point in space, movement amounts, movement distances, movement activity, MS IDs, MS group IDs, current mobile locations, past mobile locations, future mobile locations, nearness, distantness, newly near, newly afar, activities at locations (past, present, future), applications and context thereof in use at locations (past, present, future), etc. There are many various embodiments for specific supported operators used to provide interpretation to the terms. Certain operators, terms, and processing is presented for explanation and is in no way meant to limit the many other expression (BNF Grammar Expression) embodiments carrying the spirit of the disclosure.

Terms (e.g. atomic terms, WDRTerms, etc) may or may not be case sensitive, and term case sensitivity may or may not be enforced. Regardless, users can be consistent when using in environments where they are not enforced to be case sensitive.

The Command construct elaborates to atomic commands. The "atomic command" atomic element is a list of supported commands such as those found in the column headings of FIGS. 31A through 31E table (see discussions for FIGS. 31A through 31E). There are many commands, some popular commands being shown. The Operand construct elaborates to atomic operands. The "atomic operand" atomic element is a list of supported operands (data processing system objects) such as those found in the row headings of FIGS. 31A through 31E table (see discussions for FIGS. 31A through 31E). There are many operands, some popular operands being shown. For each command and operand combination, there may be anticipated parameters. The command and operand pair indicates how to interpret and process the parameters.

Constructs (e.g. Parameter, WDRTerm, AppTerm, Value, PointSet, Data, etc) are appropriately interpreted within context of their usage. An optional time specification is made available when specifying charters (i.e. when charter is in effect), expressions (i.e. a plurality of conditions (e.g. with Conditions within Expressions construct)), a particular condition (e.g. with Condition elaborations within Condition construct), and actions (e.g. with Action elaborations within Action construct). One embodiment supports multiple Host specifications for a particular action. Some embodiments allow an Invocation to include invocations as parameters in a recursive manner so as to "bubble up" a resulting Boolean (e.g. fcn1(2, fcn2(p1, x, 45), 10) such that fcn2 may also have invocations for parameters. The conventional inside out evaluation order is implemented. Other embodiments support various types of invocations which contribute to the overall invocation result returned.

In alternate embodiments, an action can return a return code, for example to convey success, failure, or some other value(s) back to the point of performing the action. Such embodiments may support nesting of returned values in BNF grammar Parameters so as to affect the overall processing of actions. For example: action1(parameter(s), . . . , action2( . . . parameters . . . ), . . . parameter(s)), and action2 may include returning value(s) from its parameters (which are actions).

Wildcarding is of value for broader specifications in a single specification. Wildcards may be used for BNF grammar specification wherever possible to broaden the scope of a particular specification (e.g. Condition, TimeSpec, etc).

FIGS. 31A through 31E depict a preferred embodiment set of command and operand candidates for Action Data Records (ADRs) (e.g. FIG. 37B) facilitating the discussing of associated parameters (e.g. FIG. 37C) of the ADRs of the present disclosure. Preferably, there are grammar specification privileges for governing every aspect of charters. Commands (atomic commands), operands (atomic operands), operators (atomic operators and CondOp), parameters (Parameter), associated conditions (Condition and CondOp), terms (Term), actions thereof (Action), associated data types thereof (Data), affected identities thereof (ID/IDType), and any other charter specification aspect, can be controlled by grammar specification privileges.

Figure 32A:
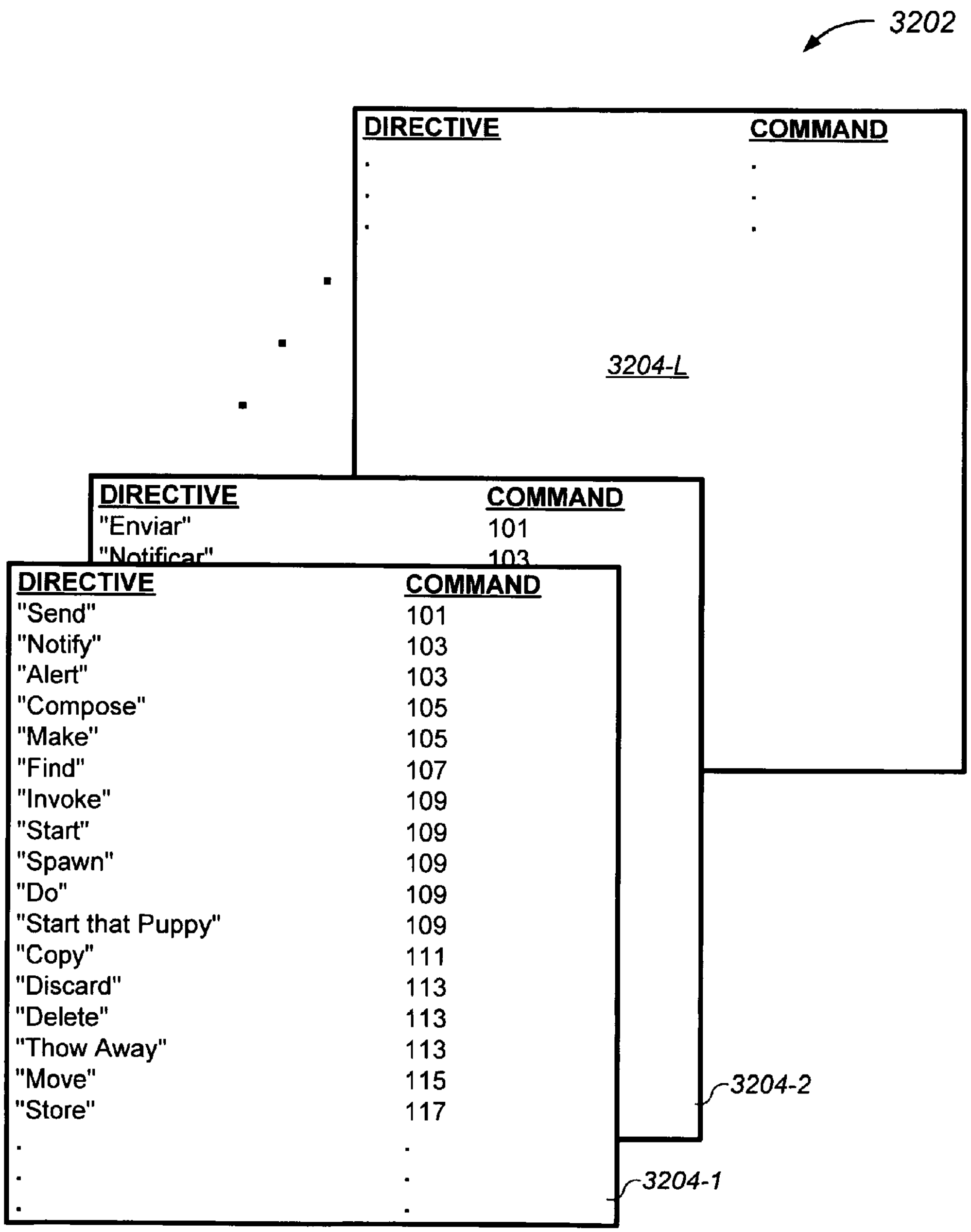
FIG. 32A depicts a preferred embodiment of a National Language Support (NLS) directive command cross reference.
Figure 32B:
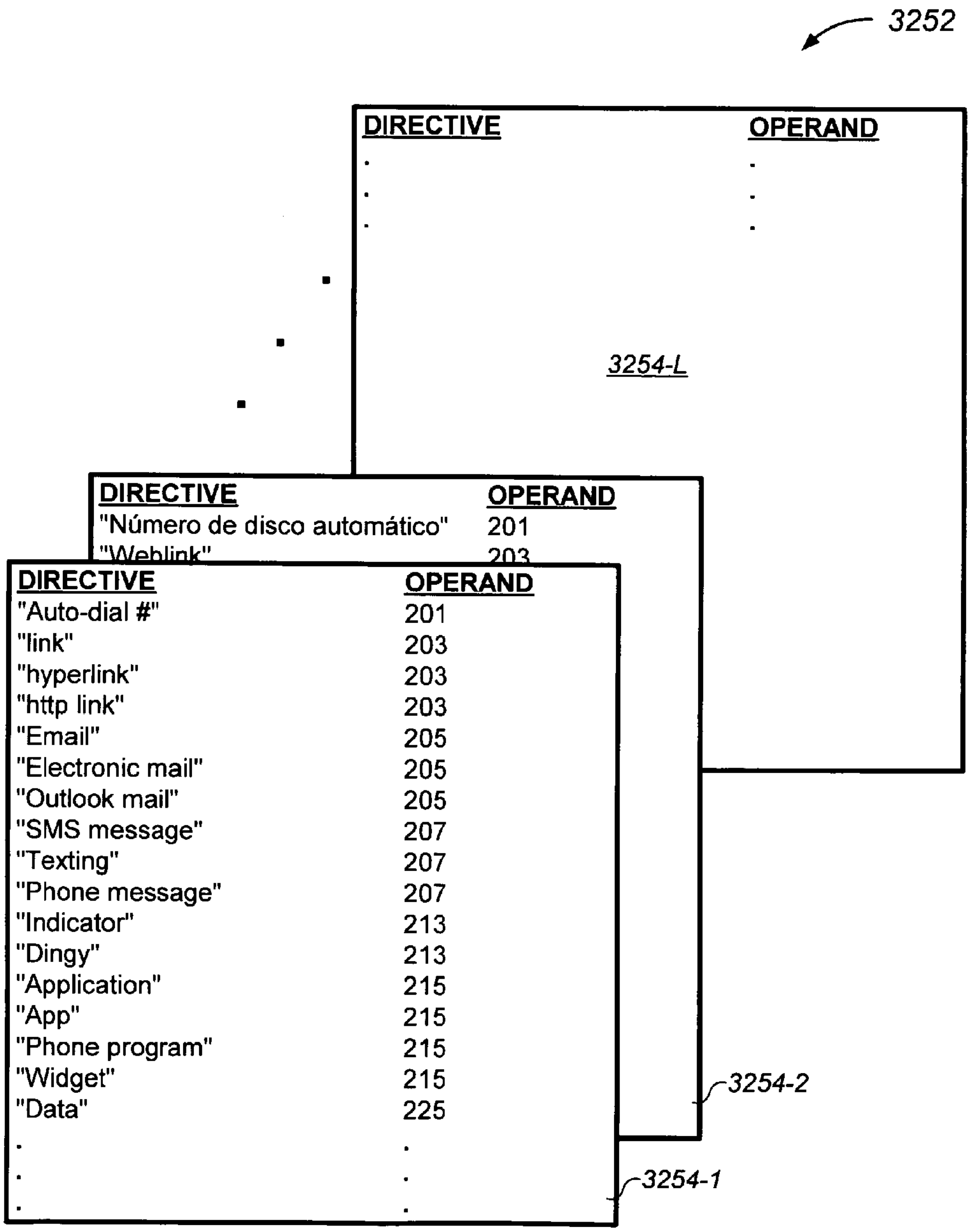
FIG. 32B depicts a preferred embodiment of a NLS directive operand cross reference.

An "atomic command" is an enumeration shown in column headings (i.e. 101, 103, . . . etc) with an implied command meaning. FIG. 32A shows what meaning is provided to some of the "atomic command" enumerations shown (also see FIG. 34D). A plurality of commands can map to a single command meaning. This supports different words/phrases (e.g. spoken in a voice command interface) to produce the same resulting command so that different people specify commands with terminology, language, or (written) form they prefer. An "atomic operand" is an enumeration shown in row headings (i.e. 201, 203, . . . etc) with an implied operand meaning. FIG. 32B shows what meaning is provided to some of the "atomic operand" enumerations shown (also see FIG. 34D). A plurality of operands can map to a single operand meaning. This supports different words/phrases (e.g. spoken in a voice command interface) to produce the same resulting operand so that different people specify operands with terminology, language, or (written) form they prefer. Operands are also referred to as data processing system objects because they are common objects associated with data processing systems. FIGS. 31A through 31E demonstrate anticipated parameters for each combination of a command with an operand. There are potentially hundreds (or more) of commands and operands. This disclosure would be extremely large to cover all the different commands, operands, and parameters that may be reasonable. Only some examples with a small number of parameters are demonstrated in FIGS. 31A through 31E to facilitate discussions. There can be a large number of parameters for a command and operand pair. Each parameter, as shown by the BNF grammar, may be in many forms. In one preferred embodiment (not shown in BNF grammar), the Parameter construct of FIG. 30E may also elaborate to a ParameterExpression which is any valid arithmetic expression that elaborates to one of the Parameter constructs (RHS) shown in the BNF Grammar. This allows specifying expressions which can be evaluated at run time for dynamically evaluating to a parameter for processing.

The combination of a command with an operand, and its set of associated parameters, form an action in the present disclosure, relative the BNF grammar discussed above. Some of the command/operand combinations overlap, or intersect, in functionality and/or parameters. In general, if parameters are not found (null specified) for an anticipated parameter position, a default is assumed (e.g. parameters of 5,7 indicates three (3) parameters of 5, use default or ignore, and 7). Operands and parameters are preferably determined at executable code run time when referenced/accessed so that the underlying values may dynamically change as needed at executable code run time in the same references. For example, a variable set with constructs which elaborates to a command, operand, and parameters, can be instantiated in different contexts for completely different results. Also, a programming language enhanced with new syntax (e.g. as described in FIG. 51) may include a loop for processing a single construct which causes completely different results at each loop iteration. The operand or parameter specification itself may be for a static value or dynamic value as determined by the reference used. An alternate embodiment elaborates values like a preprocessed macro ahead of time prior to processing for static command, operand, and parameter values. Combinations described by FIGS. 31A through 31E are discussed with flowcharts. In another embodiment, substitution (like parameter substitution discussed above for FIG. 30A) can be used for replacing parameters at the time of invocation. In any case, Parameters can contain values which are static or dynamically changing up to the time of reference.

Parameters of atomic command processing will evaluate/resolve/elaborate to an appropriate data type and form for processing which is described by the #B matrices below (e.g. FIG. 63B is the matrix for describing atomic send command processing). The #B descriptions provide the guide for the data types and forms supportable for the parameters. For example, an email body parameter may be a string, a file containing text, a variable which resolves to a string or file, etc. The BNF grammar is intended to be fully exploited in the many possible embodiments used for each parameter.

FIG. 32A depicts a preferred embodiment of a National Language Support (NLS) directive command cross reference. Each "atomic command" has at least one associated directive, and in many cases a plurality of directives. Depending on an MS embodiment, a user may interact with the MS with typed text, voice control, selected graphical user interface text, symbols, or objects, or some other form of communication between the user and the MS. A directive (FIG. 32A command and FIG. 32B operand) embodies the MS recognized communication by the user. Directives can be a word, a phrase, a symbol, a set of symbols, something spoken, something displayed, or any other form of communications between a user and the MS. It is advantageous for a plurality of command directives mapped to an "atomic command" so a MS user is not limited with having to know the one command to operate the MS. The MS should cater to everyone with all anticipated user input from a diverse set of users which may be used to specify a command. This maximizes MS usability. The command directive is input to the MS for translating to the "atomic command". One preferred embodiment of a directive command cross reference 3202 maps a textual directive (Directive column) to a command ("atomic command" of Command column). In this embodiment, a user types a directive or speaks a directive to a voice control interface (ultimately converted to text). Cross reference 3204-1 demonstrates an English language cross reference. Preferably, there is a cross reference for every language supported by the MS, for example, a Spanish cross reference 3204-2, a Russian cross reference, a Chinese cross reference, and a cross reference for the L languages supported by the MS (i.e. 3204-L being the final cross referenced language). Single byte character (e.g. Latin-1) and double byte character (e.g. Asian Pacific) encodings are supported. Commands disclosed are intended to be user friendly through support of native language, slang, or preferred command annunciation (e.g. in a voice control interface). FIG. 34D enumerates some commands which may appear in a command cross reference 3202.

FIG. 32B depicts a preferred embodiment of a NLS directive operand cross reference. Each "atomic operand" has at least one associated directive, and in many cases a plurality of directives. It is advantageous for a plurality of operand directives mapped to an "atomic operand" so a MS user is not limited with having to know the one operand to operate the MS. The MS should cater to everyone with all anticipated user input from a diverse set of users which may be used to specify an operand. The directive is input to the MS for translating to the "atomic operand". One preferred embodiment of a directive operand cross reference 3252 maps a textual directive (Directive column) to an operand ("atomic operand" of Operand column). In this embodiment, a user types a directive or speaks a directive to a voice control interface (ultimately converted to text). Cross reference 3254-1 demonstrates an English language cross reference. Preferably, there is a cross reference for every language supported by the MS, for example, a Spanish cross reference 3254-2, a Russian cross reference, a Chinese cross reference, and a cross reference for the L languages supported by the MS (i.e. 3254-L being the final cross referenced language). Operands disclosed are intended to be user friendly through support of native language, slang, or preferred command annunciation (e.g. in a voice control interface). FIG. 34D enumerates some operands which may appear in an operand cross reference 3252.

In the preferred embodiment, Parameters are contextually determined upon the MS recognizing user directives, depending on the context in use at the time. In another embodiment, Parameters will also have directive mappings for being interpreted for MS processing, analogously to FIGS. 32A and 32B.

FIG. 33A depicts a preferred embodiment American National Standards Institute (ANSI) X.409 encoding of the BNF grammar of FIGS. 30A through 30B for variables, variable instantiations and common grammar for BNF grammars of permissions and charters. A one superscript (1) is shown in constructs which may not be necessary in implementations since the next subordinate token can be parsed and deciphered on its own merit relative the overall length of the datastream containing the subordinate tokens. For example, a plural Variables construct and token is not necessary since an overall datastream length can be provided which contains sibling Variable constructs that can be parsed. Preferably, Variable assignments include the X.409 datastreams for the constructs or atomic elements as described in FIGS. 33A through 33C. FIG. 33B depicts a preferred embodiment ANSI X.409 encoding of the BNF grammar of FIG. 30C for permissions 10 and groups, and FIG. 33C depicts a preferred embodiment ANSI X.409 encoding of the BNF grammar of FIGS. 30D through 30E for charters 12. All of the X.409 encodings are preferably used to communicate information of permissions 10 and/or charters 12 (e.g. the BNF grammar constructs) between systems.

The preferred embodiment of a WDRTerm is a system well known WDR field/subfield variable name with two (2) leading underscore characters (e.g. source code references of: __confidence refers to a confidence value of a WDR confidence field 1100*d;* __msyaw refers to a yaw value of a WDR location reference field 1100*f* MS yaw subfield). Some useful examples using a WDRTerm include:

- A specified MS, or group, WDR 1100 field (e.g. condition using field 1100*a* of (_I_msid !=George) & (_I_msid-^ChurchGroup));
- A specified MS, or group, WDR 1100 field or subfield value;
- A current MS, or group, WDR 1100 field (e.g. condition using field 1100*a* of (__msid !=George) & (__msid-^ChurchGroup)); and
- A current MS, or group, WDR 1100 field or subfield value;

The preferred embodiment of an AppTerm is a system well known application variable name with a registered prefix, followed by an underscore character, followed by the variable name in context for the particular application (e.g. source code references of: M_source refers to a source email address of a received email for the registered MS email application which was registered with a "M" prefix; B_srchcriteria refers to the most recently specified search criteria used in the MS internet browser application which was registered with a "B" prefix). The preferred WDRTerm and AppTerm syntaxes provide user specifiable programmatic variable references for expressions/conditions to cause certain actions. The double underscore variable references refer to a WDR in process (e.g. inserted to queue 22 (__fldname), inbound to MS (_I_fldname), outbound from MS (_O_fldname)) at the particular MS. There is a system well known double underscore variable name for every field and subfield of a WDR as disclosed herein. The registered prefix name variable references always refer to data applicable to an object in process (e.g. specific data for: email just sent, email just received, phone call underway, phone call last made, phone call just received, calendar entry last posted, etc) within an application of the particular MS. There is a system well known underscore variable name for each exposed application data, and registering the prefix correlates the variable name to a particular MS application (see FIG. 53).

An "atomic term" is another special type of user specifiable programmatic variable reference for expressions/conditions to cause certain actions. The preferred embodiment of an atomic term is a system well known variable name with a leading backslash (\) escape character (e.g. source code references of: \loc_my refers to the most recent MS location; \timestamp refers to the current MS system date/time in a date/time stamp format). There can be atomic terms to facilitate expression/condition specifications, some of which were described above.

FIGS. 33A through 33C demonstrate using the BNF grammar of FIGS. 30A through 30E to define an unambiguous datastream encoding which can be communicated between systems (e.g. MSs, or service and MS). Similarly, those skilled in the art recognize how to define a set of XML tags and relationships from the BNF grammar of FIGS. 30A through 30E for communicating an unambiguous XML datastream encoding which can be communicated between systems. For example, X.409 encoded tokens are translatable to XML tags that have scope between delimiters, and have attributes for those tags. The XML author may improve efficiency by making some constructs, which are subordinate to other constructs, into attributes (e.g. ID and IDType constructs as attributes to a Grantor and/or Grantee XML tag). The XML author may also decide to have some XML tags self contained (e.g. <History creatordt=" . . . " creatorid=" . . . " . . . /> or provide nesting, for example to accommodate an unpredictable plurality of subordinate items (e.g. <Permission . . . > . . . <Grantor userid="joe"/> . . . <Grantee groupid="dept1"/> . . . <Grantee groupid="dept43"/> . . . <Grantee groupid="dept9870"/> . . . </Permission>). It is a straightforward matter for translating the BNF grammar of FIGS. 30A through 30E into an efficiently processed XML encoding for communications between MSs. An appropriate XML header will identify the datastream (and version) to the receiving system (like HTML, WML, etc) and the receiving system (e.g. MS) will process accordingly using the present disclosure guide for proper parsing to internalize to a suitable processable format (e.g. FIGS. 34A through 34G, FIGS. 35A through 37C, FIG. 52, or another suitable format per disclosure). See FIG. 54 for one example of an XML encoding.

FIGS. 34A through 34G depict preferred embodiment C programming source code header file contents, derived from the grammar of FIGS. 30A through 30E. A C example was selected so that the embodiment was purely data in nature. Another preferred embodiment utilizes an Object Oriented Programming (OOP) source code (e.g. C++, C#, or Java), but those examples mix data and object code in defining relationships. A preferred object oriented architecture would create objects for BNF grammar constructs that contain applicable processing data and code. The object hierarchy would then equate to construct relationships. Nevertheless, a purely data form of source code is demonstrated by FIGS. 34A through 34G (and FIG. 52) to facilitate understanding. Those skilled in the relevant arts know how to embody the BNF grammar of FIG. 30A through 30E in a particular programming source code. The C programming source code may be used for:

- Parsing, processing, and/or internalizing a derivative X.409 encoding of the BNF grammar of FIGS. 30A through 30E (e.g. FIGS. 33A through 33C);
- Parsing, processing, and/or internalizing a derivative XML encoding of the BNF grammar of FIGS. 30A through 30E;
- Compiler parsing, processing, and/or internalizing of a programming language processing form of the BNF grammar of FIGS. 30A through 30E;
- Interpreter parsing, processing, and/or internalizing of a programming language processing form of the BNF grammar of FIGS. 30A through 30E;
- Internalized representation of permissions 10, groups (data 8) and/or charters 12 to data processing system memory;
- Internalized representation of permissions 10, groups (data 8) and/or charters 12 to data processing system storage; and/or
- Parsing, processing, and/or internalizing any particular derivative form, or subset, of the BNF grammar of FIGS. 30A through 30E.

Source code header information is well understood by those skilled in the relevant art in light of the BNF grammar disclosed. The example does make certain assumptions which are easily altered depending on specificities of a derivative form, or subset, of the grammar of FIGS. 30A through 30E. Assumptions are easily modified for "good" implementations through modification of isolated constants in the header file:

- TLV tokens are assumed to occupy 2 bytes in length;
- TLV length bytes are assumed to occupy 4 bytes in length;
- Some of the header definitions may be used solely for processing X.409 encodings in which case they can be removed depending on the context of source code use;
- Data structure linkage;
- Data structure form without affecting objective semantics;
- Data structure field definitions;
- Unsigned character type is used for data that can be a typecast byte stream, and pointers to unsigned character is used for pointers to data that can be typecast;
- Source code syntax; or
- Other aspects of the source code which are adaptable to a particular derivative form, or subset, of the BNF grammar of FIGS. 30A through 30E.

The TIMESPEC structure of FIG. 34E preferably utilizes a well performing Julian date/time format. Julian date/time formats allows using unambiguous floating point numbers for date/time stamps. This provides maximum performance for storage, database queries, and data manipulation. Open ended periods of time use an unspecified start, or end date/time stamp, as appropriate (i.e. DT_NOENDSPEC or DT_NOSTARTSPEC). A known implemented minimal time granulation used in Julian date/time stamps can be decrement or incremented by one (1) as appropriate to provide a non-inclusive date/time stamp period delimiter in a range specification (e.g. >date/time stamp).

The VAR structure provides a pointer to a datastream which can be typecast (if applicable in embodiments which elaborate the variable prior to being instantiated, or referenced), or later processed. Variables are preferably not elaborated/evaluated until instantiated or referenced. For example, the variable assigned value(s) which are parsed from an encoding remains unprocessed (e.g. stays in X.409 datastream encoded form) until instantiated. Enough space is dynamically allocated for the value(s) (e.g. per length of variable's value(s)) (e.g. X.409 encoding form), the variable's value (e.g. X.409 encoding) is copied to the allocated space, and the v.value pointer is set to the start of the allocated space. The v.value pointer will be used later when the variable is instantiated (to then parse and process the variable value(s) when at the context they are instantiated).

An alternate embodiment to the PERMISSION structure of FIG. 34F may not require the grantor fields (e.g. grantor, gortype) since the data processing system owning the data may only maintain permissions for the grantor (e.g. the MS user). An alternate embodiment to the CHARTER structure of FIG. 34G may not require the grantee fields (e.g. grantee, geetype) or the grantor fields (e.g. grantor, gortype) since the data processing system owning the data may only maintain charters for that user at his MS. Another embodiment to the CHARTER structure of FIG. 34G may not require the grantor fields (e.g. grantor, gortype) since the data processing system owning the data may be self explanatory for the Grantor identity (e.g. charters used at MS of Grantor).

Some figures illustrate data records (FIGS. 35A through 37D, FIG. 53, FIG. 76C, FIG. 85A, 86C, FIG. 90B, FIGS. 91A and 91B, FIG. 95A, FIG. 97B, or any other disclosed data records), for example maintained in an SQL database, or maintained in record form by a data processing system. Depending on the embodiment, some data record fields disclosed may be multi-part fields (i.e. have sub-fields), fixed length records, varying length records, or a combination with field(s) in one form or another. Some data record field embodiments will use anticipated fixed length record positions for subfields that can contain useful data, or a null value (e.g. −1). Other embodiments may use varying length fields depending on the number of sub-fields to be populated, or may use varying length fields and/or sub-fields which have tags indicating their presence. Other embodiments will define additional data record fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments). Fields described may be converted: a) prior to storing; or b) after accessing; or c) by storage interface processing; for standardized processing. Fields described may not be converted (i.e. used as is).

Figure 35A:
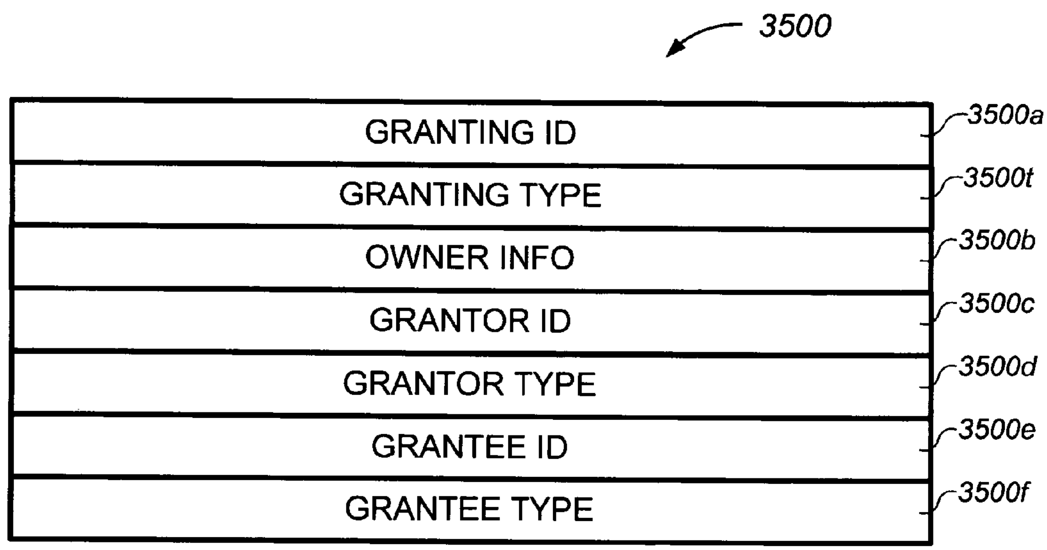
FIG. 35A depicts a preferred embodiment of a Granting Data Record (GDR) for discussing operations of the present disclosure, derived from the grammar of FIGS. 30A through 30E.

FIG. 35A depicts a preferred embodiment of a Granting Data Record (GDR) 3500 for discussing operations of the present disclosure, derived from the grammar of FIGS. 30A through 30E. A GDR 3500 is the main data record for defining a granting of permissions 10, or charters 12. A granting identifier (granting ID) field 3500*a* contains a unique number generated for the record 3500 to distinguish it from all other records 3500 maintained. For example, in a Microsoft SQL Server deployment, granting ID field 3500*a* is a primary key column. Another embodiment uses the correlation generation techniques described above to ensure a unique number is generated. Field 3500*a* facilitates well performing searches, updates, deletes, and other I/O (input/output) interfaces. Field 3500*a* may match (for joining) a field 3520*b* or 3700*a*, depending on the GDR type (GDR type field 3500*t* with value of Permission or Charter). A granting type field 3500*t* distinguishes the type of GDR (Permission or Charter) for: a Grantor granting all privileges to a Grantee (i.e. Permission (e.g. ID field 3500*a* unique across GDRs but not used to join other data records)), a Grantor granting specific privilege(s) and/or grants of privileges (permission(s)) to a Grantee ((i.e. Permission (e.g. ascendant ID field 3520*b* value in ID field 3500*a*)), and a Grantor granting enablement of a charter to a Grantee ((i.e. Charter (e.g. charter ID field 3700*a* value in ID field 3500*a*)). An owner information (info) field 3500*b* provides who the owner (creator and/or maintainer) is of the GDR 3500. Depending on embodiments, or how the GDR 3500 was created, owner info field 3500*b* may contain data like the ID and type pair as defined for fields 3500*c* and 3500*d*, or fields 3500*e* and 3500*f*. An alternate embodiment to owner info field 3500*b* is two (2) fields: owner info ID field 3500*b*-1 and owner info type field 3500*b*-2. Yet another embodiment removes field 3500*b* because MS user (e.g. the grantor) information is understood to be the owner of the GDR 3500. The owner field 3500*b* may become important in user impersonation. A grantor ID field 3500*c* provides an identifier of the granting grantor and a grantor type field 3500*d* provides the type of the grantor ID field 3500*c*. A grantee ID field 3500*e* provides an identifier of the granting grantee and a grantee type field 3500*f* provides the type of the grantee ID field 3500*e*.

Figure 35B:
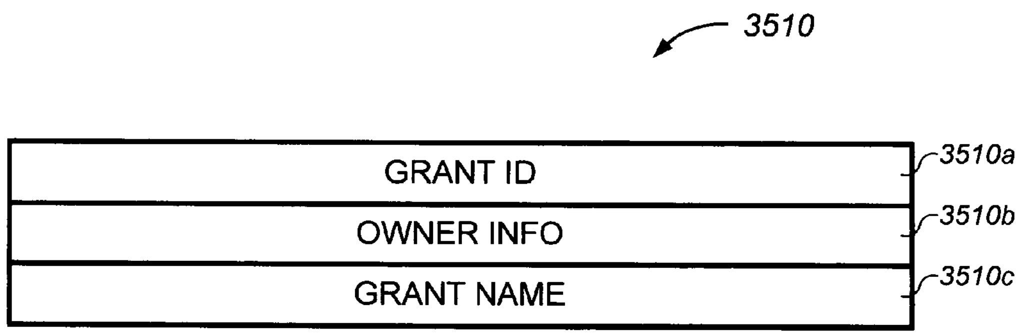
FIG. 35B depicts a preferred embodiment of a Grant Data Record (GRTDR) for discussing operations of the present disclosure, derived from the grammar of FIGS. 30A through 30E.

FIG. 35B depicts a preferred embodiment of a Grant Data Record (GRTDR) 3510 for discussing operations of the present disclosure, derived from the grammar of FIGS. 30A through 30E. A GRTDR 3510 is the main data record for defining a grant. A grant identifier (grant ID) field 3510*a* contains a unique number generated for the record 3510 to distinguish it from all other records 3510 maintained. Field 3510*a* is to be maintained similarly to as described for field 3500*a* (e.g. primary key column, correlation generation, facilitates well performing I/O). An owner information (info) field 3510*b* provides who the owner (creator and/or maintainer) is of the GRTDR 3510. Field 3510*b* is to be maintained similarly to as described for field 3500*b* (e.g. embodiments for like ID and type pair, two (2) fields, removal because MS user information understood to be owner). A grant name field 3510*c* provides the name of the grant.

Figure 35C:
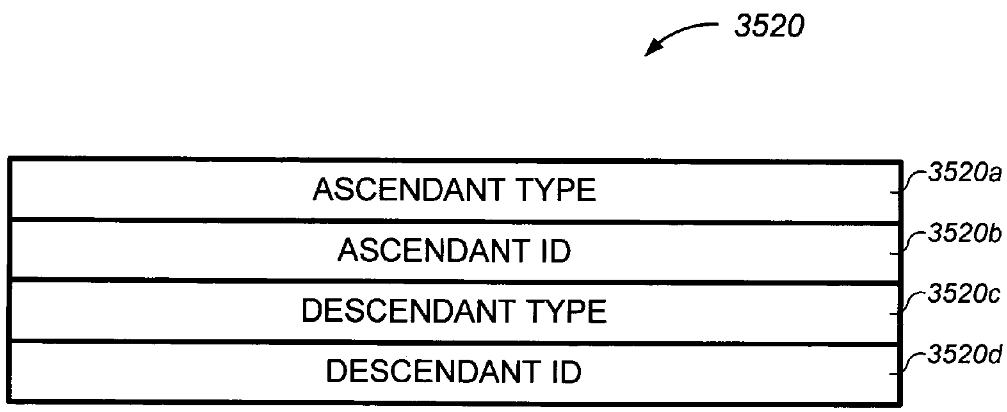
FIG. 35C depicts a preferred embodiment of a Generic Assignment Data Record (GADR) for discussing operations of the present disclosure, derived from the grammar of FIGS. 30A through 30E.

FIG. 35C depicts a preferred embodiment of a Generic Assignment Data Record (GADR) 3520 for discussing operations of the present disclosure, derived from the grammar of FIGS. 30A through 30E. A GADR 3520 is the main data record for defining an assignment relationship between data records. The assignment relationship can be viewed as a container relationship, or a parent-child relationship such as in a tree structure. An ascendant type field 3520*a* contains the type of parent (or container) data record in the relationship. Values maintained to field 3520*a* include Permission, Grant, or Group. An ascendant ID field 3520*b* provides an identifier of the parent (or container) data record in the relationship (used for joining data records in queries in an SQL embodiment). Values maintained to field 3520*b* include values of granting ID field 3500*a*, grant ID field 3510*a*, or group ID field 3540*a*. A descendant type field 3520*c* contains the type of child (or contained) data record in the relationship. Values maintained to field 3520*c* include Grant, Privilege, Group, or ID Type (e.g. Grantor or Grantee ID type). A descendant ID field 3520*d* provides an identifier of the child (or contained) data record in the relationship (used in joining data records in queries in an SQL embodiment). Values maintained to field 3520*d* include values of grant ID field 3510*a*, privilege identifier (i.e. "atomic privilege for assignment"), group ID field 3540*a*, ID field 3500*c*, or ID field 3500*e*. Records 3520 (key for list below is descendant first; ascendant last (i.e. " . . . in a . . . ")) are used to represent:

- Grant(s) (the descendants) in a permission (the ascendant);
- Privilege(s) in a permission;
- Grant(s) in a grant (e.g. tree structure of grant names);
- Privilege(s) in a grant;
- Groups(s) in a group (e.g. tree structure of group names);
- IDs in a group (e.g. group of grantors and/or grantees); and/or
- Other parent/child relationships of data records disclosed.

An alternate embodiment will define distinct record definitions (e.g. 3520-*z*) for any subset of relationships described to prevent data access performance of one relationship from impacting performance accesses of another relationship maintained. For example, in an SQL embodiment, there may be two (2) tables: one for handling three (3) of the relationships described, and another for handling all other relationships described. In another SQL example, six (6) distinct tables could be defined when there are only six (6) relationships to maintain. Each of the distinct tables could have only two (2) fields defined for the relationship (i.e. ascendant ID and descendant ID). The type fields may not be required since it would be known that each table handles a single type of relationship (i.e. GADR-grant-to-permission, GADR-privilege-to-permission, GADR-grant-to-grant, GADR-privilege-to-grant, GADR-group-to-group and GADR-ID-to-group). Performance considerations may provide good reason to separate out relationships maintained to distinct tables (or records).

Figure 35D:
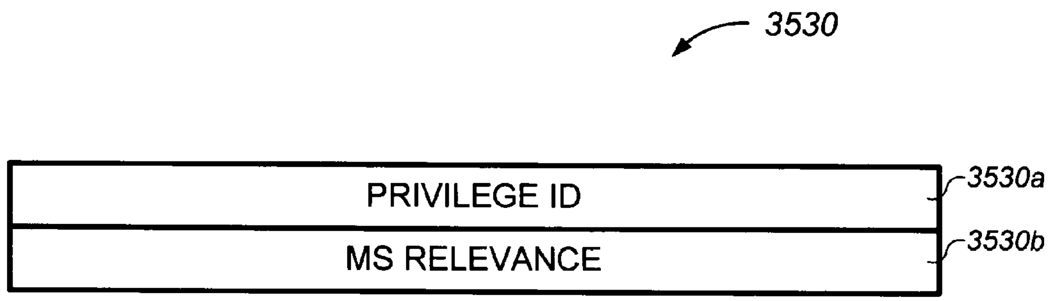
FIG. 35D depicts a preferred embodiment of a Privilege Data Record (PDR) for discussing operations of the present disclosure, derived from the grammar of FIGS. 30A through 30E.

FIG. 35D depicts a preferred embodiment of a Privilege Data Record (PDR) 3530 for discussing operations of the present disclosure, derived from the grammar of FIGS. 30A through 30E. A privilege ID field 3530*a* contains a unique number associated to a supported privilege (i.e. "atomic privilege for assignment"). Field 3530*a* associates a MS relevance field 3530*b* to a particular privilege for indicating the MS types which apply to a privilege. There should not be more than one PDR 3530 at a MS with matching fields 3530*a* since the associated field 3530*b* defines the MS types which are relevant for that privilege. If there is no record 3530 for a particular privilege, then it is preferably assumed that all MSs participate with the privilege. MS relevance field 3530*b* is preferably a bit mask accommodating all anticipated MS types, such that a 1 in a predefined MS type bit position indicates the MS participates with the privilege, and a 0 in a predefined MS type bit position indicates the MS does not participate with the privilege. Optimally, there are no records 3530 at a MS which implies all supported privileges interoperate fully with other MSs according to the present disclosure.

Figure 35E:
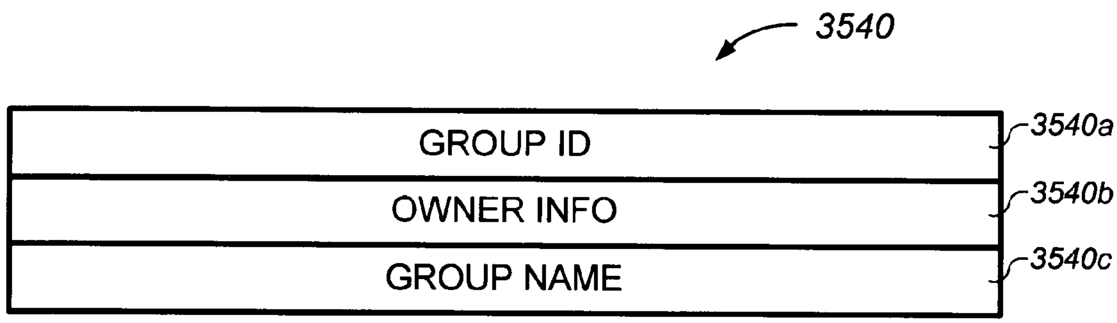
FIG. 35E depicts a preferred embodiment of a Group Data Record (GRPDR) for discussing operations of the present disclosure, derived from the grammar of FIGS. 30A through 30E.

FIG. 35E depicts a preferred embodiment of a Group Data Record (GRPDR) 3540 for discussing operations of the present disclosure, derived from the grammar of FIGS. 30A through 30E. A GRPDR 3540 is the main data record for defining a group. A group identifier (group ID) field 3540*a* contains a unique number generated for the record 3540 to distinguish it from all other records 3540 maintained. Field 3540*a* is to be maintained similarly to as described for field 3500*a* (e.g. primary key column, correlation generation, facilitates well performing I/O). An owner information (info) field 3540*b* provides who the owner (creator and/or maintainer) is of the GRPDR 3540. Field 3540*b* is to be maintained similarly to as described for field 3500*b* (e.g. embodiments for like ID and type pair, two (2) fields, removal because MS user information understood to be owner). A group name field 3540*c* provides the name of the group.

Figure 36A:
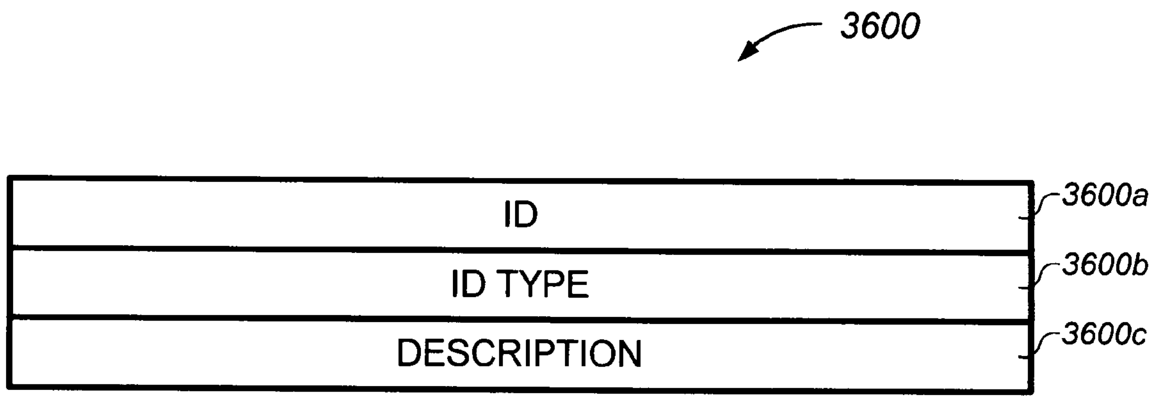
FIG. 36A depicts a preferred embodiment of a Description Data Record (DDR) for discussing operations of the present disclosure, derived from the grammar of FIGS. 30A through 30E.

FIG. 36A depicts a preferred embodiment of a Description Data Record (DDR) 3600 for discussing operations of the present disclosure, derived from the grammar of FIGS. 30A through 30E. A DDR 3600 is for maintaining description information for certain constructs. A description ID field 3600*a* provides an identifier of the data record associated to the description field 3600*c*. For example, values maintained to field 3600*a* are used for joining data records in queries in an SQL embodiment. Values maintained to field 3600*a* include values of granting ID field 3500*a*, grant ID field 3510*a*, a privilege ID (e.g. as candidate to field 3530*a*), ID field 3500*c*, ID field 3500*e*, charter ID field 3700*a*, action ID field 3750*a*, parameter ID field 3775*a*, group ID field 3540*a*, or any other ID field for associating a description. A description type field 3600*b* contains the type of data record to be associated (e.g. joined) to the description field 3600*c*. Values maintained to field 3600*b* include Permission, Grant, Privilege, ID, Charter, Action, Parameter, or Group in accordance with a value of field 3600*a*. Field 3600*c* contains a description, for example a user defined text string, to be associated to the data described by fields 3600*a* and 3600*b*. Alternate embodiments will move the description data to a new field of the data record being associated to, or distinct record definitions 3600-*y* may be defined for any subset of relationship/association to prevent data access performance of one relationship/association from impacting performance accesses of another relationship/association maintained (analogous to distinct embodiments for GADR 3520).

Figure 36B:
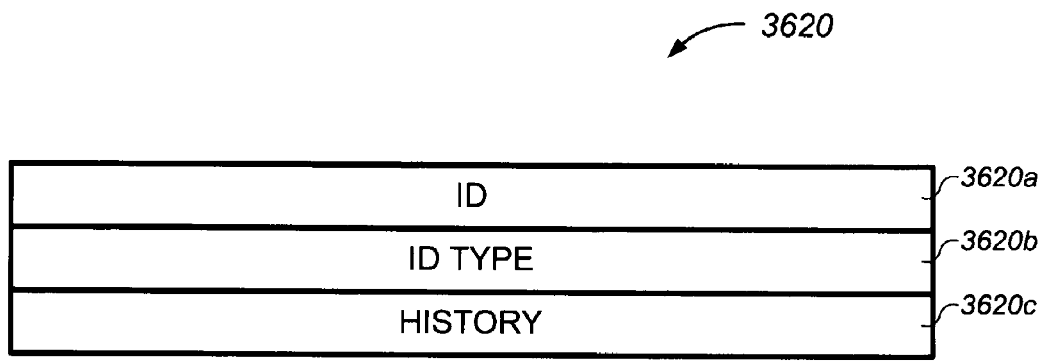
FIG. 36B depicts a preferred embodiment of a History Data Record (HDR) for discussing operations of the present disclosure, derived from the grammar of FIGS. 30A through 30E.

FIG. 36B depicts a preferred embodiment of a History Data Record (HDR) 3620 for discussing operations of the present disclosure, derived from the grammar of FIGS. 30A through 30E. A HDR 3620 is for maintaining history information for certain constructs. A history ID field 3620*a* provides an identifier of the data record associated to the history field 3620*c*. For example, values maintained to field 3620*a* are used for joining data records in queries in an SQL embodiment. Values maintained to field 3620*a* include values of granting ID field 3500*a*, grant ID field 3510*a*, a privilege ID (e.g. as candidate to field 3530*a*), ID field 3500*c*, ID field 3500*e*, charter ID field 3700*a*, action ID field 3750*a*, parameter ID field 3775*a*, group ID field 3540*a*, or any other ID field for associating a history. A history type field 3620*b* contains the type of data record to be associated (e.g. joined) to the history field 3620*c*. Values maintained to field 3620*b* include Permission, Grant, Privilege, ID, Charter, Action, Parameter, or Group in accordance with a value of field 3620*a*. Field 3620*c* contains a history, for example a collection of fields for describing the creation and/or maintenance of data associated to the data described by fields 3620*a* and 3620*b*. Alternate embodiments will move the history data to new field(s) of the data record being associated to, or distinct record definitions 3620-*x* may be defined for any subset of relationship/association to prevent data access performance of one relationship/association from impacting performance accesses of another relationship/association maintained (analogous to distinct embodiments for GADR 3520). Another embodiment may break out subfields of field 3620*c* to fields 3620*c*-1, 3620*c*-2, 3620*c*-3, etc. for individual fields accesses (e.g. see CreatorInfo and ModifierInfo sub-fields).

Figure 36C:
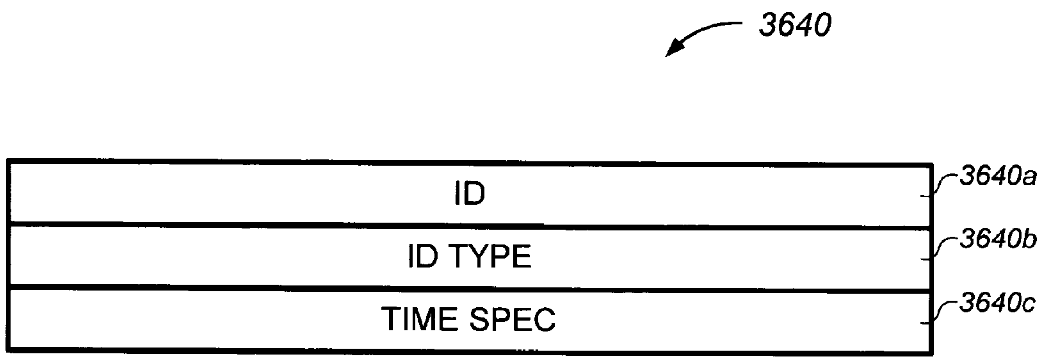
FIG. 36C depicts a preferred embodiment of a Time specification Data Record (TDR) for discussing operations of the present disclosure, derived from the grammar of FIGS. 30A through 30E.

FIG. 36C depicts a preferred embodiment of a Time specification Data Record (TDR) 3640 for discussing operations of the present disclosure, derived from the grammar of FIGS. 30A through 30E. A TDR 3640 is for maintaining time spec information for certain constructs. A time spec ID field 3640*a* provides an identifier of the data record associated to the time spec field 3640*c*. For example, values maintained to field 3640*a* are used for joining data records in queries in an SQL embodiment. Values maintained to field 3640*a* include values of granting ID field 3500*a*, grant ID field 3510*a*, a privilege ID (e.g. as candidate to field 3530*a*), charter ID field 3700*a*, action ID field 3750*a*, or any other ID field for associating a time spec (specification). A time spec type field 3640*b* contains the type of data record to be associated (e.g. joined) to the time spec field 3640*c*. Values maintained to field 3640*b* include Permission, Grant, Privilege, Charter, or Action in accordance with a value of field 3640*a*. Field 3640*c* contains a time spec, for example one or more fields for describing the date/time(s) for which the data associated to the data described by fields 3640*a* and 3640*b* is applicable, enabled, or active. For example, permissions can be granted as enabled for particular time period(s). Alternate embodiments will move the time spec data to new field(s) of the data record being associated to, or distinct record definitions 3640-*w* may be defined for any subset of relationship/association to prevent data access performance of one relationship/association from impacting performance accesses of another relationship/association maintained (analogous to distinct embodiments for GADR 3520). Another embodiment may break out subfields of field 3640*c* to fields 3640*c*-1, 3640*c*-2, 3620*c*-3, etc. Field 3640*c* (and sub-fields if embodiment applicable) can describe specific date/time(s) or date/time period(s). Yet another embodiment, maintains plural TDRs for a data record of ID field 3640*a*. Field 3640*c* is intended to qualify the associated data of fields 3640*a* and 3640*b* for being applicable, enabled, or active at future time(s), past time(s), or current time(s). An alternate embodiment of field 3640*c* may include a special tense qualifier as defined below:

- Past ("P"): indicates that the associated data record (e.g. permission, charter, action, etc) applies to all WDR information maintained to LBX History 30;
- Self Past ("SP"): indicates that the associated data record (e.g. permission, charter, action, etc) applies to only WDR information maintained to LBX History 30 for the MS owning history 30;
- Other Past ("OP"): indicates that the associated data record (e.g. permission, charter, action, etc) applies to only WDR information maintained to LBX History 30 for all MSs other than the one owning history 30;

Future ("F"): indicates that the associated data record (e.g. permission, charter, action, etc) applies to all WDRs created/received (e.g. inserted to queue 22) in the future by the MS (i.e. after configuration made);

Self Future ("SF"): indicates that the associated data record (e.g. permission, charter, action, etc) applies to all WDRs created in the future (e.g. inserted to queue 22) by the MS for its own whereabouts (i.e. after configuration made);

Other Future ("OF"): indicates that the associated data record (e.g. permission, charter, action, etc) applies to all WDRs received (e.g. inserted to queue 22) in the future by the MS for other MS whereabouts (i.e. after configuration made);

All ("A"): indicates that the associated data record (e.g. permission, charter, action, etc) applies to all WDRs created/received in the future by the MS (i.e. after configuration made) and WDRs already contained by queue 22;

Self All ("SA"): indicates that the associated data record (e.g. permission, charter, action, etc) applies to all WDRs created in the future by the MS for its own whereabouts (i.e. after configuration made) and WDRs already contained by queue 22 for the MS;

Other All ("OA"): indicates that the associated data record (e.g. permission, charter, action, etc) applies to all WDRs received in the future by the MS for other MS whereabouts (i.e. after configuration made) and WDRs already contained by queue 22 for other MSs; and/or Any combination of above (e.g. "SF,OA,OP")

A syntactical equivalent may be specified for subsequent internalization causing configurations to immediately take effect. Another embodiment qualifies which set of MSs to apply time specification for, but this is already accomplished below in the preferred embodiment through specifications of conditions. Yet another embodiment provides an additional qualifier specification for which WDRs to apply the time specification: WDRs maintained by the MS (e.g., to queue 22), inbound WDRs as communicated to the MS, outbound WDRs as communicated from the MS; for enabling applying of time specifications before and/or after privileges/charters are applied to WDRs with respect to an MS. Blocks 3970, 4670 and 4470 may be amended to include processing for immediately checking historical information maintained at the MS which privileges/charters have relevance, for example after specifying a historical time specification or special tense qualifier.

Figure 36D:
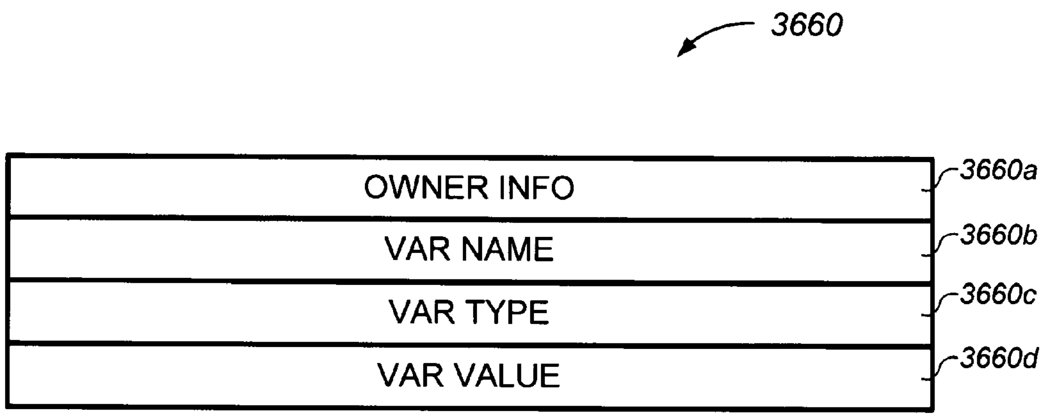
FIG. 36D depicts a preferred embodiment of a Variable Data Record (VDR) for discussing operations of the present disclosure, derived from the grammar of FIGS. 30A through 30E.

FIG. 36D depicts a preferred embodiment of a Variable Data Record (VDR) 3660 for discussing operations of the present disclosure, derived from the grammar of FIGS. 30A through 30E. A VDR 3660 contains variable information that may be instantiated. A record 3660 provides a single place to define an encoding that is instantiated in many places. One advantage is for saving on encoding sizes. An owner information (info) field 3660*a* provides who the owner (creator and/or maintainer) is of the VDR 3660. Field 3660*a* is to be maintained similarly to as described for field 3500*b* (e.g. embodiments for like ID and type pair, two (2) fields, removal because grantor information understood to be owner). Variable name field 3660*b* contains the variable name string, variable type field 3660*c* contains the variable type, and variable value field 3660*d* contains the value(s) of the variable for instantiation. Preferably, field 3660*d* remains in its original form until the variable is instantiated. For example, in an X.409 embodiment, field 3660*d* contains the X.409 encoding datastream (including the overall length for starting bytes) of the variable value. In a programming source, XML, or other syntactical embodiment (of grammar of FIGS. 30A through 30F), field 3660*d* contains the unelaborated syntax in text form for later processing (e.g. stack processing). Thus, field 3660*d* may be a BLOB (Binary Large Object) or text. Preferably, field 3660*d* is not elaborated, or internalized, until instantiated. When a variable is set to another variable name, field 3660*d* preferably contains the variable name and the variable type field 3660*c* indicates Variable. Preferably, field 3660*d* handles varying length data well for performance, or an alternate embodiment will provide additional VDR field(s) to facilitate performance.

Figure 37A:
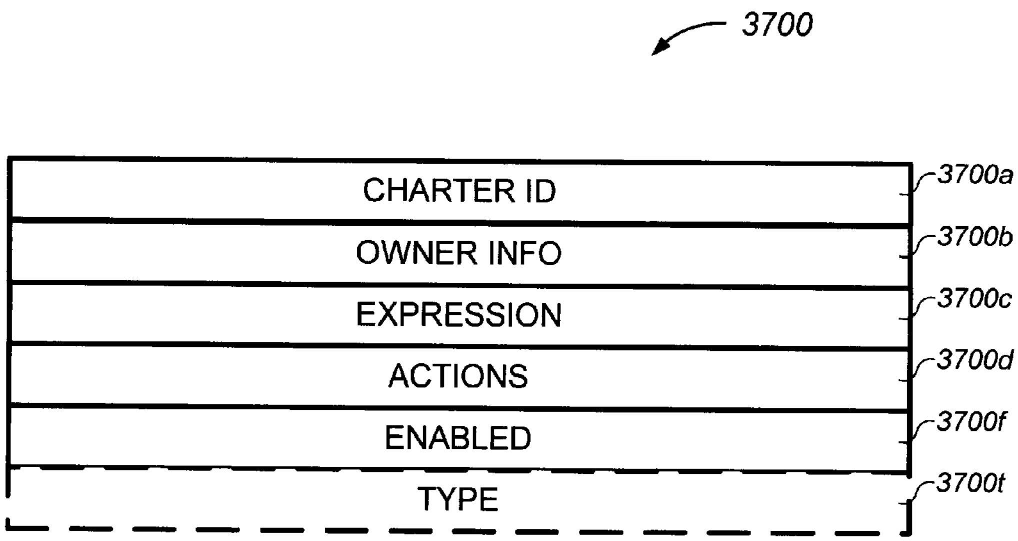
FIG. 37A depicts a preferred embodiment of a Charter Data Record (CDR) for discussing operations of the present disclosure, derived from the grammar of FIGS. 30A through 30E.

FIG. 37A depicts a preferred embodiment of a Charter Data Record (CDR) 3700 for discussing operations of the present disclosure, derived from the grammar of FIGS. 30A through 30E. A CDR 3700 is the main data record for defining a charter. A charter identifier (charter ID) field 3700*a* contains a unique number generated for the record 3700 to distinguish it from all other records 3700 maintained. Field 3700*a* is to be maintained similarly to as described for field 3500*a* (e.g. primary key column, correlation generation, facilitates well performing I/O). Grantee and Grantor information is linked to with a match of field 3700*a* with 3500*a*. An alternate embodiment will require no Grantee or Grantor specification for a charter (e.g. charters maintained and used at the user's MS). An owner information (info) field 3700*b* provides who the owner (creator and/or maintainer) is of the CDR 3700. Field 3700*b* is to be maintained similarly to as described for field 3500*b* (e.g. embodiments for like ID and type pair, two (2) fields, removal because MS user information understood to be owner). An expression field 3700*c* contains the expression containing one or more conditions for when to perform action(s) of action field 3700*d*. Preferably, field 3700*c* remains in its original form until the conditions are to be elaborated, processed, or internalized. For example, in one X.409 embodiment, field 3700*c* contains the X.409 encoding datastream for the entire Expression TLV. In the preferred syntactical embodiment (programming source code, XML encoding, programming source code enhancement, or the like), field 3700*c* contains the unelaborated syntax in text form for later stack processing of conditions and terms and their subordinate constructs. Thus, field 3700*c* may be a BLOB (Binary Large Object) or (preferably) text. An alternate embodiment to field 3700*c* may use General Assignment Data Records (GADRs) 3520 to assign condition identifier fields of a new condition data record to charter identifier fields 3700*a* (to prevent a single field from holding an unpredictable number of conditions for the charter of record 3700). Actions field 3700*d* contains an ordered list of one or more action identifiers 3750*a* of actions to be performed when the expression of field 3700*c* is evaluated to TRUE. For example, in the preferred syntactical embodiment, when actions field 3700*d* contains "45,2356,9738", the action identifier fields 3750*a* have been identified as an ordered list of actions 45, 2356 and 9738 which are each an action identifier contained in an ADR 3750 field 3750*a*. An alternate embodiment to field 3700*d* will use General Assignment Data Records (GADRs) 3520 to assign action identifier fields 3750*a* to charter identifier fields 3700*a* (to prevent a single field from holding an unpredictable number of actions for the charter of record 3700). Another alternative embodiment may include Grantor and Grantee information as part of the CDR (e.g. new fields 3700*e* through 3700*h* like fields 3500*c* through 3500*f*). Charter enabled field 3700*f* indicates whether or not the charter is active (Y=Yes (is active), N=No (is not active)). Enabled field 3700*f* is useful for enabling or disabling charters (i.e. in effect or not in effect), setting a default enabled/disabled setting for the charter which a user reconciles later, or for setting charters to be enabled or disabled depending on the time and/or processing path involved with applicable charter processing. Various embodiments will default field **3700*f* appropriately. Type field 3700*t* contains the type of charter (see Application Term Triggers below). When field 3700*t*** is set to NULL, the charter is not of an Application Term trigger variety.

Figure 37B:
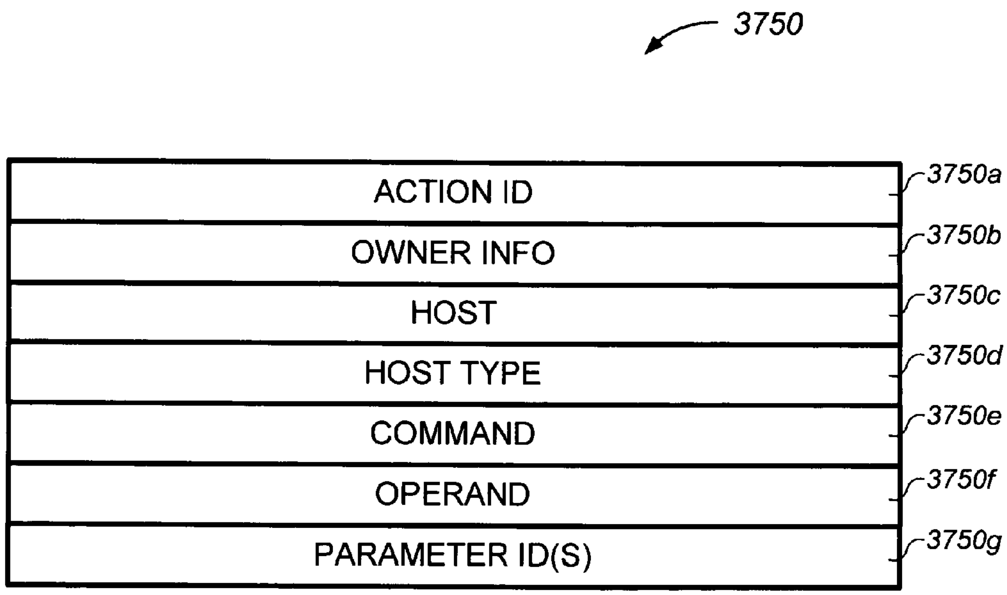
FIG. 37B depicts a preferred embodiment of an Action Data Record (ADR) for discussing operations of the present disclosure, derived from the grammar of FIGS. 30A through 30E.

FIG. 37B depicts a preferred embodiment of an Action Data Record (ADR) 3750 for discussing operations of the present disclosure, derived from the grammar of FIGS. 30A through 30E. An action identifier (action ID) field **3750*a* contains a unique number generated for the record 3750 to distinguish it from all other records 3750 maintained. Field 3750*a* is to be maintained similarly to as described for field 3500*a* (e.g. primary key column, correlation generation, facilitates well performing I/O). An owner information (info) field 3750*b* provides who the owner (creator and/or maintainer) is of the ADR 3750. Field 3750*b* is to be maintained similarly to as described for field 3500*b* (e.g. embodiments for like ID and type pair, two (2) fields, removal because MS user information understood to be owner). Host field 3750*c* contains the host (if not null) for where the action is to take place. An alternate embodiment allows multiple host specification(s) for the action. Host type field 3750*d* qualifies the host field 3750*c* for the type of host(s) to perform the action (helps interpret field 3750*c*). An alternate embodiment allows multiple host type specifications for multiple host specifications for the action. Yet another embodiment uses a single host field 3750*c* to join to a new table for gathering all applicable hosts for the action. Command field 3750*e* contains an "atomic command" (such as those found at the top of FIG. 34D), operand field 3750*f* contains an "atomic operand" (e.g. such as those found at the bottom of FIG. 34D), and parameter IDs field 3750*g* contains a list of null, one or more parameter identifiers 3775*a* (an ordered list) for parameters in accordance with the combination of command field 3750*e* and operand field 3750*f* (see FIGS. 31A through 31E for example parameters). There is a list of supported commands, list of supported operands, and a set of appropriate parameters depending on the combination of a particular command with a particular operand. In the preferred syntactical embodiment, when parameter IDs field 3750*g* contains "234,18790", the parameter IDs fields 3775*a* have been identified as an ordered list of parameters 234 and 18790 which are each a parameter identifier contained in a record 3775 field 3775*a*. An alternate embodiment to field 3750*g* will use General Assignment Data Records (GADRs) 3520 to assign parameter identifier fields 3775*a* to action identifier fields 3750*a* (to prevent a single field from holding an unpredictable number of parameters for the action of record 3750**).

Figure 37C:
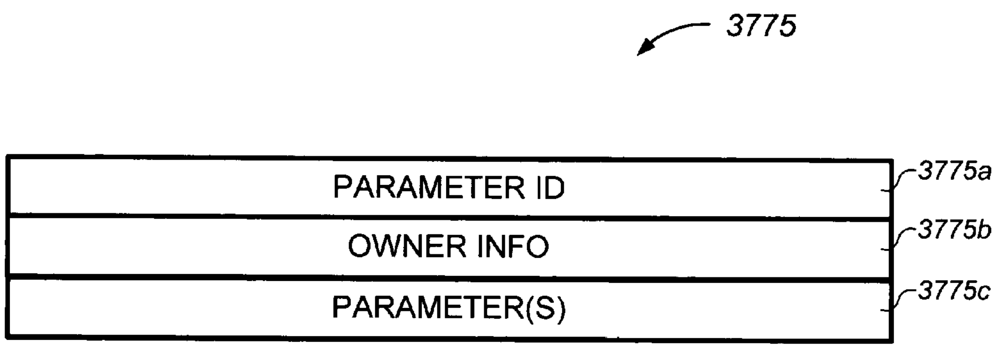
FIG. 37C depicts a preferred embodiment of a Parameter Data Record (PARMDR) for discussing operations of the present disclosure, derived from the grammar of FIGS. 30A through 30E.

FIG. 37C depicts a preferred embodiment of a Parameter Data Record (PARMDR) 3775 for discussing operations of the present disclosure, derived from the grammar of FIGS. 30A through 30E. A parameter identifier (parameter ID) field **3775*a* contains a unique number generated for the record 3775 to distinguish it from all other records 3775 maintained. Field 3775*a* is to be maintained similarly to as described for field 3500*a* (e.g. primary key column, correlation generation, facilitates well performing I/O). An owner information (info) field 3775*b* provides who the owner (creator and/or maintainer) is of the record 3775. Field 3775*b* is to be maintained similarly to as described for field 3500*b* (e.g. embodiments for like ID and type pair, two (2) fields, removal because MS user information understood to be owner). Parameters field 3775*c* contains one or more parameters pointed to by data of field 3750*g*, preferably in a conveniently parsed form. Field 3750*g* can point to a single record 3775 which contains a plurality of parameters in field 3775*c*, or field 3750*g* can specify a plurality of parameters pointing to plural records 3775, each containing parameter information in fields 3775*c***.

Figure 37D:
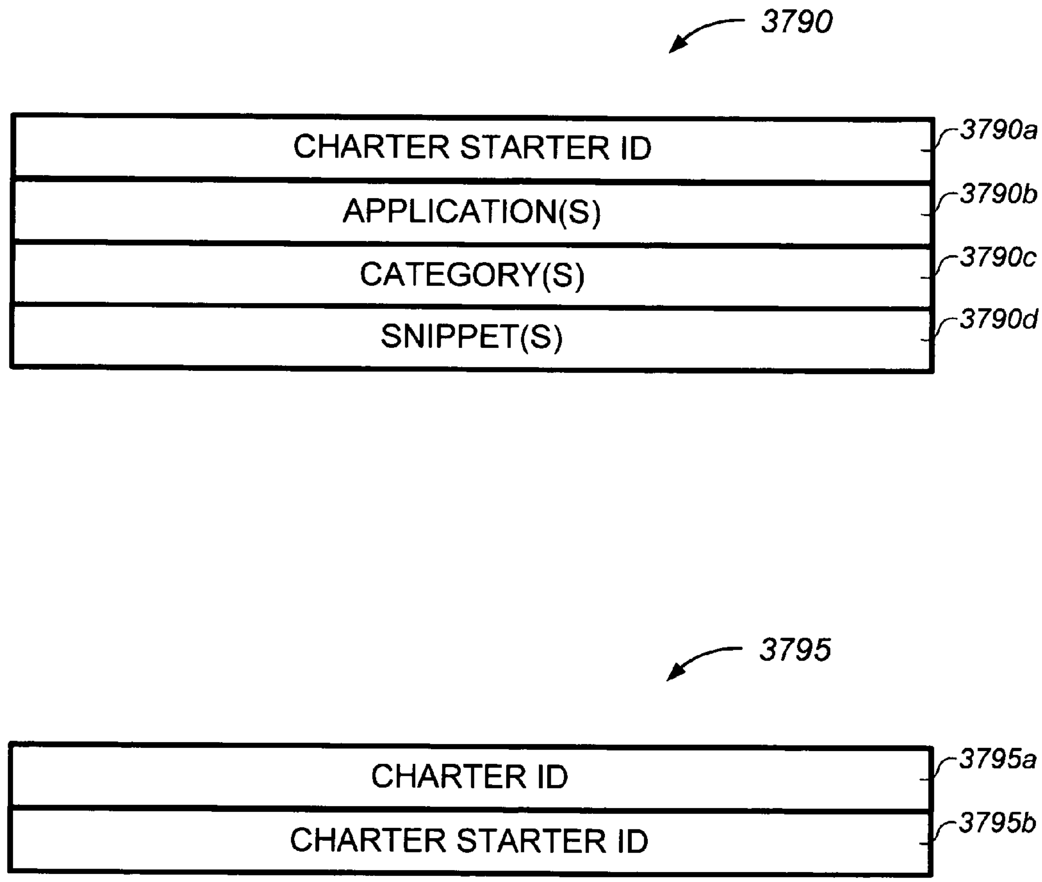
FIG. 37D depicts a preferred embodiment of Charters Starters schema for discussing operations of the present disclosure.

FIG. 37D depicts a preferred embodiment of Charters Starters schema for discussing operations of the present disclosure, namely a Charters Starters Record (CSR) 3790 and a CDR to CSR mapping record (CDR2CSR) 3795, for conveniently enabling or disabling a set of charters. A CSR 3790 may or may not be contained in a preferred embodiment for facilitating desirable charters to make effective in a MS when accessed for charter processing, for example at block 4608 and/or FIG. 57 WITS processing. A charter starter identifier field **3790*a* contains a unique key field identifier to the CSR table record and is used to join to field 3795*b* for associating the CSR to a CDR described in a field 3795*a*. An application(s) field 3790*b* provides a list (i.e. one or more) of applications which are associated to charter(s) (i.e. to CDR(s)). In some embodiments, field 3790*b* is a unique join field to an Application table so that any number of applications can be associated to charter(s). A category(s) field 3790*c* provides a list (i.e. one or more) of categories which are associated to charter(s) (i.e. to CDR(s)). In some embodiments, field 3790*c* is a unique join field to a Categories table so that any number of categories can be associated to the charter(s). A snippet(s) field 3790*d* provides a list (i.e. one or more) of snippets which are associated to the charter(s) (i.e. to CDR(s)). In some embodiments, field 3790*d* is a unique join field to a Snippets table so that any number of snippets can be associated to the charter(s). Otherwise, a list of snippets may be maintained directly to field 3790*d*. A snippet is preferably an executable subset of the associated charter(s) (i.e. of the associated CDR(s)), and may be automatically generated when a charter is created, edited, or maintained. The snippet provides a reference-able component which can be used to form new charters. When a plurality of values are maintained to a field 3790*b/c/d*, a suitable delimiter (e.g. semicolon) is used for separating distinct values. Various embodiments may default CSR fields appropriately. A CSR may include additional fields to facilitate selecting, organizing, sorting, enabling, disabling, or maintaining charters in the present disclosure. CDR2CSR records 3795 support mapping many charters (CDRs) to a single CSR, or many CSRs to a single charter (CDR). Charter id field 3795*a* will contain a charter id field 3700*a*, and charter starter id field 3795*b* will contain a charter starter id field 3790*a*. This provides optimal well performing flexibility in isolating organization criteria from the charters themselves. In some embodiments, field 3700*f*** is maintained to a CSR rather than a CDR.

Preferably, blocks 4630, 4632, 4636, 4654, 4662, 4664 and related charter processing described below support presenting and managing appropriately per context the applicable charters starters schema described above in the applicable context.

In one embodiment, data can be maintained to data records (e.g. of FIGS. 35A through 37D, FIG. 53, FIG. 76C, FIG. 85A, 86C, FIG. 90B, FIGS. 91A and 91B, FIG. 95A, FIG. 97B, and/or any other disclosed data records) such that it is marked as enabled or disabled (e.g. additional column in SQL table for enabled/disabled). In another embodiment, a record is configured in disabled form and then subsequently enabled, for example with a user interface. Any subset of data records may be enabled or disabled as a related set. Privileges may be configured for which subsets can be enabled or disabled by a user. In another embodiment, privileges themselves enable or disable a data record, a subset of data records, a subset of data record types, or a subset of data of data records. In some embodiments, an administrator or authorized user makes configurations for an intended MS user.

Data records were derived from the BNF grammar of FIGS. 30A through 30E. Other data record embodiments may exist. In a preferred embodiment, data records of FIGS. 35A through 37D are maintained to persistent storage of the MS. A MS used for the first time should be loaded with a default set of data (e.g. starter templates containing defaulted data) preloaded to the data records for user convenience. Loading may occur from local storage or from remotely loading, for example over a communications channel when first initializing the MS (e.g. enhanced block 1214 for additionally ensuring the data records are initialized, in particular for the first startup of an MS). Owner fields (e.g. field 3500*b*) for preloaded data are preferably set to a system identity for access and use by all users. Preferably, a user cannot delete any of the system preloaded data. While the data records themselves are enough to operate permissions 10 and charters 12 at the MS after startup, a better performing internalization may be preferred. For example, block 1216 can be enhanced for additionally using data records to internalize to a non-persistent well performing form such as compiled C encoding of FIGS. 34A through 34G (also see FIG. 52), and block 2822 can be enhanced for additionally using the internalized data to write out to data records maintained in persistent storage. Any compiled/interpreted programming source code may be used without departing from the spirit and scope of the disclosure. FIGS. 34A through 34G (also see FIG. 52) are an example, but may provide an internalized form for processing. In any case, many examples are provided for encoding permissions 10 and charters 12. Continuing with the data record examples, for example a persistent storage form of data records in a MS local SQL database (e.g. a data record corresponds to a particular SQL table, and data record fields correspond to the SQL table columns), flowcharts 38 through 48B are provided for configuration of permissions 10 and charters 12. Data records are to be maintained in a suitable MS performance conscious form (may not be an SQL database). An "s" is added as a suffix to disclosed acronyms (e.g. GDR) to reference a plural version of the acronym (e.g. GDRs=Granting Data Records).

FIGS. 35A through 37D assume an unlimited number of records (e.g. objects) to accomplish a plurality of objects (e.g. BNF grammar constructs). In various embodiments, a high maximum number plurality of the BNF grammar derived objects is supported wherever possible. In various embodiments, any MS storage or memory means, local or remotely attached, can be used for storing information of an implemented derivative of the BNF grammar of this disclosure. Also, various embodiments may use a different model or schema to carry out functionality disclosed. Various embodiments may use an SQL database (e.g. Oracle, SQL Server, Informix, DB2, etc) for storing information, or a non-SQL database form (e.g. data or record retrieval system, or any interface for accessible record formatted data).

It is anticipated that management of permissions 10 and charters 12 be as simple and as lean as possible on an MS. Therefore, a reasonably small subset of the FIGS. 30A through 30E grammar is preferably implemented. While FIGS. 35A through 48B demonstrate a significantly large derivative of the BNF grammar, the reader should appreciate that this is to "cover all bases" of consideration, and is not necessarily a derivative to be incorporated on a MS of limited processing capability and resources. A preferred embodiment is discussed, but much smaller derivatives are even more preferred on many MSs. Appropriate semaphore lock windows are assumed incorporated when multiple asynchronous threads can access the same data concurrently.

Figure 38:
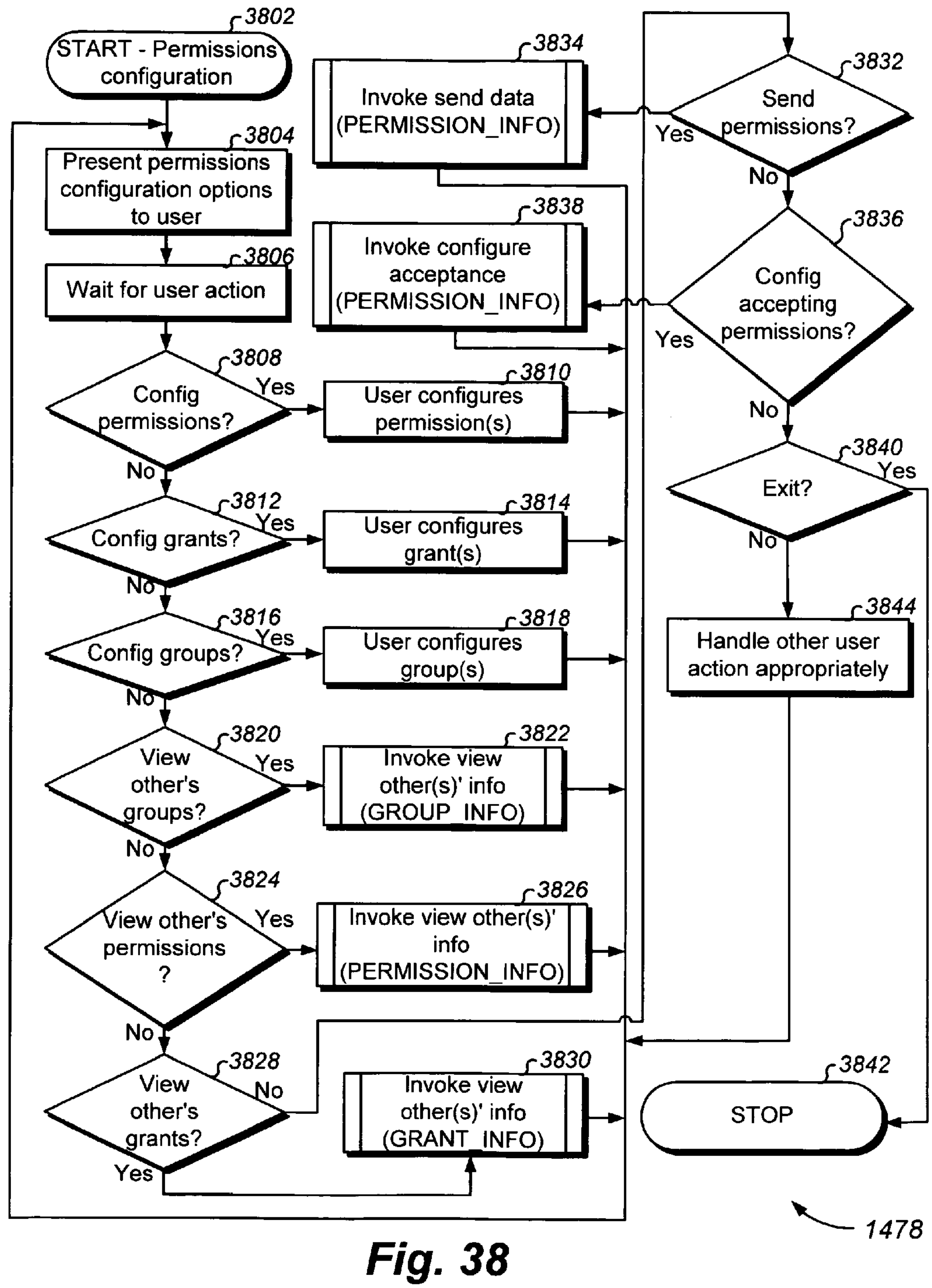
FIG. 38 depicts a flowchart for describing a preferred embodiment of MS permissions configuration processing.

FIG. 38 depicts a flowchart for describing a preferred embodiment of MS permissions configuration processing of block 1478. FIG. 38 is of Self Management Processing code 18. Processing starts at block 3802 and continues to block 3804 where a list of permissions configuration options are presented to the user. Thereafter, block 3806 waits for a user action in response to options presented. Block 3806 continues to block 3808 when a user action has been detected. If block 3808 determines the user selected to configure permissions data, then the user configures permissions data at block 3810 (see FIG. 39A) and processing continues back to block 3804. If block 3808 determines the user did not select to configure permissions data, then processing continues to block 3812. If block 3812 determines the user selected to configure grants data, then the user configures grants data at block 3814 (see FIG. 40A) and processing continues back to block 3804. If block 3812 determines the user did not select to configure grants data, then processing continues to block 3816. If block 3816 determines the user selected to configure groups data, then the user configures groups data at block 3818 (see FIG. 41A) and processing continues back to block 3804. If block 3816 determines the user did not select to configure groups data, then processing continues to block 3820. If block 3820 determines the user selected to view other's groups data, then block 3822 invokes the view other's info processing of FIG. 42 with GROUP_INFO as a parameter (for viewing other's groups data information) and processing continues back to block 3804. If block 3820 determines the user did not select to view other's groups data, then processing continues to block 3824. If block 3824 determines the user selected to view other's permissions data, then block 3826 invokes the view other's info processing of FIG. 42 with PERMISSION_INFO as a parameter (for viewing other's permissions data information) and processing continues back to block 3804. If block 3824 determines the user did not select to view other's permissions data, then processing continues to block 3828. If block 3828 determines the user selected to view other's grants data, then block 3830 invokes the view other's info processing of FIG. 42 with GRANT_INFO as a parameter (for viewing other's grants data information) and processing continues back to block 3804. If block 3828 determines the user did not select to view other's grants data, then processing continues to block 3832. If block 3832 determines the user selected to send permissions data, then block 3834 invokes the send data processing of FIG. 44A with PERMISSION_INFO as a parameter (for sending permissions data) and processing continues back to block 3804. If block 3832 determines the user did not select to send permissions data, then processing continues to block 3836. If block 3836 determines the user selected to configure accepting permissions, then block 3838 invokes the configure acceptance processing of FIG. 43 with PERMISSION_INFO as a parameter (for configuring acceptance of permissions data) and processing continues back to block 3804. If block 3836 determines the user did not select to configure accepting permissions, then processing continues to block 3840. If block 3840 determines the user selected to exit block 1478 processing, then block 3842 completes block 1478 processing appropriately. If block 3840 determines the user did not select to exit, then processing continues to block 3844 where all other user actions detected at block 3806 are appropriately handled, and processing continues back to block 3804.

In an alternate embodiment where the MS maintains GDRs 3500, GRTDRs 3510, GADRs 3520, PDRs 3530 and GRPDRs 3540 (and their associated data records DDRs, HDRs and TDRs) at the MS where they were configured, FIG. 38 may not provide blocks 3820 through 3830. The MS may be aware of its user permissions and need not share the data (i.e. self contained). In some embodiments, options 3820 through 3830 cause access to locally maintained data for others (other users, MSs, etc) or cause remote access to data when needed (e.g. from the remote MSs). In the embodiment where no data is maintained locally for others, blocks 3832 through 3838 may not be necessary. The preferred embodiment is to locally maintain permissions data for the MS user and others (e.g. MS users) which are relevant to provide the richest set of permissions governing MS processing at the MS.

Figure 39A:
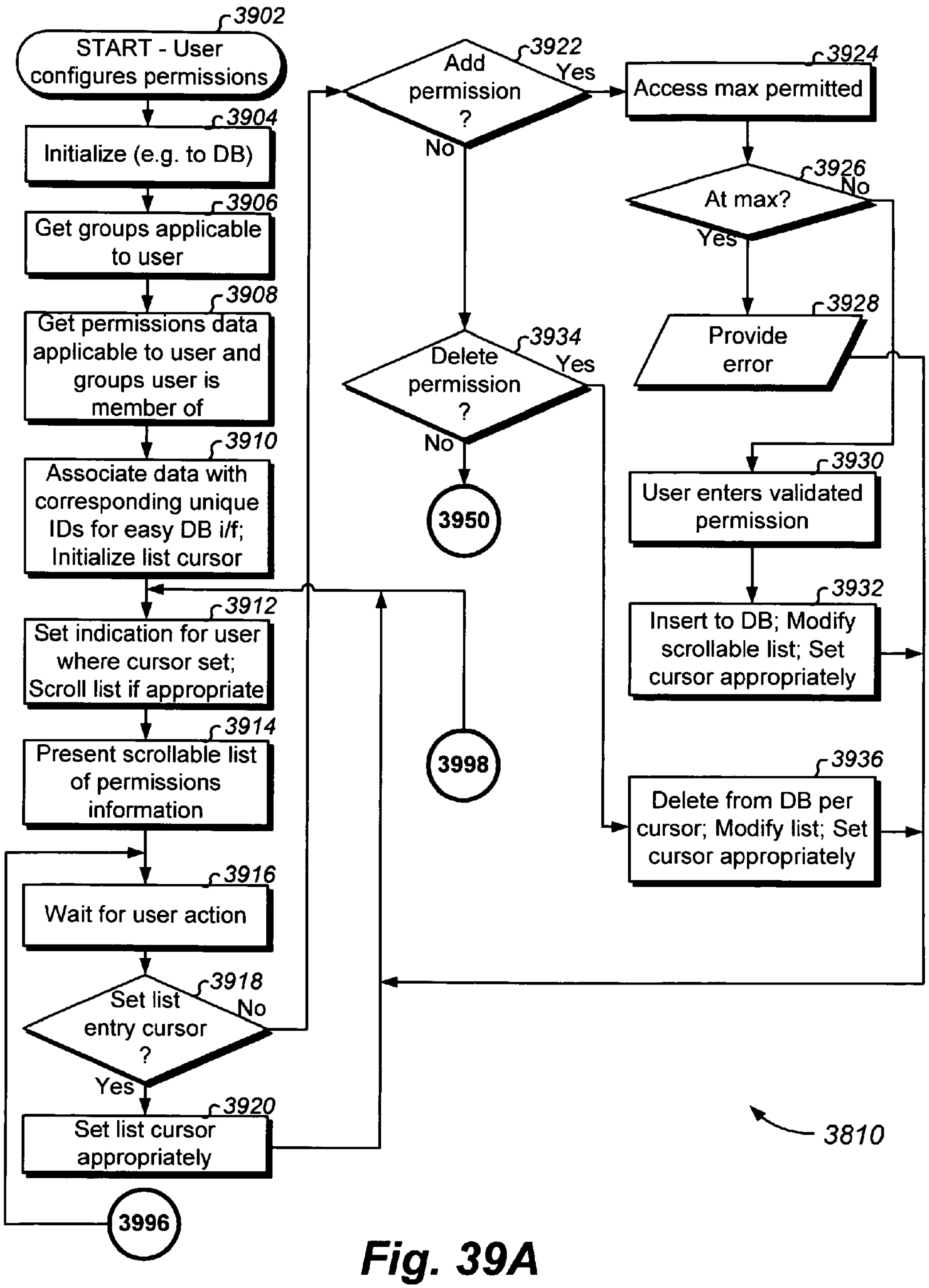
FIGS. 39A through 39B depict flowcharts for describing a preferred embodiment of MS user interface processing for permissions configuration.
Figure 39B:
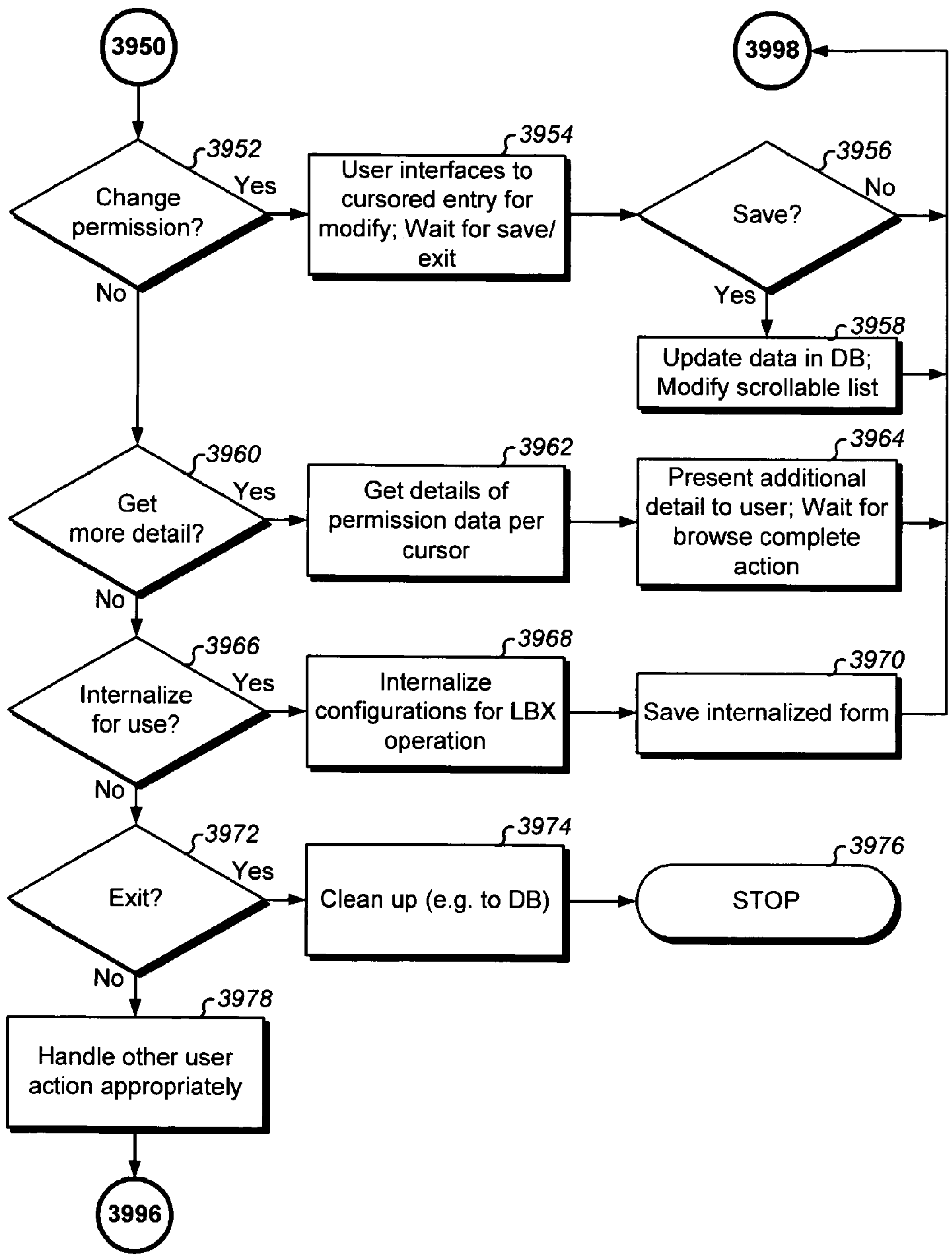

FIGS. 39A through 39B depict flowcharts for describing a preferred embodiment of MS user interface processing for permissions configuration of block 3810. With reference now to FIG. 39A, processing starts at block 3902, continues to block 3904 for initialization (e.g. a start using database command), and then to block 3906 where groups the user is a member of are accessed. Block 3906 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR is a derivative embodiment which happens to not distinguish. Alternate embodiments may carry a group type field to select appropriate records by group type. Yet another embodiment may not have a block 3906 with processing at block 3908 for gathering data additionally by groups the user is a member of. Block 3906 continues to block 3908.

Block 3908 accesses all GDRs (e.g. all rows from a GDR SQL table) for the user of FIG. 39A matching field 3500*t* to Permission, and the owner information of the GDRs (e.g. user information matches field 3500*b*) to the user and to groups the user is a member of (e.g. group information matches field 3500*b* (e.g. owner type=group, owner id=a group ID field 3540*a* from block 3906). The GDRs are additionally joined (e.g. SQL join) with DDRs and TDRs (e.g. fields 3600*b* and 3640*b*=Permission and by matching ID fields 3600*a* and 3640*a* with field 3500*a*). Description field 3600*c* may provide a useful description last saved by the user for the permission entry. Block 3908 may also retrieve system predefined data records for use and/or management. Thereafter, each joined entry returned at block 3908 is associated at block 3910 with the corresponding data IDs (at least fields 3500*a* and 3540*a*) for easy unique record accesses when the user acts on the data. Block 3910 also initializes a list cursor to point to the first list entry to be presented to the user. Thereafter, block 3912 sets user interface indication for where the list cursor is currently set (e.g. set to highlight the entry), and any list scrolling settings are set (the list is initially not set for being scrolled on first FIG. 39A processing encounter to block 3912 from block 3910). Block 3912 continues to block 3914 where the entry list is presented to the user in accordance with the list cursor and list scroll settings managed for presentation at block 3912. Thereafter, block 3916 waits for user action to the presented list of permissions data and will continue to block 3918 when a user action has been detected. Presentation of the scrollable list preferably presents in an entry format such that an entry contains fields for: DDR 3600 description; GDR owner information, grantor information and grantee information; GRPDR owner information and group name if applicable; and TDR time spec information. Alternate embodiments will present less information, or more information (e.g. GRTDR(s) 3510 and/or PDR(s) 3530 via GADR(s) 3520 joining fields (e.g. 3500*a*, 3510*a*, 3520*b*)).

If block 3918 determines the user selected to set the list cursor to a different entry, then block 3920 sets the list cursor accordingly and processing continues back to block 3912. Block 3912 always sets for indicating where the list cursor is currently pointed and sets for appropriately scrolling the list if necessary when subsequently presenting the list at block 3914. If block 3918 determines the user did not select to set the list cursor, then processing continues to block 3922. If block 3922 determines the user selected to add a permission, then block 3924 accesses a maximum number of permissions allowed (perhaps multiple maximum values accessed), and block 3926 checks the maximum(s) with the number of current permissions defined. There are many embodiments for what deems a maximum (for this user, for a group, for this MS, etc). If block 3926 determines a maximum number of permissions allowed already exists, then block 3928 provides an error to the user and processing continues back to block 3912. Block 3928 preferably requires the user to acknowledge the error before continuing back to block 3912. If block 3926 determines a maximum was not exceeded, then block 3930 interfaces with the user for entering validated permission data and block 3932 adds the data record(s), appropriately updates the list with the new entry, and sets the list cursor appropriately for the next list presentation refresh, before continuing back to block 3912. If block 3922 determines the user did not want to add a permission, processing continues to block 3934. Block 3932 will add a GDR 3500, DDR 3600, HDR 3620 (to set creator information) and TDR 3640. The DDR and TDR are optionally added by the user, but the DDR may be strongly suggested (if not enforced on the add). This will provide a permission record assigning all privileges from the grantor to the grantee. Additionally, blocks 3930/3932 may support adding new GADR(s) 3520 for assigning certain grants and/or privileges (which are validated to exist prior to adding data at block 3932).

If block 3934 determines the user selected to delete a permission, then block 3936 deletes the data record currently pointed to by the list cursor, modifies the list for the discarded entry, and sets the list cursor appropriately for the next list presentation refresh, before continuing back to block 3912. Block 3936 will use the granting ID field 3500*a* (associated with the entry at block 3910) to delete the permission. Associated GADR(s) 3520, DDR 3600, HDR 3620, and TDR 3640 is also deleted (e.g. preferably with a cascade delete in a SQL embodiment). If block 3934 determines the user did not select to delete a permission, then processing continues to block 3952 of FIG. 39B by way of off-page connector 3950.

With reference now to FIG. 39B, if block 3952 determines the user selected to modify a permission, then block 3954 interfaces with the user to modify permission data of the entry pointed to by the list cursor. The user may change information of the GDR and any associated records (e.g. DDR, TDR and GADR(s)). The user may also add the associated records at block 3954. Block 3954 waits for a user action indicating completion. Block 3954 will continue to block 3956 when the complete action is detected at block 3954. If block 3956 determines the user exited, then processing continues back to block 3912 by way of off-page connector 3998. If block 3956 determines the user selected to save changes made at block 3954, then block 3958 updates the data and the list is appropriately updated before continuing back to block 3912. Block 3958 may update the GDR and/or any associated records (e.g. GADR(s), DDR, and/or TDR) using the permission id field 3500*a* (associated to the entry at block 3910). Block 3958 will update an associated HDR as well. Block 3958 may add new GADR(s), a DDR and/or TDR as part of the permission change. If block 3952 determines the user did not select to modify a permission, then processing continues to block 3960.

If block 3960 determines the user selected to get more details of the permission (e.g. show all joinable data to the GDR that is not already presented with the entry), then block 3962 gets additional details (may involve database queries in an SQL embodiment) for the permission pointed to by the list cursor, and block 3964 appropriately presents the information to the user. Block 3964 then waits for a user action that the user is complete reviewing details, in which case processing continues back to block 3912. If block 3960 determines the user did not select to get more detail, then processing continues to block 3966.

If block 3966 determines the user selected to internalize permissions data thus far being maintained, then block 3968 internalizes (e.g. as a compiler would) all applicable data records for well performing use by the MS, and block 3970 saves the internalized form, for example to MS high speed non-persistent memory. In one embodiment, blocks 3968 and 3970 internalize permission data to applicable C structures of FIGS. 34A through 34G (also see FIG. 52). In various embodiments, block 3968 maintains statistics for exactly what was internalized, and updates any running totals or averages maintained for a plurality of internalizations up to this point, or over certain time periods. Statistics such as: number of active constructs; number of user construct edits of particular types; amount of associated storage used, freed, changed, etc with perhaps a graphical user interface to graph changes over time; number of privilege types specified, number of charters affected by permissions; and other permission dependent statistics. In other embodiments, statistical data is initialized at internalization time to prepare for subsequent gathering of useful statistics during permission processing. In embodiments where a tense qualifier is specified for TimeSpec information, saving the internalized form at block 3970 causes all past and current tense configurations to become effective for being processed.

Bock 3970 then continues back to block 3912. If block 3966 determines the user did not select to internalize permission configurations, then processing continues to block 3972. Alternate embodiments of processing permissions 10 in the present disclosure will rely upon the data records entirely, rather than requiring the user to redundantly internalize from persistent storage to non-persistent storage for use. Persistent storage may be of reasonably fast performance to not require an internalized version of permission 10. Different embodiments may completely overwrite the internalized form, or update the current internalized form with any changes.

If block 3972 determines the user selected to exit block 3810 processing, then block 3974 cleans up processing thus far accomplished (e.g. issue a stop using database command), and block 3976 completes block 3810 processing. If block 3972 determines the user did not select to exit, then processing continues to block 3978 where all other user actions detected at block 3916 are appropriately handled, and processing continues back to block 3916 by way off off-page connector 3996.

Figure 40A:
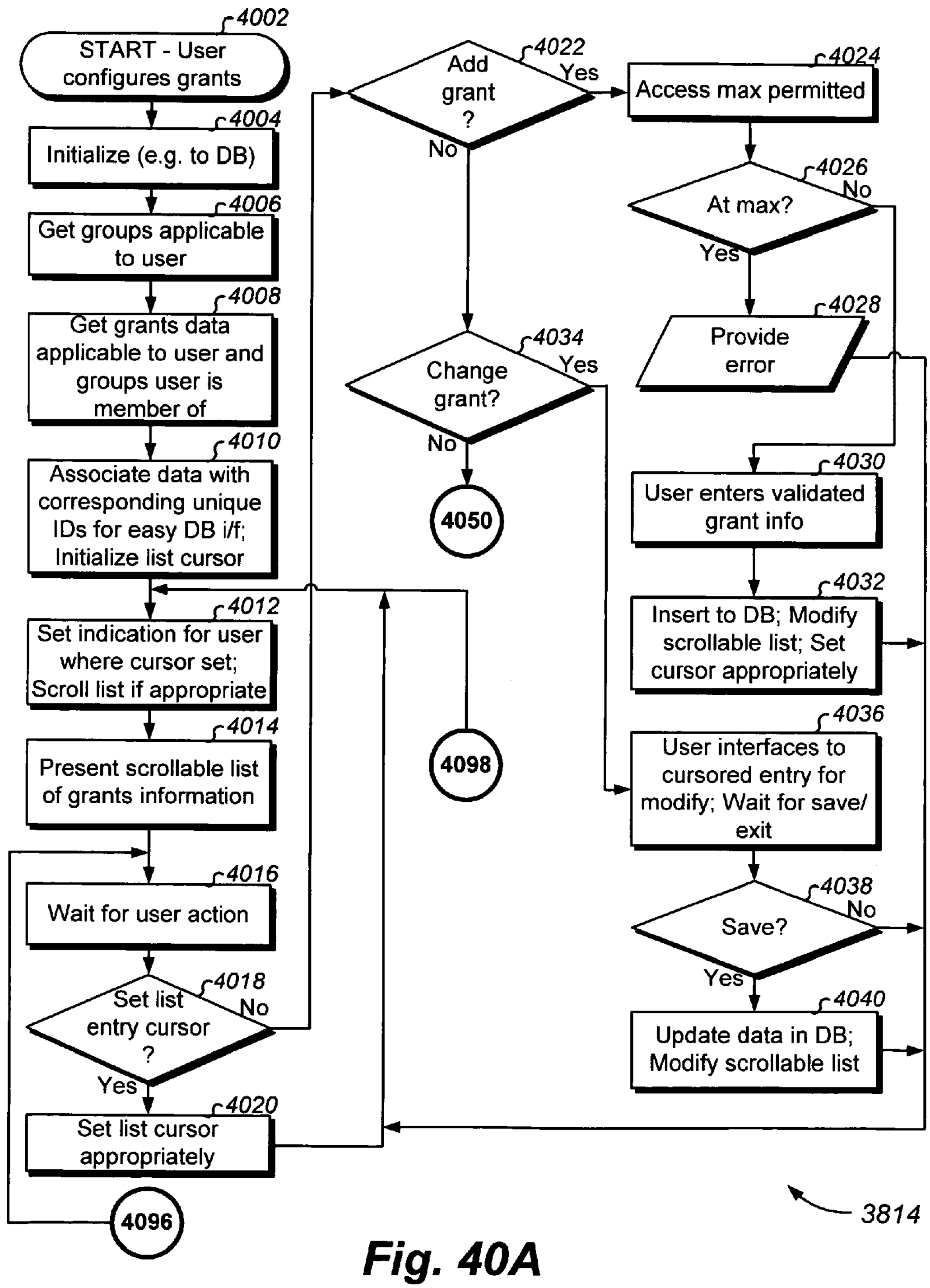
FIGS. 40A through 40B depict flowcharts for describing a preferred embodiment of MS user interface processing for grants configuration.
Figure 40B:
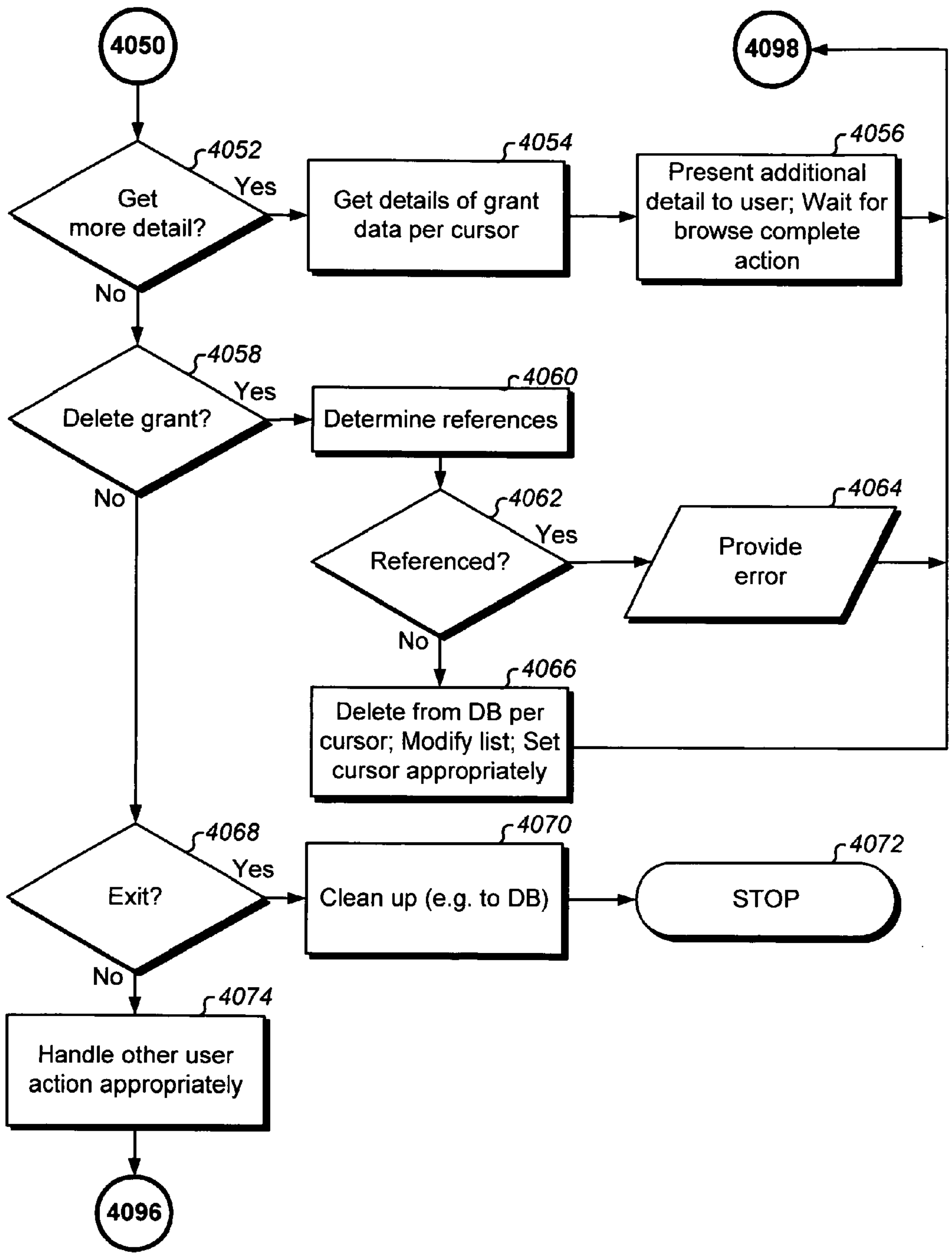

FIGS. 40A through 40B depict flowcharts for describing a preferred embodiment of MS user interface processing for grants configuration of block 3814. With reference now to FIG. 40A, processing starts at block 4002, continues to block 4004 for initialization (e.g. a start using database command), and then to block 4006 where groups the user is a member of are accessed. Block 4006 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR 3540 is a derivative embodiment which happens to not distinguish. Alternate embodiments may carry a group type field to select appropriate records by group type. Yet another embodiment may not have a block 4006 with processing at block 4008 for gathering data additionally by groups the user is a member of. Block 4006 continues to block 4008.

Block 4008 accesses all GRTDRs 3510 (e.g. all rows from a GRTDR SQL table) for the user of FIG. 40A matching the owner information of the GRTDRs (e.g. user information matches field 3510*b*) to the user and to groups the user is a member of (e.g. group information matches field 3510*b* (e.g. owner type=group, owner id=group ID field 3540*a* from block 4006). The GRTDRs 3510 are additionally joined (e.g. SQL join) with DDRs 3600 and TDRs 3640 (e.g. fields 3600*b* and 3640*b*=Grant and by matching ID fields 3600*a* and 3640*a* with field 3510*a*). Description field 3600*c* can provide a useful description last saved by the user for the grant data, however the grant name itself is preferably self documenting. Block 4008 may also retrieve system predefined data records for use and/or management. Block 4008 will also retrieve grants within grants to present the entire tree structure for a grant entry. Block 4008 retrieves all GRTDRs 3510 joined to other GRTDRs 3510 through GADRs 3520 which will provide the grant tree structure hierarchy. Grants can be descendant to other grants in a grant hierarchy. Descendant type field 3520*c* set to Grant and descendant ID field 3520*d* for a particular grant will be a descending grant to an ascending grant of ascendant type field 3520*a* set to Grant and ascendant ID field 3520*b*. Therefore, each list entry is a grant entry that may be any node of a grant hierarchy tree. There may be grant information redundantly presented, for example when a grant is subordinate to more than one grant, but this helps the user know a grant tree structure if one has been configured. A visually presented embodiment may take the following form wherein a particular Grant, appears in the appropriate hierarchy form.

```
Grant Info_1
    Grant Info_11
    Grant Info_12
        Grant Info_121
        Grant Info_122
        ...
        Grant Info_12n
    ...
    Grant Info_1k
Grant Info_2
...
Grant Info_j
```

The list cursor can be pointing to any grant item within a single grant entry hierarchy. Thus, a single grant entry can be represented by a visual nesting, if applicable. Thereafter, each joined entry returned at block 4008 is associated at block 4010 with the corresponding data IDs (at least fields 3510*a* and 3540*a*) for easy unique record accesses when the user acts on the data. Block 4010 also initializes a list cursor to point to the first grant item to be presented to the user in the (possibly nested) list. Thereafter, block 4012 sets user interface indication for where the list cursor is currently set (e.g. set to highlight the entry) and any list scrolling settings are set (the list is initially not set for being scrolled on first FIG. 40A processing encounter to block 4012 from block 4010). Block 4012 continues to block 4014 where the entry list is presented to the user in accordance with the list cursor and list scroll settings managed for presentation at block 4012. Thereafter, block 4016 waits for user action to the presented list of grant data and will continue to block 4018 when a user action has been detected. Presentation of the scrollable list preferably presents in an entry format with subordinate grants also reference-able by the list cursor. A grant entry of the grant tree presented preferably contains fields for: GRTDR name field 3510*c*; GRTDR owner information; GRPDR owner information and group name if applicable; TDR time spec information; and DDR information. Alternate embodiments will present less information, or more information (e.g. join PDR(s) 3530 via GADR(s) 3520 when applicable).

If block 4018 determines the user selected to set the list cursor to a different grant reference, then block 4020 sets the list cursor accordingly and processing continues back to block 4012. Block 4012 always sets for indicating where the list cursor is currently pointed and sets for appropriately scrolling the list if necessary when subsequently presenting the list at block 4014. If block 4018 determines the user did not select to set the list cursor, then processing continues to block 4022. If block 4022 determines the user selected to add a grant, then block 4024 accesses a maximum number of grants allowed (perhaps multiple maximum values accessed), and block 4026 checks the maximum(s) with the number of current grants defined. There are many embodiments for what deems a maximum (for this user, for a group, for this MS, etc). If block 4026 determines a maximum number of grants allowed already exists, then block 4028 provides an error to the user and processing continues back to block 4012. Block 4028 preferably requires the user to acknowledge the error before continuing back to block 4012. If block 4026 determines a maximum was not exceeded, then block 4030 interfaces with the user for entering validated grant data and block 4032 adds the data record, appropriately updates the list with the new entry, and sets the list cursor appropriately for the next list presentation refresh, before continuing back to block 4012. If block 4022 determines the user did not want to add a grant, processing continues to block 4034. Block 4032 will add a GRTDR 3510, DDR 3600, HDR 3620 (to set creator information) and TDR 3640. The DDR and TDR are optionally added by the user. Additionally, at block 4030 the user may add new GADR(s) 3520 for assigning certain grants to the added grant and/or privileges to the grant (which are validated to exist prior to adding data at block 4032).

If block 4034 determines the user selected to modify a grant, then block 4036 interfaces with the user to modify grant data of the entry pointed to by the list cursor. The user may change information of the GRTDR and any associated records (e.g. DDR, TDR and GADR(s)). The user may also add the associated records at block 4036. Block 4036 waits for a user action indicating completion. Block 4036 will continue to block 4038 when the action is detected at block 4036. If block 4038 determines the user exited, then processing continues back to block 4012. If block 4038 determines the user selected to save changes made at block 4036, then block 4040 updates the data and the list is appropriately updated before continuing back to block 4012. Block 4040 may update the GRTDR and/or any associated records (e.g. GADR(s), DDR, and/or TDR) using the grant id field 3510*a* (associated to the grant item at block 4010). Block 4040 will update an associated HDR as well. Block 4036 may add new GADR(s), a DDR and/or TDR as part of the grant change. If block 4034 determines the user did not select to modify a grant, then processing continues to block 4052 by way of off-page connector 4050.

With reference now to FIG. 40B, if block 4052 determines the user selected to get more details of the grant (e.g. show all joinable data to the GRTDR that is not already presented with the entry), then block 4054 gets additional details (may involve database queries in an SQL embodiment) for the grant pointed to by the list cursor, and block 4056 appropriately presents the information to the user. Block 4056 then waits for a user action that the user is complete reviewing details, in which case processing continues back to block 4012 by way of off-page connector 4098. If block 4052 determines the user did not select to get more detail, then processing continues to block 4058.

If block 4058 determines the user selected to delete a grant, then block 4060 determines any data records (e.g. GADR(s) 3520) that reference the grant data record to be deleted. Preferably, no ascending data records (e.g. GRTDRs) are joinable to the grant data record being deleted, otherwise the user may improperly delete a grant from a configured permission or other grant. In the case of descending grants, all may be cascaded deleted in one embodiment, provided no ascending grants exist for any of the grants to be deleted. The user should remove ascending references to a grant for deletion first. Block 4060 continues to block 4062. If block 4062 determines there was at least one reference, block 4064 provides an appropriate error with the reference(s) found so the user can subsequently reconcile. Block 4064 preferably requires the user to acknowledge the error before continuing back to block 4012. If no references were found as determined by block 4062, then processing continues to block 4066 for deleting the data record currently pointed to by the list cursor, along with any other related records that can be deleted. Block 4066 also modifies the list for the discarded entry(s), and sets the list cursor appropriately for the next list presentation refresh, before continuing back to block 4012. Block 4066 will use the grant ID field 3510*a* (associated with the entry at block 4010) to delete a grant. Associated records (e.g. DDR 3600, HDR 3620, and TDR 3640) are also deleted (e.g. preferably with a cascade delete in a SQL embodiment). If block 4058 determines the user did not select to delete a grant, then processing continues to block 4068.

If block 4068 determines the user selected to exit block 3814 processing, then block 4070 cleans up processing thus far accomplished (e.g. issue a stop using database command), and block 4072 completes block 3814 processing. If block 4068 determines the user did not select to exit, then processing continues to block 4074 where all other user actions detected at block 4016 are appropriately handled, and processing continues back to block 4016 by way off off-page connector 4096.

Figure 41A:
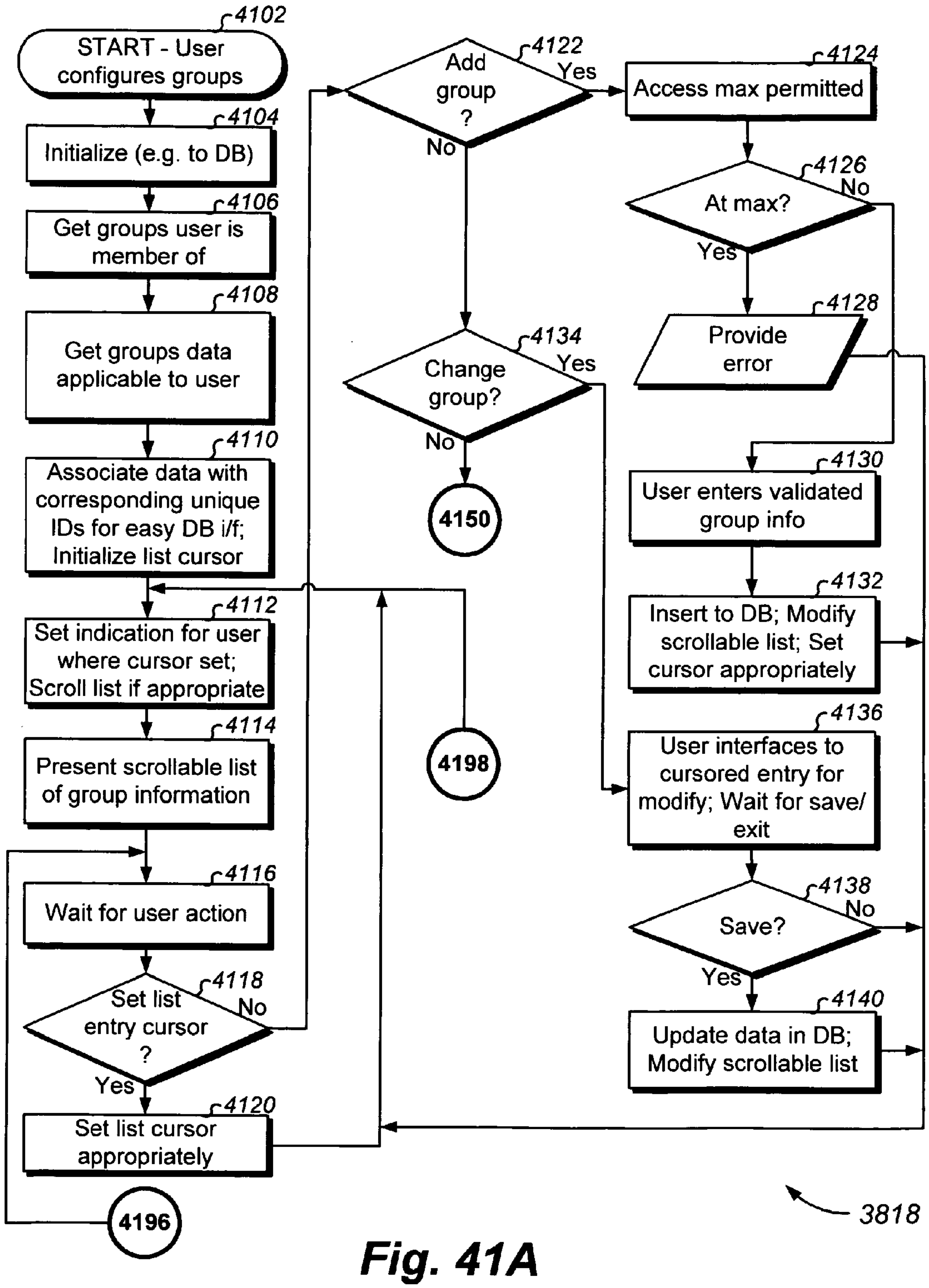
FIGS. 41A through 41B depict flowcharts for describing a preferred embodiment of MS user interface processing for groups configuration.
Figure 41B:
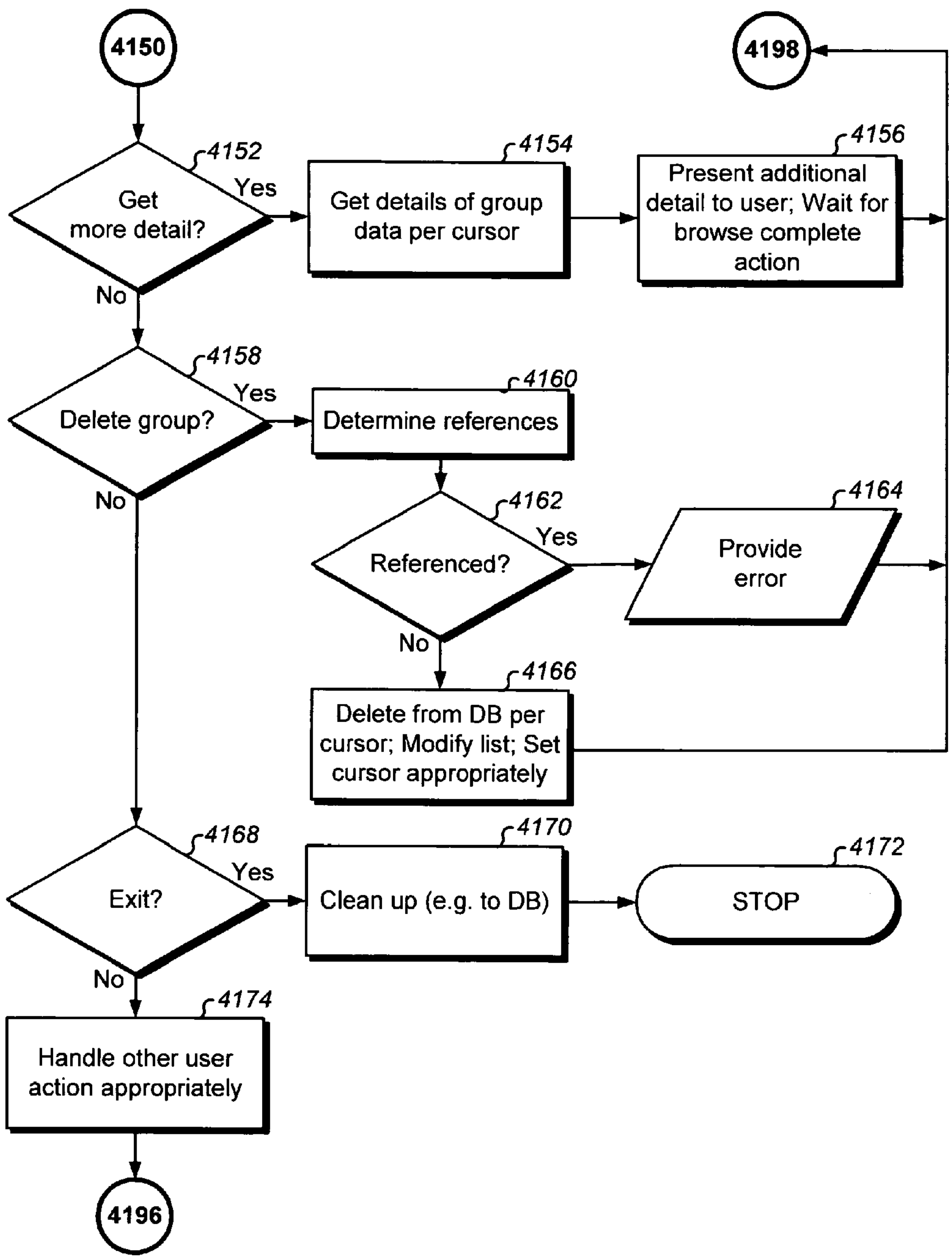

FIGS. 41A through 41B depict flowcharts for describing a preferred embodiment of MS user interface processing for groups configuration of block 3818. With reference now to FIG. 41A, processing starts at block 4102, continues to block 4104 for initialization (e.g. a start using database command), and then to block 4106 where groups the user is a member of are accessed. Block 4106 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR 3540 is a derivative embodiment which happens to not distinguish. Alternate embodiments may carry a group type field to select appropriate records by group type. Yet another embodiment may not have a block 4106 with processing at block 4108 for gathering data additionally by groups the user is a member of. Block 4106 continues to block 4108.

Block 4108 accesses all GRPDRs 3540 (e.g. all rows from a GRPDR SQL table) for the user of FIG. 41A matching the owner information of the GRPDRs (e.g. user information matches field 3540*b*) to the user and to groups the user is a member of (e.g. group information matches field 3540*b* (e.g. owner type=group, owner id=group ID field 3540*a* from block 4106)). The GRPDRs 3540 are additionally joined (e.g. SQL join) with DDRs 3600 and TDRs 3640 (e.g. fields 3600*b* and 3640*b*=Group and by matching ID fields 3600*a* and 3640*a* with field 3540*a*). Description field 3600*c* can provide a useful description last saved by the user for the group data, however the group name itself is preferably self documenting. Block 4108 may also retrieve system predefined data records for use and/or management. Block 4108 will also retrieve groups within groups to present the entire tree structure for a group entry. Block 4108 retrieves all GRPDRs 3540 joined to other GRPDRs 3540 through GADRs 3520 which will provide the group tree structure hierarchy. Groups can be descendant to other groups in a group hierarchy. Descendant type field 3520*c* set to Group and descendant ID field 3520*d* for a particular group will be a descending group to an ascending group of ascendant type field 3520*a* set to Group and ascendant ID field 3520*b*. Therefore, each list entry is a group entry that may be any node of a group hierarchy tree. There may be group information redundantly presented, for example when a group is subordinate to more than one group, but this helps the user know a group tree structure if one has been configured. A visually presented embodiment may take the following form wherein a particular Group, appears in the appropriate hierarchy form.

Group $\text{Info}_1$
    Group $\text{Info}_{11}$
    Group $\text{Info}_{12}$
        Group $\text{Info}_{121}$
        Group $\text{Info}_{122}$
        ...
        Group $\text{Info}_{12u}$
    ...
    Group $\text{Info}_{1t}$
Group $\text{Info}_2$
...
Group $\text{Info}_s$ The list cursor can be pointing to any group item within a single group entry hierarchy. Thus, a single group entry can be represented by a visual nesting, if applicable. Thereafter, each joined entry returned at block 4108 is associated at block 4110 with the corresponding data IDs (at least fields 3540*a*) for easy unique record accesses when the user acts on the data. Block 4110 also initializes a list cursor to point to the first group item to be presented to the user in the (possibly nested) list. Thereafter, block 4112 sets user interface indication for where the list cursor is currently set (e.g. set to highlight the entry) and any list scrolling settings are set (the list is initially not set for being scrolled on first FIG. 41A processing encounter to block 4112 from block 4110). Block 4112 continues to block 4114 where the entry list is presented to the user in accordance with the list cursor and list scroll settings managed for presentation at block 4112. Thereafter, block 4116 waits for user action to the presented list of group data and will continue to block 4118 when a user action has been detected. Presentation of the scrollable list preferably presents in an entry format with subordinate groups also reference-able by the list cursor. A group entry of the group tree presented preferably contains fields for: GRPDR name field 3540*c*; GRPDR owner information; owning GRPDR owner information and group name if applicable; TDR time spec information; and DDR information. Alternate embodiments will present less information, or more information (e.g. join to specific identities via GADR(s) 3520 when applicable).

If block 4118 determines the user selected to set the list cursor to a different group entry, then block 4120 sets the list cursor accordingly and processing continues back to block 4112. Block 4112 always sets for indicating where the list cursor is currently pointed and sets for appropriately scrolling the list if necessary when subsequently presenting the list at block 4114. If block 4118 determines the user did not select to set the list cursor, then processing continues to block 4122. If block 4122 determines the user selected to add a group, then block 4124 accesses a maximum number of groups allowed (perhaps multiple maximum values accessed), and block 4126 checks the maximum(s) with the number of current groups defined. There are many embodiments for what deems a maximum (for this user, for a group, for this MS, etc). If block 4126 determines a maximum number of groups allowed already exists, then block 4128 provides an error to the user and processing continues back to block 4112. Block 4128 preferably requires the user to acknowledge the error before continuing back to block 4112. If block 4126 determines a maximum was not exceeded, then block 4130 interfaces with the user for entering validated group data and block 4132 adds the data record, appropriately updates the list with the new entry, and sets the list cursor appropriately for the next list presentation refresh, before continuing back to block 4112. If block 4122 determines the user did not want to add a group, processing continues to block 4134. Block 4132 will add a GRPDR 3540, DDR 3600, HDR 3620 (to set creator information) and TDR 3640. The DDR and TDR are optionally added by the user. Additionally, at block 4130 the user may add new GADR(s) 3520 for assigning certain groups to the added group and/or identities to the group (which are validated to exist prior to adding data at block 4132).

If block 4134 determines the user selected to modify a group, then block 4136 interfaces with the user to modify group data of the entry pointed to by the list cursor. The user may change information of the GRPDR and any associated records (e.g. DDR, TDR and GADR(s)). The user may also add the associated records at block 4136. Block 4136 waits for a user action indicating completion. Block 4136 will continue to block 4138 when the complete action is detected at block 4136. If block 4138 determines the user exited, then processing continues back to block 4112. If block 4138 determines the user selected to save changes made at block 4136, then block 4140 updates the data and the list is appropriately updated before continuing back to block 4112. Block 4140 may update the GRPDR and/or any associated GADR(s), DDR, and/or TDR using the group id field 3540*a* associated to the group item at block 4110. Block 4140 will update an associated HDR as well. Blocks 4136/4140 may support adding new GADR(s), a DDR and/or TDR as part of the group change. If block 4134 determines the user did not select to modify a group, then processing continues to block 4152 by way of off-page connector 4150.

With reference now to FIG. 41B, if block 4152 determines the user selected to get more details of the group (e.g. show all joinable data to the GRPDR that is not already presented with the entry), then block 4154 gets additional details (may involve database queries in an SQL embodiment) for the group pointed to by the list cursor, and block 4156 appropriately presents the information to the user. Block 4156 then waits for a user action that the user is complete reviewing details, in which case processing continues back to block 4112 by way of off-page connector 4198. If block 4152 determines the user did not select to get more detail, then processing continues to block 4158.

If block 4158 determines the user selected to delete a group, then block 4160 determines any data records (e.g.

GADR(s) 3520) that reference the group data record to be deleted. Preferably, no ascending data records (e.g. GRPDRs) are joinable to the group data record being deleted, otherwise the user may improperly delete a group from a configured permission or other group. In the case of descending groups, all may be cascaded deleted in one embodiment, provided no ascending groups exist for any of the groups to be deleted. The user should remove ascending references to a group for deletion first. Block 4160 continues to block 4162. If block 4162 determines there was at least one reference, block 4164 provides an appropriate error with the reference(s) found so the user can subsequently reconcile. Block 4164 preferably requires the user to acknowledge the error before continuing back to block 4112. If no references were found as determined by block 4162, then processing continues to block 4166 for deleting the data record currently pointed to by the list cursor, along with any other related records that can be deleted. Block 4166 also modifies the list for the discarded entry(s), and sets the list cursor appropriately for the next list presentation refresh, before continuing back to block 4112. Block 4166 will use the group ID field 3540*a* (associated with the entry at block 4110) to delete the group. Associated records (e.g. DDR 3600, HDR 3620, and TDR 3640) are also deleted (e.g. preferably with a cascade delete in a SQL embodiment). If block 4158 determines the user did not select to delete a group, then processing continues to block 4168.

If block 4168 determines the user selected to exit block 3818 processing, then block 4170 cleans up processing thus far accomplished (e.g. issue a stop using database command), and block 4172 completes block 3818 processing. If block 4168 determines the user did not select to exit, then processing continues to block 4174 where all other user actions detected at block 4116 are appropriately handled, and processing continues back to block 4116 by way off off-page connector 4196.

Figure 42:
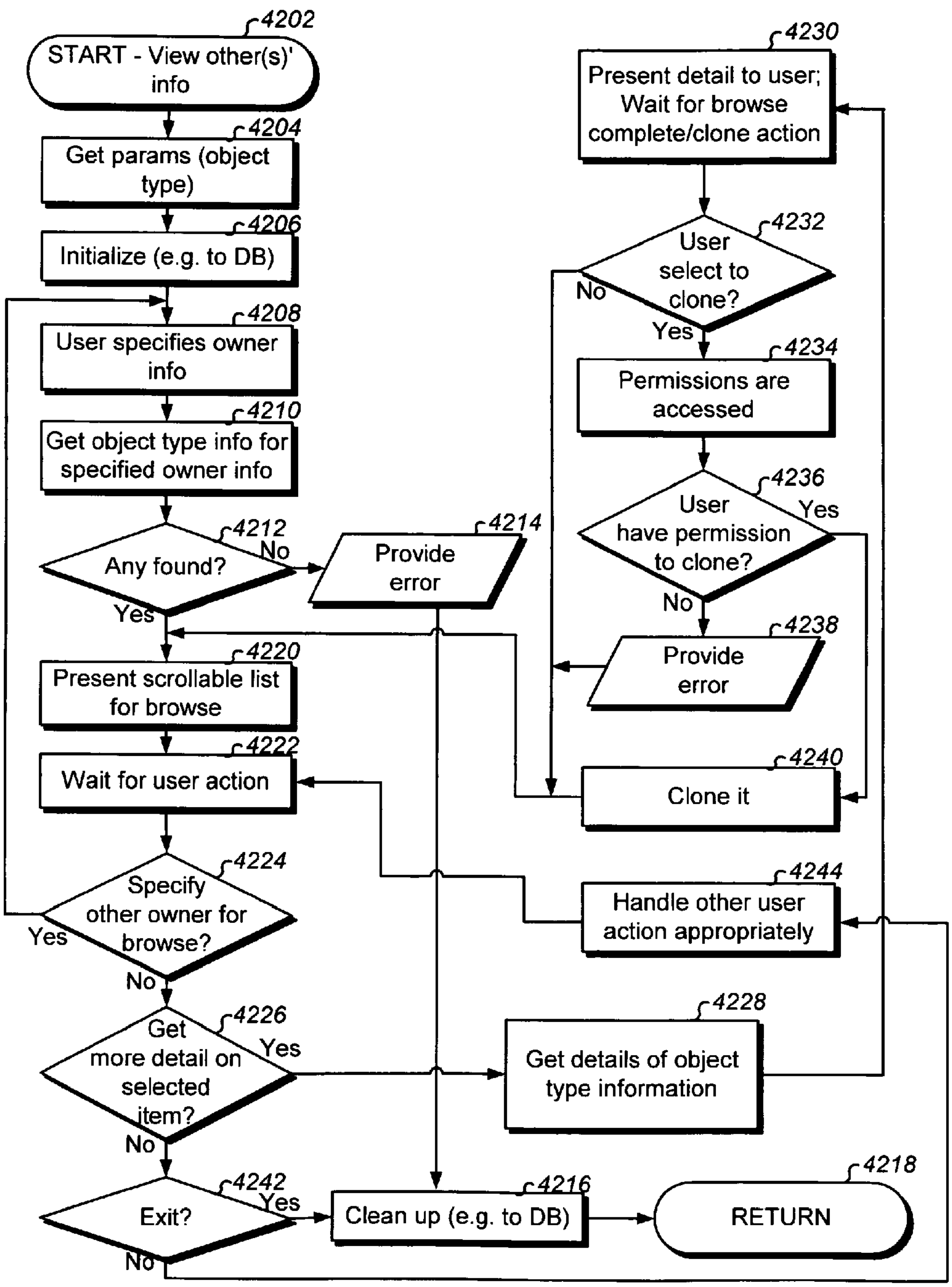
FIG. 42 depicts a flowchart for describing a preferred embodiment of a procedure for viewing MS configuration information of others.

FIG. 42 depicts a flowchart for describing a preferred embodiment of a procedure for viewing MS configuration information of others. Processing starts at block 4202 and continues to block 4204 where an object type parameter is determined for which information to present to the user as passed by the caller of FIG. 42 processing (e.g. GROUP_INFO, PERMISSION_INFO, GRANT_INFO, CHARTER_INFO, ACTION_INFO or PARAMETER_INFO). Thereafter, block 4206 performs initialization (e.g. a start using database command), and then the user specifies owner information (criteria), at block 4208, for the object type data records to present. No privilege is assumed required for browsing other's information since it is preferably local to the MS of the user anyway. Block 4208 continues to block 4210.

In an alternative embodiment, block 4208 appropriately accesses privileges granted from the owner criteria to the user of FIG. 42 to ensure the user has a privilege to browse the data records (per object type parameter) of the specified owner. Block 4208 will provide an error when there is no privilege, and will continue to block 4210 when there is a privilege. Block 4208 may also provide a user exit option for continuing to block 4216 for cases the user cannot successfully specify owner criteria. In similar embodiments, there may be a separate privilege required for each object type a user may browse.

Block 4210 gets (e.g. SQL selects) data according to the object type parameter (e.g. GRPDR(s), GDR(s), GRTDR(s), CDR(s), ADR(s) or PARMDR(s), along with any available associated joinable data (e.g. DDR(s), HDR(s), TDR(s) and data records via GADR(s) if applicable), per object type passed). There are various embodiments to block 4210 in accessing data: locally maintained data for the owner criteria specified at block 4208, communicating with a remote MS for accessing the MS of the owner criteria to synchronously pull the data, or sending a request to a remote MS over an interface like interface 1926 for then asynchronously receiving by an interface like interface 1948 for processing. Block 4210 may access field 3700*f* in the case of filtering desired charter records. One preferred embodiment is to locally maintain relevant data. In privilege enforced embodiments, appropriate privileges are determined before allowing access to the other's data.

Thereafter, if block 4212 determines there were no data records according to the object type passed by the caller for the owner criteria specified at block 4208, then block 4214 provides an error to the user, and processing continues to block 4216. Block 4216 performs cleanup of processing thus far accomplished (e.g. perform a stop using database command), and then continues to block 4218 for returning to the caller of FIG. 42 processing. Block 4214 preferably requires the user to acknowledge the error before continuing to block 4216.

If block 4212 determines at least one data record of object type was found, then block 4220 presents a browse-able scrollable list of entries to the user (i.e. similar to lists discussed for presentation by FIGS. 39A&B, FIGS. 40A&B, FIGS. 41A&B, FIGS. 46A&B, FIGS. 47A&B or FIGS. 48A&B, per object typed passed), and block 4222 waits for a user action in response to presenting the list. When a user action is detected at block 4222, processing continues to block 4224. If block 4224 determines the user selected to specify new owner criteria (e.g. for comparison to field 3500*b*, 3510*b*, 3540*b*, 3700*b*, 3750*b* or 3775*b*, per object type passed) for browse, then processing continues back to block 4208 for new specification and applicable processing already discussed for blocks thereafter. If block 4224 determines the user did not select to specify new owner criteria, processing continues to block 4226.

If block 4226 determines the user selected to get more detail of a selected list entry, then processing continues to block 4228 for getting data details of the selected entry, and block 4230 presents the details to the user, and waits for user action. Detail presentation is similar to getting detail processing discussed for presentation by FIGS. 39A&B, FIGS. 40A&B, FIGS. 41A&B, FIGS. 46A&B, FIGS. 47A&B or FIGS. 48A&B, per object typed passed. Block 4230 continues to block 4232 upon a user action (complete/clone).

If block 4232 determines the user action from block 4230 was to exit browse, processing continues to block 4220. If block 4232 determines the user action from block 4230 was to clone the data (e.g. to make a copy for user's own use), processing continues to block 4234 for accessing permissions. Thereafter, if block 4236 determines the user does not have permission to clone, processing continues to block 4238 for reporting an error (preferably requiring the user to acknowledge before leaving block 4238 processing), and then back to block 4220. If block 4236 determines the user does have permission to clone, processing continues to block 4240 where the data item browsed is appropriately duplicated with defaulted fields as though the user of FIG. 42 processing had created new data himself. Processing then continues back to block 4220. If block 4226 determines the user did not select to get more detail on a selected item, then processing continues to block 4242.

If block 4242 determines the user selected to exit browse processing, then processing continues to block 4216 already described. If block 4242 determines the user did not select to exit, then processing continues to block 4244 where all other user actions detected at block 4222 are appropriately handled, and processing continues back to block 4222.

In an alternate embodiment, FIG. 42 will support cloning multiple entries in one action so that a first user conveniently makes use of a second user's data (like starter template(s)) for the first user to create/configure new data without entering it from scratch in the other interfaces disclosed. Another embodiment will enforce unique privileges for which data can be cloned by which user(s).

Figure 43:
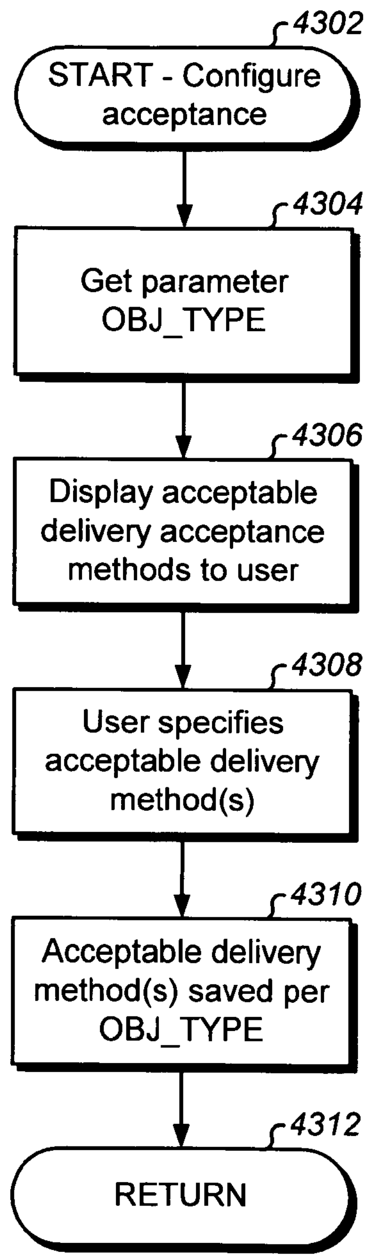
FIG. 43 depicts a flowchart for describing a preferred embodiment of a procedure for configuring MS acceptance of data from other MSs.

FIG. 43 depicts a flowchart for describing a preferred embodiment of a procedure for configuring MS acceptance of data from other MSs, for example permissions 10 and charters 12. In a preferred embodiment, permissions 10 and charters 12 contain data for not only the MS 2 but also other MSs which are relevant to the MS 2 (e.g. MS users are known to each other). Processing starts at block 4302 and continues to block 4304 where a parameter passed by a caller is determined. The parameter indicates which object type (data type) to configure delivery acceptance (e.g. PERMISSION_INFO, CHARTER_INFO). Thereafter, block 4306 displays acceptable methods for accepting data from other MSs, preferably in a radio button form in a visually perceptible user interface embodiment. A user is presented with two (2) main sets of options, the first set preferably being an exclusive selection:

- Accept no data (MS will not accept data from any source); or
- Accept all data (MS will accept data from any source); or
- Accept data according to permissions (MS will accept data according to those sources which have permission to send certain data (perhaps privilege also specifies by a certain method) to the MS).

And the second set being:

- Targeted data packet sent or broadcast data packet sent (preferably one or the other);
- Electronic Mail Application;
- SMS message; and/or
- Persistent Storage Update (e.g. file system).

Block 4306 continues to block 4308 where the user makes a selection in the first set, and any number of selections in the second set. Thereafter, processing at block 4310 saves the user's selections for the object type parameter passed, and processing returns to the caller at block 4312. LBX processing may have intelligence for an hierarchy of attempts such as first trying to send or broadcast, if that fails send by email, if that fails send by SMS message, and if that fails alert the MS user for manually copying over the data at a future time (e.g. when MSs are in wireless vicinity of each other). Block 4306 may provide a user selectable order of the attempt types. Intelligence can be incorporated for knowing which data was sent, when it was sent, and whether or not all of the send succeeded, and a synchronous or asynchronous acknowledgement can be implemented to ensure it arrived safely to destination(s). Applicable information is preferably maintained to LBX history 30 for proper implementation.

In one embodiment, the second set of configurations is further governed by individual privileges (each send type), and/or privileges per a source identity. For example, while configurations of the second set may be enabled, the MS will only accept data in a form from a source in accordance with a privilege which is enabled (set for the source identity). Privilege examples (may also each have associated time specification) include:

- Grant Joe privilege to send all types of data (e.g. charters and privileges, or certain (e.g. types, contents, features, any characteristic(s)) charters and/or privileges);
- Grant Joe privilege to send certain type of data (e.g. charters or privileges, or certain (e.g. types, contents, features, any characteristic(s)) charters and/or privileges);
- Grant Joe privilege to send certain type of data using certain method (privilege for each data type and method combination); and/or
- Grant Joe privilege to send certain type of data using certain method(s) (privilege for each data type and method combination) at certain time(s).

In another embodiment, there may be other registered applications (e.g. specified other email applications) which are candidates in the second set. This allows more choices for a receiving application with an implied receiving method (or user may specify an explicit method given reasonable choices of the particular application). For example, multiple MS instant messaging and/or email applications may be selectable in the second set of choices, and appropriately interfaced to for accepting data from other MSs. This allows specifying preferred delivery methods for data (e.g. charters and/or permissions data), and an attempt order thereof.

In some embodiments, charter data that is received may be received by a MS in a deactivated form whereby the user of the receiving MS must activate the charters for use (e.g. use of charter enabled field **3700*f* for indicating whether or not the charter is active (Y=Yes, N=No)). Field 3700*f*** may also be used by the charter originator for disabling or enabling for a variety of reasons. This permits a user to examine charters, and perhaps put them to a test, prior to putting them into use. Other embodiments support activating charters (received and/or originated): one at a time, as selected sets by user specified criteria (any charter characteristic(s)), all or none, by certain originating user(s), by certain originating MS(s), or any other desirable criteria. Of course, privileges are defined for enabling accepting privileges or charters from a MS, but many privileges can be defined for accepting privileges or charters with certain desired characteristics from a MS.

Figure 44A:
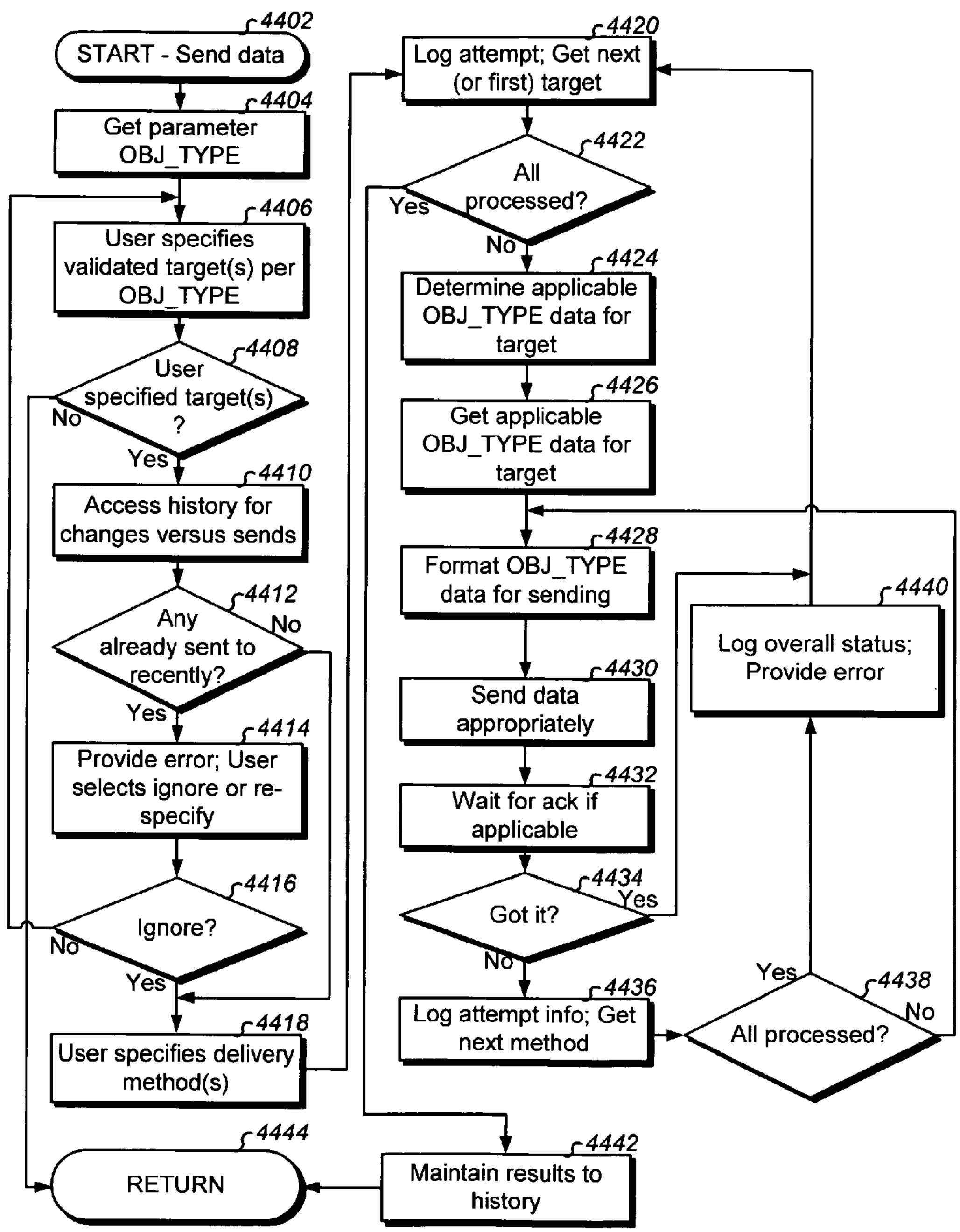
FIG. 44A depicts a flowchart for describing a preferred embodiment of a procedure for sending MS data to another MS.

FIG. 44A depicts a flowchart for describing a preferred embodiment of a procedure for sending MS data to another MS. FIG. 44A processing is preferably of linkable PIP code 6. The purpose is for the MS of FIG. 44A processing (e.g. a first, or sending, MS) to transmit information to other MSs (e.g. at least a second, or receiving, MS), for example permissions 10 or charters 12. Multiple channels for sending, or broadcasting should be isolated to modular send processing (feeding from a queue 24). In an alternative embodiment having multiple transmission channels visible to processing of FIG. 44A (e.g. block 4430), there can be intelligence to drive each channel for broadcasting on multiple channels, either by multiple send threads for FIG. 44A processing, FIG. 44A loop processing on a channel list, and/or passing channel information to send processing feeding from queue 24. If FIG. 44A does not transmit directly over the channel(s) (i.e. relies on send processing feeding from queue 24), an embodiment may provide means for communicating the channel for broadcast/send processing when interfacing to queue 24 (e.g. incorporate a channel qualifier field with send packet inserted to queue 24).

Figure 50A:
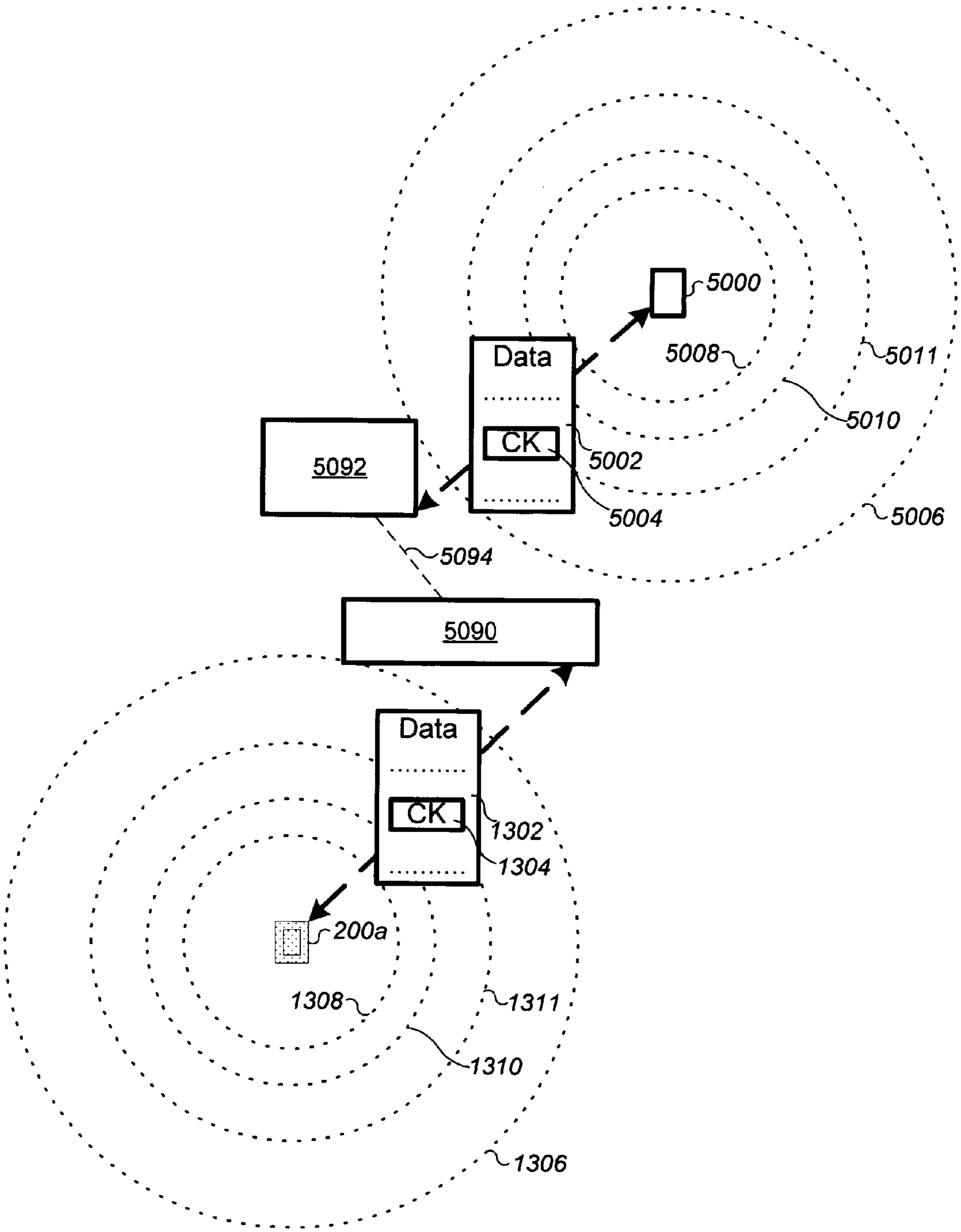
FIGS. 50A through 50C depict an illustration of data processing system wireless data transmissions over some wave spectrum.
Figure 50B:
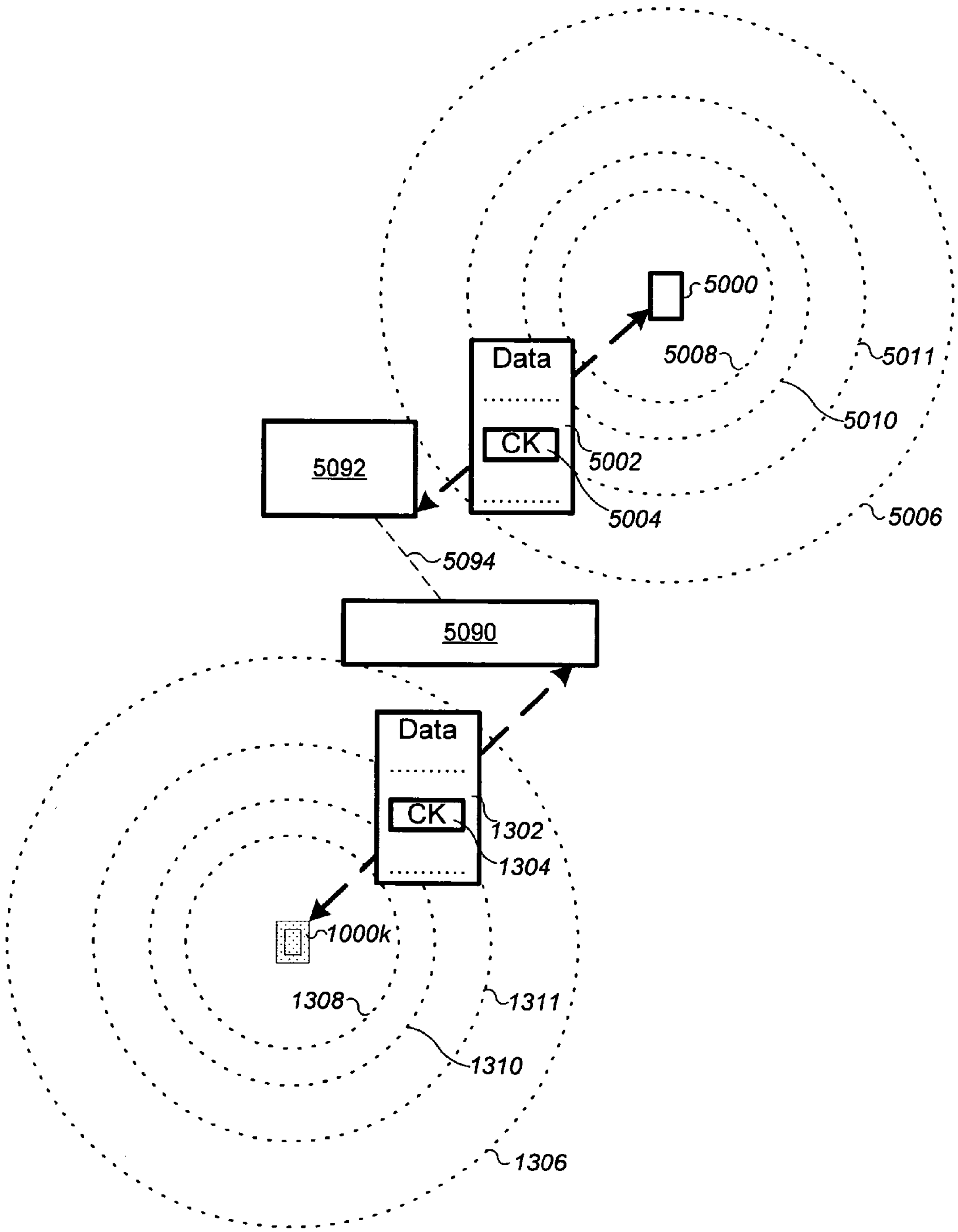
Figure 50C:
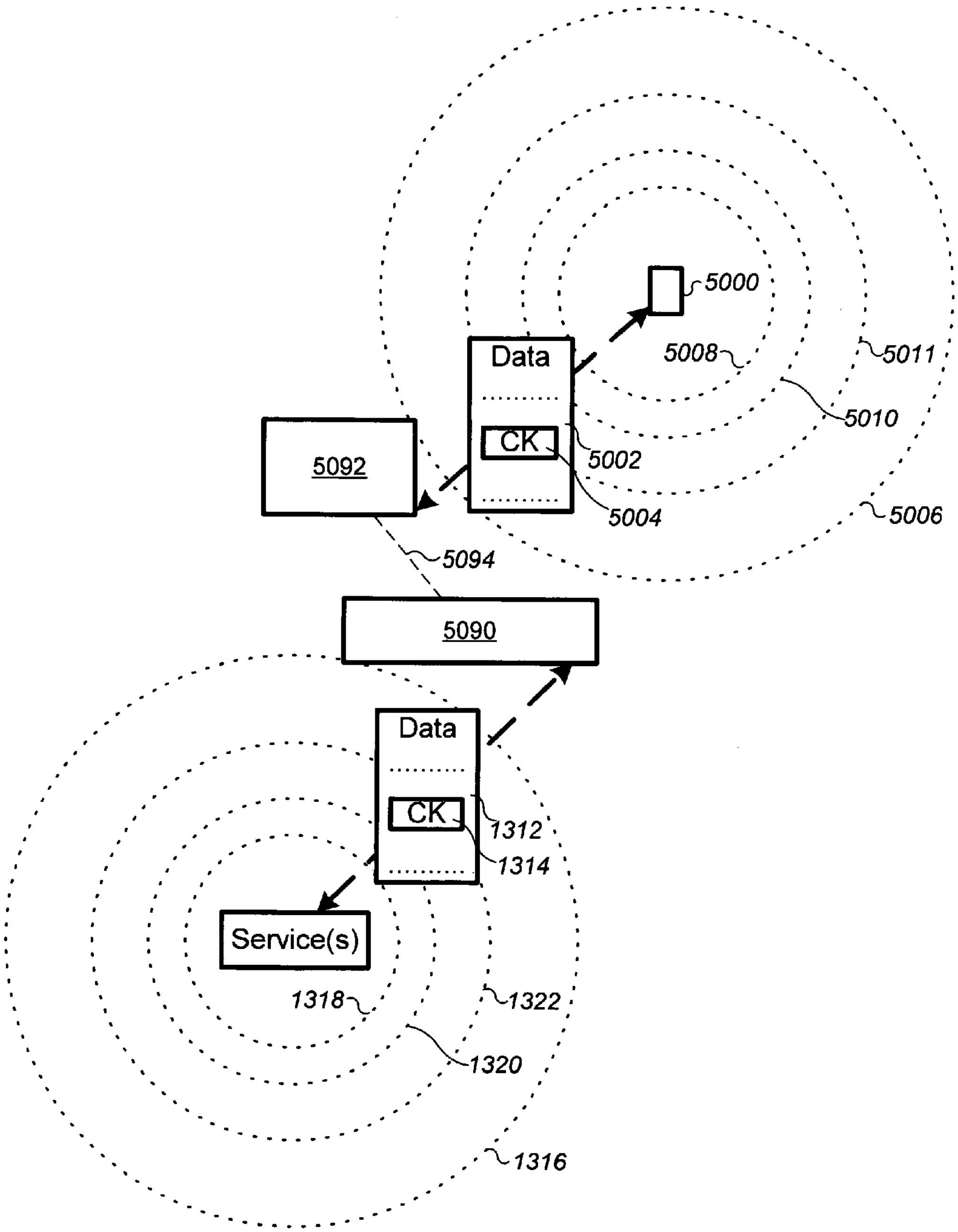

In any case, see detailed explanations of FIGS. 13A through 13C, as well as supporting exemplifications shown in FIGS. 50A through 50C, respectively. Processing begins at block 4402, continues to block 4404 where the caller parameter passed to FIG. 44A processing is determined (i.e. OBJ_TYPE), and processing continues to block 4406 for interfacing with the user to specify targets to send data to, in context of the object type parameter specified for sending (PERMISSION_INFO or CHARTER_INFO). An alternate embodiment will consult a configuration of data for validated target information. Depending on the present disclosure embodiment, a user may specify any reasonable supported (ID/IDType) combination of the BNF grammar ID construct (see FIG. 30B) as valid targets. Validation will validate at least syntax of the specification. In another embodiment, block 4406 will access and enforce known permissions for validating which target(s) (e.g. grantor(s)) can be specified. Various embodiments will also support wildcarding the specifications for a group of ID targets (e.g. department* for all department groups). Additional target information is to be specified when required for sending, for example, if email or SMS message is to be used as a send method (i.e. applicable destination recipient addresses to be specified). An alternate embodiment to block 4406 accesses mapped delivery addresses from a database, or table, (referred to as a Recipient Address Book (RAB)) associating a recipient address to a target identity, thereby alleviating the user from manual specification, and perhaps allowing the user to save to the RAB for any new useful RAB data. In another embodiment, block 4428 (discussed below) accesses the RAB for a recipient address for the target when preparing the data for sending.

Upon validation at block 4406, processing continues to block 4408. It is possible the user was unsuccessful in specifying targets, or wanted to exit block 4406 processing. If block 4408 determines the user did not specify at least one validated target (equivalent to selecting to exit FIG. 44A processing), then processing continues to block 4444 where processing returns to the caller. If block 4408 determines there is at least one target specified, then block 4410 accesses LBX history 30 to determine if any of the targets have been sent the specific data already. Thereafter, if block 4412 determines the most recently updated data for a target has already been sent, then block 4414 presents an informative error to the user, preferably requiring user action. Block 4414 continues to block 4416 when the user performs the action. If block 4416 determines the user selected to ignore the error, then processing continues to block 4418, otherwise processing continues back to block 4406 for updating target specifications.

Block 4418 interfaces with the user to specify a delivery method. Preferably, there are defaulted setting(s) based on the last time the user encountered block 4418. Any of the "second set" of options described with FIG. 43 can be made. Thereafter, block 4420 logs to LBX history 30 the forthcoming send attempt and gets the next target from block 4406 specifications before continuing to block 4422. If block 4422 determines that all targets have not been processed, then block 4424 determines applicable OBJ_TYPE data for the target (e.g. check LBX history 30 for any new data that was not previously successfully sent), and block 4426 gets (e.g. preferably new data, or all, depending on embodiment) the applicable target's OBJ_TYPE data (permissions or charters) before continuing to block 4428. Block 4428 formats the data for sending in accordance with the specified delivery method, along with necessary packet information (e.g. source identity, wrapper data, etc) of this loop iteration (from block 4418), and block 4430 sends the data appropriately. For a broadcast send, block 4430 broadcasts the information (using a send interface like interface 1906) by inserting to queue 24 so that send processing broadcasts data 1302 (e.g. on all available communications interface(s) 70), for example as far as radius 1306, and processing continues to block 4432. The broadcast is for reception by data processing systems (e.g. MSs) in the vicinity (see FIGS. 13A through 13C, as further explained in detail by FIGS. 50A through 50C which includes potentially any distance). For a targeted send, block 4430 formats the data intended for recognition by the receiving target. Block 4430 causes sending/broadcasting data 1302 containing CK 1304, depending on the type of MS, wherein CK 1304 contains information appropriately. In a send email embodiment, confirmation of delivery status may be used to confirm delivery with an email interface API to check the COD (Confirmation of Delivery) status, or the sending of the email (also SMS message) is assumed to have been delivered in one preferred embodiment.

In an embodiment wherein usual MS communications data 1302 of the MS is altered to contain CK 1304 for listening MSs in the vicinity, send processing feeding from queue 24, caused by block 4430 processing, will place information as CK 1304 embedded in usual data 1302 at the next opportune time of sending usual data 1302. This embodiment will replace synchronous sending success validation of blocks 4432 through 4440 and multiple delivery methods of 4418 (and subsequent loop processing) with status asynchronously updated by the receiving MS(s) for a single type of delivery method selected at block 4418. An alternate embodiment will attempt the multiple send types in an appropriate asynchronous thread of processing depending on success of a previous attempt. As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 44A sends/broadcasts new data 1302.

For sending an email, SMS message, or other application delivery method, block 4430 will use the additional target information (recipient address) specified via block 4406 for properly sending. Thereafter, block 4432 waits for a synchronous acknowledgement if applicable before either receiving one or timing out. If a broadcast was made, one (1) acknowledgement may be all that is necessary for validation, or all anticipated targets can be accounted for before deeming a successful ack. An email, SMS message, or other application send may be assumed reliable and that an ack was received. Thereafter, if block 4434 determines an applicable ack was received (i.e. data successfully sent/received), or none was anticipated (i.e. assume got it), then processing continues back to block 4420 for processing any next target(s). If block 4434 determines an anticipated ack was not received, then block 4436 logs the situation to LBX history 30 and the next specified delivery method is accessed. Thereafter, if block 4438 determines all delivery methods have already been processed for the current target, then processing continues to block 4440 for logging the overall status and providing an error to the user. Block 4440 may require a user acknowledgement before continuing back to block 4420. If block 4438 determines there is another specified delivery method for sending, then processing continues back to block 4428 for sending using the next method.

Referring back to block 4422, if all targets are determined to have been processed, then block 4442 maintains FIG. 44A processing results to LBX history 30 and the caller is returned to at block 4444. In an alternate embodiment to FIG. 44A processing, a trigger implementation is used for sending/broadcasting data at the best possible time (e.g. when new/modified permissions or charters information is made for a target) as soon as possible, as soon as a target is detected to be nearby, or in the vicinity (vicinity is expanded as explained by FIGS. 50A through 50C), or as soon as the user is notified to send (e.g. in response to a modification) and then acknowledges to send. See FIGS. 50A through 50C for explanation of communicating data from a first MS to a second MS over greater distances. In another embodiment, background thread(s) timely poll (e.g. per user or system configurations) the permissions and/or charters data to determine which data should be sent, how to send it, who to send it to, what applicable permissions are appropriate, and when the best time is to send it. A time interval, or schedule, for sending data to others on a continual interim basis may also be configured. This may be particularly useful as a user starts using a MS for the first time and anticipates making many configuration changes. The user may start or terminate polling threads as part of FIGS. 14A/14B processing, so that FIG. 44A is relied on to make sure permissions and/or charters are communicated as needed. Appropriate blocks of FIGS. 44A&B will also interface to statistics 14 for reporting successes, failures and status of FIGS. 44A&B processing.

Figure 44B:
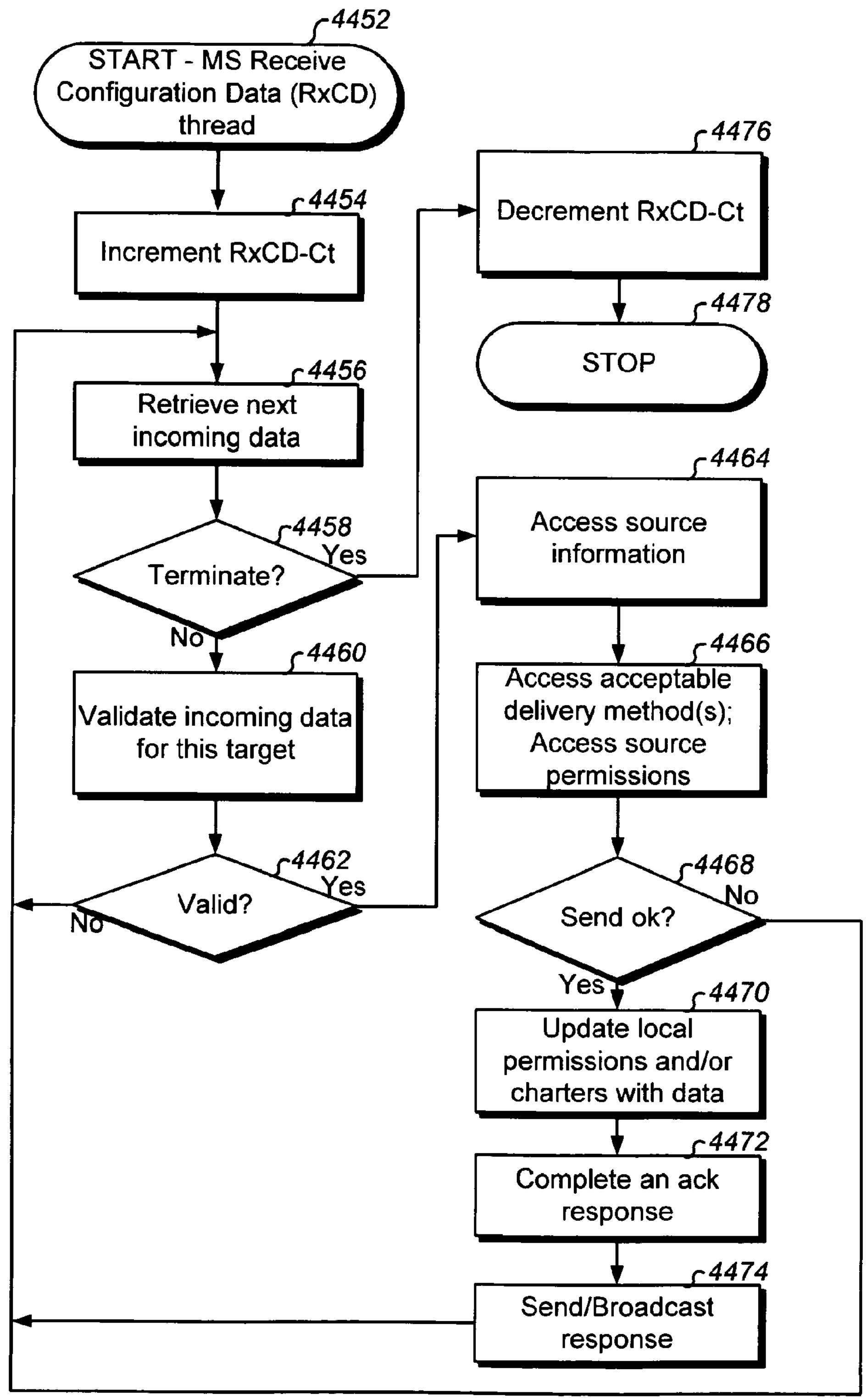
FIG. 44B depicts a flowchart for describing a preferred embodiment of receiving MS configuration data from another MS.

In sum, FIGS. 44A and 44B provide a LBX peer to peer method for ensuring permissions and charters are appropriately maintained at MSs, wherein FIG. 44A sends in a peer to peer fashion and FIG. 44B receives in a peer to peer to fashion. Thus, permissions 10 and charters 12 are sent from a first MS to a second MS for configuring maintaining, enforcing, and/or processing permissions 10 and charters 12 at an MS. There is no intermediary service required for permissions and charters for LBX interoperability. FIG. 44A demonstrates a preferred push model. A pull model may be alternatively implemented. An alternative embodiment may make a request to a MS for its permissions and/or charters and then populate its local image of the data after receiving the response. Privileges would be appropriately validated at the sending MS(s) and/or receiving MS(s) in order to ensure appropriate data is sent/received to/from the requesting MS.

FIG. 44B depicts a flowchart for describing a preferred embodiment of receiving MS configuration data from another MS. FIG. 44B processing describes a Receive Configuration Data (RxCD) process worker thread, and is of PIP code 6. There may be many worker threads for the RxCD process, just as described for a 19xx process. The receive configuration data (RxCD) process is to fit identically into the framework of architecture 1900 as other 19xx processes, with specific similarity to process 1942 in that there is data received from receive queue 26, the RxCD thread(s) stay blocked on the receive queue until data is received, and a RxCD worker thread sends data as described (e.g. using send queue 24). Blocks 1220 through 1240, blocks 1436 through 1456 (and applicable invocation of FIG. 18), block 1516, block 1536, blocks 2804 through 2818, FIG. 29A, FIG. 29B, and any other applicable architecture 1900 process/thread framework processing is to adapt for the new RxCD process. For example, the RxCD process is initialized as part of the enumerated set at blocks 1226 (preferably last member of set) and 2806 (preferably first member of set) for similar architecture 1900 processing. Receive processing identifies targeted/broadcasted data (permissions and/or charter data) destined for the MS of FIG. 44B processing. An appropriate data format is used, for example the X.409 encoding of FIGS. 33A through 33C wherein RxCD thread(s) purpose is for the MS of FIG. 44B processing to respond to incoming data. It is recommended that validity criteria set at block 1444 for RxCD-Max be set as high as possible (e.g. 10) relative performance considerations of architecture 1900, to service multiple data receptions simultaneously. Multiple channels for receiving data fed to queue 26 are preferably isolated to modular receive processing.

In an alternative embodiment having multiple receiving transmission channels visible to the RxCD process, there can be a RxCD worker thread per channel to handle receiving on multiple channels simultaneously. If RxCD thread(s) do not receive directly from the channel, the preferred embodiment of FIG. 44B would not need to convey channel information to RxCD thread(s) waiting on queue 24 anyway. Embodiments could allow specification/configuration of many RxCD thread(s) per channel.

A RxCD thread processing begins at block 4452 upon the MS receiving permission data and/or charter data, continues to block 4454 where the process worker thread count RxCD-Ct is accessed and incremented by 1 (using appropriate semaphore access (e.g. RxCD-Sem)), and continues to block 4456 for retrieving from queue 26 sent data (using interface like interface 1948), perhaps a special termination request entry, and only continues to block 4458 when a record of data (permission/charter data, or termination record) is retrieved. In one embodiment, receive processing deposits X.409 encoding data as record(s) to queue 26, and may break up a datastream into individual records of data from an overall received (or ongoing) datastream. In another embodiment, XML is received and deposited to queue 26, or some other suitable syntax is received as derived from the BNF grammar. In another embodiment, receive processing receives data in one format and deposits a more suitable format for FIG. 44B processing. Receive processing embodiments may deposit "piece-meal" records of data as sent, "piece-meal" records broken up from data received, full charter or permission datastreams and/or subsets thereof to queue 26 for processing by FIG. 44B.

Block 4456 stays blocked on retrieving from queue 26 until any record is retrieved, in which case processing continues to block 4458. If block 4458 determines a special entry indicating to terminate was not found in queue 26, processing continues to block 4460. There are various embodiments for RxCD thread(s), thread(s) 1912 and thread(s) 1942 to feed off a queue 26 for different record types, for example, separate queues 26A, 26B and 26C, or a thread target field with different record types found at queue 26 (e.g. like field 2400*a*). In another embodiment, there are separate queues 26C and 26D for separate processing of incoming charter and permission data. In another embodiment, thread(s) 1912 are modified with logic of RxCD thread(s) to handle permission and/or charter data records, since thread(s) 1912 are listening for queue 26 data anyway. In another embodiment, there are segregated RxCD threads RxCD-P and RxCD-C for separate permission and charter data processing.

Block 4460 validates incoming data for this targeted MS before continuing to block 4462. A preferred embodiment of receive processing already validated the data is intended for this MS by having listened specifically for the data, or by having already validated it is at the intended MS destination (e.g. block 4458 can continue directly to block 4464 (no block 4460 and block 4462 required)). If block 4462 determines the data is valid for processing, then block 4464 accesses the data source identity information (e.g. owner information, sending MS information, grantor/grantee information, etc, as appropriate for an embodiment), block 4466 accesses acceptable delivery methods and/or permissions/privileges for the source identity to check if the data is eligible for being received, and block 4468 checks the result. Depending on an embodiment, block 4466 may enforce an all or none privilege for accepting the privilege or charter data, or may enforce specific privileges from the receiving MS (MS user) to the sending MS (MS user) for exactly which privileges or charters are acceptable to be received and locally maintained.

If block 4468 determines the delivery is acceptable (and perhaps privileged, or privileged per source), then block 4470 appropriately updates the MS locally with the data (depending on embodiment of 4466, block 4470 may remove from existing data at the MS as well as per privilege(s)), block 4472 completes an acknowledgment, and block 4474 sends/broadcasts the acknowledgement (ack), before continuing back to block 4456 for more data. Block 4474 sends/broadcasts the ack (using a send interface like interface 1946) by inserting to queue 24 so that send processing transmits data 1302, for example as far as radius 1306. Embodiments will use the different correlation methods already discussed above, to associate an ack with a send. In some embodiments, block 4470 may default field 3700$f$ in the case of receiving charter records.

If block 4468 determines the data is not acceptable, then processing continues directly back to block 4456. For security reasons, it is best not to respond with an error. It is best to ignore the data entirely. In another embodiment, an error may be returned to the sender for appropriate error processing and reporting. Referring back to block 4462, if it is determined that the data is not valid, then processing continues back to block 4456.

Referring back to block 4458, if a worker thread termination request was found at queue 26, then block 4476 decrements the RxCD worker thread count by 1 (using appropriate semaphore access (e.g. RxCD-Sem)), and RxCD thread processing terminates at block 4478. Block 4476 may also check the RxCD-Ct value, and signal the RxCD process parent thread that all worker threads are terminated when RxCD-Ct equals zero (0).

Block 4474 causes sending/broadcasting data 1302 containing CK 1304, depending on the type of MS, wherein CK 1304 contains ack information prepared. In the embodiment wherein usual MS communications data 1302 of the MS is altered to contain CK 1304 for listening MSs in the vicinity, send processing feeding from queue 24, caused by block 4474 processing, will place ack information as CK 1304 embedded in usual data 1302 at the next opportune time of sending usual data 1302. As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 44B sends/broadcasts new ack data 1302.

In an alternate embodiment, permission and/or charter data records contain a sent date/time stamp field of when the data was sent by a remote MS, and a received date/time stamp field (like field 2490$c$) is processed at the MS in FIG. 44B processing. This would enable calculating a TDOA measurement while receiving data (e.g. permissions and/or charter data) that can then be used for location determination processing as described above.

For other acceptable receive processing, methods are well known to those skilled in the art for "hooking" customized processing into application processing of sought data received. For example, in an email application, a callback function API is preferably made available to the present disclosure so that every time an applicable received email distribution is received with specified criteria (e.g. certain subject, certain attached file name, certain source, or any other identifiable email attribute(s) (provided by present disclosure processing to API)) sent by block 4430, the callback function (provided by present disclosure processing to the appropriate API) is invoked for custom processing. In this example, the present disclosure invokes the callback API for providing: the callback function to be invoked, and the email criteria for triggering invocation of the callback function; for processing of permissions or charter data. For example, a unique subject field indicates to the email application that the email item should be directed by the email application to the callback function for processing. The present disclosure callback function then parses permissions and/or charter information from the email item and updates local permissions 10 and/or charters 12. Data received in the email item may be textual syntax derived from the BNF grammar in an email body or attached file form, XML syntax derived from the BNF grammar in email body or attached file form, an X.409 binary encoding in attached file form, or other appropriate format received with the email item (e.g. new Document Interchange Architecture (DIA) attribute data, etc). DIA is an IBM electronic mail (email) interchange protocol standard between email systems. A process return status is preferably returned by the callback function, for example for appropriate email confirmation of delivery processing.

In another embodiment, the present disclosure provides at least one thread of processing for polling a known API, or email repository, for sought criteria (e.g. attributes) which identifies the email item as destined for present disclosure processing. Once the email item(s) are found, they are similarly parsed and processed for updating permissions 10 and/or charters 12.

Thus, there are well known methods for processing data in context of this disclosure for receiving permissions 10 and/or charters 12 from an originating MS to a receiving MS, for example when using email. Similarly (callback function or polling), SMS messages can be used to communicate data 10 and/or 12 from one MS to another MS, albeit at smaller data exchange sizes. The sending MS may break up larger portions of data which can be sent as parse-able text (e.g. source syntax, XML, etc. derived from the BNF grammar) to the receiving MS. It may take multiple SMS messages to communicate the data in its entirety.

Regardless of the type of receiving application, those skilled in the art recognize many clever methods for receiving data in context of a MS application which communicates in a peer to peer fashion with another MS (e.g. callback function(s), API interfaces in an appropriate loop which can remain blocked until sought data is received for processing, polling known storage destinations of data received, or other applicable processing).

Permission data 10 and charter data 12 may be manually copied from one MS to another over any appropriate communications connection between the MSs. Permission data 10 and charter data 12 may also be manually copied from one MS to another MS using available file management system operations (move or copy file/data processing). For example, a special directory can be defined which upon deposit of a file to it, processing parses it, validates it, and uses it to update permissions 10 and/or charters 12. Errors found may also be reported to the user, but preferably there are automated processes that create/maintain the file data to prevent errors in processing. Any of a variety of communications wave forms can be used depending on MS capability.

Figure 45A:
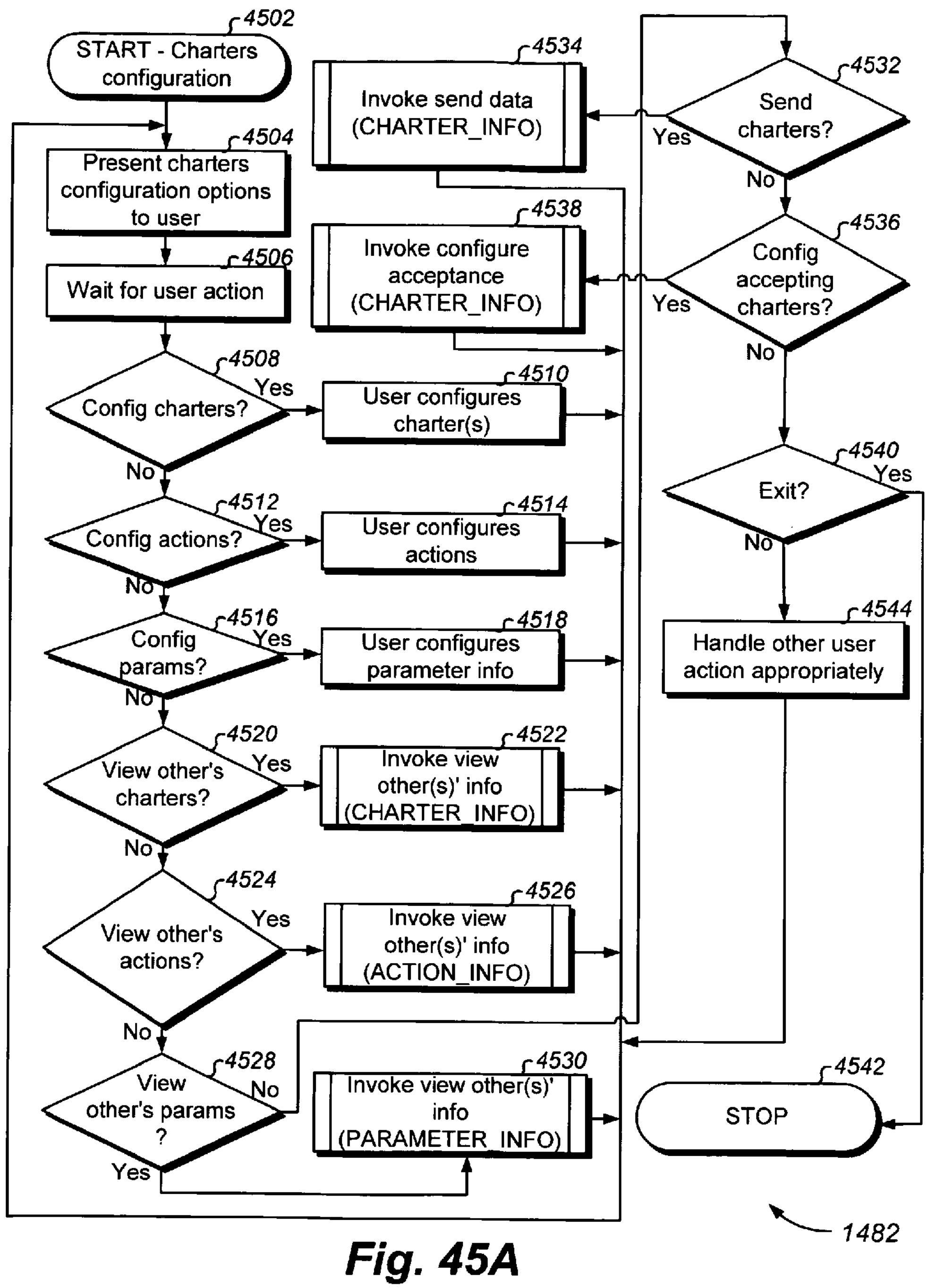
FIG. 45A depicts a flowchart for describing a preferred embodiment of MS charters configuration processing.

FIG. 45A depicts a flowchart for describing a preferred embodiment of MS charters configuration processing of block 1482. FIG. 45A is of Self Management Processing code 18. Processing starts at block 4502 and continues to block 4504 where a list of charters configuration options are presented to the user. Thereafter, block 4506 waits for a user action in response to options presented. Block 4506 continues to block 4508 when a user action has been detected. If block 4508 determines the user selected to configure charters data, then the user configures charters data at block 4510 (see FIG. 46A) and processing continues back to block 4504. If block 4508 determines the user did not select to configure charters data, then processing continues to block 4512. If block 4512 determines the user selected to configure actions data, then the user configures actions data at block 4514 (see FIG. 47A) and processing continues back to block 4504. If block 4512 determines the user did not select to configure actions data, then processing continues to block 4516. If block 4516 determines the user selected to configure parameter data, then the user configures parameter data at block 4518 (see FIG. 48A) and processing continues back to block 4504. If block 4516 determines the user did not select to configure parameter data, then processing continues to block 4520. If block 4520 determines the user selected to view other's charter data, then block 4522 invokes the view other's info processing of FIG. 42 with CHARTER_INFO as a parameter (for viewing other's charter data) and processing continues back to block 4504. If block 4520 determines the user did not select to view other's charter data, then processing continues to block 4524. If block 4524 determines the user selected to view other's actions data, then block 4526 invokes the view other's info processing of FIG. 42 with ACTION_INFO as a parameter (for viewing other's action data) and processing continues back to block 4504. If block 4524 determines the user did not select to view other's action data, then processing continues to block 4528. If block 4528 determines the user selected to view other's parameter data, then block 4530 invokes the view other's info processing of FIG. 42 with PARAMETER_INFO as a parameter (for viewing other's parameter data information) and processing continues back to block 4504. If block 4528 determines the user did not select to view other's parameter data, then processing continues to block 4532. If block 4532 determines the user selected to send charters data, then block 4534 invokes the send data processing of FIG. 44A with CHARTER_INFO as a parameter (for sending charters data) and processing continues back to block 4504. If block 4532 determines the user did not select to send charters data, then processing continues to block 4536. If block 4536 determines the user selected to configure accepting charters, then block 4538 invokes the configure acceptance processing of FIG. 43 with CHARTER_INFO as a parameter (for configuring acceptance of charters data) and processing continues back to block 4504. If block 4536 determines the user did not select to configure accepting charters, then processing continues to block 4540. If block 4540 determines the user selected to exit block 1482 processing, then block 4542 appropriately completes block 1482 processing. If block 4540 determines the user did not select to exit, then processing continues to block 4544 where all other user actions detected at block 4506 are appropriately handled, and processing continues back to block 4504.

In an alternate embodiment where the MS maintains GDRs, GADRs, CDRs, ADRS, PARMDRs and GRPDRs (and their associated data records DDRs, HDRs and TDRs) at the MS where they were configured, FIG. 45A may not provide blocks 4520 through 4530. The MS may be aware of its user charters and need not share the data (i.e. self contained). In some embodiments, options 4520 through 4530 cause access to locally maintained data for others (other users, MSs, etc) or cause remote access to data when needed (e.g. from the remote MSs). In the embodiment where no data is maintained locally for others, blocks 4532 through 4538 may not be necessary. In sum, the preferred embodiment is to locally maintain charters data for the MS user and others (e.g. MS users) which are relevant to provide the richest set of charters governing MS processing at the MS.

Figure 45B:
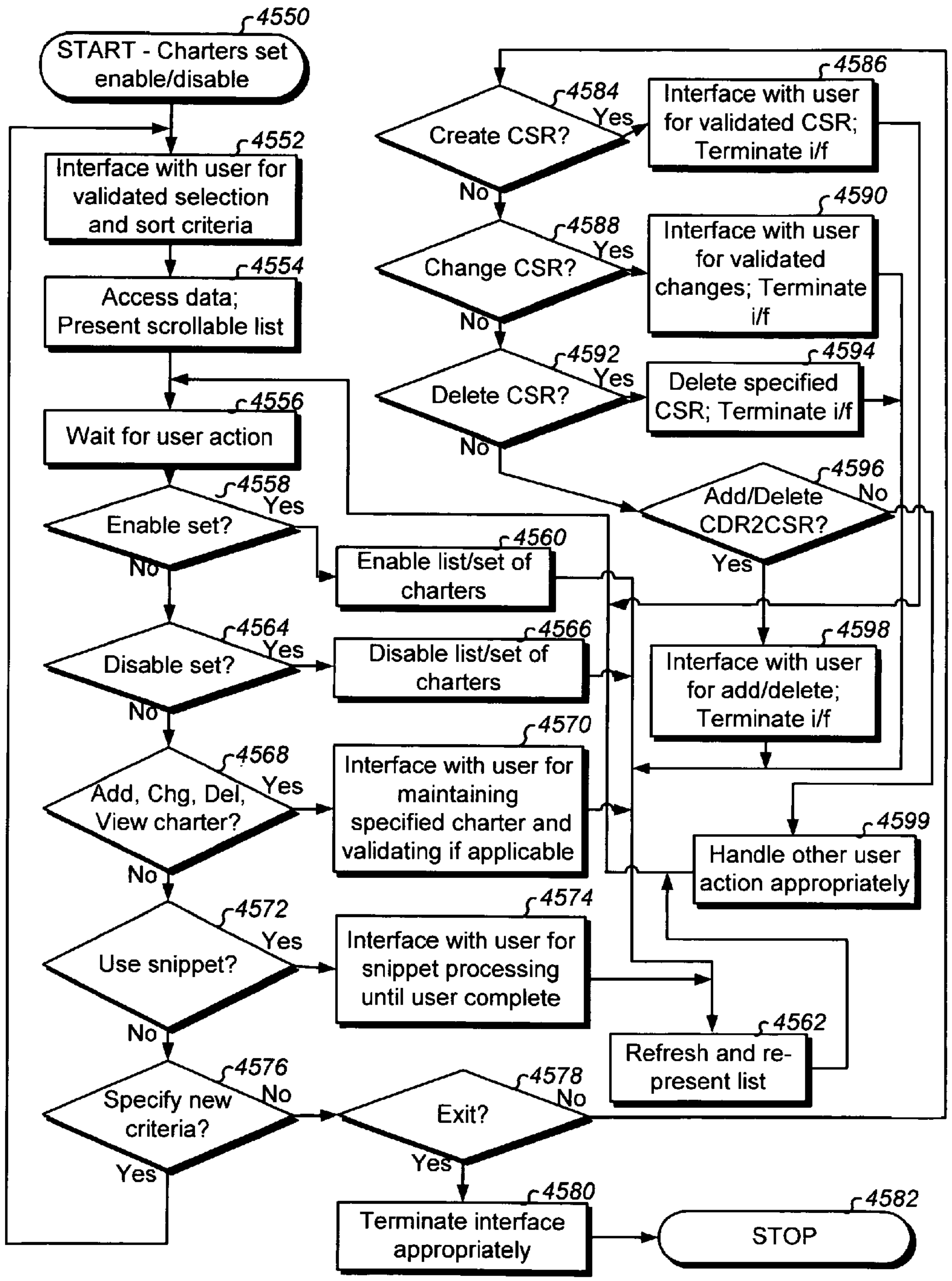
FIG. 45B depicts a flowchart for describing a preferred embodiment of MS charter enablement and disablement processing.

FIG. 45B depicts a flowchart for describing a preferred embodiment of MS charter enablement and disablement processing. FIG. 45B provides a convenient method for a user to enable or disable a specified set of charters. FIG. 45B also provides means for maintaining charters starters schema. While CSR records 3790 and CDR2CSR records 3795 may be defaulted ahead of time for a MS, a user can create, change or delete CSRs and associated CDR2CSRs as desired. In one embodiment, block 1496 may be modified to include new blocks **1496*h*, 1496*i*, and 1496*c*** such that:

- Block **1496*h* checks to see if the user selected to configure enablement or disablement of charters—an option for configuration at block 1406 wherein the user action to configure it is detected at block 1408**;
- Block **1496*i* is processed if block 1496*h* determines the user did select to configure charters for enabled/disable. Block 1496*i* invokes FIG. 45B for interfacing with the user accordingly, and processing then continues to block 1496*c***.
- Block **1496*c* is processed if block 1496*h* determines the user did not select to configure charters for enable/disable, or as the result of processing leaving block 1496*i*. Block 1496*c* handles other user interface actions leaving block 1408 (e.g. becomes the "catch all" as currently shown in block 1496 of FIG. 14**B).

CSR configuration begins at block 4550 upon a user action to present the interface. In one embodiment, the user is an authenticated administrator prior to being permitted to get access to processing of FIG. 45B. Block 4550 continues to block 4552 where the user is able to specify which search criteria to use against CSR fields, charter fields and sort preferences thereof. Any view of charters can be retrieved using any combination of values of CSRs, CDRs, ADRs, and PARMDRs. For example, all charters using certain atomic commands, expressions conditions, etc may be searched and provided in a list for enablement or disablement as a set. In a simple example, the user specifies to retrieve all charters associated to a category of "Shopping" (e.g. found in field **3790*c*), and associated to the applications of "Calendar" and "Messaging" (e.g. found in field 3790*b*), in a sorted key order of category first and application next, both in alphabetic ascending order. Snippets field 3790*d* may also be specified by the user for search. Various block 4552 embodiments support searching on entire entries of any of the CSR or charter record fields, or in any subset string(s) of the fields. Sort order can be ascending or descending with a specified key order (e.g. 3790*c* first, then 3790*b*** within each of those rows found).

Thereafter, block 4554 accesses all joined CSRs and CDRs through the CDR2CSR records 3795 for returning all sought charters. Preferably, CSRs drive the ability to correlate associated CDRs when searching on at least one CSR field (e.g. SQL inner join). Processing preferably presents the list of charters found as a list of entries wherein each entry contains enough information to determine there is a unique charter, which search criteria it pertains to, and whether or not it is currently enabled or disabled (e.g. field **3700*f*). Also, each entry has associated to it the charter id field 3795*a* and charter starter id field 3795*b* for convenient subsequent I/O operations. Thereafter, block 4556 waits for a user action in response to the list which can be scrolled, and a specific entry selected for an applicable action. Block 4556 continues to block 4558** when a user action is detected.

If block 4558 determines the user selected to enable all charters of the list presented at block 4554, then block 4560 updates all the charters to enabled (e.g. updates field **3700*f* to enabled), block 4562 refreshes and re-presents the list to reflect changes, and processing continues back to block 4556. If block 4558 determines the user did not select to enable the search result charters of the list, then processing continues to block 4564**.

If block 4564 determines the user selected to disable all charters of the list presented at block 4554, then block 4566 updates all the charters to disabled (e.g. updates field 3700*f* to disabled), block 4562 refreshes and re-presents the list to reflect changes, and processing continues back to block 4556. If block 4564 determines the user did not select to disable the search result charters of the list, then processing continues to block 4568.

If block 4568 determines the user selected to manage (i.e. add, change, delete, view details, etc) information of a specific charter of the list, block 4570 interfaces with the user for managing/maintaining the specified charter information and validating any modifications if applicable before continuing to block 4562 already described. If block 4568 determines the user did not select to manage a charter, then processing continues to block 4572. Blocks 4568 and 4570 may include processing for managing charter data as already described in FIGS. 45A, 46A, 46B, 47A, 47B, 48A and 48B. It should be understood that applicable charter management processing of those Figures can be embodied in FIG. 45B for user convenience.

If block 4572 determines the user selected to use at least one snippet of a charter list entry, then block 4574 accesses data of associated field 3790*d* where the user can select at least one snippet for in turn creating a new charter. Block 4574 enables a user to make use of charter snippets as executable starters for new charters. Thereafter, processing continues to block 4562. If block 4572 determines the user did not select to use snippet data, then processing continues to block 4576. An enabled or disabled charter may be created as a result of block 4574 if the user desires so. Snippets are charter portions (i.e. subsets) which make it convenient to clone, and from which to create new charters. In some embodiments, a reasonable plurality of subset snippets is automatically generated from charter data when adding a CDR2CSR record (block 4598). If more than one charter is joinable to the CSR, then many snippets may potentially be automatically made from associated charters for subsequent use at block 4574.

If block 4576 determines the user selected to specify new search criteria, then processing continues back to block 4552, otherwise processing continues to block 4578.

If block 4578 determines the user selected to exit FIG. 45B processing, then block 4580 terminates the FIG. 45B interface and block 4582 terminates FIG. 45B processing. If block 4578 determines the user did not select to exit, then processing continues to block 4584.

If block 4584 determines the user selected to create a CSR, then block 4586 interfaces with the user to create one and terminate that interface before processing continues back to block 4556 since there are no list changes. If block 4584 determines the user did not select to create a CSR, then processing continues to block 4588.

If block 4588 determines the user selected to change a CSR associated to a particular charter list entry, then block 4590 interfaces with the user to modify it, validate any changes, and terminate that interface before processing continues to block 4562. Any charters of the list from the search result that now do not meet the search criteria are removed from the list at block 4562 processing. Any charters of the list from the search result that now newly meet the search criteria are added to the list at block 4562 processing. If block 4588 determines the user did not select to change a CSR, then processing continues to block 4592.

If block 4592 determines the user selected to delete a CSR associated to a particular charter list entry, then block 4594 interfaces with the user to delete it and terminate that interface before processing continues to block 4562. Any charters of the list from the search result that do not meet the search criteria are removed from the list at block 4562 processing. If block 4592 determines the user did not select to delete a CSR, then processing continues to block 4596.

If block 4596 determines the user selected to add a CSR or delete a list entry CSR, then block 4598 interfaces with the user to add or delete before terminating that interface and continuing processing to block 4562. In a preferred embodiment, the associated snippet(s) field 3790*d* is automatically updated with reasonable useful charter subsets (e.g. conditions, expressions, actions, etc). In another embodiment, a user manually updates CSR field 3790*d* at blocks 4586 and 4590. Any charters of the list from the search result that do not meet the search criteria are removed from the list at block 4562 processing. Any charters of the list from the search result that now newly meet the search criteria are added to the list at block 4562 processing. If block 4596 determines the user did not select to add or delete a CDR2CSR, then processing continues to block 4599 where any other action leaving block 4556 is appropriately handled. Block 4599 continues to block 4556.

In some embodiments, and in accordance with permissions, users may access another user's data for the same FIG. 45B processing to maintain another user's data and make use of other's snippets. It may be useful to determine which of other's charters should be enabled or disabled. In other embodiments, snippets may include tag fields to identify a snippet description for facilitating which snippets to use, or for what purpose to use snippets. Snippets provide building blocks to build new and useful charters. A user may use his own or other's snippets to create new charters. In an alternate embodiment, categories and applications are maintained as folders for encapsulating and organizing charters, and may be visually presented that way to a user for easy interpretation (as opposed to charters starters schema of FIG. 37D). The most recent set of enabled charters are those that remain in effect from that point in time forward for MS processing. In other embodiments, configured charters for WITS processing are affected (e.g. removed, altered, etc) by FIG. 45B processing.

Figure 46A:
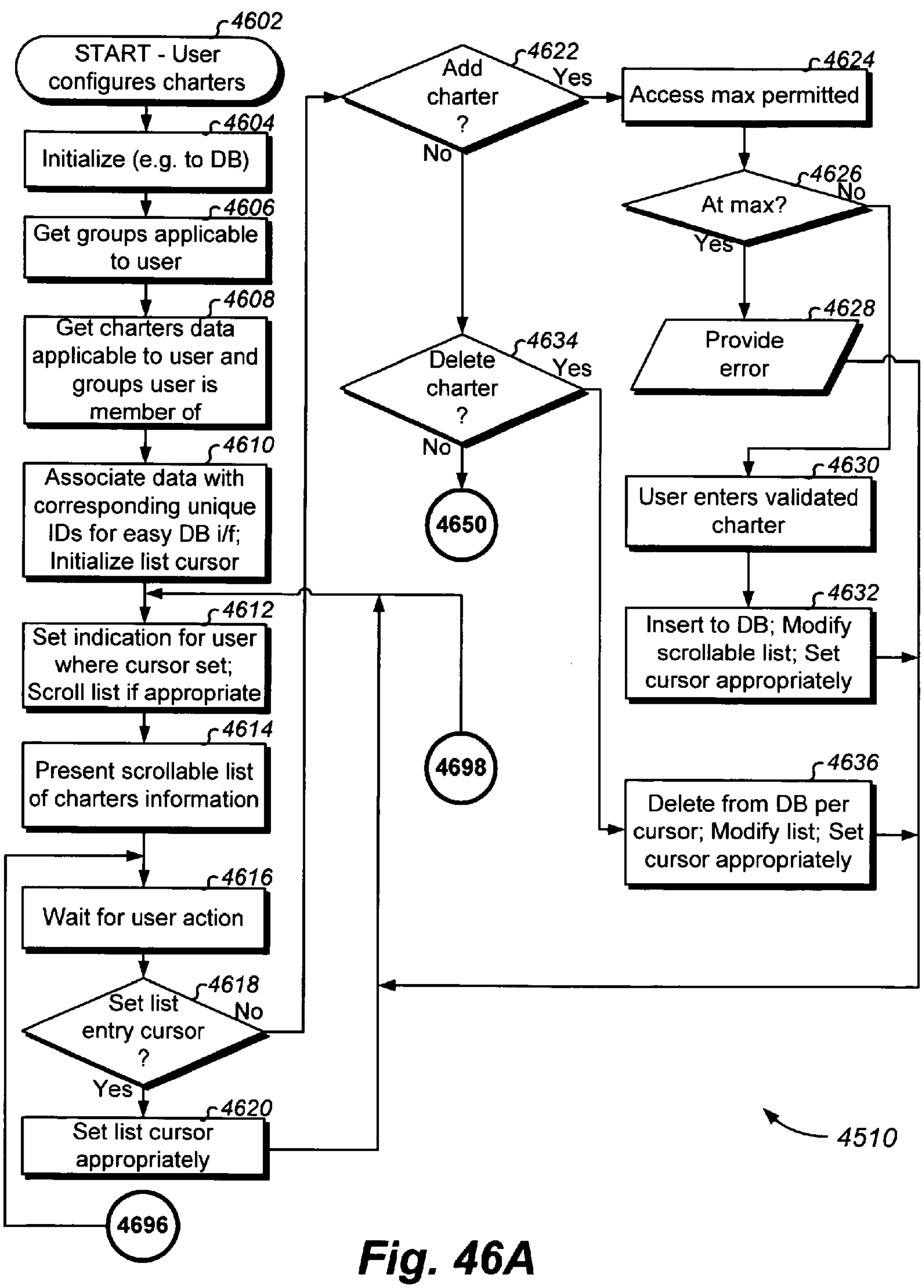
FIGS. 46A through 46B depict flowcharts for describing a preferred embodiment of MS user interface processing for charters configuration.
Figure 46B:
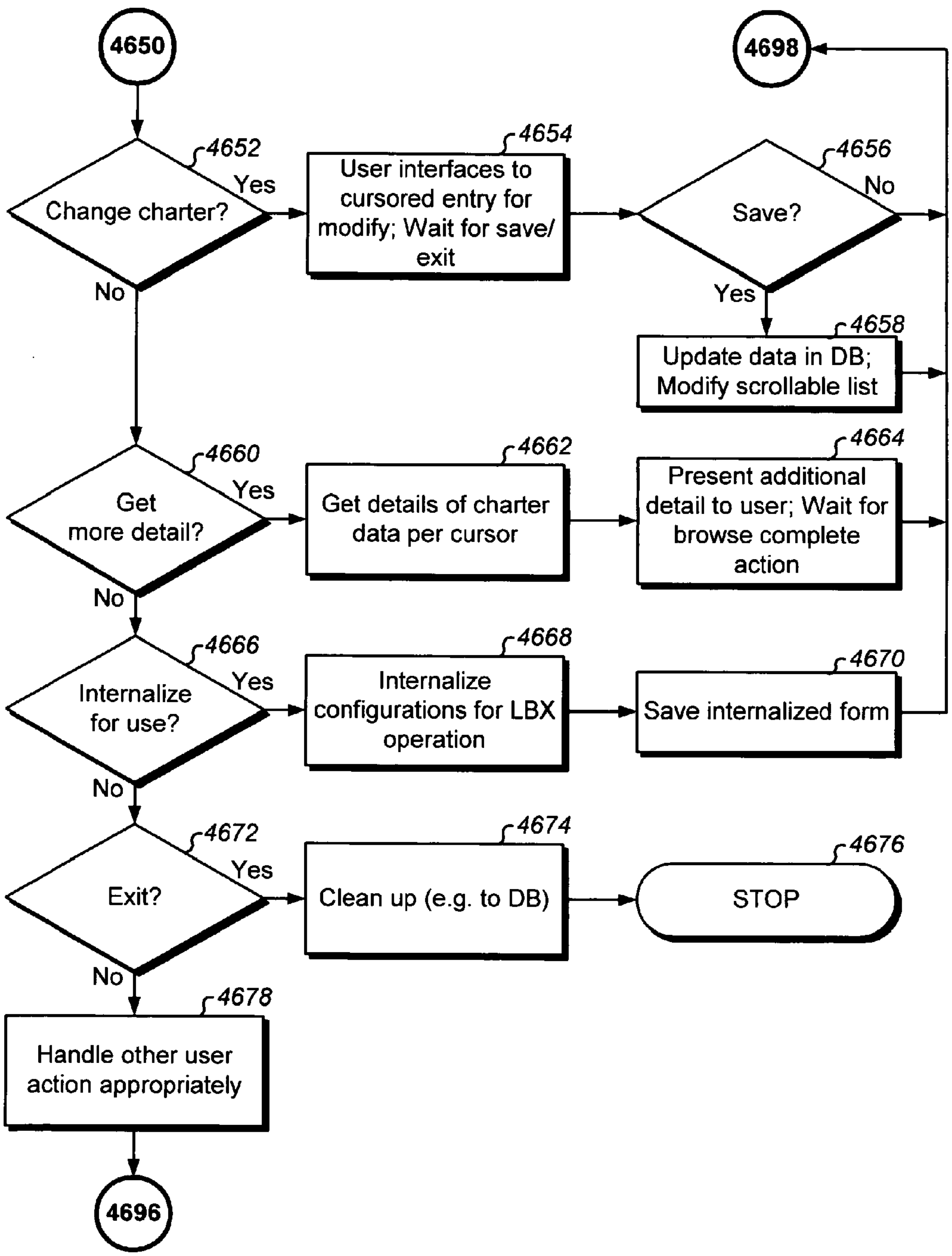

FIGS. 46A through 46B depict flowcharts for describing a preferred embodiment of MS user interface processing for charters configuration of block 4510. With reference now to FIG. 46A, processing starts at block 4602, continues to block 4604 for initialization (e.g. a start using database command), and then to block 4606 where groups the user is a member of are accessed. Block 4606 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR is a derivative embodiment which happens to not distinguish. Alternate embodiments may carry a group type field to select appropriate records by group type. Yet another embodiment may not have a block 4606 with processing at block 4608 for gathering data additionally by groups the user is a member of. Block 4606 continues to block 4608.

Block 4608 accesses all CDRs (e.g. all rows from a CDR SQL table) with enabled field 3700*f* set to Yes for the user of FIG. 46A (e.g. user information matches field 3700*b*), and for the groups the user is a member of (e.g. group information matches field 3700*b* (e.g. owner type=group, owner id=a group ID field 3540*a* from block 4606)). The CDRs are additionally joined (e.g. SQL join) with GDRs, DDRs and TDRs (e.g. fields 3500*t*, 3600*b* and 3640*b*=Charter and by matching ID fields 3500*a*, 3600*a* and 3640*a* with field 3700*a*). Description field 3600*c* can provide a useful description last saved by the user for the charter entry. Block 4608 may access field 3700*f* in the case of filtering desired charter records. Block 4608 may also retrieve system predefined data records for use and/or management. Thereafter, each joined entry returned at block 4608 is associated at block 4610 with the corresponding data IDs (at least fields 3700*a*/3500*a* and 3540*a*) for easy unique record accesses when the user acts on the data. Block 4610 also initializes a list cursor to point to the first list entry to be presented to the user. Thereafter, block 4612 sets user interface indication for where the list cursor is currently set (e.g. set to highlight the entry), and any list scrolling settings are set (the list is initially not set for being scrolled on first FIG. 46A processing encounter to block 4612 from block 4610). Block 4612 continues to block 4614 where the entry list is presented to the user in accordance with the list cursor and list scroll settings managed for presentation at block 4612. Thereafter, block 4616 waits for user action to the presented list of charters data and will continue to block 4618 when a user action has been detected. Presentation of the scrollable list preferably presents in an entry format such that an entry contains fields for: DDR 3600 description; GDR owner information, grantor information and grantee information; GRPDR owner information and group name if applicable; CDR information; and TDR time spec information. Alternate embodiments will present less information, or more information (e.g. join to ADR and/or PARMDR information).

If block 4618 determines the user selected to set the list cursor to a different entry, then block 4620 sets the list cursor accordingly and processing continues back to block 4612. Block 4612 always sets for indicating where the list cursor is currently pointed and sets for appropriately scrolling the list if necessary when subsequently presenting the list at block 4614. If block 4618 determines the user did not select to set the list cursor, then processing continues to block 4622. If block 4622 determines the user selected to add a charter, then block 4624 accesses a maximum number of charters allowed (perhaps multiple maximum values accessed), and block 4626 checks the maximum(s) with the number of current charters defined. There are many embodiments for what deems a maximum (for this user, for a group, for this MS, etc). If block 4626 determines a maximum number of charters allowed already exists, then block 4628 provides an error to the user and processing continues back to block 4612. Block 4628 preferably requires the user to acknowledge the error before continuing back to block 4612. If block 4626 determines a maximum was not exceeded, then block 4630 interfaces with the user for entering validated charter data and block 4632 adds the data record(s), appropriately updates the list with the new entry, and sets the list cursor appropriately for the next list presentation refresh, before continuing back to block 4612. If block 4622 determines the user did not want to add a charter, processing continues to block 4634. Block 4632 will add a CDR, GDR, DDR, HDR (to set creator information) and TDR. The DDR and TDR are optionally added by the user, but the DDR may be strongly suggested (if not enforced on the add). This will provide a charter record. Additionally, block 4630 may add new ADR(s) and/or PARMDR(s) (which are validated to exist prior to adding data at block 4632). In one embodiment, a GDR associated to the CDR is not added; for indicating the user wants his charter made available to all other user MSs which are willing to accept it.

If block 4634 determines the user selected to delete a charter, then block 4636 deletes the data record currently pointed to by the list cursor, modifies the list for the discarded entry, and sets the list cursor appropriately for the next list presentation refresh, before continuing back to block 4612. Block 4636 will use the Charter ID field 3700*a*/3500*a* (associated with the entry at block 4610) to delete the charter. Associated CDR, ADR(s), PARMDR(s), DDR 3600, HDR 3620, and TDR 3640 is also deleted (e.g. preferably with a cascade delete in a SQL embodiment). If block 4634 determines the user did not select to delete a charter, then processing continues to block 4652 of FIG. 46B by way of off-page connector 4650.

With reference now to FIG. 46B, if block 4652 determines the user selected to modify a charter, then block 4654 interfaces with the user to modify charter data of the entry pointed to by the list cursor. The user may change information of the GDR, CDR, ADR and/or PARMDR and any associated records (e.g. DDR and TDR). The user may also add applicable records at block 4654. Block 4654 waits for a user action indicating completion. Block 4654 will continue to block 4656 when the complete action is detected. If block 4656 determines the user exited, then processing continues back to block 4612 by way of off-page connector 4698. If block 4656 determines the user selected to save changes made at block 4654, then block 4658 updates the data and the list is appropriately updated before continuing back to block 4612. Block 4658 may update the GDR, CDR, ADR, PARMDR and/or any associated records (e.g. DDR, and/or TDR) using the charter id field 3700*a*/3500*a* (associated to the entry at block 4610). Block 4658 will update an associated HDR as well. Block 4658 may add new CDR, ADR(s), PARMDR(s), a DDR and/or TDR as part of the charter change. If block 4652 determines the user did not select to modify a charter, then processing continues to block 4660.

If block 4660 determines the user selected to get more details of the charter (e.g. show all joinable data to the GDR or CDR that is not already presented with the entry), then block 4662 gets additional details (may involve database queries in an SQL embodiment) for the charter pointed to by the list cursor, and block 4664 appropriately presents the information to the user. Block 4664 then waits for a user action that the user is complete reviewing details, in which case processing continues back to block 4612. If block 4660 determines the user did not select to get more detail, then processing continues to block 4666.

If block 4666 determines the user selected to internalize charters data thus far being maintained, then block 4668 internalizes (e.g. as a compiler would) all applicable data records for well performing use by the MS, and block 4670 saves the internalized form, for example to MS high speed non-persistent memory. In one embodiment, blocks 4668 and 4670 internalize charter data to applicable C structures of FIGS. 34A through 34G (also see FIG. 52). In various embodiments, block 4668 maintains statistics for exactly what was internalized, and updates any running totals or averages maintained for a plurality of internalizations up to this point, or over certain time periods. Statistics such as: number of active constructs; number of user construct edits of particular types; amount of associated storage used, freed, changed, etc with perhaps a graphical user interface to graph changes over time; number of charter expressions, actions, term types, etc specified, number of charters affected and unaffected by permissions; and other charter dependent statistics. In other embodiments, statistical data is initialized at internalization time to prepare for subsequent gathering of useful statistics during charter processing. In embodiments where a tense qualifier is specified for TimeSpec information, saving the internalized form at block 4670 causes all past and current tense configurations to become effective for being processed.

Block 4670 then continues back to block 4612. If block 4666 determines the user did not select to internalize charter configurations, then processing continues to block 4672. Alternate embodiments of processing charters 12 in the present disclosure will rely upon the data records entirely, rather than requiring the user to redundantly internalize from persistent storage to non-persistent storage for use. Persistent storage may be of reasonably fast performance to not require an internalized version of charters 12. Different embodiments may completely overwrite the internalized form, or update the current internalized form with any changes.

If block 4672 determines the user selected to exit block 4510 processing, then block 4674 cleans up processing thus far accomplished (e.g. issue a stop using database command), and block 4676 completes block 4510 processing. If block 4672 determines the user did not select to exit, then processing continues to block 4678 where all other user actions detected at block 4616 are appropriately handled, and processing continues back to block 4616 by way off off-page connector 4696.

Figure 47A:
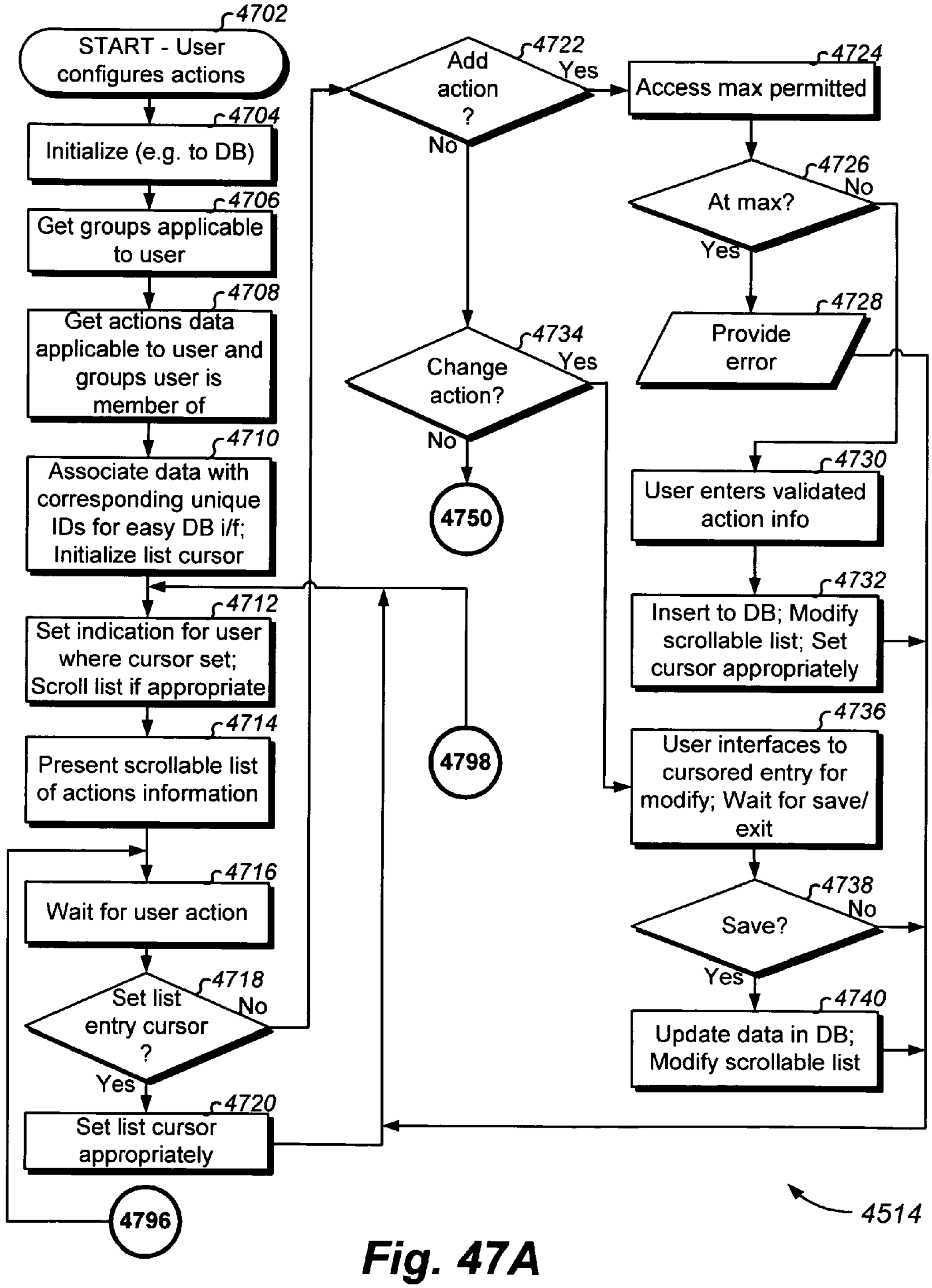
FIGS. 47A through 47B depict flowcharts for describing a preferred embodiment of MS user interface processing for actions configuration.
Figure 47B:
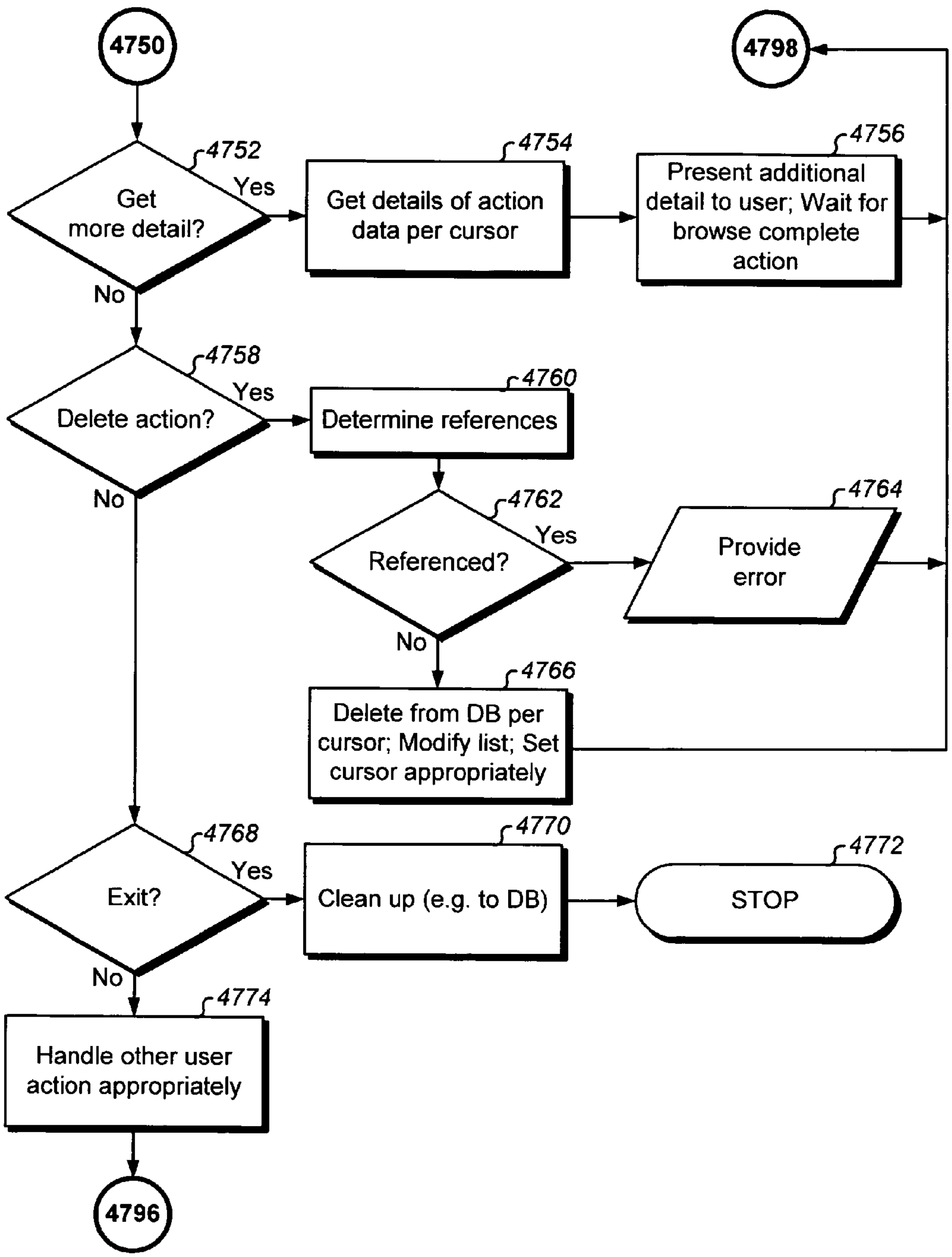

FIGS. 47A through 47B depict flowcharts for describing a preferred embodiment of MS user interface processing for actions configuration of block 4514. With reference now to FIG. 47A, processing starts at block 4702, continues to block 4704 for initialization (e.g. a start using database command), and then to block 4706 where groups the user is a member of are accessed. Block 4706 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR 3540 is a derivative embodiment which happens to not distinguish. Alternate embodiments may carry a group type field to select appropriate records by group type. Yet another embodiment may not have a block 4706 with processing at block 4708 for gathering data additionally by groups the user is a member of. Block 4706 continues to block 4708.

Block 4708 accesses all ADRs (e.g. all rows from a ADR SQL table) for the user of FIG. 47A matching the owner information of the ADRs (e.g. user information matches field 3750*b*) to the user and to groups the user is a member of (e.g. group information matches field 3750*b* (e.g. owner type=group, owner id=group ID field 3540*a* from block 4706)). The ADRs are additionally joined (e.g. SQL join) with DDRs 3600 and TDRs 3640 (e.g. fields 3600*b* and 3640*b*=Action and by matching ID fields 3600*a* and 3640*a* with field 3750*a*). Description field 3600*c* can provide a useful description last saved by the user for the action data. Block 4708 may also retrieve system predefined data records for use and/or management. Thereafter, each joined entry returned at block 4708 is associated at block 4710 with the corresponding data IDs (at least fields 3750*a* and 3540*a*) for easy unique record accesses when the user acts on the data. Block 4710 also initializes a list cursor to point to the first action item to be presented to the user in the list. Thereafter, block 4712 sets user interface indication for where the list cursor is currently set (e.g. set to highlight the entry) and any list scrolling settings are set (the list is initially not set for being scrolled on first FIG. 47A processing encounter to block 4712 from block 4710). Block 4712 continues to block 4714 where the entry list is presented to the user in accordance with the list cursor and list scroll settings managed for presentation at block 4712. Thereafter, block 4716 waits for user action to the presented list of action data and will continue to block 4718 when a user action has been detected. Presentation of the scrollable list preferably presents in an entry format reference-able by the list cursor. An action entry presented preferably contains ADR fields including owner information; GRPDR owner information and group name if applicable; TDR time spec information; and DDR information. Alternate embodiments will present less information, or more information (e.g. join ADR(s) to PARMDR(s) via field(s) 3750*g*).

If block 4718 determines the user selected to set the list cursor to a different action entry, then block 4720 sets the list cursor accordingly and processing continues back to block 4712. Block 4712 always sets for indicating where the list cursor is currently pointed and sets for appropriately scrolling the list if necessary when subsequently presenting the list at block 4714. If block 4718 determines the user did not select to set the list cursor, then processing continues to block 4722. If block 4722 determines the user selected to add an action, then block 4724 accesses a maximum number of actions allowed (perhaps multiple maximum values accessed), and block 4726 checks the maximum(s) with the number of current actions defined. There are many embodiments for what deems a maximum (for this user, for a group, for this MS, etc). If block 4726 determines a maximum number of actions allowed already exists, then block 4728 provides an error to the user and processing continues back to block 4712. Block 4728 preferably requires the user to acknowledge the error before continuing back to block 4712. If block 4726 determines a maximum was not exceeded, then block 4730 interfaces with the user for entering validated action data and block 4732 adds the data record, appropriately updates the list with the new entry, and sets the list cursor appropriately for the next list presentation refresh, before continuing back to block 4712. If block 4722 determines the user did not want to add an action, processing continues to block 4734. Block 4732 will add an ADR, HDR 3620 (to set creator information) and TDR 3640. The DDR and TDR are optionally added by the user. Additionally, at block 4730 the user may add new PARMDR(s) for the action.

If block 4734 determines the user selected to modify an action, then block 4736 interfaces with the user to modify action data of the entry pointed to by the list cursor. The user may change information of the ADR and any associated records (e.g. DDR, TDR). The user may also add the associated records at block 4736. Block 4736 waits for a user action indicating completion. Block 4736 will continue to block 4738 when the action is detected at block 4736. If block 4738 determines the user exited, then processing continues back to block 4712. If block 4738 determines the user selected to save changes made at block 4736, then block 4740 updates the data and the list is appropriately updated before continuing back to block 4712. Block 4740 may update the ADR and/or any associated records (e.g. DDR and/or TDR) using the action id field 3750*a* (associated to the action item at block 4710). Block 4740 will update an associated HDR as well. Block 4736 may add a DDR and/or TDR as part of the action change. If block 4734 determines the user did not select to modify an action, then processing continues to block 4752 by way of off-page connector 4750.

With reference now to FIG. 47B, if block 4752 determines the user selected to get more details of the action (e.g. show all joinable data to the ADR that is not already presented with the entry), then block 4754 gets additional details (may involve database queries in an SQL embodiment) for the action pointed to by the list cursor, and block 4756 appropriately presents the information to the user. Block 4756 then waits for a user action that the user is complete reviewing details, in which case processing continues back to block 4712 by way of off-page connector 4798. If block 4752 determines the user did not select to get more detail, then processing continues to block 4758.

If block 4758 determines the user selected to delete an action, then block 4760 determines any data records (e.g. CDR(s)) that reference the action data record to be deleted. Preferably, no referencing data records (e.g. CDRs) are joinable (e.g. field 3700*d*) to the action data record being deleted, otherwise the user may improperly delete an action from a configured charter. The user should remove ascending references to an action for deletion first. Block 4760 continues to block 4762. If block 4762 determines there was at least one CDR reference, block 4764 provides an appropriate error with the reference(s) found so the user can subsequently reconcile. Block 4764 preferably requires the user to acknowledge the error before continuing back to block 4712. If no references were found as determined by block 4762, then processing continues to block 4766 for deleting the data record currently pointed to by the list cursor. Block 4766 also modifies the list for the discarded entry, and sets the list cursor appropriately for the next list presentation refresh, before continuing back to block 4712. Block 4766 will use the action ID field 3750*a* (associated with the entry at block 4710) to delete an action. Associated records (e.g. DDR 3600, HDR 3620, and TDR 3640) are also deleted (e.g. preferably with a cascade delete in a SQL embodiment). If block 4758 determines the user did not select to delete an action, then processing continues to block 4768.

If block 4768 determines the user selected to exit block 4514 processing, then block 4770 cleans up processing thus far accomplished (e.g. issue a stop using database command), and block 4772 completes block 4514 processing. If block 4768 determines the user did not select to exit, then processing continues to block 4774 where all other user actions detected at block 4716 are appropriately handled, and processing continues back to block 4716 by way off off-page connector 4796.

Figure 48A:
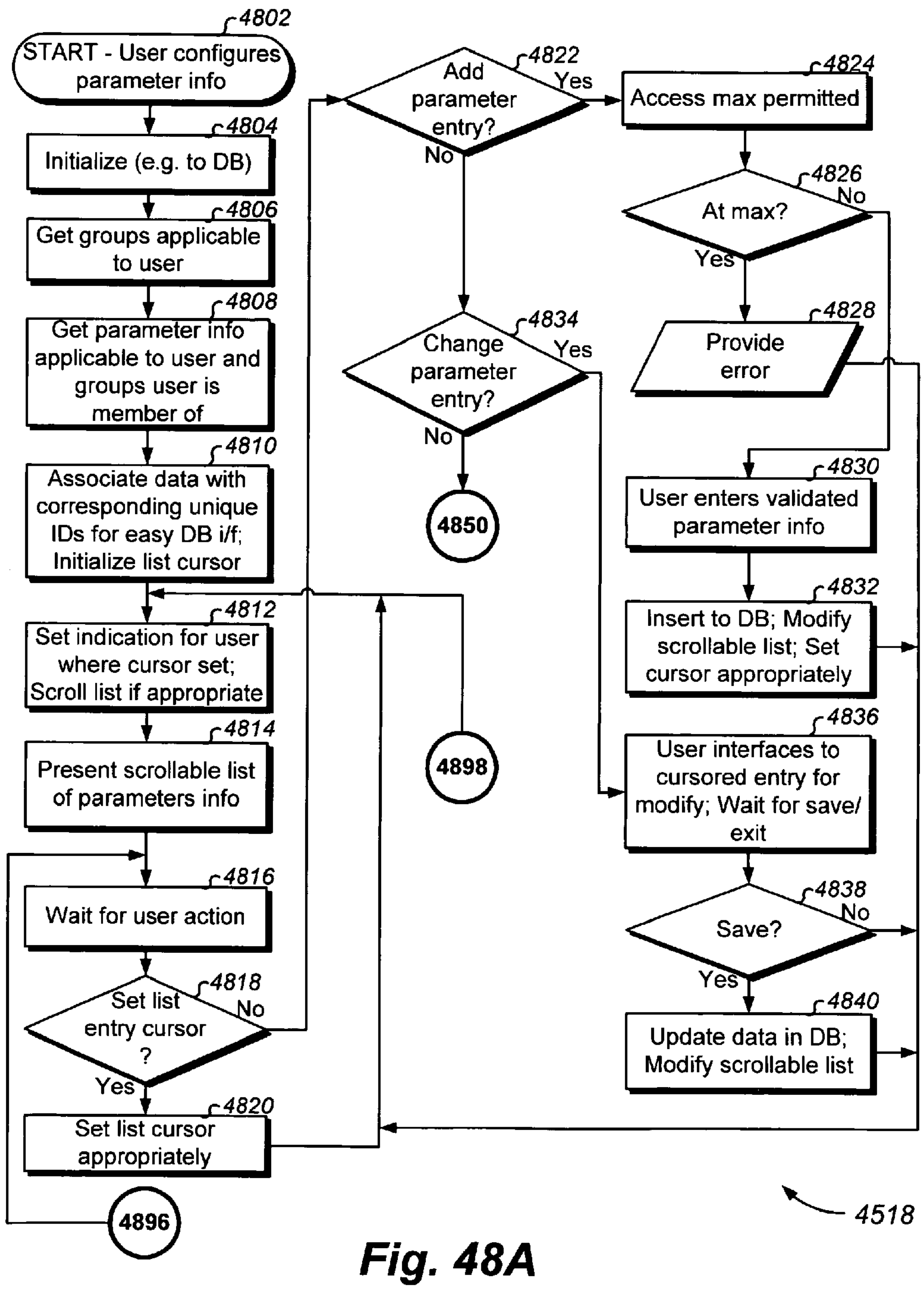
FIGS. 48A through 48B depict flowcharts for describing a preferred embodiment of MS user interface processing for parameter information configuration.
Figure 48B:
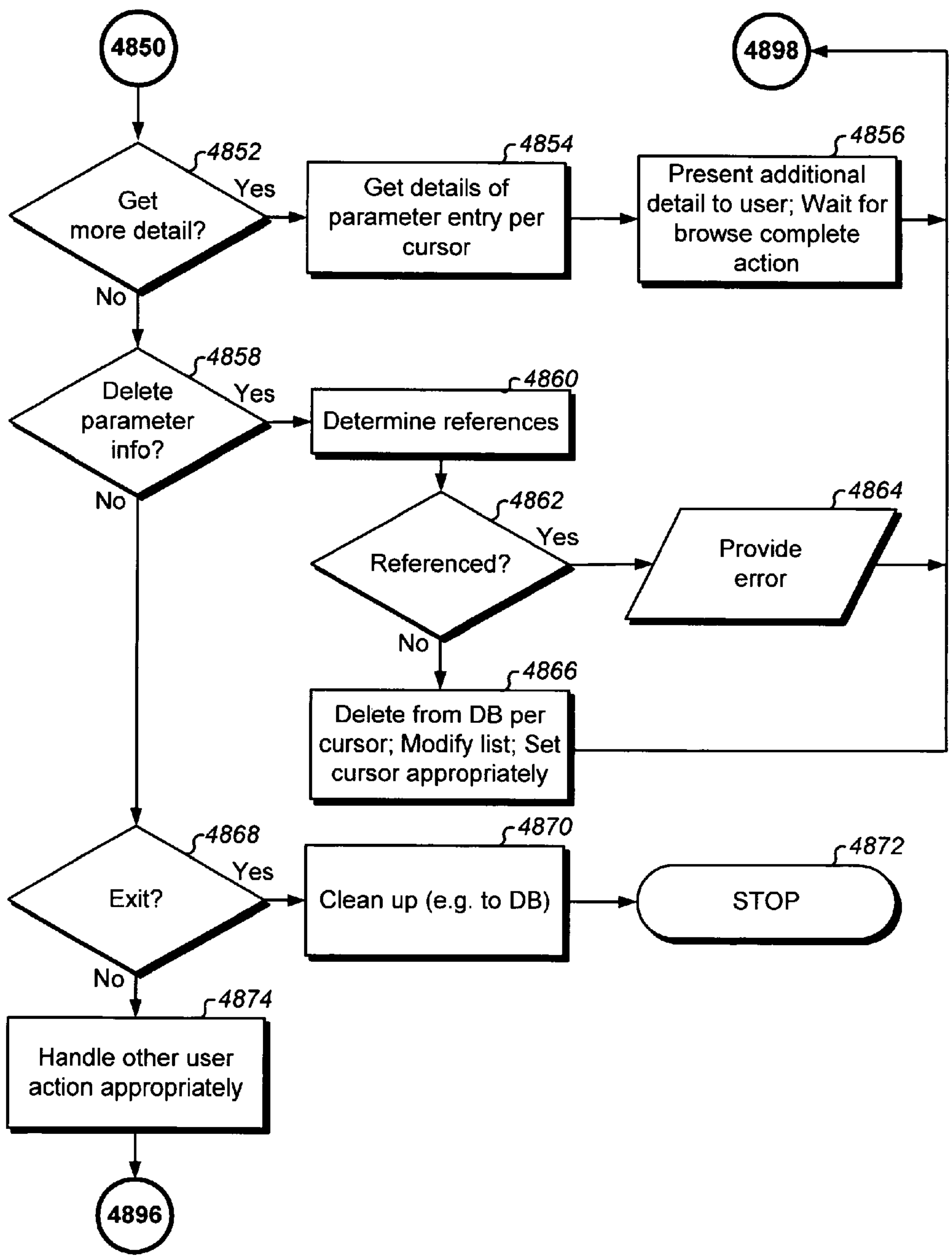

FIGS. 48A through 48B depict flowcharts for describing a preferred embodiment of MS user interface processing for parameter information configuration of block 4518. With reference now to FIG. 48A, processing starts at block 4802, continues to block 4804 for initialization (e.g. a start using database command), and then to block 4806 where groups the user is a member of are accessed. Block 4806 retrieves all GRPDRs 3540 joined to GADRs 3520 such that the descendant type field 3520*c* and descendant ID field 3520*d* match the user information, and the ascendant type field 3520*a* is set to Group and the ascendant ID field 3520*b* matches the group ID field 3540*a*. While there may be different types of groups as defined for the BNF grammar, the GRPDR 3540 is a derivative embodiment which happens to not distinguish. Alternate embodiments may carry a group type field to select appropriate records by group type. Yet another embodiment may not have a block 4806 with processing at block 4808 for gathering data additionally by groups the user is a member of. Block 4806 continues to block 4808.

Block 4808 accesses all PARMDRs (e.g. all rows from a PARMDR SQL table) for the user of FIG. 48A matching the owner information of the PARMDRs (e.g. user information matches field 3775*b*) to the user and to groups the user is a member of (e.g. group information matches field 3775*b* (e.g. owner type=group, owner id=group ID field 3540*a* from block 4806)). The PARMDRs are additionally joined (e.g. SQL join) with DDRs 3600 (e.g. field 3600*b*=Parameter and by matching ID field 3600*a* with field 3775*a*). Description field 3600*c* can provide a useful description last saved by the user for the parameter data. Block 4808 may also retrieve system predefined data records for use and/or management. Thereafter, each joined entry returned at block 4808 is associated at block 4810 with the corresponding data IDs (at least fields 3775*a* and 3540*a*) for easy unique record accesses when the user acts on the data. Block 4810 also initializes a list cursor to point to the first parameter entry to be presented to the user in the list. Thereafter, block 4812 sets user interface indication for where the list cursor is currently set (e.g. set to highlight the entry) and any list scrolling settings are set (the list is initially not set for being scrolled on first FIG. 48A processing encounter to block 4812 from block 4810). Block 4812 continues to block 4814 where the entry list is presented to the user in accordance with the list cursor and list scroll settings managed for presentation at block 4812. Thereafter, block 4816 waits for user action to the presented list of parameter data and will continue to block 4818 when a user action has been detected. Presentation of the scrollable list preferably presents in an entry format reference-able by the list cursor. A parameter entry presented preferably contains fields for: PARMDR field 3775*c*; GRPDR owner information; owning GRPDR owner information and group name if applicable; and DDR information. Alternate embodiments will present less information, or more information (e.g. commands and operands parameters may be used with, parameter descriptions, etc).

If block 4818 determines the user selected to set the list cursor to a different parameter entry, then block 4820 sets the list cursor accordingly and processing continues back to block 4812. Block 4812 always sets for indicating where the list cursor is currently pointed and sets for appropriately scrolling the list if necessary when subsequently presenting the list at block 4814. If block 4818 determines the user did not select to set the list cursor, then processing continues to block 4822. If block 4822 determines the user selected to add a parameter, then block 4824 accesses a maximum number of parameter entries allowed (perhaps multiple maximum values accessed), and block 4826 checks the maximum(s) with the number of current parameter entries defined. There are many embodiments for what deems a maximum (for this user, for a group, for this MS, etc). If block 4826 determines a maximum number of parameter entries allowed already exists, then block 4828 provides an error to the user and processing continues back to block 4812. Block 4828 preferably requires the user to acknowledge the error before continuing back to block 4812. If block 4826 determines a maximum was not exceeded, then block 4830 interfaces with the user for entering validated parameter data, and block 4832 adds the data record, appropriately updates the list with the new entry, and sets the list cursor appropriately for the next list presentation refresh, before continuing back to block 4812. If block 4822 determines the user did not want to add a parameter entry, processing continues to block 4834. Block 4832 will add a PARMDR, DDR 3600 and HDR 3620 (to set creator information). The DDR is optionally added by the user.

If block 4834 determines the user selected to modify a parameter entry, then block 4836 interfaces with the user to modify parameter data of the entry pointed to by the list cursor. The user may change information of the PARMDR and any associated records (e.g. DDR). The user may also add the associated records at block 4836. Block 4836 waits for a user action indicating completion. Block 4836 will continue to block 4838 when the complete action is detected at block 4836. If block 4838 determines the user exited, then processing continues back to block 4812. If block 4838 determines the user selected to save changes made at block 4836, then block 4840 updates the data and the list is appropriately updated before continuing back to block 4812. Block 4840 may update the PARMDR and/or any associated DDR using the parameter id field 3775*a* (associated to the parameter entry at block 4810). Block 4840 will update an associated HDR as well. Block 4836 may add a new DDR as part of the parameter entry change. If block 4834 determines the user did not select to modify a parameter, then processing continues to block 4852 by way of off-page connector 4850.

With reference now to FIG. 48B, if block 4852 determines the user selected to get more details of the parameter entry, then block 4854 gets additional details (may involve database queries in an SQL embodiment) for the parameter entry pointed to by the list cursor, and block 4856 appropriately presents the information to the user. Block 4856 then waits for a user action that the user is complete reviewing details, in which case processing continues back to block 4812 by way of off-page connector 4898. If block 4852 determines the user did not select to get more detail, then processing continues to block 4858.

If block 4858 determines the user selected to delete a parameter entry, then block 4860 determines any data records (e.g. ADR(s)) that reference the parameter data record to be deleted. Preferably, no referencing data records (e.g. ADRs) are joinable (e.g. field 3750*g*) to the parameter data record being deleted, otherwise the user may improperly delete a parameter from a configured action. The user should remove references to a parameter entry for deletion first. Block 4860 continues to block 4862. If block 4862 determines there was at least one reference, block 4864 provides an appropriate error with the reference(s) found so the user can subsequently reconcile. Block 4864 preferably requires the user to acknowledge the error before continuing back to block 4812. If no references were found as determined by block 4862, then processing continues to block 4866 for deleting the data record currently pointed to by the list cursor, along with any other related records that can be deleted. Block 4866 also modifies the list for the discarded entry(s), and sets the list cursor appropriately for the next list presentation refresh, before continuing back to block 4812. Block 4866 will use the parameter ID field 3775*a* (associated with the entry at block 4810) to delete the parameter entry. Associated records (e.g. DDR 3600, and HDR 3620) are also deleted (e.g. preferably with a cascade delete in a SQL embodiment). If block 4858 determines the user did not select to delete a parameter entry, then processing continues to block 4868.

If block 4868 determines the user selected to exit block 4518 processing, then block 4870 cleans up processing thus far accomplished (e.g. issue a stop using database command), and block 4872 completes block 4518 processing. If block 4868 determines the user did not select to exit, then processing continues to block 4874 where all other user actions detected at block 4816 are appropriately handled, and processing continues back to block 4816 by way off off-page connector 4896.

FIGS. 39A, 40A, 41A, 46A, 47A and 48A assume a known identity of the user for retrieving data records. Alternate embodiments may provide a user interface option (e.g. at block 3904/4004/4104/4604/4704/4804) for whether the user wants to use his own identity, or a different identity (e.g. impersonate another user, a group, etc). In this embodiment, processing (e.g. block 3904/4004/4104/4604/4704/4804) would check permissions/privileges for the user (of FIGS. 39A, 40A, 41A, 46A, 47A and/or 48A) for whether or not an impersonation privilege was granted by the identity the user wants to act on behalf of. If no such privilege was granted, an error would be presented to the user. If an impersonation privilege was granted to the user, then applicable processing (FIGS. 39A&B, FIGS. 40A&B, FIGS. 41A&B, FIGS. 46A&B, FIGS. 47A&B and/or FIGS. 48A&B) would continue in context of the permitted impersonated identity. In another embodiment, an impersonation privilege could exist from a group to another identity for enforcing who manages grants for the group (e.g. 3904/4004/4104/4604/4704/4804 considers this privilege for which group identity data can, and cannot, be managed by the user). One privilege could govern who can manage particular record data for the group. Another privilege can manage who can be maintained to a particular group. Yet another embodiment could have a specific impersonation privilege for each of FIGS. 39A&B, FIGS. 40A&B, FIGS. 41A&B, FIGS. 46A&B, FIGS. 47A&B and/or FIGS. 48A&B. Yet another embodiment uses Grantor field information (e.g. fields 3500*c* and 3500*d*) for matching to the user's identity(s) (user and/or group(s)) for processing when the choice is available (e.g. in a GDR for permissions and/or charters). Similarly, an administrator or authorized user may make configurations for an intended user of the MS.

FIGS. 39A, 40A, 41A, 46A, 47A and 48A may also utilize VDRs 3660 if referenced in any data record fields of processing for elaboration to constructs or values that are required at a processing block. Appropriate variable name referencing syntax, or variable names referenced in data record fields, will be used to access VDR information for elaboration to the value(s) that are actually needed in data record information when accessed.

FIG. 49A depicts an illustration for preferred permission data 10 processing in the present disclosure LBX architecture, for example when WDRs are in-process of being maintained to queue 22, or being inbound to a MS (referred to generally as "incoming" in FIG. 49A). Table 4920 depicts considerations for privilege data (i.e. permission data 10) resident at the MS of a first identity $ID_1$ (grammar ID/IDType), depending on privileges granted in the following scenarios:

2) The first identity $ID_1$ (Grantor) granting a privilege to a second identity $ID_2$ (Grantee; grammar ID/IDType), as shown in cell 4924: Privilege data is maintained by $ID_1$ at the $ID_1$ MS as is used to govern actions, functionality, features, and/or behavior for the benefit of $ID_2$, by a) processing $ID_1$ WDR information at the $ID_2$ MS (preferably, privileges are communicated to $ID_2$ MS for enforcing and/or cloning there), b) processing $ID_2$ WDR information at the $ID_1$ MS (privileges locally maintained to $ID_1$), and c) processing $ID_1$ WDR information at the $ID_1$ MS (privileges locally maintained to $ID_1$);

3) The first identity $ID_1$ (Grantor) granting a privilege to himself (Grantee), as shown in cell 4922: Preferably, privilege data in this case is not necessary, no configuration interface is required for this scenario, and an identity implicitly has all conceivable privileges assigned to himself by default; however, alternatively privileges may be appropriate for activating/deactivating functionality;

4) The second identity $ID_2$ (Grantor) granting a privilege to the first identity (Grantee), as shown in cell 4926: Privilege data is used for informing $ID_1$ (or enabling $ID_1$ to clone per a privilege) and to govern actions, functionality, features, and/or behavior for the benefit of $ID_1$, by a) processing $ID_2$ WDR information at the $ID_1$ MS (preferably, privileges are communicated to $ID_1$ MS for enforcing and/or cloning there), b) processing $ID_1$ WDR information at the $ID_2$ MS (privileges locally maintained to $ID_2$); and c) processing $ID_2$ WDR information at the $ID_2$ MS (privileges locally maintained to $ID_2$); and/or 5) The second identity granting a privilege to himself, as shown in cell 4928: Preferably, privilege data in this case is not necessary, no communications interface is required for this scenario, and an identity implicitly has all conceivable privileges assigned to himself by default; however, alternatively privileges may be appropriate for activating/deactivating functionality.

Table 4940 depicts considerations for privilege data (i.e. permission data 10) resident at the MS of a second identity $ID_2$ (grammar ID/IDType), depending on privileges granted in the following scenarios:

6) A first identity $ID_1$ (Grantor) granting a privilege to the second identity $ID_2$ (Grantee; grammar ID/IDType), as shown in cell 4944: Privilege data is used for informing $ID_2$ (or enabling $ID_2$ to clone per a privilege) and to govern actions, functionality, features, and/or behavior for the benefit of $ID_2$, by a) processing $ID_1$ WDR information at the $ID_2$ MS (preferably, privileges are communicated to $ID_1$ MS for enforcing and/or cloning there), b) processing $ID_2$ WDR information at the $ID_1$ MS (privileges locally maintained to $ID_1$), and c) processing $ID_1$ WDR information at the $ID_1$ MS (privileges locally maintained to $ID_1$);

7) The first identity $ID_1$ (Grantor) granting a privilege to himself (Grantee), as shown in cell 4942: Preferably, privilege data in this case is not necessary, no communications interface is required for this scenario, and an identity implicitly has all conceivable privileges assigned to himself by default; however, alternatively privileges may be appropriate for activating/deactivating functionality;

8) The second identity $ID_2$ (Grantor) granting a privilege to the first identity (Grantee), as shown in cell 4946: Privilege data is maintained by $ID_2$ at the $ID_2$ MS as is used to govern actions, functionality, features, and/or behavior for the benefit of $ID_1$, by a) processing $ID_2$ WDR information at the $ID_1$ MS (preferably, privileges are communicated to $ID_1$ MS for enforcing and/or cloning there), b) processing $ID_1$ WDR information at the $ID_2$ MS (privileges locally maintained to $ID_2$) and c) processing $ID_2$ WDR information at the $ID_2$ MS (privileges locally maintained to $ID_2$); and/or 9) The second identity granting a privilege to himself, as shown in cell 4948: Preferably, privilege data in this case is not necessary, no configuration interface is required for this scenario, and an identity implicitly has all conceivable privileges assigned to himself by default; however, alternatively privileges may be appropriate for activating/deactivating functionality.

FIG. 49B depicts an illustration for preferred charter data 12 processing in the present disclosure LBX architecture, for example when WDRs are in-process of being maintained to queue 22, or being inbound to a MS (referred to generally as "incoming" in FIG. 49B). Table 4960 depicts considerations for charter data resident at the MS of a first identity $ID_1$ (grammar ID/IDType), depending on privileges granted in the following scenarios:

1) The first identity $ID_1$ (Grantee) owning a charter for use at the MS of a second identity $ID_2$ (Grantor; grammar ID/IDType), as shown in cell 4964: Charter data is maintained by $ID_1$ at the $ID_1$ MS for being candidate use at the $ID_2$ MS to cause actions, functionality, features, and/or behavior, in accordance with configured permission data 10, for the benefit of either $ID_1$ or $ID_2$ by a) processing $ID_2$ WDR information at the $ID_2$ MS (preferably, charters are communicated to $ID_2$ MS for use there), and b) processing $ID_1$ WDR information at the $ID_2$ MS (preferably, charters are communicated to $ID_2$ MS for use there);

2) The first identity $ID_1$ (Grantee) owning a charter for use at his own MS, as shown in cell 4962: Charter data is maintained locally for local use to cause actions, functionality, features, and/or behavior, in accordance with configured permission data 10, for the benefit of either $ID_1$ or $ID_2$ by a) processing $ID_1$ WDR information at the $ID_1$ MS, and b) processing $ID_2$ WDR information at the $ID_1$ MS;

3) The second identity $ID_2$ (Grantee) owning a charter for use at the MS of the first identity $ID_1$ (Grantor; grammar ID/IDType), as shown in cell 4966: Charter data is used at the $ID_1$ MS for informing $ID_1$ and enforcing cause of actions, functionality, features, and/or behavior, in accordance with configured permission data 10, for the benefit of either $ID_1$ or $ID_2$ by a) processing $ID_2$ WDR information at the $ID_1$ MS (preferably, charters are communicated to $ID_1$ MS for use there), and b) processing $ID_1$ WDR information at the $ID_1$ MS (preferably, charters are communicated to $ID_1$ MS for use there); and/or 4) The second identity $ID_2$ (Grantee) owning a charter at his own MS, as shown in cell 4968: Charter data may be communicated to the $ID_1$ MS for informing $ID_1$, allowing $ID_1$ to browse, or allowing $ID_1$ to use as a template for cloning and then making/maintaining into $ID_1$'s own charter(s), wherein each reason for communicating to the $ID_1$ MS (or processing at the $ID_1$ MS) has a privilege grantable from $ID_2$ to $ID_1$.

Table 4980 depicts considerations for charter data resident at the MS of a second identity $ID_2$ (grammar ID/IDType), depending on privileges granted in the following scenarios:

5) The first identity $ID_1$ (Grantee) owning a charter for use at the MS of the second identity $ID_2$ (Grantor), as shown in cell 4984: Charter data is used at the $ID_2$ MS for informing $ID_2$ and enforcing cause of actions, functionality, features, and/or behavior, in accordance with configured permission data 10, for the benefit of either $ID_1$ or $ID_2$ by a) processing $ID_2$ WDR information at the $ID_2$ MS (preferably, charters are communicated to $ID_2$ MS for use there), and b) processing $ID_1$ WDR information at the $ID_2$ MS (preferably, charters are communicated to $ID_2$ MS for use there);

6) The first identity $ID_1$ (Grantee) owning a charter for use at his own MS, as shown in cell 4982: Charter data may be communicated to the $ID_2$ MS for informing $ID_2$, allowing $ID_2$ to browse, or allowing $ID_2$ to use as a template for cloning and then making into $ID_2$'s own charter(s), wherein each reason for communicating to the $ID_2$ MS (or processing at the $ID_1$ MS) has a privilege grantable from $ID_1$ to $ID_2$.

7) The second identity $ID_2$ (Grantee) owning a charter for use at the MS of the first identity $ID_1$ (Grantor; grammar ID/IDType), as shown in cell 4986: Charter data is maintained by $ID_2$ at the $ID_2$ MS for being candidate use at the $ID_1$ MS to cause actions, functionality, features, and/or behavior, in accordance with configured permission data 10, for the benefit of either $ID_1$ or $ID_2$ by a) processing $ID_2$ WDR information at the $ID_1$ MS (preferably, charters are communicated to $ID_1$ MS for use there), and b) processing $ID_1$ WDR information at the $ID_1$ MS (preferably, charters are communicated to $ID_1$ MS for use there); and/or 8) The second identity $ID_2$ (Grantee) owning a charter at his own MS, as shown in cell 4988: Charter data is maintained locally for local use to cause actions, functionality, features, and/or behavior, in accordance with configured permission data 10, for the benefit of either $ID_1$ or $ID_2$ by a) processing $ID_1$ WDR information at the $ID_2$ MS, and b) processing $ID_2$ WDR information at the $ID_2$ MS.

Various embodiments will implement any reasonable subset of the considerations of FIGS. 49A and 49B, for example to minimize or eliminate communicating a user's permissions 10 and/or charters 12 to another MS, or to prevent storing the same permissions and/or charters data at more than one MS. FIGS. 49A and 49B are intended to highlight feasible embodiments wherein FIG. 49B terminology "incoming" is used generally for referring to WDRs in-process which are a) being maintained (e.g. "incoming" as being maintained to queue 22); and b) incoming to a particular MS (e.g. "incoming" as being communicated to the MS).

In one subset embodiment, privileges and charters are only maintained at the MS where they are configured for driving LBX features and functionality. In another embodiment, privileges are maintained at the MS where they were configured as well as any MSs which are relevant for those configurations, yet charters are only maintained at the MS where they are configured. In yet another embodiment, privileges and charters are maintained at the MS where they were configured, as well as any MSs which are relevant for those configurations. In another embodiment, a MS may not have all privileges assigned to itself (said to be assigned to the user of the MS) by default. Privileges may require being enabled as needed for any users to have the benefits of the associated LBX features and functionality. Thus, the considerations highlighted by FIGS. 49A and 49B are to "cover many bases" with any subset embodiment within the scope of the present disclosure.

Preferably, statistics are maintained by WITS for counting occurrences of each variety of the FIGS. 49A and 49B processing scenarios. WITS processing should also keep statistics for the count by privilege, and by charter, of each applicable WITS processing event which was affected. Other embodiments will maintain more detailed statistics by MS ID, Group ID, or other "labels" for categories of statistics. Still other embodiments will categorize and maintain statistics by locations, time, applications in use at time of processing scenarios, etc. Applicable statistical data can be initialized at internalization time to prepare for proper gathering of useful statistics during WITS processing.

FIGS. 50A through 50C depict an illustration of data processing system wireless data transmissions over some wave spectrum for further explaining FIGS. 13A through 13C, respectively. Discussions above for FIGS. 13A through 13C are expanded in explanation for FIGS. 50A through 50C, respectively. It is well understood that the DLM 200*a* (FIGS. 13A and 50A), ILM 1000*k* (FIGS. 13B and 50B) and service(s) (FIGS. 13C and 50C) can be capable of communicating bidirectionally. Nevertheless, FIGS. 50A through 50C clarify FIGS. 13A through 13C, respectively, with a bidirectional arrow showing data flow "in the vicinity" of the DLM 200*a*, ILM 1000*k*, and service(s), respectively. All disclosed descriptions for FIGS. 13A through 13C are further described by FIGS. 50A through 50C, respectively. In all embodiments, MSs communicate in a peer to peer manner. Any of a variety of useful protocols may be used to accomplish the peer to peer communications between MSs. No server is required to carry out MS location based functionality.

With reference now to FIG. 50A, "in the vicinity" language is described in more detail for the MS (e.g. DLM 200*a*) as determined by clarified maximum range of transmission 1306. In some embodiments, maximum wireless communications range (e.g. 1306) is used to determine what is in the vicinity of the DLM 200*a*. In other embodiments, a data processing system 5090 may be communicated to as an intermediary point between the DLM 200*a* and another data processing system 5000 (e.g. MS or service) for increasing the distance of "in the vicinity" between the data processing systems to carry out LBX peer to peer data communications. Data processing system 5090 may further be connected to another data processing system 5092, by way of a connection 5094, which is in turn connected to a data processing system 5000 by wireless connectivity as disclosed. Data processing systems 5090 and 5092 may be a MS, service, router, switch, bridge, or any other intermediary data processing system (between peer to peer interoperating data processing systems 200*a* and 5000) capable of communicating data with another data processing system. Connection 5094 may be of any type of communications connection, for example any of those connectivity methods, options and/or systems discussed for FIG. 1E. Connection 5094 may involve other data processing systems (not shown) for enabling peer to peer communications between DLM 200*a* and data processing system 5000. FIG. 50A clarifies that "in the vicinity" is conceivably any distance from the DLM 200*a* as accomplished with communications well known to those skilled in the art demonstrated in FIG. 50A. In some embodiments, data processing system 5000 may be connected at some time with a physically connected method to data processing system 5092, or DLM 200*a* may be connected at some time with a physically connected method to data processing system 5090, or DLM 200*a* and data processing system 5000 may be connected to the same intermediary data processing system. Regardless of the many embodiments for DLM 200*a* to communicate in a LBX peer to peer manner with data processing system 5000, DLM 200*a* and data processing system 5000 preferably interoperate in context of the LBX peer to peer architecture. In some embodiments, data processing systems between DLM 200*a* and the data processing system 5000 intercept data for tracking, book-keeping, statistics, and for maintaining data potentially accessed by service informant code 28, however, the LBX peer to peer model is preferably not interfered with.

Data processing system 5000 may be a DLM, ILM, or service being communicated with by DLM 200*a* as disclosed in the present disclosure for FIGS. 13A through 13C, or for FIGS. 50A through 50C. LBX architecture is founded on peer to peer interaction between MSs without requiring a service to middleman data, however data processing systems 5090, 5092 and those applicable to connection 5094 can facilitate the peer to peer interactions. In some embodiments, data processing systems between DLM 200*a* and the data processing 5000 intercept data for tracking, book-keeping, statistics, and for maintaining data potentially accessed by service informant code 28, however, the LBX peer to peer model is preferably not interfered with. Data processing system 5000 generically represents a DLM, ILM or service(s) for analogous FIGS. 13A through 13C processing for sending/broadcasting data such as a data packet 5002 (like 1302/1312). When a Communications Key (CK) 5004 (like 1304/1314) is embedded within data 5002, data 5002 is considered usual communications data (e.g. protocol, voice, or any other data over conventional forward channel, reverse channel, voice data channel, data transmission channel, or any other appropriate channel) which has been altered to contain CK 5004. Data 5002 contains a CK 5004 which can be detected, parsed, and processed when received by an MS or other data processing system in the vicinity (conceivably any distance depending on embodiment) of data processing system 5000 as determined by the maximum range of transmission 5006 (like 1306/1316). CK 5004 permits "piggy-backing" on current transmissions to accomplish new functionality as disclosed herein. Transmissions radiate out in all directions in a manner consistent with the wave spectrum used, and data carried thereon may or may not be encrypted (e.g. encrypted WDR information). The radius 5008 (like 1308/1318) represents a first range of signal reception from data processing system 5000 (e.g. antenna thereof), perhaps by a MS. The radius 5010 (like 1310/1320) represents a second range of signal reception from data processing system 5000 (e.g. antenna thereof), perhaps by a MS. The radius 5011 (like 1311/1322) represents a third range of signal reception from data processing system 5000 (e.g. antenna thereof), perhaps by a MS. The radius 5006 (like 1306/1316) represents a last and maximum range of signal reception from data processing system 5000 (e.g. antenna thereof), perhaps by a MS (not shown). The time of transmission from data processing system 5000 to radius 5008 is less than times of transmission from service to radiuses 5010, 5011, or 5006. The time of transmission from data processing system 5000 to radius 5010 is less than times of transmission to radiuses 5011 or 5006. The time of transmission from data processing system 5000 to radius 5011 is less than time of transmission to radius 5006. In another embodiment, data 5002 contains a Communications Key (CK) 5004 because data 5002 is new transmitted data in accordance with the present disclosure. Data 5002 purpose is for carrying CK 5004 information for being detected, parsed, and processed when received by another MS or data processing system in the vicinity (conceivably any distance depending on embodiment) of data processing system 5000 as determined by the maximum range of transmission.

With reference now to FIG. 50B, "in the vicinity" language is described in more detail for the MS (e.g. ILM 1000*k*) as determined by clarified maximum range of transmission 1306. In some embodiments, maximum wireless communications range (e.g. 1306) is used to determine what is in the vicinity of the ILM 1000*k*. In other embodiments, a data processing system 5090 may be communicated to as an intermediary point between the ILM 1000*k* and another data processing system 5000 (e.g. MS or service) for increasing the distance of "in the vicinity" between the data processing systems to carry out LBX peer to peer data communications. Data processing system 5090 may further be connected to another data processing system 5092, by way of a connection 5094, which is in turn connected to a data processing system 5000 by wireless connectivity as disclosed. Data processing systems 5090 and 5092 may be a MS, service, router, switch, bridge, or any other intermediary data processing system (between peer to peer interoperating data processing systems 1000*k* and 5000) capable of communicating data with another data processing system. Connection 5094 may be of any type of communications connection, for example any of those connectivity methods, options and/or systems discussed for FIG. 1E. Connection 5094 may involve other data processing systems (not shown) for enabling peer to peer communications between ILM 1000*k* and data processing system 5000. FIG. 50B clarifies that "in the vicinity" is conceivably any distance from the ILM 1000*k* as accomplished with communications well known to those skilled in the art demonstrated in FIG. 50B. In some embodiments, data processing system 5000 may be connected at some time with a physically connected method to data processing system 5092, or ILM 1000*k* may be connected at some time with a physically connected method to data processing system 5090, or ILM 1000*k* and data processing system 5000 may be connected to the same intermediary data processing system. Regardless of the many embodiments for ILM 1000*k* to communicate in a LBX peer to peer manner with data processing system 5000, ILM 1000*k* and data processing system 5000 preferably interoperate in context of the LBX peer to peer architecture. In some embodiments, data processing systems between ILM 1000*k* and the data processing system 5000 intercept data for tracking, book-keeping, statistics, and for maintaining data potentially accessed by service informant code 28, however, the LBX peer to peer model is preferably not interfered with.

With reference now to FIG. 50C, "in the vicinity" language is described in more detail for service(s) as determined by clarified maximum range of transmission 1316. In some embodiments, maximum wireless communications range (e.g. 1316) is used to determine what is in the vicinity of the service(s). In other embodiments, a data processing system 5090 may be communicated to as an intermediary point between the service(s) and another data processing system 5000 (e.g. MS) for increasing the distance of "in the vicinity" between the data processing systems to carry out LBX peer to peer data communications. Data processing system 5090 may further be connected to another data processing system 5092, by way of a connection 5094, which is in turn connected to a data processing system 5000 by wireless connectivity as disclosed. Data processing systems 5090 and 5092 may be a MS, service, router, switch, bridge, or any other intermediary data processing system (between peer to peer interoperating data processing system service(s) and 5000) capable of communicating data with another data processing system. Connection 5094 may be of any type of communications connection, for example any of those connectivity methods, options and/or systems discussed for FIG. 1E. Connection 5094 may involve other data processing systems (not shown) for enabling peer to peer communications between service(s) and data processing system 5000. FIG. 50C clarifies that "in the vicinity" is conceivably any distance from the service(s) as accomplished with communications well known to those skilled in the art demonstrated in FIG. 50C. In some embodiments, data processing system 5000 may be connected at some time with a physically connected method to data processing system 5092, or service(s) may be connected at some time with a physically connected method to data processing system 5090, or service(s) and data processing system 5000 may be connected to the same intermediary data processing system. Regardless of the many embodiments for service(s) to communicate in a LBX peer to peer manner with data processing system 5000, service(s) and data processing system 5000 preferably interoperate in context of the LBX peer to peer architecture. In some embodiments, data processing systems between service(s) and the data processing system 5000 intercept data for tracking, book-keeping, statistics, and for maintaining data potentially accessed by service informant code 28, however, the LBX peer to peer model is preferably not interfered with.

In an LN-expanse, it is important to know whether or not WDR information is of value for locating the receiving MS, for example to grow an LN-expanse with newly located MSs. FIGS. 50A through 50C demonstrate that WDR information sources may be great distances (over a variety of communications paths) from a particular MS receiving the WDR information. Carrying intermediary system indication is well known in the art, for example to know the number of hops of a communications path. The preferred embodiment uses communications reference field 1100*g* to maintain whether or not the WDR encountered any intermediate systems, for example as identified with hops, network address change(s), channel extender transmission indications, or any pertinent data to indicate whether the WDR encountered anything other than a wireless transmission (e.g. directly between the sending MS and receiving MS). This provides FIG. 26B with a means to qualify the peek at block 2634 for only those WDRs which show field 1100*g* to be over a single wireless connection from the source to the MS (i.e. block 2634 to read as "Peek all WDRs from queue 22 for confidence>confidence floor and most recent in trailing f(WTV) period of time and field 1100*g* indicating a wireless connected source over no intermediary systems"). Field 1100*g* would be set intelligently for all WDRs received and processed by the MS (e.g. inserted to queue 22). In another embodiment, fields 1100*e* and 1100*f* are used to indicate that the WDR can be relied upon for triangulating a new location of the MS (e.g. block 2660 altered to get the next WDR from the REMOTE_MS list which did not arrive except through a single wireless path). In other embodiments, the correlation (e.g. field 1100*m*) can be used to know whether it involved more than a single wireless communications path. The requirement is to be able to distinguish between WDRs that can contribute to locating a MS and WDRs which should not be used to locate the MS. In any case, WDRs are always useful for peer to peer interactions as governed by privileges and charters (see WITS filtering discussed below).

In other embodiments, the WDR fields 1100*e* and 1100*f* information is altered to additionally contain the directly connected system whereabouts (e.g. intermediary system 5090 whereabouts) so that the MS (e.g. 1000*k*) can use that WDR information relevant for locating itself (e.g. triangulating the MS whereabouts). This ensures that a MS receives all relevant WDRs from peers and also uses the appropriate WDR information for determining its own location. FIG. 26B would distinguish between the data that describes the remote MS whereabouts from the data useful for locating the receiving MS. A preferred embodiment always sets an indicator to at least field 1100*e*, 1100*f*, or 1100*g* for indicating that the WDR was in transit through one or more intermediary system(s). This provides the receiving MS with the ability to know whether or not the WDR was received directly from a wireless in-range MS versus a MS which can be communicated with so that the receiving MS can judiciously process the WDR information (see WITS filtering discussed below).

An alternate embodiment supports WDR information source systems which are not in wireless range for contributing to location determination of a MS. For example, a system can transmit WDR information outbound in anticipation of when it will be received by a MS, given knowledge of the communication architecture. Outbound date/time information strategically set along with other WDR information to facilitate making a useful measurement at a receiving MS (e.g. TDOA). The only requirement is the WDR conform to a MS interface and be "true" to how fields are set for LBX interpretation and appropriate processing, for example to emulate a MS transmitting useful WDR information.

WITS filtering provides a method for filtering out (or in) WDRs which may be of use for locating the receiving MS, or are of use for permission and/or charter processing. Supporting ranges beyond a range within wireless range to a MS can cause a massive number of WDRs to be visible at a MS. Thus, only those WDRs which are of value, or are candidate for triggering permissions or charter processing, are to be processed. Application fields 1100*k* may also contain data which affects WITS filtering (e.g. appfld.loc.blackout). WITS filtering can use the source information (e.g. MS ID) or any other WDR fields, or any combination of WDR fields to make a determination if the WDR deserves further processing. The longer range embodiment of FIGS. 50A through 50C preferably incorporates a send transmission for directing the WDRs to MSs which have candidate privileges and/or charters in place, rather than a broadcast for communicating WDRs. Broadcasting can flood a network and may inundate MSs with information for WITS filtering, however the multithreaded LBX architecture may process efficiently even for broadcast data.

In another embodiment, a configuration can be made (user or system) wherein FIGS. 13A through 13C are applicable, and non-wireless range originated WDRs are always ignored. For example, a WDR Range Configuration (WRC) indicates how to perform WITS filter processing:

1) Ignore WDRs which are originated from a wirelessly connected source (e.g. within range 1306);
2) Consider all WDRs regardless of source;
3) Ignore all WDRs regardless of source; and/or
4) Ignore WDRs which are not originated from a wirelessly connected source.

WDR fields, as described above, are to contain where the WDR originated and any relevant path it took to arrive. Block 1496 may be modified to include new blocks 1496*a*, 1496*b*, and 1496*c* such that:

- Block 1496*a* checks to see if the user selected to configure the WRC—an option for configuration at block 1406 wherein the user action to configure it is detected at block 1408;
- Block 1496*b* is processed if block 1496*a* determines the user did select to configure the WRC. Block 1496*b* interfaces with the user for a WRC setting (e.g. a block 1496*b*-1 to prepare parameters for FIG. 18 processing, and a block 1496*b*-2 for invoking the Configure value procedure of FIG. 18 to set the WRC). Processing then continues to block 1496*c*.
- Block 1496*c* is processed if block 1496*a* determines the user did not select to configure the WRC, or as the result of processing leaving block 1496*b*. Block 1496*c* handles other user interface actions leaving block 1408 (e.g. becomes the "catch all" as currently shown in block 1496 of FIG. 14B).

The WRC is then used appropriately by WITS processing for deciding what to do with the WDR in process. Assuming the WDR is to be processed further, and the WDR is not of use to locate the receiving MS, then permissions 10 and charters 12 are still checked for relevance of processing the WDR (e.g. MS ID matches active configurations, WDR contains potentially useful information for configurations currently in effect, etc). In an alternative embodiment, WITS filtering is performed at existing permission and charter processing blocks so as to avoid redundantly checking permissions and charters for relevance.

FIG. 51A depicts an example of a source code syntactical encoding embodiment of permissions, derived from the grammar of FIGS. 30A through 30E, for example as user specified, system maintained, system communicated, system generated, authorized administrator defined, etc. In one embodiment, a user may specify the source code as a portion of a hosting programming source code like C, C++, C#, Java, or any other programming language. The hosting programming source code compiler or interpreter shall recognize keywords (e.g. Permissions) to then uniquely parse and process the source code stream between associated delimiters (e.g. { . . . }) in a unique way, for example as handled by new compiler/interpreter code, or with a processing plug-in appropriately invoked by the compiler/interpreter. This allows adapting an existing programming environment to handle the present disclosure with specific processing for the recognized source code section(s). In another embodiment, the present disclosure source code is handled as any other source code of the hosting programming environment through closely adapting the hosting programming source code syntax, incorporating new keywords and contextual processing, and maintaining data and variables like other hosting programming environment variables.

FIG. 51A shows that a Permissions block contains "stuff" between delimiters ({, }) like C, C++, C#, and the Java programming languages (all referred hereinafter as Popular Programming Languages (PPLs)), except the reserved keyword "Permissions" qualifies the block which follows. Statements within the block are also aligned with syntax of PPLs. Here is an in-context description of FIG. 51A:

Text(str)="Test Case #106729 (context)";

The str variable is of type Text (i.e. BNF Grammar "text string") and is set with string "Test Case #106729 (context)". Below will demonstrate variable string substitution for the substring "context" when str is instantiated.

Generic(assignPrivs)="G=Family,Work,\vuloc [T=>20080402000130.24,<20080428; D=*str; H;]";

The assignPrivs variable is of type Generic and is set with a long string containing lots of stuff. Generic tells the internalizer to treat the assigned value as text string without any variable type validation at this time. The BNF grammar showed that variables have a type to facilitate validation at parse time of what has been assigned, however type checking is really not necessary since validation will occur in contexts when a variable is instantiated anyway. Another variable type (VarType) to introduce to the BNF grammar is "Generic" wherein anything assigned to the variable is to have its type delayed until after instantiation (i.e. when referenced later). Note that the str variable is not instantiated at this time (i.e. =the preferred embodiment, however an alternate embodiment would instantiate str at this time). Below will demonstrate a Generic variable instantiation.

```
Groups {
     LBXPHONE_USERS = Austin, Davood, Jane, Kris, Mark, Ravi,
     Sam, Tim; "SW Components" = "SM 1.0", "PIP 1.0",
            "PIPGUI 1.0", "SMGUI 1.0", "COMM 1.0", "KERNEL 1.1";
}
```

Two (2) groups are defined. In this example embodiment, "Groups" is a reserved keyword identifying a groups definition block just as "Permissions" did the overall block. The "LBXPHONE_USERS" group is set to a simplified embodiment of MS IDs Austin, Davood, etc; and the "SW Components" group is set to LBX Phone software modules with current version numbers. Any specification of the BNF Grammar (e.g. group name, group member, etc) with intervening blanks can be delimited with double quotes to make blanks significant.

```
     Grants /* Can define Grant structure(s) prior to assignment */ {
     ...
     }
```

In this example embodiment, "Grants" is a reserved keyword identifying a Grants definition block just as "Permissions" did the overall block. Statements within the Grants block are for defining Grants which may be used later for assigning privileges. "//" starts a comment line like PPLs, and "/*" . . . "*/" delimits comment lines like PPLs.

Family=\lbxall[R=0xFFFFFFFF;] [D=*str(context="Family")];

A grant named "Family" is assigned the privilege "\lbxall" and is relevant for all MS types (i.e. 0xFFFFFFFF such that the "R" is a specification for MSRelevance). \lbxall is the all inclusive privilege for all LBX privileges. \lbxall maps to a unique privilege id (e.g. maintained to field 3530*a*, FIGS. 34F and 52 "unsigned long priv", etc). Optional specifications are made with delimiters "[" and "]", which coincidentally were used in defining the BNF grammar optional specifications. Each optional specification can have its own delimiters, or all optional specifications could have been made in a single pair of delimiters. The "D" specification is a Description specification which is set to an instantiation of the str variable using a string substitution. Thus, the Description is set to the string "Test Case #106729 (Family)".

```
          Work = [T=YYYYMMDD08:YYYYMMDD17;
          D=*str(context="Work");H;] {
          ...
          };
```

A grant named "Work" is assigned as a parent grant to other grant definitions, in which case a delimited block for further grant definitions can be assigned. Optional specifications can be made for the Work grant prior to defining subordinate grants either before the Work grant block, or after the block just prior to the block terminating semicolon (";"). The Work grant has been assigned an optional "T" specification for a TimeSpec qualifying the grant to be in effect for every day of every month of every year for only the times of 8 AM through 5 PM. The Work grant also defined a Description of "Test Case #106729 (Work)". The "H" specification tells the internalizer to generate History information (e.g. FIGS. 36B, 33A, 34E HISTRY, etc) for the Work grant.

"Department 232"=\geoar,\geode,\nearar,\nearde;

The grant "Department 232" is subordinate to "Work" and has four (4) privileges assigned, and no optional specifications.

```
     "Department 458" = [D="Davood lyadi's mgt scope";] {
          "Server Development Team" = ;
          "lbxPhone Development Team" =
               {
               "Comm Layer Guys" = \mssys;\msbios;
               "GUI girls" = \msguiload;
               "Mark and Tim" = \msapps;
          };
     };
```

The grant "Department 458" is subordinate to "Work", has an optional Description specification, and has two (2) subordinate grants defined. The grant "Server Development Team" is defined, but has no privileges or optional specifications. The grant "lbxPhone Development Team" is subordinate to "Work", has no optional specifications, and has three (3) subordinate grants defined. The grant "Comm Layer Guys" has two (2) privileges assigned (\mssys and \msbios), the grant "GUI girls" has one (1) privilege assigned (\msguiload), and the grant "Mark and Tim" has one (1) privilege assigned (\msapps).

"Accounting Department" [H;]=\track;

The grant "Accounting Department" is subordinate to "Work", has optional History information to be generated, and has one (1) privilege assigned.

Parents={Mom=\lbxall; Dad=\lbxall;};

Michael-Friends=\geoam\geode;

Jason-Friends=\nearar;\nearde;

The grant "Parents" is independent of the Work grant (a peer), has two (2) subordinate grants "Mom" and "Dad", each with a single privilege assigned. The grants "Michael-Friends" and "Jason-Friends" are each independent of other grants, and each have two (2) privileges assigned. A nested tree structure of Grants so far compiled which can be used for privilege assignments are:

```
Family
Work
   Department 232
   Department 458
      Server Development Team
      IbxPhone Development Team
         Comm Layer Guys
         GUI girls
         Mark and Tim
   Accounting Department
Parents
   Mom
   Dad
Michael-Friends
Jason-Friends
```

The nested structure of the source code was intended to highlight the relationship of grants defined. Note that assigning the Work grant from one ID to another ID results in assigning all privileges of all subordinate grants (i.e. \geoar;\geode; \nearar;\nearde;\mssys;\msbios;\msguiload;\msapps;\track).

Bill: LBXPHONE_USERS [G=\caller;\callee;\trkall;];

The MS ID Bill assigns (i.e. Grant specification "G") three (3) privileges to the LBXPHONE_USERS group (i.e. to each member of the group). Privileges and/or grants can be granted. The \caller privilege enables LBXPHONE_USERS member MSs to be able to call the Bill MS. The \callee privilege enables the Bill MS to call LBXPHONE_USERS member MSs. The \trkall privilege enables LBXPHONE_USERS members to use the MS local tracking application for reporting mobile whereabouts of the Bill MS. The grants are optional (i.e. "[" and "]") because without specific grants and/or privileges specified, all privileges are granted.

LBXPHONE_USERS: Bill [G=\callee;\caller;];

Each member of the LBXPHONE_USERS group assigns (i.e. Grant specification "G") two (2) privileges to the Bill MS. The \caller privilege enables the Bill MS to be able to call any of the members of the LBXPHONE_USERS group. The \callee privilege enables the LBXPHONE_USERS member MSs to call the Bill MS.

Bill:Sophia;

All system privileges are assigned from Bill to Sophia.

Bill:Brian [*assignPrivs];

The assignPrivs variable is instantiated to "G=Family,Work, \vuloc [T=>20080402000130.24,<20080428; D=*str; H;]" as though that configuration were made literally as:

Bill:Brian [G=Family,Work,\vuloc [T=>20080402000130.24,<20080428; D="Test Case #106729 (context)"; H;]];

Note the str variable is now instantiated as well. Bill grants Brian all privileges defined in the Family grant, all privileges of the Work grant, and the specific \vuloc privilege. The privilege \vuloc has optional specifications for TimeSpec (i.e. after 1 minute 30.24 seconds into Apr. 2, 2008 and prior to Apr. 28, 2008), Description, and History to be generated. The optional specifications ([ . . . ]) would have to be outside of the other optional delimiter specifications (e.g. [G= . . . ] [ . . . ]) to be specifications for the Permission.

Bill:George [G=\geoall,\nearall;];

Bill assigns two (2) privileges to George.

Michael: Bill [G=Parents,Michael-Friends;];

Michael assigns to Bill the privileges \lbxall, \geoarr and \geode.

Jason: Bill [G=Parents,Jason-Friends;];

Jason assigns to Bill the privileges \lbxall, \nearar and \nearde.

FIG. 51B depicts an example of a source code syntactical encoding embodiment of charters, derived from the grammar of FIGS. 30A through 30E, for example as user specified, system maintained, system communicated, system generated, etc. In one embodiment, a user may specify the source code as a portion of a hosting programming source code like C, C++, C#, Java, or any other programming language. The hosting programming source code compiler or interpreter shall recognize keywords (e.g. Charters) to then uniquely parse and process the source code stream between associated delimiters (e.g. { . . . }) in a unique way, for example as handled by new internalization (e.g. compiler/interpreter) code, or with a processing plug-in appropriately invoked by the internalizer. This allows adapting an existing programming environment to handle the present disclosure with specific processing for the recognized source code section(s). In another embodiment, the present disclosure source code is handled as any other source code of the hosting programming environment through closely adapting the hosting programming source code syntax, incorporating new keywords and contextual processing, and maintaining data and variables like other hosting programming environment variables.

It is important to understand that WDRs in process (e.g. to queue 22 (_ref), outbound (_O_ref), and inbound (_I_ref)) cause the recognized trigger of WDR processing to scan charters for testing expressions, and then performing actions for those expressions which evaluate to true. Expressions are evaluated within the context of applicable privileges. Actions are performed within the context of privileges. Thus, WDRs in process are the triggering objects for consulting charters at run time. Depending on the MS hardware and how many privileged MSs are "in the vicinity", there may be many (e.g. dozens) of WDRs in process every second at a MS. Each WDR in process at a MS is preferably in its own thread of processing (preferred architecture 1900) so that every WDR in process has an opportunity to scan charters for conditional actions.

FIG. 51B shows that a Charters block contains "stuff" between delimiters ({, }) like PPLs, except the reserved keyword "Charters" qualifies the block which follows. Statements within the block are also aligned with syntax of PPLs. Here is an in-context description of FIG. 51B:

Condition(cond1)="(location @@ \loc_my) [D="Test Case #104223 (v)";]";

The variable cond1 is of type Condition and is set accordingly. Validation of the variable type can occur here since the type is known. Cond1 is a Condition specification with an optional specification for the Description. Since the type "Generic" can be used, it may be convenient to always use that.

"ms group"={"Jane", "George", "Sally"};

This is another method for specifying a group without a Groups block. The internalizer preferably treats an assignment using block delimiters outside of any special block definitions as a group declaration. While there has been no group hierarchies demonstrated, groups within groups can certainly be accomplished like Grants.

```
( ((_msid = "Michael") & *cond1(v="Michael")) |
    ((_msid = "Jason") & *cond1(v="Jason")) ):
  Invoke App myscript.cmd ("S"), Notify Autodial 214-405-6733;
```

_msid is a WDRTerm indicating to check the condition of the WDRs maintained to the local MS (e.g. processed for inserting to queue 22). The condition _msid="Michael" tests if the WDR in process has a WDR MS ID field 1100*a* equal to the MS ID Michael. "&" is a CondOp. After instantiation of cond1 with the string substitution the second condition is "(_location @@ \loc_my) [D="Test Case #104223 (v)";]" which tests the WDR in process (e.g. for insertion to queue 22) for a WDR location field 1100*c* which was at my current location (\loc_my is a system defined atomic term for "my current location" (i.e. the current location of the MS checking the WDR in process)). @@ is an atomic operator for "was at". There is an optional description specified for the condition to be generated. The expression formed on the left hand side of the colon (:) not only tests for Michael WDR information, but also Jason WDR information with the same WDR field tests. If the WDR in process (contains a MS ID=Michael AND Michael's location was at my current location at some time in the past), OR (i.e. | CondOp) the WDR in process (contains a MS ID=Jason AND Jason's location was at my current location at some time in the past), then the Actions construct (i.e. right hand side of colon) is acted upon. The "was at" atomic operator preferably causes access to LBX History 30 after a fruitless access to queue 22. It may have been better to specify another condition for Michael and Jason WDRs to narrow the search, otherwise if LBX history is not well pruned the search may be timely. For example, the variable may have been better defined prior to use as:

Condition(cond1)="(_location (2W)$(10F) \loc_my) [D="Test Case #104223 (v)";]";

for recently in vicinity (i.e. within 10 feet) of my location in last 2 weeks helps narrow the search.

Parenthesis are used to affect how to evaluate the expression as is customary for an arithmetic expression, and can be used to determine which construct the optional specifications are for. Of course, a suitable precedence of operators is implemented. So, if the Expression evaluates to true, the actions shall be processed. There can be one or more actions processed. The first action performs an Invoke command with an Application operand and provides the parameter of "myscript.cmd("S")" which happens to be an executable script invocable on the particular MS. A parameter of "S" is passed to the script. The script can perform anything supported in the processable script at the particular MS. The second action performs a Notify command with an Autodial operand and provides the parameter of "214-405-6733". Notify Autodial will automatically perform a call to the phone number 214-405-6733 from the MS. So, if the MS of this configuration is currently at a location where Jason or Michael (in the vicinity) had been at some time before (as maintained in LBX History if necessary, or in last 2 weeks in refined example), then the two actions are processed. LBX History 30 will be searched for previous WDR information saved for Michael and Jason to see if the expression evaluates to true when queue 22 does not contain a matching WDR for Michael or Jason.

It is interesting to note that the condition "((\locByID_Michael @@ \loc_my) I (\locByID_Jason @@ \loc_my))" accomplishes the same expression shown in FIG. 51B described above. \locRef_is an atomic term for the WDR location field with the suffix (Ref) referring to the value for test. \loc"R e f" is an acceptable format when there are significant blanks in the suffix for testing against the value of the WDR field. It is also interesting to note that the expression "(\loc_my @@ \locByID_Michael)" is quite different. The expression "(\loc_my @@ \locByID_Michael)" tests if my current location was at Michael's location in history, again checking LBX history. However, the WDR in process only provided the trigger to check permissions and charters. There is no field of the in process WDR accessed here.

```
((_I_msid = "Brian") & (_I_location @ \loc_my)
        [D="multi-cond text";H;]):
        Invoke App (myscript.cmd ("B")) [T=20080302;],
        Notify Autodial (214-405-5422);
```

_I_msid is a WDRTerm indicating to check the condition of the WDRs inbound to the local MS (e.g. deposited to receive queue 26). The condition _I_msid="Brian" tests if the inbound WDR has a WDR MS ID field 1100*a* equal to the MS ID Brian. "=" is an atomic operator. & is a CondOp. _I_location is the contents of the inbound WDR location field 1100*c*, so that the condition of (_I_location @ \loc_my) tests the inbound WDR for a WDR location field 1100*c* which is at my current location. @ is an atomic operator for "is at". There is an optional description specified for the condition as well as history information to be generated. The expression formed on the left hand side of the colon (:) tests for inbound WDRs from Brian wherein Brian is at my (i.e. receiving MS) current location. Assuming the expression evaluates to true, then the two (2) actions are performed. The actions are similar to the previous example, except the syntax is demonstrated to show parentheses may or may not be used for command/operand parameters. Also, the first action has an optional TimeSpec specification which mandates that the action only be performed any time during the day of Mar. 2, 2008. Otherwise, the first action will not be performed. The second action is always performed.

The _I_fldname syntax is a WDRTerm for inbound WDRs which makes sense for our expression above. A careless programmer/user could in fact create expressions that may never occur. For example, if the user specified _O_instead of _I_, then outbound rather than inbound WDRs would be tested. ((_O_msid="Brian") & (_O_location @ \loc_my)) causes outbound WDRs to be tested (e.g. deposited to send queue 24) for MS ID=Brian which are at my current location (i.e. current location of the MS with the configuration being discussed). Mixing _, _I_, and _O_prefixes has certain semantic implications and must be well thought out by the user prior to making such a configuration. The charter expression is considered upon an event involving each single WDR and is preferably not used to compare to a plurality of potentially ambiguous/unrelated WDRs at the same time. A single WDR can be both in process locally (e.g. inserted to queue 22) and inbound to the MS when received from MSs in the vicinity. It will not be known that the WDR meets both criteria until after it has been inbound and is then being inserted to queue 22. Likewise, a single WDR can be both in process locally (e.g. inserted to queue 22) and outbound from the MS. It will not be known that the WDR meets both criteria until after it has been retrieved from queue 22 and then ready for being sent outbound. The programmer/user can create bad configurations when mixing these syntaxes. It is therefore recommended, but not required, that users not mix WDR trigger syntax. Knowing a WDR is inbound and then in process to queue 22 is straightforward (e.g. origination other than "this MS"). Knowing a WDR was on queue 22 and is outbound is also straightforward (e.g. origination at outbound="this MS"). However, a preferred embodiment prevents mixing these syntaxes for triggered processing.

```
(M_sender = ~emailAddrVar [T=<YYYYMMDD18]):
    Notify Indicator (M_sender, \thisMS) [D="Test Case #104223"; H;];
```

M_sender is an AppTerm for the registered Mail application (see FIGS. 53 and 55A&B), specifically the source address of the last email object received. ~emailAddrVar references a programmatic variable of the hosting programming environment (PPLs), namely a string variable to compare against the source address (e.g. billj@iswtechnologies.com). If the variable type does not match the AppTerm type, then the internalizer (e.g. compiler/interpreter) should flag it prior to conversion to an internalized form. Alternate embodiments will rely on run time for error handling. The Condition also specifies an optional TimeSpec specification wherein the condition for testing is only active during all seconds of the hour of 6:00 PM every day (just to explain the example). Expressions can contain both AppTerms and WDRTerms while keeping in mind that WDRs in process are the triggers for checking charters. M_sender will contain the most recent email source address to the MS. This value continually changes as email objects are received, therefore the window of opportunity for containing the value is quite unpredictable. Thus, having a condition solely on an AppTerm without regard for checking a WDR that triggers checking the configuration seems useless, however a MS may have many WDRs in process thereby reasonably causing frequent checks to M_sender. A more useful charter with an AppTerm will check the AppTerm against a WDR field or subfield, while keeping in mind that WDRs in process trigger testing the charter(s). For example:

(appfld.email.source=M_sender)

or the equivalent of:

(M_sender=_appfld.email.source)

checks each WDR in process for containing an Application field 1100*k* from the email section (if available) which matches an AppTerm. While this again seems unusual since M_sender dynamically changes according to email objects received, timeliness of WDRs in process for MSs (e.g. in the wireless vicinity) can make this useful. Further, the programmer/user can specify more criteria for defining how close/far in the vicinity (e.g. atomic operators of $(range), (spec)$ (range), etc.

((appfld.email.source=M_sender) & (location $(500F) \loc_my))

The WDR in process is checked to see if the originating MS has a source email address that matches a most recently received email object and the MS is within 500 feet of my current location. This configuration can be useful, for example to automatically place a call to a friend when they just sent you an email and they are nearby. You can then walk over to them and converse about the email information. Good or poor configurations can be made. One embodiment of an internalizer warns a user when an awkward configuration has been made.

In looking at actions for this example, the command operand pair is for "Notify Indicator" with two parameters (M_sender, \thisMS). M_sender is what to use for the indicator (the source address matched). Thus, an AppTerm can be used as a parameter. \thisMS is an atomic term for this MS ID. If the expression evaluates to true, the MS hosting the charter configuration will be notified with an indicator text string (e.g. billj@iswtechnologies.com). Notify Indicator displays the indicator in the currently focused title bar text of a windows oriented interface. In another embodiment, Notify indicator command processing displays notification data in the focused user interface object at the time of being notified. The action has optional specifications for Description and History information to be generated (when internalized).

In general, History information will be updated as the user changes the associated configuration in the future, either in syntax (recognized on internalization (e.g. to data structures)), with FIGS. 38 through 48B, etc.

```
(B__srchSubj ^ M__subject) & !(__fcnTest(B__srchSubj)) :
      "ms group"[G].Store DBobject(JOESDB.LBXTABS.TEST,
      "INSERT INTO TABLESAV (" && \thisMS && ", " &&
         \timestamp && ", 9);", \thisMS);
```

IF (the most recently specified B_srchSubj string is in (i.e. is a substring of) the most recently received email object M_subject (i.e. email subject string)), AND if (the invocation of the function _fcnTest( ) with the parameter of the most recently specified B_srchSubj string returns false) (i.e. ! the return code results in true), THEN the configured action after the colon (:) shall take place assuming there are applicable privileges configured as well. Again, keep in mind that WDRs in process (e.g. to queue 22, outbound and/or inbound) provide the triggers upon which charters are tested, therefore the fact that no WDR field is specified in the conditions is strange, but makes a good point. The example demonstrates using otherwise unrelated AppTerms and an invoked function (e.g. can be dynamically linked as in a Dynamic Link Library (DLL) or linked through an extern label _fcnTest). B_srchSubj contains the most recently specified search criteria string requested to the MS browser application. WDRTerm(s), AppTerm(s) and atomic terms can be used in conditions, as parameters, or as portions in any part of a configured charter.

The action demonstrates an interesting format for representing the optional Host construct (qualifier) of the BNF grammar for where the action should take place (assuming privilege to execute there is configured). "ms group"[G]. tells the internalizer to search for a group definition like an array and find the first member of the group meeting the subscript definition. This would be "George" (the G). Any substring of "George" (or the entire string) could have been used to indicate use George from the "ms group". This allows a shorthand reference to the item(s) of the group. Multiple members that match "G" would all apply for the action. Also, note that the double quotes are used whenever variables contain significant blanks. "ms group"[G].Store DBobject tells the internalizer that the Command Operand pair is to be executed at the George MS for storing to a database object per parameters. An equivalent form is George.Store DB-object with the Host specification explicitly specified as George. The parameters of (JOESDB.LBXTABS.TEST, "INSERT INTO TABLESAV ("&& \thisMS &&", "&& \timestamp &&", 9);", \thisMS) indicates to insert a row into the table TABLESAV of the TEST database at the system "this MS" (the MS hosting the configuration). The second (query) parameter matches the number of columns in the table for performing a database row insert. Like other compilers/interpreters, the " " evaluates to a single double quote character when double quotes are needed inside strings. A single quote can also be legal to delimit query string parameters (shown below). This example shows using atomic term(s) for a parameter (i.e. elaborates to underlying value; WDRTerm(s) can also be used for parameters). This example introduces a concatenation operator (&&) for concatenating together multiple values into a result string for one parameter (e.g. "INSERT INTO TABLESAV ('Bill', '20080421024421.45', 9);"). Other embodiments will support other programmatic operators in expressions for parameters. Still other embodiments will support any reasonable programmatic statements, operators, and syntax among charter configuration to facilitate a rich method for defining charters 12.

Note that while we are configuring for the MS George to execute the action, we are still performing the insert to the MS hosting the Charter configuration (i.e. target system is \thisMS). We could just as easily have configured:

```
Store DBobject(JOESDB.LBXTABS.TEST,
    "INSERT INTO TABLESAV (" && \thisMS && ", " &&
        \timestamp && ", 9);");
```

without using George to execute the action, and to default to the local MS. Privileges will have to be in place for running the action at the George MS with the original charter of FIG. 51B.

```
( _I_msid = "Sophia" & \loc_my (30M)$$(25M) _I_location ) :
    "ms group".Invoke App (alert.cmd);
```

_I_msid is a WDRTerm indicating to check the condition of the WDRs inbound to the local MS (e.g. deposited to receive queue 26). The condition _I_msid="Sophia" tests if the inbound WDR has a WDR MS ID field 1100*a* equal to the MS ID Sophia. "=" is an atomic operator. & is a CondOp. _I_location is the contents of the inbound WDR location field 1100*c*, so that the condition of (\loc_my 30M$$25M _I_location) tests my current location (i.e. receiving MS) for being within 25 meters, within the last 30 minutes, of the location of the WDR received. A group is specified for where to run the action (i.e. Host specification), yet no member is referenced. The alert.cmd file is executed at each MS of the group (all three), provided there is a privilege allowing this MS to run this action there, and provided the alert.cmd file is found for execution (e.g. preferably uses PATH environment variable or similar mechanism; fully qualified path can specify).

```
(%c:\myprofs\interests.chk > 90):
    Send Email ("Howdy " && _I_msid && " !!\n\nOur
        profiles matched > 90%.\n\n" && "Call me at " &&
        \appfld.phone.id && ". We are " && (_I_location -
        \loc_my)F && " feet apart\n", \appfld.source.id.email,
        "Call Me!",, _I_appfld.email.source);
```

This example uses an atomic profile match operator N. A profile is optionally communicated in Application field 1100*k* subfield _appfld.profile.contents. A user specifies which file represents his current profile and it is sent outbound with WDRs (see FIG. 78 for profile example). Upon receipt by a receiving MS, the current profile can be compared to the profile information in the WDR. (% c:\myprofs\interests.chk>90) provides a condition for becoming true when the hosting MS profile interests.chk is greater than 90% a match when matching to a WDR profile of field 1100*k* (preferably matches on a tag basis). The profile operator here is triggered on in process WDRs. An alternate embodiment will specify where to check the WDR (e.g. _I_%, _O_% or _%). If the expression evaluates to true, the Send Email (Command Operand pair) action is invoked with appropriate parameters. Note that the newline (\n) character and concatenation operator is used. Also, note the WDRTerm (_I_location) and atomic term (\loc_my) were used in an arithmetic statement to figure out the number of feet in distance between the location of the inbound WDR and "my current location". The result is automatically typecast to a string for the concatenation like most PPLs. The recipient is the email source in Application fields 1100*k*. The default email attributes are specified (,,).

In sum, there are many embodiments derived from the BNF grammar of FIG. 30A through 30E. FIGS. 51A and 51B are simple examples with some interesting syntactical feature considerations. Some embodiments will support programmatic statements intermingled with the BNF grammar syntax derivative used to support looping, arithmetic expressions, and other useful programmatic functionality integrated into Privilege and Charter definitions. FIGS. 51A and 51B illustrate a WPL for programming how a MS is to behave. WPL is a unique programming language wherein peer to peer interaction events containing whereabouts information (WDRs) provide the triggers for novel location based processing. Permissions and charters provide rules which govern the interoperable LBX processing between MSs. While WPL is more suited for a programmer type of user, the intent of this disclosure is to simplify configurations for all types of users. WPL may suit an advanced user while FIGS. 35A through 37D may suit more prevalent and novice users. Other embodiments may further simplify configurations. Some WPL embodiments will implement more atomic operators, AppTerm(s), WDRTerm(s) and other configurable terms without departing from the spirit and scope of this disclosure. It is the intent that less time be spent on documentation and more time be spent implementing it. Permissions and charters are preferably centralized to the MS, and maintained with their own user interface, outside of any particular MS application for supervisory control of all MS LBX applications. See FIG. 1A for how PIP data 8 is maintained outside of other MS processing data and resources for centralized governing of MS operations.

In alternate embodiments, an action can return a return code/value, for example to convey success, failure, or some other value(s) back to the point of performing the action. A syntactical embodiment:

```
((_I_msid = "Brian") & (_I_location @ \loc_my)
[D="multi-cond text";H;]):
    Notify Autodial (214-405-5422,,,, Invoke App (myscript.cmd ("B"))
        [T=20080302;]);
```

Based on an outcome from Invoke App (myscript . . . ), the returned value is passed back and used as a parameter to Notify AutoDial. The Notify AutoDial executable spawned can then use the value at run-time to affect Notify processing. Invoke App may return a plurality of different values depending on the time the action is processed, and what the results are of that processing. Some parameters are specified to use defaults (i.e. ,,,,).

There are many methods with different atomic operators and different Terms to accomplish the same expression or condition for providing convenient user specification. An expression with a plurality of conditions facilitates conjuncture. A charter expression syntax or encoding may be output by a MS accessed application (e.g. user interface to configure a geo-fence). The following are selected syntax examples for various condition discussions:

Geofence (_loc $(20Y) \locByL_-30.21,−93.8) tests whether the MS of the in-process WDR has a location which is within a radius of 20 Yards of the point having the specified latitude and longitude. Precision specification (e.g. number of degree decimal places) of the point may include less or more two dimensional geographical space to be within range of. A zero elevation (or altitude) may be assumed, or one may be specified, for example to support a spherical radius as well as a circular radius.

(_I_loc >$(20Y) \locByL_-30.21,−93.8) tests whether the MS of the in-bound WDR has a location which is newly within a radius of 20 Yards of the point above.

(_loc (5M)$$(0) \PS_+33.27,−97.4;+34.1,−97.3;+34.13,−97.12) tests whether the MS of the in-process WDR has a location described to be departed in the last 5 minutes from the vicinity defined by the two dimensional polygon (triangle) described with points having latitude and longitude (PointSet specification). The zero (0) range specifies to use the bounds of the polygon. A non-zero value for range will cause checking the condition to be within the range of the bounds of the polygon.

(_I_loc (5M)$$(1000F) \PS_3DGeo_+33.27,−97.4, 4500F; +34.1,−97.3,1L; +34.13,−97.21,2000Y;+34.3,−97.1, 2000Y;+34.89,−97.08,2000Y) tests whether the MS of the in-bound WDR has a location described to be departed in the last 5 minutes from the vicinity defined by the three dimensional polygonal region with points having latitude, longitude and elevation (or altitude). The 1000F range specifies to check if the WDR contains a location within 1000F of any bounds of the three dimensional polygon.

((_msid="Sam") & (_loc <E>\loc_my) & (_loc <S>\loc_my)) tests whether the in-process WDR has a MS ID of "Sam" and if Sam is Southeast of the MS processing the Sam WDR. Depending on embodiments of MS IDs, an automatic conversion may occur via a lookup when the MS ID embodiment is not already in a raw form of "Sam". The lookup may be from local mapping information, or via access to mapping information remotely (e.g. propagated service interface which in turn accesses a database service interface).

Situational Location (\slByID_Larry=\sl_lat=+34.1,lon=−97.3;elev=1L; speed>42) tests whether the MS with an ID of Larry can be described by the specified situational location. Note that any of the usual WDRTerm field reference names can be used in a situational location atomic term, and operators other than testing equivalency (e.g. >) may be supported. In some embodiments, a speed prefix or suffix is used to specify speed units which are appropriately converted when necessary (e.g. 42 MPH). Any constant which can be specified in more than one units of measurement are to support a qualifier in appropriate places of processing for enabling conversions when comparisons are processed.

(_WDR=\sl_lat=+34.1,lon=−97.3;elev=1L;speed>42) tests whether the in-process WDR can be described by the specified situational location. While a plurality of conditions can be specified to check an expression involving a situational location, a special syntax may also be used for contextual comparison. A WDR specification (_I_WDR and _O_WDR also) is a contextual WDRTerm for comparison because the condition context implies which fields to check. This saves on encoding lengths (e.g. syntax required).

(_I_WDR=\sl_lat=+34.1,lon=−97.3; appfld.profile.contents::hangouts>>"Starbucks") tests whether the in-bound WDR can be described by the specified situational location. Note that the usual WDRTerm field reference appfld.profile.contents is specified and a particular tag is checked to contain "Starbucks". Preferably, tag element comparisons are not case sensitive. Any profile tag can be accessed. A tag hierarchy may be specified (e.g.::home,state) if there is chance of an ambiguous tag specification.

Movement Monitoring ((_msid="Sam") & (_loc $(2M) \locByID_Sam)) tests whether the in-process WDR has a MS ID of Sam AND the location of the in-process WDR is within 2 meters of the most recent location (if found) of a WDR from Sam found in history (e.g. on queue 22). Preferably, the expression results in False if no record of Sam is found, depending on the depth of queue 22 (supported number of entries) and/or whether or not LBX history 30 is checked.

(\q_msid=Sam $(10M) \h_msid=Sam) tests whether the most recent WDR from Sam on queue 22 has a location within 10 meters of the location of the most recent Sam WDR from LBX history 30. This condition should be made with some knowledge of where history 30 starts and where queue 20 ends for maintaining timely WDRs.

(\q_msid=Sam;_dt>20090927120405 $(10M) \h_msid=Sam;_dt>=20090227;_dt<20090427) tests whether the most recent WDR from Sam on queue 22 later than a date/time stamp has a location within 10 meters of the most recent location of Sam from LBX history 30 during the specified time period. An alternate embodiment may check all WDRs in the time period. Note that any WDRTerm can have a condition for search and the same WDRTerm reference may be used a plurality of times in the atomic term.

Application Activities ((_msid="Sam") & ((_appfld.rfid.passive.enabled=True)| (_appfld.rfid.active.enabled=True)) & (_loc=\loc_my)) tests whether the in-process WDR: is from the Sam MS AND the application fields section shows RFID capability is enabled AND the location matches the location of the MS where the charter condition is being evaluated. Lack of a WDR field for testing in a condition (e.g. not contained in WDR) preferably causes an error which is logged which prevents the Charter from action( )) from occurring. Other embodiments may assume a False condition to prevent charters from firing.

((\appLive="Geofencing") & (_I_msid="Sam") & (_I_loc $(2500F) \loc_my)) tests whether the in-bound WDR: is from the Sam MS AND SAM is within 2500 feet of my current location AND the Geofencing application is active at the MS of charter processing of this expression.

FIG. 52 depicts another preferred embodiment C programming source code header file contents, derived from the grammar of FIGS. 30A through 30E. FIG. 52 is more efficient for an internalized BNF grammar form by removing unnecessary data. When comparing FIG. 52 with FIGS. 34E through 34G, FIG. 52 has removed description and history information since this is not necessary for internalization/processing. A TIMESPEC is the same as defined at the top of FIG. 34E, but time specification information has been merged to where it is needed, rather than keeping it in multiple places as configured for deducing a merged result later. There are many reasonable embodiments of a derivative of the BNF grammar of FIGS. 30A through 30E.

Figure 53:
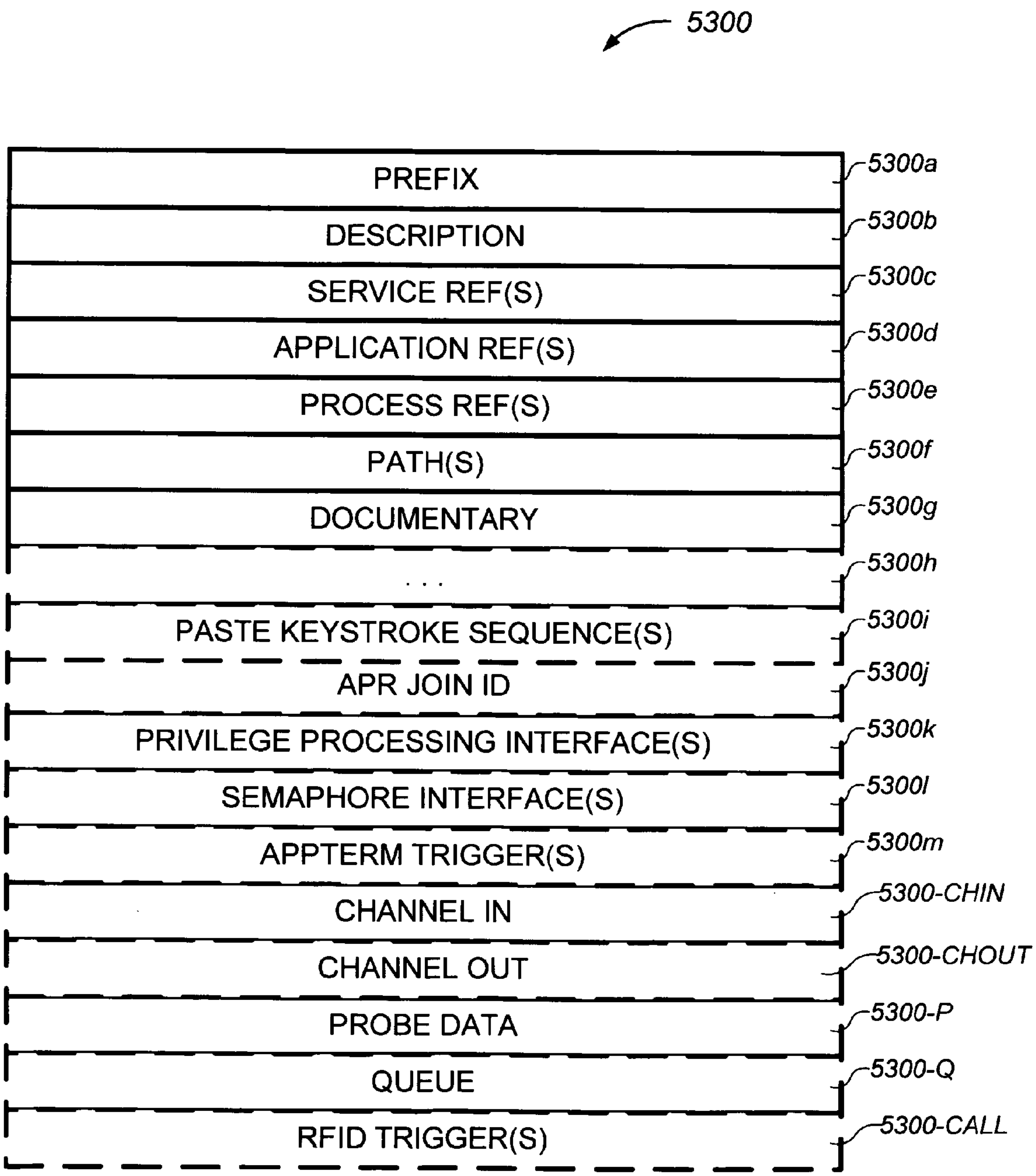
FIG. 53 depicts a preferred embodiment of a Prefix Registry Record (PRR) for discussing operations of the present disclosure.

FIG. 53 depicts a preferred embodiment of a Prefix Registry Record (PRR) for discussing operations of the present disclosure. A PRR 5300 is for configuring which prefix is assigned to which application used in an AppTerm. This helps to ensure that an AppTerm be properly usable when referenced in a charter. A prefix field 5300*a* provides the prefix in an AppTerm syntax (e.g. M_sender such that "M" is the prefix). Any string can be used for a prefix (i.e. configured in field 5300*a*), but preferably there are a minimal number of characters to save syntax encoding space. A description field 5300*b* provides an optional user specified description for a PRR 5300, but it may include defaulted data available with an application supporting at least one AppTerm. A service references field 5300*c* identifies, if any, the data processing system services associated with the application for the AppTerm referenced with the prefix of field 5300*a*. Validation of such services may occur through an API, or may be specified by a knowledgeable user, administrator, or system setup. Field 5300*c* potentially contains a list of service references. An application references field 5300*d* identifies, if any, data processing system application references (e.g. names) associated with the Application for the AppTerm referenced with the prefix of field 5300*a*. Validation of such applications referenced may occur through an API, or may be specified by a knowledgeable user, administrator, or system setup. Field 5300*d* potentially contains a list. A process references field 5300*e* identifies, if any, data processing operating system processes for spawning associated with the Application for the AppTerm referenced with the prefix of field 5300*a*. Validation of such processes may occur through an API, or may be specified by a knowledgeable user, administrator, or system setup. Field 5300*e* potentially contains a list. A paths field 5300*f* identifies, if any, data processing system file name paths to executables (e.g. .exe, .dll, etc) for spawning associated with the Application for the AppTerm referenced with the prefix of field 5300*a*. Validation of such paths may occur through an API, or may be specified by a knowledgeable user, administrator, or system setup. Field 5300*f* potentially contains a list. A documentary field 5300*g* documents each Application data variable (i.e. AppTerm data name without prefix), and an optional description, for what data is exposed for the Application which can be used in the AppTerm. Validation of data in field 5300*g* data may occur through an API, or may be specified by a knowledgeable user, administrator, or system setup. Field 5300*g* potentially contains a list. Extension field 5300*h* contains other data for how to test for whether or not the Application of the PRR is up and running in the MS, additional information for starting the Application, and additional information for accessing application vitals. Validation of information may occur through an API, or may be specified by a knowledgeable user, administrator, or system setup. Field 5300*h* may be a list, or null. Other PRR fields are described below in context of use.

In one preferred embodiment, PRRs are supplied with a MS prior to user first MS use, and no administrator or user has to maintain them. In another embodiment, only a special administrator can maintain PRRs, which may or may not have been configured in advance. In another embodiment, a MS user can maintain PRRs, which may or may not have been configured in advance.

FIG. 54 depicts an example of an XML syntactical encoding embodiment of permissions and charters, derived from the BNF grammar of FIGS. 30A through 30E, for example as user specified, system maintained, system communicated, system generated, etc. Enough information is provided for those skilled in the art to define an appropriate XML syntax of the disclosed BNF grammar in light of disclosure heretofore. A simple embodiment of variables can be handled with a familiar Active Service Page (ASP) syntax wherein variables are defined prior to being instantiated with a special syntax (e.g. <%=varName %>). Double quotes can be represented within double quote delimited character strings by the usual providing of two double quotes for each double quote character position. Those skilled in the art of XML recognize there are many embodiments for XML tags, how to support subtags, and tag attributes within a tag's scope. FIG. 54 provides a simple reference using a real example. FIG. 54 illustrates a WPL for less advanced users.

The syntax "_location $(300M)\loc_my" is a condition for the WDR in process being within 300 Meters of the vicinity of my current location. Other syntax is identifiable based on previous discussions.

Figure 55A:
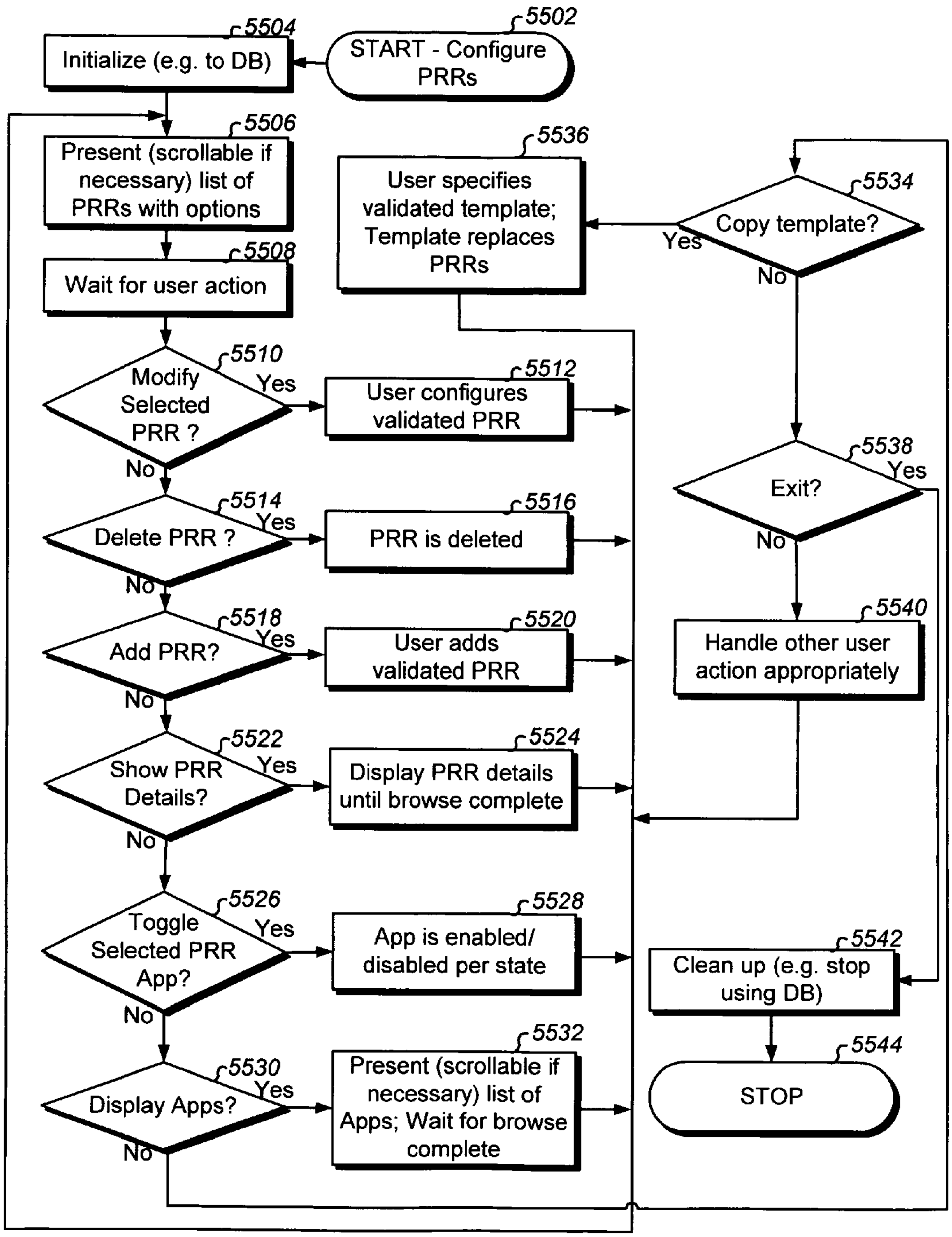
FIG. 55A depicts a flowchart for describing a preferred embodiment of MS user interface processing for Prefix Registry Record (PRR) configuration.

FIG. 55A depicts a flowchart for describing a preferred embodiment of MS user interface processing for Prefix Registry Record (PRR) configuration. Block 5502 may begin as the result of an authenticated administrator user interface, authenticated user interface, or as initiated by a user. Block 5502 starts processing and continues to block 5504 where initialization is performed before continuing to block 5506. Initialization may include initializing for using an SQL database, or any other data form of PRRs. Processing continues to block 5506 where a list of current PRRs are presented to the user. The list is scrollable if necessary. A user preferably has the ability to perform a number of actions on a selected/specified PRR from the list presented at block 5506. Thereafter, block 5508 waits for a user action in response to presenting PRRs. Block 5508 continues to block 5510 when a user action has been detected. If block 5510 determines the user selected to modify a PRR, then the user configures the specified PRR at block 5512 and processing continues back to block 5506. Block 5512 interfaces with the user for PRR 5300 alterations until the user is satisfied with changes which may or may not have been made. Block 5512 preferably validates to the fullest extent possible the data of PRR 5300. If block 5510 determines the user did not select to modify a PRR, then processing continues to block 5514. If block 5514 determines the user selected a PRR for delete, then block 5516 deletes the specified PRR, and processing continues back to block 5506. Depending on an embodiment, block 5516 may also properly terminate the application fully described by the PRR 5300. If block 5514 determines the user did not select to delete a PRR, then processing continues to block 5518. If block 5518 determines the user selected to add a PRR, then the user adds a validated PRR at block 5520 and processing continues back to block 5506. Block 5520 preferably validates to the fullest extent possible the data of PRR 5300. Depending on an embodiment, block 5520 may also properly start the application described by the PRR 5300. If block 5518 determines the user did not select to add a PRR, then processing continues to block 5522. If block 5522 determines the user selected to show additional detail of a PRR, then block 5524 displays specified PRR details including those details not already displayed at block 5506 in the list. Processing continues back to block 5506 when the user is complete browsing details. If block 5522 determines the user did not want to browse PRR details, then processing continues to block 5526. If block 5526 determines the user selected to enable/disable (toggle) a specified PRR, then block 5528 uses PRR 5300 to determine if the associated application is currently enabled (e.g. running) or disabled (e.g. not running). Upon determination of the current state of the application for the specified PRR 5300, block 5528 uses the PRR 5300 to enable (e.g. start if currently not running), or disable (e.g. terminate if currently running), the application described fully by the specified PRR, before continuing back to block 5506. Block 5528 should ensure the Application has been properly started, or terminated, before continuing back to block 5506. If block 5526 determines the user did not want to toggle (enable/disable) a PRR described application, then processing continues to block 5530. If block 5530 determines the user selected to display candidate AppTerm supported applications of the MS, then block 5532 presents a list of MS applications potentially configurable in PRR form. Block 5532 will interface with the user until complete browsing the list. One embodiment of block 5532 accesses current PRRs 5300 and displays the applications described. Another embodiment accesses an authoritative source of candidate AppTerm supported applications, any of which can be configured as a PRR. Processing continues back to block 5506 when the user's browse is complete. If block 5530 determines the user did not select to display AppTerm supported applications, then processing continues to block 5534. If block 5534 determines the user selected to use a data source as a template for automatically populating PRRs 5300, then block 5536 validates a user specified template, uses the template to alter PRRs 5300, and processing continues back to block 5506. PRRs may be optionally altered at block 5536 for replacement, overwrite, adding to, or any other alteration method in accordance with a user or system preference. In some embodiments, existing PRRs can be used for template(s). If block 5534 determines the user did not select to use a data source for a PRR template, then processing continues to block 5538. If block 5538 determines the user did not select to exit PRR configuration processing, then block 5540 handles all other user actions detected at block 5508, and processing continues back to block 5506. If block 5538 determines the user did select to exit, then processing continues to block 5542 where configuration processing cleanup is performed before terminating FIG. 55A processing appropriately at block 5544. Depending on an embodiment, block 5542 may properly terminate data access initialized at block 5504, and internalize PRRs for a well performing read-only form accessed by FIG. 55B. Appropriate semaphore interfaces are used.

FIG. 55A is used to expose those AppTerm variables which are of interest. Candidate applications are understood to maintain data accessible to charter processing. Different embodiments will utilize global variables (e.g. linked extern), dynamically linked variables, shared memory variables, or any other data areas accessible to both the application and charter processing with proper thread safe synchronized access.

Figure 55B:
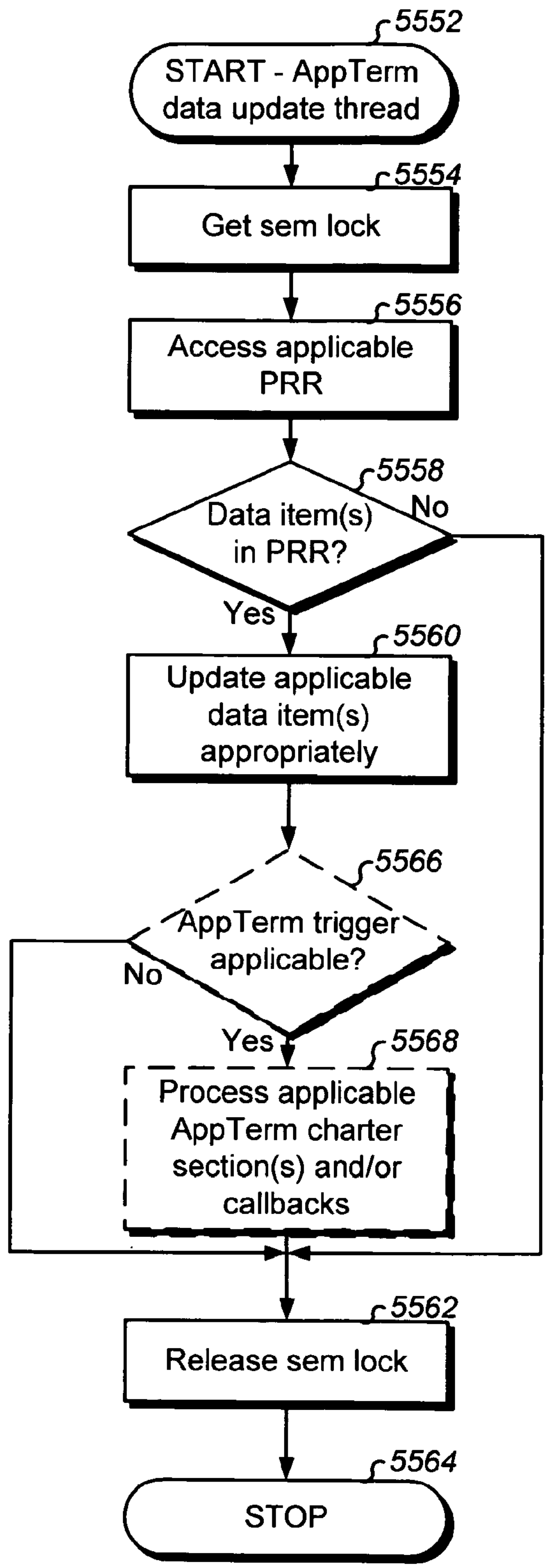
FIG. 55B depicts a flowchart for describing a preferred embodiment of Application Term (AppTerm) data modification.

FIG. 55B depicts a flowchart for describing a preferred embodiment of Application Term (AppTerm) data modification. An application thread performing at least one AppTerm update uses processing of FIG. 55B. A participating application thread starts processing at block 5552 as the result of a standardized interface, integrated processing, or some other appropriate processing means. Block 5552 continues to block 5554 where an appropriate semaphore lock is obtained to ensure synchronous data access between the application and any other processing threads (e.g. charter processing). Processing then continues to block 5556 for accessing the application's associated PRR (if one exists). Thereafter, if block 5558 determines the PRR exists and at least one of the data item(s) for modification are described by field 5300*g*, block 5560 updates the applicable data item(s) described by field 5300*g* appropriately as requested by the application invoking FIG. 55B processing. Thereafter, block 5562 releases the semaphore resource locked at block 5554 and processing terminates at block 5564.

If block 5558 determines the associated PRR was not found or all data items of the found PRR for modification are not described by field 5300*g*, then processing continues directly to block 5562 for releasing the semaphore lock, thereby performing no updates to an AppTerm. PRRs 5300 control eligibility for modification by applications, as well as which AppTerm references can be made in charter processing.

An AppTerm is accessed (read) by grammar processing with the same semaphore lock control used in FIG. 55B.

Figure 56:
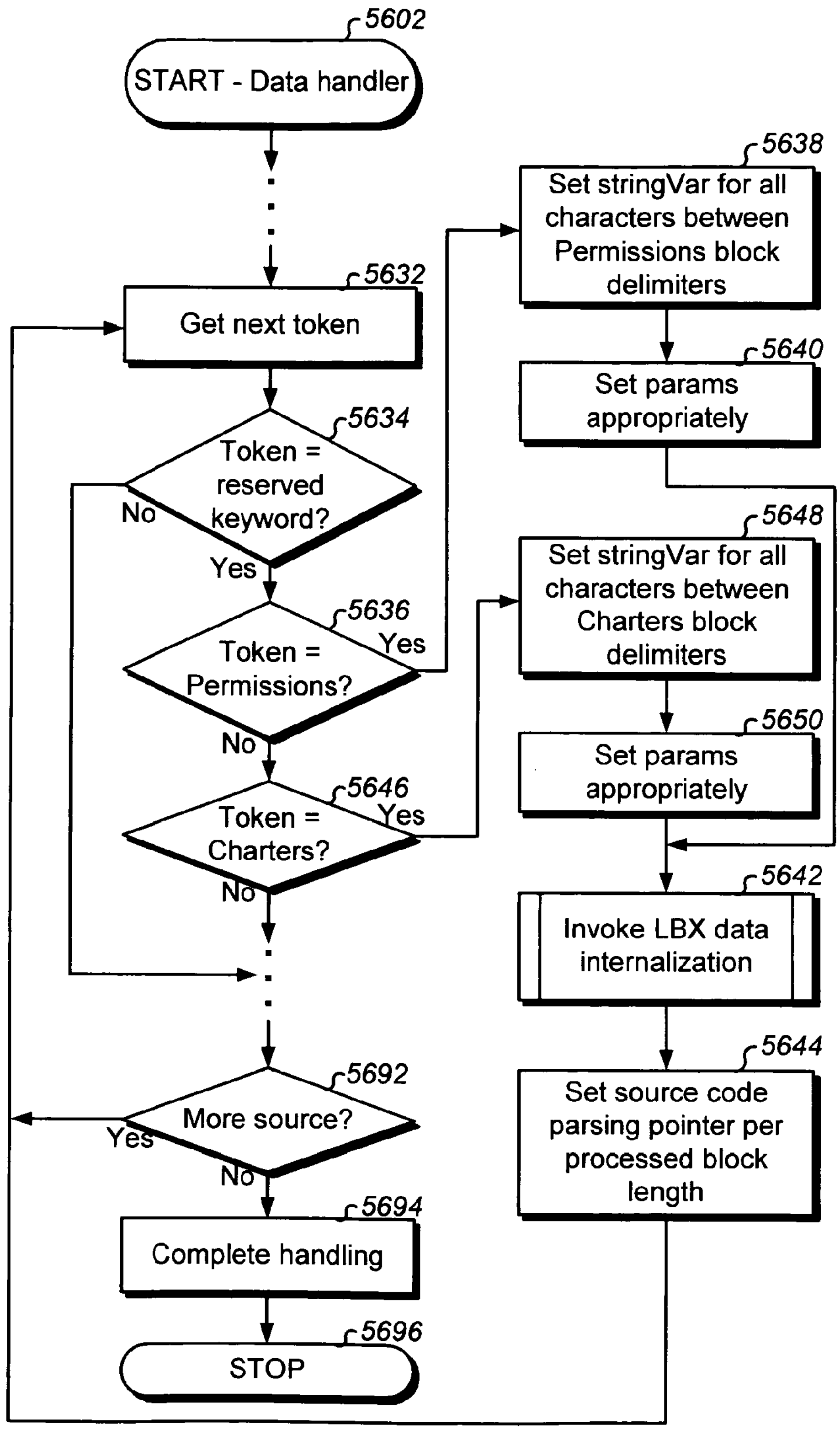
FIG. 56 depicts a flowchart for appropriately processing an encoding embodiment of the BNF grammar of FIGS. 30A through 30E, in context for a variety of parser processing embodiments.

FIG. 56 depicts a flowchart for appropriately processing an encoding embodiment of the BNF grammar of FIGS. 30A through 30E, in context for a variety of parser processing embodiments. Those skilled in the art may take information disclosed heretofore to generate table records of FIGS. 35A through 37C, and/or data of FIGS. 34A through 34G (and/or FIG. 52), and/or datastreams of FIG. 33A through 33C, and/or a suitable syntax or internalized form derivative of FIGS. 30A through 30E. Compiler, interpreter, data receive, or other data handling processing as disclosed in FIG. 56 is well known in the art. Text books such as "Algorithms+Data Structures=Programs" by Nicklaus Wirth are one of many for guiding compiler/interpreter development. A BNF grammar of FIGS. 30A through 30E may also be "plugged in" to a Lex and Yacc environment to isolate processing from parsing in an optimal manner. Compiler and interpreter development techniques are well known. FIG. 56 can be viewed in context for adapting Permission and Charter processing to an existing source code processing environment (e.g. within PPLs). FIG. 56 can be viewed in context for new compiler and interpreter processing of permissions and/or charters (e.g. WPL). FIG. 56 can be viewed in context for receiving Permission and/or Charter data (e.g. syntax, datastream, or other format) from some source (e.g. communicated to MS). FIG. 56 can be viewed in context for plugging in isolated Permission and Charter processing to any processing point of handling a derivative encoding of the BNF grammar of FIGS. 30A through 30E.

Data handling of a source code for compiling/interpreting, an encoding from a communication connection, or an encoding from some processing source starts at block 5602. At some point in BNF grammar derived data handling, a block 5632 gets the next (or first) token from the source encoding. Tokens may be reserved keywords, delimiters, variable names, expression syntax, or some construct or atomic element of an encoding. Thereafter, if block 5634 determines the token is a reserved key or keyword, block 5636 checks if the reserved key or keyword is for identifying permissions 10 (e.g. FIG. 51A "Permissions", FIG. 54 "permission", FIG. 33B Permissions/Permission, etc), in which case block 5638 sets a stringVar pointer to the entire datastream representative of the permission(s) 10 to be processed, and block 5640 prepares parameters for invoking LBX data internalization processing at block 5642.

If block 5636 determines the reserved key or keyword is not for permission(s) 10, then processing continues to block 5646. Block 5646 checks if the reserved key or keyword is for identifying charters 12 (e.g. FIG. 51B "Charters", FIG. 54 "charter", FIG. 33C Charters/Charter, etc), in which case block 5648 sets a stringVar pointer to the entire datastream representative of the charter(s) 12 to be processed, and block 5650 prepares parameters for invoking LBX data internalization processing at block 5642.

Blocks 5640 and 5650 preferably have a stringVar set to the permission/charter data encoding start position, and then set a length of the permission/charter data for processing by block 5642. Alternatively, the stringVar is a null terminated string for processing the permission(s)/charter(s) data encoding. Embodiment requirements are for providing appropriate parameters for invoking block 5642 for unambiguous processing of the entire permission(s)/charter(s) for parsing and processing. The procedure of block 5642 has already been described throughout this disclosure (e.g. creating a processable internalized form (e.g. database records, programmatic structure, etc)). Upon return from block 5642 processing, block 5644 resets the parsing position of the data source encoding provided at block 5632 for having already processed the permission(s)/charter(s) encoding handled by block 5642. Thereafter, processing continues back to block 5632 for getting the next token from the data encoding source.

If block 5646 determines the reserved key or keyword is not for charter(s) 12, then processing continues to process the applicable reserved key or keyword identified in the source data encoding. If block 5634 determines the token is not a reserved key or keyword, then processing continues to the appropriate block for handling the token which is not a reserved key or keyword. In any case there may be processing of other source data encoding not specifically for a permission or charter.

Eventually, processing continues to a block 5692 for checking if there is more data source to handle/process. If block 5692 determines there is more data encoding source, processing continues back to block 5632 for getting the next token. If block 5692 determines there is no more data encoding source, processing continues to block 5694 for data encoding source processing completion, and then to block 5696 for termination of FIG. 56 processing.

Depending on the embodiment, block 5694 may complete processing for:

- Compiling one of the PPLs (or other programming language) with embedded/integrated encodings for permissions 10 and/or charters 12;
- Interpreting one of the PPLs (or other programming language) with embedded/integrated encodings for permissions 10 and/or charters 12;
- Receiving the encoding source data from a communications channel;
- Receiving the encoding source data from a processing source;
- Receiving the encoding source data from a user configured source;
- Receiving the encoding source data from a system configured source; or
- Internalizing, compiling, interpreting, or processing an encoding derived from the disclosed BNF grammar for Permissions 10 and/or Charter 12.

Blocks 5636 through 5650 may represent plug-in processing for permissions 10 and/or charters 12. Depending on when and where processing occurs for FIG. 56, appropriate semaphores may be used to ensure data integrity.

LBX: Permissions and Charters—WDR Processing

As WDR information is transmitted/received between MSs, privileges and charters are used to govern automated actions. Thus, privileges and charters govern processing of at least future whereabouts information to be processed. There is WDR In-process Triggering Smarts (WITS) in appropriate executable code processing paths. WITS provides the intelligence of whether or not privilege(s) and/or charter(s) trigger(s) an action. WITS is the processing at a place where a WDR is automatically examined against configured privileges and charters to see what actions should automatically take place. There are three different types of WITS, namely: maintained WITS (mWITS), inbound WITS (iWITS), and outbound WITS (oWITS). Each type of WITS is placed in a strategic processing path so as to recognize the event for when to process the WDR. Maintained WITS (mWITS) occur at those processing paths applicable to a WDR in process for being maintained at an MS (e.g. inserted to queue 22). Other embodiments may define other maintained varieties of a WDR in process for configurations (e.g. inbound, outbound, in-process2Q22, in-process2History (i.e. WDR in process of being maintained to LBX history 30), in-process2application(s) (i.e. WDR in process of being maintained/communicated to an application), etc). Inbound WITS (iWITS) occur at those processing paths applicable to a WDR which is inbound to a MS (e.g. communicated to the MS). Outbound WITS (oWITS) occur at those processing paths applicable to a WDR which is outbound from a MS (e.g. sent by an MS). There are various WITS embodiments as described below. Users should keep in mind that a single WDR may be processed multiple times (by different WITS) with configuring charters that refer to different WITS (e.g. first inbound, then to queue 22). One embodiment supports only mWITS. Another embodiment supports only iWITS. Another embodiment supports oWITS. Yet another embodiment supports use of any combination of available WITS.

mWITS:

- The preferred embodiment is a new block 273 in FIG. 2F such that block 272 continues to block 273 and block 273 continues to block 274. This allows mWITS processing block 273 to see all WDRs which are candidate for insertion to queue 22, regardless of the role check at block 274, confidence check at block 276, and any other FIG. 2F processing. In some embodiments, block 273 may choose to use enabled roles and/or confidence and/or any WDR field(s) values and/or permissions and/or any other processing result to decisively affect whether or not the WDR should be examined and/or processed further by FIG. 2F. For example, block 273 may result in processing to continue directly to block 294 or 298 (rather than block 274). For example, upon determining that the WDR source had not provided any privileges to the receiving MS, the WDR can be ignored so as to not use resources of the MS. In another example, a WDR shows that it arrived completely wirelessly (e.g. field(s) 1100*f*) and did not go through an intermediary service (e.g. router). The WDR may provide usefulness in locating the receiving MS despite the receiving MS not being privileged by the source MS, in which case block 273 continues to block 274 for WDR processing. It may be important to filter WDRs so that only those WDRs are maintained which either a) contribute to locating (per configurations), or b) are associated with active permissions or charters for applicable processing. The WRC discussed above may also be used to cause block 273 to continue to block 294 or 298. Such filtering is referred to as WITS filtering. WITS filtering may be crucial in a LBX architecture which supports MSs great distances from each other since there can be an overloading number of WDRs to process at any point in time. Charters and privileges that are configured are used for deciding which WDRs are to be "seen" (processed) further by FIG. 2F processing. If there are no privileges and no charters in effect for the in process WDR, then the WDR may be ignored. If there is no use for the WDR to help locate the receiving MS, then the WDR may also be ignored. If there are privileges and charters in effect for the in process WDR, then the WDR can be processed further by FIG. 2F, even if not useful for locating the MS.
- One preferred embodiment does make use of the confidence field 1100*d* to ensure the peer MS has been sufficiently located. Block 273 will compare information of the WDR with configured privileges to determine which actions should be performed. When appropriate privileges are in place, block 273 will also compare information of the WDR with configured and privileged charters (e.g. _fldname) to determine applicable configured charter actions to be performed.
- Alternate embodiments can move mWITS at multiple processing places subsequent to where a WDR is completed by the MS (e.g. blocks 236, 258, 334, 366, 418, 534, 618, 648, 750, 828, 874, 958, 2128, 2688, etc).
- Another embodiment can support mWITS at processing places subsequent to processing by blocks 1718 and 1722 to reflect user maintenance.
- Yet another embodiment recognizes in mWITS that the WDR was first inbound to the MS and is now in process of being maintained (e.g. to queue 22). This can allow distinguishing between an inbound WDR, maintained WDR, and inbound AND maintained WDR. In one embodiment, the WDR (e.g. field 1100*g*) carries new bit(s) of information (e.g. set by receive processing when inserting to queue 26) for indicating the WDR was inbound to the MS. The new bit(s) are checked by mWITS for new processing (i.e. inbound AND maintained WDR).

iWITS:

The preferred embodiment is a new block 2111 in FIG. 21 such that block 2110 continues to block 2111 (i.e. on No condition) and block 2111 continues to block 2112. This allows iWITS processing block 2111 to see all inbound WDRs, regardless of the confidence check at block 2114, and any other FIG. 21 processing. In some embodiments, block 2111 may choose to use confidence and/or any WDR field(s) and/or permissions and/or any other processing result to decisively affect whether or not the WDR should be examined and/or processed further by FIG. 21. Block 2111 may result in processing to continue directly to block 2106 (rather than block 2112). For example, upon determining that the WDR source had not provided any privileges to the receiving MS, the WDR can be ignored so as to not use resources of the MS. In another example, a WDR shows that it arrived completely wirelessly (e.g. field(s) **1100*f*) and did not go through an intermediary service (e.g. router). The WDR may provide usefulness in locating the receiving MS despite the receiving MS not being privileged by the source MS, in which case block 2111 continues to block 2112** for WDR processing. Similar WITS filtering can occur here as was described for mWITS processing above, with the advantage of intercepting WDRs of little value at the earliest possible time and preventing them from reaching subsequent LBX processing.

One preferred embodiment does make use of the confidence field **1100*d* to ensure the peer MS has been sufficiently located. Block 2111 will compare information of the WDR with configured privileges to determine which actions should be performed. When appropriate privileges are in place, block 2111** will also compare information of the WDR with configured and privileged charters (e.g. _I_fldname) to determine applicable configured charter actions to be performed.

Another embodiment can support iWITS at processing places associated with receive queue 26, for example processing up to the insertion of the WDR to queue 26.

oWITS:

The preferred embodiment incorporates a new block 2015 in FIG. 20 such that block 2014 continues to block 2015 and block 2015 continues to block 2016. This allows oWITS processing block 2015 to see all its outbound WDRs for FIG. 20 processing. In some embodiments, block 2015 may choose to use confidence and/or any WDR field(s) and/or permissions and/or any other processing result to decisively affect whether or not the WDR should be processed further by FIG. 20. Block 2015 may result in processing to continue directly to block 2018. The WRC discussed may also be used appropriately here. Similar WITS filtering can occur here as was described for mWITS and iWITS processing above, with the advantage of intercepting WDRs of little value to anyone else in the LN-expanse, and preventing the WDRs from reaching subsequent LBX processing at remote MSs that will have no use for them.

The preferred embodiment will also incorporate a new block 2515 in FIG. 25 such that block 2514 continues to block 2515 and block 2515 continues to block 2516. This allows oWITS processing block 2515 to see all its outbound WDRs of FIG. 25 processing. In some embodiments, block 2515 may choose to use confidence and/or any WDR field(s) and/or permissions and/or any other processing result to decisively affect whether or not the WDR should be examined and/or processed further by FIG. 25. Block 2515 may result in processing to continue directly to block 2506. For example, upon determining that the WDR is destined for a MS with no privileges in place, the WDR can be ignored and unprocessed (i.e. not sent). The WRC discussed may also be used appropriately here. Similar WITS filtering can occur here as was described for mWITS, iWITS and oWITS processing above, with the advantage of intercepting WDRs of little value to anyone else in the LN-expanse, and preventing the WDRs from reaching subsequent LBX processing at remote MSs that will have no use for them.

Blocks 2015 and 2515 will compare information of the WDR with configured privileges to determine which actions should be performed. When appropriate privileges are in place, blocks 2015/2515 will also compare information of the WDR with configured charters (e.g. _O_fldname) to determine applicable configured and privileged charter actions to be performed.

Another embodiment can support oWITS at processing places associated with send queue 24, for example after the insertion of the WDR to queue 24.

Yet another embodiment recognizes in oWITS that the WDR was first maintained to the MS and is now in process of being sent outbound. This can allow distinguishing between an outbound WDR, maintained WDR, and outbound AND maintained WDR. Different embodiments will use different criteria for what designates an outbound AND maintained WDR, for example seeking certain values in maintained WDR field(s), seeking certain values in outbound WDR field(s), or both. In one embodiment, the WDR carries new bit(s) of information (e.g. set by send processing) for indicating the WDR was outbound from the MS. WDR processing for a maintained WDR and/or an outbound WDR can also be made relevant for designating an outbound AND maintained WDR. Criteria may be important in this embodiment since an outbound WDR was maintained in some fashion prior to being candidate as an outbound WDR.

Figure 57:
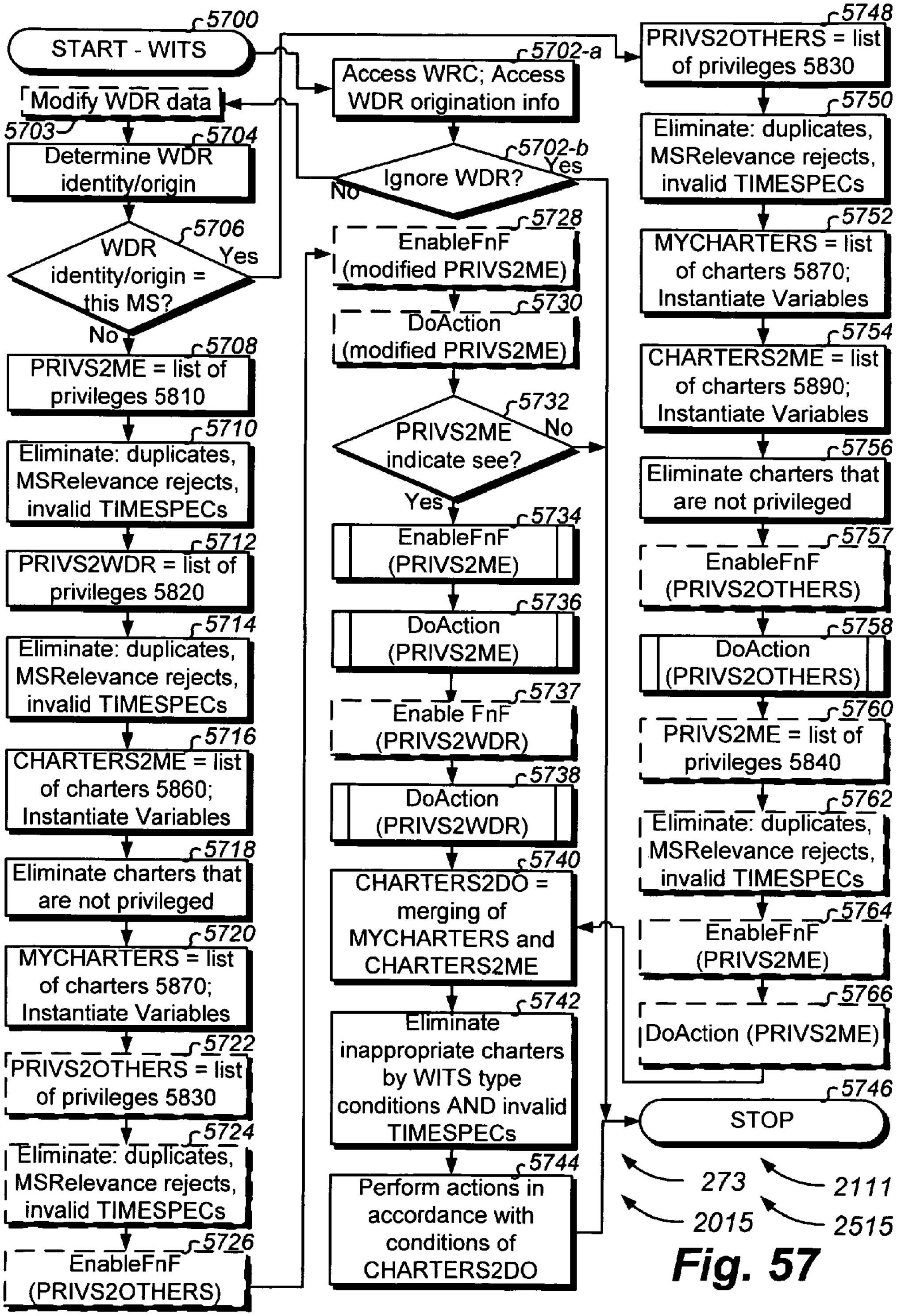
FIG. 57 depicts a flowchart for describing a preferred embodiment of WDR In-process Triggering Smarts (WITS) processing.

FIG. 57 depicts a flowchart for describing a preferred embodiment of WDR In-process Triggering Smarts (WITS) processing. The term "Triggering Smarts" is used to describe intelligent processing of WDRs for privileges and/or charters that may trigger configured processing such as certain actions. FIG. 57 is presented to cover the different WITS embodiments discussed above. WITS processing is of PIP code 6, and starts at block 5700 with an in-process WDR as the result of the start of new blocks 273, 2111, 2015 and 2515 (as described above). While preferred WITS embodiments include new blocks 273, 2111, 2015, and 2515, it is to be understood that alternate embodiments may include FIG. 57 processing at other processing places, for example as described above. There are similarities between mWITS, iWITS and oWITS. FIG. 57 is presented in context for each WITS type. Thus, block 5700 shall be presented as being invoked for mWITS, iWITS, and oWITS in order to process a WDR (i.e. in-process WDR) that is being maintained to the MS of FIG. 57 processing (e.g. to queue 22), is inbound to the MS of FIG. 57 processing, and/or is outbound from the MS of FIG. 57 processing. Applicable charter configurations (_ref, _I_ref, _O_ref) and applicable privileges are to be handled accordingly.

Depending on the embodiment, charter fields **3700*f*, or an equivalent descriptor thereof, may be accessed by WITS processing to determine which charters are enabled for applicable charter list use. Block 5700 continues to block 5702**-*a* where the WRC and applicable origination information of the WDR is accessed. Thereafter, if the WRC and WDR information indicates to ignore the WDR at block 5702-*b*, then processing continues to block 5746, otherwise processing continues to block 5704. Whenever block 5746 is encountered, the decision is made (assumed in FIG. 57) to continue processing the WDR or not continue processing the WDR in processing which includes FIG. 57 (i.e. FIGS. 2F, 20, 21 25) as described above. This decision depends on how block 5746 was arrived to by FIG. 57 processing. Blocks 5702-*a* and 5702-*b* may perform any variety of WITS filtering for any reason to prevent further processing of a WDR. In one embodiment, block 5702-*a* checks MS privilege and/or charter configurations for relevance of further processing the WDR (e.g. there are no configurations existing which are relevant to the WDR from that particular originating MS, therefore no further WDR processing is warranted).

Block 5704 determines the identity (e.g. originating MS) of the in-process WDR (e.g. check field 1100*a*). A lookup, conversion, and/or other facilitated determination may be made. Thereafter, if block 5706 determines the identity of the in-process WDR does not match the identity of the MS of FIG. 57 processing, processing continues to block 5708. Block 5706 continues to block 5708 when a) the in-process WDR is from other MSs and is being maintained at the MS of FIG. 57 processing (i.e. FIG. 57=mWITS); or b) the in-process WDR is from other MSs and is inbound to the MS of FIG. 57 processing (i.e. FIG. 57=iWITS). For example, a first MS of FIG. 57 processing handles a WDR from a second MS starting at block 5708.

Figure 58:
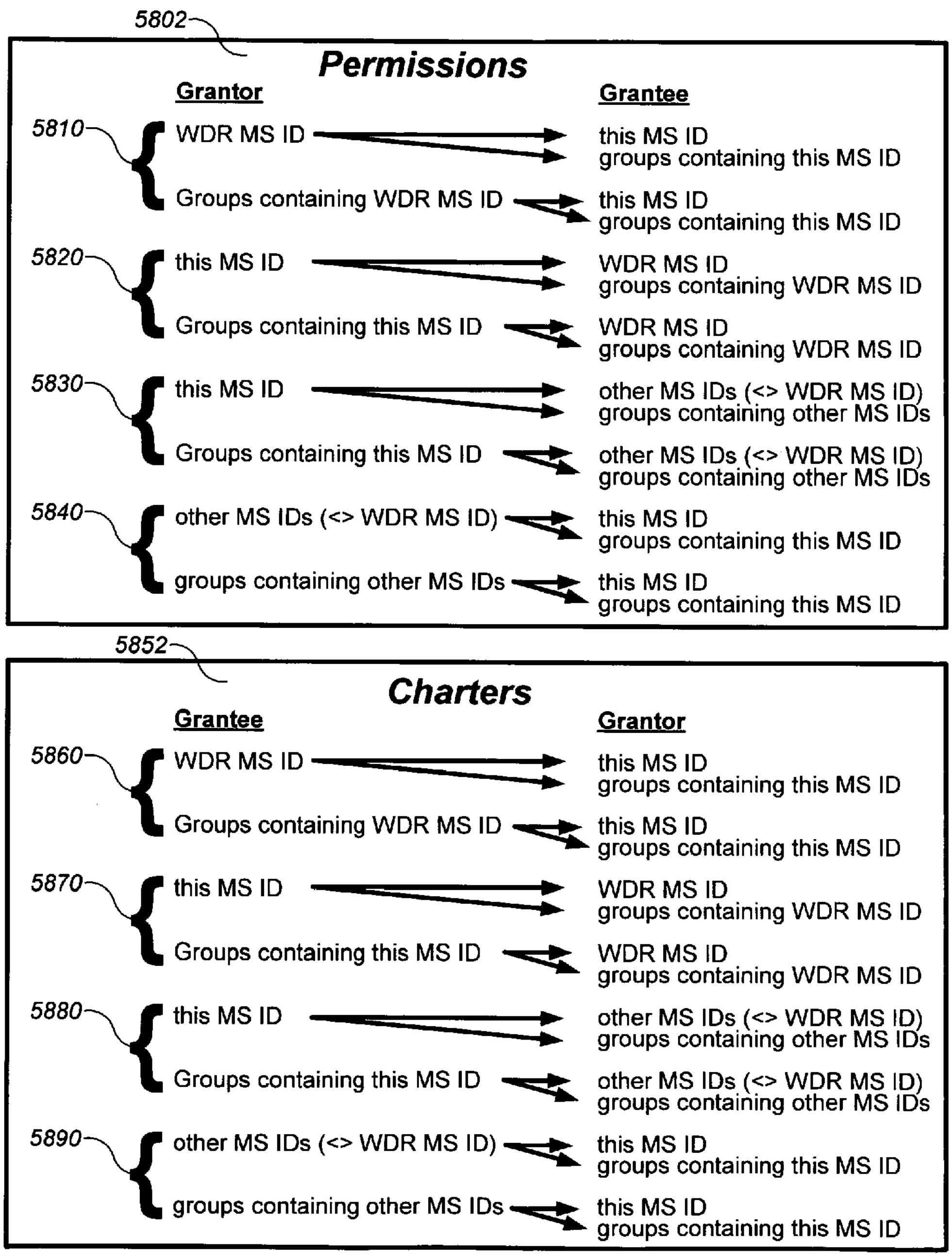
FIG. 58 depicts an illustration for granted data characteristics in the present disclosure LBX architecture.

With reference now to FIG. 58, depicted is an illustration for granted data characteristics in the present disclosure LBX architecture, specifically with respect to granted permission data and granted charter data as maintained by a particular MS of FIG. 57 processing (i.e. as maintained by "this MS"). To facilitate discussion of FIG. 57, permission data 10 can be viewed as permission data collection 5802 wherein arrows shown are to be interpreted as "provides privileges to" (i.e. Left Hand Side (LHS) provides privileges to the Right Hand Side (RHS)). Any of the permissions representations heretofore described (internalized, datastream, XML, source code, or any other BNF grammar derivative) can be used to represent, or encode, data of the collection 5802. Regardless of the BNF grammar derivative/representation deployed, the minimal requirement of collection 5802 is to define the relationships of privileges granted from one ID to another ID (and perhaps with associated MSRelevance and/or TimeSpec qualifier(s)). Whether grants or explicit privileges are assigned, ultimately there are privileges granted from a grantor ID to a grantee ID.

Different identity embodiments are supported (e.g. MS ID or user ID) for the LHS and/or RHS (see BNF grammar for different embodiments). Permission data collection 5802 is to be from the perspective of one particular MS, namely the MS of FIG. 57 processing. Thus, the terminology "this MS ID" refers to the MS ID of the MS of FIG. 57 processing. The terminology "WDR MS ID" is the MS ID (field 1100*a*) of an in-process WDR of FIG. 57 processing distinguished from all other MS IDs configured in collection 5802 at the time of processing the WDR. The terminology "other MS IDs" is used to distinguish all other MS IDs configured in collection 5802 which are not the same as the MS ID of the terminology "WDR MS ID" (i.e. MS IDs other than the MS ID (field 1100*a*) of the in-process WDR of FIG. 57 processing (also other than the "this MS" MS ID)). Privilege configurations 5810 are privileges provided from an in-process WDR MS ID (i.e. WDR being processed by FIG. 57 at "this MS") to the MS ID of FIG. 57 processing. The groups an ID belongs to can also provide, or be provided with, privileges so that the universe of privileges granted should consider groups as well. Privilege configurations 5820 are privileges provided from the MS of FIG. 57 processing (this MS) to the MS ID (field 1100*a*) of the in-process WDR being processed by FIG. 57. Privilege configurations 5830 are privileges provided from the MS of FIG. 57 processing (this MS) to MS IDs (field 1100*a*) configured in collection 5802 other than the MS ID of the in-process WDR being processed by FIG. 57 (also other than the "this MS" MS ID). Privilege configurations 5840 are privileges provided from MS IDs configured in collection 5802 at the MS of FIG. 57 processing (this MS) which are different than the MS ID of the in-process WDR being processed by FIG. 57 (also different than the "this MS" MS ID).

Also to facilitate discussion of FIG. 57, charter data 12 can be viewed as a charter data collection 5852 wherein arrows shown are to be interpreted as "creates enabled charters for" (i.e. Left Hand Side (LHS) creates enabled charters for the Right Hand Side (RHS)). Any of the charter representations heretofore described (internalized, datastream, XML, source code, or any other BNF grammar derivative) can be used to represent, or encode, data of the collection 5852. Regardless of the BNF grammar derivative/representation deployed, the minimal requirement of collection 5852 is to define the charters granted by one ID to another (and perhaps with associated TimeSpec qualifier(s); TimeSpec may be an aggregate-result of TimeSpec specified for the charter, charter expression, charter condition and/or charter term). Preferably, for charters with multiple actions, each action is evaluated on its own specified TimeSpec merit if applicable. In embodiments that use a tense qualifier in TimeSpecs: LBX history, appropriate queue(s), and any other reasonable source of information shall be utilized appropriately.

Different identity embodiments are supported (e.g. MS ID or user ID) for the LHS and/or RHS (see BNF grammar for different embodiments). A privilege preferably grants the ability to create effective (enabled) charters for one ID from another ID. However, in some embodiments the granting of a charter by itself from one ID to another ID can be treated like the granting of a permission/privilege to use the charter, thereby preventing special charter activating permission(s) be put in place. Charter data collection 5852 is also to be from the perspective of the MS of FIG. 57 processing. Thus, the terminology "this MS ID" refers to the MS ID of the MS of FIG. 57 processing. The terminology "WDR MS ID" is the MS ID (field 1100*a*) of the in-process WDR of FIG. 57 processing distinguished from all other MS IDs configured in collection 5852 at the time of processing the WDR. The terminology "other MS IDs" is used to distinguish all other MS IDs configured in collection 5852 which are not the same as the MS ID of the terminology "WDR MS ID" (i.e. MS IDs other than the MS ID (field 1100*a*) of the in-process WDR of FIG. 57 processing (also other than the "this MS" MS ID)). Charter configurations 5860 are charters created by the MS ID of an in-process WDR (i.e. WDR being processed by FIG. 57 at "this MS") for being effective at the MS of FIG. 57 processing (this MS ID). The groups an ID belongs to can also provide, or be provided with, charters so that the universe of charters granted should consider groups as well. Charter configurations 5870 are charters created by the MS ID of FIG. 57 processing (i.e. this MS) for being effective at the MS of FIG. 57 processing (this MS ID). Charter configurations 5870 include the most common embodiments of creating charters for yourself at your own MS. Charter configurations 5880 are charters created by the MS ID of FIG. 57 processing (this MS) for being effective at MSs with MS IDs configured in collection 5852 other than the MS ID of the in-process WDR being processed by FIG. 57. Charter configurations 5890 are charters at the MS of FIG. 57 processing (this MS) which are created by MS IDs other than the MS ID of the in-process WDR being processed by FIG. 57 (also other than the "this MS" MS ID).

Any subset of data collections 5802 and 5852 can be resident at a MS of FIG. 57 processing, depending on a particular embodiment of the present disclosure, however preferred and most common data used is presented in FIG. 57. While FIG. 58 facilitates flowchart descriptions and discussions for in-process WDR embodiments of being maintained (e.g. to queue 22), being inbound (e.g. communicated to the MS), and/or being outbound (e.g. communicated from the MS), FIGS. 49A and 49B provide relevant discussions for WDR in-process embodiments when considering generally "incoming" WDRs (i.e. being maintained (e.g. to queue 22) or being inbound (e.g. communicated to the MS)).

In the preferred embodiment, groups defined local to the MS are used for validating which data using group IDs of collections 5802 and 5852 are relevant for processing. In alternate embodiments, group information of other MSs may be "visible" to FIG. 57 processing for broader group configuration consideration, either by remote communications, local maintaining of MS groups which are privileged to have their groups maintained there (communicated and maintained like charters), or another reasonable method.

With reference back to FIG. 57, block 5708 forms a PRIVS2ME list of configurations 5810 and continues to block 5710 for eliminating duplicates that may be found. Block 5708 may collapse grant hierarchies to form the list. Duplicates may occur for privileges which include the duplicated privileges (i.e. subordinate privileges). For example, \lbxall specifies all LBX privileges and \nearar is only one LBX privilege already included in \lbxall. Recall that some privileges can be higher order scoped (subordinate) privileges for a plurality of more granulated privileges. Block 5710 additionally eliminates duplicates that may exist for permission embodiments wherein a privilege can enable or disable a feature. In a present disclosure embodiment wherein a privilege can enable, and a privilege can disable the same feature or functionality, there is preferably a tie breaker of disabling the feature (i.e. disabling wins). In an alternate embodiment, enabling may break a tie of ambiguity. Block 5710 further eliminates privileges that have a MSRelevance qualifier indicating the MS of FIG. 57 processing is not supported for the particular privilege, and also eliminates privileges with a TimeSpec qualifier invalid for the time of FIG. 57 processing (an alternate embodiment can enforce TimeSpec interpretation at blocks 5734 (i.e. in FIG. 59 processing) and 5736 (i.e. in FIG. 60 processing)). Thereafter, block 5712 forms a PRIVS2WDR list of configurations 5820 and continues to block 5714 for eliminating duplicates that may be found in a manner analogous to block 5710 (i.e. subordinate privileges, enable/disable tie breaker, MSRelevance qualifier, TimeSpec qualifier). Block 5712 may collapse grant hierarchies to form the list. An alternate embodiment can enforce TimeSpec interpretation at block 5738 (i.e. in FIG. 60 processing). Thereafter, block 5716 forms a CHARTERS2ME list of configurations 5860 and preferably eliminates variables by instantiating/elaborating at points where they are referenced. Then, block 5718 eliminates those charters which are not privileged. In some embodiments, block 5718 is not necessary (5716 continues to 5720) because un-privileged charters will not be permitted to be present at the MS of FIG. 57 processing anyway (e.g. eliminated when receiving). Nevertheless, block 5718 removes from the CHARTERS2ME list all charters which do not have a privilege (e.g. using PRIVS2WDR) granted by the MS (the MS user) of FIG. 57 processing to the creator of the charter, for permitting the charter to be "in effect" (activated). In the preferred embodiment, there is a privilege (e.g. \chrtrs) which can be used to grant the permission of activating any charters of another MS (or MS user) at the MS of FIG. 57 processing. In the preferred embodiment, there can be any number of subordinate charter privileges (i.e. subordinate to \chrtrs) for specifically indicating which type of charters are permitted. For example, privileges for governing which charters are to be active from a remote MS include:

- mWITS specifications (allow charters with _fldname);
- iWITS specifications (allow charters with _I_fldname);
- oWITS specifications (allow charters with _O_fldname);
- specified atomic terms (e.g. a privilege for each eligible atomic term use);
- specified WDRTerms (e.g. a privilege for each eligible WDRTerm use);
- specified AppTerms (e.g. a privilege for each eligible AppTerm use);
- specified operators (e.g. a privilege for each eligible atomic operator use);
- specified conditions;
- specified actions;
- specified host targets for actions; and/or
- any identifiable characteristic of a charter encoding as defined in the BNF grammar of FIGS. 30A through 30E.

In any embodiment, block 5718 ensures no charters from other users are considered active unless appropriately privileged (e.g. using PRIVS2WDR). Thereafter, block 5720 forms a MYCHARTERS list of configurations 5870 and preferably eliminates variables by elaborating at points where they are referenced, before continuing to block 5732.

Block 5732 checks the PRIVS2ME list to see if there is a privilege granted from the identity of the in-process WDR to the MS (or user of MS) of FIG. 57 processing for being able to "see" the WDR. One main privilege (e.g. \lbxiop) can enable or disable whether or not the MS of FIG. 57 processing should be able to do anything at all with the WDR from the remote MS. If block 5732 determines this MS can process the WDR, then processing continues to block 5734. Block 5734 enables local features and functionality in accordance with privileges of the PRIVS2ME list by invoking the enable features and functionality procedure of FIG. 59 with the PRIVS2ME list, and the in-process WDR as parameters (preferably passed by pointer/reference).

Figure 59:
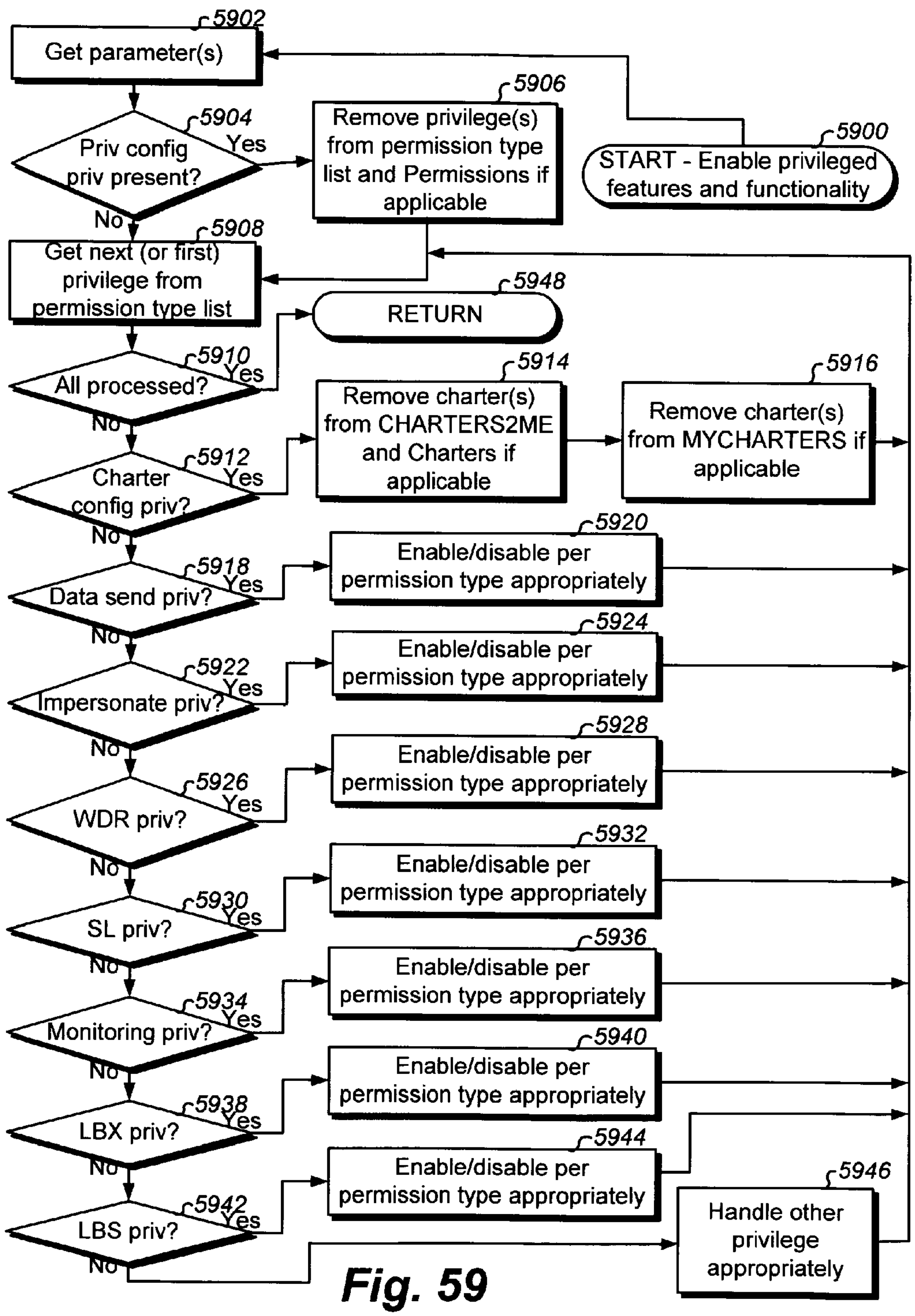
FIG. 59 depicts a flowchart for describing a preferred embodiment of a procedure for enabling LBX features and functionality in accordance with a certain type of permissions.

With reference now to FIG. 59, depicted is a flowchart for describing a preferred embodiment of a procedure for enabling LBX features and functionality in accordance with a certain type (category) of permissions. Blocks 5920, 5924, 5928, 5932, 5936, 5940, 5944, and 5946 enable or disable LBX features and functionality for semantic privileges. Processing of block 5734 starts at block 5900 and continues to block 5902 where the permission type list parameter passed (i.e. PRIVS2ME (5810) when invoked from block 5734) is determined, and the in-process WDR may be accessed. The list parameter passed provides not only the appropriate list to FIG. 59 processing, but also which list configuration (5810, 5820, 5830 or 5840) has been passed for processing by FIG. 59. There are potentially thousands of specific privileges that FIG. 59 can handle. Therefore, FIG. 59 processing is shown to generically handle different classes (categories) of privileges, namely privilege classes of: privilege-configuration, charter-configuration, data send, impersonation, WDR processing, situational location, monitoring, LBX, LBS, and any others as handled by block 5946. Privileges disclosed throughout the present disclosure fall into one of these classes handled by FIG. 59.

Block 5902 continues to block 5904 where if it is determined that a privilege-configuration privilege is present in the list parameter passed to FIG. 59 processing, then block 5906 will remove privileges from the list parameter if appropriate to do that. For example, a privilege (or absence thereof) detected in the list parameter for indicating no privileges can be defined/enabled in context of the list parameter causes block 5906 to remove all privileges from the list parameter and also from permissions 10 (i.e. 5810 of collection 5802 when FIG. 59 invoked from block 5734). Similarly, any more granular privilege-configuration privileges of the list parameter causes processing to continue to block 5906 for ensuring remaining privileges of the list parameter (and of permissions 10 configurations) are appropriate. There can be many different privilege-configuration privileges for what can, and can't, be defined in permissions 10, for example by any characteristic(s) of permissions data 10 according to the present disclosure BNF grammar. Block 5906 continues to block 5908 when all privilege-configuration privileges are reflected in the list parameter and collection 5802 of permissions 10. If block 5904 determines there are no privilege-configuration privileges to consider in the list parameter passed to FIG. 59 processing, then processing continues to block 5908.

Block 5908 gets the next individual privilege entry (or the first entry upon first encounter of block 5908 for an invocation of FIG. 59) from the list parameter and continues to block 5910. Blocks 5908 through 5946 iterate all individual privileges (list entries) associated with the list parameter of permissions 10 provided to block 5908. If block 5910 determines there was an unprocessed privilege entry remaining in the list parameter (i.e. 5810 of collection 5802 when FIG. 59 invoked from block 5734), then the entry gets processed starting with block 5912. If block 5912 determines the entry is a charter-configuration privilege, then block 5914 will remove charters from CHARTERS2ME if appropriate to do that. For example, a privilege (or absence thereof) detected in the list parameter for indicating no CHARTERS2ME charters can be defined/enabled in context of the list parameter causes block 5914 to remove all charters from CHARTERS2ME and also from charters 12 (i.e. 5860 of collection 5852 when FIG. 59 invoked from block 5734). Similarly, any more granular charter-configuration privileges of the list parameter causes processing to continue to block 5914 for ensuring remaining charters of CHARTERS2ME (and of charters 12 configurations) are appropriate. There can be many different charters-configuration privileges for what can and can't be defined in charters 12, for example by any characteristic(s) of charters data 12 according to the present disclosure BNF grammar, in particular for an in-process WDR from another MS. Any aspect of charters can be privileged (all, certain commands, certain operands, certain parameters, certain values of any of those, whether can specify Host for action processing, certain conditions and/or terms—See BNF grammar). Block 5914 then continues to block 5916. Block 5916 will remove charters from MYCHARTERS if appropriate to do that. For example, a privilege (or absence thereof) detected in the list parameter for indicating certain MYCHARTERS charters (e.g. those that involve the in-process WDR) can/cannot be defined/enabled in context of the list parameter causes block 5916 to remove charters from MYCHARTERS for subsequent FIG. 57 processing. Changes to charters 12 for the MYCHARTERS list does not occur. This prevents deleting charters locally at the MS that the user spent time creating at his MS. Removing from the MYCHARTERS list is enough to affect subsequent FIG. 57 processing, for example of an in-process WDR. Block 5914 shown does additionally remove from charters 12 because the charters are not valid from a remote user anyway. One preferred embodiment to block 5914 will not alter charters 12 (only CHARTERS2ME) similarly to block 5916 so that subsequent FIG. 57 processing continues properly while preventing a remote MS user from resending charters (use of FIGS. 44A and 44B) at a subsequent time for reinstatement upon discovering the "this MS" FIG. 57 processing user had not provided a needed permission/privilege. Block 5916 continues back to block 5908 for the next entry. Blocks 5914 and 5916 make use of the privilege entry data from block 5908 (e.g. grantor ID, grantee ID, privilege, etc) to properly affect change of CHARTERS2ME and MYCHARTERS. CHARTERS2ME and MYCHARTERS are shown as global variables accessible from FIG. 57 processing to FIG. 59 processing, but an alternate embodiment will pass these lists as additional parameters determined at block 5902. If block 5912 determined the currently iterated privilege is not a charter configuration privilege, then processing continues to block 5918.

If block 5918 determines the entry is a data send privilege, then block 5920 will enable LBX features and functionality appropriately in context for the list parameter, and processing continues back to block 5908. A data send privilege may be one that is used at block 4466 and enforced at block 4470 for exactly what data can or cannot be received. Any granulation of permission data 10 or charter data 12 (e.g. by any characteristic(s)) may be supported. A data send privilege may overlap with a privilege-configuration privilege or a charter-configuration privilege since either may be used at blocks 4466 and 4470, depending on an embodiment. It may be useful to control what data can be received by a MS at blocks 4466 and 4470 versus what data actually gets used for FIG. 57 processing as controlled by blocks 5904, 5906, 5912, 5914, and 5916. If block 5918 determines the entry is not a data send privilege, then processing continues to block 5922. Data send privileges can control what privilege, charter, and/or group data can and cannot be sent to a MS (i.e. received by a MS). Data send privileges can be overall privileges, subordinate privileges, and/or privileges for any granulation of data based on type, size, value, age, or any other characteristic(s) available from a derivative of the BNF grammar of FIGS. 30A through 30E.

If block 5922 determines the entry is an impersonation privilege, then block 5924 will enable LBX features and functionality appropriately in context for the list parameter, and processing continues back to block 5908. An impersonation privilege is one that is used to access certain authenticated user interfaces, some of which were described above. Any granulation of permission data 10 (e.g. by any characteristic(s)) may be supported, for example for any subset of MS user interfaces with respect to the present disclosure. Block 5924 may access security, or certain application interfaces accessible to the MS of FIG. 59 processing for read, modify, add, or otherwise alter certain related data, or cause the processing of certain related executable code, for example to manage associated identity impersonation at the MS. If block 5922 determines the entry is not an impersonation privilege, then processing continues to block 5926. Impersonation privileges can be overall privileges, subordinate privileges, and/or privileges for any granulation of identity data or any other characteristic(s) available from a derivative of the BNF grammar of FIGS. 30A through 30E.

If block 5926 determines the entry is a WDR privilege, then block 5928 will enable LBX features and functionality appropriately in context for the list parameter, and processing continues back to block 5908. A WDR privilege is one that is used to govern access to certain fields of the in-process WDR. Any granulation of permission data 10 (e.g. by any characteristic(s)) may be supported, for example for any subset of available in-process WDR data. Block 5928 may access any in-process WDR field, subfield(s), or associated in-process WDR data to make use of certain application interfaces accessible to the MS of FIG. 59 processing for read, modify, add, or otherwise alter certain related data, or cause the processing of certain related executable code, for example to manage appropriate in-process WDR processing. If block 5926 determines the entry is not a WDR privilege, then processing continues to block 5930. WDR privileges can be overall privileges, subordinate privileges, and/or privileges for any granulation of in-process related WDR data, perhaps using any characteristic(s) available from a derivative of the BNF grammar of FIGS. 30A through 30E.

If block 5930 determines the entry is a Situational Location privilege, then block 5932 will enable LBX features and functionality appropriately in context for the list parameter, and processing continues back to block 5908. A Situational Location privilege may overlap with a WDR privilege since WDR fields are consulted for automated processing, however it may be useful to distinguish. Any granulation of permission data 10 (e.g. by any characteristic(s)) may be supported, for example for any subset of available in-process relevant WDR data. The term "situational location" is useful for describing location based conditions (e.g. as disclosed in Service delivered location dependent content of U.S. Pat. Nos. 6,456,234; 6,731,238; 7,187,997 (Johnson)). Block 5932 may access any in-process WDR field, subfield(s), or associated in-process WDR data for appropriate LBX processing involving read, modify, add, or otherwise alter certain related data, or cause the processing of certain related executable code, for example to manage appropriate in-process WDR situational location processing. If block 5930 determines the entry is not a situational location privilege, then processing continues to block 5934. Situational location privileges can be overall privileges, subordinate privileges, and/or privileges for any granulation of in-process related WDR data, perhaps using any characteristic(s) available from a derivative of the BNF grammar of FIGS. 30A through 30E.

If block 5934 determines the entry is a monitoring privilege, then block 5936 will enable LBX features and functionality appropriately in context for the list parameter, and processing continues back to block 5908. A monitoring privilege governs monitoring any data of a MS for any reason (e.g. in charter conditions). Any granulation of permission data 10 (e.g. by any characteristic(s)) may be supported, for example for any subset of MS data. Block 5936 may access any MS data, or associated in-process WDR data for appropriate LBX processing involving read, modify, add, or otherwise alter certain related data, or cause the processing of certain related executable code, for example to manage appropriate in-process WDR processing at the MS. If block 5934 determines the entry is not a monitoring privilege, then processing continues to block 5938. Monitoring privileges can be overall privileges, subordinate privileges, and/or privileges for any granulation of MS data (MS of FIG. 59 processing or of the in-process WDR), perhaps using any characteristic(s) available from a derivative of the BNF grammar of FIGS. 30A through 30E.

If block 5938 determines the entry is a LBX privilege, then block 5940 will enable LBX features and functionality appropriately in context for the list parameter, and processing continues back to block 5908. A LBX privilege governs LBX processing behavior at the MS of FIG. 59 processing. Other privileges so far discussed for FIG. 59 processing may overlap with an LBX privilege. Any granulation of permission data 10 (e.g. by any characteristic(s)) may be supported, for example for unique LBX processing at the MS of FIG. 59 processing. Block 5940 may access any MS data, or associated in-process WDR data for appropriate LBX processing involving read, modify, add, or otherwise alter certain related data, or cause the processing of certain related executable code, for example to perform LBX processing at the MS. If block 5938 determines the entry is not a LBX privilege, then processing continues to block 5942. LBX privileges can be overall privileges, subordinate privileges, and/or privileges for any granulation of MS data (MS of FIG. 59 processing or of the in-process WDR), perhaps using any characteristic(s) available from a derivative of the BNF grammar of FIGS. 30A through 30E.

If block 5942 determines the entry is a LBS privilege, then block 5944 will enable LBS features and functionality appropriately in context for the list parameter, and processing continues back to block 5908. A LBS privilege governs LBS processing behavior at the MS of FIG. 59 processing. Other privileges so far discussed for FIG. 59 processing may overlap with an LBS privilege. Any granulation of permission data 10 (e.g. by any characteristic(s)) may be supported, for example for unique LBS processing at the MS of FIG. 59 processing. Block 5944 may access any MS data, or associated in-process WDR data for appropriate LBS processing involving read, modify, add, or otherwise alter certain related data, or cause the processing of certain related executable code, for example to perform LBS processing at the MS, and perhaps cause processing at a connected LBS. If block 5942 determines the entry is not a LBS privilege, then processing continues to block 5946. LBS privileges can be overall privileges, subordinate privileges, and/or privileges for any granulation of MS data (MS of FIG. 59 processing or of the in-process WDR), perhaps using any characteristic(s) available from a derivative of the BNF grammar of FIGS. 30A through 30E, and perhaps using any data or interface of a connected LBS.

Block 5946 is provided for processing completeness for handling appropriately (e.g. enable or disable MS processing) a privilege that some reader may not appreciate falling into one of the privilege classes of FIG. 59 processing. Block 5946 then continues to block 5908. Referring back to block 5910, if it is determined there are no more unprocessed entries remaining in the list parameter (i.e. 5810 of collection 5802 when FIG. 59 invoked from block 5734), then the caller/invoker is returned to at block 5948.

FIG. 59 may not require blocks 5904 and 5906 since a block 4466 embodiment may have already enforced what has been received and integrated at block 4470 to a proper set of collections 5802 and 5852. In any case, the procedure of FIG. 59 is made complete having blocks 5904 and 5906 for various caller/invoker embodiments. Similarly, FIG. 59 also may not require blocks 5912 through 5916 since a block 4466 embodiment may have already enforced what has been received and integrated at block 4470 to a proper set of collections 5802 and 5852. The procedure of FIG. 59 is made complete by having blocks 5912 through 5916 for various caller/invoker embodiments.

In one embodiment, FIG. 59 uses the absence of certain privileges to enable or disable LBX features and functionality wherein block 5948-A determines which privileges were not provided, block 5948-B enables/disables LBX features and functionality in accordance with the lack of privileges, and block 5948-C returns to the caller/invoker.

With reference back to FIG. 57, block 5734 continues to block 5736. Some embodiments of FIG. 57 blocks 5710, 5714, 5718, 5742, 5750, 5756, etc may perform sorting for a best processing order (e.g. as provided to procedures of FIGS. 59 and 60). Block 5736 performs actions in accordance with privileges of the PRIVS2ME list by invoking the do action procedure of FIG. 60 with the PRIVS2ME list, and the in-process WDR as parameters (preferably passed by pointer/reference).

Figure 60:
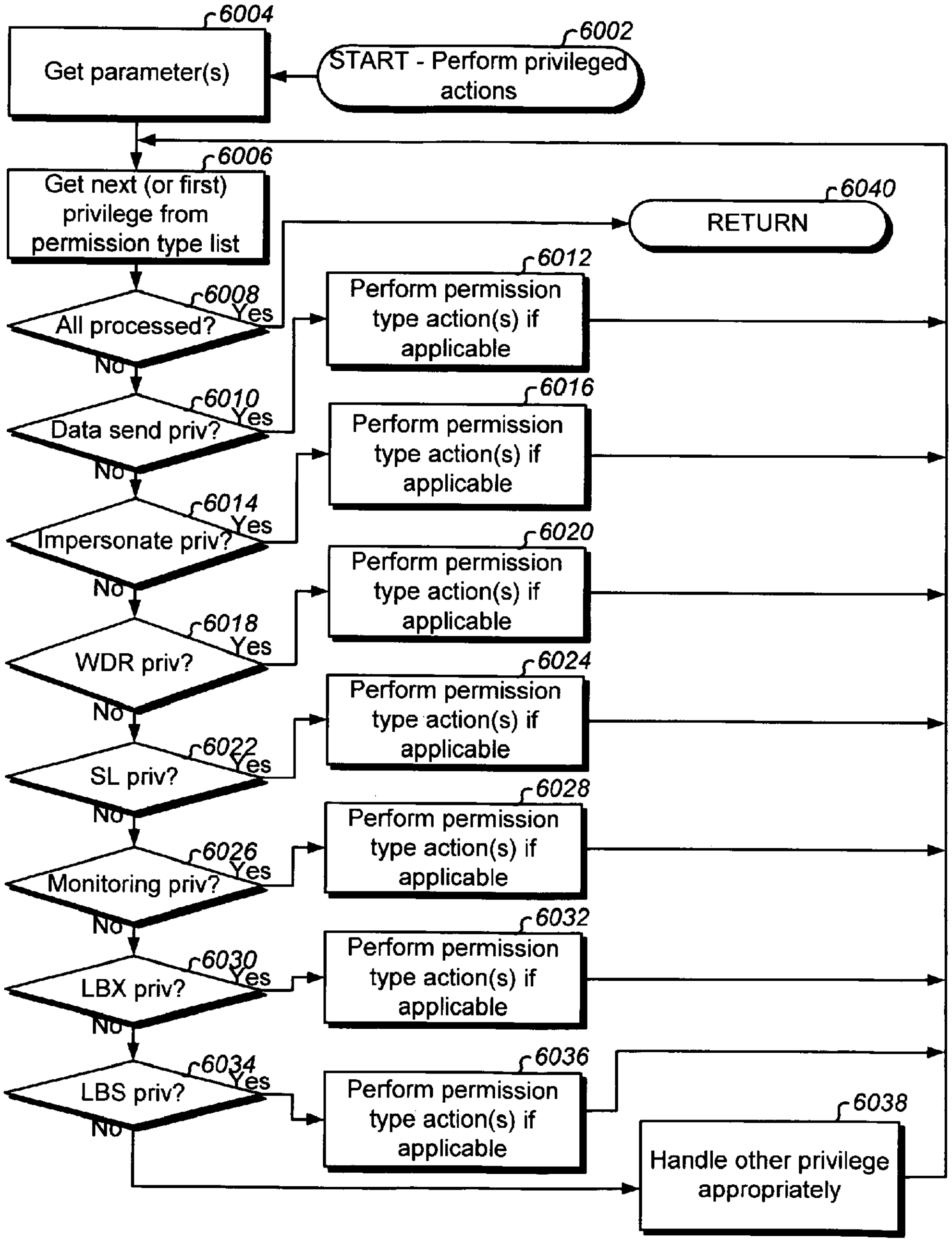
FIG. 60 depicts a flowchart for describing a preferred embodiment of a procedure for performing LBX actions in accordance with a certain type of permissions.

With reference now to FIG. 60, depicted is a flowchart for describing a preferred embodiment of a procedure for performing LBX actions in accordance with a certain type of permissions. Blocks 6012, 6016, 6020, 6024, 6028, 6032, 6036, and 6038 perform actions for semantic privileges. Processing of block 5736 starts at block 6002 and continues to block 6004 where the permission type parameter passed (i.e. PRIVS2ME (5810) when invoked from block 5736) is determined, and the in-process WDR may be accessed. The list parameter passed provides not only the appropriate list to FIG. 60 processing, but also which list configuration (5810, 5820, 5830 or 5840) has been passed for proper processing by FIG. 60. There are potentially thousands of specific privileges that FIG. 60 can handle. Therefore, FIG. 60 processing is shown to generically handle different classes (categories) of privileges, namely privilege classes of: data send, impersonation, WDR processing, situational location, monitoring, LBX, LBS, and any others as handled by block 6038. Privileges disclosed throughout the present disclosure fall into one of these classes handled by FIG. 60.

Block 6004 continues to block 6006. Block 6006 gets the next individual privilege entry (or the first entry upon first encounter of block 6006 for an invocation of FIG. 60) from the list parameter and continues to block 6008. Blocks 6006 through 6038 iterate all individual privileges associated with the list parameter of permissions 10 provided to block 6002. If block 6008 determines there was an unprocessed privilege entry remaining in the list parameter (i.e. 5810 of collection 5802 when FIG. 60 invoked from block 5736), then the entry gets processed starting with block 6010.

If block 6010 determines the entry is a data send privilege, then block 6012 will perform any LBX actions in context for the list parameter (if any applicable), and processing continues back to block 6006. A data send privilege may be one that is used at block 4466 and enforced at block 4470 for exactly what data can or cannot be received, or alternatively, block 6012 can perform actions for communicating data between MSs, or affecting data at MSs, for an appropriate local image of permissions 10 and/or charters 12. Any granulation of permission data 10 or charter data 12 (e.g. by any characteristic(s)) may be supported. If block 6010 determines the list entry is not a data send privilege, processing continues to block 6014.

If block 6014 determines the entry is an impersonation privilege, then block 6016 will perform any LBX actions in context for the list parameter (if any applicable), and processing continues back to block 6006. Block 6016 may access security, or certain application interfaces accessible to the MS of FIG. 60 processing for read, modify, add, or otherwise alter certain related data, or cause the processing of certain related executable code, for example to manage associated identity impersonation at the MS. If block 6014 determines the entry is not an impersonation privilege, then processing continues to block 6018.

If block 6018 determines the entry is a WDR privilege, then block 6020 will perform any LBX actions in context for the list parameter (if any applicable), and processing continues back to block 6006. Block 6020 may access any in-process WDR field, subfield(s), or associated in-process WDR data to make use of certain application interfaces accessible to the MS of FIG. 60 processing for read, modify, add, or otherwise alter certain related data, or cause the processing of certain related executable code, for example to manage appropriate in-process WDR processing. If block 6020 determines the entry is not a WDR privilege, then processing continues to block 6022.

If block 6022 determines the entry is a Situational Location privilege, then block 6024 will perform any LBX actions in context for the list parameter (if any applicable), and processing continues back to block 6006. Block 6024 may access any in-process WDR field, subfield(s), or associated in-process WDR data for appropriate LBX processing involving read, modify, add, or otherwise alter certain related data, or cause the processing of certain related executable code, for example to manage appropriate in-process WDR situational location processing. If block 6022 determines the entry is not a situational location privilege, then processing continues to block 6026

If block 6026 determines the entry is a monitoring privilege, then block 6028 will perform any LBX actions in context for the list parameter (if any applicable), and processing continues back to block 6006. Block 6028 may access any MS data, or associated in-process WDR data for appropriate LBX processing involving read, modify, add, or otherwise alter certain related data, or cause the processing of certain related executable code, for example to manage appropriate in-process WDR processing at the MS. If block 6026 determines the entry is not a monitoring privilege, then processing continues to block 6030.

If block 6030 determines the entry is a LBX privilege, then block 6032 will perform any LBX actions in context for the list parameter (if any applicable), and processing continues back to block 6006. Block 6032 may access any MS data, or associated in-process WDR data for appropriate LBX processing involving read, modify, add, or otherwise alter certain related data, or cause the processing of certain related executable code, for example to perform LBX processing at the MS. If block 6030 determines the entry is not a LBX privilege, then processing continues to block 6034.

If block 6034 determines the entry is a LBS privilege, then block 6036 will perform any LBS actions in context for the list parameter, and processing continues back to block 6006. Block 6036 may access any MS data, or associated in-process WDR data for appropriate LBS processing involving read, modify, add, or otherwise alter certain related data, or cause the processing of certain related executable code, for example to perform LBS processing at the MS, and perhaps cause processing at a connected LBS. If block 6034 determines the entry is not a LBS privilege, then processing continues to block 6038.

Block 6038 is provided for processing completeness for handling appropriately (e.g. performing any LBX actions in context for the list parameter (if any applicable) a privilege that some reader may not appreciate falling into one of the privilege classes of FIG. 60 processing. Block 6038 then continues to block 6006. Referring back to block 6008, if it is determined there are no more unprocessed entries remaining in the list parameter (i.e. 5810 of collection 5802 when FIG. 60 invoked from block 5736), then the caller/invoker is returned to at block 6040.

In one embodiment, FIG. 60 uses the absence of certain privileges to perform LBX actions in context for the list parameter wherein block 6040-A determines which privileges were not provided, block 6040-B performs LBX actions in context for the lack of privileges, and block 6040-C returns to the caller/invoker.

FIG. 60 processing causes application types of actions according to privileges set. Such application types of actions are preferably caused using APIs, callback functions, or other interfaces so as to isolate FIG. 60 LBX processing from applications that are integrated with it. This prevents application "know-how" from being part of the LBX processing (e.g. software) built for MSs. FIG. 60 preferably invokes the "know-how" through an appropriate interface (software or hardware). In one preferred embodiment, participating applications register themselves as processing particular atomic privileges so that FIG. 60 invokes the interface with the privilege, its setting, and perhaps useful environmental data of interest. The application itself can then optimally process the privilege for an appropriate application action. Invocation of the application interface may be thread oriented so as to not wait for a return, or may be synchronous for waiting for a return (or return code). In one preferred embodiment, the PRR 5300 is modified for further containing a privilege join field **5300*j* for joining to a new Application Privileges Reference (APR) table containing all privileges which are relevant for the application described by the PRR 5300. This provides the guide of all privileges which are applicable to an application, and which are to cause invocation of the interface(s) of the application. A PRR 5300 is to be extended with new data in at least one field 5300*k* which contains interface directions for how to invoke the application with the privilege for processing (e.g. through an appropriate interface (e.g. Dynamic Link Library (DLL), callback function, script, etc)). See FIGS. 59 and 60**. Preferably, a single API or invocation is used for all privileges to a particular application and the burden of conditional processing paths is put on the application in that one interface. An alternate embodiment could allow multiple interfaces to be plugged in: one for each of a plurality of classes, or categories, of privileges so that the burden of unique processing paths, depending on a privilege, is reduced for one application. In any embodiment, it is preferable to minimize linkage execution time between LBX processing and an application which is plugged in. Linkage time can be reduced by:

1) Performing appropriate and directed executable linkage as indicated by the PRR at initialization time of block 1240;
2) Performing loading into executable memory of needed dynamically linked executables (e.g. DLL) as indicated by the PRR at initialization time of block 1240 wherein the PRR provides link library information for resolving linkage; and/or
3) Validating presence of, or performing loading of, the executables/script/etc in an appropriate manner at an appropriate initialization time.

Note that atomic command processing solves performance issues by providing a tightly linked executable environment while providing methods for customized processing. Many applications may be invoked for the same privilege (i.e. blocks 6012, 6016, 6020, 6024, 6028, 6032, 6036 and/or 6038 can certainly invoke multiple applications (i.e. cause multiple actions) for a single privilege), depending on what is found in the APR table. Of course, integrated application action processing can be built with LBX software so that the MS applications are tightly integrated with the LBX processing. Generally, FIG. 60 includes appropriate processing of applications while FIG. 59 affects data which can be accessed (e.g. polled) by applications.

With reference back to FIG. 57, block 5736 continues to block 5738. Block 5738 performs actions in accordance with privileges of the PRIVS2WDR list by invoking the do action procedure of FIG. 60 with the PRIVS2WDR list, and the in-process WDR as parameters (preferably passed by pointer/reference), and then continues to block 5740. FIG. 60 processing is analogously as described above except in context for the PRIVS2WDR (5820) list and for the in-process WDR of FIG. 57 processing relative the PRIVS2WDR list. One embodiment may incorporate a block 5737 (block 5736 continues to 5737 which continues to block 5738) for invoking FIG. 59 processing with PRIVS2WDR. Generally, privilege configurations 5820 involve actions for the benefit of the WDR originator.

Block 5740 processing merges the MYCHARTERS and CHARTERS2ME lists into a CHARTERS2DO list, and continues to block 5742 for eliminating inappropriate charters that may exist in the CHARTERS2DO list. Block 5742 additionally eliminates charters with a TimeSpec qualifier invalid for the time of FIG. 57 processing (an alternate embodiment can enforce TimeSpec interpretation at block 5744). If all actions, or any condition, term, expression, or entire charter itself has a TimeSpec outside of the time of FIG. 57 processing, then preferably the entire charter is eliminated. Action(s) are removed from a charter which remains in effect if action(s) for a charter have an invalid TimeSpec for the time of FIG. 57 processing, in which case any remaining actions with no TimeSpec or a valid TimeSpec are preserved for the effective charter. If all charter actions are invalid per TimeSpec, then the charter is completely eliminated. Thereafter, block 5744 performs charter actions in accordance with conditions of charters of the CHARTERS2DO list (see FIG. 61), and processing then terminates at block 5746.

Block 5742 can eliminate charters which are irrelevant for processing, for example depending upon the type of in-process WDR. For a maintained WDR, inappropriate charters may be those which do not have a maintained condition specification (i.e. _fldname). For an inbound WDR, inappropriate charters may be those which do not have an in-bound condition specification (i.e. _I_fldname). For an outbound WDR, inappropriate charters may be those which do not have an out-bound condition specification (i.e. _O_fldname). The context of WITS processing (mWITS, iWITS, oWITS) may be used at block 5742 for eliminating inappropriate charters.

With reference back to block 5732, if it is determined that this MS should not process (see) the WDR in-process, processing continues to block 5746 where FIG. 57 processing is terminated, and the processing host of FIG. 57 (i.e. FIGS. 2F, 20, 21, 25) appropriately ignores the WDR.

With reference back to block 5706, if it is determined that the WDR identity matches the MS of FIG. 57 processing, processing continues to block 5748. Block 5706 continues to block 5748 when a) the in-process WDR is from this MS and is being maintained at the MS of FIG. 57 processing (i.e. FIG. 57=mWITS); or b) the in-process WDR is outbound from this MS (i.e. FIG. 57=oWITS). Block 5748 forms a PRIVS2OTHERS list of configurations 5830 and continues to block 5750 for eliminating duplicates that may be found. Block 5748 may collapse grant hierarchies to form the list. Duplicates may occur for privileges which include the duplicated privileges (i.e. subordinate privileges) as described above. Block 5750 additionally eliminates duplicates that may exist for permission embodiments wherein a privilege can enable or disable a feature. In a present disclosure embodiment wherein a privilege can enable, and a privilege can disable the same feature or functionality, there is preferably a tie breaker of disabling the feature (i.e. disabling wins).

In an alternate embodiment, enabling may break a tie of ambiguity. Block 5750 further eliminates privileges that have a MSRelevance qualifier indicating the MS of FIG. 57 processing is not supported for the particular privilege, and also eliminates privileges with a TimeSpec qualifier invalid for the time of FIG. 57 processing (an alternate embodiment can enforce TimeSpec interpretation at block 5758 (i.e. in FIG. 60 processing)). Thereafter, block 5752 forms a MYCHARTERS list of configurations 5870 and preferably eliminates variables by instantiating/elaborating at points where they are referenced. Then, block 5754 forms a CHARTERS2ME list of configurations 5890 and preferably eliminates variables by instantiating/elaborating at points where they are referenced. Then, block 5756 eliminates those charters which are not privileged. In some embodiments, block 5756 is not necessary (5754 continues to 5758) because un-privileged charters will not be permitted to be present at the MS of FIG. 57 processing. Nevertheless, block 5756 removes from the CHARTERS2ME list all charters which do not have a privilege granted by the MS (the MS user) of FIG. 57 processing to the creator of the charter, for permitting the charter to be enabled (as described above for block 5718). In any embodiments, block 5756 ensures no charters from other users are considered active unless appropriately privileged. Thereafter, block 5758 performs actions in accordance with privileges of the PRIVS2OTHERS list by invoking the do action procedure of FIG. 60 with the PRIVS2ME list, and the in-process WDR as parameters (preferably passed by pointer/reference), and then continues to block 5740 which has already been described. FIG. 60 processing is the same as described above except in context for the PRIVS2OTHERS (5830) and for the in-process WDR of FIG. 57 processing relative the PRIVS2OTHERS list. Of course the context of blocks 5748 through 5758 are processed for in-process WDRs which are: a) maintained to the MS of FIG. 57 for the whereabouts of the MS of FIG. 57 processing; or b) outbound from the MS of FIG. 57 processing (e.g. an outbound WDR describing whereabouts of the MS of FIG. 57 processing). One embodiment may incorporate a block 5757 (block 5756 continues to 5757 which continues to block 5758) for invoking FIG. 59 processing with PRIVS2OTHERS. Generally, privilege configurations 5830 involve actions for the benefit of others (i.e. other than this MS).

When considering the terminology "incoming" as used for FIGS. 49A and 49B, a WDR in-process at this MS (the MS of FIG. 57 processing) which was originated by this MS with an identity for this MS uses: a) this MS charters (5870 confirmed by 4962 bullet 2 part 1, 4988 bullet 2 part 1, 4922, 4948); b) others' charters per this MS (or this MS user) privileges to them (5890 confirmed by 4966 bullet 3, 4964 bullet 2, 4986 bullet 3, 4984 bullet 2, 4924, 4946); and c) this MS (or this MS user) privileges to others (5830 confirmed by 4944 bullet 4, 4924 bullet 4, 4946 bullet 4, 4926 bullet 4). An alternate embodiment additionally uses d) others' privileges to this MS (or this MS user) (5840), for example to determine how nearby they are at outbound WDR time or at the time of maintaining the MS's own whereabouts. This alternate embodiment would cause FIG. 57 to include: a new block 5760 for forming a PRIVS2ME list of privileges 5840; a new block 5762 for eliminating duplicates, MSRelevance rejects and invalid TimeSpec entries; a new block 5764 for enabling features an functionality in accordance with the PRIVS2ME list of block 5760 by invoking the enable features and functionality procedure of FIG. 59 with PRIVS2ME as a parameter (FIG. 59 processing analogous to as described above except for PRIVS2ME); and a new block 5766 for performing actions in accordance with PRIVS2ME by invoking the do action procedure of FIG. 60 with PRIVS2ME as a parameter (FIG. 60 processing analogous to as described above except for PRIVS2ME). Such an embodiment would cause block 5758 to continue to block 5760 which continues to block 5762 which continues to block 5764 which continues to block 5766 which then continues to block 5740.

When considering the terminology "incoming" as used for FIGS. 49A and 49B, a WDR in-process at this MS (the MS of FIG. 57 processing) which was originated by a remote MS with an identity different than this MS uses: e) this MS charters per other's privileges to this MS (or this MS user) (5870 confirmed by 4962 bullet 2 part 2, 4988 bullet 2 part 2, 4926, 4944, 4924 bullet 2); f) others' charters per this MS (or this MS user) privileges to them (5860 confirmed by 4966 bullet 2, 4964 bullet 3, 4986 bullet 2, 4984 bullet 3, 4924, 4946); g) this MS (or this MS user) privileges to others (5820 confirmed by 4944 bullet 3, 4924 bullet 3, 4946 bullet 3, 4926 bullet 3); and h) others' privileges to this MS (or this MS user) (5810 confirmed by 4926 bullet 2, 4944 bullet 2, 4946 bullet 2, 4924 bullet 2). An alternate embodiment additionally uses i) others' charters per this MS (or this MS user) privileges to them (5890); and/or j) this MS (or this MS user) privileges to others (5830); and/or k) others' privileges to this MS (or this MS user) (5840). This alternate embodiment would cause FIG. 57 to alter block 5716 to further include charters 5890, alter block 5708 to further include privileges 5840, include a new block 5722 for forming a PRIVS2OTHERS list of privileges 5830, new block 5724 for eliminating duplicates, new block 5726 for enabling features an functionality in accordance with the PRIVS2OTHERS list of block 5722, new block 5728 for enabling features an functionality in accordance with the modified PRIVS2ME list of block 5708, and new block 5730 for performing actions in accordance with the modified PRIVS2ME (i.e. block 5720 continues to block 5722 which continues to block 5724 which continues to block 5726 which continues to block 5728 which continues to block 5730 which then continues to block 5732). Also, blocks 5742 and 5744 would appropriately handle new charters of altered block 5716. Such an embodiment would cause new blocks 5726, 5728 and 5730 to invoke the applicable procedure (FIGS. 59 or FIG. 60) with analogous processing as described above except in context for the parameter passed.

In some FIG. 57 embodiments, blocks 5708 and/or 5716 and/or 5754 and/or relevant alternate embodiment blocks discussed are remotely accessed by communicating with the MS having the identity determined at block 5704 for the WDR in-process. The preferred embodiment is as disclosed for maintaining data local to the MS for processing there. In other embodiments, there are separate flowcharts (e.g. FIGS. 57A, 57B and 57C) for each variety of handling in-process WDRs (e.g. mWITS, iWITS, oWITS processing).

Various FIG. 57 embodiments' processing will invoke the procedures of FIGS. 59 and 60 with appropriate parameters (i.e. lists for 5810 and/or 5820 and/or 5830 and/or 5840) so that any category subset of the permission data collection 5802 (i.e. 5810 and/or 5820 and/or 5830 and/or 5840) is used to enable appropriate LBX features and functionality according to the WDR causing execution of FIG. 57 processing. For example, privileges between the MS of FIG. 57 processing and an identity other than the WDR causing FIG. 57 processing may be used (e.g. relevant MS third party notification, features, functionality, or processing as defined by related privileges).

Various FIG. 57 embodiments' processing will invoke charter processing with appropriate parameters (i.e. lists for 5860 and/or 5870 and/or 5880 and/or 5890) so that any category subset of the charter data collection 5852 (i.e. 5860 and/or 5870 and/or 5880 and/or 5890) is used to perform LBX actions according to the WDR causing execution of FIG. 57 processing. For example, charters between the MS of FIG. 57 processing and an identity other than the WDR causing FIG. 57 processing may be used (e.g. relevant MS third party charters as defined by related privileges).

FIG. 57 determines which privileges and charters are relevant to the WDR in process, regardless of where the WDR originated. The WDR identity checked at block 5706 can take on various embodiments so that the BNF grammar of FIGS. 30A through 30E are fully exploited. Preferably, the identities associated with "this MS" and the WDR in process are usable as is, however while there are specific embodiments implementing the different identifier varieties, there may also be a translation or lookup performed at block 5704 to ensure a proper compare at block 5706. The identities of "this MS" and the WDR identity (e.g. field 1100*a*) may be translated prior to performing a compare. For example, a user identifier maintained to the user configurations (permissions/charters) may be "looked up" using the MS identifiers involved ("this MS" and WDR MS ID) in order to perform a proper compare at block 5706. Some embodiments may maintain a separate identifier mapping table local to the MS, accessed from a remote MS when needed, accessed from a connected service, or accessed as is appropriate to resolve the source identifiers with the identifiers for comparing at block 5706. In another embodiment (preferred), the appfld.source section of fields 1100*k* contains the reasonable MS identities and is used contextually for the correct identifier to do the compare (e.g. when specifying appfld.source.id, the best fit appfld.source.id.X is determined and used). There may be other appfld.source.id.X values for a MS which may be used in comparing WDR identity values. Thus, permissions and/or charters can grant from one identity to another wherein identities of the configuration are associated directly (i.e. useable as is) or indirectly (i.e. mapped) to the actual identities of the user(s), the MS(s), the group(s), etc involved in the configuration.

Preferably, statistics are maintained by WITS processing for each reasonable data worthy of tracking from standpoints of user reporting, automated performance fine tuning (e.g. thread throttling), automated adjusted processing, and monitoring of overall system processing. In fact, every processing block of FIG. 57 can have a plurality of statistics to be maintained.

Figure 61:
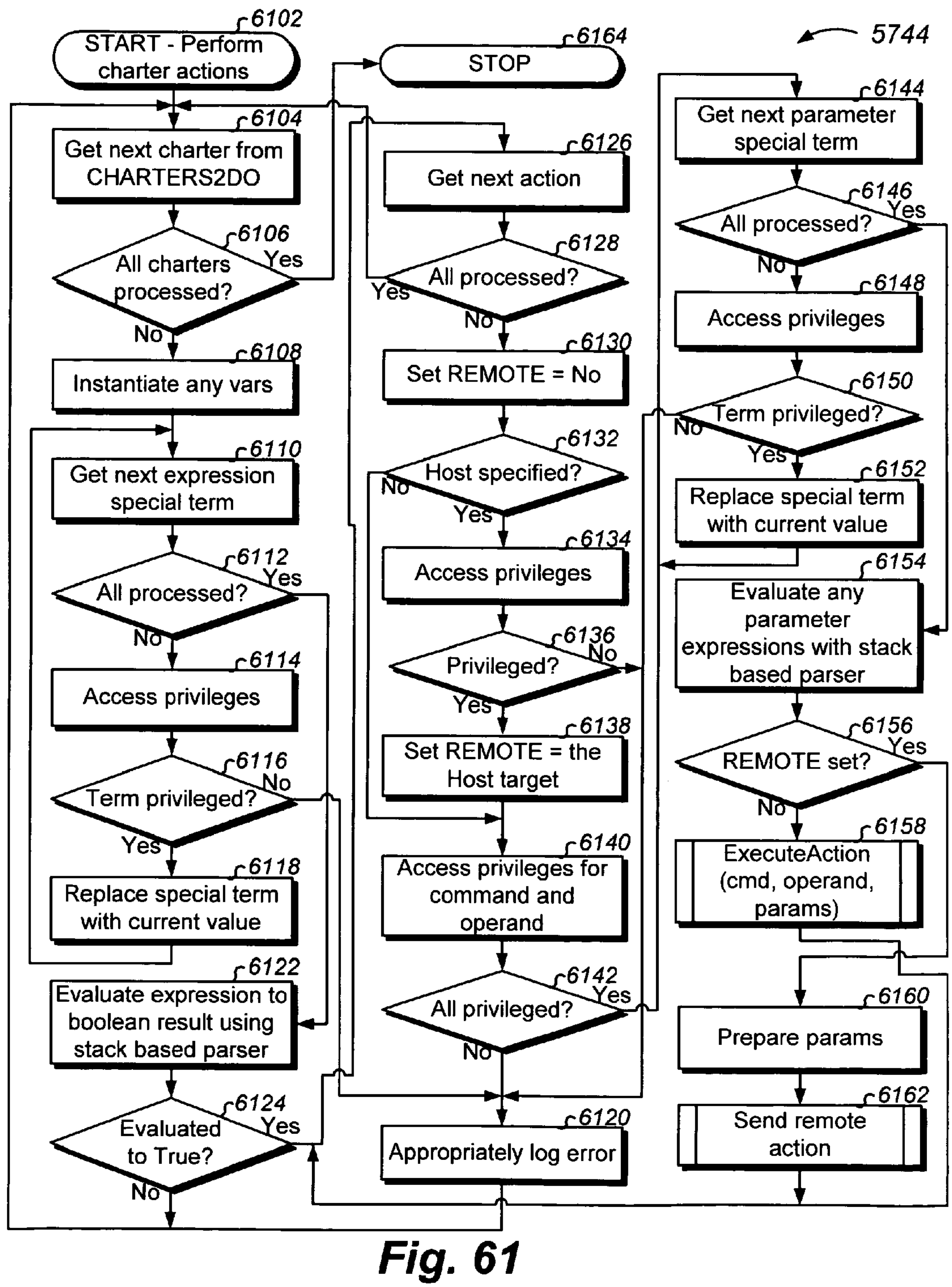
FIG. 61 depicts a flowchart for describing a preferred embodiment of performing processing in accordance with configured charters.

FIG. 61 depicts a flowchart for describing a preferred embodiment of performing processing in accordance with configured charters, as described by block 5744. The CHARTERS2DO list from FIG. 57 is processed by FIG. 61. FIGS. 61 (and/or FIG. 57 (e.g. blocks 5718/5756)) is responsible for processing grammar specification privileges. Block 5744 processing begins at block 6102 and continues to block 6104. Block 6104 gets the next charter (or first charter on first encounter to block 6104 from block 6102) from the CHARTERS2DO list and continues to block 6106 to check if all charters have already been processed from the list. Block 6104 begins an iterative loop (blocks 6104 through 6162) for processing all charters (if any) from the CHARTERS2DO list.

If block 6106 determines there is a charter to process, then processing continues to block 6108 for instantiating any variables that may be referenced in the charter, and then continues to block 6110. Charter parts are scanned for referenced variables and they are instantiated so that the charter is intact without a variable reference. The charter internalized form may be modified to accommodate instantiation(s). FIG. 57 may have already instantiated variables for charter elimination processing. Block 6108 is typically not required since the variables were likely already instantiated when internalized to a preferred embodiment CHARTERS2DO processable form, and also processed by previous blocks of FIG. 57 processing. Nevertheless, block 6108 is present to cover other embodiments, and to handle any instantiations which were not already necessary. In some embodiments, block 6108 is not required since variable instantiations can occur as needed when processing the individual charter parts during subsequent blocks of FIG. 61 processing. Block 6106 would continue to block 6110 when a block 6108 is not required.

Block 6110 begins an iterative loop (blocks 6110 through 6118) for processing all special terms from the current charter expression. Block 6110 gets the next (or first) special term (if any) from the charter expression and continues to block 6112. A special term is a BNF grammar WDRTerm, AppTerm, map term, or atomic term. If block 6112 determines a special term was found for processing from the expression, then block 6114 accesses privileges to ensure the special term is privileged for use. Appropriate permissions 5802 are accessed in this applicable context of FIG. 57 processing. Block 6114 then continues to block 6116. Blocks 6114 and 6116 may not be required since unprivileged charters were already eliminated in previous blocks of FIG. 57 processing (e.g. see blocks 5718 and 5756). Nevertheless, blocks 6114 and 6116 are shown to cover other embodiments, and to ensure unprivileged charters are treated ineffective. Depending on an embodiment, blocks 5718 and 5756 may only perform obvious eliminations. In other embodiments, there may be no blocks 5718 or 5756 so that charter part processing occurs only in one place (i.e. FIG. 61) to achieve better MS performance by preventing more than one scan over charter data. In another embodiment, blocks 6114 and 6116 are not required since all charter eliminations based on privileges already occurred at the previous blocks of FIG. 57 processing. Block 6112 can continue to block 6118 when blocks 6114 and 6116 are not required.

If block 6116 determines the special term is privileged for use (e.g. explicit privilege, or lack of a privilege denying use, depending on privilege deployment embodiments), then block 6118 appropriately accesses the special term data source and replaces the expression referenced special term with the corresponding value. Block 6118 accesses special term data dynamically so that the terms reflect values at the time of block 6118 processing. Block 6118 continues back to block 6110. A WDRTerm is accessed from the in-process WDR to FIG. 57 processing. An AppTerm is an anticipated registered application variable accessed by a well known name, typically with semaphore control since an asynchronous application thread is writing to the variable. A map term is an indicated name (e.g. ?refname) which references a map point or map region found in records 9080. An atomic term will cause access to WDR data at queue 22 or LBX history 30, application status for applications in use at the MS of FIG. 57 processing, system date/time, the MS ID of the MS of FIG. 57 processing, or other appropriate data source.

Referring back to block 6116, if it is determined that the special term of the charter expression is not privileged, then block 6120 logs an appropriate error (e.g. to LBX history 30) and processing continues back to block 6104 for the next charter. An alternate block 6120 may alert the MS user, and in some cases require the user to acknowledge the error before continuing back to block 6104. So, the preferred embodiment of charter processing eliminates a charter from being processed if any single part of the charter expression is not privileged.

Referring back to block 6112, if it is determined there are no special terms in the expression remaining to process (or there were none in the expression), then block 6122 evaluates the expression to a Boolean True or False result using well known processing for a stack based parser for expression evaluation (e.g. See well known compiler/interpreter development techniques (e.g. "Algorithms+Data Structures=Programs" by Nicklaus Wirth published by Prentice-Hall, Inc. 1976)). Block 6122 implements atomic operators using the WDR queue 22, most recent WDR for this MS, LBX history 30, or other suitable MS data. Any Invocation is also invoked for resulting to a True or False wherein a default is enforced upon no return code, or no suitable return code, returned. Invocation parameters that had special terms would have been already been updated by block 6118 to eliminate special terms prior to invocation. In an alternate embodiment, stack processing of block 6122 evaluates all special terms when required so that expressions may result in being evaluated to a special term which subsequently gets resolved. In this alternate embodiment, block 6122 would incorporate privilege validation of blocks 6114 and 6116 as well as special term elaboration/replacement of blocks 6110, 6112 and 6118; and block 6122 can recognize a special indicator, or syntax, for specifying to reduce an expression to a type of special term. Thereafter, if block 6124 determines the expression evaluated to False, then processing continues back to block 6104 for the next charter (i.e. expression=False implies to prevent (not cause) the action(s) of the charter). If block 6124 determines the expression evaluated to True, then processing continues to block 6126.

Block 6126 begins an iterative loop (blocks 6126 through 6162) for processing all actions from the current charter. Block 6126 gets the next (or first) action (if any) from the charter and continues to block 6128. There should be at least one action in a charter provided to FIG. 61 processing since the preferred embodiment of FIG. 57 processing will have eliminated any placeholder charters without an action specified (e.g. charters with no actions preferably eliminated at blocks 5740 as part of the merge process, at block 5742, or as part of previous FIG. 57 processing to form privileged charter lists). If block 6128 determines an unprocessed action was found for processing, then block 6130 initializes a REMOTE variable to No. Thereafter, if it is determined at block 6132 that the action has a BNF grammar Host specification, then block 6134 accesses privileges and block 6136 checks if the action is privileged for being executed at the Host specified. The appropriate permissions 5802 are accessed at block 6134 in this applicable context of FIG. 57 processing. If block 6136 determines the action is privileged for running at the Host, then block 6138 sets the REMOTE variable to the Host specified and processing continues to block 6140. If block 6136 determines the action is not privileged for running at the Host, then processing continues to block 6120 for error processing already described above. If block 6132 determines there was no Host specified for the action, processing continues directly to block 6140. Blocks 6134 and 6136 may not be required since unprivileged charters were already eliminated in previous blocks of FIG. 57 processing (e.g. see blocks 5718 and 5756). Nevertheless, blocks 6134 and 6136 are shown to cover other embodiments, and to ensure unprivileged charters are treated ineffective. Depending on an embodiment, blocks 5718 and 5756 may only perform obvious eliminations. In other embodiments, there may be no blocks 5718 or 5756 so that charter part processing occurs only in one place (i.e. FIG. 61) to achieve better MS performance by preventing more than one scan over charter data. In another embodiment, blocks 6134 and 6136 are not required since all charter eliminations based on privileges already occurred at the previous blocks of FIG. 57 processing. Block 6132 can continue to block 6138 when blocks 6134 and 6136 are not required and a Host was specified with the action. In some embodiments, block 6136 may cause logging of an error and a return to block 6126 so other charter actions are not ignored for an unprivileged host.

Block 6140 accesses appropriate permissions 5802 in this applicable context of FIG. 57 processing for ensuring the command and operand are appropriately privileged. Thereafter, if block 6142 determines that the action's command and operand are not privileged, then processing continues to block 6120 for error processing already described. If block 6142 determines the action's command and operand are to be effective, then processing continues to block 6144. Blocks 6140 and 6142 may not be required since unprivileged charters were already eliminated in previous blocks of FIG. 57 processing (e.g. see blocks 5718 and 5756). Nevertheless, blocks 6140 and 6142 are shown to cover other embodiments, and to ensure unprivileged charters are treated ineffective. Depending on an embodiment, blocks 5718 and 5756 may only perform obvious eliminations. In other embodiments, there may be no blocks 5718 or 5756 so that charter part processing occurs only in one place (i.e. FIG. 61) to achieve better MS performance by preventing more than one scan over charter data. In another embodiment, blocks 6140 and 6142 are not required since all charter eliminations based on privileges already occurred at the previous blocks of FIG. 57 processing. Block 6138, and the No condition of block 6132, would continue to block 6144 when blocks 6140 and 6142 are not required. In some embodiments, block 6142 may cause logging of an error and a return to block 6126 so other charter actions are not ignored for an unprivileged action.

Block 6144 begins an iterative loop (blocks 6144 through 6152) for processing all parameter special terms of the current charter. Block 6144 gets the next (or first) parameter special term (if any) and continues to block 6146. A special term is a BNF grammar WDRTerm, AppTerm, map term, or atomic term (as described above). If block 6146 determines a special term was found for processing from the parameter list, then block 6148 accesses privileges to ensure the special term is privileged for use. The appropriate permissions 5802 are accessed in this applicable context of FIG. 57 processing. Block 6148 then continues to block 6150. Blocks 6148 and 6150 may not be required since unprivileged charters were already eliminated in previous blocks of FIG. 57 processing (e.g. see blocks 5718 and 5756). Nevertheless, blocks 6148 and 6150 are shown to cover other embodiments, and to ensure unprivileged charters are treated ineffective. Depending on an embodiment, blocks 5718 and 5756 may only perform obvious eliminations. In other embodiments, there may be no blocks 5718 or 5756 so that charter part processing occurs only in one place (i.e. FIG. 61) to achieve better MS performance by preventing more than one scan over charter data. In another embodiment, blocks 6148 and 6150 are not required since all charter eliminations based on privileges already occurred at the previous blocks of FIG. 57 processing. Block 6146 can continue to block 6152 when blocks 6148 and 6150 are not required.

If block 6150 determines the special term is privileged for use (e.g. explicit privilege, or lack of a privilege denying use, depending on privilege deployment embodiments), then block 6152 appropriately accesses the special term data source and replaces the parameter referenced special term with the corresponding value (e.g. map term gets replaced with associated PointSet). Block 6152 accesses special term data dynamically so that the terms reflect values at the time of FIG. 61 block 6152 processing. Block 6152 continues back to block 6144. A WDRTerm, AppTerm, map term, and atomic term are accessed in a manner analogous to accessing them at block 6118.

Figure 62:
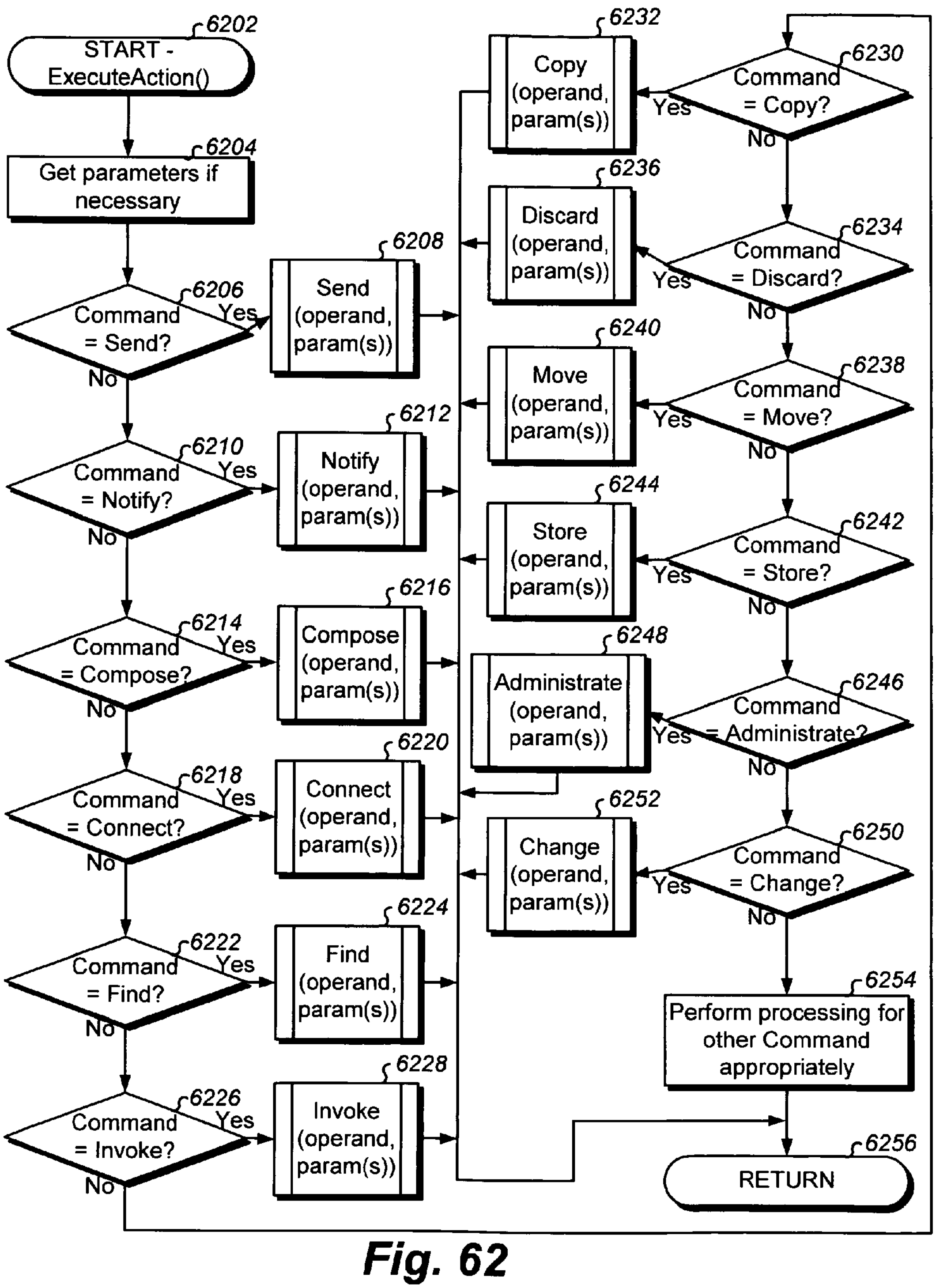
FIG. 62 depicts a flowchart for describing a preferred embodiment of a procedure for performing an action corresponding to a configured command.

Referring back to block 6150, if it is determined that the special term of the parameter list is not privileged, then processing continues to block 6120 for error processing already described. In some embodiments, block 6150 may cause logging of an error and a return to block 6126 so other charter actions are not ignored for an unprivileged parameter. Referring back to block 6146, if it is determined there are no special terms in the parameter list remaining to process (or there were none), then block 6154 evaluates each and every parameter expression to a corresponding value using well known processing for a stack based parser for expression evaluation (e.g. See well known compiler/interpreter development techniques (e.g. "Algorithms+Data Structures=Programs" by Nicklaus Wirth published by Prentice-Hall, Inc. 1976)). Block 6154 implements the atomic operators using the WDR queue 22, most recent WDR for this MS, LBX history 30, or other suitable MS data. Any Invocation is also invoked for resulting to Data or Value wherein a default is enforced upon no returned data. Invocation parameters that had special terms would have been updated at block 6152 to eliminate special terms prior to invocation. Block 6154 ensures each parameter is in a ready to use form to be processed with the command and operand. Each parameter results in embodiments of a data value, a data value resulting from an expression, a data reference (e.g. pointer), or other embodiments well known in the art of passing parameters (arguments) to a function, procedure, or script for processing. In an alternate embodiment, stack processing of block 6154 evaluates all special terms when required so that expressions may result in being evaluated to a special term which subsequently gets resolved. In this alternate embodiment, block 6154 would incorporate privilege validation of blocks 6148 and 6150 as well as special term elaboration/replacement of blocks 6144, 6146 and 6152; and block 6154 can recognize a special indicator, or syntax, for specifying to reduce an expression to a type of special term. Thereafter, if block 6156 determines the REMOTE variable is set to No (i.e. "No" equals a value distinguishable from any Host specification for having the meaning of "No Host Specification"), then processing continues to block 6158 where the ExecuteAction procedure of FIG. 62 is invoked with the command, operand and parameters of the action in process. Upon return from the procedure of FIG. 62, processing continues back to block 6126 for any remaining charter actions. If block 6156 determines the REMOTE variable is set to a Host for running the action, then processing continues to block 6160 for preparing send data procedure parameters for performing a remote action (of the command, operand and parameters), and then invoking at block 6162 the send data procedure of FIG. 75A for performing the action at the remote MS (also see FIG. 75B). Processing then continues back to block 6126. An alternate embodiment will loop on multiple BNF grammar Host specifications for multiple invocations of the send data procedure (i.e. when multiple Host specifications are supported). Another embodiment to FIG. 61 processing permits multiple actions with a single Host specification.

Referring back to block 6128, if it is determined all current charter actions are processed, then processing continues to block 6104 for any next charter to process. Referring back to block 6106, if it is determined all charters have been processed, processing terminates at block 6164.

Depending on various embodiments, there may be obvious error handling in FIG. 61 charter parsing. Preferably, the charters were reasonably validated prior to being configured and/or previously processed/parsed (e.g. FIG. 57 processing). AppTerm specifications are to cause obvious error handling processing for searching fields 5300*g* for determining the matching PRR. If there is no match in any PRR, the AppTerm specification is invalid. WDRTerm and atomic term specifications are to cause obvious error handling processing for being able to resolve the field reference.

TimeSpec and/or MSRelevance information may be used in FIG. 61 so that charter part processing occurs only in one place (i.e. FIG. 61 rather than FIG. 57) to achieve better MS performance by preventing more than one scan over charter data. Some embodiments of FIG. 61 may be the single place where charters are eliminated based on privileges, TimeSpecs, MSRelevance, or any other criteria discussed with FIG. 57 for charter elimination to improve performance (i.e. a single charter parse when needed). Third party MSs (i.e. those that are not represented by the in-process WDR and the MS of FIG. 57 processing) can be affected by charter actions (e.g. via Host specification, privileged action, privileged feature, etc). Processing of special terms at blocks 6110 and/or 6144 can include concatenating of data, formatting of data, or any other term of a reasonable expression. Blocks 6110 and/or 6144 may include stack processing of blocks 6122 and/or 6154 for proper special term determination (e.g. expressions which evaluate to a special term). See discussions above (e.g. FIGS. 51A&B, Invocation, Parameters, etc).

Preferably, statistics are maintained throughout FIG. 61 processing for how charters were processed, which charters became effective, why they became effective, which commands were processed (e.g. invocation of FIG. 62), etc.

With reference now to FIG. 75A, depicted is a flowchart for describing a preferred embodiment of a procedure for sending data to a remote MS, for example to perform a remote action as invoked from block 6162. FIG. 75A is preferably of linkable PIP code 6. The purpose is for the MS of FIG. 75A processing (e.g. a first, or sending, MS) to transmit data to other MSs (e.g. at least a second, or receiving, MS), for example an action (command, operand, and any parameter(s)), or specific processing for a particular command (e.g. Send atomic command). Multiple channels for sending, or broadcasting should be isolated to modular send processing (feeding from a queue 24). In an alternative embodiment having multiple transmission channels visible to processing of FIG. 75A (e.g. block 6162), there can be intelligence to drive each channel for broadcasting on multiple channels, either by multiple send threads for FIG. 75A processing, FIG. 75A loop processing on a channel list, and/or passing channel information to send processing feeding from queue 24. If FIG. 75A does not transmit directly over the channel(s) (i.e. relies on send processing feeding from queue 24), an embodiment may provide means for communicating the channel for broadcast/send processing when interfacing to queue 24 (e.g. incorporate a channel qualifier field with send packet inserted to queue 24).

In any case, see detailed explanations of FIGS. 13A through 13C, as well as long range exemplifications shown in FIGS. 50A through 50C, respectively. Processing begins at block 7502, continues to block 7504 where the caller parameter(s) passed to FIG. 75A processing (e.g. action for remote execution, or command for remote execution) are used for sending at least one data packet containing properly formatted data for sending, and for being properly received and interpreted. Block 7504 may reformat parameters into a suitable data packet(s) format so the receiving MS can process appropriately (see FIG. 75B). Depending on the present disclosure embodiment, any reasonable supported identity (ID/IDType) is a valid target (e.g. as derived from a recipient or system parameter). Thereafter, block 7506 waits for an acknowledgement from the receiving MS if the communication embodiment in use utilizes that methodology. In one embodiment, the send data packet is an unreliable datagram(s) that will most likely be received by the target MS. In another embodiment, the send data packet(s) is reliably transported data which requires a final acknowledgement that it was received in good order. In any case, block 7506 continues to block 7508.

Block 7504 formats the data for sending in accordance with the specified delivery method, along with necessary packet information (e.g. source identity, wrapper data, etc), and sends data appropriately. For a broadcast send, block 7504 broadcasts the information (using a send interface like interface 1906) by inserting to queue 24 so that send processing broadcasts data 1302 (e.g. on all available communications interface(s) 70), for example as far as radius 1306, and processing continues to block 7506. The broadcast is for reception by data processing systems (e.g. MSs) in the vicinity of FIGS. 13A through 13C, as further explained by FIGS. 50A through 50C which includes potentially any distance. The targeted MS should recognize that the data is meant for it and receives it. For a targeted send, block 7504 formats the data intended for recognition by the receiving target. In an embodiment wherein usual MS communications data 1302 of the MS is altered to contain CK 1304 for listening MSs in the vicinity, send processing feeding from queue 24, caused by block 7504 processing, will place information as CK 1304 embedded in usual data 1302 at the next opportune time of sending usual data 1302. As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 75A sends/broadcasts new data 1302.

Block 7506 waits for a synchronous acknowledgement if applicable to the send of block 7504 until either receiving one or timing out. Block 7506 will not wait if no ack/response is anticipated, in which case block 7506 sets status for block 7508 to "got it". If a broadcast was made, one (1) acknowledgement may be all that is necessary for validation, or all anticipated targets can be accounted for before deeming a successful ack. Thereafter, if block 7508 determines an applicable ack/response was received (i.e. data successfully sent/received), or none was anticipated (i.e. assume got it), then processing continues to block 7510 for potentially processing the response. Block 7510 will process the response if it was anticipated for being received as determined by data sent at block 7504. Thereafter, block 7512 performs logging for success (e.g. to LBX History 30). If block 7508 determines an anticipated ack was not received, then block 7512 logs the attempt (e.g. to LBX history 30). An alternate embodiment to block 7514 will log an error and may require a user action to continue processing so a user is confirmed to have seen the error. Both blocks 7512 and 7514 continue to block 7516 where the caller (invoker) is returned to for continued processing (e.g. back to block 6162).

With reference now to FIG. 75B, depicted is a flowchart for describing a preferred embodiment of processing for receiving execution data from another MS, for example action data for execution, or processing of a particular atomic command for execution. FIG. 75B processing describes a Receive Execution Data (RxED) process worker thread, and is of PIP code 6. There may be many worker threads for the RxED process, just as described for a 19xx process. The receive execution data (RxED) process is to fit identically into the framework of architecture 1900 as other 19xx processes, with specific similarity to process 1942 in that there is data received from receive queue 26, the RxED thread(s) stay blocked on the receive queue until data is received, and a RxED worker thread sends data as described (e.g. using send queue 24). Blocks 1220 through 1240, blocks 1436 through 1456 (and applicable invocation of FIG. 18), block 1516, block 1536, blocks 2804 through 2818, FIG. 29A, FIG. 29B, and any other applicable architecture 1900 process/thread framework processing is to adapt for the new RxED process. For example, the RxED process is initialized as part of the enumerated set at blocks 1226 (e.g. preferably next to last member of set) and 2806 (e.g. preferably second member of set) for similar architecture 1900 processing. Receive processing identifies targeted/broadcasted data destined for the MS of FIG. 75B processing. An appropriate data format is used, for example using X.409 encoding of FIGS. 33A through 33C for some subset of data packet(s) received wherein RxED thread(s) purpose is for the MS of FIG. 75B processing to respond to incoming data. It is recommended that validity criteria set at block 1444 for RxED-Max be set as high as possible (e.g. 10) relative performance considerations of architecture 1900, to service multiple data receptions simultaneously. Multiple channels for receiving data fed to queue 26 are preferably isolated to modular receive processing.

In an alternative embodiment having multiple receiving transmission channels visible to the RxED process, there can be a RxED worker thread per channel to handle receiving on multiple channels simultaneously. If RxED thread(s) do not receive directly from the channel, the preferred embodiment of FIG. 75B would not need to convey channel information to RxED thread(s) waiting on queue 24 anyway. Embodiments could allow specification/configuration of many RxED thread(s) per channel.

A RxED thread processing begins at block 7552, continues to block 7554 where the process worker thread count RxED-Ct is accessed and incremented by 1 (using appropriate semaphore access (e.g. RxED-Sem)), and continues to block 7556 for retrieving from queue 26 sent data (using interface like interface 1948), perhaps a special termination request entry, and only continues to block 7558 when a record of data (e.g. action for remote execution, particular atomic command, or termination record) is retrieved. In one embodiment, receive processing deposits data as record(s) to queue 26. In another embodiment, XML is received and deposited to queue 26, or some other suitable syntax is received as derived from the BNF grammar. In another embodiment, receive processing receives data in one format and deposits a more suitable format for FIG. 75B processing.

Block 7556 stays blocked on retrieving from queue 26 until data is retrieved, in which case processing continues to block 7558. If block 7558 determines a special entry indicating to terminate was not found in queue 26, processing continues to block 7560. There are various embodiments for RxED thread(s), RxCD thread(s), thread(s) 1912 and thread(s) 1942 to feed off a queue 26 for different record types, for example, separate queues 26A, 26B, 26C and 26D, or a thread target field with different record types found at queue 26 (e.g. like field 2400$a$). In another embodiment, there are separate queues 26D and 26E for separate processing of incoming remote action and send command data. In another embodiment, thread(s) 1912 are modified with logic of RxED thread(s) to handle remote actions and send command data requests, since thread(s) 1912 are listening for queue 26 data anyway. In yet another embodiment, there are distinct threads and/or distinct queues for processing each kind of an atomic command to FIG. 75B processing (i.e. as processed by blocks 7578 through 7584).

Block 7560 validates incoming data for this targeted MS before continuing to block 7562. A preferred embodiment of receive processing already validated the data is intended for this MS by having listened specifically for the data, or by having already validated it is at the intended MS destination (e.g. block 7558 can continue directly to block 7564 (no block 7560 and block 7562 required)). If block 7562 determines the data is valid for processing, then block 7564 checks the data for its purpose (remote action or particular command). If block 7564 determines the data received is for processing a remote action, then block 7566 accesses source information, the command, the operand, and parameters from the data received. Thereafter, block 7568 accesses privileges for each of the remote action parts (command, operand, parameters) to ensure the source has proper privileges for running the action at the MS of FIG. 75B processing. Depending on embodiments, block 7568 may include evaluating the action for elaborating special terms and/or expressions as described for FIG. 61 (blocks 6140 through 6154), although the preferred embodiment preferably already did that prior to transmitting the remote action for execution (e.g. remote action already underwent detailed privilege assessment). However, in some embodiments where privileges are only maintained locally, the action processing of FIG. 61 processing would be required at block 7568 to check privileges where appropriate in processing the action. In such embodiments, FIG. 61 would process local actions as disclosed, but would not process actions known to be for remote execution (i.e. Host specification) since a FIG. 75B embodiment would include FIG. 61 processing for performing privilege check processing to determine that sufficient privileges are granted. Thus, depending on the present disclosure embodiment, block 7568 may include little privilege verification, no privilege verification, or may include all applicable action privilege verification discussed already in FIG. 61.

In yet another embodiment, special terms processing of FIG. 61 can be delayed until FIG. 75B processing (e.g. block 7566 continues to a new block 7567 which continues to block 7568). It may be advantageous to have new block 7567 elaborate/evaluate special terms at the MS of FIG. 75B processing in some embodiments. In a further embodiment, a syntax or qualifier can be used to differentiate where to perform special term elaboration/evaluation.

Thereafter, if block 7570 determines the action for execution is acceptable (and perhaps privileged, or privileged per source, or there was no check necessary), then block 7572 invokes the execute action procedure of FIG. 62 with the action (command, operand, and any parameter(s)), completes at block 7574 an acknowledgement to the originating MS of the data received at block 7556, and block 7576 sends/broadcasts the acknowledgement (ack), before continuing back to block 7556 for the next incoming execution request data. Block 7576 sends/broadcasts the ack (using a send interface like interface 1946) by inserting to queue 24 so that send processing transmits data 1302, for example as far as radius 1306. Embodiments will use the different correlation methods already discussed above, to associate an ack with a send.

If block 7570 determines the data is not acceptable/privileged, then processing continues directly back to block 7556. For security reasons, it is best not to respond with an error. It is best to ignore the data entirely. In another embodiment, an error may be returned to the sender for appropriate error processing and reporting.

Referring back to block 7564, if it is determined that the execution data is for processing a particular atomic command, then processing continues to block 7578. Block 7578 accesses the command (e.g. send), the operand, and parameters from the data received. Thereafter, block 7580 accesses privileges for each of the parts (command, operand, parameters) to ensure the source has proper privileges for running the atomic command at the MS of FIG. 75B processing. Depending on embodiments, block 7580 may include evaluating the command for elaborating special terms and/or expressions as described for FIG. 61 (blocks 6140 through 6154), although the preferred embodiment preferably already did that prior to transmitting the command for execution. However, in some embodiments where privileges are only maintained locally, the privilege processing of FIG. 61 would be required at block 7580 to check privileges where appropriate in processing the command. In such embodiments, FIG. 61 would process local actions as disclosed, but would not process actions known to be for remote execution (i.e. Host specification) since a FIG. 75B embodiment would include FIG. 61 processing for performing privilege check processing to determine that sufficient privileges are granted. Thus, depending on the present disclosure embodiment, block 7580 may include little privilege verification, no privilege verification, or may include all applicable action privilege verification discussed already in FIG. 61.

In yet another embodiment, special terms processing of FIG. 61 can be delayed until FIG. 75B processing (e.g. block 7578 continues to a new block 7579 which continues to block 7580). It may be advantageous to have new block 7579 elaborate/evaluate special terms at the MS of FIG. 75B processing in some embodiments. In a further embodiment, a syntax or qualifier can be used to differentiate where to perform special term elaboration/evaluation.

Thereafter, if block 7582 determines the command (Command, Operand, Parameters) for execution is acceptable (and perhaps privileged, or privileged per source, or there was no check necessary), then block 7584 performs the command locally at the MS of FIG. 75B processing. Thereafter, block 7586 checks if a response is needed as a result of command (e.g. Find command) processing at block 7584. If block 7586 determines a response is to be sent back to the originating MS, 7574 completes a response to the originating MS of the data received at block 7556, and block 7576 sends/broadcasts the response, before continuing back to block 7556 for the next incoming execution request data. Block 7576 sends/broadcasts the response containing appropriate command results (using a send interface like interface 1946) by inserting to queue 24 so that send processing transmits data 1302, for example as far as radius 1306. Embodiments will use the different correlation methods already discussed above, to associate a response with a send.

If block 7586 determines a response is not to be sent back to the originating MS, then processing continues directly back to block 7556. If block 7582 determines the data is not acceptable/privileged, then processing continues back to block 7556. For security reasons, it is best not to respond with an error. It is best to ignore inappropriate (e.g. unprivileged, unwarranted) data entirely. In another embodiment, an error may be returned to the sender for appropriate error processing and reporting.

Blocks 7578 through 7584 are presented generically so that specific atomic command descriptions below provide appropriate interpretation and processing. The actual implementation may replace blocks 7578 through 7584 with programming case statement conditional execution for each atomic command supported.

Referring back to block 7562, if it is determined that the data is not valid for the MS of FIG. 75B processing, processing continues back to block 7556. Referring back to block 7558, if a worker thread termination request was found at queue 26, then block 7586 decrements the RxED worker thread count by 1 (using appropriate semaphore access (e.g. RxED-Sem)), and RxED thread processing terminates at block 7588. Block 7586 may also check the RxED-Ct value, and signal the RxED process parent thread that all worker threads are terminated when RxED-Ct equals zero (0).

Block 7576 causes sending/broadcasting data 1302 containing CK 1304, depending on the type of MS, wherein CK 1304 contains ack/response information prepared. In the embodiment wherein usual MS communications data 1302 of the MS is altered to contain CK 1304 for listening MSs in the vicinity, send processing feeding from queue 24, caused by block 7576 processing, will place ack/response information as CK 1304 embedded in usual data 1302 at the next opportune time of sending usual data 1302. As the MS conducts its normal communications, transmitted data 1302 contains new data CK 1304 to be ignored by receiving MS other character 32 processing, but to be found by listening MSs within the vicinity which anticipate presence of CK 1304. Otherwise, when LN-Expanse deployments have not introduced CK 1304 to usual data 1302 communicated on a receivable signal by MSs in the vicinity, FIG. 75B sends/broadcasts new ack/response data 1302.

In an alternate embodiment, remote action and/or atomic command data records contain a sent date/time stamp field of when the data was sent by a remote MS, and a received date/time stamp field (like field 2490*c*) is processed at the MS in FIG. 75B processing. This would enable calculating a TDOA measurement while receiving data (e.g. actions or atomic command) that can then be used for location determination processing as described above.

For other acceptable receive processing, methods are well known to those skilled in the art for "hooking" customized processing into application processing of sought data received, just as discussed with FIG. 44B above (e.g. mail application, callback function API, etc). Thus, there are well known methods for processing data in context of this disclosure for receiving remote actions and/or atomic command data from an originating MS to a receiving MS, for example when using email. Similarly, as described above, SMS messages can be used to communicate data, albeit at smaller data exchange sizes. The sending MS may break up larger portions of data which can be sent as parse-able text to the receiving MS. It may take multiple SMS messages to communicate the data in its entirety.

Regardless of the type of receiving application, those skilled in the art recognize many clever methods for receiving data in context of a MS application which communicates in a peer to peer fashion with another MS (e.g. callback function(s), API interfaces in an appropriate loop which can remain blocked until sought data is received for processing, polling known storage destinations of data received, or other applicable processing). FIGS. 75A and 75B are an embodiment of MS to MS communications, referred to with the acronym MS2MS. Various MS2MS communication embodiments may include: reliable transport protocol involving a plurality of packets (sends and acknowledgements) between systems for a single send; unreliable transport protocol involving a plurality of packets (sends and acknowledgements) between systems for a single send; or on-going communications processing which is subsequent to an initiation send of data between systems (e.g. peer to peer application processing (e.g. MS peer to peer phone call after call initiation (i.e. no service involved))).

FIG. 62 depicts a flowchart for describing a preferred embodiment of a procedure for performing an action corresponding to a configured command, namely an ExecuteAction procedure. Only a small number of commands are illustrated. The procedure starts at block 6202 and continues to block 6204 where parameters of the Command, Operand, and Parameters are accessed (see BNF grammar), depending on an embodiment (e.g. parameters passed by reference or by value). Preferably, FIG. 62 procedure processing is passed parameters by reference (i.e. by address) so they are accessed as needed by FIG. 62 processing. Block 6204 continues to block 6206.

Figure 63A:
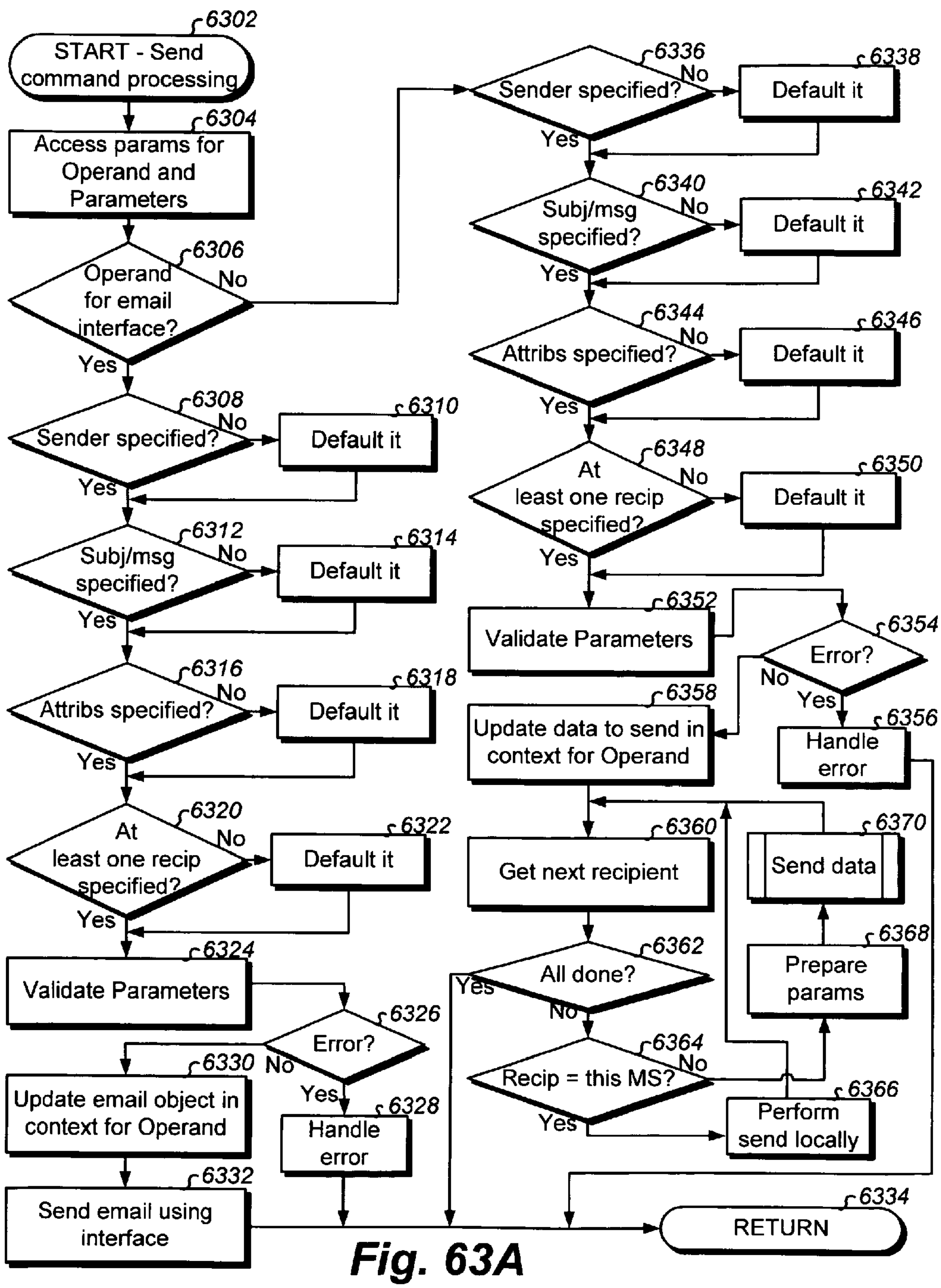
FIG. 63A depicts a flowchart for describing a preferred embodiment of a procedure for Send command action processing.
Figure 64A:
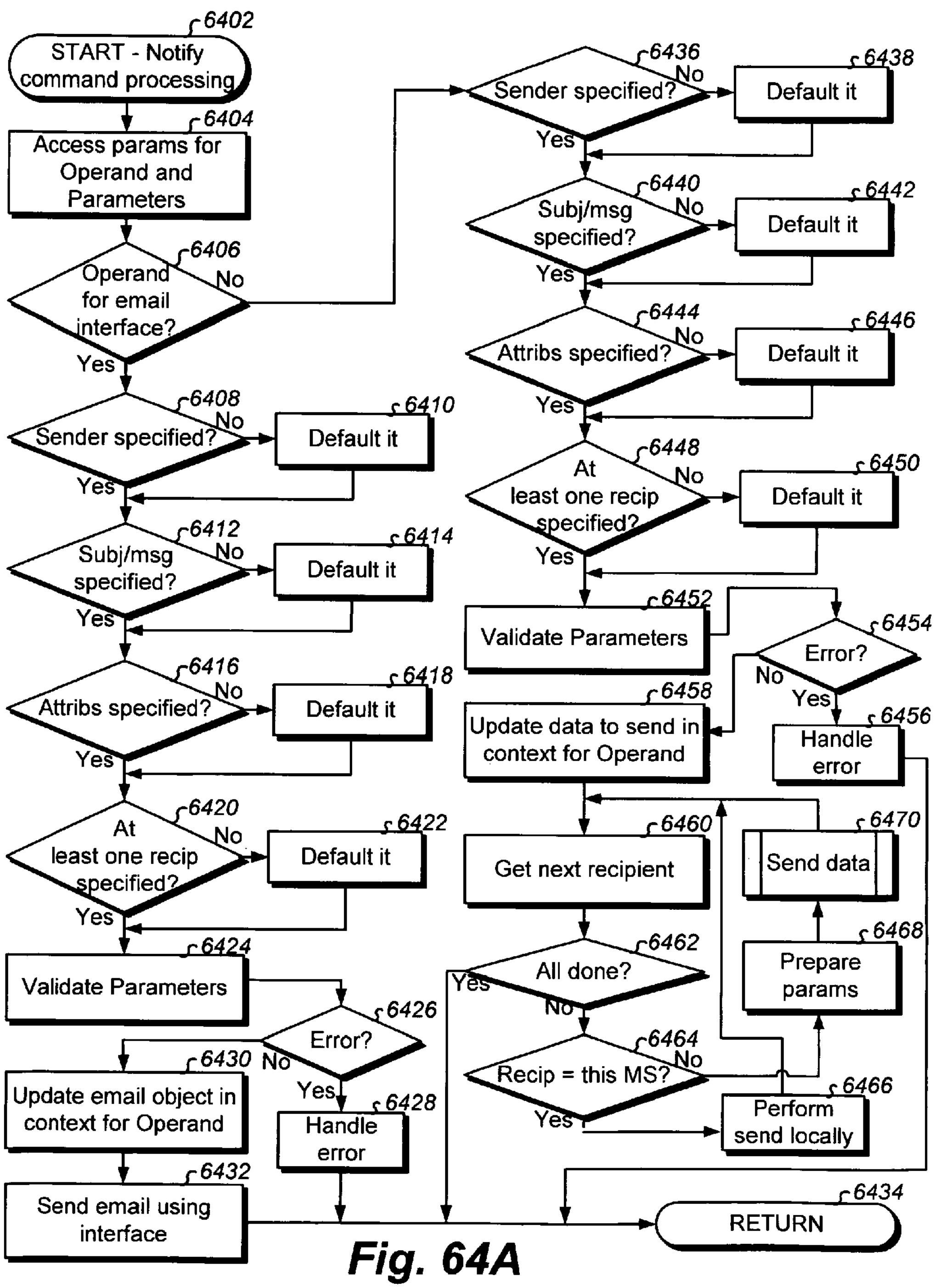
Figure 65A:
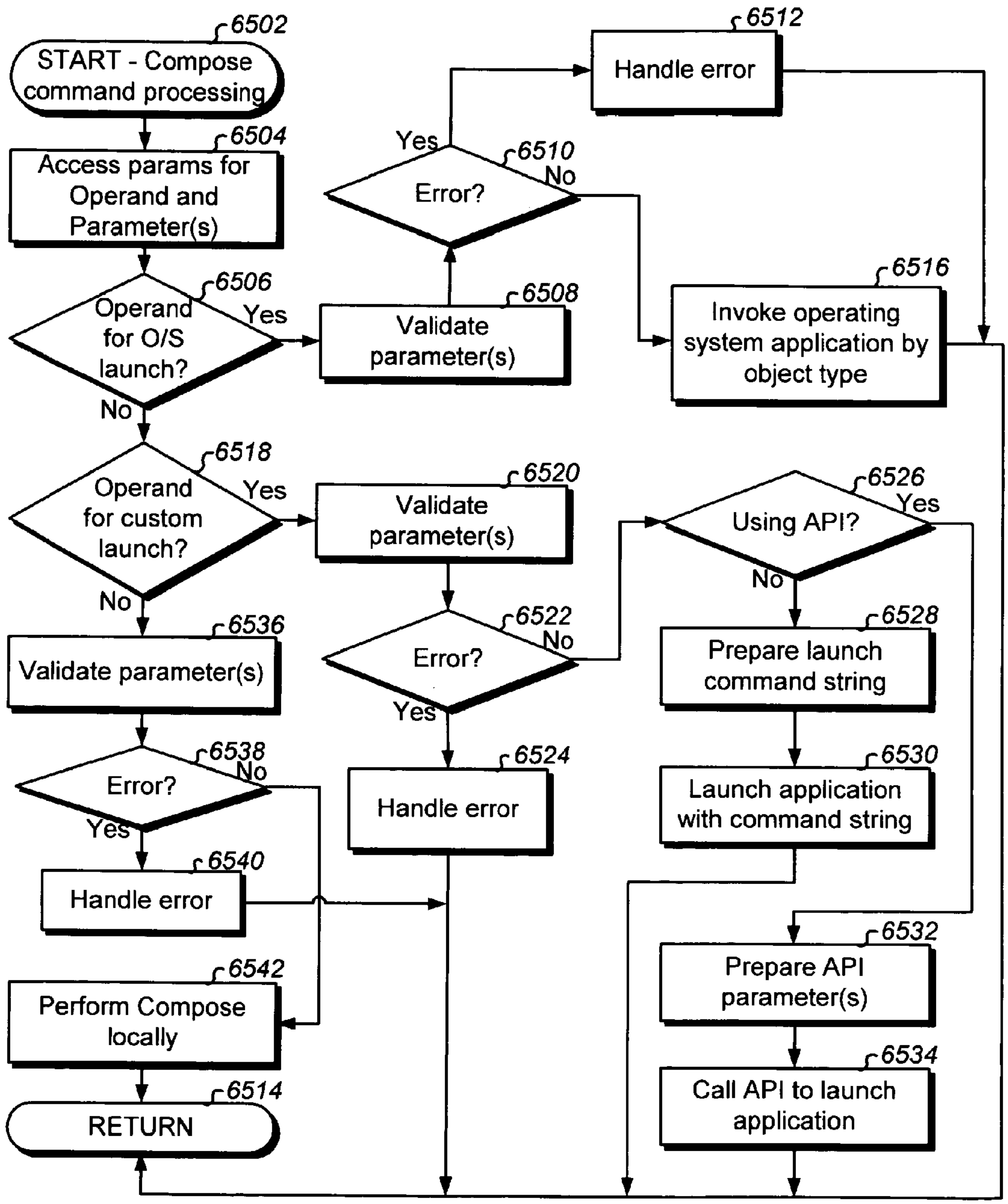
Figure 66A:
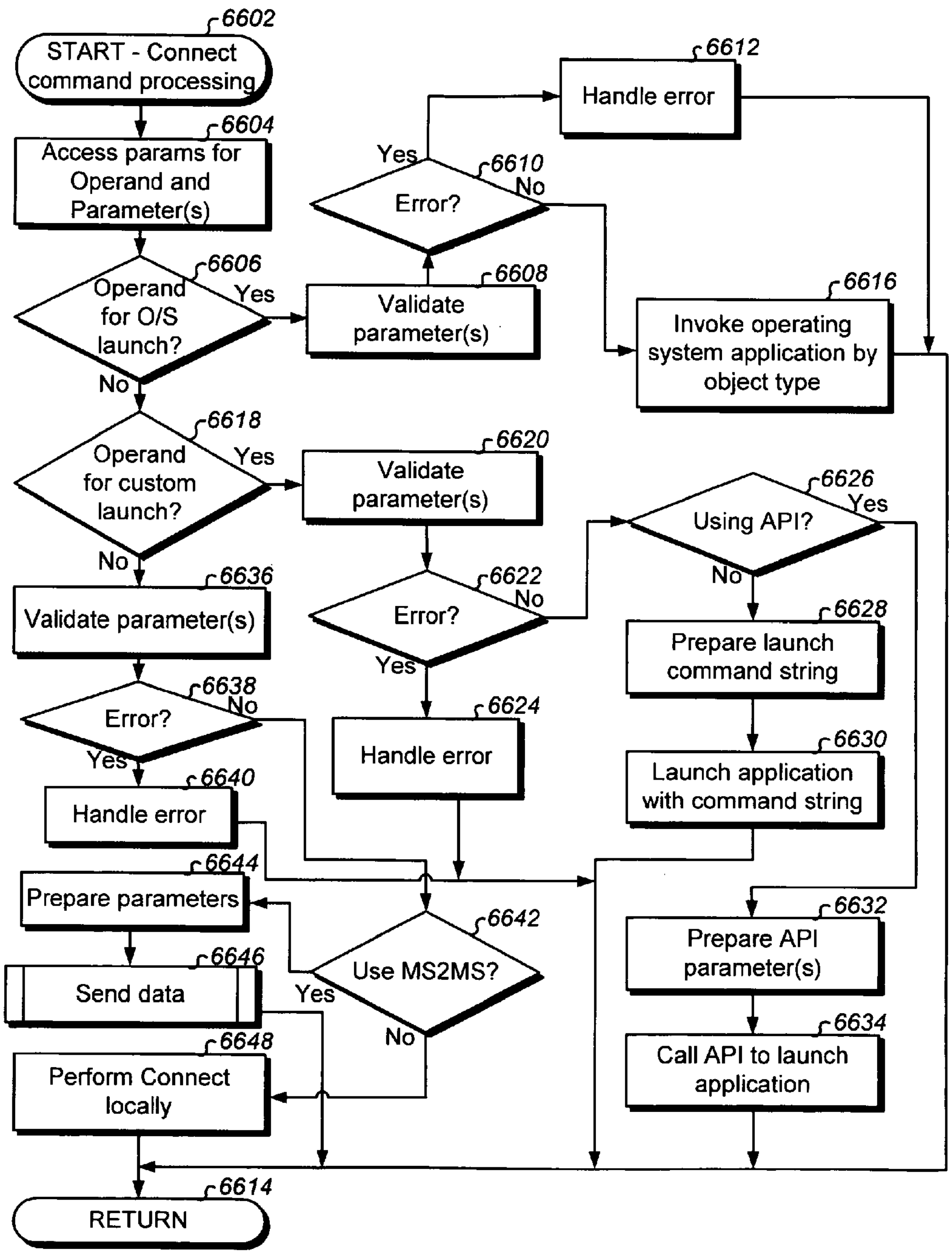
Figure 67A:
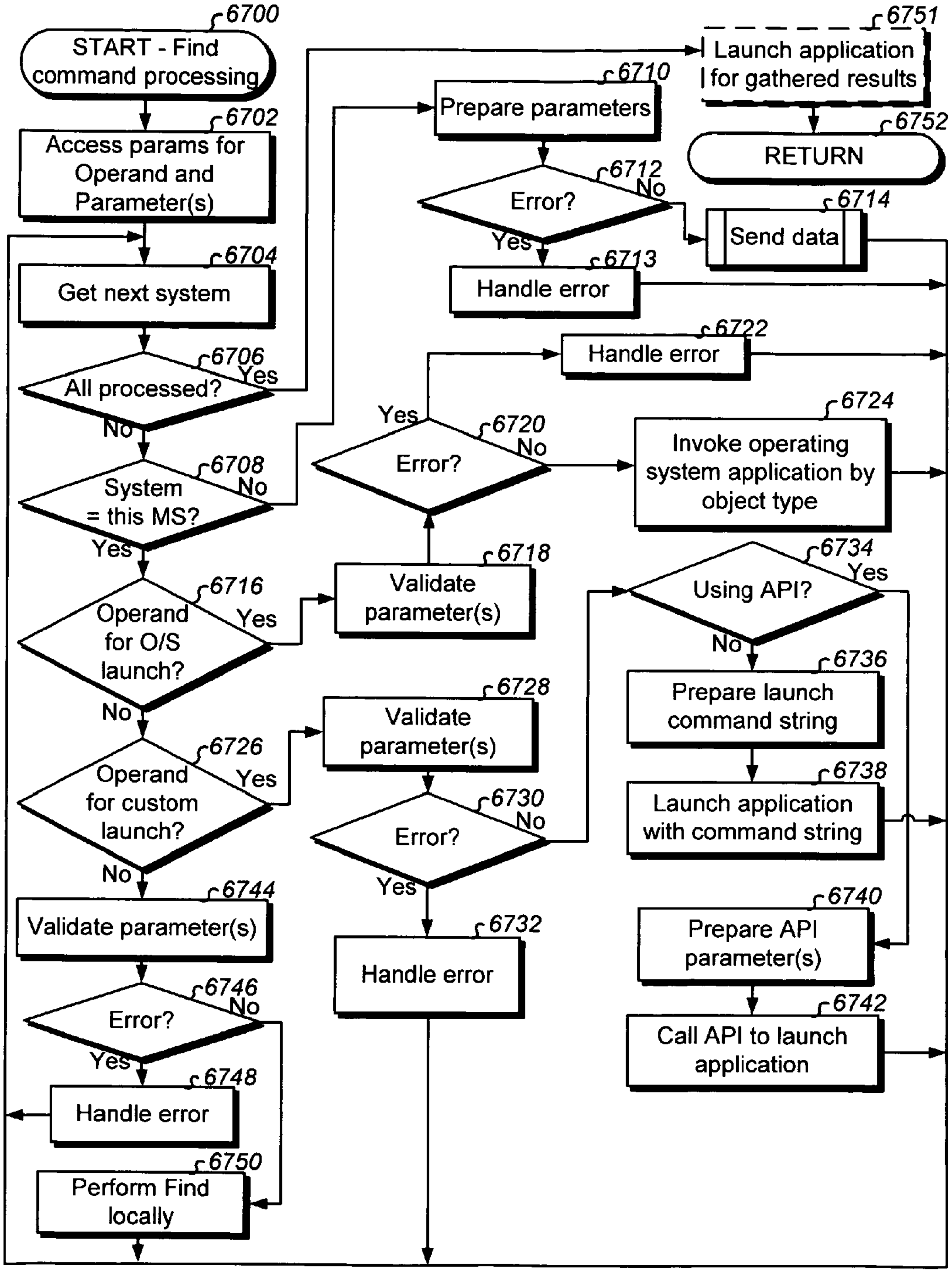

If it is determined at block 6206 that the action atomic command is a send command, then processing continues to block 6208 where the send command action procedure of FIG. 63A is invoked. The send command action procedure is invoked with parameters including the passed parameters of Operand and Parameters discussed for block 6204. Upon return from the send command action procedure, block 6208 continues to block 6256. Block 6256 returns to the calling block of processing (e.g. block 6158) that invoked FIG. 62 processing. If block 6206 determines the action atomic command is not a send command, then processing continues to block 6210. If it is determined at block 6210 that the action atomic command is a notify command, then processing continues to block 6212 where the notify command action procedure of FIG. 64A is invoked. The notify command action procedure is invoked with parameters including the passed parameters of Operand and Parameters discussed for block 6204. Upon return from the notify command action procedure, block 6212 continues to block 6256. If block 6210 determines the action atomic command is not a notify command, then processing continues to block 6214. If it is determined at block 6214 that the action atomic command is a compose command, then processing continues to block 6216 where the compose command action procedure of FIG. 65A is invoked. The compose command action procedure is invoked with parameters including the passed parameters of Operand and Parameters discussed for block 6204. Upon return from the compose command action procedure, block 6216 continues to block 6256. If block 6214 determines the action atomic command is not a compose command, then processing continues to block 6218. If it is determined at block 6218 that the action atomic command is a connect command, then processing continues to block 6220 where the connect command action procedure of FIG. 66A is invoked. The connect command action procedure is invoked with parameters including the passed parameters of Operand and Parameters discussed for block 6204. Upon return from the connect command action procedure, block 6220 continues to block 6256. If block 6218 determines the action atomic command is not a connect command, then processing continues to block 6222. If it is determined at block 6222 that the action atomic command is a find command, then processing continues to block 6224 where the find command action procedure of FIG. 67A is invoked. The find command action procedure is invoked with parameters including the passed parameters of Operand and Parameters discussed for block 6204. Upon return from the find command action procedure, block 6224 continues to block 6256. If block 6222 determines the action atomic command is not a find command, then processing continues to block 6226. If it is determined at block 6226 that the action atomic command is an invoke command, then processing continues to block 6228 where the invoke command action procedure of FIG. 68A is invoked. The invoke command action procedure is invoked with parameters including the passed parameters of Operand and Parameters discussed for block 6204. Upon return from the invoke command action procedure, block 6228 continues to block 6256. If block 6226 determines the action atomic command is not an invoke command, then processing continues to block 6230. If it is determined at block 6230 that the action atomic command is a copy command, then processing continues to block 6232 where the copy command action procedure of FIG. 69A is invoked. The copy command action procedure is invoked with parameters including the passed parameters of Operand and Parameters discussed for block 6204. Upon return from the copy command action procedure, block 6232 continues to block 6256. If block 6230 determines the action atomic command is not a copy command, then processing continues to block 6234. If it is determined at block 6234 that the action atomic command is a discard command, then processing continues to block 6236 where the discard command action procedure of FIG. 70A is invoked. The discard command action procedure is invoked with parameters including the passed parameters of Operand and Parameters discussed for block 6204. Upon return from the discard command action procedure, block 6236 continues to block 6256. If block 6234 determines the action atomic command is not a discard command, then processing continues to block 6238. If it is determined at block 6238 that the action atomic command is a move command, then processing continues to block 6240 where the move command action procedure of FIG. 71A is invoked. The move command action procedure is invoked with parameters including the passed parameters of Operand and Parameters discussed for block 6204. Upon return from the move command action procedure, block 6240 continues to block 6256. If block 6238 determines the action atomic command is not a move command, then processing continues to block 6242. If it is determined at block 6242 that the action atomic command is a store command, then processing continues to block 6244 where the store command action procedure of FIG. 72A is invoked. The store command action procedure is invoked with parameters including the passed parameters of Operand and Parameters discussed for block 6204. Upon return from the store command action procedure, block 6244 continues to block 6256. If block 6242 determines the action atomic command is not a store command, then processing continues to block 6246. If it is determined at block 6246 that the action atomic command is an administrate command, then processing continues to block 6248 where the administrate command action procedure of FIG. 73A is invoked. The administrate command action procedure is invoked with parameters including the passed parameters of Operand and Parameters discussed for block 6204. Upon return from the administrate command action procedure, block 6248 continues to block 6256. If block 6246 determines the action atomic command is not an administrate command, then processing continues to block 6250. If it is determined at block 6250 that the action atomic command is a change command, then processing continues to block 6252 where the change command action procedure of FIG. 74A is invoked. The change command action procedure is invoked with parameters including the passed parameters of Operand and Parameters discussed for block 6204. Upon return from the change command action procedure, block 6252 continues to block 6256. If block 6250 determines the action atomic command is not a change command, then processing continues to block 6254 for handling other supported action atomic commands on the MS. There are many commands that can be implemented on a MS. Block 6254 continues to block 6256 for processing as already described. FIGS. 60 through 62 describe action processing for recognized events to process WDRs.

Application Term Triggers

In-process WDRs (e.g. inbound, outbound, in process for a particular reason, etc) provide processing paths for triggering charter processing. It may be desirable to additionally provide charter processing which is triggered by changes to particular AppTerm(s). For example, as a MS application changes a processing state (e.g. as in "finite state machine") for any reason, that processing state can be reflected in changing at least one AppTerm. When that AppTerm is changed, the change itself can cause related charter processing. This provides a more rich method for automatically processing conditions at a MS.

With reference back to FIG. 53, AppTerm trigger(s) field 5300*m* contains one or more AppTerm trigger records (or pointers/join-to thereof), each record for causing automated charter processing based on a change in the AppTerm. In some embodiments, field 5300*m* provides a joining identifier to another table for joining a plurality of rows containing trigger records associated to the record 5300. An AppTerm trigger record contains:

a. AppTerm reference name found in field 5300*g*. No AppTerm can appear in field 5300*m* without also being in field 5300*g;* b. An optional charter directive specification may be specified of "I", "O", "APP", "<name>", or "CB" wherein "I" indicates to process inbound WDR related charters (i.e. _I_. . . ), "O" indicates to process outbound WDR related charters (i.e. _O_. . . ), "APP" indicates to process AppTerm section charters (see below), "<name>" indicates to process named section charters (see below), and "CB" indicates to invoke the specified function interface (e.g. callback or DLL function) with applicable and appropriately resolvable parameters. Absence of a charter directive specification indicates to process in-process WDR related charters (i.e. _ . . . );

c. An optional AppTerm condition may be specified for the AppTerm, for example wrt a value: x="some string", x>=5, x in [3, 340], etc. Any expression (see BNF grammar 3068*a* Expression) can be specified for the AppTerm condition, preferably involving the AppTerm and appropriately accessible terms. The AppTerm condition must evaluate to a True of False. True causes the directed charter(s) to be processed. False causes no charter(s) to be processed for the changed AppTerm. Of course, any charter conditions including resolvable specifications apply for the charters processed anyway.

AppTerm trigger specifications should be used carefully because the same charters configured for handling WDR processing events may be processed as though a WDR triggered the charter processing event. One preferred embodiment substitutes the most recent applicable WDR fields for referenced fields (ref, _I_ref, _O_ref) in charter expressions. Another embodiment ignores all charters with expressions which reference an in-process (ref, _I_ref, _O_ref) WDR field. In either embodiment, a user must consider if this is desirable, either by reviewing charters, reviewing permissions that provide charter processing to others, crafting new charters, or combinations thereof. Appropriate privileges (permission 10) are provided for governing every aspect of AppTerm trigger processing and all permission descriptions heretofore do apply.

AppTerm triggered charters are executed locally and permissible charter actions can be executed locally or remotely as already discussed, however another charter directive embodiment may be used. One embodiment of a charter directive includes a specification of "$MS\_ID_1$, $MS\_ID_2$, . . . , $MS\_ID_n$" such that "n" is the number of MSs for where to process charters wherein potential execution-hosting MSs include the local MS and any number of privilege providing remote MSs. The local MS_ID can alternatively be specified with a keyword "THISMS". The charter directive will cause charters to be processed as though an in-process WDR was received at each specified MS. An optional directive qualifier of "I", "O", "APP", "<name>", or "CB" may also be specified with similar processing at the particular MS(s). Remote processing is already described in detail.

When the APP directive qualifier "APP" is used, a charter section identified with the associated prefix field 5300*a* is processed. This charter section is only processed for AppTerm trigger specifications, and never processed for in-process WDRs. Consequently, references are not made to in-process WDR fields (i.e. ref, _I_ref, _O_ref), however any other BNF grammar charter expression specification may be made (e.g. atomic term WDR reference (i.e. \ref)). In an alternate embodiment, references are supported to an in-process WDR for the fields of the most recent in-process WDR which applies. When the APP directive qualifier "<name>" is used, a charter section identified with the associated explicit <name> is processed. This charter section is only processed for AppTerm trigger specifications, and never processed for in-process WDRs. Consequently, references are not made to in-process WDR fields (i.e. ref, _I_ref, _O_ref), however any other BNF grammar charter expression specification may be made (e.g. atomic term WDR reference (i.e. \ref)). Similarly, in an alternate embodiment, references are supported to an in-process WDR for the fields of the most recent in-process WDR which applies. The "APP" specification provides a charter section for processing all AppTerm variables for a PRR. The "<name>" specification provides a special named charter section for processing specific AppTerm variables of a PRR. Charter embodiments and processing thereof heretofore described also applies for AppTerm trigger processing charters, albeit with embodiment modifications made in light of discussions (e.g. new charter type field 3700*t* (e.g. main, AppTerm, named (an actual name in the field other than indicator for main and AppTerm)). Below is a syntactical example to facilitate understanding. Note the use of scoped (i.e. curly braced) sections which are referenced. These sections are not executed by in-process WDR charter processing.

```
Charters {
...
    B_{
        ...
        ("harrow" ^ B_srchSubj):
            Notify Weblink
                "http://www.dfwfarms.com/
                harrows.xls",,,target="_blank";
        ...
    };
...
    doitHere {
        ...
        ( ):     Invoke App alertme.cmd (\thisAppTerm);
        ...
    };
...
}
("harrow" ^ B_srchSubj):
    Notify
    Weblink "http://www.dfwfarms.com/harrows.xls",,,target="_blank";
```

The "B_" charter section indicates that any AppTerm (all AppTerms) modified for the application described by the PRR with a prefix field 5300*a* is to execute the applicable B_ section charters. Here is a useful example where the MS user is searching for farm harrows. The user has collected previous research into a spreadsheet harrows.xls. The prefix "B_" happens to be contained in a field 5300*a* for the MS browser application so that every time the user enters a search criteria into the MS browser, not only does the MS search for the text entered to the text entry field of the browser (i.e. maintained to AppTerm srchSubj variable), but the srchSubj variable being modified causes this charter to execute. This charter invokes (opens) the spreadsheet local to the MS so the user can have the spreadsheet automatically available for edit upon browsing for harrows. There may be a plurality of charter specifications in the AppTerm section.

( ): Invoke App alertme.cmd \thisAppTerm;

An AppTerm named section "doitHere" is specified wherein charters are executed whenever an AppTerm referencing the named section is modified, or when the optional AppTerm condition specified results to true. Here is a valid null charter expression for unconditionally executing the atomic invoke command action. A new atomic term \thisAppTerm is introduced which is valid only within the context of AppTerm charter sections. The \thisAppTerm atomic term evaluated to the AppTerm variable name which caused execution of the AppTerm charter section. So, if an entered change to the srchSubj AppTerm was made in the browser application, and the AppTerm trigger specification used a named "doitHere" charter directive, then the same AppTerm example above which caused the "B_" section to execute would additionally cause the "doitHere" section to be processed. The alertme.cmd file would be invoked with "B_srchSubj" as a parameter.

This example shows that the "APP" section charter specifications can be a catch all for any applicable PRR AppTerm for that application. Named sections enable singling out certain AppTerm processing for unique charter processing. In a preferred embodiment, a specified "APP" section redundantly handles named section processing for the same AppTerm in a PRR 5300. Charters are configured accordingly. In an alternate embodiment, a named section overrides an "APP" section for AppTerm trigger charter processing so that only one charter section is processed for an AppTerm meeting criteria of either section.

When the callback directive qualifier "CB" is used, the applicable executable interface is invoked for processing with parameters that may be specified. Any expressions, terms, variables, etc supported in AppTerm conditions are also supported as parameters to the callback interface. The interface may be a well known name to a linked executable or a name which is dynamically linked as needed. Any processing may occur within the callback interface.

In another embodiment, AppTerm trigger sections may be executed at remote MSs based on consistent referenced AppTerm trigger sections across a plurality of MSs. Applicable permissions govern the ability to perform remote AppTerm trigger charter processing. In another embodiment, fields 5300*j* and 5300*k* may define assignable permissions which are only relevant within the context of a particular application. When two or more MSs have the same application, privileges are granted as heretofore described because the privileges can be universally known. Another embodiment supports defining new privileges via a PRR field 5300*j* as long as codes used do not intersect with a universal privilege code. These new privileges can then be configured by cooperating users at interoperating MSs for desired permissible functionality using permission embodiments heretofore described. Yet another embodiment supports broadcasting new PRR privileges defined to willing (or privilege providing) MSs for making other users aware of their use. Such new privileges can be explicitly assigned to charter processing so that privilege semantics need not be incorporated in MS processing logic. For example:

\33005::( ): Invoke App alertme.cmd \thisAppTerm;

qualifies the charter for only executing it if the privilege code \32005 (e.g. in embodiment where any code greater than 33000 is a user specified privilege) has been granted for charter execution by the MS causing the execution and the MS hosting the execution. In fact, this special privilege qualification may be used in any charters with universally known privilege codes, or user defined privilege codes. For example:

\lbxall::( ): Invoke App alertme.cmd \thisAppTerm;

With reference now to FIGS. 55A and 55B, the additional AppTerm trigger records and fields of the PRR are appropriately handled in FIG. 55A, and FIG. 55B includes AppTerm trigger processing. Block 5556 additionally accesses AppTerm trigger information of the application's associated PRR. Thereafter, if block 5558 determines the PRR exists and at least one of the data item(s) for modification are described by field 5300*g*, block 5560 updates the applicable data item(s) described by field 5300*g* appropriately as requested by the application invoking FIG. 55B processing. Thereafter, a block 5566 checks if the PRR contains an AppTerm trigger for any of the AppTerm variables of field 5300*g* which have been updated. If block 5566 determines one or more AppTerm triggers are applicable, then a block 5568 processes applicable AppTerm charter sections and/or callback interfaces for each AppTerm that was updated which has an associated trigger defined as described above. Processing continues from block 5568 to block 5562. If block 5566 determines there is no AppTerm trigger configured for the AppTerm modified, then processing continues to block 5562. Block 5568 ensures applicable AppTerm charter sections are processed as described above. In an alternate embodiment, the semaphore resource is released as soon as possible to prevent preempting critical MS processing, for example by spawning an asynchronous charter processing thread for FIFO processing at block 5568 so block 5562 can be performed immediately. There are a various synchronization schemes that can be deployed for desired multi-threaded charter processing. AppTerm accesses in processed charters may use the same semaphore lock control used in FIG. 55B, or as described in fields 5300*l* which may alternatively be used by FIG. 55B processing.

There are many AppTerm trigger examples for unique charter processing. An AppTerm variable can be set with a value, and subsequently cause the event for automated charter execution. The charter can access the AppTerm variable along with other data discussed for novel conditions and associated action processing, for example:

- Caller id for call placed to the MS, or made from the MS, is placed into an AppTerm upon call activation;
- Email recipient, sender, subject, etc for email item received or just sent is placed into an AppTerm upon being sent/received;
- Attendees, subject, scheduled date/time, etc for a calendar item just accepted, created, or received at a MS, is placed into an AppTerm;
- Search criteria specified for a search at the MS is placed into an AppTerm upon the search being requested by the user;
- Document source, name, or other attribute(s) of a document accessed by the MS user is placed into an AppTerm;
- Source, title, star name(s), etc of a video broadcast or movie played at the MS is placed into suitable AppTerm variables upon play of the video at the MS; and/or
- Any variable for any application for any reason can be set for causing a charter trigger, and for being used in combination with other conditions using special terms already described.

FIGS. 63A through 74C document a MS toolbox of useful actions. FIGS. 63A through 74C are in no way intended to limit LBX functionality with a limited set of actions, but rather to demonstrate a starting list of tools. New atomic commands and operands can be implemented with contextual "plug-in" processing code, API plug-in processing code, command line invoked plug-in processing code, local data processing system (e.g. MS) processing code, MS2MS plug-in processing code, or other processing, all of which are described below. The "know how" of atomic commands is preferably isolated for a variety of "plug-in" processing. The charter and privilege platform is designed for isolating the complexities of privileged actions to "plug-in" methods of new code (e.g. for commands and/or operands) wherever possible.

Together with processing disclosed above, provided is a user friendly development platform for quickly building LBX applications wherein the platform enables conveniently enabled LBX application interoperability and processing, including synchronized processing, across a plurality of MSs. Some commands involve a plurality of MSs and/or data processing systems. Others don't explicitly support a plurality of MSs and data processing systems, however that is easily accomplished for every command since a single charter expression can cause a plurality of actions anyway. For example, if a command does not support a plurality of MSs in a single command action, the plurality of MSs is supported with that command through specifying a plurality of identical command actions in the charter configuration for each desired MS. Actions provided in this LBX release enable a rich set of LBX features and functionality for:

- Desired local MS LBX processing;
- Desired peer MS LBX processing relative permissions provided; and
- Desired MS LBX processing from a global perspective of a plurality of MSs. MS operating system resources of memory, storage, semaphores, and applications and application data is made accessible to other MSs as governed by permissions. Thus, a single MS can become a synchronization point for any plurality of MSs, and synchronized processing can be achieved across a plurality of independently operating MSs.

There are many different types of actions, commands, operands, parameters, etc that are envisioned, but embodiments share at least the following fundamental characteristics:

1) Syntax is governed by the LBX BNF grammar;
2) Command is a verb for performing an action (i.e. atomic command);
3) Operand is an object which provides what is acted upon by the Command—e.g. brings context of how to process Command (i.e. atomic operand); and
4) Parameters are anticipated by a combination of Command and Operand. Each parameter can be a constant, of any data type, or a resulting evaluation of any arithmetic or semantic expression, which may include atomic terms, WDRTerms, AppTerms, atomic operators, etc (see BNF grammar). Parameter order, syntax, semantics, and variances of specification(s) are anticipated by processing code. Obvious error handling is incorporated in action processing.

Syntax and reasonable validation should be performed at the time of configuration, although it is preferable to check for errors at run time of actions as well. Various embodiments may or may not validate at configuration time, and may or may not validate at action processing time. Validation should be performed at least once to prevent run time errors from occurring. Obvious error handling is assumed present when processing commands, such error handling preferably including the logging of the error to LBX History 30 and/or notifying the user of the error with, or without, request for the user to acknowledge the reporting of error.

FIGS. 63A through 74C are organized for presenting three (3) parts to describing atomic commands (e.g. 63A, 63B (e.g. 63B-1 through 63B-7), 63C):

#A=describes preferred embodiment of command action processing;

#B=describes LBX command processing for some operands; and

#C=describes one embodiment of command action processing.

Some of the #A figures highlight diversity for showing different methods of command processing while highlighting that some of the methods are interchangeable for commands (e.g. Copy and Discard processing). Also the terminology "application" and "executable" are used interchangeably to represent an entity of processing which can be started, terminated, and have processing results. Applications (i.e. executables) can be started as a contextual launch, custom launch through an API or command line, or other launch method of an executable for processing.

Atomic command descriptions are to be interpreted in the broadest sense, and some guidelines when reading the descriptions include:

1) Any action (Command, Operand, Parameters) can include an additional parameter, or use an existing parameter if appropriate (e.g. attributes) to warn an affected user that the action is pending (i.e. about to occur). The warning provides the user with informative information about the action and then waits for the user to optionally accept (confirm) the action for processing, or cancel it;
2) In alternate embodiments, an email or similar messaging layer may be used as a transport for conveying and processing actions between systems. As disclosed above, characteristic(s) of the transported distribution will distinguish it from other distributions for processing uniquely at the receiving system(s);
3) Identities (e.g. sender, recipient, source, system, etc) which are targeted data processing systems for processing are described as MSs, but can be a data processing system other than a MS in some contexts provided the identified system has processing as disclosed;
4) Obvious error handling is assumed and avoided in the descriptions.

The reader should cross reference/compare operand descriptions in the #B matrices for each command to appreciate full exploitation of the Operand, options, and intended embodiments since descriptions assume information found in other commands is relevant across commands. Some operand description information may have been omitted from a command matrix to prevent obvious duplication of information already described for the same operand in another command.

FIG. 63A depicts a flowchart for describing a preferred embodiment of a procedure for Send command action processing. There are three (3) primary methodologies for carrying out send command processing:

1) Using email or similar messaging layer as a transport layer;
2) Using a MS to MS communications (MS2MS) of FIGS. 75A and 75B; or
3) Processing the send command locally.

In various embodiments, any of the send command Operands can be implemented with either one of the methodologies, although there may be a preference of which methodology is used for which Operand. Atomic send command processing begins at block 6302, continues to block 6304 for accessing parameters of send command "Operand" (BNF Grammar Operand) and "Parameters" (BNF Grammar Parameters), and then to block 6306 for checking which "Operand" was passed. If block 6306 determines the "Operand" indicates to use email as the mechanism for performing the send command, then block 6308 checks if a sender parameter was specified. If block 6308 determines a sender was specified, processing continues to block 6312, otherwise block 6310 defaults one (e.g. valid email address for this MS) and then processing continues to block 6312. Block 6312 checks if a subject parameter was specified. If block 6312 determines a subject was specified, processing continues to block 6316, otherwise block 6314 defaults one (e.g. subject line may be used to indicate to email receive processing that this is a special email for performing atomic command (e.g. send command) processing), and then processing continues to block 6316. Block 6314 may specify a null email subject line. Block 6316 checks if an attributes parameter was specified. If block 6316 determines attributes were specified, processing continues to block 6320, otherwise block 6318 defaults attributes (e.g. confirmation of delivery, high priority, any email Document Interchange Architecture (DIA) attributes or profile specifications, etc) and then processing continues to block 6320. The terminology "attributes", for example as associated to an electronic distribution (e.g. email, SMS message, etc) refers to DIA attributes or other descriptive data associated to the distribution. Block 6318 may use email attributes to indicate that this is a special email for send command processing while using the underlying email transport to handle the delivery of information. Block 6320 checks if at least one recipient parameter was specified. If block 6320 determines at least one recipient was specified, processing continues to block 6324, otherwise block 6322 defaults one (e.g. valid email address for this MS) and then processing continues to block 6324. Block 6322 may specify a null recipient list so as to cause an error in later processing (detected at block 6324).

Block 6324 validates "Parameters", some of which may have been defaulted in previous blocks (6310, 6314, 6318 and 6322), and continues to block 6326. If bock 6326 determines there is an error in "Parameters", then block 6328 handles the error appropriately (e.g. log error to LBX History 30 and/or notify user) and processing returns to the caller (invoker) at block 6334. If block 6326 determines that "Parameters" are in good order for using the email transport, then block 6330 updates an email object in context for the send command "Operand" and "Parameters", block 6332 uses a send email interface to send the email, and block 6334 returns to the caller (e.g. block 6208). Block 6330 can use the attributes parameter to affect how "Parameters" is to be interpreted. The attributes parameter may be modified, and can be used by any processes which receive the sent distribution. Those skilled in the art know well known email send interfaces (e.g. APIs) depending on a software development environment. The email interface used at block 6332 will be one suitable for the underlying operating system and available development environments, for example, a standardized SMTP interface. In a C# environment, an SMTP email interface example is:

```
...
SmtpClient smtpCl = new SmtpClient(SMTP_SERVER_NAME);
...
smtpCl.UseDefaultCredentials = true;
...
MailMessage objMsg;
...
objMsg = new MailMessage(fromAddr, toAddr, subjLn, emailBod);
...
smtpCl.Send(objMsg);
objMsg.Dispose( );
...
```

Those skilled in the art recognize other interfaces of similar messaging capability for carrying out the transport of an action (e.g. Send command). Email is a preferred embodiment. While there are Send command embodiments that make using an existing transport layer (e.g. email) more suitable than not, even the most customized Send command Operands can use email (instead of MS2MS) by implementing one or more recognizable signature(s), indication(s), or the like, of/in the email distribution to be used for informing a receiving email system to treat the email uniquely for carrying out the present disclosure. Depending on the embodiment, integrated processing code is maintained/built as part of the email system, or processing code is "plugged" ("hooked") into an existing email system in an isolated third party manner. Regardless, the email system receiving the present disclosure email will identify the email as being one for special processing. Then, email contents is parsed out and processed according to what has been requested.

In embodiments where Send command Operands are more attractively implemented using an existing transport layer (e.g. email), those send commands can also be sent with MS2MS encoded in data packet(s) that are appropriate for processing.

Referring back to block 6306, if it is determined that the "Operand" indicates to not use an email transport (e.g. use a MS2MS transport for performing the send command, or send command is to be processed locally), then block 6336 checks if a sender parameter was specified. If block 6336 determines a sender was specified, processing continues to block 6340, otherwise block 6338 defaults one (e.g. valid MS ID) and then processing continues to block 6340. Block 6340 checks if a subject message parameter was specified. If block 6340 determines a subject message was specified, processing continues to block 6344, otherwise block 6342 defaults one, and then processing continues to block 6344. Block 6342 may specify a null message. Block 6344 checks if an attributes parameter was specified. If block 6344 determines attributes were specified, processing continues to block 6348, otherwise block 6346 defaults attributes (e.g. confirmation of delivery, high priority, etc) and then processing continues to block 6348. Block 6348 checks if at least one recipient parameter was specified. If block 6348 determines at least one recipient was specified, processing continues to block 6352, otherwise block 6350 defaults one (e.g. valid ID for this MS) and then processing continues to block 6352. Block 6350 may specify a null recipient list so as to cause an error in later processing (detected at block 6352).

Block 6352 validates "Parameters", some of which may have been defaulted in previous blocks (6338, 6342, 6346 and 6350), and continues to block 6354. If bock 6354 determines there is an error in "Parameters", then block 6356 handles the error appropriately (e.g. log error to LBX History and/or notify user) and processing returns to the caller (invoker) at block 6334. If block 6354 determines that "Parameters" are in good order, then block 6358 updates a data object in context for the send command "Operand" and "Parameters", and block 6360 begins a loop for delivering the data object to each recipient. Block 6360 gets the next (or first) recipient from the recipient list and processing continues to block 6362.

If block 6362 determines that all recipients have been processed, then processing returns to the caller at block 6334, otherwise block 6364 checks the recipient to see if it matches the ID of the MS of FIG. 63A processing (i.e. this MS). If block 6364 determines the recipient matches this MS, then block 6366 (see FIG. 63B discussions) performs the atomic send command locally and processing continues back to block 6360 for the next recipient. If block 6364 determines the recipient is an other MS, block 6368 prepares parameters for FIG. 75A processing, and block 6370 invokes the procedure of FIG. 75A for sending the data (send command, operand and parameters) to the other MS. Processing then continues back to block 6360 for the next recipient. Blocks 6366, 6368, and 7584 can use the attributes parameter to affect how "Parameters" is to be interpreted. The attributes parameter may be modified, and can be used by any processes which receive the send result.

MS2MS processing is as already described above (see FIGS. 75A and 75B), except FIG. 75A performs sending data for the send command to a remote MS, and FIG. 75B blocks 7578 through 7584 carry out processing specifically for the send command. Block 7584 processes the send command locally (like block 6366—see FIG. 63A).

In FIG. 63A, "Parameters" for the atomic send command in accordance with the "Operand" were shown to be validated for being properly privileged prior to FIG. 63A processing (by FIG. 61 processing). However, an alternate embodiment could move some or all applicable privilege validation to FIG. 63A in context of where the "Parameters" are processed. Also, some embodiments may not validate "Parameters" since they (or some reasonable subset thereof) can be understood to be in good order by the time FIG. 63A processing occurs (e.g. no blocks 6308 through 6328 and/or 6336 through 6356 required). In yet another embodiment, no defaulting or some defaulting of parameters is implemented. In some embodiments, any subset of send commands will utilize email distributions for processing between MSs. In other embodiments, any subset of send commands will utilize FIGS. 75A and 75B for processing between MSs. Operations of the send command can be carried out regardless of the transport that is actually used to perform the send command.

FIGS. 63B-1 through 63B-7 depicts a matrix describing how to process some varieties of the Send command (e.g. as processed at blocks 6366 and 7584). Each row in the matrix describes processing apparatus and/or methods for carrying out command processing for certain operands (see FIG. 34D for the Operand which matches the number in the first column). The second column shows the Preferred Methodology (PM) for carrying out Send command processing:

E=Email transport preferably used (blocks 6308 through 6332);

O=Other processing (MS2MS or local) used (blocks 6336 through 6370).

Any of the Send command operand combinations can be carried out with either of the methodologies. The second column shows a preferred methodology (PM). The third column describes processing which is placed into flowchart embodiments. There are many embodiments derived from the Send processing descriptions without departing from the spirit and scope of the disclosure. Descriptions are self explanatory.

With reference back to FIGS. 31A through 31E, note that the column of information is headed by "101" represents the parameters applicable for the Send command. The Send command has the following parameters, all of which are interpreted in context of the Operand:

first parameter(s)=These are required, and are in context of the Operand;

sender=The sender of the Send command, typically tied to the originating identity of the action (e.g. email address or MS ID). A different sender can be specified if there is an applicable privilege in place, or if impersonation has been granted;

msg/subj=A message or subject associated with Send command;

attributes=Indicators for more detailed interpretation of Send command parameters and/or indicators for attributes to be interpreted by external (e.g. receiving) processes affected by the Send command result (e.g. handled appropriately by block 7584 or receiving email system);

recipient(s)=One or more destination identities for the Send command (e.g. email address or MS ID).

Figure 63C:
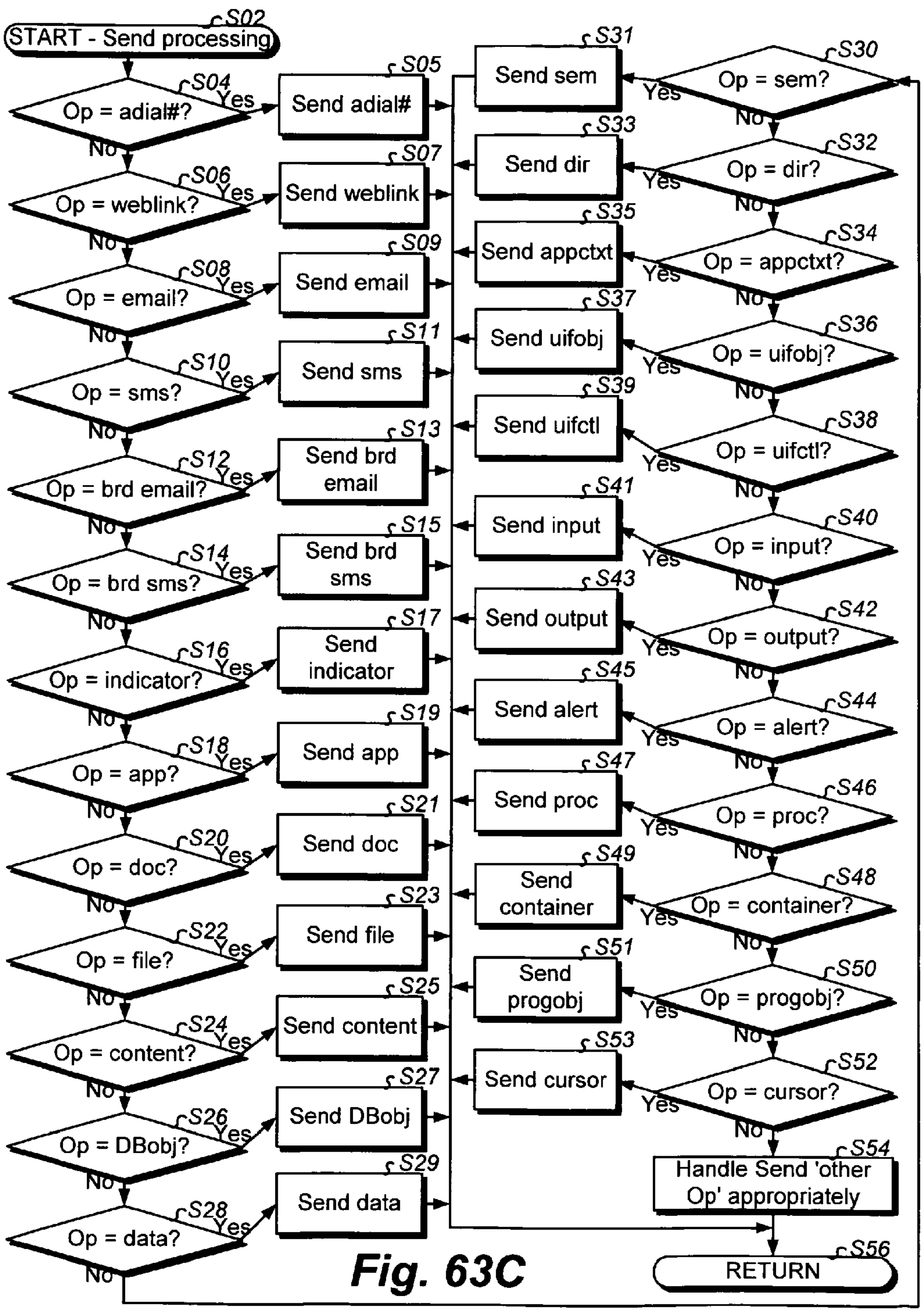
FIG. 63C depicts a flowchart for describing one embodiment of a procedure for Send command action processing, as derived from the processing of FIG. 63A.

FIG. 63C depicts a flowchart for describing one embodiment of a procedure for Send command action processing, as derived from the processing of FIG. 63A. All operands are implemented, and each of blocks S04 through S54 can be implemented with any one of the methodologies described with FIG. 63A, or any one of a blend of methodologies implemented by FIG. 63C.

FIG. 64A depicts a flowchart for describing a preferred embodiment of a procedure for Notify command action processing. The Alert command and Notify command provide identical processing. There are three (3) primary methodologies for carrying out notify command processing:

1) Using email or similar messaging layer as a transport layer;
2) Using a MS to MS communications (MS2MS) of FIGS. 75A and 75B; or
3) Processing the notify command locally.

In various embodiments, any of the notify command Operands can be implemented with either one of the methodologies, although there may be a preference of which methodology is used for which Operand. Atomic notify command processing begins at block 6402, continues to block 6404 for accessing parameters of notify command "Operand" (BNF Grammar Operand) and "Parameters" (BNF Grammar Parameters), and then to block 6406 for checking which "Operand" was passed. If block 6406 determines the "Operand" indicates to use email as the mechanism for performing the notify command, then block 6408 checks if a sender parameter was specified. If block 6408 determines a sender was specified, processing continues to block 6412, otherwise block 6410 defaults one (e.g. valid email address for this MS) and then processing continues to block 6412. Block 6412 checks if a subject parameter was specified. If block 6412 determines a subject was specified, processing continues to block 6416, otherwise block 6414 defaults one (e.g. subject line may be used to indicate to email receive processing that this is a special email for performing atomic command (e.g. notify command) processing), and then processing continues to block 6416. Block 6414 may specify a null email subject line. Block 6416 checks if an attributes parameter was specified. If block 6416 determines attributes were specified, processing continues to block 6420, otherwise block 6418 defaults attributes (e.g. confirmation of delivery, high priority, any email DIA attributes or profile specifications, etc) and then processing continues to block 6420. Block 6418 may use email attributes to indicate that this is a special email for notify command processing while using the underlying email transport to handle the delivery of information. Block 6420 checks if at least one recipient parameter was specified. If block 6420 determines at least one recipient was specified, processing continues to block 6424, otherwise block 6422 defaults one (e.g. valid email address for this MS) and then processing continues to block 6424. Block 6422 may specify a null recipient list so as to cause an error in later processing (detected at block 6424).

Block 6424 validates "Parameters", some of which may have been defaulted in previous blocks (6410, 6414, 6418 and 6422), and continues to block 6426. If bock 6426 determines there is an error in "Parameters", then block 6428 handles the error appropriately (e.g. log error to LBX History 30 and/or notify user) and processing returns to the caller (invoker) at block 6434. If block 6426 determines that "Parameters" are in good order for using the email transport, then block 6430 updates an email object in context for the notify command "Operand" and "Parameters", block 6432 uses a send email interface to notify through email, and block 6434 returns to the caller (e.g. block 6212). Block 6430 can use the attributes parameter to affect how "Parameters" is to be interpreted. The attributes parameter may be modified, and can be used by any processes which receive the notify. The email interface used at block 6432 will be one suitable for the underlying operating system and available development environments, for example, a standardized SMTP interface, and other messaging capability, as described above for FIG. 63A.

While there are Notify command embodiments that make using an existing transport layer (e.g. email) more suitable than not, even the most customized Notify command Operands can use email (instead of MS2MS) by implementing one or more recognizable signature(s), indication(s), or the like, of/in the email distribution to be used for informing a receiving email system to treat the email uniquely for carrying out the present disclosure. Depending on the embodiment, integrated processing code is maintained/built as part of the email system, or processing code is "plugged" ("hooked") into an existing email system in an isolated third party manner. Regardless, the email system receiving the present disclosure email will identify the email as being one for special processing. Then, email contents is parsed out and processed according to what has been requested.

In embodiments where Notify command Operands are more attractively implemented using an existing transport layer (e.g. email), those notify commands can also be sent with MS2MS encoded in data packet(s) that are appropriate for processing.

Referring back to block 6406, if it is determined that the "Operand" indicates to not use an email transport (e.g. use a MS2MS transport for performing the notify command, or notify command is to be processed locally), then block 6436 checks if a sender parameter was specified. If block 6436 determines a sender was specified, processing continues to block 6440, otherwise block 6438 defaults one (e.g. valid MS ID) and then processing continues to block 6440. Block 6440 checks if a subject message parameter was specified. If block 6440 determines a subject message was specified, processing continues to block 6444, otherwise block 6442 defaults one, and then processing continues to block 6444. Block 6442 may specify a null message. Block 6444 checks if an attributes parameter was specified. If block 6444 determines attributes were specified, processing continues to block 6448, otherwise block 6446 defaults attributes (e.g. confirmation of delivery, high priority, etc) and then processing continues to block 6448. Block 6448 checks if at least one recipient parameter was specified. If block 6448 determines at least one recipient was specified, processing continues to block 6452, otherwise block 6450 defaults one (e.g. valid ID for this MS) and then processing continues to block 6452. Block 6450 may specify a null recipient list so as to cause an error in later processing (detected at block 6452).

Block 6452 validates "Parameters", some of which may have been defaulted in previous blocks (6438, 6442, 6446 and 6450), and continues to block 6454. If bock 6454 determines there is an error in "Parameters", then block 6456 handles the error appropriately (e.g. log error to LBX History and/or notify user) and processing returns to the caller (invoker) at block 6434. If block 6454 determines that "Parameters" are in good order, then block 6458 updates a data object in context for the notify command "Operand" and "Parameters", and block 6460 begins a loop for delivering the data object to each recipient. Block 6460 gets the next (or first) recipient from the recipient list and processing continues to block 6462.

If block 6462 determines that all recipients have been processed, then processing returns to the caller at block 6434, otherwise block 6464 checks the recipient to see if it matches the ID of the MS of FIG. 64A processing (i.e. this MS). If block 6464 determines the recipient matches this MS, then block 6466 (see FIG. 64B discussions) performs the atomic notify command locally and processing continues back to block 6460 for the next recipient. If block 6464 determines the recipient is an other MS, block 6468 prepares parameters for FIG. 75A processing, and block 6470 invokes the procedure of FIG. 75A for sending the data (notify command, operand and parameters) to the other MS. Processing then continues back to block 6460 for the next recipient. Blocks 6466, 6468, and 7584 can use the attributes parameter to affect how "Parameters" is to be interpreted. The attributes parameter may be modified, and can be used by any processes which receive the notify result.

MS2MS processing is as already described above (see FIGS. 75A and 75B), except FIG. 75A performs sending data for the notify command to a remote MS, and FIG. 75B blocks 7578 through 7584 carry out processing specifically for the notify command. Block 7584 processes the notify command locally (like block 6466—see FIG. 64A).

In FIG. 64A, "Parameters" for the atomic notify command in accordance with the "Operand" were shown to be validated for being properly privileged prior to FIG. 64A processing (by FIG. 61 processing). However, an alternate embodiment could move some or all applicable privilege validation to FIG. 64A in context of where the "Parameters" are processed. Also, some embodiments may not validate "Parameters" since they (or some reasonable subset thereof) can be understood to be in good order by the time FIG. 64A processing occurs (e.g. no blocks 6408 through 6428 and/or 6436 through 6456 required). In yet another embodiment, no defaulting or some defaulting of parameters is implemented. In some embodiments, any subset of notify commands will utilize email distributions for processing between MSs. In other embodiments, any subset of notify commands will utilize FIGS. 75A and 75B for processing between MSs. Operations of the notify command can be carried out regardless of the transport that is actually used to perform the notify command.

FIGS. 64B-1 through 64B-4 depicts a matrix describing how to process some varieties of the Notify command (e.g. as processed at blocks 6466 and 7584). Each row in the matrix describes processing apparatus and/or methods for carrying out command processing for certain operands (see FIG. 34D for the Operand which matches the number in the first column). The second column shows the Preferred Methodology (PM) for carrying out Notify command processing:

E=Email transport preferably used (blocks 6408 through 6432);

O=Other processing (MS2MS or local) used (blocks 6436 through 6470).

Any of the Notify command operand combinations can be carried out with either of the methodologies. The second column shows a preferred methodology (PM). The third column describes processing which is placed into flowchart embodiments. There are many embodiments derived from the Notify processing descriptions without departing from the spirit and scope of the disclosure. Descriptions are self explanatory.

With reference back to FIGS. 31A through 31E, note that the column of information headed by "103" represents the parameters applicable for the Notify command. The Notify command has the following parameters, all of which are interpreted in context of the Operand:

first parameter(s)=These are required, and are in context of the Operand;

sender=The sender of the Notify command, typically tied to the originating identity of the action (e.g. email address or MS ID). A different sender can be specified if there is an applicable privilege in place, or if impersonation has been granted;

msg/subj=A message or subject associated with Notify command;

attributes=Indicators for more detailed interpretation of Notify command parameters and/or indicators for attributes to be interpreted by external (e.g. receiving) processes affected by the Notify command result (e.g. handled appropriately by block 7584 or receiving email system);

recipient(s)=One or more destination identities for the Notify command (e.g. email address or MS ID).

Figure 64C:
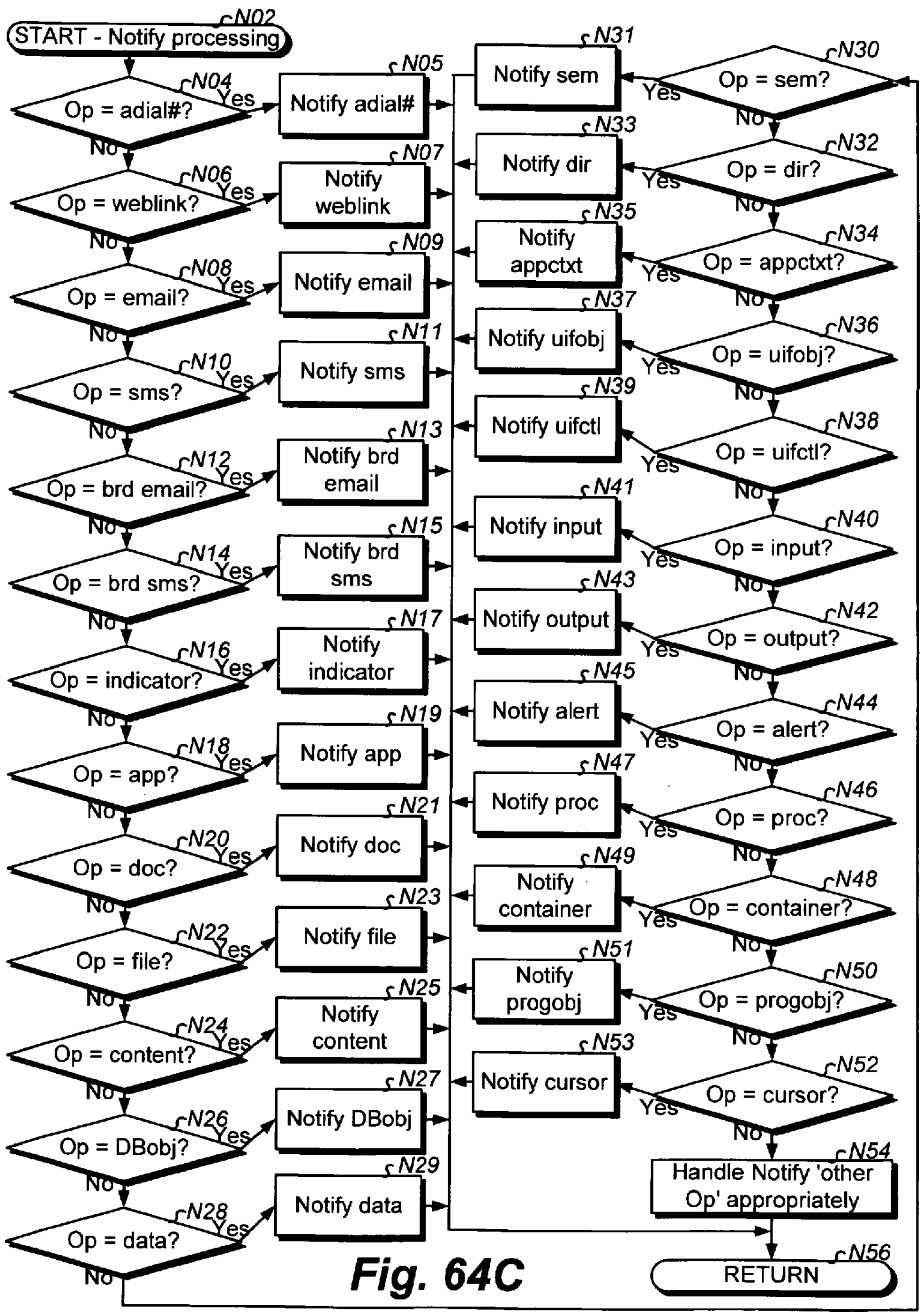

FIG. 64C depicts a flowchart for describing one embodiment of a procedure for Notify command action processing, as derived from the processing of FIG. 64A. All operands are implemented, and each of blocks N04 through N54 can be implemented with any one of the methodologies described with FIG. 64A, or any one of a blend of methodologies implemented by FIG. 64C. The atomic command and atomic operand pair of Notify Cursor can be used to provide a new user interface (e.g. mouse pointer) cursor appearance, however in touch type interfaces a cursor change may not be seen until the user subsequently uses an interface where the cursor is used.

FIG. 65A depicts a flowchart for describing a preferred embodiment of a procedure for Compose command action processing. The Make command and Compose command provide identical processing. There are three (3) primary methodologies for carrying out compose command processing:

1) Launching an application, executable, or program with a standard contextual object type interface;
2) Custom launching of an application, executable, or program; or
3) Processing the compose command through a MS operating system interface.

In various embodiments, any of the compose command Operands can be implemented with either one of the methodologies, although there may be a preference of which methodology is used for which Operand. Atomic compose command processing begins at block 6502, continues to block 6504 for accessing parameters of compose command "Operand" (BNF Grammar Operand) and "Parameters" (BNF Grammar Parameters), and then to block 6506 for checking which "Operand" was passed. If block 6506 determines the "Operand" indicates to launch with a standard contextual object type interface, then parameter(s) are validated at block 6508 and block 6510 checks the result. If block 6510 determines there was at least one error, then block 6512 handles the error appropriately (e.g. log error to LBX History 30 and/or notify user) and processing returns to the caller (invoker) at block 6514. If block 6510 determines there were no parameter errors, then block 6516 interfaces to the MS operating system for the particular object passed as a parameter. Block 6516 may prepare parameters in preparation for the Operating System (O/S) contextual launch, for example if parameters are passed to the application which is invoked for composing the object. Processing leaves block 6516 and returns to the caller (invoker) at block 6514.

An example of block 6516 is similar to the Microsoft Windows XP (Microsoft and Windows XP are trademarks of Microsoft corp.) O/S association of applications to file types for convenient application launch. For example, a user can double click a file (e.g. when viewing file system) from Window Explorer and the appropriate application will be launched for opening the file, assuming an application has been properly registered for the file type of the file opened. In a Windows graphical user interface scenario, registration of an application to the file type is achieved, for example, from the user interface with the "File Types" tab of the "Folder Options" option of the "File Types" pulldown of the Windows Explorer interface. There, a user can define file types and the applications which are to be is launched when selecting/invoking (e.g. double clicking) the file type from file system. Alternatively, an O/S API or interface may be used to configure an object to associate to a launch-able executable for handling the object. In this same scheme, the MS will have a similar mechanism whereby an association of an application to a type of object (e.g. file type) has been assigned. Block 6516 makes use of the system interface for association which was set up outside of present disclosure processing (e.g. via MS O/S).

Referring back to block 6506, if it is determined the "Operand" does not indicate to launch with a standard contextual object type interface, processing continues to block 6518. If block 6518 determines the "Operand" indicates to perform a custom launch, then parameter(s) are validated at block 6520 and block 6522 checks the result. If block 6522 determines there was at least one error, then block 6524 handles the error appropriately (e.g. log error to LBX History 30 and/or notify user) and processing returns to the caller (invoker) at block 6514. If block 6522 determines there were no parameter errors, then processing continues to block 6526.

If block 6526 determines the custom launch is not to use an Application Programming Interface (API) to launch the applicable application for composing the object passed as a parameter, then block 6528 prepares a command string for launching the particular application, block 6530 invokes the command string for launching the application, and processing continues to block 6514 for returning to the caller.

If block 6526 determines the custom launch is to use an Application Programming Interface (API) to launch the applicable application for composing the object passed as a parameter, then block 6532 prepares any API parameters as necessary, block 6534 invokes the API for launching the application, and processing continues to block 6514 for returning to the caller.

Referring back to block 6518, if it is determined that the "Operand" indicates to perform the compose command locally (e.g. use operating system interface (e.g. set semaphore, program object, data, signal, etc)), then parameter(s) are validated at block 6536 and block 6538 checks the result. If block 6538 determines there was at least one error, then block 6540 handles the error appropriately (e.g. log error to LBX History 30 and/or notify user) and processing returns to the caller (invoker) at block 6514. If block 6538 determines there were no parameter errors, then block 6542 performs the compose command, and block 6514 returns to the caller.

In FIG. 65A, "Parameters" for the atomic compose command in accordance with the "Operand" were shown to be validated for being properly privileged prior to FIG. 65A processing (by FIG. 61 processing). However, an alternate embodiment could move some or all applicable privilege validation to FIG. 65A in context of where the "Parameters" are processed. Also, some embodiments may not validate "Parameters" since they (or some reasonable subset thereof) can be understood to be in good order by the time FIG. 65A processing occurs (e.g. no blocks 6510/6512 and/or 6522/6524 and/or 6538/6540 required). In yet another embodiment, some defaulting of parameters is implemented.

FIGS. 65B-1 through 65B-7 depicts a matrix describing how to process some varieties of the Compose command (e.g. as resulting after blocks 6516, 6534 and 6542). Each row in the matrix describes processing apparatus and/or methods for carrying out command processing for certain operands (see FIG. 34D for the Operand which matches the number in the first column). The second column shows the Preferred Methodology (PM) for carrying out Compose command processing:

S=Standard contextual launch used (blocks 6508 through 6516);

C=Custom launch used (blocks 6520 through 6534);

O=Other processing (O/S interface) used (blocks 6536 through 6542).

Any of the Compose command operand combinations can be carried out with either of the methodologies. The second column shows a preferred methodology (PM). The third column describes processing which is placed into flowchart embodiments. There are many embodiments derived from the Compose processing descriptions without departing from the spirit and scope of the disclosure. Descriptions are self explanatory.

With reference back to FIGS. 31A through 31E, note that the column of information headed by "105" represents the parameters applicable for the Compose command. The Compose command has the following parameters, all of which are interpreted in context of the Operand:

first parameter(s)=These are required, and are in context of the Operand;

sender=The sender of the Compose command, typically tied to the originating identity of the action (e.g. email address or MS ID). A different sender can be specified if there is an applicable privilege in place, or if impersonation has been granted;

msg/subj=A message or subject associated with Compose command;

attributes=Indicators for more detailed interpretation of Compose command parameters and/or indicators for attributes to be interpreted by external (e.g. receiving) processes affected by the Compose command result;

recipient(s)=One or more destination identities for the Compose command (e.g. email address or MS ID).

Compose command data is preferably maintained to LBX history, a historical call log (e.g. outgoing when call placed), or other useful storage for subsequent use (some embodiments may include this processing where appropriate (e.g. as part of blocks 6516, 6542, etc)).

Figure 65C:
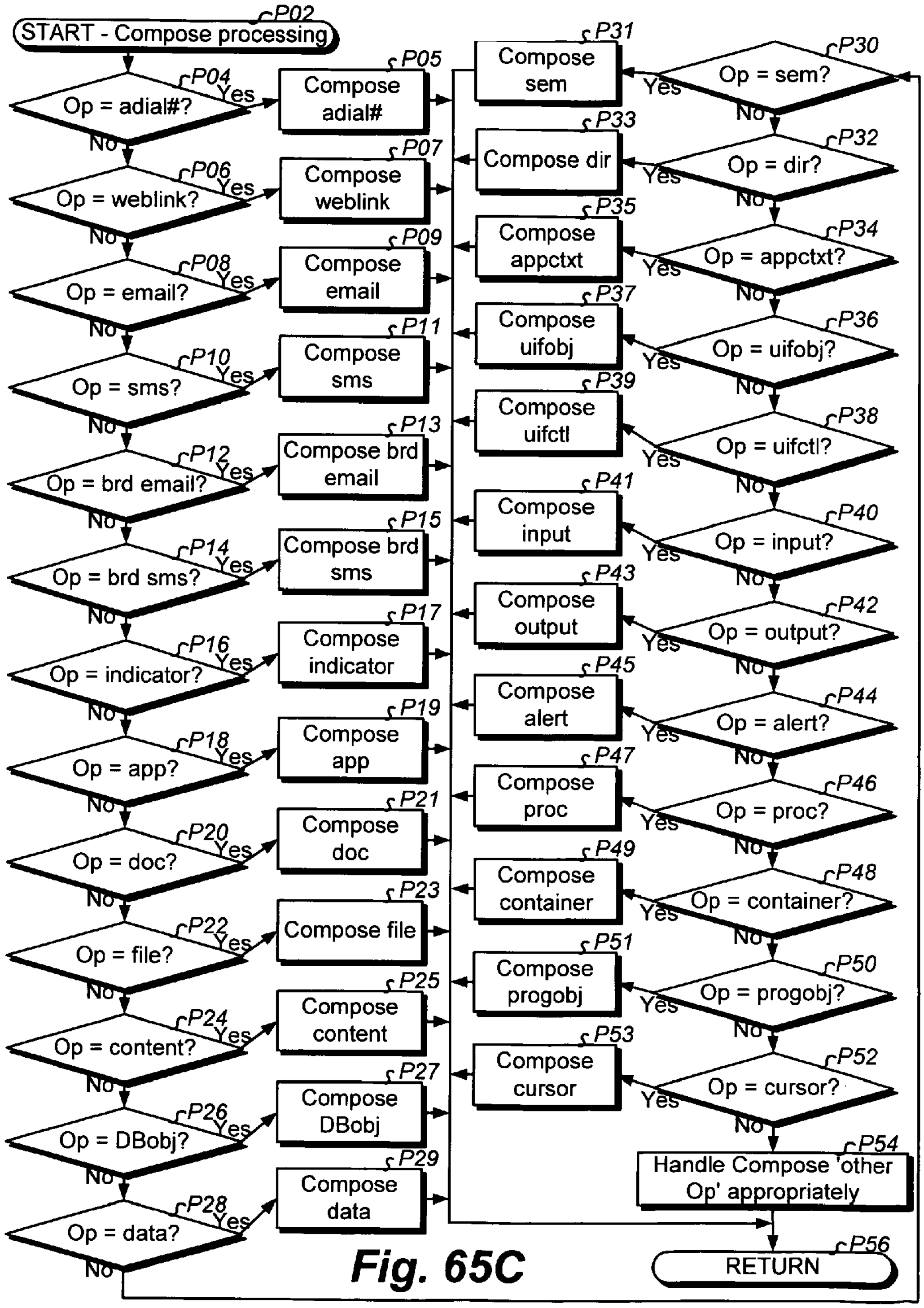

FIG. 65C depicts a flowchart for describing one embodiment of a procedure for Compose command action processing, as derived from the processing of FIG. 65A. All operands are implemented, and each of blocks P04 through P54 can be implemented with any one of the methodologies described with FIG. 65A, or any one of a blend of methodologies implemented by FIG. 65C.

FIG. 66A depicts a flowchart for describing a preferred embodiment of a procedure for Connect command action processing. The Call command and Connect command provide identical processing. There are four (4) primary methodologies for carrying out connect command processing:

1) Launching an application, executable, or program with a standard contextual object type interface;
2) Custom launching of an application, executable, or program;
3) Processing the connect command through a MS operating system interface; or
4) Using a MS to MS communications (MS2MS) of FIGS. 75A and 75B.

In various embodiments, any of the connect command Operands can be implemented with either one of the methodologies, although there may be a preference of which methodology is used for which Operand. Atomic connect command processing begins at block 6602, continues to block 6604 for accessing parameters of connect command "Operand" (BNF Grammar Operand) and "Parameters" (BNF Grammar Parameters), and then to block 6606 for checking which "Operand" was passed. If block 6606 determines the "Operand" indicates to launch with a standard contextual object type interface, then parameter(s) are validated at block 6608 and block 6610 checks the result. If block 6610 determines there was at least one error, then block 6612 handles the error appropriately (e.g. log error to LBX History 30 and/or notify user) and processing returns to the caller (invoker) at block 6614. If block 6610 determines there were no parameter errors, then block 6616 interfaces to the MS operating system for the particular object passed as a parameter. Block 6616 may prepare parameters in preparation for the O/S contextual launch, for example if parameters are passed to the application which is invoked. Processing leaves block 6616 and returns to the caller (invoker) at block 6614.

An example of block 6616 is similar to the Microsoft Windows XP O/S association of applications to file types for convenient application launch, and is the same as processing of block 6516 described above. Block 6616 makes use of the system interface for association which was set up outside of present disclosure processing (e.g. via MS O/S).

Referring back to block 6606, if it is determined the "Operand" does not indicate to launch with a standard contextual object type interface, processing continues to block 6618. If block 6618 determines the "Operand" indicates to perform a custom launch, then parameter(s) are validated at block 6620 and block 6622 checks the result. If block 6622 determines there was at least one error, then block 6624 handles the error appropriately (e.g. log error to LBX History 30 and/or notify user) and processing returns to the caller (invoker) at block 6614. If block 6622 determines there were no parameter errors, then processing continues to block 6626.

If block 6626 determines the custom launch is not to use an Application Programming Interface (API) to launch the applicable application for the object passed as a parameter, then block 6628 prepares a command string for launching the particular application, block 6630 invokes the command string for launching the application, and processing continues to block 6614 for returning to the caller.

If block 6626 determines the custom launch is to use an Application Programming Interface (API) to launch the applicable application for the object passed as a parameter, then block 6632 prepares any API parameters as necessary, block 6634 invokes the API for launching the application, and processing continues to block 6614 for returning to the caller.

Referring back to block 6618, if it is determined that the "Operand" indicates to perform the connect command locally (e.g. use operating system interface (e.g. set semaphore, program object, data, signal, etc)), or to use MS2MS for processing, then parameter(s) are validated at block 6636 and block 6638 checks the result. If block 6638 determines there was at least one error, then block 6640 handles the error appropriately (e.g. log error to LBX History 30 and/or notify user) and processing returns to the caller (invoker) at block 6614. If block 6638 determines there were no parameter errors, then block 6642 checks the operand for which processing to perform. If block 6642 determines that MS2MS processing is needed to accomplish processing, then block 6644 prepares parameters for FIG. 75A processing, and block 6646 invokes the procedure of FIG. 75A for sending the data (connect command, operand and parameters) for connect processing at the MS to connect. Processing then continues to block 6614. MS2MS processing is as already described above (see FIGS. 75A and 75B), except FIG. 75A performs sending data for the connect command to the remote MS for processing, and FIG. 75B blocks 7578 through 7584 carry out processing specifically for the connect command. Block 7584 processes the connect command for connecting the MSs in context of the Operand. Referring back to block 6642, if it is determined that MS2MS is not to be used, then block 6648 performs the connect command, and block 6614 returns to the caller.

In FIG. 66A, "Parameters" for the atomic connect command in accordance with the "Operand" were shown to be validated for being properly privileged prior to FIG. 66A processing (by FIG. 61 processing). However, an alternate embodiment could move some or all applicable privilege validation to FIG. 66A in context of where the "Parameters" are processed. Also, some embodiments may not validate "Parameters" since they (or some reasonable subset thereof) can be understood to be in good order by the time FIG. 66A processing occurs (e.g. no blocks 6610/6612 and/or 6622/6624 and/or 6638/6640 required). In yet another embodiment, some defaulting of parameters is implemented.

In the case of automatically dialing a phone number at a MS, there are known APIs to accomplish this functionality, depending on the MS software development environment, by passing at least a phone number to the MS API programmatically at the MS (e.g. see C# phone application APIs, J2ME phone APIs, etc). In a J2ME embodiment, you can place a call by calling the MIDP 2.0 platformRequest method inside the MIDlet class (e.g. platformRequest("tel://mobileNumber") will request the placing call functionality from the applicable mobile platform).

FIGS. 66B-1 through 66B-2 depicts a matrix describing how to process some varieties of the Connect command (e.g. as processed at blocks 6648 and 7584). Each row in the matrix describes processing apparatus and/or methods for carrying out command processing for certain operands (see FIG. 34D for the Operand which matches the number in the first column). The second column shows the Preferred Methodology (PM) for carrying out Connect command processing:

S=Standard contextual launch used (blocks 6608 through 6616);
C=Custom launch used (blocks 6620 through 6634);
O=Other processing (MS2MS or local) used (blocks 6636 through 6648).

Any of the Connect command operand combinations can be carried out with either of the methodologies. The second column shows a preferred methodology (PM). The third column describes processing which is placed into flowchart embodiments. There are many embodiments derived from the Connect processing descriptions without departing from the spirit and scope of the disclosure. Descriptions are self explanatory.

With reference back to FIGS. 31A through 31E, note that the column of information headed by "119" represents the parameters applicable for the Connect command. The Connect command has the following parameters, all of which are interpreted in context of the Operand:

first parameter(s)=These are required, and are in context of the Operand;

sender=The sender of the Connect command, typically tied to the originating identity of the action (e.g. email address or MS ID). A different sender can be specified if there is an applicable privilege in place, or if impersonation has been granted;

msg/subj=A message or subject associated with Connect command;

attributes=Indicators for more detailed interpretation of Connect command parameters and/or indicators for attributes to be interpreted by external (e.g. receiving) processes affected by the Connect command result;

recipient(s)=One or more destination identities for the Connect command (e.g. email address or MS ID).

Connect command data is preferably maintained to LBX history, a historical call log (e.g. outgoing when call placed), or other useful storage for subsequent use (some embodiments may include this processing where appropriate (e.g. as part of blocks 6616, 6648, 7584, etc)).

Figure 66C:
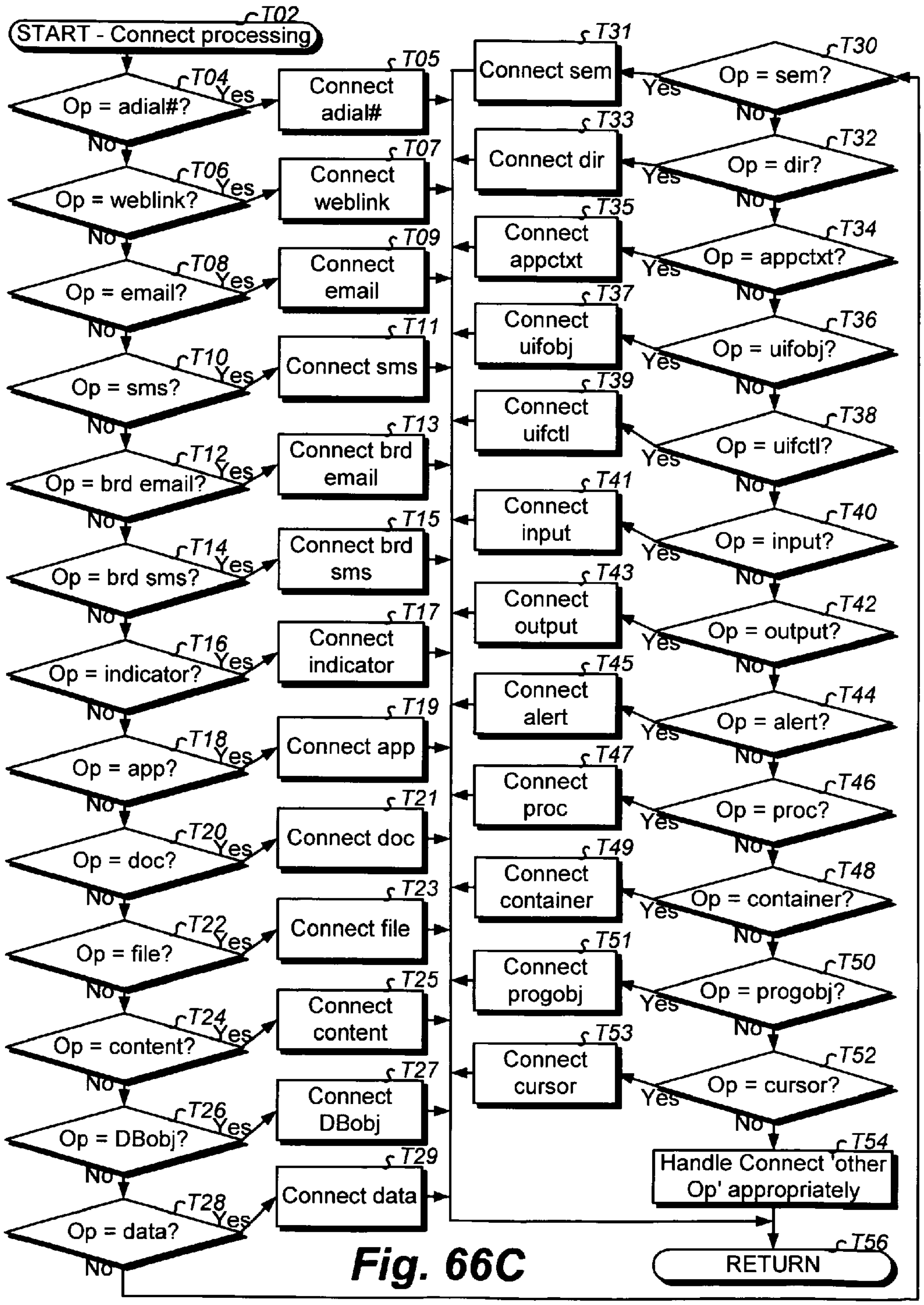

FIG. 66C depicts a flowchart for describing one embodiment of a procedure for Connect command action processing, as derived from the processing of FIG. 66A. All operands are implemented, and each of blocks T04 through T54 can be implemented with any one of the methodologies described with FIG. 66A, or any one of a blend of methodologies implemented by FIG. 66C.

FIG. 67A depicts a flowchart for describing a preferred embodiment of a procedure for Find command action processing. The Search command and Find command provide identical processing. There are four (4) primary methodologies for carrying out find command processing:

1) Launching an application, executable, or program with a standard contextual object type interface;
2) Custom launching of an application, executable, or program;
3) Processing the find command locally; or
4) Using MS to MS communications (MS2MS) of FIGS. 75A and 75B for remote finding.

In various embodiments, any of the find command Operands can be implemented with either one of the methodologies, although there may be a preference of which methodology is used for which Operand. Atomic find command processing begins at block 6700, continues to block 6702 for accessing parameters of find command "Operand" (BNF Grammar Operand) and "Parameters" (BNF Grammar Parameters), and then to block 6704 for getting the next (or first) system parameter (block 6704 starts a loop for processing system(s)). At least one system parameter is required for the find. If at least one system is not present for being processed by block 6704, then block 6704 will handle the error and continue to block 6752 for returning to the caller (not shown—considered obvious error handling, or was already validated at configuration time). Block 6704 continues to block 6706. If block 6706 determines that an unprocessed system parameter remains, then processing continues to block 6708. If block 6708 determines the system is not the MS of FIG. 67A processing, then MS2MS processing is used to accomplish the remote find processing, in which case block 6708 continues to block 6710 for preparing parameters for FIG. 75A processing. Thereafter, block 6712 checks to see if there were any parameter errors since block 6710 also validates them prior to preparing them. If block 6712 determines there was at least one parameter error, then block 6713 handles the error appropriately (e.g. log error to LBX History 30 and/or notify user) and processing continues back to block 6704. If block 6712 determines there were no errors, then block 6714 invokes the procedure of FIG. 75A for sending the data (find command, operand and parameters) for remote find processing at the remote MS. Processing then continues back to block 6704. MS2MS processing is as already described above (see FIGS. 75A and 75B), except FIG. 75A performs sending data for the find command to the remote MS for finding sought operand dependent criteria at the remote MS, and FIG. 75B blocks 7578 through 7584 carry out processing specifically for the find command. Block 7584 processes the find command for finding sought criteria in context of the Operand at the MS of FIG. 75B processing. Blocks 7574 and 7576 will return the results to the requesting MS of FIG. 75A processing, and block 7510 will complete appropriate find processing. Note that block 7510 preferably includes application launch processing (e.g. like found in FIG. 67A) for invoking the best application in the appropriate manner with the find results returned. The application should be enabled for searching remote MSs further if the user chooses to do so. Another embodiment of block 7510 processes the search results and displays them to the user and/or logs results to a place the user can check later and/or logs results to a place a local MS application can access the results in an optimal manner. In some embodiments, find processing is spawned at the remote MS and the interface results are presented to the remote user. In some embodiments, the find processing results interface is presented to the user of FIG. 67A processing. In some embodiments, find processing is passed an additional parameter for whether or not to spawn the search interface at the remote MS for the benefit of the remote MS user (at MS of FIG. 75B processing), or to spawn locally for the benefit of the user of the MS of FIG. 67A processing.

In one embodiment, block 6714 causes processing at a remote data processing system which incorporates similar MS2MS processing, but the remote data processing system is not a MS (i.e. system parameter is for a data processing system identifier accessible to the MS of FIG. 67A processing). The remote data processing system may be a service data processing system, or any other data processing system capable of similar MS2MS processing as described for the find command, perhaps involving search of storage, memory, or operating system resources which is shared by many MSs.

Referring back to block 6708, if it is determined that the system for processing is the MS of FIG. 67A processing, then processing continues to block 6716 for checking which "Operand" was passed. If block 6716 determines the "Operand" indicates to launch a search application for the sought operand with a standard contextual object type interface, then parameter(s) are validated at block 6718 and block 6720 checks the result. If block 6720 determines there was at least one error, then block 6722 handles the error appropriately (e.g. log error to LBX History 30 and/or notify user) and processing returns back to block 6704. If block 6720 determines there were no parameter errors, then block 6724 interfaces to the MS operating system to start the search application for the particular object passed as a parameter. Block 6724 may prepare parameters in preparation for the O/S contextual launch, for example if parameters are passed to the application which is invoked for finding the object. Processing leaves block 6724 and returns to block 6704.

An example of block 6724 is similar to the Microsoft Windows XP association of applications to file types for convenient application launch, just as was described above for block 6616.

Referring back to block 6716, if it is determined the "Operand" does not indicate to launch with a standard contextual object type interface, processing continues to block 6726. If block 6726 determines the "Operand" indicates to perform a custom launch, then parameter(s) are validated at block 6728 and block 6730 checks the result. If block 6730 determines there was at least one error, then block 6732 handles the error appropriately (e.g. log error to LBX History 30 and/or notify user) and processing returns to block 6704. If block 6730 determines there were no parameter errors, then processing continues to block 6734.

If block 6734 determines the custom launch is not to use an Application Programming Interface (API) to launch the applicable search application for finding the object passed as a parameter, then block 6736 prepares a command string for launching the particular application, block 6738 invokes the command string for launching the application, and processing continues to block 6704.

If block 6734 determines the custom launch is to use an Application Programming Interface (API) to launch the applicable application for finding the object passed as a parameter, then block 6740 prepares any API parameters as necessary, block 6742 invokes the API for launching the application, and processing continues back to block 6704.

Referring back to block 6726, if it is determined that the "Operand" indicates to perform the find command with other local processing, then parameter(s) are validated at block 6744 and block 6746 checks the result. If block 6746 determines there was at least one error, then block 6748 handles the error appropriately (e.g. log error to LBX History 30 and/or notify user) and processing returns to block 6704. If block 6746 determines there were no parameter errors, then block 6750 checks the operand for which find processing to perform, and performs find processing appropriately. Processing then continues back to block 6704.

Referring back to block 6704, if it is determined that there are no remaining unprocessed system parameters, then processing returns to the caller at block 6752.

In FIG. 67A, "Parameters" for the atomic find command in accordance with the "Operand" were shown to be validated for being properly privileged prior to FIG. 67A processing (by FIG. 61 processing). However, an alternate embodiment could move some or all applicable privilege validation to FIG. 67A in context of where the "Parameters" are processed. Also, some embodiments may not validate "Parameters" since they (or some reasonable subset thereof) can be understood to be in good order by the time FIG. 67A processing occurs (e.g. no blocks 6720/6722 and/or 6728/6730 and/or 6746/6748 required). In yet another embodiment, some defaulting of parameters is implemented.

FIGS. 67B-1 through 67B-13 depicts a matrix describing how to process some varieties of the Find command (e.g. as processed at blocks 6750 and 7584). Each row in the matrix describes processing apparatus and/or methods for carrying out command processing for certain operands (see FIG. 34D for the Operand which matches the number in the first column). The second column shows the Preferred Methodology (PM) for carrying out Find command processing:

S=Standard contextual launch used (blocks 6716 through 6724);

C=Custom launch used (blocks 6726 through 6742);

O=Other processing (MS2MS or local) used (blocks 6744 through 6750, blocks 6708 through 6714).

Any of the Find command operand combinations can be carried out with either of the methodologies. The second column shows a preferred methodology (PM). The third column describes processing which is placed into flowchart embodiments. There are many embodiments derived from the Find processing descriptions without departing from the spirit and scope of the disclosure. Descriptions are self explanatory.

With reference back to FIGS. 31A through 31E, note that the column of information headed by "107" represents the parameters applicable for the Find command. The Find command has the following parameters, all of which are interpreted in context of the Operand:

first parameter(s)=These are required, and are in context of the Operand;

system(s)=One or more destination identities for the Find command (e.g. MS ID or a data processing system identifier).

Figure 67C:
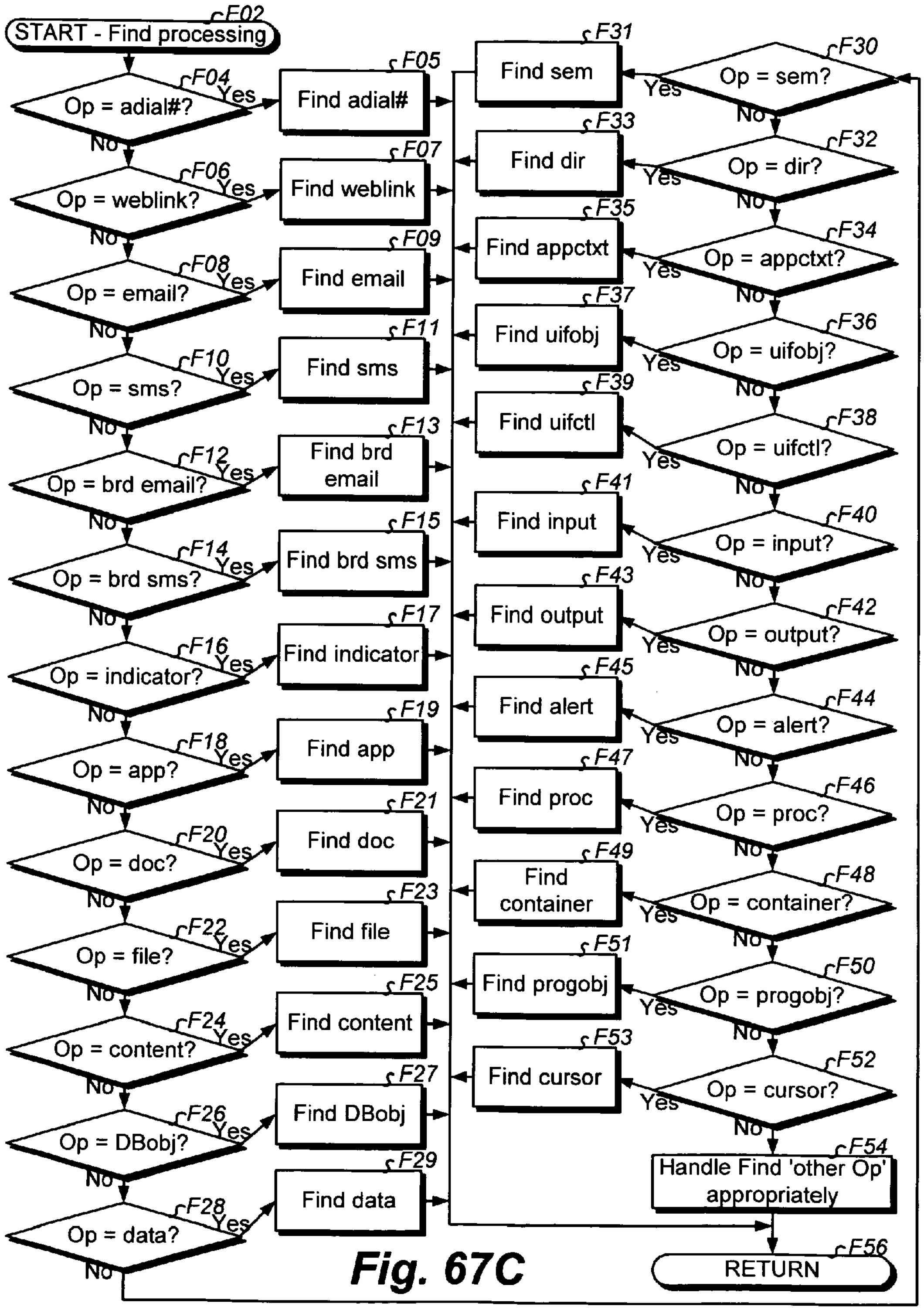

FIG. 67C depicts a flowchart for describing one embodiment of a procedure for Find command action processing, as derived from the processing of FIG. 67A. All operands are implemented, and each of blocks F04 through F54 can be implemented with any one of the methodologies described with FIG. 67A, or any one of a blend of methodologies implemented by FIG. 67C.

Find command processing discussed thus far demonstrates multithreaded/multiprocessed processing for each system to search. In one embodiment, the same methodology is used for each system and each launched find processing saves results to a common format and destination. In this embodiment, block 6706 processing continues to a new block 6751 when all systems are processed. New block 6751 gathers the superset of find results saved, and then launches an application (perhaps the same one that was launched for each find) to show all results found asynchronously from each other. The application launched will be launched with the same choice of schemes as blocks 6716 through 6750. Block 6751 then continues to block 6752. This design requires all applications invoked to terminate themselves after saving search results appropriately for gathering a superset and presenting in one find results interface. Then, the new block 6751 handles processing for a single application to present all search results.

In another embodiment, while an application may be launched multiple times for each system, the application itself is relied upon for handling multiple invocations. The application itself has intelligence to know it was re-launched thereby permitting a single resulting interface for multiple target system searches, regardless of the number of times the same search application was launched.

In one preferred embodiment, find processing permits multiple instances of a search application launched wherein Find processing is treated independently (this is shown in FIG. 67A).

Preferably all find command embodiments provide the ability to perform other commands (e.g. Copy, Move, Discard, Change, Administrate, etc) wherever possible from the resulting interface in context for each search result found.

Find command data is preferably maintained to LBX history, a historical log, or other useful storage for subsequent use (some embodiments may include this processing where appropriate). Additional find command parameters can be provided for how and where to search (e.g. case sensitivity, get all or first, how to present results, etc).

FIG. 68A depicts a flowchart for describing a preferred embodiment of a procedure for Invoke command action processing. The Spawn command, Do command, and Invoke command provide identical processing. There are five (5) primary methodologies for carrying out invoke command processing:

1) Launching an application, executable, or program with a standard contextual object type interface;
2) Custom launching of an application, executable, or program;
3) Processing the invoke command locally;
4) Using MS to MS communications (MS2MS) of FIGS. 75A and 75B for remote invocation; or
5) Using email or similar messaging layer as a transport layer for invoking distributions.

In various embodiments, any of the invoke command Operands can be implemented with either one of the methodologies, although there may be a preference of which methodology is used for which Operand. Atomic invoke command processing begins at block 6802, continues to block 6804 for accessing parameters of invoke command "Operand" (BNF Grammar Operand) and "Parameters" (BNF Grammar Parameters), and then to block 6892 for checking if the Operand for invocation indicates to use the email (or similar messaging transport). If block 6892 determines the Operand is for email/messaging transport use, then block 6894 invokes send command processing of FIG. 63A with the Operand and Parameters. Upon return, processing continues to block 6852 for returning to the caller (invoker of FIG. 68A processing). If send processing of FIG. 63A (via block 6894) is to be used for Operands with a system(s) parameter, then the system(s) parameter is equivalent to the recipient(s) parameter and other parameters are set appropriately.

If block 6892 determines the Operand is not for the email/messaging transport use, then processing continues to block 6806 for getting the next (or first) system parameter (block 6806 starts an iterative loop for processing system(s)). At least one system parameter is required for the invoke command at block 6806. If at least one system is not present for being processed by block 6806, then block 6806 will handle the error and continue to block 6852 for returning to the caller (not shown—considered obvious error handling, or was already validated at configuration time). Block 6806 continues to block 6808. If block 6808 determines that an unprocessed system parameter remains, then processing continues to block 6810. If block 6810 determines the system is not the MS of FIG. 68A processing, then MS2MS processing is used to accomplish the remote invoke processing, in which case block 6810 continues to block 6812 for preparing parameters for FIG. 75A processing, and block 6814 invokes the procedure of FIG. 75A for sending the data (invoke command, operand and parameters) for remote invoke processing at the remote MS. Processing then continues back to block 6806. MS2MS processing is as already described above (see FIGS. 75A and 75B), except FIG. 75A performs sending data for the invoke command to the remote MS for an invocation at the remote MS, and FIG. 75B blocks 7578 through 7584 carry out processing specifically for the invoke command. Block 7584 processes the invoke command for invocation in context of the Operand at the MS of FIG. 75B processing (e.g. using invocation methodologies of FIG. 68A).

In one embodiment, blocks 6812 and 6814 cause processing at a remote data processing system which incorporates similar MS2MS processing, but the remote data processing system is not a MS (i.e. system parameter is for a data processing system identifier accessible to the MS of FIG. 68A processing). The remote data processing system may be a service data processing system, or any other data processing system capable of similar MS2MS processing as described for the invoke command, perhaps involving invocation of a suitable executable in context for the operand.

Referring back to block 6810, if it is determined that the system for processing is the MS of FIG. 68A processing, then processing continues to block 6816 for checking which "Operand" was passed. If block 6816 determines the "Operand" indicates to invoke (launch) an appropriate application for the operand with a standard contextual object type interface, then parameter(s) are validated at block 6818 and block 6820 checks the result. If block 6820 determines there was at least one error, then block 6822 handles the error appropriately (e.g. log error to LBX History 30 and/or notify user) and processing returns back to block 6806. If block 6820 determines there were no parameter errors, then block 6824 interfaces to the MS operating system to start the appropriate application for the particular object passed as a parameter. Block 6824 may prepare parameters in preparation for the O/S contextual launch, for example if parameters are passed to the application which is invoked. Processing leaves block 6824 and returns to block 6806.

An example of block 6824 is similar to the Microsoft Windows XP association of applications to file types for convenient application launch, just as described above for block 6616.

Referring back to block 6816, if it is determined the "Operand" does not indicate to launch with a standard contextual object type interface, processing continues to block 6826. If block 6826 determines the "Operand" indicates to perform a custom launch, then parameter(s) are validated at block 6828 and block 6830 checks the result. If block 6830 determines there was at least one error, then block 6832 handles the error appropriately (e.g. log error to LBX History 30 and/or notify user) and processing returns to block 6806. If block 6830 determines there were no parameter errors, then processing continues to block 6834.

If block 6834 determines the custom invocation (launch) is not to use an Application Programming Interface (API) to invoke the application for the object passed as a parameter, then block 6836 prepares a command string for invoking the particular application, block 6838 invokes the command string for launching the application, and processing continues to block 6806.

If block 6834 determines the custom invocation (launch) is to use an Application Programming Interface (API) to invoke the application for the object passed as a parameter, then block 6840 prepares any API parameters as necessary, block 6842 invokes the API for launching the application, and processing continues back to block 6806.

Referring back to block 6826, if it is determined that the "Operand" indicates to perform the invoke command with other local processing, then parameter(s) are validated at block 6844 and block 6846 checks the result. If block 6846 determines there was at least one error, then block 6848 handles the error appropriately (e.g. log error to LBX History 30 and/or notify user) and processing returns to block 6806. If block 6846 determines there were no parameter errors, then block 6850 checks the operand for which invoke processing to perform, and performs invoke command processing appropriately.

Referring back to block 6808, if it is determined that there are no remaining unprocessed system parameters, then processing returns to the caller at block 6852.

In FIG. 68A, "Parameters" for the atomic invoke command in accordance with the "Operand" were shown to be validated for being properly privileged prior to FIG. 68A processing (by FIG. 61 processing). However, an alternate embodiment could move some or all applicable privilege validation to FIG. 68A in context of where the "Parameters" are processed. Also, some embodiments may not validate "Parameters" since they (or some reasonable subset thereof) can be understood to be in good order by the time FIG. 68A processing occurs (e.g. no blocks 6820/6822 and/or 6830/6832 and/or 6846/6848 required). In yet another embodiment, some defaulting of parameters is implemented.

FIGS. 68B-1 through 68B-5 depicts a matrix describing how to process some varieties of the Invoke command (e.g. as processed at blocks 6850 and 7584). Each row in the matrix describes processing apparatus and/or methods for carrying out command processing for certain operands (see FIG. 34D for the Operand which matches the number in the first column). The second column shows the Preferred Methodology (PM) for carrying out Invoke command processing:

S=Standard contextual launch used (blocks 6816 through 6824);

C=Custom launch used (blocks 6826 through 6842);

E=Email transport preferably used (blocks 6892 through 6894);

O=Other processing (MS2MS or local) used (blocks 6844 through 6850, blocks 6812 through 6814).

Any of the Invoke command operand combinations can be carried out with either of the methodologies. The second column shows a preferred methodology (PM). The third column describes processing which is placed into flowchart embodiments. There are many embodiments derived from the Invoke processing descriptions without departing from the spirit and scope of the disclosure. Descriptions are self explanatory.

With reference back to FIGS. 31A through 31E, note that the column of information headed by "109" represents the parameters applicable for the Invoke command. The Invoke command has the following parameters, all of which are interpreted in context of the Operand:

first parameter(s)=These are required, and are in context of the Operand;

system(s)=One or more destination identities for the Invoke command (e.g. MS ID or a data processing system identifier);

sender=The sender of the Invoke command, typically tied to the originating identity of the action (e.g. email address or MS ID). A different sender can be specified if there is an applicable privilege in place, or if impersonation has been granted;

msg/subj=A message or subject associated with invoke command;

attributes=Indicators for more detailed interpretation of invoke command parameters and/or indicators for attributes to be interpreted by external (e.g. receiving) processes affected by the invoke command result;

recipient(s)=One or more destination identities for the Invoke command (e.g. email address or MS ID).

FIG. 68C depicts a flowchart for describing one embodiment of a procedure for Invoke command action processing, as derived from the processing of FIG. 68A. All operands are implemented, and each of blocks J04 through J54 can be implemented with any one of the methodologies described with FIG. 68A, or any one of a blend of methodologies implemented by FIG. 68C.

In some embodiments, the invoke command may be used as an overall strategy and architecture for performing most, if not all, actions (e.g. other commands).

FIG. 69A depicts a flowchart for describing a preferred embodiment of a procedure for Copy command action processing. There are four (4) primary methodologies for carrying out copy command search processing:

1) Launching an application, executable, or program with a standard contextual object type interface, for finding the source object(s) to copy;
2) Custom launching of an application, executable, or program, for finding the source object(s) to copy;
3) Processing the copy command locally, for finding the source object(s) to copy; or
4) MS to MS communications (MS2MS) of FIGS. 75A and 75B for finding the source object(s) to copy.

The source parameter specifies which system is to be the source of the copy: the MS of FIG. 69A processing or a remote data processing system.

There are two (2) primary methodologies for carrying out copy command copy processing:

1) Using local processing;
2) MS to MS communications (MS2MS) of FIGS. 75A and 75B for remote copying.

In various embodiments, any of the copy command Operands can be implemented with either of the methodologies, although there may be a preference of which methodology is used for which Operand. Atomic copy command processing begins at block 6900, continues to block 6902 for accessing parameters of copy command "Operand" (BNF Grammar Operand) and "Parameters" (BNF Grammar Parameters), and continues to block 6904.

If block 6904 determines the source system parameter (source) is this MS, then processing continues to block 6906. If block 6906 determines the "Operand" indicates to launch a search application for the sought operand object with a standard contextual object type interface, then parameter(s) are validated at block 6908 and block 6910 checks the result. If block 6910 determines there was at least one error, then block 6912 handles the error appropriately (e.g. log error to LBX History 30 and/or notify user) and processing returns to the caller (invoker) at block 6960. If block 6910 determines there were no parameter errors, then block 6914 interfaces to the MS operating system to start the search application for the particular object (for Operand). Block 6914 may prepare parameters in preparation for the operating system. Processing leaves block 6914 and continues to block 6938 which is discussed below.

An example of block 6914 is similar to the Microsoft Windows XP association of applications to file types for convenient application launch, just as was described above for block 6616.

Referring back to block 6906, if it is determined the "Operand" does not indicate to launch with a standard contextual object type interface, processing continues to block 6916. If block 6916 determines the "Operand" indicates to perform a custom launch, then parameter(s) are validated at block 6918 and block 6920 checks the result. If block 6920 determines there was at least one error, then block 6912 handles the error appropriately (e.g. log error to LBX History 30 and/or notify user) and processing returns to the caller at block 6960. If block 6920 determines there were no parameter errors, then processing continues to block 6922.

If block 6922 determines the custom launch is not to use an Application Programming Interface (API) to launch the searching application for copying the object, then block 6924 prepares a command string for launching the particular application, block 6926 invokes the command string for launching the application, and processing continues to block 6938 discussed below.

If block 6922 determines the custom launch is to use an Application Programming Interface (API) to launch the applicable application for searching, then block 6928 prepares any API parameters as necessary, block 6930 invokes the API for launching the application, and processing continues to block 6938.

Referring back to block 6916, if it is determined that the "Operand" indicates to perform the copy command with local search processing, then parameter(s) are validated at block 6932 and block 6934 checks the result. If block 6934 determines there was at least one error, then block 6912 handles the error appropriately (e.g. log error to LBX History 30 and/or notify user) and processing returns to the caller at block 6960. If block 6934 determines there were no parameter errors, then block 6936 searches for the operand object in context for the Operand, and processing continues to block 6938.

Referring back to block 6904, if it is determined the source parameter is not for this MS, then block 6962 prepares parameters for FIG. 75A processing. Thereafter, block 6964 checks to see if there were any parameter errors since block 6962 also validates them prior to preparing them. If block 6964 determines there was at least one parameter error, then block 6912 handles the error appropriately (e.g. log error to LBX History 30 and/or notify user) and processing returns to the caller at block 6960. If block 6964 determines there were no errors, then block 6966 invokes the procedure of FIG. 75A for sending the data (copy command, operand and parameters) for remote copy search processing at the remote MS. Processing then continues to block 6938 discussed below. MS2MS processing is as already described above (see FIGS. 75A and 75B), except FIG. 75A performs searching for data for the copy command at the remote MS, and FIG. 75B blocks 7578 through 7584 carry out processing specifically for the copy command search processing. Block 7584 processes the copy command for finding the object to copy in context of the Operand. Blocks 7574 and 7576 will return the results to the requesting MS of FIG. 75A processing, and block 7510 will complete appropriate copy search processing so that FIG. 69A processing receives the search results. FIG. 75A can convey the found object(s) for copy by returning from a function interface (the send procedure being a function), returning to a file, setting data visible to both processes, etc. Note that block 7510 may invoke application launch processing (e.g. like found in FIG. 69A) for invoking the best application in the appropriate manner for determining copy search results returned from FIG. 75B processing, or block 7510 may process results itself.

In one embodiment, block 6966 causes processing at a remote data processing system which incorporates similar MS2MS processing, but the remote data processing system is not a MS (i.e. system parameter is for a data processing system identifier accessible to the MS of FIG. 67A processing). The remote data processing system may be a service data processing system, or any other data processing system capable of similar MS2MS processing as described for the find command, perhaps involving search of storage, memory, or operating system resources which are shared by many MSs.

By the time processing reaches block 6938 from any previous FIG. 69A processing, a search result is communicated to processing and any launched executable (application) for searching for the copy object(s) has terminated. Search results can be passed back as a function return, placed to a well known directory, placed to a file, placed to interfaced variable(s), or other communications of the result to further processing. Regardless of the embodiment, search results are accessed at block 6938. An alternate embodiment is like FIG. 70A wherein the application/processing invoked at blocks 6914, 6926, 6930 and 6936 handles the ack parameter and ambiguous results appropriately (i.e. no need for blocks 6938 through 6958) to proceed with completing the copy (processing of blocks 6938 through 6958 incorporated). Different methods are disclosed for similar processing to highlight methods for carrying out processing for either one of the commands (Copy or Discard).

Block 6938 checks the results of finding the source object for copying to ensure there are no ambiguous results (i.e. not sure what is being copied since the preferred embodiment is to not copy more than a single operand object at a time). If block 6938 determines that there was an ambiguous search result, then processing continues to block 6912 for error handling as discussed above (e.g. in context for an ambiguous copy since there were too many things to copy). If block 6938 determines there is no ambiguous entity to copy, block 6940 checks the acknowledgement parameter passed to FIG. 69A processing. An alternate embodiment assumes that a plurality of results is valid for copying all results to the target system(s) (i.e. no ambiguous check). In another embodiment, an ambiguous result relies on user reconciliation to reconcile whether or not to perform the copy (like FIG. 70A discard processing).

If block 6940 determines the acknowledgement (ack) parameter is set to true, then block 6942 provides the search result which is to be copied. Thereafter, processing waits for a user action to either a) continue with the copy; or b) cancel the copy. Once the user action has been detected, processing continues to block 6944. Block 6942 provides a user reconciliation of whether or not to perform the copy. In another embodiment, there is no ack parameter and multiple results detected at block 6938 forces processing into the reconciliation by the MS user. In yet another embodiment, the ack parameter is still provided, however multiple search results forces processing into the reconciliation by the MS user anyway for selecting which individual object shall be copied. In still other embodiments, all results are copied.

If block 6944 determines the user selected to cancel processing, then block 6946 logs the cancellation (e.g. log error to LBX History 30) and processing returns to the caller at block 6960. If block 6944 determines the user selected to proceed with the copy, then processing continues to block 6948 for getting the next (or first) system parameter (block 6948 starts a loop for processing system(s) for the copy result). Also, if block 6940 determines that the ack parameter was set to false, then processing continues directly to block 6948. At least one system parameter is required for the copy as validated by previous parameter validations. Block 6948 continues to block 6950. If block 6950 determines that an unprocessed system parameter remains, then processing continues to block 6952. If block 6952 determines the system (target for copy) is the MS of FIG. 69A processing, then block 6954 appropriately copies the source object to the system and processing continues back to block 6948. If block 6952 determines the system is not the MS of FIG. 69A processing, then MS2MS processing is used to accomplish the copy processing to the remote data processing system (e.g. MS), in which case block 6956 prepares parameters for FIG. 75A processing, and block 6958 invokes the procedure of FIG. 75A for sending the data (copy command, operand, and search result) for remote copy processing at the remote MS. Processing then continues back to block 6948. MS2MS processing is as already described above (see FIGS. 75A and 75B), except FIG. 75A performs sending data for the copy action to the remote MS for copying sought operand dependent criteria to the remote MS, and FIG. 75B blocks 7578 through 7584 carry out processing specifically for the copy processing. Block 7584 processes the copy of the search result from FIG. 69A to the system of FIG. 75B processing.

In one embodiment, blocks 6956 and 6958 cause processing at a remote data processing system which incorporates similar MS2MS processing, but the remote data processing system is not a MS (i.e. system parameter is for a data processing system identifier accessible to the MS of FIG. 69A processing). The remote data processing system may be a service data processing system, or any other data processing system capable of similar MS2MS processing as described for the copy command, perhaps involving storage, memory, or operating system resources which are shared by many MSs.

Referring back to block 6950, if it is determined that there are no remaining unprocessed system parameters, then processing returns to the caller at block 6960.

In FIG. 69A, "Parameters" for the atomic copy command in accordance with the "Operand" were shown to be validated for being properly privileged prior to FIG. 69A processing (by FIG. 61 processing). However, an alternate embodiment could move some or all applicable privilege validation to FIG. 69A in context of where the "Parameters" are processed. Also, some embodiments may not validate "Parameters" since they (or some reasonable subset thereof) can be understood to be in good order by the time FIG. 69A processing occurs (e.g. no blocks 6908/6910 and/or 6918/6920 and/or 6932/6934 required). In yet another embodiment, some defaulting of parameters is implemented.

The first parameter may define a plurality of entities to be copied when the object inherently contains a plurality (e.g. directory, container). In an alternate embodiment, the search results for copying can be plural without checking for ambiguity at block 6938, in which case all results returned can/will be copied to the target systems.

FIGS. 69B-1 through 69B-14 depicts a matrix describing how to process some varieties of the Copy command. Each row in the matrix describes processing apparatus and/or methods for carrying out command processing for certain operands (see FIG. 34D for the Operand which matches the number in the first column). The second column shows the Preferred Methodology (PM) for carrying out Copy command processing:

S=Standard contextual launch used (blocks 6906 through 6914);

C=Custom launch used (blocks 6916 through 6930);

O=Other processing used (e.g. block 6936).

Any of the Copy command operand combinations can be carried out with either of the methodologies. The second column shows a preferred methodology (PM). The third column describes processing which is placed into flowchart embodiments. There are many embodiments derived from the Copy processing descriptions without departing from the spirit and scope of the disclosure. Descriptions are self explanatory.

With reference back to FIGS. 31A through 31E, note that the column of information headed by "111" represents the parameters applicable for the Copy command. The Copy command has the following parameters, all of which are interpreted in context of the Operand:

first parameter(s)=This is required, and is in context of the Operand;

ack=Boolean for whether or not to prompt user for performing the copy, prior to doing the copy.

source=A source identity for the Copy command (e.g. MS ID or a data processing system identifier);

system(s)=One or more destination identities for the Copy command (e.g. MS ID or a data processing system identifier).

In a preferred embodiment, an additional parameter is provided for specifying the target destination of the system for the copy. For example, a directory can be placed to a target path, an email can be placed to a target folder, etc. Otherwise, there is an assumed target destination. In another embodiment, a user can select from a plurality of search results which objects are to be copied.

FIG. 69C depicts a flowchart for describing one embodiment of a procedure for Copy command action processing, as derived from the processing of FIG. 69A. All operands are implemented, and each of blocks C04 through C54 can be implemented with any one of the methodologies described with FIG. 69A, or any one of a blend of methodologies implemented by FIG. 69C.

FIG. 70A depicts a flowchart for describing a preferred embodiment of a procedure for Discard command action processing. The Delete command, "Throw Away" command, and Discard command provide identical processing. There are four (4) primary methodologies for carrying out discard command processing:

1) Launching an application, executable, or program with a standard contextual object type interface;
2) Custom launching of an application, executable, or program;
3) Processing the discard command locally; or
4) Using MS to MS communications (MS2MS) of FIGS. 75A and 75B for remote discarding.

In various embodiments, any of the discard command Operands can be implemented with either one of the methodologies, although there may be a preference of which methodology is used for which Operand. Atomic discard command processing begins at block 7002, continues to block 7004 for accessing parameters of discard command "Operand" (BNF Grammar Operand) and "Parameters" (BNF Grammar Parameters), and then to block 7006 for getting the next (or first) system parameter (block 7006 starts an iterative loop for processing system(s)). At least one system parameter is required for the discard. If at least one system is not present for being processed by block 7006, then block 7006 will handle the error and continue to block 7062 for returning to the caller (not shown—considered obvious error handling, or was already validated at configuration time). Block 7006 continues to block 7008. If block 7008 determines that an unprocessed system parameter remains, then processing continues to block 7010. If block 7010 determines the system is not the MS of FIG. 70A processing, then MS2MS processing is used to accomplish the remote discard processing, in which case block 7010 continues to block 7012 for preparing parameters for FIG. 75A processing. Thereafter, block 7014 checks to see if there were any parameter errors since block 7012 also validates them prior to preparing them. If block 7014 determines there was at least one parameter error, then block 7016 handles the error appropriately (e.g. log error to LBX History 30 and/or notify user) and processing continues back to block 7006. If block 7014 determines there were no errors, then block 7018 invokes the procedure of FIG. 75A for sending the data (discard command, operand and parameters) for remote discard processing at the remote MS. Processing then continues back to block 7006. MS2MS processing is as already described above (see FIGS. 75A and 75B), except FIG. 75A performs sending data for the discard command to the remote MS for discarding sought operand dependent criteria at the remote MS, and FIG. 75B blocks 7578 through 7584 carry out processing specifically for the discard command. Block 7584 processes the discard command for discarding sought criteria in context of the Operand. In a preferred embodiment, the discard takes place when privileged, and when an ack parameter is not provided or is set to false.

Blocks 7574 and 7576 will return the results to the requesting MS of FIG. 75A processing when the ack parameter is set to true, and block 7510 will complete appropriate discard processing after prompting the user of the MS of FIG. 75A processing for whether or not to continue (just like blocks 7054 through 7060 discussed below). Note that block 7510 may include invoking the best application in the appropriate manner (e.g. like found in FIG. 70A) with the discard results returned when an acknowledgement (ack parameter) has been specified to true, or block 7510 may process results appropriately itself. Processing should be enabled for then continuing with the discard through another invocation of FIG. 75A (from block 7510 and a following processing of blocks 7578 through 7584 to do the discard) if the user chooses to do so. Block 7510 includes significant processing, all of which has been disclosed in FIG. 70A anyway and then included at block 7510 if needed there for ack processing.

In one embodiment, block 7018 causes processing at a remote data processing system which incorporates similar MS2MS processing, but the remote data processing system is not a MS (i.e. system parameter is for a data processing system identifier accessible to the MS of FIG. 70A processing). The remote data processing system may be a service data processing system, or any other data processing system capable of similar MS2MS processing as described for the discard command, perhaps involving search of storage, memory, or operating system resources which are shared by many MSs.

Referring back to block 7010, if it is determined that the system for processing is the MS of FIG. 70A processing, then processing continues to block 7020 for checking which "Operand" was passed. If block 7020 determines the "Operand" indicates to launch a search application for the sought operand with a standard contextual object type interface, then parameter(s) are validated at block 7022 and block 7024 checks the result. If block 7024 determines there was at least one error, then block 7016 handles the error appropriately (e.g. log error to LBX History 30 and/or notify user) and processing returns back to block 7006. If block 7024 determines there were no parameter errors, then block 7026 interfaces to the MS operating system to start the search application for the particular object passed as a parameter and then to continue with the discard for ack set to false, and to prompt for doing the discard for the prompt set to true. Block 7026 may prepare parameters in preparation for the operating system, for example if parameters are passed to the application which is invoked for discarding the object. Processing leaves block 7026 and returns to block 7006. An alternate embodiment processes like FIG. 69A wherein the application launched at block 7026 produces only a search result prior to continuing to block 7050. Then, the search result is discarded if there are no ambiguous results or the ack parameter is set to false, or there are ambiguous results and the user selects to continue, or the ack parameter is set to true and the user selects to continue. FIG. 70A demonstrates processing where the executable launched is an all inclusive processing. Likewise, FIG. 69A can be like FIG. 70A wherein the application launched handles the ack parameter appropriately. Different methods are disclosed for similar processing to highlight methods to carrying out processing for either one of the commands (Copy or Discard).

An example of block 7026 is similar to the Microsoft Windows XP association of applications to file types for convenient application launch, just as was described above for block 6616.

Referring back to block 7020, if it is determined the "Operand" does not indicate to launch with a standard contextual object type interface, processing continues to block 7028. If block 7028 determines the "Operand" indicates to perform a custom launch, then parameter(s) are validated at block 7030 and block 7032 checks the result. If block 7032 determines there was at least one error, then block 7016 handles the error appropriately (e.g. log error to LBX History 30 and/or notify user) and processing returns to block 7006. If block 7032 determines there were no parameter errors, then processing continues to block 7034.

If block 7034 determines the custom launch is not to use an Application Programming Interface (API) to launch the applicable search application for discarding the object passed as a parameter, then block 7036 prepares a command string for launching the particular application, block 7038 invokes the command string for launching the application, and processing continues to block 7006. An alternate embodiment processes like FIG. 69A wherein the application launched at block 7026 produces only a search result prior to continuing to block 7050. Then, the search result is discarded if there are no ambiguous results or the ack parameter is set to false, or there are ambiguous results and the user selects to continue, or the ack parameter is set to true and the user selects to continue. FIG. 70A demonstrates processing where the executable launched is an all inclusive processing (e.g. includes processing of blocks 7050 through 7060).

If block 7034 determines the custom launch is to use an Application Programming Interface (API) to launch the applicable application for discarding the object passed as a parameter, then block 7040 prepares any API parameters as necessary, block 7042 invokes the API for launching the application, and processing continues back to block 7006. An alternate embodiment processes like FIG. 69A wherein the application launched at block 7042 produces only a search result prior to continuing to block 7050. Then, the search result is discarded if there are no ambiguous results or the ack parameter is set to false, or there are ambiguous results and the user selects to continue, or the ack parameter is set to true and the user selects to continue. FIG. 70A demonstrates processing where the executable launched is an all inclusive processing (includes processing of blocks 7050 through 7060).

Referring back to block 7028, if it is determined that the "Operand" indicates to perform the discard command with other local processing, then parameter(s) are validated at block 7044 and block 7046 checks the result. If block 7046 determines there was at least one error, then block 7016 handles the error appropriately (e.g. log error to LBX History 30 and/or notify user) and processing returns to block 7006. If block 7046 determines there were no parameter errors, then block 7048 checks the operand for which discard processing to perform, and performs discard search processing appropriately. Thereafter, block 7050 checks the results.

Block 7050 checks the results of finding the source object for discard to ensure there are no ambiguous results (i.e. not sure what is being discarded since the preferred embodiment is to not discard more than a single operand object at a time). If block 7050 determines that there was an ambiguous search result, then processing continues to block 7052. If block 7050 determines there is no ambiguity, then processing continues to block 7054. If block 7054 determines the ack parameter is set to true, then processing continues to block 7052, otherwise processing continues to block 7060. Block 7054 checks the acknowledgement parameter passed to FIG. 70A processing. An alternate embodiment assumes that a plurality of results is valid and discards all results at the target system(s) (i.e. no ambiguous check). In another embodiment, an ambiguous result causes error handling at block 7016 (like FIG. 69A copy processing).

Block 7052 causes processing for waiting for a user action to either a) continue with the discard; or b) cancel the discard. Once the user action has been detected, processing continues to block 7056. Block 7052 provides a user reconciliation of whether or not to perform the discard. In another embodiment, there is no ack parameter and multiple results detected at block 7048 are handled for the discard.

If block 7056 determines the user selected to cancel processing, then block 7058 logs the cancellation (e.g. log error to LBX History 30) and processing returns to block 7006. If block 7056 determines the user selected to proceed with the discard, then processing continues to block 7060. Block 7060 performs the discard of the object(s) found at block 7048. Thereafter, processing continues back to block 7006.

Referring back to block 7008, if it is determined that there are no remaining unprocessed system parameters, then processing returns to the caller at block 7062.

In FIG. 70A, "Parameters" for the atomic discard command in accordance with the "Operand" were shown to be validated for being properly privileged prior to FIG. 70A processing (by FIG. 61 processing). However, an alternate embodiment could move some or all applicable privilege validation to FIG. 70A in context of where the "Parameters" are processed. Also, some embodiments may not validate "Parameters" since they (or some reasonable subset thereof) can be understood to be in good order by the time FIG. 70A processing occurs (e.g. no blocks 7022/7024 and/or 7030/7032 and/or 7044/7046 required). In yet another embodiment, some defaulting of parameters is implemented.

FIGS. 70B-1 through 70B-11 depicts a matrix describing how to process some varieties of the Discard command. Each row in the matrix describes processing apparatus and/or methods for carrying out command processing for certain operands (see FIG. 34D for the Operand which matches the number in the first column). The second column shows the Preferred Methodology (PM) for carrying out Discard command processing:

S=Standard contextual launch used (blocks 7020 through 7026);

C=Custom launch used (blocks 7028 through 7042);

O=Other processing (MS2MS or local) used (blocks 7044 through 7060, blocks 7012 through 7018).

Any of the Discard command operand combinations can be carried out with either of the methodologies. The second column shows a preferred methodology (PM). The third column describes processing which is placed into flowchart embodiments. There are many embodiments derived from the Discard processing descriptions without departing from the spirit and scope of the disclosure. Descriptions are self explanatory.

With reference back to FIGS. 31A through 31E, note that the column of information headed by "113" represents the parameters applicable for the Discard command. The Discard command has the following parameters, all of which are interpreted in context of the Operand:

first parameter(s)=This is required, and is in context of the Operand;

ack=Boolean for whether or not to prompt user for performing the discard, prior to doing the discard.

system(s)=One or more identities affected for the Discard command (e.g. MS ID or a data processing system identifier).

Discard command processing discussed thus far demonstrates multithreaded/multiprocessed processing for each system to search. In search results processing, for example when a plurality of results for discard are available, an application may be launched multiple times. For each system, the application itself is relied upon for handling multiple invocations. The application itself has intelligence to know it was re-launched thereby permitting a single resulting interface for multiple target system searches, regardless of the number of times the same search application was launched. In a preferred embodiment, discard processing permits multiple instances of a search application launched. In another embodiment, a user selects which of a plurality of results are to be discarded prior to discarding.

FIG. 70C depicts a flowchart for describing one embodiment of a procedure for Discard command action processing, as derived from the processing of FIG. 70A. All operands are implemented, and each of blocks D04 through D54 can be implemented with any one of the methodologies described with FIG. 70A, or any one of a blend of methodologies implemented by FIG. 70C.

FIG. 71A depicts a flowchart for describing a preferred embodiment of a procedure for Move command action processing. There are four (4) primary methodologies for carrying out move command search processing:

1) Launching an application, executable, or program with a standard contextual object type interface, for finding the source object(s) to move;
2) Custom launching of an application, executable, or program, for finding the source object(s) to move;
3) Processing the move command locally, for finding the source object(s) to move; or
4) MS to MS communications (MS2MS) of FIGS. 75A and 75B for finding the source object(s) to move.

The source parameter specifies which system is to be the source of the move: the MS of FIG. 71A processing or a remote data processing system.

There are two (2) primary methodologies for carrying out move command processing:

1) Using local processing;
2) MS to MS communications (MS2MS) of FIGS. 75A and 75B for remote processing.

In various embodiments, any of the move command Operands can be implemented with either of the methodologies, although there may be a preference of which methodology is used for which Operand. Atomic move command processing begins at block 7100, continues to block 7102 for accessing parameters of move command "Operand" (BNF Grammar Operand) and "Parameters" (BNF Grammar Parameters), and continues to block 7104.

If block 7104 determines the source system parameter (source) is this MS, then processing continues to block 7106. If block 7106 determines the "Operand" indicates to launch a search application for the sought operand object with a standard contextual object type interface, then parameter(s) are validated at block 7108 and block 7110 checks the result. If block 7110 determines there was at least one error, then block 7112 handles the error appropriately (e.g. log error to LBX History 30 and/or notify user) and processing returns to the caller (invoker) at block 7160. If block 7110 determines there were no parameter errors, then block 7114 interfaces to the MS operating system to start the search application for the particular object. Block 7114 may prepare parameters in preparation for the operating system. Processing leaves block 7114 and continues to block 7138 which is discussed below.

An example of block 7114 is similar to the Microsoft Windows XP association of applications to file types for convenient application launch, just as was described above for block 6616.

Referring back to block 7106, if it is determined the "Operand" does not indicate to launch with a standard contextual object type interface, processing continues to block 7116. If block 7116 determines the "Operand" indicates to perform a custom launch, then parameter(s) are validated at block 7118 and block 7120 checks the result. If block 7120 determines there was at least one error, then block 7112 handles the error appropriately (e.g. log error to LBX History 30 and/or notify user) and processing returns to the caller at block 7160. If block 7120 determines there were no parameter errors, then processing continues to block 7122.

If block 7122 determines the custom launch is not to use an Application Programming Interface (API) to launch the searching application for moving the object, then block 7124 prepares a command string for launching the particular application, block 7126 invokes the command string for launching the application, and processing continues to block 7138 discussed below.

If block 7122 determines the custom launch is to use an Application Programming Interface (API) to launch the applicable application for searching, then block 7128 prepares any API parameters as necessary, block 7130 invokes the API for launching the application, and processing continues to block 7138.

Referring back to block 7116, if it is determined that the "Operand" indicates to perform the move command with local search processing, then parameter(s) are validated at block 7132 and block 7134 checks the result. If block 7134 determines there was at least one error, then block 7112 handles the error appropriately (e.g. log error to LBX History 30 and/or notify user) and processing returns to the caller at block 7160. If block 7134 determines there were no parameter errors, then block 7136 searches for the operand object in context for the Operand, and processing continues to block 7138.

Block 7138 checks the results of finding the source object for moving to ensure there are no ambiguous results (i.e. not sure what is being moved since the preferred embodiment is to not move more than a single operand object at a time). If block 7138 determines there was an ambiguous search result, then processing continues to block 7112 for error handling as discussed above (e.g. in context for an ambiguous move since there were too many things to move). If block 7138 determines there is no ambiguous entity to move, block 7140 checks the acknowledgement parameter passed to FIG. 71A processing. An alternate embodiment assumes that a plurality of results is valid and moves all results to the target system(s) (i.e. no ambiguous check). In another embodiment, an ambiguous result relies on user reconciliation to reconcile whether or not to perform the move (like FIG. 70A discard processing).

If block 7140 determines the acknowledgement (ack) parameter is set to true, then block 7142 provides the search result which is to be moved. Thereafter, processing waits for a user action to either a) continue with the move; or b) cancel the move. Once the user action has been detected, processing continues to block 7144. Block 7142 provides a user reconciliation of whether or not to perform the move. In another embodiment, there is no ack parameter and multiple results detected at block 7138 forces processing into the reconciliation by the user. In yet another embodiment, the ack parameter is still provided, however multiple search results forces processing into the reconciliation by the MS user anyway for selecting which individual object shall be moved. In still other embodiments, all results are moved.

If block 7144 determines the user selected to cancel processing, then block 7146 logs the cancellation (e.g. log error to LBX History 30) and processing returns to the caller at block 7160. If block 7144 determines the user selected to proceed with the move, then processing continues to block 7148 for getting the next (or first) system parameter (block 7148 starts an iterative loop for processing system(s) for the move result). Also, if block 7140 determines that the ack parameter was set to false, then processing continues directly to block 7148. At least one system parameter is required for the move as validated by previous parameter validations. Block 7148 continues to block 7150.

If block 7150 determines that an unprocessed system parameter remains, then processing continues to block 7152. If block 7152 determines the system (target for move) is the MS of FIG. 71A processing, then block 7154 appropriately moves the source object to the system and processing continues back to block 7148. If block 7152 determines the system is not the MS of FIG. 71A processing, then MS2MS processing is used to accomplish the move processing to the remote data processing system (e.g. MS), in which case block 7156 prepares parameters for FIG. 75A processing, and block 7158 invokes the procedure of FIG. 75A for sending the data (move command, operand, and search result) for remote move processing at the remote MS. Processing then continues back to block 7148. MS2MS processing is as already described above (see FIGS. 75A and 75B), except FIG. 75A performs sending data for the move action to the remote MS for moving sought operand dependent criteria to the remote MS, and FIG. 75B blocks 7578 through 7584 carry out processing specifically for the move processing. Block 7584 processes the move of the search result from FIG. 71A to the system of FIG. 75B processing.

Referring back to block 7104, if it is determined the source parameter is not for this MS, then block 7162 prepares parameters for FIG. 75A processing. Thereafter, block 7164 checks to see if there were any parameter errors since block 7162 also validates them prior to preparing them. If block 7164 determines there was at least one parameter error, then block 7112 handles the error appropriately (e.g. log error to LBX History 30 and/or notify user) and processing returns to the caller at block 7160. If block 7164 determines there were no errors, then block 7166 invokes the procedure of FIG. 75A for sending the data (move command, operand and parameters) for remote move search processing at the remote MS. Processing then continues to block 7138. In one embodiment, the object(s) to move are discarded from the source system (via block 7166) in preparation for the move command processing at blocks 7154 and 7158. In another embodiment, the object(s) to move will be discarded from the source system when completing move processing at blocks 7154 or 7158. MS2MS processing via block 7166 is as already described above (see FIGS. 75A and 75B), except FIG. 75A performs searching for data for the move command at the remote MS, and FIG. 75B blocks 7578 through 7584 carry out processing specifically for at least the move command search processing for the source system. Block 7584 processes the move command for finding the object to move in context of the Operand. Blocks 7574 and 7576 will return the results to the requesting MS of FIG. 75A processing, and block 7510 will complete appropriate move search processing so that FIG. 71A processing receives the search results. FIG. 75A can convey the found object(s) for the move by returning from a function interface (the send procedure being a function), returning to a file, setting data visible to both processes, etc. Note that block 7510 may include application launch processing (e.g. like found in FIG. 71A) for invoking the best application in the appropriate manner for determining move search results returned from FIG. 75B processing, or block 7510 may process returned results itself.

In one embodiment, block 7166 causes processing at a remote data processing system which incorporates similar MS2MS processing, but the remote data processing system is not a MS (i.e. system parameter is for a data processing system identifier accessible to the MS of FIG. 71A processing). The remote data processing system may be a service data processing system, or any other data processing system capable of similar MS2MS processing as described for the find command, perhaps involving search of storage, memory, or operating system resources which are shared by many MSs.

By the time processing reaches block 7138 from any previous FIG. 71A processing, a search result is communicated to processing and any launched executable (application) for searching for the move object(s) has terminated. Search results can be passed back as a function return, placed to a well known directory, placed to a file, placed to interfaced variable(s), or other communications of the result to further processing. Regardless of the embodiment, search results are accessed at block 7138. An alternate embodiment is like FIG. 70A wherein the application/processing invoked at blocks 7114, 7126, 7130 and 7136 handles the ack parameter and ambiguous results appropriately (i.e. no need for blocks 7138 through 7158) to proceed with completing the move (processing of blocks 7138 through 7158 incorporated). Different methods are disclosed for similar processing to highlight methods for carrying out processing for either one of the commands (Move or Discard).

In one embodiment, blocks 7156 and 7158 cause processing at a remote data processing system which incorporates similar MS2MS processing, but the remote data processing system is not a MS (i.e. system parameter is for a data processing system identifier accessible to the MS of FIG. 71A processing). The remote data processing system may be a service data processing system, or any other data processing system capable of similar MS2MS processing as described for the move command, perhaps involving storage, memory, or operating system resources which are shared by many MSs.

Referring back to block 7150, if it is determined that there are no remaining unprocessed system parameters, then processing returns to the caller at block 7160.

In FIG. 71A, "Parameters" for the atomic move command in accordance with the "Operand" were shown to be validated for being properly privileged prior to FIG. 71A processing (by FIG. 61 processing). However, an alternate embodiment could move some or all applicable privilege validation to FIG. 71A in context of where the "Parameters" are processed. Also, some embodiments may not validate "Parameters" since they (or some reasonable subset thereof) can be understood to be in good order by the time FIG. 71A processing occurs (e.g. no blocks 7108/7110 and/or 7118/7120 and/or 7132/7134 required). In yet another embodiment, some defaulting of parameters is implemented.

The first parameter may define a plurality of entities to be moved when the object inherently contains a plurality (e.g. directory, container). In an alternate embodiment, the search results for moving can be plural without checking for ambiguity at block 7138, in which case all results returned will be moved to the target systems.

FIGS. 71B-1 through 71B-14 depicts a matrix describing how to process some varieties of the Move command. The end result of a move command is identical to "Copy" command processing except the source is "Discard"-ed as part of processing (preferably after the copy). Each row in the matrix describes processing apparatus and/or methods for carrying out command processing for certain operands (see FIG. 34D for the Operand which matches the number in the first column). The second column shows the Preferred Methodology (PM) for carrying out Move command processing:

S=Standard contextual launch used (blocks 7106 through 7114);

C=Custom launch used (blocks 7116 through 7130);

O=Other processing used (e.g. block 7136).

Any of the Move command operand combinations can be carried out with either of the methodologies. The second column shows a preferred methodology (PM). The third column describes processing which is placed into flowchart embodiments. There are many embodiments derived from the Move processing descriptions without departing from the spirit and scope of the disclosure. Descriptions are self explanatory.

With reference back to FIGS. 31A through 31E, note that the column of information headed by "115" represents the parameters applicable for the Move command. The Move command has the following parameters, all of which are interpreted in context of the Operand:

first parameter(s)=This is required, and is in context of the Operand;

ack=Boolean for whether or not to prompt user for performing the move, prior to doing the move.

source=A source identity for the Move command (e.g. MS ID or a data processing system identifier);

system(s)=One or more destination identities for the Move command (e.g. MS ID or a data processing system identifier).

In an alternate embodiment, an additional parameter is provided for specifying the target destination of the system for the move. For example, a directory can be placed to a target path, an email can be placed to a target folder, etc.

FIG. 71C depicts a flowchart for describing one embodiment of a procedure for Move command action processing, as derived from the processing of FIG. 71A. All operands are implemented, and each of blocks M04 through M54 can be implemented with any one of the methodologies described with FIG. 71A, or any one of a blend of methodologies implemented by FIG. 71C.

FIG. 72A depicts a flowchart for describing a preferred embodiment of a procedure for Store command action processing. There are four (4) primary methodologies for carrying out store command processing:

1) Launching an application, executable, or program with a standard contextual object type interface;
2) Custom launching of an application, executable, or program;
3) Processing the store command locally; or
4) Using MS to MS communications (MS2MS) of FIGS. 75A and 75B for storing remotely.

In various embodiments, any of the store command Operands can be implemented with either one of the methodologies, although there may be a preference of which methodology is used for which Operand. Atomic store command processing begins at block 7202, continues to block 7204 for accessing parameters of store command "Operand" (BNF Grammar Operand) and "Parameters" (BNF Grammar Parameters), and then to block 7206 for getting the next (or first) system parameter (block 7206 starts an iterative loop for processing system(s)). At least one system parameter is required for the store command. If at least one system is not present for being processed by block 7206, then block 7206 will handle the error and continue to block 7250 for returning to the caller (not shown—considered obvious error handling, or was already validated at configuration time). Block 7206 continues to block 7208. If block 7208 determines that an unprocessed system parameter remains, then processing continues to block 7210. If block 7210 determines the system is not the MS of FIG. 72A processing, then MS2MS processing is needed to accomplish the remote store processing, in which case block 7210 continues to block 7212 for preparing parameters for FIG. 75A processing. Thereafter, block 7214 checks to see if there were any parameter errors since block 7212 also validates them prior to preparing them. If block 7214 determines there was at least one parameter error, then block 7216 handles the error appropriately (e.g. log error to LBX History 30 and/or notify user) and processing continues back to block 7206. If block 7214 determines there were no errors, then block 7218 invokes the procedure of FIG. 75A for sending the data (store command, operand and parameters) for remote store processing at the remote MS. Processing then continues back to block 7206. MS2MS processing is as already described above (see FIGS. 75A and 75B), except FIG. 75A performs sending data for the store command to the remote MS for storing operand dependent criteria at the remote MS, and FIG. 75B blocks 7578 through 7584 carry out processing specifically for the store command. Block 7584 processes the store command for storing in context of the Operand.

In one embodiment, block 7218 causes processing at a remote data processing system which incorporates similar MS2MS processing, but the remote data processing system is not a MS (i.e. system parameter is for a data processing system identifier accessible to the MS of FIG. 72A processing). The remote data processing system may be a service data processing system, or any other data processing system capable of similar MS2MS processing as described for the store command, perhaps involving search of storage, memory, or operating system resources which are shared by many MSs.

Referring back to block 7208, if it is determined that the system for processing is the MS of FIG. 72A processing, then processing continues to block 7220 for checking which "Operand" was passed. If block 7220 determines the "Operand" indicates to launch a store application for the sought operand with a standard contextual object type interface, then parameter(s) are validated at block 7222 and block 7224 checks the result. If block 7224 determines there was at least one error, then block 7216 handles the error appropriately (e.g. log error to LBX History 30 and/or notify user) and processing returns back to block 7206. If block 7224 determines there were no parameter errors, then block 7226 interfaces to the MS operating system to start the storing application for the particular object passed as a parameter. Block 7226 may prepare parameters in preparation for the operating system, for example if parameters are passed to the application which is invoked for storing the object. Processing leaves block 7226 and returns to block 7206.

An example of block 7226 is similar to the Microsoft Windows XP association of applications to file types for convenient application launch, just as was described above for block 6616.

Referring back to block 7220, if it is determined the "Operand" does not indicate to launch with a standard contextual object type interface, processing continues to block 7228. If block 7228 determines the "Operand" indicates to perform a custom launch, then parameter(s) are validated at block 7230 and block 7232 checks the result. If block 7232 determines there was at least one error, then block 7216 handles the error appropriately (e.g. log error to LBX History 30 and/or notify user) and processing returns to block 7206. If block 7232 determines there were no parameter errors, then processing continues to block 7234.

If block 7234 determines the custom launch is not to use an Application Programming Interface (API) to launch the applicable application for storing the object passed as a parameter, then block 7236 prepares a command string for launching the particular application, block 7238 invokes the command string for launching the application, and processing continues to block 7206.

If block 7234 determines the custom launch is to use an Application Programming Interface (API) to launch the applicable application for storing the object passed as a parameter, then block 7240 prepares any API parameters as necessary, block 7242 invokes the API for launching the application, and processing continues back to block 7206.

Referring back to block 7228, if it is determined that the "Operand" indicates to perform the store command with other local processing, then parameter(s) are validated at block 7244 and block 7246 checks the result. If block 7246 determines there was at least one error, then block 7216 handles the error appropriately (e.g. log error to LBX History 30 and/or notify user) and processing returns to block 7206. If block 7246 determines there were no parameter errors, then block 7248 checks the operand for which store processing to perform, and performs store processing appropriately. Processing then continues back to block 7206.

Referring back to block 7206, if it is determined that there are no remaining unprocessed system parameters, then processing returns to the caller at block 7250.

In FIG. 72A, "Parameters" for the atomic store command in accordance with the "Operand" were shown to be validated for being properly privileged prior to FIG. 72A processing (by FIG. 61 processing). However, an alternate embodiment could move some or all applicable privilege validation to FIG. 72A in context of where the "Parameters" are processed. Also, some embodiments may not validate "Parameters" since they (or some reasonable subset thereof) can be understood to be in good order by the time FIG. 72A processing occurs (e.g. no blocks 7222/7224 and/or 7230/7232 and/or 7244/7246 required). In yet another embodiment, some defaulting of parameters is implemented.

FIGS. 72B-1 through 72B-5 depicts a matrix describing how to process some varieties of the Store command. Each row in the matrix describes processing apparatus and/or methods for carrying out command processing for certain operands (see FIG. 34D for the Operand which matches the number in the first column). The second column shows the Preferred Methodology (PM) for carrying out Store command processing:

S=Standard contextual launch used (blocks 7220 through 7226);

C=Custom launch used (blocks 7228 through 7242);

O=Other processing (MS2MS or local) used (blocks 7244 through 7248, blocks 7212 through 7218).

Any of the Store command operand combinations can be carried out with either of the methodologies. The second column shows a preferred methodology (PM). The third column describes processing which is placed into flowchart embodiments. There are many embodiments derived from the Store processing descriptions without departing from the spirit and scope of the disclosure. Descriptions are self explanatory.

With reference back to FIGS. 31A through 31E, note that the column of information headed by "117" represents the parameters applicable for the Store command. The Store command has the following parameters, all of which are interpreted in context of the Operand:

first parameter(s)=These are required, and are in context of the Operand;

system(s)=One or more destination identities for the Store command (e.g. MS ID or a data processing system identifier).

In an alternate embodiment, an ack parameter is provided for proving a user reconciliation of the store processing (like ack parameter in other commands) wherein the reconciliation preferably presents the proposed store operation in an informative manner so that the user can make an easy decision to proceed or cancel.

FIG. 72C depicts a flowchart for describing one embodiment of a procedure for Store command action processing, as derived from the processing of FIG. 72A. All operands are implemented, and each of blocks R04 through R54 can be implemented with any one of the methodologies described with FIG. 72A, or any one of a blend of methodologies implemented by FIG. 72C.

FIG. 73A depicts a flowchart for describing a preferred embodiment of a procedure for Administrate command action processing. There are four (4) primary methodologies for carrying out administrate command processing:

1) Launching an application, executable, or program with a standard contextual object type interface;
2) Custom launching of an application, executable, or program;
3) Processing the administrate command locally; or
4) Using MS to MS communications (MS2MS) of FIGS. 75A and 75B for remote administration.

In various embodiments, any of the administrate command Operands can be implemented with either one of the methodologies, although there may be a preference of which methodology is used for which Operand. Atomic administrate command processing begins at block 7302, continues to block 7304 for accessing parameters of administrate command "Operand" (BNF Grammar Operand) and "Parameters" (BNF Grammar Parameters), and then to block 7306 for getting the next (or first) system parameter (block 7306 starts an iterative loop for processing system(s)). At least one system parameter is required for the administrate command. If at least one system is not present for being processed by block 7306, then block 7306 will handle the error and continue to block 7350 for returning to the caller (not shown—considered obvious error handling, or was already validated at configuration time). Block 7306 continues to block 7308. If block 7308 determines that an unprocessed system parameter remains, then processing continues to block 7310. If block 7310 determines the system is not the MS of FIG. 73A processing, then MS2MS processing is needed to accomplish the remote administration processing, in which case block 7310 continues to block 7312 for preparing parameters for FIG. 75A processing. Thereafter, block 7314 checks to see if there were any parameter errors since block 7312 also validates them prior to preparing them. If block 7314 determines there was at least one parameter error, then block 7316 handles the error appropriately (e.g. log error to LBX History 30 and/or notify user) and processing continues back to block 7306. If block 7314 determines there were no errors, then block 7318 invokes the procedure of FIG. 75A for sending the data (administrate command, operand and parameters) for remote administrate processing at the remote MS. Processing then continues back to block 7306. MS2MS processing is as already described above (see FIGS. 75A and 75B), except FIG. 75A performs sending data for the administrate command to the remote MS for searching for sought operand dependent criteria at the remote MS, and FIG. 75B blocks 7578 through 7584 carry out processing specifically for the administrate command search result. Block 7584 processes the administrate command for searching for sought criteria in context of the Operand. Blocks 7574 and 7576 will return the results to the requesting MS of FIG. 75A processing, and block 7510 will complete appropriate administrate processing. Note that block 7510 may include application launch processing (e.g. like found in FIG. 73A) for invoking the best application in the appropriate manner with the administrate results returned. The application should be enabled for searching remote MSs further if the user chooses to do so, and be enabled to perform the privileged administration. Another embodiment of block 7510 processes the search results and displays them to the user for subsequent administration in an optimal manner. In some embodiments, administrate processing is spawned at the remote MS and the interface results are presented to the remote user. In preferred embodiments, the administrate processing results interface is presented to the user of FIG. 73A processing for subsequent administration. In some embodiments, administrate processing is passed an additional parameter for whether or not to spawn the search interface at the remote MS for the benefit of the remote MS user, or to spawn locally for the benefit of the user of the MS of FIG. 73A processing. Block 7510 may process results itself.

In one embodiment, block 7318 causes processing at a remote data processing system which incorporates similar MS2MS processing, but the remote data processing system is not a MS (i.e. system parameter is for a data processing system identifier accessible to the MS of FIG. 73A processing). The remote data processing system may be a service data processing system, or any other data processing system capable of similar MS2MS processing as described for the administrate command, perhaps involving search of storage, memory, or operating system resources which are shared by many MSs.

Referring back to block 7310, if it is determined that the system for processing is the MS of FIG. 73A processing, then processing continues to block 7320 for checking which "Operand" was passed. If block 7320 determines the "Operand" indicates to launch the administration application for the sought operand with a standard contextual object type interface, then parameter(s) are validated at block 7322 and block 7324 checks the result. If block 7324 determines there was at least one error, then block 7316 handles the error appropriately (e.g. log error to LBX History 30 and/or notify user) and processing returns back to block 7306. If block 7324 determines there were no parameter errors, then block 7326 interfaces to the MS operating system to start the administration application for the particular object passed as a parameter. Block 7326 may prepare parameters in preparation for the operating system, for example if parameters are passed to the application which is invoked for administration of the object. Processing leaves block 7326 and returns to block 7306.

An example of block 7326 is similar to the Microsoft Windows XP association of applications to file types for convenient application launch, just as was described above for block 6616.

Referring back to block 7320, if it is determined the "Operand" does not indicate to launch with a standard contextual object type interface, processing continues to block 7328. If block 7328 determines the "Operand" indicates to perform a custom launch, then parameter(s) are validated at block 7330 and block 7332 checks the result. If block 7332 determines there was at least one error, then block 7316 handles the error appropriately (e.g. log error to LBX History 30 and/or notify user) and processing returns to block 7306. If block 7332 determines there were no parameter errors, then processing continues to block 7334.

If block 7334 determines the custom launch is not to use an Application Programming Interface (API) to launch the applicable administration application for administration of the object passed as a parameter, then block 7336 prepares a command string for launching the particular application, block 7338 invokes the command string for launching the application, and processing continues to block 7306.

If block 7334 determines the custom launch is to use an Application Programming Interface (API) to launch the applicable application for administration of the object passed as a parameter, then block 7340 prepares any API parameters as necessary, block 7342 invokes the API for launching the application, and processing continues back to block 7306.

Referring back to block 7328, if it is determined that the "Operand" indicates to perform the administrate command with other local processing, then parameter(s) are validated at block 7344 and block 7346 checks the result. If block 7346 determines there was at least one error, then block 7316 handles the error appropriately (e.g. log error to LBX History 30 and/or notify user) and processing returns to block 7306. If block 7346 determines there were no parameter errors, then block 7348 checks the operand for which administration processing to perform, and performs administration processing appropriately. Processing then continues back to block 7306.

Referring back to block 7306, if it is determined that there are no remaining unprocessed system parameters, then processing returns to the caller at block 7350.

In FIG. 73A, "Parameters" for the atomic administrate command in accordance with the "Operand" were shown to be validated for being properly privileged prior to FIG. 73A processing (by FIG. 61 processing). However, an alternate embodiment could move some or all applicable privilege validation to FIG. 73A in context of where the "Parameters" are processed. Also, some embodiments may not validate "Parameters" since they (or some reasonable subset thereof) can be understood to be in good order by the time FIG. 73A processing occurs (e.g. no blocks 7322/7324 and/or 7330/7332 and/or 7344/7346 required). In yet another embodiment, some defaulting of parameters is implemented.

FIGS. 73B-1 through 73B-7 depicts a matrix describing how to process some varieties of the Administrate command. Each row in the matrix describes processing apparatus and/or methods for carrying out command processing for certain operands (see FIG. 34D for the Operand which matches the number in the first column). The second column shows the Preferred Methodology (PM) for carrying out Administrate command processing:

S=Standard contextual launch used (blocks 7320 through 7326);

C=Custom launch used (blocks 7328 through 7342);

O=Other processing (MS2MS or local) used (blocks 7344 through 7348, blocks 7310 through 7318).

Any of the Administrate command operand combinations can be carried out with either of the methodologies. The second column shows a preferred methodology (PM). The third column describes processing which is placed into flowchart embodiments. There are many embodiments derived from the Administrate processing descriptions without departing from the spirit and scope of the disclosure. Descriptions are self explanatory.

With reference back to FIGS. 31A through 31E, note that the column of information headed by "121" is not shown. However, it is assumed to be present ( . . . ). The Administrate command has the following parameters, all of which are interpreted in context of the Operand:

first parameter(s)=These are required, and are in context of the Operand;

system(s)=One or more destination identities for the Administrate command (e.g. MS ID or a data processing system identifier).

FIG. 73C depicts a flowchart for describing one embodiment of a procedure for Administrate command action processing, as derived from the processing of FIG. 73A. All operands are implemented, and each of blocks A04 through A54 can be implemented with any one of the methodologies described with FIG. 73A, or any one of a blend of methodologies implemented by FIG. 73C.

Administrate command processing discussed thus far demonstrates multithreaded/multiprocessed processing for each system to perform administration. In one embodiment, the same methodology is used for each system and each launched administrate processing saves results to a common format and destination. In this embodiment, block 7308 processing continues to a new block 7349 when all systems are processed. New block 7349 gathers the superset of administrate results saved, and then launches an application (perhaps the same one that was launched for each administrate) to show all results found asynchronously from each other. The application launched will be launched with the same choice of schemes as blocks 7320 through 7350. Block 7349 then continues to block 7350. This design will want all applications invoked to terminate themselves after saving search results appropriately. Then, the new block 7349 starts a single administration application to present all search results for performing the administration.

In another embodiment, while an application may be launched multiple times for each system, the application itself is relied upon for handling multiple invocations. The application itself has intelligence to know it was re-launched thereby permitting a single resulting interface for multiple target system searches, regardless of the number of times the same search application was launched.

In one preferred embodiment, administrate processing permits multiple instances of a search application launched. Administrate processing is treated independently (this is shown in FIG. 73A).

Preferably all administrate command embodiments provide the ability to perform other commands (e.g. Copy, Move, Discard, Change, . . . ) wherever possible from the resulting interface in context for each search result found.

There are many other reasonable commands (and operands), some of which may intersect processing by other commands. For example, there is a change command. The change command can be described by operand as the other commands were, except the change command has identical processing to other commands for a particular operand. There are multiple commands duplicated with the change command, depending on the operand of the change command (like Connect command overlap of functionality). FIG. 74A depicts a flowchart for describing a preferred embodiment of a procedure for Change command action processing, and FIG. 74C depicts a flowchart for describing one embodiment of a procedure for Change command action processing, as derived from the processing of FIG. 74A.

Charters certainly provide means for a full spectrum of automated actions from simple predicate based (conditional) alerts to complex application processing. Actions includes API invocations, executable script invocations (e.g. from command line), executable program invocations, O/S contextual launch executions, integrated execution processing (e.g. part of block processing), or any other processing executions. As incoming WDRs indicate that a MS (MS user) of interest is nearby, charters provide the mechanism for the richest possible executions of many varieties to be automatically processed. From as simple a use as generating nearby/nearness/distantness status to performing a complicated set of processing based on nearby/nearness/distantness relative a MS user, there is no limit to the processing that can occur. All of the processing is handled locally by the MS and no connected service was required.

A first LBX enabled MS with phone capability can have a charter configuration for automatically placing a call to a second LBX enabled MS user upon determining that the second MS is close by the first MS user, for example when both users are coincidentally nearby each other. Perhaps the users are in a store at the same time, or are attending an event without knowledge of each other's attendance. It is "cool" to be able to cause an automatic phone call for connecting the users by conversation to then determine that they should "hook up" since they are nearby. Furthermore, a charter at the first MS can be configured wherein the first MS automatically dials/calls the second MS user, or alternatively a charter at the first MS can be configured wherein the second MS automatically dials/calls the first MS user, provided appropriate privileges are in place.

FIG. 76A depicts a flowchart for describing a preferred embodiment of processing a special Term (BNF Grammar Term: WDRTerm, AppTerm, atomic term, map term, etc) information paste action at a MS. Special paste action processing begins at block 7602 upon detection of a user invoked action to perform a special paste using Term information. Depending on the embodiment, FIG. 76A processing is integrated into the MS user interface processing, either as presentation manager code, a plug-in, TSR (Terminate and Stay Resident) code, or other method for detecting applicable user input at the MS (e.g. keystroke(s), voice command, etc). Unique paste requests (user actions) cause processing to start at block 7602. Block 7602 continues to block 7604 where the most recent Term information for the MS of FIG. 76A processing is accessed, then to block 7606 to see if the referenced value for the paste is set. Block 7604 access to a WDR may be for a particular most recent in-process WDR (inbound, outbound, inserted to queue 22, etc) depending on the paste request. A most recent inbound WDR may be most recently inserted to queue 22 from another MS, or may be accessed from LBX History 30. A most recent outbound WDR may be accessed from LBX History 30. A most recent in-process WDR may be most recently inserted to queue 22 regardless of originator.

Depending on when a user invokes the special paste option, the sought Term for pasting may not have a value set yet (e.g. AppTerm newly registered). If block 7606 determines the Term has not yet been set with a value, then block 7608 defaults the value for paste, otherwise block 7606 continues to block 7610. Block 7608 may or may not choose to default with an obvious value for "not set yet" before continuing to block 7610. If block 7610 determines the Term to be pasted is a WDRTerm, then processing continues to block 7612 where the WTV is accessed, and then to block 7614 to see how timely the most recent WDR accessed at block 7604 is for describing whereabouts of the MS. If block 7614 determines the WDR information is not out of date with respect to the WTV (i.e. whereabouts information is timely), then block 7616 pastes the WDR information according to the special paste action causing execution of FIG. 76A. If there is no data entry field in focus at the MS at the time of FIG. 76A processing, then an error occurs at block 7616 which is checked for at block 7618. If block 7618 determines the WDR information paste operation was successful, processing terminates at block 7622, otherwise processing continues to block 7624. If block 7624 determines an image frame is not in the focused object, then processing continues to block 7620 which provides the user with an error that there is no appropriate target in focus applicable for the paste operation. The error may require a user acknowledgement to clear the error to ensure the user sees the error. Block 7620 then continues to block 7622.

If block 7624 determines an image lies in the focused object, then processing continues to block 7626A. Block 7624 accesses appropriate status or data processing indication for knowing an image (frame) is in the user interface context. There are a variety of MS applications where an image is detected for being present in the focused user interface. These applications include:

- MS camera mode after just taking a snapshot of an image (a frame);
- MS browse of a snapshot image previously taken;
- MS camcorder/video while in standby or record mode;
- MS browse/review of a previously recorded video image stream (a plurality of frames);
- MS edit of a snapshot image;
- MS edit of an image stream; or
- Any other application context where some image is currently presented to the MS user interface.

Block 7626A updates a movable MS cursor with the data to be pasted in the appropriate format, and the user can then position the cursor for proper placement over a desired location of the image at block 7626B. Appropriate user interface control is provided for user navigation for a desired paste target area, preferably while showing at the movable cursor what is to be pasted (e.g. paste data moves with cursor) with proper size and appearance. Further user input control may be provided for changing the font of text, paste data boldness, artistic appearance, content, or any other visual appearance. When the user is satisfied with placement and appearance at block 7626B, the user accepts the placement (e.g. user acceptance action) and processing continues to block 7626C where the application context is notified to perform an update of the image with the paste data and the application then prompts the user for whether or not he wants to save the change at block 7626D. Thereafter, block 7626E determines if the user selected to save the modified image (frame(s)), in which case the image (frame(s)) is saved at block 7626F and paste operation processing terminates at block 7622, otherwise block 7626E continues directly to block 7622. There are various embodiments of when the FIG. 76A paste processing notifies the MS application to take over processing for the paste operation. In fact, FIG. 76A may notify the application at the earliest time, and a block 7626 (generally covers blocks 7626A through 7628F) notifies the application to take over processing for the paste operation. After such a block 7626 notifies the application to take over the paste operation, FIG. 76A processing terminates at block 7622. Block 7626 may or may not modify the cursor prior to notifying the application to take over paste processing.

If at block 7614 it is determined the user attempted to paste WDR information from an untimely WDR, then block 7615 provides the user with a warning, preferably including how stale the WDR information is, and processing waits for a user action to proceed with the paste, or cancel the paste. Thereafter, if block 7617 determines the user selected to cancel the paste operation, then processing terminates at block 7622, otherwise processing continues to block 7616. Alternatively, block 7612 may access a different timeliness variable, or perhaps one set up in advance specifically for paste operations.

Referring back to block 7610, if it is determined the paste operation is not for a WDRTerm, then processing continues directly to block 7616 for pasting the other Term construct terms being referenced by the paste operation (i.e. atomic term, AppTerm, map term, etc).

FIG. 76A processes special paste commands for pasting Term information to is focused user interface objects (e.g. data entry fields) of the MS user interface from Term data maintained at the MS. In a preferred embodiment, queue 22 is accessed for the most recent WDR at block 7604 when a WDRTerm (WDR field/subfield) is referenced. In another embodiment, a single WDR entry for the most recent WDR information is accessed at block 7604. In a preferred embodiment, there are a plurality of special paste commands detected and each command causes pasting the associated Term information field(s) in an appropriate format to the currently focused user interface data entry field or frame(s). In a picture application, a single frame is affected with the change. In a video/stream application, a user designated set of frames (one or more) are affected. There can be a command (user input) for pasting any Term (e.g. WDR) field(s) in a particular format to the currently focused data entry field. In another embodiment, one or more fields are accessed at block 7616 and then used to determine an appropriate content for the paste operation to the currently focused data entry field. For example, there can be a special keystroke sequence (<Ctrl><Alt><l>) to paste a current location (e.g. WDRTerm WDR field 1100*c*) to the currently focused data entry field, a special keystroke sequence (<Ctrl><Alt><s>) to paste a current situational location to the currently focused data entry field (e.g. my most recent atomic term situational location), a special keystroke sequence (<Ctrl><Alt><l>) to paste the MS ID of the most recently received WDR, a special keystroke sequence (<Ctrl><Alt><c>) to paste a confidence (e.g. WDRTerm WDR field 1100*d*) to the currently focused data entry field, a special keystroke sequence (<Ctrl><Alt><e>) to paste a current email source address from the WDR application fields section of the WDR, a special keystroke sequence (<Ctrl><Alt><F1>) to paste a current email source address from the WDR application fields section of the WDR, a special keystroke sequence (<Ctrl><Alt><1>) to paste a current statistical atomic term, etc. There can be a user input for pasting any Term data including from WDRs, atomic terms, Application Terms, map terms, most recent Invocation, etc.

In another embodiment, the keystroke sequence for the particular paste operation includes a keystroke as defined in a prefix 5300*a*, or in a new record field 5300*i* for an application, so that particular application field(s) are accessible (e.g. AppTerm data field(s) and/or corresponding WDR Application fields 1100*k*). Depending on an embodiment, the keystroke sequence(s) field 5300*i* may define a start sequence for applicable paste commands, or may define the directory of valid paste keystroke command sequences. In some embodiments, field 5300*i* provides a joining identifier to another table for joining a plurality of rows containing unique paste commands associated to the PRR 5300. In other embodiments, there are special paste actions for LBX maintained statistics, whereabouts information averages, or any other useful current or past LBX data, including from LBX History 30. In another embodiment, there are special paste actions for predicted data which is based on current and/or past LBX data, for example using an automated analysis of a plurality of WDRs, application terms, atomic terms, map terms, statistics, or information thereof. In some embodiments, special paste commands are available for the nearest N MSs (MS users) where "N" forms part of the paste command. For example, the nearest 3 users' data is pasted into a captured image at the MS for automatically documenting (as part of the image) LBX data appropriate for the picture taken by the MS (e.g. the 3 LBX enabled MS users taken in the photo). Unique paste commands (user input) may be created to access any available LBX data, in any format, combinations thereof, and any data that can be derived from available LBX data.

Paste operations are a convenient method using the wealth of LBX processing data in MS application interfaces. Paste commands also provide an excellent mechanism for component testing lbxPhone™ features. Paste commands may be configured as saved keystrokes for later execution by an application which automates LBX data access (e.g. macro, user input recording file, etc which may or may not be used by an atomic command for automated processing).

Paste operations provide convenient methods for informative markings to photographs and videos. Location, date/time, who is in the vicinity (e.g. those nearby for picture just taken), options, landmark(s), and historical information can be accessed by a unique paste command in a particular context. MS assets such as queue 22, LBX History 30, etc can be accessed with specific paste commands for desired information, even when wanting plural data across a plurality of WDRs or MSs. For example, a paste command can be provided to provide the nearest N MS identifiers in the desired appfld.source.id.X format from queue 22, wherein N is part of the paste command request (e.g. <ctrl><*><3> provides nearest 3 MSs email identifiers and formats it to a text string for convenient paste to the image or data entry field).

Furthermore, paste commands described by FIG. 76A can be used to paste the current zip code, city, county, state, address, etc. which has been converted from WDR location information using the geo-coding conversion tables. This provides a user with the ability to paste current accurate address information into MS user interfaces without actually knowing where he is located at the time.

FIG. 76B-1 illustrates a preferred embodiment of Application term interface processing used by WITS processing, FIG. 76A paste processing, or any other MS processing for access to a BNF grammar AppTerm. Shared memory 7630 contains AppTerm variables/data and associated description information. Shared memory 7630 is preferably MS shared memory accessible to any MS executable process (and threads thereof) through an appropriate MS O/S shared memory interface using a well known global shared memory name. As well known to those skilled in the art, a thread which accesses shared memory 7630 uses the shared memory name to get a handle to the shared memory for subsequent access to data therein. Appropriate control (e.g. semaphore(s)) is used when accessing shared memory 7630 to ensure synchronous access across a plurality of asynchronous threads. In alternate embodiments accomplishing the same functionality, shared memory 7630 is an SQL database, tabular database, shared data area, or other thread-safe memory means for "middle-manning" data access. Depending on an embodiment, shared memory 7630 includes PRRs 5300 or is separately maintained from PRRs 5300. Depending on an embodiment, shared memory 7630 may reside in main memory 56, persistent storage 60, removable storage device 62, or any variety of memory accessible to the MS locally, or remotely at an other data processing system 72.

An AppTerm configuration processing thread 7632 (e.g. integrated with PRR configuration of FIG. 55A) updates shared memory 7630 to correspond with PRR 5300 configurations. As discussed above, an AppTerm is accessed with a configured prefix which corresponds to a particular application. Prefixes are unique across PRRs 5300. A prefix prevents conflict between a plurality of applications which happen to use the same source code variable name (prefix field 5300*a* is unique) used for the data reference. Shared memory 7630 contains a plurality of shared memory records 7650 for properly interfacing between applications and threads 7632 through 7636. Shared memory 7630 may be of a worst case size to accommodate a maximum number of AppTerm enabled applications by: a) a maximum array size of records 7650; b) a maximum sized array of pointers to records 7650; c) a memory pointer to a) or b); or a suitable means for maintaining records 7650. Pointers kept within shared memory 7630 preferably point to dynamically allocated memory which should be appropriately freed, for example upon application termination, or AppTerm removal (e.g. field 5300*g* removes AppTerm to expose).

With reference now to FIG. 76C, illustrated is a preferred embodiment of Application term shared memory records, namely shared main record 7650 and shared reference record 7652. Prefix field 7650*a* is equivalent to field 5300*a* and provides correlation of a record 7650 to a particular application. Reference(s) pointer field 7650*b* contains a pointer to a linked list (=NULL or pointer to first of a linked list of one or more records) of shared reference records 7652. There will be a number of shared reference records 7652 in the linked list equal to the number of exposed AppTerm data variables described by field 5300*g* for a particular application of a PRR 5300. Application term(s) memory pointer field 7650*c* points to a block of memory of appropriate size to at least accommodate requirements of all AppTerm data storage described in the linked list of field 7650*b*.

Each record 7652, maintained through field 7650*b*, contains a name field 7652*a* which contains the particular application source code variable name string for the AppTerm shared, an offset field 7652*b* for which byte offset into the memory pointed to by pointer 7650*c* contains the AppTerm value, a length field 7652*c* for the length of AppTerm data value starting at the offset of field 7652*b*, a type field 7652*d* for how to interpret the AppTerm value, and next pointer field 7652*e* for pointing to the next record 7652 in the linked list of field 7650*b*. Description field 5300*b* may provide the default initial value for the AppTerm for the particular record 7652, for example when newly allocating an AppTerm reference to shared memory 7630. Fields 5300*c* through 5300*f*, and 5300*h* are appropriately used for application starting, terminating, checking if started/terminated, or for determining required executable components. Fields 5300*c* through 5300*f*, and 5300*h* are used as required for a particular application. Field 5300*g* documents any AppTerm(s) which are maintained to records 7652 with appropriate sufficient detail as to enable configuring the applicable records 7652 for the application represented by record 7650 (corresponding to the applicable PRR 5300).

With reference back to FIG. 76B-1, a WITS processing thread 7634 (e.g. at block 5744) accesses shared memory 7630 according to AppTerm usage in configured charters 12. A user interface paste processing thread 7636 (e.g. FIG. 76A processing) also accesses shared memory 7630 according to an AppTerm paste request. Programmers of threads 7632, 7634 and 7636 anticipate at programming source code creation and executable build time what the global name is of shared memory 7630, and what the architecture is of shared memory 7630. Charter processing uses the prefix (fields 5330*a* and 7650*a*) to identify which variable references are being made for which AppTerm data. Additionally, programmers of a set of applications 7638 are to conform to the LBX architecture, anticipate at programming source code creation and executable build time what the global name is, and architecture is, of shared memory 7630. This ensures a consistent platform for well performing AppTerm exposure, charter use, and threaded access across heterogeneous applications, while providing "plug-in" capability of application configurations and processing.

Block 5504 initializes to (or may already be initialized to after block 1216) shared memory 7630, and PRRs if maintained separately. Block 5512 may allocate or deallocate records 7652 according to PRR 5300 alterations. Block 5516 will deallocate any associated record 7650 and its associated records 7652. Block 5520 will allocate an applicable record 7650 and its associated records 7652. Block 5524 may present interesting information of statistics 14 maintained for accesses to shared memory 7630. Block 5528 preferably allocates and deallocate records 7652 (and associated records 7652) to avoid errors in AppTerm accessing which are handled as obvious error handling (e.g. AppTerm reference does not exist in shared memory 7630). Block 5532 displays candidate AppTerm supported applications of the MS which are known to conform to LBX architecture shared memory coding practices. Block 5536 allocates or deallocates as already described for similar reasons described. Block 5542 terminates using (or may terminate using after block 2824) shared memory 7630, and PRRs if maintained separately.

An application thread performing at least one AppTerm update uses processing of FIG. 55B. In a preferred embodiment, the set of applications 7638 use at least one API for interfacing to shared memory 7630 to prevent common source code implementation from being reinvented within different LBX conforming applications. Regardless of implementation, an application of the set of applications 7638 conforms to the LBX architecture when programmers of the application source code implemented the architecture of shared memory 7630 in the framework of PRRs 5300. In one preferred embodiment, a structure (struct) of AppTerm variables is maintained by the application and offsets, lengths, types, and names into the structure are maintained. In this embodiment, field 7650*c* can point to memory containing the structure which is referenced conveniently at source code time with a typecast by the application, and is referenced at run time with record 7650 and its record(s) 7652 by threads 7634 and 7636. Charter processing (e.g. block 5744) may further contextually resolve the type of an AppTerm based on its expression use context.

With reference now to FIG. 76B-2, illustrated is an embodiment of Application term interface processing for applications not using a standardized LBX coding practice for a shared memory 7630. Threads 7632, 7634 and 7636, as well as a set of applications 7638, are similar to as described above except with a different access architecture for "middle-manning" AppTerm data. The set of applications 7638 of FIG. 76B-2 can include:

1) a MS O/S executable process 7640 having a data segment 7640-DS, code segment 7640-CS, stack segment 7640-SS and perhaps other data or executable code (i.e. " . . . ") such as linked interfaces, heap and dynamic memory allocation management, etc;
2) a MS O/S dynamically linked executable 7642 having at least a code segment 7642-CS, for example an invocable public interface for a function or procedure (e.g. API). Executable 7642 may also include other data or executable code (i.e. " . . . ") such as a data segment provided data is protected for executable 7642 being reentrant by multiple simultaneous threads, linked interfaces, reentrant heap and dynamic memory allocation management, etc. Alternatively, a known multi-threaded synchronization scheme can be leveraged; and 3) a MS O/S shared memory data segment 7644-DS having data accessible with shared memory access techniques.

An AppTerm mapper executable 7644 is intended to isolate run time executable linkage to data of the set of applications 7638 so that no re-building (compile and/or link) is required of executable code of threads 7632, 7634 and 7636, and any applications of the set of applications 7638. Thread interfaces 7632-*if*, 7634-*if* and 7636-*if* preferably invoke a Dynamic Link Library (DLL) interface for executable 7644 to return the sought AppTerm data (or an error if not found). The DLL interface never changes, however code within the DLL executable 7644 will change for new requirements of sharing AppTerm data. For example, the DLL interface accepts, from a caller, parameters for sought AppTerm data and where to return the value(s) (e.g. address to thread 7632/7634/7636 accessible memory). DLL executable 7644 is rebuilt for proper execution according to AppTerm share requirements. Appropriate automation of re-building (compile and/or link) executable 7644 is incorporated wherever possible within the framework of PRRs 5300.

For example, executable 7640 exposes one or more AppTerm data references for external linkage (e.g. extern) and/or more public interfaces for external linkage to return AppTerm data. Interface 7640-dsif is accomplished with linking executable 7644 to the external interface (e.g. to the extern data). Interface 7640-csif is accomplished with linking executable 7644 to the documented public interface for access of AppTerm data at access times by threads 7632, 7634 and 7636.

For example, executable 7642 exposes one or more public interfaces for external linkage to return AppTerm data. Interface 7642-csif is accomplished with linking executable 7644 to the documented public interface for access of AppTerm data at access times by threads 7632, 7634 and 7636.

For example, segment 7644 exposes one or more AppTerm data references for shared memory access well known to those skilled in the art (e.g. shared memory name). Interface 7644-dsif is accomplished with building the executable 7644 to access the shared memory.

The upside of the FIG. 76B-2 architecture is applications need not conform to an AppTerm access architecture, except to make data and interfaces available as they conventionally would anyway. The downside is rebuilding the executable 7644 during user configuration time. PRRs 5300 would be configured for also driving automatic building, and rebuilding, of executable 7644 wherever possible, such as part of FIG. 55A processing. In embodiments where full automation is not possible, FIG. 55A should provide instruction in response to configurations made for those situations that require manual attention. Executable 7644 will provide appropriate thread safe access to AppTerm data.

With regard to appropriate semaphore access, there are various embodiments for AppTerm access:

Utilize a single semaphore for all AppTerm accesses;

Utilize an application independent semaphore for AppTerm accesses to uniquely associate a semaphore to a PRR. The advantage is preventing globally synchronizing threads for unrelated data accesses. In a preferred embodiment, a semaphore is automatically created using the unique prefix to ensure uniqueness. Block 5520 may or may not enforce a validated maximum number of PRRs relative a reasonable supported number of semaphore resources. Also, block 5556 would access the applicable PRR, release the semaphore (requested at block 5554) for PRR access, request the appropriate application semaphore (e.g. using prefix), continue to subsequent processing, and release the application semaphore at block 5562; or A new PRR semaphore interface(s) field **5300*l* is defined for specification of which AppTerms are managed by which semaphores. Field 5330*l* enables a map of a unique application semaphore to particular AppTerms of the application. There are many embodiments for field 5330*l* for providing administrator control of which AppTerms are accessed appropriately with which semaphores. In a preferred embodiment, at least one semaphore is automatically created using the unique prefix to ensure uniqueness, and the PRR administrator can subsequently define a plurality of unique semaphores using field 5300*l* along with AppTerm associations for the particular semaphore. This has the advantage of enabling a PRR administrator to define how to synchronize threads for being fully executed to related sets of AppTerm data using application knowledge. The disadvantage is the administrator can "screw up". Blocks 5512 and 5520 may or may not enforce a validated maximum number of semaphores identified for creation in field 5300*l*. Also, block 5556 would access the applicable PRR, release the semaphore (requested at block 5554) for PRR access, request the appropriate application semaphore (e.g. using field 5300*l*), continue to subsequent processing, and release the application semaphore at block 5562. In some embodiments, field 5300*l* provides a joining identifier to another table for joining a plurality of rows containing semaphore information with AppTerm references associated to the record 5300**.

Those skilled in the art will recognize alternative AppTerm access implementations using some of the schemes disclosed above. An Object Oriented Programming (OOP) embodiment can embody an AppTerm as a public class interface which consists of a data reference or a member function invocation which returns the data of the appropriate type to a caller (e.g. on the stack).

Related Linkage Discussion

A WITS processing thread will cause at least one semaphore access when processing other special terms such as a WDRTerm and atomic term, and access to LBX history 30, queue 22 accesses, etc. Access to a WDRTerm, atomic term, queue 22 or LBX History 30 can be made through an API to isolate processing. MS embodiments may define a plurality of semaphores to manage related sets of data accesses for threads to fully execute wherever possible.

With reference now to FIG. 76B-3, illustrated is a preferred embodiment of charter invocation interface processing, for example upon encounter of a BNF grammar Invocation construct. Here, the set of applications 7638 are executable interfaces which additionally include executable path interfaces (e.g. interface 7648-osif), for example a script 7648 of a file system. In some embodiments, atomic commands may be linked using any of the examples depicted in FIG. 76B-3 or a LBX platform DLL interface, however it is preferred that atomic command implementations be statically linked with caller processing code (e.g. WITS processing) for maximum performance.

Regardless of charter form (for WITS processing) embodiments, appropriate linkage is accomplished for the BNF grammar Invocation construct. An Invocation Mapper 7646 is built for proper link of a WITS processing thread (e.g. 7634)

to executable interfaces in an analogous manner as described for Mapper 7644 (using an interface 7646-*if* for middle-manning executable invocations). Interface 7646-*if* preferably invokes a Dynamic Link Library (DLL) interface for executable 7646 to "in turn" invoke the appropriate interface. Interface 7640-csif is accomplished with linking executable 7646 to the documented public interface for access by a WITS processing thread. DLL executable 7642 exposes one or more public interfaces for external linkage wherein interface 7642-csif is accomplished with linking executable 7646 to the documented public interface for access by WITS processing. Interface 7648-osif is preferably provided by a MS O/S, and is used directly by a WITS processing thread for invoking a script 7648 (e.g. command line file). The advantage of Mapper 7646 is to isolate link changes to outside of WITS processing code so that invocable interfaces are adapted to WITS processing without rebuilding WITS processing itself. Mapper 7646 would provide a single interface for all Invocations by accepting a parameter over interface 7646-*if* for the requested invocation, searching the corresponding linked interface, and then invoking it. Interfaces of FIG. 76B-3 may return a resulting return code conveyed back to a WITS processing thread.

Those skilled in the art will recognize alternative invocation access implementations. The set of applications 7638 of FIG. 76B-3 provides public interfaces (e.g. APIs) which accept parameters and/or process parameters from a WITS processing thread, and may return data to a WITS processing thread.

Permission and charter specification through WPL can be processed in a variety of ways depending on the hosting programming environment as described for FIG. 56. The advantage of WPL is extending a programming environment with a rich set of user specified LBX functionality while enhancing LBX user specifications with access to programming environment objects (e.g. variables). Preferably, the PPL environment seamlessly supports a LBX permission and charter syntax which may or may not take on identical syntactical characteristics of the hosting programming development environment. Variable data, executable Invocation interfaces (e.g. function interfaces), semaphores, database interfacing, file system interfacing, shared memory accesses, and any other symbol, data or interface of an executable program is provided to user LBX specifications in a straightforward manner by coupling the hosting programming environment with LBX permission and charter processing in an integrated processing environment. For example, an interpreter or compiler processes embedded charter and permission syntax as any other source encoding it processes, and enables a suitable executable. A special "~" may not be necessary for a tightly coupled WPL syntax and processing. The "~" syntax is particularly useful when charter and permission source code accesses conventional programming objects in source code processing (e.g. of an interpreter or compiler) not tightly integrated. When the "~" reference syntax is used, preferably the programming environment is relied upon for contextually bringing data, type, and/or meaning to the reference. Alternatively, additional LBX syntax can be provided to explicitly specify the type of BNF grammar reference being made (e.g. to explicitly state specifying a named variable address or data, named semaphore, a named function Invocation interface, a named file, named file and offset/length therein, named database object, etc) so that interpretation or compilation will know how to treat the syntactical reference, and produce an error prior to run-time execution if improperly referenced. Raw source code, internalized interpreter source code, or compiled and linked source code of LBX privilege and charter specifications is preferably handled in the same programming environment context as the hosting programming environment would handle its native source code. WPL embodiments preferably incorporate syntactical embodiments disclosed for special terms (AppTerm, WDRTerm, atomic term, map term) with appropriate linkage and access (e.g. MS API(s) provided), but may define alternative syntax to prevent ambiguous use, conflict, or elegance issues of syntax already used in conventional source code.

In an alternate embodiment, programming environment symbolic link information is made accessible to permission and charter processing so that the programming environment supports access to its programmatic objects at appropriate permission and charter processing times. Those skilled in the art recognize that symbolic information is produced as part of an executable link, and a human readable symbol information file can also be output as an option of program linking. The symbolic information provides symbol offset addresses relative a variable base address (e.g. a segment (e.g. Data Segment (DS)). Data processing systems support allocating executables to memory (e.g. memory 56) for execution. After being loaded into memory, base addresses provide base pointer addresses (e.g. stack pointer, data segment pointer, code segment pointer, etc) for real relative memory pointer address offsets identified in the symbolic information. In a data processing environment which does not support swapping, the addresses of loaded symbols may not change and may be relied upon during execution. In a data processing system environment which supports swapping, the addresses of loaded symbols may change as their base addresses (base segment addresses) change when swapped. Symbols accessed through the link output symbolic information have to be relative a current base address to the region (segment) of memory where a symbol lives. There are well known methods for determining where the value or address of a symbol lives in data processing system memory when consulting symbol information from link output. In a simple embodiment, the MS O/S is a debug-like framework environment wherein symbol information of linked executable code provides the lookup capability to access data and variables by name to real data processing memory as needed. Also, a data processing system can be equipped with APIs for returning base addresses for symbol information ranges (like OS/2 selectors) to then determine the offset where an address or value lives.

Atomic commands and their parameters may utilize hosting programmatic objects as described above when the atomic commands are integrated for WPL source code causing directly invoked interfaces from the interpreter or compiler (e.g. statically or dynamically linked). When atomic command interfaces are not used in the context of a WPL environment, they are preferably invoked as statically linked executable code of WITS processing, but may be dynamically linked to WITS processing. Atomic command script interfaces may be used, but performance would likely be unacceptable. When atomic commands are invoked from a WITS processing thread which is not integrated in a conventional programming environment, but access is needed from the atomic command implementation to O/S resources (e.g. semaphore, application data, database object, file system object, etc), then linkage is needed to accomplish the access. As described above, symbolic information can be made available to atomic command processing by specifying a parameter of where to find required symbolic information to resolve the O/S object as described by an atomic operand. For example, a symbol (variable name, semaphore name, function name, etc) value, or address thereof, is deduced using the symbol information from at least one link output symbol file in context of a current base region/segment memory address where the symbol lives. Some embodiments may specify a directory where a plurality of symbolic information files are checked for resolving a symbolic name within a MS O/S. In atomic commands involving database interfaces, the atomic command implementation may assume authenticated credentials, may take on credentials for authentication by the logged-on user of a MS, may require input of credentials to be authenticated, or authentication credentials may be specified in, or as part of, a parameter for an atomic command and operand pair. In any case, appropriate database access authentication is incorporated for database accesses. In atomic commands involving file system interfaces, the atomic command implementation may assume a file system search path (e.g. current working directory, DPATH, PATH, etc), or the file search path is fully specified in a parameter for an atomic command and operand pair. There are many embodiments for carrying out atomic command and atomic operand processing disclosed.

FIG. 76D depicts a flowchart for describing a preferred embodiment of processing for contextual charter creation. FIG. 76D provides a convenient method for creating a charter based on a desired application context. A charter is created for associating LBX data (e.g. special terms, atomic operands) with special terms, atomic operands or other otherwise unrelated application data. Processing begins at block 7660 upon a user action to create a contextual charter and continues to block 7662 for where the user interface context is determined. In some embodiments, the user interface context is determined by access to a user interface object handle (e.g. object class, title bar information, or other unique handle information), and then comparing it to a registry (or active object history) of user interface objects invoked at the MS. Enough information should be contained in the registry to identify a PRR if one has been created. Alternatively, unique user interface handle information can be stored through a new PRR field 5300*n* for finding the applicable PRR so that the application is identified. In another embodiment, the user action itself which starts processing at block 7660 uniquely identifies the application context desired by the user (e.g. distinct keystroke(s)) regardless of what user interface is currently in focus, so that block 7662 accesses the command (user action) for specific information of the requested context.

Thereafter, block 7664 searches for relevant special terms (WDRTerm, AppTerm, atomic term, map term, etc) according to the user desired context for charter creation and interfaces with the user for selection(s), block 7666 waits for a user action and block 7668 checks the user action detected. Relevant special terms may be determined by block 7664 through hard coded anticipation logic, but is preferably determined using a cross reference database, table, or map of which special terms are relevant to which applications wherein the cross reference database is maintained independently outside of FIG. 76D processing by a knowledgeable administrator. A user can select a set of special terms from the interface at block 7664 for further processing, or the user can select to exit processing. If the user selected one or more special terms for further processing as determined by block 7668, block 7670 presents operators, defaulted values, other special terms, and pre-formatted charter expressions and/or actions to minimize the user's effort in creating a useful charter according to the desired application context. Many ready made charter expressions and actions are preferably presented using the special terms from block 7664 and relevant information determined at block 7670. Relevancy determined at block 7664 is application context dependent. Relevancy determined at block 7670 may be application dependent, but is certainly based on special terms selected by the user at block 7664. Block 7670 may also determine relevancy by access to data of queue 22, statistics 14, LBX history 30, MS interoperability or any other LBX data providing guidance for automatically creating a useful charter. At block 7670, the user may select, or create (e.g. drag and drop portions), one or more charters to be automatically created. A suitable user interface facilitating easy decisions, and well validated charter construction options is deployed. Only valid charters result when leaving block 7670 for charter creation. Thereafter, block 7672 checks whether the user selected to create one or more charters, or to create one or more charters and also configure permissions, or to configure permissions, or to exit processing.

If block 7672 determines the user did not select to exit, then processing continues to block 7674. If block 7674 determines the user selected to configure permissions (e.g. perhaps to coincide with the new charters), then block 7682 interfaces with the user for any charter associated relevant permission modifications (i.e. permissions determined to be relevant for the selected charter(s)), and processing continues to block 7684, otherwise block 7674 continues to block 7676. If block 7684 determines the user selected to continue charter creation from block 7670, then processing continues to block 7676. Block 7676 updates charter data appropriately. Thereafter, block 7678 terminates the FIG. 76D user interface, and processing terminates at block 7680. Block 7676 may update charters locally and/or remotely as appropriate. See charter configuration processing already discussed above for additional information.

A preferred embodiment of block 7682 incorporates processing of FIG. 38, however, it is preferred that the FIG. 38 processing be restricted and informative for being limited to managing permissions applicable to any charter(s) being created.

If block 7684 determines the user selected to exit FIG. 76D processing, processing continues to block 7678 for termination processing. If block 7672 determines the user selected to exit FIG. 76D processing, processing continues to block 7678 for termination processing. If block 7668 determines the user selected to exit FIG. 76D processing, processing continues to block 7678 for termination processing.

Application Fields 1100*k*

Application fields 1100*k* are preferably set in a WDR when it is completed for queue 22 insertion (for FIG. 2F processing). This ensures WDRs which are in-process to queue 22 contain the information at appropriate times. This also ensures the WDRs which are to be sent outbound contain the information at the appropriate time, and ensures the WDRs which are to be received inbound contain the information at the appropriate time. See FIG. 84B for an example embodiment. Fields 1100*k* may be set when processing at inbound time as well (e.g. by receive processing prior to being placed to queue 26). Application fields can add a significant amount of storage to a WDR. Alternate embodiments may not maintain field 1100*k* to queue 22, but rather append information, or an appropriate subset thereof, to field 1100*k* when sending WDRs outbound to minimize storage WDRs utilize at a MS (e.g. at blocks 2014 and 2514). This alternate embodiment will enable appropriate WITS processing for maintained WDRs, inbound WDRs, and outbound WDRs without an overhead of maintaining lots of data to queue 22, however application fields functionality will be limited to application data from an outbound originated perspective, rather than application field setting at the time of an in process WDR regardless of when it was in process. For example, field 1100*k* may alternatively be set at blocks 2014 and 2514 and then stripped after being processed by receiving MSs prior to any insertion to queue 22. In some embodiments, certain field 1100*k* data can be enabled or disabled for being present in WDR information.

WITS processing may modify the WDR (e.g. application fields 1100*k*), or WDR related data at the MS, at a block 5703, such that processing of block 5702-*b* continues to block 5703 and block 5703 continues to block 5704. Block 5703 will preferably modify WDR related statistics 14 and may modify the in-process WDR (e.g. strip, append, or alter applications fields 1100*k* section(s)) or any subset of data therein for any reason, including based on permissions 10, system settings, enabled/disabled fields (sections) according to FIG. 77 (e.g. see FIG. 84B discussion), MS performance constraints, statistics 14, special terms (map term, atomic term, AppTerm, WDRTerm), application data, any other detectable configuration(s) and/or condition(s). Block 5703 may read-access the WDR for information (e.g. application fields) to use for related data maintenance or modification, and then incorporate WITS filtering to prevent any further processing of the WDR as was described above for blocks 5702-*a* and 5702-*b* (i.e. not continue processing the WDR in processing which includes FIG. 57 (i.e. FIGS. 2F, 20, 21 25)).

Preferably, there are WDRTerms for referencing each reasonable application fields section individually, as a subset, or as a set. For example, appfld.appname.dataitem should resolve to the value of "dataitem" for the application section "appname" of application fields 1100*k* (i.e. "_appfld"). The hierarchy qualification operator (i.e. ".") indicates which subordinate member is being referenced for which organization is use of field 1100*k*. The requirement is the organization be consistent in the LN-expanse (e.g. data values for anticipated application categories). For example, _appfld.email.source resolves to the email address associated with the email application of the MS which originated the WDR. For example, _appfld.phone.id resolves to the phone number associated with the phone application of the MS which originated the WDR (e.g. for embodiments where the MS ID is not the same as the MS caller id/phone number). If a WDRTerm references an application field which is not present in a WDR, then preferably a run time error during WITS processing is logged with ignoring of the expression and any assigned action, or the applicable condition defaults to false. Preferably, a user has control for enabling any application subsets of data in field 1100*k*. Of course, appending, or setting, data in fields 1100*k* may involve first accessing needed data from memory 56, storage from secondary storage devices 58 such as persistent storage 60, a database, a file, or any other MS resource which maintains the specific application data.

FIG. 77 depicts a flowchart for describing a preferred embodiment of configuring data to be maintained to WDR Application Fields 1100*k*. While there can certainly be privileges put in place to govern whether or not to include certain data in field 1100*k*, it may be desirable to differentiate this because of the potentially large amount of storage and requirements to carry such data when transmitting and processing WDRs. Highlighting such consideration and perhaps warning a user of its use may be warranted (e.g. MS performance, storage capacity, communications speed and bandwidth, generation of protocol used, etc are valid considerations in deciding how much data in application fields 1100*k* can be enabled, and the priority for which data to enable). FIG. 77 processing provides the differentiation. Depending on present disclosure implementations, there are privileges which require associated information, for example for enabling profile communication (preferably can define which file is to be used for the profile), accepting data/database/file control (preferably can define which data and what to do), etc. An alternate embodiment may define a specific privilege for every derivation, but this may overwhelm a user when already configuring many privileges. Also, specific methods may be enforced without allowing user specification (e.g. always use a certain file for the profile). A preferred embodiment permits certain related specifications with privileges and also differentiates handling of certain features which could be accomplished with privileges.

Application fields 1100K specification processing begins at block 7702 upon a user action for the user interface processing of FIG. 77, and continues to block 7704 where the user is presented with options. Thereafter, block 7706 waits for a user input/action. The user is able to specify any of a plurality of application data for enablement or disablement in at least outbound WDR fields 1100*k*. Various embodiments will support enablement/disablement for inbound, outbound, or any other in-process WDR event executable processing paths. Field 1100*k* can be viewed as containing application sections, each section containing data for a particular type of MS application, or a particular type of application data as described above.

Upon detection of a user action at block 7706, block 7708 checks if the user selected to enable a particular application section of fields 1100*k*. If block 7708 determines the user selected to enable a particular application fields 1100*k* section, then block 7710 sets the particular indicator for enabling that particular application fields 1100*k* section, and processing continues back to block 7704. If block 7708 determines the user did not select to enable a particular application fields 1100*k* section, then processing continues to block 7712. If block 7712 determines the user selected to disable a particular application fields 1100*k* section, then block 7714 sets the particular indicator for disabling that particular application fields 1100*k* section, and processing continues back to block 7704. If block 7712 determines the user did not select to disable a particular application fields 1100*k* section, then processing continues to block 7716. If block 7716 determines the user selected to disable sending profile information in a application fields 1100*k* section, then block 7718 sets the profile participation variable to NULL (i.e. disabled), and processing continues back to block 7704. If block 7716 determines the user did not select to disable sending profile information, then processing continues to block 7720. If block 7720 determines the user selected to enable sending profile information in a application fields 1100*k* section, then block 7722 prompts the user for the file to be used for the profile (preferably the last used (or best used) file is defaulted in the interface), and block 7724 interfaces with the user for a validated file path specification. The user may not be able to specify a validated profile specification at block 7724 in which case the user can cancel out of block 7724 processing. Thereafter, if block 7726 determines the user cancelled out of block 7724 processing, processing continues back to block 7704. If block 7726 determines the user specified a validated profile file, then block 7728 sets the profile participation variable to the fully qualified path name of the profile file, and processing continues back to block 7704. Block 7724 preferably parses the profile to ensure it conforms to an LN-expanse standard format, or error processing is handled which prevents the user from leaving block 7724 with an incorrect profile.

In an alternate embodiment, block 7728 additionally internalizes the profile for well performing access (e.g. to a XML tag tree which can be processed). This alternate internalization embodiment for block 7728 would additionally require performing internalization after every time the user modified the profile, in which case there could be a special editor used by the user for creating/maintaining the profile, a special user post-edit process to cause internalization, or some other scheme for maintaining a suitable internalization. In an embodiment which internalizes the profile from a special editor, the special editor processing can also limit the user to what may be put in the profile, and validate its contents prior to internalization. An internalized profile is preferably always in correct parse-friendly form to facilitate performance when being accessed. In the embodiment of block 7728 which sets the fully qualified path name of the profile file, a special editor may still be used as described, or any suitable editor may be used, but validation and obvious error handling may have to be performed when accessing the profile, if not validated by block 7724 beyond a correct file path. Some embodiments may implement a profile in a storage embodiment that is not part of a file system.

If block 7720 determines the user did not select to enable profile information to be maintained to field 1100*k*, then processing continues to block 7730. If block 7730 determines the user selected to exit FIG. 77 processing, application fields 1100*k* specification processing terminates appropriately at block 7732. If block 7730 determines the user did not select to exit, then processing continues to block 7734 where any other user actions detected at block 7706 are handled appropriately. Block 7734 then continues back to block 7704.

There can be many MS application sections of field 1100*k* which are enabled or disabled by blocks 7708 through 7714. In the preferred embodiment of profile processing, the profile is a human readable text file, and any file of the MS can be compared to a profile of a WDR so that the user can maintain many profiles for the purpose of comparisons in expressions. Alternate embodiments include a binary file, data maintained to some storage, or any other set of data which can be processed in a similar manner as described for profile processing. Some embodiments support specification of how to enable/disable at blocks 7708 through 7714 derivatives for mW ITS, iWITS and/or oWITS.

In the preferred embodiment, a profile text file contains at least one tagged section, preferably using XML tags. Alternatively, Standard Generalized Markup Language (SGML) or HTML may be used for encoding text in the profile. There may be no standardized set of XML tags, although this would make for a universally consistent interoperability. The only requirement is that tags be used to define text strings which can be searched and compared. It helps for a plurality of users to know what tags each other uses so that comparisons can be made on a tag to tag basis between different profiles. A plurality of MS users should be aware of profile tags in use between each other so as to provide functionality for doing comparisons, otherwise profiles that use different tags cannot be compared.

Indicators disabled or enabled, as well as the profile participation variable is to be observed by WDR processing so that field 1100*k* is used accordingly. In some embodiments, certain application field sections cannot be enabled or disabled by users (i.e. a MS system setting). In preferred embodiments, WITS processing checks these settings to determine whether or not to perform applicable processing. In some embodiments, WITS processing checks these settings to strip out (e.g. for setting(s) disabled) information from a WDR which is to be in process.

FIG. 78 depicts a simplified example of a preferred XML syntactical encoding embodiment of a profile for the profile section of WDR Application Fields 1100*k*. This is also the contents of a profile file as specified at block 7724. Any tag may have any number of subordinate tags and there can be any number of nested levels of depth of subordinate tags. A user can define his own tags. Preferably, the user anticipates what other MS users are using for tags. Individual text elements for a tag are preferably separated by semicolons. Blanks are only significant when non-adjacent to a semicolon. The text between tags is compared (e.g. text elements (e.g. Moorestown)), regardless of whether a tag contains subordinate tags, however subordinate tags are compared for matching prior to determining a match of contents between them. Ultimately, the semicolon delimited text elements between the lowest order tags (leaf node tag sections of tag tree) are compared for matching. Ascending XML tags and the lowest level tags hierarchy provide the guide for what to compare. Thus, tags provide the map of what to compare, and the stuff being compared is the text elements between the lowest order tags of a particular tag hierarchy tree. Some explanations of atomic operator uses in expressions are described for an in-process WDR:

#d:\myprofs\benchmark.xml>5

This condition determines if the benchmark.xml file contains greater than 5 tag section matches in the entire WDR profile of the WDR in process. Text elements of the lowest order tag sections are used to decide the comparison results. A tag hierarchy, if present, facilitates how to compare. Six (six) or more matches evaluates to true, otherwise the condition evaluates to false.

% d:\myprofs\benchmark.xml>=75

This condition determines if the benchmark.xml file contains greater than or equal to 75% of tag section matches in the entire WDR profile of the WDR in process. Contents that occurs between every tag is compared for a match. The number of matches found divided by the number of tag matches performed provides the percentage of matches (after multiplying the result by 100). The resulting percentage greater than or equal to 75% evaluates to true, otherwise the condition evaluates to false.

#(interests)d:\myprofs\benchmark.xml>2

In using FIG. 78 as an example, this condition determines if the benchmark.xml file contains greater than two (2) semicolon delimited matches within only the interests tag in the WDR profile of the WDR in process. If either the benchmark.xml file or the WDR profile does not contain the interests tag, then the condition evaluates to false. If both 2contain the interests tag, then the semicolon delimited items which is interests tag delimited are compared. Three (3) or more semicolon delimited interests that match evaluates to true, otherwise the condition evaluates to false.

% (home,hangouts)d:\myprofs\benchmark.xml>75

This condition determines if the benchmark.xml file contains greater than 75% matches when considering the two tags home and hangouts in the WDR profile of the WDR in process. Any number of tags, and any level of ascending tag hierarchy, can be specified within the ( . . . ) syntax. If either the benchmark.xml file or the WDR profile does not contain the tags for matching, then the condition evaluates to false. If both contain the sought tags for matching, then the text elements of the lowest order subordinate tags are treated as the items for compare. Of course, if the tags have no subordinate tags, then text elements would be compared that occurs between those tag delimiters. The number of matches found divided by the number of comparisons made provides the percentage of matches (after multiplying the result by 100). The resulting percentage greater than 75% evaluates to true, otherwise the condition evaluates to false.

WITS processing preferably uses an internalized form of FIG. 78 to perform comparisons. The internalized form may be established ahead of time as discussed above for better WITS processing performance, or may be manufactured by WITS processing in real time as needed.

FIG. 79A illustrates a branch subset of a tree structure. Tree structures and processing thereof are well known in the art and facilitate automated processing. Any particular node n of the tree is capable of any number of directly descending nodes n1 through ni. Nodes n1 through ni are referred to as peer nodes. The line drawn connecting any nodes is referred to as a branch of the tree. Any particular node n1 through ni is in turn capable of any number of descending nodes. For example, n2 has directly descending nodes n21 through n2*j* (peer nodes), as shown with respective branches. Any particular node n21 through n2*j* is in turn capable of any number of descending nodes. For example, n22 has directly descending nodes n221 through n22*k*. Node n2 is said to be one level below node n. Node n22 is said to be two levels below node n. Node n222 is said to be three levels below node n. Peer nodes are on the same level in a tree and have the same ascending node. For convention, the number of digits appearing after the variable n is equivalent to the number of levels below node n. If the variable n indicates a node 345, then 34524184 is 5 levels below node 345. Any node on the tree can also have any number of ascending nodes, although ascending nodes are singular in nature and correspond directly with the number of levels deep into the tree. Node n222 has three ascending nodes if node n is the root node. This corresponds with the level 3. Those skilled in the art associate a nesting of XML tags to a tag tree of FIG. 79A. For example, the selected section of the XML file example of FIG. 78 is represented by a tree using tabs to show nesting as:

```
...
home
    city
    state
...
interests
...
hangouts
    morning
    lunch
    evening
...
```

such that home, interests and hangouts are peer node tags on the same level; city and state are peer nodes on the same level with the same ascending node (homes); and morning, lunch and evening are peer node tags on the same level with the same ascending node (hangouts). Depending on disclosure embodiments and XML files in use, there can be a complicated tree structure having many branches with many tag levels. Any tag, regardless of having descendants, can be used to perform a comparison by using all leaf node tag elements within its scope. Leaf nodes of the XML tree have no descending tags, and may or may not have data specified.

FIG. 79B illustrates a binary tree equivalent to the tree structure of FIG. 79A which is used to support XML tag tree traversal processing. Binary tree structures and processing thereof are well known in the art and facilitate automated processing of general tree structures. Making node n of FIG. 79A the root node 1 yields FIG. 79B. The advantage of representing the tree structure as a binary tree is that only two pointers are required at any particular node in the tree to accomplish top down processing of all branches. FIG. 79B can represent FIG. 79A without loss of information and is more easily processed by a data processing system. Representing an internalized tree structure in main memory 56 and/or storage 58 according to FIG. 79A for a data processing system may cause excessive re-allocations on any node n, or wasted storage for allocating a maximum node size, to satisfy the requirement of adding new descendants. Representing an internalized tree structure according to FIG. 79B for a data processing system conveniently allows one allocation in main memory 56 and/or storage 58 with two pointers for any particular node n. Some embodiments may add additional pointer(s) (e.g. FIG. 79C ascendant and peer_up) for providing "reverse" link(s) to an ascending node and/or peer node.

FIG. 79B is a skeletal structure for representing an XML tag tree for tag tree traversal processing of the present disclosure. A root pointer of a tree points to the node Data11. The first level of descending nodes from the root are nodes Data11 through Data 1*i*. Data 11 through Data11 are peer nodes. Any particular node of Data11 through Data11 is in turn capable of any number of descending nodes. For example, Data12 has directly descending nodes Data121 through Data12*j* (peer nodes), as shown with respective branches. Any particular node Data121 through Data12*j* is in turn capable of any number of descending nodes. For example, Data122 has directly descending nodes Data1221 through Data122*k*. Node Data12 is one level below the root node. Node Data122 is two levels below the root node. Node Data1222 is three levels below the root node.

Pointers, pointing to the left, point to the leftmost descending node (peer nodes on a tree are ordered). Pointers, pointing to the right, point to the next peer node. A tree node record contains Data (or at least one pointer to Data) and is indicated in FIG. 79B using the "Data" prefix as a notation convention. The Data (i.e. data) in a node record is associated with the "stuff" between leaf node tags (e.g. Moorestown="stuff" between city leaf node tags; basketball;programming;running;football="stuff" between interests leaf node tags, etc). Data may be in any suitable form capable of storing/representing the "stuff" between matching tag delimiters (e.g. <tagN>"stuff"</tagN>). In a preferred embodiment, only leaf node tags contain data and other tags have no (i.e. null) data, however data may be present for non-leaf node tags for "stuff" of a branch node for tag data matching embodiments that support "stuff" associated with non-leaf tags of an XML tag hierarchy.

FIG. 79C depicts a preferred embodiment C programming source code structure for encoding a node in an internalized XML tree. A preferred embodiment utilizes an OOP source code (e.g. C++, C#, or Java), but those examples mix data and object code in defining relationships. FIG. 79C depicts a purely data form of an internalize XML tree node. Because XML is well known and has many uses, preferred OOP environments provide XML APIs. In fact, there are many XML APIs available to a programmer for many different programming environments. These existing APIs (e.g. XML InfoSet interfaces, XML Element Tree interfaces, XML document interfaces, etc) are preferably used to accomplish the disclosed profile match operator evaluation. For example, in Java there is a Document Object Model (DOM) specification for parsing XML documents and constructing a complete in-memory representation of the document using classes modeling concepts found in the DOM specification. There is a Simple API for XML (SAX) which includes the SAXParser. Unlike the DOM parser, the SAX parser does not create an in-memory representation of the XML document and is faster and uses less memory. The SAX parser informs clients of the XML document structure by invoking callbacks. There is a XML Stylesheet Language for Transformations (XSLT)

which allows conversion of an XML document into other forms of data. JAXP provides interfaces allowing applications to invoke an XSLT transformation. There is also XMLpull and related APIs. Microsoft's .NET has the System.XML namespace which contains major XML classes, Python has the xml.etree.ElementTree XML API, and there are third party API providers (e.g. for JDOM). Those skilled in the art recognize many XML interfaces of use for carrying out XML processing according to the present disclosure. Some developers may choose to write a "home grown" XML implementation using information found in FIGS. 79A through 79D. The implementation scheme selected may affect processing at blocks 4668, 4670, 4470, 5744 and other related blocks of processing discussed above (e.g. in FIGS. 38 through 48B).

The XML _NODE type definition may or may not need a data_type field since data may always be the same type (e.g. null terminated strings such as in the FIG. 78 example which uses semicolons to delimit a plurality of data elements).

FIG. 79D depicts a flowchart for describing a preferred embodiment of a procedure for profile match operator evaluation without locking a design into any particular XML implementation, for example those discussed above. Processing begins at block 7952 (e.g. when invoked by block 5744 processing) and continues to block 7954. Block 7954 accesses parameters passed: the charter expression portion where the profile match operator has been specified, reference profile (e.g. Lprofile of FIG. 79C pointing to internalized tree of profile in expression), and attempt profile (e.g. Rprofile of FIG. 79C pointing to internalized tree of WDR profile section). Depending on an embodiment, the profiles may already be internalized, or block 7954 will perform internalization, or there is no need to internalize (e.g. dependent on APIs used). The reference profile is the profile maintained at/for the MS which is processing the charter (preferably specified in the charter expression, although some embodiments may assume a default profile when one is not specified (e.g. #>5)). The attempt profile is the profile of the in-process WDR (e.g. inbound WDR), or the profile (section) of application fields 1100*k* of an in-process WDR. The FIG. 79D procedure can be passed swapped parameters for using the in-process WDR as the reference profile. Block 7954 continues to block 7956.

If block 7956 determines the profile match operator has not been qualified with specific tags for matching (in charter expression portion parameter), then block 7958 sets a TAG_CHECK_LIST with a list of entries wherein each entry includes a XML tree leaf node tag name (e.g. interests) and associated tag element value (e.g. "basketball; programming; running; football"). In another embodiment, block 7958 may build a list of all tags in the XML tree and then maintain leaf node tag (within that tree node's descending scope) element data values concatenated together like a plurality of semicolon delimited data elements for compare as though the branch node was a leaf node with the element data. The tag hierarchy may, or may not, be maintained in the TAG_CHECK_LIST entry tag information for causing the tag path to have relevance in matching. Block 7958 continues to block 7960. If block 7956 determines the profile match operator has been qualified with specific tags for matching (e.g. % (home,hangouts)d:\myprofs\benchmark.xml>75), then block 7962 sets a TAG_CHECK_LIST with a list of entries wherein each entry includes a specified tag (e.g. home and hangouts) and their associated values (home: "Moorestown; N.J.", and hangouts: "Starbucks; Jammin's; Mongolian Barbeque; Confettis; Jimbos"). The preferred embodiment concatenates descending leaf node tag values (within the tag node's scope) together like a larger leaf node. Another embodiment may maintain separate TAG_CHECK_LIST entries for unique branch paths from the specified tag to each descending leaf node tag so that tag hierarchy path information is considered in the compare. Block 7962 continues to block 7960.

Block 7960 initializes counter variables: TAG_DATA_MATCH_ATTEMPTS=0 and TAG_DATA_MATCHES=0, and continues to block 7964 for getting the next TAG_CHECK_LIST entry. Thereafter, if block 7966 determines all entries from TAG_CHECK_LIST have not been processed, block 7968 uses the associated data for the tag from the TAG_CHECK_LIST entry and attempts to access the data in an analogous manner (to building TAG_CHECK_LIST) from the attempt profile. Block 7968 may, or may not, enforce a matching tag hierarchy to get to a matching tag.

Thereafter, if block 7970 determines there was no matching tag in the attempt profile, or no data for a matched tag in the attempt profile, then block 7972 increments the counter TAG_DATA_MATCH_ATTEMPTS by the number of data elements (e.g. semicolon delimited) in the TAG_CHECK_LIST entry data, and processing continues back to block 7964. If block 7970 determines the tag was found with element data in the attempt profile, block 7974 gets the next data element (e.g. string up to semicolon or end of string) of the TAG_CHECK_LIST data entry. Thereafter, if block 7976 determines the last element of data for the tag in the TAG_CHECK_LIST entry has been processed (or none was present to start with), then processing returns to block 7964 for the next entry in the TAG_CHECK_LIST.

If block 7976 determines there is a data element to process, then block 7978 increments by 1 the TAG_DATA_MATCH_ATTEMPTS counter and block 7980 checks if the data element is found in the attempt profile for the matched tag. If it is found, block 7980 continues to block 7982 where the TAG_DATA_MATCHES counter is incremented by 1 and processing returns to block 7974 for processing the next (if any) data element. If block 7980 determines the sought data is not found in the attempt profile data, then processing continues directly back to block 7974.

Note that blocks 7974 through 7982 form a loop for iterating each data element (e.g. semicolon delimited) for the tag in the entry of TAG_CHECK_LIST for matching to data with the same tag in the attempt profile. If block 7976 determines there are no more data elements to check, then processing continues back to block 7964 for getting the next TAG_CHECK_LIST entry. Note that blocks 7964 through 7982 form a loop for iterating each TAG_CHECK_LIST entry for matching to data with the same tag in the attempt profile. A match is preferably made when the reference profile data element of block 7974 appears in any subset of attempt profile data from block 7968.

If block 7966 determines that all TAG_CHECK_LIST entries have been processed, processing continues to block 7984. If block 7984 determines the profile match operator of the charter expression portion passed to FIG. 79D is the "#" operator, then block 7986 checks the charter expression portion using TAG_DATA_MATCHES for evaluating the condition. If block 7986 determines the condition is true, then block 7988 returns a TRUE result to the caller (e.g. block 5744 invoker processing), otherwise block 7990 returns a FALSE result to the caller. If block 7984 determines the profile match operator of the charter expression portion passed to FIG. 79D is the "%" operator, then block 7992 calculates a percentage of matching using TAG_DATA_MATCHES and TAG_DATA_MATCH_ATTEMPTS (i.e. solve for x such that TAG_DATA_MATCHES/TAG_DATA_MATCH_ATTEMPTS=x/100) and block 7994 checks the charter expression portion using the percentage calculated for evaluating the condition. If block 7994 determines the condition is true, then block 7988 returns a TRUE result to the caller (e.g. block 5744 invoker processing), otherwise block 7990 returns a FALSE result to the caller.

With reference now to FIG. 80A, depicted is an example LBX application fields 1100*k* implementation status table 8000 for being processed. As already discussed above, any section of applications field 1100*k* can be enabled, or disabled for being included in inbound, outbound, or any other in-process WDR, and a "section" may be an entire application section (i.e. all data within that application section), any subset of data within an application section, or any specific data item within an application section. Section is a broad term for being any subset of data in fields 1100*k*. Application fields processing (discussed with FIG. 77) allows a MS user and/or MS system settings to control:

- Data of fields 1100*k* that gets exposed in the LN-expanse (i.e. stripped or appended before outbound);
- Data of fields 1100*k* that gets stored to queue 22 (i.e. stripped or appended before processing for insertion); and/or
- Data of fields 1100*k* that gets seen by processing after a WDR has been received (i.e. stripped or appended before any MS post-receive processing).

WITS filtering and privileges in place can enforce what WDRs are seen by others. This expands or narrows the "playing field" for applying processing enforced with FIG. 77. In some embodiments, any section of application fields 1100*k* can be enabled or disabled in any WDR in-process path for specific MSs, MS users, groups of MSs, groups of MS users, or any identifiable collection of valid source(s) or target(s) of WDRs. Similarly, privileges can be used for enabling, disabling, hiding, un-hiding, or managing all applications fields 1100*k* and applicable processing disclosed.

Applications fields are preferably hierarchical sections for organizing data in an easily identifiable manner. Whether MS users use local applications or internet accessed applications (e.g. cloud computing), application fields communicated between MS users is important for interoperability. Any section of fields 1100*k* can be shared from one MS to another. Application fields 1100*k* is in at least the reference-able form: appfld.appname.dataitem such that appfld references field 1100*k*, appname references a specific application section of field 1100*k* and dataitem references a specific value (or set of values) in the application section. Some sections of fields 1100*k* are maintained in databases by the application and are accessed as needed (e.g. for WDR transmission, update from received WDR, etc). Syntactical references include forms: \ref, ref, _I_ref or _O_ref such that ref is equivalent to the field referenced: \appfld.appname.dataitem, appfld.appname.dataitem, _I_appfld.appname.dataitem, _O_appfld.appname.dataitem. There may be many sections and levels thereof to get to a data item. The form name1.name2.name3. . . . nameN is used as required to get to the lowest order data in a higher order section. Because of the very large number of subsets (sections) of fields 1100*k*, it is preferred that most, if not all, user controlled fields 1100*k* be disabled when a MS is powered up for the first time. The user can later enable features after learning to use a LBX enabled MS. Depending on the data embodiment for carrying data of fields 1100*k*, human readable names or corresponding parse-able binary identifiers are used. X.409 or a similar encoding may be used to carry data in fields 1100*k*. appfld section date/time specs can use BNF grammar time specification methods.

Any subset of application fields 1100*k* can be moved to LBX History 30 for any reason at any time in MS processing, for example to keep a history of application contexts, states, data, occurrences thereof, etc FIG. 80A is a snapshot of a LBX application fields 1100*k* implementation status table. Requirements for amending LBX processing are preferably fed into a review board of key stake holders for consideration of implementation. A proposed application fields section is submitted to the board with a presentation and then later processed for a current status. The section can be a completely new application section, or a new hierarchically lower data field in an existing application section. An LBX proposed amendment has the following status:

1) Presented=new requirement(s) (e.g. 8006) presented to the board for making case of compelling value. The presentation may be as simple as an email, an escalated customer trouble ticket, or as serious as a live presentation. Those skilled in the art should be able to recognize alternatives for how to implement the application presented and the benefits of having such an application;
2) RFP=Request for Proposal of new requirement(s) (e.g. 8004) has been decided by the board for successfully presented requirement(s). The proposing party must formally submit their detailed proposal within the context of the LBX architecture before it is candidate for implementation; When an item is marked RFP, implementation is understood and documented, but additional details may be required;
3) Registered=An RFP has been accepted and is formally adopted for implementation in the LBX architecture (e.g. 8002). New privileges are implemented for appropriate interoperability between MSs. The registered requirement(s) are documented as part of subsequent LBX enabled product documentation. The scope of current implementation is documented as well;
4) Tabled=Requirement(s) were presented or RFP was considered, and it was decided to not pursue the requirement(s) in the LBX architecture (e.g. 8008). Reason(s) for being tabled is documented as part of records; and
5) Retired=Requirement(s) which were registered have been removed from the LBX architecture. Reason(s) for being retired is documented as part of records.

FIG. 80B depicts some section descriptions of registered LBX application fields 1100*k*. Note that many fields are derived from, or are predecessors of, Application terms accessible for use in charter expressions, and atomic command processing. Also note that there are privileges and/or charter specifications which can be specified for carrying out identical functionality. The LBX architecture is emerging, so there is intentional overlap between privilege and charter processing, application term specifications and intended features defined by sections of fields 1100*k*. It is not clear yet which LBX option for overlapped features (AppTerm versus fields 1100*k* section) will become more readily adopted in the marketplace. There is a wealth of statistics generated for application fields and processing thereof. Some of the section values below may be set to NULL.

Each data value of leaf nodes of a section hierarchy tree may be set by a MS user and/or defaulted by a MS (see FIG. 80C). Permissions may be used to govern permissible values initialized or assigned. Application fields may be present to share with others (e.g. in the vicinity) for a variety of reasons, and the data can be accessed for user examination at the MS with an appropriate user interface. Some application fields require a database lookup when added to a WDR, otherwise high speed MS memory will be impacted for maintaining the data. With reference to FIG. 80B, source section 8002*a* includes subordinate sections including the following examples:

| | |
|---|---|
| appfld.source.id.X | appfld.source.id.email = "davood.iyadi@lbxphone.com"; appfld.source.id.phone = "214-405-2323"; appfld.source.id.calendar = "davood@lbxphone.com"; appfld.source.id.ab = "davood@lbxphone.com"; appfld.source.id.rfid = "0A12:43EF:985B:012F"; References to appfld.source.id in charter expressions contextually uses the correct ID data value based on the context of use. The fully qualified hierarchical name (e.g. appfld.source.id.email") may also be used explicitly. |
| appfld.source.type | See BNF grammar atomic element "system type" discussions. |
| appfld.source.mfr | See BNF grammar atomic element "system type" discussions for breaking out manufacturer from atomic element "system type". |
| appfld.source.serno | See BNF grammar atomic element "logical handle" or "physical handle". |
| appfld.source.ip | Suitable ip address(es) notation (e.g. 192.168.1.25; 50.46.123.2) |
| . . . | . . . |

Source section 8002*a* information is physical and logical information about the MS which may be of use when sharing between MSs for various applications and managing of identities thereof.

Profile section 8002*b* includes at least the appfld.profile.contents section containing profile information as discussed throughout this disclosure (e.g. XML or X.409 datastream).

Email section 8002*c* includes subordinate sections including the following examples:

| | |
|---|---|
| appfld.email.source | appfld.email.source = "davood.iyadi@lbxphone.com"; This value is preferably used to default appfld.source.id.email, but can be changed based on permissions (e.g. specify different source address for emails). |
| appfld.email.default.attribute.Y | Default attributes: appfld.email.attribute.cod = Y; appfld.email.attribute.urgent = N; appfld.email.attribute.charcode = 850; etc In one embodiment, the attribute section is a bit mask for enable/disable of well known bit position attributes. There can be many attributes. |
| appfld.email.default.salutation | Textual salutation may be shared with others. May be null. |
| appfld.email.default.doctype | Can inform others of preference. |
| appfld.email.default.recips | Comma separated recipients for defaulting in an email recipient list. These are not defaulted into emails unless requested by the user during email composition. A special qualifier is used to specify the type of recipient (e.g. "davood.iyadi@lbxphone.com, cc:ravi.sirrayanan@lbxphone.com, bc:sam.sunn@lbxphone.com" specifies a copy recipient ravi and a blind copy recipient sam. No qualifier is a primary recipient. There may be other qualifiers for other recipient types.) |
| appfld.email.default.encrypt | Email encryption algorithm (settings for NONE (no encryption), DES, AES, RSA, Blowfish, or any other MS reference-able algorithm). May be null. |
| appfld.email.default.compress | Email compression algorithm settings for NONE, ZIP, LZO, LZX or any other MS reference-able algorithm), May be null. |
| appfld.email.default.$ | $ = other field sections. |
| appfld.email.type | Email app type/name can inform others which email application is used. |
| appfld.email.pending.attribute.Y | Attributes of pending email being composed: appfld.email.attribute.cod = N; appfld.email.attribute.urgent = N; appfld.email.attribute.charcode = 850; etc In one embodiment, the attribute section is a bit mask for enable/disable of well known bit position attributes. There can be many attributes. |
| appfld.email. pending.salutation | Textual salutation if present in composed email. May be null. |
| appfld.email.pending.doctype | Doc type of email being composed. |
| appfld.email.pending.recips | Comma separated recipients for email underway using qualifiers discussed above. |
| appfld.email.pending.encrypt | Email encryption algorithm to be used as described above. May be null. |
| appfld.email.pending.compress | Compression algorithm to be used as described above. May be null. |
| appfld.email.pending.cdt | Email initial creation date/time stamp for pending or last entry. |

-continued

| | |
|---|---|
| appfld.email.pending.content | Email data (e.g. email body, attachment(s), etc) for transporting between MSs. This enables a peer to peer email delivery (see MS2MS processing). No email service is required for MS users to talk to each other. appfld.email.pending.content.body = the currently constructed email body being composed for sending. Attachments are referenced with appfld.email.pending.content.attach.ct for the number (ct = count) of attachments and appfld.email.pending.content.attach.# (1 for first, 2 for second, etc.) for an email currently being composed which has not been sent yet. SMS messages may use this same mechanism. See content subordinate fields discussed above. |
| appfld.email.pending.$ | $ = other field sections. |
| appfld.email.last.sent.ANY.attribute.Y | Attributes of email last sent to anyone from MS: appfld.email.attribute.cod = N; appfld.email.attribute.urgent = N; appfld.email.attribute.charcode = 850; etc In one embodiment, the attribute section is a bit mask for enable/disable of well known bit position attributes. There can be many attributes. |
| appfld.email.last.sent.ANY.salutation | Textual salutation of email last sent to anyone from MS. |
| appfld.email.last.sent.ANY.doctype | Doc type of email last sent to anyone from MS. |
| appfld.email.last.sent.ANY.recips | Comma separated recipients of email last sent to anyone from MS. |
| appfld.email.last.sent.ANY.encrypt | Email encryption algorithm indicator of email last sent to anyone from MS. |
| appfld.email.last.sent.ANY.compress | Compression algorithm indicator of email last sent to anyone from MS. |
| appfld.email.last.sent.ANY.cdt | Email initial creation date/time stamp of email last sent to anyone from MS. |
| appfld.email.last.sent.ANY.content | Email data (e.g. email body, attachment(s), etc) of email last sent to anyone from MS for transporting between MSs. This enables a peer to peer email delivery (see MS2MS processing). No email service is required for MS users to talk to each other. appfld.email.pending.content.body, appfld.email.pending.content.attach.ct, and appfld.email.pending.content.attach.# are analogous to above for the last sent email to anyone from the MS. |
| appfld.email.last.sent.ANY.$ | $ = other field sections. |
| appfld.email.last.sent.{id}.* | There is a field here for each appfld.email.last.sent.ANY.* field above, however a specific id can be specified (e.g. joe@yahoo.com). This allows access to fields of the most recently sent email item to a specific recipient. There are a plurality of fields (i.e. *) represented by this row to prevent redundantly listing each field again for an appfld.email.last.sent.{id} section . . . |
| appfld.email.last.rcvd.ANY.* | There is a field here for each appfld.email.last.sent.ANY.* field above, however rcvd qualifier indicates that each field is for the most recent email received by the MS from anyone. There are a plurality of fields (i.e. *) represented by this row to prevent redundantly listing each field again for an appfld.email.last.rcvd.ANY section . . . |
| appfld.email.last.rcvd.{id}.* | There is a field here for each appfld.email.last.rcvd.ANY.* field above, however a specific id can be specified (e.g. joe@yahoo.com). This allows access to fields of the most recently received email item from a specific recipient. There are a plurality of fields (i.e. *) represented by this row to prevent redundantly listing each field again for an appfld.email.last.rcvd.{id} section . . . |
| . . . other field sections . . . | . . . |

Email section 8002*c* information contains useful information for LBX sharing and novel applications thereof with respect to (wrt) an email application. For example, a WDR received may be treated uniquely based on an email in progress (WDR in-process at receiving MS or sending MS) or an email last sent (WDR in-process at receiving MS or sending MS). Charters can use data above in AppTerm form as well. In some MS embodiments there are multiple email applications wherein the hierarchical section structure would be affected for supporting each email application with data specific for the particular application (e.g. appfld.email.outlook for qualifying all outlook subordinate sections (e.g. appfld.email.outlook.type), appfld.email.express for qualifying all express subordinate sections, etc).

Address Book (AB) section 8002*e* includes subordinate sections including the following examples:

| | |
|---|---|
| appfld.ab.id | This value is preferably used to default appfld.source.id.ab, but can be changed based on permissions. |
| appfld.ab.default. attribute.Y | Defaults for composing AB entries: appfld.ab.default.attribute.marker = NONE or specific visual marker type for entry created; appfld.ab.default.attribute.color = color of entry in address book; appfld.ab.default.attribute.font = font used for text; appfld.ab.default.attribute.size = size of font used. In one embodiment, the attribute section is a bit mask for enable/disable of well known bit position attributes. There can be many attributes. |
| appfld.ab.default. background | Background color, pattern, tiled picture, stretched picture, and/or animation file (e.g. HTML). May be null. |
| appfld.ab.default.$ | $ = other field sections. |
| appfld.ab.type | AB app type/name can inform others which application is used. |
| appfld.ab.pending. attribute.Y | Attributes of pending AB entry being composed as described above. In one embodiment, the attribute section is a bit mask for enable/disable of well known bit position attributes. |
| appfld.ab.pending. background | Background color, pattern, tiled picture, stretched picture, and/or animation file (e.g. HTML) for pending/composed entry. May be null. |
| appfld.ab.pending.cdt | AB initial creation date/time stamp for pending entry. |
| appfld.ab.pending. content | AB data (e.g. ab body, attachment(s), etc) being created, which may be transported between MSs. This enables a peer to peer AB delivery (see MS2MS processing). No service is required for MS users to talk to each other. appfld.ab.pending.content.name = the currently constructed AB entry name or reference to entry. appfld.ab.pending.content.body = the currently constructed AB entry body being composed. Attachments are supported with appfld.ab.pending.content.attach.ct for the number (ct = count) of attachments and appfld.ab.pending.content.attach.# (1 for first, 2 for second, etc.) for an AB entry being composed (i.e. pending). |
| appfld.ab.pending.group | Optional group(s) (delimited if plural) tagging the AB entry for organization (e.g. Family; Cousins). May be null. |
| appfld.ab.pending.$ | $ = other field sections. |
| appfld.ab.last.local.ANY. attribute.Y | Attributes of AB entry last created locally wherein .attribute.Y described above for appfld.ab.default.attribute.Y. |
| appfld.ab.last.local.ANY. background | Background color, pattern, tiled picture, stretched picture, and/or animation file (e.g. HTML) of last completed AB entry at MS. |
| appfld.ab.last.local.ANY. cdt | AB creation date/time stamp of AB entry last created at MS. |
| appfld.ab.last.local.ANY. content | AB data (e.g. body, attachment(s), etc) of AB entry last created at MS. See above for field section descriptions. |
| appfld.ab.last.local.ANY. group | Optional group(s) tagging the AB entry last created at MS. |
| appfld.ab.last.local.ANY.$ | $ = other field sections. |
| appfld.ab.last.local. {id}.* | There is a field here for each appfld.ab.last.local.ANY.* field above, however a specific id can be specified (e.g. joe@yahoo.com). This allows access to fields of the most recently created AB item for a specific person (e.g. MS user). There are a plurality of fields (i.e. *) represented by this row to prevent redundantly listing each field again for an appfld.ab.last.local.{id} section . . . |
| appfld.ab.last.other. ANY.* | There is a field here for each appfld.ab.last.local.ANY.* field above, however the other qualifier indicates that each field is for the most recent AB entry created by another user (e.g. received by the MS from anyone). There are a plurality of fields (i.e. *) represented by this row to prevent redundantly listing each field again for an appfld.ab.last.other.ANY section . . . |

-continued

| | |
|---|---|
| appfld.ab.last.other.{id}.* | There is a field here for each appfld.ab.last.other.ANY.* field above, however a specific id can be specified (e.g. joe@yahoo.com). This allows access to fields of the most recently created AB item from a specific user. There are a plurality of fields (i.e. *) represented by this row to prevent redundantly listing each field again for an appfld.ab.last.other.{id} section . . . |
| . . . other field sections . . . | . . . |

AB section **8002*e*** information may contain useful information for LBX sharing and novel applications thereof wrt an AB application. For example, a WDR received may be treated uniquely based on an AB entry in progress (WDR in-process at receiving MS or sending MS) or an AB entry last sent (WDR in-process at receiving MS or sending MS). Charters can use data above in AppTerm form as well. In some MS embodiments there are multiple AB applications wherein the hierarchical section structure would be affected for supporting each AB application with data specific for the particular application (e.g. appfld.ab.outlook for qualifying all outlook subordinate sections (e.g. appfld.ab.outlook.type), appfld.ab.rolodex for qualifying all rolodex subordinate sections, etc).

Calendar section **8002*d*** includes subordinate sections including the following examples:

| | |
|---|---|
| appfld.calendar.id | This value is preferably used to default appfld.source.id.calendar, but can be changed based on permissions. |
| appfld.calendar.default.attribute.Y | Defaults for composing CALENDAR entries: appfld.calendar.default.attribute.cod = confirmation of delivery of meeting notice; appfld.calendar.default.attribute.urgent = mark calendar entry/notice as urgent; appfld.calendar.default.attribute.color = color for highlight of entry or NONE; In one embodiment, the attribute section is a bit mask for enable/disable of well known bit position attributes. There can be many attributes. |
| appfld.calendar.default.recips | Comma separated recipients for defaulting in a calendar notice recipient list. These are not defaulted into meeting notices unless requested by the user during composition. A special qualifier can used to specify the type of recipient (e.g. "davood.iyadi@lbxphone.com, cc:ravi.sirrayanan@lbxphone.com, bc:sam.sunn@lbxphone.com" specifies a copy recipient ravi and a blind copy recipient sam. No qualifier is a required attendee. There may be other qualifiers for other recipient types.) |
| appfld.calendar.default.camp | Can share with others whether you permit meeting notices created by others to camp on one of your calendar entries already scheduled. Then, if the original meeting is cancelled, the camped-on meeting becomes scheduled and attendees are automatically notified. True or False. |
| appfld.calendar.default.$ | $ = other field sections. |
| appfld.calendar.type | CALENDAR app type/name can inform others which application is used. |
| appfld.calendar.pending.attribute.Y | Attributes of pending CALENDAR entry being composed as described above. In one embodiment, the attribute section is a bit mask for enable/disable of well known bit position attributes. |
| appfld.calendar.pending.recips | Recipients of calendar entry being composed. |
| appfld.calendar.pending.camp | Camp-on permission of calendar entry being composed. |
| appfld.calendar.pending.cdt | CALENDAR initial creation date/time stamp for pending entry. |
| appfld.calendar.pending.content | CALENDAR data (e.g. calendar body, attachment(s), etc) being created, which may be transported between MSs. This enables a peer to peer CALENDAR delivery (see MS2MS processing). No service is required for MS users to talk to each other. appfld.calendar.pending.content.subj = the subject of the calendar notice. appfld.calendar.pending.content.body = the currently constructed CALENDAR entry body being composed. Attachments are supported with appfld.calendar.pending.content.attach.ct for the number (ct = count) of attachments and |

-continued

| | |
|---|---|
| | appfld.calendar.pending.content.attach.# (1 for first, 2 for second, etc.) for an CALENDAR entry being composed (i.e. pending). |
| appfld.calendar.pending.datetimes | CALENDAR scheduling information (when scheduled). |
| appfld.calendar.pending.recurring | CALENDAR appointment recurring information (e.g. every week, every month, etc) of composed calendar entry. May be null. |
| appfld.calendar.pending.$ | $ = other field sections. |
| appfld.calendar.last.local.ANY.attribute.Y | Attributes of CALENDAR entry last created locally wherein attribute.Y described above for appfld.calendar.default.attribute.Y. |
| appfld.calendar.last.local.ANY.recips | Same as appfld.calendar.default.recips except for the last entry created locally. |
| appfld.calendar.last.local.ANY.camp | Same as appfld.calendar.default.camp except for the last entry created locally. |
| appfld.calendar.last.local.ANY.cdt | CALENDAR creation date/time stamp of CALENDAR entry last created at MS. |
| appfld.calendar.last.local.ANY.content | CALENDAR data (e.g. body, attachment(s), etc) of CALENDAR entry last created at MS. See above for field section descriptions. |
| appfld.calendar.last.local.ANY.datetimes | Same as appfld.calendar.default.datetimes except for the last entry created locally. |
| appfld.calendar.last.local.ANY.recurring | Same as appfld.calendar.default.recurring except for the last entry created locally. |
| appfld.calendar.last.local.ANY.$ | $ = other field sections. |
| appfld.calendar.last.local.{id}.* | There is a field here for each appfld.calendar.last.local.ANY.* field above, however a specific id can be specified (e.g. joe@yahoo.com). This allows access to fields of the most recently created CALENDAR item for a specific person (e.g. MS user). There are a plurality of fields (i.e. *) represented by this row to prevent redundantly listing each field again for an appfld.calendar.last.local.{id} section . . . |
| appfld.calendar.last.other.ANY.* | There is a field here for each appfld.calendar.last.local.ANY.* field above, however the other qualifier indicates that each field is for the most recent CALENDAR entry created by another user (e.g. received by the MS from anyone). There are a plurality of fields (i.e. *) represented by this row to prevent redundantly listing each field again for an appfld.calendar.last.other.ANY section . . . |
| appfld.calendar.last.other.{id}.* | There is a field here for each appfld.calendar.last.other.ANY.* field above, however a specific id can be specified (e.g. joe@yahoo.com). This allows access to fields of the most recently created CALENDAR item from a specific user. There are a plurality of fields (i.e. *) represented by this row to prevent redundantly listing each field again for an appfld.calendar.last.other.{id} section . . . |
| appfld.calendar.next.X | Always contains the next forthcoming (wrt current MS date/time) appointment calendar entry information such as date/time stamp, attendees, location, etc in form: appfld.calendar.next.X for each section (field) X. Can share as appropriate. |
| appfld.calendar.nextavail.X | Can share your next free period of time X on your calendar wrt current MS date/time, such that X is hour (e.g. appfld.calendar.nextavail.hour), day, week, etc. There are many embodiments for permitted forthcoming periods of time available. |
| appfld.calendar.sched.X | Can share any specified calendar portion schedule with others. Embodiments support an X section for any conceivable subset of time of a calendar. The X field is parse-able data (e.g. string) for information. |
| . . . other field sections . . . | . . . |

Calendar section 8002*d* information contains useful information for LBX sharing and novel applications thereof wrt a calendar application. For example, a WDR received may be treated uniquely based on a calendar entry, or meeting notice, in progress (WDR in-process at receiving MS or sending MS) or a calendar entry, or meeting notice, last sent (WDR in-process at receiving MS or sending MS). Charters can use data above in AppTerm form as well. In some MS embodiments there are multiple calendar applications wherein the hierarchical section structure would be affected for supporting each calendar application with data specific for the particular application (e.g. appfld.calendar.outlook for qualifying all outlook subordinate sections (e.g. appfld.ab.outlook.type), appfld.calendar.meetingplace for qualifying all meetingplace subordinate sections, etc).

Phone section **8002*f*** includes subordinate sections including the following examples:

| | |
|---|---|
| appfld.phone.id | = (e.g. "214-405-9999") The real MS caller id which cannot be changed. This number is provided by the telecommunications service provider, or by the peer to peer MS telephone plan. Can be shared with others. This value is preferably used to default appfld.source.id.phone, but can be changed based on permissions (e.g. specify different phone id). |
| appfld.phone.default. volume | Phone call default volume. |
| appfld.phone.default. encrypt | Phone call default encryption algorithm for outgoing voice call. Receiving system recognizes that call is encrypted and handles appropriately. See encryption choices discussed above. May be null. |
| appfld.phone.default. compress | Phone call default compression algorithm for outgoing voice call. Receiving system recognizes that call is compressed and handles appropriately. See compression choices discussed above. May be null. |
| appfld.phone.default. camp | Phone call default camp-on variable which when true allows callers to camp-on a busy phone call session (i.e. call waiting) in a priority order. A unique call waiting tone notifies the MS user for each new party camped-on. |
| appfld.phone.default.$ | $ = other field sections. |
| appfld.phone.caller | Can override appfld.phone.id with a different caller id for the MS if appropriate privileges exist. This allows overriding a real caller id with an acceptable text string. |
| appfld.phone.log.in | Log for calls received by the MS (analogous to a cell phone log with historical number). |
| appfld.phone.log.out | Log for calls made by the MS (analogous to a cell phone log with historical number). |
| appfld.phone.log.missed | Log for calls missed by the MS (analogous to a cell phone log with historical number). |
| appfld.phone.log.vmail | Log for calls that left message to voice mail at the MS (analogous to a cell phone log with historical number). |
| appfld.phone.log.$ | $ = other log field sections. |
| appfld.phone.record.X | appfld.phone.record.rx = True (record voice data of all calls received); appfld.phone.record.tx = False (do not record voice data of all calls made from MS: False is the default so need not be specified); appfld.phone.record.713-303-8900 = True (record calls made to, or received from 713-303-8900); appfld.phone.record.tx:713-303-8900 = True (record calls made to 713-303-8900); appfld.phone.record.rx:713-303-8900 = True (record calls received from 713-303-8900); Other embodiments will support other prefixes for qualifying what to do with recording a specific number (e.g. appfld.phone.record.tx,Houston:713-303-8900 = True (record calls into the Houston folder made to 713-303-8900).Wildcards are supported where reasonable: appfld.phone.record.713* = True (record calls made to, or received from any number from area code 713). appfld.phone.record.ct contains the total number of current record.X configurations excluding the .ct configuration. appfld.phone.record.folder = where to place recording file. Each recording file is identified with its create date/time stamp, and the MS ID involved (e.g. file name convention). Storage is limited, so the MS user should monitor to prevent out of space conditions. |
| appfld.phone.ogm | Can share your OutGoing voice mail Message. Alternate embodiments support appfld.phone.ogm.X wherein X in [primary, alternate1, alternate2, . . . alternateN]. |
| appfld.phone.dt.out | Date/time stamp for last call made from MS. |
| appfld.phone.dt.in | Date/time stamp last call received to MS. |
| appfld.phone.dt.missed | Date/time stamp for last call missed at MS. |
| appfld.phone.type | Phone application type/name can inform others which application is used. |
| appfld.phone.fwd | A parse-able syntactical string of instructions in left to right priority order for how to forward the call with options for other phone number(s), directly to voice mail, conversion to an email, or conversion to a fax. This section is used by other section processing. See appfld.phone.blackout section. This is also used for |

| | |
|---|---|
| | the DND (Do Not Disturb) function for forwarding directly to voice mail. |
| appfld.phone.ring | Ring setting = ring tone selection reference OR audio file reference. |
| appfld.phone.vibe | Vibration setting = None OR reference for vibration type. |
| appfld.phone.droplocs.X | appfld.phone.droplocs.ct = number of dropped call locations saved at MS, preferably after a system threshold reached for same location; appfld.phone.droplocs.#.data = (# in [1..ct]) parse-able data describing location information where phone calls were likely consistently dropped by the local MS poor reception. Data preferably qualifies the location suspected of being dropped such as speed, date/time, elevation, etc. A reasonably sized FIFO queue of dropped call data records is automatically maintained for later warning MS user(s) of trouble spots at a future time. |
| appfld.phone.macro.X | appfld.phone.macro.ct = number of automated ARU interface macros saved/recorded for automated ARU interface use. appfld.phone.#.name = (# in [1..ct]) macro name; appfld.phone.#.cdt = (# in [1..ct]) creation date/time in Julian format (e.g. 8 bytes); appfld.phone.#.ldt = (# in [1..ct]) = last changed date/time stamp in Julian format (e.g. 8 bytes); appfld.phone.#.source = (# in [1..ct]) null terminated string macro (e.g. for stocks. "1-800-453-6767:1323211"; This indicates a macro named "stocks". The string which follows is the macro and can take various forms; may also be in binary format). See U.S. Pat. No. 5,835,571 ("Automated telephone service interface", Johnson) for embodiments supported here. |
| appfld.phone.pwd.X | appfld.phone.pwd.ct = number of configurations; appfld.phone.pwd.#.pred = (# in [1..ct]) called phone identifier (e.g. called number) for assigned password with wildcarding supported (e.g. 856-234-5589 for specific number, 713* predicate for all calls made to 713 area code, etc); appfld.phone.pwd.#.pwd = (# in [1..ct]) for the associated password. Calling passwords may be shared for a MS user's phone directory maintained. appfld.phone.pwd.#.enabled = (# in [1..ct]) for True to use/transmit the password, otherwise False indicates to not send it as trailing information. See U.S. Pat. No. 5,912,959 ("Method of and system for password protection in a telecommunications network", Johnson) for MS receiving embodiments provided the origination of the call and network, or peer to peer MS2MS implementation, supports processing the password information with the call. If the trailing password is not supported by the receiving MS, or switch, the trailing information is simply ignored. |
| appfld.phone.pwd.rx | appfld.phone.pwd.rx is a delimited (e.g. semicolon) list of passwords which others must use in order for their calls to succeed to this MS. The receiving MS for MS2MS peer calls made will check for a match to the password(s) in order to connect the call when appfld.phone.pwd.rxon = True, otherwise appfld.phone.pwd.rx is not used. One password is typically used, but there may be reasons to provide different password to different callers for unique call processing - e.g. appfld.phone.record section, appfld.phone.fwd section, etc. Calls received are treated uniquely based on the password that accompanies the call. See U.S. Pat. No. 5,912,959 ("Method of and system for password protection in a telecommunications network", Johnson). This disclosure improves that U.S Patent with variable processing based on the password entered. May be null. |
| appfld.phone.pwd.rxon | Boolean for enable or disable of appfld.phone.pwd.rx. |
| appfld.phone.blackout | This configuration is very useful for preventing the taking of calls. Calls are automatically forwarded to appfld.phone.fwd processing when one or more blackout conditions are true. This is a syntactical expression which gets elaborated to determine a Boolean True or False result. True causes forward processing, False does not. A charter can be |

-continued

| | |
|---|---|
| | configured for setting this as desired. In an alternate embodiment, .blackout itself contains the Expression (see BNF grammar FIG. 30D) which determines whether or not the call is forwarded as specified by appfld.phone.fwd. Anything that can be specified in a charter expression can be specified here syntactically (e.g. FIG. 51B). In process WDR references (____ref, __I__ref, __O__ref) and profile operators are somewhat odd because a WDR is not the trigger for processing. If used, these are supported by referencing the most recent applicable WDR information being referenced at the MS, and the most recent applicable profile information (all of which are preferably cached as at least a single last instance). WITS filtering would incorporate/invoke/call processing described for FIG. 57 and block 5744. In this alternate embodiment, the .blackout section never forwards to .fwd when an error occurs as the result of referencing undefined data. Any error in the Expression is logged to LBX History 30 and renders this configuration useless. May be null. |
| appfld.phone.msg.X | appfld.phone.msg.new.recref = the reference where messages are maintained (e.g. folder name); appfld.phone.msg.new.ct = number of new messages (not yet listened to by MS user); appfld.phone.msg.new.#.record = (# in [1..ct]) the voice mail message left at the MS for the MS user wherein the first 8 bytes contains a date/time stamp in Julian floating point form, the following bytes are a null terminated string containing the caller id, and the remaining datastream contains the recording; appfld.phone.msg.saved.recref = the reference where messages are saved (e.g. folder name); appfld.phone.msg.saved.ct = number of saved messages (already listened to by MS user); appfld.phone.msg.saved.#.record = (# in [1..ct]) the voice mail message left at the MS for the MS user wherein the first 8 bytes contains a date/time stamp in Julian floating point form, the following bytes are a null terminated string containing the caller id, and the remaining datastream contains the recording; The MS user can save voice mail messages to other MS system destinations (e.g. folders), and other data may be saved with the messages in appfld.phone.msg.X.record. |
| appfld.phone.pending. volume | Pending call volume. |
| appfld.phone.pending. encrypt | Pending call encryption algorithm or null. |
| appfld.phone.pending. compress | Pending call compression algorithm or null. |
| appfld.phone.pending. camp | Pending call camp-on setting. (True or False). |
| appfld.phone.pending. cdt | Pending call creation/date time (when call started). |
| appfld.phone.pending. recref | Pending call recording reference (e.g. file name) or null. |
| appfld.phone.pending. pwd | Pending call applicable password used or null. |
| appfld.phone.pending. macro | Pending call macro used or null. |
| appfld.phone.pending. orig | Caller id of originator of the call. |
| appfld.phone.pending. data | This is voice call data which is only present in incoming or outgoing WDRs when a peer to peer MS2MS call is in progress. This section contains a subset of the call since the call may be ongoing, and previous WDRs contain old voice call data. .data contains a snapshot of voice data of a call in progress. |
| appfld.phone.pending.$ | $ = other field sections. |
| appfld.phone.last.out.ANY. cdt | Call start date/time. |
| appfld.phone.last.out.ANY. recref | Call recording reference if recorded, otherwise null. |
| appfld.phone.last.out.ANY. pwd | Call password is used, otherwise null. |
| appfld.phone.last.out.ANY. macro | Call macro if used, otherwise null. |

-continued

| | |
|---|---|
| appfld.phone.last.out.ANY.orig | Call originator caller id. |
| appfld.phone.last.out.ANY.edt | Call end date/time. |
| appfld.phone.last.out.ANY.$ | $ = other field sections. |
| appfld.phone.last.out.{id}.* | There is a field here for each appfld.phone.last.out.ANY.* field above, however a specific id can be specified (e.g. 214-403-4071). This allows access to fields of the most recently completed call made to a specific person (e.g. MS user). There are a plurality of fields (i.e. *) represented by this row to prevent redundantly listing each field again for an appfld.phone.last.out.{id} section . . . |
| appfld.phone.last.in.ANY.* | There is a field here for each appfld.phone.last.in.ANY.* field above, however the qualifier indicates that each field is for the most recent phone call received from another MS user (e.g. received from anyone). There are a plurality of fields (i.e. *) represented by this row to prevent redundantly listing each field again for an appfld.phone.last.in.ANY section . . . |
| appfld.phone.last.in.{id}.* | There is a field here for each appfld.phone.last.in.ANY.* field above, however a specific id can be specified (e.g. 214-403-4071). This allows access to fields of the most recent phone call received from a specific user. There are a plurality of fields (i.e. *) represented by this row to prevent redundantly listing each field again for an appfld.phone.last.in.{id} section . . . |
| . . . other field sections . . . | . . . |

Phone section **8002*f*** information contains useful information for LBX sharing and novel applications thereof wrt a phone application. For example, a WDR received may be treated uniquely based on a phone call in progress (WDR in-process at receiving MS or sending MS) or a phone call last made (WDR in-process at receiving MS or sending MS). Charters can use data above in AppTerm form as well. In some MS embodiments there are multiple phone applications wherein the hierarchical section structure would be affected for supporting each phone application with data specific for the particular application (e.g. appfld.phone.dialit for qualifying all dialit phone application subordinate sections (e.g. appfld.ab.dialit.type), appfld.phone.skype for qualifying all skype subordinate sections, etc)). Additional appfld.phone section data is defined for MS conference call capability, such as tracking all callers who are parties to a current or past conference call.

Dropped locations provide a directory to "trouble-spots" that a MS user may encounter in the future. The directory of "trouble-spots" are used to warn a MS user of areas to avoid when engaging in phone calls. In one embodiment, when a MS user travels to the direction of a location marked as a dropped call location, the user is alerted with a reminder. In another embodiment, the user is alerted with a reminder during an active phone call when approaching a dropped call location. In another embodiment, a threshold is configured for a number of acceptable dropped calls in the vicinity of a location. After that threshold is reached (e.g. >=3 times), the user is alerted for future travels to the particular location. There are various embodiments for making user of "trouble-spot" history to inform a user at a future time.

Emergency section **8002*g*** includes subordinate sections including the following examples:

| | |
|---|---|
| appfld.emergency.type | appfld.emergency.type = "Fire", "Police", "Ambulance", "Amber", "Person Needs Help", "Construction Caution", "Traffic Caution", "Terror Alert", or any other emergency, warning or alert situation description. This may be a well known byte code indication for space preservation rather than a string. An originator specification. |
| appfld.emergency.cdt | Emergency/warning creation date/time stamp. |
| appfld.emergency.duration | = a period of time in seconds, minutes, hours, days, weeks, etc. See time period specifications discussed above. NULL indicates to remain in effect until WDRs are not being received with the information. This is used with .cdt to determine when to move to .last. An originator specification. |
| appfld.emergency.content.type | Content type (e.g. string). An originator specification. |
| appfld.emergency.content.alert | The content alert = (e.g. "Ambulance Needs Right-Of-Way!"). An originator specification. |
| appfld.emergency.content.prefmeth | appfld.emergency content.prefmeth = preferred method for notifying user (visual, audio, both) in which case a conversion may take place to recipient MS .method. An originator specification. |
| appfld.emergency.method. | appfld.emergency method,meth = audio, focused |

-continued

| | |
|---|---|
| meth | object, alert area (predefined alert area), or any combination thereof. A conversion may take place depending how .prefmeth was specified. A recipient MS specification. |
| appfld.emergency.method.font | Font to use when displayed in predefined area. A recipient MS specification. |
| appfld.emergency.method.size | Size to use when displayed in predefined area. A recipient MS specification. |
| appfld.emergency.method.color | Color of textual alert to use when displayed in predefined area. A recipient MS specification. |
| appfld.emergency.method.volume | Volume of audio alert to use. A recipient MS specification. |
| appfld.emergency.method.$ | $ = other field sections. |
| appfld.emergency.last.self | An entire copy of the most recent WDR containing an emergency which was sent out from this MS. An alternate embodiment may choose any subset of the WDR, but emergency sections of fields 1100k and the WDR location information are important to maintain for functionality herein. |
| appfld.emergency.last.other | An entire copy of the most recent WDR containing an emergency which was received by this MS from another MS. An alternate embodiment may choose any subset of the WDR, but emergency sections of fields 1100k and the WDR location information are important to maintain for functionality herein. |
| . . . other field sections . . . | . . . |

Emergency section 8002*g* information contains useful information for LBX sharing and novel applications thereof wrt an emergency or warning application. Furthermore, a MS user ("Individual") may want to generate help requests using this section. A WDR received may be treated uniquely based on a known emergency situation in progress (WDR in-process at receiving MS or sending MS) or an emergency situation which recently occurred (WDR in-process at receiving MS or sending MS). Charters can use data above in AppTerm form as well. In some MS embodiments there are multiple emergency/warning/alerting/help-request applications wherein the hierarchical section structure would be affected for supporting each application variety with data specific for the particular application.

In one example, fire trucks speed to the scene of a fire. Without the use of a service (i.e. peer to peer MS communications), an automobile (i.e. fire-truck) installed or fireman handheld MS beacons WDRs which are received by other MSs in the vicinity (e.g. other driver MSs). Recipient peer MSs can determine from time and location information whether or not to alert their users that the fire truck(s) is nearby (e.g. approaching fast from behind) and needs the road cleared for easy passing. MS users can then drive to the side of the road and allow easy access for the fire trucks.

Locational section 8002*h* includes subordinate sections including the following examples:

| | |
|---|---|
| appfld.loc.blackout | This configuration is very useful for preventing the beaconing of WDRs (outbound). WDRs are prevented by WITS filtering from being transmitted outbound. True prevents transmission, False has no effect on the outbound destined WDR. A charter can be configured for setting .blackout as desired. May be null for False. This could be simply set to True to always prevent beaconing WDRs. In an alternate embodiment, .blackout itself contains the Expression (see BNF grammar FIG. 30D) which determines whether or not the WDR(s) are beaconed. Anything that can be specified in a charter expression can be specified here syntactically (e.g. FIG. 51B). In process WDR references (____ref, __I__ref, __O__ref) and profile operators are somewhat odd because a WDR is not the trigger for processing. If used, these are supported by referencing the most recent applicable WDR information being referenced at the MS, and the most recent applicable profile information (all of which are preferably cached as at least a single last instance). WITS filtering would incorporate/invoke/call processing described for FIG. 57 and block 5744. In this alternate embodiment, the .blackout section evaluates to False when an error occurs as the result of referencing undefined data. Any error in the Expression is logged to LBX History 30 and renders this configuration as set to False. |
| appfld.loc.mode | Current MS mode = DLM or ILM (e.g. maintained at FIG. 2F processing). |
| appfld.loc.geofence.X | appfld.loc.geofence.ct = count of geofences configured; appfld.loc.geofence.#.name (# in [1..ct]) = a null terminated string name for the geofence configured; |

| | |
|---|---|
| | appfld.loc.geofence.#.source (# in [1..ct]) = geofence data encoding with a binary encoding length in the first 4 bytes, or a null terminated encoding string. See "Pingimeters" of U.S. patent pending Ser. No. 11/207,080 ("System and Method for Anonymous Location Based Services", Johnson). "Geofence" is the industry terminology referenced with the gpsping.com trademark term Pingimeter. The lbxPhone ™ enforces a reasonable maximum number configured by the user. |
| appfld.loc.halo.units | The units (inches, feet, meters, miles, etc) of the "halo" around this MS. |
| appfld.loc.halo.value | The distance measurement of the halo around the mobile MS in the units of appfld.loc.halo.units. This is identical to a "moving interest radius" since it is a radius around the MS. See "moving interest radius" of U.S. patent pending Ser. No. 11/207,080 ("System and Method for Anonymous Location Based Services", Johnson). A "Halo" is a new coined term for a "mobile interest radius" in the MS peer to peer LBX architecture. "Halo" terminology provides software engineer jargon to distinguish between a peer to peer moving interest radius in the LBX architecture from a moving interest radius in a conventional service centric architecture. |
| appfld.loc.mark.X | appfld.loc.mark.ct = count of marks being maintained at the MS. appfld.loc.mark.#.name = (# in [1..ct]) null terminated name/description for the mark; appfld.loc.mark.#.cdt = (# in [1..ct]) 8 bytes containing creation date/time in Julian format; appfld.loc.mark.#.ldt = (# in [1..ct]) 8 bytes containing last changed date/time in Julian format; appfld.loc.mark.#.source = (# in [1..ct]) appropriate encoding for mark location information (e.g. WDR fields 1100c, 1100e, 1100h, 1100i, 1100j, etc). The length of location information is kept in the first 2 bytes of the .source datastream, unless encoded as a null terminated string. Location marks (sometimes called "location tags" or "waymarks") can be set for use. For example, a user wants to mark where he parked the car prior to entering a shopping mall. The user sets a mark for the location without needing to know details of the location. That mark can then be used in a charter(s) to automatically notify the user that he is approaching his vehicle in the parking lot, or can direct the user to the vehicle, indicate how far away, or provide other useful navigation information. |
| appfld.loc.dcdb.X | appfld.loc.dcdb.ct = count for number of deliverable content database (DCDB) records being maintained at the MS for automated delivery to the MS user, or peer MS users provided applicable permissions are in place, and charters are configured for trigger processing; appfld.loc.dcdb.#.desc = (# in [1..ct]) null terminated description or name for the DCDB entry; appfld.loc.dcdb.#.cdt = (# in [1..ct]) 8 bytes containing creation date/time in Julian format; appfld.loc.dcdb.#.ldt = (# in [1..ct]) 8 bytes containing last changed date/time in Julian format; appfld.loc.dcdb.#.source = (# in [1..ct]) appropriate encoding for DCDB data. The length of DCDB information is kept in the first 2 bytes of the .source datastream, unless encoded as a null terminated string. DCDB information is encoded as an embodiment of DCDB record data disclosed in U.S. Pat. Nos. 6,456,234; 6,731,238; 7,187,997, and Ser. No. 11/207,080 (Johnson). A MS may maintain here its own content, as well as content for, or from, others. Permissions govern how the data is shared and charters configured govern how the data is used. The DCDB is a set of records for defining situational locations (see U.S. Pat. Nos. 6,456,234; 6,731,238; 7,187,997 (Johnson)) with associated DCDB information for delivery. No service is involved here. Delivery is automated between MSs in the vicinity of each other, for example in a peer to peer manner. |
| appfld.loc.beacon.expr | appfld.loc.beacon.expr = expression to be evaluated at the receiving MS for determining if true or false. A true evaluation results in the received WDR being further processed, otherwise a False results in WITS filtering causing the WDR to be filtered out from further processing. For, example, an expression of ((\thisMS = "Larry") & \loc_my $(50F) _I_location) & (_I_msid = Joe)) is used to identify if the receiving MS Larry is within 50 |

-continued

| | |
|---|---|
| | feet of the MS Joe. Note that the expression gets evaluated at the receiving MS as through the expression were originally specified there, so the requesting user (if privileged) must be careful to encode in terms of that MS. Any supported charter expression can be specified. Anything that can be specified in a charter expression can be specified here syntactically (e.g. FIG. 51B), except __O__ref and ____ref specifications are not supported since it is an inbound WDR for processing. WITS filtering incorporates/invokes/calls processing described for FIG. 57 and block 5744. Any error in the Expression is logged to LBX History 30 and renders this configuration as set to true. appfld.loc.beacon.cdt = 8 bytes containing creation date/time in Julian format; appfld.loc.beacon.ldt = 8 bytes containing last changed date/time in Julian format; In an alternate embodiment wherein WDRs are Wireless Data Records without location information, this data may be moved to a more appropriate section for processing. |
| appfld.loc.beacon.type | appfld.loc.beacon.expr = setting used when .expr has been specified; NONE = do not beacon the receiving MS (i.e. WDR is processed as usual); AUDIO = sound file to be played at MS if the sending user is so privileged. In one embodiment, an additional appfld.loc.beacon.vol specifies a volume setting if the sending user is so privileged; CHARTER = a named charter section which can be executed if the sending MS user is so privileged (i.e. any actions for any conditions can be performed); Encoding includes a single type code followed by a null terminated data string. |
| . . . other field sections . . . | . . . |

Locational section **8002*h*** information contains useful information for LBX sharing and novel applications thereof wrt a locational application. Prior art required a service for automated functionality using geofences and content delivery. A WDR received may be treated uniquely based on a known locational situation in progress (WDR in-process at receiving MS or sending MS) or a locational situation which recently occurred (WDR in-process at receiving MS or sending MS). Charters can use data above in AppTerm form as well. In some MS embodiments there are multiple locational applications wherein the hierarchical section structure would be affected for supporting each application variety with data specific for the particular application.

Perhaps one of the more exciting registered applications in the LBX architecture has been the Radio Frequency Identification (RFID) section. The wireless multi-wave, multi-frequency and multi-channel nature of an lbxPhone™ together with many emerging RFID applications makes a great marriage. Passive RFID devices do not contain a battery. The power is supplied by the MS when reading the RFID tag. The MS transfers energy to the RFID device (e.g. a transponder) by emitting electromagnetic waves through the air (i.e. wireless). The RFID device uses the Radio Frequency (RF) energy to charge up and it receives command/data signal information. The RFID device then responds accordingly to the MS. The MS receives the response and performs applicable processing. For example, when appropriate radio waves from the MS are encountered by a passive RFID device, a coiled antenna within the device forms a magnetic field which provides power for energizing circuits in the device. Other passive embodiments may also be used. The device can then carry out capable functionality (e.g. respond automatically with information). Active RFID devices contain a power source (e.g. battery) for the device's circuitry and antenna, and therefore tends to carry out richer functionality. A MS may respond to an active RFID device (i.e. RFID device initiates) or may initiate communicating with it. A passive RFID device and active RFID device are data processing systems. An LBX enabled MS is not intended to address issues with RFID technologies (e.g. zombies, distance, encryption, size, use, environment, etc), but to leverage use and enhance user experiences with novel applications. RFID operations, standards, frequency ranges (e.g. LF, HF, UHF) and embodiments are well known in the art. RFID section **8002*i*** includes subordinate sections including the following examples:

| | |
|---|---|
| appfld.rfid.id | This value is preferably used to default appfld.source.id.rfid, but can be changed based on permissions. RFID identifier of MS. |
| appfld.rfid.passive.enabled | = True (MS is enabled for passive RFID capability), otherwise False (the default). This means the MS has its own RFID capability for other readers (e.g. an RFID passive module incorporated therein/thereon). In one embodiment, a MS is a small and minimal scale product for being used as a more intelligent radioactive tag to be placed on an article of manufacture (e.g. shipping container). MS passive RFID capability. |
| appfld.rfid.passive.channel | The unique channel identifier for MS RF communications used in listening for probes to respond to. The channel is set up ahead of time by an administrator and has associated wave form characteristics (e.g. frequency). |

-continued

| | |
|---|---|
| appfld.rfid.passive. response | The byte stream to respond to a (initial) probe with. This is of a limited length dependent on the length of time available for power to the installed passive RFID module. The response may contain instructions for subsequent MS interoperability processing (e.g. carried by subsequent WDR data in application fields 1100k). In some embodiments, the passive RFID module has no interface to this data in which case the passive RFID module provides its own data in response and the MS user has no control over data which is responded with. |
| appfld.rfid.active.enabled | = True (MS is enabled for active RFID capability), otherwise False (the default). This means the MS has its own RFID capability enabled on at least one channel for other readers as evidenced in appfld.rfid.listen.X sections. In one embodiment, a MS is a small and minimal scale product for being used as a more intelligent radio-active tag to be placed on an article of manufacture (e.g. shipping container). All MS active RFID capability can be enabled or disabled with this field. An alternate embodiment supports a section appfld.rfid.listen.#.enabled = True or False below for enabling/disabling individual channel usage that remains administrated. |
| appfld.rfid.listen.X | This reflects MS configured capability to interact with active initiating RFID devices. appfld.rfid.listen.ct = count (number) of RFID channels configured to listen on. appfld.rfid.listen.#.channel = (# in [1..ct]) a channel that has been configured in advance so that any transmissions received from active RFID tags is received through a receive queue to at least one thread handling the channel. A channel maps to a communications interface 70 for supporting any variety of communications, preferably through a receive queue interface of receive queue 26 with an identifier for distinguishing which thread(s) are to receive what is deposited to the queue. A separate queue may be implemented as well. This discussion is analogous to receive queue 26 discussions above. A channel has associated wave form characteristics (e.g. frequency) and anticipated protocol. An administrator has configured the MS and receive threads in advance (e.g. appfld.rfid.listen.1.channel = 12980000 such that 12980000 is the channel id (which coincidentally is the same as 12.98 Mhz). Presence of appfld.rfid.listen.# sections implies they are enabled. Removal of the entry implies disabling it. appfld.rfid.listen.#.launch = (# in [1..ct]) the fully qualified executable path (e.g. invoked application) or callback interface to invoke. The preferred embodiment passes the channel identifier from the received queue so that a single executable is able to handle all configured channels. However, that single executable can receive appfld.rfid.listen.#.launch for in turn invoking a unique executable specified here for the channel. appfld.rfid.listen.#.cdt = (# in [1..ct]) 8 bytes containing creation date/time in Julian format; appfld.rfid.listen.#.ldt = (# in [1..ct]) 8 bytes containing last changed date/time in Julian format; The .listen sections are said to be a RFID listen registry. |
| appfld.rfid.seek.X | This reflects MS configured capability to interact with RFID devices whereby the MS is the initiator (i.e. RFID device is not initiating). appfld.rfid.seek.ct = count (number) of channels configured. appfld.rfid.seek.#.channel = (# in [1..ct]) a channel that has been configured in advance for transmissions to be sent to RFID devices. A channel has been configured in advance so that polling transmissions can be made for active RFID devices, either in an automated manner, or based on user request. A transmission is made through a send queue using at least one thread handling the channel. A channel maps to a communications interface 70 for supporting any variety of communications, preferably through a send queue interface like send queue 24 (or perhaps the same send queue 24 with an identifier for which channel to send on). A channel has associated wave form characteristics (e.g. frequency) and prescribed protocol. An administrator has configured the MS and send threads in advance (e.g. appfld.rfid.seek.1. = 13560000 such that 13560000 is the channel id (which coincidentally is the same as 13.56 Mhz). Presence of |

-continued

| | |
|---|---|
| | appfld.rfid.seek.# sections implies they are enabled. Removal of the entry implies disabling it. appfld.rfid.seek.#.poller = (# in [1..ct]) the fully qualified executable path (e.g. invoked application) for polling RFID devices in the vicinity. The preferred embodiment uses a single executable to handle all configured channels, so the same executable may be referenced across multiple entries. Alternatively, there may be a unique executable specified here for each channel. appfld.rfid.seek.#.probe = (# in [1..ct]) the data to probe the RFID device with (the initial data transmission). Various embodiments support binary or string specification; appfld.rfid.seek.#.callback = (# in [1..ct]) interface to invoke on a mapped response. appfld.rfid.seek.#.cdt = (# in [1..ct]) 8 bytes containing creation date/time in Julian format; appfld.rfid.seek.#.ldt = (# in [1..ct]) 8 bytes containing last changed date/time in Julian format; The .seek sections are said to be a RFID seek registry. |
| . . . other field sections . . . | . . . |

RFID section 8002*i* information contains useful information for LBX sharing and novel applications thereof wrt a RFID application. A WDR received may be treated uniquely based on a known RFID situation in progress (WDR in-process at receiving MS or sending MS) or a RFID situation which recently occurred (WDR in-process at receiving MS or sending MS). Charters can use data above in AppTerm form as well. In some MS embodiments there are multiple RFID applications wherein the hierarchical section structure would be affected for supporting each application variety with data specific for the particular application. See discussions for FIGS. 80D and 80E for the integration of RFID technologies into the LBX application framework.

In some embodiments, Radio Data Systems (RDS) transmissions (e.g. over FM) are used for NTP synchronization among MSs. In some embodiments, RDS transmissions are used to broadcast WDRs for being received by MSs in the vicinity for LBX processing. In some uses, RDS WDRs received are processed for automated application behavior according to privileges and/or charters which have been configured at a MS. Some LBX uses replace similar conventional RDS applications with a richer user experience. For example, FM radio stations transmit RDS data for displaying information of the song, album, artist, etc. The LBX architecture provides a fully automated platform for receiving the same RDS transmissions, detecting and checking application fields therein, and then processing a multitude of automated conditional actions. Atomic commands and operands disclosed provide excellent tools for automatically handling RDS transmissions, for example to record a song being played, or notify a peer MS user with a song selection, or saving a new song, title and/or other music criteria for an artist of interest, perhaps to become automatically notified or made aware of other music of interest. A desirable song may be automatically ordered by the MS through automatically processed charters based on RDS data received, user acknowledgement of RDS data received, or through a MS application which exposes, or processes, RDS data received. RDS fits well into the wireless multi-wave, multi-frequency and multi-channel nature of a LBX enabled MS (e.g. lbxPhone™). A channel can be administrated analogously to a RFID listen channel for the same framework of processing.

Hotspot section 8002*j* includes subordinate sections including the following examples:

| | |
|---|---|
| appfld.hotspot.listen | = True (keeping track of hotspots), otherwise False (the default). |
| appfld.hotspot.X | appfld.hotspot.history.ct = count of historical unique hotspots detected by the MS with an associated signal location for the hotspot saved. appfld.hotspot.history.#.cdt = (# in [1..ct]) 8 bytes containing creation date/time in Julian format; appfld.hotspot.history.#.ldt = (# in [1..ct]) 8 bytes containing last changed detected date/time in Julian format; appfld.hotspot.history.#.name = (# in [1..ct]) hotspot name detected; appfld.hotspot.history.#.location = hotspot information for the most recent location information (e.g. WDR fields 1100c, 1100e, 1100h, 1100i, 1100j, etc) detected for the strongest hotspot signal for this named hotspot The length of location information is kept in the first 2 bytes of a binary datastream, otherwise an encoded string is null terminated; The location will change when the strength of the same detected hotspot has grown stronger relative previous detections. All #.name entries are unique, however system settings may be used to determine if the locations of detection are so far apart that the configuration deserves its own saved hotspot information (i.e. .#.name entries not unique). |
| appfld.hotspot.$ | $ = other field sections. |
| . . . other field sections . . . | . . . |

Hotspot section 8002*j* information contains useful information for LBX sharing and novel applications thereof wrt a hotspot dependent application (e.g. makes use of faster connect speed). A WDR received may be treated uniquely based on a known hotspot situation in progress (WDR in-process at receiving MS or sending MS) or a hotspot situation which recently occurred (WDR in-process at receiving MS or sending MS). Charters can use data above in AppTerm form as well. In some MS embodiments there are multiple hotspot applications wherein the hierarchical section structure would be affected for supporting each application variety with data specific for the particular application. Hotspot information supports feeding a directory of available hotspots (e.g. WiMax or WiFi) which can be used to inform MS users of hotspot whereabouts for future use.

Services section **8002*k*** includes subordinate sections including the following examples:

| | |
|---|---|
| appfld.services.X | appfld.services.ct = count of dynamically routed services maintained here (# in other configurations is from 1..N based on .ct); appfld.services.#.handle = Handle (e.g. name) to the service; appfld.services.#.route = Dynamic route last detected to the service; appfld.services.#.address = Address of dynamically routed service (e.g. 76.211.34.125:23462).appfld.services.#.ldt = Date/time stamp of when the service was last used at the MS which includes this field outbound. There are fields appfld.services.#.$ for fields $ from records 8500 in the Service Directory 16. Fields in this LBX release are the minimum set of requirements for accomplishing propagated service invocation functionality in a LN-expanse. |
| . . . other field sections . . . | . . . |

Services section **8002*k* information contains useful information for LBX sharing and novel applications thereof wrt available services. A WDR received may have the services made known added to the service directory 16 at the receiving MS for use in cases where the needed service(s) are not available when needed. A MS may route requests through another MS(s) in order to get access to a needed service. There may be many services.X sections for many services which are shareable between MSs. The service handles are preferably standardized for use (i.e. a service name) in MS user interfaces. See FIGS. 84 and 85A, and related discussions for additional information. Section 8002*k*** facilitates publishing propagateable services.

Statistics section **8002*l*** includes sections for statistical data including the following examples:

| | |
|---|---|
| appfld.statistics.phone.X | Statistic X for the registered phone application. |
| appfld.statistics.calendar.X | Statistic X for the registered calendar application. |
| appfld.statistics.email.X | Statistic X for the registered email application. |
| appfld.statistics.ab.X | Statistic X for the registered ab application. |
| appfld.statistics.$.X | Statistic X for the registered $ application. |
| . . . other field sections . . . | There are many statistics with an appropriate hierarchy for organization. |

Statistics section **8002*l* information contains useful information for LBX sharing and novel applications thereof wrt useful reporting statistics. A WDR received may be treated uniquely based on a known statistical situation in progress (WDR in-process at receiving MS or sending MS) or a statistical situation which recently occurred (WDR in-process at receiving MS or sending MS). Charters can use data above in atomic term form as well. In some MS embodiments there are multiple MS applications which make use of statistics wherein the hierarchical section structure would be affected for supporting each application variety with data specific for the particular application. The statistics section appeared prior to application fields 1100*k*** registration.

Application sections which are not yet registered are every bit as important as ones that are. The review process may not keep pace with Presentations and RFPs. RFP application sections have a variety of implementations in context of the LBX architecture, including:

- appfld.traffic.*=Traffic reports which are maintained by MS users or by authorized traffic control administrators, or automated traffic systems in the vicinity. This may be useful data to share as MS users are mobile.
- appfld.appliance.*=Data sharing for operating nearby appliances. This may or may not be integrated with RFID application section data. This is used for operating motor vehicle remote access, television remote control operation, wash machine cycle operation, window blind operation, or any other appliance with capable remote control operation, preferably using radio waves. For example, as a MS comes within range of your window blinds in the living room, a set of blind controls will expose themselves on your MS for controlling the blinds. A charter is used to automate revealing (i.e. starting) the control application on the MS.
- appfld.acctmgt.*=Data sharing for automatically performing financial transactions. Strong encryption is a necessary feature for this to be a marketable solution. In general, WDRs may be compressed and/or encrypted independent of specific WDR fields, however some application sections will support encrypting to be sure the MS provides an encryption option when all WDRs are not being encrypted.
- appfld.transport.*=Data sharing for making nearby transportation services aware of your need for a ride, and for transportation services letting potential customers know that a ride is available, the cost, etc. For example, a MS user seeks a taxi, or taxi cab MS user seeks a customer. Data sharing enables timely MS user awareness of availability with appropriate permission and charter configurations.
- appfld.carpool.*=Data sharing for discovering potential carpool members who share common mobile routes during similar scheduled times. The discovery is completely automatic with appropriate permission and charter configurations, and those who are interested in such discovery are notified. For example, charters may be configured for saving MS identifiers with location and date/time information for then later comparing for consistency. The MS user can make configurations active for certain routes taken so that only MS users along those routes are considered for carpool candidates. Repeated detections of the same MS identifiers at similar times on the same route(s) can alert a MS user as a possible candidate worthy of subsequent communications, or automated communications (automatic send of email) based on charter configuration(s).
- appfld.advertise.*=Data sharing for a MS user's willingness to accept MS location based advertisements. Also, permits users to advertise what they want to advertise to willing receiving MS users (like a peer to peer Craig's List). Privileges manage who gets what kind of information.

appfld.news.*=Data sharing for a MS user's interested topic areas for MS location dependent news, and the actual news which is delivered to MS users. Data depends on who (MS user or news data processing system in the vicinity) is originating specified sections herein.

appfld.media.*=Data sections for automatically marking, dating, sizing, framing, tagging, or performing any other special configuration to pictures or videos taken at the MS. Media data can be shared in WDRs between MSs as governed by privileges and charters. For example, automatically send a copy to your sister when detected within the vicinity.

appfld.parking.*=Data sharing for quickly guiding a driver with a MS to a most preferred available parking spot, and for carrying a MS user's preference for eh type of parking spot (e.g. width, distance from establishment, # accessible sides, etc). Data depends on who (MS user or parking lot data processing system in the vicinity) is originating specified sections herein.

Application sections which have been presented, but require a formal RFP to be signed off include:

appfld.employ.*=Data sharing for making MS users aware of job opportunities, and employers aware of employee opportunities. MSs nearby each other perform automated job matches for appropriate notification to a potential employer and potential employee or contractor. This is much like www.linkedin.com functionality in a peer to peer framework context (no service). Current economy conditions show promise for this section.

appfld.real.*=Data sharing for real estate business opportunities, real estate advertising, availability, and financing—a sort of all things real estate section for MS users in a peer to peer framework.

An application section which has been tabled includes:

appfld.personal.*=Data sharing for all things personal between a group of MS users. The appfld.profile.contents is already in use for singles/dating information or other personal match-making and sharing applications. MS users maintain their own data of any kind in appfld.profile.contents. In an alternate embodiment, MS users may invoke API(s) which define new sections in fields 1100*k* for being updated by WITS processing (e.g. at blocks 5703). The API(s) can support adding, stripping or altering the new section data for a variety of homegrown application reasons.

There will be other application sections over time. None of these sections are shared (e.g. sent outbound) by default. A user enables appropriate section(s) for being shared. There are other application sections such as:

appfld.music.*=MS user music preferences for being notified of music share opportunities and store music consensus play.

appfld.shopping.*=MS user shopping lists to be automatically used for guiding a shopping travel through a store, for checkout, etc appfld.religion.*=MS user peer to peer interaction with other users for religious/church related interests.

appfld.stocks.*=MS user peer to peer interaction for Wallstreet stock interests.

In a binary encoding embodiment, an appname section (FIG. 80A), reference section (FIG. 80B (i.e. FIGS. 80B-#)), and field sections thereof are very similar to TCP/UDP sockets and ports in the way they are implemented, deployed, documented, standardized and functionally amended. Registered application fields may be viewed like "well known ports", and users may use fields 1100*k* outside of any specification (like "dynamic ports" or "private ports"). Permissions 10 (privileges) enforce in WITS for any in-process WDR path for controlling who sees what, when, and how. For example, certain MS users can see another user's calendar, but other users can't, or certain MS users can see another user's calendar at certain times, but other users can't, or certain MS users can see another user's calendar during certain processing (e.g. application state(s) provide enablement), but other users can't. Any privileges may be specified with Parameters or TimeSpec information as described above. Supporting a vast number of application fields provides much richer charter specifications by supporting automated actions for rich complex expressions. Groups of MS users (e.g. an audience) who are in the vicinity with certain data can be responded to in an automated manner based on information received by another MS (or MS user) or a strategically placed data processing system emulating an LBX enabled MS. Applications are limitless in the LBX architecture as WDRs are shared (e.g. beaconed) between MSs. Various sections may be enforced by the MS for:

Section(s) for local use only (i.e. not shared);

Section(s) have allowable set(s) of initialization data;

Section(s) shared in system configured (e.g. privileged) manner; or

Section(s) indiscriminately shared.

Application fields 1100*k* descriptions have been presented for easy reading. In another preferred embodiment, application fields 1100*k* references (e.g. FIG. 80B and discussions above) include methods in an OOP environment. Main sections (e.g. source, profile, email, etc) are defined with an object programming "Class" and sections within that class can be "public" functions (i.e. methods) of the class. In this embodiment, WITS processing invokes the methods of the appropriate class with data specified as parameters to the methods. In this way, fields 1100*k* contains data for parameters to methods of object classes identified with the section reference. Classes may be quite complex and include private and protected function processing, private and protected data, and OOP relationships to other objects. WITS processing uses the public class APIs to carry out functionality. In this embodiment, when a method is invoked (e.g. from a charter expression), the method returns a function result of data that is appropriate for use where the method is used (e.g. \ref, ref, _I_ref or _O_ref all return data where they are referenced as though they were simply referencing a data field (overloaded)). The advantage to OOP is having the ability to hide complex processing in what appears to be a simple reference. This enables many other application fields 1100*k* sections (i.e. " . . . " in the tables) for being defined with significantly richer application offerings. Details of OOP are well known to those skilled in the art, and such detail will merely cloud discussion herein.

Some of the application fields 1100*k* sections are enumerated (e.g. appfld.services.thandle, appfld.rfid.listen.3.channel, etc). The number of enumerations depends on a count (e.g. appfld.services.ct, appfld.rfid.listen.ct, etc) that may not be anticipated by a MS user in a charter configuration. A MS user may also not be able to anticipate which record of the enumerations contains the sought value in a charter configuration. The # operator is referred to as a cached index operator in charter configurations. Any section which is enumerated can have the # operator used. The last True condition result within a thread which uses the # operator saves the index used in that condition for subsequent use within the same thread context. For example:

```
("SiteName" ^ _appfld.services.#.handle):
    Notify Weblink (_appfld.services.#.address ,,,target="_blank");
```

If any of the appfld.services.#.handle data fields (i.e. for 1 to count (_appfld.services.ct automatically accessed by charter processing)) contains "SiteName", then the cached index retains the index value that produced the True condition result so that it has meaning thereafter. Assuming 7 was cached for the # operator because _appfld.services.7.handle was set to "SiteName", then the reference to appfld.services.#.address takes on the value of _appfld.services.7.address. If "SiteName" was not found, then # in _appfld.services.#.address would be undefined and cause the charter expression to not be true and not execute anyway.

The cached index operator should be carefully because it has side effects:

- # retains the most recent index value for a True condition result involving a # match (e.g. ^ or !^ operators) within a thread context, therefore a most recent True condition from many charters processed before the current charter in the same thread context will have the cached index operator set to that most recently caused value, regardless of how far back in thread context processing occurred;
- A cached index set value can be referenced many times without changing the value until another True Condition occurs thereafter in the same thread context;
- Multiple condition expressions are performed left to right where the rightmost condition is last unless a former condition in the same expression already produced a False result. Parenthesis govern condition ordering with the most inside parenthesized conditions processed prior to the outermost conditions; and
- A reference to # which has had no cached value saved in the current thread context causes an error such that the error is logged and charter ignored.

There are various embodiments for # processing schemes and operator uses for carrying out comparisons and references involving sections which cannot be anticipated exactly. In an alternate embodiment, special functions can be provided for returning an index explicitly which can then be used like a variable for an explicitly referenced array section. However, this may burden MS users with additional syntax for getting to sought data.

FIG. 80C depicts a flowchart for describing a preferred embodiment of a procedure for application fields 1100*k* section initialization processing. Processing starts at block 8010, for example upon a user to request initialization, or some MS initialization or termination processing. In one embodiment, block 1496 may be modified to include new blocks 1496*d*, 1496*e*, and 1496*c* such that:

- Block 1496*d* checks to see if the user selected to perform (configure) application fields 1100*k* section initialization—an option for configuration at block 1406 wherein the user action to configure it is detected at block 1408;
- Block 1496*e* is processed if block 1496*d* determines the user did select to perform application fields 1100*k* section initialization. Block 1496*e* invokes FIG. 80C for interfacing with the user for application fields 1100*k* section initialization, and processing then continues to block 1496*c*.
- Block 1496*c* is processed if block 1496*d* determines the user did not select to perform application fields 1100*k* section initialization or as the result of processing leaving block 1496*e*. Block 1496*c* handles other user interface actions leaving block 1408 (e.g. becomes the "catch all" as currently shown in block 1496 of FIG. 14B).

Block 8010 processing continues to block 8012. A user interfaces at block 8012 for specifying which application fields section(s) (i.e. any subset of fields 1100*k*) are to be initialized. Permissions 10 (e.g. system starter templates which may or may not be alterable by the user) and/or system configurations are used at block 8012 to enforce what can be modified by the user. Only when the user completes specifying which alterable section(s) (field(s)) are to be initialized will processing leave block 8012, in which case block 8014 checks the result. If block 8014 determines the user opted to exit block 8012 processing, for example to specify no alteration (e.g. decided not to continue), then processing returns to the caller (invoker) at block 8016.

If block 8014 determines that one or more sections were specified, then block 8018 interfaces with the user for how to initialize the section(s). Permissions 10 (e.g. system starter templates which may or may not be alterable by the user) and/or system configurations are used at block 8018 to enforce what can be specified for initialization by the user. Initialization criteria may be selected from a plurality of initialization templates which have an overall theme for how to initialize the data. For example, data used for initialization may reflect themes of:

- MS is newly started, powered up, used for the first time, or the like (e.g. all values initialized to 0);
- Application(s) of the MS are newly started, used for the first time, or the like (e.g. all values initialized to 0);
- MS is to be placed in a processing state as though a predictable set of MS processing occurrence(s) have occurred to get to the initialized set of data (i.e. initialized to prescribed values);
- Application(s) of the MS are newly terminated, used for the last time, or the like; or
- MS is newly terminated, powered off, used for the last time, or the like.

Themes may be named, may be maintained as a configurable collection of choices, and may have associated descriptions. Only when the user completes specifying initialization criteria will processing leave block 8018, in which case block 8020 checks the result. If block 8020 determines the user opted to exit block 8018 processing, for example to specify no alteration (e.g. decided not to continue), then processing returns to the caller (invoker) at block 8016. If block 8020 determines that one or more sections were specified with valid initialization criteria, then block 8022 initializes the section(s) accordingly and processing returns to the caller (invoker) at block 8016. Block 8022 will update statistics 14 appropriately. Block 8022 may also be invoked directly as needed by MS processing for initializing section(s) appropriately.

FIG. 80D depicts a flowchart for describing a preferred embodiment of MS Radio Frequency Identification (RFID) probe processing. Amendments were made to PRRs 5300 for adapting RFID technologies to an lbxPhone™. RFID device receive processing is intended to process passive and active RFID device transmissions.

With reference now to FIG. 53, an application described by a PRR may be a LBX application incorporating RFID technology. PRR fields already described continue to be the same for a RFID application of a PRR 5300 (e.g. containing information for starting, terminating and fully describing essential executables and useful data, etc). When used (otherwise null), new fields 5300-CHIN, 5300-CHOUT, 5300-P, 5300-Q and 5300-CALL describe a RFID application of the overall PRR 5300. In some embodiments, a field 5300-RFID provides a joining identifier to another table for joining RFID related information of fields 5300-CHIN, 5300-CHOUT, 5300-P, 5300-Q and 5300-CALL to the record 5300. Channel In field 5300-CHIN contains a channel identifier, preferably provided by a MS administrator or already populated with a manufactured MS. Field 5300-CHIN is a globally unique handle to a channel for receiving communications transmission data from a RFID device 72 via one of the MS communications interfaces 70 of the MS. Channel Out field 5300-CHOUT contains a channel identifier, preferably provided by a MS administrator or already populated with a manufactured MS. Field 5300-CHOUT is a globally unique handle to a channel for sending communications transmission data from the MS to a RFID device 72 via one of the MS communications interfaces 70 of the MS. Many of the RFID technology interfaces are plug-in semiconductor components (referred to as RFIC (Radio Frequency Identification Component)) manufactured to communicate in a certain way for certain RFID devices (e.g. a particular frequency and anticipated protocol). The RFIC (or a plurality of RFICs) is coupled/integrated to a MS in an isolated manner so that there is at least one channel interface for communicating with it internally to the MS. Fields 5300-CHIN and 5300-CHOUT may or may not be the same handle. LBX architecture 1900 is very flexible for isolating a plurality of complex communications interfaces to simplified threaded queue interfaces. Adapting RFID technology is no exception. In some embodiments, a communications interface 70 provides a run-time modifiable parameter interface for a plurality of unique transmission qualities (e.g. on different frequencies).

In a preferred embodiment, fields 5300-CHIN and 5300-CHOUT are all that are necessary for routing communications traffic via a RFID receive queue and RFID send queue, respectively. The RFID receive queue may be distinct from queue 26 and processes analogously to descriptions for queue 26, however an embodiment can share queue 26 with other processing provided the RFID data can be distinguished from other data fed from queue 26 (e.g. using techniques already described above). The RFID send queue may be distinct from queue 24 and processes analogously to descriptions for queue 24, however an embodiment can share queue 24 with other processing provided the RFIC, or equivalent send transmission functionality, is able to feed from queue 24 for data to be sent to a RFID device.

The plurality of MS communications interfaces 70 may already support wave spectrum(s) appropriate for existing RFID devices. In this embodiment, fields 5300-CHIN and 5300-CHOUT are configured in advance for mapping to existing MS capability so that required wave interfaces leverage existing MS capability. For example, a single communications interface 70 may support a plurality of distinct radio interfaces (e.g. different frequencies, amplitude, etc) and fields 5300-CHIN and 5300-CHOUT simply map to appropriate parameters passed to the interface for correct communications. The channel should be validated before allowing specification to fields 5300-CHIN and 5300-CHOUT. See appfld.rfid.listen.X and appfld.rfid.seek.X channel information.

Probe data field 5300-P contains a datastream to be sent on the outbound channel described by field 5300-CHOUT for providing RFID device listening signature data and/or protocol data sought by potential receiving RFID devices. Field 5300-P may contain user edited information, or may point to the datastream in some MS storage. Queue field 5300-Q defines a globally unique handle (e.g. queue name) to a MS queue for RFID receive processing. This value is null when queue 26 is shared, otherwise the queue handle is used by the RFID application of PRR 5300 for starting at least one thread (see FIG. 80E) waiting on that particular MS queue. Non-null values of fields 5300-Q should be validated to ensure the referenced MS system queue exists for use (e.g. as initialized by block 1218). RFID Trigger(s) field 5300-CALL is equivalent in description to field 5300*m* except the RFID communications interface is the trigger for invoking processing of field 5300-CALL (sub-sections b and c only). A single application of a record 5300 may have application term trigger(s) and/or RFID trigger(s). Thus, the LBX architecture supports automatically triggered processing via in-process WDRs, application variable changes, and RFID communications (e.g. automatically invoke processing when in the vicinity of an authenticated RFI device). One preferred embodiment is to have a single callback function interface for handling all of the RFID device communications for the PRR 5300 which is overloaded (OOP polymorphism) for different data typed parameters parsed from the received data for unique processing, however multiple interfaces may be specified. If multiple callback interfaces are specified, the appropriate interface can be contextually used based on an appropriate typecast of received data. An ordered list of parameter types can be assumed. However, potentially messy conditional decision instructions may also form part of field 5300-CALL. Another preferred embodiment utilizes named charter section processing only.

With reference back to FIG. 80D, MS RFID probe processing begins at block 8030 by way of: a user selecting to manually perform a RFID request transmission; a RFID application (e.g. appfld.rfid.seek.#.channel executable) performing a RFID request transmission; an atomic command performing a RFID send transmission (e.g. as part of charters); or by MS processing related to RFID application processing. Block 8030 processing continues to block 8032. Depending on how FIG. 80D was invoked, PRR field 5300-CHOUT is determined at block 8032 by: 1) a parameter (e.g. the PRR) passed to FIG. 80D processing; 2) a user interface for validating (using PRRs 5300) a user specification; or 3) access to MS memory or MS storage (e.g. an AppTerm, fields 1100*k* field, etc) for deducing the PRR and channel. Block 8032 continues to block 8034. Block 8034 accesses PRRs 5300 for a field 5300-P in the same PRR which had a field 5300-CHOUT. Thereafter, block 8036 uses fields 5300-CHOUT and 5300-P to build a transmission packet for hopeful reception by at least one RFID device in the vicinity of the MS of FIG. 80D processing. Field 5300-P is anticipated protocol data (e.g. at least a signature) being received by a RFID device (see appfld.rfid.seek.#.probe). Thereafter, block 8038 broadcasts the packet by inserting to the RFID send queue for the correct channel (field 5300-CHOUT) for outbound wave characteristics, and processing terminates at block 8040. For example, block 8038 broadcasts data 1302 as far as radius 1306. The broadcast is for reception by RFID devices in the vicinity. FIGS. 50A through 50C may increase distances for RFID device interfacing.

In some embodiments, a receiving RFID device may require correlation built into the data packet at block 8036 for returning to the MS of FIG. 80D processing. Correlation processing has been discussed above and similar processing may be used to correlate a broadcast from block 8038 (e.g. with a data packet processed by FIG. 80E). Also, TDOA measurements may be similarly made as discussed above for RFID inbound or outbound transmission data.

In some embodiments: {IF: A) RFID device probing is automated; and B) usual communications spectrum capabilities includes wave form qualities acceptable for probing RFID devices; and C) RFID devices can seek certain signatures in usual communications spectrum in order to respond; THEN usual MS communications data 1302 of the MS is altered to contain CK 1304 for listening RFID devices in the vicinity.) Send processing feeding from the RFID send queue, caused by block 8038 processing, will place RFID device probe data (e.g. probe data field 5300-P) as CK 1304 embedded in usual data 1302 at the next opportune time of sending usual data 1302. If an opportune time is not timely, send processing may or may not (e.g. may depend on parameter(s)) discard the send request of block 8038 to avoid broadcasting an untimely probe. As the MS conducts its normal communications, transmitted data 1302 contains new data CK 1304 to be recognized by RFID devices listening for probe data of field 5300-P. An automation of seeking RFID devices from a MS can send repeated timely pulsed broadcasts.

FIG. 80E depicts a flowchart for describing a preferred embodiment of processing for receiving data from an RFID device. Architecture 1900 is an excellent model for RFID applications. FIG. 80E processing describes a RFID Receive (RFID_Rx) process worker thread, and is provided as part of the application executables described in a PRR. There may be a plurality of worker threads for the RFID_Rx process, just as described for a 19*xx* process. The RFID_Rx process operates analogously to the framework of architecture 1900 as other 19xx processes, with specific similarity to process 1942 in that there is data received from receive queue 26, and the RFID_Rx thread(s) stay blocked on the receive queue until data is received. The associated application is responsible for RFID_Rx process initialization. Receive processing identifies targeted/broadcasted RFID device data destined for the MS of FIG. 80E processing through system resources of fields 5300-CHIN and 5300-Q.

A RFID_Rx thread processing begins at block 8050 upon the MS receiving RFID device originated data, continues to block 8052 where processing is initialized (e.g. to the application PRR 5300). Thereafter, at block 8054 the process worker thread count RFID_Rx-Ct is accessed and incremented by 1 using appropriate semaphore access if there is more than 1 thread, and continues to block 8056 for retrieving data from the RFID queue (using interface like interface 1948), perhaps a special termination request entry, and only continues to block 8058 when a record of data is retrieved. In one embodiment, receive processing may break up a datastream into individual records of data from an overall received (or ongoing) datastream. In one embodiment, receive processing receives data in one format and deposits a more suitable format for FIG. 80E processing. Block 8056 stays blocked on retrieving from the RFID receive queue until any record is retrieved, in which case processing continues to block 8058. If block 8056 determines a special entry indicating to terminate was not found in the RFID receive queue, processing continues to block 8060 for accessing applicable privileges through PRR field 5300*j*. In some embodiments, at least one privilege processing interface of PRR field 5300*k* is invoked with the received data to determine if it is privileged for being processed. Various embodiments support globally maintained LBX architecture privileges and/or custom defined privileges for particular applications, such as those plugged in through a PRR. Thereafter, block 8062 uses the application PRR to retrieve field 5300-CALL, and determines any expression outcome if embodied/configured therein. Block 8062 continues to block 8064. Block 8064 checks for a configured execution (e.g. callback invocation) and/or conditional charter trigger processing depending on the embodiment/configuration.

If block 8064 determines no callback processing (or trigger processing) is configured as determined at block 8062 or processing is not privileged as determined by block 8060, processing continues back to block 8056, otherwise the applicable configured processing (e.g. callback or trigger) is invoked appropriately at block 8066, and processing then continues back to block 8056. A callback function is a preferred method for embodying the processing of received RFID device data. The callback function may also use other PRR fields and invoke processing thereof.

A preferred embodiment of RFID receive processing without requiring application programmer coding of FIG. 80E isolates FIG. 80E processing from applications with an MS O/S API (called RFID_Rx API). An application programmer provides the RFID receive queue, the channel and callback function to the RFID_Rx API with a “start using” interface. The RFID_Rx API is responsible for invoking the callback function with RFID device data received. The RFID_Rx API has at least “start using” and “stop using” interfaces.

Referring back to block 8058, if a worker thread termination request was found at the RFID receive queue, then block 8068 decrements the RFID_Rx worker thread count by 1 using appropriate semaphore access if there is more than 1 thread, and RFID_Rx thread processing terminates at block 8070. Block 8068 may also check the RFID_Rx-Ct value, and signal a RFID_Rx process parent thread that all worker threads are terminated when RFID_Rx-Ct equals zero (0).

Date/time stamp and/or correlation information in data received may be used to calculate TDOA measurements as already described in detail above. Regardless of the type of receiving application, those skilled in the art recognize many clever methods for receiving data in context of a MS application which communicates in a peer to peer fashion with a RFID device. Of course, the application of a PRR 5300 performing receive processing can leverage all features of a PRR and LBX enabled MS as described above.

In one application, a user wears a RFID tag for being within range of the MS he uses. When the MS is out of range of the user (as configured in a charter by lack of RFI signal availability), the MS peripherals can be locked so unauthorized use is prevented. There are system AppTerm variables (e.g. SYS_kbdLock=True or False enables or disables MS keyboard use); SYS_voiceCtl=True or False (enables or disables voice control interface use), etc) which can automatically be set in the charter action(s) for controlling the MS peripherals. Other input peripherals are controlled similarly. The range of the RFID tag can be used to determine what is out of range (e.g. 3 meters). Similarly, the MS can be configured to only permit certain data input at certain peripherals with AppTerm list variables. The AppTerm list variables are set with the allowable input, or the disallowed input, for the peripheral, for example when at certain locations/conditions as configured in charters.

In another application, a RFID is affixed or installed to a printer. MS print jobs are queued up and saved for printing later when the MS is out of range of the RFID tag of a particular printer. In another embodiment, the printer has a MS ID and is equipped with a MS emulation for LBX interactions. Print jobs are not enabled for printing at the printer until the MS is within range of fast communications for printing as managed by configured charters. Special AppTerm variables for print management can be enabled (PR_offline=False) or disabled (PR_offline=True). Other output peripherals are controlled similarly. The “PR_” prefix is MS defined for the default printer installed for printing. This allows print jobs to be saved by setting the printer offline in a charter, and then to be printed when taken offline in a charter, automatically and without user intervention.

There are an unlimited number of AppTerm variables for being exposed to charters for an unlimited set of event based processing using the many charter methods described above.

With reference now to FIG. 82A, depicted is a flowchart for describing a preferred embodiment of processing for maintaining LBX history 30. Block 1494 processing begins at block 8200, and then continues to block 8202 for initializing data for subsequent processing, block 8204 for presenting LBX history maintenance options to the user, and block 8206 for waiting for an action by the user in response to the presentation at block 8204. Once the user responds with an action, processing continues to block 8208.

If block 8208 determines the user selected to browse or edit the history 30 information, then block 8210 accesses LBX history 30, block 8212 presents the history information in an appropriate editor interface, block 8214 interfaces with user in the editor for any alteration or viewing as desired by the user, and processing continues back to block 8204. In one example, blocks 8210 through 8214 may have been requested by the user to see who was nearby at some time in history. Block 8214 is to provide a convenient history search criteria specification interface for the user to find sought history. Of course, a separate user interface can be used to access history for desired information. One embodiment maintains history as appended text lines in a flat ASCII file for careful browse and edit by a user using a simple flat file editor (e.g. Notepad, Personal Editor, etc). Charter expressions may cause access to history 30, so it may be desirable to maintain history to records of data, or a database to facilitate searching performance, in which case blocks 8210 and 8214 deploy a suitable editor (or query manager), or an appropriate home-grown interface. If block 8208 determines the user did not select to browse or edit history, then processing continues to block 8216.

If block 8216 determines the user selected to modify the destination for keeping history 30 information, then block 8218 saves the current destination setting (e.g. file folder, or schema qualifier in a SQL embodiment), block 8220 interfaces with the user for a new specified destination, and block 8222 checks the user's specification from block 8220. Block 8220 performs validation (e.g. valid path/table/place/etc for storing history, enough space to store history, etc) before processing can continue to block 8222. If block 8222 determines the user did not change the destination (i.e. not different than original destination saved at block 8218), then processing continues to block 8204, otherwise block 8224 prompts the user to confirm the change, and block 8226 checks his response. If block 8226 determines the user cancels the change, then processing continues back to block 8204, otherwise block 8228 prompts the user for whether or not to move the existing history data and block 8230 checks the user's response. If block 8230 determines the user wants to move existing history data to the new destination, then block 8232 moves the history and block 8234 modifies the history destination setting for future history data to be maintained. If block 8230 determines the user did not select to move existing history (e.g. wants to start a new set of history), then processing continues directly to block 8234. Block 8234 continues to block 8204. In some embodiments, block 8232 copies the history to the new destination rather than moving it. Also, the user may use other tools for copying or moving history information. If block 8216 determines the user did not select to modify the history destination, then processing continues to block 8236.

If block 8236 determines the user selected to modify criteria for what data to maintain to history, then block 8238 accesses the current criteria, block 8240 presents the current criteria to the user for browsing or editing, block 8242 interfaces with the user for saving any modified criteria, block 8244 prompts the user for whether to prune the history data (e.g. to reflect criteria changes), and block 8246 checks the user response. If block 8246 determines the user does not want to prune history, processing continues to block 8204, otherwise block 8248 performs pruning in accordance with criteria for maintaining history and processing continues to block 8204. If block 8236 determines the user did not select to modify the criteria for maintaining history, then processing continues to block 8250.

Blocks 8240 and 8242 provide a suitable criteria editor (e.g. existing or home-grown), depending on the form criteria is kept in, and which memory or storage run time accessed criteria is kept. Criteria may be kept in a text file, as data records, in a SQL database, or any other appropriate form. Criteria managed by blocks 8240 and 8242 includes specification (e.g. for what to keep, and what not to keep) for which information data to keep in history (e.g. date/time stamp which is preferably required, MS ID, history maintainer Process ID (PID), history maintainer thread ID (TID), valid history maintainers, maintainable depth of history data (e.g. before history file wraps or closes for starting a new file at the destination, or number of records, date/time stamp trailing history pruning cut-off, etc), WDR field(s), specific data and fields, conditions for what data to keep, etc). Criteria should be consistent with anticipated expression terms. Block 1482 charter configuration processing and/or BNF grammar expression processing may consult history criteria for knowing when to look in history 30, or when to handle a not found, or error, condition. An invoker of FIG. 82B processing preferably passes all available data for being maintained to history, but FIG. 82B processing will decide what data is saved based on configured criteria. In one embodiment, criteria includes expressions with conditions for what to keep, and data passed for being logged to history is examined for satisfying the condition(s). For example, expressions may be as complex as an expression of charter BNF Grammar 3068*a* and 3068*b*. A True result of the expression is to cause the history to be logged. If expressions are supported, a generalized expression interface may be used for history and statistics conditional information gathering. In other embodiments, generic expression interfaces are provided for consistent expression specification and stack based expression evaluation for conditional history logging, conditional statistics logging, charter expressions (including AppTerm expressions, etc), and other expression embodiments used in the MS.

If block 8250 determines the user selected to perform pruning to history, then block 8248 performs pruning according to the criteria for maintaining history, and processing continues back to block 8204. If block 8250 determines the user did not select to perform pruning, then processing continues to block 8252.

If block 8252 determines the user selected to modify the history information formatting, then block 8254 accesses the current formatting specifications, block 8256 presents the current specifications to the user for browsing or editing, block 8258 interfaces with the user for saving any modified formatting specifications, block 8260 prompts the user for whether to change the format of current history data, and block 8262 checks the user's response. If block 8262 determines the user does not want to modify the current history data to the new format, processing continues to block 8204, otherwise block 8264 modifies the format of current history information accordingly and processing continues to block 8204. If block 8252 determines the user did not select to modify history format specifications, then processing continues to block 8266.

Blocks 8256 and 8258 provide a format editor (e.g. existing or home-grown), depending on the form that specifications are kept in, and which memory or storage run time accessed history is kept. Formatting specifications may be kept in a text file, as data records, in a SQL database, or any other appropriate form. Formatting changes may involve data record or SQL database schema changes in some embodiments. Specifications managed by blocks 8256 and 8258 include order of fields saved, units used, appearance in reporting/browsing/saving, whether or not special characters are used (tabs, <CR> and/or <LF>), whether or not data positions are reported as null when not available or filtered out (e.g. by criteria), or any other presentation variable. Formatting specifications are in context of the criteria for maintaining history.

If block 8266 determines the user selected to clear history, then block 8268 clears the history to a zero (0) sized file, and processing continues back to block 8204. In some embodiments, block 8268 interfaces with the user for exactly what to remove from history. If block 8266 determines the user did not select to clear history, then processing continues to block 8270.

If block 8270 determines the user selected to exit block 1494 processing, then block 8272 appropriately terminates block 1494 processing (e.g. clear user interface, etc), otherwise block 8274 handles any other user actions which result in processing leaving block 8206. Block 8274 continues back to block 8204.

FIG. 82B depicts a flowchart for describing a procedure to maintain information to LBX history 30, preferably embodied as an API for being invoked by all LBX processing points that want to log history information. The benefit of the FIG. 82B history logger is to centralize all history updates in a single module of processing code. Each invoker (caller) of FIG. 82B may have different data to be logged to history as passed by appropriate parameters to FIG. 82B processing. History logging processing begins at block 8280 when invoked by a caller to write out history data and continues to block 8282 for getting parameters of data (caller (i.e. history maintainer), data for logging, etc) passed to be potentially written out (or appended) to history. Thereafter, block 8284 accesses criteria managed by blocks 8236 through 8248, accesses formatting specifications managed by blocks 8252 through 8264, and accesses the history destination setting managed by blocks 8216 through 8234. All of this data is defaulted in a MS in case a user has not made use of block 1494 processing. Thereafter, block 8286 gets useful system information (e.g. current MS date/time stamp to the best granulation of time for writing with the history information, PID, etc) which may be written to history, and block 8288 prepares the history data for output according to the parameters from block 8282 as well as the criteria and specifications from blocks 8284 and 8286. Block 8288 may incorporate stack based condition processing for complex expressions used to determine conditions for which history is to be logged. Thereafter, block 8290 appropriately saves (e.g. appends) the history data prepared and formatted at block 8288 to the history destination, block 8292 prunes history data according to the criteria determined at block 8284, and block 8294 checks if statistics are to be contributed to with the history data just logged. Depending on the form which history information is maintained, block 8290 may involve a plurality of write operations, or a single write operation.

If block 8294 determines there are no statistics involved with the history data logged, then the caller (i.e. history maintainer) of FIG. 82B is returned to at block 8296, otherwise block 8298 prepares parameters according to the history data for generating statistics, block 8299 invokes (calls) the statistics logger of FIG. 83B, and the caller of FIG. 82B is returned to at block 8296.

Block 8292 is an ideal place to perform pruning. An alternate embodiment MS includes at least one polling thread for asynchronously pruning history data. There is a wealth of history information which can be logged, but MS users are cautioned to not waste MS resources unless it is warranted. Statistics 14 can be taken/derived from any history data 30, and other MS data which is useful for tracking or reporting.

FIG. 83A depicts a flowchart for describing a preferred embodiment of processing for configuring LBX statistics 14. Block 1486 processing begins at block 8300, and then continues to block 8302 for initializing data for subsequent processing, block 8304 for presenting LBX statistics maintenance options to the user, and block 8306 for waiting for an action by the user in response to the presentation at block 8304. Once the user responds with an action, processing continues to block 8308.

If block 8308 determines the user selected to browse statistics 14 information, then block 8310 accesses LBX statistics 14, block 8312 presents the statistics information in an appropriate reporting interface, and processing continues back to block 8304. Block 8312 is to provide a convenient statistics search criteria specification interface for the user to find sought statistics. Of course, a separate user interface can be used to access statistics for desired information. Preferred embodiments maintain statistics in SQL database, data record, or tabular spreadsheet access form for optimal graphical reporting capability. The interface of block 8312 should support graphing of statistics over time, saving different views of statistics for additional reports, printing report/graphs, and sending reports/graphs to others. If block 8308 determines the user did not select to browse statistics, then processing continues to block 8314.

If block 8314 determines the user selected to modify the destination for keeping statistics 14 information, then block 8316 saves the current destination setting (e.g. file folder, or schema qualifier in a SQL embodiment), block 8318 interfaces with the user for a new specified destination, and block 8320 checks the user's specification from block 8318. Block 8318 performs validation (e.g. valid path/table/place/etc for storing statistics, enough space to store statistics, etc) before processing can continue to block 8320. If block 8320 determines the user did not change the destination (i.e. not different than original destination saved at block 8316), then processing continues to block 8304, otherwise block 8322 prompts the user to confirm the change, and block 8324 checks his response. If block 8324 determines the user cancels the change, then processing continues back to block 8304, otherwise block 8326 prompts the user for whether or not to move the existing statistics data and block 8328 checks the user's response. If block 8328 determines the user wants to move existing statistics data to the new destination, then block 8330 moves the statistics and block 8332 modifies the statistics destination setting for future statistics data to be maintained. If block 8328 determines the user did not select to move existing statistics (e.g. wants to start a new set of statistics), then processing continues directly to block 8332. Block 8332 continues to block 8304. In some embodiments, block 8330 copies the statistics to the new destination rather than moving it. Also, the user may use other tools for copying or moving statistics information. If block 8314 determines the user did not select to modify the statistics destination, then processing continues to block 8334.

If block 8334 determines the user selected to modify criteria for what data to maintain to statistics, then block 8336 accesses the current criteria, block 8338 presents the current criteria to the user for browsing or editing, block 8340 interfaces with the user for saving any modified criteria, block 8342 checks if a statistics data layout or schema change (e.g. to reflect criteria changes) was made at block 8340, and block 8344 checks the result. If block 8344 determines no layout or schema change was made by the user, processing continues to block 8304, otherwise block 8346 appropriately modifies statistical layout/schema in accordance with criteria for maintaining statistics and processing continues to block 8304. If block 8334 determines the user did not select to modify the criteria for maintaining statistics, then processing continues to block 8348.

Blocks 8338 and 8340 provide a suitable criteria editor (e.g. existing or home-grown), depending on the form criteria is kept in, and which memory or storage run time accessed criteria is kept. Criteria may be kept in a text file, as data records, in a SQL database, or any other appropriate form. Criteria managed by blocks 8338 and 8340 includes specification (e.g. for what to keep, and what not to keep) for which information data to keep in statistics and how the statistics should be organized (e.g. layout or schema). Criteria should be consistent with anticipated statistical atomic terms (e.g. \st_statisticName). Block 1482 charter configuration processing and/or BNF grammar expression processing may consult statistics criteria for knowing when to look in statistics 14, or when to handle a not found, or error, condition. An invoker of FIG. 83B processing preferably passes all available data for being maintained to statistics, but FIG. 83B processing will decide what data is saved and/or calculated based on configured criteria. In one embodiment, criteria includes expressions with conditions for what to keep, and data passed for being logged to statistics is examined for satisfying the condition(s). For example, expressions may be as complex as an expression of charter BNF Grammar 3068*a* and 3068*b*. A True result of the expression is to cause the statistics to be logged. If expressions are supported, a generalized expression interface may be used for statistics as described above.

If block 8348 determines the user selected to configure automatic reporting, block 8350 interfaces with the user for setting up, modifying, or removing automatic polled statistical reporting, and processing continues to block 8304. Block 8350 supports setting up one or more asynchronous threads of execution for polling desired statistics according to a schedule, and then automatically sending the information (e.g. by MS alert/pop-up, email, SMS message, FIG. 75A, propagated service, service informant code 28, or other configured method) to one or more recipients. Block 8350 supports configuring the "look and feel" of statistical information, graphs thereof, fonts, colors, or any other audible or visual attribute for presentation to a recipient of the statistics information. Automatic reporting of statistics is preferably generically implemented for accessing of history information, AppTerm data, atomic term data, WDRTerm data, map term data, or any other MS data, as well as statistical information data for reporting. If block 8348 determines the user did not select to configure automatic reporting, then processing continues to block 8352. Block 8350 may also be used to configure and influence presentation at block 1812.

If block 8352 determines the user selected to configure triggered reporting, block 8354 interfaces with the user for setting up, modifying, or removing triggers (e.g. SQL database trigger, or similar mechanism) for automatic statistical reporting, and processing continues to block 8304. Block 8354 supports setting up one or more triggers (e.g. expression of at least one condition) for instantly reporting desired statistics, and then automatically sending the information (e.g. by MS alert/pop-up, email, SMS message, FIG. 75A, propagated service, service informant code 28, or other configured method) to one or more recipients. Block 8354 supports configuring the "look and feel" of statistical information, graphs thereof, fonts, colors, or any other audible or visual attribute for presentation to a recipient of the statistics information. Triggered reporting of statistics is preferably generically implemented for monitoring of history information, AppTerm data, atomic term data, WDRTerm data, map term data, or any other MS data, as well as statistical information data for reporting. If block 8352 determines the user did not select to configure triggered reporting, then processing continues to block 8356. Block 8354 may also be used to configure and influence presentation at block 1812. Blocks 8354 and 8350 preferably use a common set of APIs or code, and may be implemented in a common user interface. Any "view" (as in SQL view) can be used to view, report, save, schedule, or trigger informative statistical reports.

If block 8356 determines the user selected to reset statistics, then block 8358 interfaces with the user for how to reset them, block 8360 resets the statistics accordingly, and processing continues back to block 8304. Depending on different embodiments, block 8358 interfaces with the user for: a reset template for how to reset which is used at block 8360; a date/time stamp for when to reset statistics back to, or forward from; or exactly what to remove from the statistics; and what initial values to use for the reset. If block 8356 determines the user did not select to reset statistics, then processing continues to block 8362.

If block 8362 determines the user selected to exit block 1486 processing, then block 8364 appropriately terminates block 1486 processing (e.g. clear user interface, etc), otherwise block 8366 handles any other user actions which result in processing leaving block 8306. Block 8366 continues back to block 8304.

FIG. 83B depicts a flowchart for describing a procedure to maintain information to LBX statistics 14, preferably embodied as an API for being invoked by all LBX processing points that want to log statistics information. The benefit of the FIG. 83B statistics logger is to centralize all statistics updates in a single module of processing code. Each invoker (caller) of FIG. 83B may have different data to be logged to statistics as passed by appropriate parameters to FIG. 83B processing. Statistics logging processing begins at block 8370 when invoked by a caller to write out statistics data and continues to block 8372 for getting parameters of data (caller (i.e. statistics maintainer), data for logging, etc) passed for potentially affecting, or being written out to, statistics. Thereafter, block 8374 accesses criteria managed by blocks 8334 through 8346 and accesses the statistics destination setting managed by blocks 8314 through 8332. All of this data is defaulted in a MS in case a user has not made use of block 1486 processing. Thereafter, block 8376 gets useful system information (e.g. current MS date/time stamp to the best granulation of time for writing with the statistics information, PID, etc) which may be written to statistics, and block 8378 prepares the statistics data for output according to the parameters from block 8372 as well as the criteria and data from blocks 8374 and 8376. Block 8378 may incorporate stack based condition processing for complex expressions used to determine conditions for which statistics is to be logged. Thereafter, block 8380 appropriately saves the statistics data prepared to the statistics destination, calculates any statistics derived from the newly updated statistical information, and updates the derived statistics as well. Cumulative statistics may be updated at block 8380. Thereafter, block 8382 checks trigger conditions/expressions managed by blocks 8352 through 8354 and generates any applicable reporting before continuing to block 8384. Block 8384 prunes statistics data according to the criteria determined at block 8374, and block 8386 checks if any statistics are to be logged to history.

If block 8386 determines there is no history to be output as part of statistics logged, then the caller (i.e. statistics maintainer) of FIG. 83B is returned to at block 8388, otherwise block 8390 prepares parameters according to the statistics data for generating history, block 8392 invokes (calls) the history logger of FIG. 82B, and the caller of FIG. 83B is returned to at block 8388.

Block 8384 is an ideal place to perform pruning. An alternate embodiment MS includes at least one polling thread for asynchronously pruning statistics data. Another embodiment maintains statistics so that pruning is never a requirement. Some embodiments may only move to history those statistics which have been pruned, for example to use history for data which is no longer maintained at the MS.

Statistics are not just for reporting (e.g. WDR fields' processing, privilege and charter processing, etc), but also to be accessed by MS threads of processing for adjusting their processing (e.g. IPC thread throttling, thread inter-communications for efficient processing, best method for graphically displaying data, etc), and to affect defaults that may used in MS processing. \st_statisticName atomic references can be to raw statistics, cumulated statistics, statistics derived from other statistics, or any data describing status, state, progress, threshold, value, or the like.

In some embodiments, statistics 14 and history 30 information are integrated in a common data repository for synergy of related data and access to it as needed (e.g. for reporting or preventing redundant data copies). FIGS. 82B and 83B should not cause a substantial or significant recursive chain of stack growth by calling each other. Appropriate semaphore control is incorporated by processing of history and statistics information.

FIG. 84A depicts a flowchart for describing a preferred embodiment of processing for configuring service propagation at block 1474. Service propagation leverages the LBX architecture to maximize availability of services which are available to at least one MS of a LN-Expanse. MSs without direct access to a needed service can access a needed service through at least one peer MS, or through multiple MSs, for routing service requests to successfully reach a desired service which would otherwise be unreachable. The service responses are also routed back to the originator through one or more MSs. A first MS uses services through a second MS, a second and third MS, a second and third and fourth MS, . . . , a second and third and . . . $N^{th}$ MS, etc as required to get to a needed service, for example when requesting a help service (e.g. 911) that is not directly available from the MS requesting help. Privileges are configured for governing what services can be propagated from which MS for the benefit of which users in the LN-Expanse. MSs may be mobile at high speeds, so it is preferred that propagated services be of the kind that cause reasonably small communications request and response exchanges (e.g. internet connected services) to prevent mobile roaming from interfering with large transmissions (e.g. file downloads), however error handling appropriately handles conditions when transmission traffic does not reach its destination.

Block 1474 processing begins at block 8400 and continues to block 8402 where options are presented to the user for configuration of service propagation. Thereafter, block 8404 waits for a user action in response to the options presented at block 8402. When a user action has been detected at block 8404, processing continues to block 8406.

If block 8406 determines the user selected to manage a service resource for propagation, block 8408 accesses service directory 16 for SDRs (Service Directory Records) and presents SDRs found in scrollable list form to the user with options before continuing to block 8410 for waiting for a user response action. Service directory 16 contains SDRs for which services can be shared in the LN-Expanse.

With reference now to FIG. 85A, depicted is a preferred embodiment of a Service Directory Record (SDR) 8500 for discussing operations of the present disclosure when interfacing to the service directory 16. A SDR 8500 describes a service to be accessible at the MS. SDR 8500 includes a service handle field 8500*a* for uniquely defining a service in a LN-expanse. Preferably, field 8500*a* is a service name (e.g. text string) which is consistently used by MSs in a LN-Expanse, however any form (e.g. binary) may be used provided it uniquely distinguishes the service from other services. Charter expressions may reference a propagate-able service for a return to context, and an atomic command may invoke a propagate-able service by name (e.g. Invoke App "service handle", . . . ). Service requesters preferably use field 8500*a* for making requests to the service (e.g. rather than field 8500*d*). There may be multiple SDRs in service directory 16 with the same field 8500*a* value when the same service is reachable through peer MSs, or other MSs of the LN-Expanse. A service description field 8500*b* is an optional user entered string for describing the SDR. A route field 8500*c* contains a directed route description of MSs for routing a request to the service.

Examination of field 8500*c* provides indication of which MS the service of the SDR is directly accessed, and how many hops (MSs) are involved in reaching the service at that MS. Unique identification/correlation is maintained to field 8500*c* for each MS involved in the route, for example a MS ID embodiment as described above. There is always at least one MS ID of field 8500*c*. Examples of field 8500*c* include:

A. A single MS (MS ID) described in field 8500*c* implies the SDR describes a service which is accessed directly from the MS with the SDR. A single MS in field 8500*c* (e.g. Stan) will always identify the MS which owns that service directory 16; or B. A plurality of ordered MSs (MS IDs) described in field 8500*c* implies there is a route through at least one remote MS to access the service of the SDR. For example, Stan;George (i.e. in a named syntactical MS ID embodiment) indicates the MS with the SDR is Stan and the service is accessible to Stan at the MS George. Stan;George;Jane;Greg indicates the MS with the SDR is Stan and the service is accessible to Stan at the MS Greg by routing first from Stan to George, then from George to Jane, and then from Jane to Greg (i.e. 3 hops). As will be seen in the flowcharts, if a SDR with one or more hops is selected to process a service request, the dynamic nature of processing at high speed moving MSs may cause starting with an anticipated number of hops (e.g. 3 per the example), but may end up with less or more hops depending on where the requested service is BEST made accessible in the LN-Expanse at the time of processing the request. Service requests are processed for minimizing the number of hops from any MS to get to a service, regardless of being processed by a MS with an originally anticipated number of hops. Thus, routes are completely dynamic as needed for maximum performance, and each MS hop processing makes a prioritized best judgment of where to route next to satisfy the request.

An address field 8500*d* (e.g. 12.234.56.140:23456) describes where to reach the service (e.g. ip address) at the MS with direct access, and may include at least one qualifier (e.g. ip port) to better target the service at the address. A URL (e.g. web site address) may be specified as well. Field 8500*d* is important for using at the MS with direct service access and is less important for being propagated to remote MSs since service requests ultimately access the MS with direct service capability anyway regardless of how many hops it took to get there. Field 8500*d* may contain a DLL interface or other executable interface specification. A communication reference information field 8500*e* contains any MS communications interface(s) 70 involved in communicating to the service. In some embodiments, one or more interfaces are assumed on the MS (i.e. no field 8500*e*). In some embodiments, an ordered list of interfaces may be specified for ensuring success. Field 8500*e* may include more detailed specifications (channel, wave spectrum, etc) for how to communicate over an interface 70, for example if more than one method is used over a single interface 70. A date/time last used field 8500*f* indicates when the service was last used successfully by the MS. A test method field 8500*g* contains a user configured request that can be used to test connectivity to the service. It is recommended that field 8500*g* be a request that causes a minimal response (e.g. a return code). In use flag field 8500*h* is true when a service request for the service is pending, and is false when one is not pending. Proper FIG. 84A processing consults the condition of field 8500*h* (e.g. at blocks 8428, 8432, etc). Field descriptions with the flowcharts provide additional detail.

With reference back to FIG. 84A, processing leaves block 8410 for block 8412 upon detection of a user action. If block 8412 determines the user selected to reset a SDR, then block 8414 resets the SDR by defaulting data fields for defining a service which has never been used yet by the MS. An appropriate semaphore lock window is incorporated to ensure other threads are not interfered with when accessing SDR information of the service directory 16 from block 8414 and other thread data sharing blocks of FIG. 84A processing (e.g. around entire block 1474 processing, or alternatively at specific blocks (e.g. 8414, 8430, 8434, etc)). Block 8414 continues back to block 8408 where new field values may be displayed depending on the embodiment of how the list is displayed. If block 8412 determines the user did not select to reset a SDR, then processing continues to block 8418. If block 8418 determines the user selected to test service connectivity, block 8420 prepares parameters for the selected SDR service handle and block 8422 invokes the procedure of FIG. 85B to process a service request described by test method field 8500*g*. Block 8420 prepares parameters for making the request described by field 8500*g* to the desired service of service handle 8500*a*, and to alert the user for how the request succeeded or failed (at block 8532). The request is preferably processed without regard to field 8500*c* by automatically determining the optimal route for processing in request processing of FIG. 85B. Alternatively, the route for the selected SDR could be enforced to perform the test by passing a parameter prepared at block 8420 to prioritize at block 8508 for the single SDR selected at block 8410 so that a specific route is tested. Upon return from request processing at block 8422, processing continues back to block 8408. If block 8418 determines the user did not select to test using a service described by a SDR, then processing continues to block 8424. If block 8424 determines the user selected to add a SDR to the service directory 16, then the user interfaces for adding a validated SDR at block 8426 and processing continues back to block 8408. If block 8424 determines the user did not select to add a SDR, then processing continues to block 8428. If block 8428 determines the user selected to delete a SDR from service directory 16, then the selected SDR is deleted at block 8430 and processing continues back to block 8408. If block 8428 determines the user did not select to delete a SDR, then processing continues to block 8432. If block 8432 determines the user selected to view or modify a SDR, then the user interfaces for viewing or modifying the selected SDR at block 8434 and processing continues back to block 8408. Block 8434 will ensure any modifications are validated before processing leaves block 8434. If block 8432 determines the user did not select to view or modify a SDR, then processing continues to block 8436. If block 8436 determines the user selected to exit managing service resources of the services directory 16, then processing continues back to block 8402 for presenting the user with overall service propagation configuration options, otherwise block 8438 handles any other user actions detected at block 8410 and processing continues to block 8408. Referring back to block 8406, if it is determined the user did not select to manage a service resource for propagation, processing continues to block 8440.

If block 8440 determines the user selected to configure publishing a service, then block 8442 accesses the service directory 16 for all SDRs and block 8444 interfaces with the user for enabling or disabling specific service sections of applications fields 1100*k*. Thereafter, block 8444 processing continues to block 8402. Publishing services is equivalent to enabling the presence of service descriptions (i.e. SDR information) in application fields 1100*k* of outbound WDRs for processing by receiving privileged MSs. Publishing enables service propagation by making services of a first MS available to remote peer MSs which have privileges to access the services described in fields 1100*k* (i.e. appfld.services section). Block 8444 uses processing of FIG. 77, preferably with a scoped set of application fields sections of block 8442 (e.g. parameter passed to a procedural form of FIG. 77) to limit FIG. 77 processing to appfld.services sections. If block 8440 determines the user did not select to publish a service, then processing continues to block 8446.

If block 8446 determines the user selected to configure service propagation permission(s), then block 8448 interfaces with the user to configure permissions related to service propagation and processing continues to block 8402. Block 8448 provides configuration of privileges for who can use/see the published services when receiving WDRs, for example for influencing WITS filtering (e.g. strip out specific appfld.services section(s) based on permissions). Block 8448 can be embodied with processing of FIG. 38. If block 8446 determines the user did not select to configure permission(s), then processing continues to block 8450.

If block 8450 determines the user selected to configure service propagation charter(s), then block 8452 interfaces with the user to configure charters related to service propagation and processing continues to block 8402. Block 8452 provides configuration of charters related to service propagation (e.g. inbound processing of WDRs to make use of services made available by peer MSs), such as a charter using the executable of FIG. 85E. Block 8452 can be embodied with processing of FIG. 45. If block 8450 determines the user did not select to configure charter(s), then processing continues to block 8454.

If block 8454 determines the user did not select to exit block 1474 processing, block 8456 handles any other user actions detected at block 8404 and processing continues back to block 8402, otherwise block 1474 processing appropriately terminates at block 8458 (e.g. terminates user interface).

FIG. 84B depicts a flowchart for describing a procedure to process application fields according to how they are enabled or disabled for WDRs, for example as directed for oWITS. See FIG. 77 and related discussions for enabling or disabling sections (subsets of data) in application fields 1100*k*. Application fields sections (any subsets) can be disabled or enabled for being stripped, appended, or modified. Preferably, FIG. 77 facilitates governing what is stripped or appended. FIG. 77 may influence how a section is modified for a particular application, but privileges may be used to more specifically influence specified application fields section modifications for mWITS, iWITS and oWITS. The FIG. 84B procedure is preferably used for publicizing services by appending the appfld.services subordinate sections from the service directory 16 for propagating services to receiving MSs to populate their service directories 16 for use. There are to be at least 3 fields appropriately (appfld.services.ct too) appended from the service directory 16 for each service: handle field 8500*a*, route field 8500*c* and date/time last used field 8500*f*. Field 8500*d* may be appended. Field 8500*f* is relevant within context of SDRs from the same MS because the date/time stamp is in time terms of that MS. In embodiments where NTP is globally used by MSs, field 8500*f* could be consistent in time terms across the entire LN-Expanse. Other SDR fields may also be appended to outbound WDRs, but are not required to be present in a WDR to be received by other MSs in many embodiments.

Processing of FIG. 84B may be incorporated in overall processing of application fields 1100*k*, as one of a plurality of procedures for processing application fields 1100*k* (e.g. used by block 5703), or as part of oWITS specific processing of application fields 1100*k*.

Processing application fields, for example to show how service directory information is appended to outbound WDRs, starts at block 8460 and continues to block 8462 for getting parameters passed. At least the WDR (reference/address thereof) is passed to FIG. 84B processing, along with a parameter communicated back to the caller for whether to prevent processing the WDR further (i.e. WITS filtering). A reference/address to privileges, and to enabled/disabled indicators for fields 1100*k* sections, as well as how to process fields 1100*k* may also be passed as parameters. Thereafter, block 8464 accesses the WRC, or a similar outbound counterpart to it, for WITS filtering processing, and the outbound WDR identity is used to see what is known about its MS identity recent whereabouts in a reasonably current trailing amount of time (e.g. checking queue 22 and/or LBX history). Processing continues to block 8466. Recall that the WRC indicates how to perform WITS filter processing, except in this case it is used for outbound processing:

5) Ignore (i.e. do not permit for outbound) WDRs which are destined for a wirelessly connected MS (e.g. within range 1306);
6) Consider (permit outbound) all WDRs regardless of destination;
7) Ignore (i.e. do not permit for outbound) all WDRs regardless of destination; and/or Ignore (i.e. do not permit for outbound) WDRs which are not destined for a wirelessly connected destination (e.g. this is a popular configuration).

The WRC (or counter-part thereof) is then used appropriately by WITS processing for deciding what to do with the WDR in process. Assuming the WDR is to be processed further, then permissions 10 and charters 12 are still checked for relevance of processing the WDR (e.g. MS ID matches active configurations, WDR contains potentially useful information for configurations currently in effect, etc). In an alternative embodiment, WITS filtering is performed at existing permission and charter processing blocks so as to avoid redundantly checking permissions and charters for relevance.

If block 8466 determines the WRC and WDR information indicates to ignore the WDR, then processing continues to block 8468 for indicating to the caller of FIG. 84B to filter out the WDR from further WITS processing (e.g. FIG. 57 and caller processing which invoked FIG. 57), and the FIG. 84B caller is returned to at block 8470. If block 8466 determines the WRC and WDR information indicates to continue processing, then processing continues to block 8472 for indicating to the FIG. 84B caller to continue processing the WDR (i.e. do not filter out), and processing continues to block 8474.

Block 8474 loops through all fields 1100*k* sections enabled, for example by FIG. 77 processing, to eliminate subset sections when a higher level section includes all enabled subordinate sections. For example, appfld.services is a higher order section for all SDR corresponding sections to be maintained therein of service directory 16, appfld.services.2 is a higher order section specifically for a web service appfld.services.2.handle, etc. Fields to enable are at least appfld.services.#.handle, appfld.services.#.route, and appfld.services.#.ldt for each service (appfld.services.ct too). Enabling appfld.services indicates to FIG. 84B processing to get all SDRs from the service directory 16 for being present in the WDR. Block 8474 continues to block 8476 when all enabled fields 1100*k* sections are identified.

Block 8476 gets the next (or first) enabled fields 1100*k* section. Thereafter, block 8478 checks if all have been processed (may be none, one or many to process). If block 8478 determines there is a section to process, block 8484 accesses section applicable privileges and block 8486 checks if anyone is privileged to receive the section in any form. If block 8486 determines that at least one privilege is in place, then block 8488 accesses data for the section, block 8490 builds the fields 1100*k* section appropriately into a work area, perhaps in accordance with the associated privilege from block 8484, and processing continues back to block 8476 to get a next section for processing. Block 8488 will access appropriate data for the application fields 1100*k* section (e.g. directory 16 SDR information) as is appropriate for that particular application set of data. This may include accessing data of an AppTerm, atomic term, WDRTerm, map term, data (e.g. existing applications fields 1100*k* section(s)) of the passed WDR, or any other MS data.

If block 8478 determines there are no remaining enabled sections to process, block 8480 strips off the entire fields 1100*k* from the WDR passed for processing, block 8482 appends to the passed WDR a completely new fields 1100*k* built to the work area, and the caller is returned to at block 8470. For service propagation, the appfld.services section contains appropriate fields for receiving MSs to maximize service availability in the LN-Expanse. Receiving MSs update their service directories 16. See FIG. 85E discussion.

FIG. 85B depicts a flowchart for describing a preferred embodiment of a procedure for processing a request for a propagated service. FIG. 85B is to be thread safe (reentrant), as are all procedures of this application for good coding practices. Processing begins at block 8502, continues to block 8504 for getting parameters passed (e.g. service handle (e.g. name) desired (comparable to field 8500*a*), the request data, reference/address to any response data returned to the caller, whether to provide a notification to the user if able/unable to reach the service), block 8506 for accessing service directory 16 at the MS of FIG. 85B processing for all SDRs describing where to find the desired service passed as a parameter, and then to block 8508 for prioritizing SDRs found at block 8506. If only one SDR, or none, is found for the desired service, then no prioritizing is performed. There may be a plurality of SDRs from many MSs in the service directory 16 based on privileges and enabled fields 1100*k* sections shared between MSs. Prioritizing is preferably carried out on SDRs by sorting SDRs with priority for a minimum number of hops (i.e. least # of MSs in routing field 8500*c*) and a most recent date/time stamp field 8500*f* for SDRs with the same MS ID in the final targeted MS of route field 8500*c*. For example, there may be a plurality of SDRs in a service directory 16 for a choice of routes to the specified service.

Thereafter, block 8510 gets the next prioritized SDR (or first) and block 8512 checks the result. If block 8512 determines there is a SDR to process for the desired service, then block 8514 sets field 8500*h* to true in the corresponding SDR of directory 16, block 8516 builds a targeted send request for the request data parameter according to route field 8500*c* (i.e. the service or first hop in the route) and applicable field(s) 8500*e*, and block 8518 sends the request and waits for the response. If a single MS ID is present in field 8500*c*, then it is the MS of FIG. 85B processing in which case the desired service is communicated with directly from the MS of FIG. 85B processing using address field 8500*d*. If there is a plurality of MSs in field 8500*c*, then the next MS to hop to is targeted for processing the service request.

FIG. 85B makes use of appropriate semaphore control discussed for FIG. 84A. Block 8518 processing preferably involves asynchronous communications threads for sending and receiving, analogously to architecture 1900 send and receive processing discussed above wherein queued correlation is maintained to correlate a response with a request. Block 8518 preferably sends using a targeted request using a send queue (e.g. queue 24) like block 2516, and then involves at least one asynchronous receiving thread blocked on a receive queue (e.g. queue 26) at a MS or service to provide a correlation containing response. Block 8518 processing continues to block 8520 when either of the following conditions occur:

1) Response containing status and/or data received back for the request sent at block 8518;
2) Error response code status received back for the request sent at block 8518; or
3) A communications wait timeout occurred whereby a response was never received in a reasonable time period for the request sent at block 8518.

Block 8520 sets field 8500*h* to false in the corresponding SDR of directory 16 from block 8510, and block 8522 checks results of the send at block 8518.

If block 8522 determines an error was returned, or a timeout occurred whereby no response was received back, then processing continues back to block 8510 for a next prioritized SDR, otherwise at block 8524 the response information received is appropriately placed into the parameter for returning the response back to the caller of FIG. 85B, block 8526 sets a return code to the caller for indicating a response was received, block 8528 updates the corresponding SDR of directory 16 field 8500*f* to the current MS system date/time and processing continues to block 8530. The timeout value may be configurable or enforced by known system constraints.

Referring back to block 8512, if block 8512 determines there are no SDRs to process for the desired service, or the last prioritized SDR was already processed, then block 8540 places a null into the parameter for returning the response back to the caller, block 8542 sets the return code to the caller for the error which last occurred, and processing continues to block 8530. Loop iterations of blocks 8510 through 8522 provide the best ordered attempt to reach the requested service in minimal time.

If block 8530 determines a user notification parameter passed to FIG. 85B processing indicates to notify the user of request results, then block 8532 alerts the user with result status information and processing continues to block 8534, otherwise block 8530 continues directly to block 8534. The results status information preferably requires the user to acknowledge seeing the status information before processing can leave block 8532 for block 8534. Block 8534 logs results (e.g. to history 30), continues to block 8536 for pruning service directory 16 of the MS of FIG. 85 processing, and the return code is preferably returned as a "function" FIG. 85B would so the caller knows how to handle results.

Pruning SDRs will prune by current privileges in effect and will prune SDRs originated by the same MS for the same service so that only the most recent SDR using field 8500*f* remains for redundancy or conflict (e.g. different routes for same service from same MS with different last used date/time stamps). An alternate embodiment implements an asynchronous pruning thread (instead of a block 8536) to prevent impacting performance of request processing.

FIG. 85C depicts a flowchart for describing an example embodiment of MS application processing relevant for interfacing to a propagated service. A MS application in use starts at block 8546 and continues to block 8548 where a user uses the application as is appropriate for the particular application. Block 8546 may involve many user interfaces, many different kinds of processing, and may involve finally terminating the particular application. When a propagated service is to be accessed by the application (e.g. block 8550), block 8552 prepares appropriate service request parameters to FIG. 85B processing and block 8554 invokes FIG. 85B processing for making the service request. Thereafter, processing continues to an applicable processing point within the particular MS application at block 8548 for processing return information from FIG. 85B.

FIG. 85D depicts a flowchart for describing a preferred embodiment of processing at a MS when receiving a request for a propagated service from a remote MS. Processing begins at block 8558 when a request for a service is received (e.g. at a receive queue (e.g. queue 26)) from another MS. There is preferably a pool (plurality) of FIG. 85D threads for servicing a plurality of MSs simultaneously. The pool of FIG. 85D threads should be started like other MS 19xx processes in an appropriate order and terminated like other MS 19xx processes in an appropriate order (see applicable discussions related to thread pools blocked on a queue (for FIGS. 12, 28, 29A, 29B)). Thereafter, block 8560 prepares parameters for invoking FIG. 85B processing that are in the request, block 8562 invokes FIG. 85B processing, block 8564 builds a response from FIG. 85B processing correlated to the request for the requesting MS, block 8566 sends the response (e.g. using a send queue (e.g. queue 24)), and thread processing terminates at block 8568. The response built at block 8564 appropriately builds a correlated response for any error or success condition. Note that invoking FIG. 85B processing at the receiving MS ensures a best route is obtained in minimum time using prioritized local entries which may have changed (e.g. improved) since the originating MS service directory 16 was updated. In cases where the service directory 16 of the MS of FIG. 85D processing has worsened for finding the service, an error is returned to the requesting MS so that FIG. 85B processing at the requesting MS processes a next prioritized SDR. Service directory 16 SDRs enable a very dynamic nature for optimal routing in a LN-Expanse for service requests.

In an alternate embodiment, MS response processing may search the service directory 16 for finding the best route to get back to the requesting MS, rather than using the same route of the request hops. Response processing can implement searching directory 16 for finding the best and minimum number of hops back to the requesting MS. Directory 16 would be accessed for prioritizing SDRs just as was disclosed for FIG. 85B, and with applicable processing, for processing the prioritized list for the correlated response to get it back to the requesting MS in the best possible path.

FIG. 85E depicts a flowchart for describing a preferred embodiment of processing for an executable that updates service directory 16 information, for example as used in a charter action configured by FIG. 45A or block 8452. A user can configure a charter to update the service directory 16 with all propagated services (i.e. in context of privileges), such as:

```
(_I_appfld.services != NULL):
    Invoke App updsvcd.exe (_I_msid, _I_appfld.services, "ALL");
```

A user may configure charters to update the service directory 16 with certain propagated service(s) (i.e. in context of privileges), such as:

```
(_I_appfld.services.#.handle = "LBXsupervisory"):
    Invoke App updsvcd.exe (_I_msid, _I_appfld.services.#.handle,
                    "SPECIFIC");
```

NULL is a special keyword for indicating "not present" and can be used on any section. The updsvcd.exe executable is passed appropriate parameters. An alternate embodiment of FIG. 85E is a DLL interface wherein the DLL is already loaded to MS processing memory for fast performance when invoked by name from the charter (e.g. Invoke App updsvcd ( . . . )).

Service directory updater processing starts at block 8570 and continues to block 8572 which accesses parameters passed. If the "ALL" parameter is passed, then all subordinate sections of appfld.services are processed so that all WDR services being publicized can be used. If the "SPECIFIC" parameter is passed, then only the single propagated service section being publicized can be used. A user may specify multiple charters, each for specific services of interest for propagated service requests. The entire WDR may be passed for access using the special _I_WDR parameter in which case appropriate parsing would be performed on sought WDR information.

Thereafter, block 8574 gets the next (or first) application fields 1100*k* services section according to whether a single section or multiple sections are to be processed, and block 8576 checks if they all have been processed (not at first encounter to block 8576 from block 8570). If there is one to process, then block 8578 gets the services section data fields (e.g. at least fields for populating a SDR into the local services directory 16 with fields 8500*a*, 8500*c* and 8500*f*), block 8580 accesses permissions data relevant for the section and originating MS identity, and block 8582 checks if the MS of FIG. 85E processing is privileged for updating its service directory 16 for making service requests using the remote MS data received at block 8572. If block 8582 determines the MS of FIG. 85E is not privileged, then processing continues back to block 8574 for any remaining service sections for processing, otherwise block 8584 accesses the local service directory 16 for a matching SDR by matching the service handle (e.g. name) and route information (route received starts at MS identity being received from). Thereafter, if block 8586 determines a match was found (i.e. MS1;MS2; . . . for a service matches a received MS2; . . . for the service), then block 8588 updates the SDR route field 8500*c* (i.e. for MS1;MS2, . . . ) in directory 16 with the section received (may be route information change), as well as any other fields received, before continuing back to block 8574. If block 8586 determines a match was not found, then block 8590 inserts a new SDR into the local directory 16 for finding the service (i.e. with route field 8500*c* of MS1;MS2, . . . ) with the section received, as well as any other fields received before continuing back to block 8574. Loop iterations of blocks 8574 through 8590 ensure services sections received in WDRs are appropriately processed.

If all service sections have been processed as determined by block 8576, then processing terminates at block 8592. Appropriate semaphore control is used by FIG. 85E processing for directory 16 processing.

Service propagation facilitates identifying peer MSs which can help satisfy service requests made by a MSs that does not have direct access to a needed service at the time of making the request. Permissions help enforce what service routing can be shared between MSs. For a basic example, internet connected services are made available to MSs which do not have direct access to the service by routing through peer MSs which are in the vicinity. Routing paths dynamically change as MSs are mobile, and a request always leverages the best available path from any MS during a pending request, and hops thereof. Services are made "highly available". Some suggested services for service propagation configuration include:

- Supervisory service 1050 (e.g. appfld.services.#.handle=LBXsupervisory) as discussed above for common service informant code 28 processing among MSs. For example, the LBX architecture supports peer to peer call processing which does not require a "middleman" telephony service provider. MSs communicate with each other in a peer to peer manner. Consequently, service 1050 may be used for reporting call processing usage information to a MS manufacturer, MS software provider, etc so that peer to peer call processing can be monitored and billed appropriately;
- Credit Card Transaction service (e.g. appfld.services.#.handle=verifoneClearing) for automatic credit card transactions or validation of such transactions processed by a MS, for example when ordering from a vending machine within the vicinity of the MS, processing or validating a purchase transaction when within the vicinity of an automated teller (e.g. StarBucks robotic coffee maker), processing or validating a bank transaction, or any other debit or credit card related automated service;
- Call Processing service (e.g. appfld.services.#.handle=callProcessor) for automatically placing a peer to peer phone call whereby a call is placed through a request and response involving multiple hops as described above. In some embodiments, SIP or H.323 ip phone call processing traffic is routed through LBX propagated services. In an alternate embodiment, correlated requests and responses are used to set up a communication path for call processing much like a call processing SS7 STP (Signaling Transfer Point);

911 Emergency service (e.g. appfld.services.#.handle=911) for handling a 911 emergency call that may only be reachable through service propagation. For example, an injured skier's only chance to reach a 911 service is through MSs which are in the vicinity;

411 Directory service (e.g. appfld.services.#.handle=411) for handling a 411 directory assistance call to find a sought phone number;

Public Transportation service (e.g. appfld.services.#.handle=publicXport) for providing responses to MS user requests seeking a nearby taxi, bus, other needed transportation, or information thereof;

OnStar service (e.g. appfld.services.#.handle=OnStar) for satisfying requests for needed OnStar services, for example to ensure a person has access to OnStar in times of need (e.g. to unlock automobile, alert OnStar to a potential accident, theft, or other incident, etc);

NTP time service (e.g. appfld.services.#.handle=NTP) for satisfying time synchronization requests in the LN-expanse to improve interoperability performance and facilitating whereabouts determination; or Gaming service (e.g. appfld.services.#.handle=CallofDuty5) for satisfying gaming interactions among MSs for ensuring "Call of Duty" game interoperability availability. There may be many other specific game service interfaces (specific service handles (e.g. names)) for being supported through propagated services.

FIG. 86A depicts a flowchart for describing a preferred embodiment of processing for configuring the service informant code 28. Block 1490 processing begins at block 8602 and continues to block 8604 for initializing variables for subsequent processing, block 8606 for accessing an informant map and building a workable copy used by FIG. 86A processing, block 8608 for presenting a scrollable list of current informant map entries, and then to block 8610 for waiting for a user action in response to the list presented at block 8608.

With reference now to FIG. 86C, depicted is a preferred embodiment of a Service Informant Record (SIR) 8600 for discussing operations of the present disclosure. The informant map is a collection of Service Informant Records (SIRs) wherein each record contains three fields: a handle field 8600*a* which is used by an invoker of service informant code 28 to specify which SIR 8600 is being used; a method field 8600*b* which contains a value for indicating: MS2MS, PROPAGATED, HOMEGROWN, ALERT, or ATOMIC, each of which are explained in detail with FIG. 86B; and a reference field 8600*c* which is the reference to be invoked in context of the method field 8600*b*, also explained in detail with FIG. 86B. All values in fields 8600*a* are unique across records to ensure a unique handle to a SIR. The purpose of SIRs is to prevent re-building low level or middleware executable LBX code (e.g. compiled and linked) when a different method for performing service informant code functionality is needed. A user updates the informant map SIRs for desired functionality and invoking executable code using FIG. 86B does not have to be rebuilt. SIRs externalize and isolate variable service informant code 28 processing behavior with convenient user configuration.

With reference back to FIG. 86A, block 8610 continues to block 8612 when a user action has been detected in response to the list presented. If block 8612 determines the user selected to test a SIR of the list presented at block 8608, then the user interfaces at block 8614 for specifying parameters for the reference field 8600*c*, and block 8616 invokes service informant code 28 processing of FIG. 86B. Thereafter, processing continues to block 8608. The user can check results of having invoked service informant code 28. If block 8612 determines the user did not select to test a SIR, then processing continues to block 8618. Depending on a particular embodiment, the user of FIG. 86A may be an authenticated/authorized administrator, or a MS user.

If block 8618 determines the user selected to browse details of a selected SIR presented at block 8608, then the details are presented to the user at block 8620, and the user browses them until satisfied at block 8622. Thereafter, processing continues to block 8608. Details presented at block 8620 include data from related LBX history 30, statistics 14, permissions 10, charters 12, and any other data related to the SIR. If block 8618 determines the user did not select to browse data for a selected SIR, then processing continues to block 8624.

If block 8624 determines the user selected to modify a selected SIR presented at block 8608, then the SIR is presented to the user at block 8626 in modifiable form, and the user modifies the SIR until satisfied at block 8628. Thereafter, processing continues to block 8608. SIR 8600 fields are presented at block 8626 for modification, and block 8628 ensures any changes are valid. If block 8624 determines the user did not select to modify a selected SIR, then processing continues to block 8630.

If block 8630 determines the user selected to save the working copy (e.g. memory kept only) of the informant map (i.e. SIRs) for permanent subsequent use, then block 8632 writes the working copy to the informant map used by LBX processing (kept in suitable MS storage), and processing continues to block 8608. FIG. 86A supports making one or more "in progress" changes to a temporary working copy which may be saved at block 8632, or not saved when terminating block 1490 processing at block 8638. If block 8630 determines the user did not select to save working copy changes, then processing continues to block 8634. A working copy minimizes a semaphore resource window when updating.

If block 8634 determines the user did not select to exit block 1490 processing, block 8636 handles any other user actions detected at block 8610 and processing continues back to block 8608, otherwise block 1490 processing appropriately terminates at block 8638 (e.g. terminates user interface).

FIG. 86B depicts a flowchart for describing a preferred embodiment procedure to provide service informant code 28 processing. Service informant code 28 processing begins at block 8650 when invoked by a calling thread (e.g. by block 296) with parameters of A) SIR handle; and B) list of parameters, preferably contained in a parameter class object (alternatively, a variable length list of parameters). While service informant code 28 processing can be user configured for desired functionality, parameters to FIG. 86B processing, and order thereof, should be anticipated for FIG. 86B processing in light of possible SIR configurations. An alternate embodiment expands SIRs to include additional parameter description information fields for which parameters, and order thereof, to use out of all parameters passed to FIG. 86B processing to accommodate SIR configuration changes for different service informant code 28 method processing. Other embodiments may expand SIRs for how to format certain parameters for desired processing. Service informant code 28 processing is capable of informing a data processing system with MS2MS communications, invoking a propagated service, invoking a "homegrown" interface, providing a MS local alert, or invoking an atomic command, wherein each method depends on the SIR handle parameter passed to FIG. 86B processing. In some embodiments, the informed data processing system (e.g. supervisory service 1050) includes at least one Database (e.g. via Database interface (e.g. SQL-NET) of service 1050 or service 1050 interface to Database) to house data for many MSs in a LN-Expanse for coordinated service processing. Regardless, the system contacted is any variety of a data processing system (including another MS).

Block 8650 continues to block 8652 for getting the handle field 8600*a* passed as a parameter, then to block 8654 for using the handle to access the informant map for the associated SIR, and then to block 8656. Block 8654 may default the method, or cause an error to be handled at block 8686, if a SIR is not found for the handle.

If block 8656 determines the SIR (e.g. found at block 8654) indicates to perform MS2MS processing (i.e. indicated in SIR field 8600*b*), block 8658 uses the SIR (e.g. from block 8654) reference field 8600*c* and parameter class object to prepare parameters for MS2MS processing. The reference may be used to indicate which command, or exactly what type of processing to perform, in MS2MS processing being requested (e.g. a command name). Thereafter, block 8660 invokes FIG. 75A processing already described above (see FIGS. 75A and 75B), and processing continues to block 8688 which returns to the caller of FIG. 86B. If block 8656 determines a MS2MS method is not indicated in the SIR, then processing continues to block 8662. Block 8660 should perform appropriately well (i.e. prevent "loopback" at link layer) when identifying the target MS as the same MS of FIG. 86B processing.

If block 8662 determines the SIR indicates to invoke a propagated service, block 8664 uses the SIR reference field 8600*c* and parameter class object to prepare parameters for invoking the propagated service interface. The reference may be used to indicate which named interface to invoke. Thereafter, block 8666 requests the propagated service by calling FIG. 85B already described above, and processing continues to block 8688 which returns to the caller of FIG. 86B. Preferably, service informant code 28 processing is a best attempt and any return code is not checked. Alternatively, a return code can be checked after performing any informing method, and returned to the caller of FIG. 86B at block 8688. If block 8662 determines a propagated service (field 8600*b*=PROPAGATED) method is not indicated in the SIR, then processing continues to block 8668.

If block 8668 determines the SIR indicates to invoke a homegrown interface (field 8600*b*=HOMEGROWN) method, block 8670 uses the SIR reference field 8600*c* and parameter class object to prepare parameters for invoking the interface. The SIR reference field 8600*c* may be used to specify the first parameter to the homegrown interface. Thereafter, block 8672 invokes the homegrown interface (e.g. DLL), and processing continues to block 8688 which returns to the caller of FIG. 86B. If block 8668 determines a homegrown interface method is not indicated in the SIR, then processing continues to block 8674.

If block 8674 determines the SIR indicates to notify the local MS user (method field 8600*b*=ALERT), block 8676 prepares information to invoke a MS alert interface at the MS, and uses the SIR reference field 8600*c* for the type of alert (e.g. pop-up, log entry, title-bar informative mechanism, specific alert application, etc) and parameter class object to prepare parameters (e.g. convert data to formatted human readable string form), for alerting the user. Thereafter, block 8678 invokes the specified alert interface, and processing continues to block 8688 which returns to the caller of FIG. 86B. If block 8674 determines an alert interface method is not indicated in the SIR, then processing continues to block 8680.

If block 8680 determines the SIR indicates to perform an atomic command (method field 8600*b*=ATOMIC), block 8682 prepares parameters to invoke the atomic command, and uses the SIR reference field 8600*c* for the atomic command (i.e. name) and optionally the atomic operand, and parameter class object to prepare parameters for the atomic command and operand pair as already described in detail above. Thereafter, block 8684 invokes FIG. 62 processing, and processing continues to block 8688 which returns to the caller of FIG. 86B. See details of atomic commands and atomic operand for all the variations and type of informant processing that can occur. If block 8680 determines an atomic command method is not indicated in the SIR, then processing continues to block 8686 where any unknown SIR handle is appropriately dealt with (e.g. log error) before returning to the caller at block 8688.

In alternate service informant embodiments, data which is used to inform is analyzed to determine which is the best method to use for informing, in which case block 8654 is replaced with functionality for analyzing parameters passed. In this embodiment, no informant map (i.e. no SIRs) is required. Modified block 8654 would make a determination what is the best method to perform informing based on data used to inform with. In a related embodiment, expressions having conditions may be configured for how to interpret data passed as parameters for determining an appropriate informing method. For example, expressions may be as complex as an expression of charter BNF Grammar 3068*a* and 3068*b*. A True result of the expression is to cause certain informing method(s) to be used as was directed by the configuration. If expressions are supported, a generalized expression interface may be used for synergy with expressions described above. In other embodiments, generic expression interfaces are provided for consistent expression specification and stack based expression evaluation, as described above.

In some embodiments, a method for informing may be to carry data in application fields 1100*k* for beaconing data to receiving data processing systems. In some embodiments, privileges are enforced in FIG. 86B for certain target data processing system informing (e.g. there is a block X-a for accessing applicable privileges, block X-b for validating the applicable privileges, and block X-c for performing what is already at block X wherein X is 8658, 8664, 8670, 8676 and 8682; Each of blocks X-b continue directly to block 8688 when required privileges are not found, otherwise blocks X-b continue to blocks X-c for continued processing as shown).

In some embodiments, the service informant code 28 is used to propagate services, for example to update service directory 16 at a remote MS, or at an overall service directory 16 for a LN-Expanse which is accessed remotely by MSs as needed for propagated service processing in the LN-Expanse (e.g. block 8506 accesses remote overall service directory 16 database). Service informant processing of FIG. 86B may be used by lbxPhone™ provider solution processing (e.g. block 296, or any other processing point disclosed), used by charters configured by a user (e.g. see BNF grammar 3068*b* Invocation), or used by MS application providers. Different embodiments can expose SIR management of FIG. 86A, informant processing of FIG. 86B, and SIRs of FIG. 86C in various ways to various types of users. Some uses of FIG. 86C include:

- Affecting Intersection Traffic Light switching—Application fields 1100*k* work well for beaconing WDRs to be received not only by MSs in the vicinity, but also data processing systems which can process specific application data of WDRs. For example, a data processing system responsible for changing an intersection light from red to green, and visa-versa, will analyze WDR application fields 1100*k* for an applicable traffic application section (e.g. traffic section 8004*a*) for MSs in the vicinity. As a number of WDR emitting MSs are in the vicinity of intersections, an intersection light management data processing system uses the WDR information and directions, velocities, etc thereof, to make good decisions for affecting light changing behavior. In one preferred embodiment, an intersection light has a normal and consistent schedule for when to change light color for directions of traffic, and the intersection management data processing system overrides the normal schedule upon analyzing WDRs in the vicinity to determine that a light change should occur, for example, when there is a red light for a long line of vehicles heading south and north at a four way intersection, yet the light is currently green for no vehicles heading east and west at that intersection. In another embodiment, service informant processing is used to keep the intersection management data processing system informed for intelligent automated decision making, even when the informing MS is great distances from the intersection.

Parking Lot Guidance—The service informant may be used to inform a service that the MS desires to make use of the service, for example to become informed of available parking lot spaces. In one embodiment, a data processing system responsible for helping "would-be parkers" will analyze WDR application fields 1100*k* for an applicable parking lot awareness application section (e.g. parking lot awareness section 8004*i*) for MSs in the vicinity of a particular parking lot. As a number of WDR emitting MSs are in the vicinity of the parking lot, a parking lot management data processing system uses the WDR information and directions, velocities, etc thereof, along with available parking lot spaces to provide the driver with useful guidance information in order to find an available parking lot space. Maps, audible directions, and other useful navigational information can be provided to the user automatically, or according to user options. In another embodiment, service informant processing is used to request parking lot awareness information well in advance of being in wireless vicinity of the parking lot for properly planning ahead.

HotSpot Guidance—MSs which participate in high speed communications with "hotspots" can keep track of where the hotspots were located to remind the MS user of where to find the hotspot again. The hotspot application field section 8002*j* is used for internet resource binding between a MS and a hotspot service in the vicinity of the MS. Further, the service informant may be used to keep a master database automatically updated so that other MSs are made aware of the hotspot resources for their travels. The master database should keep a record of successfully bound hotspot uses that other users can be made aware of the same resources when traveling nearby.

Carpool Collaboration—The service informant may be used to automatically inform a carpool service with scheduling, route, and travel consistency information. In one embodiment, the carpool service supports user registrations for soliciting others who travel similar routes at similar times in order to identify possible carpool arrangements. In another embodiment, the carpool application section 8004*e* is used for interoperating MSs in the vicinity of each other, in accordance with permissions, to confirm that traveling carpool service users are indeed in the vicinity of each other during proposed carpool times. The service informant is used to communicate intelligence findings to the carpool service.

Mileage Reporting—The service informant is used to automatically inform a mileage reporting service for automatic accounting, for example to reimburse the MS user (e.g. employee or contractor) for his travels. Many companies reimburse their employees for work related travels. This accounting is manual and burdensome for employees when it comes time to do reporting. The service informant can automatically report after a certain number of miles, certain amount of time, or other events, to the service for automated accounting and reimbursement processing. In some embodiment, the MS must be detected to be in close proximity of a validated automobile data processing system in order to account for mileage. In other embodiments, the MS is mounted in the automobile.

Tracking—The service informant is used to automatically inform a service in order to do tracking of the MS for many different applications, and for many different reasons. Useful observations and useful application leveraging those observations can be made at the service for novel services to a plurality of users using the service. In one embodiment, the service uses tracking information to predict future travels of the MS. In another embodiment, the service uses tracking information to govern, guide, or operate future travels of the MS.

Sudden Proximal User Interface (SPUI)

FIG. 87A depicts a flowchart for describing a preferred embodiment of Sudden Proximal User Interface (SPUI) processing. SPUI rhymes with GUI, and for good reason. A SPUI is a Graphical User Interface (GUI) which automatically appears on a MS without the user having manually requested it to be started. A SPUI suddenly appears and is used to interact with at least one device (another MS, another data processing system, RFID device, etc) that is in proximity to (i.e. in the vicinity of) the MS. Although not named, a SPUI was previously disclosed, for example resulting from a charter automatically launching an application (e.g. Invoke atomic command) based on the charter's expression (e.g. being nearby another MS, or a data processing system emulating MS functionality). Charters can automatically start or terminate executable(s) (e.g. SPUI) by invoking appropriate processing. Specific application fields 1100*k* presence and values can result in conditionally spawning, or terminating, a SPUI.

SPUI processing begins at block 8700, and may begin as the result of invocation by a privileged charter, privileged passive or active RFID processing (e.g. 5300-CALL interface invocation) which automatically detected being in range of a RFID device, manually requested by a user like conventional application GUIs, or the like as disclosed in LBX processing. Processing continues to block 8702 where the most recent SPUI application variables are accessed and to block 8704 for checking if the SPUI application is already running on the MS. If block 8704 determines the SPUI application is not already running on the MS, then processing continues to block 8706 for presenting the SPUI to the user, preferably using the most recently saved SPUI application state variables from block 8702, and then to block 8708 where the user interfaces with the SPUI in context of the particular SPUI application. The FIG. 87A flowchart depicts processing of interest to SPUI processing during user interface at block 8708. Of course, there can be many user actions and processing that takes place at block 8708. Processing of interest at block 8708 is first checked for at block 8710.

If block 8710 determines that authentication is to be performed to the remote data processing system (e.g. other MS, MS emulator, RFI device, etc), then block 8712 prepares the authentication request using data specified in the SPUI at block 8708 (e.g. password), block 8714 sends the request to be received by the remote data processing system, block 8716 waits for a response and processing does not leave block 8716 for block 8718 until a response is received, an error is received, or a timeout with no response being received is detected. If block 8718 determines a corresponding non-error response (e.g. correlated) was received, then block 8720 updates SPUI relevant data (e.g. any data including local MS data, remote data, data for Service Informant processing, etc) if applicable, block 8722 updates the SPUI interface to reflect the response to the user, and processing continues back to block 8708 for further user interface to the SPUI. If block 8718 determines no response was received within a reasonable timeout, or that an error (correlated) was returned from the remote data processing system, then block 8724 reports the error to the user (e.g. in the SPUI) and processing continues back to block 8708.

There are various embodiments for authentication to the remote data processing system which may be a passive RFI device, an active RFI device, a MS, a MS emulator, or another data processing system. Embodiments include:

- See U.S. Pat. No. 5,912,959 ("Method of and system for password protection in a telecommunications network", Johnson) wherein trailing digits are used for a password to a numeric access interface (e.g. numbers dialed). For example, as a MS comes within range of a vending machine, the SPUI gets automatically presented, the user dials the advertised phone number interface and uses the SPUI to make a purchase for dispensing the product. Continuing with another example, the MS comes within range of a personal control center (e.g. outdoor lights at MS user's home), the user dials the well known phone number interface along with personally known trailing password digits for authentication to then be able to interface through the MS SPUI for controlling his personal home outdoor lighting system. The outdoor lighting system interface is embodied with a SPUI;
- A password (may be encrypted when communicating) is maintained by the remote data processing system for being recognized from an authorized administrating MS;
- Use of probe data 5300-P, or a subset therein, at the appropriate time (e.g. FIG. 87A processing) for authenticating to the device;
- Use, at the appropriate time, of user entered authentication criteria specified by a user of the SPUI;
- Block 8710 and subsequent processing described above for possibly re-authenticating at a much later time in SPUI interface processing at block 8708 because RFID processing already used probe data 5300-P to initiate communications and authenticate to the remote data processing system which is why processing began at block 8700 anyway (i.e. already authenticated when arriving to block 8700);
- No block 8710 and subsequent processing described above because authentication was already granted by virtue of having arrived to block 8700 for processing;
- Charter, or atomic command, execution already passed authentication criteria prior to invoking the SPUI; or
- Another authentication processing embodiment in context of the LBX architecture.

If block 8710 determines that authentication was not requested by the user or SPUI application, then processing continues to block 8726.

If block 8726 determines a request is to be sent to the remote data processing system, then block 8712 prepares the particular request (e.g. using data specified in the SPUI at block 8708), block 8714 sends the request to be received by the remote data processing system, block 8716 waits for a response, and processing does not leave block 8716 for block 8718 until a response is received or a timeout with no response being received is detected. Processing continues just as was described for an authentication request. If block 8726 determines that no request was to be sent, then processing continues to block 8728.

If block 8728 determines that asynchronous data was received for the SPUI application of FIG. 87A processing (e.g. presumably from an applicable remote data processing system), processing continues to block 8730. If block 8730 determines the data received was anticipated (e.g. using correlation maintained from a prior send request), then block 8732 parses and analyzes the data received. Thereafter, block 8718 determines if the data received was in error, or if it is to be used for SPUI processing. Block 8718 and subsequent processing is already described. If block 8730 determines the data received was not anticipated (e.g. no correlation found), then block 8734 attempts to correlate the data (e.g. to context of SPUI processing up to this point at block 8708) to the SPUI of FIG. 87A processing before continuing to block 8718 and subsequent processing already described. If block 8728 determines that no asynchronously received data is to be processed, then processing continues to block 8736.

If block 8736 determines the MS moved out of range of the remote data processing system being interfaced with, then block 8724 reports the error before continuing processing back at block 8708. In some embodiments, charter processing causes the event of block 8736 subsequent processing. Moving out of range may automatically terminate the SPUI application rather than providing an error in the SPUI which remains running. In some embodiments, the timeout detected at block 8716 determines that the MS is out of range. In some embodiments, there is no need for MS out of range determination (e.g. explicitly depicted by block 8736) because every response by the remote data processing system may be driven by a SPUI request. If block 8736 determines that the MS did not determine to be out of range, then processing continues to block 8738.

If block 8738 determines that SPUI application variables are to be saved (e.g. a user action to save), then block 8740 saves variables which can be used by the next processing at block 8702 (e.g. take on characteristics of processing and/or presentation desirable to prevent rework or redundant user specification, incorporate past user habits, past user SPUI orders, etc). Thereafter, processing continues to block 8708. If block 8738 determines that no SPUI application variables are to be saved, then processing continues to block 8742.

If block 8742 determines that the SPUI application is to be exited (e.g. a user action to exit), then block 8744 terminates the SPUI application appropriately (may save variables like block 8740 thereby eliminating the requirement for blocks 8738 and 8740 based on a user action), and SPUI processing terminates at block 8746. If block 8742 determines the SPUI application is not to be exited, then processing continues back to block 8708.

Referring back to block 8704, if it is determined that the SPUI application is already running in the MS, then block 8748 reports the SPUI is already active, and may surface the SPUI in the MS user interface for notifying the user of its presence. Thereafter, processing continues to block 8746 where processing terminates. In some SPUI embodiments, there is no need to check at a block 8704 if the SPUI application is already running. For example, a MS may be in proximity to a plurality of controllable remote data processing systems that use the same SPUI in which case multiple instances of the SPUI are presented to the user for uniquely controlling each system. One embodiment can have multiple instances of the same SPUI launched for multiple remote data processing systems, another embodiment can support multiple remote data processing systems with a single SPUI, and yet another embodiment enforces one SPUI instance at a time for a single remote data processing system.

While blocks 8714 and 8716 are presented in a synchronous point of view by waiting for a response, the reader should appreciate that the LBX architecture 1900 is a preferred embodiment. As has been well described above for threads of architecture 1900, the sending of requests, correlating the responses to those requests, and processing responses, is most efficiently performed by multiple threads executing concurrently. In the preferred embodiment of architecture 1900, blocks 8716 through 8722 can be carried out with receive thread processing after correlating a response (if matched) with the request sent. This would be a different asynchronous thread than the processing of block 8716, but would be as effective in producing the result. Block 8716 would have to create an insert to a queue correlation which can be used by the receive thread. The correlation must have enough information to uniquely distinguish the response from other responses. Similarly, block 8728 depicts that the preferred asynchronous receive thread design is accounted for in processing solicited and unsolicited responses from the remote data processing system, and block 8736 processing may have been caused by an asynchronous processing thread which can affect SPUI application behavior. So, to not obfuscate the many thread relationships of a SPUI, FIG. 87A presents processing relevant to SPUI application processing while reminding the reader the context of architecture 1900 is a preferred embodiment.

Sudden Proximal User Interfaces (SPUIs) are intended for notifying a user with a GUI that a remote data processing system of interest is nearby, or is within range. The user can control SPUI invocation through charter and RFID configuration as described above, however privileges on their own merit could be deployed for the meaning of invoking a SPUI when nearby an applicable remote data processing system. The SPUI may contain all the things native to a GUI (e.g. menus, options, icons, windows, etc) and may affect an entire MS interface (e.g. desktop or main window background or foreground, option or control layout, etc). The SPUI may modify the look, feel, and/or options of the MS user interface rather than invoke an application to the MS. For example, as a user travels, SPUIs present themselves to the MS for use based on what is in the vicinity at the time. The MS interface may be automatically reorganized to reflect what is nearby at the time. The SPUI is the user's path into an application that the user can interface to for driving a remote data processing system. Regardless of how a SPUI was invoked, there is a wealth of data accessible for processing such as WDR information of a WDR triggering a SPUI, application variables and most recent WDR information of an AppTerm triggering a SPUI, callback function processing for accessing AppTerm data and most recent WDR information, any disclosed processing for access to LBX History 30, statistics 14, or any other MS data herein disclosed. A SPUI may be presented visually, with audio, combinations thereof, or in any way that grabs the attention of the MS user. Any data processing systems can be automatically controlled, and user settings can be saved for defaulting the next interaction. The user may configure charters for automated processing, or may configure a SPUI to present itself for subsequent processing (e.g. block 8708, 8712, 8730, etc).

FIG. 87B illustrates different embodiments for discussing various data processing systems which can be automatically controlled by a MS according to the present disclosure, for example by: charter processing as a MS becomes nearby a data processing system, through a SPUI, or through other LBX processing. A remote data processing system application environment 87B-1, or subset thereof, includes an application 87B-12, some of which are discussed herein (e.g. SPUI examples section below), an application interface 87B-14, and a transponder 87B-16. In this embodiment, a transponder 87B-16 may be a RFID device for receiving and sending information, another MS, a data processing system providing a MS emulation, a data processing system providing a RFID emulation, or a data processing system specifically designed to interact with MSs for controlling application 87B-12. In this embodiment, application 87B-12 may include a plurality of data processing systems, and will provide at least one application interface 87B-14 (e.g. API) for supporting the controlling of the application 87B-12 (e.g. application device(s), application appliance(s), application environment data, application machine(s), application system(s), application data processing system(s), or the like). The application interface 87B-14 of environment 87B-1 is integrated well into the application 87B-12, for example by the builders (e.g. manufacturers, engineers, developers, etc) of application 87B-12. In this embodiment, transponder 87B-16 was adapted to the environment 87B-1, for example by a third party wherein transponder 87B-16 was developed to middleman communications and control commands between a MS (not shown) in the vicinity of transponder 87B-16 and the interface 87B-14 over at least one connection 87B-18. Connection(s) 87B-18 may be physical, wireless, a plurality of different communication mediums, different wave forms, or of embodiments discussed with FIG. 1E. Environment 87B-1 exemplifies that transponder 87B-16 was provided as an add-on component to an existing application interface 87B-14 for carrying out support for automated control of application 87B-1 by an authorized MS in the vicinity of transponder 87B-16.

A remote data processing system application environment 87B-2, or subset thereof, includes an application 87B-22, some of which are discussed herein (e.g. SPUI examples section below), and a transponder application interface 87B-24. In this embodiment, a transponder application interface 87B-24 may include a RFID device for receiving and sending information, another MS, a data processing system providing a MS emulation, a data processing system providing a RFID emulation, or a data processing system specifically designed to interact with MSs for controlling application 87B-22. In this embodiment, application 87B-22 may include a plurality of data processing systems, and will provide a tightly coupled interface with transponder functionality (e.g. shared data processing system motherboard) to a MS in the vicinity of interface 87B-24 for supporting the controlling of the application 87B-22 (e.g. application device(s), application appliance(s), application environment data, application machine(s), application system(s), application data processing system(s), or the like). Interface 87B-24 of environment 87B-2 is integrated well into the application 87B-22, for example by the builders (e.g. manufacturers, engineers, developers, etc) of application 87B-22. In this embodiment, interface 87B-24 already contained transponder functionality that a MS can interact with directly over at least one communications channel of the MS. Environment 87B-2 exemplifies that the transponder application interface 87B-24 was provided as part of the application 87B-22 for carrying out support for automated control of application 87B-22 by an authorized MS in the vicinity of interface 87B-24.

A remote data processing system application environment 87B-3, or subset thereof, includes an application 87B-32, some of which are discussed herein (e.g. SPUI examples section below), and a transponder application interface 87B-34. In this embodiment, a transponder application interface 87B-34 may include a RFID device for receiving and sending information, another MS, a data processing system providing a MS emulation, a data processing system providing a RFID emulation, or a data processing system specifically designed to interact with MSs for controlling application 87B-32. In this embodiment, application 87B-32 may include a plurality of data processing systems, and will support at least one control interface 87B-38 for the controlling of the application 87B-32 (e.g. application device(s), application appliance(s), application environment data, application machine(s), application system(s), application data processing system(s), or the like). Control interface(s) 87B-38 may include software, hardware, machines, wires, fiber, devices, or any combination of man-made apparatus in order to control application 87B-32. Interface 87B-34 of environment 87B-3 was not integrated into the application 87B-32. In this embodiment, transponder application interface 87B-34 was adapted to the environment 87B-3, for example by a third party wherein interface 87B-34 was developed to middleman control between a MS (not shown) in the vicinity of interface 87B-34. Control interface(s) 87B-38 were likely adapted (e.g. add-on) by a third party for automated controlling of application 87B-32. Environment 87B-3 exemplifies that the transponder application interface 87B-34 was provided as an add-on component with add-on control interface(s) 87B-38 for carrying out support for automated control of application 87B-3 by an authorized MS in the vicinity of interface 87B-34.

FIG. 87C depicts a flowchart for describing a remote data processing system application environment covering an infinite number of MS controllable applications. Processing is presented in light of the many detailed applications which are discussed herein (e.g. SPUI examples section below). Those skilled in the particular application art will have enough information for implementation while preventing a tremendous number of written pages for unnecessary detail. Processing begins at block 8750, and may begin as the result of an application which is ready for interacting with a MS in the vicinity. Thereafter, transponder functionality (i.e. MS send/receive interfaces) waits for eligible MS data detected in its vicinity at block 8752 either by waiting passively, or actively seeking a MS (e.g. periodic polling). Eligibility may be determined through participation on a monitored wave spectrum, a special communications signature, anticipated authentication criteria (e.g. field 5300-P data), or some other MS communications data criteria. An eligible communications from a MS in the vicinity cause processing to leave block 8752 for block 8754.

If block 8754 determines that authentication is to be performed for the MS, then block 8756 performs authentication and finalizes it if it was successful before continuing to block 8758, otherwise block 8754 continues to block 8758. Depending on the embodiment, finalizing at block 8756 may involve updating application data, accessing application data, or modifying variable data for subsequent processing.

If block 8758 determines the MS is not authorized, then block 8760 handles the error, and block 8762 checks to see if sending data back to the MS is warranted (e.g. error code). If block 8762 determines no data (e.g. error information) is to be communicated back to the MS, then processing continues back to block 8752. If block 8762 determines that data (e.g. error) should be sent back to the MS, then block 8764 prepares a transmission, sends the transmission, and processing continues to block 8752. In some embodiments, block 8760 logs an error, and may ignore the error so that no response is sent back to the MS at block 8764. If block 8758 determines the MS is authorized, then processing continues to block 8766 for processing MS data received.

Block 8766 processes data received from a MS in the vicinity and determines what should be processed for the data received. In some application embodiments, there is no explicit authentication step, for example when all MS data communications contain authentication criteria anyway as processed at block 8766. If authentication was solely the purpose of current FIG. 87C processing, processing leaves block 8766 for block 8786 where authentication processing may be completed for subsequent processing from the MS in the vicinity. A MS will communicate to FIG. 87C processing, and FIG. 87C processing will communicate to a MS over at least one supported wave spectrum, and may use different wave spectrums, channels, communication interfaces 70, or other embodiments discussed above for MS communications, even during a single period of time wherein the MS is in the vicinity for controlling the application.

After parsing and interpreting MS data at block 8766, processing continues to block 8768 to check what is necessary for further processing the MS data. If block 8768 determines the MS communicated for controlling a feature, device, apparatus, machine, or some other aspect of the application, then block 8770 appropriately invokes the application interface for performing the requested functionality. Processing continues to block 8762. If block 8762 determines no data (e.g. response) is to be communicated back to the MS, then processing continues back to block 8752. If block 8762 determines that data should be sent back to the MS, then block 8764 prepares a transmission, sends the transmission, and processing continues to block 8752. If block 8768 determines the MS did not communicate for controlling some application aspect, then processing continues to block 8772.

If block 8772 determines the MS communicated for initialization processing, then block 8774 performs initialization processing (may or may not invoke application interface) and processing continues to block 8762. If block 8762 determines no data (e.g. response) is to be communicated back to the MS, then processing continues back to block 8752. If block 8762 determines that data should be sent back to the MS, then block 8764 prepares a transmission, sends the transmission, and processing continues to block 8752. If block 8772 determines the MS did not communicate for initialization processing, then processing continues to block 8776.

If block 8776 determines the MS communicated for accessing application data, then block 8778 interfaces to the application for the sought data and processing continues to block 8762 which was already described above. Data may be sent back to the MS at block 8764. If block 8776 determines the MS did not communicate for application data access, then processing continues to block 8780.

If block 8780 determines the MS communicated for setting application data, then block 8782 interfaces to the application for the sought data and processing continues to block 8762 which was already described above. If block 8772 determines the MS did not communicate for setting application data, then processing continues to block 8784.

If block 8784 determines the MS communicated data which should cause an action at the MS (e.g. SPUI data update), then processing continues to block 8764 which was described above. If block 8784 determines the MS did not communicate data resulting in an action to be performed at the MS, then processing continues to block 8786. Block 8786 handles other processing determined to leave block 8766 and processing continues back to block 8752.

Blocks 8770, 8774, 8778, 8782, 8764 and 8786 may include access: to a local or remote application database; to a local or remote data processing system; to an interface to the application through an API, script, command, or the like; and/or to one or more MSs other than the one causing FIG. 87C processing (e.g. in the vicinity of the application). Also, at any time during application processing (e.g. as the result of processing subsequent to processing of blocks 8756, 8770, 8774, 8778, 8782, 8764 or 8786), the MS may be communicated with in an asynchronous manner by the application as is appropriate (e.g. update status in SPUI as result of previous interactions). In some embodiments, data at block 8766 may cause execution of any combination of blocks 8770, 8774, 8778, 8782, 8764 and/or 8786.

FIG. 87C preferably comprises a plurality of threads to prevent missing any particular MS data which may be communicated for processing, and for applications which support a plurality of different MSs to communicate with.

SPUI Examples

As discussed, there are various methods for automated trigger processing at a MS within context of the LBX architecture. Typically, a SPUI is automatically presented at the MS when the MS is in the vicinity of a nearby data processing system (e.g. MS, an emulation of a MS, a RFID device, or the like). The supported strength/range of communications (e.g. maximum range 1306) between the MS and the nearby data processing system can be used to control how close the MS must be to the data processing system in order for the SPUI to present itself. For example, the user enters the living room of his home, comes within range to a RFID device associated to controlling living room window blinds. Subsequently, charters at the user's MS automatically execute to spawn an application for controlling the window blinds in the living room (e.g. up, down, tilting to desired angle, etc). In fact, each room of the MS user's home may contain a window blinds associated RFID device which supports a short wireless range so that the same blind application can be used to control each unique blind appliance appropriately. In some embodiments, parameter(s) passed contain unique RFID device information to the charter action for automatically populating the SPUI correctly for controlling the appropriate window blinds, or for distinguishing between different blind systems. The user may or may not spend time in the SPUI for controlling the appropriate blinds. There are thousands of applications wherein the MS becomes a powerful tool for the MS user's every day life. While examples below are described in context of processing of FIGS. 87A through 87C, it should be appreciated that a SPUI may not be invoked at the MS. For example, the MS may maintain user configurations so that when the MS becomes within the vicinity of a nearby data processing system, the configurations are automatically used to control the appliance (e.g. window blinds) without need for any user interface. Continuing with the window blinds example, the user configures charters which indicate that whenever the user is nearby the blinds (e.g. in the living room) between the hours of 7:00 AM and 10:00 AM, the window blinds are to be automatically tilted at 30 degrees to allow appropriate outside daylight in. Parameters may be passed to charter actions for variably affecting invoked processing for a variety of reasons, and charter action invocations maintain state data (e.g. blocks 8702 and 8740) for preventing of redundantly invoking automated processing. Charters provide a very rich enablement for automatic processing, with or without subsequent user interface as desired by the user. Below are some examples for automated control, with or without SPUI processing. Those skilled in the relevant arts know how to couple/interface/integrate data processing systems to the examples below in context of embodiments of FIGS. 87A through 87C for appropriate control of each of the examples, as driven by processing of a nearby MS which communicates with them. No service is required. All interactions can be performed in a peer to peer manner. Application examples:

1) Appliances and controllable fixtures—Window blinds, washers, dryers, dish washers, ovens, plumbing fixtures, televisions, stereos/radios, media players (e.g. DVD), lighting fixtures, fan fixtures, or any other household appliance or operable fixture;
2) Automobiles—Any controllable interface to an automobile (car, truck, bus, place, etc);
3) Vending machines—A nearby vending machine can be interfaced to for product selection and payment. In one embodiment, a SPUI uses U.S. Pat. No. 6,615,213 ("System and method for communicating data from a client data processing system user to a remote data processing system", Johnson (e.g. blocks 8708, 8712)). The MS may communicate with a remote service through the application for credit or debit card processing in order to accomplish the purchase. Alternatively, the LBX Informant may be used. Further still, earned points from credit card purchases may be automatically used to accomplish the purchase with little user interaction, and an authenticated MS in the vicinity of an ATM can be credited with points to be used to purchase certain goods or services;
4) Retail Automated Menu Interfaces—As a MS user enters a retail establishment (e.g. restaurant, product store, retail store, grocery store etc), data for previous interactions with the retail store is accessed (e.g. block 8702) and the SPUI automatically notifies the user with most recent menu or order information for convenient reorder by minimizing human interaction to accomplish processing. In one example, the MS user enters a certain Starbucks in the morning (Starbucks is a trademark of the Starbucks Corporation). Block 8702 accesses previous order information (perhaps selects the most frequently made order by the user at that Starbucks), automatically populates a SPUI with the order information at block 8706, and the user performs minimum actions to order the usual coffee product at block 8708. In some embodiments, a charter may automatically order the coffee when the user drives into the parking lot so it is ready when the user enters the store, and a charter can provide automatic payment either by: a confirmed user action, as the user leaves the store, etc. In some embodiments, previous order information is maintained at the Starbucks application and is returned to the MS at block 8764. Any retail establishment can participate with a LBX enabled MS provided appropriate authentication and automated processing is supported for nearby MSs. In another example, a grocery store is entered by the user wherein the MS displays previous shopping list choices (for previous purchases) and then provides the most efficient route for getting the desired items from the selected list, Further still, coupons available for store shopping or for certain items in the user's products of interest are automatically presented in the SPUI for optional use;

5) Parking Lot Guidance—As a MS user enters a parking lot, a SPUI is presented at the MS for indicating where the closest parking spots are, whether it is a small spot or large spot, etc; For example, the application returns informative data at block 8764;

6) Group Awareness—An application (e.g. recipients of an email, attendees of a pending meeting appointment, etc) applicable to a group of nearby MS users can be invoked, for example as configured by a charter. For example, proposed attendees of a forthcoming meeting are automatically detected to be nearby. The MS accesses relevant AppTerm data for nearby processing. Consequently, a SPUI notifies the MS user that all parties to the forthcoming meeting are in the same business establishment (i.e. are within a close distance). The MS user can then seek the other MS users, hold the meeting now when it convenient for everyone, and then be able to free up that reserved time scheduled in the future;

7) Emergencies—The MS automatically notifies its user of an emergency situation (see emergency section of field application fields 100*k*). For example, a SPUI presents itself to notify the user that an emergency vehicle is approaching. Charters may be configured to automatically navigate an automobile using processing of FIGS. 87A through 87C in a charter's automated response to the emergency data received;

8) Traffic Control—a MS approaches an intersection (e.g. in a vehicle or on the person of a pedestrian, bicycler, etc), and interfaces to the traffic light application as does many other MSs. The traffic light application can use the locations, speeds, directions and other circumstances of MSs in the vicinity to variably control when the light(s) is to change, for how long to keep light(s) or directional indication settings, and the like. Emergency data may also be received by the traffic control application and processed accordingly (e.g. automatically change light for quick passing through by emergency vehicles). WDRs of MSs in the vicinity of each other traveling at high speeds can help indicate a forthcoming accident for appropriate MS automated processing (e.g. warning, automated vehicle control, etc);

9) Attendance Monitoring—Company employees carry their MS for automatically clocking in and out of their place of employment. Employees who forget their MS will not be able to enter or leave without performing a clock operation manually. Similarly, people automatically have their attendance registered when attending a school, event, meeting, appointment, or the like;

10) Public transportation—A MS user approaches a taxi or bus stand at an airport. The public transportation application notifies the best candidate for providing service to the MS user, and the public transportation notifies the MS user with a SPUI of what to anticipate for getting service. Similarly, a MS user approaches a ticket counter for automated authentication and printing out of an appropriate boarding pass;

11) Utility Meter Reading—The MS is used to automatically access information from a utility meter (e.g. water, electric, gas) for proper customer account management when the authenticated MS is in the vicinity of the meter. The service informant can then be used periodically to keep a master database updated for data backup, centralized account management, or other services;

12) Nearby Information System Support—The MS is used to provide location information to the application in the vicinity so the application can in turn use the information to be more informative to the user, a service, or for providing the user with functionality not provided by the MS.

FIG. 88A depicts a flowchart for describing a preferred embodiment of manually transmitting WDR information: a WDR, subset of a WDR, WDR request, or a customized outbound transmission. A user may want to manually transmit WDR information for a number of reasons including:

- MS may be configured for not communicating outbound WDRs;
- MS interval for transmission (e.g. SPTP) may not be sent as timely as needed for desired processing;
- In reference to an application in the vicinity such as those discussed in FIGS. 87A through 87C, a user may want to request interface to the application. Outbound transmissions are typically a reasonable subset of the WDR for embodying the best interface to the application;
- User requests to identify (beacon) a MS in the vicinity;
- User wants to find out who is nearby;
- User want to assist other MSs in the vicinity;
- User wants to share location information with a data processing system (e.g. application of FIGS. 87A through 87C) in the vicinity so it can use the location information to provide functionality to the user; and/or
- User wants to notify a remote data processing system with WDR information.

In one embodiment, block 1496 may be modified to include new blocks 1496*j*, 1496*k*, and 1496*c* such that:

- Block 1496*j* checks to see if the user selected to request a transmission—an option for configuration at block 1406 wherein the user action to configure it is detected at block 1408;
- Block 1496*k* is processed if block 1496*j* determines the user did select to make a transmission. Block 1496*k* invokes FIG. 88A for interfacing with the user accordingly, and processing then continues to block 1496*c*.
- Block 1496*c* is processed if block 1496*j* determines the user did not select to make a transmission, or as the result of processing leaving block 1496*k*. Block 1496*c* handles other user interface actions leaving block 1408 (e.g. becomes the "catch all" as currently shown in block 1496 of FIG. 14B).

Processing begins at block 8800, and continues to block 8802 where the user is prompted for the type of transmission being requested. When a response is detected at block 8802, block 8804 checks if the user specified to transmit WDR information. If block 8804 determines the user wants to transmit WDR information, then processing continues to block 8806, otherwise processing continues to block 8826.

Block 8806 prompts the user for whether or not to modify: a) WDR data to be transmitted outbound for only the WDR of current FIG. 88A processing; or b) search criteria to use at block 8812. Thereafter, if block 8808 determines the user does want to modify WDR data to be sent at block 8820 or search criteria to be used at block 8812, then the user interfaces at block 8810 for directing which WDR data to add, remove, or modify in the WDR and/or which search criteria to modify. Processing does not leave block 8810 for block 8812 until the user is satisfied with modifications. The modifications requested are also validated at block 8810. If block 8808 determines the user did not want to perform any modification, then processing continues directly to block 8812.

By default (i.e. user did not specify search criteria modifications), block 8812 peeks the WDR queue 22 (using interface like 1904) for the most recent highest confidence entry for this MS whereabouts by searching queue 22 for: the MS ID field 1100*a* matching the MS ID of FIG. 88A processing, and a confidence field 1100*d* greater than or equal to the confidence floor value, and a most recent date/time stamp field 1100*b* within a prescribed trailing period of time (e.g. preferably less than or equal to 2 seconds). For example, block 8812 peeks the queue (i.e. makes a copy for use if an entry found for subsequent processing, but does not remove the entry from queue) for a WDR of this MS (i.e. MS of FIG. 88A processing) which has the greatest confidence over 75 and has been most recently inserted to queue 22 in the last 2 seconds. Optional blocks 278 through 284 may have been incorporated to FIG. 2F for movement tolerance, in which case the default search trailing period used by block 8812 may be appropriately adjusted. User search criteria modifications made at block 8810 will be used by block 8812 to override search defaults, for example to solve the problem of a previous use of FIG. 88A not finding a WDR (e.g. to modify trailing time period for search). In some embodiments, block 8812 supports searching LBX history for WDR information when the search criteria is better suited for history information.

Thereafter, if block 8814 determines a useful WDR was found, then block 8816 prepares the WDR for send processing, block 8818 modifies the WDR if modifications were requested at block 8810, and block 8820 broadcasts the WDR information (using send interface like 1906) by inserting to queue 24 so that send processing broadcasts data 1302 (e.g. on all available communications interface(s) 70), for example as far as radius 1306, and processing appropriately terminates at block 8822. The broadcast is for reception by data processing systems in the vicinity. In some preferred embodiments, oWITS processing is performed prior to block 8818 (e.g. a block 8817 between blocks 8816 and 8818) or after block 8818 (e.g. a block 8819 between blocks 8818 and 8820). oWITS processing of blocks 2015 and 2515 would occur at the additional block as is appropriate for the embodiment.

To prevent broadcasting the WDR on all communications interfaces of the MS, the user can specify one or more application fields appfld.rfid.seek.#.channel to override for selecting only certain channels to broadcast the WDR on. The user must have knowledge of which channels have been administrated. Although this application fields 1100*k* section is intended for RFID applications, the MS send capabilities does not distinguish between RFID and non-RFID. A communications interface used by threads feeding off the send queue may be available regardless of its targeted type of data processing system. This is an advantage of the MS disclosed. Multiple transmission channels are useable by FIG. 88A processing. As discussed with FIG. 20 above, there is means for communicating the channel for broadcast to send processing when interfacing to queue 24 (e.g. set channel qualifier field with WDR inserted to queue 24 to appfld.rfid.seek.#.channel). In one embodiment, send processing accesses appfld.rfid.seek.#.channel information. In another embodiment, block 8820 loops on one or more appfld.rfid.seek.#.channel specifications to send the broadcast over each channel requested. In another embodiment, send processing loops on one or more channel specifications to send the broadcast over each channel requested.

Block 8810 supports the user modifying any data of a WDR. Typically, application fields are modified for interface to an application in the vicinity, but any WDR field can be added, removed, or changed as desired. This allows the user to transmit any data he wants, although a starting point is with a WDR. The user can specify at block 8802 which channel(s) and/or interfaces 70 to send/broadcast on.

Referring back to block 8814, if a WDR was not found, block 8824 presents a not found error to the user and preferably waits for the user to acknowledge the error before continuing to block 8822 for appropriate FIG. 88A termination. The user may then use FIG. 88A processing again with new search criteria.

Referring back to block 8826, if it is determined that the user selected to perform a WDR request, then block 8828 builds a WDR request (e.g. containing record 2490 with field 2490*a* for the MS of FIG. 88A processing (MS ID or pseudo MS ID) so receiving MSs in the LN-expanse know who to respond to, and field 2490*b* with appropriate correlation for response), block 8830 builds a record 2450 (using correlation generated for the request at block 8828), block 8832 inserts the record 2450 to queue 1990 (using interface like 1928), and block 8834 broadcasts the WDR request (record 2490) for responses, and processing appropriately terminates at block 8822. Absence of field 2490*d* indicates to send processing feeding from queue 24 to broadcast on all available comm. interfaces 70. The user may have specified a specific channel at block 8802 when selecting to send a request, in which case the specified channel is set in field 2490*d*. An alternate embodiment to WDR request processing may not insert correlation for making TDOA measurements. If block 8826 determines that the user did not select to perform a WDR request, then processing continues to block 8836 for performing a custom transmission.

Block 8836 interfaces with the user for preparing data to be transmitted. Block 8836 does not continue to block 8836 until it is validated. If block 8838 determines the user specified to target the request, block 8842 sends the request and processing continues to block 8822, otherwise block 8840 broadcasts the request and processing continues to block 8822.

In an alternate embodiment, processing paths of block 8806 through 8824, blocks 8828 through 8834. and block 8836 through 8842 are invoked in separate user interfaces thereby eliminating the need for blocks 8802, 8804 and 8826.

A user may send out an emergency transmission using appfld.emergency sections described above (e.g. "Person Needs Help"). Only authorized data processing systems can transmit non-personal emergency transmissions (e.g. "Fire", "Police", "Ambulance", "Amber", "Person Needs Help", "Construction Caution", "Traffic Caution", "Terror Alert"). This is preferably enforced in a MS at MS manufacturing time, or presale configuration time, to provide public service officials with functionality unavailable to common MS users.

When a user requests to identify a MS in the vicinity through a beacon, fields 1100*k* may contain appfld.loc.beacon.expr set with an expression to be evaluated at the receiving MS. A receiving MS which has granted the privilege of being identified to the MS of FIG. 88A processing shall identify itself so that the user of the MS of FIG. 88A processing will know where it is. Privileges are also granted for which conditions and terms may be specified. In a preferred embodiment, FIG. 60 processing at the MS for a beacon privilege with presence of appfld.loc.beacon.expr and applicable expression privileges will perform the beacon at the MS. Block 6020 performs the action of beaconing after using expression evaluation processing already disclosed. Beaconing includes embodiments of:

- An audible sound that can be heard by the user of the requesting MS;
- A visible indication that can be seen by the user of the requesting MS;

Sending data back to the requesting MS as a message, email, or data packet which results in indication with an audible and/or visual presentation with or without another user interface action by the requesting MS user; and/or Any combination of above methods.

In another embodiment, charters are configured for handling the inbound WDR having appfld.loc.beacon.expr data so that any desired processing can be executed. The charter may have been created by either the requesting MS user, or receiving MS user, and proper charter privileges must be in place.

In some embodiments, processing of FIG. 88A may be invoked by MS processing automatically, and perhaps from configured charters for action processing. For example, DCDB content may be sent in application fields 1100*k* as part a WDR rather than as an email, SMS message, or other method (e.g. using an atomic command).

FIG. 88B depicts a flowchart for describing a preferred embodiment of MS task monitor processing. The task monitor provides the user with information about tasks running on the MS LBX operating system. Information for all MS LBX threads is displayed for the user to interpret what is happening at the time. Preferably, there is user interpretable information describing the process and thread for easy comprehension. Each process should have a name, and each thread should also have a name prefixed by the process name it belongs to. In operating systems wherein any thread can contain children threads, a name hierarchy is displayed from the process name, all the way down to the most descending child thread. Furthermore, specific milestones in processing within a thread can be treated as a qualified processing point reached (e.g. trace information) for being a valid child event in a thread, or a child event of another child event in a thread. Thus, the task monitor is a processing trace monitor.

In a preferred embodiment, processing descriptions (e.g. at least a name) are 64 character strings and may contain blanks, however more or less characters may be implemented. In an embodiment which simplifies access to information at block 8878, a single statistic (e.g. \st_osactive) maintains a list of all task monitor information. When a thread starts executing or logs a processing milestone, it uses the statistics logger (e.g. FIG. 83B) to append to the string. When a thread completes executing or completes a logged processing milestone, it uses the statistics logger (e.g. FIG. 83B) to remove the entry from the string. Because each MS thread is "trusted" to maintain its own status, threads may also maintain milestone trace information to \st_osactive for logging certain milestones in processing, rather than only a thread start and end processing entry. However, it is important that each thread remove what it has appended at an appropriate time. The \st_osactive embodiment is somewhat like a stack wherein current processing is reflected in the depth of the stack and the stack grows with a new entry and shrinks with a removed entry. A delimiter (e.g. ^) separates individual entries.

In a well performing embodiment, multiple reference-able named statistics are used which are maintained by associated threads. Setting a particular statistic involves setting or clearing a bit, byte, or other binary data representation (no strings) for maximum performance. Multiple statistics are gathered at block 8878 and presented at block 8864.

In any embodiment, maintaining of task monitor information impacts MS thread performance, and therefore should be a feature turned on or off, preferably off (disabled) for customers with the ability to be turned on (enabled) by/for MS support (e.g. engineers, developers, customer service, etc). A request to use the task monitor may be validated (e.g. administrator authentication). In one embodiment, block 1496 may be modified to include new blocks 1496*l*, 1496*m*, and 1496*c* such that:

Block 1496*l* checks to see if the user selected to configure enablement or disablement of task monitoring—an option for configuration at block 1406 wherein the user action to configure it is detected at block 1408;

Block 1496*m* is processed if block 1496*l* determines the user did select to enabled/disable. Block 1496*m* interfaces with the user for enabling/disabling maintaining of task information, and processing then continues to block 1496*c*.

Block 1496*c* is processed if block 1496*l* determines the user did not select to configure task monitor enable/disable, or as the result of processing leaving block 1496*m*. Block 1496*c* handles other user interface actions leaving block 1408 (e.g. becomes the "catch all" as currently shown in block 1496 of FIG. 14B).

Similarly, block 1496 may be modified to include new blocks 1496*n*, 1496*o*, and 1496*c* such that:

Block 1496*n* checks to see if the user selected to work with task monitor information—an option for configuration at block 1406 wherein the user action to configure it is detected at block 1408;

Block 1496*o* is processed if block 1496*n* determines the user did select to work with task monitor information. Block 1496*o* invokes FIG. 88B for interfacing with the user accordingly, and processing then continues to block 1496*c*.

Block 1496*c* is processed if block 1496*n* determines the user did not select to work with task information, or as the result of processing leaving block 1496*o*. Block 1496*c* handles other user interface actions leaving block 1408 (e.g. becomes the "catch all" as currently shown in block 1496 of FIG. 14B).

Of course, block 1496*c* may become the catch all for any combination of processing embodiments described for blocks 1496*a*/1496*b*, 1496*d*/1496*e*, 1496*f*/1496*g*, 1496*h*/1496*i*, 1496*j*/1496*k*, 1496*l*/1496*m*, 1496*n*/1496*o* and/or any other additional options presented at block 1406 with action detection at block 1408.

In the single statistics variable embodiment to facilitate discussion, an entry such as "WDR Collection 54; WDR Handler TID 3 (Tim,02/12/2009:170711)" provides an informative indication a WDR from MS ID Tim received at 11 seconds after 5:07 PM on Feb. 12, 2009 is being processed by Thread #3 of process 1912 which has a PID of 54. Any information can be placed into \st_osactive, but it must be removed as soon as that information is not relevant in processing. Nevertheless, the statistics logger can move the information to history so there is always a record. For every entry added by processing, that entry should be followed by being removed at some future time relevant in context of particular processing.

Task monitor processing starts at block 8850, and continues to block 8852 where the user is prompted for search criteria desired to find task information. Thereafter, the user specifies validated search criteria or exits processing, and block 8856 checks the type of search criteria specified. The user can search for any subset of task information specifying date/time window(s), sought processing information, environment conditions, or any other criteria for finding a subset of task information.

If block 8856 determines the user specified to search for past task information, block 8858 accesses LBX history information 30 and/or statistics information 14 (depends on embodiment) for historical task information and block 8860 checks if any was found.

If block 8860 determines no task information was found, block 8862 provides a not found error to the user and processing continues back to block 8852 for subsequent specifying of new criteria. If block 8860 determines task information was found, block 8864 presents the information in list form (i.e. scrollable if necessary), and the user interfaces with (e.g. browses) the information at block 8866. Block 8866 also waits until the user has performed an action to continue other processing. Thereafter, if block 8868 determines the user selected to make a charter, processing continues to block 8884 discussed below, otherwise processing continues to block 8870.

If block 8870 determines the user selected to exit working with the list at block 8866, then processing continues to block 8886 where the task monitor interface is appropriately terminated and to block 8888 where FIG. 88B processing terminates. If block 8870 determines the user did not select to exit working with the list at block 8866, then processing continues to block 8872.

If block 8872 determines the user selected to specify new task monitor search criteria, then processing continues back to block 8852, otherwise processing continues to block 8874 where any other user action leaving block 8866 is appropriately handled. Block 8874 then continues back to block 8866.

Referring back to block 8876, if the search is for current task information, then block 8878 accesses statistics 14 (e.g. \st_osactive) and continues to block 8860 for subsequent processing described above, otherwise processing continues to block 8880. If block 8880 determines the user selected to set task charter(s), then processing continues to block 8882, otherwise processing continues to block 8886 already described above (e.g. for when user selected to exit block 8854.).

Block 8882 creates proposed charters from user search specifications made at block 8854. The user is able to specify searching for task information which may occur in the future, for example a certain string or plurality of strings in \st_osactive during certain times, or along with other special term (e.g. atomic term, AppTerm, WDRTerm) settings. Thereafter, any charters automatically determined and created for the user's search specifications are presented to the user in list form at block 8864. The user may further "tweak" (edit) at block 8866 the charters which were created at block 8882. When leaving block 8866, if it is determined that the user selected to activate the charters, then block 8884 creates enabled charters for the local MS and processing continues back to block 8852. Charters resulting from block 8884 can be managed as any other charters (e.g. FIGS. 45A, 45B, 46A, 46B, 47A, 47B, 48A and 48B).

Data processing systems can be strategically located for MSs. For example, as MSs become in the vicinity of a strategically located data processing system, the data processing system enables, disables, modifies, behaves for, or causes specific processing based on the number of MSs, the number of types of MSs, the number of MSs producing WDR information containing certain data, etc within the vicinity of the strategically located data processing system. The strategically located data processing system processes inbound WDRs analogously as disclosed for iWITS processing so that desired processing is performed based on MSs in the vicinity. The strategically located data processing system may cause playing certain "in-store" music based on MSs in the vicinity (e.g. based on the current shopper audience), or cause display of certain advertising based on MSs in the vicinity, or perform other processing based on WDR information received from MSs in the vicinity.

Various Applications

Alternate embodiments of this disclosure may choose specific implementations accomplishing identical novel functionality. End results of certain charter processing may become popular or prevalent in which case a self contained processing of the end results are incorporated for being privileged or unprivileged as a whole unit of processing not requiring the LBX charter processing platform to carry out processing. For example, a charter for handling a lost phone can be embodied in a single user selected option (e.g. enable a privilege) in a MS user interface thereby relieving the user of configuring the charter specifics. The user relies on a single reference-able unit of processing to carry our functionality. Instead of configuring a charter, the user enables lost phone functionality at the MS. Thus, charter explanations are to be considered in the many embodiments that can accomplish the same functionality.

Automatic Communications Processing

>>Automatic MS Loss Detection and Processing

A MS can be configured to automatically perform processing (e.g. call a phone number with a message) when it undergoes a period of inactivity at the same location. In one embodiment, an AppTerm variable named SYS_lastActionDT contains a date/time stamp of the last time an action was performed by the user at the MS via any of the input peripheral interface(s) 66. The application associated to the SYS prefix is preferably predefined at the MS (e.g. populated in PRR 5300 from the MS factory) and contains a plurality of overall MS AppTerms applicable to the MS, for example at the system level described by FIG. 1D. Every peripheral interface 66 updates the SYS_lastActionDT date/time stamp upon input processing. FIG. 55B is used by peripheral input threads to update the AppTerm wherein each input peripheral action results in FIG. 89A processing.

With reference now to FIG. 89A, depicted is a flowchart for describing a preferred embodiment of updating a MS global variable (AppTerm SYS_lastActionDT) for the last time a MS input peripheral was acted upon by a MS user. Block 8902 begins thread processing of interest upon recognizing a MS input peripheral action by the MS user. Thereafter, block 8904 accesses the MS date/time information, block 8906 requests exclusivity to the appropriate semaphore resource for modifying the SYS_lastActionDT variable, and continues to block 8908 when that semaphore request succeeds. Thereafter, SYS_lastActionDT is updated at block 8908 with the current date/time information from block 8904, block 8910 releases the semaphore lock resource, block 8912 processes the input in the appropriate manner (e.g. passes to MS user interface processor), and processing terminates at block 8914. Thus, a lost phone can automatically make a phone call (e.g. MS user's home phone), and even leave an automated message through an appropriate interface. Continuing with the example described above, the following charter configuration may be made:

```
(\timestamp >= SYS__lastActionDT + 4H):
    Send Email ("Phone is lonely\n and at location: " && \loc__my,
            \appfld.source.id, "COME GET ME", williamjj@yahoo.com);
```

This configuration causes an email to be sent which contains the MS location (default formatted for output in the email (other embodiments support directing the format of the output)) when the MS has not had a single user input action for 4 hours or more. The problem with this configuration is any triggers which cause execution of the charter shall continue to send multiple emails until a user action causes the condition to be false. The following configuration ensures only a single email is sent for each lengthy time period (e.g. 4 hours) without a user action:

```
(\timestamp >= SYS__lastActionDT + 4H) & (MS__LONELY = 0):
    Send Email ("Phone is lonely\n and at location: " && \loc__my,
        \appfld.source.id, "COME GET ME", willj@yahoo.com);
    Invoke Data (MS__LONELY, 1, \thisMS);
```

Provided the MS_LONELY variable was initialized to 0, only a single email is sent when the MS has not been used for at least 4 hours. The user can subsequently modify the variable back to 0 after retrieving the MS, either by direct access to the variable, through a charter, through modifying a privilege (e.g. Enable lonely MS detection), or using another suitable manner. Notice the Invoke Data interface is used for updating a variable. Some embodiments support directly modifying variables which are resolvable in context of charter processing.

Self modifying charters may also be supported wherein a charter can be written to change the charters themselves. For example, continuing with our example, the charter may be configured for deleting itself once it has executed:

```
(\timestamp >= SYS__lastActionDT + 4H):
    Send Email ("Phone is lonely\n and at location: " && \loc__my,
        \appfld.source.id, "COME GET ME", willj@yahoo.com);
    Invoke App ("c:\charters\selfmod\charchg.exe DELETE "
        && \thisCharter && " ALL NULL NULL NULL NULL");
```

The charchg.exe application supports creating, removing, and altering charters with appropriate parameters. Required semaphore resources are incorporated into charchg.exe depending on the MS thread synchronization scheme around/in charter processing. \thisCharter is an atomic term which elaborates to the charter id reference value (e.g. field 3700*a*, charter name, etc) for the current thread context of execution, otherwise the user must know what the target charter reference value is. The "ALL" parameter specifies to delete the charter and all configurations (e.g. FIG. 35A, etc) which reference it. The NULL parameters are for Grantee and Grantor information, and are used when managing charters for specific configurations that exist (e.g. record(s) 3500), or new configurations to be created (e.g. new records 3500). For example, a charter can be granted or un-granted between identifiers. WITS processing thread context atomic terms are maintained during WITS processing (e.g. start of block 5700), and contain the value NULL when undefined. Some will be undefined until relevant. A NULL value may output as a blank when used outside of context. The following list provides some of the WITS processing thread context atomic terms:

\thisCharter—charter reference handle (e.g. field 3700*a*) for current context of processing;

\thisAction—charter action reference handle (e.g. field 3750*a*) for current context of processing;

Similarly, current privileges or grants may be modified by charter actions, so that privileges may be added or removed under certain MS charter conditions.

```
Invoke App ("c:\charters\selfmod\privchg.exe DELETE PRIV
    0xAB3E ALL NULL NULL NULL NULL");
```

Here the privilege code (e.g. as maintained to a field 3530*a*), indicated as a privilege code with the "PRIV" parameter (otherwise would be a Grant ID for a "GRANT" parameter specified) is specified in hexadecimal for removal as a privilege at the MS. Of course, the user configuring the charter must know which privilege code (or Grant ID) is to be specified. The "ALL" parameter specifies to delete the privilege and all configurations (e.g. FIG. 35A, etc) which reference it. The NULL parameters are for Grantee and Grantor information, and are used when managing specific privilege or grant configurations that exist (e.g. record(s) 3500), or new configurations to be created (e.g. new records 3500). For example, a privilege or grant can be granted or un-granted between identifiers.

```
Invoke App ("c:\charters\selfmod\privchg.exe ADD PRIV 0xAB3E INIT
    0x0000 NULL NULL NULL");
```

Here the same privilege code is being added back to the MS of the charter configuration, so that subsequent configurations can be made again. The "INIT" parameter specifies to initialize the privilege for use (e.g. insert back to FIG. 35D), and the 0x00 parameter initializes MS Relevance to all zeroes. Privilege codes are typically listed in a reference manual in hexadecimal form, but hexadecimal is not required. The leading "0x" tells privchg.exe that the parameter is a hexadecimal number. Here is an example of using a decimal notation for the privilege code:

```
Invoke App ("c:\charters\selfmod\privchg.exe ADD PRIV 43838 INIT 0
    NULL NULL NULL");
```

Invoking a command line program performs poorly when compared to a linkable function interface. Consequently, both charter and permission self modifying interfaces are available in function form. Any command line interface may be made available in a linked form for better performance.

Notify ProgObj (selfModPriv, "0xAB3E", . . . .

Function interfaces with multiple parameters may be specified with a long sequence of hex bytes as well.

>>Disable Services at the MS Based on Charter Conditions

In some embodiments, AppTerm variable access is provided to data of FIG. 85A which includes a new disabled field 8500*j* (Boolean) for indicating the service is currently disabled. This allows maintaining SDRs 8500 without having them be enabled for use. SDRs with the new field 8500*j* set to True would be treated as though they do not exist, while SDRs with field 8500*j* set to False would be treated as fully functional. Services are then enabled or disabled based on charter configurations. For example, student MSs may be configured for losing certain internet connectivity (i.e. set services to disabled) whenever the teacher is not within 50 feet of the student MS. Children MSs may be configured to lose certain service connectivity when a parent is not within a reasonable supervisory distance. In fact, an overall MS service such as internet connectivity in its entirety can be enabled or disabled at the MS based on current MS charter conditions. For example, a new privilege for internet connectivity can be removed under certain MS conditions, and then restored under certain MS conditions. FIG. 59 charter processing may be used to enable or disable certain features or services at the time. Any MS service can be disabled or enabled at the MS based on charter configurations. In another example, charters can be configured for disabling texting or other application use at the MS in the event the MS is at certain locations, certain speeds, or other configurable Ms conditions.

>>MS is Unattended; when Owner Gets Out of Range, Perform Beaconing Functionality Continuing with our example above, we can cause the phone to sound an alarm when it is unattended for at least 4 hours:

```
(\timestamp >= SYS__lastActionDT + 4H):
    Invoke App ("c:\tools\sounds\audioit.exe WARNING");
```

The audioit.exe executable puts out default warning audio at the MS, and checks to see if it is already active in the system for deciding whether to continue processing so as to prevent queuing up a redundant invocation of itself. Of course, in the examples other actions can be specified for desired unit of work processing relative a preferred thread synchronization scheme. The MS will continue to sound the warning until a user input is detected at the MS. In cases where the MS user only wants to have the phone beacon itself for being found when there are certain other MS user(s) nearby, the following may be configured:

```
(\timestamp >= SYS_lastActionDT + 4H) &
(ONEOF[buddies] $(100F) \loc_my):
    Invoke App ("c:\tools\sounds\audioit.exe WARNING");
```

This illustrates that any one of a group called buddies can cause a true condition as long as they are within 100 feet of the MS. ONE OF is referred to as an atomic function, some of which are:

ONEOF—Clarifies that any one member of the group can participate for causing a true condition;

ALLOF—Clarifies that every member of the group must participate for causing a true condition.

>>Speed Dialing

```
((_l_msid = "Sophia" & _l_location $(300F) \loc_my) &
(\locByID_Mark $(300F) \loc_my)):
    Notify AutoDial (_l_appfld.source.id.phone);
```

Automatically call Sophia's MS when Sophia and Mark are both within 300 feet of my vicinity.

>>Make Call Confidential Based on Who is Nearby

This is best configured as an AppTerm triggered charter through field 5300*m*. See field 5300*m* discussion for details. The charter should be executed when it is detected at the MS that a call is being made. The condition of determining that a new call is being made can be configured in field 5300*m* (e.g. check AppTerm) or directed to the appropriate charter body (e.g. PH { . . . } wherein PH_is the prefix for the MS phone application) where the appropriate AppTerm is checked for a new call condition. For example:

```
((PH_newCall = True) & (\locByID_Mark $(300F) \loc_my)):
    Notify Weblink
        http://www.dfwfarms.com/
        harrows.xls",,,target="_blank";
    Invoke Data (PH_defaultEncrypt, True, \thisMS);
        // same as appfld.phone.default.encrypt
```

Invoke Data is used to modify the AppTerm so that subsequent call processing will use encryption. An AppTerm typically may have an associated semaphore resource to prevent conflicting updates and should be used accordingly. The Invoke Data interface identifies the data to be modified is an AppTerm (e.g. through prefix notation), accesses the appropriate semaphore interface from the corresponding record 5300 and uses it to modify the value to True. Use of Invoke Data ensures the data is properly updated. A preferred embodiment supports directly modifying variables which are resolvable in context of charter processing (like access to them in charter expressions). However, the Invoke Data example is useful for discussion.

>>Automatic Call Forwarding by Location and/or Conditions

Below are examples of ensuring phone calls are forwarded when the MS is located at map terms "Doctor", "Sally", or "the kids orthodontist". Likewise, shown is a configuration to make sure forwarding is off when not at those locations. A user can specify PointSet information, but it is much easier to use map terms.

```
...
(\loc_my @ ?Doctor | (\loc_my @ ?Sally | (\loc_my @ ?"the kids
orthodontist"):
    Invoke Data (PH_fwd, "214-708-2000");
        // same as appfld.phone.fwd
...
(\loc_my !@ ?Doctor) & (\loc_my !@ ?Sally) &
    (\loc_my !@ ? "the kids orthodontist"):
        Invoke Data (PH_fwd, " " ); // = no forwarding
            // same as appfld.phone.fwd
```

To accommodate location determination error (and not rely on MS matching of locations), all occurrences of "@" in the above example may be replaced with "$(50F)".

>>Routing of Call to Nearby LAN Line to Prevent Minutes Used

Below are examples of ensuring mobile phone calls are forwarded to the home LAN line phone when within 100 feet of the home location. That way, the LAN line is used when at home at all times, rather than burning MS (e.g. cell phone) minutes. Likewise, shown is a configuration to make sure forwarding is off when not at that location while solving the above example as well.

```
...
(\loc_my $(100F) ?Home):
    Invoke Data (PH_fwd, "214-345-1212");
        // same as appfld.phone.fwd
...
(\loc_my !@ ?Doctor) & (\loc_my !@ ?Sally) &
    (\loc_my !@ ? "the kids orthodontist") &
        (\loc_my !$(100F) ?Home):
            Invoke Data (PH_fwd, ""); // = no forwarding
                // same as appfld.phone.fwd
```

An alternate embodiment of charter processing (e.g. internalization) could make the assumption that appfld.phone.fwd is nulled out (i.e. set to " ") at all times except where configured. This would prevent having to configure a negated configuration to keep appfld.phone.fwd updated appropriately at all times. Consideration of a known charter processing thread synchronization scheme is preferred. In this embodiment, all application terms (application data fields) would have a default value which charter processing would assume unless a configured expression was true. Users may control what the default values are by setting values for them. This charter processing (e.g. internalization) embodiment may be a strategy deployed across all charter configurations. In another embodiment, a user selects the desired charter processing (internalization) strategy to use.

>>Forward Call to Another Device (Conversion on Fly if Applicable)

The action below sets call forwarding to be sent to an email address which implies taking a message at the MS voice mail system and then converting the message saved to text for being sent to email. Vonage provides voice to email service for its customers. This functionality is the same except it occurs at the MS (i.e. no service).

```
Invoke Data (PH_fwd, "williamjj@yahoo.com");
// voice mail system answers calls and messages left are converted to text
//   and forwarded as an email to the address.
```

>>Call Processing by Situational Location

A complex set of conditions can be specified for when and how to forward in a priority order of reaching someone live (e.g. put priority of call processing in PH_fwd based on who is nearby at time, what application conditions exist at time (AppTerm values), etc).

>>Automatic Vacation/Unavailable/Busy Status by Location Trigger, or Application Trigger (e.g. New Calendar Entry)

A charter expression is specified as described with at least one associated charter action which modifies the value(s) of AppTerm variable(s) which are in turn used by the respective application(s). For example, MS user condition status for being on vacation, unavailable, busy, or other desired user condition status is modified by charter processing (AppTerm variable modification). After being modified, the MS applications accessing the AppTerm variable(s) which were modified will behave accordingly, for example automatically: forward of permit all or certain inbound calls in a variety of ways based on MS user status modified in real-time by charter processing as location based events occur; prevent or permit all or certain calendar administration operations by all or certain users based on MS user status modified in real-time by charter processing as location based events occur; or cause application other desired application processing to occur based on modifying AppTerm variables based on MS user status modified in real-time by charter processing as location based events occur.

>>Automatically Prevent Ringing (e.g. Use Vibe), Modify Ringer Volume, or Provide a Unique Ringing for: When Nearby to Other(s), when at Location(s) Perhaps with Condition(s) (e.g. Time), Based on Who is Calling, Combinations Thereof, Etc The action for an appropriate expression will set the value of PH_ring (same as appfld.phone.ring), PH_vibe (same as appfld.phone.vibe), and/or PH_vol (same as appfld.phone.default.volume).

The key "take-away" from the above examples in the ability to automatically modify any MS application variables based on the various embodiments of charter triggering types discussed above. Consider another example wherein a MS internet connectivity application with at least one PRR 5300 (e.g. prefix of "C") must keep track of how to connect the MS to an internet service provider. A C_target AppTerm is updated by a charter whenever the MS is at certain locations so that direct internet connectivity is made available in a seamless manner to the MS user. For example, when the MS user is in a hotel in California, C_target is set to "http://web.marriot.com", but when he is at a Sheraton hotel in Dallas, C-target is set to "http://ip.sheraton.com". Of course, there may be other AppTerm variables which must be automatically set by location to further govern connectivity (e.g. C_autoAquire, C_dns, etc). Regardless of what hotel the MS user is currently located at, he connects to the correct interface for internet access through the charter configured available hotel internet portal, and does not have to mess with connectivity configuration more than once (e.g. the first hotel visit). When this connectivity application fails, the service propagation processing discussed above can be used.

>>Automobile Accident Occurs and Causes Conflict with a Pending Calendar Entry;

Charters at the MS can be automatically triggered via an interface with the automobile which detects when an accident has occurred. Accident associated data can be sent to the MS on what occurred, and the applicable MS charter can perform automated emergency processing. For example, when an automobile air bag is launched, a RFID signal or radio frequency signal can be simultaneously emitted for automated MS processing as described above. Furthermore, the MS charter processing can check AppTerm information, for example configured calendar information, to determine if an automated notification and/or rescheduling should occur. After determining a conflict, automated action processing will provide the configured notifications and/or rescheduling processing.

>>Automatically Detecting Last Soup can in Pantry, or Last Yogurt in Fridge, Triggers Automated Processing for: updating a current MS shopping list(s), notifying a MS user of recommended shopping item(s), automatically making order(s), automatically purchasing the order(s), and/or automatically managing delivery of the item(s). Of course, this application is not limited to soup cans. A MS can be used to maintain inventories, shopping lists and applicable processing, etc for a variety of typically stocked items: food; shoes; toilet paper or articles; paper (print, photo, etc); office supplies; warehouse pallets, packages, and/or items; anything wherein an ongoing "stock" inventory makes sense for personal, business, or any other use. For example, passive or active RFID processing embodiments discussed above are used to interface with RFID enabled objects in proximity to be compared with a list. The user may or may not be aware that RFID interface processing is occurring. In one example, charters are configured such that being nearby a location (or situational location) causes a MS initiated RFID probe. In another example, charters are configured such that detection of a RFID signal (e.g. MS became within range of output RFID signal) is a result of a RFID initiated communications to the MS. In another example, charters are configured such that detection of a RFID signal (e.g. MS became within range of output RFID signal) causes charter processing for MS initiated RFID probe. In another example, a SPUI is automatically launched by a charter based on RFID interaction. In another example, AppTerm triggered processing results based on the user's selection(s) in the SPUI, or conditions in charters expressions at the time a SPUI is active. It should be apparent that there is an infinite cascading or processing that can occur automatically based on charter configurations and perhaps interim user interactions to SPUIs, or automatically launched applicable user interfaces thereof.

FIGS. 91A through 91B depict preferred data schema embodiments of automated inventory management for discussing operations of the present disclosure, for example when a MS comes within range of RFID device(s), nearby MS(s), or other data processing system(s) that are affixed to, or co-located with, inventory items. There are many fields in the data records illustrated, but essential fields to carry out processing of interest are discussed.

Inventory item Data Record (IDR) 9100 describes one or more inventory items for automated inventory management of inventories which are detectable (e.g. via RFID or any of the MS communication interface(s) 70) by a MS. Inventory items involve whatever application is applicable as specified by the MS user. Inventory management and order processing disclosed with FIGS. 91A through 94B is typically used by MS users for maintaining stock of every day household items, office supplies, food items, items which are continually needed, desired, or wanted tracked, by the MS user. Such items are to be suitably equipped (e.g. data processing system coupled/integrated to item (e.g. RFID tag)) for automatic communications with the user's MS.

Entry id field 9100*a* contains a unique index key field for all records 9100. Field 9100*a* may match (for joining) a field 9102*a*, 9104*a*, 9106*a*, or 9114*b*, depending on the ID_TYPE field, respectively (9102*b*, 9104*b*, 9106*b*, 9114*c*). A tag id field 9100*b* is used to suitably identify a particular inventory item (e.g. to match against RFID identifier, UPC label, barcode, MS ID, or other data processing system identifier). Short description field 9100*c* contains a name or short description of the inventory item. Long description field 9100*d* contains a long description of the inventory item. Stock specification field 9100*e* contains a user's configuration for the desired number of items. Stock count field 9100*f* contains the most recent determined number of stock items. Instance id list field 9100*g* contains all unique instance identifiers of the items which were detected at last count. For example, the tag id field 9100*b* is an overall identifier (e.g. bar code) for the item described by a record 9100, however the instance id field 9100*g* contains the unique item identifier clarification (e.g. serial number) within that overall identifier, along with an associated date/time stamp of last detection. An alternate embodiment of field 9100*g* is a join value to another table containing multiple rows for the unique item instance information. Other fields 9100*z* contain other useful information, however a preferred minimal set of data is described in a record 9100.

Inventory Order data Record (IOR) 9102 describes an active inventory order for automated inventory management of inventories which are automatically determined (e.g. via MS communication interface(s) 70 (e.g. RFID)) by a MS. ID field 9102*a* contains a value for entry id field 9100*a* or group id field 9112*a*. ID_TYPE field 9102*b* indicates an entry id in field 9102*a* from a record 9100 (e.g. ITEM), or a group id field 9112*a* (e.g. GROUP) from a record 9112. Order service id field 9102*c* contains a join to order service id field 9108*a*. Order pending field 9102*d* is a Boolean indicating whether or not there is an order already completed and pending for the item or group of items of field 9102*a*. Delivery handle 9102*e* contains a handle to delivery information for the order, for example a web site URL in a preferred embodiment wherein details of the order and anticipated delivery can be obtained. Handle field 9102*e* may serve as the URL link to the delivery provider (e.g. Fedex, UPS, U.S. Postal Service, etc). A tracking reference field 9102*f* contains the delivery tracking reference, which is also likely a URL parameter in field 9102*e*. Payment info field(s) are preferably additionally provided containing useful payment information from a PIR (record 9110) that was used to make the order. Preferably, this is copied from a PIR rather than using a field 9110*a* to join since the payment information may be modified later by a user. Other fields 9102*z* contain other useful information, however a preferred minimal set of data is described in a record 9102.

Payment Method Association data Record (PMAR) 9104 describes associating a payment method to an item or group of items. ID field 9104*a* contains a value for entry id field 9100*a* or group id field 9112*a*. ID_TYPE field 9104*b* indicates an entry id in field 9104*a* from a record 9100, or a group id field 9112*a* from a record 9112. Payment method id field 9104*c* contains a joining id field to field 9110*a*.

Order Service Association data Record (OSAR) 9106 describes associating an order service to an item or group of items. ID field 9106*a* contains a value for entry id field 9100*a* or group id field 9112*a*. ID_TYPE field 9106*b* indicates an entry id in field 9106*a* from a record 9100, or a group id field 9112*a* from a record 9112. Order service id field 9106*c* contains a joining id field to field 9108*a*.

Order Mapping data Record (OMR) 9108 describes directives for automatically placing an order from a MS, preferably through a propagate-able service of field 9108*c*. Order service id field 9108*a* contains a joining id field to field 9106*c* and field 9102*c*. Fields 9108*a* are a unique key in all records 9108. Type field 9108*b* indicates the type of service for automated ordering. Handle field 9106*c* maps (joins) to the service, for example a handle field 8500*a*, an executable reference (e.g. command string reference that may have parameters, API invocation reference that may have parameters, etc), or an address (e.g. ip address) where the ordering service can be referenced. Directions field 9108*d* contains instruction processing for the service in a suitable form depending on type field 9108*b* and the described handle field 9108*c*. Directions field 9108*d* may contain a macro, a text or binary string of commands/instructions, a set of specially formatted parameters, or another suitable direction form as required by the service of the record 9108. Field 9108*d* may contain an override address for item(s) delivery, rather than using the account address of field 9110*i*. Other fields 9108*z* contain other useful information, however a preferred minimal set of data is described in a record 9108.

Payment Information data Record (PIR) 9110 describes a particular payment method for being automatically transacted by the MS. Payment method id field 9110*a* contains a joining id field to field 9104*c*. Fields 9110*a* are a unique key in all records 9110. Provider field 9110*b* contains the transaction provider, for example MasterCard, VISA, American Express, Discover, etc. Type field 9110*c* indicates the type of payment method, for example, debit or credit. Account field 9110*d* provides the account information of the provider, for example a credit card number, or account number, of the user of the MS. Security code field 9110*e* contains any security code information for the account, for example a 3 or 4 digit code on the back of a credit card. Name field 9110*f* contains the name of the owner of the account of field 9110*d*. Expiration field 9110*g* contains an expiration date/time stamp of the payment method, for example credit card expiration date. Authorization field 9108*h* contains authorization information known to the true owner of the account, and if used will contain authorization information which authenticates that the transaction is being made by the account owner, or an authorized delegate of the account owner. Preferably, only the payment method owner will know authorization information. In one embodiment, the authorization information is privileged between users when the account does not belong to the MS user (i.e. shared). Address field 9110*i* contains the account owner's address which will be defaulted for item(s) delivery if not otherwise specified for an order (e.g. in field 9108*d*). Other fields 9110*z* contain other useful information, however a preferred minimal set of data is described in a record 9110. It is recommended that data of records 9110 be encrypted when stored at, and transmitted by, the MS. Use of U.S. Pat. No. 6,615,213 (Johnson) at a MS may integrate well into storing confidential information such as record 9110.

Inventory Group data Record (IGR) 9112 describes a group defined to contain one or more records 9100. A group id field 9112*a* contains a unique key field for all records 9112 that can be joined to fields 9102*a*, 9104*a*, 9106*a* or 9114*a* depending on the ID_TYPE field, respectively (9102*b*, 9104*b*, 9106*b*, 9114*c*). Group name field 9112*b* contains a text string name of the group. Group description field 9112*c* contains an optional user defined description of the group. Other fields 9112*z* contain other useful information, however a preferred minimal set of data is described in a record 9112.

Inventory group Join data Record (IJR) 9114 joins records 9100 to records 9112 for defining inventory items in a group. A group of groups (i.e. joins records 9112 to records 9112) may also be defined. Group id field 9114*a* joins to field 9112*a*. ID field 9114*b* joins to a field 9100*a* or field 9112*a*, depending on being a group of group(s), or group of inventory item(s). ID_TYPE field 9114*c* contains the type of id field in field 9114*b* (group or item). Other fields 9114*z* contain other useful information, however a preferred minimal set of data is described in a record 9114.

Other data record fields (with suffix "z") include information about the origin, life, and maintenance of the data (e.g. date/time stamps for when created and last changed, who the owner is of the data, etc).

FIG. 91C depicts a flowchart for a preferred embodiment for inventory management processing. A user invokes FIG. 91C processing at the MS to manage IDR relevant data. Processing begins at block 9115, continues to block 9116 where all IDR data (records 9100) are accessed, block 9118 where the data found is presented in scrollable list form along with user options, and to block 9120 for waiting for a user action in response to the list and options. When a user action is detected at block 9120, processing continues to block 9122. The list should present entry id field 9100*a* for convenient reference in a calendar entry (see FIG. 92B).

If, at block 9122, it is determined that the user selected to add a IDR, then block 9124 interfaces with the user for specifying a valid IDR which is saved prior to continuing to block 9126. Block 9126 updates the scrollable list with the new entry and may also cause highlighting of the new IDR in the list for easy recognition of being newly created. Block 9126 continues back to block 9118 for a list refresh. If block 9122 determines the user did not select to add a new IDR, then processing continues to block 9128.

If block 9128 determines the user selected to delete a IDR, then block 9130 deletes the selected IDR for delete and additionally deletes records which are joined to it (e.g. IOR, PMAR, OSAR). Thereafter, block 9126 updates the list for reflecting the removed IDR before continuing back to block 9118. If block 9128 determines the user did not select to delete a IDR, then processing continues to block 9132.

If block 9132 determines the user selected to change a selected IDR, block 9134 interfaces with the user for modifying the IDR. The user may delete from instance id field 9100*g* entries that appear stale via associated date/time stamp information. Any changes are saved prior to continuing to block 9126. Block 9126 updates the scrollable list with entry changes and may also cause highlighting of the modified IDR in the list for easy recognition of being changed. Block 9126 continues back to block 9118 for a list refresh. If block 9132 determines the user did not select to change a selected IDR, then processing continues to block 9136.

If block 9136 determines the user selected to get selected IDR details, then block 9138 accesses data joined to the IDR (e.g. IOR, PIR via PMAR, OMR via OSAR) and block 9140 interfaces with the user for browsing details of IDR data and joined data as well. Depending on the embodiment of list presentation at block 9118, IDR data presented at block 9140 may be more, less, or similarly the same amount of data presented as an entry in the list. Thereafter, block 9126 determines there is no list change to make before continuing back to block 9118. If block 9136 determines the user did not select to browse a selected IDR details, then processing continues to block 9142.

If block 9142 determines the user selected to add a selected IDR to a group, block 9144 accesses IGRs and associated IJRs before continuing to block 9146 where the user interfaces for adding the selected IDR to a selected group. Block 9146 ensures the IDR is correctly added to the group (e.g. determines if IDR already in group, which group being added to, etc). Any changes are saved prior to continuing to block 9126. Block 9126 updates the scrollable list with entry changes for embodiments which display group information in the list (e.g. block 9118 additionally joining IDR data), otherwise block 9126 determines there are no list changes to make. Block 9126 continues back to block 9118 for a list refresh. If block 9142 determines the user did not select to add a selected IDR to a group, then processing continues to block 9148.

If block 9148 determines the user selected to delete a IDR from a group, then block 9150 interfaces with user for which group to delete, and deletes it (e.g. deletes a IJR) before continuing back to block 9126. Block 9126 has been well described above and always ensures the list reflects changes when appropriate. If block 9148 determines the user did not select to delete a IDR from a group, then processing continues to block 9152.

If block 9152 determines the user selected to add payment (e.g. PMAR) or order (e.g. OSAR) information to the selected IDR, then block 9154 accesses the data by appropriately joining to payment information (PIR by way of PMAR) or order information (OMR by way of OSAR), depending on what the user selected to do at block 9120. Thereafter, if block 9156 determines that the information (PMAR or OSAR) already indicates it is added, then block 9158 provides an appropriate error to the user, and processing continues back to block 9126, otherwise block 9160 interfaces with the user for assigning of payment (e.g. PMAR) or order (e.g. OSAR) information before continuing back to block 9126. If block 9152 determines the user did not select to add payment or order information, then processing continues to block 9162.

If block 9162 determines the user selected to delete payment or order information from a IDR, block 9164 deletes the specified information for delete (PMAR or OSAR) and processing continues to block 9126. If block 9162 determines the user did not select to delete payment or order information assigned to a selected IDR, then processing continues to block 9166.

If block 9166 determines the user selected to manually order inventory described by the selected IDR, then block 9168 invokes the procedure of FIG. 94A with field 9100*a* and a descriptor that it is an item (IDR). Thereafter, processing continues to block 9126. If block 9166 determines the user did not select to manually order inventory, then processing continues to block 9170.

If block 9170 determines the user selected to exit FIG. 91C processing, block 9172 terminates the FIG. 91C interface and processing terminates at block 9174, otherwise block 9170 continues to block 9176 where any other user actions leaving block 9120 are appropriately handled before continuing back to block 9126.

FIG. 91D depicts a flowchart for a preferred embodiment of automatically processing whereabouts of inventory items in the vicinity of a MS. There are various embodiments for when automated (e.g. inventory) interfaces occur as described above.

FIG. 91D describes the net result of what has already been described above. Block 9180 starts processing when data is received from processing associated with a particular item. Thereafter, block 9182 accesses IDR data where tag id field 9100*b* matches the item having data transmitted for it, and block 9184 determines if a match was found (e.g. IDR has been configured by user). If block 9184 determines a matching IDR was found then block 9186 checks field 9100*g* to see if the unique item instance has already been accounted for. If block 9186 determines the unique item instance (e.g. one of many of the same type of soup cans described in a IDR) already exists in field 9100*g*, then block 9188 updates the instance id date/time stamp for this last detection in field 9100*g* and FIG. 91D processing terminates at block 9192, otherwise block 9190 updates field 9110*g* to contain the new instance id with date/time stamp of FIG. 91D processing for the item(s) described by the IDR, removes any stale instance id records, updates stock count field 9100*f*, and processing terminates at block 9192. At block 9190, the stock count is updated to reflect a count of the most recent collection of instance id information in field 1100*g*, as well as any stale records which were removed using old date/time stamp information. Detection of items tends to be generally at the same location so that date/time stamp information can be relied upon for what is stale. Referring back to block 9184, if it determined that there is no IDR for the item being processed, then processing terminates at block 9192.

FIG. 92A depicts a flowchart for a preferred embodiment for inventory group management processing. A user invokes FIG. 92A processing at the MS to manage IGR data. Processing begins at block 9215, continues to block 9216 where all IGR data (records 9112) are accessed, block 9218 where the data found is presented in scrollable list form along with user options, and to block 9220 for waiting for a user action in response to the list and options. When a user action is detected at block 9220, processing continues to block 9222. The list should present group id field 9112*a* for convenient reference in a calendar entry (see FIG. 92B).

If, at block 9222, it is determined that the user selected to add a IGR, then block 9224 interfaces with the user for specifying a valid IGR which is saved prior to continuing to block 9226. Block 9226 updates the scrollable list with the new entry and may also cause highlighting of the new IGR in the list for easy recognition of being newly created. Block 9226 continues back to block 9218 for a list refresh. If block 9222 determines the user did not select to add a new IGR, then processing continues to block 9228.

If block 9228 determines the user selected to delete a IGR, then block 9230 deletes the selected IGR for delete and additionally deletes records which are joined to it (e.g. IJR, IOR, PMAR, OSAR). Thereafter, block 9226 updates the list for reflecting the removed IGR before continuing back to block 9218. If block 9228 determines the user did not select to delete a IGR, then processing continues to block 9232.

If block 9232 determines the user selected to change a selected IGR, block 9234 interfaces with the user for modifying the IGR. Any changes are saved prior to continuing to block 9226. Block 9226 updates the scrollable list with entry changes and may also cause highlighting of the modified IGR in the list for easy recognition of being changed. Block 9226 continues back to block 9218 for a list refresh. If block 9232 determines the user did not select to change a selected IGR, then processing continues to block 9236.

If block 9236 determines the user selected to get selected IGR details, then block 9238 accesses data joined to the IGR (e.g. IDRs, IOR, PIR via PMAR, OMR via OSAR) and block 9240 interfaces with the user for browsing details of IGR data and joined data as well. Thereafter, block 9226 determines there is no list change to make before continuing back to block 9218. If block 9236 determines the user did not select to browse a selected IGR details, then processing continues to block 9242. Block 9240 may involve list processing to present all the IDRs belonging to the IGR.

If block 9242 determines the user selected to add a selected IGR to a group (i.e. for group of groups), block 9244 accesses IGRs and associated IJRs before continuing to block 9246 where the user interfaces for adding the selected IGR to a selected group. Block 9246 ensures the IGR is correctly added to the group (e.g. determines if IGR already in group, which group being added to, etc). Any changes are saved prior to continuing to block 9226. Block 9226 continues back to block 9218 for a list refresh. If block 9242 determines the user did not select to add a selected IGR to a group, then processing continues to block 9248.

If block 9248 determines the user selected to delete a IGR from a group, then block 9250 interfaces with user for which group to delete, and deletes it (e.g. deletes a IJR) before continuing back to block 9226. Block 9226 has been well described above and always ensures the list reflects changes when appropriate. If block 9248 determines the user did not select to delete a IGR, then processing continues to block 9252.

If block 9252 determines the user selected to add payment (e.g. PMAR) or order (e.g. OSAR) information to the selected IGR, then block 9254 accesses the data by appropriately joining to payment information (PIR by way of PMAR) or order information (OMR by way of OSAR), depending on what the user selected to do at block 9220. Thereafter, if block 9256 determines that the information (PMAR or OSAR) already indicates it is added, then block 9258 provides an appropriate error to the user, and processing continues back to block 9226, otherwise block 9260 interfaces with the user for assigning of payment (e.g. PMAR) or order (e.g. OSAR) information before continuing back to block 9226. If block 9252 determines the user did not select to add payment or order information, then processing continues to block 9262.

If block 9262 determines the user selected to delete payment or order information from a IGR, block 9264 deletes the specified information for delete (PMAR or OSAR) and processing continues to block 9226. If block 9262 determines the user did not select to delete payment or order information assigned to a selected IGR, then processing continues to block 9266.

If block 9266 determines the user selected to manually order inventory described by the selected IGR (i.e. all IDRs for the IGR), then block 9268 invokes the procedure of FIG. 94A with field 9112*a* and a descriptor that it is a group (IGR). Thereafter, processing continues to block 9226. If block 9266 determines the user did not select to manually order inventory, then processing continues to block 9270.

If block 9270 determines the user selected to exit FIG. 92A processing, block 9272 terminates the FIG. 92A interface and processing terminates at block 9274, otherwise block 9270 continues to block 9276 where any other user actions leaving block 9220 are appropriately handled before continuing back to block 9226.

FIG. 92B depicts a flowchart for a preferred embodiment for automatic order processing of inventory items according to a schedule. The user can manually order inventory items (FIGS. 91C and 92A), or can specify scheduled ordering in a calendar entry. Regardless of how an order is made, stock specification field 9100*e* is compared to stock count field 9100*f* for whether or not an actual order is to take place. In a preferred embodiment, the user encodes a request to make an order with a special syntax in the calendar entry. For example, the string "Order Item: 3498" indicates to order the item(s) described by a record 9100 with an entry id field=3498. For example, the string "Order Group: 123" indicates to order the item(s) of record(s) 9100 that belong to the group with a group id field=123. Other user interface embodiments may be used in various calendar application systems.

Block 9280 begins thread processing as the result of being started by: timer processing for polling calendar entries, event processing when a date/time event has occurred, or some other suitable trigger. Thereafter, block 9282 accesses a LAST_CHK date/time stamp for when FIG. 92B processing last executed, block 9284 accesses calendar information for entries since LAST_CHK through a calendar application API, and block 9286 accesses the next calendar entry (if any) from those entries returned by block 9284. Preferably, there is a calendar application API that returns only those calendar entries with specifications for ordering (i.e. no need for check at a block 9290), however FIG. 92B demonstrates additionally handling those APIs which do not have the ability to filter out calendar entries.

Thereafter, if block 9288 determines that all entries have not yet been processed, then block 9290 determines the user specification for automatically placing an order. If block 9290 determines an order specification is present, block 9292 determines the order details (e.g. item or group order) and prepares parameters for placing an order, block 9494 invokes the ordering procedure of FIG. 94A (for the group or item), and block 9296 checks to see if there are remaining order specifications in the calendar entry. If block 9296 determines another order specification exists, then processing continues back to block 9292 for the next specification, otherwise processing continues back to block 9286 for the next calendar entry to process. Blocks 9292 through 9296 ensure all order specifications for the current calendar entry are processed. If block 9290 determines there are no order specifications for the current calendar entry, processing continues back to block 9286.

Referring back to block 9288, if block 9288 determines that all calendar entries from block 9284 are processed (or there were none to process), then block 9298 saves a date/time stamp to the variable LAST_CHK for future access at block 9282 to ensure no calendar entries have been missed between separate invocations of FIG. 92B. Thereafter, thread processing terminates at block 9299.

FIG. 93A depicts a flowchart for a preferred embodiment for payment method management processing. A user invokes FIG. 93A processing at the MS to manage PIR data. Processing begins at block 9300, continues to block 9302 where all PIR data (records 9110) are accessed, block 9304 where data found is presented in scrollable list form along with user options, and to block 9306 for waiting for a user action in response to the list and options. When a user action is detected at block 9306, processing continues to block 9308.

If, at block 9308, it is determined that the user selected to add a PIR, then block 9310 interfaces with the user for specifying a valid PIR which is saved prior to continuing to block 9312. Block 9312 updates the scrollable list with the new entry and may also cause highlighting of the new PIR in the list for easy recognition of being newly created. Block 9312 continues back to block 9304 for a list refresh. If block 9308 determines the user did not select to add a new PIR, then processing continues to block 9314.

If block 9314 determines the user selected to delete a PIR, then block 9316 deletes the selected PIR for delete and additionally deletes records which are joined to it (e.g. PMAR). Thereafter, block 9312 updates the list for reflecting the removed PIR before continuing back to block 9304. If block 9314 determines the user did not select to delete a PIR, then processing continues to block 9318.

If block 9318 determines the user selected to change a selected PIR, block 9320 interfaces with the user for modifying the PIR. Any changes are saved prior to continuing to block 9312. Block 9312 updates the scrollable list with entry changes and may also cause highlighting of the modified PIR in the list for easy recognition of being changed. Block 9312 continues back to block 9304 for a list refresh. If block 9318 determines the user did not select to change a selected PIR, then processing continues to block 9322.

If block 9322 determines the user selected to get selected PIR details, then block 9324 presents PIR details including those not already presented in the list at block 9304. Thereafter, block 9312 determines there is no list change to make before continuing back to block 9304. If block 9322 determines the user did not select to browse a selected PIR details, then processing continues to block 9326.

If block 9326 determines the user selected to show past payment use for the selected PIR, then block 9328 searches LBX History 30 using PIR information for search criteria and block 9330 displays results found. The user browses results until complete at block 9330 and processing continues to block 9312. Block 9312 continues back to block 9304 for a list refresh after determining there are no changes to make to the PIR list. If block 9326 determines the user did not want to see past payment record use, processing continues to block 9332.

If block 9332 determines the user selected to get PIR referenced data, then block 9334 access all data joined to the PIR (e.g. IDR(s) via PMAR(s), IDR(s) via IJR(s) via IGR(s) via PMAR(s)) and block 9336 interfaces with the user for browsing details of PIR data and joined data as well. Thereafter, block 9312 determines there is no list change to make before continuing back to block 9304. If block 9332 determines the user did not select to browse referenced data, then processing continues to block 9338. Block 9336 may involve extensive list processing to present item and group data referencing the PIR.

If block 9338 determines the user selected to exit FIG. 93A processing, block 9340 terminates the FIG. 93A interface and processing terminates at block 9342, otherwise block 9338 continues to block 9344 where any other user actions leaving block 9306 are appropriately handled before continuing back to block 9306.

FIG. 93B depicts a flowchart for a preferred embodiment for pending inventory order management processing. A user invokes FIG. 93B processing at the MS to manage IOR data. Processing begins at block 9360, continues to block 9362 where all IOR data (records 9102) are accessed, block 9364 where data found is presented in scrollable list form along with user options, and to block 9366 for waiting for a user action in response to the list and options. When a user action is detected at block 9366, processing continues to block 9368.

If, at block 9368, it is determined that the user selected to check delivery associated with a selected IOR, then block 9370 spawns an internet access interface (e.g. browser) using delivery information for the IOR in fields 9102*e* and 1902*f*. Thereafter, block 9372 determines there is no list update and processing continues back to block 9364. If block 9368 determines the user did not select to check delivery, then processing continues to block 9374. Block 9370 preferably causes an asynchronous thread of processing so the user can continue to interface to the browser as needed after block 9370 processing.

If block 9374 determines the user selected to delete an IOR, then block 9376 deletes the selected IOR and processing continues to block 9372. Block 9372 updates the list for reflecting the removed IOR before continuing back to block 9364. If block 9374 determines the user did not select to delete an IOR, then processing continues to block 9378.

If block 9378 determines the user selected to browse entry details, block 9380 presents IOR details including those not already presented in the list at block 9364 and the user browses details until complete. Thereafter, block 9372 determines there is no list change to make before continuing back to block 9364. If block 9378 determines the user did not select to browse details of an IOR, processing continues to block 9382.

If block 9382 determines the user selected to get IOR referenced data, then block 9384 accesses data joined to the IOR (e.g. IDR or IGR via fields 9102*a* and 9102*b*), and block 9386 interfaces with the user for browsing details of IOR data and joined data as well. Thereafter, block 9372 determines there is no list change to make before continuing back to block 9364. If block 9382 determines the user did not select to show referenced data, then processing continues to block 9388. Block 9386 may involve extensive user interface processing to present item and group data (and perhaps associated data thereof) referenced by the IOR.

If block 9388 determines the user selected to exit FIG. 93B processing, block 9390 terminates the FIG. 93B interface and processing terminates at block 9392, otherwise block 9388 continues to block 9394 where any other user actions leaving block 9366 are appropriately handled before continuing back to block 9366.

FIG. 94A depicts a flowchart for a preferred embodiment of a procedure for automatically ordering inventory. Processing begins at block 9400, continues to block 9402 where parameters are accessed and the specified record (IGR or IDR) is also accessed, and to block 9404 to check that the parameter is valid (i.e. data exists). If block 9404 determines the parameters are not valid, the error is handled appropriately at block 9406, any house-keeping to do is performed at block 9407 (e.g. free dynamically allocated memory, close cursor, etc for other FIG. 94A processing), and the invoker (caller) of FIG. 94A is returned to at block 9408. If block 9404 determines the parameters are valid, processing continues to block 9410.

If block 9410 determines the parameters passed indicate a group id (field 9112*a*), then processing continues to block 9412 where PIR and OMR information is joined to the IGR having the parameter passed as field 9112*a* via a PMAR and OSAR, respectively. Thereafter, if block 9414 determines that both records were found for the group, then block 9416 loops through all items of the group and determines all IDR information for the group. Block 9416 will determine groups within the group which must in turn be determined for groups and items in order to deduce all items for the potentially parent group passed for processing by FIG. 94A. When all items (i.e. IDRs) are identified for the group, block 9416 prepares for a group order transaction to order each IDR of the group as a single order, and processing continues to block 9418. Thus, a highest order group has precedence for payment (PMAR/PIR) and ordering (OSAR/OMR) processing even though subordinate groups or items may have their own joinable payment and ordering information.

If block 9418 determines that there was not a single IDR to be used for the group order because all fields 9100*f* were greater than or equal to fields 9100*e*, then processing continues to block 9407, otherwise the prepared order transaction containing those item entries which are not stocked according to specification is performed at block 9420. Block 9420 uses associated OMR information for automated order processing and PIR information for automated payment of the group when arrived to by block 9418. A variety of errors may occur on this transaction. If no errors have occurred, IOR information is returned from the ordering service and processing continues to block 9422 where an IOR is created for the successful transaction, and appropriate success information is logged to LBX History 30. If an error did occur at block 9420, then block 9422 does not create a IOR, and error information is logged to LBX History 30.

Thereafter, if block 9424 determines a group cursor is open (which it is not when arrived to by block 9418), then block 9426 gets the next item entry field 9100*a* using the cursor, and associated IDR data (if fetch on cursor produces an entry id), and continues to block 9428. If block 9426 attempted a fruitless fetch because all items (IDRs) have already been processed as determined at block 9428, then processing continues to block 9407, otherwise processing continues to block 9434 for processing discussed below.

Referring back to block 9424, if there is no group cursor open, then processing continues to block 9407. Referring back to block 9414, if either a joined PIR or OMR is not found for the group of items to be ordered, then block 9430 opens a group cursor for all items (IDR) in the group because payment and/or ordering was not configured by the user for the group. The cursor model is consistent with an SQL implementation of FIGS. 91A through 91B, however a similar mechanism may be implemented depending on the data model embodiment so that all IDRs for the group are processed. Block 9430 will process all descending groups if they exist by joining IGRs to IGRs via IJRs so that all items (IDRs via IGRs) within the group scope are handled by FIG. 94A processing. When all IDRs are determined for the group for processing, block 9430 accesses the first IDR (e.g. via the open group cursor), and processing continues to block 9432. If block 9432 determines there is at least one IDR for being processed, then processing continues to block 9434, otherwise processing continues to block 9407.

Block 9434 begins an iterative loop for ordering items of a group individually. Block 9434, when arrived to by block 9410, also starts processing of a single IDR order requested by a caller of FIG. 94A processing. If block 9434 determines that the current IDR fields 9110*e* and 9110*f* show an order should be made, then block 9436 gets the associated PIR and OMR (via PMAR and OSAR) and processing continues to block 9438. If block 9438 determines that both payment (PIR) and order (OMR) information is found for the IDR, then processing continues to block 9458 for preparation of a single IDR item order and processing continues to block 9420 for appropriately processing the order.

If block 9438 determines that either payment (PIR) or order (OMR) information is not found for the IDR, then block 9440 gets all ascending groups of the IDR (IGRs via IJRs) and prioritizes for search. Thereafter, if block 9442 determines that payment information was not found at block 9438, then block 9444 loops through the prioritized group list to determine payment information, and processing continues to block 9446. If block 9446 determines no payment information can be determined for the IDR, then processing continues to block 9422 for no IOR creation and an error logged to LBX history 30. Processing continues thereafter as already described. If block 9446 determines payment information was determined at block 9444, then block 9448 sets the payment information (PIR) for the IDR, and processing continues to block 9450. If block 9442 determines that payment information was found at block 9438, then processing continues to block 9450.

If block 9450 determines that order information was not found at block 9438, then block 9452 loops through the prioritized group list to determine order information, and processing continues to block 9454. If block 9454 determines no order information can be determined for the IDR, then processing continues to block 9422 for no IOR creation and an error logged to LBX history 30. If block 9454 determines order information was determined at block 9452, then block 9456 sets the order information (OMR) for the IDR, and processing continues to block 9458 for transaction preparation and subsequent processing already described.

Referring back to block 9410, if it is determined that parameters indicate an item (IDR) is to be processed, processing continues to block 9434 which has already been described.

In some embodiments, OMRs 9108 include an additional (Boolean) reconciliation field 9108*r* (if not already part of field 9108*d*) for user reconciliation at block 9420. Reconciliation provides the user with a prompt (e.g. field 9108*r*=True) for either continuing the transaction at block 9420, or canceling the transaction. Further embodiments may include other OMR fields for how to present the reconciliation prompt to the user with detailed options thereof.

FIG. 94B depicts a flowchart for a preferred embodiment for order services management processing. A user invokes FIG. 94C processing at the MS to manage OMR data. Processing begins at block 9460, continues to block 9462 where all OMR data (records 9108) are accessed, block 9464 where the data found is presented in scrollable list form along with user options, and to block 9466 for waiting for a user action in response to the list and options. When a user action is detected at block 9466, processing continues to block 9468.

If, at block 9468, it is determined that the user selected to add a OMR, then block 9470 interfaces with the user for specifying a valid OMR which is saved prior to continuing to block 9472. Block 9472 updates the scrollable list with the new entry and may also cause highlighting of the new OMR in the list for easy recognition of being newly created. Block 9472 continues back to block 9464 for a list refresh. If block 9468 determines the user did not select to add a new OMR, then processing continues to block 9474.

If block 9474 determines the user selected to get selected OMR details, then block 9476 access data joined to the OMR (e.g. IDR(s) via OSAR and IDR(s) via IGR(s) via IJR(s) via OSAR(s)) and block 9478 interfaces with the user for browsing details of OMR data and joined data as well. Block 9478 may involve extensive user interface and list processing. Thereafter, block 9472 determines there is no list change to make before continuing back to block 9464. If block 9474 determines the user did not select to get OMR details, processing continues to block 9480.

If block 9480 determines the user selected to delete a OMR, then block 9482 deletes the selected OMR and additionally deletes records which are joined to it (e.g. OSAR). Thereafter, block 9472 updates the list for reflecting the removed OMR before continuing back to block 9464. If block 9480 determines the user did not select to delete a OMR, then processing continues to block 9484.

If block 9484 determines the user selected to change a selected OMR, block 9486 interfaces with the user for modifying the OMR data. Any changes are saved prior to continuing to block 9472. Block 9472 updates the scrollable list with entry changes and may also cause highlighting of the modified OMR in the list for easy recognition of being changed. Block 9472 continues back to block 9464 for a list refresh. If block 9484 determines the user did not select to change a selected OMR, then processing continues to block 9488.

If block 9488 determines the user selected to exit FIG. 94B processing, block 9490 terminates the FIG. 94B interface and processing terminates at block 9492, otherwise block 9488 continues to block 9494 where any other user actions leaving block 9466 are appropriately handled before continuing back to block 9466.

Automatic Application Association Processing

>>Cross Application Addressing

Cross application addressing refers to being involved with one or more MS users within the context of one application and then addressing those same users in context of a different application. This involves mapping an identifier in context of one application with an identifier in context of another application. An application context uses one source address form for the search criteria to WDR information of queue 22, or LBX History 30, in order to retrieve a sought corresponding source address form. The search can also be made to queue 22 and/or LBX history 30 for source address information of who is in the vicinity (e.g. within a certain distance), or for source address information of any WDRs which satisfy search criteria against any WDR field data of queue 22 and/or LBX history 30. The LBX platform provides very powerful cross application addressing map capability for many application situations. See appfld.source sections for examples. For example:

- Instant message or email each party of: an active call (e.g. multi-party conference call), browsed address book entry(s), calendar meeting notice, current rfid processing, queue 22 (e.g. recently nearby) search result, LBX History (e.g. nearby at some time) search result, or other application;
- Show calendar items (e.g. next forthcoming, all, most recently past, past, conditioned search, etc) for each party of: an active call, browsed address book entry(s), SMS message entry(s), email entry(s), current rfid processing, queue 22 (e.g. recently nearby) search result, LBX History (e.g. nearby at some time) search result, or other application;
- Establish phone application call for party of: email(s), calendar entry(s), address book entry(s), SMS message entry(s), email entry(s), current rfid processing, queue 22 (e.g. recently nearby) search result, LBX History (e.g. nearby at some time) search result, or other application;
- Whoever is on active call: show next calendar entry(s), email item(s), data folder(s), privileges configured, charters configured, etc;
- Automatically setup conference call from calendar notice invitees (e.g. use ip addresses for peer to peer SIP call establishment);
- Automatically address fill an email, sms message, calendar notice, etc from last or current phone call; or
- Summarizing the many supported uses as: Perform request, specification, action, or operation in context of a second application using an address identifier that is contextually correct for the second application and is associated to and derived from an address identifier of interest in context of a first application. The WDR appfld.source sections enable tremendous cross application functionality;

In one embodiment, accessible phone application AppTerm(s) contain identifying information for all parties to a call. Application fields 1100*k* may also contain this information as WDR information transmitted between MSs, for example as the result of peer to peer phone call setup being performed. Thus, parties to an active call are accessible to MS processing through access to AppTerm information, or access to WDR information from the WDR queue and/or LBX history. Preferably, appfld.source.id.* sections are maintained for each party involved in context of a particular application for quickly looking up the correct address form for a desired associated application context. In some embodiments, there are many appfld.source sections to facilitate the many MS applications which can be related to each other for the same MS (e.g. MS user) information. When the user performs a request, specification, action, or operation, the available identifier address is used to lookup the sought identifier address, preferably by application name as part of the appfld section name (e.g. appfld.source.id.email).

In another embodiment, a request can be made using FIG. 88A processing so that targeted MSs return the needed identifier address information to the MS of FIG. 88A processing.

Automatic MS Configuration Processing

>>Personalize Phone Features by Who is Nearby

```
(( _I_msid = "Poindexter") & (_I_loc $(10F) \loc_my )):
   Invoke Data (SYS_vol, "3");
   Invoke Data (SYS_bright, "2");
   Invoke Data (SYS_desktop, "mypic.jpg");
   //...
```

The example shows modifying the MS volume to a configuration of 3, modifying the MS display brightness configuration to 2, and the MS background "wall-paper" to mypic.jpg whenever Poindexter is within 10 feet. Any MS peripheral can be automatically affected with a charter. Any MS user interface (e.g. layout, organization, appearance, background, foreground, text font, etc) can be customized or modified with a charter. Similarly, by modifying any application AppTerm variables, any aspect of the application can be automatically governed (application maximum values, application settings, application appearance, application menus, application options, etc).

It may be desirable to share, or make temporary use of, different permissions (privileges) set up for one MS user to be applied conveniently to another MS user. For example, when certain MS users are in the vicinity, you may want to provide each with identical permissions while they are nearby:

```
((\locByID_Janette $(10F) \loc_my) & (\locByID_Jared $(10F) \loc_my)):
   Invoke App ("ResMapper", "PRIVILEGES", "Janette",
   "Jared", "+", "ALL");
   Invoke App ("ResMapper", "PRIVILEGES",
   "Jared", "Janette", "+", "ALL");
```

The "ResMapper" (Resource Mapper) interface is preferably a prepackaged API as part of the LBX MS O/S for better performance of being accessed with a well known name and invoked as a thread continuation of processing (e.g. function interface), rather than a spawned process in its own thread, however any reasonable executable form may be used. In the example, Jared gets treated like Janette (in addition to how currently treated), and Janette gets treated like Jared (in addition to how currently treated) for ALL privileges checked at the MS where the charter is executed by WITS processing. Referring back to FIGS. 57 and 58, resource mapper means and processing provides blocks 5708, 5712, 5722, 5748, 5760, and any other privilege processing disclosed with the ability to treat one identifier being processed in context of another identifier. Thus, anywhere there is privilege processing that Jared is involved, Jared gets treated for having privileges of Jared and additionally of Janette. Anywhere there is privilege processing that Janette is involved, Janette gets treated for having privileges of Janette and additionally Jared.

Then, to return the Jared and Janette identifiers back to the way they were, for example when both are no longer within 10 feet:

```
((\locByID_Janette (5M)$$(10F) \loc_my) |
(\locByID_ Jared (5M)$$(10F) \loc_my)):
   Invoke App ("ResMapper", "PRIVILEGES",
   "Janette", "Jared", "-", "ALL");
   Invoke App ("ResMapper", "PRIVILEGES",
   "Jared", "Janette", "-", "ALL");
```

The Resource Mapper also supports associating charters the same way by specifying "CHARTERS" for the first parameter. Referring back to FIGS. 57 and 58, resource mapper means and processing provides blocks 5716, 5720, 5740, 5752, 5754, and any other charter processing disclosed with the ability to treat one identifier being processed in context of another identifier. Assuming the only changes made to the examples is replacing "PRIVILEGES" with "CHARTERS", then in the first example ("+"), anywhere there is charter processing that Jared is involved, Jared gets treated for having charters of Jared and additionally of Janette. Anywhere there is charter processing that Janette is involved, Janette gets treated for having charters of Janette and additionally Jared. Thus, Resource Mapper gets applied where it makes sense in context of use. Below are detailed descriptions for providing the means and processing to automatically assign privileges and charters in charter actions for later being accessed in WITS processing.

FIG. 95A depicts a preferred embodiment of a resource mapper record for resource mapper processing of the present disclosure. Resource mapping refers to mapping a grantable resource such as privileges or charters with a convenient operation that does not require change of the resources themselves. A resource mapper record 9500 contains the following fields and descriptions. Resource field 9500*a* contains the resource type (CHARTERS or PRIVILEGES) which is being associated between users. Base id field 9500*b* contains an identifier (see BNF grammar ID for embodiments) which is to be extended with additional resources. Base id type field 9500*c* contains the type of identifier (see BNF grammar IDType for embodiments) of field 9500*b*. Applied id field 9500*d* contains an identifier (see BNF grammar ID for embodiments) owning the resource which is being applied to the identifier of field 9500*b*. Applied id type field 9500*e* contains the type of identifier (see BNF grammar IDType for embodiments) of field 9500*d*. Applied Mask field 9500*f* contains a mask for how to apply the resource from identifier to another. For example, when resource field 9500*a* contains PRIVILEGES (i.e. privileges being applied), mask field 9500*f* may contain "ALL" for applying all privileges of field 9500*d* to field 9500*b*, "Data" for applying only the data send privileges, "Impersonate" for applying only the impersonation privileges, "WDR" for applying only the WDR privileges, "SL" for applying only the situational location privileges, "Mon" for applying only the monitoring privileges, "LBX" for applying only the LBX privileges, "LBS" for applying only the LBS privileges, or any other embodiment setting for identifying a category or subset of privileges (FIGS. 59/60 have privilege categories). When resource field 9500*a* contains CHARTERS (i.e. charters being applied), mask field 9500*f* may contain "ALL" for applying all charters of field 9500*d* to field 9500*b*, an application prefix (e.g. "B_") for applying only certain application prefix section charters, data send privileges, a name (e.g. "doitHere") for applying only explicitly named section charters, or any other embodiment setting for identifying a category or subset of charters.

WITS processing points discussed above accesses all resource mapper records 9500 with field 9500*b* and 9500*c* set to the in-process WDR ID information. Then, fields 9500*d* and 9500*e* are used to access the resource information identified in fields 9500*a* and 9500*f* for treating it as though it were already part of resource information of fields 9500*b* and 9500*c*. There may be many records 9500 for supporting mapping of a plurality of identified resources to a single identified resource.

Charter/privilege processing points may also access all resource mapper records 9500 with field 9500*b* and 9500*c* set to the MS ID of particular processing where privileges and charters are being determined for the MS. Then, fields 9500*d* and 9500*e* are used to access the resource information identified in fields 9500*a* and 9500*f* for treating it as though it were already part of resource information of fields 9500*b* and 9500*c*.

FIG. 95B depicts a flowchart for a preferred embodiment for automatic resource mapper processing. Execution of the ResMapper interface (e.g. as exemplified above), begins at block 9502, continues to block 9504 where all parameters (one parameter for each field of a record 9500 wherein the IDType type fields may be assumed in various embodiments) are validated and then to block 9506. If block 9506 determines one or more parameters are not valid, then block 9508 handles the error appropriately and the caller (invoker) of FIG. 95B processing is returned to at block 9510, perhaps with an error describing the return. If block 9506 determines all parameters are valid, then processing continues to block 9512.

If block 9512 determines the specified operator is to apply a resource (i.e. add operator), then block 9514 accesses resource mapper records to see if an identical record for creation already exists. Thereafter, if block 9516 determines the record to be created by this invocation of FIG. 95B already exists, then the caller is returned to at block 9510 perhaps with a duplication error. Block 9510 should always return an error or success code to the caller depending on what led up to the return. If block 9516 determines the record does not already exist, then block 9518 creates the record 9500 in the resource mapper data and processing continues to block 9510. If block 9512 determines the operator is not for applying (adding) a resource mapper record, then processing continues to block 9520.

If block 9520 determines the operator passed to FIG. 95B is for removing an existing resource mapper record, then block 9522 deletes the specified record from resource mapper data (if it exists) and processing continues to block 9510, otherwise block 9524 handles any other resource mapper operator passed (e.g. an intersection operator not shown) which results in the resource intersection being set between identifiers, and processing continues to block 9510. Thus, FIG. 95B reflects the results of charter actions which automatically associate resources between users for influencing WITS processing, for example in context of other MS user privileges and/or charters. WITS processing uses the resource mapper data for extending privileges and/or charters by one or more other granting identities.

Another useful MS interface, preferably provided as an API, is the location sorter interface made available to email application inbox processing, calendar application entry processing, phone application call log processing, file system application document/file processing, or any other application where WDR queue contents can be used to provide special sort functionality to a list of the particular application. In an email application use, an email folder (e.g. inbox) can be sorted based on MSs in the vicinity, from nearest to furthest away using source, recipient or both as a key. In a calendar application use, all past, forthcoming, or currently defined calendar entries, perhaps of a certain type, can be sorted based on MSs in the vicinity, from nearest to furthest away using source, recipient or both as a key. In a phone application use, specific phone numbers of a designated phone log (incoming, outgoing, missed, all, etc) can be sorted based on MSs in the vicinity, from nearest to furthest away using caller id. In a file system application use, all files or documents of a designated MS system folder, drive, or other storage specification can be sorted based on MSs in the vicinity, from nearest to furthest away using creator, editor, owner, assignor, or other document property identifier information as a key. The file system application example provides the MS user with a quick method to identify pictures, documents, files, videos, etc for others who are in the vicinity. For example:

```
...
Invoke App ("LocSort", "BYID", \thisMS, "50M", M_listPtrs, 112,
"email", "ASC");
...
```

Location sort processing can be invoked in an action for a variety of charter conditions. Parameters to location sort processing include:

sort method=indicate to sort procedure the type of sort to conduct;

sort method data=parameter passed based on the type of sort being requested (e.g. a specified MS ID, or a specified location);

distance specification=Distance in desired units around the specified location or location of a specified MS;

pointer list=Two dimensional array of memory pointers (see FIG. 96B), each array entry containing a pointer pointing to a MS id or address, and a pointer to the overall record being sorted in the application. For example, an email application wanting to sort its inbox passes this parameter as a list of pointers to source address information (e.g. joe@yahoo.com) and its associated item inbox item record being sorted. The offset (array index) into the array equates to a current email inbox item. Upon return, the pointer list is sorted for use by the application in sorting the application records (e.g. inbox items). Any application (email, calendar, etc) can provide novel item sorting based on the location of the MS, MSs nearby, or a specified location.

Pointer list count=Number of entries in the two dimensional pointer list array for sorting;

ID section=The section name of appflds.source.ID.X which is to be used for comparison to application values (e.g. the first pointer in each two dimensional array item) for sorting;

Sort direction=Sort direction of ascending (ASC) or descending (DESC).

FIG. 96A depicts a flowchart for a preferred embodiment for automatic application sort index processing. The well known procedure ("LocSort" maps to a linked API accessible for processing) is invoked at block 9602 and continues to block 9604 where parameters are accessed and validated. FIG. 96A may be invoked by an application continually on a periodic basis based on a user application configuration (e.g. keep inbox sorted by who is nearby (e.g. poll interface every N seconds)), may be invoked by a user when needed to perform desired sorting, may be invoked upon arrival of new application entries (e.g. new email, calendar item, etc), or may be invoked in a configured charter. Thereafter, if block 9606 determines any parameters are not valid, block 9608 handles the error appropriately (e.g. logs to LBX history 30) and the invoker is returned to at block 9610, preferably with an error code or status indicating success depending on FIG. 96 processing up to that point. If block 9606 determines all parameters are valid, then processing continues to block 9612.

If block 9612 determines location sort index processing sort method is for sorting the application list by a specified location (e.g. "BYLOC" of Invoke App ("LocSort", "BYLOC", "75022", "5M", M_listPtrs, 98, "email", "ASC")), then block 9614 accesses the location parameter and prepares it for a search to the WDR queue. Various embodiments support location parameters for latitude and longitude, physical mailing address, zip code, or other physical location information transformable at block 9614. Block 9614 may access geo-coded data for deriving a location suitable for searching WDR fields 1100*c*. After search preparation, block 9616 accesses the WDR queue source identifier field section information specified by the identification sort key (e.g. ID section=appflds.source.id.email) within the specified distance to the specified location, and ordered by fields 1100*b*, then by the identification sort key within that. Alternatively, sorting can use how close to order search results, perhaps specified with an additional parameter (e.g. for time or distance sort order priority). Appropriate WDR access semaphore(s), preferably within an appropriate WDR queue API, is used for all WDRs within the specified distance (e.g. "5M"=5 meters; any of a variety of distance units and amounts are supported) of the specified location. Block 9616 also removes duplicate ID section values (i.e. keeps distinct values) which occur after the first occurrence. This ensures only a single source id is used for when it was closest to the specified location. When block 9616 completes, a sorted list of unique ID section values are made. Thereafter, block 9618 gets the next ordered ID section value from the sorted WDRs, and then block 9620 determines if there (is a first, or) are any remaining WDRs to process.

If block 9620 determines there is a WDR to process in the list from block 9616, then block 9622 accesses the pointer list, searches for a matching sort key value, and modifies the pointer list for ascending or descending according to matches found. Ascending places pointers for a match at the bottom of the list, and descending places pointers for matches at the top of the list. Once a pointer has its position set, it is not affected by subsequent processing of block 9618 through 9622 on the current invocation of FIG. 96. Block 9622 returns to block 9618. If block 9620 determines there are no additional WDRs to process from block 9616, then the caller (invoker) is returned to at block 9610. Upon return, the pointer list has been sorted appropriately by FIG. 96A processing. The application can apply the index (i.e. ID section parameter) to whatever list it is concerned with (e.g. email inbox).

Referring back to block 9612, if it is determined that the invoker did not specify to sort the pointer list by a specified location and distance thereabouts, then processing continues to block 9624. If block 9624 determines a sort method was requested by a MS location (e.g. Invoke App ("LocSort", "BYID", "Andy", "10M", M_listPtrs, 98, "email", "ASC")), then block 9626 determines the specified MS location using the specified MS ID. Any MS can be specified wherein block 9626 accesses the WDR queue for the most recent whereabouts of the particular MS. Thereafter, if block 9628 determines the MS was not found on queue 22, then the caller is returned to at block 9610, preferably with an error code, otherwise processing continues to block 9630.

Block 9630 accesses the WDR queue source identifier field section information specified by the ID section parameter (e.g. appflds.source.id.email) within the specified distance to the specified MS location, and ordered by nearness to the MS location (fields 1100*c*), then by the ID section information from the WDR within that. Alternatively, sorting can use time to order search results, perhaps specified with an additional parameter (e.g. for distance or time sort order priority). Appropriate WDR access semaphore(s), preferably within an appropriate WDR queue API, is used for all WDRs within the specified distance (e.g. "10M"=10 meters) of the specified MS location. Block 9630 also removes ID section duplicates which occur after the first occurrence (i.e. keeps distinct values). This ensures only a single source id is used for when it was closest to the specified location. When block 9630 completes, a sorted list of sort key values are made. Thereafter, block 9618 gets the next ordered ID section value from the sorted WDR information, and then block 9620 determines if there (is a first, or) are any remaining WDRs to process. Processing is as was described above. If block 9624 determines a sort method was not requested by a MS location, processing continues to block 9632.

If block 9632 determines a sort method was requested by the location of the MS of FIG. 96 processing (e.g. Invoke App ("LocSort", "BYID", \thisMS, "10M", M_listPtrs, 34, "email", "ASC")), then block 9626 determines the specified MS location using the specified MS ID and processing continues as was described for block 9626 and subsequent processing. If block 9624 determines a sort was not requested by the location of the MS of FIG. 96 processing, processing continues to block 9634. In a preferred embodiment, block 9624 handles block 9632 and block 9634 because the MS ID is passed as a parameter anyway.

If block 9634 determines a sort was requested by those nearby the location of the MS of FIG. 96 processing (e.g. Invoke App ("LocSort", "NEARBY", thisMS, "10M", C_listPtrs, 23, "calendar", "ASC")), then block 9626 determines the specified MS location using the MS ID of the MS of FIG. 96 processing, and processing continues as was described for block 9626 and subsequent processing. If block 9634 determines a sort was not requested by the location of the MS of FIG. 96 processing, processing continues to block 9610 where an error is preferably returned to the caller.

In all cases the two dimensional array of pointers are sorted base on the sort index ID section values found from the corresponding sorted WDRs. For example, the email application uses the pointer list to sort inbox items based. While it is preferable that the invoking application uses the pointer list for subsequent sort processing, an alternate embodiment causes the application list to be sorted upon return at block 9610.

Sorting the pointer list is far more efficient than sorting the data which pointers point to. The data can live where it makes sense in the application, and the pointers are sorted so that the pointer list is used for displaying of the data associated with the application identifiers being sorted.

The application uses LocSort, or LocSort results, to keep application entries sorted every time a new entry arrives, is posted, is changed, is deleted, etc. In such embodiments, the application may use LocSort results as the initial starting point, and then manage every entry to process thereafter. For example, when a new email item arrives, the email application may perform a subset of FIG. 96A processing itself to keep things sorted without invoking LocSort for an entire sort refresh.

In some embodiments, any WDR search criteria can be specified by a MS user for producing a sorted list of WDRs which can in turn contain the WDR data (e.g. identifier) used as the sort index key for sorting application records associated to the WDR data.

FIG. 96B illustrates an example application use of sort index processing, specifically a MS email application. In the example illustrated, an email inbox contains only 6 email items shown generically as inbox display 9654. The inbox email items are each shown to the user with the sent date/time stamp, who sent the email item (source address), and a subject of the email item. Other embodiments may show more or less information in the inbox display and the user can select an email item for the email body and other information. Prior to invoking FIG. 96A processing, the email application prepares the two dimensional array of pointers for the specified number of entries as shown in pointer list 9652. Note that the $S_i$ pointer points to the sender address of the email item, and the $R_i$ points to the entire email inbox row for the email item. When sorting has been completed by FIG. 96A processing, pointer list 9656 has been sorted to reflect whereabouts data found on the WDR queue as requested for the particular sort method. When the email application receives back the pointer list, it is used to then sort the email inbox to the inbox 9658 for sorting based on whereabouts data associated with email items.

Each sort method of the LocSort interface may be accessed from the email application using a new email interface request, or a charter may access the interface in a charter action. Similarly, a calendar interface displaying a plurality of calendar entries can have the entries sorted based on whereabouts of MS users associated with the calendar items. A phone application may sort various phone call logs (inbound, outbound, etc) based on whereabouts of associated MS users of the phone calls in the logs. Other applications may sort a plurality of records in context of the particular application based on whereabouts of associated MS users.

>>Modify MS Performance Variables (e.g. Throttle for More or Less Threads) Based on Activity, Nearby Status, Statistics, Queue 22 Contents, or any Other Charter Condition(s).

(\st_MSNearbyCt>=25):

In another example, the MS variables 19xx-Max or 19xx-Ct may be modified by a charter action by accessing the appropriate SYS_xxx AppTerm variables.

>>Automatic Clipboard Management

```
(...):
  Invoke Data (SYS_clipBoard, ...),
  Invoke Data (SYS_clipType, ...);
  // ...
```

The example shows that a given charter expression can be used to cause action for automatically configuring the MS system clipboard. A system clipboard AppTerm variable is made accessible to charter processing wherein other AppTerm variables can be accessed and used to populate the system clipboard AppTerm variable from the charter action. In another embodiment, a well known API is provided for automatically capturing content of an applicable type from the focused MS user interface object. The content may later be pasted to another user interface object. Similarly, the system clipboard AppTerm variable can be accessed by charter processing for copying its value to other AppTerm variables, for example to automatically populate an Application user interface object with the contents of the system clipboard. An alternate embodiment implements a well known interface for automatically pasting from the clipboard content which was most recently captured to it. AppTerm variables may include any aspect of application state variables for novel charter processing.

>>Data Input or Output Enforcement

Special AppTerm variables of SYS_inKBD, SYS_inMIC, SYS_outSPKR, and SYS_outMON are defaulted to NULL (e.g. 0) at the MS, however these AppTerm variables may be used to enforce what can be input or output at the MS. When SYS_inKBD is set to a file name, the characters and text strings contained in the file are not eligible to be entered from the keyboard. For example, inappropriate "four letter words" can be configured in the file for those words which cannot be entered at the MS keyboard. In another embodiment, when SYS_inKBD is set to a valid file name, only the character and text strings in the file can be entered at the keyboard. In one embodiment, a keyboard interrupt intercept program (e.g. Terminate and Stay Resident (TSR)) uses the file to enforce what can or cannot be entered from the MS keyboard. SYS_inMIC is similar to SYS_inKBD for defining what cannot be detected at the MS microphone (or alternately the universe of what can be detected). SYS_inMIC is also preferably an input interrupt intercept program which translates sound at the MS microphone to words and then enforces what can or cannot be spoken to the MS. In some embodiments, the voice control application makes use of SYS_inMIC for an integrated solution rather than converting voice twice by intercepting sound at the microphone. SYS_outSPKR is similar to SYS_inMIC for defining a file containing what can or cannot be output at the MS speaker(s). Again, an interceptor program (e.g. for system words detected) is one embodiment. SYS_outMON is similar to the other AppTerm variables for referencing a file containing what can or cannot be output to the MS monitor (screen). Again, a text stream output interceptor program, and/or Optical Character Recognition (OCR) interceptor program is one embodiment. While perhaps these special AppTerm variables potentially involve processing impacting MS performance, a parent of a child with a MS may desire such features to sensor certain activities at the MS. Providing various disclosed charter expressions can provide unique input and output control at certain locations or other conditions the MS encounters. In some embodiments, a special constant setting of "ALL" can be specified to prevent all input and/or output from occurring at the MS, depending on the variable set. This allows controlling whether any input or output at all is permitted at configured charter locations or other conditions.

A child will likely be reluctant to make such configurations. Charter configurations may be made by a user of a MS who has administration privileges at the MS. In some embodiments, a Grantee or Grantor in permission and charter configurations represents activities by an authorized administrator at the MSs involved. In other embodiments, permission or charter configurations (e.g. use of FIGS. 35A through 48A, or subset(s) thereof) can only be made after authentication of who is performing configuration. Authentication may be in the form of a special MS user name and password, a special MS administrator password, a MS user option exposed only after entering a special MS passcode, or other suitable authentication method.

>>Environmental Sampling (Sound, Light, Location) for Automated Charter

Some MSs incorporate sound level decibel detection capability, and light intensity/brightness detection through an iris capability. Detecting sound decibels is well known to those skilled in the art by reading levels on at least one MS microphone. Similarly, detecting light levels is well known to those skilled in the art of automated iris light detection as provided to some televisions for automatically adjusting brightness levels. Both of these capabilities involve the MS taking an environment sample with an input peripheral. Sample values are used to change the values of corresponding AppTerm variables which are accessible to charter processing (e.g. SYS_soundDB=most recent value for Decibels detected by MS at microphone. SYS_lightLumens=most recent Lumens measurement for light intensity measured by an iris of the MS). Thus, the MS can be equipped with environment sensing devices for setting AppTerm variables which are accessed for unique charter processing. For example, when light or sound levels reach certain values as described in a charter expression, charter action(s) can be performed automatically.

>>Set Up Vicinity Monitor (e.g. Real-Time Updated Map Graphic, Nearby MS Counter Gauge with Color Codes for Set(s) of Characteristics, Visual and/or Audible Metaphor for Depicting Nearby MS Conditions, or Other Graphical Embodiment) for Number of Friends Nearby, or Conditions of Nearby MSs A standard lbxPhone™ feature is to provide a real-time monitor for those nearby of interest in real time. As WDR information is received by a MS from nearby MSs of interest ("of interest" as configured by a MS user), a vicinity monitor provides visual and/or audible indication to the MS for indicating those nearby. There may be a plurality of vicinity monitors with different criteria for providing unique indication in each vicinity monitor.

With reference now to FIG. 97A, depicted is a flowchart for a preferred embodiment for vicinity monitor configuration processing. Vicinity monitor management/configuration processing begins at block 9702 upon user request, and continues to block 9704 where the user specifies a vicinity monitor name, block 9706 which uses the specified name to access Vicinity Monitor Data Records (VMDRs) 9700 for a matching Vicinity Monitor Data Record (VMDR) having the name specified, and to block 9708 to check if a VMDR with matching name field 9700*b* was found. There may be many vicinity monitors, each with a unique name that the user must specify at block 9704 for specifying which one to manage/configure. If block 9708 determines the user specified a name which was not found in VMDRs, block 9710 prompts the user to make sure he wants to create a new VMDR with the specified name, and block 9710 waits for the user's response. Thereafter, if block 9712 determines the user specified he is creating a new vicinity monitor, processing continues to block 9714 where data is defaulted for a new VMDR with the new name, otherwise the vicinity monitor configuration interface is appropriately terminated at block 9716 (e.g. incorrectly specified name at block 9704), and FIG. 97A processing terminates at block 9718. Block 9714 continues to block 9720. If block 9708 determines a VMDR was found with a matching name, then processing continues to block 9720.

Block 9720 presents to the user VMDR information for the vicinity monitor being managed by FIG. 97A processing (new vicinity monitor when arrived to from block 9714, or existing vicinity monitor when arrived to by block 9708 directly). Thereafter, block 9722 waits for a user action in response to data presented, and continues to block 9724 when such an action is detected.

If block 9724 determines the user selected to delete the vicinity monitor, then block 9726 checks field 9700*f* to see if the monitor is active and if so the vicinity monitor is terminated by inserting a special termination entry into the WDR queue which contains field 9700*b* and is used by vicinity monitor processing (FIG. 97C). Block 9726 waits for the corresponding named vicinity monitor processing of FIG. 97C to terminate (e.g. field 9700*f* set to inactive) before continuing to block 9728. Block 9728 deletes the VMDR and processing continues to block 9716 for FIG. 97A termination processing. Appropriate FIG. 97 thread semaphore control is incorporated for data accesses, depending on embodiments. If block 9724 determines the user did not select to delete the vicinity monitor, then processing continues to block 9730.

If block 9730 determines the user selected to modify the vicinity monitor VMDR, then block 9732 interfaces with the user for VMDR modification until the user selects to save modifications or exit. The user interfaces at block 9732 for modifying data described with FIG. 97B. Thereafter, if block 9734 determines there was at least one modification made which the user selected to save, then block 9736 saves the VMDR data and block 9738 checks to see if the modified vicinity monitor should be restarted to initialize with change(s) made. If block 9738 determines the corresponding vicinity monitor of FIG. 97C processing is active and should be restarted with the modified data, then block 9740 terminates the vicinity monitor by inserting the special termination entry into the WDR queue which contains field 9700*b* as discussed above. Block 9740 waits for the corresponding named vicinity monitor processing of FIG. 97C to terminate (e.g. field 9700*f* set to inactive) before continuing to block 9742 where the vicinity monitor (FIG. 97C) processing is started again, and processing continues back to block 9720. If block 9738 determines an active vicinity monitor does not have to be restarted based on data modifications or the affected vicinity monitor is not active, then processing continues back to block 9720. Block 9720 always presents the most recent VMDR information. If block 9730 determines the user did not select to modify the vicinity monitor, then processing continues to block 9744.

If block 9744 determines the user selected to restart the vicinity monitor, then block 9740 terminates the vicinity monitor as already described if it is determined to be active (checking field 9700*f*). Processing continues at block 9740 as described above. If block 9744 determines the user did not select to restart the vicinity monitor, then processing continues to block 9746. A user may select to restart a vicinity monitor for a variety of reasons, for example after using another method for modifying VMDR information (e.g. query manager of a SQL Database form of VMDR data).

If block 9746 determines the user selected to activate (start) the vicinity monitor, then block 9748 checks to see if it is already active (started) in which case processing continues back to block 9720. If the vicinity monitor is not already active, then block 9742 starts an instance of FIG. 97C processing for the named vicinity monitor and FIG. 97A processing continues back to block 9720. Block 9742 passes as a parameter to FIG. 97C processing the name (field 9700*b*) so every FIG. 97C instance of processing knows which named vicinity monitor is being started. If block 9746 determines the user did not select to activate the vicinity monitor, then processing continues to block 9750.

If block 9750 determines the user selected to deactivate (terminate) the vicinity monitor, then block 9752 checks to see if the vicinity monitor is active (running), in which case the vicinity monitor is terminated by inserting the special termination entry into the WDR queue which contains field

9700*b* as discussed above. Block 9752 waits for the corresponding named vicinity monitor processing of FIG. 97C to terminate (e.g. field 9700*f* set to inactive) before continuing back to block 9720. Block 9752 continues directly back to block 9720 when the vicinity monitor is determined to not be active (field 9700*f*). If block 9750 determines the user did not select to deactivate the vicinity monitor, then processing continues to block 9754.

If block 9754 determines the user selected to exit FIG. 97A processing, block 9754 continues to block 9716 for termination processing, otherwise block 9756 handles any other user actions which result in processing leaving block 9722. Block 9756 continues back to block 9720.

FIG. 97B depicts a preferred embodiment of a Vicinity Monitor Data Record (VMDR) 9700 for discussing operations of vicinity monitor processing. ID field 9700*a* contains a unique index key value for all VMDRs to facilitate I/O accesses to the VMDR. Name field 9700*b* contains a user specified unique vicinity monitor name which is unique across all VMDRs. Preferably, the name is displayed in a visual graphic of the vicinity monitor (e.g. window title bar text) to remind the user which vicinity monitor is being displayed. Identifier(s) field 9700*c* contains all MS identifiers of interest to the user for being monitored in the vicinity monitor. Identifier(s) field 9700*c* contains a list of identifiers including the type of identifier: group ID, MS ID, or MS ID in second form associated to, or derived from, a first form of MS ID, or other id as described in this disclosure. The type of identifier is used to convert the identifier to a suitable use form. An alternate embodiment maintains a join value in field 9700*c* for joining to one or more identifier records (e.g. in another table) separately maintained to prevent a plurality of identifiers from being maintained in a single data record field. Field 9700*c* may be specified as NULL in which case all MSs in the vicinity as defined by halo field 9700*d* which satisfy the expression of field 9700*e* are included for being monitored. Halo field 9700*d* is a measurement for the distance (a radius) around the moving MS of FIG. 97C processing for how nearby another MS must be to be of interest. The vicinity monitor will only indicate those MSs which are within halo distance from the current MS. Field 9700*d* may be maintained in certain units (e.g. converted from conveniently specified user units) or may include a units specification for carrying what units the halo distance value is being maintained in. Field 9700*d* may be specified as NULL in which case all MSs as defined in field 9700*c* which satisfy the expression of field 9700*e* are included for being monitored. Expression field 9700*e* may contain any charter expression which can be applied to a WDR as described in a field 3700*c* and processed as field 3700*c* is processed. Depending on the embodiment, certain special terms may not be supported (e.g. no AppTerm use). Active field 9700*f* is a Boolean (True/False) for indicating whether the particular vicinity monitor is active (running) or inactive. Refresh period field 9700*g* specifies the timeliness (preferably in seconds) for how often the vicinity monitor should refresh its real-time monitoring. An alternate embodiment may specify date/time information, or other time indication for how to refresh the vicinity monitor. Visual type field 9700*h* specifies how to display the vicinity monitor. Preferably there is a variety of display types supported for specification, for example:

Map=map subset having MS owning vicinity monitor at center with scale of surrounding map area determined by halo, or determined by least nearby MS when halo is NULL;

Gauge=visual gauge indicating the number of MSs in the vicinity as described by a VMDR (preferred embodiments includes a real-time updated numeric for the number of MSs in the vicinity along with a meter graphic, and perhaps color change, for the user quickly distinguishing how many); or Other visual method for communicating to the MS information about MSs of interest in the vicinity.

Audible type field 9700*h* specifies whether or not to complement the vicinity monitor display with audible information. Preferably there is a variety of audible types supported for specification, for example:

NULL=no audible to be used for the vicinity monitor;

NEW=provide a short audible indication when a new MS is determined to be newly arrived to, or newly departed from, within the vicinity (specific audible may be configured by the user, and the user may specify a vibrate rather than an audible sound);

PITCH=provide a unique pitch sound (or vibration sequence) based on the number of MSs which are included for being monitored by the vicinity monitor (higher pitch sound (or more vibrations) for higher number of MSs in the vicinity versus lower pitch sound (or less vibrations) for a lower number of MSs in the vicinity); or Other audible method for communicating to the MS information about MSs of interest in the vicinity.

State info field 9700*j* contains state information of the most recently presented vicinity monitor, including the currently displayed MS IDs and information thereof. Field 9700*j* is system maintained and is not editable by a user (e.g. by FIG. 97A). VMDRs may be accessed at MS startup for determining what to start on the MS so the user does not have to restart vicinity monitor(s) after initializing a MS as the result of a power off, reboot, etc.

FIG. 97C depicts a flowchart for a preferred embodiment for vicinity monitor processing. Vicinity monitor processing begins at block 9760 and continues to block 9762 where the vicinity monitor name parameter is determined (passed when starting FIG. 97A), block 9764 where the VMDR with a matching name field 9700*b* is updated for field 9700*f* set to active (i.e. True), and to block 9766 where all VMDR data for the matching name field 9700*b* is retrieved. Block 9766 also resolves any identifiers, such as groups to the MS identifiers that belong to the group, and mapped identifiers for MS identifiers which are to be converted for WDR comparison processing. Block 9766 also converts halo units if necessary to suitable units for proper block 9772 searching, and state info field 9700*j* is accessed for any last active state data for user presentation. Thereafter, block 9766 continues to block 9768.

Block 9768 gets the current location of the MS of FIG. 97C processing (e.g. access to WDR queue 22) and continues to block 9770 which uses field 9700*h* and 9700*d* to display an appropriate initial graphic at the MS. The graphic may be presented in a window, icon, or other MS interface presentation portion. When field 9700*h* is set to Map, a map is presented with the MS of FIG. 97C processing at the center of the map and enough scaled map showing to cover the halo region around the MS. Various embodiments will support conventional zoom in and out control, as well as panning and other conventional map functions. When halo field 9700*d* is NULL, a defaulted amount of map is presented around the MS of FIG. 97C processing. MSs presented on the map (block 9782) are preferably indicated as small colored icons which can be user selected for a pop-up of information identifying MS ID information and attributes which matched expression field 9700*e*.

When field 9700*e* is set to Gauge, an appropriate meter embodiment is presented with an initial setting of 0. Processing continues to block 9772.

Block 9772 produces a list of WDRs from WDR queue 22 which match criteria of VMDR fields 9700*c* and 9700*d*, and those that represent distinct MSs most recently added to queue 22 having an acceptable confidence. An alternate embodiment matches field 9700*e* to WDRs at the time of the queue 22 search, however a preferred embodiment implements special terms as disclosed herein which make for handling expression comparisons at a block 9778. The timeliness of maintaining entries to queue 22 provides a convenient trailing time window for MSs currently in the vicinity. An alternate embodiment can additionally access LBX History 30 provided there is a new VMDR field 9700*k* (e.g. Time criteria field 9700*k*) which governs how far back in history to consider MSs which are/were in the vicinity.

After block 9772 produces a list of distinct MS originated WDRs most recently added to queue 22, processing continues to block 9774 for beginning a loop to process each distinct MS entry of the list. Block 9774 gets the next (or first) entry from the list. Thereafter, block 9776 checks to see if all entries have been processed, or if the list is empty (i.e. nothing found at block 9772). If block 9776 determines there is a list entry (WDR) to process, block 9778 uses expression field 9700*e* against the list entry (WDR fields thereof) to check for a resulting true of false condition. Thereafter, if block 9780 determines the WDR satisfies the expression, then block 9782 updates the vicinity monitor visual (using field 9700*h*) with the MS information and processing continues back to block 9774, otherwise block 9780 continues directly back to block 9774 for processing any next list entry (WDR from block 9772). Block 9782 additionally uses fields 9700*i* and 9700*j* for audibly (or vibe option) indicating an update.

Referring back to block 9776, if all WDRs in the list from block 9772 have been processed, block 9784 updates field 9700*j* with information for unambiguously producing the current vicinity monitor result at a later time (e.g. after a MS is powered on with an active vicinity monitor when last powered off), and block 9786 sleeps according to field 9700*g* (e.g. 3 seconds). When the named thread of FIG. 97C has slept for the proper amount of time, processing continues to block 9788.

Block 9788 peeks the WDR queue 22 for a special vicinity monitor named termination entry inserted by FIG. 97A before continuing to block 9790. If block 9790 determines the termination entry for this named vicinity monitor thread was found, block 9792 removes the termination entry from queue 22, block 9794 properly terminates the vicinity monitor display graphic, block 9796 saves field 9700*f* as inactive (i.e. False), and the named instance of FIG. 97C processing terminates at block 9798. If block 9790 determines the termination entry for this named vicinity monitor thread was not found, then processing continues to block 9768 for another iteration of vicinity monitor update processing.

Thus, the vicinity monitor reflects all those of interest in the vicinity of the MS of FIG. 97C processing on a continuous basis. Any changes between the last iteration beginning at block 9768 and the next iteration beginning at block 9768 is determined through field 9700*j*, for example to provide an audible.

An alternate embodiment will incorporate asynchronous vicinity monitor processing so that the monitor is updated immediately upon arrival of matching WDR information at the MS. Rather than a polling design, block 5703 for mWITS or iWITS processing would incorporate processing for communicating the WDR in its entirety, preferably through a "WITS to vicinity monitor check" queue (referred to as WITS2VM queue), to a FIG. 97D processing. FIG. 97D would loop on the WITS2VM queue for WDRs, and when a WDR is obtained from the WITS2VM queue for processing, all VMDRs would be accessed along with the current MS location of WITS processing to determine if the WDR matches any active vicinity monitor criteria. If no match is found, the WITS2VM queue processing loop returns to get the next WDR communicated from WITS processing (implicit wait on queues if nothing there to process yet). If a match is found for an active vicinity monitor, new FIG. 97D processing would insert an entry to a "vicinity monitor check to vicinity monitor" queue (referred to as VM2VM queue) for being processed by modified FIG. 97C processing so that the monitor graphic is updated accordingly. In this embodiment, a modified FIG. 97C would only be responsible for looping on the VM2VM queue for retrieval of a named termination entry or for the named vicinity monitor matching WDR information to be indicated to the user in at least the vicinity monitor graphic. All vicinity monitors processing (new FIG. 97C processing) would access the VM2VM queue for updating their respective monitor information, and would be started and terminated, as already described. There are other embodiments without departing from the spirit and scope of a vicinity monitor that indicates those nearby in real time, for example in radio signal range of the MS running the vicinity monitor.

Other Embodiments

As mentioned above, architecture 1900 provides a set of processes which can be started or terminated for desired functionality. Thus, architecture 1900 provides a palette from which to choose desired deployment methods for an LN expanse.

In some embodiments, all whereabouts information can be pushed to expand the LN-expanse. In such embodiments, the palette of processes to choose from includes at least process 1902, process 1912 and process 1952. Additionally, process 1932 would be required in anticipation of LN-expanse participating data processing systems having NTP disabled or unavailable. Additionally, process 1922 could be used for ensuring whereabouts are timely (e.g. specifically using all blocks except 2218 through 2224). Depending on DLM capability of MSs in the LN-expanse, a further subset of processes 1902, 1912, 1952 and 1932 may apply. Thread(s) 1902 beacon whereabouts information, regardless of the MS being an affirmifier or pacifier.

In some embodiments, all whereabouts information can be pulled to expand the LN-expanse. In such embodiments, the palette of processes to choose from includes at least process 1922 (e.g. specifically using all blocks except 2226 and 2228), process 1912, process 1952 and process 1942. Additionally, process 1932 would be required in anticipation of LN-expanse participating data processing systems having NTP disabled or unavailable. Depending on DLM capability of MSs in the LN-expanse, a further subset of processes 1922, 1912, 1952, 1942 and 1932 may apply.

There are many embodiments derived from architecture 1900. Essential components are disclosed for deployment varieties. In communications protocols which acknowledge a transmission, processes 1932 may not be required even in absence of NTP use. A sending MS appends a sent date/time stamp (e.g. field 1100*n*) on its time scale to outbound data 1302 and an acknowledging MS (or service) responds with the sent date/time stamp so that when the sending MS receives it (receives data 1302 or 1312), the sending MS (now a receiving MS) calculates a TDOA measurement by comparing when the acknowledgement was received and when it was originally sent. Appropriate correlation outside of process 1932 deployment enables the sending MS to know which response went with which data 1302 was originally sent. A MS can make use of 19xx processes as is appropriate for functionality desired.

In push embodiments disclosed above, useful summary observations are made. Service(s) associated with antennas periodically broadcast (beacon) their reference whereabouts (e.g. WDR information) for being received by MSs in the vicinity. When such services are NTP enabled, the broadcasts include a sent date/time stamp (e.g. field 1100*n*). Upon receipt by a NTP enabled MS in the vicinity, the MS uses the date/time stamp of MS receipt (e.g. 1100*p*) with the date/time stamp of when sent (e.g. field 1100*n*) to calculate a TDOA measurement. Known wave spectrum velocity can translate to a distance. Upon receipt of a plurality of these types of broadcasts from different reference antennas, the MS can triangulate itself for determining its whereabouts relative known whereabouts of the reference antennas. Similarly, reference antennas are replaced by other NTP enabled MSs which similarly broadcast their whereabouts. A MS can be triangulated relative a mixture of reference antennas and other NTP enabled MSs, or all NTP enabled MSs. Stationary antenna triangulation is accomplished the same way as triangulating from other MSs. NTP use allows determining MS whereabouts using triangulation achievable in a single unidirectional broadcast of data (1302 or 1312). Furthermore, reference antennas (service(s)) need not communicate new data 1312, and MSs need not communicate new data 1302. Usual communications data 1312 are altered with a CK 1314 as described above. Usual communications data 1302 are altered with a CK 1304 as described above. This enables a MS with not only knowing there are nearby hotspots, but also where all parties are located (including the MS). Beaconing hotspots, or other broadcasters, do not need to know who you are (the MS ID), and you do not need to know who they are in order to be located. Various bidirectional correlation embodiments can always be used for TDOA measurements.

In pull embodiments disclosed above, data processing systems wanting to determine their own whereabouts (requestors) broadcast their requests (e.g. record 2490). Service(s) or MSs (responders) in the vicinity respond. When responders are NTP enabled, the responses include a sent date/time stamp (e.g. field 1100*n*) that by itself can be used to calculate a TDOA measurement if the requestor is NTP enabled. Upon receipt by a requestor with no NTP, the requestor uses the date/time stamp of a correlated receipt (e.g. 1100*p*) with the date/time stamp of when sent (e.g. fields 1100*n* or 2450*a*) to calculate a time duration (TDOA) for whereabouts determination, as described above. New data or usual communications data applies as described above.

If NTP is available to a data processing system, it should be used whenever communicating date/time information (e.g. NTP bit of field 1100*b*, 1100*n* or 1100*p*) so that by chance a receiving data processing is also NTP enabled, a TDOA measurement can immediately be taken. In cases, where either the sending (first) data processing system or receiving (second) data processing system is not NTP enabled, then the calculating data processing system wanting a TDOA measurement will need to calculate a sent and received time in consistent time scale terms. This includes a correlated bidirectional communications data flow to properly determine duration in time terms of the calculating data processing system. In a send initiated embodiment, a first (sending) data processing system incorporates a sent date/time stamp (e.g. fields 1100*n* or 2450*a*) and determines when a correlated response is received to calculate the TDOA measurement (both times in terms of the first (sending) data processing system). In another embodiment, a second (receiving) data processing system receives a sent date/time stamp (e.g. field 1100*n*) and then becomes a first (sending) data processing as described in the send initiated embodiment. Whatever embodiment is used, it is beneficial in the LN-expanse to minimize communications traffic.

The NTP bit in date/time stamps enables optimal elegance in the LN-expanse for taking advantage of NTP when available, and using correlated transmissions when it is not. A NTP enabled MS is somewhat of a chameleon in using unidirectional data (1302 or 1312 received) to determine whereabouts relative NTP enabled MS(s) and/or service(s), and then using bidirectional data (1302/1302 or 1302/1312) relative MS(s) and/or service(s) without NTP. A MS is also a chameleon when considering it may go in and out of a DLM or ILM identity/role, depending on what whereabouts technology is available at the time.

The MS ID (or pseudo MS ID) in transmissions is useful for a receiving data processing system to target a response by addressing the response back to the MS ID. Targeted transmissions target a specific MS ID (or group of MS IDs), while broadcasting is suited for reaching as many MS IDs as possible. Alternatively, just a correlation is enough to target a data source.

In some embodiments where a MS is located relative another MS, this is applicable to something as simple as locating one data processing system using the location of another data processing system. For example, the whereabouts of a cell phone (first data processing system) is used to locate an in-range automotive installed (second) data processing system for providing new locational applications to the second data processing system (or visa-versa). In fact, the second data processing may be designed for using the nearby first data processing system for determining its whereabouts. Thus, as an MS roams, in the know of its own whereabouts, the MS whereabouts is shared with nearby data processing systems for new functionality made available to those nearby data processing systems when they know their own whereabouts (by associating to the MS whereabouts). Data processing systems incapable of being located are now capable of being located, for example locating a data processing equipped shopping cart with the location of an MS, or plurality of MSs.

Architecture 1900 presents a preferred embodiment for IPC (Interprocess Communications Processing), but there are other embodiments for starting/terminating threads, signaling between processes, semaphore controls, and carrying out present disclosure processing without departing from the spirit and scope of the disclosure. In some embodiments, threads are automatically throttled up or down (e.g. 1952-Max) per unique requirements of the MS as determined by how often threads loop back to find an entry already waiting in a queue. If thread(s) spend less time blocked on queue, they can be automatically throttled up. If thread(s) spend more time blocked on queue, they can be automatically throttled down. Timers can be associated with queue retrieval to keep track of time a thread is blocked.

LBX history 30 preferably maintains history information of key points in processing where history information may prove useful at a future time. Some of the useful points of interest may include:

Interim snapshots of permissions 10 (for documenting who had what permissions at what time) at block 1478;

- Interim snapshots of charters 12 (for documenting charters in effect at what times) at block 1482;
- Interim snapshots of statistics 14 (for documenting useful statistics worthy of later browse) at block 1486;
- Interim snapshots of service propagation data of block 1474;
- Interim snapshots of service informant settings of block 1490;
- Interim snapshots of LBX history maintenance/configurations of block 1494;
- Interim snapshots of a subset of WDR queue 22 using a configured search criteria;
- Interim snapshots of a subset of Send queue 24 using a configured search criteria;
- Interim snapshots of a subset of Receive queue 26 using a configured search criteria;
- Interim snapshots of a subset of PIP data 8;
- Interim snapshots of a subset of data 20;
- Interim snapshots of a subset of data 36;
- Interim snapshots of other resources 38;
- Trace, debug, and/or dump of any execution path subset of processing flowcharts described; and/or
- Copies of data at any block of processing in any flowchart heretofore described.

Entries in LBX history 30 preferably have entry qualifying information including at least a date/time stamp of when added to history, and preferably an O/S PID and O/S TID (Thread Identifier) associated with the logged entry, and perhaps applicable applications involved (e.g. see fields 1100*k*). History 30 may also be captured in such a way there are conditions set up in advance (at block 1494), and when those conditions are met, applicable data is captured to history 30. Conditions can include terms that are MS system wide, and when the conditions are met, the data for capture is copied to history. In these cases, history 30 entries preferably include the conditions which were met to copy the entry to history. Depending on what is being kept to history 30, this can become a large amount of information. Therefore, FIG. 27A can include new blocks for pruning history 30 appropriately. In another embodiment, a separate thread of processing has a sleeper loop which when awake will prune the history 30 appropriately, either in its own processing or by invoking new FIG. 27A blocks for history 30. A parameter passed to processing by block 2704 may include how to prune the history, including what data to prune, how old of data to prune, and any other criteria appropriate for maintaining history 30. In fact, any pruning by FIG. 27A may include any reasonable parameters for how to prune particular data of the present disclosure.

Location applications can use the WDR queue for retrieving the most recent highest confidence entry, or can access the single instance WDR maintained (or most recent WDR of block 289 discussed above). Optimally, applications are provided with an API that hides what actually occurs in ongoing product builds, and for ensuring appropriate semaphore access to multi-threaded accessed data.

Correlation processing does not have to cause a WDR returned. There are embodiments for minimal exchanges of correlated sent date/time stamps and/or received date/time stamps so that exchanges are very efficient using small data exchanges. Correlation of this disclosure was provided to show at least one solution, with keeping in mind that there are many embodiments to accomplish relating time scales between data processing systems.

Architecture 1900 provides not only the foundation for keeping an MS abreast of its whereabouts, but also the foundation upon which to build LBX nearby functionality. Whereabouts of MSs in the vicinity are maintained to queue 22. Permissions 10 and charters 12 can be used for governing which MSs to maintain to queue 22, how to maintain them, and what processing should be performed. For example, MS user Joe wants to alert MS user Sandy when he is in her vicinity, or user Sandy wants to be alerted when Joe is in her vicinity. Joe configures permissions enabling Sandy to be alerted with him being nearby, or Sandy configured permissions for being alerted. Sandy accepts the configuration Joe made, or Joe accepts the configuration Sandy made. Sandy's queue 22 processing will ensure Joe's WDRs are processed uniquely for desired functionality.

FIG. 8C was presented in the context of a DLM, however architecture 1900 should be applied for enabling a user to manually request to be located with ILM processing if necessary. Blocks 862 through 870 are easily modified to accomplish a WDR request (like blocks 2218 through 2224). In keeping with current block descriptions, block 872 would become a new series of blocks for handling the case when DLM functionality was unsuccessful. New block 872-A would broadcast a WDR request soliciting response (see blocks 2218 through 2224). Thereafter, a block 872-B would wait for a brief time, and subsequently a block 872-C would check if whereabouts have been determined (e.g. check queue 22). Thereafter, if a block 872-D determines whereabouts were not determined, an error could be provided to the user, otherwise the MS whereabouts were successfully determined and processing continues to block 874. Applications that may need whereabouts can now be used. There are certainly emergency situations where a user may need to rely on other MSs in the vicinity for being located. In another embodiment, LBX history can be accessed to at least provide a most recent location, or most recently traveled set of locations, hopefully providing enough information for reasonably locating the user in the event of an emergency, when a current location cannot be determined.

To maintain modularity in interfaces to queues 24 and 26, parameters may be passed rather than having the modular send/receive processing access fields of application records. When WDRs are "sent", the WDR will be targeted (e.g. field 1100*a*), perhaps also with field 1100*f* indicating which communications interface to send on (e.g. MS has plurality of comm. interfaces 70). When WDRs are "broadcast" (e.g. null MS ID), the WDR is preferably outbound on all available comm. interfaces 70, unless field 1100*f* indicates to target a comm. interface. Analogously, when WDR requests are "sent", the request will be targeted (e.g. field 2490*a*), perhaps also with field 2490*d* indicating which communications interface to send on (e.g. MS has plurality of comm. interfaces 70). When WDR requests are "broadcast" (e.g. null MS ID), the WDR is preferably outbound on all available comm. interfaces 70, unless field 1100*f* indicates to target a comm. interface.

Fields 1100*m*, 1100*n*, 1100*p*, 2490*b* and 2490*c* are also of interest to the transport layer. Any subset, or all, of transport related fields may be passed as parameters to send processing, or received as parameters from receiving processing to ensure send and receive processing is adaptable using pluggable transmission/reception technologies.

An alternate embodiment to the BESTWDR WDR returned by FIG. 26B processing may be set with useful data for reuse toward a future FIG. 26B processing thread whereabouts determination. Field 1100*f* can be set with useful data for that WDR to be in turn used at a subsequent whereabouts determination of FIG. 26B. This is referred to as Recursive Whereabouts Determination (RWD) wherein ILMs determine WDRs for their whereabouts and use them again for calculating future whereabouts (by populating useful TDOA, AOA, MPT and/or whereabouts information to field **1100*f***).

An alternate embodiment may store remote MS movement tolerances (if they use one) to WDR field **1100*f* so the receiving MS can determine how stale are other WDRs in queue 22 from the same MS, for example when gathering all useful WDRs to start with in determining whereabouts of FIG. 26B processing (e.g. block 2634). Having movement tolerances in effect may prove useful for maximizing useful WDRs used in determining a whereabouts (FIG. 26**B processing).

Many LBX aspects have been disclosed, some of which are novel and new in LBS embodiments. While it is recommended that features disclosed herein be implemented in the context of LBX, it may be apparent to those skilled in the art how to incorporate features which are also new and novel in a LBS model, for example by consolidating distributed permission, charters, and associated functionality to a shared service connected database.

Privileges and/or charters may be stored in a datastream format (e.g. X.409), syntactical format (e.g. XML, source code (like FIGS. 51A and 51B)), compiled or linked programming data, database data (e.g. SQL tables), or any other suitable format. Privileges and/or charters may be communicated between MSs in a datastream format (e.g. X.409), syntactical format (e.g. XML, source code (like FIGS. 51A and 51B)), compiled or linked programming data, database data (e.g. SQL tables), or any other suitable format.

Block 4466 may access an all or none permission (privilege) to receive permission and/or charter data (depending on what data is being received) from a particular identity (e.g. user or particular MS). Alternate embodiments implement more granulated permissions (privileges) on which types, sets, or individual privileges and/or charters can be received so that block 4470 will update local data with only those privileges or charters that are permitted out of all data received. One embodiment is to receive all privileges and/or charters from remote systems for local maintaining so that FIG. 57 processing can later determine what privileges and charters are enabled. This has the benefit for the receiving user to know locally what the remote user(s) desire for privileges and charters without them necessarily being effective. Another embodiment is for FIG. 44B to only receive the privileged subset of data that can be used (privileged) at the time, and to check at block 4466 which privileges should be used to alter existing privileges or charters from the same MS (e.g. altered at block 4470). This has the potential benefit of less MS data to maintain and better performance in FIG. 57 processing for dealing only with those privileges and charters which may be useable. A user may still browse another user's configurations with remote data access anyway.

WPL is a unique programming language wherein peer to peer interaction events containing whereabouts information (WDRs) provide the triggers for novel location based processing, however a LBS embodiment may also be pursued. Events seen, or collected, by a service may incorporate WPL, the table record embodiments of FIGS. 35A through 37C, a suitable programming executable and/or data structures, or any other BNF grammar derivative to carry out analogous event based processing. For example, the service would receive inbound whereabouts information (e.g. WDRs) from participating MSs and then process accordingly. An inbound, outbound, and in-process methodology may be incorporated analogously by processing whereabouts information from MSs as it arrives to the service (inbound), processing whereabouts information as it is sent out from the service (outbound) to MSs, and processing whereabouts information as it is being processed by the service (in process) for MSs. In one embodiment, service informant code 28 is used to keep the service informed of the LBX network. In another embodiment, a conventional LBS architecture is deployed for collecting whereabouts of MSs.

An alternate embodiment processes inbound/outbound/maintained WDRs in process transmitted to a MS from non-mobile data processing systems, perhaps data processing systems which are to emulate a MS, or perhaps data processing systems which are to contribute to LBX processing. Interoperability is as disclosed except data processing systems other than MSs participate in interacting with WDRs. In other embodiments, the data processing systems contain processing disclosed for MSs to process WDRs from MSs (e.g. all disclosed processing or any subset of processing (e.g. WITS processing)).

Communications between MSs and other MSs, or between MSs and data processing systems, may be compressed, encrypted, and/or encoded for performance or concealing. For example, data is encrypted and/or compressed: prior to being outbound (e.g. via queue 24) from a LBX processing thread (e.g. encrypted and/or compressed at blocks 2016, 2224, 2324, 2516); by communications processing closer to transmission (e.g. after feeding from queue 24); or at an appropriate software interface layer (e.g. link layer); preferably providing configurations to a user for which encryption and/or compression to perform. Any protocol, X.409 encodings, datastream encodings, or other data which is critical for processing shall have integrity regardless of an encapsulating or embedded encoding that may be in use. Further, internalizations of the BNF grammar may also be compressed, encrypted, and/or encoded for performance or concealing. Regardless of an encapsulating or embedded encoding that may be in use, integrity shall be maintained for processing. When other encodings are used (compression, encryption, etc), an appropriate encode and decode pair of processing is used (compress/decompress, encrypt/decrypt, etc).

Grammar specification privileges are preferably enforced in real time when processing charters during WITS processing. For example, charters specified may initially be ineffective, but can be subsequently enabled with a privilege. It is preferred that privileges 10 and charters 12 be maintained independently during configuration time, and through appropriate internalization. This allows specifying anything a user wants for charters, regardless of privileges in effect at the time of charter configuration, so as to build those charters which are desired for processing, but not necessarily effective yet. Privileges can then be used to enable or disable those charters as required. In an alternate embodiment, privileges can be used to prevent certain charters from even being created. This helps provide an error to the user at an appropriate time (creating an invalid charter), however a valid charter may lose a privilege later anyway and become invalid. The problem of a valid charter becoming invalid later has to be dealt with anyway (rather than automatically deleting the newly invalid charter). Thus, it is preferable to allow any charters and privileges to be specified, and then candidate for interpreting at WITS processing time.

Many embodiments are better described by redefining the "W" in acronyms used throughout this disclosure for the more generic "Wireless" use, rather than "Whereabouts" use. Thus, WDR takes on the definition of Wireless Data Record. In various embodiments, locational information fields become less relevant, and in some embodiments mobile location information is not used at all. As stated above with FIG. 11A, when a WDR is referenced in this disclosure, it is referenced in a general sense so that the contextually reasonable subset of the WDR of FIG. 11A is used. This notion is taken steps further.

A WDR 1100 may be redefined with a core section containing only the MS ID field 1100*a*. The MS ID field 1100*a* facilitates routing of the WDR, and addressing a WDR, for example in a completely wireless transmission of FIGS. 13A through 13C. In an embodiment with a minimal set of WDR fields, the WDR may contain only two (2) fields: a MS ID field 1100*a* and application fields 1100*k*. In an embodiment with minimal changes to the architecture heretofore disclosed, all WDR 1100 fields 1100*b* through 1100*p* are maintained to field 1100*k*. Disclosure up to this point continues to incorporate processing heretofore described, except WDR fields which were peers to application fields 1100*k* in a WDR 1100 are now subordinate to field 1100*k*. However, the field data is still processed the same way as disclosed, albeit with data being maintained subordinate to field 1100*k*. Thus, field 1100*k* may have broader scope for carrying the data, or for carrying similar data.

In a more extreme embodiment, a WDR (Wireless Data Record) will contain only two fields: a MS ID field 1100*a* and application fields 1100*k*; wherein a single application (or certain applications) of data is maintained to field 1100*k*. For example, the WDR is emitted from mobile MSs as a beacon which may or may not be useful to receiving MSs, however the beaconed data is for one application (other embodiments can be for a plurality of applications). In this minimal embodiment, a minimal embodiment of architecture 1900 is deployed with block changes removing whereabouts/location processing. The following processes may provide such a minimal embodiment palette for implementation:

Wireless Broadcast Thread(s) 1902—FIG. 20 block 2010 would be modified to "Peek WDR queue for most recent WDR with MS ID=this MS". Means would be provided for date/time stamps maintained to queue 22 for differentiating between a plurality of WDRs maintained so the more recent can be retrieved. This date/time stamp may or may not be present in a WDR during transmission which originated from a remote MS (i.e. in the WDR transmitted (beaconed)). Regardless, a date/time stamp is preferably maintained in the WDR of queue 22. Appropriate and timely queue 22 pruning would be performed for one or more relevant WDRs at queue 22. FIG. 20 would broadcast at least the MS ID field 1100*a* and application data field 1100*k* for the application.

Wireless Collection Thread(s) 1912—FIG. 21 would be modified to remove location determination logic and would collect WDRs received that are relevant for the receiving MS and deposit them to queue 22, preferably with a date/time stamp. Relevance can be determined by if there are permissions or charters in place for the originating MS ID at the receiving MS (i.e. WITS filtering and processing). The local MS applicable could access WDRs from queue 22 as it sees fit for processing in accordance with the application, as well as privileges and charters.

Wireless Supervisor Thread(s) 1922—FIG. 22 block 2212 would be modified to "Peek WDR queue for MS ID=this MS, and having a reasonably current date/time stamp" to ensure there is at least one timely WDR contained at queue 22 for this MS. If there is not a timely WDR at the MS, then processing of block 2218 through 2228 would be modified to request helpful WDRs from MSs within the vicinity, assuming the application applicable warrants requesting such help, otherwise blocks 2218 through 2228 would be modified to trigger local MS processing for ensuring a timely WDR is deposited to queue 22.

Wireless Data Record Request Thread(s) 1942—FIG. 25 block 2510 would be modified to "Peek WDR queue for most recent WDR with this MS ID" and then sending/broadcasting the response to the requesting MS. FIG. 25 would be relevant in an architecture wherein the application does in fact rely on MSs within the vicinity for determining its own WDRs.

One application using such a minimal embodiment may be the transmission of profile information (see # and % operators above). As a MS roams, it beacons out its profile information for other MSs to receive it. The receiving MSs then decide to process the profile data in fields 1100*k* according to privileges and/or charters that are in place. Note that there is no locating information of interest. Only the profile information is of interest. Thus, the MSs become wireless beacons of data that may or may not be processed by receiving MSs within the wireless vicinity of the originating MS. Consider a singles/dating application wherein the profile data contains characteristics and interests of the MS user. A privilege or charter at the receiving MS could then process the profile data when it is received, assuming the receiving MS user clarified what is of interest for automated processing through configurations for WITS processing.

While a completely wireless embodiment is the preferred embodiment since MS users may be nearby by virtue of a completely wireless transmission, a longer range transmission could be facilitated by architectures of FIGS. 50A through 50C. In an architecture of transmission which is not completely wireless, the minimal embodiment WDR would include field(s) indicating a route which was not completely wireless, perhaps how many hops, etc as disclosed above. WITS filtering would play an important role to ensure no outbound transmissions occur unless there are configurations in place that indicate a receiving MS may process it (i.e. there are privileges and/or charters in place), and no inbound processing occurs unless there are appropriate configurations in place for the originating MS(s) (i.e. there are privileges and/or charters in place). Group identities of WDRs can become more important as a criteria for WITS filtering, in particular when a group id indicates the type of WDR. The longer range embodiment of FIG. 50A through 50C preferably incorporates a send transmission for directing the WDRs to MSs which have candidate privileges and/or charters in place, rather than a broadcast for communicating WDRs. Broadcasting can flood a network and may inundate MSs with information for WITS filtering.

FIG. 59 is typically used to set variables which are anticipated or accessed by applications to carry out certain application behavior and functionality. In one embodiment, applications poll data set by FIG. 59 in order to determine how they are to process. In another embodiment, FIG. 59 sets or clears semaphores for asynchronous application thread(s) for instant or timely processing. In the essence of other embodiments, FIG. 59 sets data which is used to communicate privileged intention to one or more applications. FIG. 59 provides a convenient "plug-in" model for applications by isolating privileged action triggers to data used to middleman the LBX platform to the "plug-in" applications. There are a variety of "plug-in" models supported. Applications "plug-in" through making available data which is accessible to the LBX platform.

On the other hand, FIG. 60 allows defining new complex privileges such that any subset of charter functionality, or application functionality, becomes a FIG. 60 privileged action, for example to cause certain application behavior and functionality immediately just by presence of a set privilege. Thus, a complex action or set of actions which may be embodied as an application are brought into the LBX framework by being implemented in their entirety as a single action which can be triggered by simply granting a privilege.

FIGS. 59 and 60 can be the same in results, but accomplish the results in different ways. In one embodiment, FIG. 59 assumes an asynchronous application thread accesses data which has been modified (e.g. enabled/disabled). In one embodiment, FIG. 60 directly incorporates the application processing for the privilege determined. However, FIGS. 59 and 60 may be implemented for being interchangeable. Regardless of MS LBX utilization for RFID or WDR interactions, automated peer to peer functionality disclosed in a first form of: FIG. 59 processing, FIG. 60 processing, atomic command processing, service informant processing, charter processing, or combinations thereof; can be implemented in any other form: FIG. 59 processing, FIG. 60 processing, atomic command processing, service informant processing, charter processing, home grown, Application Terms (AppTerm), Application fields, or combinations thereof; without departing from the spirit and scope of the disclosure. For example, a proven popular MS charter configuration may be replaced by providing a privilege which can be used between MSs, thereby eliminating the need to go through the time to configure the charter. The privilege itself replaces what the charter provided. In another example, a new atomic command may be used to replace complex charter configurations, or replaces a set of specific use of a plurality of other atomic commands, in order to prevent burdening MS users with configuring desirable MS behavior.

There are many embodiments for synchronizing key regions of executable code of this disclosure, and locking into a single detailed design is not intended. A synchronization design can vary based on software programming decisions. In some embodiments, a MS is equipped with different synchronization models which are configurable at manufacturing time, or by an administrator or user. In some embodiments, a prescribed synchronization model is deployed based on the type of MS and anticipated use of the MS. For example, WITS processing, or subsets therein, may be semaphore protected so that only a single WDR is processed at critical regions in charter processing. Identifying critical regions can be dependent on different uses of the LBX architecture. In one example, this can be advantageous for WITS processing involving many MSs with privileged configurations in the vicinity of a receiving MS. Consider an electronic tag example. In this example, one MS is “it” and a plurality of other MSs are avoiding becoming “it”. When the “it” MS becomes close enough to an other MS, the other MS becomes “it”. But what happens when the MS becomes close enough to a plurality of other MSs? Which MS becomes “it”? It is important to prevent making more than one MS “it”, thus synchronization provides a more convenient method for preventing this from happening. To provide clear explanation, assume that only a single iWITS WDR processing thread can execute FIG. 57 at a time. While it is certainly better performance to identify the processing block(s) (i.e. subset(s)) of FIG. 57 processing that should be synchronized rather than the entire FIG. 57 processing, doing so here for exemplification simplifies the electronic tag discussion. Thus, if there is a group of MSs in a group called PlayTag known to each participating MS, every privileged MS can have the following charter configuration in light of the synchronization to FIG. 57 processing:

```
( _l_msid ^ "PlayTag" & \loc_my $(1M) _l_location & T_it) :
   Invoke Data (T_it, True, _l_msid),
   Invoke Data (T_it, False, \thisMS);
```

Notice that the charter configuration assumes a single unit of work including the time of checking the T_it variable (True=your “it”), marking the MS which is within 1 meter to this MS location as being “it”, and the time of clearing the local application variable which marks this MS as being “it”. Synchronization becomes quite important for this charter to operator correctly, otherwise another MS can cause processing the same charter at substantially the same time for unpredictable results. Thus, thread processing synchronization is to be analyzed and incorporated as is appropriate in context of the various embodiments for deployment. In the example, the electronic tag application (e.g. with prefix “T_”) may additionally monitor the T_it AppTerm variable to cause a beaconing sound, and/or beaconing visual indication (flashing bright red screen) so that nearby MS users know who is “it”.

Various company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method comprising:

receiving, by a receiving data processing system, a plurality of data records for a plurality of data processing systems wherein each record of the plurality of data records is associated to a particular data processing system, the each record including particular physical location information for the particular data processing system and particular match criteria information for the particular data processing system, the particular match criteria information for being compared to application information having data of the application information presented in a first sorted order to a user interface of a mobile data processing system, and the particular physical location information for being compared to a specified physical location of a vicinity request for altering the first sorted order to a second sorted order presented to the user interface of the mobile data processing system;

storing searchable information for the each record;

presenting the data of the application information to the user interface of the mobile data processing system in the first sorted order;

recognizing the vicinity request after the presenting the data of the application information to the user interface of the mobile data processing system in the first sorted order, the vicinity request having the specified physical location;

comparing the application information having data of the application information presented in the first sorted order with the particular match criteria information upon the recognizing the vicinity request;

determining the particular physical location information of a same one or more records of the plurality of data records that includes the particular match criteria information which matches the application information; and presenting the data of the application information to the user interface of the mobile data processing system in the second sorted order according to at least one physical location being located in a vicinity of the specified physical location wherein the at least one physical location is determined from the particular physical location information of the same one or more records of the plurality of data records that includes the particular match criteria information which matches the application information.

2. The method of claim 1 wherein the second sorted order is determined with the plurality of data processing systems being physically located in the vicinity of the specified physical location at a time of the vicinity request.

3. The method of claim 1 wherein the second sorted order is determined with sorting by a distance relative the specified physical location.

4. The method of claim 3 wherein the distance is user specified.

5. The method of claim 1 wherein the second sorted order is determined with sorting by time information.

6. The method of claim 5 wherein the time information is user specified.

7. The method of claim 1 wherein the comparing the application information includes comparing at least one of: an identifier, a source address, a recipient address, a user identifier, a data processing system identifier, a caller identifier, an owner identifier, a creator identifier, an editor identifier, an assignor identifier, a group identifier, or an identifier associated to a user of an application.

8. The method of claim 1 wherein the particular match criteria information includes a plurality of identifiers.

9. The method of claim 1 wherein the specified physical location is a location of the mobile data processing system.

10. The method of claim 1 wherein the specified physical location is a location of an identified data processing system.

11. The method of claim 1 wherein the specified physical location is a user specified location.

12. The method of claim 1 wherein the specified physical location is a location of a data processing system other than the mobile data processing system.

13. The method of claim 1 wherein the at least one physical location being located in the vicinity of the specified physical location includes the at least one physical location being within a specified distance of the specified physical location.

14. The method of claim 1 wherein the recognizing the vicinity request includes recognizing the vicinity request upon a new arrival of received application information.

15. The method of claim 1 wherein the recognizing the vicinity request includes recognizing the vicinity request by automated polling of the searchable information.

16. The method of claim 1 wherein the recognizing the vicinity request includes recognizing the vicinity request by a user configured action.

17. The method of claim 1 wherein the recognizing the vicinity request includes recognizing the vicinity request from an application programming interface invocation by a particular application of the mobile data processing system.

18. The method of claim 1 wherein the receiving data processing system is the mobile data processing system and all processing of the method is performed by the mobile data processing system.

19. The method of claim 1 wherein the application information includes is at least one of: one or more email application data items, one or more messaging application data items, one or more calendar application data items, one or more address book application data items, one or more phone application data items, one or more map application data items, one or more storage application data items, one or more file system application data items, one or more database application data items, one or more search application data items, one or more internet browser application data items, one or more emergency application data items, one or more RFID application data items, one or more hotspot application data items, one or more services application data items, one or more traffic application data items, one or more appliance application data items, one or more device application data items, one or more account management application data items, one or more public transportation application data items, one or more carpool application data items, one or more advertising application data items, one or more news application data items, one or more picture application data items, one or more video application data items, one or more parking lot application data items, one or more employment application data items, or one or more real estate application data items.

20. A location processing system comprising:

one or more processors; and at least one memory coupled to the one or more processors, wherein the at least one memory includes executable instructions which, when executed by the one or more processors, results in the location processing system:

receiving a plurality of data records for a plurality of data processing systems wherein each record of the plurality of data records is associated to a particular data processing system, the each record including particular physical location information for the particular data processing system and particular match criteria information for the particular data processing system, the particular match criteria information for being compared to application information having data of the application information presented in a first sorted order to a user interface of a mobile data processing system, and the particular physical location information for being compared to a specified physical location of a vicinity request for altering the first sorted order to a second sorted order presented to the user interface of the mobile data processing system;

storing searchable information for the each record;

causing presenting the data of the application information to the user interface of the mobile data processing system in the first sorted order recognizing the vicinity request after the presenting the data of the application information to the user interface of the mobile data processing system in the first sorted order, the vicinity request having the specified physical location;

comparing the application information having data of the application information presented in the first sorted order with the particular match criteria information upon the recognizing the vicinity request;

determining the particular physical location information of a same one or more records of the plurality of data records that includes the particular match criteria information which matches the application information; and causing presenting the data of the application information to the user interface of the mobile data processing system in the second sorted order according to at least one physical location being located in a vicinity of the specified physical location wherein the at least one physical location is determined from the particular physical location information of the same one or more records of the plurality of data records that includes the particular match criteria information which matches the application information.

21. The location processing system of claim 20 wherein the second sorted order is determined with the plurality of data processing systems being physically located in the vicinity of the specified physical location at a time of the vicinity request.

22. The location processing system of claim 20 wherein the second sorted order is determined with sorting by a distance relative the specified physical location.

23. The location processing system of claim 22 wherein the distance is user specified.

24. The location processing system of claim 20 wherein the second sorted order is determined with sorting by time information.

25. The location processing system of claim 24 wherein the time information is user specified.

26. The location processing system of claim 20 wherein the comparing the application information includes comparing at least one of: an identifier, a source address, a recipient address, a user identifier, a data processing system identifier, a caller identifier, an owner identifier, a creator identifier, an editor identifier, an assignor identifier, a group identifier, or an identifier associated to a user of an application.

27. The location processing system of claim 20 wherein the particular match criteria information includes a plurality of identifiers.

28. The location processing system of claim 20 wherein the specified physical location is a location of the mobile data processing system.

29. The location processing system of claim 20 wherein the specified physical location is a location of an identified data processing system.

30. The location processing system of claim 20 wherein the specified physical location is a user specified location.

31. The location processing system of claim 20 wherein the specified physical location is a location of a data processing system other than the mobile data processing system.

32. The location processing system of claim 20 wherein the at least one physical location being located in the vicinity of the specified physical location includes the at least one physical location being within a specified distance of the specified physical location.

33. The location processing system of claim 20 wherein the recognizing the vicinity request includes recognizing the vicinity request upon a new arrival of received application information.

34. The location processing system of claim 20 wherein the recognizing the vicinity request includes recognizing the vicinity request by automated polling of the searchable information.

35. The location processing system of claim 20 wherein the recognizing the vicinity request includes recognizing the vicinity request by a user configured action.

36. The location processing system of claim 20 wherein the recognizing the vicinity request includes recognizing the vicinity request from an application programming interface invocation by a particular application of the mobile data processing system.

37. The location processing system of claim 20 wherein all processing is performed by the mobile data processing system.

38. The location processing system of claim 20 wherein the application information includes at least one of: one or more email application data items, one or more messaging application data items, one or more calendar application data items, one or more address book application data items, one or more phone application data items, one or more map application data items, one or more storage application data items, one or more file system application data items, one or more database application data items, one or more search application data items, one or more internet browser application data items, one or more emergency application data items, one or more RFID application data items, one or more hotspot application data items, one or more services application data items, one or more traffic application data items, one or more appliance application data items, one or more device application data items, one or more account management application data items, one or more public transportation application data items, one or more carpool application data items, one or more advertising application data items, one or more news application data items, one or more picture application data items, one or more video application data items, one or more parking lot application data items, one or more employment application data items, or one or more real estate application data items.

* * * * *